United States Patent [19]

Ebling et al.

[11] Patent Number: 4,864,507

[45] Date of Patent: Sep. 5, 1989

[54] METHOD AND APPARATUS FOR PROCESS MANUFACTURE CONTROL

[75] Inventors: Thomas D. Ebling, Boston; Susan J. Connor, Harvard; Thomas C. Howd, Framingham; Olin W. Thompson, Jr., Newton, all of Mass.

[73] Assignee: Marcam Corporation, Needham, Mass.

[21] Appl. No.: 91,988

[22] Filed: Sep. 1, 1987

[51] Int. Cl.⁴ ........................ G05B 17/00; G06F 15/46

[52] U.S. Cl. .................................... 364/468; 364/148; 364/149; 364/550; 364/551.01

[58] Field of Search ............... 364/468, 469, 148, 550, 364/551, 149, 552, 478, 554, 200, 900

[56] References Cited

PUBLICATIONS

"New Approaches to Production Management for the Food Processing Industry, " by O. W. Thompson and S. J. Connor, portions of article appeared in the Jan. and May 1986 issues of *Food Engineering Magazine*, pp. 1–6.

"Upgrading Accounting and Costing Systems," by O. W. Thompson and S. J. Connor, *Manufacturing Systems*, May 1986, Hitchcock Publishing Co.

"The Value-Added Equation," by Susan Connor, *Manufacturing Systems*, Dec. 1986, Hitchcock Publishing Company.

"Part One: The Volume/Method Matrix," by S. J. Connor and O. W. Thompson, *NEWS/34-38*, May 1986, pp. 3–9.

"Part Two: Integrating the System," by S. J. Connor and O. W. Thompson, *NEWS/34-28*, Jun. 1986, pp. 10–15.

"Part Three: Systems Management in Process Manufacturing," by S. J. Connor and O. W. Thompson, *NEWS/34-38*, Jul. 1986, pp. 16–20.

"Part Four: The High-Volume Manufacturing Environment," by S. J. Connor and O. W. Thompson, *NEWS/34-38*, Aug. 1986, pp. 21–32.

"Managing Critical Resources—A Total Manufacturing Planning System," by O. W. Thompson, S. J. Connor, *P&IM Review*, Mar. 1986.

*Primary Examiner*—Jerry Smith
*Assistant Examiner*—Paul Gordon
*Attorney, Agent, or Firm*—Lahive & Cockfield

[57] ABSTRACT

A digital data processing apparatus for manufacturing process control includes input elements for inputting digital signals representative resource elements consumed in a manufacturing process, resource elements produced by the manufacturing process and manufacturing relations between at least one consumed resource and a set of one or more produced resources. These manufacturing relations include at least one of an operational relation, a planning relation, and a financial relation. A production modeling element generates and stores a production model representative of the manufacturing relations. The modeling element includes a sub-element for generating digital signals representing manufacturing one-to-one, one-to-many, many-to-one, and many-to-many relations between consumed and produced resource elements.

63 Claims, 103 Drawing Sheets

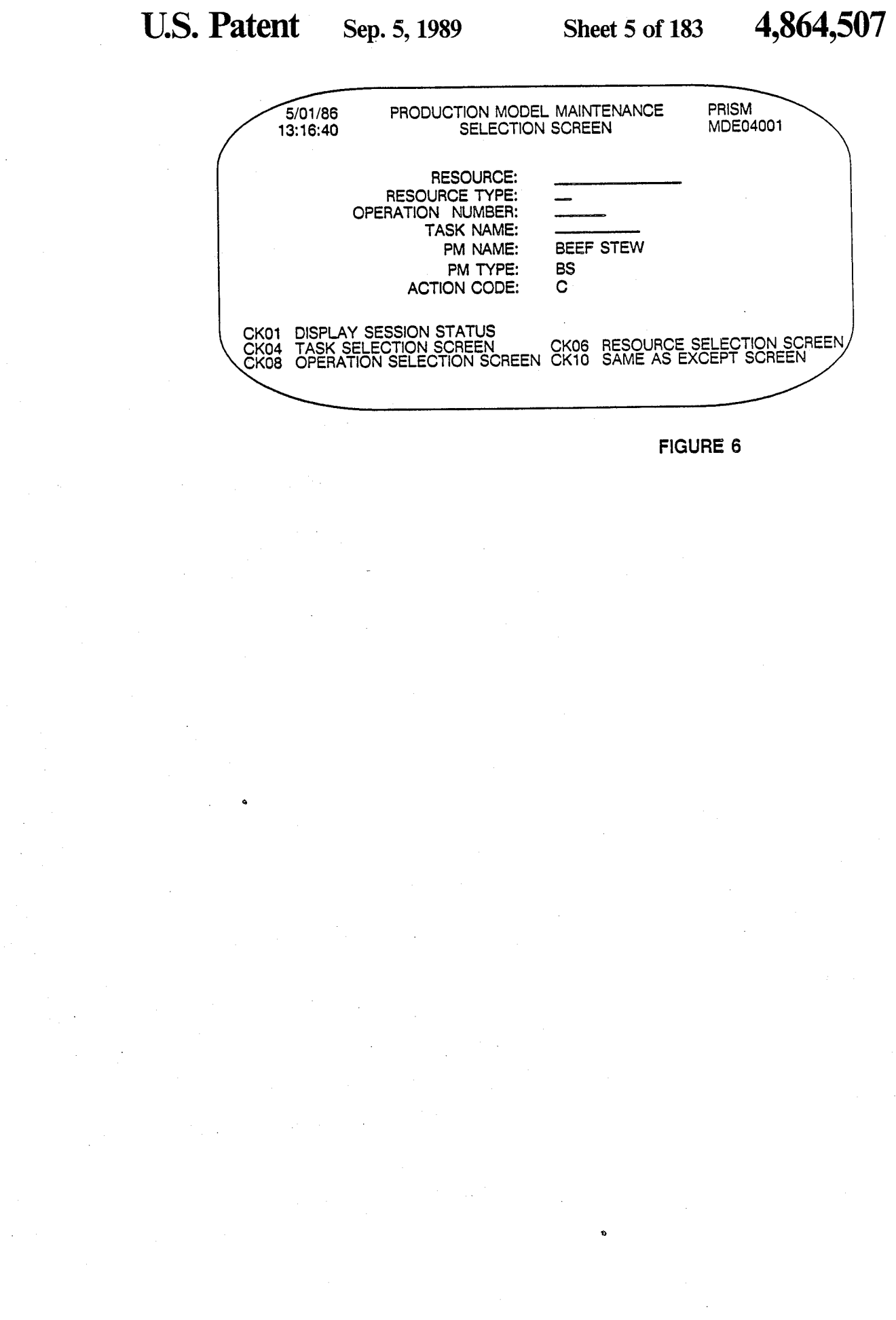

```
 5/01/86        PRODUCTION MODEL MAINTENANCE        PRISM
13:16:40              SELECTION SCREEN               MDE04001

                   RESOURCE:  ______________
              RESOURCE TYPE:  __
           OPERATION NUMBER:  _____
                  TASK NAME:  _________
                    PM NAME:  BEEF STEW
                    PM TYPE:  BS
                ACTION CODE:  C

CK01  DISPLAY SESSION STATUS
CK04  TASK SELECTION SCREEN           CK06  RESOURCE SELECTION SCREEN
CK08  OPERATION SELECTION SCREEN      CK10  SAME AS EXCEPT SCREEN
```

FIGURE 6

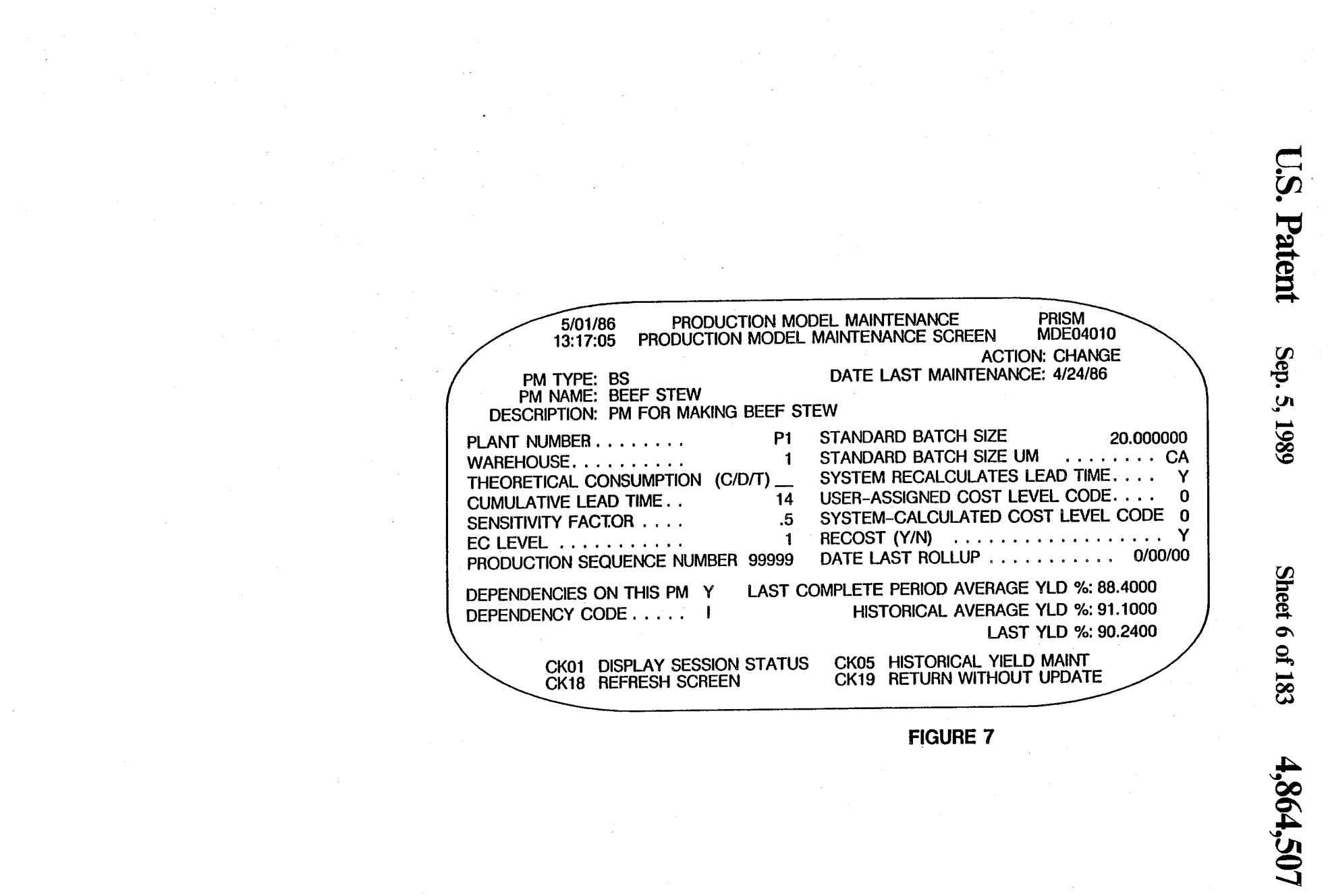

```
5/01/86        PRODUCTION MODEL MAINTENANCE              PRISM
13:17:05   PRODUCTION MODEL MAINTENANCE SCREEN      MDE04010
                                                   ACTION: CHANGE
     PM TYPE:  BS                       DATE LAST MAINTENANCE: 4/24/86
     PM NAME:  BEEF STEW
 DESCRIPTION:  PM FOR MAKING BEEF STEW

PLANT NUMBER . . . . . . . .              P1  STANDARD BATCH SIZE               20.000000
WAREHOUSE. . . . . . . . . .               1  STANDARD BATCH SIZE UM  . . . . . . . . CA
THEORETICAL CONSUMPTION  (C/D/T) __           SYSTEM RECALCULATES LEAD TIME. . . .    Y
CUMULATIVE LEAD TIME . .                  14  USER-ASSIGNED COST LEVEL CODE. . . .    0
SENSITIVITY FACTOR . . . .                .5  SYSTEM-CALCULATED COST LEVEL CODE       0
EC LEVEL . . . . . . . . . . .             1  RECOST (Y/N)  . . . . . . . . . . . . . . . . . .  Y
PRODUCTION SEQUENCE NUMBER             99999  DATE LAST ROLLUP . . . . . . . . . . .  0/00/00

DEPENDENCIES ON THIS PM  Y     LAST COMPLETE PERIOD AVERAGE YLD %: 88.4000
DEPENDENCY CODE . . . . .  I              HISTORICAL AVERAGE YLD %: 91.1000
                                                    LAST YLD %: 90.2400

     CK01  DISPLAY SESSION STATUS     CK05  HISTORICAL YIELD MAINT
     CK18  REFRESH SCREEN             CK19  RETURN WITHOUT UPDATE
```

FIGURE 7

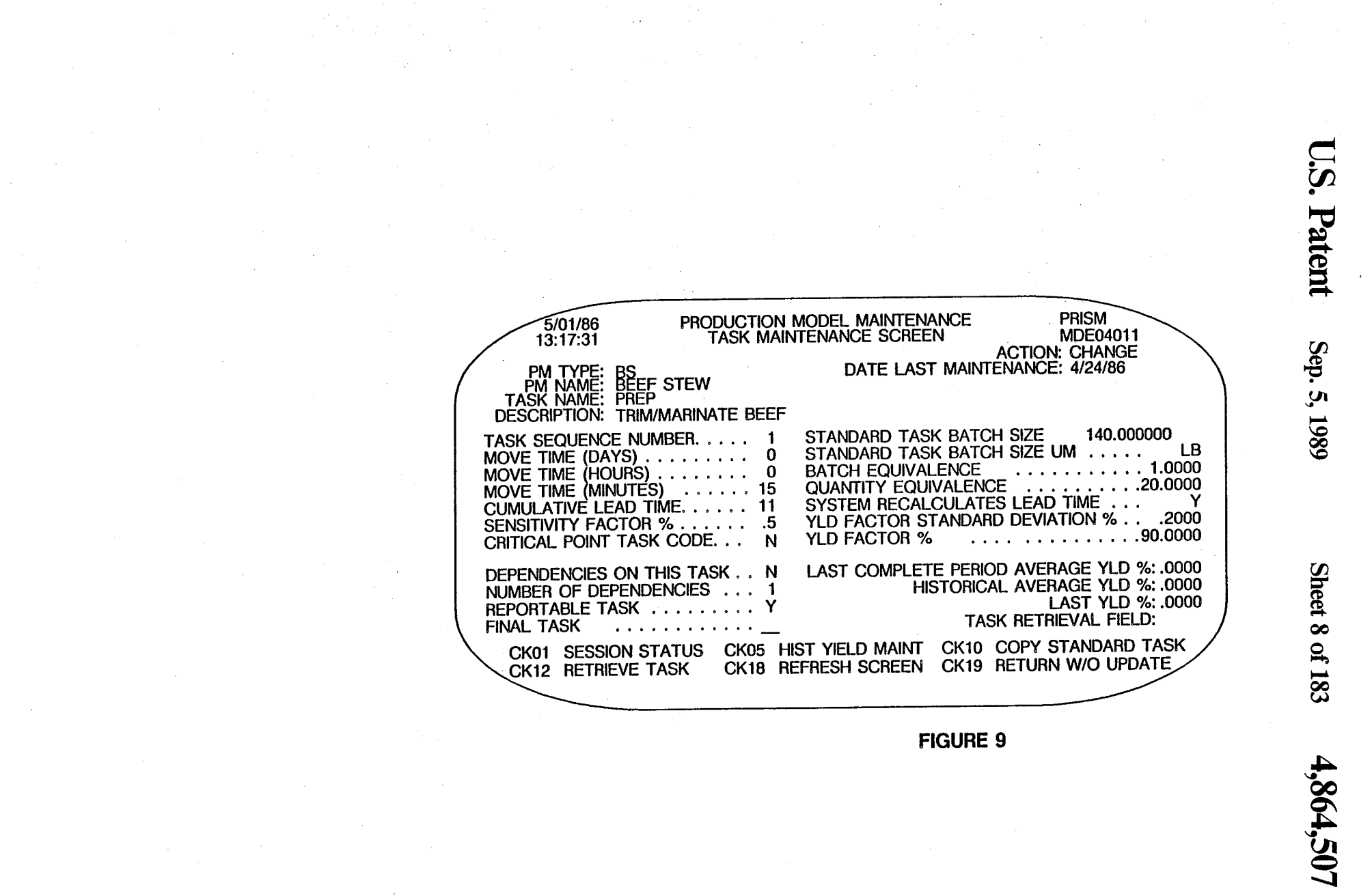

```
5/01/86            PRODUCTION MODEL MAINTENANCE              PRISM
13:17:31             TASK MAINTENANCE SCREEN                 MDE04011
                                                        ACTION: CHANGE
    PM TYPE:  BS                          DATE LAST MAINTENANCE: 4/24/86
    PM NAME:  BEEF STEW
  TASK NAME:  PREP
DESCRIPTION:  TRIM/MARINATE BEEF

TASK SEQUENCE NUMBER. . . . .  1   STANDARD TASK BATCH SIZE      140.000000
MOVE TIME (DAYS) . . . . . . . 0   STANDARD TASK BATCH SIZE UM . . . . .  LB
MOVE TIME (HOURS) . . . . . .  0   BATCH EQUIVALENCE  . . . . . . . . . . .1.0000
MOVE TIME (MINUTES)  . . . .  15   QUANTITY EQUIVALENCE  . . . . . . . . .20.0000
CUMULATIVE LEAD TIME. . . . . 11   SYSTEM RECALCULATES LEAD TIME . . .      Y
SENSITIVITY FACTOR % . . . . .5    YLD FACTOR STANDARD DEVIATION % . .  .2000
CRITICAL POINT TASK CODE. . .  N   YLD FACTOR %  . . . . . . . . . . . . .90.0000

DEPENDENCIES ON THIS TASK . .  N   LAST COMPLETE PERIOD AVERAGE YLD %: .0000
NUMBER OF DEPENDENCIES . . .   1            HISTORICAL AVERAGE YLD %: .0000
REPORTABLE TASK . . . . . . .  Y                          LAST YLD %: .0000
FINAL TASK  . . . . . . . . .  __               TASK RETRIEVAL FIELD:

  CK01  SESSION STATUS    CK05  HIST YIELD MAINT   CK10  COPY STANDARD TASK
  CK12  RETRIEVE TASK     CK18  REFRESH SCREEN     CK19  RETURN W/O UPDATE
```

FIGURE 9

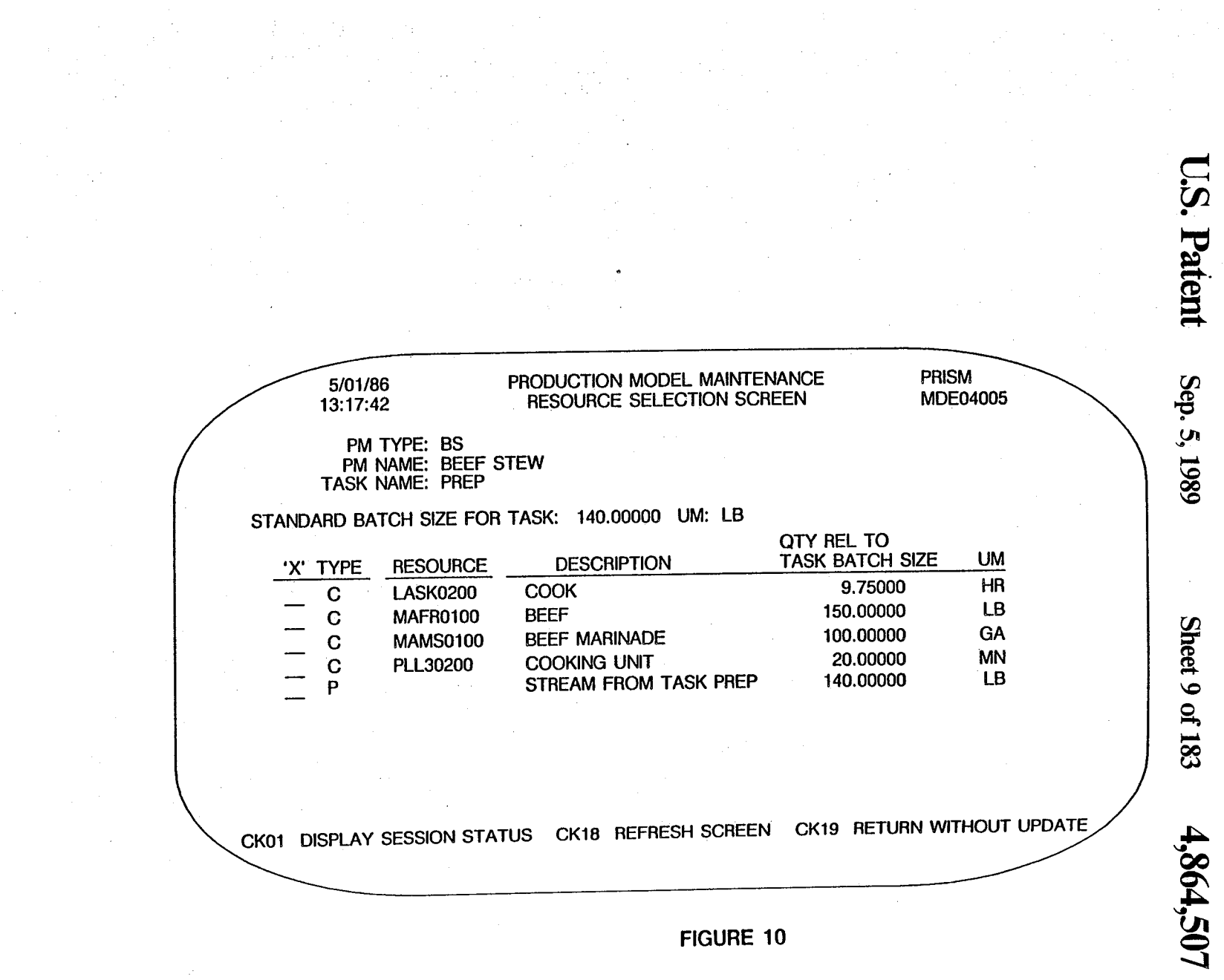

5/01/86 PRODUCTION MODEL MAINTENANCE PRISM
13:17:42 RESOURCE SELECTION SCREEN MDE04005

PM TYPE: BS
PM NAME: BEEF STEW
TASK NAME: PREP

STANDARD BATCH SIZE FOR TASK: 140.00000 UM: LB

| 'X' | TYPE | RESOURCE | DESCRIPTION | QTY REL TO TASK BATCH SIZE | UM |
|---|---|---|---|---|---|
| __ | C | LASK0200 | COOK | 9.75000 | HR |
| __ | C | MAFR0100 | BEEF | 150.00000 | LB |
| __ | C | MAMS0100 | BEEF MARINADE | 100.00000 | GA |
| __ | C | PLL30200 | COOKING UNIT | 20.00000 | MN |
| __ | P | | STREAM FROM TASK PREP | 140.00000 | LB |

CK01 DISPLAY SESSION STATUS CK18 REFRESH SCREEN CK19 RETURN WITHOUT UPDATE

FIGURE 10

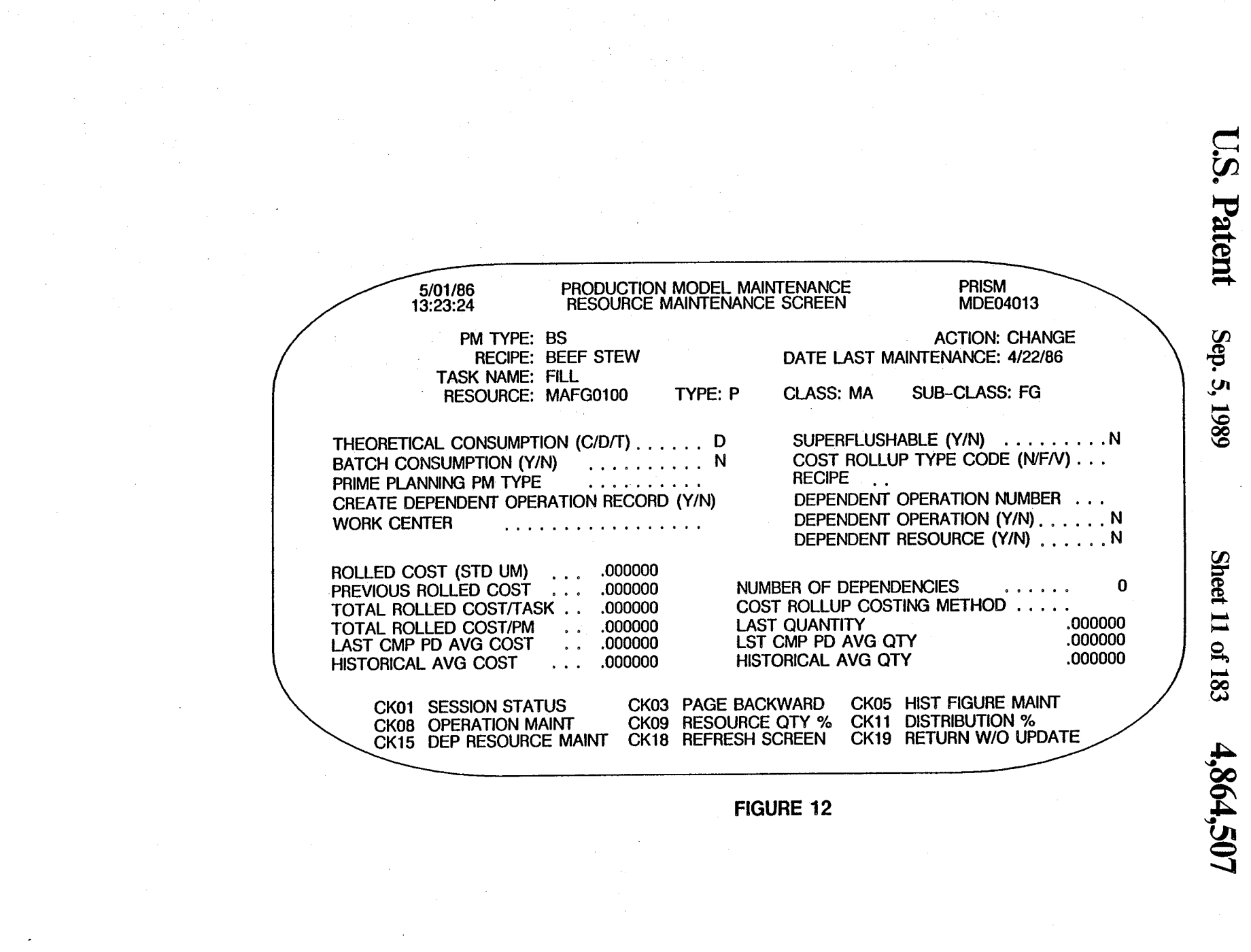

5/01/86 PRODUCTION MODEL MAINTENANCE PRISM
13:23:24 RESOURCE MAINTENANCE SCREEN MDE04013

PM TYPE: BS ACTION: CHANGE
RECIPE: BEEF STEW DATE LAST MAINTENANCE: 4/22/86
TASK NAME: FILL
RESOURCE: MAFG0100 TYPE: P CLASS: MA SUB-CLASS: FG

THEORETICAL CONSUMPTION (C/D/T) . . . . . . D
BATCH CONSUMPTION (Y/N) . . . . . . . . . . . N
PRIME PLANNING PM TYPE . . . . . . . . . . .
CREATE DEPENDENT OPERATION RECORD (Y/N)
WORK CENTER . . . . . . . . . . . . . . . . . .

SUPERFLUSHABLE (Y/N) . . . . . . . . . .N
COST ROLLUP TYPE CODE (N/F/V) . . .
RECIPE . .
DEPENDENT OPERATION NUMBER . . .
DEPENDENT OPERATION (Y/N) . . . . . . N
DEPENDENT RESOURCE (Y/N) . . . . . . N

ROLLED COST (STD UM) . . . .000000
PREVIOUS ROLLED COST . . . .000000
TOTAL ROLLED COST/TASK . . .000000
TOTAL ROLLED COST/PM . . .000000
LAST CMP PD AVG COST . . .000000
HISTORICAL AVG COST . . . .000000

NUMBER OF DEPENDENCIES . . . . . . 0
COST ROLLUP COSTING METHOD . . . . .
LAST QUANTITY .000000
LST CMP PD AVG QTY .000000
HISTORICAL AVG QTY .000000

CK01 SESSION STATUS CK03 PAGE BACKWARD CK05 HIST FIGURE MAINT
CK08 OPERATION MAINT CK09 RESOURCE QTY % CK11 DISTRIBUTION %
CK15 DEP RESOURCE MAINT CK18 REFRESH SCREEN CK19 RETURN W/O UPDATE

FIGURE 12

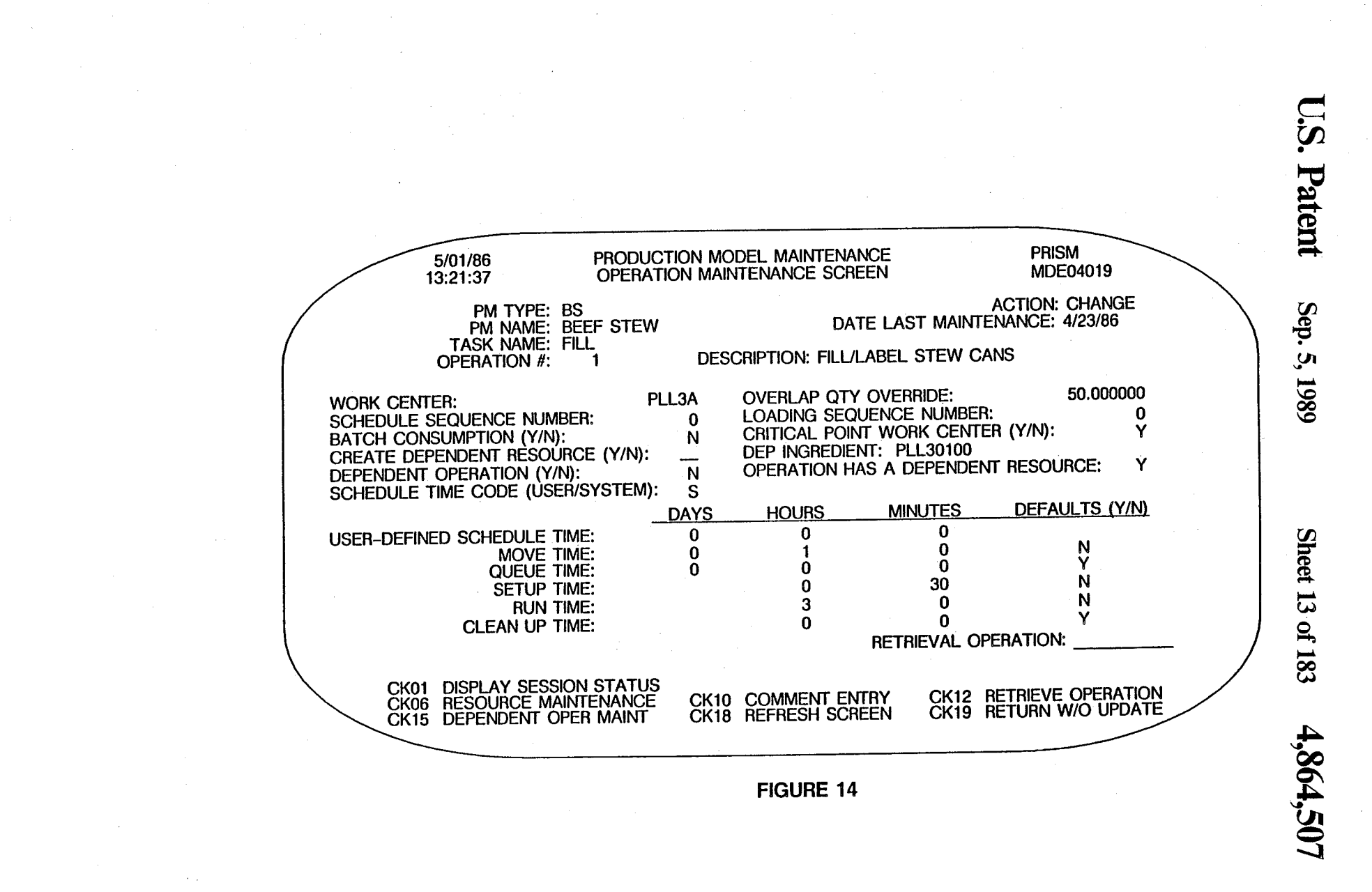

5/01/86 PRODUCTION MODEL MAINTENANCE PRISM
13:21:37 OPERATION MAINTENANCE SCREEN MDE04019

PM TYPE: BS
PM NAME: BEEF STEW
TASK NAME: FILL
OPERATION #: 1

ACTION: CHANGE
DATE LAST MAINTENANCE: 4/23/86

DESCRIPTION: FILL/LABEL STEW CANS

WORK CENTER: PLL3A
SCHEDULE SEQUENCE NUMBER: 0
BATCH CONSUMPTION (Y/N): N
CREATE DEPENDENT RESOURCE (Y/N): _
DEPENDENT OPERATION (Y/N): N
SCHEDULE TIME CODE (USER/SYSTEM): S

OVERLAP QTY OVERRIDE: 50.000000
LOADING SEQUENCE NUMBER: 0
CRITICAL POINT WORK CENTER (Y/N): Y
DEP INGREDIENT: PLL30100
OPERATION HAS A DEPENDENT RESOURCE: Y

| | DAYS | HOURS | MINUTES | DEFAULTS (Y/N) |
|---|---|---|---|---|
| USER-DEFINED SCHEDULE TIME: | 0 | 0 | 0 | |
| MOVE TIME: | 0 | 1 | 0 | N |
| QUEUE TIME: | 0 | 0 | 0 | Y |
| SETUP TIME: | | 0 | 30 | N |
| RUN TIME: | | 3 | 0 | N |
| CLEAN UP TIME: | | 0 | 0 | Y |

RETRIEVAL OPERATION: ________

CK01 DISPLAY SESSION STATUS
CK06 RESOURCE MAINTENANCE
CK15 DEPENDENT OPER MAINT
CK10 COMMENT ENTRY
CK18 REFRESH SCREEN
CK12 RETRIEVE OPERATION
CK19 RETURN W/O UPDATE

FIGURE 14

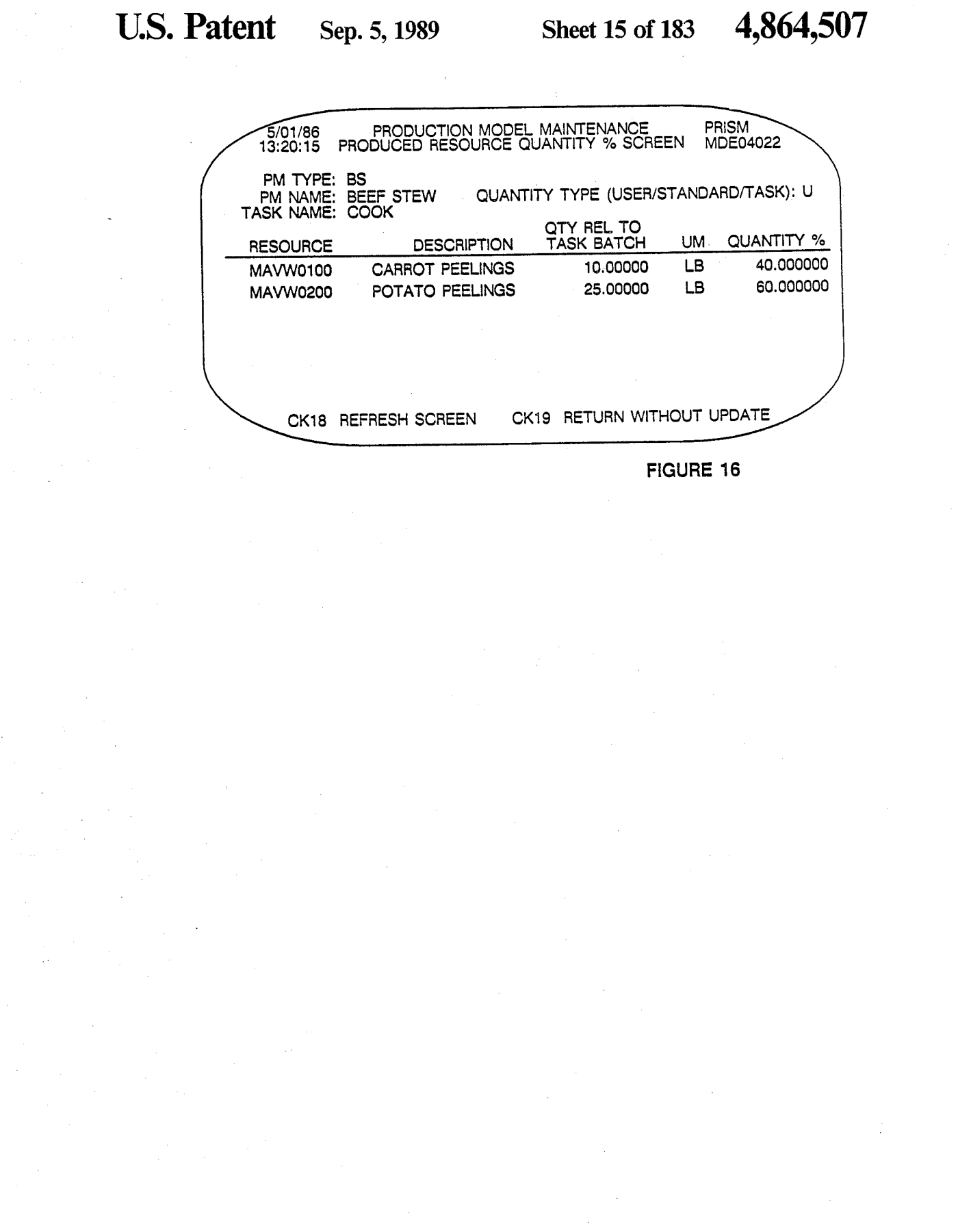

5/01/86 PRODUCTION MODEL MAINTENANCE PRISM
13:20:15 PRODUCED RESOURCE QUANTITY % SCREEN MDE04022

PM TYPE: BS
PM NAME: BEEF STEW QUANTITY TYPE (USER/STANDARD/TASK): U
TASK NAME: COOK

| RESOURCE | DESCRIPTION | QTY REL. TO TASK BATCH | UM | QUANTITY % |
|---|---|---|---|---|
| MAVW0100 | CARROT PEELINGS | 10.00000 | LB | 40.000000 |
| MAVW0200 | POTATO PEELINGS | 25.00000 | LB | 60.000000 |

CK18 REFRESH SCREEN CK19 RETURN WITHOUT UPDATE

FIGURE 16

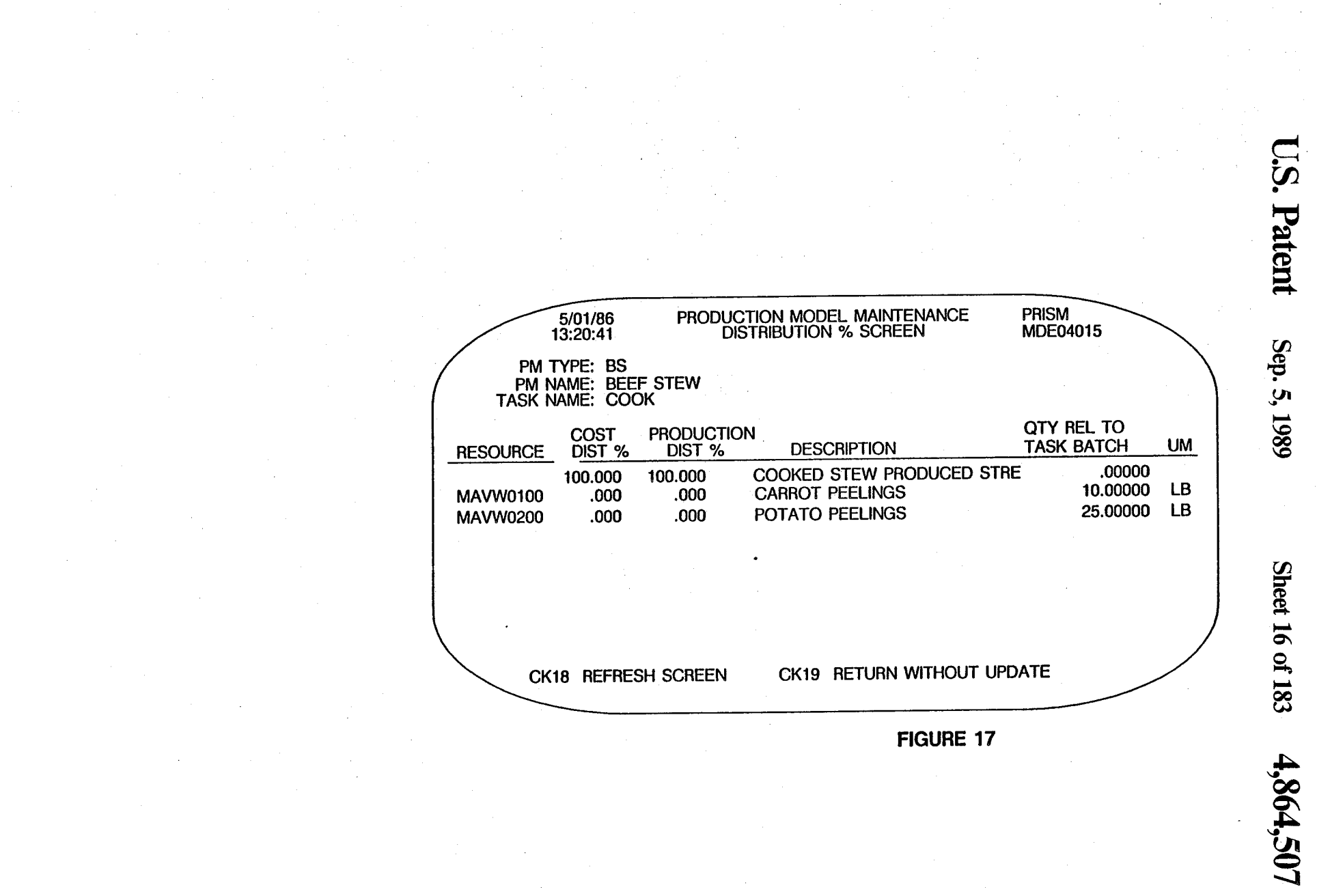

5/01/86 PRODUCTION MODEL MAINTENANCE PRISM
13:20:41 DISTRIBUTION % SCREEN MDE04015

PM TYPE: BS
PM NAME: BEEF STEW
TASK NAME: COOK

| RESOURCE | COST DIST % | PRODUCTION DIST % | DESCRIPTION | QTY REL TO TASK BATCH | UM |
|---|---|---|---|---|---|
| | 100.000 | 100.000 | COOKED STEW PRODUCED STRE | .00000 | |
| MAVW0100 | .000 | .000 | CARROT PEELINGS | 10.00000 | LB |
| MAVW0200 | .000 | .000 | POTATO PEELINGS | 25.00000 | LB |

CK18 REFRESH SCREEN CK19 RETURN WITHOUT UPDATE

FIGURE 17

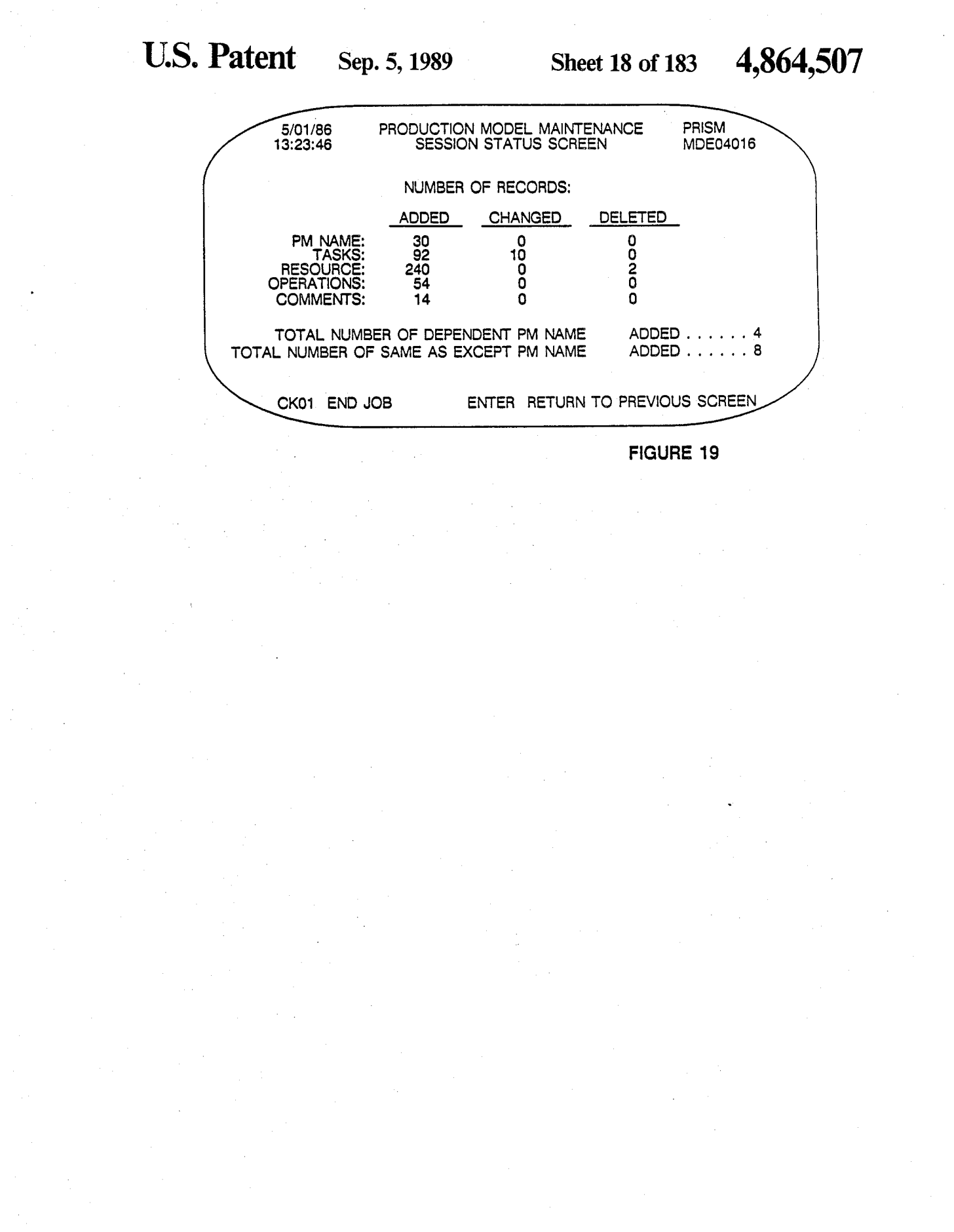

5/01/86 PRODUCTION MODEL MAINTENANCE PRISM
13:23:46 SESSION STATUS SCREEN MDE04016

NUMBER OF RECORDS:

| | ADDED | CHANGED | DELETED |
|---|---|---|---|
| PM NAME: | 30 | 0 | 0 |
| TASKS: | 92 | 10 | 0 |
| RESOURCE: | 240 | 0 | 2 |
| OPERATIONS: | 54 | 0 | 0 |
| COMMENTS: | 14 | 0 | 0 |

TOTAL NUMBER OF DEPENDENT PM NAME ADDED . . . . . . 4
TOTAL NUMBER OF SAME AS EXCEPT PM NAME ADDED . . . . . . 8

CK01 END JOB ENTER RETURN TO PREVIOUS SCREEN

FIGURE 19

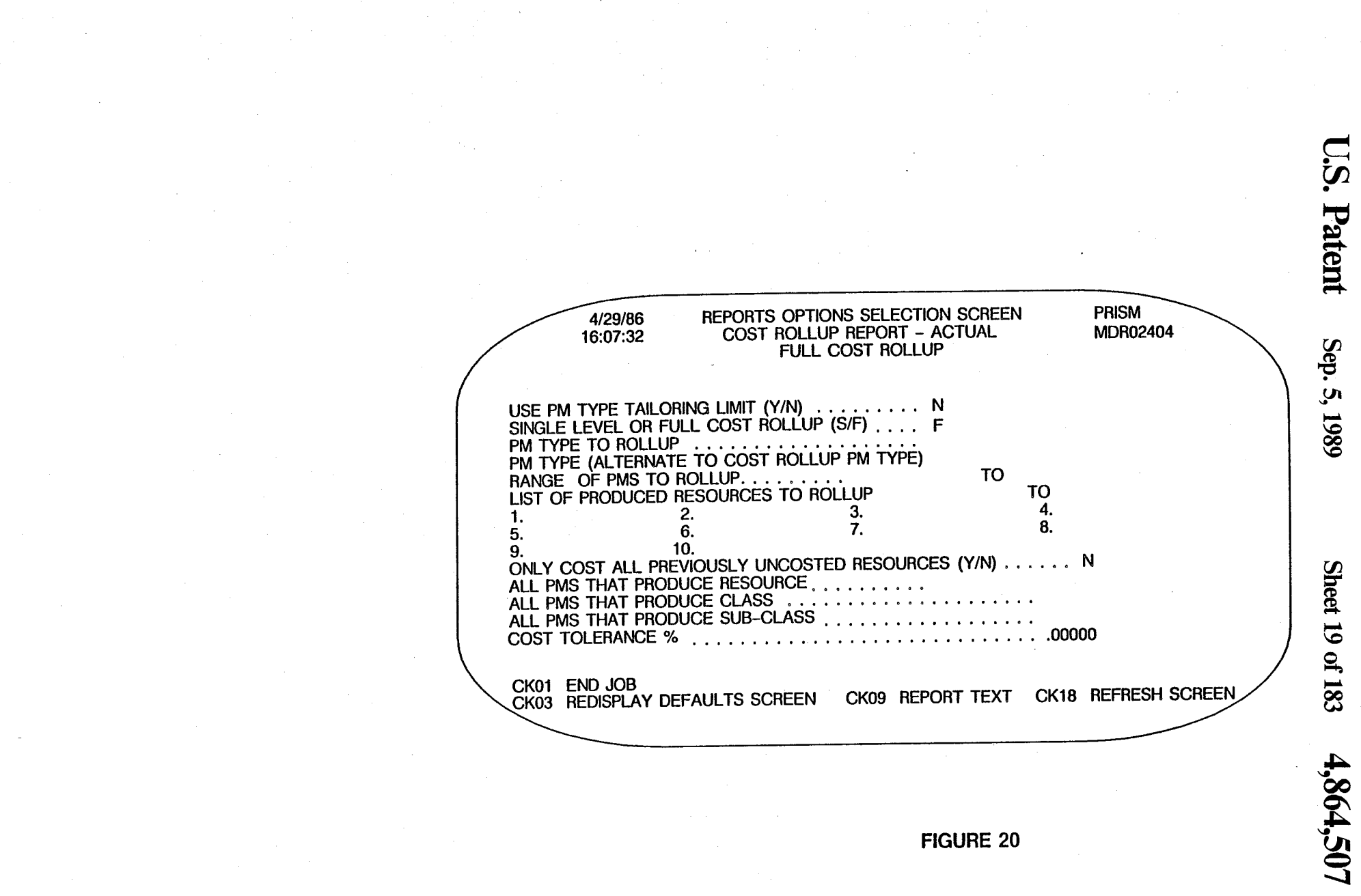

```
4/29/86          REPORTS OPTIONS SELECTION SCREEN          PRISM
16:07:32           COST ROLLUP REPORT - ACTUAL             MDR02404
                        FULL COST ROLLUP

USE PM TYPE TAILORING LIMIT (Y/N) . . . . . . . . .  N
SINGLE LEVEL OR FULL COST ROLLUP (S/F) . . . .  F
PM TYPE TO ROLLUP . . . . . . . . . . . . . . . . . . .
PM TYPE (ALTERNATE TO COST ROLLUP PM TYPE)
RANGE  OF PMS TO ROLLUP. . . . . . . . .              TO
LIST OF PRODUCED RESOURCES TO ROLLUP                      TO
1.                   2.                   3.                4.
5.                   6.                   7.                8.
9.                   10.
ONLY COST ALL PREVIOUSLY UNCOSTED RESOURCES (Y/N) . . . . . .  N
ALL PMS THAT PRODUCE RESOURCE . . . . . . . . . .
ALL PMS THAT PRODUCE CLASS . . . . . . . . . . . . . . . . . . . . .
ALL PMS THAT PRODUCE SUB-CLASS . . . . . . . . . . . . . . . . .
COST TOLERANCE % . . . . . . . . . . . . . . . . . . . . . . . . . . . . . . .00000

CK01  END JOB
CK03  REDISPLAY DEFAULTS SCREEN    CK09  REPORT TEXT    CK18  REFRESH SCREEN
```

FIGURE 20

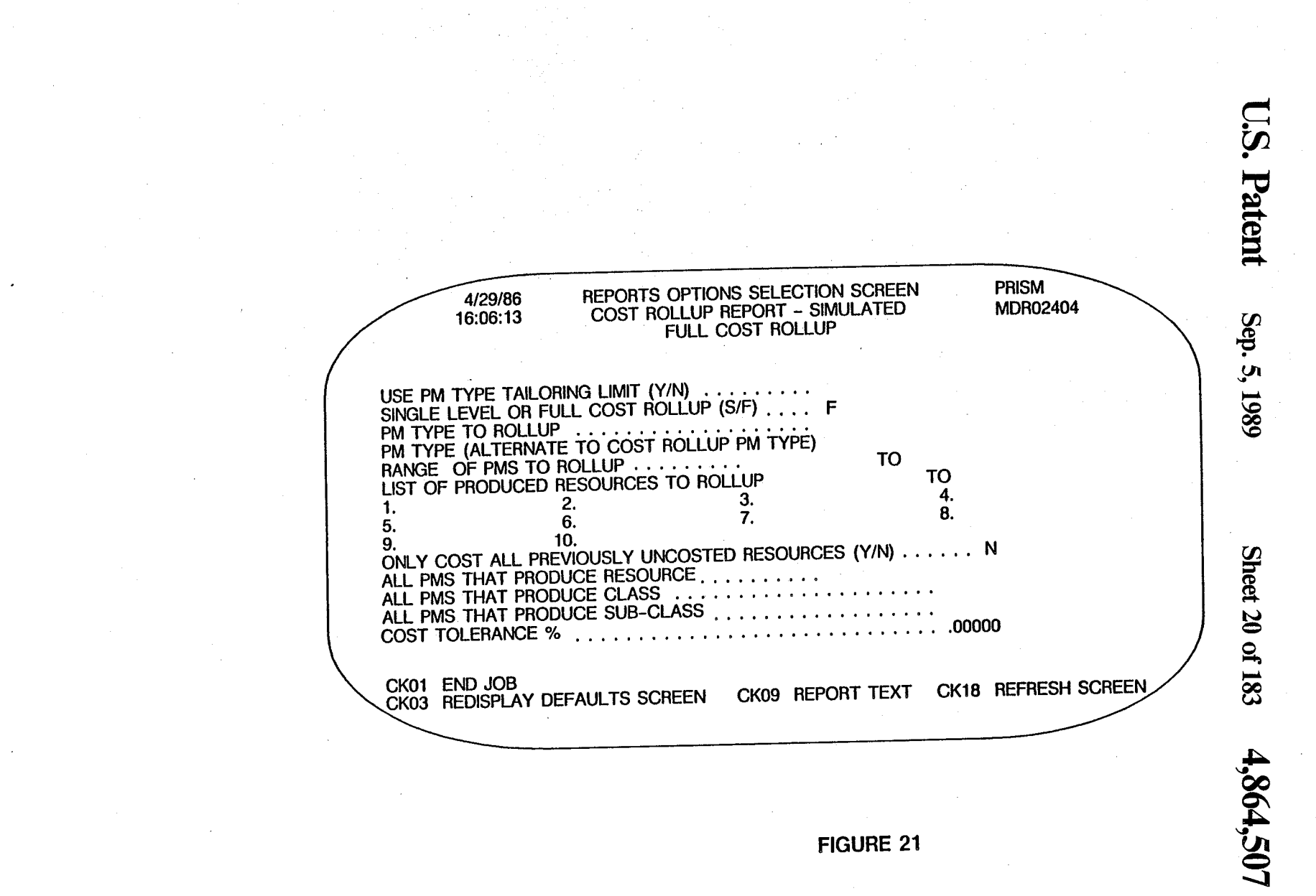

```
4/29/86      REPORTS OPTIONS SELECTION SCREEN        PRISM
16:06:13      COST ROLLUP REPORT - SIMULATED         MDR02404
                     FULL COST ROLLUP

USE PM TYPE TAILORING LIMIT (Y/N) . . . . . . . . .
SINGLE LEVEL OR FULL COST ROLLUP (S/F) . . . .  F
PM TYPE TO ROLLUP . . . . . . . . . . . . . . . . . .
PM TYPE (ALTERNATE TO COST ROLLUP PM TYPE)
RANGE  OF PMS TO ROLLUP . . . . . . . . .          TO
LIST OF PRODUCED RESOURCES TO ROLLUP                     TO
1.                2.                3.                   4.
5.                6.                7.                   8.
9.                10.
ONLY COST ALL PREVIOUSLY UNCOSTED RESOURCES (Y/N) . . . . . .  N
ALL PMS THAT PRODUCE RESOURCE . . . . . . . . . .
ALL PMS THAT PRODUCE CLASS  . . . . . . . . . . . . . . . . . . . .
ALL PMS THAT PRODUCE SUB-CLASS . . . . . . . . . . . . . . . . . .
COST TOLERANCE %  . . . . . . . . . . . . . . . . . . . . . . . . . . .00000

CK01  END JOB
CK03  REDISPLAY DEFAULTS SCREEN     CK09  REPORT TEXT     CK18  REFRESH SCREEN
```

FIGURE 21

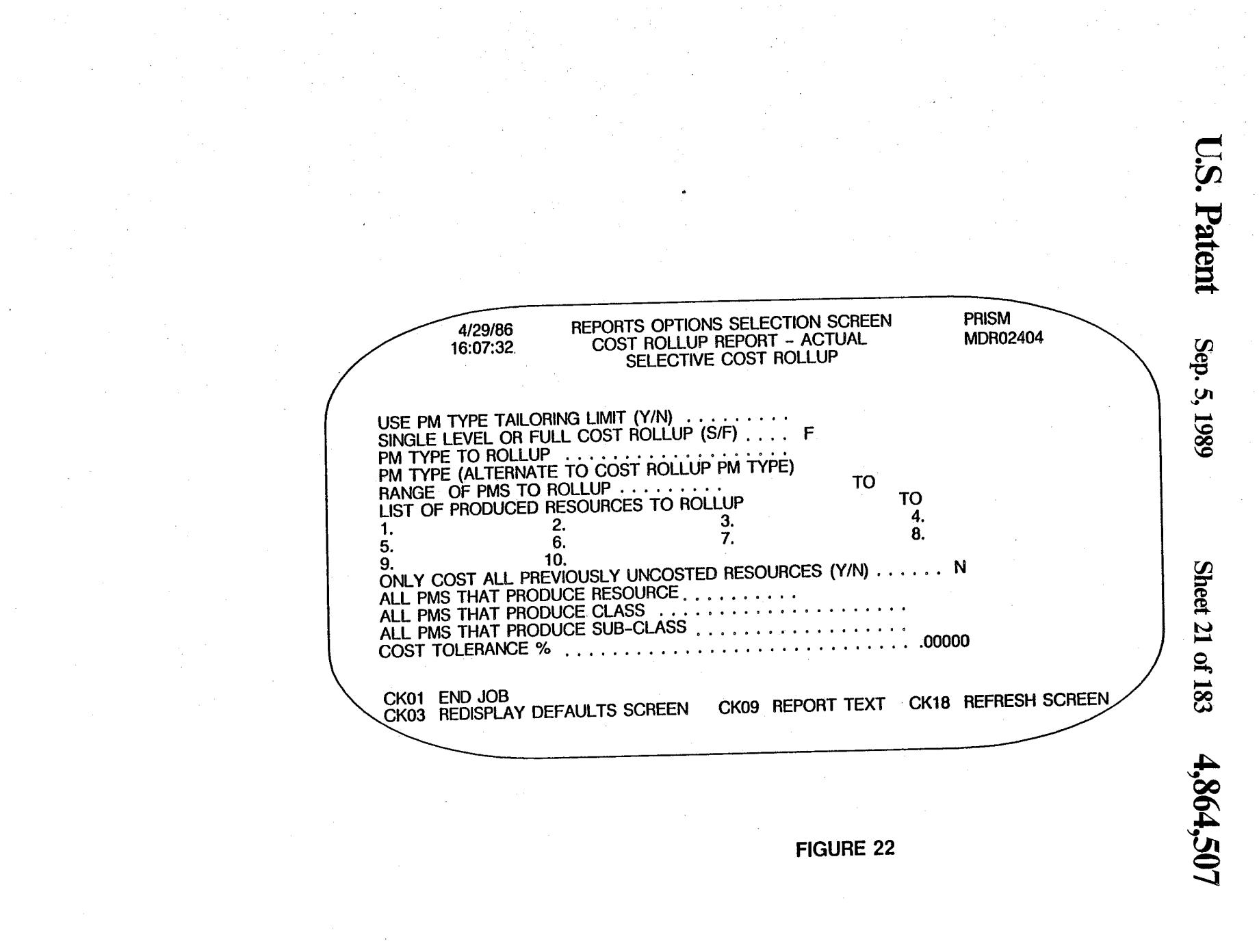

```
4/29/86         REPORTS OPTIONS SELECTION SCREEN          PRISM
16:07:32          COST ROLLUP REPORT - ACTUAL             MDR02404
                     SELECTIVE COST ROLLUP

USE PM TYPE TAILORING LIMIT (Y/N) . . . . . . . . .
SINGLE LEVEL OR FULL COST ROLLUP (S/F) . . . .  F
PM TYPE TO ROLLUP . . . . . . . . . . . . . . . . . .
PM TYPE (ALTERNATE TO COST ROLLUP PM TYPE)
RANGE  OF PMS TO ROLLUP . . . . . . . . .              TO
LIST OF PRODUCED RESOURCES TO ROLLUP                        TO
1.                    2.                    3.              4.
5.                    6.                    7.              8.
9.                    10.
ONLY COST ALL PREVIOUSLY UNCOSTED RESOURCES (Y/N) . . . . . .  N
ALL PMS THAT PRODUCE RESOURCE . . . . . . . . . .
ALL PMS THAT PRODUCE CLASS  . . . . . . . . . . . . . . . . . . . .
ALL PMS THAT PRODUCE SUB-CLASS . . . . . . . . . . . . . . . . . .
COST TOLERANCE %  . . . . . . . . . . . . . . . . . . . . . . . . . .00000

CK01  END JOB
CK03  REDISPLAY DEFAULTS SCREEN    CK09  REPORT TEXT    CK18  REFRESH SCREEN
```

FIGURE 22

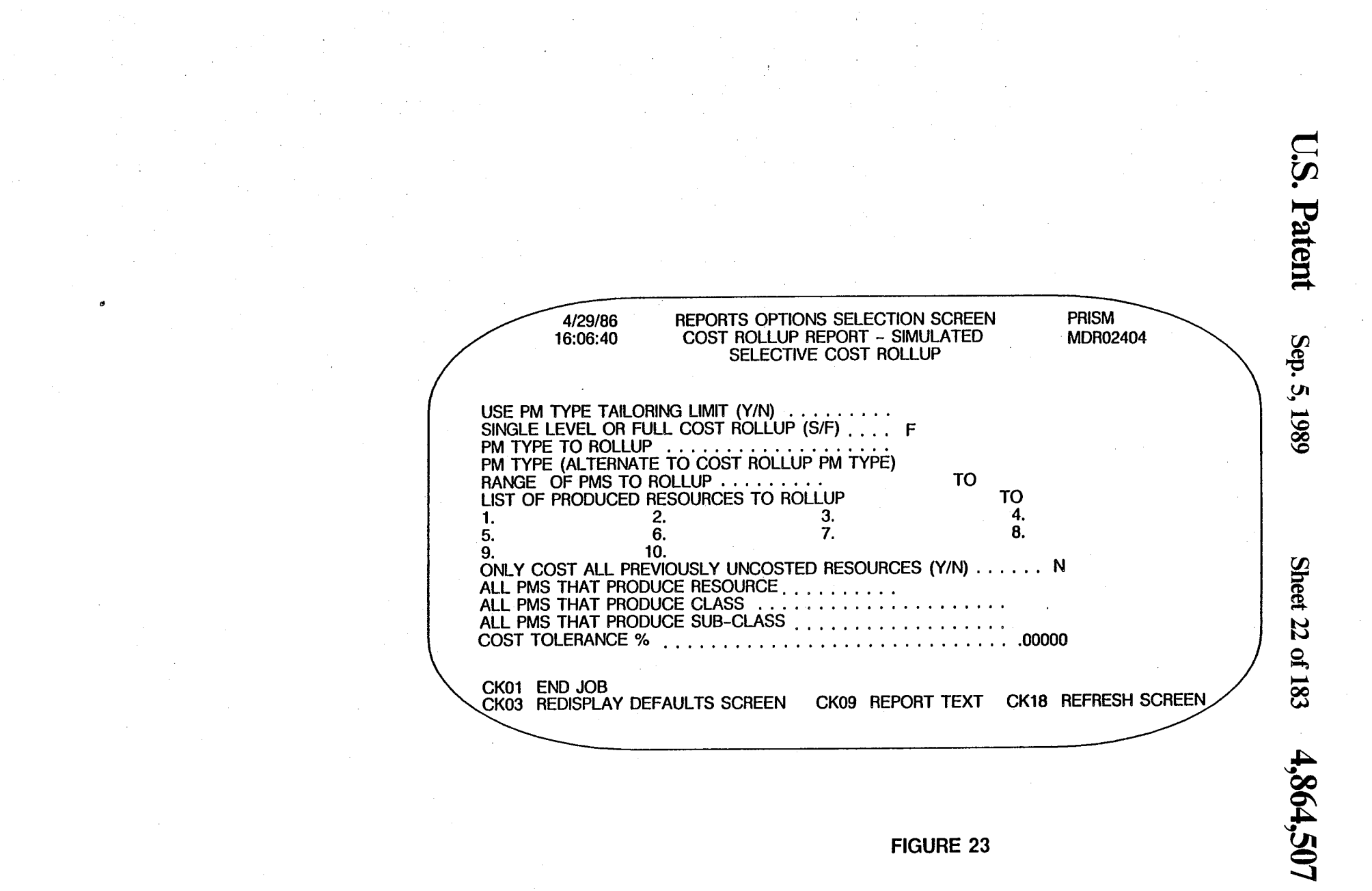

```
4/29/86       REPORTS OPTIONS SELECTION SCREEN          PRISM
16:06:40        COST ROLLUP REPORT - SIMULATED          MDR02404
                   SELECTIVE COST ROLLUP

USE PM TYPE TAILORING LIMIT (Y/N) . . . . . . . . . .
SINGLE LEVEL OR FULL COST ROLLUP (S/F) . . . .  F
PM TYPE TO ROLLUP . . . . . . . . . . . . . . . . . . .
PM TYPE (ALTERNATE TO COST ROLLUP PM TYPE)
RANGE  OF PMS TO ROLLUP . . . . . . . . .              TO
LIST OF PRODUCED RESOURCES TO ROLLUP                        TO
1.                  2.                  3.                  4.
5.                  6.                  7.                  8.
9.                  10.
ONLY COST ALL PREVIOUSLY UNCOSTED RESOURCES (Y/N) . . . . . .  N
ALL PMS THAT PRODUCE RESOURCE . . . . . . . . . .
ALL PMS THAT PRODUCE CLASS . . . . . . . . . . . . . . . . . . . . .
ALL PMS THAT PRODUCE SUB-CLASS . . . . . . . . . . . . . . . . . .
COST TOLERANCE % . . . . . . . . . . . . . . . . . . . . . . . . . . . . .  .00000

CK01  END JOB
CK03  REDISPLAY DEFAULTS SCREEN    CK09  REPORT TEXT    CK18  REFRESH SCREEN
```

FIGURE 23

```
5/01/86  11:12:50          P R I S M   C O S T   R O L L U P   R E P O R T - A C T U A L          PAGE   1     MDR020
                                                                                                     ENTITY -  STANDARD
LIMITS:    PM NAME                 TO    999999999999999              PM TYPE        TO  99
           RESOURCE                TO    999999999999999              SUB-CLASS      TO  99
           WAREHOUSE               TO    9                            CLASS          TO  99
OPTIONS:   COST LEVEL DETAIL:   RESOURCE SUMMARY
           SELECTIVE OR FULL COST ROLLUP:   S          EFFECTIVITY DATE FOR COMPARISON:  0/00/00
           RANGE OF PMS TO ROLLUP:  VS  POTATO SOUP   TO   VS POTATO SOUP
           RANGE OF PRODUCED RESOURCES TO ROLLUP:                     TO
           LIST OF PRODUCED RESOURCES TO ROLLUP:    1.                2.                3.                4.
           ONE-TIME COMMENTS:    5.        6.        7.                8.                9.                10.
           SINGLE LEVEL OR FULL COST ROLLUP:  F    COST ALL PREVIOUSLY UNCOSTED RESOURCES:  N      COST TOLERANCE:   .00000
PM TYPE     PM NAME           PM DESCRIPTION                         STANDARD BATCH SIZE        UM
      TASK NAME           TASK DESCRIPTION                           TASK BATCH SIZE            UM                  BATCH EQUIV
PRODUCED:      RESOURCE       CLASS      SUB-CLASS        DESCRIPTION                                       COST PER STD UM
                  COST PER TASK BATCH               COST PER PM BATCH            STD UM      NRV USAGE       COST DIST%
CONSUMED:      RESOURCE       CLASS      SUB-CLASS        DESCRIPTION                                       COSTING METHOD
                  TOTAL DIRECT COST                 TOTAL FIXED OVERHEAD         TOTAL VARIABLE OVERHEAD
[1] VP    [2] POTATO PREP     [3] PREP POTATOES                   [4] 60.00000        [5] LB
     [6] PEEL             [7] PEEL THE POTATOES                 [8] 60.000000          [9] LB                 [10] 1.00000
PRODUCED:      *STREAM                                  PEELED POTATOES/STREAM PROD                              6.516666
                        391.000000                    391.000000                LB          N              100.000 [20]
PRODUCED:  [11] MAVW0200     [12] MA       [13] VW       [14] POTATO PEELINGS                                [15] 100000
                      [16] 1.000000                  [17] 1.000000          [18] LB        [19] Y                  .000
CONSUMED:  [21] LAUN0100     [22] LA       [23] UN       [24] MACHINE OPERATOR                                [25] S
                      [26] 8.000000                       .00 [27]                              [28] .00
CONSUMED:      MAFR0200          MA           FR          POTATOES                                           F
                        18.000000                         .00                              360.00
CONSUMED:      PLL20100          L2           PL          PEELING MACHINE                                    S
                        6.000000                          .00                              .00
                    RESOURCE:  WITH LONGEST LEAD TIME  MAFR0200   [29]  -    5 DAY(S)
               TASK LEVEL CUMULATIVE LEAD TIME    [30] 5 DAY(S)
        DICE             DICE THE POTATOES                       60.000000                                    1.00000
PRODUCED:      MAPV0200          MA           PV          DICED POTATOES                                     6.716666
                        403.000000                    403.000000                LB          N              100.000
CONSUMED:      *STREAM*                                   PEELED POTATOES/STREAM
                        31.000000                         .00                              360.00
CONSUMED:      LAUN0100          LA           UN          MACHINE OPERATOR                                   S
                        .000000                           8.00                             .00
CONSUMED:      PLL20200          L2           PL          DICING MACHINE                                     S
                        .000000                           4.00                             .00
                    RESOURCE:  WITH LONGEST LEAD TIME  *STREAM*         -    0 DAY(S)
               TASK LEVEL CUMULATIVE LEAD TIME            5 DAY(S)
PM LEVEL CUMULATIVE LEAD TIME        5 DAY(S)    [31]
                    *****    E N D    O F    R E P O R T    *****
```

FIGURE 24

5/01/86 11:16:20 PRISM COST ROLLUP REPORT - ACTUAL Page 1 MDR020
Entity — Standard Limits: PM Name To 999999999999999 PM Type To 99
Resource To 999999999999999 Sub-Class To 99
Warehouse To 9 Class To 99

Options: Cost-Level Detail: PM with Class/Sub-Class Breakdown
Selective or Full Cost Rollup: S Effectivity Date for Comparison: 0/00/00
Range of PMs to Rollup: VP Potato Prep to VP Potato Prep
Range of Produced Resources to Rollup: To
List of Produced Resources to Rollup: 1. 2. 3. 4.
5. 6. 7. 8. 9. 10.
Single Level or Full Cost Rollup: F Cost All Previously Uncosted Resources: N Cost Tolerance: .00000
One-Time Comments:

| PM Type | PM Name | PM Description | Standard Batch Size | UM | Total PM Cost |
|---|---|---|---|---|---|
| [1] VP | [2] Potato Prep | [3] Prep Potatoes | [4] 60.00000 | [5] LB | [6] 48.940708 |

| Class | Sub-Class | Resource | Total Direct Cost | % of Total PM Cost | Total Fixed OH Cost | % of Total PM Cost | Total Var OH Cost | % of Total PM Cost | Sum of % |
|---|---|---|---|---|---|---|---|---|---|
| [7] LA | [8] UN | LAUN0100 [9] | .000000 [10] | .0 [11] | .000000 [12] | [13] .0 | [14] 8.829000 | [15] 18.0400 | [16] 18.0400 |
| LA | UN | LAUN0100 | .000000 | .0 | .000000 | .0 | 8.829000 | 18.0400 | 18.0400 |
| Totals for Class LA | | | [17] .000000 | [18] .0 | [19] .000000 | [20] .0 | [21] 17.658000 | [22] 36.0800 | [23] 36.0800 |
| MA | FR | MAFR0200 | 18.036000 | 36.8 | 1.857708 | 3.7 | .360000 | .7300 | 41.3700 |
| Totals for Class MA | | | 18.036000 | 36.8 | 1.857708 | 3.7 | .360000 | .7300 | 41.3700 |
| PL | L2 | PLL20100 | .000000 | .0 | 6.623000 | 13.5 | .000000 | .0000 | 13.5300 |
| PL | L2 | PLL20200 | .000000 | .0 | 5.406000 | 11.0 | .000000 | .0000 | 11.0400 |
| Totals for Class PL | | | .000000 | .0 | 12.029000 | 24.5 | .000000 | .0000 | 24.5700 |
| *** PM Totals *** | | | [24] 18.036000 | [25] 36.8 | [26] 13.886708 | [27] 28.3 | [28] 18.018000 | [29] 36.8100 | |

*** END OF REPORT ***

FIGURE 25

5/01/86 11:16:20 P R I S M  C O S T  R O L L U P  R E P O R T - A C T U A L Page 1 MDR020
Entity — Standard Limits: PM Name To 999999999999999 PM Type To 99
Resource To 999999999999999 Sub-Class To 99
Warehouse To 9 Class To 99

Options: Cost Level Detail: PM with Task/Class/Sub-Class Breakdown
Selective or Full Cost Rollup: S Effectivity Date for Comparison: 0/00/00
Range of PMs to Rollup: VP Potato Prep to VP Potato Prep
Range of Produced Resources to Rollup: TO
List of Produced Resources to Rollup: 1. 2. 3. 4.
5. 6. 7. 8. 9. 10.
Single Level or Full Cost Rollup: F Cost All Previously Uncosted Resources: N Cost Tolerance: .00000
One-Time Comments:

| PM Type | PM Name | PM Description | | | Standard Batch Size | UM | | | Total PM Cost |
|---|---|---|---|---|---|---|---|---|---|
| | Task Name | Task Description | | | Task Batch Size | UM | Batch Equiv | | Total Task Cost |
| Class | Sub-Class | Resource | Total Direct Cost | % of Total PM Cost | Total Fixed OH Cost | % of Total PM Cost | Total Var OH Cost | % of Total PM Cost | Sum of % |
| [1] VP | [2] Potato Prep | [3] Prep Potatoes | | | [4] 60.00000 | [5] LB | | | [6] 49.940000 |
| | [7] Peel | [8] Peel the Potatoes | | | [9] 60.00000 | [10] LB | [11] 1.00000 | | [12] 36.900000 |
| [13] LA | [14] UN | LAUN0100 [15] | [16] 000000 | [17] .0 | [18] .000000 | [19] .0 | 8.640000 [20] | [21] 23.4100 | 23.4100 [22] |
| Totals for Class LA | | | .000000 | .0 | .000000 | .0 | 8.64000 | 23.4100 | 23.4100 |
| MA | FR | MAFR0200 | 18.000000 | 48.7 | 1.800000 | 4.8 | .360000 | .9700 | 54.6200 |
| Totals for Class MA | | | [23] 18.000000 | [24] 48.7 | [25] 1.800000 | [26] 4.8 | [27] .360000 | [28] .9700 | [29] 54.6200 |
| PL | L2 | PLL20100 | .000000 | .0 | 8.100000 | 21.9 | .000000 | .0000 | 21.9500 |
| Totals for Class PL | | | .000000 | .0 | 8.100000 | 21.9 | .000000 | .0000 | 21.9500 |
| | Dice | Dice the Potatoes | | | 60.00000 | LB | 1.00000 | | 49.940000 |
| LA | UN | LAUN0100 | .000000 | .0 | .000000 | .0 | 8.640000 | 17.3000 | 17.3000 |
| Totals for Class LA | | | .000000 | .0 | .000000 | .0 | 8.640000 | 17.3000 | 17.3000 |
| PL | L2 | PLL20200 | .000000 | .0 | 5.400000 | 10.8 | .000000 | .0000 | 10.8100 |
| Totals for Class PL | | | .000000 | .0 | 5.400000 | 10.8 | .000000 | .0000 | 10.8100 |
| *** PM Totals *** | | | Total Direct Cost | % of Total PM Cost | Total Fixed OH Cost | % of Total PM Cost | Total Var OH Cost | % of Total PM Cost | |
| | | | [30] 32.000000 | [31] 7.9400 | [32] 12.00 | [33] 2.9700 | [34] 360.00 | [35] 89.3300 | |

*** END OF REPORT ***

FIGURE 26

5/01/86 11:16:20 PRISM COST ROLLUP REPORT - ACTUAL    Page 1    MDR020
Entity — Standard Limits: PM Name To 999999999999999    PM Type To 99
Resource To 999999999999999    Sub-Class To 99
Warehouse To 9    Class To 99

Options: Cost Level Detail: Task Cost Breakdown
Selective or Full Cost Rollup: S    Effectivity Date for Comparison: 0/00/00
Range of PMs to Rollup: VS Potato Soup To VS Potato Soup
Range of Produced Resources to Rollup: To
List of Produced Resources to Rollup: 1. 2. 3. 4.
5. 6. 7. 8. 9. 10.
Single Level or Full Cost Rollup: F    Cost All Previously Uncosted Resources: N    Cost Tolerance: .00000
One-Time Comments:

| PM Type | PM Name | PM Description | | Standard Batch Size | UM | | Total PM Cost | |
|---|---|---|---|---|---|---|---|---|
| | Task Name | Task Description | | Task Batch Size | UM | Batch Equiv | | |
| Resource | Cl / Sub-Cl / Lvl Cl Code | Total Direct Cost | % of Total PM Cost | Total Fixed OH Cost | % of Total PM Cost | Total Var OH Cost | % of Total PM Cost | |
| [1] VS | [2] Potato Soup | [3] Cook Potato Soup | | [4] 50.00000 | [5] CA | | [6] 548.135802 | |
| | [7] Cook | [8] Cook the Soup | | [9] 50.00000 | [10] CA | [11] 1.00000 | | |
| [12] LASK0200 | [13] LA [14] SK A [15] | .000000 [16] | .0000 [17] | .000000 [18] | .0000 [19] | 38.880000 [20] | 7.0931 [21] | |
| MAPV0200 | MA PV B | 449.459820 | 81.9978 | 44.945982 | 8.1997 | 2.700000 | .4925 | |
| PLL30200 | PL L3 A | .000000 | .0000 | .000000 | .0000 | 12.150000 | 2.2166 | |

| | Total Direct Cost | % of Total PM Cost | Total Fixed OH Cost | % of Total PM Cost | Total Var OH Cost | % of Total PM Cost |
|---|---|---|---|---|---|---|
| Totals for Cook: | | | | | | |
| This Level | [22] .000000 | [23] .0000 | [24] .000000 | [25] .0000 | [26] 51.030000 | [27] 9.3097 |
| Lower Level | [28] 449.459820 | [29] 81.9978 | [30] 44.945982 | [31] 8.1997 | [32] 2.700000 | [33] .4925 |
| Total Cost: | 548.135802 [34] | Total % of PM Cost: | | 100.0000 [35] | | |
| Totals for PM: | | | | | | |
| This Level | [36] .000000 | [37] .0000 | [38] .000000 | [39] .0000 | [40] 51.030000 | [41] 9.3097 |
| Lower Level | [42] 449.459820 | [43] 81.9978 | [44] 44.945982 | [45] 8.1997 | [46] 2.700000 | [47] .4925 |

*** END OF REPORT ***

FIGURE 27

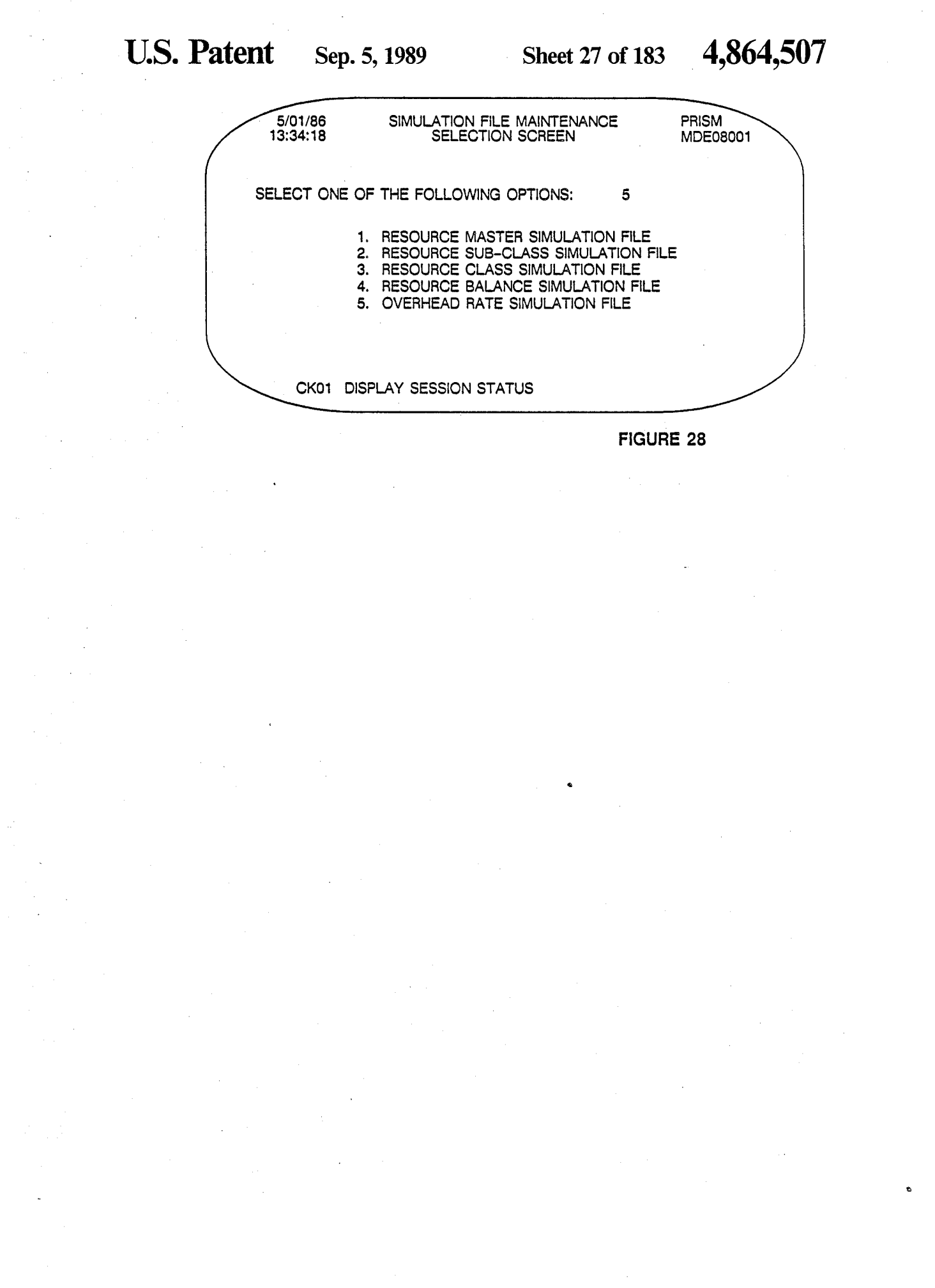

5/01/86 SIMULATION FILE MAINTENANCE PRISM
13:34:18 SELECTION SCREEN MDE08001

SELECT ONE OF THE FOLLOWING OPTIONS: 5

1. RESOURCE MASTER SIMULATION FILE
2. RESOURCE SUB-CLASS SIMULATION FILE
3. RESOURCE CLASS SIMULATION FILE
4. RESOURCE BALANCE SIMULATION FILE
5. OVERHEAD RATE SIMULATION FILE

CK01 DISPLAY SESSION STATUS

FIGURE 28

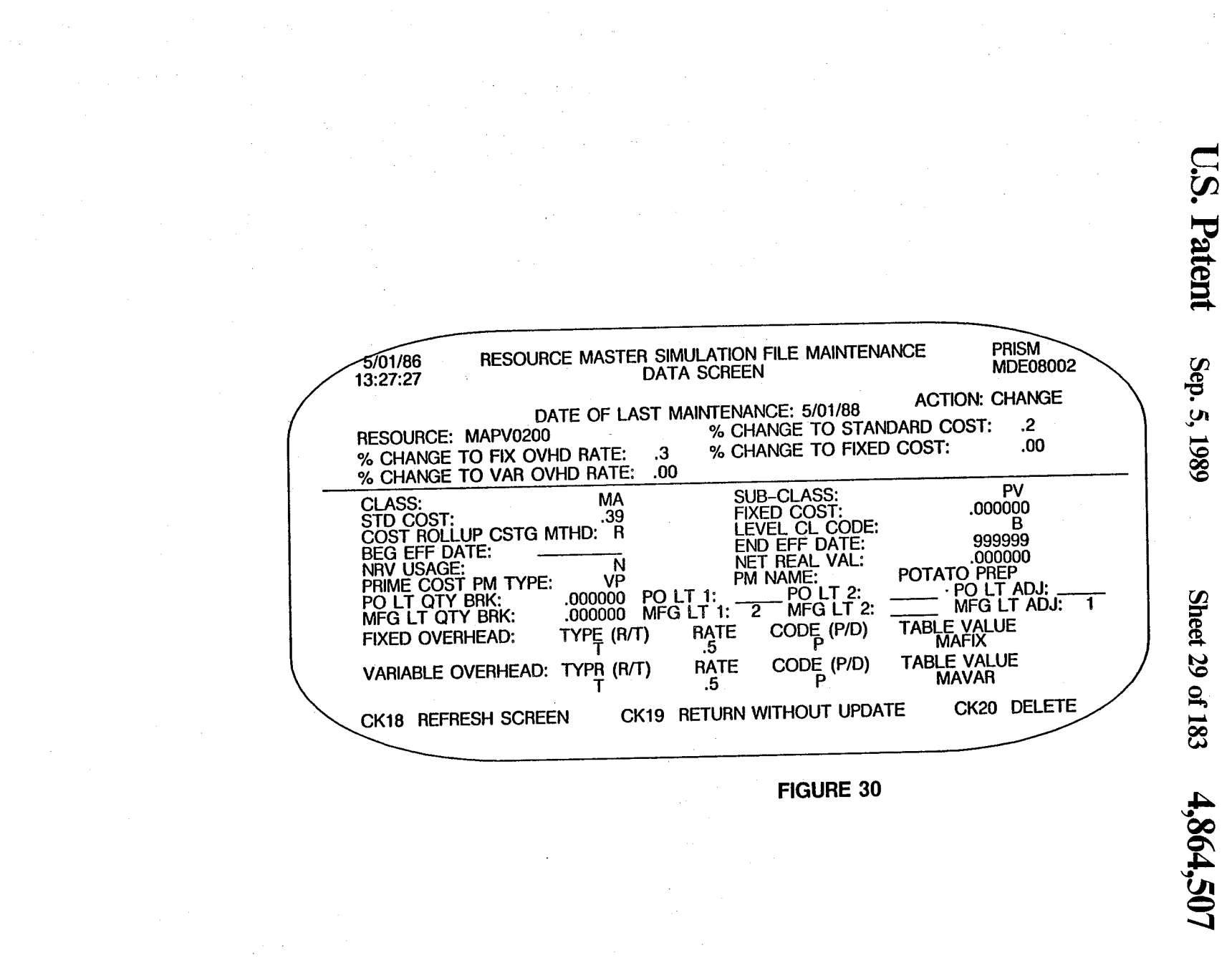

```
5/01/86        RESOURCE MASTER SIMULATION FILE MAINTENANCE        PRISM
13:27:27                      DATA SCREEN                         MDE08002
                                                         ACTION: CHANGE
                    DATE OF LAST MAINTENANCE: 5/01/88
RESOURCE:  MAPV0200                      % CHANGE TO STANDARD COST:   .2
% CHANGE TO FIX OVHD RATE:   .3          % CHANGE TO FIXED COST:      .00
% CHANGE TO VAR OVHD RATE:   .00
---------------------------------------------------------------------------
CLASS:                        MA         SUB-CLASS:                   PV
STD COST:                    .39         FIXED COST:             .000000
COST ROLLUP CSTG MTHD:         R         LEVEL CL CODE:                B
BEG EFF DATE:            _______         END EFF DATE:            999999
NRV USAGE:                     N         NET REAL VAL:           .000000
PRIME COST PM TYPE:           VP         PM NAME:            POTATO PREP
PO LT QTY BRK:           .000000  PO LT 1:  ____  PO LT 2:  ____  PO LT ADJ:  ____
MFG LT QTY BRK:          .000000  MFG LT 1:  2    MFG LT 2: ____  MFG LT ADJ:  1
FIXED OVERHEAD:      TYPE (R/T)     RATE     CODE (P/D)     TABLE VALUE
                       T             .5        P              MAFIX
VARIABLE OVERHEAD:   TYPR (R/T)     RATE     CODE (P/D)     TABLE VALUE
                       T             .5        P              MAVAR

CK18  REFRESH SCREEN      CK19  RETURN WITHOUT UPDATE      CK20  DELETE
```

FIGURE 30

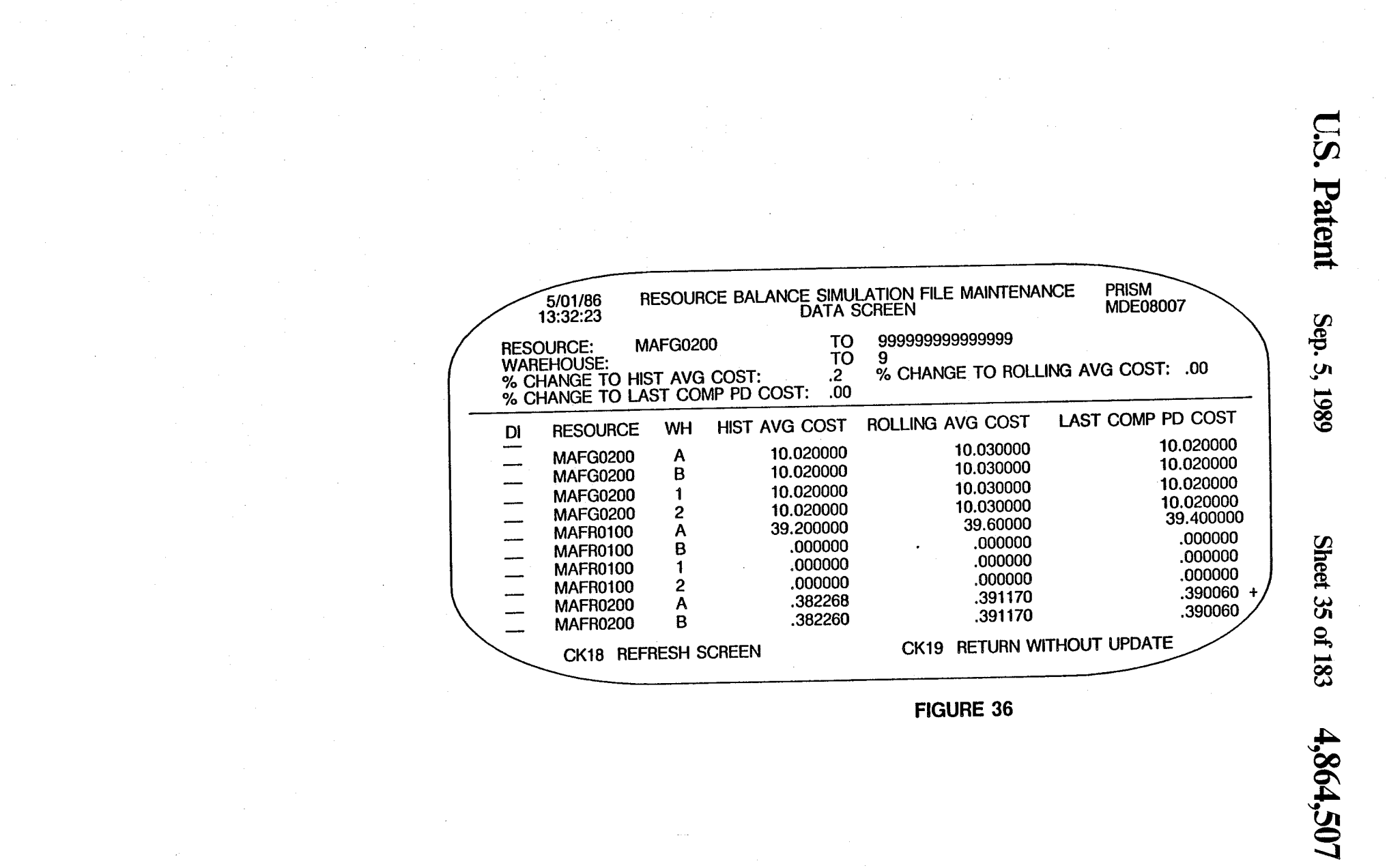

5/01/86 RESOURCE BALANCE SIMULATION FILE MAINTENANCE PRISM
13:32:23 DATA SCREEN MDE08007

RESOURCE: MAFG0200 TO 999999999999999
WAREHOUSE: TO 9
% CHANGE TO HIST AVG COST: .2 % CHANGE TO ROLLING AVG COST: .00
% CHANGE TO LAST COMP PD COST: .00

| DI | RESOURCE | WH | HIST AVG COST | ROLLING AVG COST | LAST COMP PD COST |
|---|---|---|---|---|---|
| _ | MAFG0200 | A | 10.020000 | 10.030000 | 10.020000 |
| _ | MAFG0200 | B | 10.020000 | 10.030000 | 10.020000 |
| _ | MAFG0200 | 1 | 10.020000 | 10.030000 | 10.020000 |
| _ | MAFG0200 | 2 | 10.020000 | 10.030000 | 10.020000 |
| _ | MAFR0100 | A | 39.200000 | 39.60000 | 39.400000 |
| _ | MAFR0100 | B | .000000 | .000000 | .000000 |
| _ | MAFR0100 | 1 | .000000 | .000000 | .000000 |
| _ | MAFR0100 | 2 | .000000 | .000000 | .000000 |
| _ | MAFR0200 | A | .382268 | .391170 | .390060 + |
| _ | MAFR0200 | B | .382260 | .391170 | .390060 |

CK18 REFRESH SCREEN CK19 RETURN WITHOUT UPDATE

FIGURE 36

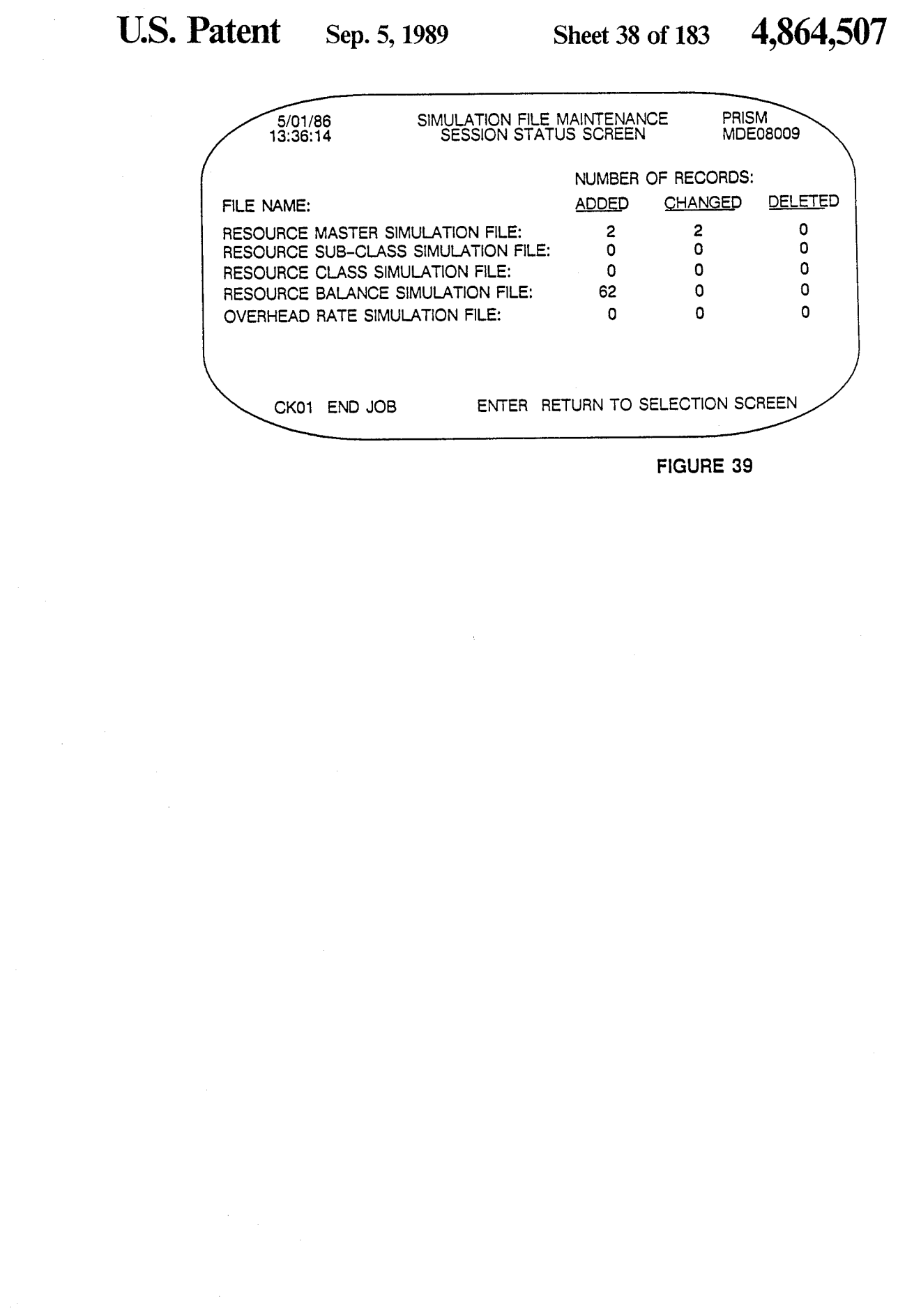

5/01/86 SIMULATION FILE MAINTENANCE PRISM
13:36:14 SESSION STATUS SCREEN MDE08009

| | NUMBER OF RECORDS: | | |
|---|---|---|---|
| FILE NAME: | ADDED | CHANGED | DELETED |
| RESOURCE MASTER SIMULATION FILE: | 2 | 2 | 0 |
| RESOURCE SUB-CLASS SIMULATION FILE: | 0 | 0 | 0 |
| RESOURCE CLASS SIMULATION FILE: | 0 | 0 | 0 |
| RESOURCE BALANCE SIMULATION FILE: | 62 | 0 | 0 |
| OVERHEAD RATE SIMULATION FILE: | 0 | 0 | 0 |

CK01 END JOB ENTER RETURN TO SELECTION SCREEN

FIGURE 39

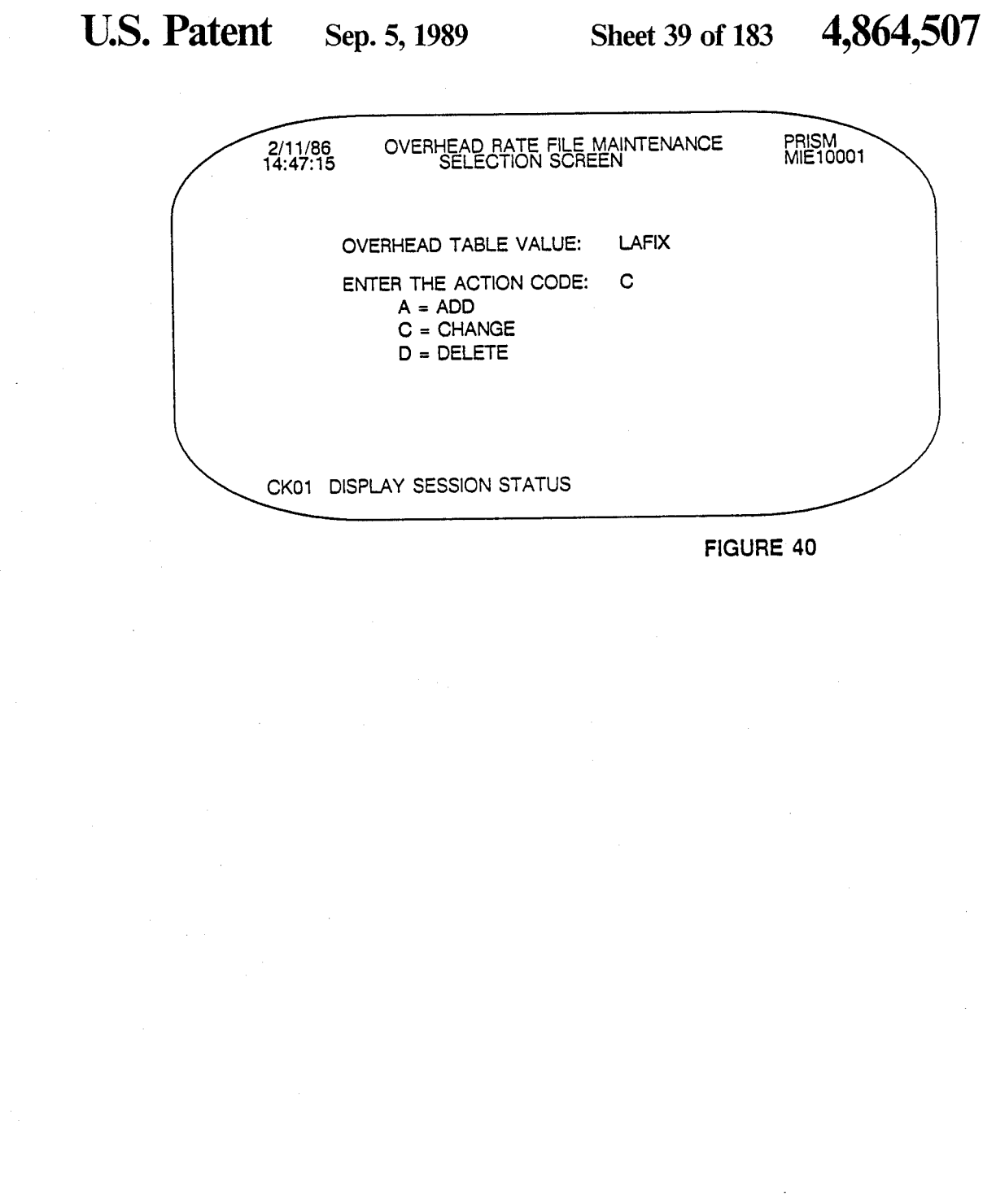

```
2/11/86      OVERHEAD RATE FILE MAINTENANCE      PRISM
14:47:15          SELECTION SCREEN               MIE10001

         OVERHEAD TABLE VALUE:     LAFIX

         ENTER THE ACTION CODE:    C
             A = ADD
             C = CHANGE
             D = DELETE

CK01  DISPLAY SESSION STATUS
```

FIGURE 40

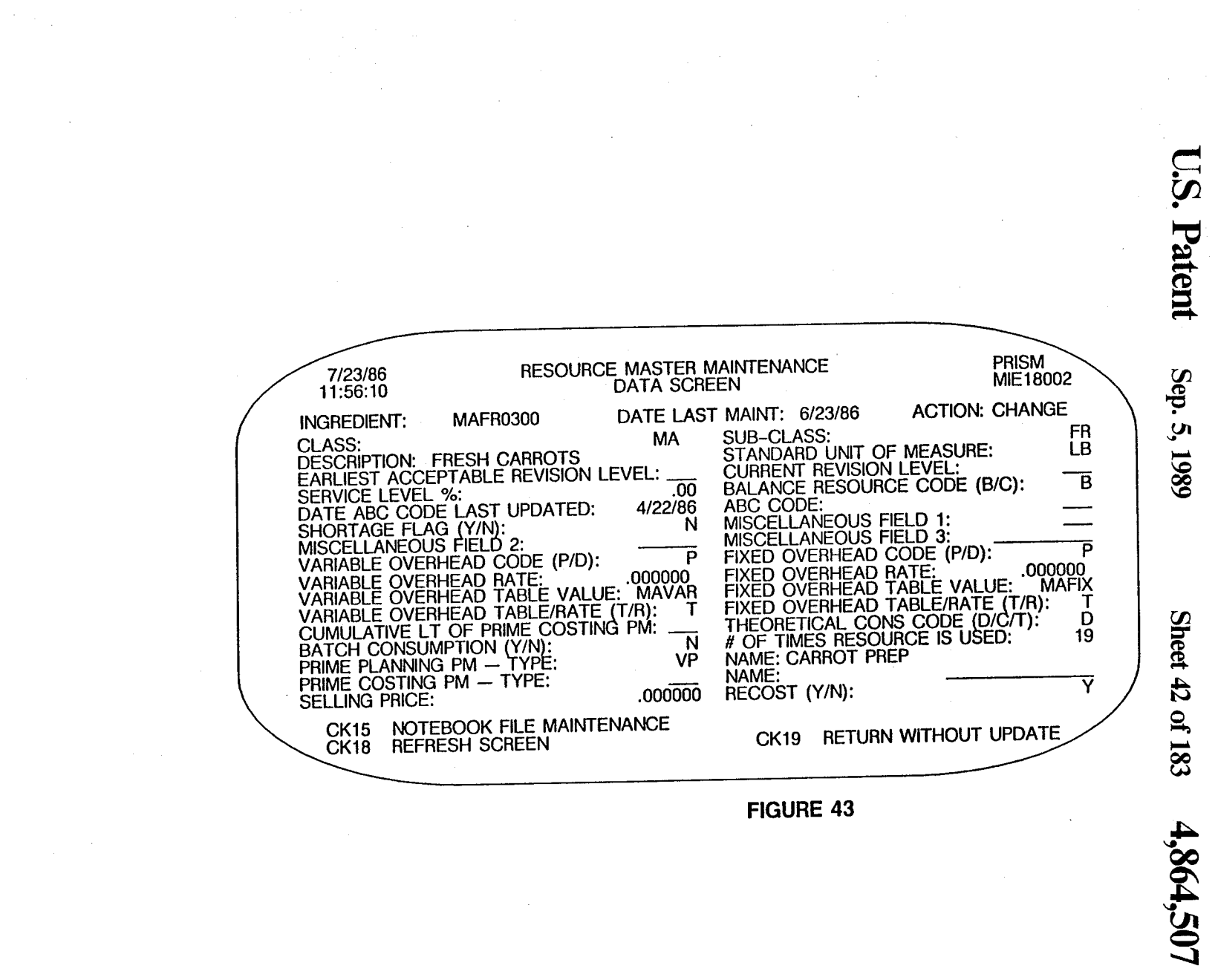

```
7/23/86                 RESOURCE MASTER MAINTENANCE                    PRISM
11:56:10                        DATA SCREEN                            MIE18002

INGREDIENT:      MAFR0300     DATE LAST MAINT:  6/23/86         ACTION: CHANGE
CLASS:                                     MA  SUB-CLASS:                                FR
DESCRIPTION:  FRESH CARROTS                    STANDARD UNIT OF MEASURE:                 LB
EARLIEST ACCEPTABLE REVISION LEVEL:       ___  CURRENT REVISION LEVEL:                  ___
SERVICE LEVEL %:                          .00  BALANCE RESOURCE CODE (B/C):               B
DATE ABC CODE LAST UPDATED:           4/22/86  ABC CODE:                                ___
SHORTAGE FLAG (Y/N):                        N  MISCELLANEOUS FIELD 1:                   ___
MISCELLANEOUS FIELD 2:                 ______  MISCELLANEOUS FIELD 3:              ________
VARIABLE OVERHEAD CODE (P/D):               P  FIXED OVERHEAD CODE (P/D):                 P
VARIABLE OVERHEAD RATE:               .000000  FIXED OVERHEAD RATE:                 .000000
VARIABLE OVERHEAD TABLE VALUE:          MAVAR  FIXED OVERHEAD TABLE VALUE:            MAFIX
VARIABLE OVERHEAD TABLE/RATE (T/R):         T  FIXED OVERHEAD TABLE/RATE (T/R):           T
CUMULATIVE LT OF PRIME COSTING PM:        ___  THEORETICAL CONS CODE (D/C/T):             D
BATCH CONSUMPTION (Y/N):                    N  # OF TIMES RESOURCE IS USED:              19
PRIME PLANNING PM — TYPE:                  VP  NAME: CARROT PREP
PRIME COSTING PM — TYPE:                  ___  NAME:                     ______________
SELLING PRICE:                        .000000  RECOST (Y/N):                              Y

CK15  NOTEBOOK FILE MAINTENANCE
CK18  REFRESH SCREEN                          CK19  RETURN WITHOUT UPDATE
```

FIGURE 43

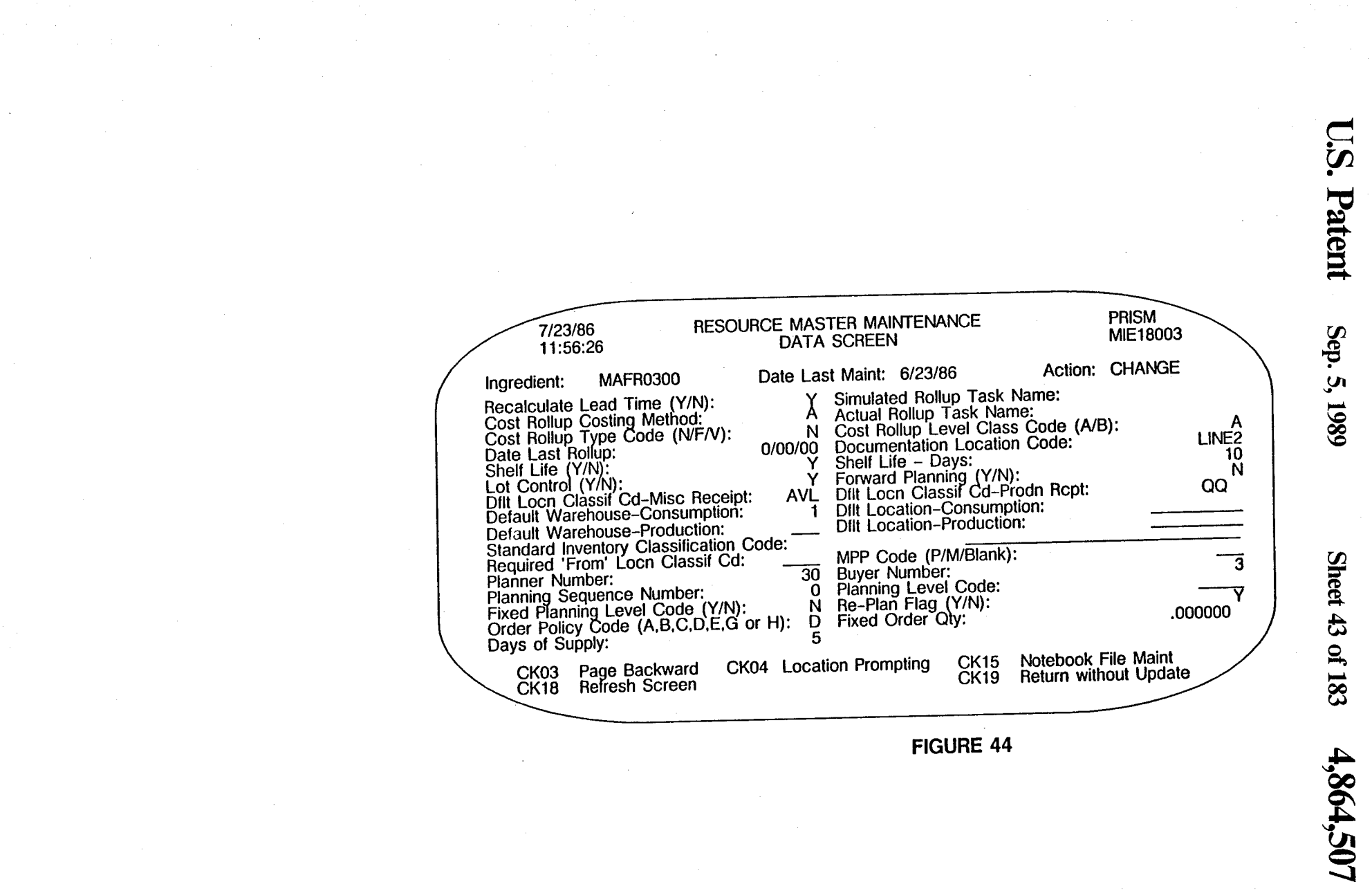

7/23/86 RESOURCE MASTER MAINTENANCE PRISM
11:56:26 DATA SCREEN MIE18003

Ingredient: MAFR0300 Date Last Maint: 6/23/86 Action: CHANGE

| | | | |
|---|---|---|---|
| Recalculate Lead Time (Y/N): | Y | Simulated Rollup Task Name: | |
| Cost Rollup Costing Method: | A | Actual Rollup Task Name: | |
| Cost Rollup Type Code (N/F/V): | N | Cost Rollup Level Class Code (A/B): | A |
| Date Last Rollup: | 0/00/00 | Documentation Location Code: | LINE2 |
| Shelf Life (Y/N): | Y | Shelf Life - Days: | 10 |
| Lot Control (Y/N): | Y | Forward Planning (Y/N): | N |
| Dflt Locn Classif Cd-Misc Receipt: | AVL | Dflt Locn Classif Cd-Prodn Rcpt: | QQ |
| Default Warehouse-Consumption: | 1 | Dflt Location-Consumption: | ____ |
| Default Warehouse-Production: | __ | Dflt Location-Production: | ____ |
| Standard Inventory Classification Code: | ____ | | |
| Required 'From' Locn Classif Cd: | __ | MPP Code (P/M/Blank): | _ |
| Planner Number: | 30 | Buyer Number: | 3 |
| Planning Sequence Number: | 0 | Planning Level Code: | _ |
| Fixed Planning Level Code (Y/N): | N | Re-Plan Flag (Y/N): | Y |
| Order Policy Code (A,B,C,D,E,G or H): | D | Fixed Order Qty: | .000000 |
| Days of Supply: | 5 | | |

| | | | | | |
|---|---|---|---|---|---|
| CK03 | Page Backward | CK04 | Location Prompting | CK15 | Notebook File Maint |
| CK18 | Refresh Screen | | | CK19 | Return without Update |

FIGURE 44

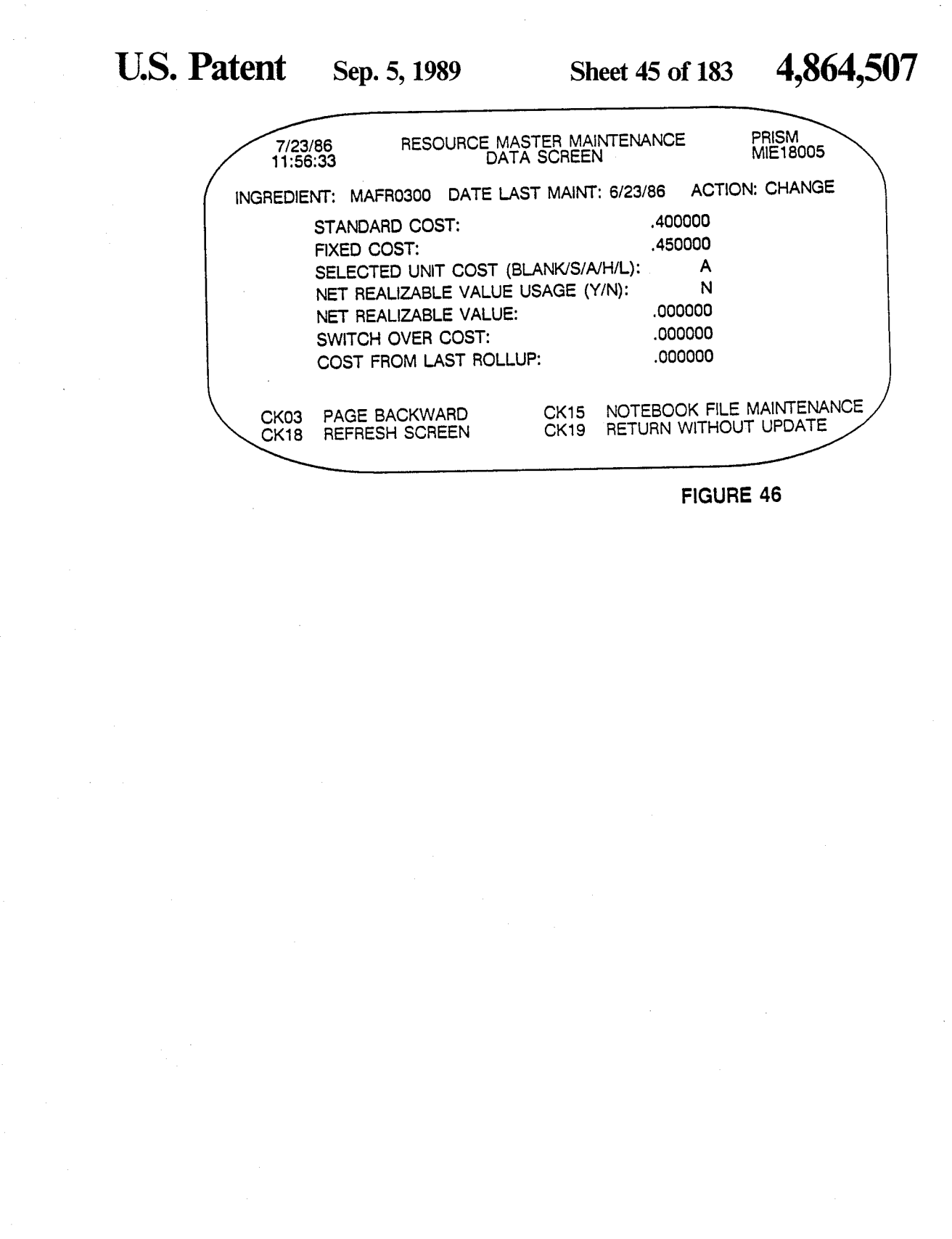

7/23/86 RESOURCE MASTER MAINTENANCE PRISM
11:56:33 DATA SCREEN MIE18005

INGREDIENT: MAFR0300 DATE LAST MAINT: 6/23/86 ACTION: CHANGE

| | |
|---|---|
| STANDARD COST: | .400000 |
| FIXED COST: | .450000 |
| SELECTED UNIT COST (BLANK/S/A/H/L): | A |
| NET REALIZABLE VALUE USAGE (Y/N): | N |
| NET REALIZABLE VALUE: | .000000 |
| SWITCH OVER COST: | .000000 |
| COST FROM LAST ROLLUP: | .000000 |

CK03 PAGE BACKWARD CK15 NOTEBOOK FILE MAINTENANCE
CK18 REFRESH SCREEN CK19 RETURN WITHOUT UPDATE

FIGURE 46

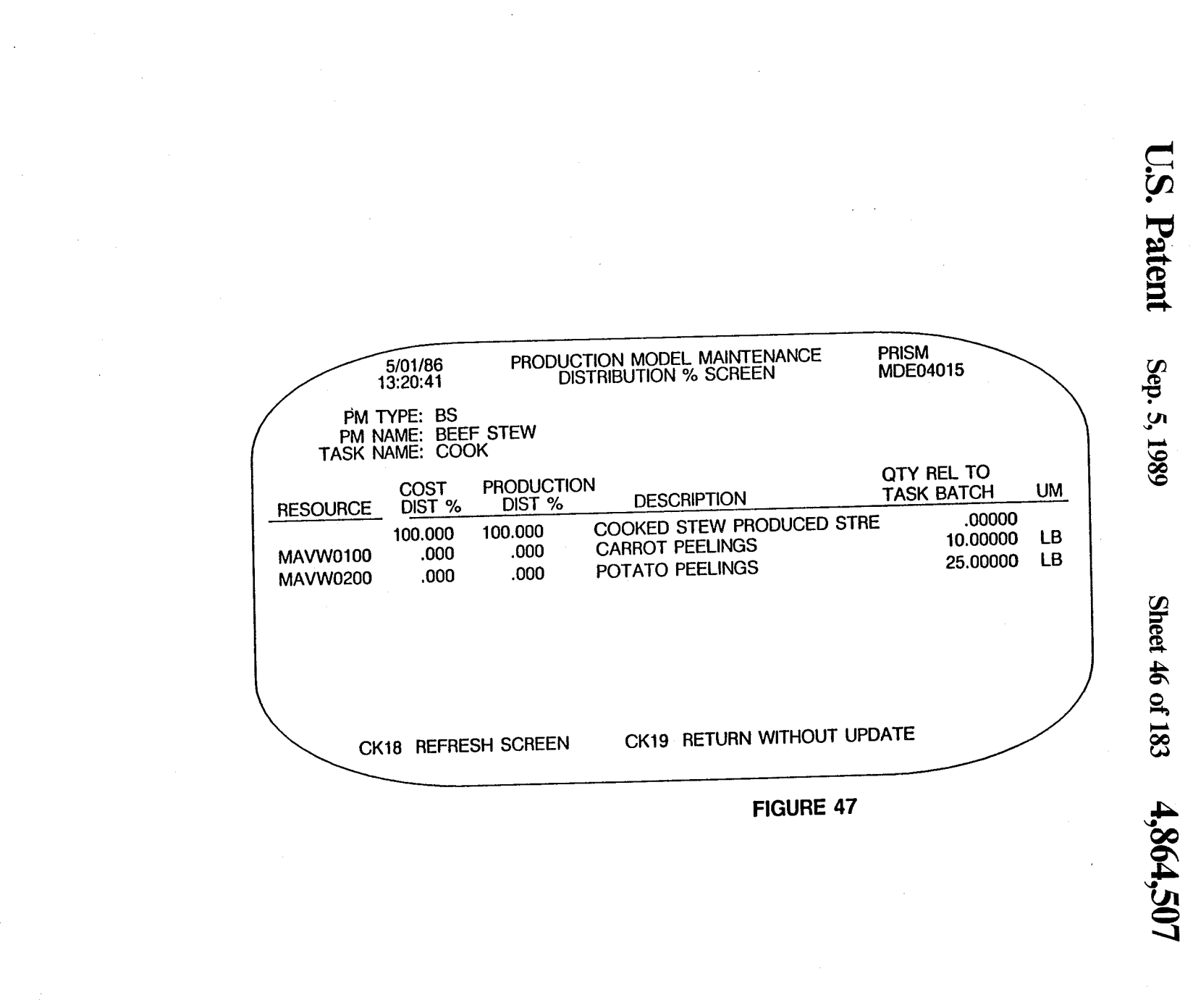

5/01/86 PRODUCTION MODEL MAINTENANCE PRISM
13:20:41 DISTRIBUTION % SCREEN MDE04015

PM TYPE: BS
PM NAME: BEEF STEW
TASK NAME: COOK

| RESOURCE | COST DIST % | PRODUCTION DIST % | DESCRIPTION | QTY REL TO TASK BATCH | UM |
|---|---|---|---|---|---|
| | 100.000 | 100.000 | COOKED STEW PRODUCED STRE | .00000 | |
| MAVW0100 | .000 | .000 | CARROT PEELINGS | 10.00000 | LB |
| MAVW0200 | .000 | .000 | POTATO PEELINGS | 25.00000 | LB |

CK18 REFRESH SCREEN CK19 RETURN WITHOUT UPDATE

FIGURE 47

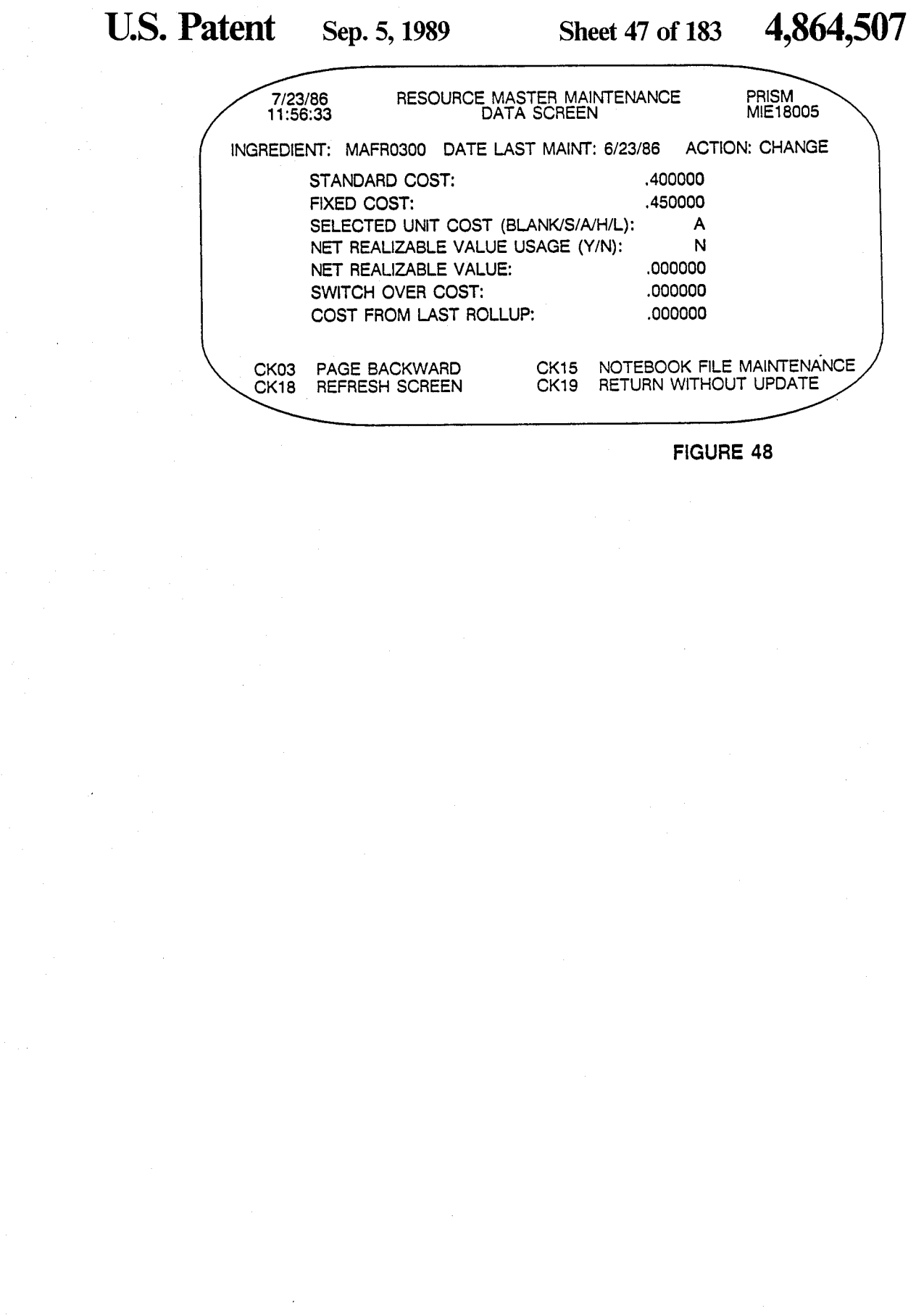

```
7/23/86            RESOURCE MASTER MAINTENANCE          PRISM
11:56:33                   DATA SCREEN                  MIE18005

INGREDIENT: MAFR0300  DATE LAST MAINT: 6/23/86   ACTION: CHANGE

        STANDARD COST:                              .400000
        FIXED COST:                                 .450000
        SELECTED UNIT COST (BLANK/S/A/H/L):               A
        NET REALIZABLE VALUE USAGE (Y/N):                 N
        NET REALIZABLE VALUE:                       .000000
        SWITCH OVER COST:                           .000000
        COST FROM LAST ROLLUP:                      .000000

   CK03  PAGE BACKWARD             CK15  NOTEBOOK FILE MAINTENANCE
   CK18  REFRESH SCREEN            CK19  RETURN WITHOUT UPDATE
```

FIGURE 48

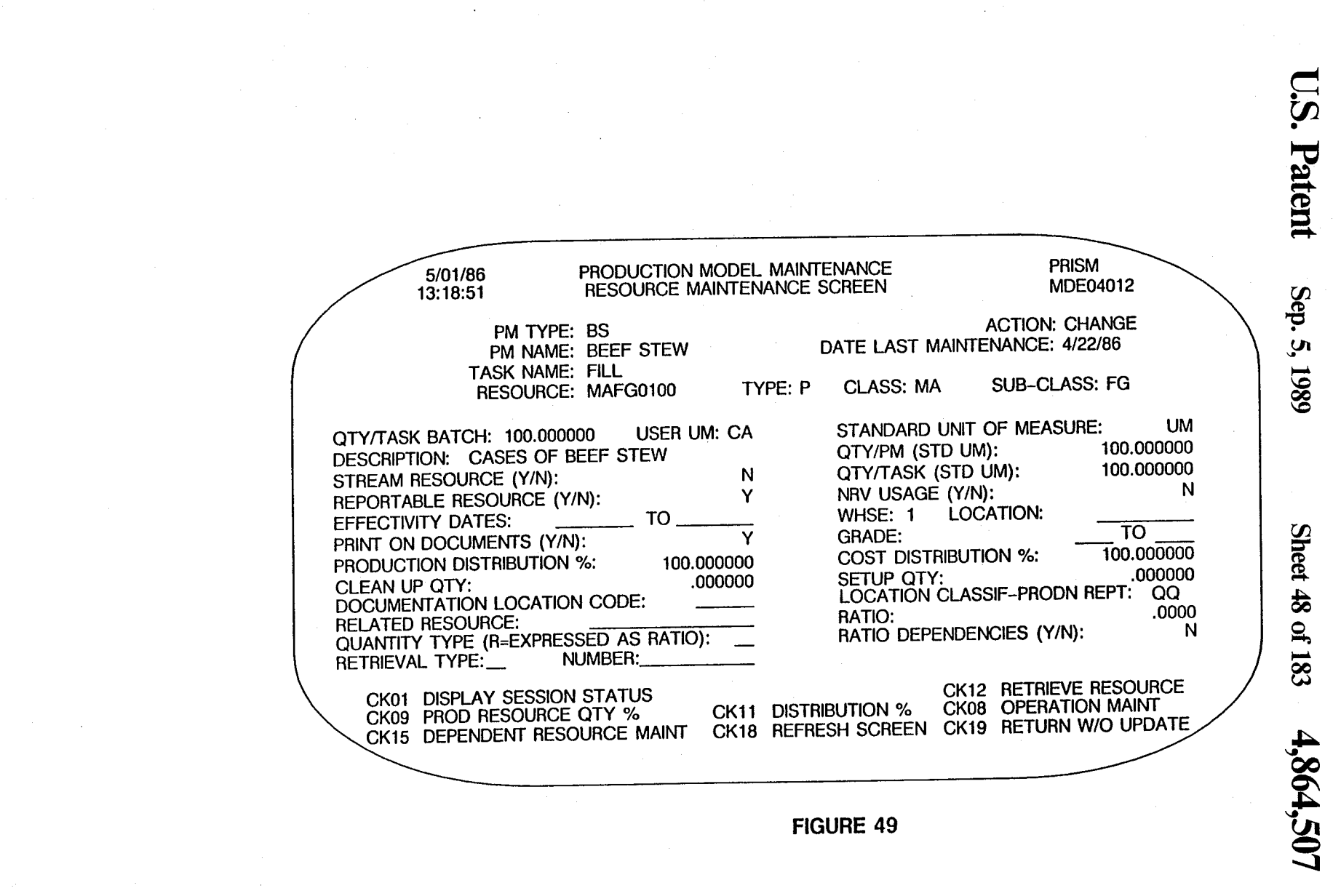

```
5/01/86          PRODUCTION MODEL MAINTENANCE                          PRISM
13:18:51         RESOURCE MAINTENANCE SCREEN                           MDE04012

      PM TYPE:  BS                                            ACTION: CHANGE
      PM NAME:  BEEF STEW                  DATE LAST MAINTENANCE: 4/22/86
    TASK NAME:  FILL
     RESOURCE:  MAFG0100      TYPE: P     CLASS: MA      SUB-CLASS: FG

QTY/TASK BATCH:  100.000000     USER UM: CA     STANDARD UNIT OF MEASURE:          UM
DESCRIPTION:  CASES OF BEEF STEW                QTY/PM (STD UM):           100.000000
STREAM RESOURCE (Y/N):                    N     QTY/TASK (STD UM):         100.000000
REPORTABLE RESOURCE (Y/N):                Y     NRV USAGE (Y/N):                    N
EFFECTIVITY DATES:  ______ TO ______            WHSE: 1   LOCATION:        ________
PRINT ON DOCUMENTS (Y/N):                 Y     GRADE:                   ___ TO ___
PRODUCTION DISTRIBUTION %:       100.000000     COST DISTRIBUTION %:       100.000000
CLEAN UP QTY:                       .000000     SETUP QTY:                    .000000
DOCUMENTATION LOCATION CODE:         ______     LOCATION CLASSIF-PRODN REPT:   QQ
RELATED RESOURCE:            ______________     RATIO:                         .0000
QUANTITY TYPE (R=EXPRESSED AS RATIO):    __     RATIO DEPENDENCIES (Y/N):          N
RETRIEVAL TYPE:__       NUMBER:____________

   CK01  DISPLAY SESSION STATUS                               CK12  RETRIEVE RESOURCE
   CK09  PROD RESOURCE QTY %       CK11  DISTRIBUTION %       CK08  OPERATION MAINT
   CK15  DEPENDENT RESOURCE MAINT  CK18  REFRESH SCREEN       CK19  RETURN W/O UPDATE
```

FIGURE 49

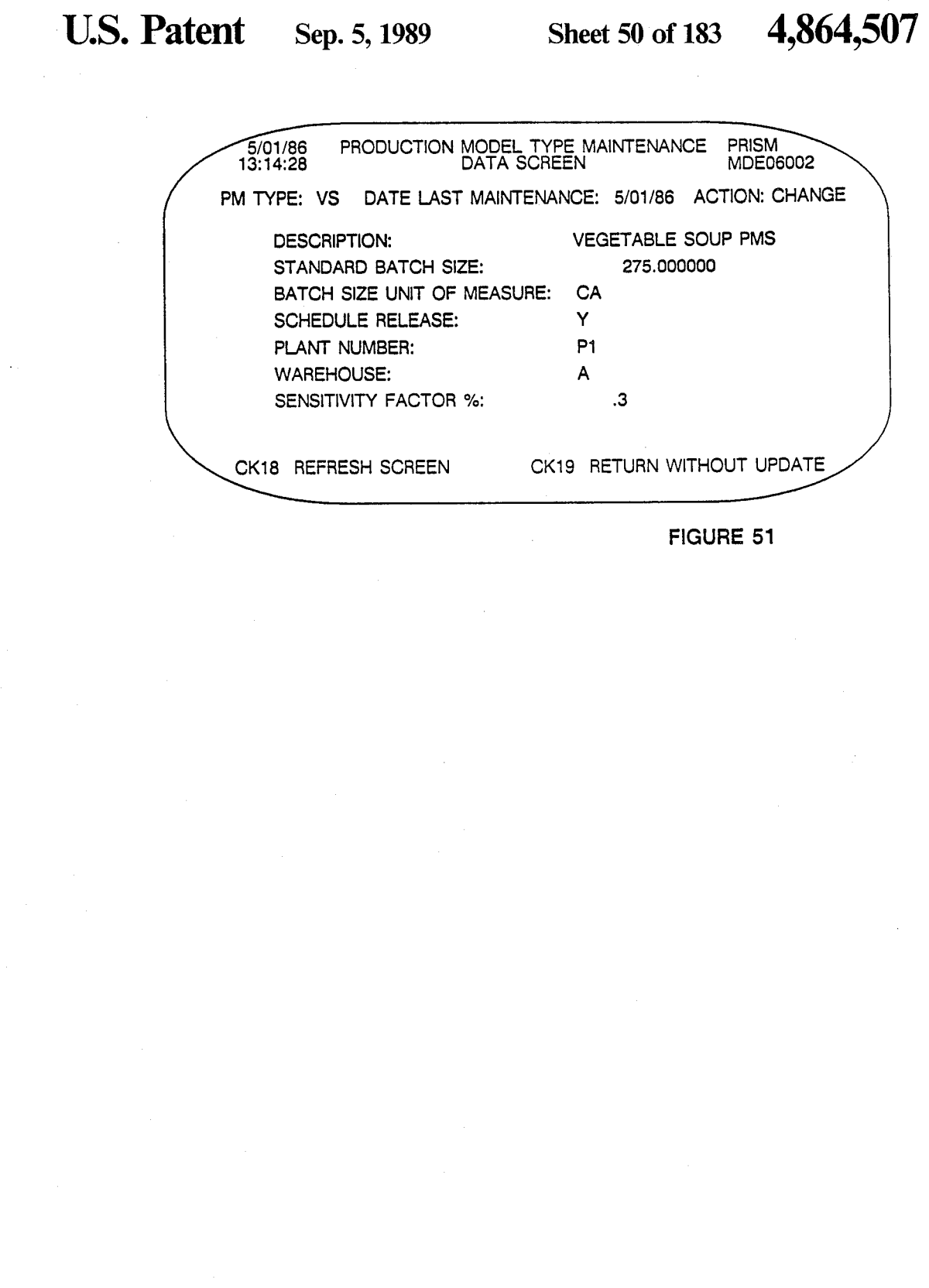

```
5/01/86      PRODUCTION MODEL TYPE MAINTENANCE    PRISM
13:14:28                 DATA SCREEN              MDE06002

PM TYPE: VS   DATE LAST MAINTENANCE: 5/01/86   ACTION: CHANGE

     DESCRIPTION:                     VEGETABLE SOUP PMS
     STANDARD BATCH SIZE:                  275.000000
     BATCH SIZE UNIT OF MEASURE:      CA
     SCHEDULE RELEASE:                Y
     PLANT NUMBER:                    P1
     WAREHOUSE:                       A
     SENSITIVITY FACTOR %:                 .3

 CK18  REFRESH SCREEN           CK19  RETURN WITHOUT UPDATE
```

FIGURE 51

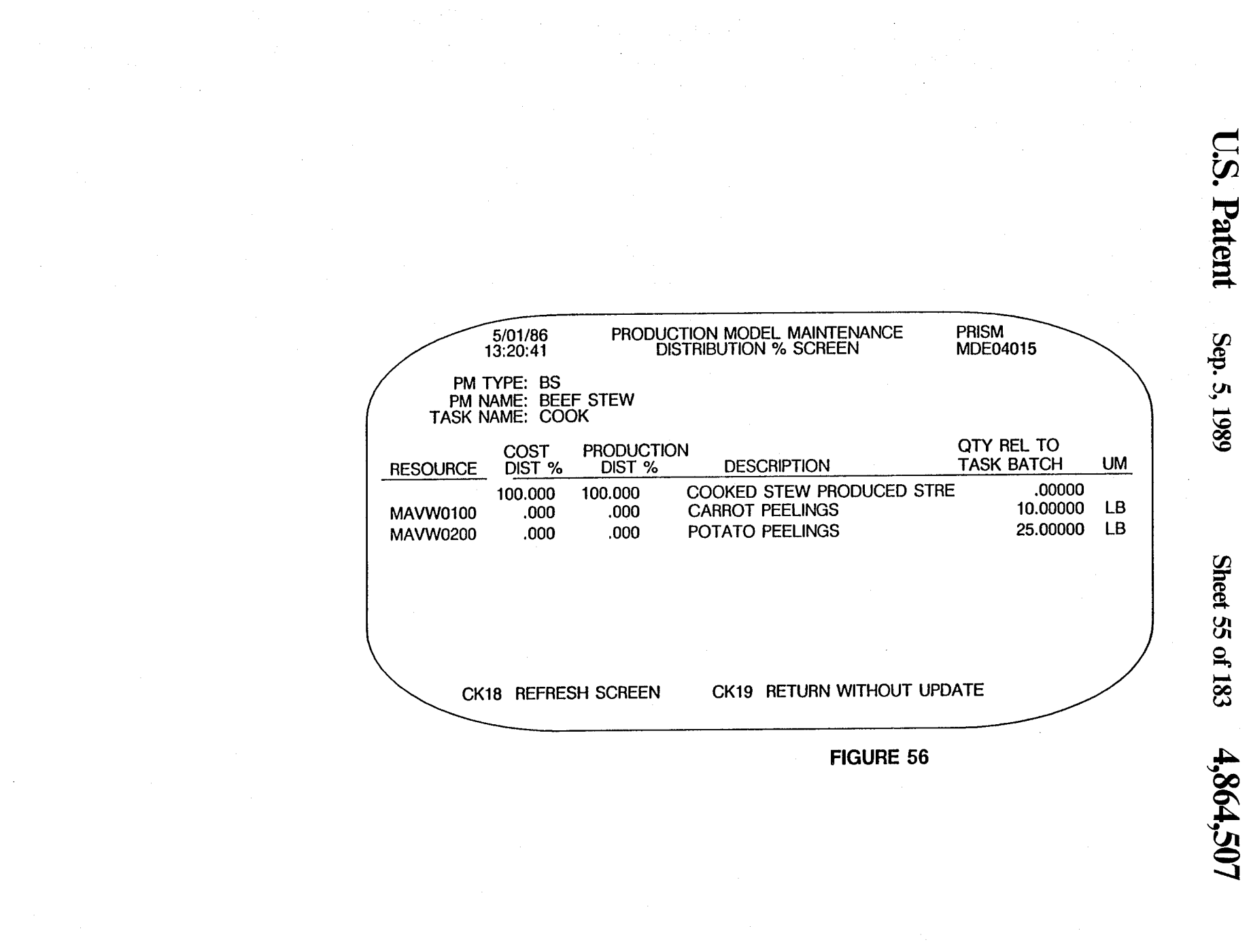

5/01/86 PRODUCTION MODEL MAINTENANCE PRISM
13:20:41 DISTRIBUTION % SCREEN MDE04015

PM TYPE: BS
PM NAME: BEEF STEW
TASK NAME: COOK

| RESOURCE | COST DIST % | PRODUCTION DIST % | DESCRIPTION | QTY REL TO TASK BATCH | UM |
|---|---|---|---|---|---|
| | 100.000 | 100.000 | COOKED STEW PRODUCED STRE | .00000 | |
| MAVW0100 | .000 | .000 | CARROT PEELINGS | 10.00000 | LB |
| MAVW0200 | .000 | .000 | POTATO PEELINGS | 25.00000 | LB |

CK18 REFRESH SCREEN CK19 RETURN WITHOUT UPDATE

FIGURE 56

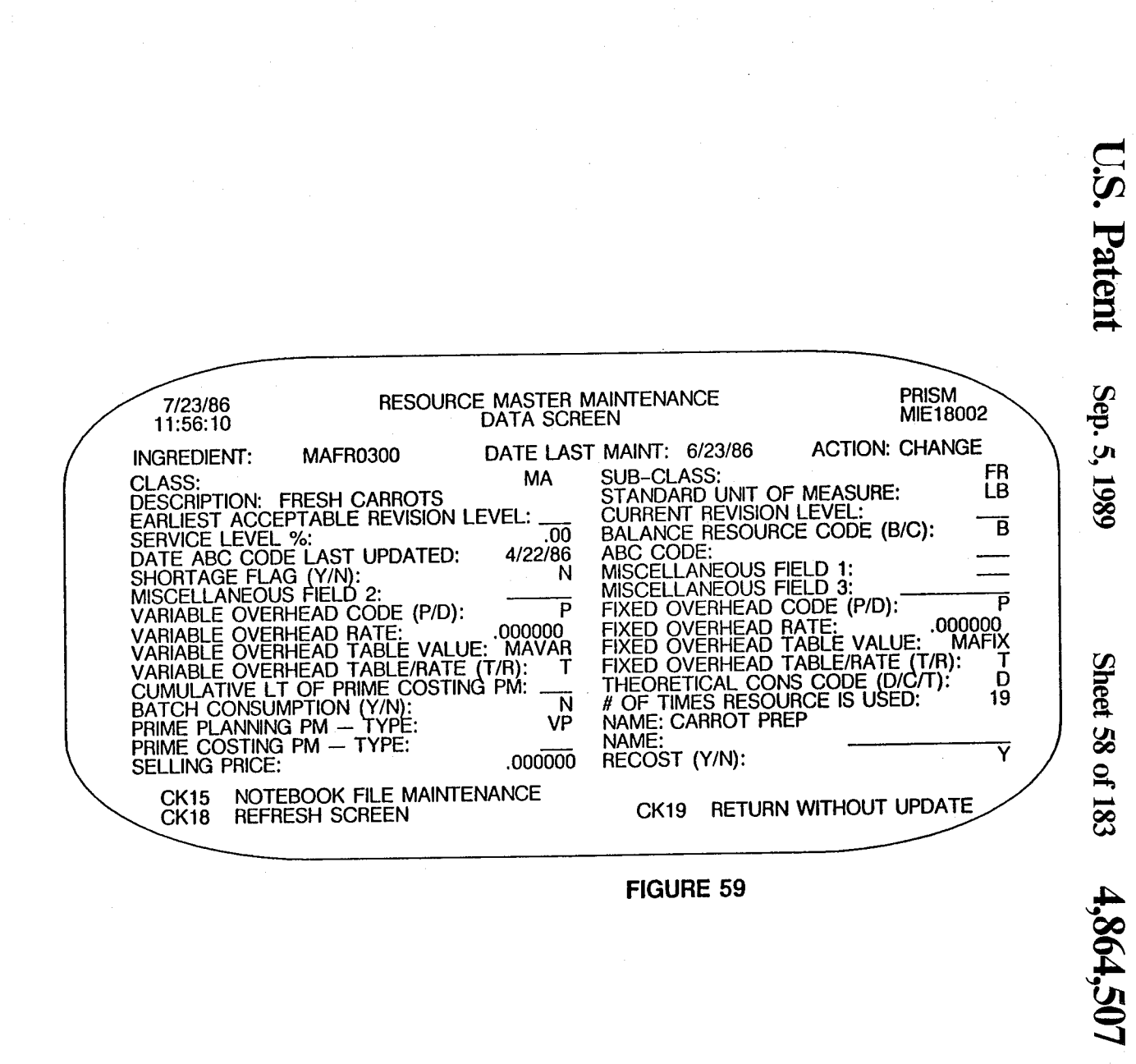

7/23/86 11:56:10 — RESOURCE MASTER MAINTENANCE DATA SCREEN — PRISM MIE18002

INGREDIENT: MAFR0300 DATE LAST MAINT: 6/23/86 ACTION: CHANGE

| | | | |
|---|---|---|---|
| CLASS: | MA | SUB-CLASS: | FR |
| DESCRIPTION: FRESH CARROTS | | STANDARD UNIT OF MEASURE: | LB |
| EARLIEST ACCEPTABLE REVISION LEVEL: | ___ | CURRENT REVISION LEVEL: | ___ |
| SERVICE LEVEL %: | .00 | BALANCE RESOURCE CODE (B/C): | B |
| DATE ABC CODE LAST UPDATED: | 4/22/86 | ABC CODE: | ___ |
| SHORTAGE FLAG (Y/N): | N | MISCELLANEOUS FIELD 1: | ___ |
| MISCELLANEOUS FIELD 2: | ___ | MISCELLANEOUS FIELD 3: | ___ |
| VARIABLE OVERHEAD CODE (P/D): | P | FIXED OVERHEAD CODE (P/D): | P |
| VARIABLE OVERHEAD RATE: | .000000 | FIXED OVERHEAD RATE: | .000000 |
| VARIABLE OVERHEAD TABLE VALUE: | MAVAR | FIXED OVERHEAD TABLE VALUE: | MAFIX |
| VARIABLE OVERHEAD TABLE/RATE (T/R): | T | FIXED OVERHEAD TABLE/RATE (T/R): | T |
| CUMULATIVE LT OF PRIME COSTING PM: | ___ | THEORETICAL CONS CODE (D/C/T): | D |
| BATCH CONSUMPTION (Y/N): | N | # OF TIMES RESOURCE IS USED: | 19 |
| PRIME PLANNING PM — TYPE: | VP | NAME: CARROT PREP | |
| PRIME COSTING PM — TYPE: | ___ | NAME: | ___ |
| SELLING PRICE: | .000000 | RECOST (Y/N): | Y |

CK15 NOTEBOOK FILE MAINTENANCE
CK18 REFRESH SCREEN
CK19 RETURN WITHOUT UPDATE

FIGURE 59

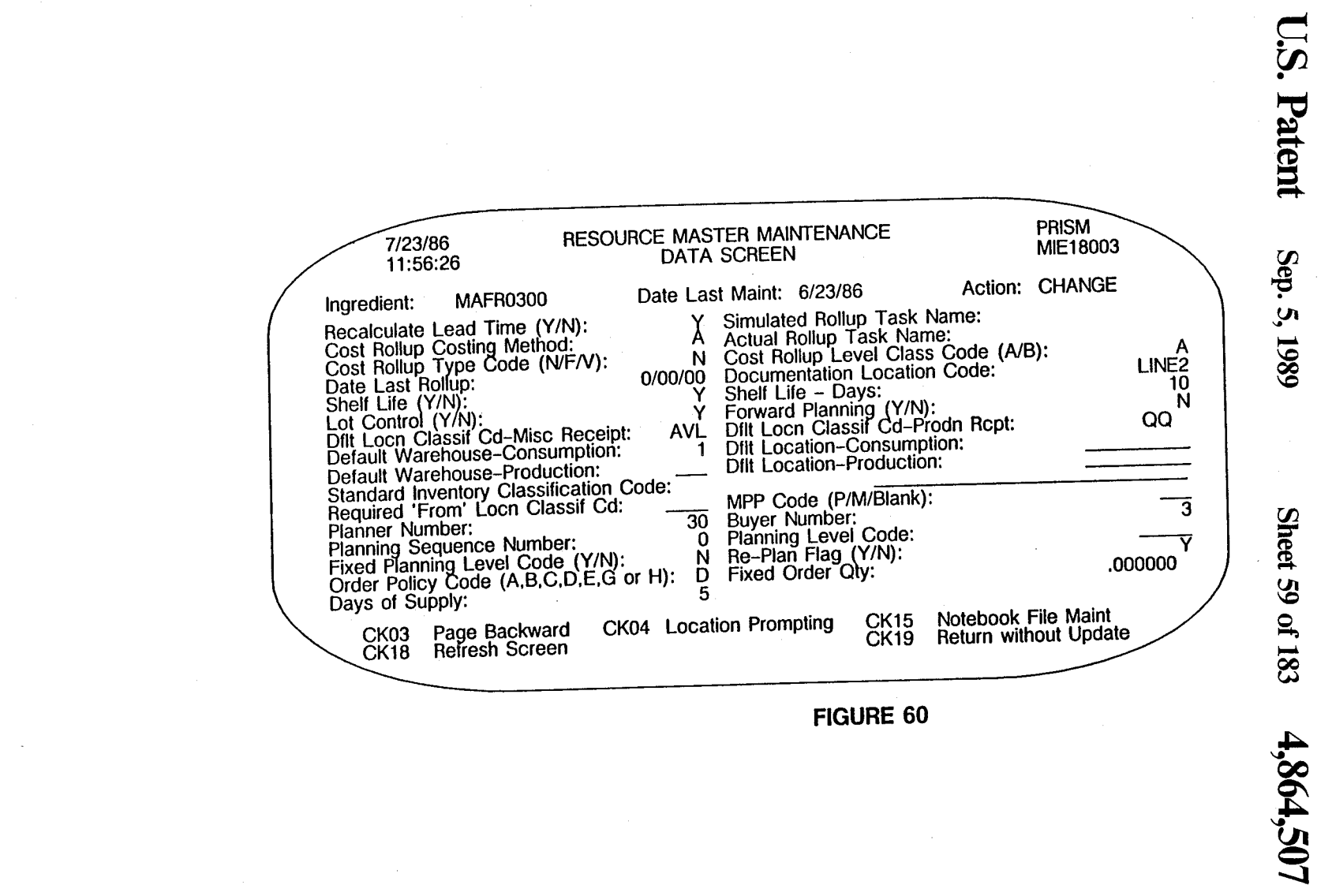

7/23/86 RESOURCE MASTER MAINTENANCE PRISM
11:56:26 DATA SCREEN MIE18003

Ingredient: MAFR0300 Date Last Maint: 6/23/86 Action: CHANGE

| | | | |
|---|---|---|---|
| Recalculate Lead Time (Y/N): | Y | Simulated Rollup Task Name: | |
| Cost Rollup Costing Method: | A | Actual Rollup Task Name: | |
| Cost Rollup Type Code (N/F/V): | N | Cost Rollup Level Class Code (A/B): | A |
| Date Last Rollup: | 0/00/00 | Documentation Location Code: | LINE2 |
| Shelf Life (Y/N): | Y | Shelf Life - Days: | 10 |
| Lot Control (Y/N): | Y | Forward Planning (Y/N): | N |
| Dflt Locn Classif Cd-Misc Receipt: | AVL | Dflt Locn Classif Cd-Prodn Rcpt: | QQ |
| Default Warehouse-Consumption: | 1 | Dflt Location-Consumption: | ____ |
| Default Warehouse-Production: | ___ | Dflt Location-Production: | ____ |
| Standard Inventory Classification Code: | ____ | | |
| Required 'From' Locn Classif Cd: | ___ | MPP Code (P/M/Blank): | ___ |
| Planner Number: | 30 | Buyer Number: | 3 |
| Planning Sequence Number: | 0 | Planning Level Code: | ___ |
| Fixed Planning Level Code (Y/N): | N | Re-Plan Flag (Y/N): | Y |
| Order Policy Code (A,B,C,D,E,G or H): | D | Fixed Order Qty: | .000000 |
| Days of Supply: | 5 | | |

CK03 Page Backward CK04 Location Prompting CK15 Notebook File Maint
CK18 Refresh Screen CK19 Return without Update

FIGURE 60

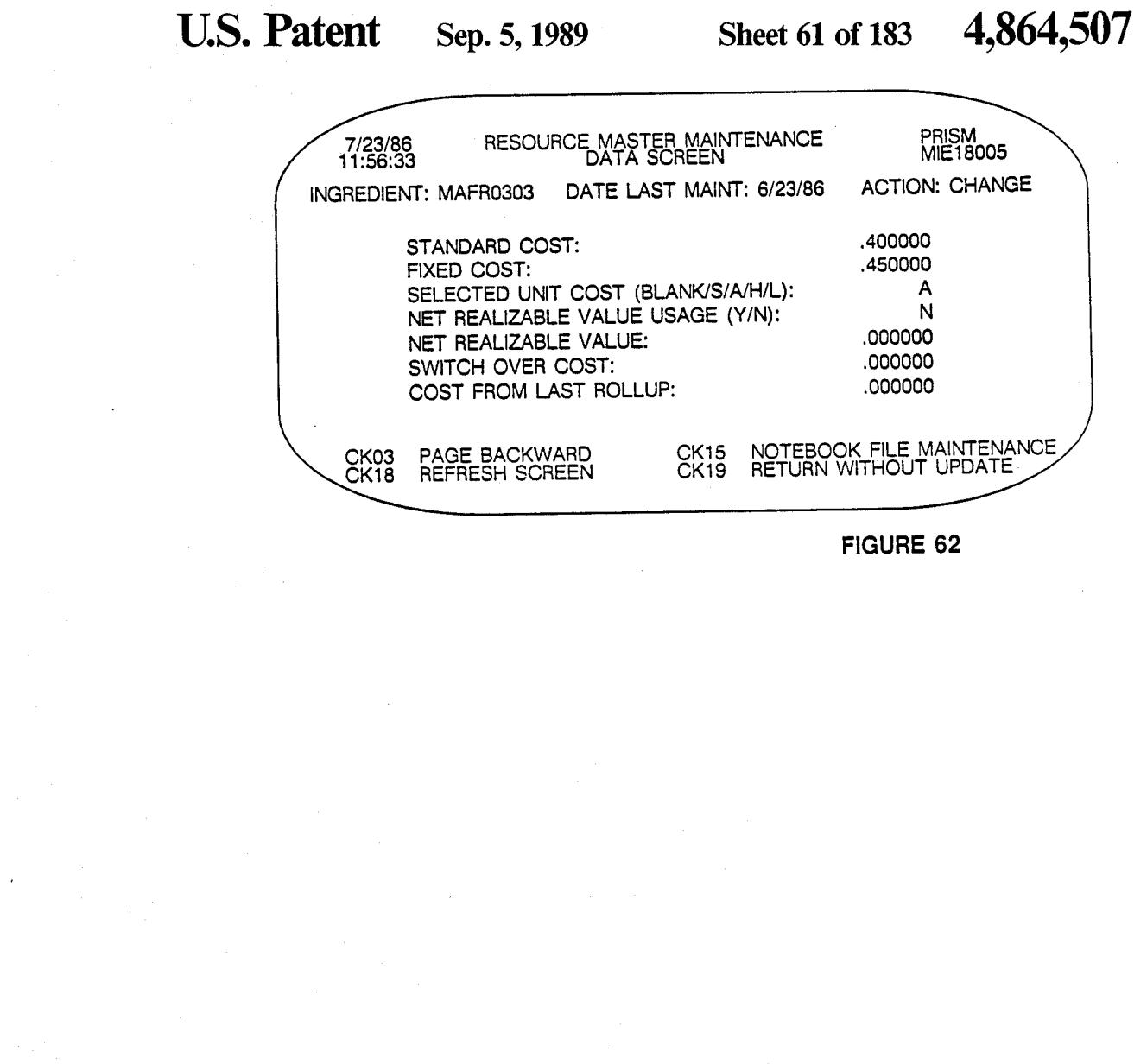

7/23/86 RESOURCE MASTER MAINTENANCE PRISM
11:56:33 DATA SCREEN MIE18005

INGREDIENT: MAFR0303 DATE LAST MAINT: 6/23/86 ACTION: CHANGE

| | |
|---|---|
| STANDARD COST: | .400000 |
| FIXED COST: | .450000 |
| SELECTED UNIT COST (BLANK/S/A/H/L): | A |
| NET REALIZABLE VALUE USAGE (Y/N): | N |
| NET REALIZABLE VALUE: | .000000 |
| SWITCH OVER COST: | .000000 |
| COST FROM LAST ROLLUP: | .000000 |

CK03 PAGE BACKWARD CK15 NOTEBOOK FILE MAINTENANCE
CK18 REFRESH SCREEN CK19 RETURN WITHOUT UPDATE

FIGURE 62

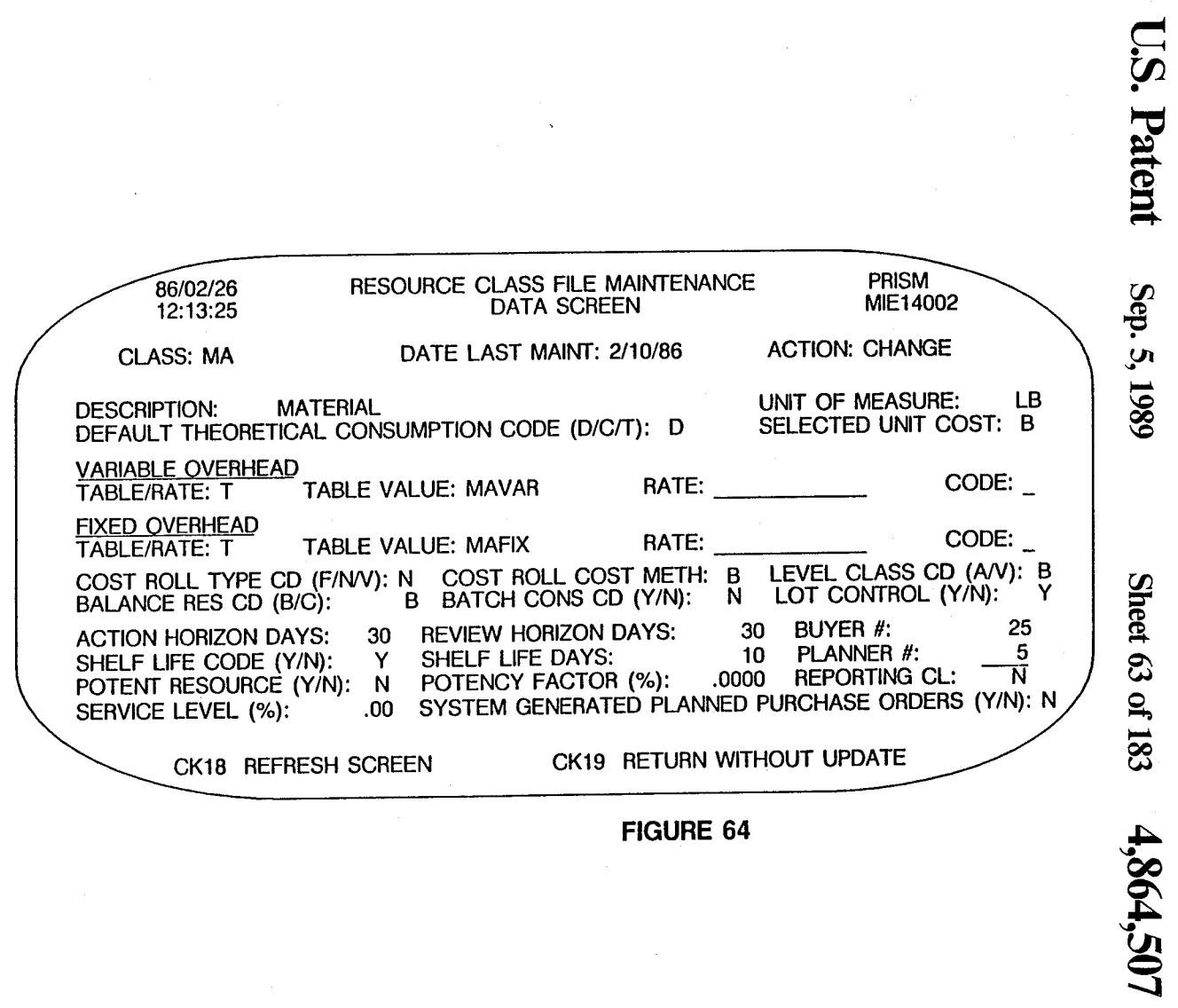

```
86/02/26          RESOURCE CLASS FILE MAINTENANCE          PRISM
12:13:25                    DATA SCREEN                    MIE14002

  CLASS: MA           DATE LAST MAINT: 2/10/86      ACTION: CHANGE

DESCRIPTION:     MATERIAL                       UNIT OF MEASURE:     LB
DEFAULT THEORETICAL CONSUMPTION CODE (D/C/T): D SELECTED UNIT COST: B

VARIABLE OVERHEAD
TABLE/RATE: T     TABLE VALUE: MAVAR     RATE: ____________     CODE: _

FIXED OVERHEAD
TABLE/RATE: T     TABLE VALUE: MAFIX     RATE: ____________     CODE: _

COST ROLL TYPE CD (F/N/V): N  COST ROLL COST METH: B  LEVEL CLASS CD (A/V): B
BALANCE RES CD (B/C):      B  BATCH CONS CD (Y/N):  N  LOT CONTROL (Y/N):    Y

ACTION HORIZON DAYS:    30  REVIEW HORIZON DAYS:    30  BUYER #:        25
SHELF LIFE CODE (Y/N):   Y  SHELF LIFE DAYS:        10  PLANNER #:       5
POTENT RESOURCE (Y/N):   N  POTENCY FACTOR (%):  .0000  REPORTING CL:    N
SERVICE LEVEL (%):     .00  SYSTEM GENERATED PLANNED PURCHASE ORDERS (Y/N): N

   CK18  REFRESH SCREEN              CK19  RETURN WITHOUT UPDATE
```

FIGURE 64

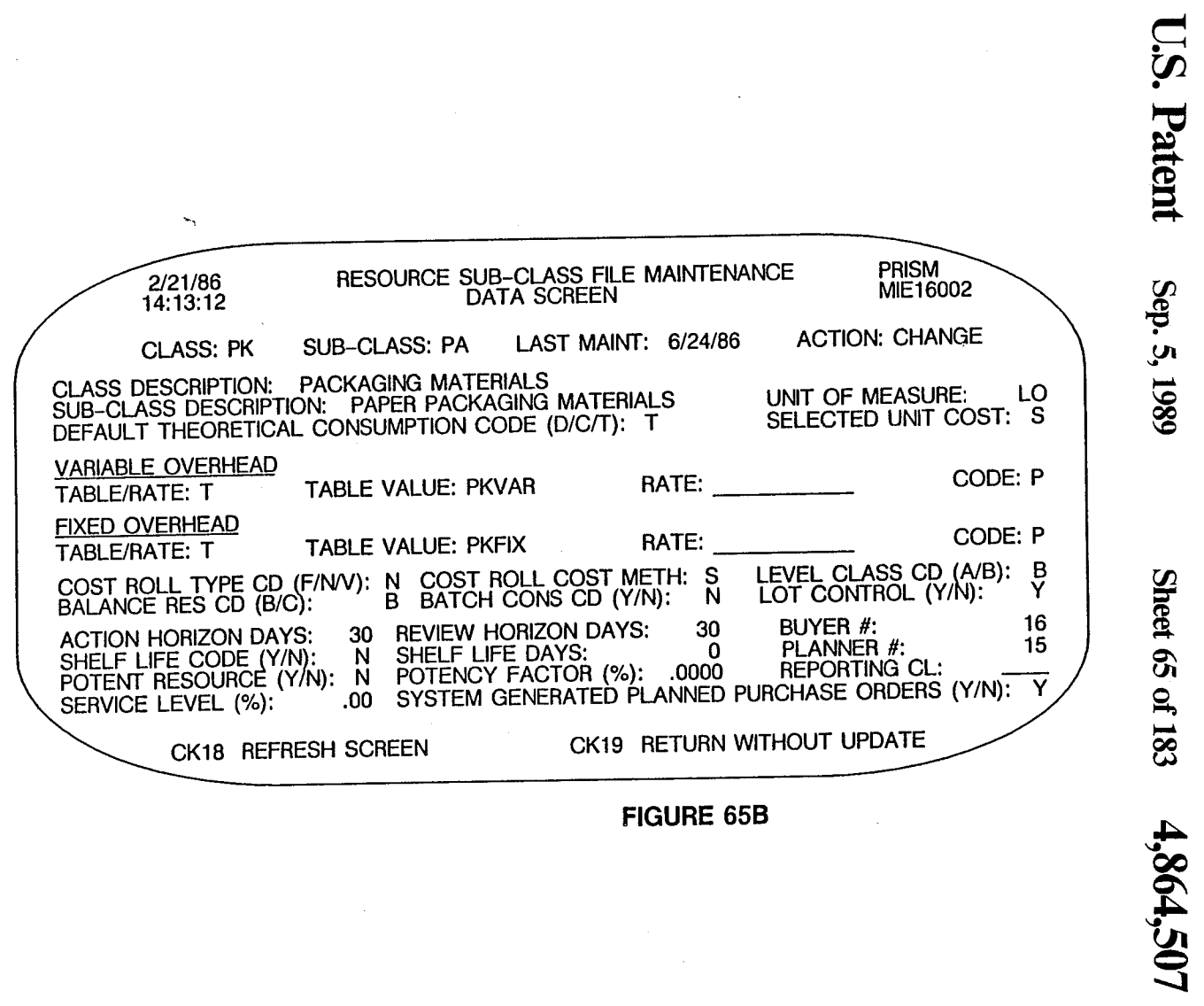

2/21/86 RESOURCE SUB-CLASS FILE MAINTENANCE PRISM
14:13:12 DATA SCREEN MIE16002

CLASS: PK SUB-CLASS: PA LAST MAINT: 6/24/86 ACTION: CHANGE

CLASS DESCRIPTION: PACKAGING MATERIALS
SUB-CLASS DESCRIPTION: PAPER PACKAGING MATERIALS UNIT OF MEASURE: LO
DEFAULT THEORETICAL CONSUMPTION CODE (D/C/T): T SELECTED UNIT COST: S

VARIABLE OVERHEAD
TABLE/RATE: T TABLE VALUE: PKVAR RATE: ________ CODE: P

FIXED OVERHEAD
TABLE/RATE: T TABLE VALUE: PKFIX RATE: ________ CODE: P

COST ROLL TYPE CD (F/N/V): N COST ROLL COST METH: S LEVEL CLASS CD (A/B): B
BALANCE RES CD (B/C): B BATCH CONS CD (Y/N): N LOT CONTROL (Y/N): Y

ACTION HORIZON DAYS: 30 REVIEW HORIZON DAYS: 30 BUYER #: 16
SHELF LIFE CODE (Y/N): N SHELF LIFE DAYS: 0 PLANNER #: 15
POTENT RESOURCE (Y/N): N POTENCY FACTOR (%): .0000 REPORTING CL: ____
SERVICE LEVEL (%): .00 SYSTEM GENERATED PLANNED PURCHASE ORDERS (Y/N): Y

CK18 REFRESH SCREEN CK19 RETURN WITHOUT UPDATE

FIGURE 65B

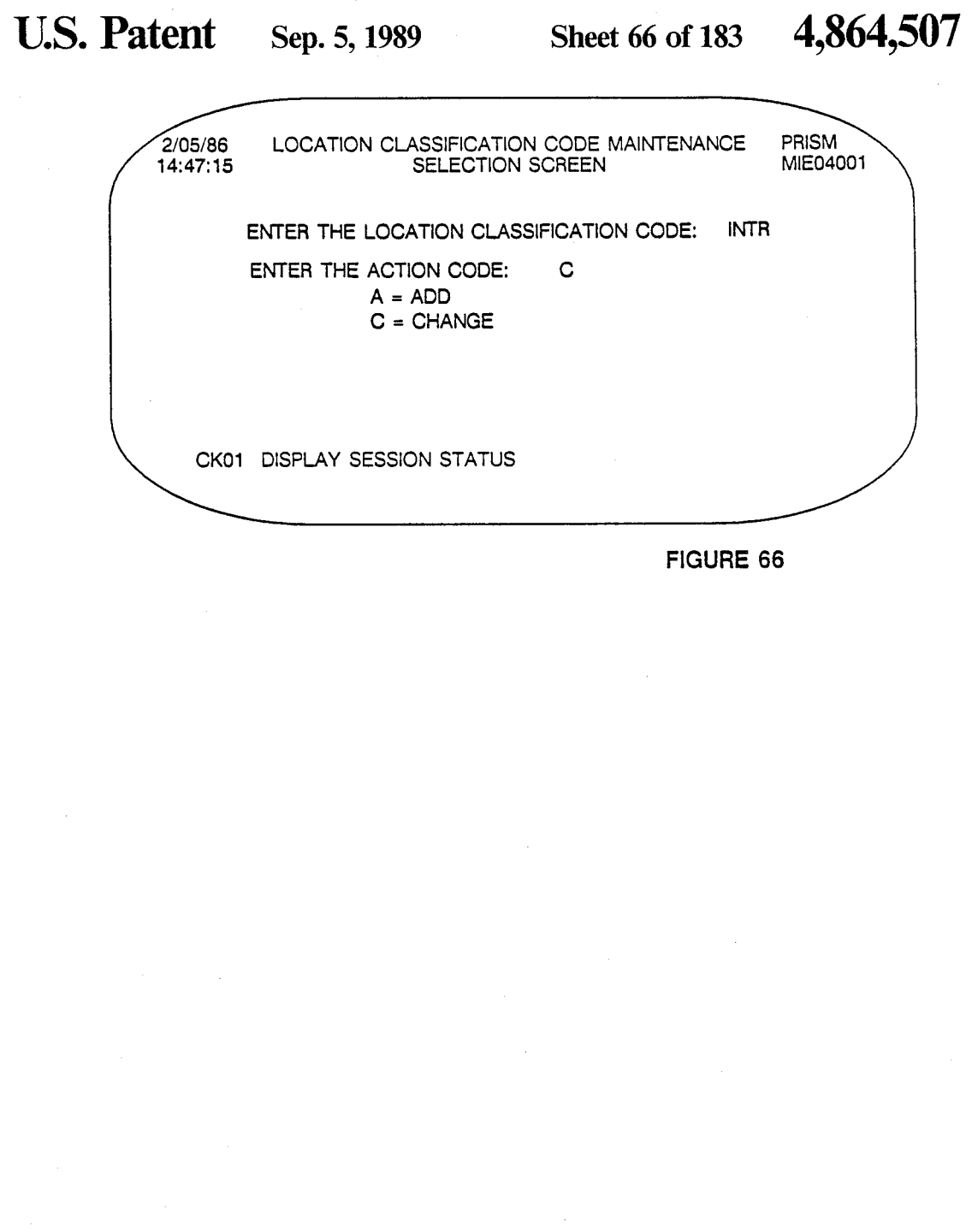

```
2/05/86      LOCATION CLASSIFICATION CODE MAINTENANCE      PRISM
14:47:15                 SELECTION SCREEN                  MIE04001

        ENTER THE LOCATION CLASSIFICATION CODE:   INTR

        ENTER THE ACTION CODE:      C
                     A = ADD
                     C = CHANGE



    CK01  DISPLAY SESSION STATUS
```

FIGURE 66

Figure 67:
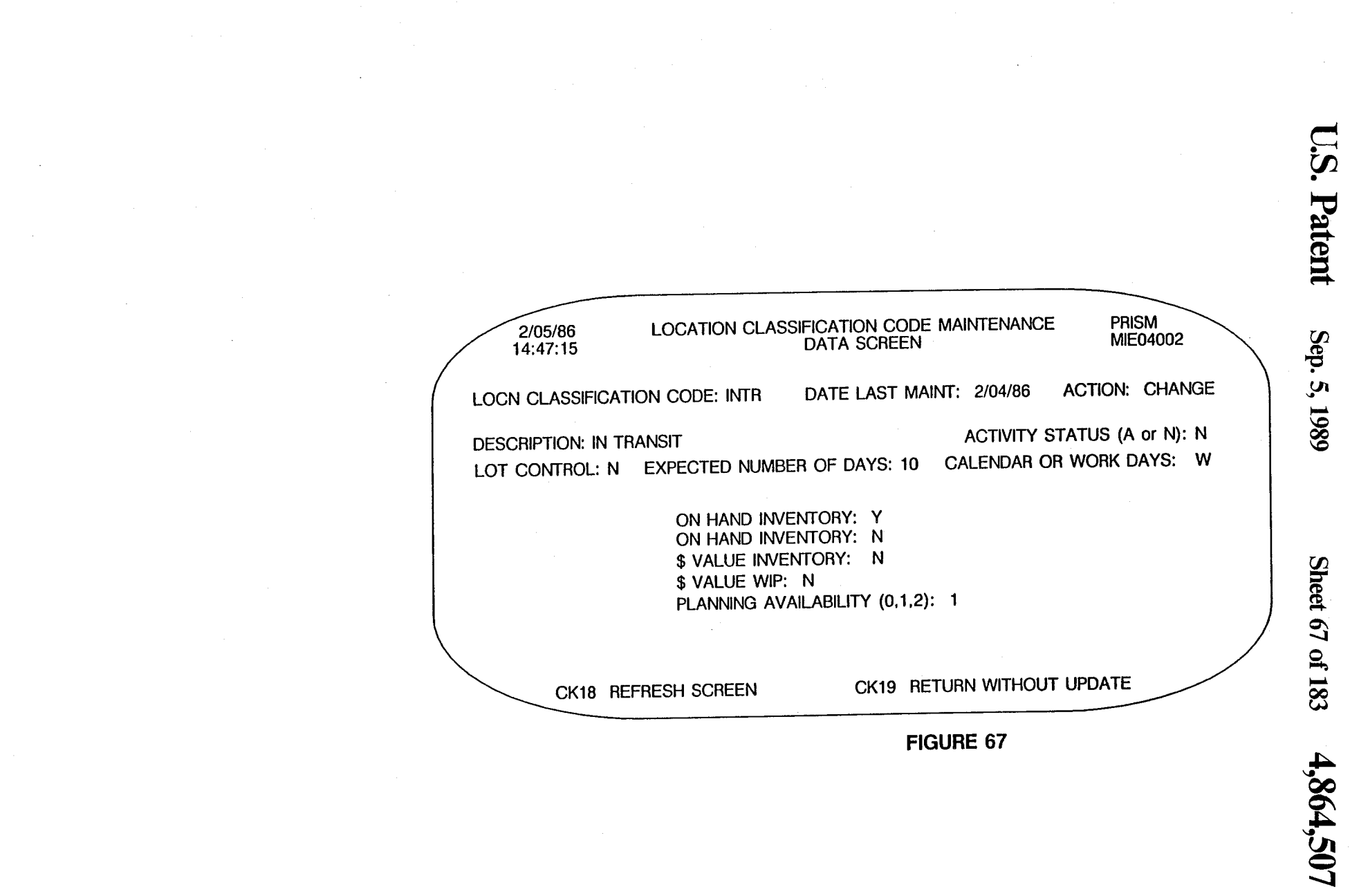

2/05/86 LOCATION CLASSIFICATION CODE MAINTENANCE PRISM
14:47:15 DATA SCREEN MIE04002

LOCN CLASSIFICATION CODE: INTR DATE LAST MAINT: 2/04/86 ACTION: CHANGE

DESCRIPTION: IN TRANSIT ACTIVITY STATUS (A or N): N

LOT CONTROL: N EXPECTED NUMBER OF DAYS: 10 CALENDAR OR WORK DAYS: W

ON HAND INVENTORY: Y
ON HAND INVENTORY: N
$ VALUE INVENTORY: N
$ VALUE WIP: N
PLANNING AVAILABILITY (0,1,2): 1

CK18 REFRESH SCREEN CK19 RETURN WITHOUT UPDATE

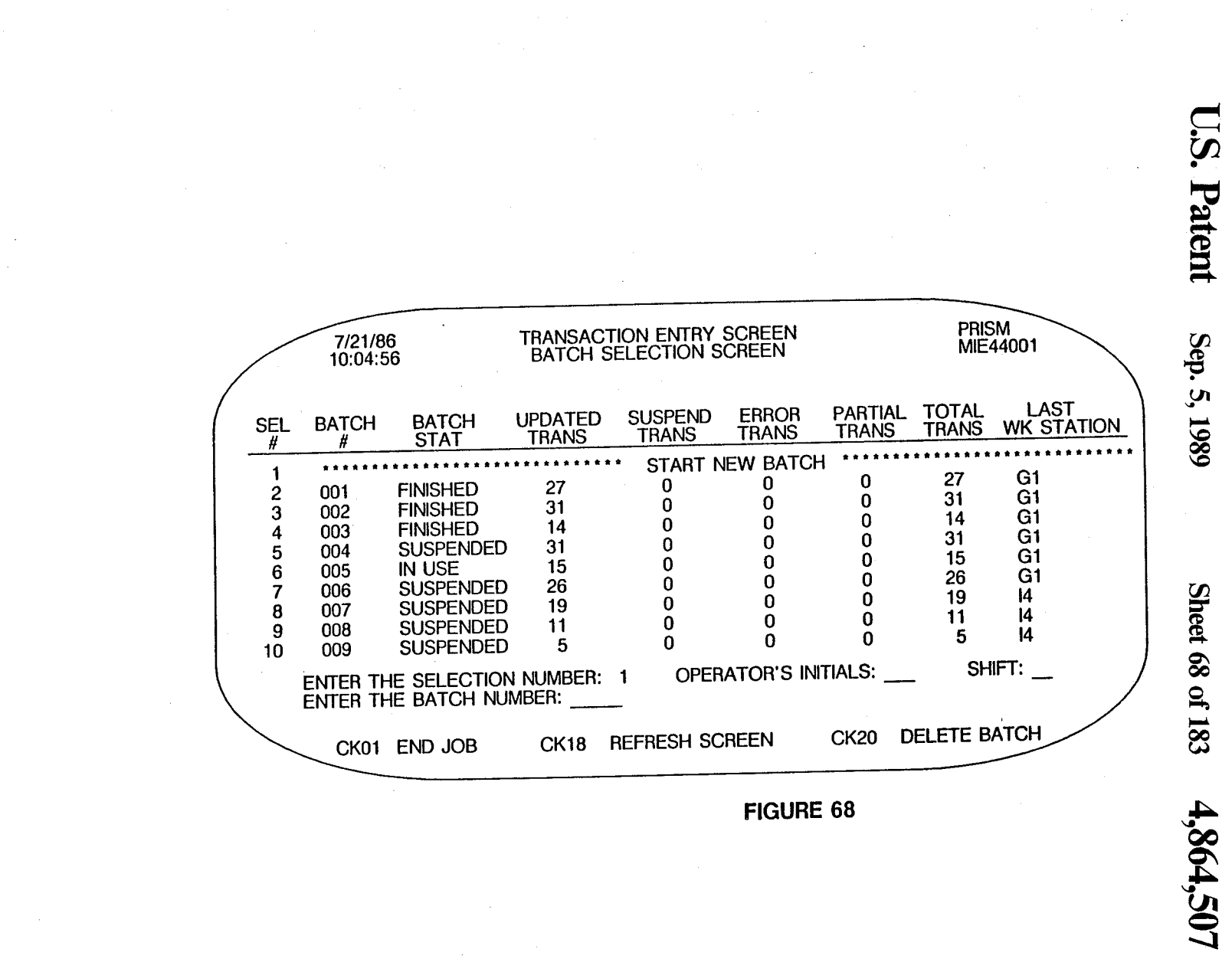

TRANSACTION ENTRY SCREEN
BATCH SELECTION SCREEN

PRISM
MIE44001

| SEL # | BATCH # | BATCH STAT | UPDATED TRANS | SUSPEND TRANS | ERROR TRANS | PARTIAL TRANS | TOTAL TRANS | LAST WK STATION |
|---|---|---|---|---|---|---|---|---|
| 1 | ****************************** | | | START NEW BATCH | | ****************************** | | |
| 2 | 001 | FINISHED | 27 | 0 | 0 | 0 | 27 | G1 |
| 3 | 002 | FINISHED | 31 | 0 | 0 | 0 | 31 | G1 |
| 4 | 003 | FINISHED | 14 | 0 | 0 | 0 | 14 | G1 |
| 5 | 004 | SUSPENDED | 31 | 0 | 0 | 0 | 31 | G1 |
| 6 | 005 | IN USE | 15 | 0 | 0 | 0 | 15 | G1 |
| 7 | 006 | SUSPENDED | 26 | 0 | 0 | 0 | 26 | G1 |
| 8 | 007 | SUSPENDED | 19 | 0 | 0 | 0 | 19 | I4 |
| 9 | 008 | SUSPENDED | 11 | 0 | 0 | 0 | 11 | I4 |
| 10 | 009 | SUSPENDED | 5 | 0 | 0 | 0 | 5 | I4 |

ENTER THE SELECTION NUMBER: 1 OPERATOR'S INITIALS: ___ SHIFT: _
ENTER THE BATCH NUMBER: _____

CK01 END JOB CK18 REFRESH SCREEN CK20 DELETE BATCH

FIGURE 68

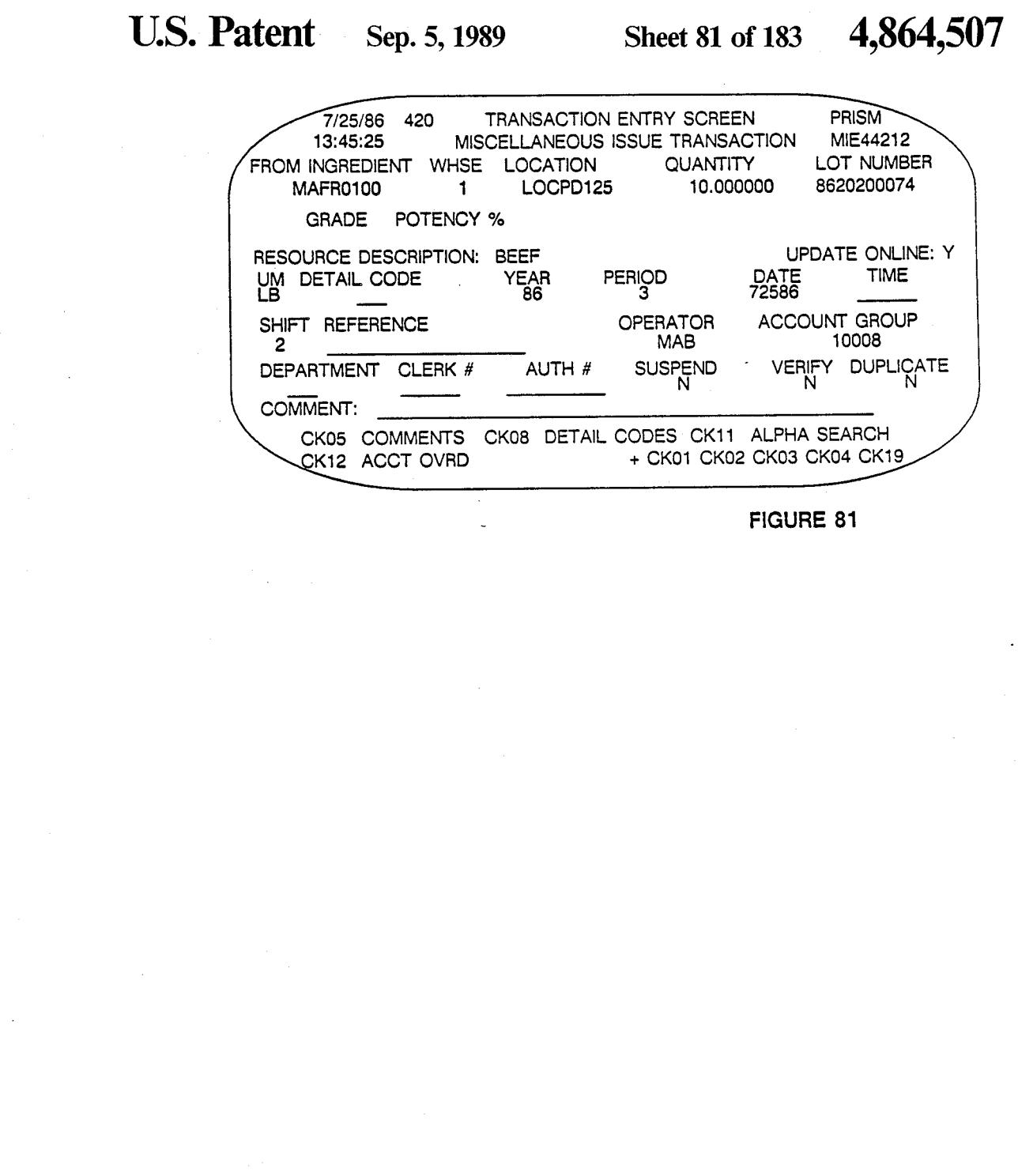

```
7/25/86   420      TRANSACTION ENTRY SCREEN            PRISM
13:45:25        MISCELLANEOUS ISSUE TRANSACTION       MIE44212
FROM INGREDIENT  WHSE   LOCATION      QUANTITY       LOT NUMBER
   MAFR0100       1     LOCPD125      10.000000      8620200074

   GRADE    POTENCY %

RESOURCE DESCRIPTION:  BEEF                        UPDATE ONLINE: Y
UM  DETAIL CODE          YEAR     PERIOD      DATE        TIME
LB                        86        3         72586       ____
       ___
SHIFT  REFERENCE                    OPERATOR     ACCOUNT GROUP
 2     ____________________          MAB            10008
DEPARTMENT  CLERK #    AUTH #      SUSPEND      VERIFY  DUPLICATE
                                      N            N        N
 ___         ______    __________
COMMENT:  ________________________________________________
    CK05  COMMENTS   CK08  DETAIL CODES  CK11  ALPHA SEARCH
    CK12  ACCT OVRD                + CK01 CK02 CK03 CK04 CK19
```

FIGURE 81

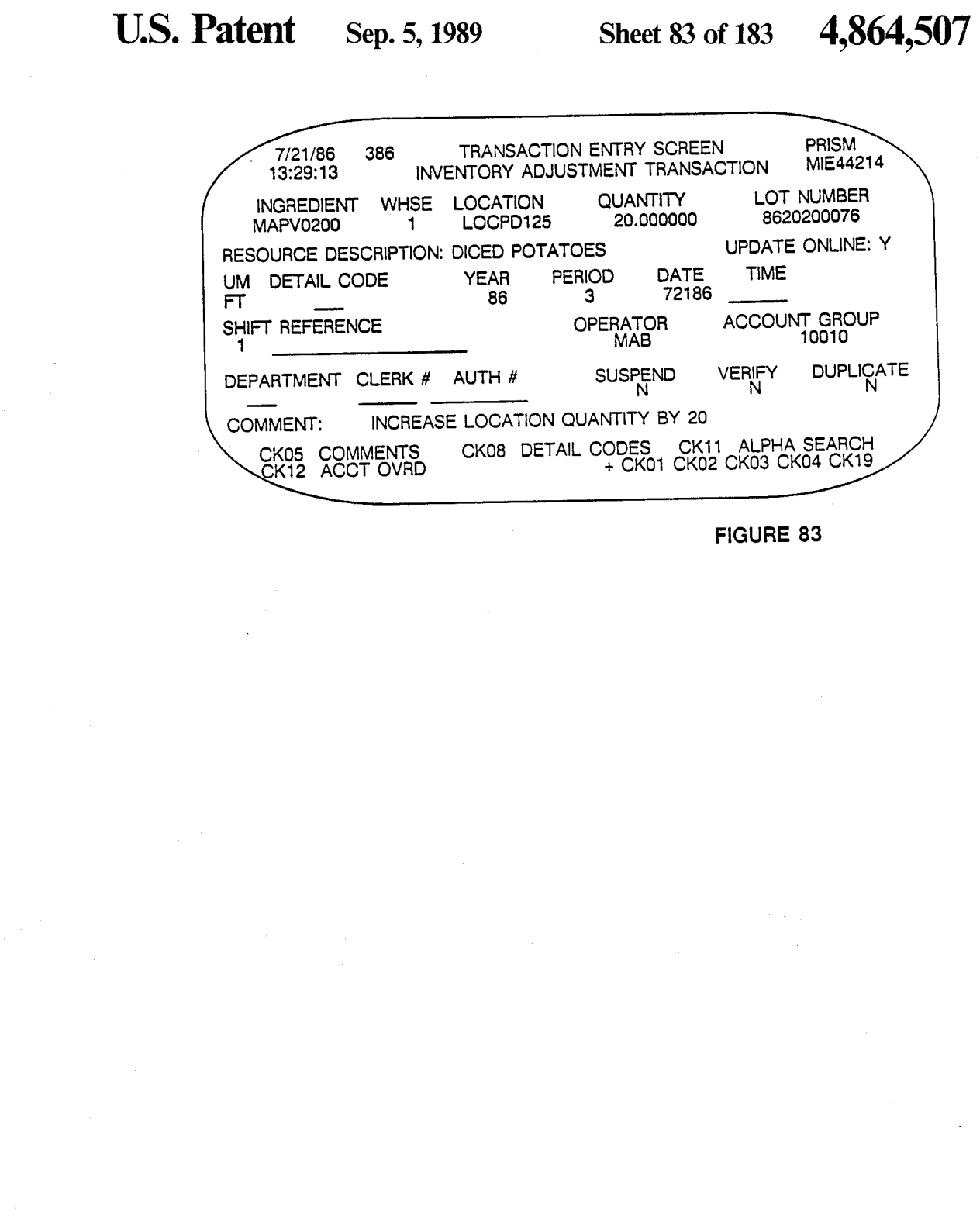

7/21/86 386 TRANSACTION ENTRY SCREEN PRISM
13:29:13 INVENTORY ADJUSTMENT TRANSACTION MIE44214

| INGREDIENT | WHSE | LOCATION | QUANTITY | LOT NUMBER |
|---|---|---|---|---|
| MAPV0200 | 1 | LOCPD125 | 20.000000 | 8620200076 |

RESOURCE DESCRIPTION: DICED POTATOES UPDATE ONLINE: Y

| UM | DETAIL CODE | YEAR | PERIOD | DATE | TIME |
|---|---|---|---|---|---|
| FT | ___ | 86 | 3 | 72186 | ______ |

| SHIFT REFERENCE | | OPERATOR | ACCOUNT GROUP |
|---|---|---|---|
| 1 | ____________________ | MAB | 10010 |

| DEPARTMENT | CLERK # | AUTH # | SUSPEND | VERIFY | DUPLICATE |
|---|---|---|---|---|---|
| ___ | ______ | __________ | N | N | N |

COMMENT: INCREASE LOCATION QUANTITY BY 20

CK05 COMMENTS CK08 DETAIL CODES CK11 ALPHA SEARCH
CK12 ACCT OVRD + CK01 CK02 CK03 CK04 CK19

FIGURE 83

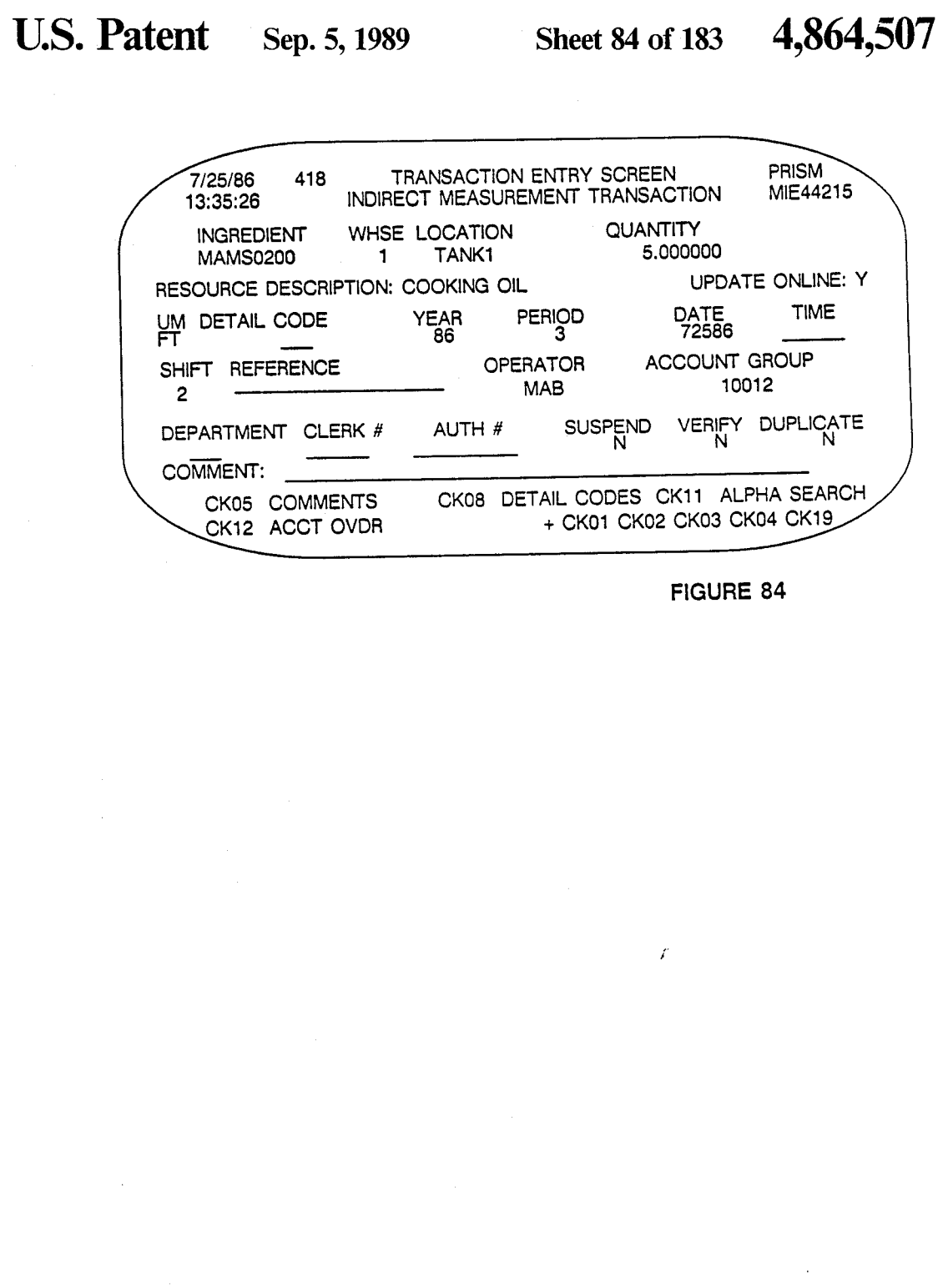

7/25/86 418 TRANSACTION ENTRY SCREEN PRISM
13:35:26 INDIRECT MEASUREMENT TRANSACTION MIE44215

INGREDIENT WHSE LOCATION QUANTITY
MAMS0200 1 TANK1 5.000000

RESOURCE DESCRIPTION: COOKING OIL UPDATE ONLINE: Y

UM DETAIL CODE YEAR PERIOD DATE TIME
FT 86 3 72586

SHIFT REFERENCE OPERATOR ACCOUNT GROUP
2 MAB 10012

DEPARTMENT CLERK # AUTH # SUSPEND VERIFY DUPLICATE
N N N

COMMENT:

CK05 COMMENTS CK08 DETAIL CODES CK11 ALPHA SEARCH
CK12 ACCT OVDR + CK01 CK02 CK03 CK04 CK19

FIGURE 84

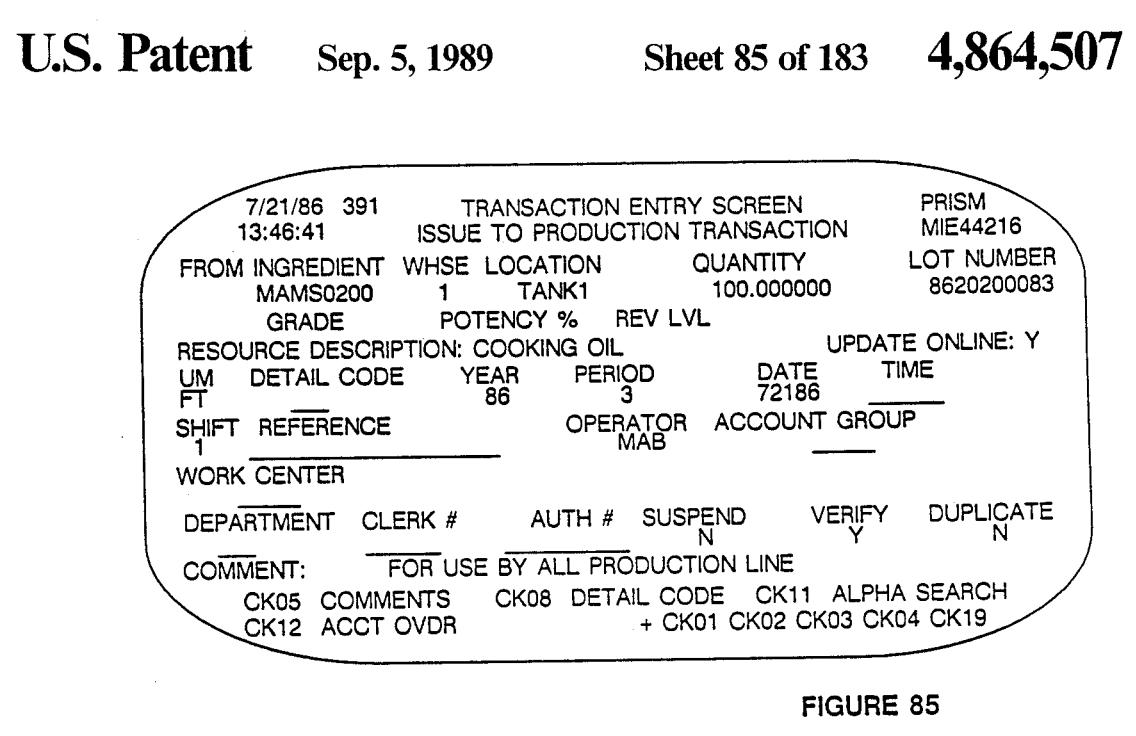

7/21/86 391 TRANSACTION ENTRY SCREEN PRISM
13:46:41 ISSUE TO PRODUCTION TRANSACTION MIE44216

FROM INGREDIENT WHSE LOCATION QUANTITY LOT NUMBER
MAMS0200 1 TANK1 100.000000 8620200083
GRADE POTENCY % REV LVL
RESOURCE DESCRIPTION: COOKING OIL UPDATE ONLINE: Y
UM DETAIL CODE YEAR PERIOD DATE TIME
FT 86 3 72186
SHIFT REFERENCE OPERATOR ACCOUNT GROUP
1 MAB
WORK CENTER

DEPARTMENT CLERK # AUTH # SUSPEND VERIFY DUPLICATE
N Y N
COMMENT: FOR USE BY ALL PRODUCTION LINE
CK05 COMMENTS CK08 DETAIL CODE CK11 ALPHA SEARCH
CK12 ACCT OVDR + CK01 CK02 CK03 CK04 CK19

FIGURE 85

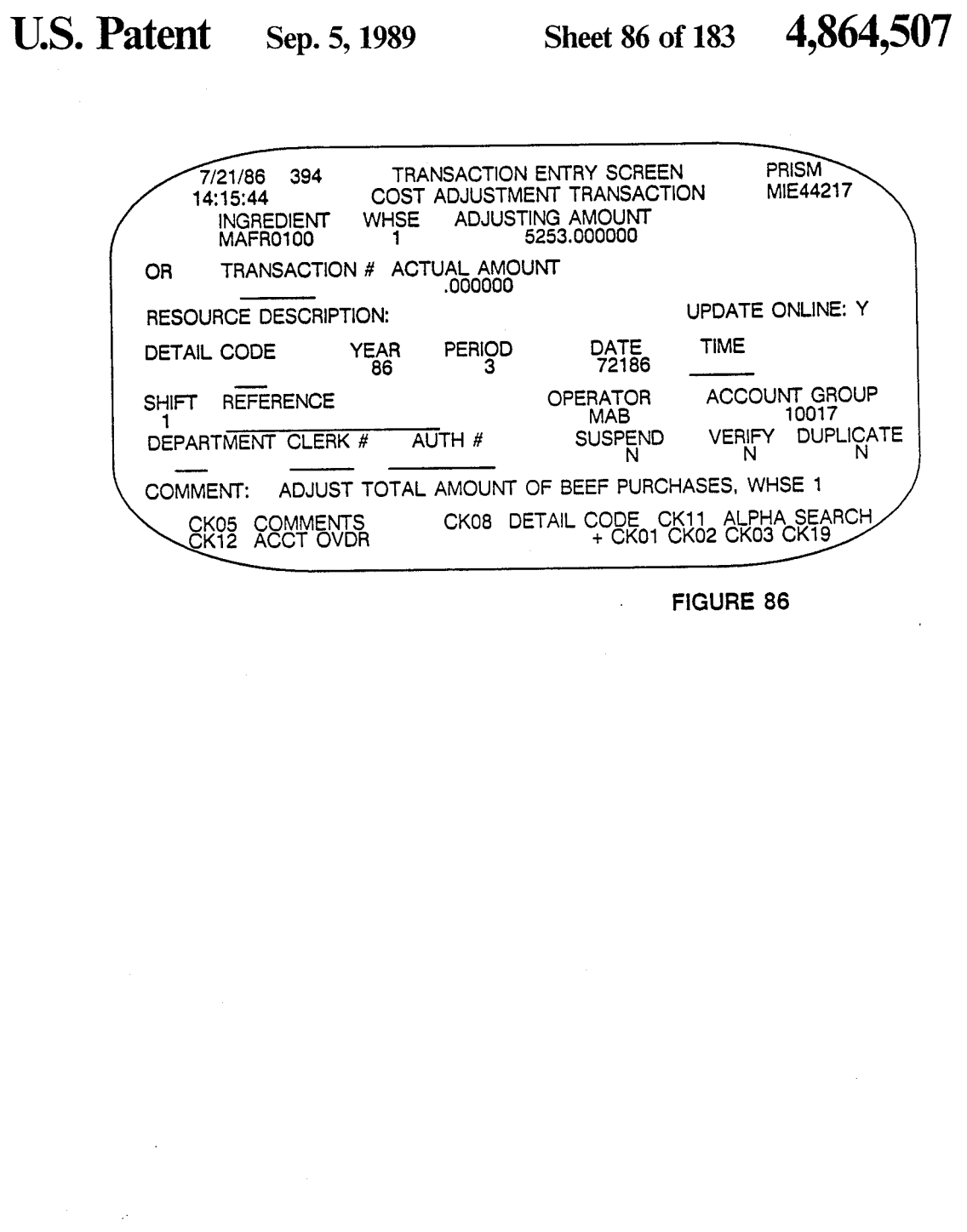

```
7/21/86  394        TRANSACTION ENTRY SCREEN           PRISM
14:15:44          COST ADJUSTMENT TRANSACTION          MIE44217
  INGREDIENT   WHSE    ADJUSTING AMOUNT
  MAFR0100      1              5253.000000

OR    TRANSACTION #  ACTUAL AMOUNT
                         .000000

RESOURCE DESCRIPTION:                          UPDATE ONLINE: Y

DETAIL CODE        YEAR     PERIOD      DATE      TIME
                    86        3         72186

SHIFT  REFERENCE                     OPERATOR     ACCOUNT GROUP
1                                      MAB             10017
DEPARTMENT  CLERK #    AUTH #         SUSPEND     VERIFY   DUPLICATE
                                          N          N         N

COMMENT:  ADJUST TOTAL AMOUNT OF BEEF PURCHASES, WHSE 1

   CK05  COMMENTS        CK08  DETAIL CODE  CK11  ALPHA SEARCH
   CK12  ACCT OVDR                     + CK01 CK02 CK03 CK19
```

FIGURE 86

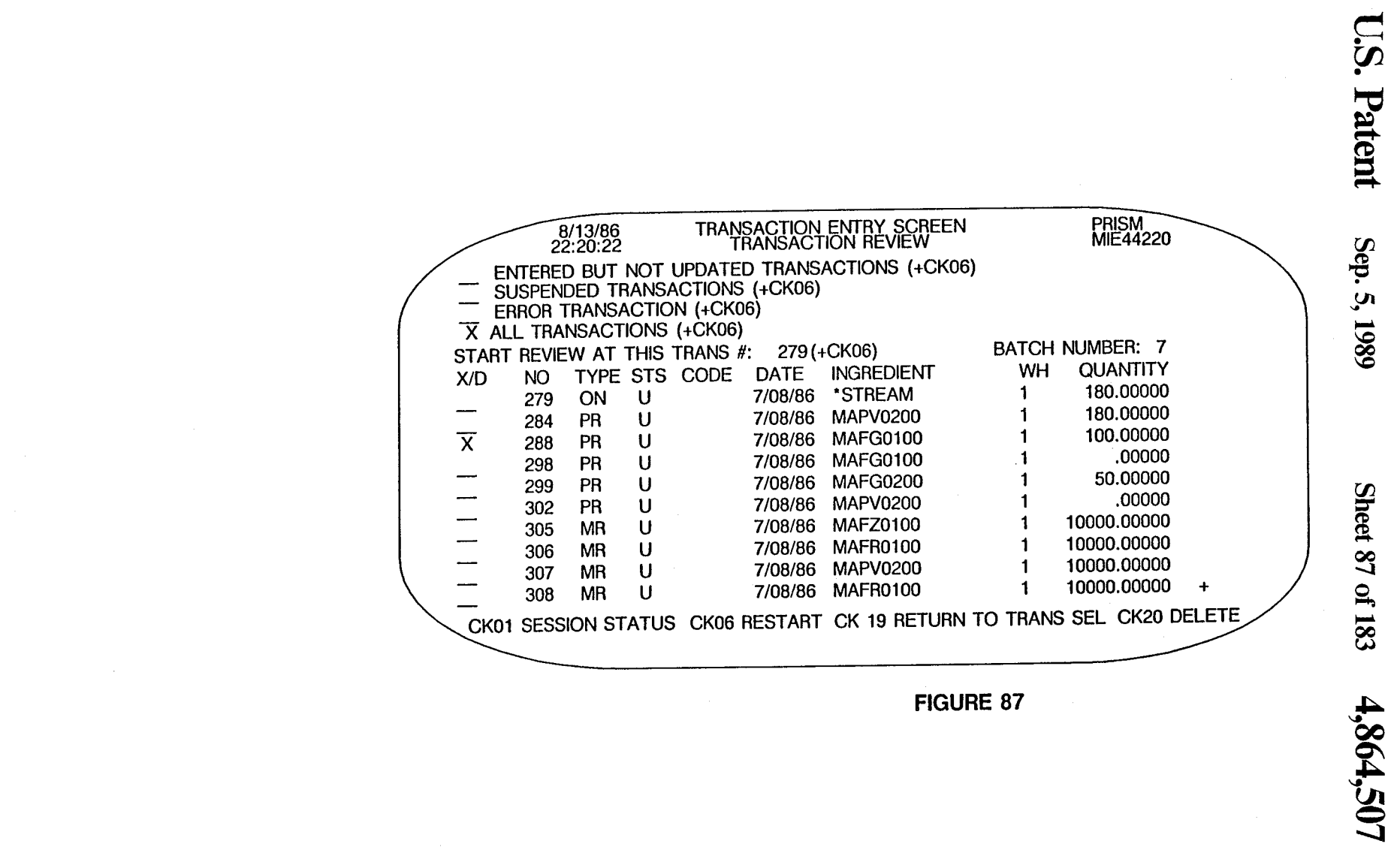

8/13/86 22:20:22 TRANSACTION ENTRY SCREEN TRANSACTION REVIEW PRISM MIE44220

_ ENTERED BUT NOT UPDATED TRANSACTIONS (+CK06)
_ SUSPENDED TRANSACTIONS (+CK06)
_ ERROR TRANSACTION (+CK06)
X ALL TRANSACTIONS (+CK06)

START REVIEW AT THIS TRANS #: 279 (+CK06) BATCH NUMBER: 7

| X/D | NO | TYPE | STS | CODE | DATE | INGREDIENT | WH | QUANTITY |
|---|---|---|---|---|---|---|---|---|
| _ | 279 | ON | U | | 7/08/86 | *STREAM | 1 | 180.00000 |
| _ | 284 | PR | U | | 7/08/86 | MAPV0200 | 1 | 180.00000 |
| X | 288 | PR | U | | 7/08/86 | MAFG0100 | 1 | 100.00000 |
| _ | 298 | PR | U | | 7/08/86 | MAFG0100 | 1 | .00000 |
| _ | 299 | PR | U | | 7/08/86 | MAFG0200 | 1 | 50.00000 |
| _ | 302 | PR | U | | 7/08/86 | MAPV0200 | 1 | .00000 |
| _ | 305 | MR | U | | 7/08/86 | MAFZ0100 | 1 | 10000.00000 |
| _ | 306 | MR | U | | 7/08/86 | MAFR0100 | 1 | 10000.00000 |
| _ | 307 | MR | U | | 7/08/86 | MAPV0200 | 1 | 10000.00000 |
| _ | 308 | MR | U | | 7/08/86 | MAFR0100 | 1 | 10000.00000 + |

CK01 SESSION STATUS CK06 RESTART CK 19 RETURN TO TRANS SEL CK20 DELETE

FIGURE 87

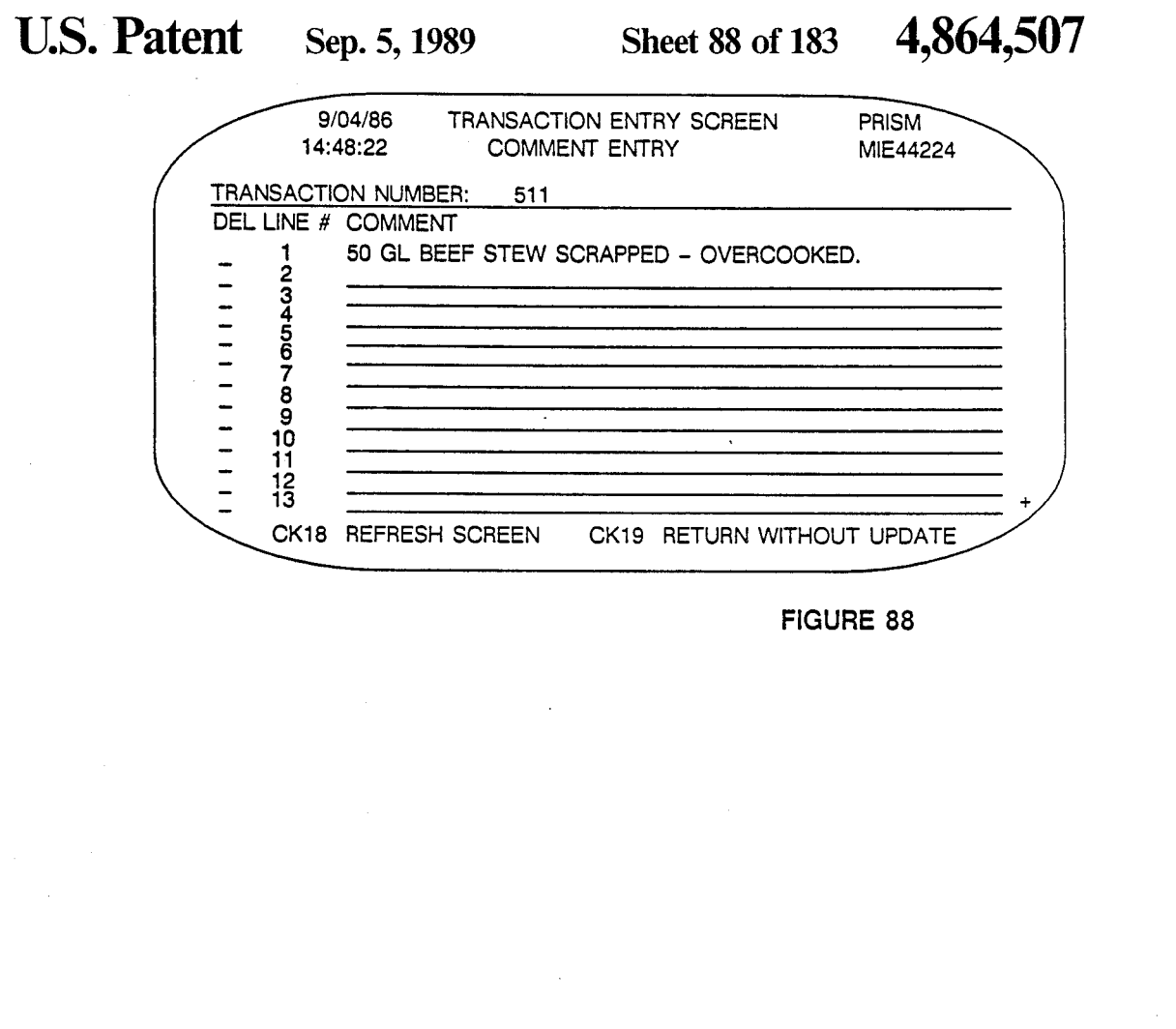

```
     9/04/86     TRANSACTION ENTRY SCREEN        PRISM
    14:48:22          COMMENT ENTRY              MIE44224

TRANSACTION NUMBER:   511
DEL LINE #  COMMENT
_     1     50 GL BEEF STEW SCRAPPED - OVERCOOKED.
_     2     ________________________________________
_     3     ________________________________________
_     4     ________________________________________
_     5     ________________________________________
_     6     ________________________________________
_     7     ________________________________________
_     8     ________________________________________
_     9     ________________________________________
_    10     ________________________________________
_    11     ________________________________________
_    12     ________________________________________
_    13     ________________________________________   +

    CK18  REFRESH SCREEN      CK19  RETURN WITHOUT UPDATE
```

FIGURE 88

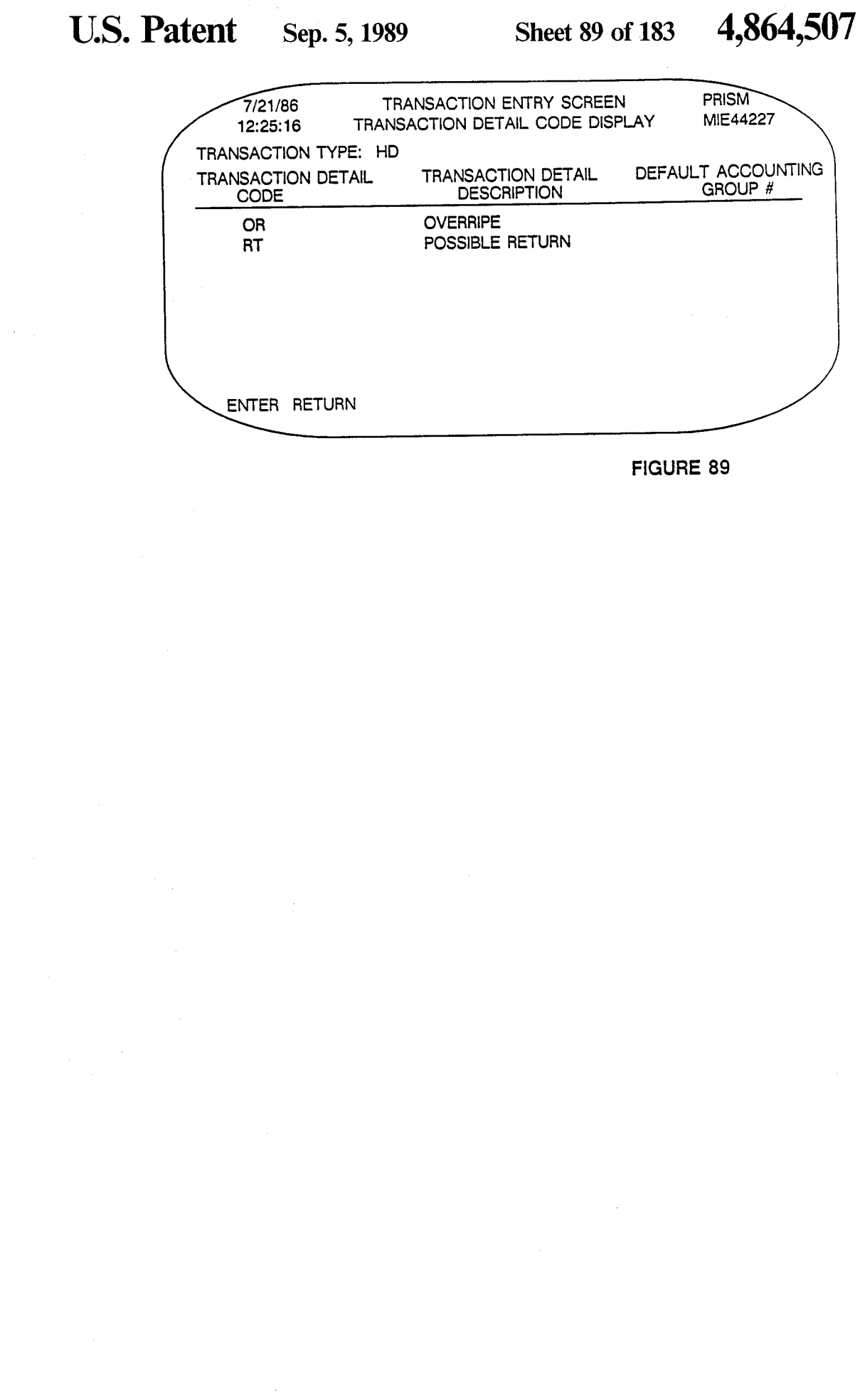

7/21/86 TRANSACTION ENTRY SCREEN PRISM
12:25:16 TRANSACTION DETAIL CODE DISPLAY MIE44227

TRANSACTION TYPE: HD

| TRANSACTION DETAIL CODE | TRANSACTION DETAIL DESCRIPTION | DEFAULT ACCOUNTING GROUP # |
|---|---|---|
| OR | OVERRIPE | |
| RT | POSSIBLE RETURN | |

ENTER RETURN

FIGURE 89

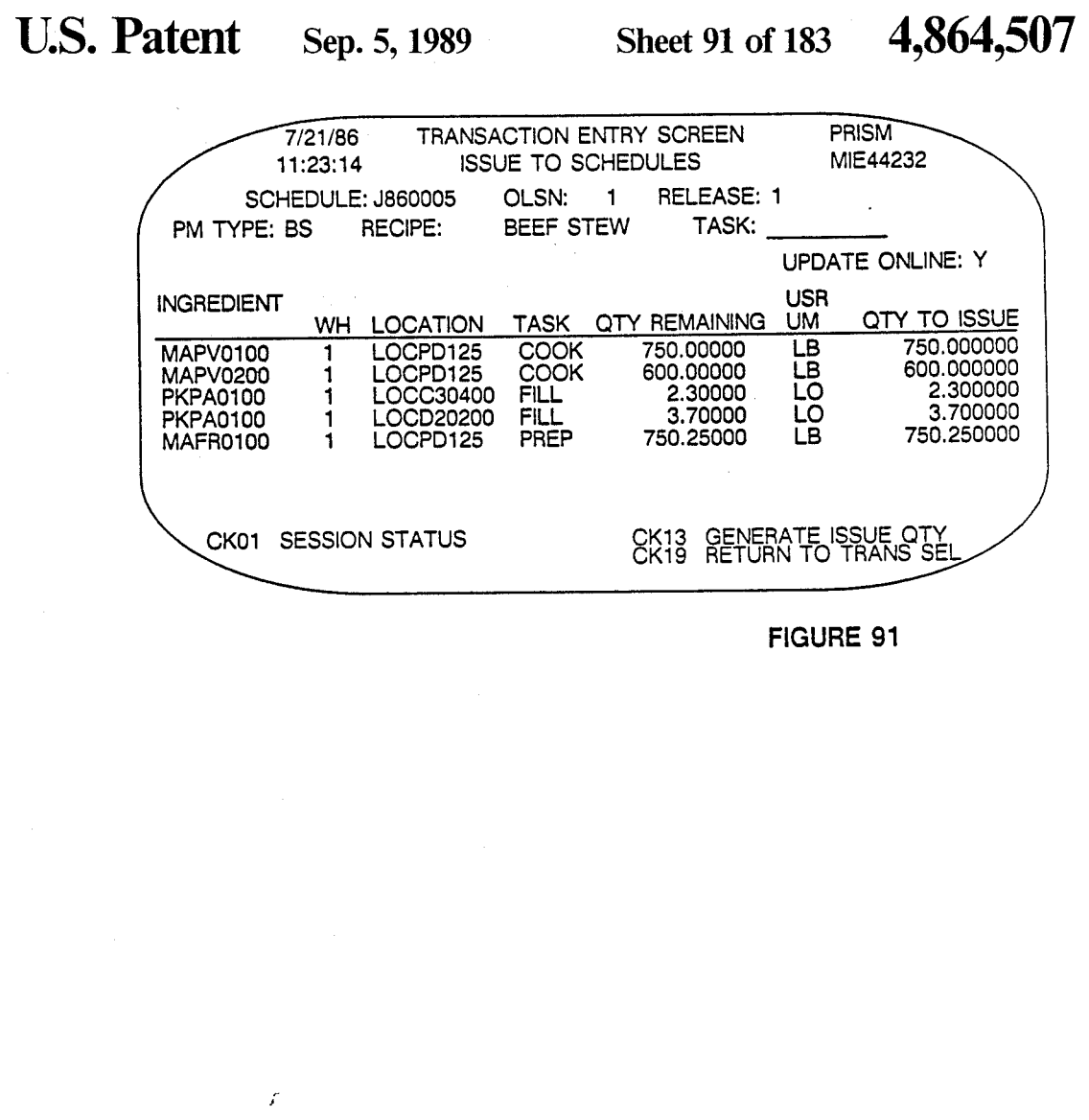

7/21/86 TRANSACTION ENTRY SCREEN PRISM
11:23:14 ISSUE TO SCHEDULES MIE44232

SCHEDULE: J860005 OLSN: 1 RELEASE: 1
PM TYPE: BS RECIPE: BEEF STEW TASK: ________

UPDATE ONLINE: Y

| INGREDIENT | WH | LOCATION | TASK | QTY REMAINING | USR UM | QTY TO ISSUE |
|---|---|---|---|---|---|---|
| MAPV0100 | 1 | LOCPD125 | COOK | 750.00000 | LB | 750.000000 |
| MAPV0200 | 1 | LOCPD125 | COOK | 600.00000 | LB | 600.000000 |
| PKPA0100 | 1 | LOCC30400 | FILL | 2.30000 | LO | 2.300000 |
| PKPA0100 | 1 | LOCD20200 | FILL | 3.70000 | LO | 3.700000 |
| MAFR0100 | 1 | LOCPD125 | PREP | 750.25000 | LB | 750.250000 |

CK01 SESSION STATUS
CK13 GENERATE ISSUE QTY
CK19 RETURN TO TRANS SEL

FIGURE 91

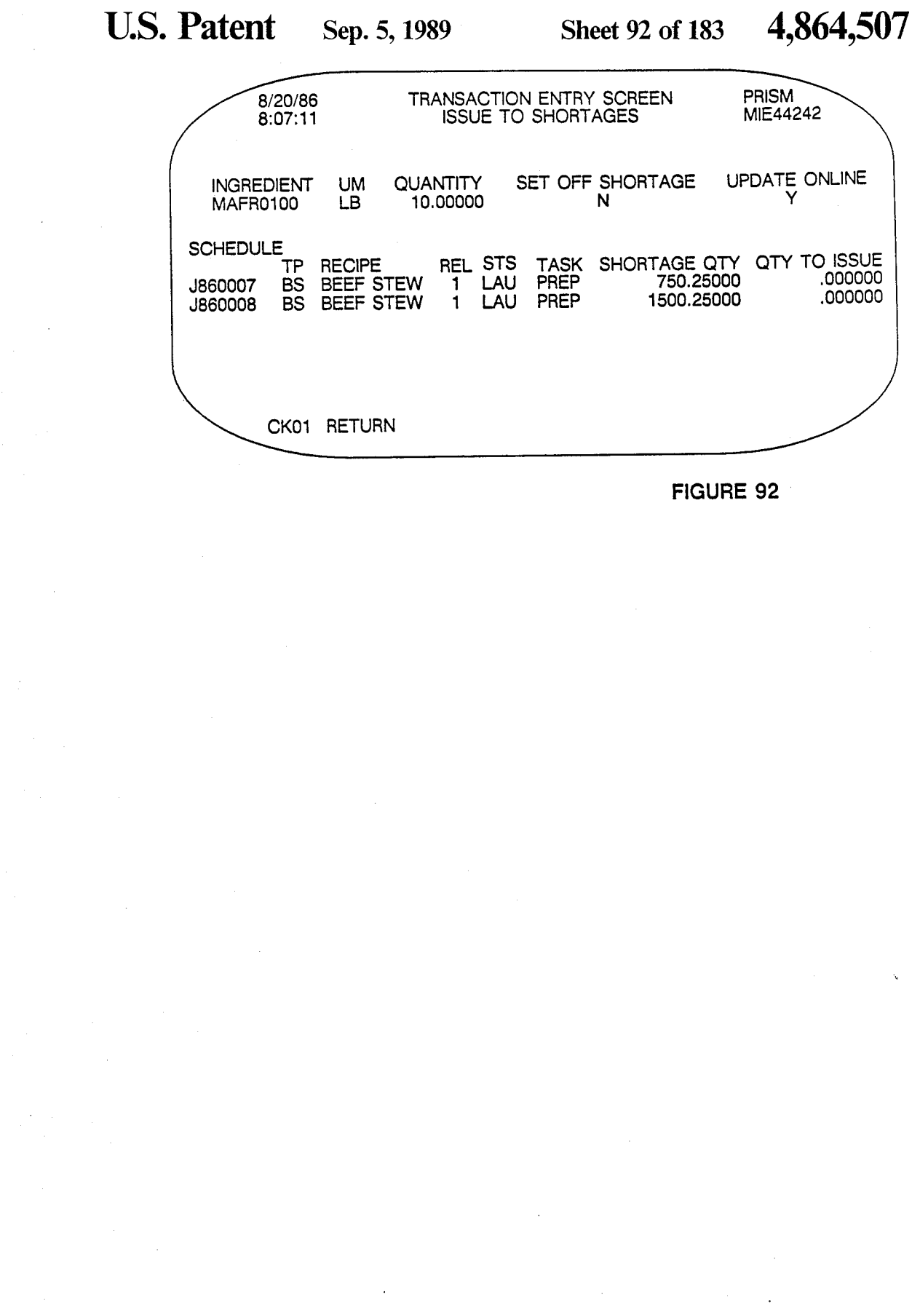

8/20/86 TRANSACTION ENTRY SCREEN PRISM
8:07:11 ISSUE TO SHORTAGES MIE44242

| INGREDIENT | UM | QUANTITY | SET OFF SHORTAGE | UPDATE ONLINE |
|---|---|---|---|---|
| MAFR0100 | LB | 10.00000 | N | Y |

| SCHEDULE | TP | RECIPE | REL | STS | TASK | SHORTAGE QTY | QTY TO ISSUE |
|---|---|---|---|---|---|---|---|
| J860007 | BS | BEEF STEW | 1 | LAU | PREP | 750.25000 | .000000 |
| J860008 | BS | BEEF STEW | 1 | LAU | PREP | 1500.25000 | .000000 |

CK01 RETURN

FIGURE 92

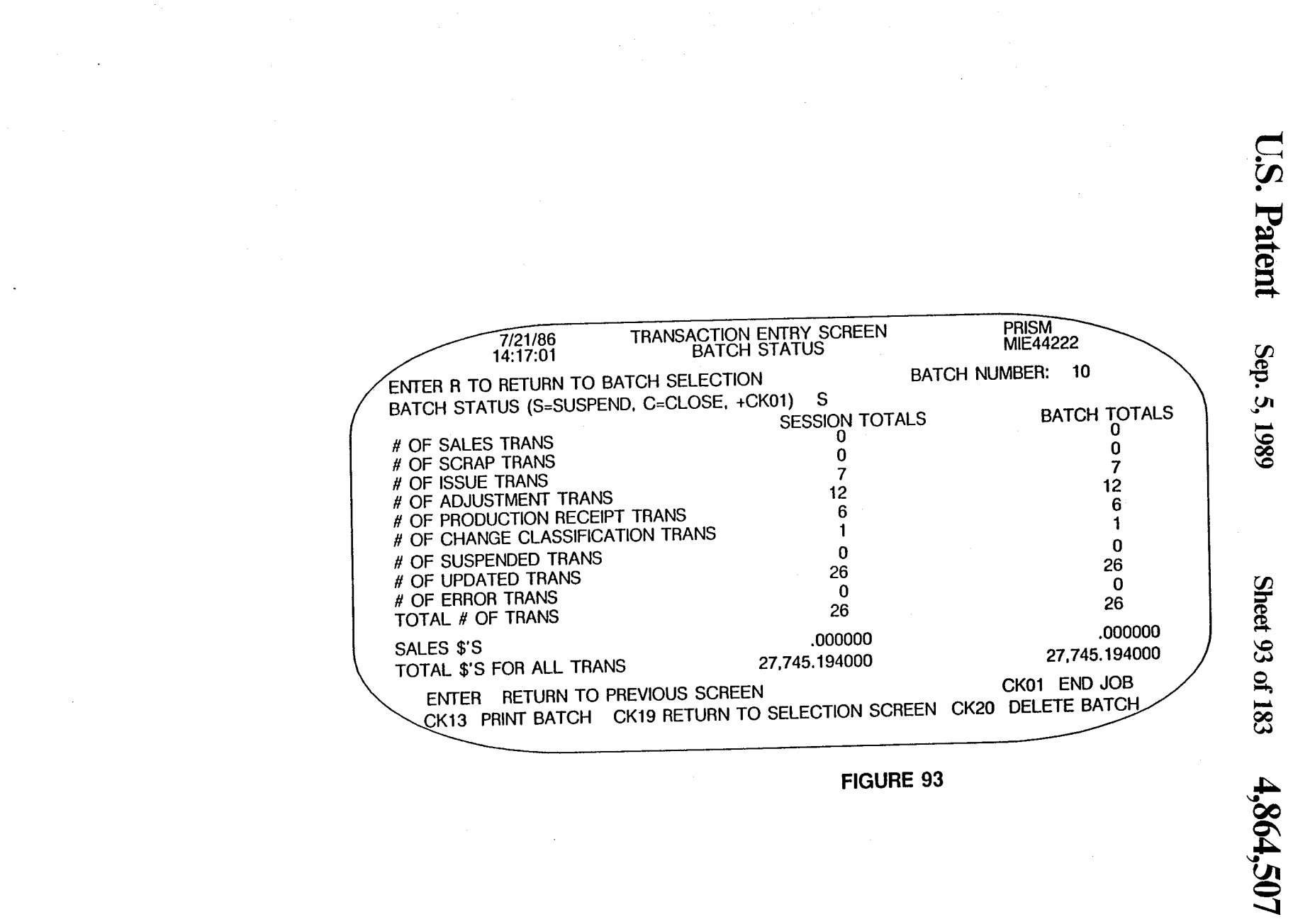

7/21/86 TRANSACTION ENTRY SCREEN PRISM
14:17:01 BATCH STATUS MIE44222

ENTER R TO RETURN TO BATCH SELECTION BATCH NUMBER: 10
BATCH STATUS (S=SUSPEND, C=CLOSE, +CK01) S

| | SESSION TOTALS | BATCH TOTALS |
|---|---|---|
| # OF SALES TRANS | 0 | 0 |
| # OF SCRAP TRANS | 0 | 0 |
| # OF ISSUE TRANS | 7 | 7 |
| # OF ADJUSTMENT TRANS | 12 | 12 |
| # OF PRODUCTION RECEIPT TRANS | 6 | 6 |
| # OF CHANGE CLASSIFICATION TRANS | 1 | 1 |
| # OF SUSPENDED TRANS | 0 | 0 |
| # OF UPDATED TRANS | 26 | 26 |
| # OF ERROR TRANS | 0 | 0 |
| TOTAL # OF TRANS | 26 | 26 |
| SALES $'S | .000000 | .000000 |
| TOTAL $'S FOR ALL TRANS | 27,745.194000 | 27,745.194000 |

ENTER RETURN TO PREVIOUS SCREEN CK01 END JOB
CK13 PRINT BATCH CK19 RETURN TO SELECTION SCREEN CK20 DELETE BATCH

FIGURE 93

8/14/86 11.22.22 PRISM TRANSACTION ENTRY BATCH UPDATE REGISTER PAGE 1 MIE442

ENTITY – STANDARD

| TRANS # | BATCH | TRANS TYPE | DATE | INGREDIENT | WHSE | UM | QUANTITY | | STATUS | |
|---|---|---|---|---|---|---|---|---|---|---|
| 335 [1] | 9 [2] | II [3] | 7/08/86 [4] | MAFR0200 [5] | 1 [6] | LB | 1000.00000 [8] | * | ALREADY UPDATED | * [9] |
| 336 | 9 | II | 7/08/86 | MAMS0200 | A | LB [7] | 100.00000 | * | ALREADY UPDATED | * |
| 337 | 9 | II | 7/08/86 | MAFR0100 | A | LB | 1000.00000 | * | ALREADY UPDATED | * |
| 338 | 9 | II | 7/08/86 | PKMT0100 | 1 | LO | 1000.00000 | * | ALREADY UPDATED | * |
| 339 | 9 | II | 7/08/86 | MAFR0300 | 2 | LB | 7000.00000 | * | ALREADY UPDATED | * |
| 425 | 9 | MR | 7/25/86 | MAFR0100 | 1 | LB | 1000.00000 | * | ALREADY UPDATED | * |
| 514 | 9 | TR | 8/14/86 | MAFR0100 | B | CA | .00000 | * | UPDATED | * |
| 515 | 9 | TR | 8/14/86 | MAFG0100 | B | CA | .00000 | * | SUSPENDED | * |
| 517 | 9 | RC | 8/14/86 | MAFZ0100 | A | LB | .00000 | * | UPDATED | * |

TOTAL # OF TRANSACTIONS = 9 [10]

*** END OF REPORT ***

FIGURE 94A

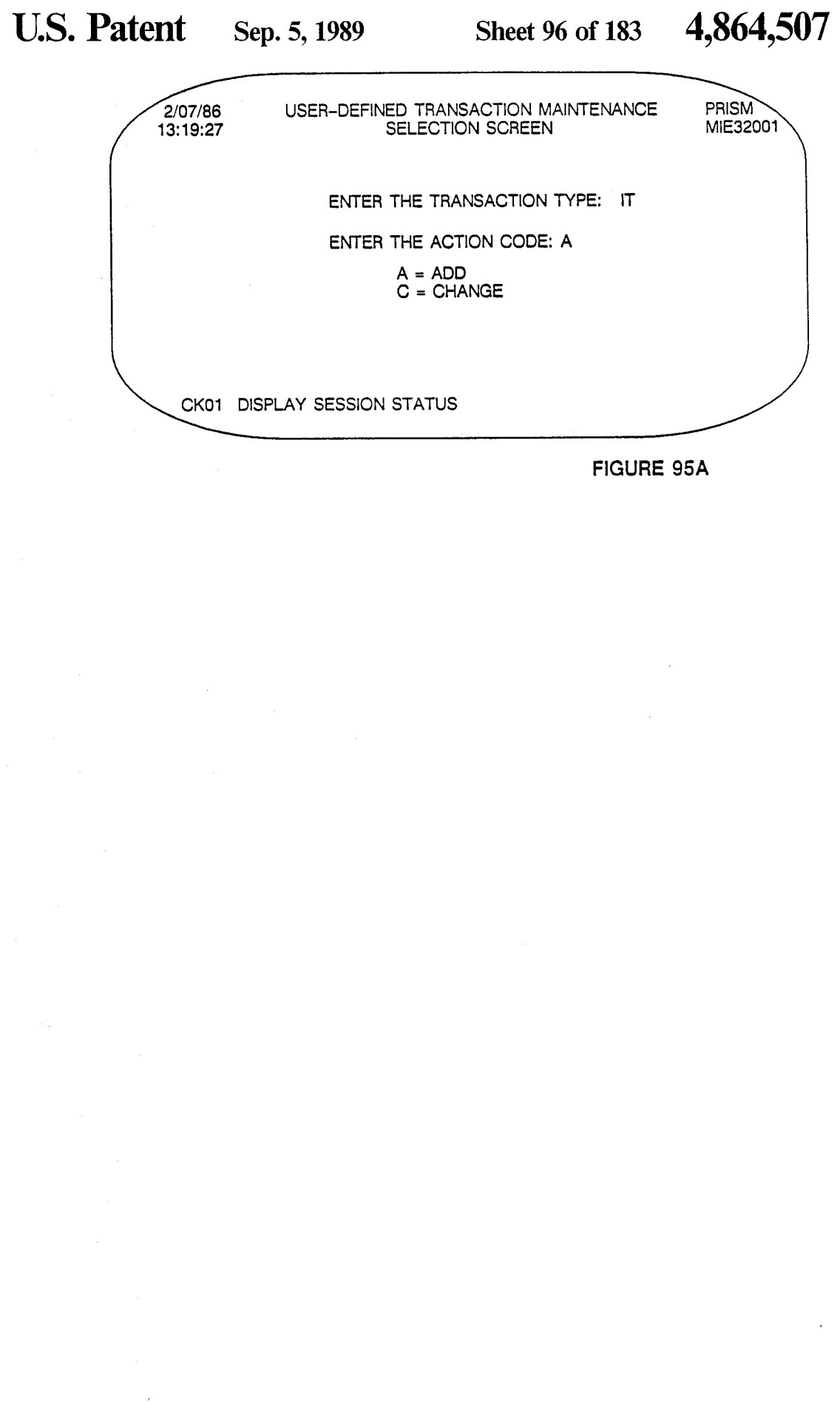

2/07/86 USER-DEFINED TRANSACTION MAINTENANCE PRISM
13:19:27 SELECTION SCREEN MIE32001

ENTER THE TRANSACTION TYPE: IT

ENTER THE ACTION CODE: A

A = ADD
C = CHANGE

CK01 DISPLAY SESSION STATUS

FIGURE 95A

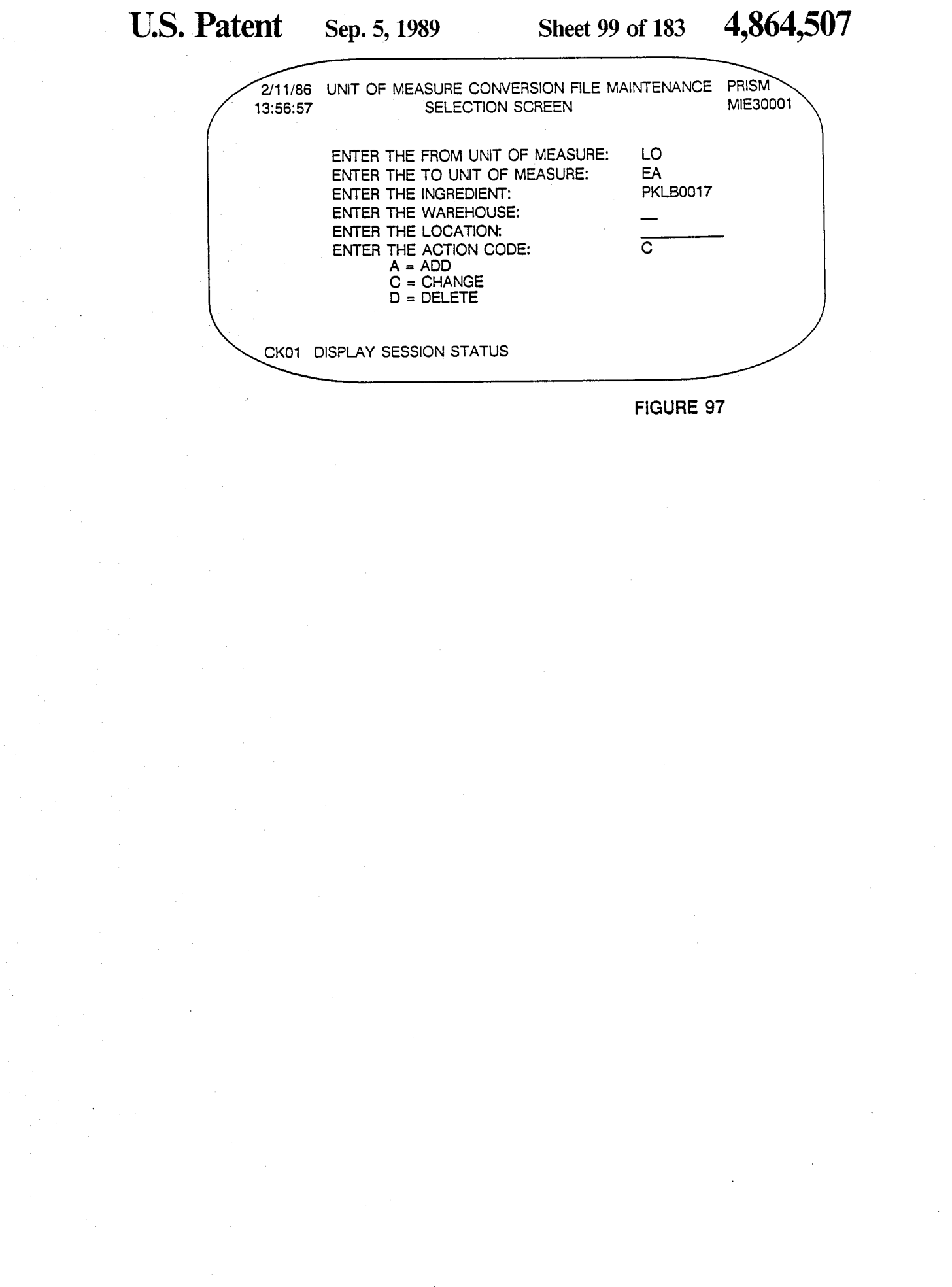

```
2/11/86  UNIT OF MEASURE CONVERSION FILE MAINTENANCE  PRISM
13:56:57            SELECTION SCREEN                  MIE30001

          ENTER THE FROM UNIT OF MEASURE:   LO
          ENTER THE TO UNIT OF MEASURE:     EA
          ENTER THE INGREDIENT:             PKLB0017
          ENTER THE WAREHOUSE:              __
          ENTER THE LOCATION:               __________
          ENTER THE ACTION CODE:            C
                 A = ADD
                 C = CHANGE
                 D = DELETE

CK01  DISPLAY SESSION STATUS
```

FIGURE 97

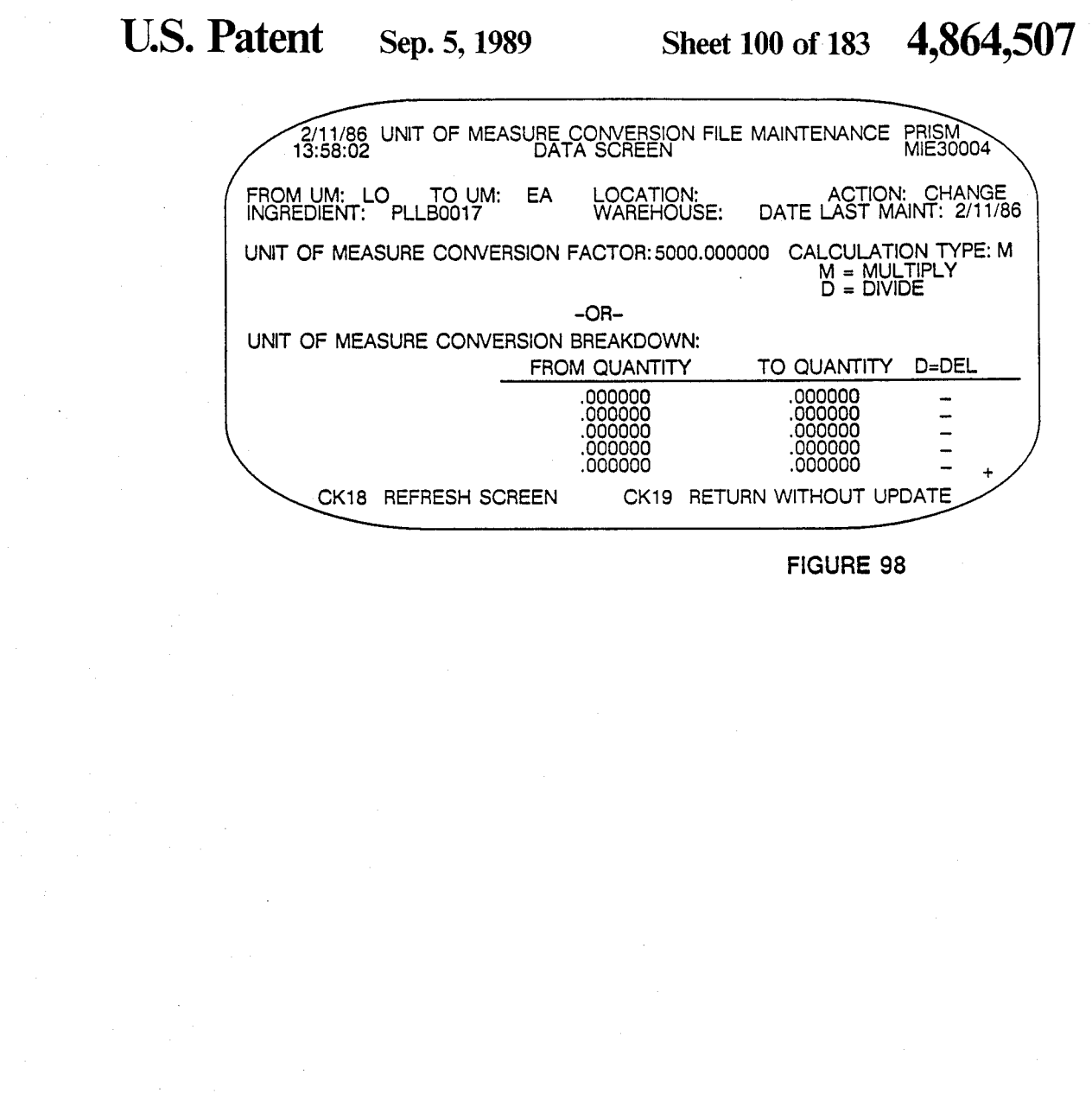

2/11/86 UNIT OF MEASURE CONVERSION FILE MAINTENANCE PRISM
13:58:02 DATA SCREEN MIE30004

FROM UM: LO TO UM: EA LOCATION: ACTION: CHANGE
INGREDIENT: PLLB0017 WAREHOUSE: DATE LAST MAINT: 2/11/86

UNIT OF MEASURE CONVERSION FACTOR: 5000.000000 CALCULATION TYPE: M
M = MULTIPLY
D = DIVIDE

-OR-

UNIT OF MEASURE CONVERSION BREAKDOWN:

| FROM QUANTITY | TO QUANTITY | D=DEL |
|---|---|---|
| .000000 | .000000 | _ |
| .000000 | .000000 | _ |
| .000000 | .000000 | _ |
| .000000 | .000000 | _ |
| .000000 | .000000 | _ |

CK18 REFRESH SCREEN CK19 RETURN WITHOUT UPDATE

FIGURE 98

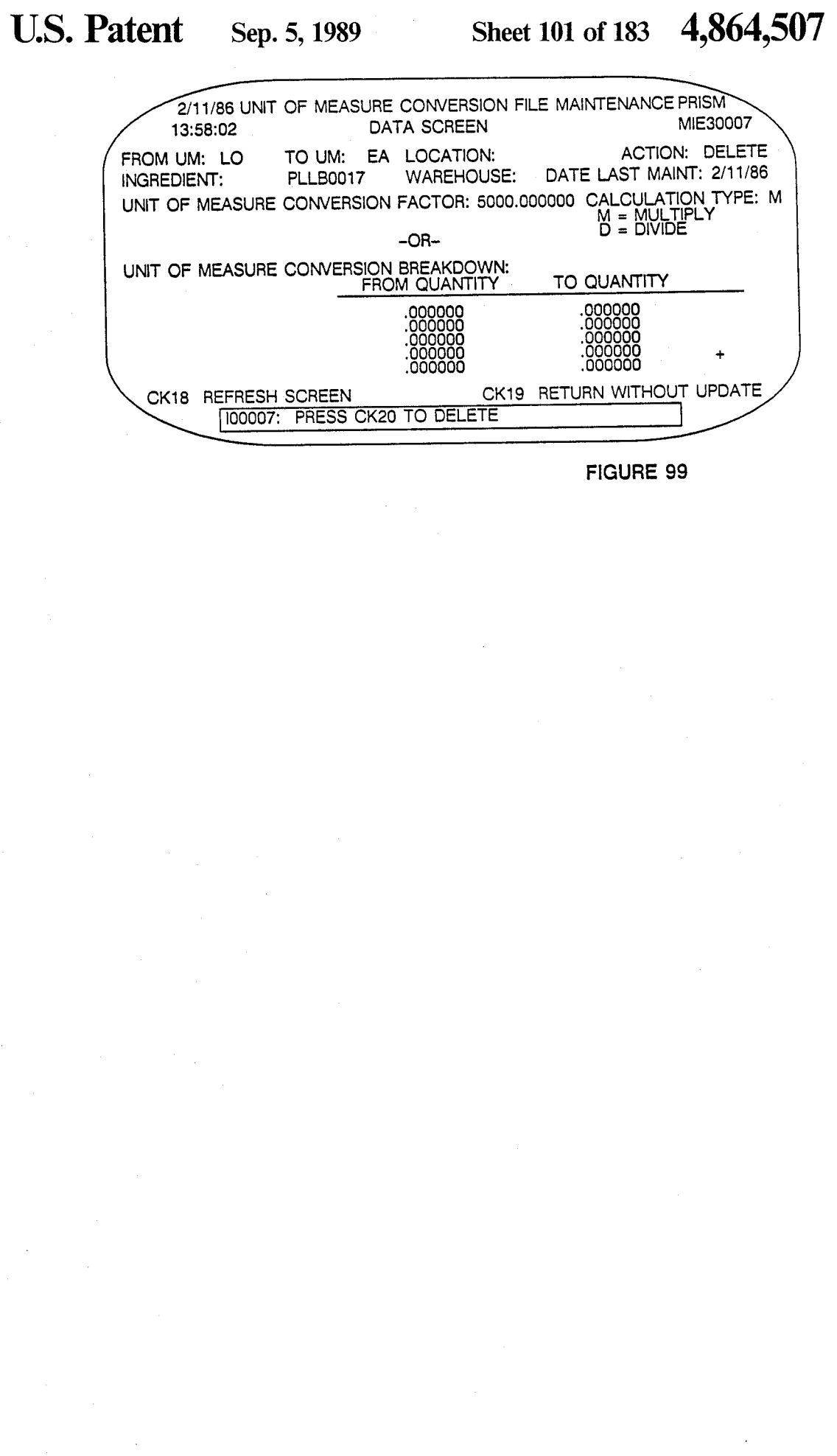

```
2/11/86 UNIT OF MEASURE CONVERSION FILE MAINTENANCE PRISM
13:58:02                    DATA SCREEN                     MIE30007

FROM UM:  LO      TO UM:   EA  LOCATION:                ACTION:  DELETE
INGREDIENT:       PLLB0017     WAREHOUSE:    DATE LAST MAINT: 2/11/86
UNIT OF MEASURE CONVERSION FACTOR: 5000.000000  CALCULATION TYPE: M
                                                  M = MULTIPLY
                                                  D = DIVIDE
                                 -OR-
UNIT OF MEASURE CONVERSION BREAKDOWN:
                              FROM QUANTITY       TO QUANTITY
                                 .000000           .000000
                                 .000000           .000000
                                 .000000           .000000
                                 .000000           .000000       +
                                 .000000           .000000

  CK18  REFRESH SCREEN                CK19  RETURN WITHOUT UPDATE
       I00007:  PRESS CK20 TO DELETE
```

FIGURE 99

MDE040X
PRODUCTION MODEL FILE MAINTENANCE PROCEDURE

MDE040X
PRODUCTION MODEL FILE MAINTENANCE PROCEDURE (CONTINUED)

MDL060X
PRODUCTION MODEL FILE LIST PROCEDURE

MDL060X
PRODUCTION MODEL FILE LIST PROCEDURE
(CONTINUED)

MDL060XJ
PRODUCTION MODEL FILE LIST JOB QUEUE PROCEDURE

MDL060XJ
PRODUCTION MODEL FILE LIST JOB QUEUE PROCEDURE
(CONTINUED)

MDL080X
PRODUCTION MODEL TASK MASTER FILE LIST PROCEDURE

MDL080X

PRODUCTION MODEL TASK MASTER FILE LIST PROCEDURE (CONTINUED)

MDL080XJ
PRODUCTION MODEL TASK FILE LIST JOB QUEUE PROCEDURE

MDL080XJ
PRODUCTION MODEL TASK FILE LIST JOB QUEUE PROCEDURE (CONTINUED)

MDL100XJ
PRODUCTION MODEL RESOURCE FILE LIST JOB QUEUE PROCEDURE

MDL100X
PRODUCTION MODEL RESOURCE FILE LIST PROCEDURE

MDL100X
PRODUCTION MODEL RESOURCE FILE LIST PROCEDURE (CONTINUED)

MDL100XJ
PRODUCTION MODEL RESOURCE FILE LIST PROCEDURE (CONTINUED)

MDL120X
PRODUCTION MODEL OPERATION FILE LIST PROCEDURE

MDL120X
PRODUCTION MODEL OPERATION FILE LIST PROCEDURE
(CONTINUED)

MDL120XJ
PRODUCTION MODEL OPERATION FILE LIST JOB QUEUE PROCEDURE

MDL120XJ
PRODUCTION MODEL OPERATION FILE LIST JOB QUEUE PROCEDURE (CONTINUED)

MDL060X
PRODUCTION MODEL FILE LIST PROCEDURE

MDL060XJ

PRODUCTION MODEL FILE LIST JOB QUEUE PROCEDURE

MDL060XJ
PRODUCTION MODEL FILE LIST JOB QUEUE PROCEDURE
(CONTINUED)

MDL080X
PRODUCTION MODEL TASK MASTER FILE LIST PROCEDURE

MDL080X
PRODUCTION MODEL TASK MASTER FILE LIST PROCEDURE (CONTINUED)

MDL080XJ
PRODUCTION MODEL TASK FILE LIST JOB QUEUE PROCEDURE (CONTINUED)

MDL100X
PRODUCTION MODEL RESOURCE FILE LIST PROCEDURE

MDL100X
PRODUCTION MODEL RESOURCE FILE LIST PROCEDURE (CONTINUED)

MDL100XJ
PRODUCTION MODEL RESOURCE FILE LIST JOB QUEUE PROCEDURE

MDL100XJ
PRODUCTION MODEL RESOURCE FILE LIST JOB QUEUE PROCEDURE (CONTINUED)

MDL120X
PRODUCTION MODEL OPERATION FILE LIST PROCEDURE

MDL120X
PRODUCTION MODEL OPERATION FILE LIST PROCEDURE
(CONTINUED)

MDL120XJ
PRODUCTION MODEL OPERATION FILE LIST JOB QUEUE PROCEDURE

MDL120XJ
PRODUCTION MODEL OPERATION FILE LIST JOB QUEUE PROCEDURE (CONTINUED)

MIR300X

SCHEDULE STATUS PRODUCTION REPORT PROCEDURE

MIR300X
SCHEDULE STATUS PRODUCTION REPORT PROCEDURE
(CONTINUED)

MIR300XJ
SCHEDULE STATUS PRODUCTION REPORT JOB QUEUE PROCEDURE

MIR300XJ
SCHEDULE STATUS PRODUCTION REPORT JOB QUEUE PROCEDURE (CONTINUED)

MIR320X
RESOURCE NEEDS REPORT PROCEDURE

MIR320X
RESOURCE NEEDS REPORT PROCEDURE (CONTINUED)

MIR320XJ
RESOURCE NEEDS REPORT JOB QUEUE PROCEDURE

MIR320XJ
RESOURCE NEEDS REPORT JOB QUEUE PROCEDURE
(CONTINUED)

MIR340X
ALLOCATION/RESERVATION REPORT PROCEDURE
(CONTINUED)

MIR340XJ
ALLOCATION/RESERVATION REPORT JOB QUEUE PROCEDURE

MIR340XJ
ALLOCATION/RESERVATION REPORT JOB QUEUE PROCEDURE (CONTINUED)

MIR360X
ORIGINAL PICK LIST REPORT PROCEDURE

MIR360X
ORIGINAL PICK LIST REPORT PROCEDURE (CONTINUED)

MIR360XJ
ORIGINAL PICK LIST REPORT JOB QUEUE PROCEDURE

MIR360XJ
ORIGINAL PICK LIST REPORT JOB QUEUE PROCEDURE
(CONTINUED)

MIR362X
PICK LIST REPRINT PROCEDURE

MIR362X
PICK LIST REPRINT PROCEDURE (CONTINUED)

MIR362XJ
PICK LIST REPRINT JOB QUEUE PROCEDURE

MIR480X
RESERVATION REPORT PROCEDURE (CONTINUED)

MIR480XJ
RESERVATION REPORT JOB QUEUE PROCEDURE

MIR480XJ
RESERVATION REPORT JOB QUEUE PROCEDURE (CONTINUED)

MIR520XJ
INDIRECT MEASUREMENT REPORT JOB QUEUE PROCEDURE (CONTINUED)

MIR540X
SCHEDULE SHORTAGE REPORT PROCEDURE

MIR540X
SCHEDULE SHORTAGE REPORT PROCEDURE
(CONTINUED)

MIR540XJ
SCHEDULE SHORTAGE REPORT JOB QUEUE PROCEDURE

MIR540XJ
SCHEDULE SHORTAGE REPORT JOB QUEUE PROCEDURE (CONTINUED)

MIU180X
SCHEDULE LAUNCH PROCEDURE (CONTINUED)

MIU180XJ
SCHEDULE LAUNCH JOB QUEUE PROCEDURE

MIU180XJ
SCHEDULE LAUNCH JOB QUEUE PROCEDURE (CONTINUED)

MIU180XJ
SCHEDULE LAUNCH JOB QUEUE PROCEDURE
(CONTINUED)

MIU180XJ
SCHEDULE LAUNCH JOB QUEUE PROCEDURE
(CONTINUED)

MIU180XJ
SCHEDULE LAUNCH JOB QUEUE PROCEDURE
(CONTINUED)

MIU182X
DELETE/RECREATE RESERVATIONS PROCEDURE

MIU182X
DELETE/RECREATE RESERVATIONS PROCEDURE
(CONTINUED)

MDR020X

COST ROLLUP REPORT PROCEDURE (CONTINUED)

MDR020XJ
COST ROLLUP PRINT PROGRAM (ACTUAL ROLLUP) JOB QUEUE PROCEDURE

MDR020XJ
(ACTUAL) COST ROLLUP PRINT PROGRAM JOB QUEUE PROCEDURE (CONTINUED)

MDR020XJ
(ACTUAL) COST ROLLUP PRINT PROGRAM JOB QUEUE PROCEDURE (CONTINUED)

MDR022X
COST ROLLUP PRINT PROGRAM PROCEDURE

MDR022X

COST ROLLUP PRINT PROGRAM PROCEDURE (CONTINUED)

MDR022XJ
(SIMULATED) COST ROLLUP PRINT PROGRAM JOB QUEUE PROCEDURE

MDR022XJ
(SIMULATED) COST ROLLUP PRINT PROGRAM
JOB QUEUE PROCEDURE (CONT'D)

MDR022XJ
(SIMULATED) COST ROLLUP PRINT PROGRAM JOB QUEUE PROCEDURE (CONT'D)

MDR022XJ
(SIMULATED) COST ROLLUP PRINT PROGRAM JOB QUEUE PROCEDURE (CONT'D)

MDE060X
PRODUCTION MODEL TYPE FILE MAINTENANCE PROCEDURE

MIE320X
USER-DEFINED TRANSACTION FILE MAINTENANCE PROCEDURE

METHOD AND APPARATUS FOR PROCESS MANUFACTURE CONTROL

BACKGROUND

The invention relates to computer aided material requirements planning and, more particularly, to digital data processing systems for monitoring and controlling manufacturing processes.

The art has only introduced digital data processing systems for aiding manufacturers in supervising and directing the production of goods. International Business Machines, Inc., for example, markets the MAPICS and COPICS systems for simulating, to a limited extent, discrete manufacturing processes. These systems are understood to operate by constructing models of the manufacturing process based upon the traditional bill of material and related routing concepts. Similar discrete manufacturing simulation and modeling systems are marketed by Arthur Anderson, PCR, and SSA.

In the modeling of bills of material, designers of the prior art material requirements planning (or "MRP") systems attempt to represent relations between produced goods and consumed articles on one-to-one or one-to-many bases. That is, the designs base their systems upon models in which users may define relationships such that a single produced good may relate to one consumed article (i.e., "one-to-one" relationship) or, alternatively, to plural consumed articles. (i.e., a "one-to-many" relationship).

These sorts of relationships are readily visualized in a simplistic model of motorcycle manufacture. Here, a single produced good, a motor bike, may be assembled by combining multiple component sub-assemblies, e.g., a power assembly and a running assembly. These sub-assemblies, in turn, may be constructed from their own component sub-assemblies. For example, the power assembly may be constructed from an engine and a power train. While, the engine itself may be assembled from a housing containing a fuel-air system, an ignition system, a feedback system, and a lubrication system.

The second aspect of prior art CAM systems calls for the independent modeling of materials routing slips. In this aspect, the prior systems characterize movement of individual sub-assemblies from location to location, independent of those relations which may be represented by the corresponding bill of materials model. Thus, a routing slip model for the construction of a motorbike may represent the necessity of having two particular components, e.g., the exhaust manifold and handlebars, available at the start of the assembly process, even where, in reality, these parts are needed at different times of the manufacturing process.

A drawback of the prior art techniques resides in their inability to model the full range of manufacturing processes. Although specifically designed to aid in the production of discrete manufactures, e.g., motorbikes, telephones, etc., the systems fail to provide mechanisms permitting modeling of more than the most rudimentary aspects of such production. Moreover, with respect to the production of repetitive and process manufactures, e.g., petrochemicals, foods, etc., the prior art techniques prove almost wholly inapplicable. As discussed below, the prior art techniques are unable to model with any degree of reliability the operation of manufacturing processes of the type represented, for example, by a petroleum refinery, where a single consumed resource, crude oil, is used to produce a plurality of petrochemical products and by-products.

An object of this invention, therefore, is to provide an improved system for manufacturing requirements planning.

More particularly, an object of the invention is to provide a digital data processing system permitting the monitoring and control of process and repetitive manufactures, as well as discrete manufactures.

Another object of the invention is to provide a digital data processing system capable of accurately modeling and simulating the aforementioned manufacturing processes and to provide accurate scheduling, cost accounting, and reporting facilities.

These and other objects of the invention are apparent in the description which follows.

SUMMARY

The aforementioned and other objects are attained by the invention, which provides digital data processing methods and apparatus for the control of process, repetitive, and discrete manufacturing. The system provides greater control of the manufacturing process through the use of several innovative modeling and reporting mechanisms. Among these, the unique capability to represent relationships between resource elements, including both produced and consumed resources, on one-to-one, one-to-many, many-to-one, and many-to-many bases.

As noted above, discrete manufacturing methods can sometimes be modeled, albeit with only a limited degree of accuracy, in such a manner that each produced item stands in a one-to-many relationship with its component sub-assemblies. Thus, drawing from the previous example, a model representing the manufacture of a motorcycle engine may include elements representing that the engine comprises fuel-air, ignition, feedback and lubrication sub-assemblies.

A digital data processing system constructed according to the invention includes the capability to model such an assembly process, while providing the further capability to model those manufacturing processes having many-to-one and many-to-many relations. This capability has proven highly effective in modeling repetitive and process manufactures. A full appreciation of this capability may be understood with reference to the operation of a crude oil refinery.

At least on a basic level, an oil refinery may be viewed as a manufacturing station in which a single consumed resource, crude oil, is processed in such a way as to yield a multitude of final products, including gasoline, motor oil, and a variety of other petrochemical compounds. The relationship between produced goods (gasoline, motor oil, etc.) and the consumed good (crude oil) is referred to as a many-to-one relationship.

Upon more thorough consideration, it is seen that the operation of an oil refinery is amenable to even more precise representation using a model supporting many-to-many relationships. Indeed, a wide variety resources are consumed in the production of the refinery's petrochemical product line. These consumed resources include crude oil, catalysts, labor, transportation resources, and utilities, among others. Still further scrutiny reveals the existence of a number of complex interrelationships between various refinery production lines, e.g., light hydrocarbons fractured from the crude in early stages of manufacture may be burned to provide energy for use in later stages of manufacture.

The invention described herein permits representation of these complex relationships through use of a modeling mechanism which supports many-to-one and many-to-many relationships, as well as the conventional one-to-one and one-to-many relationships.

With this view, the invention provides, in one aspect, a digital data processing apparatus which includes a first input element for inputting digital signals representative of one or more resource elements consumed in a manufacturing process. A second input element accepts digital signals representative of one or more resource elements produced during that process, while a third input element accepts input digital signals representative of manufacturing relations between the consumed an produced resources.

As used herein, a resource is defined as any element with positive or negative value which is required, consumed, or used during a manufacturing process, or which results from, or is produced by, such a process. Examples of resources include materials (e.g., sheet metal, crude oil, etc.), machine hours, labor, utilities, waste, storage space, and tooling.

In a system constructed in accord with the invention, manufacturing relations define how resource elements, both consumed and produced, relate at the operational, planning, and financial levels. For example, in the processing potatoes for use in beef stew, the consumed resources may include whole potatoes, dicing machinery and machine operator time. Here, an operational relation can be established to indicate that in one hour's time the machine operator can dice 10 pounds of potatoes on the dicing machine. From a planning perspective, a relation can be established to indicate that in order to fully utilize the dicing machine during an otherwise unscheduled four hour period, the operator must be free to supervise or run the dicing operation.

A digital data processing apparatus of the type described above further includes a production modeling element for generating and storing a production model comprising digital signals representative of manufacturing relations. The production model stores, in digital form, signals defining a production operation, e.g., the making of beef stew, as well as signals defining resources consumed and produced in that operation. As noted above, the invention provides the unique capability to represent relationships between the produced and consumed resources on one-to-one, one-to-many, many-to-one, and many-to-many bases.

The aforementioned data processing system further includes an output element for generating output signals representative of at least selected portions of the manufacturing process. Those selected portions might include, for example, cost reports reflecting the expected cost of a production run represented by the model, production schedules reflecting time tables for availability of consumed or produced resources, or inventory tracking reports indicating the location and condition of lots or batches of inventory.

In another aspect, the invention provides a digital data processing apparatus of the type described above in which the third input element includes a task-defining element for accepting input digital signals representative of one or more of the tasks performed during the manufacturing process by the represented model. According to this aspect of the invention, the production modeling element includes a task-storing element responsive to the task-representative signal for generating and storing digital signals reflecting how the task affects resource consumption and production.

More particularly, the task-storing element generates and stores digital signals representing, with respect to each task, one or more of the following types of information: (i) one or more resource elements consumed during execution of the task, (ii) one or more resource elements produced during execution of the task, (iii) one or more production operations performed during the course of the associated task, and (iv) manufacturing relations between the associated task and zero, one, or more other tasks.

In another aspect, the invention contemplates a digital data processing apparatus of the type described above in which there is provided an input element for accepting a digital signal representative of an amount of one or more resource elements produced by the manufacturing process. According to this aspect, a theoretical consumption element generates a digital signal representative of an amount of one or more resource elements that would have to be consumed during the course of the manufacturing process in order to produce the designated amount of the produced resource. For example, in the production of beef stew, a report reflecting the output of 100 cases of stew, would result in the generation of a signal reflecting that 2400 cans were consumed in the packaging of that stew.

A related aspect of the invention provides a theoretical production element which responds to a signal representative of an amount of a first resource produced by the manufacturing process to generate a digital signal representative of an amount of one or more related resource elements produced during the same production run. For example, in the production of chicken parts, a report reflecting the output of 600 legs, would result in the generation of a signal reflecting the output of three pounds of feathers as a byproduct of the production of those legs.

In another aspect, the invention provides a digital data processing apparatus as described above in which the third input element includes input elements for accepting digital signals representative of temporal or volumetric output of a production run, as well as that of a task associated with the run. A further input element is provided for accepting a conversion factor representing a mathematical relationship between the task and production run output quantities. A task batch is provided for generating a digital signal representative of the number of the task batches required in order to complete the production run. Use of the task batch element facilitates machine operator activity during production runs by eliminating the need to perform constant re-calculations to determine appropriate batch production.

According to another aspect of the invention, a digital data processing apparatus having features of the type described above can include a resource element for generating and storing digital signals representative of a production characteristic associated with at least one resource element in the production model. The production characteristics relate to financial, operational, planning, and tracking aspects of the resource.

By way of example, the system permits resources to be tagged as "balance" or "non-balance"; wherein, a balance resource is one whose on-hand quantity is increased or decreased by use, e.g., sheet metal, screws, or other physical material. A non-balance resource, on the other hand, is one which requires measurement from period to period, but which does not require a balance on hand, e.g., electricity, machine hours, and labor. Other characteristics may include inventory classifications, e.g., "on hand," "on order," and "work in progress," as well as quality assurance classifications "QC hold," "restricted use," or "quarantine," among others.

According to yet another aspect of the invention, a computer aided material requirements planning system of the type described above can include a transaction element for modifying digital signals representative of one or more production characteristics associated with a physical occurrence of a resource element. Use of the transaction element enables the system to note the existence of, and track changes in, those occurrences. For example, when a shipment of a resource, e.g., potatoes, arrives at the processing plant, the transaction element is actuated to record to arrival of the shipment. Later, e.g., when the potatoes are moved, diced, quarantined, or otherwise processed, the transaction element can again be actuated to record the nature of the processing activity. In this regard, a physical occurrence of a resource element is defined as the actual or simulated existence of a physical embodiment or amount of those resources. Typically, of course, a physical occurrence of a resource represents a shipment or lot of the resource.

In another aspect, the invention contemplates features for tracking physical occurrences of resource elements, along with identifying quantities of those resources on hand or required for use in production.

Further aspects of the invention provide methods for operating a digital data processing apparatus of the type described above. The aforementioned and other aspects of the invention are evident in the attached illustrations and detailed description which follows.

BRIEF DESCRIPTION OF THE ILLUSTRATED EMBODIMENT

A more complete understanding of the invention may be attained by reference to the drawings, in which:

FIGS. 5-99 depict input screens, processing reports, and other graphic displays produced during operation of a computer aided resource planning system constructed in accord with the invention.

DETAILED DESCRIPTION OF THE ILLUSTRATED EMBODIMENT

Figure 1:
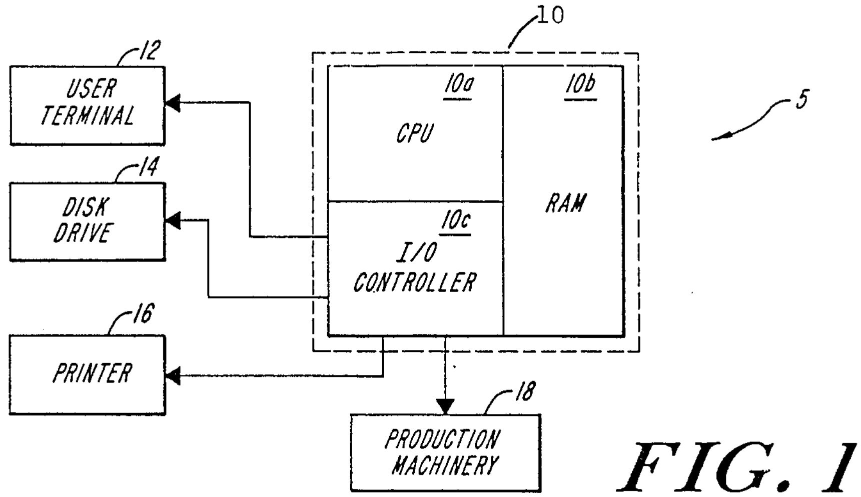
FIG. 1 depicts a digital data processing apparatus of the type used to practice the invention.

FIG. 1 depicts a digital data processing system 5 of the type used in practice of the invention. The system includes a computer 10, having a central processing unit (CPU) 10*a*, a random access memory unit (RAM) 10*b*, and an input/output control unit 10*c*. The CPU 10*a* executes computer instructions stored in RAM 10*b* representing a preferred sequence of digital data processing steps for providing manufacturing process control, as described in greater detail below. The I/O controller 10*c* provides an interface between the RAM 10*b* and permanent storage device, e.g., disc drive 14, as well as between the CPU 10*a* and other peripheral devices, including one or more user terminals 12, and printer 16. As illustrated, the I/O controller 10*c* may also interface with production machinery 18, e.g., inventory control machinery, production monitoring apparatus, etc., to monitor the operation thereof.

According to a preferred practice, the computer 10 is an IBM System 38 superminicomputer, operating under control of the CPF operating system. User terminal 12, disc drive 14, and printer 16 constitute standard peripheral devices provided with the System 38. It will be understood by those skilled in the art that any number of other commercially available computers can also be used to practice the invention.

In a preferred embodiment, the instruction sequence utilized to place the data CPU 10 and related peripherals 12, 14, 16, 18 in a mode for manufacturing process control is functionally arranged in two sections, referred to as the resource processor (or "RP") module and the resource management (or "RM") module. More particularly, the RP module provides an instruction sequence for placing the digital data processing apparatus 5 in a mode to create production models reflecting relationships between resources used in the manufacturing process, while the RM module provides an instruction sequence for placing the apparatus 5 in a mode for characterizing attributes of specific resource elements, or physical occurrences thereof.

A more complete understanding of the invention may be attained by reference to Section I, infra. The text of that section, as well as that of Sections II-XIX, describe the function and operation of a preferred embodiment of the invention, marketed under the trademark "PRISM". That mark is owned by the assignee hereof.

Figure 2:
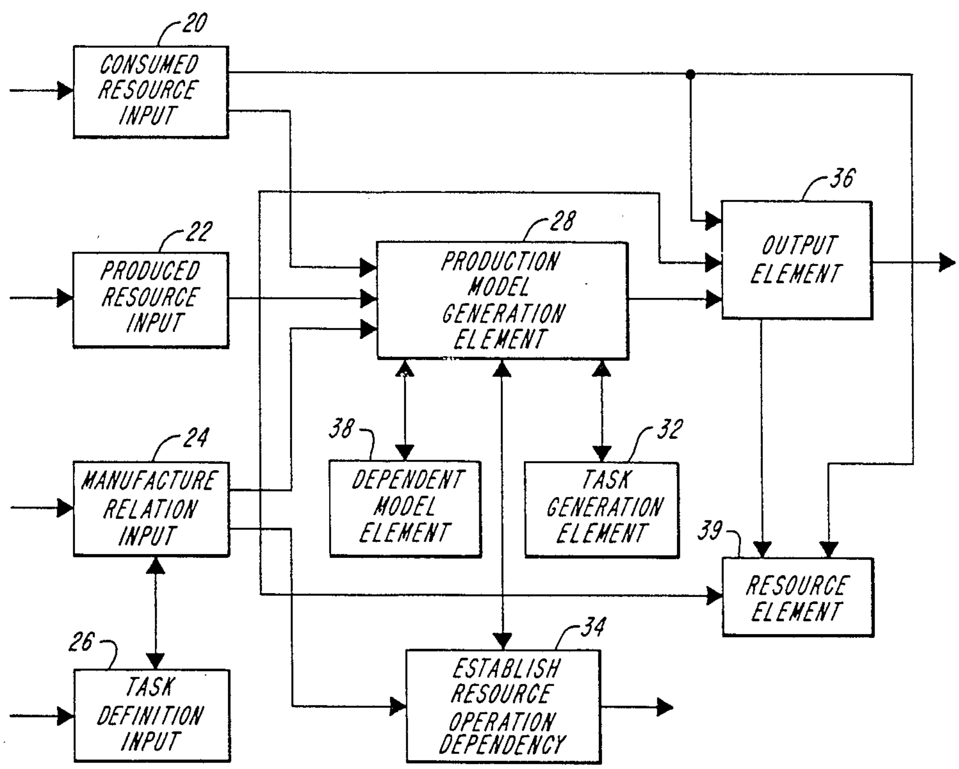
FIG. 2 depicts an overall configuration of elements comprising a preferred computer aided resource planning system constructed in accord with the invention.

FIG. 2 depicts the structural and functional interrelationship of elements making up the resource processor and resource management modules of a preferred manufacturing process control system constructed in accord with the invention. The modules include a consumed resource input element 20 for inputting digital signals representative of one or more resource elements consumed in the manufacturing process, a produced resource element 22 for inputting digital signals representative of one or more resource elements produced by the manufacturing process, and a manufacturing relation input element 24 for inputting digital signals representative of manufacturing relations associated with the manufacturing process, i.e., between at least one consumed resource and a set of one or more produced resources. Digital signals accepted by each of the elements 20, 22, 24 may be input interactively from user terminal 12 or alternatively, from the CPU 10*a*, e.g., as part of a batch mode process.

A production modeling element 28 is coupled, i.e., connected for the transfer of information in the form of digital signals, with aforementioned input elements 20, 22, and 24. The production modeling element serves to generate and store a "production model" comprising digital signals representative of manufacturing relations between the consumed and produced resource elements. The element 28 generates signals representing those relations on one-to-one, one-to-many, many-to-one, and many-to-many bases. The structure and content of a preferred data construct for storing production model information is shown in Section II-IV, infra.

An output element 36 is further coupled with the production modeling element 28, as well as with the consumed resource and produced resource input elements 20, 22, for generating output signals representative of at least selected portions of the manufacturing process. Those selected portions, as discussed below, can include portions representative of manufacturing relations associated with the production models.

A more complete understanding of the aforementioned elements may be obtained by reference to Section II, infra.

The illustrated system further includes a task-defining element 26 coupled to the manufacturing relationship input element. The element 26 accepts, e.g., from user terminal 12, digital signals representative of one or more tasks performed during the manufacturing process. The production modeling element 28 is shown to include a task-storing element 32 responsive to the task-representative signal for generating and storing digital signals representative one or more of the following types of information: (i) one or more resource elements consumed by a task, (ii) one or more resource elements produced by a task, (iii) one or more production operations performed during the course of a task, and (iv) manufacturing relations between the associated task and one or more other tasks.

According to a preferred practice of the invention, the production modeling element 28 includes an element from generating a digital signal indicating that a resource element produced by one task serves as a resource element consumed by the same or another task. This element is used for purposes of modeling resource relationship of the type found where a product produced by a first task is routed to serve as an input to that same task and/or another task.

A more complete understanding of the aforementioned elements may be obtained by reference to Section IV, infra.

The production modeling element 28, as illustrated, includes a dependent model generating element 30 for generating a digital signal defining a first production model as a master production model and for defining other production models as being dependent on that master model. A dependent production model is defined as one having the same tasks and produced resource elements as the master production model. The dependent and master production models usually differ from one another with respect to consumed resource elements.

A more complete understanding of the aforementioned elements may be obtained by reference to Section IX, infra.

In a preferred embodiment, the production modeling element 28 further includes an element for generating a digital signal representative of a production model type and for associating that production model type-representative signal with one or more production models. In accord with operations initiated by the user, for example, these type-representative signals are used to identify production models representing manufacturing processes having similar operational, financial, or planning characteristics.

A more complete understanding of the aforementioned elements may be obtained by reference to Section X, infra.

Figure 3:
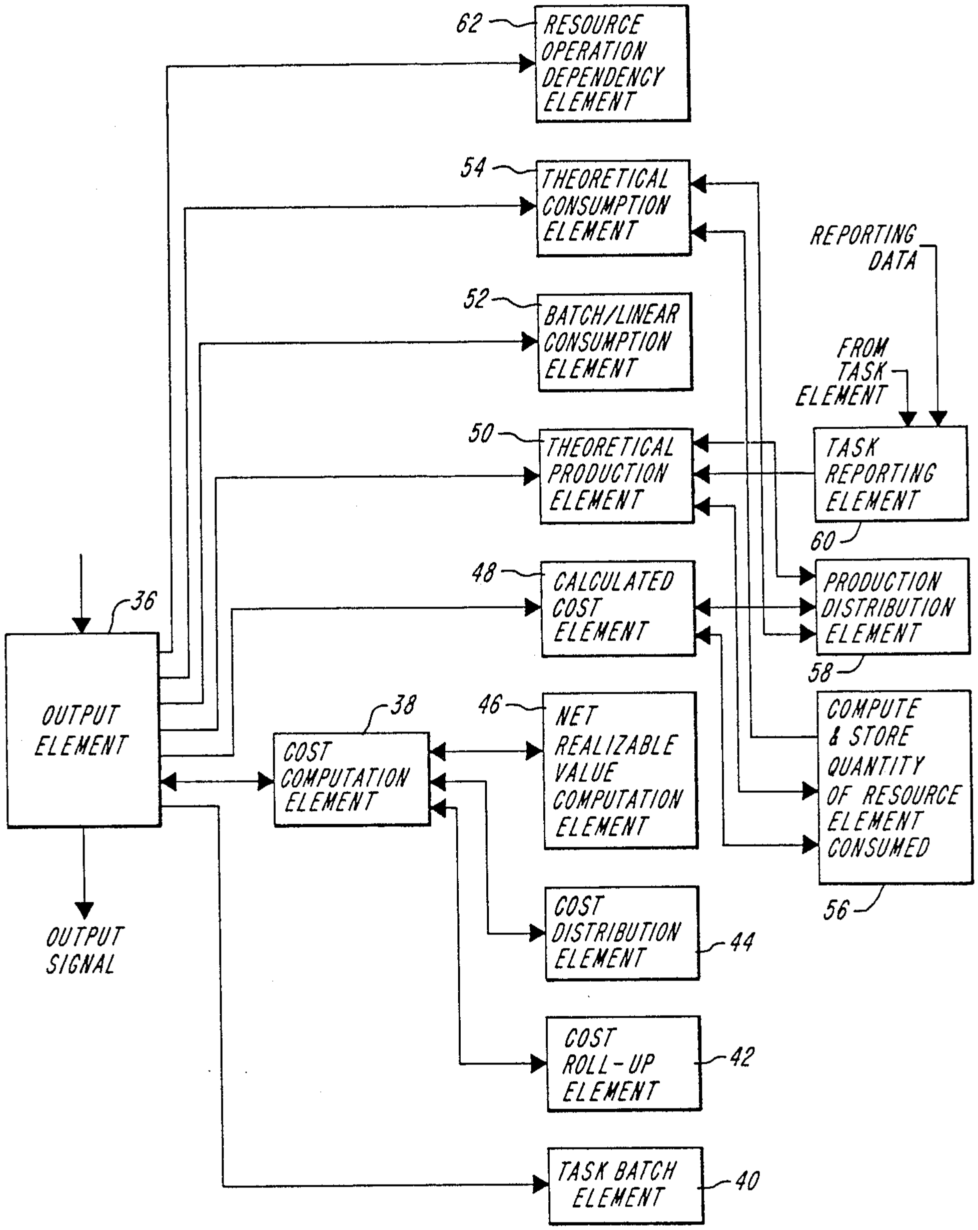
FIG. 3 depicts a configuration of elements comprising production modeling aspects of a preferred embodiment of the invention.

As shown in FIG. 3, the illustrated system further includes elements, coupled to the output element 36, for generating digital signals representative of the production, yield, consumption, composition, value, and variances for selected ones of the resource elements. More particularly, the system includes a cost computation element 38 coupled with the output element 36 for generating a digital signal representative of a cost associated with the use of a consumed resource, the production of a produced resource, or the running of a task associated with the production model. The illustrated cost computation element 38 may itself include a cost roll-up element 42 for generating a digital signal representative of a cost roll-up associated with one or more tasks associated with the production model.

A more complete understanding of the aforementioned elements may be obtained by reference to Sections III-I through III-VIII and Section V, infra.

In a preferred embodiment, the consumed resource input element 20 may include an element for accepting digital signals representative of costs associated with one or more resource elements consumed in the manufacturing process represented by the production model. As before, signals representative of those costs may be accepted from user terminal 12 or from CPU 10*a*. In conjunction with the input of cost-representative signals, the cost computation element 38 may include an element 44 for generating a digital signal representative of a cost distribution associated with each of plural produced resources associated with a task.

A more complete understanding of the aforementioned elements may be obtained by reference to Section V, infra.

With further reference to FIG. 3, the illustrated cost computation element 38 may include an element 46 for generating a digital signal representative of a net realizable value of one or more resource elements produced by a selected task.

A more complete understanding of the aforementioned elements may be obtained by reference to Section VIII, infra.

According to the illustrated embodiment, the produced resource input element 22 includes an element for inputting digital signals representative of amounts of one or more resource elements produced by a manufacturing process represented by a production model, while a theoretical consumption element 54 is coupled with the output element 36 for generating a digital signal representative of an amount of one or more resource elements consumed by the manufacturing process during production of one or more produced resource elements. The theoretical consumption element 54 includes a production distribution element 58 for generating a digital signal representative of a production distribution associated with each of plural resources produced by associated tasks. The output and production distribution elements 36, 58 are also coupled with a theoretical production element 56 selectively operable for generating a digital signal representative of an amount of one or more resource elements produced by the same task.

A more complete understanding of the aforementioned elements may be obtained by reference to Sections XI and XII-I through XII-II, infra.

The manufacturing relation input element 24 further comprises an input section for inputting a digital signal indicating whether quantities of resources produced by a task are reportable. A reportable task element 60, coupled with the element 24 and, more particularly, with the aforementioned input element, provides functionality for selectively enabling the theoretical production element 58 to generate its amount-representative signal and for, alternatively, accepting input digital signals representative of a quantity of one or more resources produced by the task.

A more complete understanding of the aforementioned elements may be obtained by reference to Section XI and XII-I through XII-II, infra.

A manufacturing relation input element 24 constructed for use in preferred practice of the invention also includes an input section for accepting a digital signal representative of temporal or volumetric output of a production run corresponding to a production model, as well as an input section for inputting a digital signal representative of a temporal or volumetric output of a task batch corresponding to a task associated with that production model. An input section further associated with the manufacturing relation input element 24 serves to input a digital signal representative of a mathematical relationship between the production run output and the task batch output. Acting in conjunction with these input section, the output element 36 includes task batch element 40 for generating a digital signal representative of a number of the task batches required to complete the production run.

A more complete understanding of the aforementioned elements may be obtained by reference to Sections II—II through II-III, infra.

In accord with preferred practice, the consumed resource input element 20 still further includes an element for inputting digital signals representative of a type of quantitative relation between a resource element consumed by a task and one or more resources produced by that same task. A batch/linear consumption element 52, coupled with the output element 36, responds to the quantitative relation type-representative signal for selectively generating a digital signal representative of either (i) a linear quantitative relation between the consumed resource and one or more produced resources, or (ii) a step-function relation between the consumed resource and the one or more produced resources.

A more complete understanding of the aforementioned elements may be obtained by reference to Section II-X, infra.

Wherein a preferred practice calls for the consumed resource input element 20 to include an inventory element for inputting and storing a digital signal representative of a quantity of a physical occurrence of a consumed resource available for use in the manufacturing process, that practice also calls for the theoretical consumption element to include an element for modifying the stored quantity-representative signal to reflect a quantity of the resource element consumed during the manufacturing process. Further in accord with that practice, the output element 36 includes a calculated cost element 48 for generating a digital signal representative of an amount of the resource element consumed by the manufacturing process in the production of the resource element. The calculated cost element 48 generates the aforementioned digital signal without modifying the stored quantity-representative signal, e.g., without making any changes which would otherwise indicate that the inventory of the consumed resource element decreased.

A more complete understanding of the aforementioned elements may be obtained by reference to Section XII, infra.

In a preferred practice, the manufacturing relation input element 24 includes an input section for accepting a digital signal representative of a quantity of a resource element consumed in a task, as well as an input section for accepting a digital signal representative of a temporal duration of an operation associated with that same task. Further according to that practice, the output element 36 is coupled to a resource operation dependency element 62 for generating a digital signal establishing a relation between a quantity of the the consumed resource element and the temporal duration of the operation. The element 62 is selectively operable for establishing those relations for selected ones of consumed resources and operations.

A more complete understanding of the aforementioned elements may be obtained by reference to Sections II—II through II-III and IV-II through IV-III, infra.

Referring, again, to FIG. 2, the illustrated system is shown to include a resource element 39 coupled with the consumed and produced resource input elements 20, 22, as well as to the output element 36, for generating and storing a digital signal representative of a production characteristic associated with at least one the resource element. As explained above, this production characteristic includes one or more of a financial, operational, planning, and tracking attribute of the at least one resource element.

A more complete understanding of the aforementioned elements may be obtained by reference to Section XIII, infra.

Figure 4:
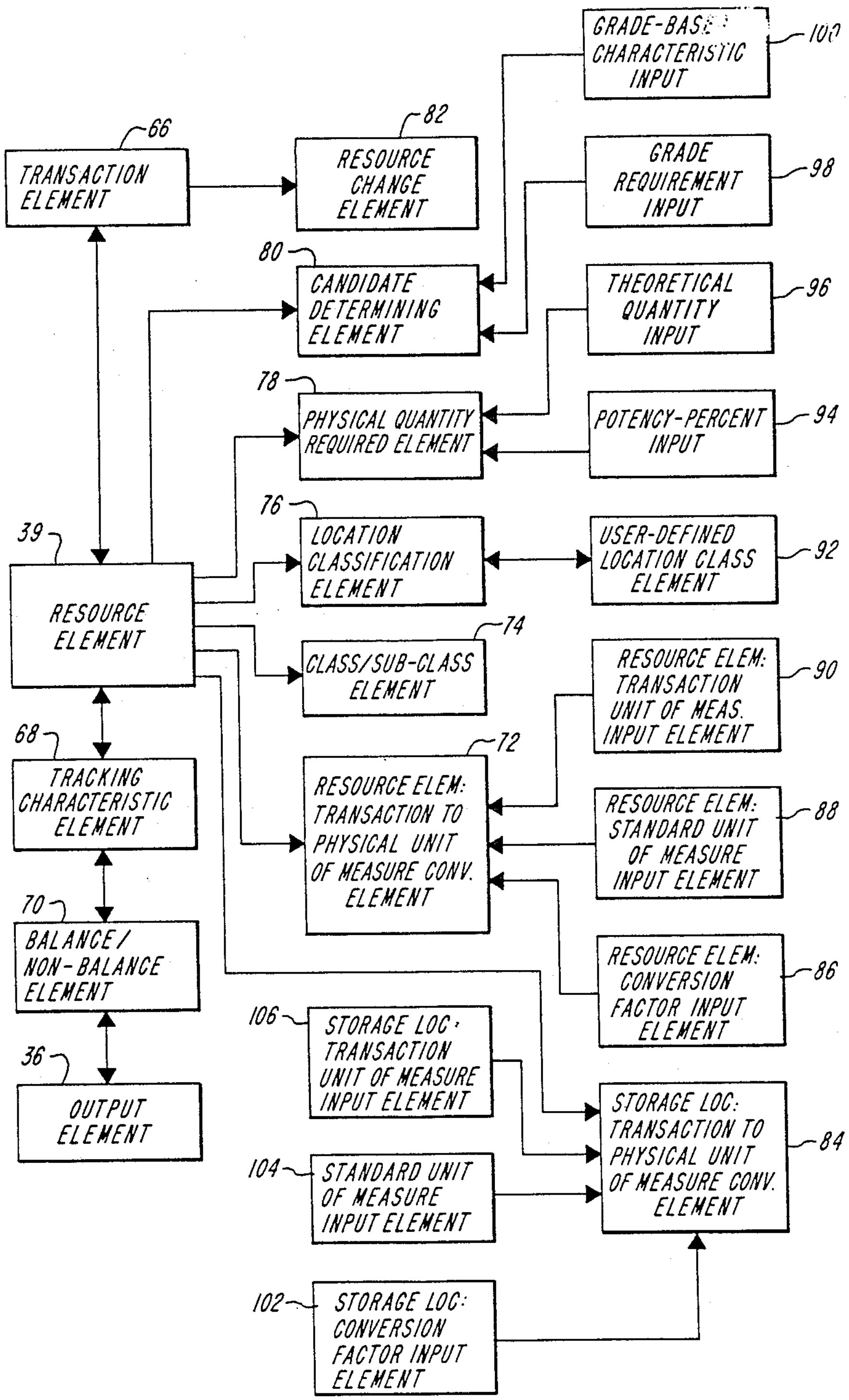
FIG. 4 depicts a configuration of elements comprising a resource management module of a preferred embodiment of the invention.

In FIG. 4, the resource element 39 is seen to be coupled with a class/sub-class element 74 for generating a digital signal defining one or more resources to have similar production characteristics. The resource element 39 is further shown to be coupled with and include a location classification element 76 for generating a digital signal representing a location classification associated with a physical occurrence of a resource element 39. As noted earlier a location classification includes one or more production characteristics, while a physical occurrence of a resource element is defined as the actual or simulated existence of a physical entity embodying the resource.

A more complete understanding of the aforementioned elements may be obtained by reference to Sections XIV through XV, infra.

Still further, the illustrated resource element 39 includes a transaction element 66 for modifying a digital signal representative of one or more production characteristics associated with a physical occurrence of a resource element 39. The transaction element itself is coupled to a resource change element 82 for modifying a digital signal which represents a physical occurrence of one resource element 39 to represent a physical occurrence of another resource element 39 and for modifying, concurrently, one or more production characteristic-representative signals associated with the modified physical occurrence-representative signal.

A more complete understanding of the aforementioned elements may be obtained by reference to Section XVI, infra.

The illustrated location classification element 76 includes a user-defined classification element 92 for inputting digital signals representative of user-defined location classifications. A user-defined classification change element is coupled to, and acts in conjunction with, the user-defined location classification element 92 for modifying a digital signal representative of a location classification associated with a physical occurrence of a resource element.

A more complete understanding of the aforementioned elements may be obtained by reference to Sections XV and XVII, infra.

With continued reference to FIG. 4, a tracking characteristic element 68 is coupled with the resource element 39 for generating a balance/non-balance signal representative of a tracking characteristic of a resource element. A balance/non-balance element 70, coupled to the tracking characteristic element 68 and the output element 36, responds to the balance/non-balance signal for selectively tracking physical occurrences of a resource element.

A more complete understanding of the aforementioned elements may be obtained by reference to Section XVIII, infra.

As shown in the illustration, the illustrated system includes an element 88 for inputting a digital signal representative of a standard unit of measure associated with a resource element. The system also includes an element 90 for inputting a digital signal representative of a transaction unit of measure associated with a physical occurrence of that same resource element. An element 86 is provided for inputting a digital signal representative of factor for converting a quantity associated with a physical occurrence of the resource element between the standard unit of measure associated with that resource and the transaction unit of measure associated with the physical occurrence thereof.

A further element 72 is coupled with the resource element 39, as well as to the input element 86, 88, 90, for inputting a digital signal representative of quantity expressable in the transaction unit of measure associated with a physical occurrence of the resource element and for converting that quantity into a digital signal representative of an equivalent quantity expressable in the standard unit of measure associated with the resource element and for generating a signal representative thereof.

A more complete understanding of the aforementioned elements may be obtained by reference to Section XIX, infra.

Similarly, a preferred computer aided materials requirements planning system includes an element 104 for inputting digital signals representative of a standard unit of measure associated with a resource element, as well as an element 106 for inputting a digital signal representative of a transaction unit of measure associated with a storage location, which storage location stores a physical occurrence of a resource element. The system further includes an element 102 for inputting a digital signal representative of conversion factor for converting a quantity between the transaction unit of measure associated with the storage location and the standard unit of measure associated with a resource element stored in that storage location.

An element 84, coupled with the resource element 39 and with the input elements 102, 104, 106, inputs a digital signal representative of quantity expressable in the transaction unit of measure and associated with the storage of a physical occurrence of a resource element and converts that quantity into a digital signal representative of an equivalent quantity expressable in the standard unit of measure. The element 84 thereafter generates a signal representative of the converted quantity.

A more complete understanding of the aforementioned elements may be obtained by reference to Section XIX, infra.

The illustrated system also includes an element 96 for inputting a digital signal representative of a theoretical quantity, at a predetermined potency level, of a consumed resource element required for production of a produced resource element, while illustrated element 94 serves to accept a digital signal representative of a potency-percentage quantity of a physical occurrence of that consumed resource element. An element 78, coupled to the resource element 39 and to the input elements 94, 96 generates a digital signal representative of a physical quantity of a physical occurrence of the consumed resource element required for production. Here, the physical quantity-required signal is expressed in terms of the potency-percentage and is based upon the predetermined potency level.

A more complete understanding of the aforementioned elements may be obtained by reference to Sections III–VII and III–IX, et seq., infra.

The system illustrated in FIG. 4 also includes an element 98 for inputting a digital signal representative of a grade requirement for a resource element consumed in the manufacturing process. A further element 100 inputs a digital signal representative of a grade-based characteristic of a physical occurrence of the resource element. Candidate-determining element 80 is coupled to resource element 39, as well as to input element 98 and 100, for responding to the grade-requirement signal and to the grade-reporting signal for generating a digital signal indicating whether the physical occurrence of the resource element is a candidate for use in the manufacturing process.

A more complete understanding of the aforementioned elements may be obtained by reference to Sections IV–II, XII–III through XII–IV, and III–VII, infra.

A preferred software listing detailing computer instructions for placing the aforementioned IBM System 38 super mini-computer in a mode for computer aided manufacturing requirements planning in accord with the invention is provided in Appendix A, filed herewith and being retained with the patented file.

The aforementioned description may be understood still more thoroughly with reference to the following manuals, available from the assignee thereof:

PRISM—Resource Processor Logic Manual (1986)

PRISM—Resource Processor Reference Manual (1986)

PRISM—Resource Management Logic Manual, Volume I (1986)

PRISM—Resource Management Logic Manual, Volume II (1986)

PRISM—Resource Management Reference Manual, Volume I (1986)

PRISM—Resource Management Reference Manual, Volume II (1986)

The illustrated computer aided material requirements planning system described above meets the desired objects by providing an improved system permitting the monitoring and control of process and repetitive manufactures, as well as discrete manufactures. The system is capable of accurately modeling and simulating the aforementioned manufacturing processes and providing accurate scheduling, cost accounting, and reporting facilities. Those skilled in the art will fully realize that text provided above describes preferred embodiments of the invention, and that systems embodying the principles set forth herein—although not incorporating elements fabricated and configured in the exact manner described in the detailed description, fall within the scope of the claimed invention.

For example, it will be appreciated that input signals, and particularly reporting signals reflecting amounts of consumed and/or produced resources, can be input to the system from production monitoring machinery, as well as from the user terminal. Further, it will be appreciated that output signals generated by the above-described system can be used to control the operation of production machinery, as well as driving a printer for presenting reports of production activity.

SECTION I

A resource is defined as any element with positive or negative value which is required for production or results from production. Machine hours, labor hours, utilities, space waste management, tooling, and material might all be examples of resources which are elements of your business. You define within PRISM all resources which require the collection and control of physical and accounting information. This information provides a sound basis for the planning, costing, and production analysis required to successfully manage your business.

Identifying Resource Classes And Sub-Classes

All resources are defined and controlled at a class, sub-class, and individual resource level within PRISM. Class and sub-class attributes are also installation-defined. An example of a resource class might be Utilities. Within the class of Utilities might exist several sub-classes, such as Electricity, Natural Gas, Steam, and Coal. Defined resources within the sub-class Electricity might include Meter 1 and Meter 2, which monitor the amount of electricity being used in specific segments of your plant. Detailed and summary reports reflecting the cost at individual meters, for all meters in the sub-class of Electricity, and for all combined sub-classes within the class of Utilities might then be selected.

RESOURCE EXAMPLES

| CLASS | SUB-CLASS | RESOURCE |
|---|---|---|
| Utilities | Electricity | Meter #1 |
| | | Meter #2 |
| | Steam | Purchased |
| | | Generated |
| Material | Fresh | Celery |
| | | Tomatoes |
| | Frozen | Beef |

TABLE 1

Define your resources to reflect the operational and financial requirements of your business. Identify only those resources which are important to manage, modelling your production processes. You define any and all resources, extending the planning and control of production requirements beyond the traditional parameters of labor and material.

Begin today by defining those classes and sub-classes which parallel your business reporting requirements. Develop additional resource class and sub-class definitions as your information and control requirements grow and change.

Include all the elements of the manufacturing process within one system. This allows you to monitor and control the consumption of resources throughout the manufacturing process. This increased level of control provides you with better cost and planning analysis for all resources, whether they are machine hours, labor, energy, waste management, material, or any other specific resource.

Within each resource definition you will establish accounting and operational characteristics. Resource class and sub-class levels will allow you to group together those resources with similar reporting characteristics, increasing visibility and management control.

INVENTORY CLASSIFICATIONS

PRISM allows increasingly sophisticated inventory control levels to be defined over time within one integrated system. Inventory classifications provide visibility of inventory passing through varying states of availability, allowing you to fully understand your inventory investment.

The use of inventory classifications makes it possible to look at quantities and related costs of inventory several different ways. On order, on hand, and work in process totals can be broken down into user-defined classifications for increased detail about resources in varying inventory states. This design provides a wealth of planning, costing and inventory control information, which is visible in the format required by various departments.

For example, on-hand material might require further breakdown within several inventory classifications. These classifications may include Inspection, Quarantine, or QC Hold. Each of these classifications provides valuable information for various people in your business. Reports segregating material within the QC Hold classification can be printed, as well as summary reports which identify all material within the Quality Control area, including Inspection, QC Hold, and Quarantine. This allows you to isolate by quantity, lot, and associated cost those materials which are of special interest to specific departments.

Consigned inventory (material which is physically stored with on-hand inventory, but which still belongs to the vendor until used), might be an example of a required sub-set of on-hand inventory. This inventory needs to be considered a part of on-hand inventory, available for production use and material planning, but needs to be excluded from costed inventory valuations. It is not an asset of the company.

Define inventory classifications which fit your reporting and control needs. Installation-unique classifications allow you to reflect existing inventory states within your company today. PRISM provides the flexibility necessary to allow evolving inventory classifications to be defined as the policies and procedures of the business dictate.

The system handles each classification the way you direct by using a number of installation-defined attributes for each classification. These attributes or characteristics outline the system accounting and availability policies which will be applied to any resources within the classification. PRISM will treat each defined classification differently, based on the characteristic parameters outlined below:

On-Order

An example of an inventory classification which might be defined with an on-order characteristic might be a vendor In-Transit classification. When a quantity of a procured material is shipped by a vendor, but the shipment has not yet reached the receiving dock, the resource quantity might be entered in this In-Transit classification. The In-Transit definition identifies the quantity shipped, for reporting purposes; but, additional reporting information is now available. The In-Transit classification provides both detail and summary visibility of these quantities. In this example, the In-Transit classification helps monitor vendor performance, and provides quantity, due date, and cost-related visibility for materials shipped from vendors which have not yet arrived.

Classifications with an on-order characteristic will be included in on-order totals of inventory. There may be any number of classifications with an on-order characteristic.

On-Hand

The characteristic on-hand indicates that all quantities within this classification are physically present. Any number of classifications may be defined with an on-hand characteristic. For example, a Quarantine classification might be defined for those products which have completed the production process, but which require a period of quarantine prior to being sold as finished product. Quantities entering the Quarantine classification would be considered physically present for purposes of on-hand quantity reporting.

Available For Planning

A classification which is defined as available for planning indicates that all resources entering that classification may be considered available for use in production now or at some future point in time. For planning purposes, each classification has a user-maintained number of calendar or work days associated with it. As a material enters a classification, its date of departure from the classification is calculated by adding the classification lead time to the receipt date. The expected date of departure (ETD) can be used as the date of availability for that material when doing resource planning. Alternately, material can also be considered available for planning immediately.

For example, purchased materials entering an Incoming Inspection classification which has been defined as available for planning might require an average of four work days to complete the inspection process. The availability date, or ETD, for this material would be calculated by the system, adding four work days to the date the material was received into Incoming Inspection. The ETD is used in time-phased planning within PRISM.

Including or excluding those resource quantities which are not yet on-hand as available for planning extends the planning horizon. Knowing when each lot of material is expected to leave a classification provides detailed time-phased planning information of material required for production. Based on the calculated date of departure for each lot, a report by ETD prioritizes which quantities are expected to leave a classification first. This provides management control of work loads and materials within classifications, for example, inspection or quarantine.

Cost

If quantities within a classification are to be included as assets of the business, the cost attribute directs the system to include them as assets of the business. The ability to group together multiple classifications for costing purposes, while retaining distinct physical and planning characteristics provides multiple views of the same information.

At the time each resource sub-class is defined, all characteristics for that sub-class will default from existing class definitions. Similarly, predefined sub-class characteristics will default for individual resource entries. These defaults may be overridden at the time of entry, as desired, for a particular sub-class or resource. Class and sub-class defaults provide flexibility at the time of resource entry, reducing the amount of clerical effort required, while increasing accuracy and efficiency.

Direct PRISM to fit your business.

The following information is defined as part of each resource definition:

Defining Your Resources

Record-Keeping Requirements

PRISM distinguishes between non-balance and balance resources. Those resources which require the measurement of resource usage from one time period to another, but do not require a balance on hand, are non-balance resources. Examples of non-balance resources might be electricity, machine hours, and labor hours.

PRISM provides usage information and visibility for those resources which had not been tracked within any manufacturing control system before PRISM. Being able to manage all types of resources provides added control at a more detailed level. Resources which have always been unidentified elements of the production process can now be included as planning, analysis, and costing considerations.

Those resources whose on-hand quantity is increased or decreased by transaction activity are balance resources. Balance records are required to maintain control of the on-hand quantities. Any liquid, gas, powder, or other physical material might be examples of balance resources. All balance resources also have non-balance information maintained, as well as on-hand information.

Inventory Classifications

Traditionally, manufacturing control systems have grouped inventory in the accounting or financial categories of on-order, on-hand, and work in process inventory. Resource quantities were visible, for purposes of planning and costing, only in terms of these three classifications or "states of availability." No further breakdown of inventory by quantity or value within each of these classifications was possible. Operational personnel need a further breakdown of the financial categories of inventory. PRISM combines such operational and financial inventory controls within one system.

"Black book" methods of control are often employed in an effort to control these informal inventory classifications such as QC Hold, Restricted Use, Quarantine, etc. These attempts to manage inventory are informal and provide limited visibility throughout the company for those who require related planning and costing information. PRISM allows you to define all of your current "black book" methods.

For example, an installation-defined classification called Incoming Inspection might be considered on-hand and not be included in cost totals as an asset of the company. Any quantity within the Incoming Inspection classification would still be considered the property of the vendor.

Another example of an inventory classification which might not be included in cost totals would be a Consigned Inventory classification. Vendor or customer-owned material carried in on-hand inventory might be defined as on-hand, because it is physically present. However, the costs associated with inventory in this classification would not be considered assets of the business, even though visibility of the on-hand quantities is retained for planning and production use.

Work In Process

Those inventory classifications with a work in process characteristic will be included in cost totals as work in process inventory of the company. For example, an "intermediate" classification might be defined with a work in process characteristic, isolating the materials within the production process which are not yet salable products, but which are still considered a part of work in process. All material entering this "intermediate" classification would be included in work in process cost totals. Additionally, detail and summary information would be available within the "intermediate" classification itself. This added level of inventory visibility provides increased planning and costing controls.

Lot Control

The ability to control resources which require lot tracking information through varying states of inventory insures that you will be able to trace information by lot. Lot control will begin at the desired point in the inventory movement cycle.

Each inventory classification and each individual resource in PRISM contains an attribute which identifies whether or not lot control information will be required. Only those resources which are installation-defined to require associated lot control information, both at the individual resource and classification level, will require the entry of a lot control number when entering that inventory classification. Each resource will pass through this system edit when entering an inventory classification, as a part of the inventory transaction.

| Classification Requires Lot Control | Resource Requires Lot Control | Will a Lot No. Be Required? |
|---|---|---|
| Y | N | N |
| Y | Y | Y |
| N | Y | N |

TABLE 2

For example, Material X might have lot control requirements, while Material Y does not. This information is included as part of the resource definition. Material Y will not be edited for lot control information when entering any inventory classification.

If Dock and Inspection inventory classifications have been identified as valid states of inventory, the Dock classification might be defined as not requiring lot control, while the Inspection classification includes a lot control characteristic. When Material "X" enters the Dock classification, no lot control information will be required (even though Material "X" has a lot control characteristic). This is because the Dock classification does not require lot control. However, when Material "X" enters the Inspection classification (where both the resource and the classification require lot control), PRISM will require lot number information.

Lot control rules are installation-defined in PRISM, insuring adherence to the policies and procedures of your business.

Dictate to the system at what point you need to assign lot number control. System edits which require lot numbers at the appropriate points will insure that lot control data exists.

| CLASSIFICATION | ON ORDER | ON HAND | PLAN | COST | WIP | LOT |
|---|---|---|---|---|---|---|
| Vendor in-transit | Y | | | | | |
| Warehouse in-transit | Y | | | Y | | Y |
| Quality Control | | Y | 1 | Y | | Y |
| Quality Control Hold | | Y | | Y | | Y |
| Restricted Use | | Y | 2 | Y | | Y |
| Floor Stock | | | 2 | | Y | Y |
| Line Stock | | Y | 2 | Y | | Y |
| Consigned Inventory | | Y | ? | Y | | Y |
| Quarantine | | Y | 1 | Y | | Y |

1 • Available at ETD
2 • Available Now

TABLE 3

Classification Reports

Detailed reports by inventory classifications are available in PRISM. These reports provide overall quantity totals within a classification for each resource. They also identify individual lot quantities of the same material within each classification.

PRISM includes a special purpose report writer to permit you to define multiple views of your inventory. Each user can define and re-define his or her own reports to answer their specific questions. These reports can show single classifications or multiple classifications as required.

A classification called Restricted Use might contain two lots of the same material—red beans. Lot P4 contains a quantity of 10,000 red beans, and lot R6 contains 15,000 red beans. A detailed report of the Restricted Use classification may be selected such that the individual lots of red beans are itemized. Alternatively, a summary report of the total quantity of red beans within that classification is available.

Inventory Reporting

With the appropriate security clearance, detailed and summary cost information about each classification is also available in PRISM. Costed reports provide visibility of the cost of each individual lot, as well as overall material values within each classification. This cost information is useful in making value or priority decisions about an individual lot, one specific resource, or an entire classification.

An inventory classification called QC Hold might contain two lots of red beans. Lot H2 contains 5,000 red beans, and lot H6 contains 10,000 red beans. With the correct level of user security, the related value of these two lots would be provided on a costed report. A summary value for all quantities of red beans currently in QC Hold is also available.

Value by Classification

An additional level of report information within each classification is available through the use of time-stamped inventory transactions. Each quantity or lot of material which enters a classification has an associated date of departure. This estimated time of departure, or ETD, can be included on classification reports. These reports would provide managers with a prioritized listing of the material within their department or area. Individual lots of the same material can be highlighted for processing first, or for delayed processing. The availability of material within a classification can be reviewed at any time.

In a QC classification, for example, three lots of red beans might be waiting for quality inspection. If there are no red beans on hand, and 10,000 red beans are required for production today, a report of the QC Hold classification could be printed. This report would list the three individual material lots of red beans, and their ETD, or expected date of departure. If today's date is 10-1-xx, it is evident that lot T1 is overdue from the QC Hold classification. An additional lot for 10,000, lot T2, is due today. This report provides the information necessary to expedite the first lot of red beans, and to expect the delivery of a second lot of red beans in sufficient time for production.

Inventory Reporting

Control material activity within your plant within individual classifications. Isolate and track individual quantities of a material, or view only summary information. Consider the cost and availability associated with material in a classification when prioritizing workloads. Review all the necessary reporting information when making your business decisions.

Transactions

A transaction is defined as any change in classification, lot control, location, allocation, quantity, or identity of a resource. Within PRISM, you define those "change of classification" transactions which are unique to your business, and adopt any or all of the standard transactions which are system-provided. Define installation-unique transactions to model the existing inventory policies and procedures of your business. By defining only allowable transaction changes in classification, resource movement may be restricted in accordance with the financial and operational policies and procedures of your company.

System-Defined Transactions

PRISM has system-defined transactions such as:

Sales Transaction
Resource Adjustment
Transfer Resource
Production Receipt
Direct Issue
Resource Number Change
Scrap Transaction
Miscellaneous Issue
Miscellaneous Receipt
Inventory Adjustment
Pick Complete
Indirect Measurement
Return To Production
Ongoing Production
Return To Stock
Issue To Production
Cost Adjustment
Theoretical Consumption
Theoretical Production
Calculated Cost
Cycle Count Adjustment

Transaction Characteristics

For all user-defined transactions, a number of different transaction characteristics can be defined by the installation:

Transaction Type

The use of terms familiar to your business within PRISM aids in the implementation process, providing a visual prompt during transaction entry and review. For example, a transaction type "DR" might be defined which indicates a resource has been "Received At Dock." A "QH" type might be defined to indicate a "Quality Hold" transaction.

A two-digit code identifies each transaction type. This code may be an abbreviated extension of terms currently being used by your company for transaction activity.

Transaction Description

A detailed explanation of the transaction types is available for review on the transaction screens and reports. The ability to verify types of transactions during data entry increases keying accuracy.

Allowable "From" Classification

Previous or "from" classifications are edited for those transactions which move resources to a new inventory classification. At the time that each transaction type is tailored, the user may define which "from" classifications are allowable for a transaction to a specific, new classification. These tailored definitions restrict the acceptable routing paths for any resource. In this way, your inventory movement follows the established policies and procedures of your business.

By building into PRISM the ability to limit transaction activity to only those types of transactions which are defined and approved by your company, strict compliance to current policies and procedures is insured. No external controls are required to monitor the movement of resources between accounting and operational checkpoints.

For example, it is a policy of your business that all material leaving the Receiving Dock must enter an Inspection classification and not into the classification On-Hand. The classification On-Hand inventory should then be defined to include Inspection as the allowable "from" classification. The Receiving Dock classification would not, however, be defined as an available "from" classification. In this example, if personnel attempted to move material from Dock directly into On-Hand inventory, the transaction entry in PRISM would not be allowed because Dock has not been defined as an acceptable "from" classification.

"To" Classification

While a resource involved in a transaction may come from any one of a number of predefined "from" origins, each transaction directs a material quantity "to" a single classification. As a quantity enters a classification, it assumes all the characteristics of the new classification.

An audit trail of all resource quantities entering a classification provides detailed historic information for any inquiry or report involving transaction activity. This information might be useful in cycle count reconciliation, or performance analysis detail.

The ability to print selective reports by detailed transaction codes and analyze information statistically, as well as at the detailed level, highlights the causes of conditions. Management is able to focus attention to specific programs, helping to isolate and eliminate the related cause.

For example, a Quality Rejection transaction might contain an installation-defined list of unique, detailed transaction codes. These codes will be used in conjunction with the Quality Rejection transaction. They might contain descriptive information about the related reasons for Quality Rejection transaction entries. One detailed transaction code might represent that material is being "Rejected for High Moisture Levels." Another detailed transaction code might indicate that material is being "Rejected for High Acid Levels."

At the time of transaction entry, the appropriate detail code would be included as part of the transaction. This will further explain the transaction being performed.

Detail codes are retained as part of transaction history in PRISM, and may be retrieved as part of statistical or detailed information gathering at a later date. A report which lists all transactions with a specific detailed transaction code might be requested.

Another report might list all transaction entries for last year's Quality Rejection classification in the last year, itemizing by detailed transaction code the quantity and cost-related values of all transaction entries.

| TRANSACTION | DETAILED TRANSACTION CODES |
|---|---|
| Rejection | HM High Moisture Content |
| | HA High Acid Level |
| | FM Foreign Matter Present |
| | VU Visually Unacceptable |
| | ?? ? ? ? |

TABLE 4

General Ledger Effect

A general ledger effect code can be assigned to each transaction definition. This code is designed to assist cost accounting in the review of all transaction activity prior to making general ledger entries.

No additional effort is required to collect cost-related information meaningful for accounting. A general ledger effect code is installation-defined for each transaction type, and is automatically incorporated into each individual entry for that transaction type.

Define your general ledger effect codes to reflect your current cost-collection requirements. All transaction entries will be saved in a history file, allowing you to review inventory control transaction activity with detail. This is helpful for accounting. As you add new transaction types, additional general ledger effect codes can supply increasingly sophisticated selection criteria for accounting review and analysis.

User-Defined Fields

No system design can anticipate every requirement for every user. For that reason, PRISM provides you with the ability to define additional transaction entry fields, insuring all necessary information will be included at the time of transaction entry.

Inventory Classification Flexible Approach

Estimated Time of Departure (ETD)

Included within each classification definition in PRISM is an associated number of work or calendar days which indicates the expected amount of time any lot will remain within the inventory classification. For each transaction receipt, the date of entry and this predefined time period are used to determine when a lot should be available to leave the current classification. The estimated time of departure (ETD) for each transaction receipt provides expediting and planning visibility by individual lot, as well as within each inventory classification.

For example, an Incoming Inspection classification might be predefined to include a lead time of four working days. A quantity of a lot-controlled material entering Incoming Inspection on a Wednesday of a standard work week would be expected to depart from that classification the following Tuesday, four work-days later. Time-phased reports provide balance and cost information based on this estimated date of departure. A report, sequenced by expected departure date, helps in prioritizing and managing the work load within Incoming Inspection.

Time-phased reports provide visibility of overdue resources within a classification. This information highlights potential problems within a classification, as well as measuring actual performance.

Detailed Transaction Codes

The detailed transaction code is an alphanumeric field which may be used at the time of transaction entry to associate predefined descriptive information with the transaction being performed. Each transaction type may have predefined detail codes which are to be associated with a single type of transaction only. Generic transaction detail codes may also be defined which associate with any type of transaction entry. Detail codes are retained as a part of transaction history, and may be used to provide statistical analysis, with supporting detail available.

The ability to assign meaningful detailed transaction codes for each type of transaction allows you the flexibility to collect and analyze reason-related transaction information without duplicating data entry effort.

For any type of transaction entry where additional statistical or descriptive information is useful, you can define detailed transaction codes which abbreviate the terms currently being used in each department or area. Using terms already familiar to your business reduces the initial implementation and training effort.

Detailed transaction codes and related descriptions are available through inquiry at all times during transaction entry. This will reduce data entry error and increase efficiency.

In addition to the standard transaction entry fields, there are installation-defined fields which are included during transaction entry. These fields will be retained as part of transaction history.

Security By Transaction

Each transaction carries its own security. Individual users are limited to those transaction types for which they are authorized.

For example, all individuals within a Quality Inspection department might have the necessary transaction security to accept or reject material which enters the Quality Inspection area. A supervisor's approval and security level, however, might be required when scrapping unusable material.

The ability to limit transaction activity at the individual user level on a transaction by transaction basis allows you to maintain required security levels directly within PRISM.

As your security control requirements change, maintenance of individual security access within PRISM is quick and easy. A change in personnel might require restricted transaction capability during initial training, for example.

Operator error due to the inadvertent entry of a valid but inappropriate transaction is reduced by limiting each individual to those types of transactions for which they are authorized.

Transaction Processing Features

Associated with each transaction at the time of entry are the following processing features:

Unlimited Comments

Transaction comments provide an additional level of information specific to an individual transaction, which goes beyond the detailed transaction code.

Each transaction entry may have unlimited comments associated with it at the time of transaction entry. Transaction comments are available as part of transaction history. For example, a transaction comment might contain detailed information about a dock receipt which has an associated freight claim.

Accounting Period Override

Each transaction entry has an associated accounting period in PRISM. Multiple accounting periods may be held open simultaneously in PRISM. This means that transactions entered at a later date can be directly applied to any open accounting period. The transaction entry screen defaults to the current accounting period, but this may be overridden to add transaction entries to a previous accounting period which is still open.

Typically, period end transactions had to be entered and the previous accounting period closed prior to entering any transactions for the new accounting period. Transactions for the new accounting period were therefore held for as long as possible, to allow for the review and correction of the previous period's activity. Unentered transactions for the current period quickly distorted inventory on-hand on-order, and availability information. The number of transactions which had to then be quickly entered once the previous accounting period was closed required a massive data entry effort which was often costly, time-consuming, and inaccurate.

With the ability to assign which open accounting period each transaction is to be applied against, adjustment transactions can be applied to previous accounting periods without inhibiting current period transaction activity.

There is no interruption in data entry to accomplish period close, so the accuracy of your system does not deteriorate at the beginning of each accounting period.

Transaction History File

All transaction entries in PRISM are saved in a history file. Transaction information is time-stamped to include the terminal identification, user's name, and the date and time of transaction entry. A separate date and time is maintained for the effective date of the transaction, if the transaction being entered occurs at some time other than the current system date and time.

In PRISM successful transaction entries are retained as history and may only be removed under the direct control of the system operator.

Batch Or On-line Processing

It may be advantageous to update some types of transactions according to a user-controlled operations schedule. Transactions which update a large volume of inventory records simultaneously, such as theoretical consumption, can be scheduled for update during periods of minimum activity.

On-line or batch processing may be tailored for selected transaction types. PRISM immediately updates those transaction types which you select for on-line processing, adjusting perpetual inventory records at the time of transaction entry. You may choose to delay the processing of specific types of transactions by selecting batch processing during tailoring.

As transaction entry requirements within your business grow and change, requirements for batch or on-line processing by transaction type may also change. PRISM allows you to change the processing parameters for each transaction type to fit your current needs. For example, if a new data entry individual begins entering issue to schedule transactions which have previously been on-line transaction entries, you may wish to select this transaction type for batch processing temporarily, during the training process.

Incomplete transactions may be suspended and retained in a transaction file in PRISM, for review and update at a later time. This transaction file also provides an access path for integrating process control, bar code, and other systems which are part of your business and external to PRISM. An interface may be installation-defined to feed this external information through the transaction file and edit check prior to update in PRISM.

EXTERNAL TRANSACTION PROCESSING

The transaction file makes it possible to interface those process control and other data collection systems which are external to PRISM, integrating data into a central information system for analysis and review.

Authorized Change of Identity

The flexibility to re-name resources is available in PRISM, without the loss of strict control over the re-naming process. A cheese manufacturer, for example, who makes mild, medium, and sharp cheddar cheese might define a separate resource for each type of cheddar cheese. Mild cheddar cheese might be aged on the shelf for three months and then tested by Quality Control, prior to re-naming it medium cheddar cheese. Likewise, medium cheddar cheese might be aged for nine months and tested, prior to re-naming it sharp cheddar cheese. Sharp cheddar cheese would then be any cheddar cheese which has aged more than nine months.

Medium cheddar cheese would be an allowable name change for mild cheddar cheese. Sharp cheddar cheese would be an allowable name change for medium cheddar cheese. As the cheese ages, user-entered transactions to selectively rename the mild cheese to medium, or the medium cheddar cheese to sharp would be allowable. Per the instructions given PRISM by the installation, however, sharp cheddar cheese would not be authorized to be renamed as mild cheddar cheese.

PRISM offers edit control for those resources whose identity may change, for any reason, from one resource to another. Each resource may contain a user-defined list of authorized changes in identity or allowable names which a resource may be changed into. A Re-Classification transaction for a quantity of a resource would then be used to rename a resource from its existing name to any one of the allowable resource names which you have predefined.

The ability to selectively control the renaming of resources incorporates procedural control within the system. A full audit trail of renaming transactions is also provided as part of transaction history in PRISM.

Inventory Location Management

A location management system within PRISM controls the storage and retrieval of inventory from unlimited storage locations. This system allows the use of random warehousing techniques to segregate and control the movement and storage of physical material.

Location Naming Convention

A ten position installation-defined location convention aids in standardizing location designations. It permits you to use your existing inventory location scheme within PRISM. This convention may be used to incorporate the physical warehouse storage layout, or any systematic warehouse locator scheme. This format is available for review during transaction entry, inquiry, and location master file maintenance. This helps prompt accurate storage location entries.

For example, a location convention might be defined such that the first position indicates the warehouse location. The next two positions might be the aisle within a warehouse. Other positions of the location convention might identify bay, shelf, and bin locations. A quantity of a material which is stored in warehouse A, bay 17, shelf B1, in bin 255 would then be "A 17 B1 255." One-time, or irregular locations, however, can use any naming convention desired.

Define a location in a manner which reflects your existing warehouse location scheme, and reduce the initial implementation effort. Changes to existing locations or additional locations may be incorporated, as storage retrieval requirements grow and change.

Default Stocking Locations

For resources which are stored primarily in one stocking location, default locations reduce the information required as part of transaction entry, as well as increasing accuracy.

When material is initially received into inventory, the stocking location must be specified at the time of transaction entry. Materials which are stored most often in a single or primary location may have a user-entered primary location in PRISM. This location will automatically appear at the time of transaction entry, and may be overridden at the time of entry, as needed.

Inventory Location Reservations

During the function of schedule release in PRISM, reservations for required materials are made for specific quantities located at specific stocking locations. A material lot at a particular location may only be reserved for one schedule, precluding the assignment of that same material for multiple purposes. Only the reserved locations for a schedule will appear on the warehouse picking list, directing warehouse personnel to pull material from specified locations. This eliminates random searching for material and assists in maintaining the integrity of the lot control system.

If material is being stored at five different stocking locations within a warehouse, and only one location quantity is required to fill the reservation of a particular schedule, the picking list will not include the other four inventory locations. This insures that resources will be taken from inventory according to the usage parameters you have selected. Material with shelf life expiration concerns will be controlled on a first-in-first-out basis. Inventory accuracy by stocking location increases, because only those reserved locations are identified for issue at the warehouse level.

Location Reports And Inquiries

PRISM offers reports and inquiries which highlight empty locations, identify all the locations for a particular material, and list all materials within a particular location.

These reports and inquiries are useful when consolidating stocking locations, expediting the retrieval of a resource which is stocked at more than one location, and cycle counting at either the resource or stock location level.

Cycle Counting Using Locations

The ability to cycle count by location provides increased inventory control. Some resources cannot physically be counted at all locations in a reasonable period of time.

In PRISM, stock locations can be an integral part of the cycle count process, allowing a single location or a range of locations to be selected for count. Separate cycle counts may then be conducted for each location, providing isolated variance reporting, simplified reconciliation, and updated count information.

When counts can be isolated within individual stocking locations, count discrepancies are more visible and can be researched at a more detailed level. Material variances are more easily traced and resolved when cycle counts are localized and of a manageable size.

Lot Tracking And Tracing

The ability to track and trace individual batches, or lots, of ingredients, intermediates, and products is a requirement of many businesses. PRISM offers complete lot control capability, from the assigning of lot numbers, to the audit and retrieval of lot control information.

Lot Control

Lot control requirements are defined at the individual resource level in PRISM, as well as within each inventory classification. When a lot controlled resource enters an inventory classification which also requires lot control, an edit function will require a lot number.

A single lot of a resource may be stored at multiple stocking locations. This allows resources to be stocked at random locations, while retaining lot control integrity. All quantities and locations of a lot will retain shelf life information.

For lot controlled resources, the lot control edit reduces operator error during transaction entry by requiring lot control information for predefined classifications, in accordance with the operating requirements of your business.

Lot Numbers

The ability to select a lot numbering scheme for system-generated lot numbers which most closely fits your business needs, guarantees the necessary degree of lot number control information, without requiring user data entry. Lot numbers may be system-generated or manually assigned and entered directly by the user, as defined at the system tailoring level. If lot numbers are assigned by the user, any numbering scheme will be accepted at the time of transaction entry. System-generated lot numbers may be selected from the following list of lot number elements:

Julian Date/Sequential Number
Year/Sequential Number
Year/Month/Sequential Number
Julian Date

Lot Tracking And Tracing

Lot tracing information may be retrieved for all lot controlled ingredients within a manufactured lot, at single or indented levels of production. Customer shipments may be traced back to manufacturing lots. Tracking lot controlled ingredients to end product production and subsequent customer shipments is provided in PRISM.

Batch/Lot Tracing

Lot Audits

Lot audits provide an additional level of lot control in PRISM. A quantity total for each lot of a resource is retained as part of history. On request, a system audit will verify that all quantities of a lot can be accounted for. An audit report provides detailed information about the quantities of a lot which have been shipped to customers or consumed by manufacturing schedules, etc. The report includes any quantity remaining in the lot. Any quantity discrepancy between the initial quantity for the lot and what can be traced through system transaction activity is highlighted.

By running lot control audits as a regular part of a cycle count program, or as required, you may verify lot related quantity totals and reconcile operational or procedural discrepancies as they occur.

Shelf Life Control

For materials which require re-inspection, a change of identity, or immediate usage, shelf life control highlights those lots which are approaching their shelf life expiration date. The ability to monitor expiration dates allows you to plan and manage lots prior to any associated action.

Notebook Records By Lot

Each inventory lot may contain a notebook record. This notebook record may be used to record lot-specific information such as quality specifications. Each notebook record contains a number of user-defined fields, with associated user-entered field descriptions to facilitate record entry. These records may be included as part of transaction entry, or may be added separately at a later date. Maintenance functions allow any additions or changes to existing notebook file records for any resource lot.

For example, Lot 1 of a material may have been received with a sample which has been sent to QA. When QA results are known, the notebook file attached to Lot 1 can be updated with QA information such as moisture content, percent solids, or any chemical or physical property which is important to the quality definition of that ingredient.

Notebook Record

Retain those lot-specific quality or specification attributes which are important to you.

Unit Of Measure Conversions

PRISM can work with multiple units of measure. As part of each resource definition, a stocking unit of measure is defined. Quantities of a resource which are purchased or produced in a unit of measure other than this stocking unit of measure are converted through the use of a unit of measure conversion table. Universal conversion factors, (eg., inches to feet, pounds to tons, and kilos to tons) are provided as standard in PRISM. An installation can add other conversion factors, as required. Conversion factors specific to a resource may also be user-defined in the unit of measure conversion table. For resources with unique physical properties or packaging considerations, any number of resource-specific conversion factors may be entered in PRISM, such as cans per case or density.

A liquid or powder material might have a stocking unit of measure which is expressed in pounds, but the resource is manufactured and delivered to inventory in terms of barrels of material. A specific conversion factor would be entered in the unit of measure conversion table which calculates the number of pounds per barrel for that liquid or powder.

Another resource might have a stocking unit of measure of cans, but the material is purchased and delivered to inventory in cases. A user-entered conversion factor would designate, for example, that each case contains eighteen cans of this product.

Conversion Table

Production formulas need not be stated in terms of the stocking unit of measure. This means no conversion of familiar formula or recipe units of measure during implementation. Manufacturing personnel can continue using the units of measure which are familiar to them.

The unit of measure conversion table in PRISM may also be used to convert a stocking unit of measure to any designated formula or bill of material unit of measure. The formula or bill of material unit of measure for a resource might be more convenient for planning or production purposes. For example, if a material is stocked in a unit of measure of pallets, but the production formula is stated in terms of pounds of the material, a unit of measure conversion may be user-defined to directly translate pounds to pallets. All references to this formulation will carry this material stated in pounds.

Unit Of Measure Conversion Factors

If a resource is purchased by the roll, stocked in pounds, and measured into production formulas in terms of inches and yards, the appropriate unit of measure conversion factors are available for use. A cycle counter would want to view variance and update reports in the stocking unit of measure of pounds on hand. A production planner might be interested in how many inches or yards of the same resource are available for a particular period of time. A buyer might choose to view the inventory on hand and on order for the resource in terms of rolls—the unit of measure which vendors supply the material in. No manual calculations are required to use quantities in the desired unit of measure.

Use any existing unit of measure which has a direct conversion factor defined in the conversion table. When defining a conversion factor from one unit of measure to another, you need not define the opposite conversion as a separate factor. When three feet is defined as equalling one yard, one yard will also be equal to three feet, as part of the same definition.

Unit of Measure Conversions

| UNIT OF MEASURE | CONVERSION FACTOR |
|---|---|
| Inches - Feet | 12 in. = 1 ft. |
| Feet - Yards | 3 ft. = 1 yd. |
| Grams - Ounces | 1 gm. = .035 oz. |
| Gallons - Pounds | ? Product Density |
| Bundles - Bags | ? Count |
| Bags - Cases | ? Pack Size |
| Rolls - Yards | ? Pack Size |

TABLE 5

Controlling Material With Varying Concentrations

Resources which contain varying potency or concentration levels of an active ingredient require an added level of inventory control. While resources with variable concentrations are issued or received in physical units through inventory, additional information is required to measure the potency of active ingredients within those physical units. Potent units are provided in PRISM to define the relationship between the physical quantity of a resource, and the percentage concentration of active ingredients within that physical quantity.

For example, suppose two equal lot quantities of vinegar are carried in separate inventory stocking locations, and each lot contains a different potency. If Lot "A" contains 200 gallons of 10 grain vinegar, and Lot "B" consists of 200 gallons of 20 grain vinegar, the number of potent units within each lot is provided as a separate quantity in PRISM. Lot "A" would contain 20 potent units of vinegar, and Lot "B" would contain 40 potent units of vinegar. These potent units of measure are used in calculating the physical units of vinegar required to satisfy production needs for each product formula.

POTENCY
Issues

Inventory

| Lot | Physical Units | Potency | Potent Units |
|---|---|---|---|
| A | 200 | 10 | 20 |
| B | 200 | 20 | 40 |

- To issue 15 potent units issue:

150 gals of A
  or 75 gals of B

TABLE 6

Production requirements for vinegar are then expressed in terms of potent units. A formula which includes vinegar as an ingredient might call for 15 potent units of vinegar per batch. Warehouse personnel issuing material against a production schedule need to know how many gallons of Lot "A" or Lot "B" will be required to supply 15 potent units of vinegar. PRISM will provide a physical quantity on the actual picking list. This informs warehouse personnel how much physical material of a stated lot to issue. If Lot "A" is selected, the picking list will require that 150 gallons of vinegar be issued. If Lot "B" is selected, the picking list will require that 75 gallons of vinegar be issued.

POTENCY
Combining Lots

Inventory

| Lot | Physical units | Potency | Potent units |
|---|---|---|---|
| A | 200 | 10 | 20 |
| B | 200 | 20 | 40 |
| Combined: | | | |
| C | 400 | | 60 |

- Add Physical and Potent Units

TABLE 7

If vinegar is stored in more than one stocking location, warehouse personnel might be required to combine the lots into one container at one location. When combining lot quantities of the same material which have varying percentage concentrations, the potent units of measure in PRISM will convert the separate physical units and percentage concentrations of each lot into potent units of the new lot. If 200 gallons with 40 potent units of Lot "A" are combined with 200 gallons with 20 potent units of Lot "B," Lot "C" will then contain 400 physical gallons and 60 potent units of vinegar.

It is important to control the storage and issue of material with varying concentrations. Personnel will no longer be required to manually calculate the concentration and quantity of each lot they relocate within inventory or issue to production. PRISM offers a high degree of accuracy and control over these variable and often expensive materials. Warehouse personnel will talk to the system in terms of physical units of a lot, and PRISM will maintain the inventory in both potent units and physical units.

Cycle Counting With PRISM

PRISM offers a full range of cycle count functions to support inventory accuracy requirements. Cycle count frequency for each material is based on a number of user-defined parameters. These are in addition to the ability to cycle count by location.

Variance and update reports provide quantity and cost detail, as well as providing statistical cycle count accuracy information.

Periodic Cycle Count

Each material may be identified as a periodic count material, and will be selected for cycle count on a monthly, quarterly, semi-annual, annual basis, or after "x" number of transactions. Any resource which contains a negative on hand balance may be added to the next cycle count. Any material may be selected for immediate cycle count, based on known or suspected discrepancies.

An appropriate cycle count program for each material may be selected, combining the requirements for accurate inventory control with a minimum amount of time and personnel investment. As control requirements change, the frequency of cycle counts at an individual material level may increase or decrease. PRISM contains the flexibility necessary to adjust cycle count frequency.

All discrepancies can be adjusted within the controlled atmosphere of the cycle count. These adjustments, made after investigation, are more accurate.

Cycle Count Control Group

The ability to monitor a small group of resources is a direct measurement of the effectiveness of operational procedures currently in place. As part of the cycle count function, a group of control items may be selected in PRISM for counting every time cycle counting occurs. Frequently counting this control group helps to identify and resolve procedural problems. Statistics on the accuracy of this control group are maintained to assist management in evaluating the ongoing accuracy of inventory figures.

Variance Reporting

Prior to updating cycle count transaction entries, variance reports may be printed as often as required during the reconciliation process. Accuracy percentages for the control group are calculated separately from other cycle count transactions.

Statistical trends are monitored separately, reflecting long term accuracy gains or losses.

Tank Measurement

Many liquid and powder resources are stored in tanks or silos. These resources are often cycle counted by measuring the height of the material in the container. This indirect measurement must then be converted to the stocking unit of measure. A calculation which includes such factors as the shape of the container and the specific density of the material being measured is used.

PRISM provides user-specified material container-conversion factors which allow a cycle count measurement to be calculated for each resource within each storage location. All the user has to do is enter the material height. PRISM allows the user to define a unique relationship reflecting the size and configuration of each individual tank. Container-conversion factors that take into account density can also be used.

Indirect Measurment

Define as many material-tank conversion factors for each resource as you require. Once this conversion information is entered, a periodic cycle count measurement as a height of product may be entered in PRISM, and the new on-hand quantity will be reported and updated in the stocking unit of measure for that resource. Manual conversion calculations are no longer required by warehouse or cycle count personnel, which increases accuracy while saving time and effort. Additionally, a complete audit trail from the physical height measurement to the inventory quantity is provided.

Production Model

ORGANIZING RESOURCES

The production model is a logical extension of traditional bills of material and the related routing required to manufacture products. It combines the necessary resource and operational information into a single model to more closely reflect the actual manufacturing process. It is similar to flow charting your production processes. The relationship between those resources which are produced and consumed, and the operational steps of the production model, enables you to directly tie each resource to its related operation(s).

The production model allows you to model by-product and co-product production flowing out of any point in the process – not just the end of the process. Production models may be defined which represent any aspect of your business. The planning, execution, and analysis of manufacturing information in PRISM matches your business requirements.

Naming The Production Model

Each production model has a user-assigned name which describes the model. This name is the key to accessing the system. PRISM accepts any alphanumeric format so that users can refer to a production model using the current terminology of your business. These descriptions will accompany all inquiries and reports which involve the use of production model information. Label each production model in terms which are already a familiar part of your business, reducing the initial implementation effort.

Production Model Type

Multiple types of production models may exist. For example, operational, costing, planning and prototype models could exist for the same production process. These various types are user-defined and assist in management flexibility. For example, standard cost could be based upon "costing" models. To avoid the accidental use of a non-operational production model type, PRISM will limit scheduled production to only selected, user-defined production model types.

Production Model Batch Size

Define a production model batch size based on the output quantity of a produced resource, the length of a shift, the amount of raw material to be consumed, or any convenient batch size which is useful to you. Implementation can follow the conventions already in place.

A production model batch for one production model might be the number of cases of a product which can be produced during an eight-hour shift. Another production model batch size might be stated in terms of the amount of raw material that can be processed in one hour. The production model batch size might also be based on the size of a vessel used in the production process.

A production model batch size is user-defined for each production model. The production unit is stated in terms of any batch size which is convenient for you, versus the traditional bill of material batch quantity of one. All produced and consumed resource quantities will be stated relative to this unit of production.

Tasks Within The Production Model

Each production model is divided into tasks. A task is the lowest level of a production model at which yield, resource production, and resource consumption information can be reported or analyzed during the production process. Each task may consist of a single operation, or a series of related operations which have been combined for reporting purposes. These operations may occur at the same or different work stations within the same or different departments. Multiple resources may be produced and/or consumed at any defined task within the production model.

Identify only those tasks which you require to maintain management control, yet combine within one task those operations which need to be detailed for scheduling purposes. This format maximizes control while minimizing reporting requirements.

THE PRODUCTION MODEL

Report intermediate production where feasible. Task reporting can be turned on or off. As more meters and process controllers provide more actual data, it can be reported to PRISM to increase your ability to analyze results.

Reportable Tasks

A task which is defined as a reportable task will require the user to directly report the actual production of resources against a schedule. Tasks in the production model can be defined as non-reportable, based on your decision or inability to directly report and measure task activity at that level.

Non-Reportable Tasks

A non-reportable task in PRISM does not require direct reporting of output information. Tasks which do not warrant direct control, or for which direct control is presently not feasible or technically possible, are defined as non-reportable tasks. Assumed or expected output information for all types of resource activity within a non-reportable task will be based on the production model standard quantities, and the actual reported output from subsequent reportable tasks, with adjustments for standard yields, if entered. PRISM will theoretically produce all defined produced resources within non-reportable tasks, generating appropriate transactions.

If one of the intermediate production tasks for a manufacturing model has been defined as a non-reportable task, when producing is directly reported against the next sequential reportable task, all activity within the non-reportable task will be system-calculated against standards which have been previously established. Actual yield information which is directly reported for the last task will provide the basis for calculating proportionate yield information, at standard, for the non-reportable task.

When a non-reporting task has activity calculated within the system for each production schedule, cost information is collected against a standard quantity expected for each resource within the production model. Through direct reporting of key tasks within the production model, enough actual production information can be collected to accurately cost each production model and schedule.

With reportable and non-reportable tasks, you can strike a balance between the value of accurate information and the cost of gathering that information.

Batch Size By Task

Include distinct batch sizes for each task with unique batch requirements. Base task batch size definitions on practical or conventional considerations which match how you actually manufacture products. Process parameters such as vessel capacity, maximum physical batch size per reaction, process time, or material handling factors might all affect batch sizing definitions at the task level.

Each task within the production model may have a distinct user-defined batch size. The relationship between the batch size for a task and the production model batch size gives the number of batches required at each task to produce the production model batch size.

For example, the production model batch size for beef soup might be defined as 1,000 cases, the amount of beef soup which can be produced in a single eight hour shift. The task batch size for the cooking task might be defined as 500 gallons, based on the size of the cooking vessel used. The number of batches at the cooking task which are required to produce 1,000 cases of finished beef soup is calculated as part of the task definition. All future production schedules which are expressed in terms of the production batch size "cases of beef soup" will be translated into the number of 500 gallon batches for the cooking task.

Additionally, resources which are required for production may be expressed as linear or batch (step function) resources. A linear resource quantity will be affected by the actual batch size being produced. A batch resource requires a fixed quantity for each production batch, regardless of the actual batch size being used.

For example, water might be a linear resource for the cooking task for beef soup. The amount of water being added to a batch of beef soup will be dependent on the actual size of the batch being produced. A batch of 500 gallons of beef soup would require one amount of water, while a batch of 450 gallons of beef soup would require less water.

The number of process minutes for the cooking task might be a batch or step function resource. For example, each batch of beef soup must be cooked for 30 minutes. Regardless of batch size, the number of process minutes for a batch of 450 gallons and 500 gallons of beef soup is the same.

Batch (step) vs Linear Run Time

THE PRODUCTION MODEL

Consumed Resources

Any element of production which is used up as a result of the process would be considered a consumed resource. Resources may be consumed at any and all tasks within the production model. A resource may be both consumed and produced at more than one task or at the same task within the same production model.

Information for consumed resources at a task might include the usage of balance or consumed resources such as labor, machine hours, material, and utilities.

Produced Resources

Any number of resources may be produced at any and all tasks within each production model. The same resource may be produced at more than one task within a production model. A resource may be both produced and consumed within the same production model or task. This permits the planning and costing of recycled materials.

THE PRODUCTION MODEL

Understanding the interrelationships of all produced resources within each production model helps in identifying the levels of control which will be required within each task to cost and manage resources.

By-Products

A by-product resource has some economic value, but is produced incidentally or as a residual product of the production process. Often, the value of a by-product is set by the marketplace. By-product quantities and related costs might require tracking and control.

Traditionally, the concept of by-products has been applied to materials in the process industries. However, by-products are present in many types of industries and apply to resources other than materials.

Residual steam or heat may occur as a result of a production process and may have some value. It would not be considered one of the primary products of that production model. The value of the steam or heat which is produced might be credited against the appropriate production model, and the quantity produced might be controlled and used as available utilities elsewhere in production. They will be tracked by PRISM, including accounting control for the economic value of the heat or steam.

Reusable containers which may be recycled after the material has been removed might be another example of a by-product resource. These containers have value, and can be reported and credited against the production module on which they occur. Residual by-products such as these have value and therefore require control and reporting as they occur. Maintain accurate inventory levels for by-products, providing visibility for planning.

The production model will identify any number of by-products at any and all defined task levels. Identify and control by-product quantities and costs, crediting the value of resources directly against the actual cost of production.

Waste

Waste products may be produced at any or all tasks within the production model. A waste product is defined as any produced resource with zero or negative value. A waste product would be residual or incidental to the production process.

The ability to manage waste allows you to include all elements of the production model in the planning, costing, and scheduling process. If waste resources are significant considerations of your business, incorporate them into the production model wherever they occur.

An example of a waste product might be cardboard packaging material which is discarded as material is used in the manufacturing process. If the value of the recycled cardboard is negative, that is, it costs you money to dispose of it, it would be considered waste. The quantity of cardboard would still be controlled, for purposes of charging the cost of waste disposal to the production which produced the waste, as well as for purposes of monitoring how much cardboard is being delivered to the recycling vendor.

Co-Products

Resources which are produced together and have relatively equal economic value are defined as co-products.

Co-products may be produced together as a matter of convenience. For example, a toothpaste manufacturer might produce 1-, 2-, and 3-ounce tubes of toothpaste as part of the same production model. The three package sizes would be considered co-products within the production model "Toothpaste."

Co-products may also be a standard production result of the manufacturing process, where one resource is manufactured and another resource is always produced. A cheese manufacturer always produces milk whey as part of the production process for cheese. This whey might be sold as an end product, or used in the production of other milk-based products. Whey would be considered a co-product of the production model for cheese, and would be included in the marketing forecast as an expected revenue potential product.

Co-products might also be produced together because they are sold together, and the quantities required of each are proportionate to one another. Two part epoxy glue might be an example of co-products which are manufactured together because marketing requirements are equal.

Another example of co-product resources might be a disassembly process, such as sawing trees in a lumber mill. As a result of the production process, several sizes of lumber are produced, as well as sawdust and wood chips. If all of these resources have relatively equal revenue potential, and are included as part of the planned revenue of the business, they would be considered co-products.

Recycled Material

Resources which are both produced and consumed as part of the same manufacturing formula are defined as recycled materials. Recycled material may occur at any and all tasks during production. PRISM handles this difficult requirement, allowing you to manage and control materials which are ingredients and products of the same process.

A carrier solvent which is used for transporting other production ingredients might be recycled through the manufacturing process. A cleaning solution would also be an example of a material which is a necessary ingredient to production, and which might be produced as a recycled material.

The Production Model

Yield

Included within each production model are standard yield percentages for each task in the model. Yield is defined as the difference between the quantity entering a task, and the quantity leaving that same task. The quantity lost or gained cannot be directly measured, and may be due to the quality of a chemical reaction, moisture evaporation, the viscosity of a liquid within a vessel, temperature, or any other unique resource property.

Standard yield percentages may be used as a basis for comparison during actual production. Yield history will be accumulated for production schedules as average historical yield figures and as standard deviations.

For example, in making tomato soup, 1000 gallons of soup might be placed in a vessel and cooked for 15 minutes as part of the production process. The amount of soup which is removed from the cooking vessel and taken to the next task is 900 gallons of tomato soup. The 100 gallons missing after the cooking process cannot be directly measured. It is determined indirectly. The difference between a quantity entering a task and the resultant quantity which leaves that task is defined as the yield loss for that task. In this example, the yield at the cooking task is 90%. The yield loss would then be calculated as 10%. An additional loss of 90 gallons at a second task produces a total of 810 gallons of tomato soup, for a 90% yield at the second task.

Scrap is distinguishable from yield in that scrap is material that is directly measurable and does not meet the specification for salable products. Planned scrap, for example, can be included in the production model as a resource. Unplanned scrap is off-spec material which is not usually produced. Unplanned scrap is handled through scrap transactions.

Separating scrap from yield provides reporting visibility of different manufacturing problems. Reporting will isolate material scrap as one situation and yield as another. Scrap and yield information will be available at the task and production model schedule levels.

Multiple produced resources within the same production model task can be expressed relative to one another, even when the produced resources cannot be stated in the same unit of measure.

Production Distribution Percentages

For production model tasks with multiple produced resources, production distribution percentages are used to assist in production planning, particularly when they have different units of measure. Each produced resource within a task is assigned some percentage of the possible production output (100%) for that task. Regardless of the unit of measure and quantity of produced resource coming from that task, a relative standard percentage for each resource represents the expected distribution of product. As actual production is reported from each task, those resources which are being theoretically consumed will be relative to these standard distribution percentages.

For those multiple produced resources within the same task which contain the identical units of measure, assigned distribution percentages make it possible to plan the output of all other resources, based on a given quantity of one produced resource.

If the last task of a production model produces two different items as a standard part of production, production distribution percentages will be assigned to each item. If 40% of production will be pounds of Product "A," and 60% as cases of Product "B," these percentage factors are entered in the production model. These standard production distribution percentages will provide a basis for comparing the actual distribution of output from each task.

Production Distribution

Dependent Production Models

A production model may have any number of dependent production models associated with it. These dependent models are used to retain exception information based on the primary production model. This means that you don't have to enter, maintain, or store the full detail of each dependent model. Minor variations in similar recipes, formulas, or production methods can easily be managed through the use of dependent production models.

If the standard formulation or process changes for a particular product, you need change only the primary model, and all dependent models will also reflect that change. Any maintenance to the primary production model will be updated for all existing dependent production models.

Each dependent production model provides a maintenance link between the primary model and any detailed changes or deletions of exception information for that dependent model. Any dependent production model may be scheduled and will function independently of the primary model for purposes of production scheduling, resource allocations and reservations, and product costing.

The ability to link dependent production models to a primary model enables you to quickly develop alternate processes without the effort of full data entry. Dependent production models might be linked to a primary model to provide multiple alternate formulations when the same product is manufactured on more than one production line. Each dependent production model might represent the individual quantity requirements for that production line, such as utilities usage and the number of machine-hours required.

INDEPENDENT DEPENDENT

Planning and simulation production models might also be designed using dependent production models. These planning or simulation models would never be used to manufacture product, but would be useful in making sound manufacturing decisions such as which line to manufacture a product on . . . or they may be useful in determining the usage or capacity requirements for a resource on one line versus another.

When creating a dependent model, enter only the exception quantity information, and delete any consumed resources which are not required. This saves time and effort, as well as increasing the accuracy of dependent model information. The primary production model will not be affected.

To create a dependent production model, begin with the required resources for all defined tasks and operations in a primary production model. Enter only the exception information for each related dependent model and note all resource requirement changes or deletions which distinguish the dependent model from the primary model.

Primary and dependent production models may be used to provide planning and scheduling visibility of approved production alternatives, as well as to improve planning flexibility.

Production Model Entry Capability

The same-as-except capability for production model entry increases operator efficiency and accuracy. Similar production models provide a base for new model entries. Automatically copy all resources, operation, and task information, and maintain any and all fields required.

PRISM provides you with the ability to create new production models from existing primary production models. Same-as-except entry capability allows you to copy an existing model. Make any additions, deletions, and changes at the resource operation and task levels and create a new production model. Once the copy procedure is completed by these two models, the new production model appears to PRISM as though it were keyed in independently.

If, for example, you have an existing production model for manufacturing chocolate chip cookies, you might want to introduce a new product called peanut butter cookies. You might use the same-as-except entry capability in PRISM to copy over the production model structure and information for chocolate chip cookies into the new production model called peanut butter cookies. You would then enter the new ingredients, deleting or changing existing ingredients, as required. If the new production model has an extra task and additional operations within existing tasks, you have the ability to incorporate all additions, changes and deletions into the new production model.

Documentation Print Codes

As production schedules are released in PRISM, documentation requirements will be provided from the production model. A user-defined documentation location code associated with each resource directs PRISM to group items on separate pick lists, providing individual pick lists to different areas of the plant.

For example, separate inventory picking lists for the same schedule might be required to print for different physical sections of the warehouse. Only those items which are to be issued from a particular section of the warehouse will be printed on respective pick lists.

Directing production documents to their required locations provides routing control of production information. Picking list and operational instructions will be routed to a specific location, as defined by the user. Warehouse personnel efficiency will increase, eliminating unproductive searches for material which is stored in another warehouse.

Production Schedule Control

Manufacturing control systems have traditionally utilized manufacturing orders. Each manufacturing order contained a specified production quantity, with associated start and due dates for a single product. Those products which were manufactured at a continuous rate required multiple and arbitrary manufacturing orders for production reporting and material issue control. Opening, maintaining, and closing the resultant volume of orders required an excessive amount of time and effort. Additionally, allocations for orders were not time-phased. That is, all material for an order was considered to be due on the first day of production for the order.

PRISM has been designed to control all production requirements through the use of production schedules. Each schedule may contain multiple products. Multiple releases on any schedule can be opened and managed, facilitating analysis of daily production on long-term production runs. Any number of schedules may exist at one time. On any schedule or schedule release, more than one production model can be named, in effect, "scheduling" various departments or lines under one control number.

Open

When a production schedule is first entered in PRISM, the schedule is said to be "open". At that time, the user is asked to enter start and stop dates for the schedule, identify all production models which will be included in the schedule, and anticipate the projected quantity for each production model. Each production model within the schedule may have multiple releases, which are identified by specific quantities and dates.

All consumed resources which required elements of production are allocated at the time a schedule is opened. This allocated demand is expressed in quantities of a resource, with required dates of expected usage based on schedules. These time-phased requirements provide both detailed and summary availability information for individual resources. In addition, they also provide availability information about each schedule and release.

For those consumed resources which contain inventory balance information, allocations for all scheduled production are netted against projected on-hand and on-order (both purchased and produced) quantity information. This provides detailed Available-To-Promise inventory projections. In this way, potential material shortages can be identified by quantity and date prior to actual production.

Available-To-Promise

Balance Resource

| Day | 1 | 2 | 3 | 4 |
|---|---|---|---|---|
| Starting Inv. | 90 | 70 | 40 | -30 |
| Req'd A | 20 | 0 | 30 | 0 |
| Req'd B | 0 | 30 | 40 | 0 |
| TOTAL | 20 | 30 | 70 | 0 |
| P/O | 0 | 0 | 0 | 50 |
| A-T-P | 70 | 40 | -30 | 20 |

TABLE 8

Material requirements may also be traced to the schedule which will consume them, allowing the user to make accurate planning decisions about the allocation of a potentially unavailable resource. For those balance resources with less allocated demand than available on-hand or on-order inventory, this Available-To-Promise information might also be used to defer or cancel the projected production or purchase of these resources.

Resources which will be consumed within a schedule, but which do not have on-hand or on-order balances (e.g., process hours), also contain valuable Available-To-Promise information for all open schedules. By totalling the daily requirements for consumption resources such as capacity, electricity, or labor hours, the summary demand or load for each day is available for comparison against the known capacity for each day for each resource.

Available-To-Promise

Consumption Resource

| Day | 1 | 2 | 3 | 4 |
|---|---|---|---|---|
| Req'd A | 10 | 10 | 10 | 10 |
| Req'd B | 10 | 8 | 15 | 14 |
| TOTAL | 20 | 18 | 25 | 24 |

table 9

If, for example, the required number of capacity hours needed in a day for Machine A between two production schedules totals 25 hours, this demand information is provided by schedule date in PRISM. This daily total requirement may then be compared by the user against the actual hours of available capacity for Machine A during the indicated 24-hour period. Resources which exceed their daily available capacity or consumption usage may require changes in existing schedules prior to production. Detail and summary Available-To-Promise demand information is provided for consumption resources by date and quantity for all open schedules. This will assist in resolving these capacity issues.

Each individual release within the production schedule provides isolated reporting and analysis. Review actual costs, yield, resource usage information, etc. for a schedule release, isolating daily or weekly run performance rather than the total production run performance.

Additional informational fields are available during the opening of a schedule. A reference number field is provided for user-entered control numbers which might, for example, be used to track a specific contract order over multiple production schedules.

The reference number field may be used to group together those schedules for which you want collective production-to-date reporting information. Use any existing numbering scheme, or select control numbers which will be useful to you when requesting reports about related schedules.

For production models which are always planned and executed simultaneously, PRISM provides you with the ability to link these production models together when opening a schedule. For example, if the production schedule for chicken noodle soup always consists of departmental production models for cooking the chicken, preparing the spices, and cooking the noodles, these production models might be linked together in PRISM. Each time a production schedule for chicken noodle soup is entered by the user, these related departmental schedules are automatically opened by the system.

All related schedules will be included with the entry of a single master production schedule. Predefined links between production models insure that all related production will be included automatically when a schedule is opened. Schedule entry efficiency and accuracy is greatly increased.

Releases may be propagated during production schedule entry in PRISM. Date and quantity information can then be adjusted for each release or schedule.

For products which are produced on an ongoing basis, automated release entry reduces the time and effort required to open new schedules, while increasing accuracy.

When a series of releases must be entered for a schedule, enter the first release and propagate all other releases for that schedule. Minimize data entry requirements, while increasing efficiency and accuracy.

Launched

All or some segment of a production schedule is launched just prior to beginning actual production. An entire production schedule may be launched, a specific release of an open schedule, or an individual task within one release of a schedule.

A schedule with multiple releases may be launched one release at a time, based on the interval between production dates associated with each release. A single production task within a release might also be launched separately, to prevent the reservation of resources prematurely. A cheese manufacturer, for example, might identify several production tasks within the same model which occur weeks or months apart, during the aging process for making cheese. Each task would be launched just prior to actual production requirements for resources.

At the time that a schedule, release, or task is launched, resource allocations are translated into actual resource reservations for the released portion of the schedule. Quantities of on-hand inventory at specific stocking locations are committed to a particular production schedule, and may not be reserved for any other use. If the resource being reserved is a lot-controlled resource, a quantity of a specific lot at a specific stocking location will be identified for issue.

In tailoring, the installation can define how on-hand inventory resources are to be reserved for production schedules. Resource reservations may be based on FIFO inventory receipts, revision level/FIFO receipts, and smallest quantity at a location which will fulfill the schedule requirement. Specific locations of a resource may also be selected for use first, regardless of their date received into inventory, by notifying PRISM of the priority associated with the location. For example, a particular lot of a material at a specific stocking location might have quality-related considerations, (e.g., high moisture content) which require that it be used as soon as possible. This quantity will be selected for next schedule use, disregarding FIFO considerations for the item.

Inventory reservations against specific on-hand stocking locations prevent the same material from being committed to more than one schedule. This insures that the "double selling" of an item to two schedules, two customers, or to both a schedule and a customer will not occur.

Warehouse personnel are directed to a particular location for a specific lot and quantity of a resource. The picking list specifically designates these locations, lots, and quantities. This helps to insure the accuracy and lot integrity within multiple locations of inventory resources, and cuts down on time-consuming searches through the warehouse for material.

The ability to prioritize quantities of material stocked at multiple locations in inventory for use in production based on some factor other than FIFO enables you to control quality exceptions as they occur.

Inventory picking lists print when a production schedule is launched. These inventory picking lists may be reprinted on demand. Picking lists can be sequenced by the user-defined documentation code. For example, picking lists for multiple schedules which are launched at the same time might all be grouped by physical warehouses A, B, and C.

By combining and routing the picking list documents, warehouse personnel can better schedule and prioritize their work load requirements. All picking lists which pertain to a particular physical area can be aggregated.

Running

A production schedule release is considered to be active or "running" when transaction activity is reported against it. A release or an entire schedule will remain "running" for any length of time, regardless of the expected stop date, or reported produced quantities. All resource activity is tracked and reported through the entire production process in PRISM, whether transactions are reported directly or indirectly. Production information for any active schedule or group of schedules is available at any time. Production information may be reviewed in a daily format, or for any requested period of time (week, month, etc.).

Use the schedule reference number to group schedules together for reporting purposes, or select one schedule for informational reports. Review all activity for a schedule for a single day, or request cumulative schedule information, as your business requirements demand.

Completed

You may complete any schedule short or in excess of the scheduled quantity. When a schedule is completed short, all unused resource reservations will immediately be released, and will be considered available for production planning and scheduling. Completing a schedule which is no longer in production prevents the accidental issue or receipt of resources against a wrong schedule. Adjustment transactions may still be entered. These may be restricted through security to selective production and cost accounting personnel.

Any schedule may be extended beyond its original completion date. This permits you to reflect the dynamics of the manufacturing operation in the formal system.

When all production activity for a schedule has ceased and all related issue and receipt transactions have been entered, the user reports the schedule to be completed. No further production transactions may be entered against a completed schedule. Only adjustment transactions will be allowed by the system. Information is available for completed schedules, showing actual versus standards. Any reserved resources which have not been used against the schedule will be released for reservation and become available for use against other schedules at this time.

Closed

When all adjustment transactions have been entered for a completed schedule, the schedule may then be closed. No transactions are possible against a closed schedule. All schedule-related information becomes a part of schedule history and is available for inquiry and report review when closed schedules are purged by the system operator.

A variety of information must be collected to fully control the manufacturing function. Different types of information must be collected with different methods,

Transaction Activity Within The Schedule reflecting the trade-off between the value of the information and the associated cost and difficulty of collecting the information. Therefore, PRISM provides a variety of methods for collecting this information.

• Direct Issue

Maintain strict control of those consumed resources which are of high value or present management with control problems by directly issuing them to the production schedule. Retain lot control integrity of each lot issue. Maintain precise inventory levels.

Direct issue transactions reflect resource consumption against a production schedule. These transactions record specifically reported actual resource use, tying specific lots and quantities to respective schedules. A resource may not be both theoretically consumed and directly issued against a schedule.

Theoretical Consumption

Theoretical consumption transactions indirectly reduce on-hand quantities record-consumption and apply the cost of resources to the schedule for selected resources. The theoretically consumed quantity is calculated, based on reported production and the standard quantity per unit, for the consumed resources on a schedule. All resources authorized for theoretical consumption within a production model will be theoretically consumed down to the next reportable task. If all tasks except the last task are non-reportable, all authorized consumed resources on the production model will be theoretically consumed.

An example of a theoretically consumed resource in making soup might be salt. Salt is a relatively low cost item. Each gallon of soup reported complete from the cooking task will generate a theoretical consumption transaction which issues a proportional amount of salt, at standard, from inventory. Examples of non-balance resources theoretically consumed could be steam and electricity.

Those resources which have a low value, are consumed in volume, or are difficult to report might not warrant the cost of control which is associated with direct issue transaction activity. These resources will be system-issued in proportion to each production receipt quantity, and the related resource quantity required per production unit. A significant amount of data collection and entry time and effort is saved for those resources. Actual production variance information can be reported on an exception basis, bringing inventory levels into balance with actual quantities consumed. These adjustment transactions also allow resource quantities and costs above and beyond schedule requirements to be charged directly to the schedule on which they occur.

Resource adjustment transactions are also provided in PRISM. These provide the user with the ability to adjust the consumption of resources when scrap, long term rework, or unplanned yield loss/gain occur. No direct reporting transactions are possible for theoretically consumed resources.

Inventory reservations for on-hand resources which are to be theoretically consumed against a production schedule identify which lot and/or location the resource is to be consumed from. Resources which are to be theoretically consumed are printed on the picking list, directing warehouse personnel where to locate the resource and when it is required for production. They will be delivered to production, but the pick list will flag them so that they will not be recorded as direct issues. At the time a theoretical consumption system transaction occurs for a resource, on-hand quantities will be consumed from these reserved locations only.

In this example, where "C" is a theoretically consumed resource, a particular lot quantity of "C" at a specific stocking location is reserved when the schedule is launched. Warehouse personnel will be directed to that stocking location when bringing "C" to the production line. No direct issue transaction will occur at the time "C" is removed from stock. When a quantity of "X" is reported complete, a proportionate quantity of "C" will be issued from the appropriate reserved inventory stocking location.

Theoretical Consumption

Non-material resources may also be theoretically consumed. For example, process hours, utilities, or labor could be theoretically consumed. This permits the application of non-material cost elements to be attributed to a specific schedule instead of treating these items as part of overhead.

The theoretical consumption of non-balance resources will permit the treatment of selected elements of cost usually treated as overhead, to be directly applied to the cost of production. These cost elements represent the variable cost segments of overhead.

Production Receipt

Production receipt transactions reflect actual lots and/or quantities of a produced resource being received against a production schedule and its quantity. A directly reported produced resource may not also be theoretically produced.

Collect actual quantity information for each production schedule. Maintain a high level of control over directly reported produced resources.

Theoretical Production

Allow the system to calculate the production of low cost by-products and waste products without the added cost of transaction control for each individual production receipt. Theoretically produce a resource at any task in the schedule on which it occurs.

Theoretically produced resource transactions increase on-hand inventory quantities and/or consumption history based on the production of some intermediate or end item resource and the predefined produced quantity per unit of production for that production model. When the directly reported resource is received, a theoretical production transaction generated by the system also receives the theoretically produced resource. No direct reporting transactions are required for a theoretically produced resource. Resource adjustment transactions are also provided in PRISM, to compensate for known discrepancies due to scrap, rework, yield loss/gain, or production distribution.

THEORETICAL PRODUCTION

As part of a production schedule for making clam chowder, one task might consist of taking the clams out of the shell. Clam shells could be identified as a theoretically produced resource at this task. For every pound of clam meat which is directly reported as received, a predefined number of pounds of clam shells might also be produced and reflected by a system generated receipt transaction.

Non-material resources may also be theoretically produced, for example, steam or heat. Planning is able to anticipate a standard quantity of BTU's of heat being generated by production. This information would aid in analyzing the capacity of a work center to use or dissipate heat.

Spotlighting

The manufacturing concept of Just-In-Time (JIT) teaches us to eliminate or minimize waste. Waste are all those activities that do not add value to the product. All reporting systems are therefore waste and should be minimized or eliminated under JIT. The idea of minimizing reporting will lead to the conclusion that the minimal reporting requirement for JIT control should be the reporting of good product produced and none other. The combination of Theoretical Production and Theoretical Consumption within PRISM will permit this high level of JIT control.

THE PRODUCTION MODEL

Allowing theoretical transactions within a schedule requires that all production standards are correct. As schedules are released and resources begin to be theoretically produced and consumed, you may suspect that the standard resource quantities or times you have entered are inaccurate, or that there are other reporting and procedural control problems.

Within PRISM, a "spotlighting" capability allows you to turn on and off the theoretical consumption indicators within a production model task or for a specific resource. By directly reporting actual activity within a schedule, you can discover and correct the root cause of the problem, whether it be inaccurate standards, unreported scrap, unreported usage variances, etc. Spotlight monitoring within a task or for a specific resource can be turned off when the problem(s) are solved, allowing theoretical transaction activity to resume.

Spotlighting can also be utilized as a roving audit function to continually validate the quality of the system and to seek out areas for improvement. This "roving spotlight" can be a major tool in fine tuning the production process. High value resources may deserve a continual spotlight to insure the quality of reporting dictated by the value of the material involved.

Use spotlighting to find the causes of discrepancies in resources which are being theoretically produced or consumed. The ability to turn on and off direct reporting against any task or resource within a schedule allows you to audit your

Cost of Control reporting systems on an exception basis. The cost of control is consistently lower when utilizing spotlighting techniques, as opposed to directly reporting all resource activity for a schedule.

Authorized Resource Substitutions

Control the issue of substitute resources which have been authorized for use. Integrate all product-related information within one system, removing the need for external manual controls of exception activity. Allowable substitutions may be temporarily approved substitutions, or permanently authorized resource equivalents. Identify substitution resources, with or without date parameters, and all transaction activity for a schedule will be edited against this list.

It is possible at the time of launching a schedule that there are insufficient quantities of a resource. But this required resource may have allowable resource substitutions. Each resource can be linked with user-maintained, authorized resources which can be substituted when the primary resource is unavailable. These substitute resources may contain start and stop effectivity dates of authorization. This allowable substitution list will serve as a system edit check whenever a resource substitution is made. If a resource which has been substituted against a production schedule is not authorized, a warning message will appear at the time the transaction is attempted.

A manufacturer who uses corn syrup in a production model to make an apple-flavored drink might authorize sugar or fructose as allowable substitutions. If corn syrup becomes unavailable, a transaction would be allowed to substitute sugar or fructose usage on a schedule. If, however, they attempted to issue maple syrup to this schedule, a warning message would indicate the maple syrup is not an authorized substitution.

Graded Materials

Some materials have such a wide spectrum of quality specifications that multiple grades of the same resource may be carried in inventory. While all quantities of a resource may be considered on hand and acceptable for production use, there may be a hierarchy of preferred grades for certain production models. Although all quantities of a graded material are carried under one resource name, the quantity by grade for each individual lot will be uniquely identified and controlled within PRISM.

For example, a soup manufacturer might inspect red beans for color and appearance. Grade 1 red beans might be the highest quality beans, with no imperfections in size or color. Grade 2 red beans might have color imperfections, but remain uniform in size and shape. Grade 3 red beans might have both color and size imperfections, but are still of an acceptable quality level to be used in some production. Grade 3 would be used only in soups, whereas Grade 2 would be used in bean salad, and Grade 1 would be used in "bean pack." All three grades will be controlled by lot and quantity within the resource name "red beans." The priority in selecting lots for soup would be Grade 3, while Grades 2 and 1 may be acceptable. Bean pack would call for Grade 1 beans with Grades 2 and 3 not being acceptable.

Each production model will reference this grading information, defining the acceptable or preferred grade(s) to be used. Quantity requirements for each resource grade within each model will be available as part of production planning information.

A downgrading template defined within PRISM for each resource identifies the multiple grades of the same material. This template also identifies all allowable substitute grades of the same resource which may be used in place of each individual grade. This template will be used by the system as an edit against issue transactions for substitute grades of a resource.

Define those graded materials which best help you utilize and control your resources. Assign specific grades of a resource to those production models which can best use the material. Identify those allowable grade substitutions within each individual resource, building into PRISM a level of control which matches your policy and procedural decisions.

Graded Products Classification

Schedule Comments

One-time instructions can be made a formal part of your schedules. Any active schedule may have unlimited user-entered comments associated with it. These comments will be retained during the life-cycle of the schedule, for informational purposes.

Costing

PRISM provides full costing support for every aspect of your manufacturing process. Cost information is available at the individual resource level, within the production model, and as a part of actual production schedule analysis.

Valuing Your Inventory

Four distinct types of cost information are associated with each resource in PRISM. The ability to value inventory more than one way allows you to achieve your costing objectives. Whether you want analysis reports or simple visibility of cost-related information, PRISM provides the following costing methods:

Last Completed Period Average Cost or Last Cost

This cost field is system-maintained, and will be updated in PRISM each time an accounting period is closed. The last cost figure associated with each resource contains the average unit cost from the most recently closed accounting period.

Historic Cost

With each transaction receipt, a new historic cost is calculated in PRISM. This historic cost is system-maintained and provides, over time, a meaningful overall average cost figure for each resource. This long range visibility is useful, for example, when comparing current or recent period trends in purchased material.

Average Cost

An additional cost field in PRISM utilizes a user-entered Alpha factor in calculating an exponentially smoothed average cost per resource. This Alpha factor helps to compensate for temporary swings in resource costs which can distort changes in cost trends. The average cost for each resource is calculated by the system and updated with each transaction receipt. Average costs which are tempered in this way are useful in isolating true cost trends versus extreme cost fluctuations.

Standard Cost

A user-maintained standard cost is associated with each resource. For purchased resources, the standard cost reflects the normal expected cost of procured material. For manufactured resources, the standard cost might be an assigned cost based on the net realizable value of the product. It might also be directly related to the operational cost of producing the product as calculated in a cost roll-up routine.

Last cost, average weighted cost, and historical cost information could be reviewed when establishing these standards.

These costing methods help you in identifying price change trends over short, intermediate, and long time spans.

Modelling Product Costs

Cost information about each manufactured intermediate or end item product is available as part of the production model definition in PRISM. The following techniques are available for costing production models:

Product Cost Roll-Up

In PRISM, all defined elements of each production process, such as machine hours, utilities, labor, and material can be identified as consumed or produced resources. That means that costs which were previously considered variable overhead costs can now be defined as resources. And they can therefore be included as direct costs against their related production models.

Those costs which were previously lumped into overhead accounts are now visible elements of the unit cost and can be broken out into class, sub-class, and individual resource categories. The remaining overhead costs can be divided into fixed and variable overhead costs. Further, fixed and variable overhead costs can be subdivided into related expense pools. And these pools can be applied across all production as a smaller burden percentage. Each expense pool can be distributed through a resource which is logically linked to the reason for the expense. Product costs become more precise.

The total cost of production for each model will directly reflect all resource costs, as well as fixed and variable overhead costs. These detailed costs will be rolled up according to user-specified parameters during a product cost roll-up. The cost information gained from this method provides a very accurate basis for establishing standard costs and selling prices for produced resources.

COSTING

Product cost roll-ups may be performed using standard, last, average, or historic cost information for resources. Detailed cost information about the product cost roll-up will be available at both the class and sub-class reporting levels. As part of system tailoring, the user may determine whether the costs associated with lower level resources will be carried to the next highest level as a combined resource cost, or as separate cost elements, by resource class and sub-class.

Select to roll standard cost as a total "material" cost to higher levels, or retain class and sub-class cost distinctions. In this way, you can see total utility costs in end items as the sum of utility costs at each level, rather than only the utility costs for the end item production.

Product cost roll-ups provide information critical to the establishment and review of standard costs for manufactured resources.

Production model cost information by resource class and sub-class allows you to move some overhead dollars out of distributed costs and calculates them as direct or assigned costs. This minimizes the overhead pool and increases the quality of cost data.

Multiple fixed and variable overhead rates allow a more meaningful distribution of overhead expenses. Overhead rates can be expressed as a percentage of direct cost or as a dollar amount per unit of the associated direct cost resource. Any and all resources on a production model can have fixed and variable overhead rates associated.

The ability to value consumed resources at standard, last, average, or historic costs when rolling up product costs allows you to identify and analyze the effects of price trends and temporary fluctuations in product costs.

In requesting a cost roll-up, the user may select all production models in the system, all uncosted production models, or individual production models. Processing time is reduced by selecting only those models for cost roll-up which are of interest to you.

COST ROLL-UP

| Resource Class | Direct Cost | Fixed Overhead | Variable Overhead |
|---|---|---|---|
| Utilities | $1000 | $ 200 | $ 600 |
| Plant & Equip | 1200 | 1400 | 600 |
| Materials | 600 | 0 | 200 |
| Labor | 100 | 100 | 100 |
| | ------ | ------ | ------ |
| Total | $2900 | $1700 | $1500 |

TABLE 10

By-Product/ Co-Product Costing

The traditionally structured bill of material permits only one end product to be identified as expected output per bill of material. The entire cost of production is therefore assigned entirely to the single produced end item. In PRISM, however, each production model may contain any number of produced resources, and these resources may occur at any and all tasks within the production model. When a production model contains multiple co-product, by-product, or waste resources, two costing options are provided.

Cost Distribution

Cost Distribution Percentage

A cost distribution percentage is user-assigned for each intermediate or end item produced resource within each production model task, and may be equal to or different from production distribution. The total of all cost percentages within any task will always equal 100%. These percentage factors will be used to distribute rolled-up cost totals between produced resources from each production task.

Assigned Cost

Using the assigned cost and/or cost distribution percentage techniques to cost multiple produced resources, PRISM provides you flexibility in costing actual production activity, as well as establishing cost standards for each multiple produced resource.

A cost may be directly assigned by the user to one or more produced resources within each production task. This cost is typically determined by factors beyond the control of operations. A product with an assigned cost might have a fixed market price, or net realizable value, which is controlled by the current sale or disposal charge for that product. PRISM will apply these user-assigned costs as direct debits or credits against the rolled-up cost associated with the output from the previous task. The remaining output cost will then be applied proportionately to the predefined cost distribution percentages for the remaining produced resources from that same task.

A production model, used for financial modelling, might consist of a single task. The task might be processing peanuts. There are three resources produced from this task. They are salted peanuts, plain peanuts, and peanut shells.

Peanut shells might have a user-assigned cost of $4.00 per pound. Salted nuts have a cost distributed percentage of 75 percent. Plain roasted nuts have a cost distribution percentage of 25 percent.

A cost roll-up for this production model might show that when standard production catch of 150 pounds is processed, $480 in production costs needs to be applied to three produced resources. The assigned cost of the peanut shells would first be calculated by multiplying the number of pounds of peanut shells and the cost per pound which has been user-entered. If 20 pounds of shells are produced and are valued at $4.00 per pound, $80 would be the assigned value of peanut shells. This amount would then be deducted from the total production cost of $480. Seventy-five percent of the remaining $400 would be applied to the cost of production for salted peanuts and 25% to the cost of production for plain roasted peanuts.

Assigned Cost

Recycled Material

Some manufacturing processes allow re-use of material during production. Additional new or "unused" quantities of the same resource may be required to provide a sufficient amount of the resource to continue production. The cost of these recycled resources can be addressed within PRISM.

For example, 100 gallons of a carrier solvent material might be issued to production, and used during the manufacturing process. At the end of production, 90 gallons of recycled solvent might be captured and re-introduced for a new production batch. An additional 10 gallons of virgin solvent material must then be issued from inventory, to meet the next production model total batch requirement for 100 gallons of carrier solvent. The production model would be defined to include separate costs for the virgin carrier solvent and the recycled carrier solvent. The virgin carrier solvent would comprise 10% of the total cost of solvent for this production model, with the remaining 90% coming from the recycled quantity.

Recycled Material

Using recycled material as part or all of the quantity required for production may increase or decrease overall production costs for that model. The ability to assign a cost ratio for virgin and recycled quantities of a resource allows you to include the cost of recycled material in the production model.

Production Model Type

As part of the production model definition, a production model type may be user-defined. Production model type codes provide you with visibility between models which are created for operational production, cost simulation, prototype design, planning, or any other user-specified need. As part of the model type definition, you specify whether or not the production models within each type are allowed for actual use as part of a production schedule. This assures, for example, that financial or prototype production models will not be used to launch schedules for actual production.

Define, for example, a financial production model type. Financial models may be created to help establish and review standard costs independent of operational production model information. These models will not be used during resource planning or actual production, and may be designed in any way which will be useful to your business.

A prototype model type might be defined, which allows you to simulate the design of a new plant or production line. In this way, existing production models may be used for planning and design purposes without impacting actual models used for current production.

Indicate the preferred production model type when requesting reports or product cost roll-ups. Select those model types which contain the information you desire.

Simulation

Simulated cost roll-ups are available in PRISM, allowing you to review product cost roll-up information before actually updating financial or operational production model information. Simulated cost roll-ups allow you to view the impact of future considerations prior to implementing them. Variable percentage factors may be entered for resource classes, sub-classes, individual resources, and fixed and variable overhead rates. Variable dollar amounts may also be directly entered for individual resources, as well as overhead rates. Any number of simulated cost roll-ups may be requested, for a single production model, or for all models.

Review the impact of production model changes prior to updating actual product information. Adjust simulation detail and re-run product cost roll-ups any number of times prior to updating actual production models. Know the financial impact of business decisions before any changes are made, based on detailed reporting information provided by simulated cost roll-ups.

The impact of a proposed 10% increase in electricity rates might be run in simulation for all financial models. This cost information might help in re-evaluating existing costs for each product, as well as understanding the overall significance of such a change for your business.

Schedule History

Once a production schedule is launched, all resource activity and production information is retained for user-review and reporting. Resource activity is reported directly through user-entered transactions, or indirectly through system-initiated theoretical consumption and production transactions. Resource costs are included as part of the schedule. Throughout the life of the schedule, a running cost of production will be available. Once a schedule has been closed and purged by the user, a detailed history of schedule activity will also be available.

Multiple Accounting Periods

In many manufacturing control systems, only one accounting period can remain open at any given time. This requires that all transaction activity for the previous period be completed, reviewed, and closed prior to entering any current period transactions. Taking adequate time to review prior period activity prevented inventory and schedule information for the current period from being updated.

Recurring data entry bottlenecks and lack of on-hand balance and schedule visibility during each period end were unavoidable.

Multiple accounting periods may remain open simultaneously in PRISM. Transaction activity for all open periods is permitted. Each transaction will have a user-maintained period and transaction date, as well as an associated entry date which is system-maintained. This allows transactions which are entered during the current period to be applied to prior periods which are still open. The length of accounting periods in PRISM will be installation-defined by the user. Each accounting period will accumulate period-to-date information for all transaction activity.

The ability to enter current period transactions while previous periods are still open insures that schedule and inventory information will reflect current activity. On-hand balances will reflect all current transactions during the entire accounting period. Transaction entry activity during the beginning of a new period will not require additional temporary time and effort to "catch up" to current inventory and schedule status.

Transaction activity which remains for any reason after the end of a period can be entered directly to the correct open accounting period. Adequate time for accounting review is available, and any accounting adjustment transactions for previous periods may be made, as required.

Simulated Close

Prior to closing a period, any number of simulated period closes may be requested by the user. While no accounting or cost files are actually updated, complete period close report information is printed. Period totals and detailed quantity and cost information are available for review and adjustment. Additional transaction adjustments may be entered for the period, and additional period close simulations run.

Review all related period close information prior to actually closing an accounting period. Simulated closes often point to possible missed transactions which can be entered and the period closed without cumbersome re-opening requirements.

When an accounting period is actually closed by the user, no more transaction activity is possible. Each accounting period must be closed in sequential order, so that all cost and cumulative year to date file information will be updated correctly. Last, average, and historic costs for the period are updated by the system, and available for review. Selected key indicators are also calculated within PRISM, and retained for future reporting and statistical review.

System Features

The following features are designed into PRISM to offer maximum flexibility during initial system implementation, and on an ongoing basis.

Creating Individual User Menus

Traditional menus are provided as standard in PRISM. Menus contain a list of functions and associated descriptions which are accessible from each screen. By selecting any desired option from a series of menu screens, menu prompts provide an access path to or from any function in the system.

Following a predefined menu path to and from any desired function enables the inexperienced or infrequent user to move easily through an unfamiliar system, gaining confidence while performing the necessary job functions.

A user may also choose to move directly from any menu to any other menu or function without following a series of menus. Each menu has a system-assigned name. This menu name and the desired menu option may be directly entered from any menu in PRISM. The requested function will appear directly, without requiring the user to move through multiple menus. The user can move directly from any menu to any other menu or option within the system.

For an experienced user, paging through a series of menus to access a familiar screen is not desirable. The ability to directly access a desired function saves operator time and effort, allowing the user to move quickly and easily through the system when performing familiar tasks.

PRISM also allows you to design unique menus for each individual, listing only those functions which are important to each user, and for which they have the appropriate security clearance. Each user menu may utilize the system-provided option descriptions, or user-entered descriptions which are helpful for that individual.

For example, a menu might be designed for someone who does receiving activities. The menu lists only the three functions which that individual is required to perform. The descriptions associated with each menu option might be the standard PRISM descriptions or they might be "My Daily Receiving Report," "Dock Receipt Entry," or "Joe's Weekly Audit Report."

User Defined Menus

As job requirements change, menu options may be added, changed, or deleted for each user-defined menu. Only those selected menu options which you have defined will be displayed for each user.

Define any of the menu option descriptions on the user menu to match the vocabulary and terminology of your business. Every user-defined menu may contain words which are familiar to an individual, a department, or your entire company.

Familiar vocabulary terms on user menus reduce implementation time and effort for the individual user. Improve communications throughout your business without changing current operations.

Use any or all of the standard menus provided in PRISM. Take advantage of user-structured menus to present only those jobs required for a single individual, changing the words for a fully user-defined menu–give your people familiar tools.

Using Terms Familiar To Your Business

The success of any information system can be adversely affected by the use of unfamiliar words and terms. One company might refer to a list of resource requirements for production as a formula, while another refers to a recipe or bill of materials. PRISM allows you to incorporate the vocabulary of your business directly into system screens and reports. Tailor PRISM to reflect those key terms which are currently being used in your business.

INSTALLATION DEFINED VOCABULARY

Shorten the educational cycle and reduce user resistance by overcoming the hurdle of words.

Error Messages

Like any system, PRISM evaluates entered information for error conditions. But, the severity of errors and the impact of the error in the business varies between plants. PRISM recognizes this difference as an important part of fitting the system to your operation.

The degree of severity for specific error messages, and the option of displaying or not displaying those messages is installation-defined in PRISM. A hard halt message code will require error correction prior to continued activity. A soft halt code will issue a warning message only, allowing the user to continue without error correction, if he or she so chooses. The lowest level of severity can be defined so that the error condition is ignored by the system, and is not displayed to the user at all. In addition, the related help descriptions which accompany each error message may be maintained to include information specific to your installation.

For example, if a field is left blank during data entry, a warning message might appear which notifies the data entry person that the field has been left blank. The level of severity for this message might be installation-defined as a warning level message only. In this instance, the user would be notified that the information has not been entered in the transaction field. The transaction entry would be allowed to continue, with or without including the missing information. If the blank field were a required field for this specific plant, the installation might consider changing the severity level of the error message from a soft halt (warning) to a hard halt, forcing the user to enter the field before the transaction is accepted.

Error Condition Management

| Level | ACTION |
|---|---|
| 1 | HARD HALT– must correct to continue |
| 2 | SOFT HALT– warning only |
| 3 | ERROR IGNORED– no message given |

TABLE 11

Tailor the error detection within PRISM to match your policies and procedures without modifying PRISM.

Increase operator efficiency by controlling individual errors which will require resolution or review by anyone using the system. Identify those system-provided messages which can be disregarded.

Expand the PRISM standard error descriptions, instructing the user what action to take for your specific installation.

On-line Help Facilities

PRISM contains three levels of on-line help text which are available for review from any screen or menu. By simply pressing the HELP key, system-provided help text is accessible to the user.

The first level of help text is a two line message to assist your users. The second level of help text information is identical to the reference documentation which is provided with the system. A third level of on-line help text may also be added for each installation, containing unlimited information which may be accessed by users. User-defined help text might include specific operational procedures which outline company policy guidelines, as well as resolution procedures which are available for review during specific operating situations. This user-defined text might be used as a formal part of education programs, making the operating rules and regulations of the business available system-wide.

Using vocabulary which is familiar to your business, you can incorporate operational procedures into formal system text. This information will be available at all times to the user, combining installation-unique information with on-line system documentation support.

Start with the system-provided help text in PRISM, and build your own on-line help text documentation gradually, as part of an ongoing procedure development process.

Include any reference information in the on-line help text which will improve operator accuracy and efficiency during actual transaction entry.

Action List

From any function in PRISM, the user may select an action list facility which allows on-line messages to be sent from one user to another. These messages are retained by the system until responded to and deleted by the recipient. This communication function between individuals is immediately accessible through the use of command key entry.

The ability to interrupt a current session from any screen, sending information to users anywhere in the company, helps to document and communicate those mental notes which might otherwise never reach their intended recipients.

These messages are retained for each user until actively deleted, and provide a common informational link between individuals and departments.

User-Defined Fields & Files

Research has shown that every business has unique information requirements which are not addressed within standard system fields and files. The following space has therefore been provided in PRISM to meet these needs.

User-Defined Fields

Multiple fields are provided at key points in PRISM, and may be defined and applied in any way which benefits the user. These user-named fields may contain any desired reference information, and will be readily accessible to the user for review and analysis. Screens and reports will include installation-defined descriptions for these fields.

User-Defined Files

Notebook files within PRISM contain multiple alphanumeric and numeric fields which may be tailored for each installation. These names fields are available for record entry by the user, and may be used to associate reference information with specific items. Notebook file records are maintainable in PRISM by the user, and are accessible for user-designed reports and analysis.

For example, a notebook file might be defined such that quality information about inspected material can be associated directly with each individual lot. Inspection results such as color or appearance information may be listed for each lot. This inspection data is then available for user inquiry and maintenance within PRISM.

Collect within PRISM all information required in your business. Provide on-line reference capability to the information which helps you review and analyze performance.

Save the cost of controlling information external to the system. Reduce the need for tacked-on system files to collect information which is unique and valuable to your business.

Multiple Databases

Within PRISM, any number of distinct manufacturing databases may be defined for each installation. A database might be defined for each plant within a company, allowing multiple plants to operate independently of each other within the same computer. User security may be defined within each existing database, as well as between multiple databases.

Additional databases might be defined for other than multiple plant requirements within your business. A database might be defined for simulation purposes in the design of a new product, manufacturing plant, or training technique. Using copied data from existing database entities, what-if planning can assist in making critical business decisions.

Define any number of databases within the same computer. PRISM will provide simultaneous information control, while retaining the integrity of each database.

Educational Database

A predefined educational database is supplied as standard within PRISM. This database contains sample resources, production models, and cost and schedule information which is identical to the examples provided within PRISM documentation, and the on-line help text within the system. This database may be used during system training, or as a test database for proposed system operating changes. This database will be fully functional, and can be used to enter any desired information during testing or educational training. After using this database, the original sample information may be refreshed by the user, for repeated experimentation or training.

Predefined sample data in an isolated database provides the user with an opportunity to enter and review trial information. This provides a valuable implementation tool, as well as a continued training method for individuals taking on new or different job functions.

Review in isolation the results of proposed changes in system tailoring or operations. Refresh the education database and conduct additional system tests within an identical framework of entered data, while retaining the operating integrity of current plant databases.

Training Database

Key Indicators

Selected financial and operational information which is a part of every business is maintained in a key indicator file on an ongoing basis. Financial indicators such as the number of inventory turns and the value of inventory over time are compiled and collected as a part of normal systems operation. This key indicator information serves as an access path to summarized business information, capturing financial indicators for future use. Information is accessible for analysis and review at any time in the future.

Use the key indicator file as an information source for summarized financial management reporting. Access any combination of data elements which are key to analyzing your business.

Job Scheduler

A job scheduler in PRISM allows each user the option of selecting any job for delayed system processing. Jobs which are sent to the job scheduler will process during non-peak operating hours. Individual jobs which take an extended length of process time may be pre-selected to default to the job scheduler. When these jobs are selected for processing, each user has the ability to override the delayed update default, as required, and request immediate processing.

Data Processing Issues

PRISM is written in RPG III, using fully documented structure techniques. The full advantage of the IBM System/38 database manager has been utilized in the design of PRISM.

Additional space is also provided at the end of each file in PRISM, allowing each installation the option to customize the database to fit the unique needs of the business. These increased file lengths make it easier to insert and use additional data elements which are important to you.

SECTION II

SECTION II - I

This section explains basic RP concepts and terminology. Refer back to this introductory section whenever you need to refresh your understanding of RP theory.

What Resource Processor Does

Resource Processor does exactly what its name suggests: it helps you process or organize your materials or resources into meaningful, efficient production plans. In PRISM, these production plans are called production models.

You can review and analyze your production data with 14 different reports, 19 file lists, and three inquiry programs. You can also run programs to see cost information as it applies to your production process. Other RP features and special functions are described later in this section.

Many of the terms used in RP may be unfamiliar to you. The information that follows links PRISM vocabulary with associated RP concepts. More details are included in the actual program descriptions in the main sections of this manual.

Production Models General Definition

Resource Processor helps you chart or model your production process using production models, or PMs for short. The production model consists of information about the materials and processes needed to manufacture a finished item.

Think of your production models as blueprints of your production processes. You tell PRISM exactly how you make a product, including everything that goes in and everything that comes out of your manufacturing process. Each production model represents a complete manufacturing process.

For each end product or resource to be manufactured, you may define any number of production models, such as "live" PMs and financial PMs. A "live" PM may be one that mirrors what is actually going on in your plant. The financial PM, on the other hand, mirrors your plant but includes cost information.

Parent/Dependent PMs

One type of production model is a parent PM. Parent PMs are independent and stand on their own. You can also, however, create a dependent PM, which would be identical to its parent except for a few minor changes.

For example, one parent PM might include fresh tomatoes on it, since you use only fresh tomatoes when they are available. When tomatoes are out of season, however, you use canned tomatoes. So you could create a dependent PM that replaces fresh tomatoes with canned tomatoes but keeps everything else on the PM the same.

This saves time, since you do not have to construct another PM just to incorporate canned tomatoes. PRISM constructs it for you. The parent/dependent relationship, while useful, does impose certain restrictions that are described in detail in *PM Maintenance*, Section 1–4 of this manual.

Master/Associated PMs

You may also create master and associated PMs. For example, suppose that whenever you make beef stew, you must also make beef marinade. RP lets you define the beef stew PM as a master PM and the beef marinade PM as its associate. When you schedule and open the PM beef stew, PRISM automatically opens the PM beef marinade.

PM Type Codes

RP also lets you group PMs with common characteristics by a PM type code. A PM name always appears with its associated type code. For example, you may want to define the type code for all financial PMs as FI, while assigning all PMs related to beef stew a type code of BS.

Outlining the Production Model

Production models can be structured a number of ways. Each PM is made up of tasks, those processes that are needed to make your product. Each task may include operations and resources that go into and come out of each operation.

For each production model, you define a Name, Type, Description, and Batch Quantity. For example, you tell PRISM that you plan to produce 100 cans, gallons, cases, pots, or pounds at the end of this production run. You can express quantities in the unit of measure that makes the most sense for each specific step in the production process. Therefore, all task, operation, and resource quantities are expressed in direct relation to your PM batch quantity.

Figure 5:
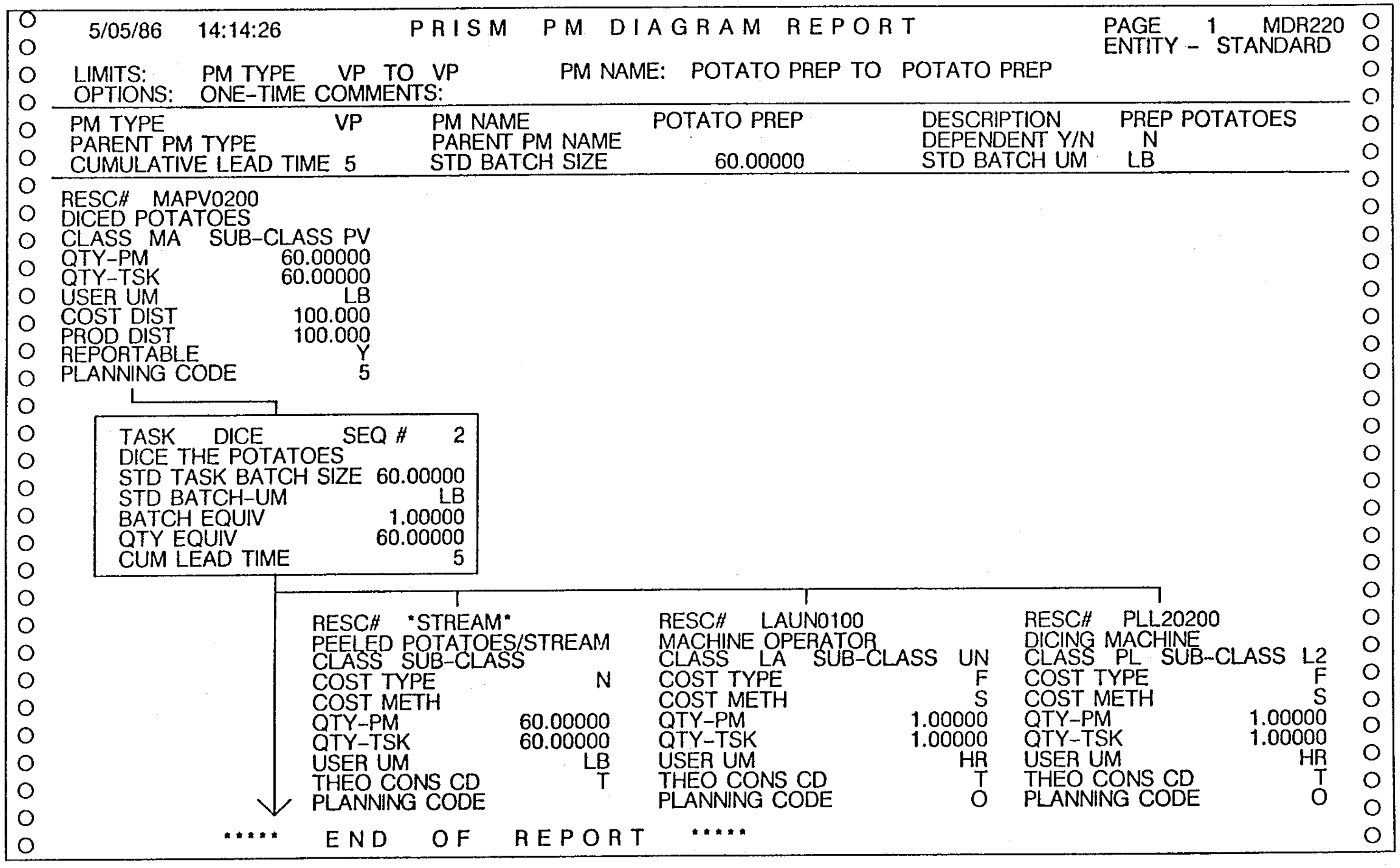

DIAGRAM (see Figure 5)

You can make a diagram of your own production models similar to the one pictured above using the RP Production Model Diagram option off the Report Menu. This diagram pulls together on paper all of the field information you enter on some 13 screens during PM Maintenance.

The production model is the heart of your PRISM production system. Poorly defined production models will result in production inefficiency and inaccurate costing and analysis of your production process. To understand other key PRISM functions, then, you must first understand the concept of the production model and the characteristics of its tasks, resources, and operations.

PM Tasks and Operations

Tasks describe what steps are necessary to manufacture the produced resources. You might begin beef stew by preparing the beef and vegetables in a task called Prep. You might then define additional tasks called Cook, Grade, and Fill.

For each task you define the resources consumed and produced by that task. Beef Stew Prep might require beef, potatoes, a spice pack, a machine operator (labor), and a peeling machine (plant/equipment). All costing or resource reporting is done at the task level. If you want to track the cost of machine, you would define the machine as a consumed resource on the task.

Within each task, you then define specific operations. During Beef Stew Prep, for example, the cook might peel potatoes, mix in spices, trim fat from the beef, and mix all of the resources in the machine tank. These might all be separate operations in Beef Stew Prep. You also define the setup, run, cleanup, and move times associated with each operation and may enter operation comments or instructions.

PM Resources

Resource Processor helps you track your resources through the production process. A resource is defined as any element with a positive or negative value, required for, or resulting from, production. This means a resource may be consumed, produced, or both. In most cases, your resources will be end items or components, such as nails or cans of soup. In PRISM, however, resources may also be intangible products such as electricity, labor, or processing hours. You determine which resources are critical to your production process and therefore necessary to monitor.

In PRISM, the ingredients that go into the pot are called consumed resources. Those that come out are called produced resources. A blend of resources that flows from one step in the production process to another is called a stream resource.

For each task, you must define the resources consumed and produced on that task. For example, you must tell PRISM that the task Cook requires .5 hours of labor, 20 kwH of electricity, 1 spice bag, and 500 gallons of broth. All are considered consumed resources, though a spice bag and broth might be produced resources from other production models.

RP lets you express the quantity of resource required or produced by a task in any number of ways. You may define the resource quantity as a ratio of another resource on the same task, or make the quantity dependent on the run time of an operation. If the PM produces more than one end resource, you may tell PRISM the production percentages of each resource and let the system calculate the actual production quantity for you. Or you may simply enter a quantity yourself.

RP also considers batch consumption of resources. For example, if the beef stew must cook for 8 hours regardless of the quantity of stew in the pot, the cooking time would be a batch consumption resource. This tells PRISM that full batch quantities are required.

You may also limit the consumed resources that may be used on a specific task by effectivity date and by grade. You might only use fresh tomatoes two months out of the year, when they are in season and easy to obtain. At other times you use canned tomatoes. You can tell PRISM you only use fresh tomatoes for those two months, and PRISM will use information for fresh tomatoes. And during the rest of the year, it will use information for canned tomatoes. You can also specify to consider only tomatoes that have been assigned a particular grade, say, "small tomatoes."

By-Products, Co-Products, and Waste

You can track any number of reportable produced resources, including all by-products, co-products, and waste products.

A by-product has economic value, but is produced incidentally, as a residual product of the main production process. Co-products are end products of relatively equal value, coming out of the same production process. Waste products are useless end products with negative value.

A production distribution percentage is assigned to each resource. This indicates how amounts of the resource are used in the task. For example, suppose you have a task to make cardboard boxes and you produce two sizes of boxes, one large and one small. Clearly, it takes more cardboard to produce a large box than it does to make a small box. So, the production distribution percentage for the large box might be 60 percent, while for the small box it is 40 percent. The sum of the production distribution percentages for all produced resources on each task must equal 100 percent.

You also assign a cost distribution percentage to each produced resource. This designates how much each resource produced in a task costs. In our example, you use more materials in producing large boxes, so their cost distribution percentage might be 60 percent, while for the smaller boxes it might be 40 percent. The sum of the cost distribution percentages for all produced resources on each task also must equal 100 percent.

PRISM also allows you to track produced resources as net realizable value (NRV) resources. Suppose your company produces chicken parts. One resource produced from the final task is chicken feathers. Since these feathers are not an overly valuable resource, you do not assign them a production or cost distribution percentage. But you know you can sell them for $20 a bag to a local pillow manufacturer. You would say, then, that chicken feathers have a net realizable value of $20 a bag.

This value is subtracted from the total cost of producing the PM. You may also use NRV to account for the cost of waste products you must pay to have taken away from your production site. In this case, the net realizable value would be added to the overall cost of production.

Superflushable Resources

RP offers a special function called superflushing. It applies to manufactured consumed resources only and instructs PRISM to automatically consume a resource that is produced by one PM but used by still another PM. The system theoretically produces the resource and theoretically consumes resources that go into its production. This procedure, then, takes into account all necessary resources when it performs the superflush.

SECTION II - II

MDE040

Production Model Maintenance and Standard Task Maintenance

A. This program allows the user to enter and maintain information in the PM master files. This includes the ability to define the summary information for a PM and specify its tasks, resources, operations, and operation comments. The program functions similarly for both PM Maintenance and Standard Task Maintenance. Differences are noted when applicable.

Screens

MDE04001—Production Model Selection Screen
MDE04003—Task Selection Screen
MDE04005—Resource Selection Screen
MDE04007—Operation Selection Screen
MDE04009—Same As Except Screen
MDE04010—Production Model Maintenance Screen
MDE04011—Task Maintenance Screen
MDE04012—Resource Maintenance Screen
MDE04013—Resource Maintenance Screen
MDE04015—Distribution % Screen
MDE04016—Status Screen
MDE04018—Comment Entry Screen
MDE04019—Operation Maintenance Screen
MDE04022—Produced Resource Quantity % Screen

Production Model Selection Screen—MDE04001

This is the first screen to appear during PM Maintenance. By entering a PM Type/PM Name, the user accesses the Production Model File (PMODEL). Other entry field combinations provide direct access to the PMTASK (task information), PMRESR (resource information), and PMOPER (operation information) files.

On this screen the user also enters an Action Code (A for Add, C for Change, and D for Delete). Depending on the user-defined severity of the appropriate error message, this field may be required or optional. If the error message is defined to be overrideable or non-display, the action depends on the entered combination. If the entry field combination does not exist, PRISM assumes the user wants to add a record. If the entry field combination already exists, the information from the file is displayed for changing or displayed for review only when deleting. The action code is blanked out when the program returns to the Selection Screen, while the other field values remain.

On this first screen certain command keys display selection screens for tasks, resources, or operations. These selection screens are subfiles that list all tasks defined for a PM, all resources defined for a task, or all operations defined for a task. CK10 calls up the Same as Except screen. On this screen the user can copy one PM into another PM. Same as Except PMs are not dependent PMs; the original and copied PMs have no binding relationship.

On every screen the user can select the HELP key and CK07, although these keys are not displayed on the screen. The HELP key calls up help text. The $HELP subroutine is copied into the screen program by using the /COPY function. Indicator 77 is always associated with the HELP key. CK07 is used to send messages to action lists.

Deleting a Production Model. The user can delete an entire PM by entering the PM Type and PM Name and taking CK20. If the PM contains associated tasks (i.e., PMTASK records exist with the same PM Type/PM Name) a UDS message appears.

If the PM has dependencies (Dependencies = Y), it cannot be deleted. An error message is displayed that alerts the user to this condition.

If CK20 is selected twice, the PM Type/PM Name entered are used to CHAIN to the PMODEL file. For an independent PM, the PMODEL record and related tasks, resources, operations, and operation comments are deleted. For a dependent PM, however, only the PMODEL and PMRESR records are deleted. In addition, the Number of Dependencies on the parent PM is decreased by one. A chain is made to the PMODELPA file using parent PM Type/parent PM Name. If this chain is unsuccessful, the parent PM no longer has dependencies, and the Dependencies on This PM is reset to N in PMODEL.

To delete task records from an independent PM, lower limits are set to the PMTASK file using PM Type/PM Name, and a series of READE operations is done. For every successful READE, the record is deleted from the PMTASK file.

For a dependent PM, the Number of Dependencies on the parent PM is reduced by one. To do this, lower limits are set to the PMRESR file using dependent PM Type/dependent PM Name, and a series of READE operations is done. For every successful READE, the same resource is retrieved from the parent PM. A CHAIN is made to the same file using parent PM Type/parent PM Name/Task Name/Resource Type = C/ Resource Number. The Number of Dependencies in this record is decreased by one. If the Number of Dependencies equals zero as a result of this subtraction, the Dependencies on This Resource is set to N.

The same steps are done for the tasks that consume these resources. A CHAIN is made to PMTASK using parent PM Type/parent PM Name/Task Name. Number of Dependencies and Dependencies on this Task are reset accordingly.

When the dependency fields have been reset, the resources on the dependent PM are reset. Lower limits are set to the PMRESR file using dependent PM Type/dependent PM Name. For an independent PM, lower limit are instead set using PM Type/PM Name. A series of READE operations is then done. For every successful READE, the resource is deleted from PMRESR.

For an independent PM, after all the resources have been deleted, all the operations for the PM are also deleted. Lower limits are set to the PMOPER file using PM Type/PM Name, and a series of READE operations is done. For every successful READE, the record from PMOPER is deleted.

When the above process has been completed, the operation comment records are deleted. Lower limits are set to the COMMNT file using PM Type/PM Name, and a series of READE operations is done. For every successful READE, the record from COMMNT is deleted.

Deleting a Task. The user can also delete a specific task and all associated resources and operations by entering a PM Type/PM Name/Task Name combination and selecting CK20. A UDS message appears that may or may not be overridden by selecting CK20 again. If this task has dependencies (Dependencies on This Task = Y) it cannot be deleted.

Entry Field Combinations. Below are the entry field combinations valid on this screen. Any other combination causes an error message. Also listed are the screens that appear with each combination.

PM Type, PM Name—MDE04010
PM Type, PM Name, Task Name—MDE04011
PM Type, PM Name, Task Name, Resource Number—MDE04012
PM Type, PM Name, Task, Resource Type, Resource Number—MDE04012
PM Type, PM Name, Task Name; Operation Number—MDE04019
PM Type, PM Name, CK04—MDE04003
PM Type, PM Name, Task Name, CK06—MDE04005
PM Type, PM Name, Task Name, CK08—MDE04007

Entry Fields:

- Resource Number
- Resource Type
- Operation Number
- Task Name
- Production Model Name
- Production Model Type
- Action Code Required Fields:

- Production Model Name
- Production Model Type
- Action Code: A = Add, C = Change, D = Delete Edits:

- Action Code must be A, C, or D.
- If the Action Code = A, the entry field combination must not already exist in the file.
- If the Action Code = C, the entry field combination must exist in the file.
- Only one user may maintain a production model at a time. This edit is controlled through the PMUSGE file. Before allowing maintenance to a PM, the program chains to PMUSGE with the PM Type/PM Name selected by the user. If the chain fails, the PM Type/PM Name is added to PMUSGE, and the user is allowed to maintain the PM. When maintenance of this PM is completed, or CK01 is selected from the Session Status Screen, the record is deleted from the PMUSGE file. If the chain is successful, someone else is maintaining the PM, and a hard halt error message appears.
- If Operation Number is entered, Task Name is required in addition to PM Type and PM Name.
- PM Type must exist in the PMTYPE file.

If the user takes CK04, PM Type and PM Name must be entered.

If the user takes CK06 or CK08, PM Type, PM Name, and Task Name must be entered.

If Resource Number is entered, a Task Name is required in addition to PM Type and PM Name. If a Resource Type is not entered, consumed resources on the PM are checked first. If a record is not found, produced resources are checked. This applies only in CHANGE mode. With an ADD or DELETE, Resource Type is required.

If a new resource is being added to the PM, it must exist in RESMST.

Command Keys (Display):

| | |
|---|---|
| CK01 | Display Session Status |
| CK04 | Task Selection Screen |
| CK06 | Resource Selection Screen |
| CK08 | Operation Selection Screen |
| CK10 | Same as Except |

Command Keys (Non-Display):

| | |
|---|---|
| HELP | Display Additional Text |
| CK07 | Send Message To Action List |
| CK17 | Override Error Message |
| CK20 | Delete a Record |

Production Model Maintenance Screen—MDE04010

The Production Model Maintenance Screen permits the entry, change, and deletion of the summary information for each production model. The Action Code text is displayed in the upper right hand corner.

After a record is added, a Task Maintenance Screen appears with the default values in place. When a record is changed or deleted, the program returns to the PM Selection Screen. The PM Type and PM Name of the record just maintained are redisplayed here.

Yield figures (historical average yield, last complete period average yield, and last yield) can be maintained by the user by selecting CK05. Yield figures are displayed as percentages, but are stored in the file in decimal format. An indicator is used to control the protection attribute of these fields. The fields are available for entry if the user has security clearance to maintain historical information. To determine if the user profile has clearance, the program calls MZM300 with these parameters: module code, $MOD (D); sequence, $SEQ (002); and result, $RES. If the result returned by MZM300, $RES, equals Y, the user profile has authorization to maintain historical figures.

If the PM batch size is changed on an existing PM, a warning message appears that indicates the tasks and resources on the PM should be adjusted so they agree with the new batch size.

Deleting a Production Model. The user can delete a full PM by selecting CK20. If the PM has associated tasks (i.e., PMTASK records exist with the PM Type/PM Name identical to those of the PM being maintained), a UDS message appears. If no associated tasks exist, the standard message, "Press CK20 to delete" appears. If CK20 is selected twice, the PM Type/PM Name entered is used to CHAIN to the PMODEL file.

If the PM has dependencies (Dependencies on This PM = Y), it cannot be deleted.

For an independent PM, the PMODEL record and related tasks, resources, operations, and operation comments are deleted. For a dependent PM, however, only the PMODEL and PMRESR records are deleted. In addition, the Number of Dependencies on the parent PM is decreased by one. A chain is made to the PMODELPA file using parent PM Type/parent PM Name. If this chain is unsuccessful, the parent PM no longer has dependencies, and the Dependencies on This PM is reset to N on the parent PM record in PMODEL.

To delete the task records on an independent PM, lower limits are set to the PMTASK file using PM Type/PM Name, and a series of READE operations is done. For every successful READE, the record is deleted from the PMTASK file.

If this is a dependent PM, the Number of Dependencies is reduced for the resources on the parent PM that had dependent resources. To identify these resources, lower limits are set to the PMRESR file using dependent PM Type/dependent PM Name, and a READE operation is done. If the READE is successful, the key fields values are saved before continuing. The same resource is retrieved from the parent PM record by chaining to PMRESR using parent PM Type/parent PM Name/Task Name/Resource Type = C/ Resource Number. The Number of Dependencies is decreased by 1. If the Number of Dependencies equals zero as a result of this subtraction, Dependencies on This Resource is set to N.

The same process occurs for the tasks that consume this resource. A CHAIN is made to PMTASK using parent PM Type/parent PM Name/Task Name. The Number of Dependencies and Dependencies on This Task are reset accordingly. The next resource on the dependent PM is retrieved by using the saved key to SETGT limits, and another READE is done.

When the dependency fields have been reset, the resources on the dependent PM are deleted. Lower limits are set to the PMRESR file using dependent PM Type/dependent PM Name. If the PM is independent, lower limits are set on PMODEL using PM Type/PM Name, and a series of READE operations is done. For every successful READE, the resource is deleted from PMRESR.

For an independent PM, all operations for the task are deleted after all the resources have been deleted. Lower limits are set to the PMOPER file using PM Type/PM Name, and a series of READE operations is done. For every successful READE, the record is deleted from the PMOPER file.

When this process has been completed, the operation comment records are deleted. Lower limits are set to the COMMNT file using PM Type/PM Name, and a series of READE operations is done. For every successful READE, the record is deleted from the COMMNT file.

Setting on Recost Flags. A change in any field or record for a PM sets on the recost flag for that PM. Setting the recost flag for a PM also sets the recost flags for all PMs that are dependent upon it. To retrieve all dependent PMs, lower limits are set to PMODELPA using PM Type/PM Name, and a series of READE operations is done. For every successful READE, the Recost byte of the PM is set to Y.

Creating a Dependent PM. When adding a record, the user can create a dependent PM by entering the parent PM Type and parent PM Name. The parent PM must be an existing independent PM. To verify these conditions, a chain is made to the PMODEL file using parent PM Type/parent PM Name. If the chain is successful, the program checks that the Dependency Code = I. If these conditions are met, the Dependency Code is set to D and the Dependencies on This PM is set to N on the dependent PM. On the parent PM, the Dependencies on This PM is set to Y, and the Number of Dependencies is incremented by one. If no parent PM is defined, the Dependency Code on the PM being maintained is set to I, and the Dependencies on This PM is set to N.

Historical information (yields on PMODEL and PMTASK, and quantities, costs, and date last costed in PMRESR) is taken from the parent PM. One exception is the Date Last Costed in PMODEL, which is set to zero when a dependent PM is created. In addition, if the user changes a consumed resource on the dependent PM, the following fields are initialized in the PMRESR file:

PRAVQY—Historical Average Quantity
PRLSQY—Last Quantity
PRPDQY—Last Complete Period Average Quantity
PRCSRU—Cost Rollup Costing Method
PRAVCS—Historical Average Cost
PRPDCS—Last Complete Period Average Cost
PRUNTC—Rolled Up Cost Per Std UM
PRTSKC—Total Rolled Up Cost for Task Size
PRPMCS—Total Rolled Up Cost for PM Size
PRPVCS—Previous Rolled Up Cost Per Std UM
PRDTLR—Date Last Rollup
PRSIMC—Simulated Rolled Up Cost If a parent PM Type/parent PM Name are entered, the following fields are not available for entry, since their values are taken from the parent PM:

Std Batch Size for PM
Std Batch Size UM
Theoretical Consumption

After a dependent PM is added, the program returns to the PM Selection Screen.

Changing the Dependency Code. If the user changes the Dependency Code to I, making a dependent PM an independent PM, the program duplicates all tasks, resources, operations, and comments from the parent PM into the dependent PM. In addition, the Number of Dependencies is decreased in the parent PM record. If the Number of Dependencies equals zero as a result of this subtraction, the Dependencies on This PM field is set to N.

Any historical information (yields in PMODEL and PMTASK, and quantities, costs, and date last costed in PMRESR) is initialized to zero when a dependent PM is changed to an independent PM.

To copy task records of the parent PM to the new independent PM, lower limits are set to the PMTASK file using parent PM Type/parent PM Name, and a series of READE operations is done. For every successful READE, a record is added to the PMTASK file with the dependent PM Type and dependent PM Name as the first two key values.

After all tasks have been added, the Number of Dependencies is reduced for resources on the parent PM that have dependent resources.To do this, lower limits are set to the PMRESR file using dependent PM Type/dependent PM Name, and a READE operation is done. If the READE is successful, the key field values are saved. The same resource is retrieved from the parent PM by chaining to PMRESR by parent PM Type/parent PM Name/Task Name/Resource Type = C/Resource Number. The Number of Dependencies is decreased by 1. If the Number of Dependencies equals zero as a result of this subtraction, Dependencies on This Resource is set to N.

The same process is done for the task that consumes this resource. A CHAIN is made to PMTASK using parent PM Type/parent PM Name/Task Name. The Number of Dependencies is adjusted, and Dependencies on This Task are reset accordingly. The next resource from the dependent PM is retrieved by doing a SETGT limits, and then a READE is done (key = dependent PM Type/dependent PM Name).

Next, resources that were the same on the parent and dependent PM are copied. Lower limits are set to the PMRESR file using parent PM Type/parent PM Name, and a READE operation is done. The key field values are saved before the process continues. If the READE is successful, the program determines if this record was overridden on the dependent PM by chaining to the PMRESR file using dependent PM Type/dependent PM Name/Task Name/Resource Type = C/ Resource Number. If the chain is unsuccessful, the program duplicates the record for this resource from the parent PM by chaining back with the saved key.

Otherwise, the same process continues with the next resource from the parent PM by setting greater than limits with the saved key and doing another READE. When all consumed resources have been read on the parent PM, all produced resource records are duplicated from the parent PM record with the exception of the PM Type and PM Name, which are taken from the dependent PM.

After all resources have been duplicated, the operations on the task are copied to the new independent PM record. Lower limits are set to the PMOPER file using parent PM Type/parent PM Name, and a series of READE operations is done. For every successful READE, a record is added to the PMOPER file. These records are copies of the parent PM operation records, with the exception of the PM Type and PM Name, which originate from the dependent PM.

Finally, the operation comment records are duplicated. Lower limits are set to the COMMNT file using parent PM Type/parent PM Name, and a series of READE operations is done. For every successful READE, a record is added to the COMMNT file. These records are copies of the parent PM operation comments, with the exception of the PM Type and PM Name, which originate from the dependent PM.

An independent PM cannot be converted to a dependent PM. That is, the Dependency Code cannot be changed from I to D.

Fields in PMODEL that have Y/N values default when a new record is added. When maintaining an existing record, the values in the file are displayed. If any fields remain blank when the user updates a record, an error message appears.

Standard Batch Size, UM, Plant Number, and Warehouse default from PMTYPE if no values appear in PMODEL. If the user blanks out a required field, however, the program retrieves the default value and loads it into the file.

When a record is added, the default for the sensitivity factor is retrieved from the PMTYPE file. The default is only updated if the user does not change the value on the screen.

Display-Only Fields (top of screen):

PM Type
PM Name
Date Last Maintenance
Action

Display-Only Fields (bottom of screen):

Dependencies on this PM
Recosting byte
System calculated cost level code
Date last costed These yields can be maintained only if CK05 is used:
Historical Average Yield %
Last Yield %
Last Complete Period Average Yield %

Entry Fields:

Parent PM Type
Parent PM Name
Cumulative Lead Time
User Assigned Cost Level Code
EC Level
Theoretical Consumption
Standard Batch Size for PM
Standard Batch Size UM
System Recalculates Lead Time
Plant Number
Warehouse
Production Sequence #
Dependency Code
Sensitivity Factor %

Required Fields:

Description
Standard Batch Size for PM
Standard Batch Size UM
Recalculate Lead Time
Dependency Code Defaults:

Recosting byte = Y
System Calculated Cost Level Code = 0
Date Last Costed = 0/00/00
Cost Rollup Code = N
Simulated Cumulative Lead Time = 0
Standard Batch Size for PM from PMTYPE
Standard Batch Size UM from PMTYPE
System Recalculates Lead Time = Y
Plant Number from PMTYPE
Warehouse from PMTYPE
Production Sequence # = 99999
Dependency Code = I
Sensitivity Factor % from PMTYPE Edits:

Dependency Code must be I or D.

If Dependency Code = I, no parent PM Type or parent PM Name can be entered if the user is adding. If in CHANGE mode, the user can change the code from D to I, and the program blanks out parent PM Type/parent PM Name.

If Dependency Code = D, parent PM Type must be specified.

If parent PM Type is entered, it must exist in PMODEL.

If Dependency Code = D, parent PM Name must be entered.

If parent PM Name is entered, it must exist in PMODEL and be independent.

If parent PM Name is entered, the Standard Batch Size, Standard Batch Size UM, and Theoretical Consumption Code must be identical to those on the parent PM.

If PM size is changed, a warning message is displayed that tells the user they should adjust tasks and resources to agree with the new batch size.

System Recalculates Lead Time must be Y or N.

Theoretical Consumption Code must be T, C, D, or blank.

Command Keys (Display):

| | |
|---|---|
| CK01 | Display Session Status |
| CK05 | Historical Yield Maintenance |
| CK18 | Refresh Screen |
| CK19 | Return without Update |

Command Keys (Non-Display):

| | |
|---|---|
| HELP | Display Additional Text |
| CK07 | Send Message to Action List |
| CK17 | Override Error Message |
| CK20 | Delete a Record |

Same as Except Screen—MDE04009

This screen appears if CK10 is used on the Selection Screen (MDE04001). The Same as Except Screen allows the user to duplicate a PM but without having the copy be dependent on the original. All tasks, resources, operations, and operation comments are also copied. In addition, the user can maintain the new PM immediately after it is created.

All historical information (yields in PMODEL and PMTASK, and quantities and costs in PMRESR) is initialized to zero on the new production model.

To maintain the new production model, the program goes directly to the Production Model Maintenance Screen when the ENTER key is selected. Otherwise, a blank Same as Except Screen is displayed so the user can copy additional PMs.

The program copies the PMODEL record of the original PM by using the original PM Type/PM Name to chain to PMODEL. If the chain is successful, a record is added to the PMODEL file with the new PM Type/PM Name. If the PM being copied has dependencies, the new PM has no dependencies. If the PM being copied is a dependent PM, the new PM has the same parent PM Type and parent PM Name. The parent PM is updated to reflect an increase in its number of dependencies. On a dependent PM, only the exceptions to the parent PM are stored. That is, only the PMODEL record and consumed resource records are duplicated.

To copy the tasks on an independent PM, lower limits are set to the PMTASK file using the original PM Type/PM Name, and a series of READE operations is done. For every successful READE, a record is added to the PMTASK file with the new PM Type/PM Name.

After all tasks have been copied, the resource records are copied. Lower limits are set to the PMRESR file using original PM Type/PM Name, and a series of READE operations is done. For every successful READE, a record is added to the PMRESR file with the new PM Type/PM Name.

After all resources have been copied, operations are copied. Lower limits are set to the PMOPER file using original PM Type/PM Name/Task Name, and a series of READE operations is done. For every successful READE, a record is added to the PMOPER file with the new PM Type/PM Name.

When this process has been completed, the operation comment records are duplicated. Lower limits are set to the COMMNT file using original PM Type/PM Name, and a series of READE operations is done. For every successful READE, a record is added to the COMMNT file with the new PM Type/PM Name.

As soon as the production model is fully copied, the recost flag for that PM is set on.

Entry Fields:

- New PM Type
- New PM Name
- Original PM Type
- Original PM Name
- Maintenance After Entry Required Fields:

- New PM Type
- New PM Name
- Original PM Type
- Original PM Name
- Maintenance After Entry Defaults:

- New PM Type/New PM Name = PM Type and PM Name entered on the Selection Screen.
- Maintenance After Entry = N.

Edits:

- New PM Type must be valid.
- New PM Type/PM Name combination must not already exist.
- Original PM Type/Name must already exist.
- Maintenance After Entry must be Y or N.

Command Keys (Display):

| | |
|---|---|
| CK01 | Display Session Status |
| CK19 | Return without Update |

Command Keys (Non-Display):

| | |
|---|---|
| HELP | Display Additional Text |
| CK07 | Send Message to Action List |
| CK17 | Override Error Message |

Task Maintenance Screen—MDE04011

The Task Maintenance Screen appears if a PM Type/PM Name/Task Name are entered on the PM Selection Screen, or if a task is selected from the Task Selection Screen. In the second case, the Task Name is for display only. When a new PM is added, this screen is automatically displayed once ENTER is pressed on the PM Maintenance Screen.

The user can select another task for maintenance by entering the Task Name in the Retrieval Field and taking CK12. The task is either added or retrieved depending on whether it already exists. If an existing task is entered, the information is displayed for maintenance. If a new Task Name is entered, the same steps occur as when adding a new task from the Task Selection Screen.

If this program is called during PM Maintenance and a record is being added, a standard task and the resources, operations, and operation comments associated with the task can be copied into the PM. The user enters the new task name in the upper left corner. It can be different from the standard task name. The standard task name is entered in the Task Retrieval field. Both the new Task Name and standard Task Name are required.

The Stream Resource Status is initialized to zero when a task is added. This field is updated during maintenance of stream resources. The possible updates are:

| From | To |
| --- | --- |
| 0 | 1, 2 |
| 1 | 0, 3 |
| 2 | 0, 3 |
| 3 | 1, 2 |

When a task record is deleted, all operations and resources associated with the standard task are also deleted.

When CK10 is selected, a PMTASK record is built from the TASKMS record, PMRESR records are built from TASKRS records, and PMOPER records are built from TASKOP records. COMMNT records are also duplicated with the new PM Type/PM Name. The TASKRS and TASKOP records are retrieved by setting lower limits using the Task Name and doing a series of READE operations. For every successful READE, a record is written to the appropriate file for the PM Type/PM Name. The Sequence Number is edited to check that it is not already assigned to another task on this PM.

The task record appears and is maintainable. After the user presses ENTER, the appropriate information is duplicated. The Batch Equivalence cannot be zero. Thus, the following formula is used to convert this value to the quantity equivalence value:

Quantity Equivalence = PM Batch Size/Batch Equivalence

When this calculation has been completed, the quantities relative to PM batch size for resources associated with the task are calculated. The following formula is used:

Qty Relative to PM Batch Size = Relative Qty × Batch Equivalence to Task Batch Size A work field determines whether an edit of the stream resources for all tasks on this PM is necessary. This work field is checked, 1) when returning to the selection screen, and 2) when exiting from PM Maintenance. This field is set to Y when a new task is added, or when the first or final task of the PM is deleted.

Yield figures (historical average yield, last complete period average yield, and last yield) are maintained by selecting CK05. Yield figures are displayed as percentages, but are stored in the file in decimal format. An indicator is used to control the protection attributes of these fields. The fields are available for entry only if the user has security clearance for the maintenance of historical information.

To determine if the user profile has the necessary clearance, the program calls program MZM300 with the following parameters: module code, $MOD (D); sequence, $SEQ (002) (003 during PM Maintenance); and result, $RES. If the result returned by MZM300, $RES, is Y, the user profile has authority to maintain historical information and the three yield fields are made available for entry.

The Reportable (Y/N) byte is loaded based on the attributes of the produced resources. When a task is added, Dependencies on This Task is initialized to N, and Number of Dependencies is initialized to zero.

When any field value is changed during PM Maintenance, the recost flag is set on. Flags to recost the PMs dependent on the PM are also set to Y. To retrieve all dependent PMs, lower limits are set to PMODELPA using PM Type/PM Name, and a series of READE operations is done. For every successful READE, the recost byte of the PM is set to Y.

Each task on a PM must have a unique Task Sequence Number. To check that number, a chain is made to the logical view of PMTASK by PM Type/PM Name/Task Sequence Number (PMTASKSQ). If the chain is successful, a hard halt error message appears.

If Dependencies on This Task = Y, this task cannot be deleted. It can only be changed by a user with security clearance to maintain dependent tasks and resources, and only after a warning message has been displayed and overridden.

Display-Only Fields (Standard Task Maintenance):

Action
Date Last Maintenance
Reportable Task

These yields can be maintained only if CK05 is used:
Historical Average Yield
Last Yield
Last Complete Period Average Yield Display-Only Fields (PM Maintenance):

Action
Date Last Maintenance
Qty Equivalence
Number of Dependencies
Dependencies on This Task
Reportable Task These yields can be maintained only if CK05 is used:
Historical Average Yield
Last Yield
Last Complete Period Average Yield Entry Fields (Standard Task Maintenance):

Description
Standard Task Batch Size
Standard Task Batch Size UM
System Recalculates Lead Time
Yield Factor Standard Deviation %
Yield Factor %
Move Time (Days)
Move Time (Hrs)

Move Time (Mins)
Cumulative Lead Time
Sensitivity Factor %
Critical Point Task Code Entry Fields (PM Maintenance):

Description
Standard Task Batch Size
Standard Task Batch Size UM
System Recalculates Lead Time
Yield Factor Standard Deviation %
Yield Factor %
Move Time (Days)
Move Time (Hrs)
Move Time (Mins)
Cumulative Lead Time
Sensitivity Factor %
Critical Point Task Code
Cumulative Lead Time
Batch Equivalence
Final Task
Task Retrieval Field Required Fields (Standard Task Maintenance):

Description
Standard Task Batch Size
Standard Task Batch Size UM

Required Fields (PM Maintenance):

Task Name (ADD only)
Task Sequence Number (ADD only)
Description
Final Task (Y/N) (ADD only)

Defaults (Standard Task Maintenance):

System Recalculates Lead Time = Y
Critical Point Task Code = N
Yield Factor = 100
Sensitivity Factor % from TALFLD Defaults (PM Maintenance):

Standard Batch Size for Task from PMODEL
Standard Batch Size UM from PMODEL
Batch Equivalence = 1
System Recalculates Lead Time = Y
Yield Factor = 100
Critical Point Task Code = N
Sensitivity Factor % from PMODEL Edits (Standard Task Maintenance):

Batch Equivalence cannot be zero.
Critical Point Task Code must be Y or N.
System Recalculates Lead Time must be Y or N.
Task Sequence Number must be greater than zero.

Edits (PM Maintenance):

Batch Equivalence cannot be zero.
Critical Point Task Code must be Y or N.
If Dependencies on This PM = Y, this task cannot be deleted.
System Recalculates Lead Time must be Y or N.
Task Name must be unique to the PM.

If a Task Retrieval Name is entered, the user must take CK10 (copy standard task), or CK12 (select a different task).

If the user takes CK10, they must have entered a task retrieval name.

If the user takes CK12, they must have entered a task retrieval name.

Each task on a production model must have a unique Task Sequence Number.

Command Keys (Display) (Standard Task Maintenance):

| | |
|---|---|
| CK01 | Display Session Status |
| CK05 | Historical Yield Maintenance |
| CK18 | Refresh Screen |
| CK19 | Return without Update |

Command Keys (Display) (PM Maintenance):

| | |
|---|---|
| CK01 | Display Session Status |
| CK05 | Historical Yield Maintenance |
| CK10 | Copy Standard Task |
| CK12 | Retrieve Task |
| CK18 | Refresh Screen |
| CK19 | Return without Update |

Command Keys (Non-Display) (Standard Task Maintenance):

| | |
|---|---|
| HELP | Display Additional Text |
| CK07 | Send Message to Action List |
| CK17 | Override Error message |
| CK20 | Delete a Record |

Command Keys (Non-Display) (PM Maintenance):

| | |
|---|---|
| HELP | Display Additional Text |
| CK07 | Send Message to Action List |
| CK17 | Override Error message |
| CK20 | Delete a Record |

Task Selection Screen - MDE04003

This screen is accessible only through PM Maintenance.

On this screen the user can see all tasks defined for a selected production model. Then the user may select a specific task for maintenance by marking the task with an X and pressing ENTER. If no task is marked, ENTER returns the user to the PM Selection Screen. If a task is marked, when its processing is complete the program returns to this screen.

The program can also display all resources or operations for a task. To display all resources for the task, the user must enter an R next to the task name. To display all operations for the task, the user must enter an O next to the task name.

Tasks are displayed in ascending sequence. Lower limits are set to the PMTASKSQ file using PM Type/PM Name, and a series of READE operations is done. For dependent PMs, the parent PM Type/parent PM Name are substituted for PM Type/PM Name. For every successful READE, a record is added to the subfile. If no tasks are defined for this PM, an error message appears.

If more than one task is selected, the task with the lowest sequence number is processed first. When its processing is complete, the program returns to the Task Selection Screen. The marking next to the task just displayed is removed. When the ENTER is pressed again, the appropriate screen appears for the next task. This process continues until all tasks have been processed.

Display-Only Fields (top of screen):

PM Type
PM Name

Display-Only Fields (subfile):

Task Name
Task Sequence Number
Description

Entry Fields:

Task Selection Field

Edits:

Task Selection field must be X, R, O, or blank.
At least one task must exist on the PM.

Command Keys (Display):

| | |
|---|---|
| CK01 | Display Session Status |
| CK18 | Refresh Screen |
| CK19 | Return Without Update |

Command Keys (Non-Display):

| | |
|---|---|
| HELP | Display Additional Text |
| CK07 | Send Message to Action List |
| CK17 | Override Error Message |

Resource Maintenance Screens—MDE04012, MDE04013

The Resource Maintenance Screens can be displayed from the PM Selection Screen or the Standard Task Selection Screen. In either case, the screens are also available from the Task Maintenance screen, the Operation Maintenance screen, and the Resource Selection screen.

On this screen the user enters, changes, and deletes resources. The Action Code text is displayed in the upper right corner. The Date Last Maintenance is displayed for review.

The user can select another resource for maintenance by entering the Resource Type and Resource Number in the bottom left corner of the first Resource Maintenance Screen and taking CK12. When CK12 is pressed, the existing information for the resource is displayed. If this resource does not exist, the program will try to add it unless the PM is dependent, in which case an error message appears.

If the Resource Type is left blank, the program assumes it is a consumed resource. If this assumption results in an error because of the requested action, the program changes the Resource Type to P (produced) and tries again. If this change still results in an error, an error message appears.

If no Resource Number is entered in the resource selection field at the bottom of the screen and ENTER is selected, the next screen to appear depends on the program's previous action. If a new resource was just added, a blank Resource Maintenance Screen appears. If an existing resource was maintained, the program returns to the initial selection screen.

Two maintenance screens exist for each resource, so ENTER is available to page forward, and CK03 is available to page backward from screen to screen. If the resource is produced, all fields on the second screen are protected. Historical figures, however, can be maintained when CK05 is selected.

Dependent PMs during PM Maintenance. A dependent PM is a copy of another PM (its parent PM) with the exception that one or more of the parent's consumed resources have been changed on the dependent PM.

A dependent PM does not consist of all the records that are normally associated with a PM. For example, if the parent PM SOUP has one task, two operations and three resources, the PM has one PMODEL record, two PMOPER records, and three PMRESR records. If a PM is created that is dependent on SOUP, it has one PMODEL record for the new PM and one PMRESR record for each consumed resource that differs from the consumed resource on the parent. These are the only records that exist for the dependent PM. All others records are referenced from the parent PM records.

When a dependent PM is maintained, the produced resource information is for display only. Only consumed resources that exist on the parent PM can be maintained. If the user tries to change a produced resource on a dependent PM, tan error message appears. The same occurs if the user tries to delete a resource from a dependent PM.

The user can maintain consumed resources on a dependent production model by either entering the Resource Number or selecting the resource on the Resource Selection Screen. In either case, the resource record is retrieved by using the dependent PM Type/dependent PM Name/Task Name/Resource Type = C/Resource Number to chain to PMRESR. If the chain is successful, the information is displayed for maintenance. If the chain fails, parent PM Type/parent PM Name is substituted in the key, and another chain is made to PMRESR. If that chain is successful, the resource information from the parent PM is displayed, along with the PM Type and PM Name of the dependent PM. If both chains fail, an error message appears.

If a consumed resource record is added to a dependent PM, the task that consumes the resource is updated to reflect this addition. A chain is made to PMTASK using parent PM Type/parent PM Name/Task Name. Dependencies on This Task is set to Y, and the Number of Dependencies is incremented by one. If a consumed resource record is deleted from a dependent PM, the Number of Dependencies is decreased by one. If the result of this subtraction sets the counter to zero, Dependencies on This Task is set to N. The same updating applies to the resource on the parent PM. The record is accessed by chaining to the PMRESR file by parent PM Type/parent PM Name/Task name/Resource Type = C/ Resource Number.

The only action available for resources on a dependent PM is CHANGE. If a record for the resource exists on the dependent PM (i.e., overrides to the resource on the parent PM have been made), the Remove Overrides field on the second Resource Maintenance Screen is available for entry. The field defaults to N, but if Y is entered the resource is deleted from the dependent PM. In other words, the resource information reverts to the information on the parent PM.

When consumed resources are maintained on a dependent PM, if the original resource on the parent PM is either related to an operation, or has an operation that is related to it, a warning message appears, since maintaining the resource would deactivate the relationship.

The Resource Type is never available for entry during maintenance on dependent PMs.

If a resource is expressed as a ratio of another resource, or if either of the related resources is changed on the dependent PM, both resource records exist on the dependent PM.

If a resource has dependencies it cannot be deleted. It can only be changed by an operator with security clearance for maintaining dependent tasks and resources. To determine if the user profile has clearance, the program calls the program MZM300 with parameters of: module code, $MOD (D); sequence, $SEQ (003); and result, $RES. If the result returned by MZM300, $RES, is Y, the user profile can perform the maintenance.

Dependent operations cannot be created on dependent PMs.

Resource Quantities. A consumed/produced resource can be expressed as ratio to another consumed/produced resource. To express the quantity of a resource relative to another, the related resource number and ratio are required entries. A related resource cannot itself be related, and the related resource must be of the same type as the dependent resource. Resources with ratio dependencies cannot be deleted.

During PM Maintenance, the program verifies that the related resource exists by using PM Type/PM Name/Task Name/Resource Type/Related Resource Number to chain to PMRESR. The related resource can be one defined on the parent PM. If the chain fails, the program substitutes parent PM Type/parent PM Name in the key and makes another chain to the file.

During Standard Task Maintenance, a chain is made to TASKRS using Task Name/Resource Type/Resource Number. If the chain succeeds, the program checks that its related resource number is blank. The unit of measure of the dependent resource must also be convertible to the standard unit of measure of the related resource. If these conditions are met, Ratio Dependencies on This Resource is set to N and the Quantity Type Code is set to R on the resource with a related resource number defined. Ratio Dependencies on This Resource is set to Y on the related resource.

When a resource with a related resource is maintained, the Quantity Relative to Task Batch Size is not available for entry. The quantity is recalculated as a ratio of the quantity of the related resource. When the quantity of a resource that is defined to have a ratio dependency is changed, the quantity of the resource which is dependent on it is also changed.

If the quantity of a resource used is changed, the quantity of resources dependent on it are changed as well. First the program must locate the ratio dependent resources. During PM Maintenance, PM Type/PM Name/Task Name/Resource Type/blank Resource Number are used to set lower limits to the PMRESR file. During Standard Task Maintenance, Task Name/Resource Type/blank Resource Number are used to set lower limits to the TASKRS file. A series of READE operations are then done. For each successful READE the program checks for resources related to the original resource. When it locates them it multiplies the quantity of the first resource by the ratio defined for the dependent resource. READE operations continue until the operation fails.

To remove the ratio relationship, the user must blank out the related resource number and ratio on the dependent resource. The program then sets the Quantity Type Code to blanks. The Related Resource Number is saved for comparison. To determine if this was the only resource dependent on that related resource, a READE is performed on all the resources on the task with the same resource type. After each successful READE, the related resource is compared with the saved field. If they are equal, no further processing is necessary. If no other resource has this related resource number, a CHAIN is made to the related resource and Ratio Dependencies is set to N.

The Quantity Relative to Task Batch Size in User UM is required. All quantities are loaded into the file even if they are equal. The following formula is used to calculate the Quantity Relative to PM Batch Size. Batch Equivalence is retrieved from the task using PM Type/PM Name/Task Name to chain to PMTASK.

If Quantity Relative to Task Batch Size in User UM is entered, it is converted to the Standard UM and then:

Quantity Relative to PM Batch Size in Standard UM = Quantity Relative to Task Batch Size × Batch Equivalence If no user UM is defined, the program assumes the UM is equal to the Standard UM. The Standard UM is then loaded into the user UM field.

During Standard Task Maintenance, Quantity Relative to Task Batch Size is required. Quantity Relative to PM Batch Size is only calculated when this standard task is copied into a PM.

Reportable (Y/N) Byte. At the end of resource maintenance, the Reportable (Y/N) byte is loaded based on the attributes of the produced resources. During PM Maintenance, lower limits are set to the PMRESR file using PM Type/PM Name/Task Name/Resource Type = P/blank Resource Number. During Standard Task Maintenance, lower limits are set to the TASKRS file using Task Name/Resource Type = P/Resource Number. A series of READE operations (key = same as above without Resource Number) are used, and the byte is checked for every successful read. As soon as one reportable produced resource is found, the byte in PMTASK (TASKMS) is set to Y. If no reportable resources are found, the byte is set to N.

Operation Dependency. The user has the ability to relate consumed resources to operations on independent PMs. One fields allows the user to specify whether an operation record is to be created for the resource. If so, a Dependent Operation Number is required and the Dependent Resource field is set to N. Dependent Operation and Dependent Resource both equal N if no operation is to be created. During PM Maintenance, the program verifies that this operation does not already exist by chaining to the PMOPER file using PM Type/PM Name/Task name/Operation Number before adding a record. During Standard Task Maintenance, a chain is made to the TASKOP file using Task Name/Operation Number.

An operation is created at the work center specified in RESMST. The work center can be overridden by entering a work center on this screen. An edit makes sure the work center exists in WCMAST. Then the resource quantity (relative to PM batch size) is converted to hours.This becomes the run time in hours in PMOPER (TASKOP). The same occurs for the setup and clean up quantities. The UM expression for hours is defined by a tailoring question answered in the Foundation module.

After maintaining a resource that has a dependent operation, the run time, setup time, and clean up time are updated in the dependent operation record.

The data fields for resources that are dependent on operations are for display only. CK15, however, allows the user to maintain the resources by breaking the dependency. When it is used, the dependency fields are reset to indicate the connection is severed: the Dependent Resource Number is blanked out, and the Dependent Resource and Dependent Operation fields on the operation are set to N. Once the connection is broken, the consumed resource and the operation times must be maintained independently.

Resources that have dependent operations cannot be deleted.

Edits and defaults apply to a specific resource type. Entries that are not valid for the resource type cause an error message to appear.

During PM Maintenance, the program can calculate cost and production percentages. Quantities of the produced resources are converted to the batch unit of measure. To calculate production distribution percentage, each resource quantity is divided by the sum of the reportable produced resource quantities and then multiplied by 100. To calculate the cost distribution percentage, each resource quantity is divided by the sum of all non-net realizable value produced resources and then multiplied by 100.

When a potent resource (Potent Resource = Y in RESMST) is added or deleted, the count of PMs that use the resource is maintained accordingly. This applies to both consumed and produced resources.

Simplified Example of Superflushing. If the PM being processed is superflushable, the user cannot add a produced resource. This edit applies only to independent PMs. A superflushable PM has only one non-reportable, produced resource. Superflushable PMs allow the user to apply the cost and production figures for the superflushed PM to consumption of another resource on another PM.

For example, think of a car that is produced on one PM and a radio that goes into the car but is produced on another PM. When a car is completed, the radio (the non-reportable, produced resource on the superflushable PM) has been placed in the car. When a production receipt is done for the car, theoretical consumption, production, etc., is done for the radio, because the system knows if a car was made a radio must have been made as well.

Resource Maintenance Screen—MDE04012

Display-Only Fields (Standard Task Maintenance):

Action
Task Name
Class
Sub-Class
Date Last Maintenance
Qty/Task (Std UM)
Standard UM
Qty Type Display-Only Fields (PM Maintenance):

PM Type
PM Name
Task Name
Action

Class
Sub-Class
Date Last Maintenance
Qty/PM (Std UM)
Qty/Task (Std UM)
Standard UM Entry Fields (Standard Task Maintenance):

Task Selection Field
Resource (ADD only)
Resource Type (ADD only)
Qty/Task Batch
User UM
Description
Stream Resource
Reportable Resource
Effectivity Lower Date
Effectivity Upper Date
Print On Documents Code
Production Distribution %
Clean Up Quantity
Documentation Location Code
Related Resource
Retrieval Type
Retrieval Number
NRV Usage
Warehouse
Location
Grade Lower Limit
Grade Upper Limit
Cost Distribution %
Setup Quantity
Location Classif Code - Production Receipt
Ratio
Ratio Dependencies Entry Fields (PM Maintenance):

Task Selection Field
Resource (ADD only)
Resource Type (ADD only)
Qty/Task Batch
User UM
Description
Stream Resource
Reportable Resource
Effectivity Lower Date
Effectivity Upper Date
Print On Documents Code
Production Distribution %
Clean Up Quantity
Documentation Location Code
Related Resource
Retrieval Type
Retrieval Number
NRV Usage
Warehouse
Location
Grade Lower Limit
Grade Upper Limit
Cost Distribution %

Setup Quantity
Location Classif Code - Production Receipt
Ratio
Ratio Dependencies Required Fields (Standard Task Maintenance):

Resource Type
Qty/Task Batch
Stream Resource

Required Fields (PM Maintenance):

Resource Type
Qty/Task Batch
Stream Resource

Defaults (PM Maintenance):

Class from RESMST
Sub-Class from RESMST
Description from RESMST
Stream Resource = N
Print On Documents = Y
Standard UM from RESMST
User UM from RESMST
Warehouse from Tailoring
Upper Grade = 99
Ratio Dependencies = N Defaults (Standard Task Maintenance):

When the action is ADD, and the Resource Number is not available, the user can use the defaults by leaving the field blank. This is indicated by a U following the fields below. Some are only updated, however, if the screen values (other than blanks) differ from the default values. These are indicated by an N.

*Consumed Resources*

Class from RESMST (U)
Sub-Class from RESMST (U)
Description from RESMST (U)
Grade Level Lower Limit = blank (U)
Grade Level Upper Limit = 99 (U)
Beginning Effectivity Date = 000000 (U)
Ending Effectivity Date = 000000 (screen) (U)
Ending Effectivity Date = 999999 (file) (U)
Print on Documents Code = Y (U)
Prime Planning PM Type from RESMST (N)
Prime Planning PM Name from RESMST (N)

*Produced Resources*

Net Realizable Value Usage from RESMST (U)
Location Classification Code from RESMST (N)

*Both*

Warehouse from PMODEL, PMTYPE, RESMST, TALFLI (U)
Cons/Prod Location from RESMST (N)
Stream Resource = N (U)

Edits for Both Standard Task and PM Maintenance:

In order to allow for a resource that is a waste, the program does not edit for negative quantities but does edit for a zero.

If Quantity Relative to Task Batch Size in User UM is entered, the user-defined UM is required.

Qty/Task Batch must be entered if neither the Related Resource nor the Related Resource Ratio was entered.

If a related resource is entered, it must be defined in RESMST.

If a related resource is entered, it cannot be the same as the resource being maintained. It must exist on the task and cannot itself have or be a related resource. Both resources must be the same type.

If the resource already has ratio dependencies defined, related resource number and ratio must be blank.

Ratio is required if related resource number is defined. It must be zero if no related resource number is entered.

If the resource is a balance resource, the resource/warehouse combination must exist in RESBAL.

Resource Number must be defined in RESMST.

Resource Type must be C or P.

Resource must not already exist on the task (ADD mode only).

Resource Retrieval field entries must be valid.

Resource Retrieval fields must be blank if CK12 was not taken.

Stream Resource must be Y or N.

If this is a stream resource, the user UM must be entered.

When a stream resource is being added or changed, no entry is permitted for the warehouse and/or the location.

A warehouse must be entered for non-stream resources.

Location must be blank for non-balance, non-stream resources.

Warehouse is required regardless of whether this is a balance or non-balance resource.

User defined UM must be convertible to the resource standard UM.

*Edits for Consumed Resources only:*

The Beginning and Ending Effectivity Dates must be in valid date format.

Beginning Effectivity Date cannot be greater than the Ending Effectivity Date.

Ending Effectivity Date cannot be greater than the Ending Effectivity Date in RESMST.

Upper Grade Level limit must be greater than or equal to lower Grade Level limit.

Print On Documents Code must be Y or N.

Print on Documents Code must be set to Y if the quantity of resource relative to PM batch size is greater than zero.

An error message is displayed if entries are made in the following fields when Resource Type = C: Production Distribution %, Cost Distribution %, NRV Usage, Reportable (Y/N), and Inventory Classification.

Reportable Resource and NRV Usage cannot be entered.

If the Setup Quantity and/or Clean Up Quantity is greater than, the Theoretical Consumption Code must be D.

*Edits for Produced Resources Only:*

If a Location Classification Code is entered, it is edited against the Inventory Classification Master file (CLASCD).

Net Realizable Value resources must have a Cost Distribution % of zero.

Non-Reportable resources must have a Production Distribution % of zero (except for stream resources).

NRV Usage must be Y or N.

NRV Usage must be N for stream resources.

An error message is displayed if entries are made in the following fields when Resource Type = P: Effectivity Dates, Grade Levels, Documentation Location Code, and Print on Documents Code.

Setup Quantity and Clean Up Quantity must be zero for produced resources.

*Edit for Standard Task Maintenance Only:*

Quantity Relative to Task Batch Size is required. Quantity Relative to PM Batch Size is a non-display field that is calculated when the standard task is copied into a PM.

Command Keys (Display):

| | |
|---|---|
| CK01 | Display Session Status |
| CK08 | Operation Maintenance |
| CK09 | Produced Resource Qty % |
| CK11 | Distribution % |
| CK12 | Retrieve Resource |
| CK15 | Dependent Resource Maintenance |
| CK18 | Refresh Screen |
| CK19 | Return without Update |

Command Keys (Non Display):

| | |
|---|---|
| HELP | Display Additional Text |
| CK07 | Send Message to Action List |
| CK17 | Override Error Message |
| CK20 | Delete |

Resource Maintenance Screen—MDE04013

Display-Only Fields (PM Maintenance):

PM Type
PM Name
Task Name
Resource
Resource Type
Class
Sub-Class
Rolled Cost (Std UM)
Previous Rolled Cost
Total Rolled Cost/Task
Total Rolled Cost/PM
Number of Dependencies
Cost Rollup Costing Method These fields can be maintained only if CK05 is used:

Last Complete Period Average Cost
Historical Average Cost
Last Quantity
Last Complete Period Average Quantity
Historical Average Quantity Display-Only Fields (Standard Task Maintenance):

Task Name

Resource
Resource Type
Class
Sub-Class
Task Name
Class
Sub-Class
Date Last Maintenance
Quantity/Task Batch (Std UM)
Standard UM
Quantity Type
These fields can be maintained only if CK05 is used:
Last Complete Period Average Cost
Historical Average Cost
Last Quantity
Last Complete Period Average Quantity
Historical Average Quantity Entry Fields (Both PM Maintenance and Standard Task Maintenance):
Theoretical Consumption Code
Batch Consumption Code
Prime Planning PM Type
Create Dependent PM Operation Record
Work Center
Superflushable
Cost Rollup Type Code
Prime Planning PM Name
Dependent Operation Number
Dependent Operation
Dependent Resource Required Fields:
Theoretical Consumption Code
Superflushable
Batch Consumption Code
Cost Rollup Type Code
Create Dependent Operation Record Defaults:
*Consumed Resources*
Cost Type from RESMST (U)
Batch Consumption from RESMST (U)
Theoretical Consumption from PMODEL, RESMST (U)
Superflushable = N (U)
Create Dependent Operation Record = N (N)
Work Center from RESMST (valid if Create Operation = Y) (N)
Remove Overrides = N (N)

Edits (Standard Task and PM Maintenance, for both consumed and produced resources):
CK05 can be used to maintain historical quantity and cost figures only if the user has the clearance to do so.
Prime Planning PM Type/Name must exist in PMODEL.
Create Dependent Operation Record must be Y or N.

Edits (Standard Task and PM Maintenance for consumed resources):
If this is a batch consumption resource, it must be theoretically consumed or cost calculated (i.e., Theoretical Consumption Code must be C or T).

Cost Type Code must be N, F, or V.

If Create Dependent Operation Record = Y, Operation Number cannot be zero.

If Create Dependent Operation Record = N, a work center cannot be entered.

A dependent operation cannot be created if: 1) the resource being maintained already has a related resource; 2) the PM being maintained is a dependent PM; 3) the resource being maintained already has a dependent operation.

When creating a dependent operation, a work center must be specified before the operation may be created.

When creating a dependent operation, the user UM must be entered and be convertible to hours.

If the Resource Overrides option is displayed for a dependent resource that differs from the parent resource, only Y or N are allowed.

If this is a stream resource, the Theoretical Consumption Code must be T.

Superflushable must be Y or N.

Theoretical Consumption Code must be T, C, or D.

Command Keys (Display):

| | |
|---|---|
| CK01 | Display Session Status |
| CK03 | Page Backward |
| CK05 | Historical Figure Maintenance |
| CK08 | Operation Maintenance |
| CK09 | Produced Resource Qty % |
| CK11 | Distribution % |
| CK15 | Dependent Resource Maintenance |
| CK18 | Refresh Screen |
| CK19 | Return without Update |

Command Keys (Non Display):

| | |
|---|---|
| HELP | Display Additional Text |
| CK07 | Send Message to Action List |
| CK17 | Override Error Message |
| CK20 | Delete |

Edits Not Associated with a Particular Screen:

Note: The following edits are performed at the end of resource maintenance. These edits apply to both Standard Task Maintenance and PM Maintenance.

If a batch consumption resource is added on a task that is non-reportable, a hard halt message appears.

Production Distribution % for all reportable produced resources (including stream resources) must add up to 100. The Cost Distribution % for all produced resources that are not considered to have net realizable value must also add up to 100. If either condition is not met, an error message appears. The user may use a command key to display a screen on which appear the produced resources and their associated percentages. The user can there maintain the percentages so they add to 100.

Only one non-reportable produced may exist on each task. The stream resource is not included, even though it is defined as such.

In PM maintenance, each task must have at least one non-stream consumed resource. In Standard Task Maintenance, at least one consumed resource, stream or non-stream, must be defined.

Each task that is not the final task must have a produced stream resource. Each task other than the first must have a consumed stream resource.

A final task cannot have a produced stream resource.

The first task on an independent PM cannot have a consumed stream resource.

Every task must have at least one produced resource. The stream resource may be considered a produced resource, except on the final task.

If a Resource Number is displayed, a Y must not be entered in the Stream Resource field.

A work field determines whether an edit of the stream resources for all tasks on this PM is necessary. This work field is checked, 1) when returning to the Selection Screen, and 2) when exiting from PM Maintenance. This field is set to Y when a new task is added or when the first or final task of the PM is deleted. If the work field equals Y, all tasks for the PM are read sequentially from the PMTASKSQ file. The following conditions must hold:

- If this is the first task in a series of tasks, PTSTST must = 2.
- For an intermediate task, PTSTST must = 3.
- For the final task in a series of tasks, PTSTST must = 1.
- For one task alone, PTSTST must = 0.

If the work field = Y, the Task Selection Screen is displayed with an R next to the invalid task. An error message also appears that indicates the task has invalid resources.

A task may have only one consumed stream resource and one produced stream resource.

Distribution % Screen—MDE04015

This screen displays the cost distribution and production distribution percentages for all produced resources on a task. The screen appears if the user uses CK11 from the first Resource Maintenance Screen.

This subfile is built one page at a time. The values on this screen are for display only if this is a dependent PM. Also, if the resource is non-reportable, the Production Distribution % field is not available for entry. And if the resource is defined as having net realizable value, the Cost Distribution % field is not available for entry.

Display-Only Fields:

PM Type (PM Maintenance only)
PM Name (PM Maintenance only)
Task Name
Resource Number
Description
Quantity Relative To Task Batch Size in Std UM
Resource Standard UM Entry Fields:

Cost Distribution %
Production Distribution %

Edits:

A resource cannot have a cost distribution percentage that is greater than 100.

The total of all cost distribution percentages for resources on the task must equal 100.

A resource cannot have a production distribution percentage that is greater than 100.

The total of all production distribution percentages for resources on the task must equal 100.

Command Keys (Display):

CK18 Refresh Screen

CK19 Return without Update

Command Keys (Non-Display):

HELP Display Additional Text

CK07 Send Message to Action List

Produced Resource % Screen—MDE04022

The Produced Resource % Screen allows the user to express the produced resource quantity in percentage format when CK09 is selected. The user enters the percentage produced by each resource, and the system calculates the resource quantity. This function is not available in DELETE mode.

The user may select to display the resources in the resource standard UM, the user UM, or the task batch size UM. Regardless of the UM, the standard unit of measure of each produced resource must be convertible to the Task Batch Size UM if this option is selected. When CK09 is selected, the desired UM is found. The program then retrieves the resource records by setting lower limits to the PMRESR file using PM Type/PM Name/Task Name/Resource Type = P/blank Resource Number.

A series of READE operations is then done, using a partial key without Resource Number. Stream resources are not included in the subfile. Unit of measure conversions are done by using the standard subroutine, $UMCNV. This subroutine is copied into the program by using the /COPY function. After each successful conversion (if necessary), the produced resource quantity is added to a total. When the READE operation fails, the program returns to the first produced resource of this task by setting lower limits again. The quantity for each produced resource is calculated by multiplying the total quantity expressed in PM batch size UM by the percentage produced, and a record is added to the subfile. If any UM conversion error is found, a hard halt error message appears.

This screen is not available when a dependent PM is being processed. An error message appears if the user selects the command key which displays this screen.

If a ratio dependency exists between any of the produced resources on this task, this function cannot be used to calculated the resource quantities. An error message appears.

Display-Only Fields:

PM Type (PM Maintenance Only)
PM Name (PM Maintenance Only)
Task Name
Resource Number
Description
Quantity Relative to Task Batch Size in Std UM
Resource Standard UM Entry Fields:

Resource Quantity %

Edits:

Total percentage of an individual resource cannot be greater than 100.

Total percentage of all resources cannot be greater than 100.

Total percentage of all resources must total 100.

Task UM must be convertible to standard and user UM.

Command Keys (Display):

CK18 Refresh Screen
CK19 Return without Update

Command Keys (Non-Display):

HELP Display Additional Text
CK07 Send Message to Action List

Resource Selection Screen—MDE04005

During PM Maintenance, CK06 calls up this screen, which lists all produced and consumed resources defined for a PM/task combination. During Standard Task Maintenance, CK06 calls up the same screen with all resources associated with the standard task.

Consumed resources are displayed first, followed by produced resources. The user may select a specific resource for maintenance by marking the resource with an X and pressing ENTER. If no resource is marked, the ENTER key simply returns the user to the Selection Screen. If a resource is marked, the Resource Maintenance Screen appears. When maintenance on that screen is complete, the program returns to this screen.

PM Maintenance. Before using CK06, the user must first enter a valid PM Type/PM Name/Task Name. An error message appears otherwise. When this screen finally appears, resources are displayed in resource number sequence. For an independent PM, PM Type/PM Name/Task Name are used to set lower limits to the PMRESR file, and a series of READE operations is done. If the READE is successful, a record is added to the subfile.

For a dependent PM, the parent PM Type/parent PM Name/Task Name are used to set lower limits to the PMRESR file, and a series of READE operations is done. If the READE is successful, the program determines if any changes have been made to this resource. The key field values (PM Type, PM Name, Task Name, Resource Type, Resource Number) are saved before continuing so the program can return to the next resource on the parent PM.

Next, dependent PM Type/dependent PM Name/Task Name/Resource Type/Resource Number are used to CHAIN to the PMRESR file. If the CHAIN is successful the information from this record is displayed instead of that retrieved using parent PM Name. The program then returns to the next resource from the parent PM by setting greater than limits using the saved key fields, and reading continues. This process continues until all resources for the task have been read. If no resources are defined for the task, an error message appears.

Standard Task Maintenance. Before using CK06, the user must enter a valid Task Name. An error message appears otherwise. Resources are displayed in resource number sequence as the TASKRS file is processed. Lower limits are set to the file using Task Name/blank Resource Type/blank Resource Number. A series of READE operations are used with a key of Task Name to retrieve the resources. For every successful READE, a record is added to the subfile.

Display-Only Fields (Standard Task Maintenance):

Task Name
Standard Batch Size for Task
Standard UM

Display-Only Fields (PM Maintenance):

PM Type
PM Name
Task Name
Standard Batch Size for Task
Standard UM

Display-Only Fields (subfiles for both programs):

Resource Type
Resource Number
Description
Quantity Relative to Task Batch Size in User UM
User-Defined UM Entry Fields:

Processing Option

Edits:

Processing Option must be X or blank.

Command Keys (Display):

| | |
|---|---|
| CK01 | Display Session Status Screen |
| CK18 | Refresh Screen |
| CK19 | Return without Update |

Command Keys (Non-Display):

| | |
|---|---|
| HELP | Display Additional Text |
| CK07 | Send Message to Action List |
| CK17 | Override Error Message |

Operation Selection Screen—MDE04007

On this screen the user can see a list of all operations defined for a PM/Task combination. During PM Maintenance, the screen appears when the user enters a valid PM Type/PM Name/Task Name combination and takes CK08. During Standard Task Maintenance, the screen appears when the user enters a Task Name and takes CK08.

The user may select a specific operation for maintenance by marking the operation with an X and pressing ENTER. If no operation is marked, the ENTER key simply returns the user to the Selection Screen. If an operation is marked, this Operation Maintenance Screen appears, and when maintenance is complete, the Selection Screen reappears.

The operations are displayed in Operation Number sequence. During PM Maintenance, lower limits are set to the PMOPER file using PM Type/PM Name/Task Name/blank Operation Number, and a series of READE operations is done (same key but without Operation Number). During Standard Task Maintenance, lower limits are set to the TASKOP file using Task Name/blank Operation Number, and a series of READE operations is done (same key but without Operation Number). For every successful READE, a record is added to the subfile. If the task has no operations, an error message appears.

Display-Only Fields (Standard Task Maintenance):

Task Name

Display-Only Fields (PM Maintenance):

PM Type
PM Name
Task Name

Display-Only Fields (subfile for both programs):

Operation Number
Work Center
Description

Entry Fields:

Processing Option

Edits:

Processing Option must be X or blank.

Command Keys (Display):

CK01 Display Session Status
CK18 Refresh Screen
CK19 Return Without Update

Command Keys (Non-Display):

HELP Display Additional Text
CK07 Send Message to Action List
CK17 Override Error Message

Operation Maintenance Screen—MDE04019

This screen appears in three cases: 1) if a PM Type/PM Name/Operation Number are entered on the PM Selection Screen, 2) if a Task Name/Operation Number are entered on the Standard Task Selection Screen, or 3) if CK08 is selected on the Resource Maintenance Screen.

On this screen the user can enter, change, and delete operations. The Action Code text is displayed in the upper right corner. The Date Last Maintenance is displayed for review.

The user can change the action on this screen without returning to the Selection Screen. To add or change another operation, the user must enter the next operation to be maintained in the Retrieval Field at the bottom of the screen and take CK12. The action is determined by whether the operation already exists. To delete another operation, the user must retrieve it using CK12 and then select CK20 twice.

When ENTER is selected after adding a new operation, a blank Operation Maintenance Screen appears. If ENTER is selected after maintaining an existing operation, the program returns to the screen where the Operation Maintenance Screen was originally called.

If CK06 is selected, the program transfers to the Resource Maintenance Screen.

For dependent PMs, the operation displayed is for view only. The operation record is retrieved by chaining to the PMOPER file using parent PM Type/parent PM Name/Task Name/Operation Number.

Resource Dependencies. The user can relate operations to consumed resources. By entering a Dependent Resource Number, the Dependent Operation field is set to N, and the Dependencies field is set to Y (both are set to N if no resource is to be created). The program verifies that this resource does not already exist by chaining to the PMRESR file using PM Type/PM Name/Task Name/Resource Type = C/Resource Number before it adds a record. If no resource was specified, a resource record is created for the default specified by the defined work center. If no default is specified, the default becomes a resource that has the same name as the work center. In either case, it must be a resource with a valid RESMST record.

After an operation that has a dependent resource is maintained (a Dependent Resource Number is entered and Dependent Resource = Y), the following fields are updated in the dependent consumed resource record: Quantity/PM (user UM), Quantity/PM (std UM), Quantity/Task (std UM), Setup Quantity, and Clean Up Quantity.

Data fields for operations that are dependent on resources (Dependent Operation = Y) are for display only. The user can, however, use CK15 to maintain these operations by breaking the connection. The Dependent Operation Number is blanked out, and the Dependent Resource and Dependent Operation fields are set to N on the resource record. Once the connection is broken, the consumed resource and the operation must be maintained independently.

The Quantity Relative to PM Batch Size is the conversion of run time in hours to the standard unit of measure for the resource. Also, Setup and Clean Up quantities are calculated by converting Setup and Clean Up times to the standard UM. The expression for hours is defined by a tailoring question in the Foundation module.

With CK10 the user can define comments that may be used as operation instructions.

Display-Only Fields:

PM Type (PM Maintenance Only)
PM Name (PM Maintenance Only)
Task Name
Operation Number (Change, Delete, View)
Action
Date Last Maintenance
Dependent Resource (Change, Delete, View)
Dependent Operation (Change, Delete, View)

Entry Fields:

Work Center
Schedule Sequence Number
Batch Consumption Code
Create Dependent Resource Record
Dependent Operation
Schedule Time Code
Description
Overlap Quantity Override
Loading Sequence Number
Critical Point Work Center
Dependent Work Center
Operation Has Dependent Resource
User Defined Schedule Time (Days)
User Defined Schedule Time (Hrs)
User Defined Schedule Time (Min)
Move Time (Days)
Move Time (Hrs)
Move Time (Min)
Move Time Defaults Queue Time (Days)
Queue Time (Hrs)
Queue Time (Min)
Queue Time Defaults
Setup Time (Hrs)
Setup Time (Min)
Setup Time Defaults
Run Time (Hrs)
Run Time (Min)
Run Time Defaults
Clean Up Time (Hrs)
Clean Up Time (Min)
Clean Up Time Defaults
Retrieval Operation
Dependent Resource Number Required Fields:

Operation Number
Description
Work Center

Edits:

Batch Consumption must be Y, N, or blank.

Create Dependent Resource record must be Y or N.

If a dependent resource is being created, a dependent resource number must exist in the default file (WCMAST) or on the screen.

If a resource number is specified to be created as a dependent resource, a Y must be entered in the Create Dependent Resource field, and the resource must not already exist on the task.

If an N appears in the Create Dependent Resource field, and the operation does not have a dependent resource, the dependent resource number field must be blank.

If a dependent resource number is entered and the operation does not yet have a dependent resource, the resource must exist in RESMST.

Critical Point Work Center must be Y or N.

Maximum Batch Size of the work center must be less than the standard batch size of the task.

Operation Number must be greater than zero (ADD only).

Operation cannot already be defined on the task (ADD only).

If an overlap quantity is entered, it cannot be greater than the maximum overlap quantity specified for the work center.

If the Retrieval Field is entered, the user must use CK12.

If the user selects CK12, the Retrieval Field must be greater than zero.

Schedule Time Code must be U or S.

All Time Defaults to Work Center fields must be Y or N.

Work Center must exist in WCMAST.

Defaults:

Critical Point Work Center = N
Schedule Code = S
Overlap Quantity from WCMAST
Batch Consumption from WCMAST
Queue Time Defaults = Y
Setup Time Defaults = Y Run Time Defaults = Y
Clean Up Time Defaults = Y
Move Time Defaults = Y
Create Dependent Resource Record = N The following fields default from WCMAST if the quantities in the default fields are zero. For example, if Clean Up Time Defaults = Y and both hours and minutes equal zero, the defaults from WCMAST are used. To override the defaults, Clean Up Time Defaults must equal N.

Queue Time (Days, Hours, Minutes)
Setup Time (Hours, Minutes)
Run Time (Hours, Minutes)
Cleanup Time (Hours, Minutes)
Move Time (Days, Hours, Minutes)

Command Keys (Display):

| | |
|---|---|
| CK01 | Display Session Status Screen |
| CK06 | Resource Maintenance |
| CK10 | Comment Entry |
| CK12 | Dependent Operation Maintenance |
| CK18 | Refresh Screen |
| CK19 | Return without Update |

Command Keys (Non-Display):

| | |
|---|---|
| HELP | Display Additional Text |
| CK07 | Send Message to Action List |
| CK17 | Override Error Message |
| CK20 | Delete a Record |

Operation Comment Maintenance Screen—MDE04018

Here the user can add comments for each operation. This screen appears by using CK10 from the Operation Maintenance Screen or selecting an operation from the Selection Screen. The PM Type, PM Name, Task Name, Operation Number, and Date Last Maintenance appear on the top of the screen for review only. During Standard Task Maintenance, the PM Type and PM Name are blank.

The subfile contains the comment text. Each line in the subfile represents a record in the COMMNT file (line 1 is sequence #00001, line 2 is sequence #00002, etc.). The subfile is built one page at a time. Each line contains a delete code that allows the user to delete lines of comment from the middle of the text. At least one line of comment is required, and blanks between lines are not allowed.

Display-Only Fields (Standard Task Maintenance):

Task Name
Date Last Maintenance
Operation Number

Display-Only Fields (PM Maintenance):

PM Type
PM Name
Task Name
Date Last Maintenance
Operation Number

Display-Only Fields (subfile) (Both Standard Task and PM Maintenance):

Sequence #

Entry Fields:

Operation Comments

D to Delete

Required Fields:

At least one comment line is required.

Edits:

Embedded blanks are not allowed in the subfile.
D to Delete field can contain D or blank.
First comment line must not be blank.

Command Keys (Display):

CK01 Display Session Status
CK18 Refresh Screen
CK19 Return Without Update

Command Keys (Non-Display):

HELP Display Additional Text
CK07 Send Message to Action List
CK17 Override Error Message

Session Status Screen—MDE04016

This screen displays the number of records added, changed, and deleted from the PMODEL, PMTASK, PMRESR, PMOPER, and COMMNT files. During PM Maintenance, it also shows the number of dependent and same-as-except PMs added. During Standard Task Maintenance, it shows the number of records added, changed, and deleted from the TASKMS, TASKRS, TASKOP, and COMMNT files. CK01 is available to end the program. If ENTER is selected, the program returns to the previous screen.

Display-Only Fields (Standard Task Maintenance):

Total Number of Tasks Added
Total Number of Resources Added
Total Number of Operations Added
Total Number of Comments Added
Total Number of Tasks Changed
Total Number of Resources Changed
Total Number of Operations Changed
Total Number of Comments Changed
Total Number of Tasks Deleted
Total Number of Resources Deleted
Total Number of Operations Deleted
Total Number of Comments Deleted Display-Only Fields (PM Maintenance):

Total Number of PMs Added
Total Number of Tasks Added
Total Number of Resources Added
Total Number of Operations Added
Total Number of Comments Added
Total Number of PMs Changed
Total Number of Tasks Changed
Total Number of Resources Changed
Total Number of Operations Changed
Total Number of Comments Changed
Total Number of PMs Deleted
Total Number of Tasks Deleted
Total Number of Resources Deleted
Total Number of Operations Deleted
Total Number of Comments Deleted
Total Number of Dependent PMs Added Total Number of Same As Except PMs Added Command Keys (Display):

CK01 Display Session Status

Command Keys (Non-Display):

HELP Display Additional Text
CK07 Send Message to Action List
CK17 Override Error Message

B.

| File | Usage |
|---|---|
| CLASCD | IF |
| COMMNT | IF |
| DEPCST | IF |
| ERRMSG | IF |
| MDE040FM | CF |
| PMODEL | UF |
| PMODELPA | IF |
| PMOPER | UF |
| PMRESR | UF |
| PMTASK | UF |
| PMTASKSQ | IF |
| PMTYPE | IF |
| PMUSGE | UF |
| RECLAS | IF |
| RESBAL | IF |
| RESMST | UF |
| RESUBC | IF |
| TALFLI | IF |
| TALFLZ | IF |
| TASKMS | UF |
| TASKOP | UF |
| TASKRS | UF |
| UMCONV | IF |
| WCMAST | IF |
| PRTCOMM | O |
| PRTMODEL | O |
| PRTOPER | O |
| PRTRESR | O |
| PRTTASK | O |

C.

| File Name | Field Name | Description |
|---|---|---|
| TALFLI | TACLNU | Variable heading for Clean Up |
| | TACSTP | Default Cost Rollup Type |
| | TAGRAD | Variable heading for Grade |
| | TAPMNM | Variable heading for PM Name |
| | TARESC | Variable heading for Resource |
| | TARUNT | Variable heading for Run Time |
| | TAWHSE | Default Warehouse |
| | TAWKCT | Variable heading for Work Center |
| TALFLZ | TANDEC | User Defined Number of Decimals |
| | TAUNHR | UM Expression for Hours |

D.

| Field Name | Position From | To | Description |
|---|---|---|---|
| $USRPF | 1811 | 1820 | User Profile |
| GPENTN | 1821 | 1830 | Entity Name |

| | | | |
|---|---|---|---|
| $USER | 1891 | 1891 | User Date Format |
| $UDATE | 1953 | 1958 | Current Date (User Format) |

F. Five registers print each time PM Maintenance is run, while four registers print for Standard Task Maintenance, regardless of the maintenance done.

The first register (output file - PRTMODEL) contains general PM information. The information on this register is mainly from the PMODEL file, and it details changes made during PM Maintenance. It is not printed after Standard Task Maintenance.

The second register (output file - PRTTASK) contains task information. The information on this register comes from the PMTASK file during PM Maintenance, and from the TASKMS file during Standard Task Maintenance. The results of activity on the Task Maintenance Screen appear on this register.

The third register (output file - PRTOPER) contains operation information. The information on this register comes from the PMOPER file during PM Maintenance, and from TASKOP during Standard Task Maintenance. The results of activity on the Operation Maintenance Screen appear on this register.

The fourth register (output file - PRTRESR) contains resource information. The information on this register comes from PMRESR during PM Maintenance, and from TASKRS during Standard Task Maintenance. The results of activity on the Resource Maintenance Screens appear on this register.

The fifth register (output file - PRTCOMM) contains operation comment information. The information on this register comes from the COMMNT file regardless of the program. The results of activity on the Operation Comment Screen appear on this register.

Section 1-4: Production Model Maintenance

When To Use Production Model Maintenance

Use this maintenance option to define and maintain your production models. *RP Concepts*, Section B of this manual, provides an important explanation of production models. The instructions in this section assume that you have read and now understand the concepts outlined in Section B.

Production Model (PM) Maintenance consists of three parts: task maintenance, resource maintenance, and operation maintenance. The information you enter during these parts is stored in your PM Task (PMTASK), PM Resource (PMRESR), and PM Operation (PMOPER) files.

PM Maintenance is the heart of your PRISM production system. Poorly defined production models will result in production inefficiency and inaccurate costing and analysis. Again, be sure you have read Section B before attempting PM Maintenance.

You may also perform maintenance on production models during Schedule Maintenance (see Section 7-3 of your RM reference manual). The changes you make there do not affect your RP files.

Before Performing PM Maintenance

Before performing PM Maintenance, you must perform the following Resource Management maintenance functions:

1. *Tailoring*: Here you define defaults for some PM Maintenance fields. See Section C of your RM reference manual for details. In most cases, it is recommended that you leave these fields blank on the screens to allow the default to "come through". In some cases, however, you may want to change the value for a specific PM.
2. *Resource Class, Sub-Class, Master,* and *Balance Maintenance*: Here you define the valid resources for your system and assign them a class and sub-class. See Sections 1-11, 1-12, 1-13, and 1-15 of your RM reference manual for details.
3. *Unit of Measure Conversion Maintenance*: PRISM must be able to convert to and from the various units of measure assigned to the batch quantities you enter during PM Maintenance. It must also be able to convert units for resources to units for operation times. See Section 1-19 of your RM reference manual for conversion details.
4. *Location Classification Maintenance*: Here you define types of locations, such as stock, inspection, or hold. See Section 1-4 of your RM reference manual for details.

Before performing PM Maintenance, you must also perform the following Resource Processor maintenance functions:

1. *Tailoring:* Here you define defaults for some PM Maintenance fields. See Section C, *Installation and Tailoring*, of this reference manual for details.
2. *PM Type Maintenance*: Here you define type codes for PMs with similar characteristics. See Section 1-2 of this reference manual for details.
3. *Work Center Maintenance:* Here you define the standard setup, run, cleanup, and move times for your machines and work centers. See Section 1-7 of this reference manual for details.

If you are defining a new production model, DO NOT plan on entering part of the PM and coming back to complete the process later. PRISM will not let you exit PM Maintenance until you have defined your production model completely and correctly. For this reason do not attempt PM Maintenance until you have taken heed of the following suggestions:

1. Outline your PM thoroughly, preferably on paper, with resource numbers, task and operation names, and sequences clearly marked. To save yourself time and frustration, make sure this outline takes into account the resource requirements for each task.
2. For the first few PMs that you define, allow yourself plenty of time to complete the process. This procedure is fairly complex and extremely important. How long it takes to define a PM will vary with its complexity.

Should Your PM Maintenance Session End Abnormally

If your PM Maintenance session ends abnormally, run a PM Usage File Purge (Section 5-4). This program clears your PM Usage File. Until you purge it, the PM you were maintaining before the abnormal termination is considered "in use" and is therefore unavailable for selection. See Section 5-4 for details.

How To Use Production Model Maintenance

When you select Option 4 from the RP Maintenance Menu the Production Model Maintenance Selection Screen is displayed. Here you enter the name and type of the production model, task, resource, or operation you want to add or maintain. If you are creating a new production model, it is easiest to use the following order:

1. Define the summary information for your PM.
2. Define the first task on the PM.
3. Define all consumed resources for the task. Then define all produced resources for the task.
4. Define all operations for the task.
5. Enter any special comments or instructions for each operation.
6. Repeat the process for each task until your PM is complete.

Production Model Maintenance Selection Screen—MDE04001

SCREEN: (see Figure 6)

The first screen that appears when you select option 4 is the Production Model Maintenance Selection Screen. Use this screen to specify what PM information you want to add or maintain. Only one user may maintain a given PM at a time.

You may select information using any of the following combinations of entry fields and command function keys:

1. PM Type, PM Name, Action Code, and ENTER—Use this combination to define a new PM or to maintain summary information for an existing PM.
2. PM Type, PM Name, Task Name, Action Code, and ENTER—For an existing PM, this combination takes you directly to a screen where you can update task information. Or if you are entering information for a new task, enter its name.
3. PM Type, PM Name, Task Name, Resource #, Action Code, and ENTER (or PM Type, PM Name, Task Name, Resource #, Resource Type, Action Code, and ENTER)—These combinations allow you to update information for resources you have previously defined. Or if you are entering information for a new resource, enter its name.
4. PM Type, PM Name, Task Name, Operation #, Action Code, and ENTER—This combination allows you to update information for operations you have previously defined. Or if you are entering information for a new operation, enter its name.
5. Use CK04 with at least a PM Type and PM Name to display a list of all tasks for the selected PM. You can then choose which task(s) you want to maintain.
6. Use CK06 with at least a PM Type, PM Name, and Task Name to display a list of all produced and consumed resources for the task. You can then choose which resource(s) you want to maintain.

7. Use CK08 with at least a PM Type, PM Name, and Task Name to display a list of all operations for the task. You can then choose which operation(s) you want to maintain.
8. Use CK10 to display the Same As Except Screen. Use this screen to copy a PM. You may then maintain the new PM as a separate PM.

Fields for Entry

Resource—Enter the number of the consumed or produced resource you want to maintain. Note that stream resources do not have assigned resource numbers. Leave this field blank to add or maintain a stream resource on a task.

Resource Type—required if you entered Resource Number above. Enter the type code associated with the above resource: P if it is a produced resource, C if it is a consumed resource. If you are maintaining an existing resource and leave this field blank, PRISM checks first for a consumed resource with that number and then for a produced resource. It displays the first record it finds.

Operation Number—Enter the number of the operation you want to maintain.

Task Name—Enter the name of the task you want to maintain.

PM NAME—Enter the name of the production model you want to add or maintain.

PM TYPE—Enter the type code associated with the above name.

Action Code—Enter A to add, C to change, or D to delete the selected record.

This field may be optional or required. If an Action Code is not required, the program works this way. If the record you entered does not exist, PRISM assumes you are adding it. If it does exist, PRISM assumes you are changing it. To delete a record when the Action Code is not required, first enter the fields to select the record. You may press ENTER to display the record before you delete it or use CK20 to delete it without looking at it.

Note: During your early stages of using PRISM, you may want to require the Action Code. This will avoid confusion about new and existing records until all users are comfortable with the system. You can do this by setting the appropriate severity code to message D00164 through Message File Maintenance (see Section 1-4 of the Foundation reference manual).

Command Function Keys

ENTER—Press ENTER to display the appropriate maintenance screen.

CK01 DISPLAY SESSION STATUS SCREEN—Use CK01 to display the Session Status Screen where you may review maintenance activity so far this session.

CK04 TASK SELECTION SCREEN—Use CK04 with at least a PM Type and PM Name to call up a list of all tasks for the PM. You may then choose the task(s) you want to maintain.

CK06 RESOURCE SELECTION SCREEN—Use CK06 with at least a PM Type, PM Name, and Task Name to call up a list of all consumed and produced resources for the task. You may then choose the resource(s) you want to maintain.

CK08 OPERATION SELECTION SCREEN—Use CK08 with at least a PM Type, PM Name, and Task Name to call up a list of all operations for the task. You may then choose the operation(s) you want to maintain.tt CK10 SAME AS EXCEPT SCREEN—Use CK10 to call up the Same As Except Screen. Use this screen to copy a PM.

Production Model Maintenance Screen—MDE04010

SCREEN: (see Figure 7)

When you specify a PM Name/PM Type on the Selection Screen and press ENTER, PRISM displays the Production Model Maintenance Screen. Use this screen to define, or maintain summary information for the selected PM.

Fields for Display

PM Type.

* PM Name.

Date Last Maintenance—date you last updated summary information for this PM, or today's date if you are defining a new PM.

System-Calculated Cost Level Code—This field only applies if at least one of the consumed resources on this PM is manufactured by another PM. If you do not enter your own Cost Level Code, PRISM can assign one with the Cost Level Code Calculator program (see Section 5-1 for details).

Cost level codes tell the cost rollup program where to stop during a rollup that could result in an endless loop. For example, suppose Resource A is made by mixing resources B and C. Yet some of A is used to produce C.

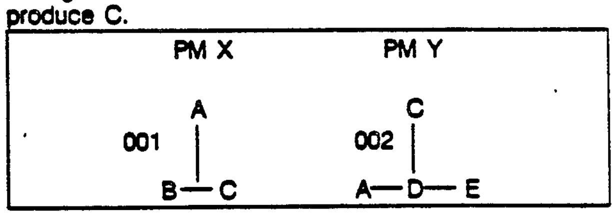

To rollup the cost of A, PRISM must first rollup the cost for C. But to rollup the cost for C, it must have the cost for A. In this situation an endless circle of rollups can begin.

To solve the looping problem, PRISM assigns the PMs cost level codes in ascending order, from the most general or higher level PM to the most specific or lower level PM. In our example, PM X receives a cost level code of 001, and PM Y a level code of 002.

The cost level code rule tells PRISM not to rollup the lower level PM if the cost level code is equal to or less than the cost level code of the current PM. Following the cost level code rule, PRISM does not use the rolled up cost of A to roll up the cost of C. Instead it rolls up C using the selected unit cost defined for resource A in Resource Master Maintenance.

Recost Y/N—If you update any consumed resource quantities on this PM, PRISM marks the PM for recosting. This indicates that the current rolled up costs of the resources produced by the PM are no longer valid. You must perform a FULL cost rollup (see *Cost Rollup Report—Actual*, Section 2-2) to have PRISM recalculate the new rolled up costs.

Date Last Rollup—date you last rolled up the cost of this PM.

Dependencies on this PM—A Y means this is a parent PM.

Fields for Entry

DESCRIPTION—Enter the full-length name for this PM.

Plant Number—Enter the number of the manufacturing facility or line area where this PM typically occurs. For new PMs, this defaults from the plant number you assigned to this PM type in PM Type Maintenance.

STANDARD BATCH SIZE—Enter the quantity expressed by one run of the PM. For instance, you may consider the PM by the number of days it runs or the number of cases it produces. When you press ENTER, PRISM retrieves the standard batch size of the parent PM.

Keep in mind that PM batch size is the standard for all other task and resource quantities defined during PM Maintenance. Should you change your standard batch size, you must also adjust all other batch and quantity fields to reflect the change.

Note: In Resource Management you open schedules for the quantity of a resource you want to produce. PRISM divides this quantity by the Standard Batch Size to determine how many batches need to be run. The largest number of batches PRISM accepts is 9999.999. Therefore, you should define a Standard Batch Size large enough to accomodate large schedule quantities.

Warehouse—Enter the number of the default warehouse where resources consumed and produced by this PM are stocked.

STANDARD BATCH SIZE UM—If this is not a dependent PM, enter the unit of measure associated with the PM batch size. If you are defining a dependent PM, this field must be blank. When you press ENTER, PRISM retrieves the parent PM standard batch unit of measure.

Theoretical Consumption (C/D/T)—for consumed resources only. Your entry here is used if you leave the Theoretical Consumption field blank on the Resource Maintenance Screen. If you do not enter a value here, the Theoretical Consumption code is taken from the Resource Master File. It is recommended that you leave this field blank to accept the Resource Master file default. If you are defining a dependent PM, you must leave this field blank to allow PRISM to insert the parent PM code.

If you prefer, however, to override the default, enter the letter for the corresponding method. You have three options:

D for Direct. With this code you must enter a transaction each time resources are issued to a task.

This code encourages precise resource tracking. If you answered no to RM tailoring question #Q17, prohibiting theoretical consumption, you must enter D.

C for calculated. Use this code to perform calculated theoretical consumption of small, high-volume resources such as screws. You use an IP (issue to production) transaction to issue the stock of screws to the shop floor. At this time, PRISM reduces inventory, but does not know what task will actually use the resource.

When you enter a PR (production receipt) transaction for a resource produced by the production model, PRISM generates a CC (calculated consumption) transaction. You do not have to tell the system how much of this resource you used. The system uses the quantity received from production to calculate how much of the resource you *must* have used. Note that here a C confirms schedule production, but does NOT reduce inventory.

T for theoretical consumption. Enter T for resources you want theoretically consumed. These could be balance resources too numerous and inexpensive to count, such as salt or screws, or non-balance resources such as labor or electricity.

When a PR transaction is entered, the system calculates the quantity of the resource used based on the quantity of the end resource produced. Suppose the PM produces 500 pounds of tomato paste per batch and uses .5 KwH of electricity per 50 pounds of paste (electricity has a theoretical consumption code of T). When you enter a PR transaction for 300 pounds of tomato paste, the system automatically generates a TC (theoretical consumption) transaction for 3 KwH of electricity.

SYSTEM RECALCULATES LEAD TIME—If you leave the Y, PRISM automatically recalculates the cumulative lead time for this PM during cost rollup and updates the Cumulative Lead Time field accordingly. If you enter N in this field, the Cumulative Lead Time you enter below is never updated by the system.

IMPORTANT: A System Recalculates Lead Time field also appears on the Task Maintenance Screen. You may enter Y in the PM field and N in any of the task fields. This allows you to leave the PM lead time fixed while adjusting the task lead times to reflect any changes you have made to move times, resource lead times, or operation setup, run, and move times. If you enter N in the PM field, however, all task recalculate lead time fields *must* also be N.

Cumulative Lead Time—Enter the estimated cumulative lead time for this PM, in days. Cumulative lead time represents the amount of time required to acquire all consumed resources needed for this PM and perform all tasks and operations.

To understand how PRISM assigns a cumulative lead time to a PM, you should first understand how lead times apply to resources, tasks, and operations. Consider this diagram:

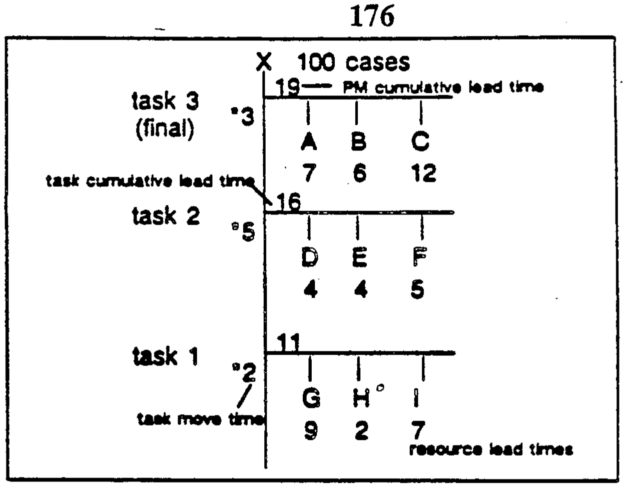

To calculate cumulative lead time for a PM, start at the bottom of the PM. The numbers under the letters represent resource lead times. To total the lead time for the first task, first find the resource with the longest lead time. It is G, with a lead time of 9 days. Then add to it the task move time, that is, the number of days required to move the produced resource on to the next task. In this case, it is 2, the starred number. Were there operations on this task, the total combined setup, run, and move times would also be added to the task lead time.

A stream resource flows from each task, and its lead time is the sum of the longest resource lead time, the task move time, and operation setup, run and move lead times. For the first task, it is 11.

The lead time for task 1 becomes the lead time of the stream resource moving from task 1 to task 2. The stream resource is considered when determining the longest resource lead time for task 2. In this example, the stream turns out to be the resource with the longest cumulative lead time. So, the lead time for task two equals: 5 (move time for the task) + 11 (longest resource lead time) or 16.

Again, the lead time for task 2 becomes the lead time for the stream resource moving from task 2 to 3. And again, the stream has the longest cumulative lead time of all resources. So, the lead time for task 3 equals: 3 (task move time) + 16 (longest cumulative resource lead time) or 19.

The adjective "cumulative" means that the lead time of each task is accumulated or rolled in to the lead time for the next task, as the example illustrates. The cumulative lead time for the PM always equals the cumulative lead time for the final task.

Note: During Resource Master Maintenance, you may assign a PO and Mfg lead time 1 and 2 and a PO and Mfg quantity break to each resource. If the required resource quantity is less than the quantity break, PRISM will use lead time 1 in its cumulative lead time calculations. If the quantity is greater than the quantity break, PRISM will use lead time 2. If you define a lead time adjustment, PRISM also adds this to the total allowed resource lead time.

User-Assigned Cost Level Code—Enter the cost level code you want to assign to this PM. Or you can have PRISM calculate cost level codes for you. See System-Calculated Cost Level Code under Fields for Display.

Sensitivity Factor %—Enter the sensitivity factor percentage you want to assign to this PM.

If a fraction of a PM batch must be run to fulfill an order, this percentage determines if the quantity is great enough to justify running the additional batch. For example, if the sensitivity factor is 4 percent, PRISM schedules the additional batch if the required quantity is at least 4 percent of the batch size. You may also define a sensitivity factor percentage for each PM task. If you change the default at the task level, the task sensitivity factor overrides the PM factor in determining whether or not to produce the additional quantity.

This field is primarily for use with the Planning Module.

EC Level—Enter the engineering change level number you want to assign to this PM. Use the EC level to distinguish between newer versions of the same PM. For example, you may be substituting a newly developed sweetener into a product or thinning the sauce. You can decide exactly how to use this informational field.

Production Sequence Number—If you intend to run this PM as part of a group of PMs, enter the sequence number for this PM, or where it falls in the series of PMs. Sequencing is designed to prioritize PMs and minimize the required cleanup and setup between runs. If you are using the same machine for a series of operations, sequencing allows you to ensure, for example, that you produce plain breadcrumbs before garlic breadcrumbs. You have little or no cleanup requirement if you perform the production in the correct sequence. You should assign sequence numbers in multiples of 10 or 100 so you may insert additional PMs into the sequence later.

Last Complete Period Average Yield %—A user authorized to maintain historical information can use CK05 and enter a value.

To calculate the percentage, PRISM divides the actual quantity by the expected quantity and multiplies by the expected yield percentage. The Last Complete Period Average Yield % is the average of all yield percentages for every schedule/release of the PM for the period.

Dependency Code—This field is only available for entry when adding a new PM.

Leave the default as I if you are defining an independent PM. Enter D if you plan to make this PM dependent on an already existing PM. For example, if you have a PM that uses fresh tomatoes, you might create a dependent PM that would be identical except for replacing fresh tomatoes with canned tomatoes. When you define a PM as dependent, PRISM associates all tasks, resources, and operations of the parent PM with the dependent. Note the word "associates". The parent data itself is not copied into the new PM record, only the basic structure of the PM.

If you enter D, you must also enter the Parent PM Type and Parent PM Name fields at the bottom of this screen. You may only maintain selected fields on a dependent PM. You may change the summary information for the PM with the exception of three fields: Standard Batch Size, Batch Size UM, and Theoretical Consumption. These three fields must be the same for parent and dependent PM to insure the integrity of the PM formula.

You may also maintain the consumed resources to be used by the dependent PM. You may not, however, add new consumed resources directly to the dependent PM. You must first add the resource to the parent with a quantity of zero and then maintain it, changing the quantity on the dependent PM. You also cannot change or delete any dependent PM tasks or operations.

The parent/dependent relationship places restrictions on the parent PM as well. For example, you may not delete the parent PM as long as it has dependencies. Once you change consumed resource data on a dependent PM, you may not delete the resource on the parent PM. The parent resource is said to have resource dependencies. You may, however, override the changes using the Override field and then delete the record.

When you purge a schedule, PRISM updates production distribution percentages and resource yields and quantities for the PM. When you purge a dependent PM, PRISM updates these values into both the dependent and parent PM records. It assumes that the user has set up the parent/dependent relationship for a very minor and frequently run variation of the parent PM. Do not make a dependent PM, then, if you are interested in tracking historical data separately for the two PMs.

If you are interested in using one PM simply as a building block for another PM, use the Same As Except Screen described later in this section.

Historical Average Yield %—A user authorized to maintain historical information can use CK05 and enter a value. Historical Average Yield % equals the average of the actual yield percentages.

Last Yield %—A user authorized to maintain historical information can use CK05 and enter a value. Last Yield % equals the last produced quantity divided by the expected quantity, the result of which is multiplied by the expected yield percentage.

Parent PM Type/° PM Name—The Parent PM Type and Name only appear when you are defining a new PM or maintaining a dependent PM. If you entered D in the Dependency Code field, enter the type code and name of the PM on which this production model is dependent.

Command Function Keys

ENTER—When you key in all required summary information for a new independent PM and press ENTER, PRISM displays the Task Maintenance Screen. Use this screen to define the first task on your new PM.

When you key in all required summary information for a new dependent PM and press ENTER, PRISM returns you to the Selection Screen with the new PM Type and PM Name in place. At this point you have three options:

1. To maintain summary information for the dependent PM, change the Action Code to C and press ENTER.
2. If you know the name of the Parent PM task on which a resource is consumed or produced, enter the Task Name and use CK06 to display the Resource Selection Screen. The screen lists all resources for the task.

3. If you want to maintain consumed resources, enter a PM Type and PM Name and use CK04 to display the Task Selection Screen. If you enter an R beside a task on this screen, PRISM displays all resources for the task. If you enter X, PRISM displays the task with a message warning you that the task is for view only. Remember that you may not maintain tasks or operations on dependent PMs, only resources consumed by the tasks. If you enter O beside a task, PRISM displays the Operation Selection Screen. You may select an operation for view only.
4. Enter the Task Name and use CK08 to display all operations for the task on the Operation Selection Screen.
5. Enter a PM Type and PM Name and use CK10 to display the Same As Except Screen.

CK01 DISPLAY SESSION STATUS SCREEN—Use CK01 to call up the Session Status Screen and then exit the option.

CK05 HISTORICAL YIELD MAINT—If you are authorized to maintain historical information, use CK05 to make the yield fields on this screen available for entry.

CK18 REFRESH SCREEN—CK18 displays the PM summary data that was on the screen when it first appeared.

CK19 RETURN WITHOUT UPDATE—Use CK19 to return to the PM Maintenance Selection Screen without updating summary information for this PM.

Task Selection Screen—MDE04003

Figure 8:
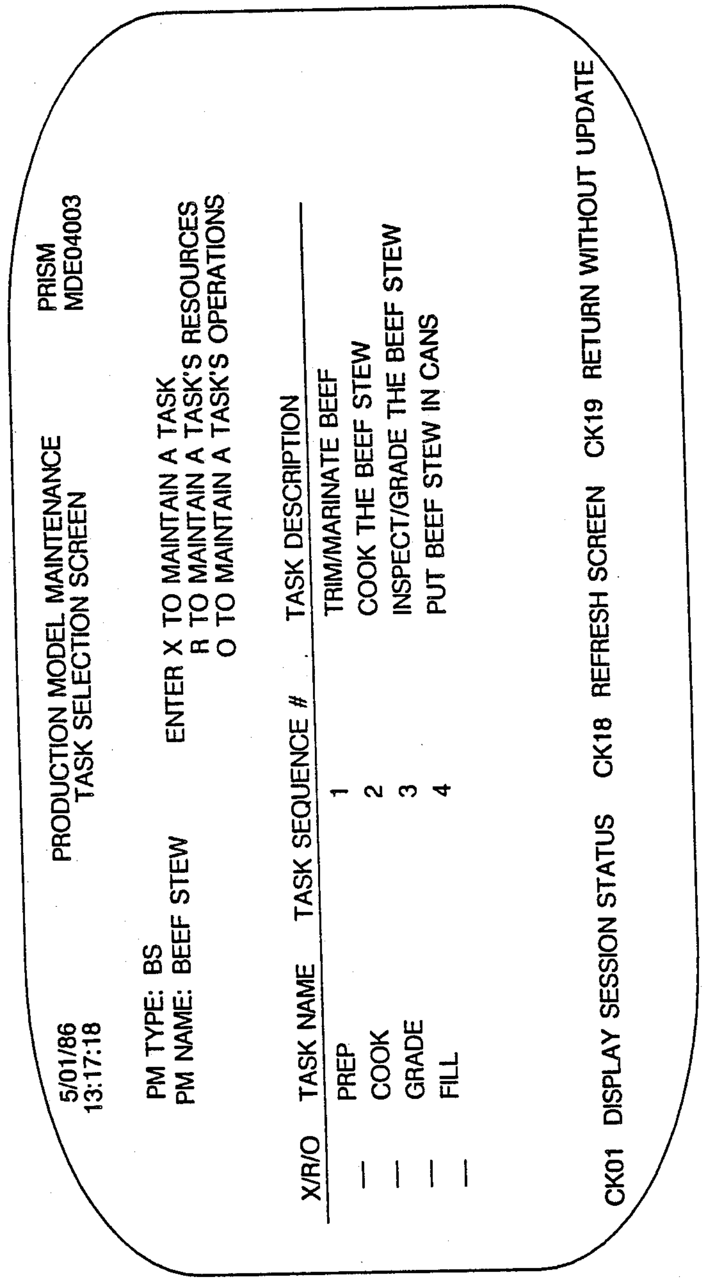

SCREEN: (see Fig. 8)

When you enter at least the PM Type and Name of a PM with tasks and use CK04, the Task Selection Screen is displayed. This screen is helpful when you do not know the name of the PM task you want to maintain. From this screen, you may select a task for maintenance or display another Selection Screen showing all resources or operations currently defined for the task.

Fields for Display

PM Type.

PM Name.

Task Name—PRISM displays the name of each task on the PM.

Task Sequence #—PRISM displays the sequence number you assigned to this task. The Task Sequence Number indicates where the task falls in a series on the PM.

Task Description.

Fields for Entry

X/R/O—Enter X at the beginning of the line to display information for the task. If this is a dependent PM, you may only view the tasks.

Enter R to display a Resource Selection Screen which lists all resources consumed and produced by the task.

Enter O to display an Operation Selection Screen which lists all operations defined for the task.

Note: You may enter X, R, or O for more than one task. When you press ENTER, PRISM brings up the screen for the first task. When you press ENTER again, the Task Selection Screen is redisplayed. Your second entry is still in place, but you must press ENTER to display it on the next screen.

SPECIAL NOTE ON PM MAINTENANCE SELECTION SCREENS: If you changed and updated a new task name or description, you will notice that the updated version does not appear on the redisplayed Task Selection Screen. This occurs with all PM Maintenance Selection Screens. If you delete a task, resource, or operation, for example, it is still listed on the Selection Screen when the screen reappears. The description, however, says "DELETED".

This does not mean that PRISM has not updated your changes. If you use CK18 any updated values are in place and a deleted record no longer appears on the list.

Command Function Keys

ENTER—Press ENTER to display the next selection or maintenance screen.

CK01 DISPLAY SESSION STATUS SCREEN—Use CK01 to call up the Session Status Screen.

CK18 REFRESH SCREEN—Use CK18 to blank out the X/R/O entry field.

CK19 RETURN WITHOUT UPDATE—Use CK19 to return to the PM or Standard Task Maintenance Selection Screen.

Task Maintenance Screen—MDE04011

SCREEN: (see Figure 9)

Use this screen to define summary information for a new task or maintain data for an existing task. PRISM stores this summary task information in your Production Model Task File (PMTASK).

Tasks are the steps or stages of your production model. They are also the lowest level at which yield, production, and consumption can be reported. You may define tasks as reportable or nonreportable. When a task is reportable, you must tell PRISM what you received out of the task.

Remember that you may not maintain task information for dependent PMs. PRISM displays the task but in VIEW mode only.

Note: Some of the following fields may be display only, entry, or never displayed at all depending on whether you called the Task Maintenance Screen from PM Maintenance or Standard Task Maintenance.

Fields for Display

PM Type—only appears during PM Maintenance.

* PM Name.

Action—ADD if you are defining a new task, CHANGE if you are maintaining a task on an independent PM, VIEW if you are reviewing a parent task or a dependent PM task.

Date Last Maintenance—date you last updated summary information for this task, or today's date if you are defining a new task.

Quantity Equivalence—only appears during PM Maintenance. PRISM calculates quantity equivalence by dividing the Standard PM Batch Size by the task Batch Equivalence.

Dependencies on this Task—only displays if you are defining or maintaining a task for a parent PM. A Y indicates that this task has at least one resource with dependencies. An N indicates no resource dependencies.

Suppose that you have a dependent PM and parent PM. On the dependent PM you change the quantity of consumed resource A. You have now changed the requirements for A. PRISM associates the new quantity for A with the dependent PM, but recognizes that, aside from the quantity exception, the dependent PM still "looks" at the parent PM definition of A. To recognize this change and dependency, PRISM updates the Dependencies on this Task field to a Y for the parent PM task.

Number of Dependencies—only appears during PM Maintenance. If the Dependencies on this Task field is Y, PRISM displays the number of dependencies associated with this task.

In reviewing the number of dependencies, it is important to understand that the dependency is actually tied to the resource and not the task. In our example above, the task consuming resource A has one dependency, meaning a change has been made to resource A on at least one dependent PM. If you make changes to resource A on two or 20 dependent PMs, the parent PM task consuming A will still show only one dependency. If the task also consumes a resource B and you make changes to B on at least one dependent PM, the parent PM task now has two dependencies Reportable Task—N for all new tasks and for an existing task with no reportable produced resources, Y if this task includes the first reportable resource.

Fields for Entry

TASK NAME—If you are defining a new task, and you did not enter the task name on the PM or Standard Task Maintenance Selection Screen, enter the name of the task here. If you are maintaining an existing task, PRISM displays the name here. You may not change a task name once assigned.

Description—Enter a new or revised description for this task.

Task Sequence Number—For new tasks, enter the sequence number you want to assign to this task. This field is required for new tasks and may not be changed once assigned. Sequence Number determines the order in which tasks are performed on the PM. It is recommended that you assign sequence numbers in multiples of 10 or 100 to make it easier to add tasks later.

Standard Task Batch Size—required for standard tasks, optional for regular tasks. Enter the standard quantity of resource produced by this task. If left blank, this field defaults to the Standard PM Batch Size.

When assigning a task batch size to regular PM tasks, keep in mind that the task batch size cannot exceed the maximum allowed at the work centers where the operation is to be performed.

Move Time Days/Hours/Minutes—Enter the time required to move resources from this task to the next, or, for final PM tasks, to stock or another PM.

Standard Task Batch Size UM—Enter the unit of measure associated with the Standard Task Batch Size defined above. If left blank, this field defaults to the Standard Batch Size UM. Keep in mind that PRISM must be able to convert this unit of measure to any specified work center unit of measure.

Batch Equivalence—only appears during PM Maintenance. Enter the number of task batches needed to produce one PM batch.

For example, suppose you are defining a task to slice potatoes. To make 100 gallons of beef stew (the PM Standard Batch Size), you need to slice 50 pounds of potatoes. If you defined your standard task batch size as 25, your batch equivalence equals two. You must slice two 25-pound batches of potatoes to meet your PM requirements.

Cumulative Lead Time—Enter the cumulative lead time for this task. Cumulative lead time equals: longest cumulative resource lead time + task move time + the sum of all setup, run, and move times for operations defined on the task.

System Recalculates Lead Time—If you leave the default Y, PRISM recalculates the cumulative lead time for this task during cost rollup and updates the cumulative lead time field. If you enter N, the Cumulative Lead Time you enter is fixed.

Sensitivity Factor %—Enter the sensitivity factor percentage for this task.

Yield Factor Standard Deviation—Enter the percentage above and below which the yield for this task is expected to deviate. For example, if you estimate a yield percentage for this task of 95 percent and assign a yield factor standard deviation of two percent, a yield percentage range of 93 through 97 is acceptable.

Critical Point Task Code—Enter Y if this task has at least one critical point or bottleneck operation. Enter N if this task does not present any production backups.

Yld Factor %—Enter the estimated yield percentage expected from this task. This field defaults to 100 percent.

The following fields default to zero for new tasks. They are for display only for existing tasks unless a user authorized to maintain historical information uses CK05 to make them available for entry.

Last Complete Period Average Yld %—This is the average of all yields for this task from every schedule/release of the PM.

Historical Average Yld %—Historical Average Yield is the average of the average task yield to date and the Last Yield from this PM.

Last Yld %—This is the last yield, calculated for this task during the purge of the last schedule/release of the PM.

Final Task—This field does not appear in View Mode or if you called the screen from Standard Task Maintenance. Enter Y if this is the last task to be performed on this PM. Enter N if it is not. For details on restrictions that apply to final tasks, see the Resource Rules list later in this section.

Task Retrieval Field—This entry field is not available in View Mode or if you called the screen from Standard Task Maintenance.

If you have just added or maintained one task and now want to display another task within the same PM, enter the task name and use CK10. PRISM displays the retrieved task information.

To retrieve a standard task, you must first transfer to ADD Mode. To do this, enter in the Task Retrieval Field the name you want to assign to the new task. Use CK12 to display a fresh Task Maintenance Screen. Now enter the name of the standard task you want to copy in the Task Retrieval Field and use CK10. PRISM displays the summary data for the retrieved standard task.

WARNING: If you use CK10 to retrieve a standard task and then discover you have called up the wrong standard task data, you may not use CK19. You must either use CK20 to delete the task or CK01 to exit task maintenance altogether.

When you purge a schedule in RM (see Section 7-15 of your RM reference manual), PRISM updates RP Production Model Files with yield, cost, and quantity information. If task information is updated by a purge, that new information replaces the old where ever the task name appears.

The following example illustrates the potential problem. Let's say you have a standard task called Cook where you simmer the beef stew. Suppose someone copies this standard task into a new PM for making soup. They make changes to the copy, altering operations and resources to fit the soup PM. Now although the tasks have the same name, both Cook, they are really different tasks that include different information. But when you purge a schedule that uses Cook, PRISM updates Soup Cook and Standard Task Cook, making no distinction between the two tasks. Your data is then not accurate.

So, if you copy a standard task into a PM and are planning to change it substantially, you should change its name when the copy is made to distinguish it from the standard task.

When using CK12 to retrieve a regular task, make sure you have updated the current task before retrieving another. If you do not press ENTER, PRISM ignores any current task data and substitutes the retrieved information.

Command Function Keys

ENTER—If you are defining a new task, when you press ENTER PRISM displays the Resource Maintenance Screen. If you are maintaining an existing task, press ENTER to update and return to the PM, Standard Task Maintenance, or Task Selection Screen.

CK01 SESSION STATUS SCREEN—Use CK01 to display the Session Status Screen, which shows the number of records added, changed, and deleted so far this session.

CK05 HIST YIELD MAINT—This command key does not appear during view mode. If you are authorized to maintain historical yield information, use CK05 to make the yield fields available for entry.

CK10 COPY STANDARD TASK—This command key only appears during PM Maintenance.

CK12 RETRIEVE TASK—This command key only appears during PM Maintenance.

CK18 REFRESH SCREEN—Use CK18 to redisplay the default or task information that was on the screen when it first appeared.

CK19 RETURN WITHOUT UPDATE—Use CK19 to return to the PM, Standard Task Maintenance, or Task Selection Screen.

Resource Selection Screen—MDE04005

SCREEN: (see Figure 10)

Use this screen when you want to maintain a resource but are unsure of the resource number. The screen contains a list of all resources defined for the task.

Fields for Display

PM Type—type code of the PM being maintained. This field only appears during PM Maintenance.

* PM Name.

Task Name—name of the task consuming or producing the resources.

Standard Batch Size for Task.

UM—unit of measure for the standard batch size.

Type—C if this is a consumed resource, P if it is a produced resource.

* Resource.

Description.

Qty Rel to Task Batch Size—For consumed resources, this is the quantity needed to produce one standard task batch. For produced resources, this is the quantity produced from one standard batch.

UM—unit of measure for the above quantity.

Fields for Entry

X—Enter X beside the resource(s) you want to maintain. You may select as many resources for maintenance as you like, and PRISM will display one record at a time on the Resource Maintenance Screen.

Command Function Keys

ENTER—Press ENTER to display the selected resource record on the Resource Maintenance Screen. If you chose to maintain more than one resource, ENTER will return you to the Selection Screen where you must use ENTER again to display information for the next resource.

Note: If you delete a resource or change its description, quantity relative to task batch size, or unit of measure, these changes do not appear on the Selection Screen during the current session. You can, however, use CK18 to display the new summary data without leaving the Selection Screen.

CK01 DISPLAY SESSION STATUS SCREEN—Use CK01 to display the Session Status Screen for the program you are working on. This screen shows the total number records added, changed, and deleted so far this session.

CK18 REFRESH SCREEN—Use CK18 to blank out any entries in the X select field and display the most current information.

CK19 RETURN WITHOUT UPDATE—Use CK19 to return to the screen where you initially called the Resource Selection Screen.

Defining Resources

The two Resource Maintenance Screens allow you to define the resources both consumed and produced by each task. The first screen contains mainly quantity information, while the second screen contains both quantity and cost information.

IMPORTANT NOTE: The second Resource Maintenance Screen appears when you press ENTER while on the first screen. To update information you entered on the first screen, you must display the second screen and press ENTER.

Resource Rules

When defining resources, you must understand and strictly follow the rules explained below. A simplified rules chart follows these detailed definitions.

1. The first task on a PM cannot consume a stream resource.

Since the first task has no other tasks before it from which it can receive a stream resource, it cannot use a stream resource. It can, however, produce a stream resource.

2. Every task other than the first must have one consumed stream resource. It cannot have more than one.

For example, the task Cook might use the stream resource beef broth prepared in the previous Broth Prep task.

3. Every task other than the last must produce one stream resource. It may not produce more than one.

This allows the cost and production distribution percentages for the next task to be accurate.

4. The final task cannot produce a stream resource, since there are no other tasks to consume it.

If you violate rules #2, #4, or #5, PRISM displays the Task Selection Screen with an appropriate error message. PRISM places an R beside the task it suspects is causing the problem. You must press ENTER to display the Resource Selection Screen and correct the problem before you can exit PM or Standard Task Maintenance.

5. Every task must have at least one produced resource.

This reportable resource may be a stream or nonstream. The task must make something for which you track the cost of production.

6. Each task may have only one non-reportable, non-stream produced resource.

It may, however, have any number of reportable produced resources.

7. If your PM has one task only (this task is both the first and last task on the PM), it may not have any stream resources.

It must have at least one reportable produced resource and not more than one nonreportable produced resource.

8. If you are creating a standard task, you must define at least one consumed resource.

The normal resource requirements for each task do not come into play until you copy the standard task onto a PM as a regular task.

RESOURCE REQUIREMENTS

| MUST HAVE | CANNOT HAVE |
|---|---|
| AT LEAST 1 CONSUMED STREAM RESOURCE | MORE THAN 1 CONSUMED STREAM RESOURCE |
| AT LEAST 1 CONSUMED NON-STREAM RESOURCE | MORE THAN 1 NON-REPORTABLE PRODUCED |
| AT LEAST 1 PRODUCED STREAM RESOURCE | |
| AT LEAST 1 REPORTABLE PRODUCED RESOURCE (STREAM OR NON-STREAM) | *FIRST TASK* |
| | A CONSUMED STREAM RESOURCE |
| *STANDARD TASKS* | *LAST TASK* |
| AT LEAST 1 CONSUMED RESOURCE (STREAM OR NON-STREAM) | A PRODUCED STREAM RESOURCE |
| | *SINGLE TASK* |
| | A PRODUCED OR CONSUMED STREAM |

Special Notes on Performing PM Resource Maintenance

1. When defining produced resources, be sure to enter all REPORTABLE resources before NONREPORTABLE resources. If you enter a nonreportable resource first, PRISM assumes you are defining a superflushable PM and therefore does not allow you to define any further produced resources.
2. If you are maintaining resources on a dependent PM, produced resource data is displayed for review only. The word VIEW appears in the Action field in the upper right corner of the screen.
3. If you are maintaining a dependent PM, you may change consumed resource information, but you may not add or delete consumed resources. To add a consumed resource, you must first add the new resource to the parent PM with a quantity of zero and then adjust the quantity on the dependent PM.
4. You cannot delete resources with operation dependencies from a parent PM. You also cannot change operations on dependent PMs.

5. Whenever a potent resource is added to or deleted from a task, PRISM updates the number of PMs using this potent resource (see *Potent Resource Usage Counter*, Section 5-2).

Resource Maintenance Screen (1)—MDE04012

Figure 11:
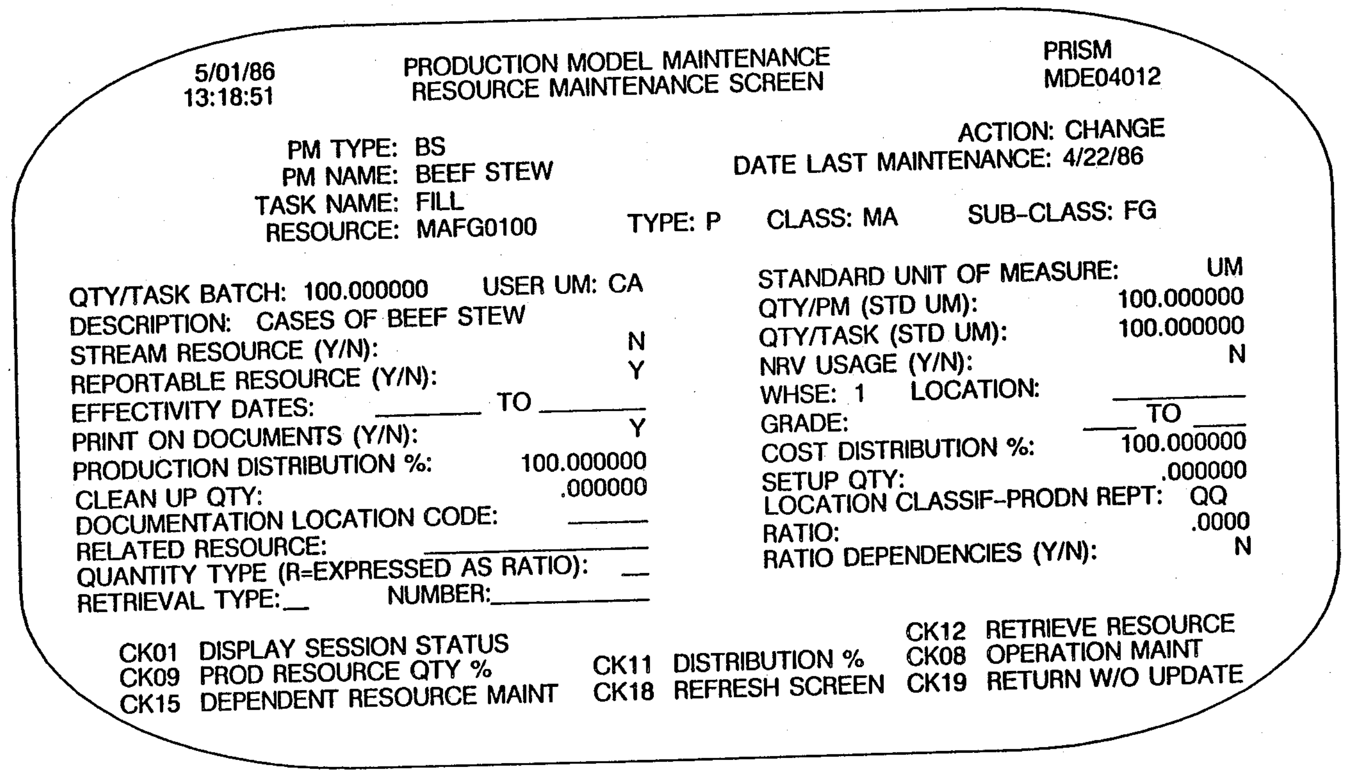

SCREEN: (see Figure 11)

This is the first of two Resource Maintenance Screens on which you can enter data for each resource defined for the task.

Fields for Display

PM Type—only appears during PM Maintenance.

Action—This field is always VIEW for produced resources on dependent PMs and for consumed resources that are dependent on operations.

• PM Name—only appears during PM Maintenance.

Date Last Maintenance—date you last updated information for this resource, or today's date if you are defining a new resource.

Task Name.

Class/Sub-Class—If you are adding a new resource to a task, these fields only appear if you specified the resource number on the PM or Standard Task Maintenance Selection Screen.

Standard Unit of Measure.

Qty/PM (Std UM)—PRISM calculates the quantity of the resource required to produce one PM batch, in the standard unit of measure.

Qty/Task (Std UM)—PRISM calculates the quantity of the resource required to produce one task batch, in the standard unit of measure.

Quantity Type—If you choose to express the required quantity of this resource as a ratio of another resource, PRISM displays an R for ratio in this field. Otherwise, the field remains blank.

Ratio Dependencies—If you define the required quantity of another resource as a ratio of this resource, PRISM displays the letter Y in this field, indicating that there are ratio dependencies on this resource.

Fields for Entry

Default information for the following fields comes from a variety of places. If you are adding a new resource, however, and did not enter the resource number on the PM Maintenance Selection Screen, the Resource Maintenance Screen appears with no defaults in place. If you would like to see the defaults to help you define your new resource, enter only the resource number and type on the first Resource Maintenance Screen and press ENTER. PRISM will display an error message that tells you the Qty/Task Batch is required. Along with the error message, it will also display all default values for the resource.

PRISM updates most Resource Maintenance Screen defaults to your Production Model Resource File when you press ENTER, providing you left the fields blank. Not all defaults, however, are updated to this file. This is noted in the field description where appropriate. Only enter a value in the field when you do not want to use the default.

WARNING: PRISM only updates default values during an ADD. If you change the default and then decide later that you want to revert to the default value, do not just blank out the field and press ENTER. You must key in the original default value yourself.

RESOURCE—If you are defining a resource on a new task, enter the resource number here. Leave this field blank if you are adding a stream resource to the task. If you entered a Resource on the PM or Standard Task Maintenance Selection Screen, it is displayed here.

TYPE—C if the resource is consumed by the task, P if produced. This field is for display only if you are maintaining a resource on a dependent PM.

Qty/Task Batch—Required entry for all standard tasks and for all regular tasks unless:

(1) you are defining the quantity as a ratio of another resource on this task; or (2) this is a produced resource, and the system calculates produced resource quantities for you.

If neither of these conditions applies, enter the quantity of this resource required to produce one standard task batch. You have the choice of defining this quantity in a user unit of measure or in the standard unit of measure for the resource. If this is a potent resource, you must define this quantity in potent units.

User UM—the unit of measure for the quantity per task batch. If you leave this field blank, PRISM assumes you defined the quantity in the resource's standard unit of measure.

Note: If you plan to make an operation dependent on this resource, PRISM must be able to convert the user unit of measure to hours for run, cleanup, and setup times. Unit of measure for hours is defined in Foundation tailoring question #9.

DESCRIPTION—This field defaults from Resource Master Maintenance.

STREAM RESOURCE—Enter Y if this is a stream resource. Leave the default as N if this is not a stream resource. Remember that (1) your first task may not consume a stream resource, (2) final tasks may not produce them (3) any task, except the first and last, may have only one consumed and one produced stream, and (4) if this PM has one task only, it may neither produce nor consume a stream.

If this field is Y, you must leave the Resource Number field blank. If you do not enter a description, PRISM displays the description "STREAM".

REPORTABLE RESOURCE (Y/N)—for produced resources only. Enter Y if this is a reportable resource. Enter N if you do not want to report produced quantities. If N, this is a theoretical production resource. PRISM calculates how much you have produced based on how much you have consumed. If N, the Production Distribution % field must be blank for non-reportable, non-stream produced resources.

NRV USAGE (Y/N)—Enter Y if this resource has net realizable value, N if it does not. If Y, the Cost Distribution % must be blank since you are assigning this resource a cost.

Suppose your company produces chicken parts. One resource produced from the final task is chicken feathers. Since these feathers are not an overly valuable resource, you do not assign them a cost or production distribution percentage. But you know you can sell them for $20 a bag to a local pillow manufacturer. Chicken feathers, then, have a net realizable value of $20 per bag. You can also use NRV to account for the cost of waste products you must pay to have taken away. In this case, the net realizable value would be negative.

Effectivity Dates—for consumed resources only. Enter the range of dates during which workers on the floor can use this resource. This date range might be used, for example, if you have a seasonal product mix. The ending effectivity date you enter here cannot be greater than the one assigned to the resource during Resource Master Maintenance.

Whse—For consumed resources, enter the warehouse where an employee picking goods would find the resource. For produced resources, enter the receiving warehouse, where the finished item will be stocked.

This field defaults from the warehouse you entered on the Production Model Maintenance Screen. If that file is blank, it defaults from the PM Type File, the Resource Master File, and then RM tailoring question #T21.

Location—not allowed for non-balance or stream resources. If you want to specify a picking or receiving location for this resource, enter the number of that location here. If left blank, this field defaults from the Resource Master File, but is not updated to the Production Model Resource File.

Print on Documents (Y/N)—This field applies to any consumed resource on a parent PM with a quantity per task batch of zero. You may choose not to print the resource on selected reports by entering N. This applies to the following RP reports: Indented Model Retrieval (Section 2-6), Standard Task (Section 2-12), and Where-Used Resource (Section 2-14).

- Grade—for consumed resources only. Grades allow you to assign quality levels to purchased and manufactured consumed resources. You assign a grade to each consumed resource when you receive it to stock. If you want to use only a certain grade or range of grades for this PM, enter the acceptable grade range here. If left blank, all grades are considered available.

PRISM contains no grade maintenance program, which means you must keep track of your grade scale manually and inform employees of the acceptable grade codes or numbers. Your Valid Grade Report (see Section 3-6 of your RM reference manual) does show all locations for a given resource, the grade of resource at each location, and the open schedules in need of the resource.

Production Distribution %—for reportable produced or stream resources only. Enter the percentage of consumed task resource(s) used to produce this resource.

For example, suppose you have a task to make cardboard boxes and that task produces two sizes of boxes, one large and one small. It takes more cardboard to produce a large box than it does to make a small box. So, the production distribution percentage for the large box might be 60 percent, while the distribution percentage for the small box is 40 percent.

The sum of the production distribution percentages for all produced resources on each task must equal 100. You may review the percentages assigned to other resources by using CK11 to call up the Distribution % Screen.

Cost Distribution %—for produced resources only. Enter the percentage of the total cost of this task you want to apply to this resource. This percentage is used during cost rollup to distribute the cost of a PM to its produced resources.

The sum of the cost distribution percentages for all produced resources on each task must equal 100. You may review the percentages assigned to other resources by using CK11 to call up the Distribution % Screen.

* Clean Up—for consumed resources only. Enter the estimated quantity of this resource used to clean up the work center at the end of the task.

If you make an operation dependent on this resource, PRISM converts clean up and setup quantities into clean up and setup times. Thus, user unit of measure for the resource must be convertible to hours.

Note: If clean up or setup quantities are greater than zero, theoretical consumption of this resource must be D.

Setup Qty—for consumed resources only. Enter the estimated quantity of this resource used to setup the work center at the beginning of the task. For example, for some tasks, you may need to run a certain amount of resource through to make sure the machine is set correctly.

Documentation Location Code—for consumed resources only. Use this field to have resource locations with the same code printed together on the pick list. Enter the documentation location code for the resource or leave the field blank to use the default assigned in Resource Master Maintenance.

Location Classif-Prodn Rcpt—for produced resources only. When you receive this resource to a new location at the end of the task, this is the default location classification code for that location. You define location classification codes in Location Classification Maintenance (see Section 1-4 of your RM reference manual).

* Related Resource—for consumed resources only. If you want to express the Qty/Task Batch of this resource as a ratio or percentage of another resource on this task, enter the number of the related resource here.

When defining the related and ratio-dependent resources, you must follow these rules:

1. The related resource must already exist on this task.
2. The related and ratio-dependent resources must be of the same resource type, both consumed or both produced.

3. The standard unit of measure for the dependent resource must be convertible to the standard unit of measure for the related resource. You define unit of measure conversions in UM Conversion Maintenance (see Section 1-19 of your RM reference manual).
4. You may define a related resource on a dependent PM. You may also change the related resource ratio.
5. You may have multiple ratio-dependent resources. For example, suppose the quantity of A is determined as a ratio of B. You may also define C and D as a ratio of B. You may not, however, define E as a ratio of A, another ratio-dependent resource.
6. A resource that is defined as related or ratio-dependent cannot also be dependent on an operation or have an operation dependent on it.

Ratio—Enter the ratio of the resource to its related resource. For example, if related resource B has a quantity per task of 100, you may enter a ratio of .5 for dependent resource A, indicating a Qty/Task Batch of one-half of 100, or 50.

If you update a related resource number and ratio, when you redisplay this resource record, PRISM displays an R for ratio in the Quantity Type field. The quantity calculated from that ratio is displayed in the Qty/Task Batch field.

Retrieval Type—The Retrieval Type and Number fields in combination with CK12 allow you to select another resource for maintenance without first returning to the selection screen. Enter C for a consumed resource, P for a produced.

Number—Enter the number of the resource.

WARNING! Be sure to press ENTER to update the current resource record before retrieving another for maintenance. Remember that you must press ENTER on the first Resource Maintenance Screen AND on the second to update any data entered on the first screen.

Command Function Keys

CK01 DISPLAY SESSION STATUS SCREEN—Use CK01 to display the Session Status Screen where you can review the number of records maintained this session.

CK08 OPERATION MAINTENANCE—Use CK08 to transfer to the Operation Maintenance Screen to define operations for this task. When adding, use this command key only if you have already defined all resources for the task. Only use this key if you know the number of the operation you want to add or maintain, since no reference screen is available.

CK09 PROD RESOURCE QTY %—Use CK09 to display the Produced Resource Quantity % Screen. After you have defined all produced resources for a task, use this command key to have PRISM calculate the required quantity per task batch for the resources. The standard unit of measure for each resource must be convertible to the task batch size UM.

Note: CK09 is not valid if any of the produced resources on this task are ratio-dependent, or if this is a dependent PM where produced resources are available for display only.

CK11 DISTRIBUTION %—For each produced resource added to each task, you must define a cost and production distribution percentage. CK11 displays the Distribution % Screen where you can review and adjust the percentages you have assigned.

CK12 RETRIEVE RESOURCE—Use this command key in combination with the Retrieval Type and Number fields to retrieve another resource without returning to a selection screen.

CK15 DEPENDENT RESOURCE MAINT—CK15 breaks a dependency you created between a consumed resource and an operation. For instance, you may have set up a PM so the longer you run a machine the more electricity you use.

All dependent resource information is display-only (the word VIEW appears in the Action field in the upper right corner of the screen). But CK15 makes the fields available for entry by breaking the dependency. Once you select CK15, you must maintain the resource Qty/Task Batch independent of the operation.

CK18 REFRESH SCREEN—Use CK18 to redisplay the data that was on the screen when it first appeared.

CK19 RETURN WITHOUT UPDATE—Use CK19 to return to the Selection Screen where you initally called this screen.

CK20 TO DELETE—CK20 is valid at any time to delete a resource displayed on the Resource Maintenance Screen. You may not, however, delete resources with dependent operations.

Resource Maintenance Screen (2)—MDE04013

SCREEN: (see Figure 12)

Pressing ENTER from the first Resource Maintenance Screen displays a second Resource Maintenance Screen. This screen displays recent cost rollup data for produced resources and historical cost and quantity data for all resources. You may also create operation/resource dependencies on this screen.

WARNING! You must display and press ENTER on this second screen to update any resource data entered on the first Resource Maintenance Screen.

Fields for Display

If you are maintaining a produced resource, all fields on this screen are for display only. If your user profile is authorized and if this is an independent PM, you may maintain the five historical cost and quantity fields by taking CK05.

PM Type—only appears during PM Maintenance.

Action—This is always VIEW for a produced resource on a dependent PM.

PM Name—only appears during PM Maintenance.

Date Last Maintenance—date you last updated information for this resource, or today's date if you are defining a new task resource.

Task Name.

Resource.

Type—P for a produced resource, C for consumed.

Class.

Sub-Class.

Dependent Operation (Y/N)—for consumed resources only. Y if an operation is dependent on this resource, N if no operations are dependent on this resource. See Create Dependent Operation Record under Fields for Entry.

Dependent Resource (Y/N)—for consumed resources only: Y if this resource is dependent on an operation, N if it is not.

On independent PMs, PRISM allows you to define a consumed resource as dependent on an operation. For example, a task will continue to consume electricity in direct proportion to the length of time you run a machine.

Generally, you will only want to establish this dependent relationship for machines or work centers that are also defined as resources. Since costs are only reported at the task level, to cost a machine, you must define it as a resource. Scheduling, however, is based on task operations, not resources. So to schedule the machine you must also define it as an operation. The resource/operation dependency option frees you from having to maintain both the resource and operation record. When you maintain one, PRISM automatically maintains the other.

Note: If you create a resource/operation or operation/resource dependency on a parent PM, you should be careful when maintaining resources on the dependent PM. If you make changes there, you may make inadvertent alterations on the parent PM.

Rolled Cost (Std UM)—PRISM displays the last rolled up cost for one unit of this produced resource. See Cost Rollup Report—Actual (Section 2-2 of this manual) for details.

Previous Rolled Cost—PRISM displays the most recent rolled up cost for this produced resource.

Number of Dependencies—for consumed resources on parent PMs only. PRISM displays the total number of resource dependencies on this particular resource.

You create dependencies on a parent consumed resource whenever you change the quantity or some other characteristic of the consumed resource on the dependent PM. At the task level, PRISM simply recognizes that a resource has dependencies. The specific number of dependencies per resource is recorded here.

Total Rolled Cost/Task—PRISM multiplies the Rolled Cost (Std UM) by the Qty/Task Batch to calculate the total rolled cost of the resource for this task.

Cost Rollup Costing Method—The cost rollup costing method code tells you which cost was used in calculating the rolled-up cost for a produced resource. The options are: F for fixed cost, R for rolled cost, S for standard cost, A for rolling average cost, H for historical cost, or L for last period average cost.

You define the fixed and standard cost for each resource in Resource Master Maintenance. PRISM updates historical, rolling average, and last period average costs into the Resource Balance File. See Cost Rollup Report—Actual (Section 2-2 of this reference manual) and Resource Master Maintenance (Section 1-13 of your RM reference manual) for details.

Total Rolled Cost/PM—This is the total cost of this resource for one batch of the PM. PRISM calculates it by multiplying the Rolled Cost (Std UM) by the quantity of the resource required to complete one PM batch.

Fields for Entry

Remove Overrides (Y/N)—displayed only if you are maintaining a dependent PM consumed resource that you have changed from the parent PM. If you have changed the consumed resource and now decide you want to set the resource back to the parent PM level, simply enter Y in this field and press ENTER. PRISM replaces the dependent PM resource information with the resource data from the parent PM .

THEORETICAL CONSUMPTION (C/D/T)—for consumed resources only. This field defaults from your entry, if any, on the PM Maintenance Screen. Otherwise, it defaults from the Resource Master File. The default is updated into the Production Model Resource File.

For consumed stream resources, this field must be T. Since stream resources are not actually defined or reported, they must be theoretically consumed. For resources that are consumed in batch, this field must be D. Direct Issue transactions allow the tightest reporting method.

Superflushable (Y/N)—for manufactured consumed resources only. Enter Y if you want to superflush this resource. Leave the default as N if you do not want to superflush this resource.

Superflushing is a more sophisticated form of theoretical consumption. It applies to manufactured consumed resources and allows you to automatically consume a resource used by one PM directly from another PM that produces the resource.

For example, suppose you have one PM called Beef Stew (Figure 1) that creates beef stew by adding broth and potatoes.

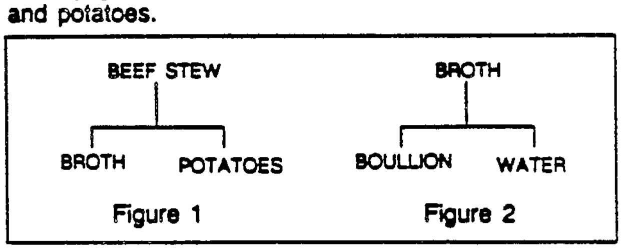

Figure 1 Figure 2

Suppose further that the broth is a manufactured consumed resource produced from another PM called Broth Prep (Figure 2).

Consider the following requirements:

1. The prime planning PM for the consumed resource broth and the PM Beef Stew must exist on the same schedule/release (see RM *Schedule Maintenance*, Section 7-3). Assume that the PM Broth Prep in our example is the prime planning PM for the consumed resource broth.

2. For the prime planning PM (Broth Prep) to be superflushable, it must have the consumed resource (in our example, broth) as its only produced resource. This resource must be nonreportable. Other stream resources, however, are allowed.

A resource must be nonreportable to be theoretically consumed. But the task resource rules require that every task, including the final task, have at least one reportable produced resource.

To get around the reportable task resource rule and create a superflushable PM:

1. Define the summary information for the prime planning PM for the consumed resource and for all tasks except the last. Remember that the superflushable PM may have no produced resources other than the end resource and streams.
2. At the final task, define the nonreportable produced resource, in this case broth. As soon as you enter a nonreportable resource as the first resource on a task, PRISM assumes you are creating a superflushable PM and prevents you from adding any other produced resources to the task.
3. To complete the superflushable definition, use CK11 to assign the superflushable produced resource a production distribution percentage of 100 percent, verifying it as the only produced resource.
4. Make sure the superflushable resource (in our example, broth) is defined as theoretically consumed on the Resource Maintenance Screen and the PM Maintenance Screen.

Suppose, you have received 100 cases of beef stew and the PM requires that you should have consumed 500 gallons of beef broth to make those 100 cases. PRISM checks the picking location and finds only 300 gallons of broth on-hand. It issues, or consumes, those 300. It assumes that you must have run the PM Broth Prep to produce the remaining 200 required for the stew.

Based on the received quantity of beef stew, it theoretically produces Broth Prep. It then theoretically consumes the remaining amount of broth required and superflushes down through the prime planning PM Broth Prep to theoretically consume any resources required to make the broth.

Superflushing stops at the second level. If the bouillon used to make broth was produced by another PM, PRISM would not superflush down to the third level.

To make a superflushable PM non-superflushable, you must delete the nonreportable produced resource. You may then define new produced resources for the task, being careful to define all reportable produced resources before nonreportable ones.

To make a non-superflushable PM superflushable, delete all produced resources except one and make that one non-reportable.

Batch Consumption (Y/N)—only valid for non-stream consumed resources.

Enter Y if the resource can be used in full batch quantities only, N if partial batches are allowed. For example, no matter how much beef stew you make, the stew must simmer for two hours. Simmering is thus a resource used always per two hour batch. A Y prevents the system from calculating partial batch quantities to fill an order, forcing it to round up to the next full batch quantity instead.

COST ROLLUP TYPE CODE (N/F/V)—for consumed resources only. When rolling up the cost of the final produced resource, this field instructs PRISM to consider the consumed resource cost as part of the produced resource's normal (N), fixed (F), or variable (V) cost.

If normal, PRISM applies the cost of the consumed resource to the applicable costs of the produced resource—direct costs to direct costs, fixed overhead to fixed overhead, variable overhead to variable overhead. If F, all costs of the consumed resource are applied to the fixed overhead cost of the produced resource. If V, all costs of the consumed resource are applied to the variable overhead cost of the produced resource.

Prime Planning PM Type—for manufactured consumed resources only. If you want to assign this resource a prime planning PM other than the one defined for this resource in Resource Master Maintenance, enter the type code and name of the new planning PM here. If you leave this field blank on the screen, PRISM uses the prime planning PM defined in the Resource Master File but does not update that value into the Production Model Resource File.

PM Name—for manufactured consumed resources only. Enter the name of the new prime planning PM for this resource. See Prime Planning PM Type above.

Create Dependent Operation Record (Y/N)—for consumed resources on independent PMs only. Enter Y if you want to make an operation dependent on this resource. Leave the default as N if you do not want to create a dependent operation. If Y, the run, cleanup, and setup times for the operation increase and decrease in direct proportion to the Qty/Task Batch, Cleanup Qty, and Setup Qty for the corresponding resource. For this reason, the unit of measure for the resource must be convertible to hours.

Each resource may have only one dependent operation. When you enter a Dependent Operation Number and Work Center and press ENTER, PRISM creates the dependent operation record, assigning it a description that says, "Operation dependent on resource XXX."

Dependent Operation Number—required if Create Dependent Operation Record is Y. Enter the number you want to assign to this dependent operation.

Work Center—required if Create Dependent Operation Record is Y. Enter the number or name of the work center where this operation is performed. When you press ENTER to update, PRISM creates the operation record with the default move, run, and setup times.

The following fields are for display only unless a user authorized to maintain historical information takes CK05 to make them available for maintenance. The cost fields apply to consumed resources only and are calculated at Period Close (see Section 9-2 of your RM reference manual). The quantity fields apply to both produced and consumed resources and are calculated at Schedule Close (Sections 7-12 through 7-17 of your RM manual).

Last Quantity—quantity of this resource actually produced or consumed the last time this task was run.

Last Cmp Pd Avg Cost—last complete period average cost of manufacturing produced resource.

Lst Cmp Pd Avg Qty—last complete period average quantity of this resource produced or consumed.

Historical Avg Cost—historical average cost of this produced resource. This is the average of all last complete period average cost figures to date.

Historical Avg Qty—historical average quantity. This is the average of all last complete period average quantities of the resource consumed or produced to date.

Command Function Keys

See the Command Function Keys description under Resource Maintenance Screen #1 for all valid command keys not described below.

CK03 PAGE BACKWARD—Use CK03 to redisplay the first Resource Maintenance Screen.

CK05 HIST FIGURE MAINT—If you are authorized to maintain historical information, use CK05 to make the five historical cost and quantity fields available for entry.

Operation Selection Screen—MDE04007

Figure 13:
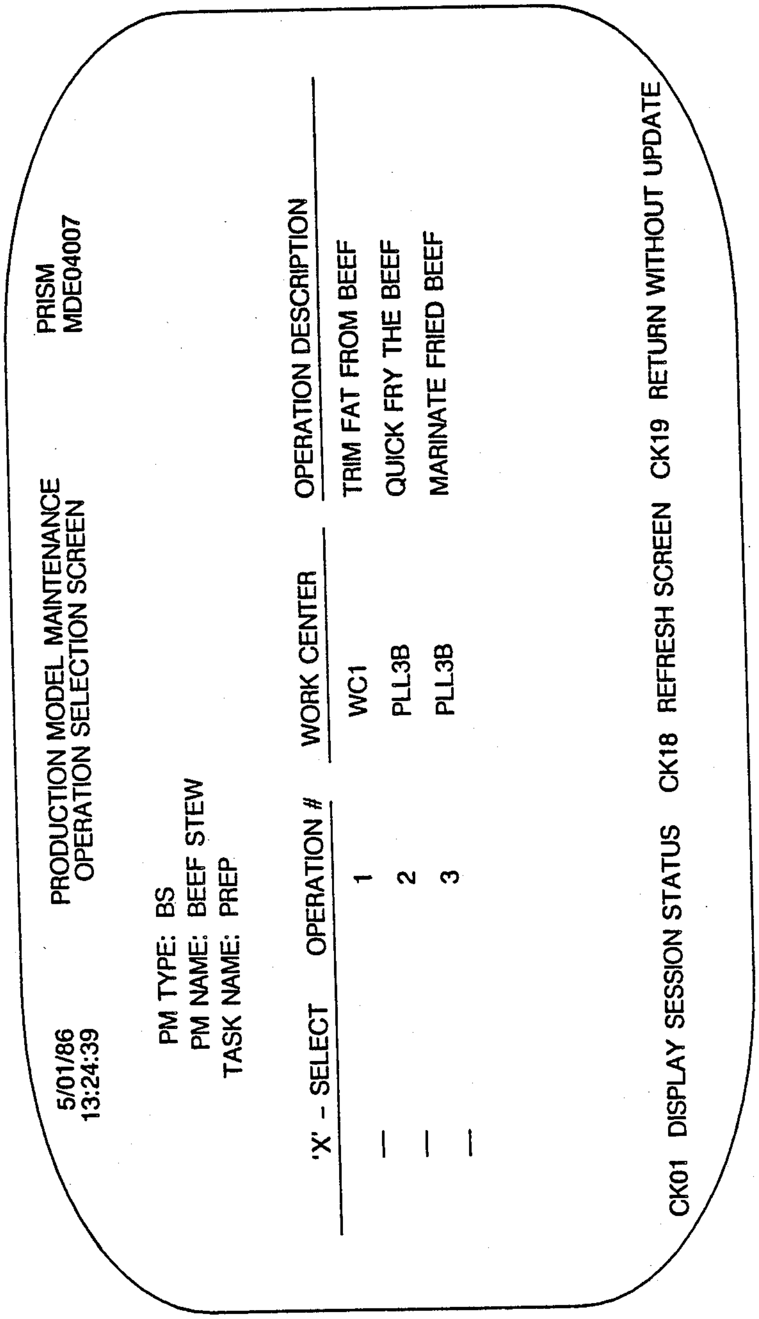

SCREEN: (see Figure 13)

The Operation Selection Screen contains a list of all operations associated with a given task. Display this screen when you want to maintain a task operation, but do not know the operation number, or when you want to verify whether you have defined all operations for the task.

Fields for Display

PM Type—only appears during PM Maintenance.

• PM Name—only appears during PM Maintenance.

Task Name.

Operation #—PRISM lists the numbers of the operations defined for this task. If a plus sign (+) appears at the bottom right corner of the screen, more operations exist than could be displayed on the first screen. Use the Roll keys to page through the operation listings.

• Work Center—work center where this operation is performed.

Operation Description.

Fields for Entry

X-Select—Enter an X to select an operation. You may enter X next to as many operations as you like.

Command Function Keys

ENTER—Press ENTER to display the selected operation on the Operation Maintenance Screen. If you selected more than one operation, PRISM returns you to the Selection Screen when you press ENTER from the Operation Maintenance Screen. Press ENTER again to display the next operation record.

CK01 DISPLAY SESSION STATUS SCREEN—Use CK01 to display the Session Status Screen which shows the maintenance activity so far this session.

CK18 REFRESH SCREEN—Use CK18 to blank out any entries you made in the X-Select column.

CK19 RETURN WITHOUT UPDATE—Use CK19 to return to the PM or Standard Task Maintenance Selection Screen.

Operation Maintenance Screen—MDE04019

SCREEN: (see Figure 14)

Use this screen to define each operation. If you are maintaining a dependent PM, all operation fields are for display only. Note the word VIEW in the Action field in the upper right corner of the screen.

Fields for Display

PM Type—appears only if you call the screen in PM Maintenance.

PM Name—appears only if you call the screen in PM Maintenance.

Task Name.

Action—action pending on the operation record. VIEW for operations that are dependent on a resource.

Date Last Maintenance—date you last maintained this operation record, or today's date if you are defining a new task operation.

Dependent Operation (Y/N)—Y if this operation is dependent on a resource consumed by the task, N if it is not.

A Y means that the run time, setup time, and cleanup time for this operation increase or decrease in direct proportion to the amount of resource consumed. If Y, all fields on this screen are for display only unless you use CK15 to break the resource/operation dependency.

Operation has a Dependent Resource—Y if a consumed resource is dependent on this operation. The quantity of the resource required increases or decreases in direct proportion to the run time of the operation.

Fields for Entry

OPERATION #—Enter the number you want to assign to this operation. Each operation must have a unique operation number. To review the numbers already assigned to operations on this task, use CK08 to display the Operation Selection Screen, or run your PM Operation File List (Section 3-6).

If you entered the number of the operation you want to add or maintain on the PM or Standard Task Maintenance Selection Screen, PRISM displays the number here.

DESCRIPTION—Enter the description of this operation.

WORK CENTER—Enter the number of the work center or machine where this operation is performed.

Overlap Qty Override—Enter the overlap or send-ahead quantity. To use the default overlap quantity assigned to the work center, leave this field blank.

Suppose the average batch size at this work center is 500. Defining an overlap quantity of 150 gives the machine operator permission to move some of the resource ahead to the next work center as soon as 150 are produced. Overlap Quantity should represent the smallest quantity that can be sent ahead. This concept is most pertinent for scheduling in the Planning Module.

Note: If you enter an overlap quantity for this operation, it must be less than or equal to the maximum overlap quantity defined for the work center in Work Center Maintenance.

Schedule Sequence Number—Enter the sequence number for this operation. For example, if the operation should be performed first in the series, enter 1; if it should be performed tenth, enter 10.

Loading Sequence Number—reserved for future PRISM enhancement.

BATCH CONSUMPTION (Y/N)—batch consumption code. Enter Y if partial runs are allowed on this machine, N if they are not. Leave this field blank to use the default assigned in Work Center Maintenance.

Critical Point Work Center (Y/N)—Y if this is a critical point or bottleneck work center, N if it is not.

Create Dependent Resource (Y/N)—Enter Y to make a resource dependent on this operation. Leave the default N if you do not want to define a dependent resource. If Y, you must also specify the number of the resource in the Dep Resource field. Once you enter Y and update, this field no longer appears on the screen during maintenance. Instead, PRISM displays a Y in the Operation has a Dependent Resource field. If Y, you cannot delete this operation until you use CK15 on the resource record to break the dependency.

Dep Resource—If you entered Y, telling PRISM that you want to make a resource dependent on this operation, enter the number of the resource here. The resource must not already be defined on this task.

If you enter Y and leave this field blank, PRISM tries to create a record using the Default Consumed Resource you defined in Work Center Maintenance. If it cannot find a resource number there, PRISM tries to create a resource record with the same number as the work center.

Note: When defining your resources through Resource Master Maintenance (Section 1-13), keep in mind that resource numbers you want to double as work center numbers cannot be more than five digits long.

A resource/operation dependency signals that the amount of this resource to be used up is dependent on the specific operation and how long it runs. PRISM thus maintains both the operation and resource records when you maintain one of them.

Schedule Time Code (User/System)—During Cost Rollup (see Section 2-2 of this manual), PRISM uses the schedule time to calculate the required lead time for each operation. If this field is S (for System), PRISM calculates the schedule time by adding together the setup, run, and move times for this work center or operation. If you enter U (for User), it uses the schedule time you define at the bottom of this screen. This concept is most pertinent for scheduling in the Planning Module.

User-Defined Schedule Time—If you entered a Schedule Time Code of U, enter the total time that should be scheduled for this operation, in days, hours, and minutes.

Defaults (Y/N)—A special defaults field applies to each of the five time fields that follow. If you enter a Y (the default) in this field, PRISM uses the default times from Work Center Maintenance. To enter your own times, enter an N in this field. If you enter your own times and leave this field as Y, PRISM ignores your entries.

Move Time—Enter the estimated time required to move resources from this work center to the next.

Queue Time—Enter the estimated queue time for this operation. Queue time is waiting or lag time before the next machine or work center can handle resources, regardless of the move time.

For example, it may take a conveyor belt 10 minutes to move a resource from work center W24 to W31. But work center W31 may be a slow-cooking process that takes two hours, while slicing at W24 takes only 10 minutes. Resources from W24 must then sit until W31 is ready.

Setup Time—Enter the time required to prepare the work center for the operation.

* Run Time—Enter the estimated time needed to complete one task batch of the operation.
* Clean Up Time—Enter the estimated time required to clean up this work center after running the operation.

Retrieval Operation—Use this field in combination with CK12 to retrieve another operation on this task.

Note: Be sure to press ENTER to update your current operation before taking CK12 to retrieve another operation. If you have not updated, you lose any changes when PRISM displays the new operation.

When you enter the number of the operation you want to maintain and use CK12, PRISM displays the operation record on the Operation Maintenance Screen. You may also add a new operation by entering a new operation number. PRISM will then display a blank Operation Maintenance Screen.

Command Function Keys

ENTER—If you are defining a new operation, press ENTER to update the operation data. PRISM then displays another blank Operation Maintenance Screen for entry. If you are maintaining an existing task, PRISM returns you to the PM or Standard Task Maintenance or Operation Selection Screen.

CK01 DISPLAY SESSION STATUS—Use CK01 to call up the Session Status Screen. Use this screen to review the maintenance activity so far this session.

CK06 RESOURCE MAINTENANCE—Use CK06 to transfer to the Resource Maintenance Screen to maintain a resource. PRISM displays the Resource Maintenance Screen with a message that asks you to (1) enter the number and type of the resource you want to maintain in the Retrieval fields and (2) use CK12 to retrieve and display the resource record.

CK10 COMMENT ENTRY—If you want to associate additional comments or instructions with this operation, use CK10 to display the Operation Comment Entry Screen.

CK12 RETRIEVE OPERATION—Use CK12 in conjunction with the Retrieval Operation field to display another operation for maintenance.

CK15 DEPENDENT OPER MAINT—If this operation is dependent on a consumed resource, all fields on this screen are for display only unless you use CK15 to break the dependency.

CK18 REFRESH SCREEN—Use CK18 to redisplay the values that were in place when the screen first appeared.

CK19 RETURN WITHOUT UPDATE—Use CK19 to return to the previous screen without updating information.

CK20 DELETE—CK20 is available in CHANGE mode to delete the operation currently displayed.

Comment Entry Screen—MDE04018

Figure 15:
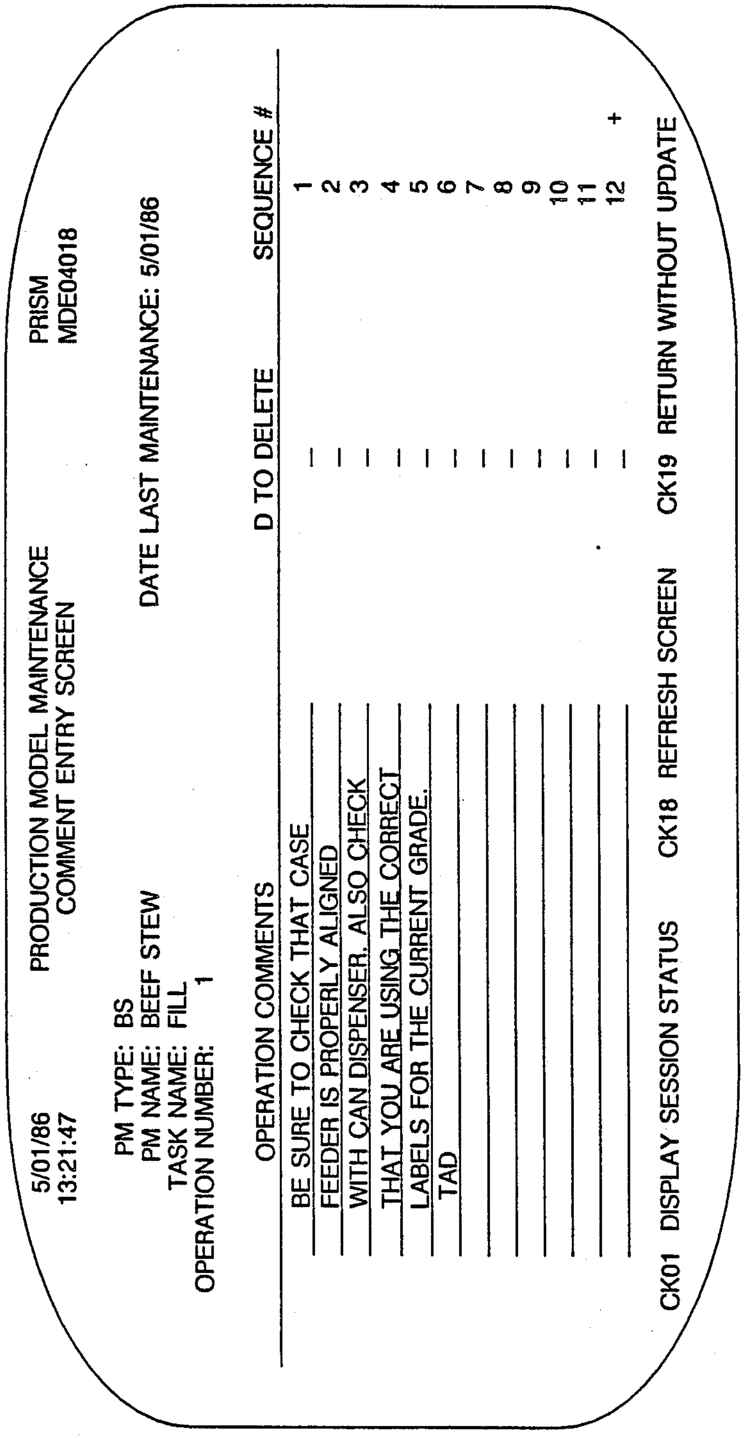

SCREEN: (See Figure 15)

CK10 from the Operation Maintenance Screen displays the Comment Entry Screen. Use this screen to associate comments or instructions with the operation.

Fields for Display

PM Type—only appears during PM Maintenance.

PM Name—only appears during PM Maintenance.

Task Name.

Operation Number—number of the operation with which the comments are associated.

Date Last Maintenance—date you last updated comments for this operation, or today's date if you are adding comments.

Sequence #—PRISM assigns each comment line a sequence number. You may delete a specific comment line by entering a D in the delete column to the left of the appropriate sequence number.

Fields for Entry

OPERATION COMMENTS—Enter any comments or instructions you want to associate with this operation. You may enter up to 12 lines of comments on one screen. If you fill all 12 lines, use the Roll Up key to display more available lines. You must enter at least one line of comment to update the record. Blank lines between comments are not allowed.

Use the Roll keys to page forward and backward through existing comments. A plus sign (+) in the bottom right corner of the screen indicates that more comments exist than could be displayed on one screen.

D to Delete—If you want to delete a comment line, enter a D in this column. You may delete any number of lines at a time. To delete the entire comment record use CK20.

Command Function Keys

ENTER—Press ENTER to update your comments and return to the Operation Maintenance Screen. If you marked any comment lines for deletion, PRISM deletes the lines and returns you to the Operation Maintenance Screen.

CK01 DISPLAY SESSION STATUS—Use CK01 to call up the Session Status Screen where you can review the maintenance activity so far this session.

CK18 REFRESH SCREEN—Use CK18 to redisplay the comments that were on the screen when it first appeared.

CK19 RETURN WITHOUT UPDATE—Use CK19 to return to the Operation Maintenance Screen without update.

Produced Resource Quantity % Screen—MDE04022

SCREEN: (See Figure 16)

Selecting CK09 from either Resource Maintenance Screen displays the Produced Resource Quantity % Screen. When all produced resources for a task have the same standard unit of measure, use this screen to have PRISM calculate the Qty/Task Batch for each resource.

Only display this screen after you have defined all produced resources for the task. On this screen, PRISM asks you to assign a produced quantity distribution percentage to each resource. It calculates the Qty/Task Batch for each resource by multiplying this percentage by the standard task batch size. This screen only applies to non-stream produced resources.

Before using this screen, make sure the unit of measure in which you want to display the resource quantity is convertible to the task batch unit of measure.

When you first display the screen, fields appear on the top half only. Once you enter a Quantity Type and press ENTER, PRISM lists all produced resources for the task on the bottom of the screen. After defining a Quantity % for each produced resource, you must press ENTER again to have PRISM perform the quantity calculation.

Fields for Display/Entry

PM Type—only appears during PM Maintenance.

° PM Name—only appears during PM Maintenance.

Task Name.

QUANTITY TYPE—Enter the unit of measure in which you want PRISM to express the quantity for each produced resource. Enter U for user, S for standard, or T for task unit of measure. The unit of measure you choose must be convertible to the standard batch UM.

After you enter a Quantity Type and press ENTER, PRISM displays the following fields.

° Resource.

Description.

Qty Rel to Task Batch—PRISM multiplies the quantity percentage for each resource by the standard task batch quantity to calculate the quantity of the resource produced in one task batch.

UM—either the user, standard, or task unit of measure, depending on which one you instructed PRISM to use.

Quantity %—Enter the quantity distribution percentage for this resource. For example, suppose that this task makes large and small boxes, and the Qty/Task Batch is 100 boxes. In this Quantity % field, you specify that of those 100 boxes, 60 percent are small boxes and 40 percent large boxes.

Command Function Keys

ENTER—When you press ENTER the first time, PRISM displays the number and description of all produced resources for the task on the bottom half of the screen. The Quantity % field is then available for entry.

Once you define a Quantity % and press ENTER a second time, PRISM returns you immediately to the Resource Maintenance Screen. If you select any of the produced resources for maintenance, the system-calculated quantity appears in the Qty/Task Batch field.

CK18 REFRESH SCREEN—Use CK18 to redisplay the values that were in place when the screen first appeared.

CK19 RETURN WITHOUT UPDATE—Use CK19 to return to the Resource Maintenance Screen without update.

Distribution % Screen—MDE04015

SCREEN: (See Figure 17)

Selecting CK11 from either Resource Maintenance Screen displays the Distribution % Screen. PRISM requires that the production and cost distribution percentages for all produced resources on a task add up to 100.

The Production Distribution tells what percentage of resources went into making this produced resource. In our cardboard box example, large boxes use more cardboard than small boxes. So the Production Distribution % for large boxes might equal 60 percent, while the % for small boxes is 40 percent.

Similarly, the Cost Distribution tells what percentage of the total cost of a task is attributed to each produced resource. You use more resources to produce large boxes, so they deserve a higher Cost Distribution %.

Note: When defining a superflushable PM, you must display this screen and define the distribution percentages for its one produced resource.

Fields for Display

PM Type—appears only during PM Maintenance.

° PM Name—appears only during PM Maintenance.

Task Name.

° Resource—PRISM lists the number of each produced resource defined for the task.

Description.

Qty Rel To Task Batch—This is the quantity of resource produced from one task batch.

UM—unit of measure for the above quantity.

Fields for Entry

COST DIST %—PRISM displays the cost distribution percentage, if any, assigned to the resource on the Resource Maintenance Screen. You may enter or adjust this percentage field. The sum of cost distribution percentages for all resources displayed on the screen must equal 100.

PRODUCTION DIST %—PRISM displays the production distribution percentage, if any, assigned to the resource on the Resource Maintenance Screen. You may enter or adjust this percentage field. The sum of production distribution percentages for all resources displayed on the screen must equal 100.

Note: If certain program messages are overridable, you may use CK17 to update and exit this screen even if your percentages do not equal 100. You must, however, adjust the percentages before you are allowed to exit PM Maintenance.

Command Function Keys

ENTER—Press ENTER to update the new cost and production distribution percentages and return to the Resource Maintenance Screen.

CK18 REFRESH SCREEN—Use CK18 to redisplay the distribution percentages that were in place when the screen first appeared.

CK19 RETURN WITHOUT UPDATE—Use CK19 to redisplay the Resource Maintenance Screen without update.

PM Maintenance Same As Except Screen—MDE04009

Figure 18:
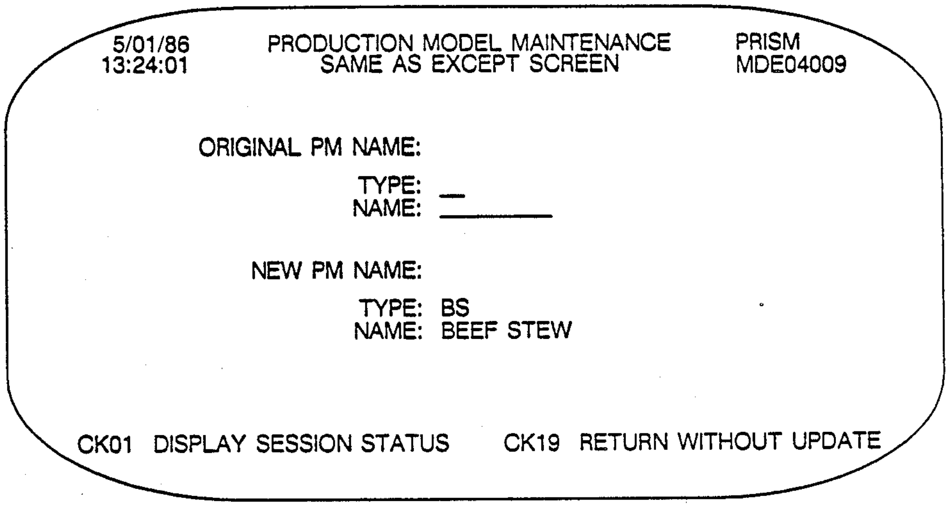

SCREEN: (See Figure 18)

PRISM displays the Same As Except Screen when you use CK10 from the PM Maintenance Selection Screen.

The Same As Except Screen lets you create a copy of an existing PM. Copy a PM when its structure is similar to the new PM you want to create. PRISM copies all summary, task, resource, and operation records into the new PM. Because the new PM is an entirely separate PM, all historical quantity and cost fields are set back to zero. You may add, change, or delete any of this copied information without affecting the original PM.

You may copy independent, parent, and dependent PMs. If the original is a parent PM, the new PM adopts the same structure as the parent, but without the attached dependent PMs. If you are copying a dependent PM, the new PM takes on the same parent PM name and type.

Fields for Entry

ORIGINAL PM TYPE—Enter the type code of the PM you want to copy.

* ORIGINAL PM NAME—Enter the name of the PM you want to copy.

NEW PM TYPE—Enter the type code you want to assign to the new PM you are about to create. If you specified a PM on the PM Selection Screen before selecting CK10, PRISM displays the type code here. You may change the code if it is incorrect.

* NEW PM NAME—Enter the name you want to assign to this new PM. Each production model must have a unique name. If you specified a PM on the PM Selection Screen before taking CK10, PRISM displays the name here. Change the name if it is incorrect.

MAINTENANCE AFTER ENTRY? (Y/N)—Enter Y if you want to maintain the new PM immediately after copying the original PM. Leave the default N if you do not want to maintain it at this time.

Command Function Keys

ENTER—If you entered Y in the Maintenance After Entry field, PRISM displays the new PM on the PM Maintenance Screen when you press ENTER. If you entered N, PRISM copies the original PM and returns you to the PM Selection Screen.

CK01 DISPLAY SESSION STATUS—Use CK01 to call up the Session Status Screen. Use this screen to review maintenance activity so far this session.

CK19 RETURN WITHOUT UPDATE—Use CK19 to return to the PM Maintenance Selection Screen without copying a PM.

PM Maintenance Session Status Screen—MDE04016

SCREEN: (See Figure 19)

Selecting CK01 from any PM Maintenance screen displays the Session Status Screen. Use this screen to review the total number of PM Maintenance records added, changed, and deleted so far during the session.

Fields for Display

- PM Name—the total number of production models added, changed, and deleted. This field is updated whenever you press ENTER on the PM Maintenance Screen.

If you changed PM task, resource, or operation information, PRISM records a change in this field and in each corresponding task, resource, operation, or comment field. If you add a dependent PM, PRISM increments this field and the Total Number of Dependent PMs Entered field at the bottom of the screen. If you copy a new PM from an old one using the Same As Except Screen, PRISM updates the PM Name add field and the Total Number of Same As Except PMs Entered field at the bottom of the screen.

Tasks—total number of tasks added, changed, and deleted.

- Resource—total number of resources added, changed, and deleted.

Operations—total number of operations added, changed, or deleted.

Comments—total number of operation comment records added, changed, or deleted.

Total Number of Dependent * PM Name—total number of dependent production models added.

Total Number of Same As Except * PM Name—total number of new PMs created using the Same As Except Screen.

Command Function Keys

CK01 END JOB—Use CK01 to exit PM Maintenance and return to the menu where you initially called the option. CK01 also prints five registers of the master files updated through PM Maintenance. The registers are:

PM Master File Register—details all summary PM data updated into the PM Master File (PMODEL).

PM Task File Register—details all summary task data updated into the PM Task File (PMTASK).

PM Resource File Register—details all resource data updated into the PM Resource File (PMRESR).

PM Operation File Register—details all operation data updated into the PM Operation File (PMOPER).

PM Operation Comment File Register—details all operation comments updated into the PM Operation Comment File (COMMNT).

Note: You may not exit PM Maintenance until the production model you are defining is complete and correct. Until then, CK01 will not exit you from the program, but will instead call up a message that lets you know where your problem may be.

SECTION II-IV

PMFULW

Full Cost Rollup Work File

This work file is used during an actual full cost rollup.

File Organization: Indexed

Record Length: 76
Key Length: 17

Key Fields

| Field Name | Description |
|---|---|
| PFTYPE | PM Type |
| PFPMNM | PM Name |

| Field Name | Length | Type | Position From | To | Dec | Description |
|---|---|---|---|---|---|---|
| PFTYPE | 2 | A | 1 | 2 | | PM Type |
| PFPMNM | 15 | A | 3 | 17 | | PM Name |
| PFTSEQ | 5 | P | 18 | 20 | 0 | Task Seq # |
| PFRESC | 15 | A | 21 | 35 | | Resource # |
| PFTDIR | 15 | P | 36 | 43 | 6 | Total Direct Cost |
| PFTFIX | 15 | P | 44 | 51 | 6 | Total Fixed Overhead |
| PFTVAR | 15 | P | 52 | 59 | 6 | Total Variable Overhead |
| PFLGRS | 15 | A | 60 | 74 | | Longest Cum Lead Time Resource # |
| PFLGLT | 3 | P | 75 | 76 | 0 | Longest Cum Lead Time |

PMODEL

Production Model Master File

This file contains a summary record for each PM defined in the system.

File Organization: Indexed

Record Length: 138
Key Length: 17

Key Fields

| Field Name | Description |
|---|---|
| PMPMTP | PM Type |
| PMPMNM | PM Name |

| Field Name | Length | Type | Position From | To | Dec | Description |
|---|---|---|---|---|---|---|
| PMPMTP | 2 | A | 1 | 2 | | PM Type |
| PMPMNM | 15 | A | 3 | 17 | | PM Name |
| PMDESC | 30 | A | 18 | 47 | | Description |
| PMSIZE | 15 | P | 48 | 55 | 6 | Standard PM Batch Size |
| PMUMSR | 2 | A | 56 | 57 | | Standard Batch Size UM |
| PMAVYD | 9 | P | 58 | 62 | 6 | Historical Avg Yield |
| PMLSYD | 9 | P | 63 | 67 | 6 | Last Yield |
| PMPDYD | 9 | P | 68 | 72 | 6 | Last Complete Period Avg Yield |
| PMDEPD | 1 | A | 73 | 73 | | Dependencies Y/N |
| PMDPCD | 1 | A | 74 | 74 | | Dependency Code (I/D) |
| PMPATP | 2 | A | 75 | 76 | | Parent PM Type |
| PMPANM | 15 | A | 77 | 91 | | Parent PM Name |
| PMTHCM | 1 | A | 92 | 92 | | Theoretical Cons Code T = Theoretical Consumption C = Calc Cost D = Direct Issue |
| PMRCST | 1 | A | 93 | 93 | | Recosting Y/N |
| PMROLL | 1 | A | 94 | 94 | | Cost Rollup |

| | | | | | | |
|---|---|---|---|---|---|---|
| | | | | | | Y = PM rolled up N = not rolled up |
| PMRCAL | 1 | A | 95 | 95 | | System Recalc Lead Time Y/N |
| PMCMLT | 3 | P | 96 | 97 | 0 | Cumulative Lead Time Days |
| PMSIMT | 3 | P | 98 | 99 | 0 | Simulated Cumulative Lead Time |
| PMULVL | 3 | P | 100 | 101 | 0 | User-assigned Cost Level Code |
| PMSLVL | 3 | P | 102 | 103 | 0 | System Calc Cost Level Code |
| PMECLV | 5 | P | 104 | 106 | 0 | EC Level |
| PMPROD | 5 | P | 107 | 109 | 0 | Prod Seq # |
| PMPLNT | 2 | A | 110 | 111 | | Plant Number |
| PMWHSE | 1 | A | 112 | 112 | | Warehouse |
| PMSENS | 4 | P | 113 | 115 | 3 | Sensitivity Factor |
| PMDTCS | 6 | P | 116 | 119 | 0 | Date Last Costed |
| PMDTMT | 6 | P | 120 | 123 | 0 | Date Last Maint |
| PMBLNK | 15 | A | 124 | 138 | | Blank area |

PMOPER

PM Operation File

This file contains information that associates a series of operations to a task.

File Organization: Indexed    Record Length: 153
Key Length: 32

Key Fields

| Field Name | Description |
|---|---|
| POTYPE | PM Type |
| POPMNM | PM Name |
| POTASK | Task Name |
| POOPER | Operation Number |

| Field Name | Length | Type | Position From | To | Dec | Description |
|---|---|---|---|---|---|---|
| POTYPE | 2 | A | 1 | 2 | | PM Type |
| POPMNM | 15 | A | 3 | 17 | | PM Name |
| POTASK | 10 | A | 18 | 27 | | Task Name |
| POOPER | 5 | P | 28 | 30 | 0 | Operation # |
| PODESC | 30 | A | 31 | 60 | | Description |
| POSSEQ | 5 | P | 61 | 63 | 0 | Schedule Sequence # |
| POLSEQ | 5 | P | 64 | 66 | 0 | Loading Sequence # |
| POOVLP | 15 | P | 67 | 74 | 6 | Overlap Qty Override |
| POWKCT | 5 | A | 75 | 79 | | Work Center |
| POCRIT | 1 | A | 80 | 80 | | Critical Point Work Center Y/N |
| PODRNM | 15 | A | 81 | 95 | | Dependent Resource # |
| PODPRS | 1 | A | 96 | 96 | | Dependent Resource Y/N |
| PODOPR | 1 | A | 97 | 97 | | Dependent Operation Y/N |
| POUSCD | 3 | P | 98 | 99 | 0 | User-Defined Schedule Time (Days) |
| POUSCH | 3 | P | 100 | 101 | 0 | User-Defined Schedule Time (Hrs) |
| POUSCM | 3 | P | 102 | 103 | 0 | User-Defined Schedule Time |

| | | | | | | |
|---|---|---|---|---|---|---|
| | | | | | | (Min) |
| POSCCD | 1 | A | 104 | 104 | | Schedule Time Code U = user-defined S = system-calculated |
| POBCON | 1 | A | 105 | 105 | | Batch Cons for Run Time Y/N |
| POQUED | 3 | P | 106 | 107 | 0 | Queue Time (Days) |
| POQUEH | 3 | P | 108 | 109 | 0 | Queue Time (Hrs) |
| POQUEM | 3 | P | 110 | 111 | 0 | Queue Time (Min) |
| POQDFT | 1 | A | 112 | 112 | | Queue Time Defaults to Work Center Y/N |
| POSETH | 3 | P | 113 | 114 | 0 | Setup Time Hrs |
| POSETM | 3 | P | 115 | 116 | 0 | Setup Time Min |
| POSDFT | 1 | A | 117 | 117 | | Setup Time Defaults to Work Center Y/N |
| PORUNH | 3 | P | 118 | 119 | 0 | Run Time (Hrs) |
| PORUNM | 3 | P | 120 | 121 | 0 | Run Time (Min) |
| PORDFT | 1 | A | 122 | 122 | | Run Time Defaults to Work Center Y/N |
| POCLNH | 3 | P | 123 | 124 | 0 | Clean Up Time (Hrs) |
| POCLNM | 3 | P | 125 | 126 | 0 | Clean Up Time (Min) |
| POCDFT | 1 | A | 127 | 127 | | Clean Up Time Defaults to Work Center Y/N |
| POMOVD | 3 | P | 128 | 129 | 0 | Move Time Days |
| POMOVH | 3 | P | 130 | 131 | 0 | Move Time Hrs |
| POMOVM | 3 | P | 132 | 133 | 0 | Move Time Min |
| POMDFT | 1 | A | 134 | 134 | | Move Time Defaults to Work Center Y/N |
| PODTMT | 6 | P | 135 | 138 | 0 | Date Last Maint |
| POBLNK | 15 | A | 139 | 153 | | Blank area |

PMRESR

PM Resource File

This file contains information that describes the input (consumed) and output (produced) resources of each task.

File Organization: Indexed

Record Length: 320
Key Length: 43

Key Fields

| Field Name | Description |
|---|---|
| PRTYPE | PM Type |
| PRPMNM | PM Name |
| PRTASK | Task Name |
| PRRSTP | Resource Type |
| PRRESC | Resource Number |

| Field Name | Length | Type | Position From | To | Dec | Description |
|---|---|---|---|---|---|---|
| PRTYPE | 2 | A | 1 | 2 | | PM Type |
| PRPMNM | 15 | A | 3 | 17 | | PM Name |
| PRTASK | 10 | A | 18 | 27 | | Task Name |
| PRRSTP | 1 | A | 28 | 28 | | Resource Type (C/P) |

| | | | | | | |
|---|---|---|---|---|---|---|
| PRRESC | 15 | A | 29 | 43 | | Resource # |
| PRDESC | 30 | A | 44 | 73 | | Resource Description |
| PRPMQY | 15 | P | 74 | 81 | 6 | Qty Per PM Batch |
| PRRSQY | 15 | P | 82 | 89 | 6 | Qty Per Task Batch |
| PRUMSR | 2 | A | 90 | 91 | | Resource Standard UM |
| PRNQTY | 15 | P | 92 | 99 | 6 | Qty Per Task Batch (User UM) |
| PRNSUM | 2 | A | 100 | 101 | | User UM |
| PRQYTP | 1 | A | 102 | 102 | | Qty Type Code R = ratio blank = not ratio |
| PRRRTO | 9 | P | 103 | 107 | 4 | Ratio |
| PRNRTO | 15 | A | 108 | 122 | | Related Resource |
| PRRDEP | 1 | A | 123 | 123 | | Ratio Dep on this Resource Y/N |
| PRCPCT | 6 | P | 124 | 127 | 5 | Cost Dist % |
| PRPPCT | 6 | P | 128 | 131 | 5 | Prod Dist % |
| PRRSCL | 2 | A | 132 | 133 | | Class |
| PRRSSC | 2 | A | 134 | 135 | | Sub-Class |
| PRBEDT | 6 | P | 136 | 139 | 0 | Beginning Effectivity Date |
| PREEDT | 6 | P | 140 | 143 | 0 | Ending Effectivity Date |
| PRDOCU | 5 | A | 144 | 148 | | Doc Loc Code Override |
| PRREPT | 1 | A | 149 | 149 | | Reportable Y/N |
| PRTHEO | 1 | A | 150 | 150 | | Theoretical Cons Code |

PMRESR (continued)

| Field Name | Length | Type | Position From | To | Dec | Description |
|---|---|---|---|---|---|---|
| | | | | | | D = direct issue C = calc cost T = theoretical consumption |
| PRSUPR | 1 | A | 151 | 151 | | Superflushable Y/N |
| PRWHSE | 1 | A | 152 | 152 | | Cons/Prod From Warehouse |
| PRLOCN | 10 | A | 153 | 162 | | Cons/Prod From Location |
| PRIVCL | 4 | A | 163 | 166 | | Location Classif Code |
| PRAVQY | 15 | P | 167 | 174 | 6 | Historical Avg Qty Per PM Batch |
| PRLSQY | 15 | P | 175 | 182 | 6 | Last Qty Per PM Batch |
| PRPDQY | 15 | P | 183 | 190 | 6 | Last Complete Period Avg Qty Per PM Batch |
| PRNRVL | 1 | A | 191 | 191 | | NRV Usage Y/N |
| PRUNTC | 15 | P | 192 | 199 | 6 | Rolled Up Cost Std UM |
| PRTSKC | 15 | P | 200 | 207 | 6 | Rolled Up Cost Per Task Batch |
| PRPMCS | 15 | P | 208 | 215 | 6 | Total Rolled Up Cost Per PM Batch |
| PRPVCS | 15 | P | 216 | 223 | 6 | Previous Rolled Cost Std UM |

| | | | | | | |
|---|---|---|---|---|---|---|
| PRDTLR | 6 | P | 224 | 227 | 0 | Date Last Rollup |
| PRCSTP | 1 | A | 228 | 228 | | Cost Type Code N = normal F = fixed OH V = variable OH |
| PRCSRU | 1 | A | 229 | 229 | | Cost Rollup Costing Method A = rolling avg F = fixed L = last period's avg cost R = rolled H = historical avg S = standard |
| PRSIMC | 15 | P | 230 | 237 | 6 | Simulated Rollup Cost |
| PRAVCS | 15 | P | 238 | 245 | 6 | Historical Avg Cost |
| PRPDCS | 15 | P | 246 | 253 | 6 | Last Complete Period Avg Cost |
| PRUGDE | 2 | A | 254 | 255 | | Grade Upper Limit |
| PRLGDE | 2 | A | 256 | 257 | | Grade Lower Limit |
| PRBCON | 1 | A | 258 | 258 | | Batch Consumption Cd |
| PRSUQY | 15 | P | 259 | 266 | 6 | Setup Quantity |
| PRCUQY | 15 | P | 267 | 274 | 6 | Clean Up Qty |
| PRDPNM | 5 | P | 275 | 277 | 0 | Dependent Operation # |
| PRDPOP | 1 | A | 278 | 278 | | Dependent Operation Y/N |
| PRDPRS | 1 | A | 279 | 279 | | Dependent Resource Y/N |
| PRDEPD | 1 | A | 280 | 280 | | Dependency on This Resource Y/N |
| PRNDEP | 3 | P | 281 | 282 | 0 | Number of Dependencies |
| PRSTRM | 1 | A | 283 | 283 | | Stream Resource Y/N |
| PRPPTP | 2 | A | 284 | 285 | | Prime Planning PM Type |
| PRPPNM | 15 | A | 286 | 300 | | Prime Planning PM Name |
| PRPRNT | 1 | A | 301 | 301 | | Print On Documents Code Y/N |
| PRDTMT | 6 | P | 302 | 305 | 0 | Date Last Maint |
| PRBLNK | 15 | A | 306 | 320 | | Blank area |

PMTASK

PM Task File

This file contains a record for each task defined on a PM.

File Organization: Indexed

Record Length: 163
Key Length: 27

Key Fields

| Field Name | Description |
|---|---|
| PTTYPE | PM Type |
| PTPMNM | PM Name |
| PTTASK | Task Name |

| Field Name | Length | Type | Position From | To | Dec | Description |
|---|---|---|---|---|---|---|
| PTTYPE | 2 | A | 1 | 2 | | PM Type |

| | | | | | | |
|---|---|---|---|---|---|---|
| PTPMNM | 15 | A | 3 | 17 | | PM Name |
| PTTASK | 10 | A | 18 | 27 | | Task Name |
| PTTSEQ | 5 | P | 28 | 30 | 0 | Task Seq # |
| PTDESC | 30 | A | 31 | 60 | | Task Description |
| PTSIZE | 15 | P | 61 | 68 | 6 | Std Task Batch Size |
| PTUMSR | 2 | A | 69 | 70 | | Std Batch Size UM |
| PTQYEQ | 11 | P | 71 | 76 | 5 | Qty Equivalence |
| PTBTEQ | 11 | P | 77 | 82 | 5 | Batch Equivalence |
| PTYLDF | 9 | P | 83 | 87 | 6 | Yield Factor |
| PTSDDV | 9 | P | 88 | 92 | 6 | Yield Factor Std Deviation |
| PTAVYD | 9 | P | 93 | 97 | 6 | Historical Avg Yield |
| PTLSYD | 9 | P | 98 | 102 | 6 | Last Yield |
| PTPDYD | 9 | P | 103 | 107 | 6 | Last Complete Period Avg Yield |
| PTMOVD | 3 | P | 108 | 109 | 0 | Move Time Days |
| PTMOVH | 3 | P | 110 | 111 | 0 | Move Time Hrs |
| PTMOVM | 3 | P | 112 | 113 | 0 | Move Time Min |
| PTRCAL | 1 | A | 114 | 114 | | System Recalc Lead Time Y/N |
| PTCMLT | 3 | P | 115 | 116 | 0 | Cum Lead Time (Days) |
| PTSIMT | 3 | P | 117 | 118 | 0 | Simul Cumulative Lead Time (Days) |
| PTLGRS | 15 | A | 119 | 133 | | Longest Cumulative Lead Time Resource # |
| PTLGLT | 3 | P | 134 | 135 | 0 | Longest Cumulative Lead Time (Days) |
| PTREPT | 1 | A | 136 | 136 | | Reportable Task Y/N |
| PTDEPD | 1 | A | 137 | 137 | | Dependencies on Task Y/N |
| PTNMDP | 3 | P | 138 | 139 | 0 | Number of Dependencies |
| PTCRIT | 1 | A | 140 | 140 | | Critical Point Task Y/N |
| PTSENS | 4 | P | 141 | 143 | 3 | Sensitivity Factor |

PMTASK (continued)

| Field Name | Length | Type | Position From | Position To | Dec | Description |
|---|---|---|---|---|---|---|
| PTSTST | 1 | P | 144 | 144 | 0 | Stream Resource Status 0—Task has zero streams 1—consumed streams 2—produced streams 3—both consumed and produced streams |
| PTDTMT | 6 | P | 145 | 148 | 0 | Date Last Maint |
| PTBLNK | 15 | A | 149 | 163 | | Blank area |

PMTYPE

PM Type File

This file contains information about PM types, which are used to associate PMs with some common characteristic.

File Organization: Indexed

Record Length: 68
Key Length: 2

Key Fields

| Field Name | Description |
|---|---|
| PYTYPE | PM Type |

| Field Name | Length | Type | Position From | To | Dec | Description |
|---|---|---|---|---|---|---|
| PYTYPE | 2 | A | 1 | 2 | | PM Type |
| PYDESC | 30 | A | 3 | 32 | | PM Description |
| PYSIZE | 15 | P | 33 | 40 | 6 | Default Std PM Batch Size |
| PYUMSR | 2 | A | 41 | 42 | | Default Std Batch Size UM |
| PYRELS | 1 | A | 43 | 43 | | Schedule Release Y/N |
| PYPLNT | 2 | A | 44 | 45 | | Plant Number |
| PYWHSE | 1 | A | 46 | 46 | | Warehouse |
| PYSENS | 4 | P | 47 | 49 | 3 | Sensitivity Factor |
| PYDTMT | 6 | P | 50 | 53 | 0 | Date Last Maint |
| PYBLNK | 15 | A | 54 | 68 | | Blank area |

SECTION II-V

MDI000

Model Simulation Inquiry

A. Model Simulation Inquiry allows the user to simulate how changing the quantity of one resource would affect other quantities on the PM.

An edit is first performed to see if the resource the user has chosen to simulate exists on the specified PM. Lower limits are set to a logical view of the PMRESR file by PM Type/PM Name/Resource Number/Resource Type/Task Name, and then the program begins a READE. The Task Name is not included in the key if it is not entered by the user. If no records match the key fields, a hard halt message appears. If no Task Name is entered and the resource appears on two different tasks, the first task read is used for calculations.

For a dependent PM, the processing is a little different. First the program checks if the resource exists on the dependent PM by chaining to PMRESRTS using the partial key of dependent PM Type/dependent PM Name/Resource Number/Resource Type. If the chain fails, the program checks if the resource exists on the parent PM by setting lower limits on PMRESRTS using parent PM Type/parent PM Name/Resource Number/ Resource Type/Task Name and then reading. If no records match the key fields, a hard halt message appears.

If a unit of measure different from the Resource Standard UM is entered, the program attempts to convert the entered UM to the standard UM using the conversion subroutine ($UMCNV). If the UM is not convertible a hard halt message appears.

When the Batch Consumption Code = Y, an additional edit is done. If the quantity entered is less than the Quantity Relative to Task Batch Size, the appropriate UDS message appears as does the Quantity Relative to Task Batch Size. This also occurs when the quantity entered is not a multiple of the Quantity Relative to Task Batch Size.

If the resource is valid, and its UM is acceptable, an inquiry for the given quantity is initiated. The program first determines how many PM batches are necessary to produce/consume the specified quantity.

This number is applied to the other resources on the PM, in ascending order by task. Lower limits are set to the PMTASKSQ file by PM Type/PM Name/Sequence Number. Lower limits are set to the PMRESR file by PM Type/PM Name/Task Name, and a READE operation is done. If the READE is successful and the record read meets the limits, the quantity relative to the PM batch is determined.

If this is a dependent PM, the program checks whether the resource exists on the dependent PM by using dependent PM Type/dependent PM Name/Task Name/Resource Type = C/Resource Number to chain to the PMRESR file. If the chain is successful, information from this file is used. The next resource from the parent PM is returned to by setting greater than limits using parent PM Type/parent PM Name/Task Name/Resource Number/Resource Type and continuing the read.

This process continues until the Resource Type = P. Hereafter any produced resources for the parent PM Type/parent PM Name/Task Name combination are added to the subfile as they are read. If a stream resource record is read, "STREAM" is entered in the Resource Number field to distinguish it from other resources.

Consider the following example for calculations. If:

Resource Qty Relative to Task Batch = 30

Resource Qty Relative to PM Batch = 90 then the Task Batch Equivalence = 3.

If 2.2 PM batches are to be run, 2.2 must be multiplied by the Task Batch Equivalence to obtain the correct amount of the resource.

$2.2 \times 3 = 6.6$, which rounds to 7 task batches $7 \times 30 = 210$, the correct resource quantity A record is added to the subfile after each resource calculation. The resource for which the inquiry was initiated is not added to the subfile. When quantities for all resources on the task have been computed, the next PMTASK file is read. This procedure continues until the final task for the PM has been read. The subfile is built one page at a time.

Additional inquiries can be performed by entering new information and pressing ENTER.

Screens

MDI00001—Inquiry Selection Screen (Subfile Control)
MDI00002—Subfile Screen
MDI00003—Command Keys for Subfile

Inquiry Selection Screen—MDI00001

Display-Only Fields (subfile):

Task
Resource Number
Resource Type
Class
Sub-Class

Quantity
Unit of Measure
Description

Entry Fields (top of screen):

PM Type
PM Name
Resource Number
Resource Type
Quantity
Unit of Measure
Task
Class Lower Limit
Class Upper Limit
Sub-Class Lower Limit
Sub-Class Upper Limit
Resource Lower Limit
Resource Upper Limit Required Fields:

PM Type
PM Name
Resource Number
Resource Type
Quantity

Edits:

If Batch Consumption = Y, the quantity must be equal to or a multiple of the Task Batch Size (UDS).
Class Lower Limit must be less than or equal to Class Upper Limit.
PM Type/PM Name must exist in PMODEL.
PM Type/PM Name/Resource Number/Resource Type must exist in PMRESR.
Resource Number Lower Limit must be less than or equal to Resource Number Upper Limit.
Resource Type must be P or C.
Sub-Class Lower Limit must be less than or equal to Sub-Class Upper Limit.
UM must be convertible to Standard UM.

Command Keys (Display):

CK01 End Program
CK11 Alpha Search

Command Keys (Non-Display):

HELP Help Text
CK07 Send Message to Action List

B.

| File | Usage |
|---|---|
| ERRMSG | IF |
| MDI000FM | CF |
| PMODEL | IF |
| PMRESR | IF |
| PMRESRTS | IF |
| PMTASK | IF |
| PMTASKSQ | IF |
| TALFLI | IF |
| TALFLZ | IF |
| UMCONV | IF |

C.

| File Name | Field Name | Description |
|---|---|---|
| TALFLI | TAPMNM | Variable heading for PM Name |
| | TARESC | Variable heading for Resource |
| TALFLZ | TANDEC | User-defined number of decimals |

D.

| Field Name | Position From | To | Description |
|---|---|---|---|
| $USRPF | 1811 | 1820 | User Profile |
| $USER | 1891 | 1891 | User Date Format |
| $UDATE | 1953 | 1958 | Current Date (User Format) |

MDI020

Production Model Inquiry

A. This inquiry allows the user to display production model information. The user must first enter either a PM Name or a Resource Number. If a PM Name is entered, a PM Type is required; and if a Resource Number is entered, the user must also select whether the prime planning PM or the prime costing PM should be displayed.

First, production model information from the PMODEL file is retrieved. If PM Name/PM Type are entered, a chain is made to the PMODEL file using those entries. If the Resource Number is entered, a chain is made to the RESMST file to locate the prime planning PM or prime costing PM. The prime PM Type/prime PM Name is retrieved to chain to the PMODEL file. Hereafter, when PM Type and PM Name are used, they refer to prime PM Type and prime PM Name if the Resource Number has been entered.

After the PM information is retrieved, the tasks on the PM are processed. The bottom of the screen contains a subfile of all tasks in ascending Sequence Number order. The subfile is built one page at a time by reading the logical view PMTASKSQ. The PM Type and PM Name are used to set lower limits to the PMTASKSQ file. For a dependent PM, the parent PM Name/parent PM Type are used instead. Records that apply to the PM Type/PM Name are added to the subfile.

The user can mark a task with an R to see resource information for a particular task. To display all resources produced and consumed by this task, the PMRESR file is processed. For an independent PM, the PM Type/PM Name/Task Name are used to set lower limits to the PMRESR file, and a READE operation is done. If the READE is successful, a record is added to the subfile.

For a dependent PM, the parent PM Type/parent PM Name/Task Name are used to set lower limits to the PMRESR file, and a record is read. If the record applies to this PM Type/PM Name and the Resource Type = C, the programs checks if any changes have been made to the resource. The key field values (PM Type, PM Name, Task Name/Resource Type/Resource Name) are saved before continuing. Then dependent PM Type/ dependent PM Name/Task Name/Resource Type = C/Resource Name are used to CHAIN to the PMRESR file. If the CHAIN is successful, the information from this record is used instead of that retrieved using parent PM Name.

The next resource from the parent PM is returned to by setting greater than limits using the saved key fields and continuing to read. This process continues until the Resource Type = P. Hereafter, any produced resources for the parent PM Type/parent PM Name/Task Name combination are added to the subfile as they are read. If a stream resource is added, "STREAM" is entered in the Resource Number.

If the quantity of the resource is zero, the Print on Documents code in PMRESR is checked. If it is N, the resource is not added to the subfile.

The effectivity dates are converted to user format, and the Quantity Relative to PM Batch Size is converted to the user UM. If the conversion ends in error, the field defaults to zero and no error message appears. The Production and Cost Distribution values are multiplied by 100 to convert them from decimals to percentages.

If the user marks a task with a O, all operations associated with the task are retrieved from the PMOPER file. PM Type/PM Name/Task Name are used to set lower limits to the PMOPER file, and a READE operation is done. A record is added to the subfile if the READE operation is successful. The process continues until the READE operation fails.

Screens

MDI02001—Subfile Control Format for PM Screen
MDI02002—Subfile Control Format for Resource Screen
MDI02003—Subfile Control Format for Operation Screen
MDI02004—Subfile for PM Screen
MDI02005—Subfile for Resource Screen
MDI02006—Subfile for Operation Screen
MDI02007—Command Keys for PM Screen
MDI02008—Command Keys for Resource Screen
MDI02009—Command Keys for Operation Screen

Inquiry Screen—MDI02001

Display-Only Fields (subfile):

PM Description
PM Batch Size
PM Batch Size UM
Task Name
Description
Reportable Task
Yield Factor %
Historical Average Yield %
Batch Size
Batch UM
Cumulative Lead Time Entry Fields (top of screen):

PM Name
PM Type
Resource Number
Prime Planning/Prime Costing PM

Entry Fields (subfile):

Resource/Operation Selection

Required Fields:

Either PM Type and PM Name
Or Resource Number

Edits:

If PM Name is entered, PM Type is required. If PM Type is entered, PM Name is required.

If PM Type/PM Name is entered, it must exist in PMODEL.
The Prime PM Name/Type entered in the RESMST record must exist in PMODEL.
If Resource Number is entered, the Prime PM Name/Type must have been entered in the RESMST record.
If Resource Number is entered, it must exist in PMRESR and RESMST.
If Resource Number is entered, PM Name must be blank.
If Resource Number is entered, PM Type must be blank.
If Resource Number is entered, Prime Planning/Costing PM is required and must be P or C.
Resource/Operation Selection field must be R, O, or blank.

Defaults:

Quantity Relative to PM Batch Size defaults to zero if UM conversion fails.

Command Keys (Display):

CK01 End Program
CK11 Alpha Search

Command Keys (Non-Display):

HELP Help Text
CK07 Send Message to Action List

Operation Detail Screen—MDI02002

Display-Only Fields (top of screen):

PM Name
PM Type
Task Name

Display-Only Fields (subfile):

Operation #
Work Center
Description
Critical Point Work Center
Loading Sequence Number
Setup Time (Hrs/Min)
Run Time (Hrs/Min)
Clean Up Time (Hrs/Min)
Move Time (Days/Hrs/Min)

Defaults:

Run Time from WCMAST if the value equals zero.
Move Time from WCMAST if the value equals zero.
Cleanup Time from WCMAST if the value equals zero.

Command Keys (Display):

CK01 End Job

Command Keys (Non-Display):

HELP Help Text
CK07 Send Message to Action List

Resource Detail Screen—MDI02003

Display-Only Fields (top of screen):

PM Name
PM Type
Task Name

Display-Only Fields (subfile):

Resource Type
Resource Number
Description
Class
Sub-Class
Warehouse
Reportable
Unit of Measure
Cost Distribution Percentage
Production Distribution Percentage
Beginning Effectivity Date
Ending Effectivity Date
Qty/PM Batch
Qty/Task Batch Command Keys (Display):

CK01 End Program

Command Keys (Non-Display):

HELP Help Text
CK07 Send Message to Action List

B.

| File | Usage |
|---|---|
| ERRMSG | IF |
| MDE020FM | CF |
| PMODEL | IF |
| PMOPER | IF |
| PMRESR | IF |
| PMTASKSQ | IF |
| RESMST | IF |
| UNCONV | IF |
| WCMAST | IF |
| TALFLI | IF |
| TALFLZ | IF |

C.

| File Name | Field Name | Description |
|---|---|---|
| TALFLI | TACLNU | Variable heading for Clean Up Time |
| | TAPMNM | Variable heading for PM Name |
| | TARESC | Variable heading for Resource Number |
| | TARUNT | Variable heading for Run Time |
| | TAWKCT | Variable heading for Work Center |
| TALFLZ | TANDEC | User-defined number of decimals |

D.

| Field Name | Position From | To | Description |
|---|---|---|---|
| $USRPF | 1811 | 1820 | User Profile |
| $USER | 1891 | 1891 | User Date Format Code |
| $UDATE | 1953 | 1958 | Current Date (User Format) |

SECTION II-VI

MDL060

PM File List

A. This program reads the Production Model File (PMODEL).

B.

| File | Usage |
|---|---|
| PMODEL | IF |
| TALFLI | IF |
| TALFLZ | IF |
| QSYSPRT | O |

C.

| File Name | Field Name | Description |
|---|---|---|
| TALFLI | TAPMNM | Variable heading for PM Name |
| TALFLZ | TANDEC | User-defined number of decimals |

D.

| Field Name | Position From | To | Description |
|---|---|---|---|
| GPMTLO | 341 | 342 | PM Type Lower Limit |
| GPMTHI | 343 | 344 | PM Type Upper Limit |
| GPMNLO | 345 | 359 | PM Name Lower Limit |
| GPMNHI | 360 | 374 | PM Name Upper Limit |
| GPCMNT | 1202 | 1251 | One-Time Comment |
| GPENTN | 1821 | 1830 | Entity Name |
| $USER | 1891 | 1891 | User Date Format Code |
| $UDATE | 1953 | 1958 | Current Date (User Format) |

E. Available Selections

*Sequence:*

PM Type/PM Name

*Limits:*

PM Name
PM Type

*Options:*

One-Time Comments
Processing Option (Batch/Interactive/Scheduled)
Default Printer (Y/N)
Number of Copies

MDL080

PM Task File List

A. This program reads the PM Task Master File (PMTASK). Defaults for the Standard Batch Size for Task and Standard Batch Size UM come from PMODEL if these fields are blank.

B.

| File | Usage |
|---|---|
| PMODEL | IF |
| PMTASK | IF |
| TALFLI | IF |

| | |
|---|---|
| TALFLZ | IF |
| QSYSPRT | O |

C.

| File Name | Field Name | Description |
|---|---|---|
| TALFLI | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GPMTLO | 341 | 342 | PM Type Lower Limit |
| GPMTHI | 343 | 344 | PM Type Upper Limit |
| GPMNLO | 345 | 359 | PM Name Lower Limit |
| GPMNHI | 360 | 374 | PM Name Upper Limit |
| GTSKLO | 449 | 458 | Task Name Lower Limit |
| GTSKHI | 459 | 468 | Task Name Upper Limit |
| GPCMNT | 1202 | 1251 | One-Time Comment |
| GPENTN | 1821 | 1830 | Entity Name |
| $USER | 1891 | 1891 | User date Format Code |
| $UDATE | 1953 | 1958 | Current Date (User Format) |

E. Available Selections

*Sequence:*

PM Type/PM Name/Task Name

*Limits:*

PM Name
PM Type
Task Name

*Options:*

One-Time Comments
Processing Option (Batch/Interactive/Scheduled)
Default Printer (Y/N)
Number of Copies

MDL100

PM Resource File List

A. This program reads the Production Model Resource File (PMRESR).

Defaults for the Inventory Classification Code, Consumed/Produced From Location, Documentation Location Override Code, Cost Rollup Code, and Prime Planning Name and Type are retrieved from the Resource Master File. If the Consumed/Produced From Location field is blank and the Resource Type = C, the default is the Consumed Location (RMDLCO) from RESMST. If the Resource Type = P, the default is the Produced Location (RMDLPR) from RESMST.

B.

| File | Usage |
|---|---|
| PMRESR | IF |
| RESMST | IF |
| TALFLD | IF |
| TALFLI | IF |
| TALFLZ | IF |
| QSYSPRT | O |

C.

| File Name | Field Name | Description |
|---|---|---|
| TALFLD | TADSPC | Tells the program whether it |

| | | |
|---|---|---|
| | | must check for user cost authorization |
| TALFLI | TACLNU | Variable heading for Clean Up Time |
| | TAGRAD | Variable heading for Grade Level |
| | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GPMTLO | 341 | 342 | PM Type Lower Limit |
| GPMTHI | 343 | 344 | PM Type Upper Limit |
| GPMNLO | 345 | 359 | PM Name Lower Limit |
| GPMNHI | 360 | 374 | PM Name Upper Limit |
| GRS#LO | 409 | 423 | Resource # Lower Limit |
| GRS#HI | 424 | 438 | Resource # Upper Limit |
| GTSKLO | 449 | 458 | Task Name Lower Limit |
| GTSKHI | 459 | 468 | Task Name Upper Limit |
| GRSTLO | 493 | 493 | Resource Type Lower Limit |
| GRSTHI | 494 | 494 | Resource Type Upper Limit |
| GPCMNT | 1202 | 1251 | One-Time Comment |
| $USRPF | 1811 | 1820 | User Profile |
| GPENTN | 1821 | 1830 | Entity Name |
| $USER | 1891 | 1891 | User Date Format Code |
| $UDATE | 1953 | 1958 | Current Date (User Format) |

E. Available Selections

*Sequence:*

PM Type/PM Name/Task Name/Resource Type/Resource Number

*Limits:*

PM Name
PM Type
Task Name
Resource Number
Resource Type

*Options:*

One-Time Comments
Processing Option (Batch/Interactive/Scheduled)
Default Printer (Y/N)
Number of Copies

MDL120

PM Operation File List

A. This program reads the Production Model Operation File (PMOPER). Defaults for the time fields (Queue, Setup, Run, Clean Up, Move) come from the Work Center Master File (WCMAST) if the time field equals zero and the corresponding time default field equals Y.

B.

| File | Usage |
|---|---|
| PMOPER | IF |
| TALFLI | IF |
| TALFLZ | IF |
| WCMAST | IF |
| QSYSPRT | O |

C.

| File Name | Field Name | Description |
|---|---|---|
| TALFLI | TACLNU | Variable heading for Clean Up Time |
| | TAPMNM | Variable heading for PM Name |
| | TARESC | Variable heading for Resource Number |
| | TARUNT | Variable heading for Run Time |
| | TAWKCT | Variable heading for Work Center |
| TALFLZ | TANDEC | User-defined number of decimals |

D.

| Field Name | Position From | To | Description |
|---|---|---|---|
| GPMTLO | 341 | 342 | PM Type Lower Limit |
| GPMTHI | 343 | 344 | PM Type Upper Limit |
| GPMNLO | 345 | 359 | PM Name Lower Limit |
| GPMNHI | 360 | 374 | PM Name Upper Limit |
| GTSKLO | 449 | 458 | Task Name Lower Limit |
| GTSKHI | 459 | 468 | Task Name Upper Limit |
| GOP#LO | 473 | 477 | Operation # Lower Limit |
| GOP#HI | 478 | 482 | Operation # Upper Limit |
| GPCMNT | 1202 | 1251 | One Time Comment |
| GPENTN | 1821 | 1830 | Entity Name |
| $USER | 1891 | 1891 | User Date Format Code |
| $UDATE | 1953 | 1958 | Current Date (User Format) |

E. Available Selections

*Sequence:*

PM Type/PM Name/Task Name/Operation Number

*Limits:*

PM Name
PM Type
Task Name
Operation Number

*Options:*

One-Time Comments
Processing Option (Batch/Interactive/Scheduled)
Default Printer (Y/N)
Number of Copies

SECTION II-VII

MDR080

Indented Model Retrieval Report

A. This report details all PMs, tasks, and resources used to produce an end PM or resource.

First the PM information is retrieved. If PM Type/PM Name are entered, a chain is made to the PMODEL file. If the chain is successful, a PM summary line is printed. Otherwise an error message appears and the program ends.

If a Resource Number is entered, a chain is made to RESMST to find the resource's prime costing PM or prime planning PM. The PM Type/PM Name of the prime planning PM is used to chain to the PMODEL file. A PM summary line is printed if the chain is successful. If the chain to either PMODEL or RESMST fails, an error message appears and the program ends.

After a PM summary line has been printed, the tasks for the PM are retrieved using the PM Type/PM Name (parent PM Type/parent PM Name for a dependent PM) to set lower limits to a logical view of the Production Model Task File (PMTASK). The file is keyed by PM Type/PM Name/Sequence Number, and the tasks are printed in ascending order. A READE operation is performed and, if successful, a task detail line is printed.

After a task line has been printed, all resources associated with the task are printed. The produced resources are printed before the consumed resources. Lower limits are set to the PMRESR file using PM Type/PM Name/Task Name/Resource Type = P (for a dependent PM, parent PM Type/parent PM Name are used), and a READE operation is done. If the READE is successful, a resource detail line is printed. Reading continues until the READE fails.

If NRV Usage = Y, the net realizable value from RESMST prints under Value. Otherwise, the rolled up cost from PMRESR is printed under Cost. For a dependent PM, a chain is made to the Dependent Cost (DEPCST) file using Dependent PM Type/Dependent PM Name/Task Name/Resource Type = P/Resource Number to retrieve the rolled up cost.

When all produced resources have been printed, the consumed resources are printed. This is potentially more complicated because each resource may be produced by another PM, which also needs to be detailed.

To retrieve the consumed resources, the PMRESR file is used. For an independent PM, PM Type/PM Name/Task Name are used to set lower limits to the PMRESR file, and a READE operation is done. If the READE is successful, the program determines if this resource is produced on another PM.

If the PM is dependent, the parent PM Type/parent PM Name/Task Name are used to set lower limits to the PMRESR file, and a READE operation is done. If the READE operation is successful and the Resource Type = C, the program determines if any changes have been made to this resource. The key field values are saved, and dependent PM Type/Dependent PM Name/Task/Resource Type = C/Resource are used to chain to the PMRESR file. If the chain is successful, the information from this record is used instead of that retrieved using parent PM Name.

The next record after the parent PM is returned to by using a SETGT operation using the saved key field values. This process continues until the Resource Type = P.

The printed cost is determined by using Resource Number to chain to RESMST and checking the Cost Rollup Costing Method. If this field is blank, the sequence for retrieving its default is RESUBC, RECLAS, and RM tailoring. If Rolling Average Cost, Historical Average Cost, or Last Complete Period Average Cost are used, the Consumed From Warehouse (PMRESR) and Resource Number are used to retrieve the appropriate cost from the Resource Balance (RESBAL) file.

After a resource has been read from PMRESR, the Resource Number is used to chain to the RESMST file to determine if this is a manufactured or purchased resource. If it is purchased, a resource detail line is printed.

If the resource is manufactured, either its prime planning PM or prime costing PM is shown, depending on user selection. A detail line for the resource is printed before the prime PM, and its tasks and resources are listed.

Two work files are used for processing. The first work file, LOOP, is used to avoid an infinite loop. The second work file, RETURN, is used to track the last consumed resource shown. Each time a prime PM is printed, a chain is made to the LOOP work file by prime planning PM Type/prime planning PM Name. If the chain is successful, the PM is not printed, and the next record from PMRESR is processed. That is, the PM is not shown because it is already being processed. Otherwise, a record is added to both the LOOP and RETURN work files.

When a record is added to the RETURN work file, the level number and key field counters are incremented by one, and the value of the key field is saved. After the work files are updated, the steps for printing PM, task, and resource information are repeated. If a PM that does not contain a manufactured consumed resource is read, it is printed in its entirety and deleted from the LOOP work file. To determine whether to restart, a chain is made to the RETURN work file by the key field. A SETGT operation is done on the PMRESR file by PM Type/PM Name/Resource Type = C/Resource Number, and the level number is restored to the value from the record read. The record is then deleted from the work file.

For a consumed resource with a quantity of zero, the Print on Documents code in PMRESR is checked. If the code is N, the resource is not printed on the report. For a dependent resource, the code from the dependent PM is used in place of that of parent PM.

When all resources for the task are completed, the next record from PMTASKSQ is read. This process continues until all tasks on the PM are printed. The program ends when the original PM has been printed in its entirety.

B.

| File | Usage |
|---|---|
| DEPCST | IF |
| LOOP | UF |
| PMODEL | IF |
| PMRESR | IF |
| PMTASK | IF |
| PMTASKSQ | IF |
| PMTYPE | IF |
| RECLAS | IF |
| RESBAL | IF |
| RESMST | IF |
| RESUBC | IF |
| RETURN | UF |
| TALFLD | IF |
| TALFLI | IF |
| TALFLZ | IF |
| QSYSPRT | O |

C.

| File Name | Field Name | Description |
|---|---|---|
| TALFLD | TADSPC | Determines if the program checks for security clearance |
| TALFLI | TACSRU | Cost Rollup Costing Method |
| | TAGRAD | Variable heading for Grade Level |

| | | |
|---|---|---|
| | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GPCMNT | 1202 | 1251 | One-Time Comment |
| GPTYPS | 1254 | 1254 | Task Yield Print Selection |
| GPEFDT | 1255 | 1260 | Effectivity Date for Comparison |
| GPPMTP | 1266 | 1267 | PM Type |
| GPPMNM | 1268 | 1282 | PM Name |
| GPRES# | 1283 | 1297 | Resource Number |
| GPPPPC | 1298 | 1298 | Prime Planning or Costing PM |
| GPGRAD | 1300 | 1300 | Grade Level Limit |
| $USRPF | 1811 | 1820 | User Profile |
| GPENTN | 1821 | 1830 | Entity Name |
| $USER | 1891 | 1891 | User Format for Date Conversion |
| $UDATE | 1953 | 1958 | Current Date (User Format) |

E. Available Selections

*Sequence:*

PM Type/PM Name

*Options:*

One-Time Comments

Processing Option (Batch/Interactive/Scheduled)

Task Yield Print Selection:

1. Historical Average Yield
2. Last Yield
3. Last Complete Period Average Yield

Select Either: PM Type and PM Name, or Resource Number

Grade Level Limits (Y/N)

Select Prime Planning PMs or Prime Costing PMs

Effectivity Date for comparison

F. Field Headings

PM Type
PM Name
Description
Std PM Batch Size
Std Batch Size UM
Historical Average Yield %
Plant Number (Defaults from PMTYPE)
Task Name
Description
Cumulative Lead Time Days
Yield Factor %
Yield Factor Std Deviation %
Historical Yield %
Reportable (Y/N) (for tasks)
Resource Type
Resource Number
Class
Sub-Class
Standard UM Cost Distribution %
Production Distribution %
Reportable (Y/N) (for resources)
NRV Usage
Net Realizable Value
Cost

SECTION II-VIII

MDR160

Single Model Retrieval Report

A. This report allows the user to review information about all resources on specified PMs, or about all PMs that produce specified resources. The report shows one level of resource or PM information, which includes task, resource, and operation information. If a consumed resource is manufactured by another PM, this report does not show the secondary PM.

PM Type/PM Name Sequence. PMODEL is the file read. Lower limits are set using the PM Type and PM Name lower limits entered by the user. If the record meets the limits, a PM summary line is printed. The program determines whether the record is a dependent PM by checking the Dependency Code. If the Dependency Code = D, the PM requires additional processing that is explained below.

After the PM summary line is printed, all tasks for the PM are retrieved and printed in ascending sequence. The PM Type/PM Name (for dependent PMs, the parent PM Type/parent PM Name) are used to set lower limits to the PMTASKSQ file, and a READE operation is done. If the READE is successful, a task detail line is printed. The yield figures that print and their appropriate headings depend on the selected option.

Each task detail line is followed by all resources consumed and produced by the task. To retrieve the resources, the PMRESR file is processed. For an independent PM, the PM Type/PM Name are used to set lower limits to the PMRESR file, and a READE operation is done. If the READE is successful, a resource detail line is printed. After all consumed resources have been printed, all produced resources are printed. When the READE operation fails, the operations for this task are processed.

For a dependent PM, the parent PM Type/parent PM Name/Task Name are used to set lower limits to PMRESR, and a READE operation is done. If the READE is successful and the Resource Type = C, the program determines whether any changes have been made to this resource. The key field values (parent PM Type/parent PM Name/Task Name/Resource Type/Resource Number) are used to chain to the PMRESR file. If this chain is successful, the information from this record is printed instead of that retrieved using the original parent PM Type and Name.

A SETGT operation returns the program to the next resource using the saved key fields. The file is then read. The process continues until the Resource Type = P. Hereafter any produced resources for this parent PM Type/parent PM Name/Task Name combination are printed as they are read. When one of the three key fields changes, the operations are processed for the task. Stream resources are also printed and are identified by the words "STREAM" in the resource field.

Some options affect the resource detail lines. First, the Date for Comparison is checked to see if it is greater than zero. If so, date checking is active, and the Date for Comparison is converted to year/month/day format. If this date is greater than or equal to the Beginning Effectivity Date of the resource, and less than or equal to the Ending Effectivity Date, the resource is included on the report.

Another option lists allowable substitutes. The Resource Number is used to set lower limits to the RESSUB file, and a series of READE operations is done. For each successful READE, a substitute detail line is printed. If the user selects to print detail, additional resource information will be displayed. Effectivity dates and grade limits are only printed if the user chooses to print detail information.

Costs are only shown if the user profile is authorized to see them. The resource cost is different depending on whether this resource is consumed or produced. For a consumed resource the resource cost is the cost used in cost rollup.

This is determined by using Resource Number to chain to RESMST and by checking the Cost Rollup Costing Method. If this field is blank, the sequence for retrieving the default is RESUBC, RECLAS, and RM tailoring.

When the Rolling Average Cost, Historical Average Cost, or the Last Complete Period Average Cost is to be used, the Consumed From Warehouse (PMRESR) and the Resource Number are used to retrieve the appropriate cost from RESBAL. Standard Cost, Rolled Cost, and Fixed Cost are taken from RESMST. For produced resources, if NRV Usage = Y, the net realizable value is retrieved from RESMST. Otherwise, the rolled up cost is retrieved. For an independent PM, the rolled up cost is found in PMRESR, while for a dependent PM the rolled up cost is from DEPCST.

With consumed resources, if the Quantity Relative To PM Batch Size is zero, the Print on Documents code in PMRESR is checked. If this code = N, the resource is not printed on the report. If a dependent resource exists, the code for the dependent resource is used in place of the one defined for the parent resource.

When all resource detail lines for the task have been printed, the operations are retrieved from the PMOPER file. The PM Type/PM Name/Task Name (or for a dependent PM, the parent PM Type/parent PM Name/Task Name) are used to set lower limits to the PMOPER file, and a READE operation is done. Defaults for the time fields (queue, setup, run, clean up, and move) come from the Work Center File if the time field equals zero and the corresponding time default field = Y. An operation detail line is printed if the READE operation is successful. When the READE operation fails, the next task for the PM is processed.

When all the PMTASK records for the PM Type/PM Name combination have been read, the next record from PMODEL is read. The program ends when all PMODEL records within the limits have been read, and the last PM's tasks, resources, and operations have been printed.

Resource Number Sequence. The PMs that produce the specified resources are printed with this sequence. First, resources are read from a logical view of PMRESR by Resource Type/Resource Number. The Resource Type for produced resources and the Resource Number are used to set lower limits to the PMRESRRS file. The file is read sequentially. If the resource meets the user's limits, the record is further processed.

After, a Resource Number has been retrieved, the program determines which PM to print. Only PMs that produce the resource are printed if the prime PM option is not selected. If that option is selected, either the prime costing PM or prime planning PM will print before the other PMs that produce the resource. To retrieve the prime costing/planning PM, the Resource Number is used to chain to the RESMST file. If the chain is successful, the prime PM Type/prime PM Name are used to chain to the PMODEL file. If the chain is successful, a PM summary line is printed.

The user-defined limits do not affect which resources print for each selected PM. The resource produced by the PM is printed above the PM Name Tasks, resources, and operations are processed as they were if the PM Type/PM Name sequence was selected.

B.

| File | Usage |
|---|---|
| DEPCST | IF |
| PMODEL | IF |
| PMOPER | IF |
| PMRESR | IF |
| PMRESRRS | IF |
| PMTASKSQ | IF |
| PMTYPE | IF |
| RECLAS | IF |
| RESBAL | IF |
| RESMST | IF |
| RESSUB | IF |
| RESUBC | IF |
| TALFLD | IF |
| TALFLI | IF |
| TALFLZ | IF |
| QSYSPRT | O |

C.

| File Name | Field Name | Description |
|---|---|---|
| TALFLD | TADSPC | Determines if program checks user profile for clearance |
| TALFLI | TACLNU | Variable heading for Clean Up Time |
| | TACSRU | Cost Rollup Costing Method |
| | TAGRAD | Variable heading for Grade Level |
| | TAPMNM | Variable heading for PM Name |
| | TARESC | Variable heading for Resource Number |
| | TARUNT | Variable heading for Run Time |

| | | |
|---|---|---|
| | TAWKCT | Variable heading for Work Center |
| TALFLZ | TANDEC | User-defined number of decimals |

D.

| Field Name | Position From | To | Description |
|---|---|---|---|
| GPSQUS | 154 | 156 | Sequence Number |
| GPSQDS | 157 | 216 | Sequence Description |
| GPMTLO | 341 | 342 | PM Type Lower Limit |
| GPMTHI | 343 | 344 | PM Type Upper Limit |
| GPMNLO | 345 | 359 | PM Name Lower Limit |
| GPMNHI | 360 | 374 | PM Name Upper Limit |
| GRS#LO | 409 | 423 | Resource # Lower Limit |
| GRS#HI | 424 | 438 | Resource # Upper Limit |
| GRCLLO | 439 | 440 | Class Lower Limit |
| GRCLHI | 441 | 442 | Class Upper Limit |
| GRSCLO | 443 | 444 | Sub-Class Lower Limit |
| GRSCHI | 445 | 446 | Sub-Class Upper Limit |
| GPCMNT | 1202 | 1251 | One-Time Comment |
| GPTYPS | 1254 | 1254 | Task Yield Print Selection |
| GPEFDT | 1255 | 1260 | Effectivity Date for Comp |
| GPPPPC | 1298 | 1298 | Prime Plan or Cost PM |
| GPSUB | 1299 | 1299 | Show Allowable Substitutes |
| GPGRAD | 1300 | 1300 | Grade Level Limit |
| GPDETL | 1301 | 1301 | Detail Print |
| $USRPF | 1811 | 1820 | User Profile |
| GPENTN | 1821 | 1830 | Entity Name |
| $USER | 1891 | 1891 | User Format for Date Conv |
| $UDATE | 1953 | 1958 | Current Date (User Format) |

E. Available Selections

*Sequences:*
PM Type/PM Name
Resource Number

*Limits:*
PM Type
PM Name
Resource Number
Sub-Class
Class

*Options:*
One-Time Comments
Processing Option (Batch/Interactive/Scheduled)
Task Yield Print Selection:
1. Historical Average Yield
2. Last Yield
3. Last Complete Period Average Yield Detail Print (Y/N)
Show Substitute Resources (Y/N)
Grade Level Limits (Y/N)
Select Prime Planning PMs (P) or Prime Costing PMs (C)
Effectivity Date for Comparison
Default Printer (Y/N)
Number of Copies F. Field Headings

*PM Summary Line—PMRESR*
Resource Number
Resource Description

*PM Summary Line—PMODEL*
PM Type

PM Name
Description
Std PM Batch Size
Std Batch Size UM
Recost (Y/N)
Plant Number (if blank, default comes from PMTYPE)

*Task Summary Line—PMTASK*
Task Name
Sequence Number
Description
Yield Factor %
Historical Yield %
Reportable (Y/N)

*Resource Detail Line—PMRESR*
Resource Type (C/P)
Resource Number
Class
Sub-Class
Qty Relative to PM Batch
Resource Std UM
Warehouse-Location
Cost Distribution % (produced resources)
Net Realizable Value
NRV Usage (Y/N)
Cost
Rollup Method

*Fields printed when Detail = Y*
Qty Per Task Batch
Qty In User UM
User UM
Production Distribution % (produced resources)
Beginning Effectivity Date (consumed resources)
Ending Effectivity Date (consumed resources)
Location Classification Code (produced resources)
Grade Low-High (consumed resources)
Reportable (Y/N)
Superflushable (Y/N)
Dependencies (Y/N)
Number of Dependencies

*Resource Substitute Detail Line—RESSUB*
Substitute Resource Number
Beginning Effectivity Date
Ending Effectivity Date

*Operation Detail Line—PMOPER*
Operation Number
Work Center
Scheduled Sequence Number
Overlapping Qty
Queue Time (Days, Hrs, Min)
Setup Time (Hrs, Min)
Run Time (Hrs, Min)
Cleanup Time (Hrs, Min)
Move Time (Days, Hrs, Min)

MDR220

PM Diagram Report

A. This report prints a graphic view of a PM. The diagram shows each task and its consumed and produced resources, but does not show operations or comments.

The PM records are read from the PMODEL file. Lower limits are set on this file using the PM Type and PM Name lower limits selected by the user. All PMODEL records are read until the upper limits have been reached. When a record falls within the limits, the Dependency Code is checked. For independent PMs, the PM Type and PM Name are saved. For dependent PMs, the parent PM Type and parent PM Name are saved, and a PM detail line is printed. Then a subroutine is called to print all tasks and resources on that PM.

Tasks are read from PMTASKSQ in reverse order using READP. For an independent PM, upper limits are set by PM Type/PM Name. For a dependent PM, upper limits are set by parent PM Type/parent PM Name. During processing, first a task is read, then produced resource information is printed, then task detail, then consumed resource information.

To print produced resources the task name is retrieved from the PMTASKSQ file. Lower limits are set on the PMRESR file by PM Type/PM Name/Task Name/Resource Type = P, and a READE begins. As each PMRESR record is read, fields to be printed are loaded into arrays. Each array can hold up to five elements at one time. For final tasks, if more than five produced resources need to be printed, the arrays are cleared and more resources are loaded. For tasks that are not final tasks, one resource is printed in the far left position on each row. The resource is printed after the array is loaded, and the array is then cleared for the next resource.

Consumed resources are printed with up to four resources appearing in the right-most position on the row. The resources are read from the PMRESR file. For an independent PM, lower limits are set on the PMRESR file using PM Type/PM Name/Task Name/Resource Type = C, and a READE commences. For a dependent PM, lower limits are set on the PMRESR file using parent PM Type/parent PM Name/Task Name/Resource Type = C, and a READE commences.

For each resource on a dependent PM, a check is made to see if there are any changes on the resource. A chain is made to PMRESR using PM Type/PM Name/Task Name/Resource Type = C. If the chain is successful, a change has been made, and the resource is loaded into the array. If the chain is unsuccessful, upper limits are set on the PMRESR file using parent PM Type/parent PM Name/Task Name/Resource Type = C so the program can resume. Resources are loaded into the arrays as soon as they are read. Arrays hold up to four resources at a time.

For more than four the resources to be printed, the arrays are cleared and reloaded. When all consumed resources for a task are printed, the next task is read.

B.

| File | Usage |
|---|---|
| PMODEL | IF |
| PMRESR | IF |
| PMTASKSQ | IF |
| TALFLI | IF |
| TALFLZ | IF |
| QSYSPRT | O |

C.

| File Name | Field Name | Description |
|---|---|---|
| TALFLI | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GPMTLO | 341 | 342 | PM Type Lower Limit |
| GPMTHI | 343 | 344 | PM Type Upper Limit |
| GPMNLO | 345 | 359 | Parent PM Lower Limit |
| GPMNHI | 360 | 374 | Parent PM Upper Limit |
| GPCMNT | 1202 | 1251 | One-Time Comment |
| GPENTN | 1821 | 1830 | Entity |
| $UDATE | 1953 | 1958 | Current Date (User Format) |

E. Available Selections

*Sequence:*

PM Type/PM Name

*Limits:*

PM Name
PM Type

*Options:*

One-Time Comments
Processing Option (Batch/Interactive/Scheduled)
Default Printer (Y/N)
Number of Copies F. Field Headings

*PM Detail Line*

PM Type
PM Name
Description
Parent PM Type
Parent PM Name
Dependent (Y/N)
Cumulative Lead Time
Standard Batch Size
Standard Unit of Measure

*Produced Resource Detail Line*

Resource Number
Resource Description
Resource Class
Resource Sub-Class
Resource Qty Per PM
Resource Qty Per Task User UM
Cost Distribution %
Production Distribution %
Reportable (Y/N)
Planning Code

*Task Detail Line*
Task Name
Task Sequence Number
Task Description
Standard Task Batch Size
Standard Batch UM
Batch Equivalence
Cumulative Lead Time

*Consumed Resource Detail Line*
Resource Number
Resource Description
Class
Sub-Class
Cost Rollup Type Code
Cost Rollup Costing Method
Resource Qty Per PM
Resource Qty Per Task
User UM
Theoretical Consumption Code
Planning Code

SECTION II-X

• *Calculating The Allocated Quantity:*

After each RMRESR record is updated, the program determines if the resource is a consumed resource. If the resource was a consumed resource, the Quantity Allocated field in the resource balance record and RMRESR record must be updated. If the resource type is C the resource is a consumed resource on this Schedule/Release. Next, the default warehouse is determined. The default warehouse # is stored in the PMRESR file and is loaded into the RMRESR record. Using the resource#/default warehouse the program CHAINs to RESBAL. If the CHAIN fails, an error message is printed on the transaction register. If the CHAIN is successful, processing continues.

If the resource is not a batch consumption type resource:

*Quantity Allocated* = (Quantity Relative to PM Batch Size x # of Planned PM Batches) + Setup Qty + Clean Up Qty If the resource is a batch consumption type resource, the number of planned task batches must be used and rounded up if there is any fraction of a task batch. For example, if the # of planned task batches is 5.2, then 5.2 is rounded up to 6 batches for the purpose of doing this calculation. The number of planned task batches is never rounded down. The number of planned task batches is calculated by multiplying the number of planned PM batches by the batch equivalence.

If the resource is a batch consumption resource:

*Quantity Allocated* = (Quantity Relative to Task Batch Size x Number of Task Batches (rounded up)) + Setup Qty + Clean Up Qty

*Number Of Planned Task Batches* = Batch Equivalence x Number Of Planned PM Batches.

The Setup Quantity and the Clean Up Quantity are found in the RMRESR file.

SECTION III

SECTION III-I

MDR020

Cost Roll Up Work File Build Program

A. This program builds work files used during a simulated cost rollup. The work files consist of current data from the master files and user maintained data from the simulation files. Each work file is built by a separate subroutine.

Resource Master Simulation Work File (RESMSTWF)

The RESMST file is read sequentially. For each record, the program checks if a record exists in the Resource Master Simulation File (RESMSTSM) by chaining to the file by Resource Number. If a record for the resource does not exist there, a record is written to RESMSTSM that is a copy of the record in the Resource Master File.

If a record exists in RESMSTSM, a record for the Resource Master Simulation Work File is built using information from both the Resource Master and Resource Master Simulation files.

The following fields are copied from RESMSTSM:

Net Realizable Value Usage
Net Realizable Value
Cost Rollup Costing Method
Standard Cost
Prime Costing PM Type
Prime Costing PM Name
Fixed Cost
Fixed Overhead Rate
Fixed Overhead Byte (dollar or %)
Fixed Overhead Table Value
Fixed Overhead Table/Rate
Variable Overhead Rate
Variable Overhead Table Value Variable Overhead Byte (dollar or %)
Variable Overhead Table/Rate
Cost Rollup Level Class Code
Beginning Effectivity Date
Ending Effectivity Date
PO Lead Time Qty Break
PO Lead Time 1
PO Lead Time 2
PO Lead Time Adjustment
Mfg Lead Time Qty Break
Mfg Lead Time 1
Mfg Lead Time 2
Mfg Lead Time Adjustment The remainder of the work file is built from the Resource Master File. If the simulation record does not exist, the fields listed above are copied from the Resource Master File in addition to the ones listed below:

Resource Number
Resource Description
Unit Of Measure
Shortage Flag
Order Policy Code
Fixed Order Amount
Days of Supply
Safety Time
Balance Resource Code
Resource Class
Resource Sub-Class
Reporting Class
Documentation Location Code
Marketing Product Line
Marketing Resource Class
Produced Product Line
Produced Resource Class
Standard Inventory Classification Code
Short Term Code
Intermediate Term Code
Long Term Code
Theoretical Consumption Code
Prime Planning PM Type
Prime Planning PM Name
Where-From Code
Switch Over Code
Potent Resource
Potency Factor
ABC Code
Date ABC Code Last Updated
Selected Unit Cost
Selling Price
Default Work Center
Number of Times Resource Used
Cost Rollup Type Code
Cost From Last Rollup
Cumulative Lead Time of Prime Costing PM
Date of Last Rollup
Actual Rollup Task Name
Simulated Rollup Task Name
Re-Plan Flag Planning Sequence Number
Planning Level Code
Fixed Planning Level Code
MPP Code
Forward Scheduling
Pegging Code
Miscellaneous Field One
Miscellaneous Field Two
Miscellaneous Field Three
Shelf Life Byte
Shelf Life Days
Recost Byte
Default Location for Consumption
Default Warehouse for Consumption
Commodity Code
Current Revision Level
Earliest Acceptable Revision Level
Planner Number
Buyer Number
Service Level %
Default Location Classif Code - PO/Misc Receipt
Default Location Classif Code - Production Receipt
Lot Control
Required From Location Classification Code
PO Lead Time for New Release
Recalculate Lead Time
Sales Lead Time
Minimum Purchase Quantity
Maximum Purchase Quantity
Multiple Purchase Factor
Graphics Code
Default Location - Production Receipt
Default Warehouse - Production Receipt
Date Last Maintenance

Resource Balance Simulation Work File (RESBALWF)

The Resource Balance File is read sequentially. For each record, the program checks if a record exists in the Resource Balance Simulation File (RESBALSM) by chaining to the file using Resource Number/Warehouse. If a record for the resource does not exist there, a copy of the appropriate record from the Resource Balance File is written to RESBALWF.

If a record does exist there, the program builds a record for the Resource Balance Simulation Work File using information from both the Resource Balance and the Resource Balance Simulation files.

The following fields are copied from RESBALSM:

Rolling Average Cost
Last Period Cost
Historical Average Cost

The remainder of the work file is built from the Resource Balance File. If the simulation record does not exist, the fields listed above are copied from the Resource Balance File in addition to the ones listed below.

Resource Number
Warehouse
Resource Class
Resource Sub-Class

Order Policy Code
Fixed Order Amount
Days of Supply
Safety Time
Safety Stock
Cycle Count Method
Cycle Count Control Group
Date Last Cycle Count
Transaction Number Trigger
Number of Transactions Since Last Cycle Count
Selected For Next Cycle Count
Carrying Rate
Setup Cost
Quantity on Hand
Quantity Sold to Date
Mfg Allocated Quantity
Sales Allocated Quantity
Mfg Material Reserved Quantity
Sales Material Reserved Quantity
Total Quantity Present
Quantity On Order
Date of Last Activity
Date of Last Effect
Actual Production Total
Actual Consumption - Last Period Closed
Standard Consumption
PO Lead Time One
PO Lead Time Two
PO Lead Time for New Release
Mfg Lead Time One
Mfg Lead Time Two
PO Lead Time Adjustment
Mfg Lead Time Adjustment
Date Last Sale
Default Location for PO Receipt
Minimum Purchase Quantity
Maximum Purchase Quantity
Multiple Purchase Factor
Period Demand Quantity
Average Period End Balance
Actual Production - Last Period Close
Qty Break for Different PO Lead Time
Qty Break for Different Mfg Lead Time
Date Last Maintenance

Resource Class Simulation Work File (RECLASWF)

The Resource Class file is read sequentially. For each record, the program checks if a record exists in the Resource Class Simulation file (RECLASSM) by chaining to the file using Resource Class. If a record for the class does not exist there, a copy of the appropriate record in the Resource Class File is written to RESCLASWF.

If a record does exist there, the program builds a record for the work file using information from both the Resource Class and Resource Class Simulation files.

The following fields are copied from RECLASSM:

Resource Costing Method
Variable Overhead

Variable Overhead Byte ($ or %)
Variable Overhead Table Value
Variable Overhead Table/Rate
Fixed Overhead
Fixed Overhead Byte ($ or %)
Fixed Overhead Table Value
Fixed Overhead Table/Rate The remainder of the work file is built from the Resource Class File. If no simulation record exists, the above fields are copied from the Resource Class File in addition to the fields listed below:

Resource Class
Resource Class Description
Service Level %
Balance Resource Code
Theoretical Consumption Code
Standard Unit of Measure
Potent Resource
Potency Factor
Planner Number
Buyer Number
Action Horizon Days
Review Horizon Days
Cost Rollup Type Code
Selected Unit Cost
Reporting Class
Cost Rollup Level Class Code
Shelf Life Byte
Shelf Life Days
Lot Control
System Generated Planned POs
Date Last Maintenance

Resource Sub-Class Simulation Work File (RESUBCWF)

The Resource Sub-Class file is read sequentially. For each record, the program checks if a record exists in the Resource Sub-Class Simulation file (RESUBCSM) by chaining to the file using Resource Sub-Class. If a record for the sub-class does not exist there, a copy of the appropriate record in the Resource Sub-Class File is written to RESUBCWF.

If a record does exist there, the program builds a record for the work file using information from both the Resource Sub-Class File and the Resource Sub-Class Simulation File.

The following fields are copied from RESUBCSM:

Resource Costing Method
Variable Overhead
Variable Overhead Byte ($ or %)
Variable Overhead Table Value
Variable Overhead Table/Rate
Fixed Overhead
Fixed Overhead Byte ($ or %)
Fixed Overhead Table Value
Fixed Overhead Table/Rate The remainder of the work file is built from the Resource Sub-Class File. If no simulation record exists, the above fields are copied from the Resource Sub-Class File in addition to those listed below:

Resource Class

Resource Sub-Class
Resource Sub-Class Description
Service Level %
Balance Resource Code
Theoretical Consumption Code
Standard Unit of Measure
Potent Resource
Potency Factor
Planner Number
Buyer Number
Action Horizon Days
Review Horizon Days
Cost Rollup Type Code
Selected Unit Cost
Reporting Class
Cost Rollup Level Class Code
Shelf Life Byte
Shelf Life Days
Lot Control
System Generated Planned POs
Date Last Maintenance

Overhead Rate Simulation Work File (OVHDRFWF)

The Overhead Rate file is read sequentially. For each record, the program checks if a record exists in the Overhead Rate Simulation file (OVHDRFSM) by chaining to the file. If no record exists there, a copy of the appropriate record in the Overhead Rate File is written to OVHDRFWF.

If a record does exist there, a record for the work file is built using information from both the Overhead Rate and Overhead Simulation Files.

The following fields are copied from the Overhead Rate Simulation File:

Overhead Rate
Overhead Rate Type ($ or %)

The remainder of the work file is built from the Overhead Rate File. If no record exists in the simulation file, the above fields are copied from the Overhead Rate File in addition to the one listed below:

Overhead Table Value

B.

| File | Usage |
|---|---|
| OVHDRF | IF |
| OVHDRFSM | IF |
| OVHDRFWF | O |
| RECLAS | IF |
| RECLASSM | IF |
| RECLASWF | O |
| RESBAL | IF |
| RESBALSM | IF |
| RESBALWF | O |
| RESMST | IF |
| RESMSTSM | IF |
| RESMSTWF | O |
| RESUBC | IF |
| RESUBCSM | IF |
| RESUBCWF | O |

MDR022

Cost Rollup Print Program

A. This program is used by two menu options. For the first (MDR020X) it performs an actual cost rollup and processes and updates the master files. For the second (MDR022X) it performs a simulated cost rollup and processes the simulation work files. For both options, the unique report prompter for this program (MDR024) is executed to determine the processing options. The program then performs the appropriate cost rollup and loads the results into work files. The results then may be printed by another program (MDR026).

Although the calculations are identical for an actual and simulated cost rollup, it is important to note that in a simulated cost rollup, work fields are updated instead of the actual master file fields.

MDR028 is called when a rollup is already running and another user attempts to initiate a separate rollup.

Full Cost Rollup. A full cost rollup runs through all PMs in the database. The rollup is performed on a PM until a consumed resource cannot be costed. If the consumed resource has a prime costing PM that is not yet costed, a record is written to the PMFULW work file indicating where the rollup was interrupted. On the next pass through the data base, additional PMs are costed if the prime costing PMs of their resources were costed during the previous pass. If the rollup was started on a previous pass, the PMFULW record is used to resume the rollup where it was interrupted.

The program continues circulating through the database, each time costing PMs where all resource costs are known, until it makes a pass and can find no additional PMs to cost.

Selective Cost Rollup. A selective cost rollup includes two sub-options. In a single level selective rollup, only the cost of one PM is determined. That means, no effort is made to rollup the costs of PMs that produce the component resources of that first PM.

In a full selective rollup, the rollup performed until a consumed resource is found with a prime costing PM that is not yet costed. At that point a record is written to the PMEXPW work file that indicates where the rollup was stopped. Then an attempt to rollup that resource's prime costing PM is made. The resource's prime costing PM is determined by chaining to the Resource Master File and checking the Prime Costing PM Type and Prime Costing PM Name fields. If this prime costing PM has a consumed resource that uses a rolled up cost with a prime costing PM that is not yet costed, another record is written to the PMEXPW work file and the process continues.

To prevent an infinite loop of rollups, the Cost Level Code of the PM just costed must be less than that of the next PM to be costed. If this is not true a message appears on the report indicating the Cost Level Code problem. The program adds a record to the ERRORS work file using the PM Type/PM Name that could not be rolled up as the keys. It then loads in a reason code of 6. When a PM is fully costed, the PMEXPW record is deleted from the work file and the previous PM continues where it was interrupted. This process continues until all PMs in the PMEXPW work file have been costed.

Reset Cost Rollup Byte. The Cost Rollup Byte is a work field in PMODEL that indicates whether a PM was rolled up during this run. To prevent the cost from a previous rollup from being used in the current rollup, all cost rollup bytes are set to N. This is done by reading through PMODEL sequentially, initializing the byte, and updating the file.

PM Selection: Actual Full Cost Rollup. Your answer to tailoring question #1 determines what PM Type is used for calculating the standard cost. If a PM Type is defined, only PMs of this type are selected for a full cost rollup. The PM Type defined is used to set lower limits to the PMODEL file, and the file is then read. Even if the tailoring file does have a PM Type defined, the user can select not to use that type to limit the rollup. If the user selects not to limit the rollup by PM Type or no entry is made in tailoring, all PMs are included in the rollup.

PM Selection: Simulated Cost Rollup. The user has a number of available options when running a simulated cost rollup. They are listed below. The text following each option indicates whether this option is valid for a full cost rollup (F), selective cost rollup (S), or both (F/S). Only one of these options may be selected for each run of the cost rollup program.

PM Type to Rollup (F)
PM Type Alternate to Rollup (F/S)
Range of PMs to Rollup (S)
Range of Produced Resources to Rollup (S)
All PMs That Produce Resource (S)
All PMs That Produce Class (S)
All PMs That Produce Sub-Class (S)
List of Produced Resources to Rollup(S)
Only Cost all Previously Uncosted Resources (S)

A full cost rollup can be restricted to include only PMs of a designated type. The PM Type/blank PM Name are used to set lower limits to the PMODEL file and a READE operation is done (key = PM Type). If the READE is successful, the PM is included in the rollup.

An alternate PM Type can be entered for both a selective and full cost rollup. In this case, a dependent PM (alternate PM Type/parent PM Name) can be rolled up in place of the independent PM. Lower limits are set to the PMODEL file using cost rollup PM Type/blank PM Name and a series of READE operations is done.

For every successful READE (key = PM Type), the Dependencies on This PM field is checked. If it is Y, a chain is made to PMODEL using alternate PM Type/original PM Name. If the chain is successful, the program checks the parent PM Type and Name. If they are the same as the original PM Type and Name, the dependent PM is rolled up in place of the original PM. Otherwise, the original PM is rolled up.

During a selective, simulated rollup, if a range of PMs is specified, lower limits are set to the PMODEL file using the PM Type lower limit/PM Name lower limit. All PMs within the selected limits are processed. This program ends when the PM Type upper limit is passed.

The user can choose to rollup all PMs that produce a specific resource. With this option, lower limits are set to the PMRESRRS file using Resource Type = P/Resource Number, and a READE operation is done. If the READE is successful, the PM is rolled up.

The user can also rollup all PMs that produce a specific resource class or resource class/sub-class combination. With this option, temporary logical views of PMRESR are read sequentially, and PMRESR02 is processed. Lower limits are set to the PMRESR02 file, and a READE operation is done. If the READE is successful, the PM is included in the rollup.

PM Selection: Selective Cost Rollup. If PM limits are specified, lower limits are set to the PMODEL file using PM Type lower limit/blank PM Name, and the file is read sequentially. If the record is within the limits, it is included in the rollup. The program ends when the PM Type upper limit is passed.

The user can also cost up to ten produced resources. Lower limits are set to the PMRESRRS file using Resource Type = P/Resource Number, and a series of READE operations is done. All PMs that produce the resource(s) are processed.

If a range of produced resources is selected, lower limits are set to the PMRESRRS file using Resource Type = P/Resource Number lower limit.

If the option to recost all previously uncosted resources is selected, the PMRESR01 file is processed sequentially and a series of READE operations is done using Resource Type = P/Date Last Rollup = 0. If the READE is successful, the record is processed. This procedure is repeated until the READE operation fails.

Deleting TSKCST Records. TSKCST records from the last rollup are deleted to prevent their accumulation. Lower limits are set to the TSKCST file using PM Type/PM Name (all other key fields are blank). A series of READE operations is done using PM Type and PM Name. For every successful READE, the TSKCST record is deleted.

Processing of Tasks. Tasks on the PMs are processed in ascending order. For a dependent PM, task records from the parent PM are used. To retrieve the tasks, lower limits are set to the PMTASKSQ file using parent PM Type/parent PM Name, and a READE operation is done. If the READE is successful, the consumed resources on this task are processed. For an independent PM, lower limits are set to the PMTASKSQ file using PM Type/PM Name, and a READE operation is done.

Processing of Consumed Resources. After a task has been read, the program checks if each resource has an available cost. To retrieve the resources, the PMRESR file is processed. For a dependent PM, parent PM Type/parent PM Name/Task Name/Resource Type = C are used to set lower limits to the PMRESR file, and a READE operation is done. If the READE is successful, the program determines if any changes have been made to this resource. The key field values (parent PM Type, parent PM Name, Task Name, Resource Type, Resource Number) are saved before continuing.

Then dependent PM Type/dependent PM Name/Task Name/Resource Type = C/Resource Number are used to CHAIN to the PMRESR file. If the CHAIN is successful, the information from this record is used instead of that retrieved using parent PM Name. To return to the next resource from the parent PM, greater than limits are set using the saved key fields, and the file is then read.

For an independent PM, the PM Type/PM Name/Task Name/Resource Type = C are used to set lower limits to the PMRESR file, and a READE operation is done.

If the READE is successful, the effectivity dates of the resource are checked against the user-entered effectivity dates. If this date is greater than or equal to the beginning effectivity date, and less than or equal to the ending effectivity date, the resource is included in the rollup. A chain is made to the RESMST file using Resource Number to retrieve the Cost Rollup Costing Method. If this field is blank, the sequence for retrieving its default is Resource Sub-Class File (RESUBC), Resource Class File (RECLAS), and finally the RM Tailoring File.

Determining Resource Cost. The cost of each consumed resource is determined by the Cost Rollup Costing Method defined in RESMST. If the costing method is blank in RESMST, the defaulting scheme is Resource Sub-Class File, Resource Class File, and finally the RM Tailoring File.

If the costing method is defined to be either standard cost or fixed cost, these costs are retrieved from the RESMST file. Otherwise the Resource Number/Consumed From Warehouse (from PMRESR) are used to chain to RESBAL to retrieve the cost. If no RESBAL record is found, an error is signalled, the cost is set to zero, and the rollup is continued. A chain is made to the ERRORS work file using Code = R/Resource Number. If the chain fails, a record is added to the file with a reason code of 4.

If the costing method indicates that rolled up cost is to be used, a chain is made to the PMODEL file using prime costing PM Type/prime costing PM Name. If the Cost Rollup Byte = Y, the rolled up cost is retrieved from the prime costing PM. The name of the task where the rolled up cost came from is stored in RESMST.

Prime Costing PM Type/Prime Costing PM Name/Task Name/Resource Type = P/Resource Number is used to chain to the PMRESR file. If the chain is successful, a cost is available. If the chain fails, the signal "Task on Prime PM Does Not Produce Resource" (reason code = 3) is loaded. If no prime costing PM is defined, the signal "No Prime Costing PM Defined" (reason code = 1) is loaded. If an invalid prime costing PM was defined, the signal "Invalid Prime Costing PM Defined" (reason code = 2) is loaded.

In all three cases the cost is assumed to be zero, and the rollup is continued. Then a chain is made to the ERRORS work file using Code = P/PM Type-PM Name (concatenated). If the chain fails, a record with the reason code corresponding to the error is added to the file. If the Cost Rollup Byte = N on the prime costing PM, a cost for this resource is not available now.

If this occurs during a full cost rollup, a record is written to the PMFULW work file (keyed by PM Type and PM Name). This indicates the PM Type and Name, Task Sequence Number, Resource Number, Total Direct Cost, Fixed Overhead Cost, Variable Overhead Cost, the longest resource lead time, and the resource where the rollup was interrupted. This feature allows the rollup to resume where it left off on a future pass through the data base.

If it occurs during a selective cost rollup, a record is added to the PMEXPW work file. PMEXPW is keyed by a sequence number that is incremented by one each time a record is added to the file. This file indicates the PM Type and Name, Task Sequence Number, Resource Number, Total Direct Cost, Fixed Overhead Cost, Variable Overhead Cost, the longest resource lead time, and the resource and PM dependency codes that were current when the rollup was interrupted.

The prime costing PM cannot be the same as the PM currently being rolled up. If this is not the case, the appropriate error condition is added to the ERRORS work file: "Cost level code problem" (Reason Code = 7), or "Prime PM defined is the same as the PM being rolled" (Reason Code = 8). The program also takes the Rolled Up Cost from Last Rollup from RESMST and then continues the rollup. Once a PM is completely rolled up, the PMEXPW record for that PM is deleted, 1 is subtracted from the sequence number, and the rollup for the previous PM resumes. This procedure continues until there are no more records in the PMEXPW work file. Then another PM is selected and processing begins on that PM.

If a rolled up cost is available during a full rollup, a chain is made to the PMRESR file using prime costing PM Type/prime costing PM Name/Task Name/Resource Type = P/Resource Number. The Rolled up Cost Per Standard UM (field name = PRUNTC) is used for an actual cost rollup. For a simulated cost rollup, the simulated cost (PRSIMC) is retrieved instead.

If the rolled up cost is available during a selective rollup, the cost is retrieved from the RESMST file. A chain is made to the RESMST file using Resource Number and the Rolled up Cost from Last Rollup. If no cost is defined, this is an error condition (Reason Code = R), but the program assumes the cost is zero and the cost rollup continues.

Even if a consumed resource has a cost of zero, it is still used in the cost rollup. Consumed resources that have a cost of zero, however, are printed at the end of the report. To facilitate this function, a chain is made to the ERRORS work file using Code = R/Resource Number. If the chain is unsuccessful, a record is added to the work file.

Application of Fixed and Variable Overhead Rates. After the unit cost of a resource has been determined, the fixed and variable overheads are calculated. The functions described below are done twice, once for fixed and once for variable overhead. First, the Resource Master File is checked for the value in the Overhead Table/Rate field, which determines whether to use the overhead rate (R) or the overhead table value (T). If the field is blank in RESMST, the defaulting scheme is RESUBC, RECLASS, then RM Tailoring.

The Table Value, Overhead Rate, and Overhead Code are then retrieved from the same file in which the Overhead Table/Rate was found. If the Table/Rate field indicates a rate (R) should be used, the Overhead Code is checked to determine whether the rate represents a dollar value (D) or a percentage (P). If this field is blank, the program assumes it is a dollar value. If the table value should be used, the table value is used to chain to the Overhead Rate File (OVHDRF) to retrieve the rate. That record indicates whether the rate is a percentage or dollar value. Once the rate is determined it is applied as follows:

The quantity of the resource is the sum of 1) the quantity relative to the PM batch size, 2) cleanup quantity, and 3) setup quantity.

If the rate is in dollar form:

- Overhead Cost = dollar value × quantity of resource

If the rate is in percentage form:

- Overhead Cost = percentage × resource cost × quantity of resource

Total Calculations. The Total Direct Cost, Total Fixed Overhead, and Total Variable Overhead are maintained for each task. The Cost Rollup Type Code in the PMRESR file indicates whether to rollup cost normally (N), to roll total cost into fixed overhead bucket (F), or to roll total cost into variable overhead bucket (V). If the field is blank, the code is retrieved from the RESMST file.

In the first case, each of the calculated costs is added to their respective total fields. The resource amount (unit cost × sum of run, cleanup, and setup quantity) is added to the Total Direct Cost; the fixed overhead is added to the Total Fixed Overhead; and the variable overhead is added to the Total Variable Overhead. If the Cost Rollup Type Code equals F or V, the three costs are summed together and added to either the Total Fixed Overhead or the Total Variable Overhead, respectively.

Distribution of Costs Among Produced Resources. When all the consumed resources for a task have been processed, the rolled up cost is distributed among the produced resources. Any produced resource coded to have net realizable value has the quantity relative to PM batch size extended by its net realizable value (RESMST). This amount is then deducted from the rolled up cost prior to any distribution among other resources. If the result is less than zero, the value is set to zero to prevent calculations that would result in negative costs.

The cost of all non-net realizable value produced resources is calculated using their cost distribution percentages. In order to calculate the total cost of a PM, total costs for both stream and non-stream resources must be obtained. The total cost for stream resources is subtracted from the total cost for the task, yielding the total cost for non-stream resources. These figures are updated into the TSKPRT work file to be used when calculating the total cost of the PM.

The following calculations provide an example:

| Produced Resource | A | B | C | D | E |
|---|---|---|---|---|---|
| Cost Distribution % | 40% | 10% | 20% | 30% | 0% |
| NRV Usage (Y/N) | N | N | N | N | Y |
| Net Realizable Value | | | | | $10 |
| Qty Relative to PM Batch Size | 10 | 30 | 20 | 10 | 3 |
| Batch Equivalence | 2 | | | | |

Total Undistributed Cost = $110
(total cost of consumed resources on the task)

1. Calculate cost of net realizable value.

3 × \$10 = \$30

2. Deduct that cost from the total undistributed cost.

\$110 − \$30 = \$80 (adjusted undistributed cost)

3. Multiply Cost Distribution % by adjusted undistributed cost to obtain the total rolled up cost relative to PM Batch Size for Resource A.

40% × \$80 = \$32

4. Divide the total rolled up cost relative to PM Batch Size by the Quantity Relative to PM Batch Size to obtain the total rolled up cost per PM batch.

Total cost per PM batch = \$32/10 = \$3.20

5. A chain to the PMTASK file using PM Type/PM Name/Task Name determines if the PM batch size and task batch size are not equal. If the chain is successful and the standard batch size for the task is not zero, the total rolled up cost for task batch size is calculated. The cost of the task batch is divided by the Batch Equivalence.

Rolled up cost for task = \$32/2 = \$16

The stream resource total distributed cost is carried up to the next higher task.

Updating the TSKCST file. After the cost of each resource is found, the program determines whether the costs of the resource should be rolled into this level class and sub-class or the lower level class and sub-class. This is defined by the Level Class Code in RESMST. If the code is blank there, the defaulting scheme is RESUBC, RECLAS, then RM Tailoring.

If the Level Class Code = A, a chain is made to the TSKCST file by PM Type/PM Name/Task Name/Class/Sub-Class. A record is added or updated (updated by increasing the cost amounts already in the record) depending on whether the chain was successful.

If the Level Class Code = B, the program determines what the prime costing PM is. The last task that produced this resource is stored in RESMST, with separate fields for simulated and actual rollups. To retrieve the lower level costs, lower limits are set to the TSKCST file by PM Type/PM Name/Task Name, and a series of READE operations is done.

For every successful READE, the previous task cost is adjusted by the Cost Distribution % and the quantity ratio, and the record for this task is either added or updated to the file. The quantity ratio is equal to the consumed resource quantity on the PM being rolled divided by the produced resource quantity on the prime costing PM. If the Level Class Code = B, but there is no prime costing PM for the resource, the TSKCST file is updated as if the Level Class Code was A.

If this is a stream resource, its cost is equal to the cost of the previous task. To retrieve that cost, lower limits are set to the TSKCST file by PM Type/PM Name/saved Task Name, and a series of READE operations is done. For every successful READE, the previous task's cost is adjusted by the Cost Distribution % and the quantity ratio, and the record for this task is added or updated to the file.

Calculation of Lead Time. The cumulative lead time for a task consists of the move time of the task, total lead time from operations, and the longest lead time of all its resources. The calculation of lead time is done while rolling up cost.

First, a field in PMODEL determines whether the system should recalculate lead time for a PM. If not, the cumulative lead time defined for the PM is used, and the task is never checked. Otherwise, the program checks whether the system should recalculate lead time for this specific task. If not, the cumulative lead time already defined from the task is used. Note well that any fixed cumulative lead times are replaced when the system is instructed to calculate lead times.

If the system is calculating lead times, the move time for the task is moved into accumulating buckets (days, hours, minutes). Then the operations for the task are retrieved. Lower limits are set to the PMOPER file using PM Type/PM Name/Task Name, and a READE operation is done. If the READE is successful, the Schedule Code is checked. If this code indicates that the user-defined schedule time is used, the schedule is added to the accumulating buckets.

If the system-calculated time should be used, the setup time and move time of each operation are added to the accumulating buckets. The run time is accumulated in its own total fields. When the last operation for this task has been processed, the total run time of the operations is converted so it is expressed relative to the PM batch size. Finally, the run time is added to the move time and converted to days. The program follows the steps listed below.

1. The time may be expressed in relation to task batch size instead of the PM batch size. This occurs when the batch equivalence for the task is not one. To convert run time so it is relative to PM batch size, batch time is multiplied by batch equivalence. If the operation uses batch consumption, the batch equivalence is rounded up to the nearest integer before multiplying.
2. Minutes are converted to hours by dividing total minutes by 60 and rounding up to the nearest integer.
3. Hours are converted to days by dividing total hours by the number of hours in a day defined in the system tailoring file, and rounding up to the nearest integer.

Once the total lead time for operations has been converted to days, the longest lead time of all consumed resources for this task is also added in. The longest lead time is determined as the PMRESR record is read. The lead time used depends on whether this is a purchased, manufactured, or stream resource. For a stream resource, PM Type/PM Name/Task Name are used to chain to the PMTASK file and the cumulative lead time is retrieved. The Longest Cumulative Lead Time Resource on the PMTASK record remains blank if the stream resource has the longest lead time.

If this is a purchased or manufactured resource, the following information is retrieved from a previous chain to RESMST. If the Where From Code = P (purchased resource), the PO Lead Time Qty Break is checked. If the resource quantity is less than this quantity break, PO Lead Time 1 is used. Otherwise, PO Lead Time 2 is used. In either case, the PO lead Time Adjustment is added to the PO Lead Time.

If the Where From Code = M (manufactured resource), the Cumulative Lead Time for Prime Costing PM from RESMST is used. If this field is zero, the Mfg Lead Time is determined in the same way that PO lead time is calculated. In either case, the Mfg Lead Time adjustment is added to the Mfg Lead Time. A field containing the longest lead time up to this point is maintained. After each resource's lead time is determined, it is compared to this field. If the lead time of the resource is greater than the present value of the longest lead time, the field is updated with the new value.

Cumulative lead time is calculated for dependent PMs, but is not updated to the PMODEL or PMTASK files.

The cumulative lead time for a task is not affected by any change in the batch equivalent from the PMTASK file. The lead times are valid for any number of task batches.

Summary Of Updates. When the calculations for a resource are complete, the following fields in PMRESR are updated if this is an actual cost rollup:

Rolled Up Cost Per Std UM (PRUNTC)
Total Rolled Up Cost Per Task Batch Size (PRTSKC)
Total Rolled Up Cost Per PM Batch Size (PRPMCS)
Previous Rolled Cost Per Std UM (PRPVCS)
Cost Type that identifies cost used in rollup (PRCSTP)
Date Last Rollup Previous Rolled Cost Per Std UM contains the rolled cost before this run. If this is the prime costing PM of a produced resource, a chain is made to the RESMST file using prime costing PM Type/prime costing PM Name. The Rolled Up Cost Per Std UM, the task that the rolled up cost came from, the Date of Last Rollup, and the Cumulative Lead Time are all updated. If the chain fails, this update is not made. During a simulated cost rollup, the only update is to the Simulated Cost Value (PRSIMC) in PMRESR.

In addition, a chain is made to the TSKCST file, and, if successful, the record is updated by increasing the cost amounts already in the record. If unsuccessful, a record is added.

When all resources for a task have been processed, a number of updates are done. During a simulated cost rollup, the only update is to the Simulated Cumulative Lead Time (PTSIMT) field. During an actual cost rollup, however, PMTASK is updated with the following:

Cumulative Lead Time (PTCMLT)
Resource Number
Longest resource lead time for the task During an actual cost rollup, when a PM has been fully recosted, two PMODEL fields are updated. Date Last Costed is updated with the current date in YYMMDD format; and Cumulative Lead Time (PMCMLT) is updated with the cumulative lead time for the last task (PTCMLT). During a simulated cost rollup, Simulated Cumulative Lead Time (PMSIMT) is updated with the simulated cumulative lead time for the last task (PTSIMT).

As each PM is recosted during a full cost rollup, all the Recosting Required flags in PMODEL and RESMST are set off. For a full cost rollup a flag is reset with every pass through the data base when all possible PMs have been costed. After at least one PM has been costed during a pass, the flag is set off. If the flag remains on after a pass through the entire data base, this indicates there are no additional PMs to cost.

B.

| File | Usage |
|---|---|
| DEPCST | UF |
| ERRORS | UF |
| OVHDRF | IF |
| PMEXPW | UF |
| PMFULW | UF |
| PMODEL | UF |
| PMODELPA | IF |
| PMOPER | IF |
| PMRESR | UF |
| PMRESRRS | IF |
| PMRESR01 | IF |
| PMRESR02 | IF |
| PMTASK | UF |
| PMTASKSQ | IF |
| RECLAS | IF |
| RESBAL | IF |
| RESMST | UF |
| RESMST2 | UF |
| RESPRT | UF |
| RESUBC | IF |
| TALFLI | IF |
| TALFLZ | IF |
| TSKCST | UF |
| TSKPRT | UF |
| WCMAST | IF |

C.

| File Name | Field Name | Description |
|---|---|---|
| TALFLI | TACRLC | Class Level Code Default |
| | TACSRU | Costing Method Default |
| | TAFOPD | Fixed Overhead Byte Default |
| | TAFORT | Fixed Overhead Rate Default |
| | TAFOTR | Fixed Overhead Table/Rate Default |
| | TAFOTV | Fixed Overhead Table Value Default |
| | TAVOPD | Variable Overhead Byte Default |
| | TAVORT | Variable Overhead Rate Default |
| | TAVOTR | Variable Overhead Table/Rate Default |
| | TAVOTV | Variable Overhead Table Value Default |
| TALFLZ | TANOHR | Number of Hours in a Day |

D.

| Field Name | Position From | To | Description |
|---|---|---|---|
| GROLL | 2 | 2 | Original/Simulated Rollup |
| GEDATE | 254 | 259 | Effectivity Date |
| GSELEC | 260 | 260 | Full/Selective Rollup |
| GFORS | 261 | 261 | Single Level/Full Cost Roll |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| RES | 300 | 449 | Ten Resources (Option) |
| GUNCRS | 450 | 450 | Cost Previously Uncosted Resources |
| GARES | 451 | 465 | PMs That Produce Resource |

| | | | |
|---|---|---|---|
| GARESC | 466 | 467 | PMs That Produce Class |
| GARESB | 468 | 469 | PMs That Produce Sub-Class |
| GPMNLO | 478 | 492 | PM Name Lower Limit |
| GPMNHI | 493 | 507 | PM Name Upper Limit |
| $UDATE | 1953 | 1958 | Current Date (User Format) |

E. Available Selections

*Options:*

Use PM Type Tailoring Limit (Y/N)
Full/Selective Cost Rollup
Single/Full Cost Rollup
PM Type to Rollup
Alternate PM Type
Range of PMs to Rollup
Range of Produced Resources to Rollup
List of Produced Resources (10)
Cost All Previously Uncosted PMs
All PMs That Produce Resource
All PMs That Produce Class
All PMs That Produce Sub-Class
Cost Tolerance Percentage

MDR024

Cost Rollup Report Prompter Program

A. This program allows the user to enter the limits and options necessary to run the cost rollup report. The cost rollup report prompter uses the RP report prompter as a prototype. GPLDA positions, however, are redefined for this program.

The program is called for both an actual and simulated cost rollup. A byte in the GPLDA indicates the type of rollup.

The Report Default Selection Screen functions essentially the same way as the RP Report Prompter, except that the Report Save Key and Default Sequence fields do not apply and are not present on the screen. The cost rollup report runs in one sequence only, and therefore no sequence screen appears The Limits Selection Screen functions exactly as it does on the usual Report Prompter.

On the first Options Selection Screen, all fields are input capable, regardless of the type of cost rollup being performed. On the second Options Selection Screen, fields that are input capable depend on the type of rollup and whether this is a full or selective rollup, chosen by the user on the first options screen.

The Effectivity Date is edited and converted to YYMMDD format in this program. If the user chooses to perform a rollup using the PM Type from the tailoring file, that value is loaded into the GPLDA.

Screens

MDR02401—Defaults Selection Screen
MDR02402—Limits Selection Screen
MDR02403—Options Selection Screen #1
MDR02404—Options Selection Screen #2
MDR02405—Printer Selection Screen

Defaults Selection Screen—MDR02401

Display-Only Fields:

Accept the Default Sequence?

Entry Fields:

Accept the Default Limits?
Accept the Default Options?
Accept the Default Printer?

Required Fields:

All input capable fields on the screen.

Defaults:

All fields default to Y.

Edits:

All options must be Y or N.

Command Keys (Display):

| | |
|---|---|
| CK01 | End Job |
| CK09 | Report Text |

Command Keys (Non-Display):

| | |
|---|---|
| HELP | Help Text |
| CK07 | Send Message to Action List |
| CK17 | Error Message Override |

Limits Selection Screen—MDR02402

Entry Fields:

These fields determine what is printed, not what is included in the calculations.

PM Type Lower Limit
PM Type Upper Limit
PM Name Lower Limit
PM Name Upper Limit
Resource Number Lower Limit
Resource Number Upper Limit
Resource Sub-Class Lower Limit
Resource Sub-Class Upper Limit
Resource Class Lower Limit
Resource Class Upper Limit
Warehouse Lower Limit
Warehouse Upper Limit Defaults:

Lower Limits Default to blanks.
Upper Limits Default to all 9s.

Edits:

Lower limits cannot exceed upper limits.

Command Keys (Display):

| | |
|---|---|
| CK01 | End Job |
| CK03 | Redisplay Defaults Screen |
| CK09 | Report Text |
| CK18 | Refresh Screen |

Command Keys (Non-Display):

| | |
|---|---|
| HELP | Help Text |
| CK07 | Send Message to Action List |
| CK17 | Error Message Override |

Options Selection Screen #1—MDR02403

Entry Fields:

One-Time Comments
Processing Option (Batch/Interactive/Scheduled)
Cost Level Detail:

1 = Resource Summary
2 = PM with Class/Sub-Class Breakdown
3 = PM with Task/Class/Sub-Class Breakdown
4 = Task Cost Breakdown
Effectivity Date for Comparison
Full or Selective Cost Rollup (F/S)

Required Fields:
Processing Option
Cost Level Detail
Full or Selective Cost Rollup (F/S)

Defaults:
Processing Option = B.
Cost Level Detail = 1.
Effectivity Date for Comparison = 0.
Full or Selective Cost Rollup = F.

Edits:
Processing Option must be B, I, or S.
Cost Level Detail must be 1, 2, 3, or 4.
Effectivity Date for Comparison must be valid.
Full or Selective Cost Rollup must be F or S.

Command Keys (Display):

| | |
|---|---|
| CK01 | End Job |
| CK03 | Redisplay Defaults Screen |
| CK09 | Report Text |
| CK18 | Refresh Screen |

Command Keys (Non-Display):

| | |
|---|---|
| HELP | Help Text |
| CK07 | Send Message to Action List |
| CK17 | Error Message Override |

Options Selection Screen #2—MDR02404

Display-Only Fields:
Depend on the type of report selected. See entry fields.

Entry Fields:

*Actual/Full Cost Rollup*
Use PM Type Tailoring Limit (Y/N)
Single level or full cost rollup (S/F)

*Actual/Selective Cost Rollup*
Single level or full cost rollup (S/F)
Range of PMs to rollup
Range of produced resources to rollup
List of produced resources to rollup
Only cost all previously uncosted resources (Y/N)

*Simulated/Full Cost Rollup*
Single level or full cost rollup (S/F)
PM type to rollup
PM type (alternate to cost rollup PM type)
Cost tolerance %

*Simulated/Selective Cost Rollup*
Single level or full cost rollup (S/F)
PM type (alternate to cost rollup PM type)
Range of PMs to rollup
Range of produced resources to rollup
List of produced resources to rollup Only cost all previously uncosted resources (Y/N)
All PMs that produce resource
All PMs that produce sub-class
All PMs that produce class
_ Cost tolerance %

Required Fields:

Single level or full cost rollup (S/F) (All rollups)
Only cost all previously uncosted resources (Y/N) (Actual and simulated selective rollups)
Use PM Type Tailoring Limit (Y/N) (Actual, full rollups)

Defaults:

Use PM Type Tailoring Limit = N.
Single level or full cost rollup = F.
Only cost all previously uncosted resources = N.
All other fields default to blanks or zeros.

Edits:

Lower Limits must be less than or equal to upper limits.
Only cost all previously uncosted resources must be Y or N.
Single level or full cost rollup must be S or F.
Use PM Type Tailoring Limit must be Y or N.

Command Keys (Display):

CK01 End Job
CK03 Redisplay Defaults Screen
CK09 Report Text
CK18 Refresh Screen Command Keys (Non-Display):

HELP Help Text
CK07 Send Message to Action List
CK17 Error Message Override

Printer Default Selection Screen—MDR02405

Entry Fields:

Printer File
Forms Type
Number of Copies
Printer File 1-50

Required Fields:

Printer File

Defaults:

Printer File from QSYSPRT
Forms Type is STD
Number of Copies is 1
Printer File 1-50 from PRINTF data area Command Keys (Display):

CK01 End Job
CK03 Redisplay Defaults Screen
CK09 Report Text
CK18 Refresh Screen Command Keys (Non-Display):

HELP Help Text
CK07 Send Message to Action List
CK17 Error Message Override

B.

| File | Usage |
|---|---|
| ERRMSG | IF |
| MDR024FM | CF |
| TALFLD | IF |
| TALFLI | IF |

C.

| File Name | Field Name | Description |
|---|---|---|
| TALFLD | TATYPE | PM Type from Tailoring |
| TALFLI | TAPMNM | Variable heading for PM Name |
| | TARESC | Variable heading for Resource Number |

D.

| Field Name | Position From | To | Description |
|---|---|---|---|
| GCNCL | 1 | 1 | Cancel Code |
| GROLL | 2 | 2 | Actual/Simulated Rollup |
| GPMNL | 101 | 115 | PM Name Lower Limit |
| GPMNH | 116 | 130 | PM Name Upper Limit |
| GRES#L | 131 | 145 | Resource # Lower Limit |
| GRES#H | 146 | 160 | Resource # Upper Limit |
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Sub-Class Lower Limit |
| GRESCH | 169 | 170 | Sub-Class Upper Limit |
| GPMTPL | 171 | 172 | PM Type Lower Limit |
| GPMTPH | 173 | 174 | PM Type Upper Limit |
| GCMNT | 201 | 250 | One-Time Comments |
| GPROC | 251 | 251 | Processing Option |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Cost Rollup |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPTITL | 1710 | 1739 | Program Title |
| GPRNT | 1740 | 1749 | Printer Option |
| GPRID | 1750 | 1751 | Printer ID Number |
| G#COP | 1752 | 1754 | Number of Copies |

| | | | |
|---|---|---|---|
| GFORM | 1755 | 1764 | Forms Type |
| $USER | 1891 | 1891 | User Date Format |
| $UDATE | 1953 | 1958 | Current Date (User Format) |

E. Available Selections

*Limits:*

PM Type
PM Name
Resource
Class
Sub-Class
Warehouse

*Options:*

One-Time Comments
Processing Option (Batch/Interactive/Scheduled)
Cost Level Detail
Effectivity Date
Full/Selective Cost Rollup
Use PM Type Tailoring Limit
Single/Full Cost Rollup
PM Type to Rollup
Alternate PM Type
Range of PMs to Rollup
Range of Produced Resources to Rollup
List of Produced Resources (10)
Only cost all previously uncosted PMs
All PMs that produce resource
All PMs PMs that produce class
All PMs PMs that produce sub-class
Cost Tolerance %

MDR026

Cost Rollup Print Program

A. This program prints the results of the cost rollup from the RESPRT, TSKPRT, and ERRORS work files. The program prints in one of four different formats depending on the selected Cost Level Detail option. At the end of the report, all PMs that could not be costed are listed with the particular reason. All resources with a cost of zero are also listed at its end.

Resource Summary Detail. When this cost detail option is chosen, the program reads the first TSKPRT record for a PM. The program then chains to the ERRORS work file using a concatenated key of Code = P/PM Type-PM Name. If the chain is successful, the PM was not completely rolled up and is not printed on any detail or total lines. If the chain fails, the PM was completely rolled up and the PM level and the first task level detail lines are printed using information from the TSKPRT record.

Lower limits are then set to the PMRESR file using PM Type/PM Name/Task Sequence Number/Resource Type = P/blank Resource Number. A series of READE operations is done to retrieve all produced resources for that PM. If the resource falls within the user-specified limits and meets the specified cost tolerance percentages, it is printed on the report.

After all the produced resources are printed, lower limits are set on PMRESR using PM Type/PM Name/Task Sequence Number/Resource Type = C/blank Resource Number, and a series of READE operations is done to retrieve all consumed resources. When a consumed resource is found, a chain is made to the RESPRT file using PM Type/PM Name/Task Sequence Number/Resource Number to retrieve the direct costs and fixed and variable overhead costs.

PM with Class/Sub-Class Breakdown Detail. With this option, the program reads the first TSKPRT record. Newly-calculated fields are summed for all tasks when the total cost of the PM is calculated. A chain is then made to the ERRORS work file using a concatenated key of Code = P/PM Type-PM Name. If the chain is successful, the PM was not completely rolled up and is not printed on any detail lines. If the chain fails, the PM was completely rolled up and the PM level detail line is printed using information from the TSKPRT record. Task level detail lines are not printed if this detail option is selected.

The program then reads the remaining TSKPRT records for the PM to calculate the Total Cost (total direct cost + total fixed overhead cost + total variable overhead cost) for the entire PM. Lower limits are set on RESPRT01 (a logical view over RESPRT by PM Type/PM Name/Resource Class/Resource Sub-Class) using PM Type/PM Name/blank Resource Class/blank Resource Sub-Class, and a series of READE operations is done.

For each successful READE, the percentage of the total cost contained in the direct cost, fixed overhead, and variable overhead of each class/sub-class is calculated. If the record is within the user-defined limits, a detail line is printed on the report. For each class/sub-class, the program accumulates the percentage of total cost for the direct cost, fixed overhead, and variable overhead, and class cost breakdowns are printed. For each class/sub-class the program also accumulates the percentages of total cost that are contained in the total direct cost, the total fixed cost, and the total variable overhead for the PM.

PM with Task/Class/Sub-Class Breakdown. With this option, the program reads the first TSKPRT record. Newly-calculated fields are summed for all tasks when the total cost of the PM is calculated. A chain is then made to the ERRORS work file using a concatenated key of Code = P/PM Type-PM Name. If the chain is successful, the PM was not completely rolled up and is not printed on any detail lines. If the chain fails, the PM was completely rolled up and the PM level and task level detail lines are printed using information from the TSKPRT record.

Lower limits are set on RESPRT02 (a logical view over RESPRT by PM Type/PM Name/Task Sequence Number/Resource Class/Resource Sub-Class) using PM Type/PM Name/Task Sequence Number/blank Resource Class/blank Resource Sub-Class, and a series of READE operations is done.

For each successful READE, the percentage of the total task cost that is contained in the direct cost, fixed overhead cost, and variable overhead cost of each task/class/sub-class is calculated. If the record is within the user-defined limits, a detail line is printed on the report. The percentage of the total task cost that is contained in the direct cost, fixed overhead cost and variable overhead cost of each task/class/sub-class is accumulated. For each, the percentage of the total PM cost contained in the direct cost, fixed cost, fixed overhead, and variable overhead cost for the PM is accumulated so a PM total line can be printed.

Task Cost Breakdown. With this option, the program reads the first TSKPRT record for a PM. Newly-calculated fields are summed for all tasks when the total cost of the PM is calculated. A chain is made to the ERRORS work file using a concatenated key of Code = P/PM Type-PM Name. If the chain is successful, the PM was not completely rolled up and no detail lines are printed. If the chain fails, the PM was completely rolled up and the PM and task level detail lines are printed using information from the TSKPRT record.

Lower limits are set on RESPRT using PM Type/PM Name/Task Sequence Number/blank Resource Number, and a series of READE operations is done. For each successful READE the percentage of the total PM cost (total direct cost + total fixed overhead + total variable overhead) is calculated by adding each resource's direct cost, fixed overhead cost and variable overhead cost. If the record is within the user-defined limits, a detail line is printed.

When all consumed resources are printed, lower limits are set on RESPRT02 (a logical view over RESPRT by PM Type/PM Name/Task Sequence Number/Resource Class/Resource Sub-Class) using PM Type/PM Name/Task Sequence Number so the program can calculate the percentage of the total PM cost contained in the direct cost, fixed overhead cost, and variable overhead cost for each task. The percentage of the total PM cost contained in the direct cost, fixed overhead cost and variable overhead cost for the PM is also calculated.

Cost Rollup Errors Detail. At the end of the report all PMs that could not be rolled up and all resources with a zero cost are printed. To print the PMs that could not be rolled up, lower limits are set on the ERRORS work file using Code = P/blank PM Type/blank PM Name, and a series of READE operations is done. For each successful READE, a record for the PM is printed along with the reason why the PM was not rolled up. When all PM records have been printed, lower limits are set on the ERRORS work file using Code = R/blank Resource Number, and second series of READE operations is done. For each successful READE a resource line is printed.

Cost Tolerance Percentage. During a simulated cost rollup, the user can specify to see only those produced resources with costs that have changed by more than a specified percentage. Change calculations are necessary if a Cost Tolerance % is entered by the user. If the percentage of change between the original and the simulated rolled up cost is greater than the cost tolerance percentage entered by the user, the resource is printed.

The following calculation is used, with the original cost coming from PMRESR:

% change = (New cost − Original cost)/New Cost × 100

Percent of Total Costs. On resource sub-class and class total lines, the report shows what percentage of the total cost is attributed to the direct cost, fixed overhead cost, and variable overhead cost. The following calculation is used:

% of total = (Direct, Fixed, or Variable Cost/Total cost of task) × 100

B.

| File | Usage |
|---|---|
| DEPCST | IF |
| ERRORS | IF |
| PMODEL | IF |
| PMRESR | IF |

| | |
|---|---|
| PMTASKSQ | IF |
| RESPRT | IF |
| RESPRT01 | IF |
| RESPRT02 | IF |
| TALFLI | IF |
| TALFLZ | IF |
| TSKPRT | IF |
| QSYSPRT | O |

C.

| File Name | Field Name | Description |
|---|---|---|
| TALFLI | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GROLL | 2 | 2 | Actual/Simulated Rollup |
| GPMNML | 101 | 115 | PM Name Lower Limit |
| GPMNMH | 116 | 130 | PM Name Upper Limit |
| GRES#L | 131 | 145 | Resource # Lower Limit |
| GRES#H | 146 | 160 | Resource # Upper Limit |
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Class Lower Limit |
| GRESCH | 169 | 170 | Class Upper Limit |
| GPMTPL | 171 | 172 | PM Type Lower Limit |
| GPMTPH | 173 | 174 | PM Type Upper Limit |
| GCOMNT | 201 | 250 | One-Time Comments |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Cost Rollup |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GCSTTL | 470 | 476 | Cost Tolerance % |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPRID | 1750 | 1751 | Printer ID Number |
| GPENTN | 1821 | 1830 | Entity Name |
| $USER | 1891 | 1891 | User Date Format |

$UDATE 1953 1958 Current Date (User Format)

E. Available Selections

*Limits:*

PM Type
PM Name
Resource
Class
Sub-Class
Warehouse

*Options:*

One-Time Comments
Processing Option (Batch/Interactive/Scheduled)
Cost Level Detail
Effectivity Date for Comparison
Full or selective cost rollup
Use PM Type Tailoring Limit
Single level of full cost rollup
PM type to rollup
PM type (alternate to cost rollup PM type)
Range of PMs to Rollup
Range of produced resources to rollup
List of produced resources to rollup (10)
Only cost all previously uncosted PMs
All PMs that produce resource
All PMs that produce class
All PMs that produce sub-class
Cost tolerance %

F. Field Headings

Resource Summary:

*PM Summary Line*
PM Type
PM Name
PM Description
Standard Batch Size
UM

*Task Summary Line*
Task Name
Task Description
Task Batch Size
UM
Batch Equivalence

*Produced Resource Detail Line*
Resource Number
Class
Sub-Class
Description
Cost Per Standard UM
Cost Per Task Batch
Cost Per PM Batch
Standard UM
NRV Usage
Cost Distribution %

*Consumed Resource Detail Line*
Resource Number
Class
Sub-Class

Resource Description
Costing Method
A = Rolling Average Cost
H = Historical Average Cost
L = Last Complete Period Cost
S = Standard Cost
R = Rolled Up Cost
F = Fixed Cost
Total Direct Cost
Total Fixed Overhead
Total Variable Overhead
Resource with Longest Lead Time
Task Level Cumulative Lead Time
PM Level Cumulative Lead Time PM with Class/Sub-Class Breakdown:

*PM Summary Line*
PM Type
PM Name
PM Description
Total PM Cost

*Resource Class/Sub-Class Line*
Resource Number
Resource Class
Resource Sub-Class
Total Direct Cost
% of Total PM Cost
Total Fixed Overhead
% of Total PM Cost
Total Variable Overhead
% of Total PM Cost
Sum of %

*Totals for Class*
Total Direct Cost
% of Total PM Cost
Total Fixed OH Cost
% of Total PM Cost
Total Variable OH Cost
% of Total PM Cost
Sum of %

*PM Totals*
Total Direct Cost
% of Total PM Cost
Total Fixed OH Cost
% of Total PM Cost
Total Variable OH Cost
% of Total PM Cost PM with Task/Class/Sub-Class Breakdown:

*PM Summary Line*
PM Type
PM Name
Description
Total PM cost

*Task Summary Line*
Task Name
Task Description
Task Batch Size

UM
Batch Equivalence
Total Task Cost

*Consumed Resource Detail Line*
Class
Sub-Class
Resource Number
Total Direct Cost
% of Total PM Cost
Total Fixed OH Cost
% of Total PM Cost
Total Variable OH Cost
% of Total PM Cost
Sum of %

*Totals for Class*
Total Direct Cost
% of Total PM Cost
Total Fixed OH Cost
% of Total PM Cost
Total Variable OH Cost
% of Total PM Cost
Sum of %

*PM Totals*
Total Direct Cost % of total cost of PM
% of Total PM Cost
Total Fixed OH Cost
% of Total PM Cost
Total Variable OH Cost
% of Total PM Cost Task Cost Breakdown:

*PM Summary Line*
PM Type
PM Name
PM Description
Standard Batch Size
UM
Total PM Cost

*Task Summary Line*
Task Name
Task Description
Task Batch Size
UM
Batch Equivalence

*Consumed Resource Detail Line*
Resource Number
Resource Class
Resource Sub-Class
Level Class Code
Total Direct Cost
% of Total PM Cost
Total Fixed OH Cost
% of Total PM Cost
Total Variable OH Cost
% of Total PM Cost

*Task Totals—This Level*
Total Direct Cost

% of Total PM Cost
Total Fixed OH Cost
% of Total PM Cost
Total Variable OH Cost
% of Total PM Cost

*Task Totals—Lower Level*
Total Direct Cost
% of Total PM Cost
Total Fixed OH Cost
% of Total PM Cost
Total Variable OH Cost
% of Total PM Cost

*Totals for Task*
Total Cost
Total % of PM Cost

*Totals for PM—This Level*
Total Direct Cost
% of Total PM Cost
Total Fixed OH Cost
% of Total PM Cost
Total Variable OH Cost
Total % of PM Cost

*Totals for PM—Lower Level*
Total Direct Cost
% of Total PM Cost
Total Fixed OH Cost
% of Total PM Cost
Total Variable OH Cost
Total % of PM Cost Uncosted PM Line:

PM Type
PM Name
Error Message
Resource Number

Error Message Reasons:

1. No prime costing PM defined for retrieving rolled up cost.
2. Invalid prime costing PM defined for retrieving rolled up cost.
3. Resource is not produced by given prime PM.
4. No RESBAL record for this resource.
5. No RESMST record for this resource.
6. Cost Level Code problem.
7. Uncosted Resource on the PM.
8. Prime PM defined is the same as the PM being rolled.

Resource Error Line:

Zero Cost Resource Number
Cost Rollup Costing Method

MDR028

Cost Rollup Error Message Print Program

A. This program is called if cost rollup is already in use. Cost rollup prevents simultaneous use of the program by allocating the data area LOCK exclusively to one work station until the rollup is complete. If another user attempts to run cost rollup, a register prints with the following message: "Cost rollup cannot be performed at this time. Already in use." The program then ends with no rollup performed.

B.

| File | Usage |
|---|---|
| TALFLI | IF |
| QSYSPRT | O |

C.

| File Name | Field Name | Description |
|---|---|---|
| TALFLI | TAPMNM | Variable heading for PM Name |
| | TARESC | Variable heading for Resource Number |

D.

| Field Name | Position From | To | Description |
|---|---|---|---|
| GROLL | 2 | 2 | Actual/Simulated Rollup |
| GPMNML | 101 | 115 | PM Name Lower Limit |
| GPMNML | 116 | 130 | PM Name Upper Limit |
| GRES#L | 131 | 145 | Resource # Lower Limit |
| GRES#H | 146 | 160 | Resource # Upper Limit |
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Class Lower Limit |
| GRESCH | 169 | 170 | Class Upper Limit |
| GPMTPL | 171 | 172 | PM Type Lower Limit |
| GPMTPH | 173 | 174 | PM Type Upper Limit |
| COMENT | 201 | 250 | One-Time Comment |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Rollup |
| GTYPE | 262 | 263 | PM Type to Rollup |
| GTYPEA | 264 | 265 | Alternate PM Type |
| GPMLO | 266 | 267 | PM Name Lower Limit |
| GPMHI | 268 | 269 | PM Name Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPENTN | 1821 | 1830 | Entity Name |
| $USER | 1891 | 1891 | User Date Format |
| $UDATE | 1953 | 1958 | Current Date (User Format) |

E. Available Selections

*Limits:*
PM Type
PM Name
Resource
Class
Sub-Class
Warehouse

*Options:*
One-Time Comments
Processing Option (Batch/Interactive/Scheduled)
Cost Level Detail
Effectivity Date
Full/Selective Cost Rollup
Use PM Type Tailoring Limit
Single/Full Cost Rollup
PM Type to Rollup
Alternate PM Type
Range of PMs to Rollup
Range of Produced Resources to Rollup
List of Produced Resources to Rollup (10)
Only Cost All Previously Uncosted Resources
All PMs that produce resource
All PMs that produce class
All PMs that produce sub-class
Cost Tolerance %

SECTION III-II

MII000

Schedule Reservation Inquiry

A. This program allows the user to inquire into all reservations for a given resource, all reservations for a given schedule, or all reservations at a location.

There are three possible input files:

a. RESRES—physical file Schedule #/OLSN/Release #/ Task/Resource # (Inquiry type S)
b. RESRESRW—logical view by Resource #/Warehouse/ Location (Inquiry type R)
c. RESRESWL—logical view by Warehouse/Location/ Resource # (Inquiry type L)

User-entered Inquiry Type = R:

If the user wants to see all the reservations for a Resource Number the input file sequence is Resource #/Warehouse/Location. Lower limits are set to that file using the entered Resource Number. Each reservation record for this Resource Number is read. If the reservation record matches all the user-entered fields, it is added to the subfile.

User-entered Inquiry Type = S:

If the user wants to see all the reservations for a schedule, the input file sequence is Schedule #/OLSN/ Release #/Task/Resource #. Lower limits are set to that file using the entered Schedule Number. Each reservation record is read for this schedule. If the reservation record matches all the user-entered fields, it is added to the subfile.

Since the PM Type/PM Name combination is equivalent to the OLSN for a given Schedule #/Release # but not for a schedule, these fields are treated separately when performing edits. This increases program flexibility by allowing the user to view reservations for a Schedule #/PM Type/PM Name, for a Schedule #/OLSN, or for a Schedule #/OLSN/Release # (which is the same as for a Schedule #/PM Type/PM Name/Release #), in addition to all other combinations.

User-entered Inquiry Type = L:

If the user wants to see all the reservations at a location, the input file sequence is Warehouse/Location/Resource Number. Lower limits are set to that file using the entered Warehouse and location. Each reservation record is read for this location. If the reservation record matches all the user entered fields, it is added to the subfile. Only reservations that have not been totally issued yet are displayed on the subfile.

Any time the user enters a location, the location can be a partial key.

• *Editing the Location Number*

The user-entered location number is moved to a data structure consisting of 10 one-position fields. The input record location is moved to a data structure consisting of 10 one position fields.

Each of the fields (starting from the field in the data structure defined as position 1-1) of the input location is compared to each of the fields in the user-selected location. When a difference is found, the user-selected location at that position is checked. If the character at that position of the location is blank, the location is accepted as a match. If the location at that position is not blank, the location is rejected and defined as a non-match with the user-selected location.

CK04 and CK11 are available to display the Location Prompting Screen or to perform the Alpha Search Inquiry respectively.

Screens

MII00000—Selection Screen
MII00003—Data Screen

Selection Screen—MII0000

Entry Fields:

Resource Number
Warehouse
Location
Schedule Number
OLSN
Release Number
PM Name
PM Type
Task
Inquiry Types:
R = All reservations for a given Resource #.
S = All reservations for a given Schedule #.
L = All reservations for a given location.

Edits:

Inquiry Type must be R, S, or L.

Required Fields:

Inquiry Type:

If the Inquiry Type is R, Resource Number is required.
If the Inquiry Type is S, Schedule Number is required.
If the Inquiry Type is L, Warehouse and Location are required.

Command Keys (Display):

| | |
|---|---|
| CK01 | End Job |
| CK04 | Location Prompting Program |
| CK11 | Alpha Search Inquiry |

Command Keys (Non-Display):

| | |
|---|---|
| CK07 | Send Message to Action List |
| HELP | Help Text |

Data Screen—MII00003

Display-Only Fields:

Location
Resource Number
Quantity at Location
Quantity Reserved
Unit of Measure
Lot Number
Fixed Reservation Byte (Y/N)
Date Required
Location Classification Code
Warehouse
Resource Description (truncated)
Schedule Number (heading truncated)
OLSN
Release Number
Task
PM Name
PM Type Command Keys (Display):

| | |
|---|---|
| CK01 | Return to Select |

Command Keys (Non-Display):

| | |
|---|---|
| CK07 | Send Message to Action List |
| HELP | Help Text |

B.

| File | Usage |
|---|---|
| ERRMSG | IF |
| LOCDTL | IF |
| MII000FM | CF |
| RESMST | IF |
| RESRES | IF |
| RESRESRW | IF |
| RESRESWL | IF |
| RMODEL | IF |
| RMRESR | IF |
| RMTASK | IF |
| TALFLI | IF |
| TALFLZ | IF |

C.

| File Name | Field Name | Description |
|---|---|---|
| TALFLI | TARESC | Resource # Variable Heading |
| | TASCHD | Schedule # Variable Heading |
| | TAPMNM | PM Name Variable Heading |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format Code |
| $UDATE | 1953 | 1958 | Date in User Format |

F. See Section A for inquiry field descriptions.

SECTION III-III

MII100

Resource Allocation Inquiry

A. This program provides a display of time-phased allocations for a particular resource number.

A Resource Number must be entered. After the ENTER key is pressed, resource summary information is displayed on the top part of the screen. If a Warehouse is entered, the information displayed applies to that Resource #/Warehouse. If no Warehouse is entered, the information displayed on the top of the screen is the accumulation of all warehouse balances for that Resource Number. This means the quantities for all RESBAL records for this Resource Number are accumulated.

If the user enters a start date, only RMRESR records with a Date Required equal to or greater than the Start Date (and a Resource Type = C for consumed) are displayed. The Start Date defaults to zero on the screen and in the program. If the default is taken, all allocations are displayed.

To access information for the top of the screen, using the entered Resource #, a CHAIN to RESMST is performed to retrieve the Standard Unit of Measure and Resource Description.

If no warehouse is entered, each RESBAL record for this Resource Number is read, and the quantities to be displayed at the top of the screen are accumulated. If a Warehouse is entered, a CHAIN to the corresponding RESBAL record is performed and the appropriate quantities are displayed.

After the information for the top part of the screen is obtained, the allocation subfile is built. One of two logical views of RMRESR is used, depending on whether or not a Warehouse is entered. If a Warehouse is entered, lower limits are set to RMRESRRW (Resource/Warehouse/Date Required/Schedule/OLSN/Release #) using Resource #, Warehouse, and Start Date. If no Warehouse is entered, lower limits are set to RMRESRRD (Resource #/Date Required/Warehouse) using the Resource # and Start Date. When the records are read, start date is not part of the key. It is used only to set lower limits.

Before a record is written to the subfile, it must be checked. If the Quantity Reserved is greater than or equal to the Quantity Issued and if the Quantity Reserved is greater than or equal to the Quantity Allocated, the record is not added and the next record is read.

If the first check is not passed, another is performed. If the Quantity Reserved is less than the Quantity Issued and if the Quantity Issued is greater than or equal to the Quantity Allocated, the record is not added and the next record is read.

Before a record can be written to the subfile, the program CHAINs to RMODEL to verify the schedule is Open, Launched, or Running. The subfile is built page-by-page.

If a record is eligible to be written to the subfile, two quantities are calculated using fields retrieved from the RMRESR file. The Remaining Quantity Reserved is the difference of the Quantity Reserved less the Quantity Reduced from Reserved. The Remaining Quantity Allocated is the difference of the Quantity Allocated less the Remaining Quantity Reserved less the Quantity Issued.

To see all of the allocations for a particular schedule, the user calls the Schedule Status Inquiry program (MII160).

Inquiry Screen—MII10001

Display-Only Fields—Top of Screen:

Standard Unit of Measure
Resource Description
Total Quantity Allocated—Manufacturing
Total Quantity Allocated—Sales
Total Quantity Reserved—Manufacturing
Total Quantity Reserved—Sales
Total Quantity On Hand Display-Only Fields—Subfile:

Date Required
Remaining Quantity Allocated (calculated)
Remaining Quantity Reserved (calculated)
Warehouse
Schedule #
PM Type
PM Name
Release #
Resource #
Warehouse
Start Date

*Possible Entry Combinations:*
Resource #
Resource #/Warehouse
Resource #/Warehouse/Start Date
Resource #/Start Date Edits:

If Warehouse is not entered, Resource # must exist in RESMST file.
If Warehouse is entered, Resource #/Warehouse must exist in RESBAL file.
Entered Start Date must be valid in user format.

Defaults:

Start Date defaults to zero.

Command Keys (Display):

CK01 Display Session Status
CK11 Alpha Key Inquiry

Command Keys (Non-Display):

CK07 Send Message to Action List
CK17 Error Message Override
HELP Help Text

B.

| File | Usage |
|---|---|
| ERRMSG | IF |
| MII100FM | CF |

| | |
|---|---|
| RMRESRRD | IF |
| RMRESRRW | IF |
| RMODEL | IF |
| RESBAL | IF |
| RESMST | IF |
| TALFLI | IF |
| TALFLZ | IF |

C.

| File Name | Field Name | Description |
|---|---|---|
| TALFLI | TARESC | Resource # Variable Heading |
| | TASCHD | Schedule # Variable Heading (truncated to 8 positions) |
| | TAPMNM | PM Name Variable Heading |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |

F. See Section A for inquiry field descriptions.

SECTION III-IV

MII160

Schedule Status Inquiry

A. The Schedule Status Inquiry allows the user to display schedule release status.

Screens

MII16001—Selection Screen (#1)
MII16004—Schedule Release Inquiry Screen (#2)
MII16007—Schedule Comments Inquiry Screen (#3)
MII16010—Schedule Task Inquiry Screen (#4)
MII16013—Schedule Resource Inquiry Screen (#5)
MII16016—Schedule Operation Inquiry Screen (#6)
MII16019—Operation Comments Inquiry Screen (#7)

The user can either go directly to the desired screen by taking a menu option from the Selection Screen and then entering the appropriate fields (described below) or access other screens through the screen that is currently being displayed.

Screen #1 can go directly to:

a. Screen #2 (Display Schedule Releases)
b. Screen #3 (Display Schedule Comments)
c. Screen #4 (Display Schedule Tasks)
d. Screen #5 (Display Schedule Resources)
e. Screen #6 (Display Schedule Operations)

Screen #2 can go directly to:

a. Screen #4 (Display Schedule Tasks)
b. Screen #3 (Display Schedule Comments)

Screen #4 can go directly to:

a. Screen #5 (Display Schedule Resources)
b. Screen #6 (Display Schedule Operations)

Screen #6 can go directly to:

a. Screen #7 (Display Operation Comments)

Selection Screen—MII16001

Entry Fields:

Selection Code for schedule releases
Selection Code for schedule comments
Selection Code for schedule tasks
Selection Code for schedule resources
Selection Code for schedule consumed resources
Selection Code for schedule produced resources
Selection Code for schedule operations
Schedule #
OLSN
PM Type
PM Name
Release #
Task Required Fields:

Schedule # (see edits)
Selection Code

Edits:

Selection Code must equal X.

Only one menu option can be processed at one time.

If both the OLSN and the PM Type/PM Name are entered, they must match each other for the entered schedule #.

If release # is entered, either PM Type/PM Name or OLSN must be entered.

If Display All Releases for a Schedule is selected, schedule # is required and must be valid in the RMODEL file.

If Display All Comments for Schedule #/OLSN/Release # is selected, Schedule #, OLSN and Release # are required. The key combination must be valid in the SCHCOM file.

If Display All Tasks is selected, Schedule #, OLSN, and Release # are required, and the key combination must be valid in the RMTASK file.

If Display All Resources, Display All Consumed Resources, or Display All Produced Resources is selected, Schedule #, OLSN, and Release # are required, and the key combination must be valid in the RMRESR file.

If Display All Operations for a Task is selected, Schedule #, OLSN, and Release # are required and must be valid in the RMOPER file.

Command Keys (Display):

CK01 End Job

Command Keys (Non-display):

CK07 Send Message to Action List
HELP Help Text

Schedule Release Inquiry Screen—MII16004

If the user enters only a Schedule #, Screen #2 displays all releases for that Schedule #. Lower limits are set to the Schedule Release Summary (RMODEL) file using Schedule # only.

If the user enters a Schedule #/OLSN, Screen #2 displays all releases for that Schedule #/OLSN. Lower limits are set to RMODEL using Schedule #/OLSN.

If the user enters a Schedule #/OLSN/Release #, Screen #2 displays, showing the release for that Schedule #/ OLSN/Release #. Lower limits are set to RMODEL using Schedule #/OLSN/Release #; using a READE with a partial key, all matching records are read and displayed. CK01 returns the user to the Selection Screen.

When using Screen #2 (Schedule Release Inquiry), the user can:

(1) place an X next to a Release Number. This displays Screen #4, showing all Tasks for this Release Number, or (2) place a C next to a Release Number. This displays Screen #3, showing all comments for this Release Number.

Display-Only Fields—Top of Screen:

Schedule Number

Display-Only Fields—Subfile:

Code (to display all tasks or comments for a release)
OLSN
Release Number
PM Type
PM Name
Release Run Quantity
Unit of Measure
Release Status
Start Date
Due Date Entry Fields:

Codes:
X = Display Tasks
C = Display Comments for the Release

Edits:

Code must be blank, X, or C.

Command Keys (Display):

CK01 Selection Screen

Command Keys (Non-Display):

CK07 Send Message to Action List
HELP Help Text

Schedule Comments Inquiry Screen—MII16007

Lower limits are set to the Schedule Comment File (SCHCOM) using the Schedule #/OLSN/Release # entered by the user. Then a READE is performed. With each successful READE operation, a record is written to the subfile. The subfile is built page-by-page. When the READE operation fails, no more comments exist for this Schedule #/OLSN/Release #.

CK01 and CK19 return the user to the selection screen. CK03 displays the previous schedule comment record (versus the Roll Down key which is used to display a previous subfile page).

Display-Only Fields—Top of Screen:

Schedule #
OLSN
Release #
PM Type
PM Name
Note: Above field values are loaded from the RMODEL file.

Display-Only Fields—Subfile:

Comment Line #1
Comment Line #2
Comment Line #3, etc.

Edits:

If user accesses this screen directly from selection screen, CK03 is not valid.

Command Keys (Display):

CK01 Selection Screen
CK03 Display Previous Release
CK19 Return (returns from present screen to screen from which user made the selection)

Command Keys (Non-Display):

CK07 Send Message to Action List
HELP Help Text

Schedule Task Inquiry Screen—MII16010

If the user enters Schedule #/OLSN/Release #/Task, Screen #4 displays, showing all tasks for that Schedule #/OLSN/Release #/Task. Lower limits are set to the Schedule Task (RMTASK) file. Using a READE with a partial key, all matching tasks are read and displayed for that Schedule #/OLSN/Release # combination.

CK19 returns the user to the Schedule Release Inquiry Screen. CK01 returns the user to the selection screen. CK03 displays the previous task record (versus the Roll Down key, which is used to display a previous subfile page). The ENTER key displays resources or operations for the task. If there are no more screens to be displayed, the ENTER key returns the user to the selection screen.

Display-Only Fields—Top of Screen:

Schedule #
OLSN
Release #
PM Type
PM Name
Description
The above field values are loaded from the RMODEL file.

Display-Only Fields—Subfile:

Task Name
Task Sequence #
Task Description
Task Status
Standard Batch Size
Standard Batch Size UM
Last Yield
Move Time (Days)
Move Time (Hours)
Move Time (Minutes)
Reportable Task
Cumulative Lead Time (Days)
Critical Point Work Center
Task Due Date
Task Start Date Entry Fields:

Codes:

P = Display Produced Resources Only (Screen #5)
C = Display Consumed Resources Only (Screen #5)
B = Display Both Consumed and Produced Resources (Screen #5)
O = Display All Operations for a Task (Screen #6)

Edits:

Code must be P, C, B, or O.

Command Keys (Display):

| | |
|---|---|
| CK01 | Selection Screen |
| CK03 | Display Previous Release |
| CK19 | Return (returns from present screen to screen from which user made the selection) |

Command Keys (Non-Display):

| | |
|---|---|
| CK07 | Send Message to Action List |
| HELP | Help Text |

Schedule Resource Inquiry Screen—MII16Q13

If the user enters Schedule #/OLSN/Release #/Task (optional) and chooses to display consumed resources or produced resources or both, Screen #5 appears, showing the appropriate resources.

If no task was entered, all resources are shown (depending on the type specified by the user for the schedule #). If a Task was entered, only the resources for that Task are displayed.

Lower limits are set to the Schedule Resource File (RMRESR) using Schedule #/OLSN/Release #/Task. Next an RMRESR record is read. If a task was entered, the Task and Resource Type Code from the record just read are compared to the entered Task and Resource Type Code. If a task was not entered, the Resource Type Code from the RMRESR record is compared to the entered Resource Type Code (tasks are not compared).

CK19 returns the the user to the screen from which the user made the selection. CK03 displays the previous resource record (versus the Roll Down key which is used to display a previous subfile page). CK01 returns the user to the Selection Screen.

If P is entered, Screen #5 displays all the produced resources for this task.
If C is entered, Screen #5 displays all the consumed resources for this task.
If B is entered, Screen #5 displays both produced and consumed resources for this task.
If O is entered, Screen #6 displays all operations for this task.

Display-Only Fields—Top of Screen:

Schedule #
OLSN
Release #
Task
Task Description
PM Type
PM Name
The above field values are loaded from the RMODEL file.

Display-Only Fields—Subfile:

Resource #
Warehouse
Description
Resource Type (produced or consumed)
Quantity Allocated (for consumed resource)
Quantity Expected
Production Quantity to Date
Quantity Issued (for consumed resource)
Documentation Location Code
Theoretical Usage Code
Standard Unit of Measure
Date Required/Expected Command Keys (Display):

CK01 Selection Screen
CK03 Display Previous Task
CK19 Return (returns from present screen to screen from which user made the selection)

Command Keys (Non-Display):

CK07 Send Message to Action List
HELP Help Text

Schedule Operation Inquiry Screen—MII16016

When using Screen #6 (Schedule Operations Inquiry), the user can place an X next to an Operation #. Screen #7 displays, showing all comments for this Operation Number.

If the user chooses to display all operations for a task, Screen #6 appears showing all operations for the Schedule #/OLSN/Release #/Task. Lower limits are set to the Schedule Operation File (RMOPER). Using READE with a partial key, all operations for this Schedule #/OLSN/Release #/Task are read and displayed.

CK19 returns the user to the previous screen. CK01 returns the user to the Selection Screen. CK03 display the previous operation record (versus the Roll Down key which is used to display a previous subfile page). ENTER displays comments for the operation. If there are no more screens to display, the ENTER key returns the user to the selection screen.

Display-Only Fields—Top of Screen

Schedule #
OLSN
Release #
Task
Task Description
PM Type
PM Name
The above field values are loaded from the RMTASK file.

Display-Only Fields—Subfile:

Operation #
Operation Description
Schedule Sequence #
Loading Sequence #
Overlap Quantity Override
Critical Point Work Center
Queue Time (days)
Queue Time (hours)

Queue Time (minutes)
Setup Hours
Setup Minutes
Run Time (hours)
Run Time (minutes)
Clean Up (hours)
Clean Up (minutes)
Move Time (days)
Move Time (hours)
Move Time (minutes)

Entry Fields:

Code (to display all comments for an operation).

Edits:

Code must be X.

Command Keys (Display):

CK01 Selection Screen
CK03 Display Previous Task
CK19 Return from present screen to screen from which user made the selection Command Keys (Non-Display)

CK07 Send Message to Action List
HELP Help Text

Operation Comments Inquiry Screen—MII16019

If an X is entered from Screen #6, operation comments are displayed. Lower limits are set to the Operation Comments File (OPCOMM) using the Schedule #/OLSN/Release #/Task/Operation # entered by the user. Then a READE is performed. With each successful READE operation, a record is written to the subfile. The subfile is built page-by-page. When the READE operation fails, no more operation comments exist for this Schedule #/OLSN/Release #/Task/Operation #.

CK01 is available to return to the selection screen. CK03 is available to display the previous operation comment record (versus the Roll Down key which displays a previous subfile page). CK19 is available to return the user to the Schedule Operations Inquiry Screen.

Display-Only Fields—Top of Screen

Schedule Number
OLSN
Release Number
PM Type
PM Name
Task
Operation
The above field values are loaded from the RMOPER file.

Display-Only Fields—Subfile:

Comment Line #1
Comment Line #2
Comment Line #3, etc.

Command Keys (Display):

CK01 Selection Screen
CK03 Display Previous Operation
CK19 Return (returns from present screen to screen from which user made the selection)

Command Keys (Non-Display)

CK07 Send Message to Action List
HELP Help Text

B.

| File | Usage |
|---|---|
| ERRMSG | IF |
| MII160FM | CF |
| RMODEL | IF |
| RMODELPP | IF |
| RMTASK | IF |
| RMRESR | IF |
| RMOPER | UF |
| SCHCOM | IF |
| OPCOMM | IF |
| TALFLZ | IF |
| TALFLI | IF |

C.

| File Name | Field Name | Description |
|---|---|---|
| TALFLI | TASCHD | Schedule # Variable Heading |
| | TAPMNM | PM Name Variable Heading |
| | TARESC | Resource # Variable Heading |
| | TAWKCT | Work Center Variable Heading |
| | TARUNT | Run Time Variable Heading |
| | TACLNT | Clean Up Time Variable Heading |
| TALFLZ | TANDEC | User-Defined # of Decimals |

D.

| Field Name | Position From | To | Description |
|---|---|---|---|
| $USRPF | 1811 | 1820 | User Profile |
| $USER | 1891 | 1891 | Date Format Code |

F. See Section A for inquiry field descriptions.

SECTION III-V

MIR300 Schedule Status/Production Report

A. This report provides access to the status of schedule releases. The user can use this report to print Past Due Schedules, Past Start Schedules, or All Schedules.

This report prints the schedule summary line, followed by a detail line for each produced resource. The schedule summary line contains schedule summary information and the status of the schedule release (i.e., Open, Launched, Running, Complete, Closed). The produced resource detail line shows the status of each produced resource (i.e., Produced Quantity to Date compared to Expected Produced Quantity).

The input file to this program is MIR300W. The XJ procedure overrides the work file to either RMODEL or one of four logical views of RMODEL. Based on the sequence selected by the user, the job queue procedure (MIR300XJ) creates the appropriate logical view of RMODEL and overrides the input file MIR300W.

The program then reads the work file (MIR300W). After each record is read, the limits are checked. If the limits are met, it is determined which kind of schedule the user wants to observe. There are three conditions of schedules: the Past Start Date schedules, the Past Due Date schedules, and All Schedules. The user has the option of printing a report for any of these types of schedules. When all the limits are met for the selected type of schedule, a summary line is printed on the report.

If a detail report is selected, lower limits are set to the RMRESR file. A detail line is printed for each produced resource. If the user selects not to print a detailed report, only the schedule summary line is printed. The user has the option to print the schedule comments. If the user selects to print the schedule comments, they are printed after the schedule summary line.

Lower limits are set to SCHCOM using the schedule number, OLSN, and release number from the RMODEL record. The READE operation is used to read and print each comment line for the schedule.

All totals are printed regardless of the schedule print option chosen, as long as at least one record is printed on the report.

If the user runs this report for past start schedules, the report shows *all* schedules that started late, even if the schedule has already been completed. If the user wishes to see only schedules that should have started but have not, s/he can use the status limits in conjunction with this option.

Before the schedules are printed on the report, the following checks are done:

1. The actual start date is compared with the expected start date. If the actual start date is later than the expected start date, this schedule is printed.
2. If the actual start date is zero (i.e., the schedule is not yet running), the expected start date is compared with the report date. The report date defaults to today's date but can be changed by the user. If the report date is later than the expected start date, this schedule is printed.

If the report is printing past due date schedules, the following checks are done:

1. The completion date is compared with the expected due date. If the completion date is later than the expected due date, this schedule is printed.
2. If the completion date is zero (i.e., the schedule has not yet been completed), the expected due date is compared to the report date (which defaults to today's date but can be changed by the user). If the report date is later than the expected due date, this schedule is printed.

B.

| File | Usage |
|---|---|
| MIR300W | IF |
| RMRESR | IF |
| SCHCOM | IF |
| TALFLI | IF |
| TALFLZ | IF |
| QSYSPRT | O |

C.

| File Name | Field Name | Description |
|---|---|---|
| TALFLI | TARESC | Resource # Variable Heading |

| | | |
|---|---|---|
| | TAPMNM | Production Model Variable Heading |
| | TASCHD | Schedule Variable Heading |
| TALFLZ | TANDEC | User-Defined # of Decimals |

D.

| Field Name | Position From | To | Description |
|---|---|---|---|
| GPSQUS | 154 | 156 | Seq # Selected by Operator |
| GPSQDS | 157 | 216 | Sequence Description |
| GPD1LO | 421 | 426 | Expected Start Date Lower Limit |
| GPD1HI | 427 | 432 | Expected Start Date Upper Limit |
| GPD2LO | 433 | 438 | Expected Due Date Lower Limit |
| GPD2HI | 439 | 444 | Expected Due Date Upper Limit |
| GPOLLO | 581 | 583 | OLSN # Lower Limit |
| GPOLHI | 584 | 586 | OLSN # Upper Limit |
| GPPTLO | 621 | 622 | Plant # Lower Limit |
| GPPTHI | 623 | 624 | Plant # Upper Limit |
| GPNMLO | 625 | 639 | PM Name Lower Limit |
| GPNMHI | 640 | 654 | PM Name Upper Limit |
| GPTPLO | 655 | 656 | PM Type Lower Limit |
| GPTPHI | 657 | 658 | PM Type Upper Limit |
| GPPRLO | 673 | 673 | Priority Code Lower Limit |
| GPPRHI | 674 | 674 | Priority Code Upper Limit |
| GPRFLO | 675 | 694 | Reference # Lower Limit |
| GPRFHI | 695 | 714 | Reference # Upper Limit |
| GPRLLO | 715 | 717 | Release # Lower Limit |
| GPRLHI | 718 | 720 | Release # Upper Limit |
| GPSTLO | 815 | 815 | Status Lower Limit |
| GPSTHI | 816 | 816 | Status Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GPS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |

| | | | |
|---|---|---|---|
| GPPROC | 1201 | 1201 | Processing Option |
| GPCMNT | 1202 | 1251 | One-Time Comment |
| GPPDTL | 1255 | 1255 | Print Detail |
| GPRPDT | 1269 | 1274 | Report Date |
| GPSCPC | 1313 | 1313 | Schedule Print Code |
| GPPRCM | 1314 | 1314 | Print Schedule Comments |
| GPENTN | 1821 | 1830 | Entity Name |
| $USER | 1891 | 1891 | Date Format Code |
| $UDATE | 1953 | 1958 | Today's Date In User Format |

E. Available Selections

*Sequences:*

Schedule/OLSN/Release #
Plant #/Schedule/OLSN/Release #
Reference #/Schedule/OLSN/Release #
Schedule Start Date/Schedule/OLSN/Release #
Schedule Due Date/Schedule/OLSN/Release #

*Limits:*

List of Schedule Ranges
OLSN
Release #
Status
PM Name
PM Type
Reference #
Start Date
Due Date
Plant #
Priority Code

*Options:*

Batch, Interactive, or Scheduler (B, I, S)
Default Printer (Y/N)
Number of Copies
One-Time Comments Schedule Print Code: D = print only past due date schedules; S = print only past start date schedules; A = print all schedules (default)
Report Date (defaults to the system date)
Print Schedule Comments Y/N (default equals N)
Print Detail Y/N (default equals Y)

F. Field Headings

*Summary line (from RMODEL):*

Schedule
OLSN #
Release #
Priority Code
Status
PM Name
PM Type
Release Expected Start Date
Release Actual Start Date
Release Expected Due Date
Release Actual Due Date
Reference Number
Plant Number

*Comment line (from SCHCOM):*

Comment

*Detail line (from RMRESR):*

Resource Number
Description
Task
User Defined UM
Quantity Produced to Date
Expected Produced Quantity

*Total lines:*

Number of Schedules Past Due Date
Number of Schedules Past Start Date
Number of Schedules At Status Open
Number of Schedules At Status Launched
Number of Schedules At Status Running
Number of Schedules At Status Closed
Number of Schedules At Status Complete

MIR320

Resource Needs Report

A. This report is a listing of all the resources required to produce the quantity requested for the schedule. If this program is called from the Schedule Open program (MIU120X), all open schedules are printed.

This report is done with user-controlled file OPENs and READs. Because resource totals are printed for certain sequences, the program must know the input file sequence.

Lower limits are set to the appropriate file based on the sequence selected. The input file is a logical view of RMRESR. A record is read from the input file. Schedule #, OLSN, release #, task, PM name, resource number, resource class, resource sub-class, and date last maintenance are compared with the report limits. If the limits are passed, a CHAIN is done to the RMODEL file. Reference #, priority code, schedule start date, and schedule due date are checked.

If the limits are passed, a CHAIN is done to the RMTASK file for task status. If it passes the limits, the quantity remaining required is checked. If it is greater than zero, the record is printed. If it is less than or equal to zero, another record is read.

If the sequence is by Schedule/OLSN/Release #/Resource, a Schedule Summary line is printed each time the schedule #, OLSN, or release number changes from the previous record printed.

If the sequence is by Class/Sub-Class/Resource/Warehouse or by Resource/Schedule/OLSN/Release #, the total quantity remaining required is accumulated. A READE to RESBAL is performed to accumulate quantity on hand for that particular resource. Resource totals are printed when a control break occurs.

B.

| File | Usage |
|---|---|
| RESBAL | IF |
| RMODEL | IF |
| RMRESR01 | IF |
| RMRESR03 | IF |
| RMRESR06 | IF |
| RMTASK | IF |
| TALFLI | IF |
| TALFLZ | IF |
| QSYSPRT | O |

C.

| File Name | Field Name | Description |
|---|---|---|
| TALFLI | TARESC | Resource Variable Heading |
| | TASCHD | Schedule Variable Heading |
| | TAPMNM | PM Name Variable Heading |
| TALFLZ | TANDEC | User-Defined # of Decimals |

D.

| Field Name | Position From | To | Description |
|---|---|---|---|
| GPSQUS | 154 | 156 | Sequence Number |
| GPSQDS | 157 | 216 | Sequence Description |
| GPD1LO | 421 | 426 | Schedule Start Date Lower Limit |
| GPD1HI | 427 | 432 | Schedule Start Date Upper Limit |
| GPD2LO | 433 | 438 | Date Last Maint Lower Limit |
| GPD2HI | 439 | 444 | Date Last Maint Upper Limit |
| GPD3LO | 445 | 450 | Schedule Due Date Lower Limit |
| GPD3HI | 451 | 456 | Schedule Due Date Upper Limit |
| GPOLLO | 581 | 583 | OLSN Lower Limit |
| GPOLHI | 584 | 586 | OLSN Upper Limit |
| GPNMLO | 625 | 639 | PM Name Lower Limit |
| GPNMHI | 640 | 654 | PM Name Upper Limit |
| GPTPLO | 655 | 656 | PM Type Lower Limit |
| GPTPHI | 657 | 658 | PM Type Upper Limit |
| GPPRLO | 673 | 673 | Priority Code Lower Limit |
| GPPRHI | 674 | 674 | Priority Code Upper Limit |
| GPRFLO | 675 | 694 | Reference # Lower Limit |
| GPRFHI | 695 | 714 | Reference # Upper Limit |
| GPRLLO | 715 | 717 | Release # Lower Limit |
| GPRLHI | 718 | 720 | Release # Upper Limit |
| GRRSLO | 729 | 743 | Resource # Lower Limit |
| GPRSHI | 744 | 758 | Resource # Upper Limit |
| GPRCLO | 759 | 760 | Class Lower Limit |
| GPRCHI | 761 | 762 | Class Upper Limit |
| GPSBLO | 763 | 764 | Sub-Class Upper Limit |
| GPSBHI | 765 | 766 | Sub-Class Upper Limit |
| GPSTLO | 815 | 815 | Status Lower Limit |
| GPSTHI | 816 | 816 | Status Upper Limit |
| GPTKLO | 839 | 848 | Task Lower Limit |
| GPTKHI | 849 | 858 | Task Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GRS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |

| | | | |
|---|---|---|---|
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| GPCMNT | 1202 | 1251 | One-Time Comment |
| GPENTN | 1821 | 1830 | Entity Name |
| $USER | 1891 | 1891 | User Date Format |
| $UDATE | 1953 | 1958 | Current Date (user format) |

E. Available Selections

*Sequences:*

Class/Sub-Class/Resource/Warehouse
Resource/Schedule/OLSN/Release
Schedule/OLSN/Release/Resource

*Limits:*

List of Schedule Ranges
OLSN
Release #
Task
PM Name
PM Type
Resource Number
Resource Class
Resource Sub-Class
Priority Code
Reference Number
Task Status
Date Last Maintenance (Note: P is loaded into date 1 position in GPLDA.)
Schedule Start Date (Note: D is loaded into date 2 position in GPLDA.)
Schedule Due Date (Note: N is loaded into date 3 position in GPLDA.)

*Options:*

Batch, Interactive, Scheduler (B, I, S)
Default Printer (Y/N)
Number of Copies
One-Time Comments F. Field Headings

*Summary line:*

Schedule #
OLSN
Release #
PM Type
PM name
Reference #
Priority Code
Schedule Start Date
Schedule Due Date
Schedule Release Run Quantity

*Detail line:*

Task

Warehouse
Resource Number
Resource Class
Resource Sub-Class
Unit of Measure
Task Status
Date Required
Quantity issued
Date last maintenance
Quantity required (quantity allocated)
Quantity remaining required = Quantity required - Quantity issued

*Total line:*

Total Quantity Remaining Required
Total Quantity On Hand

MIR340

Allocation/Reservation Report

A. This report shows schedules and their associated resource allocations and reservations. Allocations are always printed on the report. However, the user has the option of having reservations printed. If reservations are being printed, the allocation line prints first followed by each reservation detail line. If the reservations do not add up to the allocated quantity, a warning message is printed.

The input file is a logical view of the RMRESR file, based on the report sequence. After an input record is read, if the resource type is equal to a C (consumed) and its report limits are met, the program CHAINs to the RMODEL file to get the release start date, release due date, and schedule release status. If the schedule release status is within the report limits, the allocation detail line prints.

If the user selects to print reservations (Print Detail = Y), lower limits are set to RESRES using schedule, OLSN, release number, task, resource, and warehouse from the allocation record. The schedule, OLSN, release number, task, resource, and warehouse must match the RMRESR record.

Each reservation that corresponds to this allocation record is read. If it has not been completely issued, it is printed. For each reservation read, the program CHAINs to the LOCDTL file to retrieve the potency, grade, and revision level for that resource.

If no RESRES record was read, a message is printed. This message is always printed for non-balance records, since they never have reservations against them. Also, stream resources are not printed on the report.

The quantity reserved for the resource is totalled. If the total reserved quantity is not equal to the allocated quantity, a warning message is printed. After all reservations for this schedule are printed, the next RMRESR input record is read.

B.

| File | Usage |
|---|---|
| LOCDTL | IF |
| MIR340W | IF |
| RESRES | IF |
| RMODEL | IF |
| TALFLI | IF |
| TALFLZ | IF |
| QSYSPRT | O |

C.

| File Name | Field Name | Description |
|---|---|---|
| TALFLI | TARESC | Resource Variable Heading |
| | TASCHD | Schedule Variable Heading |
| | TAGRAD | Grade Variable Heading |
| | TAPMNM | PM Name Variable Heading |
| TALFLZ | TANDEC | User-Defined # of Decimals |

D.

| Field Name | Position From | To | Description |
|---|---|---|---|
| GPSQUS | 154 | 156 | Sequence Number |
| GPSQDS | 157 | 216 | Sequence Description |
| GPD1LO | 659 | 665 | Date Required Lower Limit |
| GPD1HI | 666 | 672 | Date Required Upper Limit |
| GPOLLO | 581 | 583 | OLSN Lower Limit |
| GPOLHI | 584 | 586 | OLSN Upper Limit |
| GPRLLO | 715 | 717 | Release # Lower Limit |
| GPRLHI | 718 | 720 | Release # Upper Limit |
| GRRSLO | 729 | 743 | Resource Lower Limit |
| GPRSHI | 744 | 758 | Resource Upper Limit |
| GPRCLO | 759 | 760 | Class Lower Limit |
| GPRCHI | 761 | 762 | Class Upper Limit |
| GPSBLO | 763 | 764 | Sub-Class Lower Limit |
| GPSBHI | 765 | 766 | Sub-Class Upper Limit |
| GPSTLO | 799 | 805 | Schedule/Rel # Status Lower Limit |
| GPSTHI | 806 | 812 | Schedule/Rel # Status Upper Limit |
| GPWHLO | 967 | 967 | Warehouse Lower Limit |
| GPWHHI | 968 | 968 | Warehouse Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GPS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| GPCMNT | 1202 | 1251 | One-Time comment |
| GPPDTL | 1255 | 1255 | Print Reservations (Y/N) |
| GPENTN | 1821 | 1830 | Entity Name |

| | | |
|---|---|---|
| $USER | 1891 1891 | User Date Format |
| $UDATE | 1953 1958 | Current Date (user format) |

E. Available Selections

*Sequences:*

Resource/Warehouse
Class/Sub-Class/Resource/Warehouse
Resource/Schedule/OLSN/Release
Schedule/OLSN/Release/Resource
Warehouse/Resource

*Limits:*

Resource Number
Warehouse
List of Schedule Ranges (up to 8)
OLSN
Release Number
Resource Class
Resource Sub-Class
Date Required—applies to allocations only (Note: C is loaded into date 1 position in GPLDA.)
Schedule/Release Status

*Options:*

Batch, Interactive, or Scheduler (B, I, S)
Default Printer (Y/N)
Number of Copies
One-Time Comments
Print Detail (Y/N)

F. Field Headings

*Allocation Detail line:*

Resource Number
Resource Description
Warehouse
Resource Class
Resource Sub-Class
Schedule Number
OLSN
Release Number
Schedule Release Status
Date Required
PM Type
PM Name
Task
Quantity Allocated
Quantity Reserved
Quantity Issued
Unit of Measure
Release Start Date
Release Due Date
Lowest Acceptable Grade
Highest Level Acceptable Grade

*Reservation Detail line:*

Location
Quantity Reserved at this location
Quantity Issued at this location
Potency
Grade
Revision Level

MIR360

Pick List Report

A. This report prints the resource reservations for one or more schedules. Reservations can only be created for Direct Issue or Theoretically Consumed resources that are also balance resources, so only those resources print on the Pick List.

This program can be called from the following programs:

MIR360XJ—Original Pick List Job Queue Procedure
MIR362XJ—Reprint Pick List Job Queue Procedure A parameter MENUOP is passed to this program. If an O is passed, an Original Pick List is printed. If an R is passed, a Reprint Pick List is printed.

If MIR360XJ is called by MIR360X, an Original Pick List is printed. If MIR360XJ is called by MIR362X, a Reprint Pick List is printed. If MIR362XJ is called by MIU180XJ (the Reservation Delete/Recreate CL program), MIR362XJ prints an Original Pick List.

The Original Pick List only prints those resources not printed before on a pick list. The Reprint Pick List only prints those resources that have previously been printed on a pick list.

The program MIR360 creates a logical view over the RESRES file based on the sequence selected. This report must be done with user-controlled file OPENs and READs. This is done because certain sequences print a summary line followed by a detail line, and other sequences print a double detail line with no summary line. Therefore, the program must know the sequence of the input file.

A tailoring question determines whether pick list quantities are printed in the standard UM for that resource or in the last received UM for that resource at that location. The related field is TAPLQY.

If the quantities are printed based on the location UM, as each RESRES record is read, a CHAIN is done to the LOCDTL record to find the last received UM for the location. After the last received UM for the location has been found, all the quantities for this reservation record are converted to that UM before printing.

If the quantities are successfully converted, the last received UM is moved to the UM field in the detail line. All quantities are printed in the last received UM. If the quantities are not converted, the standard UM is moved to the UM field in the detail line. All quantities are printed in the standard UM.

Lower limits are set to the appropriate file, based on the sequence selected. After reading a record from the input file, the program CHAINs to the RMODEL, RMRESR, and RMTASK for the necessary fields. The report limits are checked. If the record passes the limits, a CHAIN is done to the LOCDTL record for the lot #, grade, quantity received, standard UM, and last received UM.

The Quantity Available calculation is shown below. All the information used in this calculation comes from the LOCDTL file.

*Quantity Available* = (Quantity at location - (Quantity Reserved Sales + Quantity Reserved Manufacturing))

The Quantity Remaining Reserved is calculated as follows. All the information used in this calculation comes from the RESRES file.

*Quantity Remaining Reserved* = (Quantity Reserved − Quantity Issued)

If the Quantity Available or the Quantity Remaining Reserved is less than zero, the field prints as zero. It does not print negative numbers.

Additionally before printing the detail line, the program checks for the Theoretical Consumption Code. If the resource is a Theoretically Consumed Resource, an asterisk (*) is printed on the report next to the resource.

If the (Quantity Allocated − (Quantity Reserved − Quantity Reduced from Reserved) − Quantity Issued) is greater than zero, not enough of the resource is available to meet the amount needed as indicated by the pick list, the message "SHORT" prints on the report.

If the report is in sequence 059, 058, or 067, the schedule information is printed on a summary line. A CHAIN to the RMODEL file is only done when the input record has a new schedule/OLSN/release number combination.

If the report is in sequence 010, 011, 024, 025, 054, or 103, no summary line is printed. Instead, a double detail line is printed. A CHAIN to RMODEL is done for each input record. The summary line described below prints as detail line #2.

If the Schedule Ranges 3 and 4, Schedule Ranges 5 and 6, or Schedule Ranges 7 and 8 are blank, their corresponding heading line is not printed.

The Number of Times Pick List Printed field in RMRESR is updated. This is done through the use of a work file (MIR360W). After each record is printed, a CHAIN is done to MIR360W to check if that record exists. If not, that record is added to the file. After processing all RESRES records, a CHAIN is done back to the RMRESR file. The Number of Times Pick List Printed field is incremented by one, and the RMRESR file is updated.

If the report is printed in Location sequence, the report page breaks on location number. Tailoring is checked to determine which position of the location to use for the page break (TALNPB). This applies to sequences 025 and 103.

Associated with the production model is a Documentation Location Code. This code directs the system to group resources for documentation purposes. This code can be used to sequence the pick list. The sequence can be documentation code/resource. There is a page break every time the Documentation Code changes. This applies to sequences 024 and 025.

If the report is printed in warehouse sequence, the report page breaks on warehouse. This applies only to sequence 103.

B.

| File | Usage |
|---|---|
| LOCDTL | IF |
| MIR360W | UF |
| RESRESRW | IF |
| RESRESWL | IF |
| RESRES02 | IF |
| RESRES03 | IF |
| RESRES04 | IF |
| RESRES05 | IF |
| RESRES06 | IF |

| | |
|---|---|
| RESRES07 | IF |
| RESRES09 | IF |
| RMODEL | IF |
| RMRESR | UF |
| RMTASK | IF |
| TALFLI | IF |
| TALFLZ | IF |
| UMCONV | IF |
| QSYSPRT | O |

C.

| File Name | Field Name | Description |
|---|---|---|
| TALFLI | TARESC | Resource Variable Heading |
| | TASCHD | Schedule Variable Heading |
| | TAPMNM | PM Name Variable Heading |
| | TAGRAD | Grade Variable Heading |
| | TALNPB | Page Break Location Position |
| | TAPLQY | Pick List Quantity UM |
| TALFLZ | TANDEC | User-Defined # of Decimals |

D.

| Field Name | Position From | To | Description |
|---|---|---|---|
| GPSQUS | 154 | 156 | Sequence Number |
| GPSQDS | 157 | 216 | Sequence Description |
| GPD1LO | 421 | 426 | Release Start Date Lower Limit |
| GPD1HI | 427 | 432 | Release Start Date Upper Limit |
| GPD2LO | 433 | 438 | Task Start Date Lower Limit |
| GPD2HI | 439 | 444 | Task Start Date Upper Limit |
| GPD3LO | 445 | 450 | Date Required Lower Limit |
| GPD3HI | 451 | 456 | Date Required Upper Limit |
| GPDCLO | 457 | 461 | Documentation Code Lower Limit |
| GPDCHI | 462 | 466 | Documentation Code Upper Limit |
| GRLCLO | 527 | 536 | Location # Lower Limit |
| GPLCHI | 537 | 546 | Location # Upper Limit |
| GPOLLO | 581 | 583 | OLSN Lower Limit |
| GPOLHI | 584 | 586 | OLSN Upper Limit |
| GPNMLO | 625 | 639 | PM Name Lower Limit |
| GPNMHI | 640 | 654 | PM Name Upper Limit |
| GPTPLO | 655 | 656 | PM Type Lower Limit |
| GPTPHI | 657 | 658 | PM Type Upper Limit |
| GPPRLO | 673 | 673 | Priority Code Lower Limit |
| GPPRHI | 674 | 674 | Priority Code Upper Limit |
| GPRFLO | 675 | 694 | Reference # Lower Limit |
| GPRFHI | 695 | 714 | Reference # Upper Limit |
| GPRLLO | 715 | 717 | Release # Lower Limit |
| GPRLHI | 718 | 720 | Release # Upper Limit |
| GRRSLO | 729 | 743 | Resource Lower Limit |
| GPRSHI | 744 | 758 | Resource Upper Limit |
| GPRCLO | 759 | 760 | Class Lower Limit |
| GPRCHI | 761 | 762 | Class Upper Limit |
| GPSBLO | 763 | 764 | Sub-Class Lower Limit |
| GPSBHI | 765 | 766 | Sub-Class Upper Limit |
| GPTKLO | 839 | 848 | Task Lower Limit |
| GPTKHI | 849 | 858 | Task Upper Limit |
| GPWHLO | 967 | 967 | Warehouse Upper Limit |
| GPWHHI | 968 | 968 | Warehouse Upper Limit |
| GPS1LO | 993 | 999 | Schedule Range 1 Lower Limit |
| GPS1HI | 1000 | 1006 | Schedule Range 1 Upper Limit |

| | | | |
|---|---|---|---|
| GPS2LO | 1007 | 1013 | Schedule Range 2 Lower Limit |
| GPS2HI | 1014 | 1020 | Schedule Range 2 Upper Limit |
| GRS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| GPCMNT | 1202 | 1251 | One-Time comment |
| GPRSPR | 1352 | 1352 | Resource Print Code |
| GPENTN | 1821 | 1830 | Entity Name |
| $USER | 1891 | 1891 | User Date Format |
| $UDATE | 1953 | 1958 | Current Date (user format) |

E. Available Selections

*Sequences:*

Class/Sub-Class/Resource/Warehouse/Locn (010)
Class/Sub-Class/Warehouse/Locn/Resource (011)
Doc Code/Class/Sub-Class/Resource (024)
Doc Code/Location/Resource (025)
Resource/Warehouse/Location (054)
Schedule/OLSN/Release/Doc Code/Theoretical Cons Code/Resource (059)
Schedule/OLSN/Release/Resource (058)
Schedule/OLSN/Release/Theoretical Cons Code/Res (067)
Warehouse/Location/Resource (103)

*Limits:*

List of Schedule Ranges
OLSN
Release Number
Release Start Date (Note: D is loaded into date 1 position in GPLDA.)
Task Name
Task Start Date (Note: K is loaded into date 2 position in GPLDA.)
PM Type
PM Name
Resource Number
Warehouse
Documentation Code
Class Sub-Class
Date Required (Note: C is loaded into date 3 position in GPLDA.)
Location
Priority Code
Reference Number

*Options:*

Batch, Interactive, or Scheduler (B, I, S)
Default Printer (Y/N)
Number of Copies
One-Time Comments
Resource Print Code: D—Direct issue resources; C—Calculated cost resources; T—Theoretically consumed resources: A—Print all resources F. Field Headings

*Summary line or Detail line #1:*

Schedule Number
OLSN
Release Number
PM Name
PM Type
Reference Number
Release Start Date
Release Due Date
Run Quantity
Unit of Measure
Status
Priority Code

*Detail line #2:*

Resource Number
Resource Description
Task
Task Start Date
Warehouse
Location
Lot Number
UM
Quantity Allocated
Quantity Reserved
Quantity Issued
Quantity Remaining Reserved (calculated)
Quantity Available (calculated)
Grade
Resource Class
Resource Sub-Class
Documentation Code
Date Required
Number of times pick list has printed
Quantity Picked
Handler
* FLAG for Theoretically Consumed Resources
*SHORT* for shortage of a particular resource needed to complete the requirement listed on the Pick List.

MIR540

Schedule Shortage Report

A. This report shows all shortages and the locations that can be used to fill them. The input file is a logical view of RMRESR based on the selected sequence.

To process this report, a record is read from the input file and edited against the report limits. If the record passes the limits, a resource summary line is printed. If the record does not pass the limits, the next record from the input file is read.

For the record to pass the limits, it must be from a task that is Launched or Running. It must be a balance resource, so that reservations could be made against it. Quantity allocated must be greater than quantity reserved, quantity reduced, and issued quantity. This means the record has a shortage.

After a valid record is read from the input file, the LOCDTL file is read, using the lower limit on the resource number. Every record for that resource number is read.

The quantity available at the location is calculated (Quantity at the Location minus Quantity Reserved at the Location) for the standard and last received unit of measures. Only locations with an available quantity greater than zero are printed. If the quantity available is greater than zero, the shelf life expiration date is checked.

If the resource has expired, the print expired resource/location option is checked to determine if expired locations are to be printed on the report. The grade at the location does not have to be valid for this schedule. All locations are printed regardless of the grade.

The formula to calculate the Quantity Shortage is:

Quantity Shortage = Quantity Allocated − (Quantity Reserved − Reduced from Reserved) − Issued Quantity

B.

| File | Usage |
|---|---|
| LOCDTLRW | IF |
| MIR540W | IF |
| RESMST | IF |
| RMTASK | IF |
| UMCONV | IF |
| TALFLI | IF |
| TALFLZ | IF |
| QSYSPRT | O |

C.

| File Name | Field Name | Description |
|---|---|---|
| TALFLI | TAPMNM | PM Name Variable Heading |
| | TARESC | Resource Variable Heading |
| | TASCHD | Schedule Variable Heading |
| | TAGRAD | Grade Variable Heading |
| TALFLZ | TANDEC | User-Defined # of Decimals |

D.

| Field Name | Position From | To | Description |
|---|---|---|---|
| GPSQUS | 154 | 156 | Sequence Number |
| GPSQDS | 157 | 216 | Sequence Description |
| GPLCLO | 527 | 536 | Location Lower Limit |
| GPLCHI | 537 | 546 | Location Upper Limit |
| GPOLLO | 581 | 583 | OLSN Lower Limit |
| GPOLHI | 584 | 586 | OLSN Upper Limit |
| GPNMLO | 625 | 639 | PM Name Lower Limit |
| GPNMHI | 640 | 654 | PM Name Upper Limit |
| GPTPLO | 655 | 656 | PM Type Lower Limit |
| GPTPHI | 657 | 658 | PM Type Upper Limit |
| GPRLLO | 715 | 717 | Release # Lower Limit |
| GPRLHI | 718 | 720 | Release # Upper Limit |
| GRRSLO | 729 | 743 | Resource Lower Limit |
| GPRSHI | 744 | 758 | Resource Upper Limit |
| GPRCLO | 759 | 760 | Class Lower Limit |
| GPRCHI | 761 | 762 | Class Upper Limit |
| GPSBLO | 763 | 764 | Sub-Class Lower Limit |
| GPSBHI | 765 | 766 | Sub-Class Upper Limit |
| GPWHLO | 967 | 967 | Warehouse Lower Limit |
| GPWHHI | 968 | 968 | Warehouse Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GPS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| GPCMNT | 1202 | 1251 | Comment |
| GPPEXP | 1338 | 1338 | Print Expired Loc. (Y/N) |
| GPENTN | 1821 | 1830 | Entity Name |
| $USER | 1891 | 1891 | User Date Format |
| $UDATE | 1953 | 1958 | Current Date (User Format) |

E. Available Selections

*Sequences:*

Sched/OLSN/Rel/Task/Resource Type/Resource
Resource/Warehouse/Date Req/Sched/OLSN/Release
Resource/Schedule/OLSN/Release
Schedule/OLSN/Release/Resource

*Limits:*

Resource Number
Warehouse
Location
Resource Class
Resource Sub-Class
List of Schedule Ranges
OLSN
PM Type
PM Name
Release Number

*Options:*

Batch, Interactive, or Scheduler Job (B, I, S)
Default Printer (Y/N)
Number of Copies
One-Time Comments
Print Expired Resource/Locations (Y/N)

F. Field Headings

*Summary line (prints the Resource Shortage Record):*

Resource Number
Resource Class
Resource Sub-Class
Schedule Number
OLSN
Release Number
PM Type
PM Name
Task
Date Required
Quantity Required (Quantity Allocated)
Quantity Shortage (calculated)
Standard UM
Grade Lower Limit
Grade Upper Limit

*Detail line (prints possible locations to fill the shortage):*

Warehouse
Location
Quantity Available at the Location in Std UM (calculated)
Standard UM
Quantity Available in Last Received UM (calculated)
Last Received UM
Location Classification Code
Revision Level
Lot Number
FIFO Date
ETD Date
Grade
Expiration Date

*Totals:*

Total Number of Shortages Printed

☞ MIU180

Delete Reservations/Build Workfiles

A. This program is split into two parts. The first part of this program deletes the reservations. This part of the program is not executed if the Schedule Launch menu option is selected or if the program is being called as an option from Schedule Open or the Allocations Adjustment program. It is only executed if the Reservation Batch Update menu option is selected.

MIU182X is the CL program called by the Reservation Batch Update menu option. This CL program calls the CL program MIU180XJ with a parameter which has a value of MIU182. This parameter indicates to MIU180XJ to check the GPLDA position for the delete option to determine if reservations are to be created. If the user selected to create reservations, then the CL program MIU180XJ creates the workfiles required for creating reservations and sets on U-switch U1 to condition the opening of these workfiles. If reservations are not going to be created, then MIU180XJ does not create the workfiles and does not execute RPG program MIU182 (Create Reservations).

Part 2 of the program is not executed if the program was called to simply delete reservations and not recreate them. The only way this part of the program can be called to simply delete reservations is by selecting the Reservation Batch Update menu option, and then selecting the delete option D to only delete reservations. The calling CL program MIU180XJ sets on U2 if reservations are going to be created. If U2 is off, the build workfiles section of this program is not executed.

Part 1—Delete Reservations Processing

Lower limits are set to the RMODEL file. A record is read from the file. If the record passes the report limits, lower limits are set to the RMTASK file using Schedule/OLSN/Rel, and a READE is performed. After reading an RMTASK record, lower limits are set to the RMRESR file using Schedule/OLSN/Rel/Task and a READE is performed. After reading the RMRESR record, lower limits are set to the reservation file, RESRES, using the Schedule/OLSN/Rel/Task/Resource. Using the READE operation, each of the reservation records for this resource is read.

After the RESRES record has been read, the delete option is checked. If the operator chose to delete only the system-generated reservations and the RESRES record origin byte is U for user, the record is not processed. The program reads the next record.

If the user selected to delete only the user-entered reservations and the RESRES record origin byte is S for system-generated, the record is not processed. The program reads the next record.

If the user selected to delete both system and user-entered reservations, then there is no need to check the origin byte, and the RESRES record is processed. The program continues to read RESRES records for this resource until a record is read that passes this edit or until the READE fails. Once a RESRES record is read that should be deleted, the program continues with steps 1 and 2 below.

1. The Reserved Quantity—Manufacturing field in the LOCDTL file is updated by the lesser of:
   a. RESRES (Quantity Reserved - Quantity Issued) if greater than zero.
   b. LOCDTL (Quantity Reserved) if greater than zero.

Note: The LOCDTL record is never negative.
2. The RESRES record is deleted.

The program continues with steps 1 and 2 for each RESRES record for the Schedule/OLSN/Rel/Task/Resource i.e., a reservation type that was selected for deletion. When all the RESRES records for this Schedule/OLSN/Rel/Task have been processed, the RMRESR file and the RESBAL file are updated (steps 3–6).

3. The Reserved Quantity field is updated by the lesser of:
   a. RMRESR (Quantity Reserved - Reduced from Reserved) if greater than zero.
   b. RESBAL (Quantity Reserved) if greater than zero.

Note: The RESBAL record is never negative.
4. The RMRESR quantities are set to zero. (Both the Quantity Reserved and the Quantity reduced from Reserved are set to zero.)
5. If both the user and system-generated reservations are being deleted, then the deletion process for this Schedule/OLSN/Rel/Task/Resource is done. If the delete option is U (delete only user reservations) or S (delete only system reservations), then the processing must continue.

At this point, all reservations that should be deleted have been deleted, and the RMRESR and RESBAL files have been reduced by the full amount reserved in RMRESR. But if the user did not select to delete both user and system-generated reservations, it is possible that there are some reservations which were not deleted. If so, then it is necessary to update the RESBAL and RMRESR records so that the Quantity Reserved in these files equals the total of all remaining reservations.

6. To update the RESBAL and RMRESR files:
   a. Lower Limits are set to the RESRES file using the Sched/OLSN/Rel/Task/Resource.
   b. A READE is done using the Sched/OLSN/Rel/Task/Resource.
   c. The Quantity Issued is subtracted from the Quantity Reserved.
   d. If the resulting quantity of step 6c is greater than zero, this quantity is added to a tallying program field.
   e. Steps b, c, and d are repeated until the READE operation fails.

f. When the READE on RESRES fails, a CHAIN is done to RMRESR and the tallying field from step d is added to the Quantity Reserved field in RMRESR.

Next, a CHAIN is done to RESBAL and the same tallying field from step d is added to the Quantity Reserved—Manufacturing field in RESBAL.

When the task changes, the RMTASK file is updated (see below), and the next RMTASK record is read and processed the same as above.

7. The program checks for any reservations for the task by CHAINING to RESRES using the Sched/OLSN/Rel/Task. If the CHAIN fails, the Reservations Have Been Created field in RMTASK is set to N and the task status is set back to Open.

After all reservations for a Sched/OLSN/Rel have been processed, the program checks for any more reservations for the schedule by CHAINing to RESRES using the Sched/OLSN/Rel. If the CHAIN fails, the schedule status is set back to Open. The status is only reset to O (open) if the status was previously L (launched).

If the program is called to delete reservations and then recreate the reservations, lower limits are set again to the beginning of the RMODEL file and processing continues to create the reservations. If the program is called to just delete the reservations, the program ends.

Part 2—Workfiles

Part 2 of this program builds three workfiles. The purpose of each workfile is listed below.

- *RESLST*

This file keeps a list of all the resources that are going to have reservations created.

*Key*: Resource#/PM Type/PM Name/Warehouse

*Fields:*

Resource #
  PM Type
  PM Name
  Warehouse

- *SCHLST*

This file keeps a list of all the Schedule/OLSN/Release/Tasks that are going to have reservations created. A logical view is built over this workfile based on the user-selected priority for creating reservations (by schedule start date or priority code). This logical view is an input primary file for the Create Reservations program (MIU182).

*Key*: The file is sequential. No key fields.

*Fields:*

Schedule #
  OLSN #
  Rel

Priority Code
Schedule Start Date
Task

- *LOCLST*

This file simulates the logical file that is created over LOCDTL. It contains one record for each location detail record for a resource that is going to have reservations created.

*Key:* The file is keyed by Resource/PM Type/PM Name/Warehouse/Keyfld

*Fields:*

Resource #
PM Type
PM Name
Warehouse
Relative Record Number (RRNO)
Keyfld—The Keyfld is in positions 34-73 of the file. It consists of the following fields:
  Picking Override Seq #
  FIFO Date
  Revision Level
  Quantity Available at the Location Four tailoring questions determine how reservations are created. These four questions are:

1. R3—Should the picking template be used (Y/N)?
2. R1—What is the picking method (A/B/C)?
   A = FIFO
   B = Revision level/FIFO
   C = Lowest quantity that meets requirements
3. R7—Should the picking override sequence # field be used (Y/N)?
4. R6—If the picking method is lowest quantity that meets the requirement and there is no location with a quantity large enough to meet the requirement, should reservations be made starting with the locations with the (S) smallest quantity or the (L) largest quantity available?

This program creates a logical view of the Location Detail File (RESLST) and uses that file to search for the location to use when creating the reservations.

The CL program creates a logical file over SCHLST. This logical file is used as the input primary file. The file created depends on which sequence was selected:

Priority Code Sequence = Priority Code/Schedule/OLSN/Rel/Task

Start Date Sequence = Start Date/Schedule/OLSN/Rel/Task

To avoid having six possible logical files and to reduce the run time required for this job, the workfile LOCLST (Location List) is created and used to simulate one of the above logical files of LOCDTL. The logical files simulated are based on the answers to two tailoring questions, #2 and #3 above.

1. Override Seq # (Y)/FIFO date (A)
2. Override Seq # (Y)/Revision Level/FIFO Date (B)

3. Override Seq # (Y)/Lowest Quantity (C)
4. Override Seq # (N)/FIFO Date (A)
5. Override Seq # (N)/Revision Level/FIFO Date (B)
6. Override Seq # (N)/Lowest Quantity (C)

The RRNO (relative record number) field is the relative record number of the corresponding location detail record.

KEYFLD is made up of the following fields: Picking Override Sequence #, FIFO Date, Revision Level, and Quantity Available at the Location. The order in which these fields are loaded into this KEYFLD depends on the way in which the reservations are going to be created (Picking Method and use of Picking Override Sequence #).

The following list shows how the KEYFLD is loaded based on which logical file is being simulated. Two tailoring questions (see questions #2 and #3 above) determine which logical file to simulate.

Loading of the KEYFLD

| Logical File # | KEYFLD Starting Position | KEYFLD Ending Position | Value |
|---|---|---|---|
| 1 | 1 | 1 | Picking Override Seq # |
| | 2 | 7 | FIFO Date |
| | 8 | 40 | Blanks |
| 2 | 1 | 1 | Picking Override Seq # |
| | 2 | 3 | Revision Level |
| | 4 | 9 | FIFO Date |
| | 10 | 40 | Blanks |
| 3 | 1 | 1 | Picking Override Seq # |
| | 2 | 16 | Qty Available |
| | 17 | 40 | Blanks |
| 4 | 1 | 6 | FIFO Date |
| | 7 | 40 | Blanks |
| 5 | 1 | 2 | Revision Level |
| | 3 | 8 | FIFO Date |
| | 9 | 40 | Blanks |
| 6 | 1 | 15 | Qty Available |
| | 16 | 40 | Blanks |

- *Building The Work Files:*

Lower limits are set to RMODEL using the lower Schedule/OLSN limits, then read. After a successful read, the program verifies that the schedule status is not Complete or Closed. If it is not Complete or Closed, then the program checks that the Schedule and Release # are within the user-selected limits. If the RMODEL record passes the limits then all tasks are retrieved for this schedule.

Lower limits are set to RMTASK using the Schedule/OLSN/Rel from RMODEL and a READE. For each task for the Schedule/OLSN/Rel, the program makes sure the task status is not Closed or Complete, and the task is within the task limits. If the RMTASK record passes the limits, then a record is added to the SCHLST workfile. This work file contains the following fields:

Schedule
OLSN
Release
Task
Release Start Date
Priority Code

Later, a logical file is created over this file in a user-selected sequence (the physical file is sequential - no key). After a valid RMODEL record has been read, all the consumed balance resources for the schedule are read. To do this, lower limits are set to RMRESR using the Schedule/OLSN/Rel/Task/Resource Type from the RMTASK record, then READE. After each RMRESR record is read, the program verifies that the resource is a balance type resource.

If all those edits are met, a CHAIN is done to the RESLST file using Resource/PM Type/PM Name/Warehouse. All these fields are from RMRESR. If the CHAIN is successful, the next RMRESR record is read. This is done because the record already exists in RESLST, and, therefore, all the possible locations for this Resource/PM Type/PM Name/Warehouse have already been added to the LOCLST file. If the CHAIN is not successful, a record is written to the RESLST file.

The next step is to determine if a picking template exists for this PM Type/PM Name. To do this, a CHAIN is done to the PCKTMP file using the Warehouse, PM Type, and PM Name from the RMRESR file. If the CHAIN is not successful, PM Type and PM Name are omitted and a CHAIN is done to the PCKTMP file using only the Warehouse.

If a record existed in the Picking Template file with the PM Type and PM Name, when records are written to the LOCLST file for this Schedule/OLSN, the PM Type and PM Name fields are loaded into the LOCLST file. If the PCKTMP file does not contain a record for the PM Type and PM Name, when records are written to the LOCLST file for this Schedule/OLSN, the PM Type and PM Name fields in LOCLST are loaded with blanks.

If reservations are to be created, after a new Resource/PM Type/PM Name combination has been read and added to the RESLST file, the LOCDTL file is read. Each LOCDTL record with that resource is added to the LOCLST file.

To add the LOCLST records, it is determined if the RMRESR record contains a preferred warehouse and location. If it does, a CHAIN is done to LOCDTL using the Warehouse/Location/Resource. If the CHAIN is successful, the RRNO (relative record number) of the LOCDTL record is found and a record is added to the LOCLST file.

Next, all other LOCDTL records for this resource are found that match the picking template locations. To do this, lower limits are set to LOCDTLRW (permanent logical view by Resource/Warehouse/Location) using the Resource and Warehouse, and then a READE is performed. As each Location Detail record is read, the Location of the record is compared with the locations defined in the template. If the location matches the template, the following edits are performed:

a. The shelf life has not expired.
b. The location has a Quantity Available greater than zero.
c. The location classification code is On Hand.
d. The grade at the location is a valid grade for that production model.
e. The revision level is greater than or equal to the earliest acceptable revision level for the resource as defined in RESMST.

If all the above edits are met, the KEYFLD is built. See the above chart to determine how the KEYFLD is built. A record is written to the LOCLST file.

B.

| File | Usage |
|---|---|
| LOCDTL | UF |
| LOCDTLRW | IF |
| PCKTMP | IF |
| RESBAL | UF |
| RESLST | UF |
| RESMST | IF |
| RESRES | UF |
| RMODEL | UF |
| RMRESR | UF |
| RMTASK | UF |
| SCHLCH | IF |
| TALFLI | IF |
| TRHISTRW | UF |
| TRHIST34 | UF |
| LOCLST | O |
| QSYSPRT | O |
| QSYSPRT2 | O |
| SCHLST | O |

C.

| File Name | Field Name | Description |
|---|---|---|
| TALFLI | TAPMNM | PM Name Variable Heading |
| | TAPOSA | Should the picking override sequence be active? |
| | TAPTAC | Should the picking template be active? |
| | TASCHD | Schedule Variable Heading |

D.

| Field Name | Position From | To | Description |
|---|---|---|---|
| GPSQDS | 157 | 217 | Sequence Description |
| GPD1LO | 421 | 426 | Date 1 Lower Limit |
| GPD1HI | 427 | 432 | Date 1 Upper Limit Limit |
| GPD2LO | 433 | 438 | Date 2 Lower Limit |
| GPD2HI | 439 | 444 | Date 2 Upper Limit |
| GPD3LO | 433 | 438 | Date 3 Lower Limit |
| GPD3HI | 439 | 444 | Date 3 Upper Limit |

| | | | |
|---|---|---|---|
| GPOLLO | 581 | 583 | OLSN Lower Limit |
| GPOLHI | 584 | 586 | OLSN Upper Limit |
| GPNMLO | 625 | 639 | PM Name Lower Limit |
| GPNMHI | 640 | 654 | PM Name Upper Limit |
| GPTPLO | 655 | 656 | PM Type Lower Limit |
| GPTPHI | 657 | 658 | PM Type Upper Limit |
| GPPRLO | 673 | 673 | Priority Code Lower Limit |
| GPPRHI | 674 | 674 | Priority Code Upper Limit |
| GPRFLO | 675 | 694 | Reference # Lower Limit |
| GPRFHI | 695 | 714 | Reference # Upper Limit |
| GPRLLO | 715 | 717 | Release # Lower Limit |
| GPRLHI | 718 | 720 | Release # Upper Limit |
| GPTKLO | 839 | 848 | Task Lower Limit |
| GPTKHI | 849 | 858 | Task Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GPS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| FORMAT | 1180 | 1185 | LOCLST File Format |
| GPCMNT | 1202 | 1251 | One-Time Comments |
| GPRLNT | 1345 | 1345 | Release Next Unlaunched Release |
| GPRESV | 1346 | 1346 | Reservation Action Code |
| GPPKMO | 1347 | 1347 | Picking Method |
| GPRMSG | 1400 | 1439 | Reservation Action Code Message |
| GPPMSG | 1450 | 1489 | Picking Method Message |
| GPDMSG | 1500 | 1539 | Delete Option Message |
| GPPLSL | 1550 | 1550 | Print Pick List After Schedule Launch |
| $USRPF | 1811 | 1820 | User Profile |
| GPENTN | 1821 | 1830 | Entity Name |

| | | |
|---|---|---|
| $USER | 1891 1891 | Date Format Code |
| $UDATE | 1953 1958 | Today's Date in User Format |

E. Available Selections

See also the program descriptions for MIU180X and MIU182X. Depending on which calling program was used, your selections may vary.

*Limits:*

*Delete Reservations & Create Reservations Registers*

- OLSN
- PM Type
- PM Name
- Release #
- Task
- Priority Code
- Date of Last Maintenance
- Task Start Date
- Schedule Start Date
- Reference Number
- List of Schedule Ranges

*Options:*

*Both Registers*

- Batch, Interactive, or Scheduler
- Default Printer (Y/N)
- Number of Copies
- One-Time Comments
- Release Next Unlaunched Release

*Delete Reservations Register only*

- Picking Method
- Reservation Action Code
- Delete Option

F. Field Headings

*Delete Reservations Register*

*Summary line:*

- Schedule
- OLSN
- Release Number
- PM Type
- PM Name
- Priority Code
- Schedule Release Start Date
- Reference Number

*Detail line:*

- Task
- Task Sequence Number
- Description
- Expected Start Date
- Expected Completion Date

*Create Reservations Error Register*

*Detail line:*

- Schedule

OLSN
Release Number
PM Type
PM Name
Comment

Create Reservations Program

A. This program actually creates the reservations for the selected schedules. If the operator selected to only delete reservations, this program is not executed.

The input file is a logical file of SCHLST. The logical view of this file is created in the CL program based on the sequence selected. When the report prompter program is executed, the operator chooses one of two possible sequences. This sequence is used to determine the priority of the schedules when creating the reservations.

The program reads a record from the input primary file (SCHLST01 or SCHLST02, depending on the sequence chosen). A CHAIN to RMTASK is done using the Schedule/OLSN/Release/Task from the SCHLST record. If the CHAIN is successful, processing continues. All the resources consumed on this task are retrieved. Lower limits are set to RMRESR using the Schedule/OLSN/Release/Task from RMTASK, and a READE is performed.

After each RMRESR record is read, the program CHAINs to RESLST to see if the resource qualifies for having reservations made. If the CHAIN to RESLST is successful, the resource has passed all limits required for making reservations. Reservations are created for resources only if they are not calculated cost resources.

Next, the Quantity Allocated is compared with the Quantity Reserved. If they are equal, no reservations need to be made. The next RMRESR record is read. If they are not equal, the Quantity to Reserve is calculated using fields from RMRESR.

Quantity to Reserve =

Qty Allocated - (Reserved - Qty Reduced from Reserved) - Qty Issued

The program checks to see if the RMRESR record has a preferred warehouse/location. If it does, a CHAIN is done to the LOCDTL2 file (this is the LOCDTL file, accessed by key). If the Quantity Available at the location is greater than or equal to the amount needed to reserve, then the full amount needed is reserved, and the next RMRESR record is read. If the Quantity Available is less than what is needed to reserve, then as much as is available at the location is reserved, and the following reservation process continues.

The program determines if a general picking template is being used. This information is necessary for building a key for setting lower limits to the LOCLST file. If a general picking template is being used, then a blank PM Type/blank PM Name is used to set lower limits. If a specific picking template being used or if no template is being used, then the PM Type/PM Name in the key is used to set lower limits. To determine if a general picking template is being used, a CHAIN is done to LOCLST using the Resource/PM Type/PM name/Warehouse. If the CHAIN fails, a general template is used. This key is used to set lower limits to the LOCLST file.

A READE is performed on the LOCLST file. A CHAIN is done to LOCDTL using the RRNO (relative record number) from the LOCLST record. The reservation is made if appropriate. The grade at the location is edited to be sure it is within the valid grade range for this production model (RMRESR is checked).

If the reservation method is lowest quantity meeting the requirements, the Quantity Available at the location must be greater than or equal to the full Quantity to Reserve. If a reservation is made at that location, the following files must be updated:

- *LOCDTL*

Quantity Reserved is increased using the Quantity Reserved from the LOCLST location.
- *RESBAL*

Quantity Reserved is increased using the Quantity Reserved from this location.
- *RMRESR*

Quantity Reserved is increased using the Quantity Reserved from this location.
- *RESRES*

A record is written to this file.

LOCLST is updated if the picking method is lowest quantity that meets requirements. The KEYFLD in LOCLST is changed because the Quantity Available has now changed. To do this, the Quantity Reserved from this location is subtracted from the previous Available Quantity that was stored in the LOCLST file, and the LOCLST file is updated. If the new Quantity Available at that location is calculated to be zero, that LOCLST record is deleted.

If the reservation method is lowest quantity meeting the requirements and no location has a quantity large enough for the full reservation requirement, the reservation process for this RMRESR record must start again. The tailoring field is looked at to determine whether to begin reserving starting at locations with the smallest or the largest quantity. If reservations should begin at the smallest locations, then the program reads sequentially through the LOCLST file. However, if the reservations should begin at the largest locations, the READP operation is used to read backwards through the LOCLST file.

Once reservations have been made, the following records are updated:

- *RMTASK*

If the Task currently has a status of Open, then the Task status is updated to Launched.

The Reservations Have Already Been Created Byte is set to Y.
- *RMODEL*

If the Schedule/Rel currently has a status of Open, the Schedule/Rel status is set to Launched.

The Reservations Have Already Been Created byte is set to Y.

Four possible registers may print:

1. Create Reservations Shortage Register
2. Schedule Launch Shortage Register
3. Schedule Launch Reservation Register
4. Create Reservations Register

B.

| File | Usage |
|---|---|
| LOCDTL | UF |
| LOCDTL2 | UF |
| LOCLST | UF |
| MIU182W | IF |
| RESBAL | UF |
| RESLST | IF |
| RESMST | UF |
| RESRES | UF |
| RMODEL | UF |
| RMRESR | UF |
| RMTASK | UF |
| TALFLI | IF |
| TALFLZ | IF |
| QSYSPRT | O |
| QSYSPRT2 | O |

C.

| File Name | Field Name | Description |
|---|---|---|
| TALFLI | TALLQA | Largest or Smallest Quantity Available |
| | TAPLSL | When Schedules are launched, should the pick list print? |
| | TAPMNM | PM Name Variable Heading |
| | TAPOSA | Should the picking override sequence be active? |
| | TAPTAC | Should the picking template be active? |
| | TARESC | Resource Variable Heading |
| | TASCHD | Schedule Variable Heading |
| | TAUORS | User or System-generated Reservations |
| TALFLZ | TANDEC | User-Defined # of Decimals |

E. Available Selections

See also the program descriptions for MIU180X and MIU182X. Depending on which calling program was used, your selections may vary.

*Limits:*

*Create Reservations Shortage Register & Create Reservations Register*

OLSN
PM Type
PM Name
Release #
Task
Priority Code
Date of Last Maintenance
Task Start Date
Schedule Start Date
Reference Number
List of Schedule Ranges

*Schedule Launch Shortage Register & Schedule Launch Reservation Register*

The limits for these reports depend on the selections made in the Schedule Launch Selection program. For more information, see the description for the Schedule Launch Selection program.

*Options:*

*Create Reservations Shortage Register & Create Reservations Register*

Batch, Interactive, or Scheduler Job
Default Printer (Y/N)
Number of Copies
One-Time Comments
Release Next Unlaunched Release
Picking Method
Reservation Action Code
Delete Option

*Schedule Launch Shortage Register & Schedule Launch Reservation Register*

Batch, Interactive, or Scheduler Job
Default Printer (Y/N)
Number of Copies
One-Time Comments
Release Next Unlaunched Release

*Schedule Launch Reservation Register only*

Picking Method

F. Field Headings

*Create Reservations Shortage Register & Schedule Launch Shortage Register*

*Summary line:*

Schedule
OLSN
Release Number
PM Type
PM Name
Priority Code
Schedule Release Start Date
Reference Number
Detail Line
Task
Resource Number
Description
Standard Unit of Measure
Quantity Allocated
Quantity Reserved
Shortage Quantity

*Schedule Launch Reservation Register & Create Reservations Register*

*Summary line:*

Action
Schedule

OLSN
Release Number
PM Type
PM Name
Priority Code
Schedule Release Start Date
Reference Number

*Detail line:*

Task
Resource Number
Warehouse
Location
Quantity Reserved
Quantity Issued
Standard Unit of Measure

☞ MIU180X & MIU182X

Reservation Delete/Recreate Procedure

A. These programs can be called from four different menu options. These options are:

1. Schedule Launch (MIU180X)—This program launches schedules from the Schedule Launch file (SCHLCH) rather than using all the report prompter limits. The limits which are omitted in the report prompter are those that appear in the SCHLCH file.

This program also calls the Report Prompter program. In addition, it calls MIU180XJ with the parameter MIU180 to indicate that the Schedule Launch menu option was selected.

2. Reservation Batch Update (MIU182X)—This program calls MIU180XJ with the parameter MIU182 to indicate that the Reservation Batch Update option was selected. It also calls the Report Prompter program.

3. Schedule Open (MIU120X)—MIU180XJ is called from the Schedule Open CL program if the operator selected to also create reservations. It calls MIU180XJ with the parameter MIU120 to indicate that the Schedule Open option was selected.

4. Adjust Allocations (MIU160X)—MIU180XJ is called from the Adjust Allocations CL program if the operator selected to also create reservations. It calls MIU180XJ with the parameter MIU160 to indicate that the Adjust Allocations option was selected.

If this program is being called from the Schedule Launch menu option, the system-generated reservations are being created for the first time for this schedule release. The schedule and/or task status is set to Launched. If this program is being called to only delete reservations for a schedule and/or task, then the schedule and/or task status is reset to Open.

If the program is being called from the Reservation Batch Update menu option, the user has the option of deleting all the reservations for the selected schedules, deleting then recreating all reservations for the selected schedules, or creating the additional reserved quantities.

When this program is executed, the pick list is optionally printed (run time option with tailoring default). If the pick list is not printed at this time, the user can select a separate menu option to reprint the pick list. This reprint option executes very quickly since it only prints material reservations and does not have to go through the logic of creating the reservations.

Reports

Six reports can be printed by calling this function.

The *Delete Reservations Register* prints a list of all the reservations which were deleted. This register is only printed if called from the Reservation Batch Update menu option with a reservation option of D (delete reservations) or R (delete and recreate reservations).

The *Create Reservations Error Register* prints a list of tasks for a given schedule which can not have reservations made because the task start date is missing (equal to zero). This report is not printed if called from the Reservation Batch Update menu option with a reservation option of D (delete reservations).

The *Create Reservations Register* prints all the reservations which were made. Again, this report is not printed if the user selected to only delete reservations.

The *Create Reservations Shortage Register* prints all the resources which could not be fully reserved because there is a resource shortage. If the picking template is being used, then the shortage condition occurs when there is not enough of the resource in the locations on the picking template to complete the reservations. This report is also not printed if the user selected to only delete reservations.

The *Pick List* only prints at this time if the system is tailored to do so. The tailoring responses serve as a default, but the user is allowed to do a run time override.

The *Documentation Packet* of the Pick List program may also be printed. For more information, please see the program description for the pick list.

For more information on the Delete Reservations, Create Reservations Error, Create Reservations, and Create Reservations Shortage Registers, see the program descriptions for MIU180 and MIU182.

Shortages

There is no shortage location. If the reservation program is running and a shortage exists, then the material reservation is not made. There is a byte on the Resource Master file that is set on so that the shortage is easily identified. A line is printed on the Create Reservations Shortage Register notifying the user that reservations for that resource cannot made due to a resource shortage.

User-Entered Reservations

The user can enter specific material reservations before launching the schedule. If this is the case, the user-entered reservations override the picking method. Before creating reservations for a resource, the Reservation file is read to check for existing reservations for that Schedule/OLSN Release/Resource. If a record exists in the Reservation file for the entire amount, the system does not generate any reservation for that Schedule/OLSN/Release/ Resource. If a record exists but not for the entire quantity needed, the system generates a reservation for the difference, using the normal picking method. If no record exists in the file, the normal picking method is used.

Picking Template

There is a picking template for controlling the material reservations. The key to the template is by Warehouse/PM Type/PM Name. The user can also create a general template by entering a blank PM Type/PM Name. The data in the PCKTMP file is a series of 30 locations. The locations defined in the picking template can be location prefixes.

For example, this means that when the program is reading location detail records, the program cannot do a simple IFEQ operation. The program uses a data area consisting of ten one-position fields. The location number from the location detail record is moved into this data area, and the picking template location number is moved to a similar data area.

Then, each position of data area 1 is compared to the corresponding position of data area 2. As each position is compared, if the comparison is not equal, then the data area 2 is checked for blanks. If that position from data area 2 is equal to blanks, the location is a valid location. If that position from data area 2 is not equal to blanks, the location detail record did not match the template location number prefix; therefore, the location detail record is invalid.

When reservations are created and the picking template is being used, the program checks for a PCKTMP record for the PM type/PM name on the Schedule/OLSN/Release. If one exists, all the locations on that picking template are searched.

A tailoring question determines whether the picking template is active or not active. If the response is not active, the picking template file is ignored. There is a preferred location on the resource record on the PM that overrides all template and picking method sequences.

Picking Methods

The picking method defaults from tailoring with a run time override. This run time override is only allowed if the system is tailored that way.

Picking Methods:

1) FIFO
2) Revision level/FIFO
3) Lowest quantity that meets requirements

A Picking Override Sequence field on each location may be used to override any picking method. This special field is one position numeric in the range of one to nine and is loaded into the Location Detail file when a resource is received. The default value loaded into the LOCDTL record comes from tailoring. The Override Sequence field can be updated through Location Detail Maintenance.

For more information on the tailoring questions, see the questions under reservations in *Section C: Installation and Tailoring* of the RM reference manual.

Once the schedule has been launched and reservations have been created, the reservations have already been created byte (RMODEL) is set on. Note that reservations can only be created at the warehouse in which the allocations were made.

The operator has the option of simply deleting the reservations, deleting and recreating the reservations, or simply reserving only the remaining quantity. These options are only valid if the schedule has already been launched. When this program is being called from the Schedule Launch menu option, then the Remaining Quantity is reserved. The program reserves only the Remaining Quantity and not the Quantity Allocated because reservations may already exist.

Quantity Remaining =

Qty Allocated - (Qty Reserved - Qty Reduced From Rsvd) - Qty Issued

If the program tries to reserve the remaining quantity for that resource number at the same location where a reservation already exists for this Schedule/OLSN/Rel/Resource, the program must update the existing record rather than adding another record. When this occurs, if the existing reservation is a user-entered reservation, a tailoring question determines whether the record should be considered a system-generated reservation or a user-entered reservation. After tailoring has been checked, the appropriate value (U/S) is updated into the RESRES record.

The operator has the option of deleting only the system-generated reservations, only the user-entered reservations, or both. The default is S—delete only the system generated reservations. This option is only valid when this program is being called from the reservation maintenance batch menu option and not the Schedule Launch menu option.

E. Available Selections

*Sequences:*

Schedule Priority Code/Schedule Release Start Date
Schedule Release Start Date/Schedule Priority Code

*Limits:*

*MIU180X & MIU182X:*

Priority Code
Reference Number

*MIU182X only:*

List Of Schedule Ranges

Release #
Schedule Start Date (Note: D is loaded into date 1 position in GPLDA.)
Task Start Date (Note: K is loaded into date 2 position in GPLDA.)
Task
OLSN
PM Type
PM Name

*Options:*

*MIU180X and MIU182X:*

Batch, Interactive, Scheduler job
Default Printer (Y/N)
Number of Copies
Release the next unlaunched release for the schedule.
One-Time Comments
Picking Method Option (A/B/C)

*MIU182X only:*

Reservation Action Code—D = Delete reservations: R = delete and recreate reservations: C = create reservations for the additional quantity.

Delete Option—S = Delete system-generated reservations: U = delete user-generated reservations: B = delete both system-generated and user-generated reservations.

SECTION III-VIII

MIR480

Reservation Report

A. The purpose of this report is to print a reservation report in the sequence selected by the user. The input file is a logical view of the RESRES file. Each record in the input file is read and checked against the report limits. If the limits are passed, a CHAIN to RESMST is done to retrieve the standard UM. Another CHAIN to RMRESR is done to retrieve the required date.

The remaining quantity is calculated as the difference between the quantity reserved and the quantity issued. The record is only printed on the report if the quantity issued is less than the quantity reserved. If all of the checks are passed, a line is printed on the report.

B.

| File | Usage |
|---|---|
| MIR480W | IF |
| RESMST | IF |
| RMRESR | IF |
| TALFLI | IF |
| TALFLZ | IF |
| QSYSPRT | O |

C.

| File Name | Field Name | Description |
|---|---|---|
| TALFLI | TARESC | Resource Variable Heading |
| | TASCHD | Schedule Variable Heading |
| | TAPMNM | PM Name Variable Heading |
| TALFLZ | TANDEC | User-Defined # of Decimals |

D.

| Field Name | Position From | To | Description |
|---|---|---|---|
| GPSQUS | 154 | 156 | Sequence Number |
| GPSQDS | 157 | 216 | Sequence Description |
| GPLCLO | 527 | 536 | Location Lower Limit |
| GPLCHI | 537 | 546 | Location Upper Limit |
| GPOLLO | 581 | 583 | OLSN Lower Limit |
| GPOLHI | 584 | 586 | OLSN Upper Limit |
| GPRLLO | 715 | 717 | Release # Lower Limit |
| GPRLHI | 718 | 720 | Release # Upper Limit |
| GRRSLO | 729 | 743 | Resource Lower Limit |
| GPRSHI | 744 | 758 | Resource Upper Limit |
| GPRCLO | 759 | 760 | Class Lower Limit |
| GPRCHI | 761 | 762 | Class Upper Limit |
| GPSBLO | 763 | 764 | Sub-Class Lower Limit |
| GPSBHI | 765 | 766 | Sub-Class Upper Limit |
| GPWHLO | 967 | 967 | Warehouse Lower Limit |
| GPWHHI | 968 | 968 | Warehouse Upper Limit |
| GPS1LO | 993 | 999 | Schedule Range 1 Lower Limit |
| GPS1HI | 1000 | 1006 | Schedule Range 1 Upper Limit |
| GPS2LO | 1007 | 1013 | Schedule Range 2 Lower Limit |
| GPS2HI | 1014 | 1020 | Schedule Range 2 Upper Limit |
| GPS3LO | 1021 | 1027 | Schedule Range 3 Lower Limit |
| GPS3HI | 1028 | 1034 | Schedule Range 3 Upper Limit |
| GPS4LO | 1035 | 1041 | Schedule Range 4 Lower Limit |
| GPS4HI | 1042 | 1048 | Schedule Range 4 Upper Limit |
| GPS5LO | 1049 | 1055 | Schedule Range 5 Lower Limit |
| GPS5HI | 1056 | 1062 | Schedule Range 5 Upper Limit |
| GPS6LO | 1063 | 1069 | Schedule Range 6 Lower Limit |
| GPS6HI | 1070 | 1076 | Schedule Range 6 Upper Limit |
| GPS7LO | 1077 | 1083 | Schedule Range 7 Lower Limit |
| GPS7HI | 1084 | 1090 | Schedule Range 7 Upper Limit |
| GPS8LO | 1091 | 1097 | Schedule Range 8 Lower Limit |
| GPS8HI | 1098 | 1104 | Schedule Range 8 Upper Limit |
| GPCMNT | 1202 | 1251 | Comment |
| GPENTN | 1821 | 1830 | Entity Name |
| $USER | 1891 | 1891 | User Date Format |
| $UDATE | 1953 | 1958 | Current Date (User Format) |

E. Available Selections

*Sequences:*

Resource/Warehouse/Locn/Sched/OLSN/Rel
Warehouse/Location/Resource/Sched/OLSN/Rel
Class/Sub-Class/Resource/Warehouse/Locn
Schedule/OLSN/Release/Resource
Warehouse/Resource/Locn/Sched/OLSN/Rel

*Limits:*

Resource Number
Warehouse
OLSN
Release #
Resource Class
Resource Sub-Class
Location
List of Schedule Ranges

*Options:*

Batch, Interactive, or Scheduler Job (B, I, S)
Default Printer (Y/N)
Number of Copies
One-Time Comments F. Field Headings

*Detail line:*

Resource Number
Resource Description
Resource Class
Resource Sub-Class
Schedule Number
OLSN
Release Number
PM Type
PM Name
Task
UM
Quantity Reserved
Quantity Issued
Quantity Remaining = (Quantity Reserved - Quantity Issued)
Schedule/Release start date
Date Required
Warehouse
Location

SECTION III-IX

Potency

You may have resources of varying strengths, such as chemical solutions. In PRISM, you define a resource as a "potent resource" (one requiring a potency factor) by entering Y in the Potent Resource field on Data Screen MIE18004 in Resource Master Maintenance.

When receiving a resource to a location, you define the potency of the resource at that location. If it is a potent resource (if the Potent Resource field in Resource Master is Y), you must enter a potency factor greater than zero. If it is not a potent resource (if the Potent Resource field is N), the Potency Factor must be zero.

The entire quantity of a resource at a location can have only ONE potency. So, if you have two containers with different strengths of the same solution, you probably want to put them in different locations, even if that means placing them right next to each other and creating a new location for the *second* container.

You can have the potency information default. Resource Class Maintenance includes Potent Resource and Potency Factor fields. The Potent Resource field indicates whether the resources in that class are generally potent resources (resources with potency factors). If that field is Y, you can enter a Potency Factor, which is the default percentage for resources in that class.

These fields are also found in Resource Sub-Class Maintenance, and default to the values from the class to which the sub-class belongs. In Resource Master Maintenance, these fields default to the values from the Resource Sub-Class file. When you are receiving a potent resource to a new location, the Potency field defaults to the value from the Resource Master file for the resource being received.

From the potency factor, the system calculates the number of "potent units" of the resource. If you have 20 gallons of a 10 percent solution, there are two gallons of "potent units" of the resource. If you have 100 gallons of a 25 percent solution, there are 25 "potent gallons." When a potent resource is consumed by a task on a production model, you must express the quantity in potent units. When it is *produced*, however, when you enter a PR transaction, you must express it in *physical* units.

For each resource at a location, the system stores quantity information in two forms:

Quantity at Location—quantity in the standard unit of measure for the resource.

Quantity in Last Received UM—quantity at that location in the unit of measure used the last time that resource was received to that location.

You can see this information by printing a Location Detail Report (see Section 2-10) or using the Location Detail Inquiry (see Section 6-3).

The system distinguishes between "physical" units and "potent" units of a resource at a location. In some situations, such as receiving, it is easier to enter the physical quantity of the resource. At other times, you will want to know the quantity in potent units. To make this possible, the Quantity in Last Received UM is stored in physical units of the resource, and the Quantity at Location is in potent units.

Suppose you receive 20 gallons of a 10 percent solution to a location that does not already contain that resource. Its standard unit of measure is pounds, and one gallon of it weighs two pounds. The Quantity in Last Received UM is 20 gallons, and the Quantity at Location is four pounds. Why? Twenty gallons of a 10 percent solution is two potent gallons. Two gallons of this resource weigh four pounds.

Now suppose that the location already contains 40 gallons of a five percent solution of the same resource. What happens? When you first attempt to enter the transaction placing two quantities of different potencies in the same location, a message is displayed, warning you of this situation. If you override the warning and put the two together, the system assumes that the two quantities were combined in one vessel, so that you now have 60 gallons of a 6.7 percent solution.

WARNING! When using potent resources, be very careful of your locations. A Location Detail record can exist for a resource/warehouse/location combination, but have a quantity of zero of that resource.

When this happens for potent resources, the default potency at that location is STILL the potency of the resource from the last time the location had a quantity of it. If you enter a transaction receiving the potent resource to this existing (empty) location, and you allow the potency factor to default, you may end up with a different potency recorded at that location than you really intended. To avoid this, do one or more of the following:

(1) Run the Purge Empty Locations program (see Section 9-4) fairly often, to remove the empty locations for potent resources.

(2) Discourage operators from allowing potency factors to default.

(3) Make a habit of using the Verify field. This way, if an operator allows the potency to default, that default will be displayed before the transaction is added to the batch. The operator will notice the incorrect potency and enter the correct figure.

SECTION III-X

Fields for Entry

Default information for the following fields comes from a variety of places. If you are adding a new resource, however, and did not enter the resource number on the PM Maintenance Selection Screen, the Resource Maintenance Screen appears with no defaults in place. If you would like to see the defaults to help you define your new resource, enter only the resource number and type on the first Resource Maintenance Screen and press ENTER. PRISM will display an error message that tells you the Qty/Task Batch is required. Along with the error message, it will also display all default values for the resource.

PRISM updates most Resource Maintenance Screen defaults to your Production Model Resource File when you press ENTER, providing you left the fields blank. Not all defaults, however, are updated to this file. This is noted in the field description where appropriate. Only enter a value in the field when you do not want to use the default.

WARNING: PRISM only updates default values during an ADD. If you change the default and then decide later that you want to revert to the default value, do not just blank out the field and press ENTER. You must key in the original default value yourself.

- RESOURCE—If you are defining a resource on a new task, enter the resource number here. Leave this field blank if you are adding a stream resource to the task. If you entered a Resource on the PM or Standard Task Maintenance Selection Screen, it is displayed here.

TYPE—C if the resource is consumed by the task, P if produced. This field is for display only if you are maintaining a resource on a dependent PM.

Qty/Task Batch—Required entry for all standard tasks and for all regular tasks unless:

(1) you are defining the quantity as a ratio of another resource on this task; or (2) this is a produced resource, and the system calculates produced resource quantities for you.

If neither of these conditions applies, enter the quantity of this resource required to produce one standard task batch. You have the choice of defining this quantity in a user unit of measure or in the standard unit of measure for the resource. If this is a potent resource, you must define this quantity in potent units.

User UM—the unit of measure for the quantity per task batch. If you leave this field blank, PRISM assumes you defined the quantity in the resource's standard unit of measure.

Note: If you plan to make an operation dependent on this resource, PRISM must be able to convert the user unit of measure to hours for run, cleanup, and setup times. Unit of measure for hours is defined in Foundation tailoring question #9.

DESCRIPTION—This field defaults from Resource Master Maintenance.

STREAM RESOURCE—Enter Y if this is a stream resource. Leave the default as N if this is not a stream resource. Remember that (1) your first task may not consume a stream resource, (2) final tasks may not produce them (3) any task, except the first and last, may have only one consumed and one produced stream, and (4) if this PM has one task only, it may neither produce nor consume a stream.

If this field is Y, you must leave the Resource Number field blank. If you do not enter a description, PRISM displays the description "STREAM".

REPORTABLE RESOURCE (Y/N)—for produced resources only. Enter Y if this is a reportable resource. Enter N if you do not want to report produced quantities. If N, this is a theoretical production resource. PRISM calculates how much you have produced based on how much you have consumed. If N, the Production Distribution % field must be blank for non-reportable, non-stream produced resources.

NRV USAGE (Y/N)—Enter Y if this resource has net realizable value, N if it does not. If Y, the Cost Distribution % must be blank since you are assigning this resource a cost.

Suppose your company produces chicken parts. One resource produced from the final task is chicken feathers. Since these feathers are not an overly valuable resource, you do not assign them a cost or production distribution percentage. But you know you can sell them for $20 a bag to a local pillow manufacturer. Chicken feathers, then, have a net realizable value of $20 per bag. You can also use NRV to account for the cost of waste products you must pay to have taken away. In this case, the net realizable value would be negative.

SECTION III-XI

◦ *Potency Factors:*

When a transaction is entered for a potent resource, the operator enters the physical quantity not the potent unit quantity. The Transaction Entry program converts the physical quantity of the transaction to the standard UM, then applies the potency to the physical quantity in standard UM. All file quantities are stored in standard UM and updated using the potent unit quantity with the exception of the quantity in last received UM in LOCDTL. The Quantity in last received UM in LOCDTL is updated using the physical quantity in the receiving UM.

For example:

Resource A has a standard UM of pounds (lbs).

UM CONVERSION 10 gallon—.5 lbs
50 gallons—2 lbs
100 gallons—5 lbs
200 gallons—15 lbs
300 gallons—30 lbs To convert Resource Qty UM to Location Potency:

Receipt Transaction #1 = 100 gal of Res A to Loc1 with potency factor of 10 %.

Potent Units = Transaction Quantity x Transaction Potency Factor

Quantity in the Standard UM for 100 gls is 5 lbs. (See UM conversion table above.)

Now the potency is applied:

The potent unit quantity is equal to 0.5 (5 X .1).

During conversion of user unit of measure to standard unit of measure, the Physical Quantity is used, not the Potent Unit Quantity. The UMCONV records are always entered based on the Potent Unit Quantity, if potency applies.

Now, the files are updated:

*LOCDTL:*

Quantity in Standard UM = .5
Standard UM = pounds
Quantity in Last Received UM = 100
Last Received UM = gallons
Potency factor = .10

*RESBAL:*

Quantity present = .5

In the above example, only the Location Detail and the Resource Balance files are updated. This is only for the purpose of the example. During an actual transaction, many more files are updated. (For example, if a Lot Number was entered on the transaction, the LOTMAS file would also have to be updated. If a PO was entered on the transaction, the PODETL file would also have to be updated. All files quantities are in standard UM and use the same quantity to update as the RESBAL record used to update Quantity in Standard UM).

Suppose another receipt to that location is made:

Receipt Transaction #2 = 200 gal. of Res A to Loc1 with potency factor of 15%.

Then, the program must:

a. Convert the Quantity to the standard UM. The quantity in the standard UM for this transaction would equal 15 lbs. See UM conversion chart above using 200 gallons.
b. Calculate the Potent Unit Quantity for this transaction. See potent unit formula above. For the next transaction, the Potent Unit Quantity would be 2.25 lbs.(15 x .15).
c. Calculate Quantity at the Location in standard UM by adding the Quantity calculated in step "b" above to the existing Quantity at the Location. This equals .5 lbs + 2.25 lbs = 2.75 lbs.
d. Calculate the Quantity at Location in last received UM by adding the Transaction Quantity to the existing Quantity at Location in last received UM. The receiving UM of this transaction might not be the same as the last received UM. If they are not the same, the existing Quantity at the Location in last received UM, must be converted to the new last received UM (the trans UM), then added to the transaction quantity. In this example, the Quantity in last received UM is 300 (100 gallons + 200 gallons).
e. If a receipt is performed to an existing location (meaning there is an existing LOCDTL record), the Potency Factor at the location must be recalculated.

Formula for Calculating the New Potency Factor

$$\frac{(\text{Prev Qty in user UM}) \times (\text{Prev Potency}) + (\text{Trans Qty in user UM}) \times (\text{Trans Potency})}{(\text{Prev Qty in user UM}) + (\text{Trans Qty in user UM})}$$

The new Potency Factor in this example is:

$$\frac{\{(100) \times .10) + (200 \times .5)\}}{100 + 200} = \frac{10 + 30}{300} = .13333$$

File Updates:

*LOCDTL:*

Quantity in Standard UM = 2.75 (.5 + 2.25)
Standard UM = pounds
Quantity in Last Received UM = 300 (100 + 200)
Last Received UM = gallons
Potency Factor = .13333 (See new potency calculation above.)

*RESBAL:*

Quantity present = 2.75 (.5 + 2.25)

• *Assigning A Transaction Number:*

1. The next available transaction number is stored in the tailoring file. Each time a transaction is written to the TREBAT file the following occurs:

a. CHAIN to tailoring to find the next available transaction number.

b. CHAIN to the TREBAT file and the TRHIST file using the next available transaction number, to verify that the transaction number has not already been used. If either of the CHAINs are successful, the transaction number is invalid. If the transaction number is invalid, one (1) is added to the next available transaction number and that transaction number is edited against TREBAT and TRHIST. This process of adding 1 and editing continues until a valid transaction number is found.

c. Using that transaction number, the TREBAT file is written.

d. One (1) is added to the transaction number used. In the Tailoring file, the next available transaction number is updated.

• *Shelf Life Date:*

Three tailoring questions determine how to calculate the Shelf Life Date. These questions are:

1. When processing a transaction, if both the From Location and the to Location are specified and the To Location is an existing location, should the Shelf Life Expiration Date be:

A. the earliest date (between the two locations);
   B. the latest date (between the two locations);
   C. the date of the From Location;
   D. not changed at all;
   E. Transaction Date plus Shelf Life Days?

2. If doing a transaction and the From Location is not specified and the To Location is specified, should the Shelf Life be:

A. the Transaction Date plus Number of Shelf Life Days;
   B. the To Location Date?

However, if the To Location is a new location, always use the Transaction Date plus the Number of Shelf Life Days.

3. If processing a transaction and the From Location and the TO Location are specified, and the To Location is a new location, should the Shelf Life be:

A. the Transaction Date plus Number of Shelf Life Days;
   B. the FROM Location date?

• *Generating Lot Numbers:*

A tailoring question determines whether the system generates lot numbers. If the response to that question is YES, a second tailoring question determines how to generate the lot numbers. The possible methods of generating lot numbers are:

1. Julian/sequential number
2. Year/sequential number
3. Year/month/sequential number
4. Julian

SECTION III - XI

Grades/Revision Levels

GRADE. The grade of a resource is a quality rating. For each resource consumed by a production model, you can specify a range of acceptable grades. Suppose you grade all beans received from vendors with a number between 1 (worst) and 3 (best). When making cans of beans, you want to use only grade 3 beans, but when making vegetable soup any grade is acceptable.

You can define these limitations in your production models for canned beans and vegetable soup, so that when the system creates reservations for the consumed beans, it skips over any location where it finds beans whose grade is not within the limits. You can use the Valid Grade Report (see Section 3-6) to see for a resource the locations where it is found, the grade at each location, and the schedules that need the resource. This allows you to decide specifically which location/grade to use for each schedule.

Note: If you normally use a word other than "grade" for the same concept, and would prefer to continue using your own term, you can define a variable heading for "grade" (see tailoring question #V2). The word or phrase you specify is then used in place of the word "grade" on report headings, the report prompter screens, and most entry and inquiry screens. "Grade" is still used in the Marcam version of program messages, on menus, and in the reference and logic manuals.

REVISION LEVEL. A "revision level" in PRISM is what you may know as the "engineering change (EC) level" of the resource. This characteristic, a two-character field, indicates which version of the design was used to manufacture this supply of the resource. Suppose the original design for resource A was revision level 01. Since then, you have been through revision levels 02, 03, 04, and are now using 05. Revision levels 01 and 02 are so out of date that you no longer use them.

In Resource Master Maintenance (see Data Screen MIE18002 in Section 1-13), you can define the Earliest Acceptable Revision Level for resource A to be 03. Then, when the system creates reservations for resource A, it skips over any location where it finds resource A with revision level 01 or 02. In addition, the Invalid Revision Level Report (see Section 2-9) identifies locations that contain resources with unacceptable revision levels.

Each resource in a location can be assigned a grade and a revision level. The entire quantity of the resource at a single location must have ONE grade and ONE revision level. So, when you move a resource from one location to another, the grade or revision level assigned to it sometimes changes (see tailoring questions #T25-26).

On the other hand, varying grades and revision levels of the same resource can exist in different locations. As mentioned above, the system skips over a location where the resource has an unacceptable grade or revision level. The revision level can be a part of your method of creating reservations (see tailoring question #R1 and Allocations/Reservations/Picking). This ensures that resources with earlier but still acceptable revision levels are used first, before they also become out of date.

SECTION IV

SECTION IV-I

Task Maintenance Screen—MDE04011

The Task Maintenance Screen appears if a PM Type/PM Name/Task Name are entered on the PM Selection Screen, or if a task is selected from the Task Selection Screen. In the second case, the Task Name is for display only. When a new PM is added, this screen is automatically displayed once ENTER is pressed on the PM Maintenance Screen.

The user can select another task for maintenance by entering the Task Name in the Retrieval Field and taking CK12. The task is either added or retrieved depending on whether it already exists. If an existing task is entered, the information is displayed for maintenance. If a new Task Name is entered, the same steps occur as when adding a new task from the Task Selection Screen.

If this program is called during PM Maintenance and a record is being added, a standard task and the resources, operations, and operation comments associated with the task can be copied into the PM. The user enters the new task name in the upper left corner. It can be different from the standard task name. The standard task name is entered in the Task Retrieval field. Both the new Task Name and standard Task Name are required.

The Stream Resource Status is initialized to zero when a task is added. This field is updated during maintenance of stream resources. The possible updates are:

| From | To |
|---|---|
| 0 | 1, 2 |
| 1 | 0, 3 |
| 2 | 0, 3 |
| 3 | 1, 2 |

When a task record is deleted, all operations and resources associated with the standard task are also deleted.

When CK10 is selected, a PMTASK record is built from the TASKMS record, PMRESR records are built from TASKRS records, and PMOPER records are built from TASKOP records. COMMNT records are also duplicated with the new PM Type/PM Name. The TASKRS and TASKOP records are retrieved by setting lower limits using the Task Name and doing a series of READE operations. For every successful READE, a record is written to the appropriate file for the PM Type/PM Name. The Sequence Number is edited to check that it is not already assigned to another task on this PM.

The task record appears and is maintainable. After the user presses ENTER, the appropriate information is duplicated. The Batch Equivalence cannot be zero. Thus, the following formula is used to convert this value to the quantity equivalence value:

Quantity Equivalence = PM Batch Size/Batch Equivalence

When this calculation has been completed, the quantities relative to PM batch size for resources associated with the task are calculated. The following formula is used:

Qty Relative to PM Batch Size = Relative Qty x Batch Equivalence to Task Batch Size A work field determines whether an edit of the stream resources for all tasks on this PM is necessary. This work field is checked, 1) when returning to the selection screen, and 2) when exiting from PM Maintenance. This field is set to Y when a new task is added, or when the first or final task of the PM is deleted.

Yield figures (historical average yield, last complete period average yield, and last yield) are maintained by selecting CK05. Yield figures are displayed as percentages, but are stored in the file in decimal format. An indicator is used to control the protection attributes of these fields. The fields are available for entry only if the user has security clearance for the maintenance of historical information.

To determine if the user profile has the necessary clearance, the program calls program MZM300 with the following parameters: module code, $MOD (D); sequence, $SEQ (002) (003 during PM Maintenance); and result, $RES. If the result returned by MZM300, $RES, is Y, the user profile has authority to maintain historical information and the three yield fields are made available for entry.

The Reportable (Y/N) byte is loaded based on the attributes of the produced resources. When a task is added, Dependencies on This Task is initialized to N, and Number of Dependencies is initialized to zero.

When any field value is changed during PM Maintenance, the recost flag is set on. Flags to recost the PMs dependent on the PM are also set to Y. To retrieve all dependent PMs, lower limits are set to PMODELPA using PM Type/PM Name, and a series of READE operations is done. For every successful READE, the recost byte of the PM is set to Y.

Each task on a PM must have a unique Task Sequence Number. To check that number, a chain is made to the logical view of PMTASK by PM Type/PM Name/Task Sequence Number (PMTASKSQ). If the chain is successful, a hard halt error message appears.

If Dependencies on This Task = Y, this task cannot be deleted. It can only be changed by a user with security clearance to maintain dependent tasks and resources, and only after a warning message has been displayed and overridden.

Display-Only Fields (Standard Task Maintenance):

Action
Date Last Maintenance
Reportable Task

These yields can be maintained only if CK05 is used:
Historical Average Yield
Last Yield
Last Complete Period Average Yield Display-Only Fields (PM Maintenance):

Action
Date Last Maintenance
Qty Equivalence
Number of Dependencies
Dependencies on This Task
Reportable Task These yields can be maintained only if CK05 is used:
Historical Average Yield
Last Yield
Last Complete Period Average Yield Entry Fields (Standard Task Maintenance):
Description
Standard Task Batch Size
Standard Task Batch Size UM
System Recalculates Lead Time
Yield Factor Standard Deviation %
Yield Factor %
Move Time (Days)
Move Time (Hrs)
Move Time (Mins)
Cumulative Lead Time
Sensitivity Factor %
Critical Point Task Code Entry Fields (PM Maintenance):
Description
Standard Task Batch Size
Standard Task Batch Size UM
System Recalculates Lead Time
Yield Factor Standard Deviation %
Yield Factor %
Move Time (Days)
Move Time (Hrs)
Move Time (Mins)
Cumulative Lead Time
Sensitivity Factor %
Critical Point Task Code
Cumulative Lead Time
Batch Equivalence
Final Task
Task Retrieval Field Required Fields (Standard Task Maintenance):
Description
Standard Task Batch Size
Standard Task Batch Size UM Required Fields (PM Maintenance):
Task Name (ADD only)
Task Sequence Number (ADD only)
Description
Final Task (Y/N) (ADD only)

Defaults (Standard Task Maintenance):
System Recalculates Lead Time = Y
Critical Point Task Code = N
Yield Factor = 100
Sensitivity Factor % from TALFLD Defaults (PM Maintenance):
Standard Batch Size for Task from PMODEL
Standard Batch Size UM from PMODEL
Batch Equivalence = 1
System Recalculates Lead Time = Y
Yield Factor = 100
Critical Point Task Code = N
Sensitivity Factor % from PMODEL Edits (Standard Task Maintenance):

- Batch Equivalence cannot be zero.
- Critical Point Task Code must be Y or N.
- System Recalculates Lead Time must be Y or N.
- Task Sequence Number must be greater than zero.

Edits (PM Maintenance):

- Batch Equivalence cannot be zero.
- Critical Point Task Code must be Y or N.
- If Dependencies on This PM = Y, this task cannot be deleted.
- System Recalculates Lead Time must be Y or N.
- Task Name must be unique to the PM.
- If a Task Retrieval Name is entered, the user must take CK10 (copy standard task) or CK12 (select a different task).
- If the user takes CK10, they must have entered a task retrieval name.
- If the user takes CK12, they must have entered a task retrieval name.
- Each task on a production model must have a unique Task Sequence Number.

Command Keys (Display) (Standard Task Maintenance):

| | |
|---|---|
| CK01 | Display Session Status |
| CK05 | Historical Yield Maintenance |
| CK18 | Refresh Screen |
| CK19 | Return without Update |

Command Keys (Display) (PM Maintenance):

| | |
|---|---|
| CK01 | Display Session Status |
| CK05 | Historical Yield Maintenance |
| CK10 | Copy Standard Task |
| CK12 | Retrieve Task |
| CK18 | Refresh Screen |
| CK19 | Return without Update |

Command Keys (Non-Display) (Standard Task Maintenance):

| | |
|---|---|
| HELP | Display Additional Text |
| CK07 | Send Message to Action List |
| CK17 | Override Error message |
| CK20 | Delete a Record |

Command Keys (Non-Display) (PM Maintenance):

| | |
|---|---|
| HELP | Display Additional Text |
| CK07 | Send Message to Action List |
| CK17 | Override Error message |
| CK20 | Delete a Record |

Task Selection Screen - MDE04003

This screen is accessible only through PM Maintenance.

On this screen the user can see all tasks defined for a selected production model. Then the user may select a specific task for maintenance by marking the task with an X and pressing ENTER. If no task is marked, ENTER returns the user to the PM Selection Screen. If a task is marked, when its processing is complete the program returns to this screen.

The program can also display all resources or operations for a task. To display all resources for the task, the user must enter an R next to the task name. To display all operations for the task, the user must enter an O next to the task name.

Tasks are displayed in ascending sequence. Lower limits are set to the PMTASKSQ file using PM Type/PM Name, and a series of READE operations is done. For dependent PMs, the parent PM Type/parent PM Name are substituted for PM Type/PM Name. For every successful READE, a record is added to the subfile. If no tasks are defined for this PM, an error message appears.

If more than one task is selected, the task with the lowest sequence number is processed first. When its processing is complete, the program returns to the Task Selection Screen. The marking next to the task just displayed is removed. When the ENTER is pressed again, the appropriate screen appears for the next task. This process continues until all tasks have been processed.

Display-Only Fields (top of screen):
- PM Type
- PM Name

Display-Only Fields (subfile):
- Task Name
- Task Sequence Number
- Description

Entry Fields:
- Task Selection Field

Edits:
- Task Selection field must be X, R, O, or blank.
- At least one task must exist on the PM.

Command Keys (Display):

| | |
|---|---|
| CK01 | Display Session Status |
| CK18 | Refresh Screen |
| CK19 | Return Without Update |

Command Keys (Non-Display):

| | |
|---|---|
| HELP | Display Additional Text |
| CK07 | Send Message to Action List |
| CK17 | Override Error Message |

SECTION IV-II

Resource Maintenance Screens—MDE04012, MDE04013

The Resource Maintenance Screens can be displayed from the PM Selection Screen or the Standard Task Selection Screen. In either case, the screens are also available from the Task Maintenance screen, the Operation Maintenance screen, and the Resource Selection screen.

On this screen the user enters, changes, and deletes resources. The Action Code text is displayed in the upper right corner. The Date Last Maintenance is displayed for review.

The user can select another resource for maintenance by entering the Resource Type and Resource Number in the bottom left corner of the first Resource Maintenance Screen and taking CK12. When CK12 is pressed, the existing information for the resource is displayed. If this resource does not exist, the program will try to add it unless the PM is dependent, in which case an error message appears.

If the Resource Type is left blank, the program assumes it is a consumed resource. If this assumption results in an error because of the requested action, the program changes the Resource Type to P (produced) and tries again. If this change still results in an error, an error message appears.

If no Resource Number is entered in the resource selection field at the bottom of the screen and ENTER is selected, the next screen to appear depends on the program's previous action. If a new resource was just added, a blank Resource Maintenance Screen appears. If an existing resource was maintained, the program returns to the initial selection screen.

Two maintenance screens exist for each resource, so ENTER is available to page forward, and CK03 is available to page backward from screen to screen. If the resource is produced, all fields on the second screen are protected. Historical figures, however, can be maintained when CK05 is selected.

Dependent PMs during PM Maintenance. A dependent PM is a copy of another PM (its parent PM) with the exception that one or more of the parent's consumed resources have been changed on the dependent PM.

A dependent PM does not consist of all the records that are normally associated with a PM. For example, if the parent PM SOUP has one task, two operations and three resources, the PM has one PMODEL record, two PMOPER records, and three PMRESR records. If a PM is created that is dependent on SOUP, it has one PMODEL record for the new PM and one PMRESR record for each consumed resource that differs from the consumed resource on the parent. These are the only records that exist for the dependent PM. All others records are referenced from the parent PM records.

When a dependent PM is maintained, the produced resource information is for display only. Only consumed resources that exist on the parent PM can be maintained. If the user tries to change a produced resource on a dependent PM, tan error message appears. The same occurs if the user tries to delete a resource from a dependent PM.

The user can maintain consumed resources on a dependent production model by either entering the Resource Number or selecting the resource on the Resource Selection Screen. In either case, the resource record is retrieved by using the dependent PM Type/dependent PM Name/Task Name/Resource Type = C/Resource Number to chain to PMRESR. If the chain is successful, the information is displayed for maintenance. If the chain fails, parent PM Type/parent PM Name is substituted in the key, and another chain is made to PMRESR. If that chain is successful, the resource information from the parent PM is displayed, along with the PM Type and PM Name of the dependent PM. If both chains fail, an error message appears.

If a consumed resource record is added to a dependent PM, the task that consumes the resource is updated to reflect this addition. A chain is made to PMTASK using parent PM Type/parent PM Name/Task Name. Dependencies on This Task is set to Y, and the Number of Dependencies is incremented by one. If a consumed resource record is deleted from a dependent PM, the Number of Dependencies is decreased by one. If the result of this subtraction sets the counter to zero. Dependencies on This Task is set to N. The same updating applies to the resource on the parent PM. The record is accessed by chaining to the PMRESR file by parent PM Type/parent PM Name/Task name/Resource Type = C/ Resource Number.

The only action available for resources on a dependent PM is CHANGE. If a record for the resource exists on the dependent PM (i.e., overrides to the resource on the parent PM have been made), the Remove Overrides field on the second Resource Maintenance Screen is available for entry. The field defaults to N, but if Y is entered the resource is deleted from the dependent PM. In other words, the resource information reverts to the information on the parent PM.

When consumed resources are maintained on a dependent PM, if the original resource on the parent PM is either related to an operation, or has an operation that is related to it, a warning message appears, since maintaining the resource would deactivate the relationship.

The Resource Type is never available for entry during maintenance on dependent PMs.

If a resource is expressed as a ratio of another resource, or if either of the related resources is changed on the dependent PM, both resource records exist on the dependent PM.

If a resource has dependencies it cannot be deleted. It can only be changed by an operator with security clearance for maintaining dependent tasks and resources. To determine if the user profile has clearance, the program calls the program MZM300 with parameters of: module code, $MOD (D); sequence, $SEQ (003); and result, $RES. If the result returned by MZM300, $RES, is Y, the user profile can perform the maintenance.

Dependent operations cannot be created on dependent PMs.

Resource Quantities. A consumed/produced resource can be expressed as ratio to another consumed/produced resource. To express the quantity of a resource relative to another, the related resource number and ratio are required entries. A related resource cannot itself be related, and the related resource must be of the same type as the dependent resource. Resources with ratio dependencies cannot be deleted.

During PM Maintenance, the program verifies that the related resource exists by using PM Type/PM Name/Task Name/Resource Type/Related Resource Number to chain to PMRESR. The related resource can be one defined on the parent PM. If the chain fails, the program substitutes parent PM Type/parent PM Name in the key and makes another chain to the file.

During Standard Task Maintenance, a chain is made to TASKRS using Task Name/Resource Type/Resource Number. If the chain succeeds, the program checks that its related resource number is blank. The unit of measure of the dependent resource must also be convertible to the standard unit of measure of the related resource. If these conditions are met, Ratio Dependencies on This Resource is set to N and the Quantity Type Code is set to R on the resource with a related resource number defined. Ratio Dependencies on This Resource is set to Y on the related resource.

When a resource with a related resource is maintained, the Quantity Relative to Task Batch Size is not available for entry. The quantity is recalculated as a ratio of the quantity of the related resource. When the quantity of a resource that is defined to have a ratio dependency is changed, the quantity of the resource which is dependent on it is also changed.

If the quantity of a resource used is changed, the quantity of resources dependent on it are changed as well. First the program must locate the ratio dependent resources. During PM Maintenance, PM Type/PM Name/Task Name/Resource Type/blank Resource Number are used to set lower limits to the PMRESR file. During Standard Task Maintenance, Task Name/Resource Type/blank Resource Number are used to set lower limits to the TASKRS file. A series of READE operations are then done. For each successful READE the program checks for resources related to the original resource. When it locates them it multiplies the quantity of the first resource by the ratio defined for the dependent resource. READE operations continue until the operation fails.

To remove the ratio relationship, the user must blank out the related resource number and ratio on the dependent resource. The program then sets the Quantity Type Code to blanks. The Related Resource Number is saved for comparison. To determine if this was the only resource dependent on that related resource, a READE is performed on all the resources on the task with the same resource type. After each successful READE, the related resource is compared with the saved field. If they are equal, no further processing is necessary. If no other resource has this related resource number, a CHAIN is made to the related resource and Ratio Dependencies is set to N.

The Quantity Relative to Task Batch Size in User UM is required. All quantities are loaded into the file even if they are equal. The following formula is used to calculate the Quantity Relative to PM Batch Size. Batch Equivalence is retrieved from the task using PM Type/PM Name/Task Name to chain to PMTASK.

If Quantity Relative to Task Batch Size in User UM is entered, it is converted to the Standard UM and then:

Quantity Relative to PM Batch Size in Standard UM = Quantity Relative to Task Batch Size × Batch Equivalence If no user UM is defined, the program assumes the UM is equal to the Standard UM. The Standard UM is then loaded into the user UM field.

During Standard Task Maintenance, Quantity Relative to Task Batch Size is required. Quantity Relative to PM Batch Size is only calculated when this standard task is copied into a PM.

Reportable (Y/N) Byte. At the end of resource maintenance, the Reportable (Y/N) byte is loaded based on the attributes of the produced resources. During PM Maintenance, lower limits are set to the PMRESR file using PM Type/PM Name/Task Name/Resource Type = P/blank Resource Number. During Standard Task Maintenance, lower limits are set to the TASKRS file using Task Name/Resource Type = P/Resource Number. A series of READE operations (key = same as above without Resource Number) are used, and the byte is checked for every successful read. As soon as one reportable produced resource is found, the byte in PMTASK (TASKMS) is set to Y. If no reportable resources are found, the byte is set to N.

Operation Dependency. The user has the ability to relate consumed resources to operations on independent PMs. One fields allows the user to specify whether an operation record is to be created for the resource. If so, a Dependent Operation Number is required and the Dependent Resource field is set to N. Dependent Operation and Dependent Resource both equal N if no operation is to be created. During PM Maintenance, the program verifies that this operation does not already exist by chaining to the PMOPER file using PM Type/PM Name/Task name/Operation Number before adding a record. During Standard Task Maintenance, a chain is made to the TASKOP file using Task Name/Operation Number.

An operation is created at the work center specified in RESMST. The work center can be overridden by entering a work center on this screen. An edit makes sure the work center exists in WCMAST. Then the resource quantity (relative to PM batch size) is converted to hours.This becomes the run time in hours in PMOPER (TASKOP). The same occurs for the setup and clean up quantities. The UM expression for hours is defined by a tailoring question answered in the Foundation module.

After maintaining a resource that has a dependent operation, the run time, setup time, and clean up time are updated in the dependent operation record.

The data fields for resources that are dependent on operations are for display only. CK15, however, allows the user to maintain the resources by breaking the dependency. When it is used, the dependency fields are reset to indicate the connection is severed: the Dependent Resource Number is blanked out, and the Dependent Resource and Dependent Operation fields on the operation are set to N. Once the connection is broken, the consumed resource and the operation times must be maintained independently.

Resources that have dependent operations cannot be deleted.

Edits and defaults apply to a specific resource type. Entries that are not valid for the resource type cause an error message to appear.

During PM Maintenance, the program can calculate cost and production percentages. Quantities of the produced resources are converted to the batch unit of measure. To calculate production distribution percentage, each resource quantity is divided by the sum of the reportable produced resource quantities and then multiplied by 100. To calculate the cost distribution percentage, each resource quantity is divided by the sum of all non-net realizable value produced resources and then multiplied by 100.

When a potent resource (Potent Resource = Y in RESMST) is added or deleted, the count of PMs that use the resource is maintained accordingly. This applies to both consumed and produced resources.

Simplified Example of Superflushing. If the PM being processed is superflushable, the user cannot add a produced resource. This edit applies only to independent PMs. A superflushable PM has only one non-reportable, produced resource. Superflushable PMs allow the user to apply the cost and production figures for the superflushed PM to consumption of another resource on another PM.

For example, think of a car that is produced on one PM and a radio that goes into the car but is produced on another PM. When a car is completed, the radio (the non-reportable, produced resource on the superflushable PM) has been placed in the car. When a production receipt is done for the car, theoretical consumption, production, etc., is done for the radio, because the system knows if a car was made a radio must have been made as well.

Resource Maintenance Screen—MDE04012

Display-Only Fields (Standard Task Maintenance):

- Action
- Task Name
- Class
- Sub-Class
- Date Last Maintenance
- Qty/Task (Std UM)
- Standard UM
- Qty Type Display-Only Fields (PM Maintenance):

- PM Type
- PM Name
- Task Name
- Action
- Class
- Sub-Class
- Date Last Maintenance
- Qty/PM (Std UM)
- Qty/Task (Std UM)
- Standard UM Entry Fields (Standard Task Maintenance):

- Task Selection Field
- Resource (ADD only)
- Resource Type (ADD only)
- Qty/Task Batch
- User UM
- Description
- Stream Resource
- Reportable Resource
- Effectivity Lower Date
- Effectivity Upper Date
- Print On Documents Code
- Production Distribution %
- Clean Up Quantity
- Documentation Location Code
- Related Resource
- Retrieval Type
- Retrieval Number
- NRV Usage
- Warehouse
- Location
- Grade Lower Limit
- Grade Upper Limit
- Cost Distribution %
- Setup Quantity
- Location Classif Code - Production Receipt
- Ratio
- Ratio Dependencies Entry Fields (PM Maintenance):

- Task Selection Field
- Resource (ADD only)

Resource Type (ADD only)
Qty/Task Batch
User UM
Description
Stream Resource
Reportable Resource
Effectivity Lower Date
Effectivity Upper Date
Print On Documents Code
Production Distribution %
Clean Up Quantity
Documentation Location Code
Related Resource
Retrieval Type
Retrieval Number
NRV Usage
Warehouse
Location
Grade Lower Limit
Grade Upper Limit
Cost Distribution %
Setup Quantity
Location Classif Code - Production Receipt
Ratio
Ratio Dependencies Required Fields (Standard Task Maintenance):

Resource Type
Qty/Task Batch
Stream Resource

Required Fields (PM Maintenance):

Resource Type
Qty/Task Batch
Stream Resource

Defaults (PM Maintenance):

Class from RESMST
Sub-Class from RESMST
Description from RESMST
Stream Resource = N
Print On Documents = Y
Standard UM from RESMST
User UM from RESMST
Warehouse from Tailoring
Upper Grade = 99
Ratio Dependencies = N Defaults (Standard Task Maintenance):

When the action is ADD, and the Resource Number is not available, the user can use the defaults by leaving the field blank. This is indicated by a U following the fields below. Some are only updated, however, if the screen values (other than blanks) differ from the default values. These are indicated by an N.

*Consumed Resources*

Class from RESMST (U)
Sub-Class from RESMST (U)
Description from RESMST (U)
Grade Level Lower Limit = blank (U)

Grade Level Upper Limit = 99 (U)
Beginning Effectivity Date = 000000 (U)
Ending Effectivity Date = 000000 (screen) (U)
Ending Effectivity Date = 999999 (file) (U)
Print on Documents Code = Y (U)
Prime Planning PM Type from RESMST (N)
Prime Planning PM Name from RESMST (N)

*Produced Resources*

Net Realizable Value Usage from RESMST (U)
Location Classification Code from RESMST (N)

*Both*

Warehouse from PMODEL, PMTYPE, RESMST, TALFLI (U)
Cons/Prod Location from RESMST (N)
Stream Resource = N (U)

Edits for Both Standard Task and PM Maintenance:

In order to allow for a resource that is a waste, the program does not edit for negative quantities but does edit for a zero.

If Quantity Relative to Task Batch Size in User UM is entered, the user-defined UM is required.

Qty/Task Batch must be entered if neither the Related Resource nor the Related Resource Ratio was entered.

If a related resource is entered, it must be defined in RESMST.

If a related resource is entered, it cannot be the same as the resource being maintained. It must exist on the task and cannot itself have or be a related resource. Both resources must be the same type.

If the resource already has ratio dependencies defined, related resource number and ratio must be blank.

Ratio is required if related resource number is defined. It must be zero if no related resource number is entered.

If the resource is a balance resource, the resource/warehouse combination must exist in RESBAL.

Resource Number must be defined in RESMST.

Resource Type must be C or P.

Resource must not already exist on the task (ADD mode only).

Resource Retrieval field entries must be valid.

Resource Retrieval fields must be blank if CK12 was not taken.

Stream Resource must be Y or N.

If this is a stream resource, the user UM must be entered.

When a stream resource is being added or changed, no entry is permitted for the warehouse and/or the location.

A warehouse must be entered for non-stream resources.

Location must be blank for non-balance, non-stream resources.

Warehouse is required regardless of whether this is a balance or non-balance resource.

User defined UM must be convertible to the resource standard UM.

*Edits for Consumed Resources only:*

The Beginning and Ending Effectivity Dates must be in valid date format.

Beginning Effectivity Date cannot be greater than the Ending Effectivity Date.

Ending Effectivity Date cannot be greater than the Ending Effectivity Date in RESMST.

Upper Grade Level limit must be greater than or equal to lower Grade Level limit.

Print On Documents Code must be Y or N.

Print on Documents Code must be set to Y if the quantity of resource relative to PM batch size is greater than zero.

An error message is displayed if entries are made in the following fields when Resource Type = C: Production Distribution %, Cost Distribution %, NRV Usage, Reportable (Y/N), and Inventory Classification.

Reportable Resource and NRV Usage cannot be entered.

If the Setup Quantity and/or Clean Up Quantity is greater than, the Theoretical Consumption Code must be D.

*Edits for Produced Resources Only:*

If a Location Classification Code is entered, it is edited against the Inventory Classification Master file (CLASCD).

Net Realizable Value resources must have a Cost Distribution % of zero.

Non-Reportable resources must have a Production Distribution % of zero (except for stream resources).

NRV Usage must be Y or N.

NRV Usage must be N for stream resources.

An error message is displayed if entries are made in the following fields when Resource Type = P: Effectivity Dates, Grade Levels, Documentation Location Code, and Print on Documents Code.

Setup Quantity and Clean Up Quantity must be zero for produced resources.

*Edit for Standard Task Maintenance Only:*

Quantity Relative to Task Batch Size is required. Quantity Relative to PM Batch Size is a non-display field that is calculated when the standard task is copied into a PM.

Command Keys (Display):

| | |
|---|---|
| CK01 | Display Session Status |
| CK08 | Operation Maintenance |
| CK09 | Produced Resource Qty % |
| CK11 | Distribution % |
| CK12 | Retrieve Resource |
| CK15 | Dependent Resource Maintenance |
| CK18 | Refresh Screen |
| CK19 | Return without Update |

Command Keys (Non Display):

| | |
|---|---|
| HELP | Display Additional Text |
| CK07 | Send Message to Action List |
| CK17 | Override Error Message |
| CK20 | Delete |

Resource Maintenance Screen—MDE04013

Display-Only Fields (PM Maintenance):

PM Type
PM Name
Task Name
Resource
Resource Type
Class
Sub-Class
Rolled Cost (Std UM)
Previous Rolled Cost
Total Rolled Cost/Task
Total Rolled Cost/PM
Number of Dependencies
Cost Rollup Costing Method These fields can be maintained only if CK05 is used:
Last Complete Period Average Cost
Historical Average Cost
Last Quantity
Last Complete Period Average Quantity
Historical Average Quantity Display-Only Fields (Standard Task Maintenance):

Task Name
Resource
Resource Type
Class
Sub-Class
Task Name
Class
Sub-Class
Date Last Maintenance
Quantity/Task Batch (Std UM)
Standard UM
Quantity Type These fields can be maintained only if CK05 is used:
Last Complete Period Average Cost
Historical Average Cost
Last Quantity
Last Complete Period Average Quantity
Historical Average Quantity Entry Fields (Both PM Maintenance and Standard Task Maintenance):

Theoretical Consumption Code
Batch Consumption Code
Prime Planning PM Type
Create Dependent PM Operation Record
Work Center
Superflushable
Cost Rollup Type Code
Prime Planning PM Name
Dependent Operation Number
Dependent Operation
Dependent Resource Required Fields:

- Theoretical Consumption Code
- Superflushable
- Batch Consumption Code
- Cost Rollup Type Code
- Create Dependent Operation Record Defaults:

*Consumed Resources*
Cost Type from RESMST (U)
Batch Consumption from RESMST (U)
Theoretical Consumption from PMODEL, RESMST (U)
Superflushable = N (U)
Create Dependent Operation Record = N (N)
Work Center from RESMST (valid if Create Operation = Y) (N)
Remove Overrides = N (N)

Edits (Standard Task and PM Maintenance, for both consumed and produced resources):

CK05 can be used to maintain historical quantity and cost figures only if the user has the clearance to do so.
Prime Planning PM Type/Name must exist in PMODEL.
Create Dependent Operation Record must be Y or N.

Edits (Standard Task and PM Maintenance for consumed resources):

If this is a batch consumption resource, it must be theoretically consumed or cost calculated (i.e., Theoretical Consumption Code must be C or T).
Cost Type Code must be N, F, or V.
If Create Dependent Operation Record = Y, Operation Number cannot be zero.
If Create Dependent Operation Record = N, a work center cannot be entered.
A dependent operation cannot be created if: 1) the resource being maintained already has a related resource; 2) the PM being maintained is a dependent PM; 3) the resource being maintained already has a dependent operation.
When creating a dependent operation, a work center must be specified before the operation may be created.
When creating a dependent operation, the user UM must be entered and be convertible to hours.
If the Resource Overrides option is displayed for a dependent resource that differs from the parent resource, only Y or N are allowed.
If this is a stream resource, the Theoretical Consumption Code must be T.
Superflushable must be Y or N.
Theoretical Consumption Code must be T, C, or D.

Command Keys (Display):

| | |
|---|---|
| CK01 | Display Session Status |
| CK03 | Page Backward |
| CK05 | Historical Figure Maintenance |
| CK08 | Operation Maintenance |
| CK09 | Produced Resource Qty % |
| CK11 | Distribution % |
| CK15 | Dependent Resource Maintenance |

CK18 Refresh Screen
CK19 Return without Update

Command Keys (Non Display):

HELP Display Additional Text
CK07 Send Message to Action List
CK17 Override Error Message
CK20 Delete Edits Not Associated with a Particular Screen:

Note: The following edits are performed at the end of resource maintenance. These edits apply to both Standard Task Maintenance and PM Maintenance.

If a batch consumption resource is added on a task that is non-reportable, a hard halt message appears.

Production Distribution % for all reportable produced resources (including stream resources) must add up to 100. The Cost Distribution % for all produced resources that are not considered to have net realizable value must also add up to 100. If either condition is not met, an error message appears. The user may use a command key to display a screen on which appear the produced resources and their associated percentages. The user can there maintain the percentages so they add to 100.

Only one non-reportable produced may exist on each task. The stream resource is not included, even though it is defined as such.

In PM maintenance, each task must have at least one non-stream consumed resource. In Standard Task Maintenance, at least one consumed resource, stream or non-stream, must be defined.

Each task that is not the final task must have a produced stream resource. Each task other than the first must have a consumed stream resource.

A final task cannot have a produced stream resource.

The first task on an independent PM cannot have a consumed stream resource.

Every task must have at least one produced resource. The stream resource may be considered a produced resource, except on the final task.

If a Resource Number is displayed, a Y must not be entered in the Stream Resource field.

A work field determines whether an edit of the stream resources for all tasks on this PM is necessary. This work field is checked, 1) when returning to the Selection Screen, and 2) when exiting from PM Maintenance. This field is set to Y when a new task is added or when the first or final task of the PM is deleted. If the work field equals Y, all tasks for the PM are read sequentially from the PMTASKSQ file. The following conditions must hold:

- If this is the first task in a series of tasks, PTSTST must = 2.
- For an intermediate task, PTSTST must = 3.
- For the final task in a series of tasks, PTSTST must = 1.
- For one task alone, PTSTST must = 0.

If the work field = Y, the Task Selection Screen is displayed with an R next to the invalid task. An error message also appears that indicates the task has invalid resources.

A task may have only one consumed stream resource and one produced stream resource.

Distribution % Screen—MDE04015

This screen displays the cost distribution and production distribution percentages for all produced resources on a task. The screen appears if the user uses CK11 from the first Resource Maintenance Screen.

This subfile is built one page at a time. The values on this screen are for display only if this is a dependent PM. Also, if the resource is non-reportable, the Production Distribution % field is not available for entry. And if the resource is defined as having net realizable value, the Cost Distribution % field is not available for entry.

Display-Only Fields:

PM Type (PM Maintenance only)
PM Name (PM Maintenance only)
Task Name
Resource Number
Description
Quantity Relative To Task Batch Size in Std UM
Resource Standard UM Entry Fields:

Cost Distribution %
Production Distribution %

Edits:

A resource cannot have a cost distribution percentage that is greater than 100.

The total of all cost distribution percentages for resources on the task must equal 100.

A resource cannot have a production distribution percentage that is greater than 100.

The total of all production distribution percentages for resources on the task must equal 100.

Command Keys (Display):

CK18 Refresh Screen
CK19 Return without Update

Command Keys (Non-Display):

HELP Display Additional Text
CK07 Send Message to Action List

Produced Resource % Screen—MDE04022

The Produced Resource % Screen allows the user to express the produced resource quantity in percentage format when CK09 is selected. The user enters the percentage produced by each resource, and the system calculates the resource quantity. This function is not available in DELETE mode.

The user may select to display the resources in the resource standard UM, the user UM, or the task batch size UM. Regardless of the UM, the standard unit of measure of each produced resource must be convertible to the Task Batch Size UM if this option is selected. When CK09 is selected, the desired UM is found. The program then retrieves the resource records by setting lower limits to the PMRESR file using PM Type/PM Name/Task Name/Resource Type = P/blank Resource Number.

A series of READE operations is then done, using a partial key without Resource Number. Stream resources are not included in the subfile. Unit of measure conversions are done by using the standard subroutine, $UMCNV. This subroutine is copied into the program by using the /COPY function. After each successful conversion (if necessary), the produced resource quantity is added to a total. When the READE operation fails, the program returns to the first produced resource of this task by setting lower limits again. The quantity for each produced resource is calculated by multiplying the total quantity expressed in PM batch size UM by the percentage produced, and a record is added to the subfile. If any UM conversion error is found, a hard halt error message appears.

This screen is not available when a dependent PM is being processed. An error message appears if the user selects the command key which displays this screen.

If a ratio dependency exists between any of the produced resources on this task, this function cannot be used to calculated the resource quantities. An error message appears.

Display-Only Fields:

PM Type (PM Maintenance Only)
PM Name (PM Maintenance Only)
Task Name
Resource Number
Description
Quantity Relative to Task Batch Size in Std UM
Resource Standard UM Entry Fields:

Resource Quantity %

Edits:

Total percentage of an individual resource cannot be greater than 100.
Total percentage of all resources cannot be greater than 100.
Total percentage of all resources must total 100.
Task UM must be convertible to standard and user UM.

Command Keys (Display):

CK18 Refresh Screen
CK19 Return without Update

Command Keys (Non-Display):

HELP Display Additional Text
CK07 Send Message to Action List

Resource Selection Screen—MDE04005

During PM Maintenance, CK06 calls up this screen, which lists all produced and consumed resources defined for a PM/task combination. During Standard Task Maintenance, CK06 calls up the same screen with all resources associated with the standard task.

Consumed resources are displayed first, followed by produced resources. The user may select a specific resource for maintenance by marking the resource with an X and pressing ENTER. If no resource is marked, the ENTER key simply returns the user to the Selection Screen. If a resource is marked, the Resource Maintenance Screen appears. When maintenance on that screen is complete, the program returns to this screen.

PM Maintenance. Before using CK06, the user must first enter a valid PM Type/PM Name/Task Name. An error message appears otherwise. When this screen finally appears, resources are displayed in resource number sequence. For an independent PM, PM Type/PM Name/Task Name are used to set lower limits to the PMRESR file, and a series of READE operations is done. If the READE is successful, a record is added to the subfile.

For a dependent PM, the parent PM Type/parent PM Name/Task Name are used to set lower limits to the PMRESR file, and a series of READE operations is done. If the READE is successful, the program determines if any changes have been made to this resource. The key field values (PM Type, PM Name, Task Name, Resource Type, Resource Number) are saved before continuing so the program can return to the next resource on the parent PM.

Next, dependent PM Type/dependent PM Name/Task Name/Resource Type/Resource Number are used to CHAIN to the PMRESR file. If the CHAIN is successful the information from this record is displayed instead of that retrieved using parent PM Name. The program then returns to the next resource from the parent PM by setting greater than limits using the saved key fields, and reading continues. This process continues until all resources for the task have been read. If no resources are defined for the task, an error message appears.

Standard Task Maintenance. Before using CK06, the user must enter a valid Task Name. An error message appears otherwise. Resources are displayed in resource number sequence as the TASKRS file is processed. Lower limits are set to the file using Task Name/blank Resource Type/blank Resource Number. A series of READE operations are used with a key of Task Name to retrieve the resources. For every successful READE, a record is added to the subfile.

Display-Only Fields (Standard Task Maintenance):

Task Name
Standard Batch Size for Task
Standard UM

Display-Only Fields (PM Maintenance):

PM Type
PM Name
Task Name
Standard Batch Size for Task
Standard UM

Display-Only Fields (subfiles for both programs):

Resource Type
Resource Number
Description
Quantity Relative to Task Batch Size in User UM
User-Defined UM Entry Fields:

Processing Option

Edits:

Processing Option must be X or blank.

Command Keys (Display):

CK01 Display Session Status Screen
CK18 Refresh Screen
CK19 Return without Update Command Keys (Non-Display):

HELP Display Additional Text
CK07 Send Message to Action List
CK17 Override Error Message

SECTION IV-III

Operation Selection Screen—MDE04007

On this screen the user can see a list of all operations defined for a PM/Task combination. During PM Maintenance, the screen appears when the user enters a valid PM Type/PM Name/Task Name combination and takes CK08. During Standard Task Maintenance, the screen appears when the user enters a Task Name and takes CK08.

The user may select a specific operation for maintenance by marking the operation with an X and pressing ENTER. If no operation is marked, the ENTER key simply returns the user to the Selection Screen. If an operation is marked, this Operation Maintenance Screen appears, and when maintenance is complete, the Selection Screen reappears.

The operations are displayed in Operation Number sequence. During PM Maintenance, lower limits are set to the PMOPER file using PM Type/PM Name/Task Name/blank Operation Number, and a series of READE operations is done (same key but without Operation Number). During Standard Task Maintenance, lower limits are set to the TASKOP file using Task Name/blank Operation Number, and a series of READE operations is done (same key but without Operation Number). For every successful READE, a record is added to the subfile. If the task has no operations, an error message appears.

Display-Only Fields (Standard Task Maintenance):

Task Name

Display-Only Fields (PM Maintenance):

PM Type
PM Name
Task Name

Display-Only Fields (subfile for both programs):

Operation Number
Work Center
Description

Entry Fields:

Processing Option

Edits:

Processing Option must be X or blank.

Command Keys (Display):

CK01 Display Session Status
CK18 Refresh Screen
CK19 Return Without Update

Command Keys (Non-Display):

HELP Display Additional Text
CK07 Send Message to Action List
CK17 Override Error Message

Operation Maintenance Screen—MDE04019

This screen appears in three cases: 1) if a PM Type/PM Name/Operation Number are entered on the PM Selection Screen, 2) if a Task Name/Operation Number are entered on the Standard Task Selection Screen, or 3) if CK08 is selected on the Resource Maintenance Screen.

On this screen the user can enter, change, and delete operations. The Action Code text is displayed in the upper right corner. The Date Last Maintenance is displayed for review.

The user can change the action on this screen without returning to the Selection Screen. To add or change another operation, the user must enter the next operation to be maintained in the Retrieval Field at the bottom of the screen and take CK12. The action is determined by whether the operation already exists. To delete another operation, the user must retrieve it using CK12 and then select CK20 twice.

When ENTER is selected after adding a new operation, a blank Operation Maintenance Screen appears. If ENTER is selected after maintaining an existing operation, the program returns to the screen where the Operation Maintenance Screen was originally called.

If CK06 is selected, the program transfers to the Resource Maintenance Screen.

For dependent PMs, the operation displayed is for view only. The operation record is retrieved by chaining to the PMOPER file using parent PM Type/parent PM Name/Task Name/Operation Number.

Resource Dependencies. The user can relate operations to consumed resources. By entering a Dependent Resource Number, the Dependent Operation field is set to N, and the Dependencies field is set to Y (both are set to N if no resource is to be created). The program verifies that this resource does not already exist by chaining to the PMRESR file using PM Type/PM Name/Task Name/Resource Type = C/Resource Number before it adds a record. If no resource was specified, a resource record is created for the default specified by the defined work center. If no default is specified, the default becomes a resource that has the same name as the work center. In either case, it must be a resource with a valid RESMST record.

After an operation that has a dependent resource is maintained (a Dependent Resource Number is entered and Dependent Resource = Y), the following fields are updated in the dependent consumed resource record: Quantity/PM (user UM), Quantity/PM (std UM), Quantity/Task (std UM), Setup Quantity, and Clean Up Quantity.

Data fields for operations that are dependent on resources (Dependent Operation = Y) are for display only. The user can, however, use CK15 to maintain these operations by breaking the connection. The Dependent Operation Number is blanked out, and the Dependent Resource and Dependent Operation fields are set to N on the resource record. Once the connection is broken, the consumed resource and the operation must be maintained independently.

The Quantity Relative to PM Batch Size is the conversion of run time in hours to the standard unit of measure for the resource. Also, Setup and Clean Up quantities are calculated by converting Setup and Clean Up times to the standard UM. The expression for hours is defined by a tailoring question in the Foundation module.

With CK10 the user can define comments that may be used as operation instructions.

Display-Only Fields:

PM Type (PM Maintenance Only)
PM Name (PM Maintenance Only)
Task Name
Operation Number (Change, Delete, View)
Action
Date Last Maintenance
Dependent Resource (Change, Delete, View)
Dependent Operation (Change, Delete, View)

Entry Fields:

Work Center
Schedule Sequence Number
Batch Consumption Code
Create Dependent Resource Record
Dependent Operation
Schedule Time Code
Description
Overlap Quantity Override
Loading Sequence Number
Critical Point Work Center
Dependent Work Center
Operation Has Dependent Resource
User Defined Schedule Time (Days)
User Defined Schedule Time (Hrs)
User Defined Schedule Time (Min)
Move Time (Days)
Move Time (Hrs)
Move Time (Min)
Move Time Defaults
Queue Time (Days)
Queue Time (Hrs)
Queue Time (Min)
Queue Time Defaults
Setup Time (Hrs)
Setup Time (Min)
Setup Time Defaults
Run Time (Hrs)
Run Time (Min)
Run Time Defaults
Clean Up Time (Hrs)
Clean Up Time (Min)
Clean Up Time Defaults
Retrieval Operation
Dependent Resource Number Required Fields:

Operation Number
Description
Work Center

Edits:

Batch Consumption must be Y, N, or blank.
Create Dependent Resource record must be Y or N.
If a dependent resource is being created, a dependent resource number must exist in the default file (WCMAST) or on the screen.

If a resource number is specified to be created as a dependent resource, a Y must be entered in the Create Dependent Resource field, and the resource must not already exist on the task.

If an N appears in the Create Dependent Resource field, and the operation does not have a dependent resource, the dependent resource number field must be blank.

If a dependent resource number is entered and the operation does not yet have a dependent resource, the resource must exist in RESMST.

Critical Point Work Center must be Y or N.

Maximum Batch Size of the work center must be less than the standard batch size of the task.

Operation Number must be greater than zero (ADD only).

Operation cannot already be defined on the task (ADD only).

If an overlap quantity is entered, it cannot be greater than the maximum overlap quantity specified for the work center.

If the Retrieval Field is entered, the user must use CK12.

If the user selects CK12, the Retrieval Field must be greater than zero.

Schedule Time Code must be U or S.

All Time Defaults to Work Center fields must be Y or N.

Work Center must exist in WCMAST.

Defaults:

Critical Point Work Center = N
Schedule Code = S
Overlap Quantity from WCMAST
Batch Consumption from WCMAST
Queue Time Defaults = Y
Setup Time Defaults = Y
Run Time Defaults = Y
Clean Up Time Defaults = Y
Move Time Defaults = Y
Create Dependent Resource Record = N The following fields default from WCMAST if the quantities in the default fields are zero. For example, if Clean Up Time Defaults = Y and both hours and minutes equal zero, the defaults from WCMAST are used. To override the defaults, Clean Up Time Defaults must equal N.

Queue Time (Days, Hours, Minutes)
Setup Time (Hours, Minutes)
Run Time (Hours, Minutes)
Cleanup Time (Hours, Minutes)
Move Time (Days, Hours, Minutes)

Command Keys (Display):

| | |
|---|---|
| CK01 | Display Session Status Screen |
| CK06 | Resource Maintenance |
| CK10 | Comment Entry |
| CK12 | Dependent Operation Maintenance |
| CK18 | Refresh Screen |
| CK19 | Return without Update |

Command Keys (Non-Display):

| | |
|---|---|
| HELP | Display Additional Text |
| CK07 | Send Message to Action List |
| CK17 | Override Error Message |
| CK20 | Delete a Record |

Operation Comment Maintenance Screen—MDE04018

Here the user can add comments for each operation. This screen appears by using CK10 from the Operation Maintenance Screen or selecting an operation from the Selection Screen. The PM Type, PM Name, Task Name, Operation Number, and Date Last Maintenance appear on the top of the screen for review only. During Standard Task Maintenance, the PM Type and PM Name are blank.

The subfile contains the comment text. Each line in the subfile represents a record in the COMMNT file (line 1 is sequence #00001, line 2 is sequence #00002, etc.). The subfile is built one page at a time. Each line contains a delete code that allows the user to delete lines of comment from the middle of the text. At least one line of comment is required, and blanks between lines are not allowed.

Display-Only Fields (Standard Task Maintenance):

Task Name
Date Last Maintenance
Operation Number

Display-Only Fields (PM Maintenance):

PM Type
PM Name
Task Name
Date Last Maintenance
Operation Number

Display-Only Fields (subfile) (Both Standard Task and PM Maintenance):

Sequence #

Entry Fields:

Operation Comments
D to Delete

Required Fields:

At least one comment line is required.

Edits:

Embedded blanks are not allowed in the subfile.
D to Delete field can contain D or blank.
First comment line must not be blank.

Command Keys (Display):

| | |
|---|---|
| CK01 | Display Session Status |
| CK18 | Refresh Screen |
| CK19 | Return Without Update |

Command Keys (Non-Display):

| | |
|---|---|
| HELP | Display Additional Text |
| CK07 | Send Message to Action List |
| CK17 | Override Error Message |

SECTION IV-IV

PMOPER

PM Operation File

This file contains information that associates a series of operations to a task.

File Organization: Indexed

Record Length: 153
Key Length: 32

Key Fields

| Field Name | Description |
|---|---|
| POTYPE | PM Type |
| POPMNM | PM Name |
| POTASK | Task Name |
| POOPER | Operation Number |

| Field Name | Length | Type | Position From | To | Dec | Description |
|---|---|---|---|---|---|---|
| POTYPE | 2 | A | 1 | 2 | | PM Type |
| POPMNM | 15 | A | 3 | 17 | | PM Name |
| POTASK | 10 | A | 18 | 27 | | Task Name |
| POOPER | 5 | P | 28 | 30 | 0 | Operation # |
| PODESC | 30 | A | 31 | 60 | | Description |
| POSSEQ | 5 | P | 61 | 63 | 0 | Schedule Sequence # |
| POLSEQ | 5 | P | 64 | 66 | 0 | Loading Sequence # |
| POOVLP | 15 | P | 67 | 74 | 6 | Overlap Qty Override |
| POWKCT | 5 | A | 75 | 79 | | Work Center |
| POCRIT | 1 | A | 80 | 80 | | Critical Point Work Center Y/N |
| PODRNM | 15 | A | 81 | 95 | | Dependent Resource # |
| PODPRS | 1 | A | 96 | 96 | | Dependent Resource Y/N |
| PODOPR | 1 | A | 97 | 97 | | Dependent Operation Y/N |
| POUSCD | 3 | P | 98 | 99 | 0 | User-Defined Schedule Time (Days) |
| POUSCH | 3 | P | 100 | 101 | 0 | User-Defined Schedule Time (Hrs) |
| POUSCM | 3 | P | 102 | 103 | 0 | User-Defined Schedule Time (Min) |
| POSCCD | 1 | A | 104 | 104 | | Schedule Time Code U = user-defined S = system-calculated |
| POBCON | 1 | A | 105 | 105 | | Batch Cons for Run Time Y/N |
| POQUED | 3 | P | 106 | 107 | 0 | Queue Time (Days) |
| POQUEH | 3 | P | 108 | 109 | 0 | Queue Time (Hrs) |
| POQUEM | 3 | P | 110 | 111 | 0 | Queue Time (Min) |
| POQDFT | 1 | A | 112 | 112 | | Queue Time Defaults to Work Center Y/N |
| POSETH | 3 | P | 113 | 114 | 0 | Setup Time Hrs |
| POSETM | 3 | P | 115 | 116 | 0 | Setup Time Min |

PMOPER (continued)

| Field Name | Length | Type | Position From | To | Dec | Description |
|---|---|---|---|---|---|---|
| POSDFT | 1 | A | 117 | 117 | | Setup Time Defaults to Work Center Y/N |
| PORUNH | 3 | P | 118 | 119 | 0 | Run Time (Hrs) |
| PORUNM | 3 | P | 120 | 121 | 0 | Run Time (Min) |
| PORDFT | 1 | A | 122 | 122 | | Run Time Defaults to Work Center Y/N |
| POCLNH | 3 | P | 123 | 124 | 0 | Clean Up Time (Hrs) |
| POCLNM | 3 | P | 125 | 126 | 0 | Clean Up Time (Min) |
| POCDFT | 1 | A | 127 | 127 | | Clean Up Time Defaults to Work Center Y/N |
| POMOVD | 3 | P | 128 | 129 | 0 | Move Time Days |
| POMOVH | 3 | P | 130 | 131 | 0 | Move Time Hrs |
| POMOVM | 3 | P | 132 | 133 | 0 | Move Time Min |
| POMDFT | 1 | A | 134 | 134 | | Move Time Defaults to Work Center Y/N |
| PODTMT | 6 | P | 135 | 138 | 0 | Date Last Maint |
| POBLNK | 15 | A | 139 | 153 | | Blank area |

SECTION IV-V

PMRESR

PM Resource File

This file contains information that describes the input (consumed) and output (produced) resources of each task.

File Organization: Indexed

Record Length: 320
Key Length: 43

Key Fields

| Field Name | Description |
|---|---|
| PRTYPE | PM Type |
| PRPMNM | PM Name |
| PRTASK | Task Name |
| PRRSTP | Resource Type |
| PRRESC | Resource Number |

| Field Name | Length | Type | Position From | To | Dec | Description |
|---|---|---|---|---|---|---|
| PRTYPE | 2 | A | 1 | 2 | | PM Type |
| PRPMNM | 15 | A | 3 | 17 | | PM Name |
| PRTASK | 10 | A | 18 | 27 | | Task Name |
| PRRSTP | 1 | A | 28 | 28 | | Resource Type (C/P) |
| PRRESC | 15 | A | 29 | 43 | | Resource # |
| PRDESC | 30 | A | 44 | 73 | | Resource Description |
| PRPMQY | 15 | P | 74 | 81 | 6 | Qty Per PM Batch |
| PRRSQY | 15 | P | 82 | 89 | 6 | Qty Per Task Batch |
| PRUMSR | 2 | A | 90 | 91 | | Resource Standard UM |
| PRNQTY | 15 | P | 92 | 99 | 6 | Qty Per Task Batch (User UM) |
| PRNSUM | 2 | A | 100 | 101 | | User UM |

PMRESR (continued)

| Field Name | Length | Type | Position From | To | Dec | Description |
|---|---|---|---|---|---|---|
| PRQYTP | 1 | A | 102 | 102 | | Qty Type Code R = ratio blank = not ratio |
| PRRRTO | 9 | P | 103 | 107 | 4 | Ratio |
| PRNRTO | 15 | A | 108 | 122 | | Related Resource |
| PRRDEP | 1 | A | 123 | 123 | | Ratio Dep on this Resource Y/N |
| PRCPCT | 6 | P | 124 | 127 | 5 | Cost Dist % |
| PRPPCT | 6 | P | 128 | 131 | 5 | Prod Dist % |
| PRRSCL | 2 | A | 132 | 133 | | Class |
| PRRSSC | 2 | A | 134 | 135 | | Sub-Class |
| PRBEDT | 6 | P | 136 | 139 | 0 | Beginning Effectivity Date |
| PREEDT | 6 | P | 140 | 143 | 0 | Ending Effectivity Date |
| PRDOCU | 5 | A | 144 | 148 | | Doc Loc Code Override |
| PRREPT | 1 | A | 149 | 149 | | Reportable Y/N |
| PRTHEO | 1 | A | 150 | 150 | | Theoretical Cons Code D = direct issue C = calc cost T = theoretical consumption |
| PRSUPR | 1 | A | 151 | 151 | | Superflushable Y/N |
| PRWHSE | 1 | A | 152 | 152 | | Cons/Prod From Warehouse |
| PRLOCN | 10 | A | 153 | 162 | | Cons/Prod From Location |
| PRIVCL | 4 | A | 163 | 166 | | Location Classif Code |
| PRAVQY | 15 | P | 167 | 174 | 6 | Historical Avg Qty Per PM Batch |
| PRLSQY | 15 | P | 175 | 182 | 6 | Last Qty Per PM Batch |
| PRPDQY | 15 | P | 183 | 190 | 6 | Last Complete Period Avg Qty Per PM Batch |
| PRNRVL | 1 | A | 191 | 191 | | NRV Usage Y/N |
| PRUNTC | 15 | P | 192 | 199 | 6 | Rolled Up Cost Std UM |
| PRTSKC | 15 | P | 200 | 207 | 6 | Rolled Up Cost Per Task Batch |
| PRPMCS | 15 | P | 208 | 215 | 6 | Total Rolled Up Cost Per PM Batch |
| PRPVCS | 15 | P | 216 | 223 | 6 | Previous Rolled Cost Std UM |
| PRDTLR | 6 | P | 224 | 227 | 0 | Date Last Rollup |
| PRCSTP | 1 | A | 228 | 228 | | Cost Type Code N = normal F = fixed OH V = variable OH |
| PRCSRU | 1 | A | 229 | 229 | | Cost Rollup Costing Method A = rolling avg F = fixed L = last period's avg cost |

PMRESR (continued)

| Field Name | Length | Type | Position From | To | Dec | Description |
|---|---|---|---|---|---|---|
| | | | | | | R = rolled H = historical avg S = standard |
| PRSIMC | 15 | P | 230 | 237 | 6 | Simulated Rollup Cost |
| PRAVCS | 15 | P | 238 | 245 | 6 | Historical Avg Cost |
| PRPDCS | 15 | P | 246 | 253 | 6 | Last Complete Period Avg Cost |
| PRUGDE | 2 | A | 254 | 255 | | Grade Upper Limit |
| PRLGDE | 2 | A | 256 | 257 | | Grade Lower Limit |
| PRBCON | 1 | A | 258 | 258 | | Batch Consumption Cd |
| PRSUQY | 15 | P | 259 | 266 | 6 | Setup Quantity |
| PRCUQY | 15 | P | 267 | 274 | 6 | Clean Up Qty |
| PRDPNM | 5 | P | 275 | 277 | 0 | Dependent Operation # |
| PRDPOP | 1 | A | 278 | 278 | | Dependent Operation Y/N |
| PRDPRS | 1 | A | 279 | 279 | | Dependent Resource Y/N |
| PRDEPD | 1 | A | 280 | 280 | | Dependency on This Resource Y/N |
| PRNDEP | 3 | P | 281 | 282 | 0 | Number of Dependencies |
| PRSTRM | 1 | A | 283 | 283 | | Stream Resource Y/N |
| PRPPTP | 2 | A | 284 | 285 | | Prime Planning PM Type |
| PRPPNM | 15 | A | 286 | 300 | | Prime Planning PM Name |
| PRPRNT | 1 | A | 301 | 301 | | Print On Documents Code Y/N |
| PRDTMT | 6 | P | 302 | 305 | 0 | Date Last Maint |
| PRBLNK | 15 | A | 306 | 320 | | Blank area |

SECTION IV-VI

PMTASK

PM Task File

This file contains a record for each task defined on a PM.

File Organization: Indexed

Record Length: 163
Key Length: 27

Key Fields

| Field Name | Description |
|---|---|
| PTTYPE | PM Type |
| PTPMNM | PM Name |
| PTTASK | Task Name |

PMTASK (continued)

| Field Name | Length | Type | Position From | Position To | Dec | Description |
|---|---|---|---|---|---|---|
| PTTYPE | 2 | A | 1 | 2 | | PM Type |
| PTPMNM | 15 | A | 3 | 17 | | PM Name |
| PTTASK | 10 | A | 18 | 27 | | Task Name |
| PTTSEQ | 5 | P | 28 | 30 | 0 | Task Seq # |
| PTDESC | 30 | A | 31 | 60 | | Task Description |
| PTSIZE | 15 | P | 61 | 68 | 6 | Std Task Batch Size |
| PTUMSR | 2 | A | 69 | 70 | | Std Batch Size UM |
| PTQYEQ | 11 | P | 71 | 76 | 5 | Qty Equivalence |
| PTBTEQ | 11 | P | 77 | 82 | 5 | Batch Equivalence |
| PTYLDF | 9 | P | 83 | 87 | 6 | Yield Factor |
| PTSDDV | 9 | P | 88 | 92 | 6 | Yield Factor Std Deviation |
| PTAVYD | 9 | P | 93 | 97 | 6 | Historical Avg Yield |
| PTLSYD | 9 | P | 98 | 102 | 6 | Last Yield |
| PTPDYD | 9 | P | 103 | 107 | 6 | Last Complete Period Avg Yield |
| PTMOVD | 3 | P | 108 | 109 | 0 | Move Time Days |
| PTMOVH | 3 | P | 110 | 111 | 0 | Move Time Hrs |
| PTMOVM | 3 | P | 112 | 113 | 0 | Move Time Min |
| PTRCAL | 1 | A | 114 | 114 | | System Recalc Lead Time Y/N |
| PTCMLT | 3 | P | 115 | 116 | 0 | Cum Lead Time (Days) |
| PTSIMT | 3 | P | 117 | 118 | 0 | Simul Cumulative Lead Time (Days) |
| PTLGRS | 15 | A | 119 | 133 | | Longest Cumulative Lead Time Resource # |
| PTLGLT | 3 | P | 134 | 135 | 0 | Longest Cumulative Lead Time (Days) |
| PTREPT | 1 | A | 136 | 136 | | Reportable Task Y/N |
| PTDEPD | 1 | A | 137 | 137 | | Dependencies on Task Y/N |
| PTNMDP | 3 | P | 138 | 139 | 0 | Number of Dependencies |
| PTCRIT | 1 | A | 140 | 140 | | Critical Point Task Y/N |
| PTSENS | 4 | P | 141 | 143 | 3 | Sensitivity Factor |
| PTSTST | 1 | P | 144 | 144 | 0 | Stream Resource Status 0—Task has zero streams 1—consumed streams 2—produced streams 3—both consumed and produced streams |
| PTDTMT | 6 | P | 145 | 148 | 0 | Date Last Maint |
| PTBLNK | 15 | A | 149 | 163 | | Blank area |

SECTION V

SECTION V-I

Section 2-2: Cost Rollup Report—Actual

When To Use Cost Rollup Report—Actual

Take this report option periodically to calculate, or rollup, the cost of your produced resources. PRISM calculates the cost of production by adding up the cost of all consumed resources used in that production.

You may rollup whatever PM, range of PMs, or produced resources you like. The options and limits of the Cost Rollup report are many and varied. Each is explained in detail later in this section. You may run only one cost rollup at a time. Attempt more than one at a time and PRISM will print your report with a message that tells you the program was in use.

Only run this rollup program when you want to update your PRISM master files with new rolled up cost data. If you are interested in experimenting with costs only and do not want to update your files, run your Cost Rollup Report—Simulated (Section 2-3 of this reference manual). That report gives you a chance to see how production costs would be affected given different information. The actual rollup, however, uses and updates "real" resource data currently in you RP and RM master files.

Cost Rollup performs a variety of functions. It calculates and prints produced resource costs per standard unit of measure, per PM batch size, and per task batch size. It subtracts the value of any net realizable value produced resources from this total cost and then distributes the balance cost of production among the remaining end produced resources, using the cost distribution percentages you assigned to each produced resource.

The program applies the cost of each consumed resource to the direct, fixed overhead, or variable overhead cost of the produced resource. Total direct and overhead costs are also calculated for each task. If the system is assigned to recalculate lead times for the PM being rolled, the Cost Rollup Report also shows adjusted lead times for the task and for the PM, reflecting any changes you have made to task information.

For a detailed list of the master file fields updated by Cost Rollup and a step-by-step explanation of the rollup process and calculations, see your RP logic manual.

If the system is assigning PM cost level codes for you (see PM Maintenance), you must run your Cost Level Code Calculator (Section 5-1) before performing Cost Rollup.

Important Note: The Cost Rollup program does not consider whether a user profile is authorized to see costs. If you do not want a user profile to have access to the cost information displayed on the rollup report, then you must completely restrict them from the report option through Foundation Security Clearance Maintenance. See Section 4-10 of your Foundation reference manual for details.

How To Use Cost Rollup Report—Actual

When you select Option 2 from the Report Menu, PRISM displays the Defaults Selection Screen. You may override defaults for limits, options, and printer. You may also save your report selections. These selections determine which, if any, additional selection screens are displayed when you press ENTER. The limits you set here affect what is printed on the report, but do not affect what information is used to perform the actual calculations.

IMPORTANT NOTE: The limits you define affect what shows up on the report; but the options you define determine what information is actually used for the rollup.

Sections of the RP reference manual concerning specific reports assume that the reader is familiar with the information in the *Introduction to RP Reports*, Section 2-A. Therefore, this section provides only a list of the limits and options available for running this report, and an illustration of it. For a description of how to run any report, please refer to Section 2-A of this manual.

Available Limits:

PM Type.
* PM Name.
* Resource.
Class.
Sub-Class.
Warehouse.

Available Options:

One-Time Comments—PRISM prints on the top of your report any one-time special comments, instructions, or explanations you enter here.

PROCESSING OPTION—B to run the job in batch using the job queue, I to run it interactively, S to submit the job to the Scheduler for later processing.

COST LEVEL DETAIL—You may print your Cost Rollup Report in four different formats:

1. Resource Summary—the default. For each task, PRISM prints the cost for each produced resource and each consumed resource within your defined limits. For each produced resource, the report shows cost per std UM, cost per task batch, cost per PM batch, and the cost distribution percentage you assigned. For each consumed resource, the report shows total direct, fixed overhead, and variable overhead cost.
2. PM with Class/Sub-Class Breakdown—For each PM, this report shows consumed resource costs by resource class and sub-class. It also shows the cost total for each class/sub-class. The report does not associate the resources with any specific task on the PM.
3. PM with Task/Class/Sub-Class Breakdown—This format is identical to option 2 with the addition of a task summary line. For each PM task, the report shows the same consumed resource costs grouped by resource class/sub-class. This report also prints the total cost of each task.
4. Task Cost Breakdown—This format breaks down consumed resource costs by PM task. For each resource consumed by the task, it prints the total direct, fixed overhead, and variable overhead cost by resource class/sub-class. It then totals the cost for the task. For manufactured resources consumed by the task, it breaks costs down by the current PM and lower PM level.

Effectivity Date For Comparison—The date you enter here affects what appears on the report AND how it is calculated. PRISM only uses resources that have an effectivity date range that includes the date you enter here.

FULL OR SELECTIVE COST ROLLUP (F/S)—Use this field to tell PRISM the general type of rollup you want to perform. Leave the default as F to perform a full rollup of all PMs of a given PM type. Enter S to rollup only selected PMs.

When you press ENTER, PRISM displays the Options Selection Screen. Here you further define the type of cost rollup you want to run. The available entry fields on this second Options screen vary depending on whether you enter S or F in this field and whether you are running an actual or simulated rollup. Screens for both an actual and simulated rollup are displayed and explained here because they are so similar. You may need to refer to this section, then, when you want to run a simulated cost rollup.

Options Selection Screen—MDR02404
Actual Full Cost Rollup (See Figure 20)

Options Selection Screen—MDR02404
Simulated Full Cost Rollup (See Figure 21)

Options Selection Screen—MDR02404
Actual Selective Cost Rollup (See Figure 22)

Options Selection Screen—MDR02404
Simulated Selective Cost Rollup (See Figure 23)

Use this screen to tell PRISM which PMs you want to rollup. Only some of these options are available on each screen.

USE PM TYPE TAILORING LIMIT (Y/N)—This field is only available for entry during an actual full rollup. Enter Y if you want to rollup only those PMs with the type code you defined in RP tailoring question #1. This assumes that you have assigned all of your financial or prime costing PMs the same type code. Leave the default as N if you do not want to limit the rollup to PMs of this type. If you enter Y in this field, the only other option allowed is PM Type (alternate).

SINGLE LEVEL OR FULL COST ROLLUP (S/F)—If you want PRISM to rollup only the selected PMs, enter S for single level. If you want PRISM to cost the selected PMs and all related PMs from the highest to lowest level, enter F for full level.

PM type to Rollup—This field applies to the simulated, full rollup only. If you want to rollup PMs of a specific type, enter the type code here.

PM type (alternate to cost rollup PM type)—This field applies to a simulated, full rollup on'y and works in conjunction with the PM type to Rollup field above. If you entered a PM type to Rollup, you may specify an alternate dependent PM type here. When PRISM finds a PM of the PM type to Rollup, it checks to see if a dependent PM with the SAME NAME exists with this alternate type code. If the dependent PM of the same name as the parent PM, but of this alternate PM type, does exist PRISM rolls up the alternate PM rather than the parent.

Important: For this field combination to work, the alternate PM must be dependent on the parent PM and must have the same PM Name as the parent PM. Only the PM type codes vary.

Range of PMs to Rollup—for simulated and actual selective rollups only. Enter the range of PM Type/Names you want to rollup. You may rollup all of the PMs within this range, but only print cost data on your report for the range defined on the Limits Selection Screen.

If you enter this field, you may NOT enter a Range of Produced Resources to Rollup or a List of Produced Resources to Rollup.

Range of Produced Resources to Rollup—for simulated and actual selective rollups only. Enter the range of produced resources you want to rollup. Use this Option field if you know the resource numbers but not the producing PM Type/Names. You may rollup this entire resource range, but limit the actual data printed on the report using the Limits Selection Screen.

If you enter this field, you may NOT enter a Range of PMs to Rollup or List of Produced Resources to Rollup.

List of Produced Resources to Rollup—for simulated and actual selective rollups only. You may list up to 10 produced resources that you want to rollup.

If you enter this field, you may NOT enter a Range of PMs to Rollup or a Range of Produced Resources to Rollup.

Only Cost all Previously Uncosted Resources (Y/N)—for simulated and actual selective rollups only. Leave the default as N if you want to cost all resources you defined above. Enter Y to rollup only produced resources with no previous rolled cost. If you enter this field, you may NOT enter a Range of Produced Resources to Rollup or any of the All PMs that Produce fields. You may enter this field as your only rollup limit.

You may not enter any of the following fields if you entered a Range of PMs to Rollup, Range of Produced Resources to Rollup, or List of Produced Resources to Rollup All PMs that Produce Resource—for simulated selective rollups only. You may limit your rollup to all PMs that produce a given resource by entering the number of the produced resource here. This allows you to compare the costs of all PMs for any one resource. If you enter this field, you may NOT enter either the All PMs that Produce Class or All PMs that Produce Sub-Class fields.

All PMs that Produce Class—for simulated selective rollups only. You may limit your rollup to all PMs that produce a resource in this class by entering the Class here. You may enter this Option limit alone or in conjunction with All PMs that Produce Sub-Class below.

All PMs that Produce Sub-Class—for simulated selective rollups only. You may limit your rollup to all PMs that produce a resource in a given sub-class by entering the sub-class here and the class in the option field above.

Cost tolerance %—for simulated rollups only. PRISM only prints rollup cost information for a produced resource if the difference between this new cost and the previous cost is equal to or greater than the tolerance percentage you enter here. You may enter any tolerance with up tc two digits and five decimal positions.

Possible Rollup Errors

If PRISM is unable to perform the requested rollup, it *prints* an error page at the end of each report explaining why. Below are listed possible errors.

1. You defined the cost rollup costing method for a consumed resource as R for rolled up, but you did not assign a prime costing PM to the resource. PRISM cannot calculate a rolled up cost if it does not know what PM to rollup. If you did define a prime costing PM, it may be invalid. Or it may be the same as the PM being rolled up, in which case an endless loop of rollups would occur.
2. You defined a prime costing PM, but PRISM found that prime costing PM does not produce the specified produced resource.
3. PRISM could not find a Resource Balance record for a consumed resource needed for the rollup, and this resource's cost is supposed to come from the Resource Balance File.
4. The consumed resource has a Resource Balance File record, but the specified rollup cost type is not defined. For example, the rolling average field is blank and you defined the resource cost rollup costing method as A for rolling average. In this case, PRISM lists the resource at the end of the report as a "zero cost" resource.
5. If you are performing a full level rollup and the Cost Rollup Costing Method for a resource is R for rolled up cost, PRISM looks to a lower level to get the cost for the resource. If no rolled up cost has been assigned to the resource yet, PRISM cannot complete the rollup, since it is missing needed cost information.
6. PRISM could not find a Resource Master record for the specified resource and this consumed resource's rollup cost is supposed to come from the Resource Mastser File.
7. A Resource Master File record exists for the resource, but the standard or fixed cost fields are blank. You have asked PRISM to use the standard or fixed cost of this consumed resource during the rollup. In this case, again, PRISM lists the resource as a "zero cost" resource.
8. A cost level code problem exists. Your PMs may be related in a way that would cause an endless loop of rollups. If you did not assign cost level codes yourself during PM Maintenance and have not run your Cost Level Code Calculator, no cost level codes have been assigned to these PMs. If you have assigned codes or run the program, the codes may be in error. You may need to enter a user-assigned cost level code to correct the problem and continue the rollup.

A sample of each of the Cost Rollup Report formats follows.

Cost Rollup Report—Resource Summary (See Figure 24)

PM Summary Line

1. PM Type.
2. * PM Name.
3. * PM Description.
4. Standard Batch Size—This is the quantity expressed by one run of the PM. For instance, you may consider the PM by the number of days it runs or the number of cases it produces.
5. UM—unit of measure in which the above PM standard batch size is expressed.

Task Summary Line

6. Task Name—PRISM breaks down the resource costs by PM task. It lists each task name in ascending order.
7. Task Description.
8. Task Batch Size.
9. UM—unit of measure.
10. Batch Equiv—number of task batches required to produce one PM batch.

Produced Resource Detail Line

11. * Resource—number of the rolled up produced resource.
12. Class.
13. Sub-Class.
14. Description.
15. Cost Per Std UM—actual or simulated rolled up cost for one standard unit of measure of the produced resource.
16. Cost Per Task Batch—actual or simulated rolled up cost of the quantity of the resource produced by one task batch. This equals the cost per standard unit of measure of the resource times the resource quantity produced in one task batch.
17. Cost Per PM Batch—actual or simulated rolled up cost of the quantity of the resource produced by one PM batch.

This equals the cost of one standard unit of measure of the resource times the PM batch quantity.

18. Std UM—resource standard unit of measure.
19. NRV Usage—Y if this resource has net realizable value. N if it does not. PRISM subtracts any net realizable value from the total cost of consumed resources before distributing costs to the other resources.
20. Cost Dist %—cost distribution percentage assigned to this resource during PM Maintenance. This field is blank if this resource has net realizable value.

Consumed Resource Detail Line

21. * Resource—number of the consumed resource.
22. Class.
23. Sub-Class.
24. Description.
25. Costing Method—cost rollup costing method. This indicates what cost was used to calculate the produced resource cost: F for fixed cost from Resource Master (RESMST), S for standard cost from RESMST, A for rolling average cost from Resource Balance (RESBAL), H for historical average cost from RESBAL, L for last complete period average cost from RESBAL, R for rolled up cost from the resource's prime costing PM.
26. Total Direct Cost—PRISM uses the consumed resource cost times the consumed resource quantity to calculate the Total Direct Cost. Consumed resource quantity equals required batch quantity plus any setup and cleanup quantities.

In RM Resource Master Maintenance, you assign each consumed resource a Cost Rollup Type Code. If F (fixed), PRISM applies the total cost of the consumed resource to the fixed overhead cost of the produced resource. If V (variable), PRISM applies it to the variable overhead costs of the produced resource. If N (normal), PRISM distributes the cost of the consumed resources normally, as direct, fixed and variable overhead costs of producing the resource.
27. Total Fixed Overhead—total of the consumed resource cost to be applied to the fixed overhead cost.
28. Total Variable Overhead—total of the consumed resource cost to be applied to the variable overhead cost.
29. * Resource with Longest Lead Time—Of the resources printed above, PRISM lists the number of the resource with the longest cumulative lead time and its lead time in days. If blank, this is the task stream resource.
30. Task Level Cumulative Lead Time—current cumulative lead time, in days, for this task. If you authorized PRISM to recalculate lead time, the adjusted lead time appears here. If not authorized to recalculate lead time, the lead time you defined on the Task Maintenance Screen in PM Maintenance appears.
31. PM Level Cumulative Lead Time—current cumulative lead time, in days, for this PM. If you authorized PRISM to recalculate lead time, the adjusted lead time appears here. If not authorized to recalculate lead time, the lead time you defined on the PM Maintenance Screen appears.

Cost Rollup Report—PM with Class/Sub-Class Breakdown (See Figure 25)

PM Summary Line

1. PM Type.
2. * PM Name.
3. PM Description.
4. Standard Batch Size—This is the quantity expressed by one run of the PM. For instance, you may consider the PM by the number of days it runs or the number of cases it produces.
5. UM.
6. Total PM Cost—total rolled up cost of the PM. This is the sum of the cost of all consumed resources less any net realizable value.

Consumed Resource Detail Line

PRISM lists all resources consumed by the PM, by resource class/sub-class in ascending order.

7. Class.
8. Sub-Class.
9. * Resource—number of the consumed resource.
10. Total Direct Cost—total of the consumed resource cost to be applied to the direct cost of the PM.
11. % of Total PM Cost—This equals consumed resource Total Direct Cost (field 10) divided by Total PM Cost (field 6).
12. Total Fixed Overhead—total of the consumed resource cost to be applied to the fixed overhead cost of the PM.
13. % of Total PM Cost—This equals consumed resource Total Fixed Overhead (field 12) divided by Total PM Cost (field 6).
14. Total Variable Overhead—total of the consumed resource cost to be applied to the variable overhead cost of the PM.
15. % of Total PM Cost—This equals the consumed resource Total Variable OH Cost (field 14) divided by Total PM Cost (field 6).

16. Sum of %—The sum of the percentages in fields 11,13, and 15 shows what percentage of the total PM cost comes from this consumed resource.

Totals for Class

17. Total Direct Cost—sum of all field 10 Total Direct Costs for each consumed resource detailed in this Class/Sub-Class.
18. % of Total PM Cost—sum of all field 11 % of Total PM Costs for each consumed resource detailed in this Class/Sub-Class.
19. Total Fixed OH Cost—sum of all field 12 Total Fixed OH Costs for each consumed resource detailed in this Class/Sub-Class.
20. % of Total PM Cost—sum of all field 13 % of Total PM Costs for each consumed resource detailed in this Class/Sub-Class.
21. Total Variable OH Cost—total of all field 14 Total Variable OH costs for each consumed resource detailed in this Class/Sub-Class.
22. % of Total PM cost—total of all field 15 % of Total PM Costs for each consumed resource detailed in this Class/Sub-Class.
23. Sum of %—sum of all Class/Sub-Class field 18, 20, and 22 percentage totals.

PM Totals

24. Total Direct Cost—total direct costs of this PM. This equals the total of all Class/Sub-Class field 17 totals.
25. % of Total PM cost—percentage of the total PM cost attributable to direct costs. This equals the total of all Class/Sub-Class field 18 totals.
26. Total Fixed OH Cost—total fixed overhead costs for this PM. This equals the sum of all Class/Sub-Class field 19 totals.
27. % of Total PM Cost—percentage of total PM costs attributable to fixed overhead. This equals the total of all Class/Sub-Class field 20 percentages.
28. Total Variable OH Cost—total variable overhead costs for the PM. This equals the sum of all field 21 Class/Sub-Class Total Variable OH Costs.
29. % of Total PM Cost—percentage of total PM costs attributable to variable overhead costs. This equals the total of all Class/Sub-Class field 22 percentage totals.

Cost Rollup Report—PM with Task/Class/Sub-Class Breakdown (See Figure 26)

PM Summary Line

1. PM Type.
2. * PM Name.
3. PM Description.
4. Standard Batch Size—This is the quantity expressed by one run of the PM. For instance, you may consider the PM by the number of days it runs or the number of cases it produces.
5. UM.
6. Total PM Cost—total rolled up cost of the PM. This is the sum of the cost of all consumed resources less any net realizable value.

Task Summary Line

7. Task Name—PRISM lists by Class/Sub-Class the resources consumed by this task.
8. Task Description.
9. Task Batch Size.
10. UM.
11. Batch Equiv—number of task batches required to produce one PM batch.
12. Total Task Cost—total rolled up cost for this task. This equals the cost of all consumed resources for the task. If this is the last task, this field equals the Total PM Cost.

Consumed Resource Detail Line

PRISM lists all resources consumed by the PM, by resource class/sub-class and in ascending sub-class order.

13. Class.
14. Sub-Class.
15. * Resource—number of the consumed resource.
16. Total Direct Cost—total of the consumed resource cost to be applied to the direct cost of the PM.
17. % of Total PM Cost—equals the consumed resource Total Direct Cost (field 16) divided by Total PM Cost (field 6).

18. Total Fixed OH Cost—total of the consumed resource cost to be applied to the fixed overhead cost of the PM.
19. % of Total PM Cost—equals the consumed resource Total Fixed Overhead Cost (field 18) divided by Total PM Cost (field 6).
20. Total Variable OH Cost—total of the consumed resource cost to be applied to the variable overhead cost of the PM.
21. % of Total PM Cost—equals the consumed resource Total Variable OH Cost (field 20) divided by Total PM Cost (field 6).
22. Sum of %—The sum of the percentages in fields 17, 19, and 21 shows what percentage of the total PM cost comes from this consumed resource.

Totals for Class

23. Total Direct Cost—sum of all field 16 Total Direct Costs for each consumed resource detailed in this Class/Sub-Class.
24. % of Total PM Cost—sum of all field 17 % of Total PM Costs for each consumed resource detailed in this Class/Sub-Class.
25. Total Fixed OH Cost—sum of all field 18 Total Fixed OH Costs for each consumed resource detailed in this Class/Sub-Class.
26. % of Total PM Cost—sum of all field 19 % of Total PM Costs for each consumed resource detailed in this Class/Sub-Class.
27. Total Variable OH Cost—total of all field 20 Total Variable OH Costs for each consumed resource detailed in this Class/Sub-Class.
28. % of Total PM Cost—total of all field 21 % of Total PM Costs for each consumed resource detailed in this Class/Sub-Class.
29. Sum of %—sum of all Class/Sub-Class field 24, 26, and 28 percentage totals.

PM Totals

30. Total Direct Cost—total direct costs of this PM. This equals the total of all Class/Sub-Class field 23 totals.
31. % of Total PM cost—percentage of the total PM cost attributable to direct costs. This equals the total of all Class/Sub-Class field 24 totals.
32. Total Fixed OH—total fixed overhead costs for this PM. This equals the sum of all Class/Sub-Class field 25 totals.
33. % of Total PM Cost—percentage of total PM costs attributable to fixed overhead. This equals the total of all Class/Sub-Class field 26 percentages.
34. Total Variable OH—total variable overhead costs for the PM. This equals the sum of all field 27 Class/Sub-Class Total Variable OH Costs.
35. % of Total PM Cost—percentage of total PM costs attributable to variable overhead costs. This equals the total of all Class/Sub-Class field 28 percentage totals.

Cost Rollup Report—Task Cost Breakdown (See Figure 27)

PM Summary Line

1. PM Type.
2. * PM Name.
3. PM Description.
4. Standard Batch Size—This is the quantity expressed by one run of the PM. For instance, you may consider the PM by the number of days it runs or the number of cases it produces.
5. UM.
6. Total PM Cost—total rolled up cost of the PM. This is the sum of the cost of all consumed resources less any net realizable value.

Task Summary Line

7. Task Name—PRISM lists by Class/Sub-Class the resources consumed by this task.
8. Task Description.
9. Task Batch Size.
10. UM.
11. Batch Equiv—number of task batches required to produce one PM batch.

Consumed Resource Detail Line

PRISM lists all resources consumed by the PM Task in ascending order by resource number.

12. * Resource.
13. Class.
14. Sub-Class.
15. Lvl Cl Code—the level class code assigned to this resource in RM Resource Master Maintenance. The cost of a produced resource can be broken down by resource class and sub-class. This code tells the system how closely to look at the cost of a consumed resource when rolling up the cost. If the level class code for a consumed resource is A, the system uses the cost rollup costing method for the consumed resource to determine its cost. If its level class code is B, the system looks down another level, to the prime costing PM for that resource, to find the components of its cost.

16. Total Direct Cost—total of the consumed resource cost to be applied to the direct cost of the PM.
17. % of Total PM Cost—equals the Total Direct Cost (field 16) divided by Total PM Cost (field 6).
18. Total Fixed OH Cost—total of the consumed resource cost to be applied to the fixed overhead cost of the PM.
19. % of Total PM Cost—equals the Total Fixed OH Cost (field 18) divided by Total PM Cost (field 6).
20. Total Variable OH Cost—total of the consumed resource cost to be applied to the variable overhead cost of the PM.
21. % of Total PM Cost—equals the Total Variable OH Cost (field 20) divided by Total PM Cost (field 6).

Task Totals—This Level

PRISM adds up cost totals for all task consumed resources with level class code A. See the Level Class Code field description above for details.

22. Total Direct Cost—sum of all field 16 Total Direct Costs for consumed resources on this task with level class code A.
23. % of Total PM Cost—sum of all field 17 % of Total PM Costs for consumed resources with level class code A.
24. Total Fixed OH Cost—sum of all field 18 Total Fixed OH Costs for consumed resources with level class code A.
25. % of Total PM Cost—sum of all field 19 % of Total PM Costs for consumed resources with level class code A.
26. Total Variable OH Cost—total of all field 20 Total Variable OH Costs for consumed resources with level class code A.
27. % of Total PM cost—total of all field 21 % of Total PM Costs for consumed resources with level class code A.

Task Totals—Lower Level

PRISM adds up cost totals for all consumed resources with level class code B, lower level.

28. Total Direct Cost—sum of all field 16 Total Direct Costs for consumed resources on this task with level class code B.
29. % of Total PM Cost—sum of all field 17 % of Total PM Costs for consumed resources with level class code B.
30. Total Fixed OH—sum of all field 18 Total Fixed OH Costs for consumed resources with level class code B.
31. % of Total PM Cost—sum of all field 19 % of Total PM Costs for consumed resources with level class code B.
32. Total Variable OH—total of all field 20 Total Variable OH Costs for consumed resources with level class code B.
33. % of Total PM cost—total of all field 21 % of Total PM Costs for consumed resources with level class code B.

Totals for Task

34. Total Cost—total rolled up cost for the task. This is the sum of all total direct, total fixed overhead, and total variable overhead costs of consumed resources for the task.
35. Total % of PM Cost—This equals the Total Cost (field 34) divided by Total PM Cost (field 6).

Totals for PM—This level

PRISM adds up all Totals for Task—This Level to get the PM total.

36. Total Direct Cost—total direct costs of all consumed resources on this PM with level class code A. This is the sum of all field 22 task totals.
37. % of Total PM cost—percentage of the total PM cost attributable to direct costs. This equals the total of all field 23 Task—This Level percentage totals.
38. Total Fixed OH—total fixed overhead costs of all consumed resources on this PM with level class codes of A. This equals the sum of all field 24 Task—This Level totals.
39. % of Total PM Cost—percentage of total PM costs attributable to level A fixed overhead costs. This equals the total of all field 25 Task—This Level totals.
40. Total Variable OH—total variable overhead costs of all level class code A consumed resources on this PM. This equals the sum of all field 26 Task—This Level totals.
41. % of Total PM Cost—percentage of total PM costs attributable to variable overhead costs of level class A resources. This equals the total of all field 27 Task—This Level totals.

Totals for PM—Lower level

PRISM adds up all Totals for Task—Lower Level to get the PM totals.

42. Total Direct Cost—total direct costs of all consumed resources on this PM with level class code B. This is the sum of all field 28 Task—Lower Level totals.
43. % of Total PM cost—percentage of the total PM cost attributable to direct costs. This equals the total of all field 29 Task—Lower Level percentage totals.
44. Total Fixed OH—total fixed overhead costs of all consumed resources on this PM with level class code B. This equals the sum of all field 30 Task—Lower Level totals.
45. % of Total PM Cost—percentage of total PM costs attributable to level B fixed overhead costs. This equals the total of all field 31 Task—Lower Level totals.
46. Total Variable OH—total variable overhead costs of all level class code B consumed resources on this PM. This equals the sum of all field 32 Task—Lower Level totals.
47. % of Total PM Cost—percentage of total PM costs attributable to variable overhead costs of level class B resources. This equals the total of all field 33 Task—Lower Level totals.

When To Use Cost Rollup Report—Simulated

Use this option when you want to calculate and print the rolled up costs for a PM or range of PMs and for all associated tasks and resources without updating your master files with the new cost data. This allows you to experiment with "what if" data to see how changing consumed resource costs will change overall production costs. You enter simulation data through Simulation Files Maintenance (Section 1-5) or Simulation Files Batch Update (Section 5-5).

How To Use Cost Rollup Report—Simulated

You follow nearly the same process to run a simulated rollup as you do for an actual rollup. Refer to Section 2-2 for details. Special instructions for a simulated rollup are given when applicable. Also see Sections 1-5, 5-5, and 5-6 for details on simulation files.

SECTION V-II

MDR020

Cost Roll Up Work File Build Program

A. This program builds work files used during a simulated cost rollup. The work files consist of current data from the master files and user maintained data from the simulation files. Each work file is built by a separate subroutine.

Resource Master Simulation Work File (RESMSTWF)

The RESMST file is read sequentially. For each record, the program checks if a record exists in the Resource Master Simulation File (RESMSTSM) by chaining to the file by Resource Number. If a record for the resource does not exist there, a record is written to RESMSTSM that is a copy of the record in the Resource Master File.

If a record exists in RESMSTSM, a record for the Resource Master Simulation Work File is built using information from both the Resource Master and Resource Master Simulation files.

The following fields are copied from RESMSTSM:

Net Realizable Value Usage
Net Realizable Value
Cost Rollup Costing Method
Standard Cost
Prime Costing PM Type
Prime Costing PM Name
Fixed Cost
Fixed Overhead Rate
Fixed Overhead Byte (dollar or %)
Fixed Overhead Table Value
Fixed Overhead Table/Rate
Variable Overhead Rate
Variable Overhead Table Value
Variable Overhead Byte (dollar or %)
Variable Overhead Table/Rate
Cost Rollup Level Class Code
Beginning Effectivity Date
Ending Effectivity Date PO Lead Time Qty Break
PO Lead Time 1
PO Lead Time 2
PO Lead Time Adjustment
Mfg Lead Time Qty Break
Mfg Lead Time 1
Mfg Lead Time 2
Mfg Lead Time Adjustment The remainder of the work file is built from the Resource Master File. If the simulation record does not exist, the fields listed above are copied from the Resource Master File in addition to the ones listed below:

Resource Number
Resource Description
Unit Of Measure
Shortage Flag
Order Policy Code
Fixed Order Amount
Days of Supply
Safety Time
Balance Resource Code
Resource Class
Resource Sub-Class
Reporting Class
Documentation Location Code
Marketing Product Line
Marketing Resource Class
Produced Product Line
Produced Resource Class
Standard Inventory Classification Code
Short Term Code
Intermediate Term Code
Long Term Code
Theoretical Consumption Code
Prime Planning PM Type
Prime Planning PM Name
Where-From Code
Switch Over Code
Potent Resource
Potency Factor
ABC Code
Date ABC Code Last Updated
Selected Unit Cost
Selling Price
Default Work Center
Number of Times Resource Used
Cost Rollup Type Code
Cost From Last Rollup
Cumulative Lead Time of Prime Costing PM
Date of Last Rollup
Actual Rollup Task Name
Simulated Rollup Task Name
Re-Plan Flag
Planning Sequence Number
Planning Level Code
Fixed Planning Level Code
MPP Code
Forward Scheduling Pegging Code
Miscellaneous Field One
Miscellaneous Field Two
Miscellaneous Field Three
Shelf Life Byte
Shelf Life Days
Recost Byte
Default Location for Consumption
Default Warehouse for Consumption
Commodity Code
Current Revision Level
Earliest Acceptable Revision Level
Planner Number
Buyer Number
Service Level %
Default Location Classif Code - PO/Misc Receipt
Default Location Classif Code - Production Receipt
Lot Control
Required From Location Classification Code
PO Lead Time for New Release
Recalculate Lead Time
Sales Lead Time
Minimum Purchase Quantity
Maximum Purchase Quantity
Multiple Purchase Factor
Graphics Code
Default Location - Production Receipt
Default Warehouse - Production Receipt
Date Last Maintenance

Resource Balance Simulation Work File (RESBALWF)

The Resource Balance File is read sequentially. For each record, the program checks if a record exists in the Resource Balance Simulation File (RESBALSM) by chaining to the file using Resource Number/Warehouse. If a record for the resource does not exist there, a copy of the appropriate record from the Resource Balance File is written to RESBALWF.

If a record does exist there, the program builds a record for the Resource Balance Simulation Work File using information from both the Resource Balance and the Resource Balance Simulation files.

The following fields are copied from RESBALSM:

Rolling Average Cost
Last Period Cost
Historical Average Cost

The remainder of the work file is built from the Resource Balance File. If the simulation record does not exist, the fields listed above are copied from the Resource Balance File in addition to the ones listed below.

Resource Number
Warehouse
Resource Class
Resource Sub-Class
Order Policy Code
Fixed Order Amount
Days of Supply
Safety Time
Safety Stock Cycle Count Method
Cycle Count Control Group
Date Last Cycle Count
Transaction Number Trigger
Number of Transactions Since Last Cycle Count
Selected For Next Cycle Count
Carrying Rate
Setup Cost
Quantity on Hand
Quantity Sold to Date
Mfg Allocated Quantity
Sales Allocated Quantity
Mfg Material Reserved Quantity
Sales Material Reserved Quantity
Total Quantity Present
Quantity On Order
Date of Last Activity
Date of Last Effect
Actual Production Total
Actual Consumption - Last Period Closed
Standard Consumption
PO Lead Time One
PO Lead Time Two
PO Lead Time for New Release
Mfg Lead Time One
Mfg Lead Time Two
PO Lead Time Adjustment
Mfg Lead Time Adjustment
Date Last Sale
Default Location for PO Receipt
Minimum Purchase Quantity
Maximum Purchase Quantity
Multiple Purchase Factor
Period Demand Quantity
Average Period End Balance
Actual Production - Last Period Close
Qty Break for Different PO Lead Time
Qty Break for Different Mfg Lead Time
Date Last Maintenance

Resource Class Simulation Work File (RECLASWF)

The Resource Class file is read sequentially. For each record, the program checks if a record exists in the Resource Class Simulation file (RECLASSM) by chaining to the file using Resource Class. If a record for the class does not exist there, a copy of the appropriate record in the Resource Class File is written to RESCLASWF.

If a record does exist there, the program builds a record for the work file using information from both the Resource Class and Resource Class Simulation files.

The following fields are copied from RECLASSM:

Resource Costing Method
Variable Overhead
Variable Overhead Byte ($ or %)
Variable Overhead Table Value
Variable Overhead Table/Rate
Fixed Overhead
Fixed Overhead Byte ($ or %)
Fixed Overhead Table Value
Fixed Overhead Table/Rate The remainder of the work file is built from the Resource Class File. If no simulation record exists, the above fields are copied from the Resource Class File in addition to the fields listed below:

Resource Class
Resource Class Description
Service Level %
Balance Resource Code
Theoretical Consumption Code
Standard Unit of Measure
Potent Resource
Potency Factor
Planner Number
Buyer Number
Action Horizon Days
Review Horizon Days
Cost Rollup Type Code
Selected Unit Cost
Reporting Class
Cost Rollup Level Class Code
Shelf Life Byte
Shelf Life Days
Lot Control
System Generated Planned POs
Date Last Maintenance

Resource Sub-Class Simulation Work File (RESUBCWF)

The Resource Sub-Class file is read sequentially. For each record, the program checks if a record exists in the Resource Sub-Class Simulation file (RESUBCSM) by chaining to the file using Resource Sub-Class. If a record for the sub-class does not exist there, a copy of the appropriate record in the Resource Sub-Class File is written to RESUBCWF.

If a record does exist there, the program builds a record for the work file using information from both the Resource Sub-Class File and the Resource Sub-Class Simulation File.

The following fields are copied from RESUBCSM:
Resource Costing Method
Variable Overhead
Variable Overhead Byte ($ or %)
Variable Overhead Table Value
Variable Overhead Table/Rate
Fixed Overhead
Fixed Overhead Byte ($ or %)
Fixed Overhead Table Value
Fixed Overhead Table/Rate The remainder of the work file is built from the Resource Sub-Class File. If no simulation record exists, the above fields are copied from the Resource Sub-Class File in addition to those listed below:

Resource Class
Resource Sub-Class
Resource Sub-Class Description
Service Level %
Balance Resource Code
Theoretical Consumption Code
Standard Unit of Measure
Potent Resource Potency Factor
Planner Number
Buyer Number
Action Horizon Days
Review Horizon Days
Cost Rollup Type Code
Selected Unit Cost
Reporting Class
Cost Rollup Level Class Code
Shelf Life Byte
Shelf Life Days
Lot Control
System Generated Planned POs
Date Last Maintenance

Overhead Rate Simulation Work File (OVHDRFWF)

The Overhead Rate file is read sequentially. For each record, the program checks if a record exists in the Overhead Rate Simulation file (OVHDRFSM) by chaining to the file. If no record exists there, a copy of the appropriate record in the Overhead Rate File is written to OVHDRFWF.

If a record does exist there, a record for the work file is built using information from both the Overhead Rate and Overhead Simulation Files.

The following fields are copied from the Overhead Rate Simulation File:

Overhead Rate
Overhead Rate Type ($ or %)

The remainder of the work file is built from the Overhead Rate File. If no record exists in the simulation file, the above fields are copied from the Overhead Rate File in addition to the one listed below:

Overhead Table Value

B.

| File | Usage |
|---|---|
| OVHDRF | IF |
| OVHDRFSM | IF |
| OVHDRFWF | O |
| RECLAS | IF |
| RECLASSM | IF |
| RECLASWF | O |
| RESBAL | IF |
| RESBALSM | IF |
| RESBALWF | O |
| RESMST | IF |
| RESMSTSM | IF |
| RESMSTWF | O |
| RESUBC | IF |
| RESUBCSM | IF |
| RESUBCWF | O |

MDR022

Cost Rollup Print Program

A. This program is used by two menu options. For the first (MDR020X) it performs an actual cost rollup and processes and updates the master files. For the second (MDR022X) it performs a simulated cost rollup and processes the simulation work files. For both options, the unique report prompter for this program (MDR024) is executed to determine the processing options. The program then performs the appropriate cost rollup and loads the results into work files. The results then may be printed by another program (MDR026).

Although the calculations are identical for an actual and simulated cost rollup, it is important to note that in a simulated cost rollup, work fields are updated instead of the actual master file fields.

MDR028 is called when a rollup is already running and another user attempts to initiate a separate rollup.

Full Cost Rollup. A full cost rollup runs through all PMs in the database. The rollup is performed on a PM until a consumed resource cannot be costed. If the consumed resource has a prime costing PM that is not yet costed, a record is written to the PMFULW work file indicating where the rollup was interrupted. On the next pass through the data base, additional PMs are costed if the prime costing PMs of their resources were costed during the previous pass. If the rollup was started on a previous pass, the PMFULW record is used to resume the rollup where it was interrupted.

The program continues circulating through the database, each time costing PMs where all resource costs are known, until it makes a pass and can find no additional PMs to cost.

Selective Cost Rollup. A selective cost rollup includes two sub-options. In a single level selective rollup, only the cost of one PM is determined. That means, no effort is made to rollup the costs of PMs that produce the component resources of that first PM.

In a full selective rollup, the rollup performed until a consumed resource is found with a prime costing PM that is not yet costed. At that point a record is written to the PMEXPW work file that indicates where the rollup was stopped. Then an attempt to rollup that resource's prime costing PM is made. The resource's prime costing PM is determined by chaining to the Resource Master File and checking the Prime Costing PM Type and Prime Costing PM Name fields. If this prime costing PM has a consumed resource that uses a rolled up cost with a prime costing PM that is not yet costed, another record is written to the PMEXPW work file and the process continues.

To prevent an infinite loop of rollups, the Cost Level Code of the PM just costed must be less than that of the next PM to be costed. If this is not true a message appears on the report indicating the Cost Level Code problem. The program adds a record to the ERRORS work file using the PM Type/PM Name that could not be rolled up as the keys. It then loads in a reason code of 6. When a PM is fully costed, the PMEXPW record is deleted from the work file and the previous PM continues where it was interrupted. This process continues until all PMs in the PMEXPW work file have been costed.

Reset Cost Rollup Byte. The Cost Rollup Byte is a work field in PMODEL that indicates whether a PM was rolled up during this run. To prevent the cost from a previous rollup from being used in the current rollup, all cost rollup bytes are set to N. This is done by reading through PMODEL sequentially, initializing the byte, and updating the file.

PM Selection: Actual Full Cost Rollup. Your answer to tailoring question #1 determines what PM Type is used for calculating the standard cost. If a PM Type is defined, only PMs of this type are selected for a full cost rollup. The PM Type defined is used to set lower limits to the PMODEL file, and the file is then read. Even if the tailoring file does have a PM Type defined, the user can select not to use that type to limit the rollup. If the user selects not to limit the rollup by PM Type or no entry is made in tailoring, all PMs are included in the rollup.

PM Selection: Simulated Cost Rollup. The user has a number of available options when running a simulated cost rollup. They are listed below. The text following each option indicates whether this option is valid for a full cost rollup (F), selective cost rollup (S), or both (F/S). Only one of these options may be selected for each run of the cost rollup program.

PM Type to Rollup (F)
PM Type Alternate to Rollup (F/S)
Range of PMs to Rollup (S)
Range of Produced Resources to Rollup (S)
All PMs That Produce Resource (S)
All PMs That Produce Class (S)
All PMs That Produce Sub-Class (S)
List of Produced Resources to Rollup(S)
Only Cost all Previously Uncosted Resources (S)

A full cost rollup can be restricted to include only PMs of a designated type. The PM Type/blank PM Name are used to set lower limits to the PMODEL file and a READE operation is done (key = PM Type). If the READE is successful, the PM is included in the rollup.

An alternate PM Type can be entered for both a selective and full cost rollup. In this case, a dependent PM (alternate PM Type/parent PM Name) can be rolled up in place of the independent PM. Lower limits are set to the PMODEL file using cost rollup PM Type/blank PM Name and a series of READE operations is done.

For every successful READE (key = PM Type), the Dependencies on This PM field is checked. If it is Y, a chain is made to PMODEL using alternate PM Type/original PM Name. If the chain is successful, the program checks the parent PM Type and Name. If they are the same as the original PM Type and Name, the dependent PM is rolled up in place of the original PM. Otherwise, the original PM is rolled up.

During a selective, simulated rollup, if a range of PMs is specified, lower limits are set to the PMODEL file using the PM Type lower limit/PM Name lower limit. All PMs within the selected limits are processed. This program ends when the PM Type upper limit is passed.

The user can choose to rollup all PMs that produce a specific resource. With this option, lower limits are set to the PMRESRRS file using Resource Type = P/Resource Number, and a READE operation is done. If the READE is successful, the PM is rolled up.

The user can also rollup all PMs that produce a specific resource class or resource class/sub-class combination. With this option, temporary logical views of PMRESR are read sequentially, and PMRESR02 is processed. Lower limits are set to the PMRESR02 file, and a READE operation is done. If the READE is successful, the PM is included in the rollup.

PM Selection: Selective Cost Rollup. If PM limits are specified, lower limits are set to the PMODEL file using PM Type lower limit/blank PM Name, and the file is read sequentially. If the record is within the limits, it is included in the rollup. The program ends when the PM Type upper limit is passed.

The user can also cost up to ten produced resources. Lower limits are set to the PMRESRRS file using Resource Type = P/Resource Number, and a series of READE operations is done. All PMs that produce the resource(s) are processed.

If a range of produced resources is selected, lower limits are set to the PMRESRRS file using Resource Type = P/Resource Number lower limit.

If the option to recost all previously uncosted resources is selected, the PMRESR01 file is processed sequentially and a series of READE operations is done using Resource Type = P/Date Last Rollup = 0. If the READE is successful, the record is processed. This procedure is repeated until the READE operation fails.

Deleting TSKCST Records. TSKCST records from the last rollup are deleted to prevent their accumulation. Lower limits are set to the TSKCST file using PM Type/PM Name (all other key fields are blank). A series of READE operations is done using PM Type and PM Name. For every successful READE, the TSKCST record is deleted.

Processing of Tasks. Tasks on the PMs are processed in ascending order. For a dependent PM, task records from the parent PM are used. To retrieve the tasks, lower limits are set to the PMTASKSQ file using parent PM Type/parent PM Name, and a READE operation is done. If the READE is successful, the consumed resources on this task are processed. For an independent PM, lower limits are set to the PMTASKSQ file using PM Type/PM Name, and a READE operation is done.

Processing of Consumed Resources. After a task has been read, the program checks if each resource has an available cost. To retrieve the resources, the PMRESR file is processed. For a dependent PM, parent PM Type/parent PM Name/Task Name/Resource Type = C are used to set lower limits to the PMRESR file, and a READE operation is done. If the READE is successful, the program determines if any changes have been made to this resource. The key field values (parent PM Type, parent PM Name, Task Name, Resource Type, Resource Number) are saved before continuing.

Then dependent PM Type/dependent PM Name/Task Name/Resource Type = C/Resource Number are used to CHAIN to the PMRESR file. If the CHAIN is successful, the information from this record is used instead of that retrieved using parent PM Name. To return to the next resource from the parent PM, greater than limits are set using the saved key fields, and the file is then read.

For an independent PM, the PM Type/PM Name/Task Name/Resource Type = C are used to set lower limits to the PMRESR file, and a READE operation is done.

If the READE is successful, the effectivity dates of the resource are checked against the user-entered effectivity dates. If this date is greater than or equal to the beginning effectivity date, and less than or equal to the ending effectivity date, the resource is included in the rollup. A chain is made to the RESMST file using Resource Number to retrieve the Cost Rollup Costing Method. If this field is blank, the sequence for retrieving its default is Resource Sub-Class File (RESUBC), Resource Class File (RECLAS), and finally the RM Tailoring File.

Determining Resource Cost. The cost of each consumed resource is determined by the Cost Rollup Costing Method defined in RESMST. If the costing method is blank in RESMST, the defaulting scheme is Resource Sub-Class File, Resource Class File, and finally the RM Tailoring File.

If the costing method is defined to be either standard cost or fixed cost, these costs are retrieved from the RESMST file. Otherwise the Resource Number/Consumed From Warehouse (from PMRESR) are used to chain to RESBAL to retrieve the cost. If no RESBAL record is found, an error is signalled, the cost is set to zero, and the rollup is continued. A chain is made to the ERRORS work file using Code = R/Resource Number. If the chain fails, a record is added to the file with a reason code of 4.

If the costing method indicates that rolled up cost is to be used, a chain is made to the PMODEL file using prime costing PM Type/prime costing PM Name. If the Cost Rollup Byte = Y, the rolled up cost is retrieved from the prime costing PM. The name of the task where the rolled up cost came from is stored in RESMST.

Prime Costing PM Type/Prime Costing PM Name/Task Name/Resource Type = P/Resource Number is used to chain to the PMRESR file. If the chain is successful, a cost is available. If the chain fails, the signal "Task on Prime PM Does Not Produce Resource" (reason code = 3) is loaded. If no prime costing PM is defined, the signal "No Prime Costing PM Defined" (reason code = 1) is loaded. If an invalid prime costing PM was defined, the signal "Invalid Prime Costing PM Defined" (reason code = 2) is loaded.

In all three cases the cost is assumed to be zero, and the rollup is continued. Then a chain is made to the ERRORS work file using Code = P/PM Type-PM Name (concatenated). If the chain fails, a record with the reason code corresponding to the error is added to the file. If the Cost Rollup Byte = N on the prime costing PM, a cost for this resource is not available now.

If this occurs during a full cost rollup, a record is written to the PMFULW work file (keyed by PM Type and PM Name). This indicates the PM Type and Name, Task Sequence Number, Resource Number, Total Direct Cost, Fixed Overhead Cost, Variable Overhead Cost, the longest resource lead time, and the resource where the rollup was interrupted. This feature allows the rollup to resume where it left off on a future pass through the data base.

If it occurs during a selective cost rollup, a record is added to the PMEXPW work file. PMEXPW is keyed by a sequence number that is incremented by one each time a record is added to the file. This file indicates the PM Type and Name, Task Sequence Number, Resource Number, Total Direct Cost, Fixed Overhead Cost, Variable Overhead Cost, the longest resource lead time, and the resource and PM dependency codes that were current when the rollup was interrupted.

The prime costing PM cannot be the same as the PM currently being rolled up. If this is not the case, the appropriate error condition is added to the ERRORS work file: "Cost level code problem" (Reason Code = 7), or "Prime PM defined is the same as the PM being rolled" (Reason Code = 8). The program also takes the Rolled Up Cost from Last Rollup from RESMST and then continues the rollup. Once a PM is completely rolled up, the PMEXPW record for that PM is deleted, 1 is subtracted from the sequence number, and the rollup for the previous PM resumes. This procedure continues until there are no more records in the PMEXPW work file. Then another PM is selected and processing begins on that PM.

If a rolled up cost is available during a full rollup, a chain is made to the PMRESR file using prime costing PM Type/prime costing PM Name/Task Name/Resource Type = P/Resource Number. The Rolled up Cost Per Standard UM (field name = PRUNTC) is used for an actual cost rollup. For a simulated cost rollup, the simulated cost (PRSIMC) is retrieved instead.

If the rolled up cost is available during a selective rollup, the cost is retrieved from the RESMST file. A chain is made to the RESMST file using Resource Number and the Rolled up Cost from Last Rollup. If no cost is defined, this is an error condition (Reason Code = R), but the program assumes the cost is zero and the cost rollup continues.

Even if a consumed resource has a cost of zero, it is still used in the cost rollup. Consumed resources that have a cost of zero, however, are printed at the end of the report. To facilitate this function, a chain is made to the ERRORS work file using Code = R/Resource Number. If the chain is unsuccessful, a record is added to the work file.

Application of Fixed and Variable Overhead Rates. After the unit cost of a resource has been determined, the fixed and variable overheads are calculated. The functions described below are done twice, once for fixed and once for variable overhead. First, the Resource Master File is checked for the value in the Overhead Table/Rate field, which determines whether to use the overhead rate (R) or the overhead table value (T). If the field is blank in RESMST, the defaulting scheme is RESUBC, RECLASS, then RM Tailoring.

The Table Value, Overhead Rate, and Overhead Code are then retrieved from the same file in which the Overhead Table/Rate was found. If the Table/Rate field indicates a rate (R) should be used, the Overhead Code is checked to determine whether the rate represents a dollar value (D) or a percentage (P). If this field is blank, the program assumes it is a dollar value. If the table value should be used, the table value is used to chain to the Overhead Rate File (OVHDRF) to retrieve the rate. That record indicates whether the rate is a percentage or dollar value. Once the rate is determined it is applied as follows:

The quantity of the resource is the sum of 1) the quantity relative to the PM batch size, 2) cleanup quantity, and 3) setup quantity.

If the rate is in dollar form:

- Overhead Cost = dollar value × quantity of resource

If the rate is in percentage form:

- Overhead Cost = percentage × resource cost × quantity of resource

Total Calculations. The Total Direct Cost, Total Fixed Overhead, and Total Variable Overhead are maintained for each task. The Cost Rollup Type Code in the PMRESR file indicates whether to rollup cost normally (N), to roll total cost into fixed overhead bucket (F), or to roll total cost into variable overhead bucket (V). If the field is blank, the code is retrieved from the RESMST file.

In the first case, each of the calculated costs is added to their respective total fields. The resource amount (unit cost × sum of run, cleanup, and setup quantity) is added to the Total Direct Cost; the fixed overhead is added to the Total Fixed Overhead; and the variable overhead is added to the Total Variable Overhead. If the Cost Rollup Type Code equals F or V, the three costs are summed together and added to either the Total Fixed Overhead or the Total Variable Overhead, respectively.

Distribution of Costs Among Produced Resources. When all the consumed resources for a task have been processed, the rolled up cost is distributed among the produced resources. Any produced resource coded to have net realizable value has the quantity relative to PM batch size extended by its net realizable value (RESMST). This amount is then deducted from the rolled up cost prior to any distribution among other resources. If the result is less than zero, the value is set to zero to prevent calculations that would result in negative costs.

The cost of all non-net realizable value produced resources is calculated using their cost distribution percentages. In order to calculate the total cost of a PM, total costs for both stream and non-stream resources must be obtained. The total cost for stream resources is subtracted from the total cost for the task, yielding the total cost for non-stream resources. These figures are updated into the TSKPRT work file to be used when calculating the total cost of the PM.

The following calculations provide an example:

| Produced Resource | A | B | C | D | E |
|---|---|---|---|---|---|
| Cost Distribution % | 40% | 10% | 20% | 30% | 0% |
| NRV Usage (Y/N) | N | N | N | N | Y |
| Net Realizable Value | | | | | $10 |
| Qty Relative to PM Batch Size | 10 | 30 | 20 | 10 | 3 |
| Batch Equivalence | 2 | | | | |

Total Undistributed Cost = $110
(total cost of consumed resources on the task)

1. Calculate cost of net realizable value.

3 x $10 = $30

2. Deduct that cost from the total undistributed cost.

$110 - $30 = $80 (adjusted undistributed cost)

3. Multiply Cost Distribution % by adjusted undistributed cost to obtain the total rolled up cost relative to PM Batch Size for Resource A.

40% x $80 = $32

4. Divide the total rolled up cost relative to PM Batch Size by the Quantity Relative to PM Batch Size to obtain the total rolled up cost per PM batch.

Total cost per PM batch = $32/10 = $3.20

5. A chain to the PMTASK file using PM Type/PM Name/Task Name determines if the PM batch size and task batch size are not equal. If the chain is successful and the standard batch size for the task is not zero, the total rolled up cost for task batch size is calculated. The cost of the task batch is divided by the Batch Equivalence.

Rolled up cost for task = $32/2 = $16

The stream resource total distributed cost is carried up to the next higher task.

Updating the TSKCST file. After the cost of each resource is found, the program determines whether the costs of the resource should be rolled into this level class and sub-class or the lower level class and sub-class. This is defined by the Level Class Code in RESMST. If the code is blank there, the defaulting scheme is RESUBC, RECLAS, then RM Tailoring.

If the Level Class Code = A, a chain is made to the TSKCST file by PM Type/PM Name/Task Name/Class/Sub-Class. A record is added or updated (updated by increasing the cost amounts already in the record) depending on whether the chain was successful.

If the Level Class Code = B, the program determines what the prime costing PM is. The last task that produced this resource is stored in RESMST, with separate fields for simulated and actual rollups. To retrieve the lower level costs, lower limits are set to the TSKCST file by PM Type/PM Name/Task Name, and a series of READE operations is done.

For every successful READE, the previous task cost is adjusted by the Cost Distribution % and the quantity ratio, and the record for this task is either added or updated to the file. The quantity ratio is equal to the consumed resource quantity on the PM being rolled divided by the produced resource quantity on the prime costing PM. If the Level Class Code = B, but there is no prime costing PM for the resource, the TSKCST file is updated as if the Level Class Code was A.

If this is a stream resource, its cost is equal to the cost of the previous task. To retrieve that cost, lower limits are set to the TSKCST file by PM Type/PM Name/saved Task Name, and a series of READE operations is done. For every successful READE, the previous task's cost is adjusted by the Cost Distribution % and the quantity ratio, and the record for this task is added or updated to the file.

Calculation of Lead Time. The cumulative lead time for a task consists of the move time of the task, total lead time from operations, and the longest lead time of all its resources. The calculation of lead time is done while rolling up cost.

First, a field in PMODEL determines whether the system should recalculate lead time for a PM. If not, the cumulative lead time defined for the PM is used, and the task is never checked. Otherwise, the program checks whether the system should recalculate lead time for this specific task. If not, the cumulative lead time already defined from the task is used. Note well that any fixed cumulative lead times are replaced when the system is instructed to calculate lead times.

If the system is calculating lead times, the move time for the task is moved into accumulating buckets (days, hours, minutes). Then the operations for the task are retrieved. Lower limits are set to the PMOPER file using PM Type/PM Name/Task Name, and a READE operation is done. If the READE is successful, the Schedule Code is checked. If this code indicates that the user-defined schedule time is used, the schedule is added to the accumulating buckets.

If the system-calculated time should be used, the setup time and move time of each operation are added to the accumulating buckets. The run time is accumulated in its own total fields. When the last operation for this task has been processed, the total run time of the operations is converted so it is expressed relative to the PM batch size. Finally, the run time is added to the move time and converted to days. The program follows the steps listed below.

1. The time may be expressed in relation to task batch size instead of the PM batch size. This occurs when the batch equivalence for the task is not one. To convert run time so it is relative to PM batch size, batch time is multiplied by batch equivalence. If the operation uses batch consumption, the batch equivalence is rounded up to the nearest integer before multiplying.
2. Minutes are converted to hours by dividing total minutes by 60 and rounding up to the nearest integer.
3. Hours are converted to days by dividing total hours by the number of hours in a day defined in the system tailoring file, and rounding up to the nearest integer.

Once the total lead time for operations has been converted to days, the longest lead time of all consumed resources for this task is also added in. The longest lead time is determined as the PMRESR record is read. The lead time used depends on whether this is a purchased, manufactured, or stream resource. For a stream resource, PM Type/PM Name/Task Name are used to chain to the PMTASK file and the cumulative lead time is retrieved. The Longest Cumulative Lead Time Resource on the PMTASK record remains blank if the stream resource has the longest lead time.

If this is a purchased or manufactured resource, the following information is retrieved from a previous chain to RESMST. If the Where From Code = P (purchased resource), the PO Lead Time Qty Break is checked. If the resource quantity is less than this quantity break, PO Lead Time 1 is used. Otherwise, PO Lead Time 2 is used. In either case, the PO lead Time Adjustment is added to the PO Lead Time.

If the Where From Code = M (manufactured resource), the Cumulative Lead Time for Prime Costing PM from RESMST is used. If this field is zero, the Mfg Lead Time is determined in the same way that PO lead time is calculated. In either case, the Mfg Lead Time adjustment is added to the Mfg Lead Time. A field containing the longest lead time up to this point is maintained. After each resource's lead time is determined, it is compared to this field. If the lead time of the resource is greater than the present value of the longest lead time, the field is updated with the new value.

Cumulative lead time is calculated for dependent PMs, but is not updated to the PMODEL or PMTASK files.

The cumulative lead time for a task is not affected by any change in the batch equivalent from the PMTASK file. The lead times are valid for any number of task batches.

Summary Of Updates. When the calculations for a resource are complete, the following fields in PMRESR are updated if this is an actual cost rollup:

Rolled Up Cost Per Std UM (PRUNTC)
Total Rolled Up Cost Per Task Batch Size (PRTSKC)
Total Rolled Up Cost Per PM Batch Size (PRPMCS)
Previous Rolled Cost Per Std UM (PRPVCS)
Cost Type that identifies cost used in rollup (PRCSTP)
Date Last Rollup Previous Rolled Cost Per Std UM contains the rolled cost before this run. If this is the prime costing PM of a produced resource, a chain is made to the RESMST file using prime costing PM Type/prime costing PM Name. The Rolled Up Cost Per Std UM, the task that the rolled up cost came from, the Date of Last Rollup, and the Cumulative Lead Time are all updated. If the chain fails, this update is not made. During a simulated cost rollup, the only update is to the Simulated Cost Value (PRSIMC) in PMRESR.

In addition, a chain is made to the TSKCST file, and, if successful, the record is updated by increasing the cost amounts already in the record. If unsuccessful, a record is added.

When all resources for a task have been processed, a number of updates are done. During a simulated cost rollup, the only update is to the Simulated Cumulative Lead Time (PTSIMT) field. During an actual cost rollup, however, PMTASK is updated with the following:

Cumulative Lead Time (PTCMLT)

Resource Number

Longest resource lead time for the task

During an actual cost rollup, when a PM has been fully recosted, two PMODEL fields are updated. Date Last Costed is updated with the current date in YYMMDD format; and Cumulative Lead Time (PMCMLT) is updated with the cumulative lead time for the last task (PTCMLT). During a simulated cost rollup, Simulated Cumulative Lead Time (PMSIMT) is updated with the simulated cumulative lead time for the last task (PTSIMT).

As each PM is recosted during a full cost rollup, all the Recosting Required flags in PMODEL and RESMST are set off. For a full cost rollup a flag is reset with every pass through the data base when all possible PMs have been costed. After at least one PM has been costed during a pass, the flag is set off. If the flag remains on after a pass through the entire data base, this indicates there are no additional PMs to cost.

B.

| File | Usage |
|---|---|
| DEPCST | UF |
| ERRORS | UF |
| OVHDRF | IF |
| PMEXPW | UF |
| PMFULW | UF |
| PMODEL | UF |
| PMODELPA | IF |
| PMOPER | IF |
| PMRESR | UF |
| PMRESRRS | IF |
| PMRESR01 | IF |
| PMRESR02 | IF |
| PMTASK | UF |
| PMTASKSQ | IF |
| RECLAS | IF |
| RESBAL | IF |
| RESMST | UF |
| RESMST2 | UF |
| RESPRT | UF |
| RESUBC | IF |
| TALFLI | IF |
| TALFLZ | IF |
| TSKCST | UF |
| TSKPRT | UF |
| WCMAST | IF |

C.

| File Name | Field Name | Description |
|---|---|---|
| TALFLI | TACRLC | Class Level Code Default |
| | TACSRU | Costing Method Default |
| | TAFOPD | Fixed Overhead Byte Default |
| | TAFORT | Fixed Overhead Rate Default |
| | TAFOTR | Fixed Overhead Table/Rate Default |
| | TAFOTV | Fixed Overhead Table Value Default |
| | TAVOPD | Variable Overhead Byte Default |
| | TAVORT | Variable Overhead Rate Default |
| | TAVOTR | Variable Overhead Table/Rate Default |
| | TAVOTV | Variable Overhead Table Value Default |
| TALFLZ | TANOHR | Number of Hours in a Day |

D.

| Field Name | Position From | To | Description |
|---|---|---|---|
| GROLL | 2 | 2 | Original/Simulated Rollup |
| GEDATE | 254 | 259 | Effectivity Date |
| GSELEC | 260 | 260 | Full/Selective Rollup |
| GFORS | 261 | 261 | Single Level/Full Cost Roll |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| RES | 300 | 449 | Ten Resources (Option) |
| GUNCRS | 450 | 450 | Cost Previously Uncosted Resources |
| GARES | 451 | 465 | PMs That Produce Resource |
| GARESC | 466 | 467 | PMs That Produce Class |
| GARESB | 468 | 469 | PMs That Produce Sub-Class |
| GPMNLO | 478 | 492 | PM Name Lower Limit |
| GPMNHI | 493 | 507 | PM Name Upper Limit |
| $UDATE | 1953 | 1958 | Current Date (User Format) |

E. Available Selections

*Options:*

Use PM Type Tailoring Limit (Y/N)
Full/Selective Cost Rollup
Single/Full Cost Rollup
PM Type to Rollup
Alternate PM Type
Range of PMs to Rollup
Range of Produced Resources to Rollup
List of Produced Resources (10)
Cost All Previously Uncosted PMs
All PMs That Produce Resource
All PMs That Produce Class
All PMs That Produce Sub-Class
Cost Tolerance Percentage

MDR024

Cost Rollup Report Prompter Program

A. This program allows the user to enter the limits and options necessary to run the cost rollup report. The cost rollup report prompter uses the RP report prompter as a prototype. GPLDA positions, however, are redefined for this program.

The program is called for both an actual and simulated cost rollup. A byte in the GPLDA indicates the type of rollup.

The Report Default Selection Screen functions essentially the same way as the RP Report Prompter, except that the Report Save Key and Default Sequence fields do not apply and are not present on the screen. The cost rollup report runs in one sequence only, and therefore no sequence screen appears The Limits Selection Screen functions exactly as it does on the usual Report Prompter.

On the first Options Selection Screen, all fields are input capable, regardless of the type of cost rollup being performed. On the second Options Selection Screen, fields that are input capable depend on the type of rollup and whether this is a full or selective rollup, chosen by the user on the first options screen.

The Effectivity Date is edited and converted to YYMMDD format in this program. If the user chooses to perform a rollup using the PM Type from the tailoring file, that value is loaded into the GPLDA.

Screens

MDR02401—Defaults Selection Screen
MDR02402—Limits Selection Screen
MDR02403—Options Selection Screen #1
MDR02404—Options Selection Screen #2
MDR02405—Printer Selection Screen

Defaults Selection Screen—MDR02401

Display-Only Fields:

Accept the Default Sequence?

Entry Fields:

Accept the Default Limits?
Accept the Default Options?
Accept the Default Printer?

Required Fields:

All input capable fields on the screen.

Defaults:

All fields default to Y.

Edits:

All options must be Y or N.

Command Keys (Display):

| | |
|---|---|
| CK01 | End Job |
| CK09 | Report Text |

Command Keys (Non-Display):

| | |
|---|---|
| HELP | Help Text |
| CK07 | Send Message to Action List |
| CK17 | Error Message Override |

Limits Selection Screen—MDR02402

Entry Fields:

These fields determine what is printed, not what is included in the calculations.

PM Type Lower Limit
PM Type Upper Limit
PM Name Lower Limit
PM Name Upper Limit
Resource Number Lower Limit
Resource Number Upper Limit
Resource Sub-Class Lower Limit
Resource Sub-Class Upper Limit
Resource Class Lower Limit
Resource Class Upper Limit
Warehouse Lower Limit
Warehouse Upper Limit Defaults:

Lower Limits Default to blanks.
Upper Limits Default to all 9s.

Edits:

Lower limits cannot exceed upper limits.

Command Keys (Display):

| | |
|---|---|
| CK01 | End Job |
| CK03 | Redisplay Defaults Screen |
| CK09 | Report Text |
| CK18 | Refresh Screen |

Command Keys (Non-Display):

| | |
|---|---|
| HELP | Help Text |
| CK07 | Send Message to Action List |
| CK17 | Error Message Override |

Options Selection Screen #1—MDR02403

Entry Fields:

One-Time Comments
Processing Option (Batch/Interactive/Scheduled)
Cost Level Detail:
1 = Resource Summary
2 = PM with Class/Sub-Class Breakdown
3 = PM with Task/Class/Sub-Class Breakdown
4 = Task Cost Breakdown
Effectivity Date for Comparison
Full or Selective Cost Rollup (F/S)

Required Fields:

Processing Option
Cost Level Detail
Full or Selective Cost Rollup (F/S)

Defaults:

Processing Option = B.
Cost Level Detail = 1.
Effectivity Date for Comparison = 0.
Full or Selective Cost Rollup = F.

Edits:

Processing Option must be B, I, or S.
Cost Level Detail must be 1, 2, 3, or 4.
Effectivity Date for Comparison must be valid.

Full or Selective Cost Rollup must be F or S.

Command Keys (Display):

CK01 End Job
CK03 Redisplay Defaults Screen
CK09 Report Text
CK18 Refresh Screen Command Keys (Non-Display):

HELP Help Text
CK07 Send Message to Action List
CK17 Error Message Override

Options Selection Screen #2—MDR02404

Display-Only Fields:

Depend on the type of report selected. See entry fields.

Entry Fields:

*Actual/Full Cost Rollup*
Use PM Type Tailoring Limit (Y/N)
Single level or full cost rollup (S/F)

*Actual/Selective Cost Rollup*
Single level or full cost rollup (S/F)
Range of PMs to rollup
Range of produced resources to rollup
List of produced resources to rollup
Only cost all previously uncosted resources (Y/N)

*Simulated/Full Cost Rollup*
Single level or full cost rollup (S/F)
PM type to rollup
PM type (alternate to cost rollup PM type)
Cost tolerance %

*Simulated/Selective Cost Rollup*
Single level or full cost rollup (S/F)
PM type (alternate to cost rollup PM type)
Range of PMs to rollup
Range of produced resources to rollup
List of produced resources to rollup
Only cost all previously uncosted resources (Y/N)
All PMs that produce resource
All PMs that produce sub-class
All PMs that produce class
Cost tolerance %

Required Fields:

Single level or full cost rollup (S/F) (All rollups)
Only cost all previously uncosted resources (Y/N) (Actual and simulated selective rollups)
Use PM Type Tailoring Limit (Y/N) (Actual, full rollups)

Defaults:

Use PM Type Tailoring Limit = N.
Single level or full cost rollup = F.
Only cost all previously uncosted resources = N.
All other fields default to blanks or zeros.

Edits:

Lower Limits must be less than or equal to upper limits.
Only cost all previously uncosted resources must be Y or N.

Single level or full cost rollup must be S or F.
Use PM Type Tailoring Limit must be Y or N.

Command Keys (Display):

| | |
|---|---|
| CK01 | End Job |
| CK03 | Redisplay Defaults Screen |
| CK09 | Report Text |
| CK18 | Refresh Screen |

Command Keys (Non-Display):

| | |
|---|---|
| HELP | Help Text |
| CK07 | Send Message to Action List |
| CK17 | Error Message Override |

Printer Default Selection Screen—MDR02405

Entry Fields:

Printer File
Forms Type
Number of Copies
Printer File 1-50

Required Fields:

Printer File

Defaults:

Printer File from QSYSPRT
Forms Type is STD
Number of Copies is 1
Printer File 1-50 from PRINTF data area Command Keys (Display):

| | |
|---|---|
| CK01 | End Job |
| CK03 | Redisplay Defaults Screen |
| CK09 | Report Text |
| CK18 | Refresh Screen |

Command Keys (Non-Display):

| | |
|---|---|
| HELP | Help Text |
| CK07 | Send Message to Action List |
| CK17 | Error Message Override |

B.

| File | Usage |
|---|---|
| ERRMSG | IF |
| MDR024FM | CF |
| TALFLD | IF |
| TALFLI | IF |

C.

| File Name | Field Name | Description |
|---|---|---|
| TALFLD | TATYPE | PM Type from Tailoring |
| TALFLI | TAPMNM | Variable heading for PM Name |
| | TARESC | Variable heading for Resource Number |

D.

| Field Name | Position From | To | Description |
|---|---|---|---|
| GCNCL | 1 | 1 | Cancel Code |
| GROLL | 2 | 2 | Actual/Simulated Rollup |
| GPMNL | 101 | 115 | PM Name Lower Limit |
| GPMNH | 116 | 130 | PM Name Upper Limit |
| GRES#L | 131 | 145 | Resource # Lower Limit |
| GRES#H | 146 | 160 | Resource # Upper Limit |

| | | | |
|---|---|---|---|
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Sub-Class Lower Limit |
| GRESCH | 169 | 170 | Sub-Class Upper Limit |
| GPMTPL | 171 | 172 | PM Type Lower Limit |
| GPMTPH | 173 | 174 | PM Type Upper Limit |
| GCMNT | 201 | 250 | One-Time Comments |
| GPROC | 251 | 251 | Processing Option |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Cost Rollup |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPTITL | 1710 | 1739 | Program Title |
| GPRNT | 1740 | 1749 | Printer Option |
| GPRID | 1750 | 1751 | Printer ID Number |
| G#COP | 1752 | 1754 | Number of Copies |
| GFORM | 1755 | 1764 | Forms Type |
| $USER | 1891 | 1891 | User Date Format |
| $UDATE | 1953 | 1958 | Current Date (User Format) |

E. Available Selections

*Limits:*

PM Type
PM Name
Resource
Class
Sub-Class
Warehouse

*Options:*

One-Time Comments
Processing Option (Batch/Interactive/Scheduled)
Cost Level Detail
Effectivity Date
Full/Selective Cost Rollup
Use PM Type Tailoring Limit Single/Full Cost Rollup
PM Type to Rollup
Alternate PM Type
Range of PMs to Rollup
Range of Produced Resources to Rollup
List of Produced Resources (10)
Only cost all previously uncosted PMs
All PMs that produce resource
All PMs PMs that produce class
All PMs PMs that produce sub-class
Cost Tolerance %

MDR026

Cost Rollup Print Program

A. This program prints the results of the cost rollup from the RESPRT, TSKPRT, and ERRORS work files. The program prints in one of four different formats depending on the selected Cost Level Detail option. At the end of the report, all PMs that could not be costed are listed with the particular reason. All resources with a cost of zero are also listed at its end.

Resource Summary Detail. When this cost detail option is chosen, the program reads the first TSKPRT record for a PM. The program then chains to the ERRORS work file using a concatenated key of Code = P/PM Type-PM Name. If the chain is successful, the PM was not completely rolled up and is not printed on any detail or total lines. If the chain fails, the PM was completely rolled up and the PM level and the first task level detail lines are printed using information from the TSKPRT record.

Lower limits are then set to the PMRESR file using PM Type/PM Name/Task Sequence Number/Resource Type = P/blank Resource Number. A series of READE operations is done to retrieve all produced resources for that PM. If the resource falls within the user-specified limits and meets the specified cost tolerance percentages, it is printed on the report.

After all the produced resources are printed, lower limits are set on PMRESR using PM Type/PM Name/Task Sequence Number/Resource Type = C/blank Resource Number, and a series of READE operations is done to retrieve all consumed resources. When a consumed resource is found, a chain is made to the RESPRT file using PM Type/PM Name/Task Sequence Number/Resource Number to retrieve the direct costs and fixed and variable overhead costs.

PM with Class/Sub-Class Breakdown Detail. With this option, the program reads the first TSKPRT record. Newly-calculated fields are summed for all tasks when the total cost of the PM is calculated. A chain is then made to the ERRORS work file using a concatenated key of Code = P/PM Type-PM Name. If the chain is successful, the PM was not completely rolled up and is not printed on any detail lines. If the chain fails, the PM was completely rolled up and the PM level detail line is printed using information from the TSKPRT record. Task level detail lines are not printed if this detail option is selected.

The program then reads the remaining TSKPRT records for the PM to calculate the Total Cost (total direct cost + total fixed overhead cost + total variable overhead cost) for the entire PM. Lower limits are set on RESPRT01 (a logical view over RESPRT by PM Type/PM Name/Resource Class/Resource Sub-Class) using PM Type/PM Name/blank Resource Class/blank Resource Sub-Class, and a series of READE operations is done.

For each successful READE, the percentage of the total cost contained in the direct cost, fixed overhead, and variable overhead of each class/sub-class is calculated. If the record is within the user-defined limits, a detail line is printed on the report. For each class/sub-class, the program accumulates the percentage of total cost for the direct cost, fixed overhead, and variable overhead, and class cost breakdowns are printed. For each class/sub-class the program also accumulates the percentages of total cost that are contained in the total direct cost, the total fixed cost, and the total variable overhead for the PM.

PM with Task/Class/Sub-Class Breakdown. With this option, the program reads the first TSKPRT record. Newly-calculated fields are summed for all tasks when the total cost of the PM is calculated. A chain is then made to the ERRORS work file using a concatenated key of Code = P/PM Type-PM Name. If the chain is successful, the PM was not completely rolled up and is not printed on any detail lines. If the chain fails, the PM was completely rolled up and the PM level and task level detail lines are printed using information from the TSKPRT record.

Lower limits are set on RESPRT02 (a logical view over RESPRT by PM Type/PM Name/Task Sequence Number/Resource Class/Resource Sub-Class) using PM Type/PM Name/Task Sequence Number/blank Resource Class/blank Resource Sub-Class, and a series of READE operations is done.

For each successful READE, the percentage of the total task cost that is contained in the direct cost, fixed overhead cost, and variable overhead cost of each task/class/sub-class is calculated. If the record is within the user-defined limits, a detail line is printed on the report. The percentage of the total task cost that is contained in the direct cost, fixed overhead cost and variable overhead cost of each task/class/sub-class is accumulated. For each, the percentage of the total PM cost contained in the direct cost, fixed cost, fixed overhead, and variable overhead cost for the PM is accumulated so a PM total line can be printed.

Task Cost Breakdown. With this option, the program reads the first TSKPRT record for a PM. Newly-calculated fields are summed for all tasks when the total cost of the PM is calculated. A chain is made to the ERRORS work file using a concatenated key of Code = P/PM Type-PM Name. If the chain is successful, the PM was not completely rolled up and no detail lines are printed. If the chain fails, the PM was completely rolled up and the PM and task level detail lines are printed using information from the TSKPRT record.

Lower limits are set on RESPRT using PM Type/PM Name/Task Sequence Number/blank Resource Number, and a series of READE operations is done. For each successful READE the percentage of the total PM cost (total direct cost + total fixed overhead + total variable overhead) is calculated by adding each resource's direct cost, fixed overhead cost and variable overhead cost. If the record is within the user-defined limits, a detail line is printed.

When all consumed resources are printed, lower limits are set on RESPRT02 (a logical view over RESPRT by PM Type/PM Name/Task Sequence Number/Resource Class/Resource Sub-Class) using PM Type/PM Name/Task Sequence Number so the program can calculate the percentage of the total PM cost contained in the direct cost, fixed overhead cost, and variable overhead cost for each task. The percentage of the total PM cost contained in the direct cost, fixed overhead cost and variable overhead cost for the PM is also calculated.

Cost Rollup Errors Detail. At the end of the report all PMs that could not be rolled up and all resources with a zero cost are printed. To print the PMs that could not be rolled up, lower limits are set on the ERRORS work file using Code = P/blank PM Type/blank PM Name, and a series of READE operations is done. For each successful READE, a record for the PM is printed along with the reason why the PM was not rolled up. When all PM records have been printed, lower limits are set on the ERRORS work file using Code = R/blank Resource Number, and second series of READE operations is done. For each successful READE a resource line is printed.

Cost Tolerance Percentage. During a simulated cost rollup, the user can specify to see only those produced resources with costs that have changed by more than a specified percentage. Change calculations are necessary if a Cost Tolerance % is entered by the user. If the percentage of change between the original and the simulated rolled up cost is greater than the cost tolerance percentage entered by the user, the resource is printed.

The following calculation is used, with the original cost coming from PMRESR:

% change = (New cost − Original cost)/New Cost × 100

Percent of Total Costs. On resource sub-class and class total lines, the report shows what percentage of the total cost is attributed to the direct cost, fixed overhead cost, and variable overhead cost. The following calculation is used:

% of total = (Direct, Fixed, or Variable Cost/Total cost of task) × 100

B.

| File | Usage |
|---|---|
| DEPCST | IF |
| ERRORS | IF |
| PMODEL | IF |
| PMRESR | IF |
| PMTASKSQ | IF |
| RESPRT | IF |
| RESPRT01 | IF |
| RESPRT02 | IF |
| TALFLI | IF |
| TALFLZ | IF |
| TSKPRT | IF |
| QSYSPRT | O |

C.

| File Name | Field Name | Description |
|---|---|---|
| TALFLI | TAPMNM | Variable heading for PM Name |
| | TARESC | Variable heading for Resource Number |
| TALFLZ | TANDEC | User-defined number of decimals |

D.

| Field Name | Position From | To | Description |
|---|---|---|---|
| GROLL | 2 | 2 | Actual/Simulated Rollup |
| GPMNML | 101 | 115 | PM Name Lower Limit |
| GPMNMH | 116 | 130 | PM Name Upper Limit |
| GRES#L | 131 | 145 | Resource # Lower Limit |
| GRES#H | 146 | 160 | Resource # Upper Limit |
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Class Lower Limit |
| GRESCH | 169 | 170 | Class Upper Limit |
| GPMTPL | 171 | 172 | PM Type Lower Limit |
| GPMTPH | 173 | 174 | PM Type Upper Limit |
| GCOMNT | 201 | 250 | One-Time Comments |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Cost Rollup |
| GTYPE | 262 | 263 | PM Type to Rollup |
| GTYPEA | 264 | 265 | Alternate PM Type |
| GPMLO | 266 | 267 | PM Type Lower Limit |
| GPMHI | 268 | 269 | PM Type Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GCSTTL | 470 | 476 | Cost Tolerance % |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPRID | 1750 | 1751 | Printer ID Number |
| GPENTN | 1821 | 1830 | Entity Name |
| $USER | 1891 | 1891 | User Date Format |
| $UDATE | 1953 | 1958 | Current Date (User Format) |

E. Available Selections

*Limits:*

PM Type
PM Name
Resource
Class
Sub-Class
Warehouse

*Options:*

One-Time Comments
Processing Option (Batch/Interactive/Scheduled)
Cost Level Detail
Effectivity Date for Comparison Full or selective cost rollup
Use PM Type Tailoring Limit
Single level of full cost rollup
PM type to rollup
PM type (alternate to cost rollup PM type)
Range of PMs to Rollup
Range of produced resources to rollup
List of produced resources to rollup (10)
Only cost all previously uncosted PMs
All PMs that produce resource
All PMs that produce class
All PMs that produce sub-class
Cost tolerance %

F. Field Headings

Resource Summary:

*PM Summary Line*
PM Type
PM Name
PM Description
Standard Batch Size
UM

*Task Summary Line*
Task Name
Task Description
Task Batch Size
UM
Batch Equivalence

*Produced Resource Detail Line*
Resource Number
Class
Sub-Class
Description
Cost Per Standard UM
Cost Per Task Batch
Cost Per PM Batch
Standard UM
NRV Usage
Cost Distribution %

*Consumed Resource Detail Line*
Resource Number
Class
Sub-Class
Resource Description
Costing Method
A = Rolling Average Cost
H = Historical Average Cost
L = Last Complete Period Cost
S = Standard Cost
R = Rolled Up Cost
F = Fixed Cost
Total Direct Cost
Total Fixed Overhead
Total Variable Overhead
Resource with Longest Lead Time
Task Level Cumulative Lead Time
PM Level Cumulative Lead Time PM with Class/Sub-Class Breakdown:

*PM Summary Line*
PM Type
PM Name
PM Description
Total PM Cost

*Resource Class/Sub-Class Line*
Resource Number
Resource Class
Resource Sub-Class
Total Direct Cost
% of Total PM Cost
Total Fixed Overhead
% of Total PM Cost
Total Variable Overhead
% of Total PM Cost
Sum of %

*Totals for Class*
Total Direct Cost
% of Total PM Cost
Total Fixed OH Cost
% of Total PM Cost
Total Variable OH Cost
% of Total PM Cost
Sum of %

*PM Totals*
Total Direct Cost
% of Total PM Cost
Total Fixed OH Cost
% of Total PM Cost
Total Variable OH Cost
% of Total PM Cost PM with Task/Class/Sub-Class Breakdown:

*PM Summary Line*
PM Type
PM Name
Description
Total PM cost

*Task Summary Line*
Task Name
Task Description
Task Batch Size
UM
Batch Equivalence
Total Task Cost

*Consumed Resource Detail Line*
Class
Sub-Class
Resource Number
Total Direct Cost
% of Total PM Cost
Total Fixed OH Cost
% of Total PM Cost
Total Variable OH Cost
% of Total PM Cost
Sum of %

*Totals for Class*
Total Direct Cost
% of Total PM Cost
Total Fixed OH Cost
% of Total PM Cost
Total Variable OH Cost
% of Total PM Cost
Sum of %

*PM Totals*
Total Direct Cost % of total cost of PM
% of Total PM Cost
Total Fixed OH Cost
% of Total PM Cost
Total Variable OH Cost
% of Total PM Cost Task Cost Breakdown:

*PM Summary Line*
PM Type
PM Name
PM Description
Standard Batch Size
UM
Total PM Cost

*Task Summary Line*
Task Name
Task Description
Task Batch Size
UM
Batch Equivalence

*Consumed Resource Detail Line*
Resource Number
Resource Class
Resource Sub-Class
Level Class Code
Total Direct Cost
% of Total PM Cost
Total Fixed OH Cost
% of Total PM Cost
Total Variable OH Cost
% of Total PM Cost

*Task Totals—This Level*
Total Direct Cost
% of Total PM Cost
Total Fixed OH Cost
% of Total PM Cost
Total Variable OH Cost
% of Total PM Cost

*Task Totals—Lower Level*
Total Direct Cost
% of Total PM Cost
Total Fixed OH Cost
% of Total PM Cost
Total Variable OH Cost
% of Total PM Cost

*Totals for Task*
Total Cost
Total % of PM Cost

*Totals for PM—This Level*
Total Direct Cost
% of Total PM Cost
Total Fixed OH Cost
% of Total PM Cost
Total Variable OH Cost
Total % of PM Cost

*Totals for PM—Lower Level*
Total Direct Cost
% of Total PM Cost
Total Fixed OH Cost
% of Total PM Cost
Total Variable OH Cost
Total % of PM Cost Uncosted PM Line:

PM Type
PM Name
Error Message
Resource Number

Error Message Reasons:

1. No prime costing PM defined for retrieving rolled up cost.
2. Invalid prime costing PM defined for retrieving rolled up cost.
3. Resource is not produced by given prime PM.
4. No RESBAL record for this resource.
5. No RESMST record for this resource.
6. Cost Level Code problem.
7. Uncosted Resource on the PM.
8. Prime PM defined is the same as the PM being rolled.

Resource Error Line:

Zero Cost Resource Number
Cost Rollup Costing Method

MDR028

Cost Rollup Error Message Print Program

A. This program is called if cost rollup is already in use. Cost rollup prevents simultaneous use of the program by allocating the data area LOCK exclusively to one work station until the rollup is complete. If another user attempts to run cost rollup, a register prints with the following message: "Cost rollup cannot be performed at this time. Already in use." The program then ends with no rollup performed.

B.

| File | Usage |
|---|---|
| TALFLI | IF |
| QSYSPRT | O |

C.

| File Name | Field Name | Description |
|---|---|---|
| TALFLI | TAPMNM | Variable heading for PM Name |
| | TARESC | Variable heading for Resource Number |

D.

| Field Name | Position From | To | Description |
|---|---|---|---|
| GROLL | 2 | 2 | Actual/Simulated Rollup |
| GPMNML | 101 | 115 | PM Name Lower Limit |
| GPMNML | 116 | 130 | PM Name Upper Limit |
| GRES#L | 131 | 145 | Resource # Lower Limit |
| GRES#H | 146 | 160 | Resource # Upper Limit |
| GWHSEL | 161 | 161 | Warehouse Lower Limit |
| GWHSEH | 162 | 162 | Warehouse Upper Limit |
| GRSCL | 163 | 164 | Class Lower Limit |
| GRSCH | 165 | 166 | Class Upper Limit |
| GRESCL | 167 | 168 | Class Lower Limit |
| GRESCH | 169 | 170 | Class Upper Limit |
| GPMTPL | 171 | 172 | PM Type Lower Limit |
| GPMTPH | 173 | 174 | PM Type Upper Limit |
| COMENT | 201 | 250 | One-Time Comment |
| GCSTDT | 253 | 253 | Cost Level Detail Code |
| GEDATE | 254 | 259 | Effectivity Date |
| GSELEC | 260 | 260 | Full/Selective Rollup |
| GFORS | 261 | 261 | Single Level/Full Rollup |
| GTYPE | 262 | 263 | PM Type to Rollup |
| GTYPEA | 264 | 265 | Alternate PM Type |
| GPMLO | 266 | 267 | PM Name Lower Limit |
| GPMHI | 268 | 269 | PM Name Upper Limit |
| GRESLO | 270 | 284 | Resource # Lower Limit |
| GRESHI | 285 | 299 | Resource # Upper Limit |
| GRES01 | 300 | 314 | Resource #1 |
| GRES02 | 315 | 329 | Resource #2 |
| GRES03 | 330 | 344 | Resource #3 |
| GRES04 | 345 | 359 | Resource #4 |
| GRES05 | 360 | 374 | Resource #5 |
| GRES06 | 375 | 389 | Resource #6 |
| GRES07 | 390 | 404 | Resource #7 |
| GRES08 | 405 | 419 | Resource #8 |
| GRES09 | 420 | 434 | Resource #9 |
| GRES10 | 435 | 449 | Resource #10 |
| GUNCRS | 450 | 450 | Cost Previously Uncosted Resources |
| GARES | 451 | 465 | PMs that produce resource |
| GARESC | 466 | 467 | PMs that produce class |
| GARESB | 468 | 469 | PMs that produce sub-class |
| GTAPMN | 477 | 477 | PM Type Tailoring Limit |
| GPMNLO | 478 | 492 | PM Name Lower Limit |
| GPMNHI | 493 | 507 | PM Name Upper Limit |
| GPENTN | 1821 | 1830 | Entity Name |
| $USER | 1891 | 1891 | User Date Format |
| $UDATE | 1953 | 1958 | Current Date (User Format) |

E. Available Selections

*Limits:*

PM Type
PM Name
Resource
Class
Sub-Class
Warehouse

*Options:*

One-Time Comments
Processing Option (Batch/Interactive/Scheduled)
Cost Level Detail
Effectivity Date
Full/Selective Cost Rollup
Use PM Type Tailoring Limit
Single/Full Cost Rollup
PM Type to Rollup
Alternate PM Type
Range of PMs to Rollup
Range of Produced Resources to Rollup
List of Produced Resources to Rollup (10)
Only Cost All Previously Uncosted Resources
All PMs that produce resource
All PMs that produce class
All PMs that produce sub-class
Cost Tolerance %

SECTION VI

SECTION VI-I

When To Use Simulation Files Maintenance

Use this option to maintain simulated cost information for resources before running your Cost Rollup Report—Simulated (see Section 2-3). Simulated Cost Rollup calculates what the rolled up cost of a produced resource would be given certain simulated or "what if" cost data. You enter this "what if" data through Simulation Files Maintenance or Simulation Files Batch Update (Sections 1-5 and 5-5, respectively). This theoretical data is not updated into your master files. It is test data only.

If you plan to enter the same simulated data for a range of resources, resource classes, or sub-classes, use Simulation Files Batch Update.

Simulation Files Maintenance actually contains five file maintenance programs. Depending on the option you select, you may maintain your: (1) Resource Master (RESMSTSM), (2) Resource Sub-Class (RESUBCSM), (3) Resource Class (RECLASSM), (4) Resource Balance (RESBALSM), and (5) Overhead Rate (OVHDRFSM) Simulation Files. You may only select one option at a time, but you may maintain all five files or any combination. Each simulation option and its effect on other simulation files is explained in detail later in this section. If you enter no simulated data and run a simulated cost rollup, PRISM supplies data from the corresponding RM master files.

How To Use Simulation Files Maintenance

Before using this option, run your RP simulation file lists, Section 3-4, and 3-11 through 3-14, to review current simulation data. If you do not want to use any of this data, use RP Simulation Files Initialization (Section 5-6) to clear the files.

Then take Option 5 from the Maintenance Menu to display the Simulation File Maintenance Selection Screen (MDE08001).

Selection Screen—MDE08001

(See Figure 28)

Use this screen to select the simulation file you want to maintain. Each file option is described below.

Fields for Entry

1. Resource Master Simulation File

Choose this option to maintain simulation data resource by resource.

2. Resource Sub-Class Simulation File

Take this option to maintain simulation data by resource sub-class. RM allows you to define resources and group them by class and sub-class. For example, the class labor may consist of sub-classes skilled (LA/SK) and unskilled (LA/UN). Note that simulated cost data you enter for a sub-class affects all resources in that sub-class, unless you also take Option 1 to maintain simulation data resource by resource.

3. Resource Class Simulation File

Take this option to maintain simulated cost information for a resource class. See *Resource Class* and *Sub-Class Maintenance*, Sections 1-12 and 1-15, respectively, in your Resource Management reference manual for details. Note that the simulated cost data you enter for a class affects all consumed resources in that class and in all related sub-classes, unless you also take Option 1 or 2 from this screen to maintain simulation data by resource and/or sub-class.

4. Resource Balance Simulation File

Take this option to maintain simulated cost data for specific resource/warehouse combinations. Note that the simulated cost data you enter for a resource/warehouse affects only that specific resource/warehouse combination.

Note: You may only select Option 4 if your user profile is authorized to see historical costs. See *Security Clearance Maintenance*, Section 4-10 of your Foundation reference manual for details on special functions security clearance.

5. Overhead Rate Simulation File

Take this option to maintain the simulated cost data associated with a specific overhead table value.

For each resource you have the choice of defining an actual overhead rate or assigning an overhead table value. The overhead rate adds a certain dollar amount or percentage to the cost of a resource to account for overhead costs. An overhead table value allows you to apply the same rate to a group of resources.

For example, rather than defining a rate of 10 percent for 10,000 individual resources, you might say that overhead table value T1 equals 10 percent. You can then assign this overhead table value to all selected resources with an overhead cost of 10 percent. Now you can change the overhead rate for all T1 resources by simply changing the rate assigned to overhead table value T1, rather than keying in a new overhead rate for 10,000 resources.

This simulation option lets you maintain the overhead rate and code assigned to an overhead table value. You may also define a percentage (%) change to the overhead rate. The simulated cost data you enter affects all resources assigned that table value, unless you also maintain simulated overhead cost data by resource, class, or sub-class.

Command Function Keys

ENTER—Press ENTER after selecting an option to display the appropriate Simulation File Maintenance Data Screen.

CK01 DISPLAY SESSION STATUS—CK01 displays the Session Status Screen. Use this screen to review the total number of file records added, changed, or deleted from the five simulation files. A command key from the Session Status Screen lets you exit the option and generates a register for each simulation file that details your maintenance activity.

Data Screen—MDE08002

Figure 29:
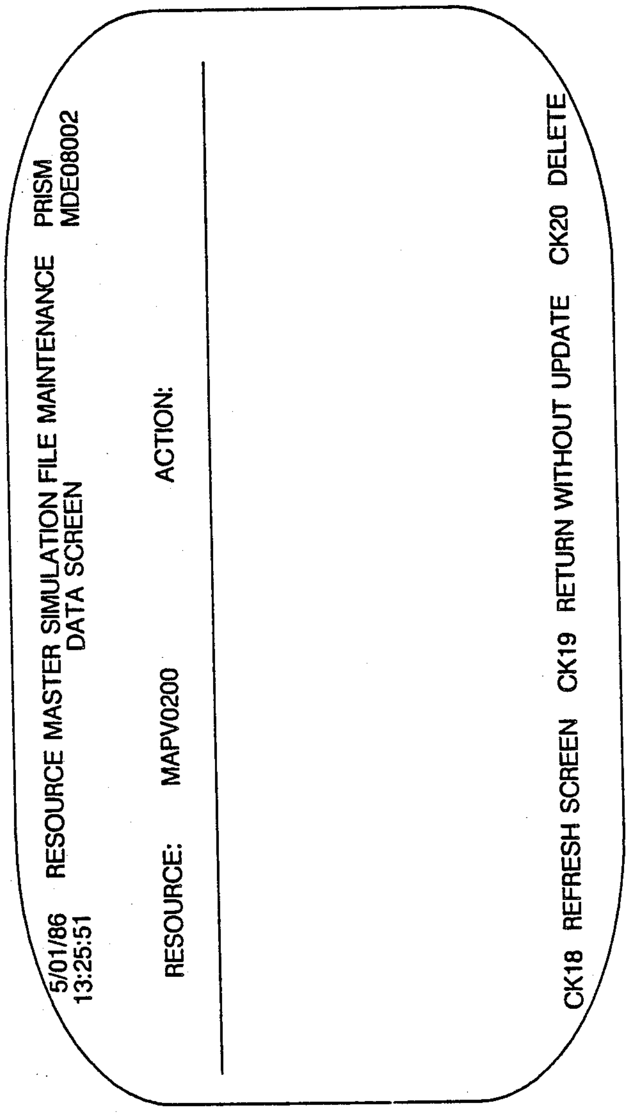

(See Figure 29)

When you select Option 1 from the Selection Screen and press ENTER, PRISM displays the Data Screen. Use the top half of this screen to enter the number of the resource whose simulation cost data you want to maintain.

Fields for Entry

- RESOURCE—Enter the number of the resource for which you want to maintain simulation data. The resource must exist in your RM Resource Master File. Run your Resource File List (see Section 3-16 of your RM Reference manual) to verify valid resource numbers.

Command Function Keys

ENTER—When you enter a resource number and press ENTER, PRISM displays simulated cost information for the resource on the bottom of half of the screen.

If a record already exists for the resource in your Resource Master Simulation File, PRISM displays this simulated data. If a record does not exist, PRISM checks your RM Resource Master, Resource Sub-Class, and Resource Class files for the missing cost data. It displays the data it finds and loads it into the simulation file when you update the record. If it cannot find the data in any of the three files, it displays and loads the appropriaté default values from RM tailoring.

Resource Master Data Screen—MDE08002 (Expanded)

(See Figure 30)

When you enter a resource on the top of the Resource Master Simulation File Data Screen and press ENTER, PRISM displays simulated cost information for the resource on the bottom of the screen.

Fields for Display

Action Code—indicates whether you are adding or changing simulation file data. If ADD, the values on the screen are defaults from your RM resource files. If CHANGE, you are looking at simulation file data.

Date of Last Maintenance—date you last updated simulation data for this resource, or today's date if this is a new simulation record.

* Resource—resource being maintained.

Class—class to which the resource belongs.

Sub-Class—sub-class to which the resource belongs.

Fields for Entry

% Change to Fix Ovhd Rate—Fixed overhead costs are costs that are fixed and virtually unchanging for a resource. For example, the cost of leasing a dicer would be constant from month to month. As would the money you pay to rent a space. These costs are independent of the length and output of your production process. Variable overhead costs, on the other hand, vary with production time and volume. For example, the longer you run a machine, the more electricity you use. For rollups, the total cost of producing a resource consists of three separate costs: (1) the actual cost of the consumed resource, (2) the fixed overhead costs, and (3) the variable overhead costs.

The cost of consumed resources you actually issue to a PM are applied to that PM during Cost Rollup. In order to track their costs, however, you may choose to define overhead resources such as lighting or electricity as consumed resources. You account for overhead resources, then, by distributing their costs among other resources.

Use this field to specify a percentage change (three digits plus two decimal positions) to the current fixed overhead rate for this resource. For example, suppose the current fixed overhead rate is $500. If you enter a Trade Secret Information of Marcam; All Rights Reserved.

change of 10% here, PRISM adds 10% ($50) of the current rate ($500) to the current rate to get a new fixed overhead rate of $550. This new rate is used in any simulated cost rollup calculations. You can also change the rate by directly entering a new value in the fixed overhead rate field. See the appropriate description later in this section.

% Change to Standard Cost—You set the standard cost for each unit of a resource through Resource Master Maintenance (see Section 1- 13 of your RM reference manual) at the beginning of each fiscal year or production period. Standard cost is what you estimate it will cost you to acquire this consumed resource. You decide whether this cost is the purchase price alone or the purchase price plus estimated overhead costs attributed to the resource.

Use this entry field to specify a percentage change (three digits, plus two decimal positions) to the current standard cost that appears at the bottom of this screen. See % Change to Fix Ovhd Rate field above for details on how PRISM performs the calculation.

% Change to Var Ovhd Rate—Variable overhead costs are ones that change depending on the amount of production. For example, electricity for a machine would vary depending on rates and production volume. Use this field to specify a % change to the variable overhead rate that appears at the bottom of this screen. See % Change to Fix Ovhd Rate for an explanation of overhead costs and details on how PRISM calculates the change.

% Change to Fixed Cost—Resource Master Maintenance lets you define a fixed cost for each resource as well as a standard cost. You determine the difference between the two types of cost. For example, fixed might include overhead costs while standard might not. You may tell PRISM to use the fixed cost of a resource during cost rollup (see Cost Rollup Costing Method field below), but use the standard cost for cost calculations displayed on reports. See Section 1-13 of your RM reference manual for details.

Use this field to specify a % change to the Fixed Cost field that appears at the bottom of this screen. See % Change to Fix Ovhd Rate above for details on how PRISM calculates the change.

Standard Cost—in dollars, what you expect it will cost to acquire this resource. If you are not authorized to see costs, this field is blank and protected from entry. See % Change to Standard Cost above for details.

Fixed Cost—in dollars. If you are not authorized to see costs, this field is blank and protected from entry. See % Change to Fixed Cost above for details.

Cst Rollup Cstg Mthd—cost rollup costing method. This specifies which consumed resource cost is to be used during rollup: A for rolling average, F for fixed, H for historical, L for last period's average cost, R for rolled up, or S for standard. You define standard and fixed costs in Resource Master Maintenance. The other three costs are calculated by PRISM at each period close (see *Period Close*, Section 9-2, of your RM reference manual). A brief description of those three follows:

Last period average cost is the average cost of this resource from the period just closed. It is calculated at each RM period close.

Historical average cost is the average of all period average costs to date and the last period average cost. This cost calculation method gives considerably more weight to the most recent period than to any other individual period. You may not want to use this cost method if the last period average cost was unusually above or below average.

Rolling average cost is the historical average cost with an adjustment to even out the averaging. In RM tailoring question #T38 you define the percentage to be applied to the last period average cost so that it does not outweigh the historical average. See RM tailoring and Resource Master Maintenance for details.

If this is a new simulation file record and this field is blank in the Resource Master file, PRISM checks for entries in the Sub-Class, Class, and tailoring files. It displays the retrieved value on the screen and loads it into the simulation file when you press ENTER.

LEVEL CL CD—level class code for this consumed resource. The level class code tells PRISM how specific you want to be in attributing costs. Under method A, the cost rollup program calculates the total cost of the consumed resource but does not consider how that cost breaks down. Suppose you are making beef stew, and that production model consumes a spice pack worth $13. Under level code A, rollup charges $13 to material. It does not worry whether that spice pack represents $13 in material or $3 in labor and $10 in material.

Under method B, the cost rollup program looks down another level to the Prime Costing PM for the consumed resource. The prime costing PM for spice pack tells you that the $13 cost of a spice pack is actually $3 of labor and $10 of material. Under level code A, rollup charges $13 to material. Under level code B, rollup charges $10 to material and $3 to labor.

If this is a new simulation file record and this field is blank in the Resource Master file, PRISM checks for entries in the Sub-Class, Class, and tailoring files. It displays the retrieved value and loads it into the simulation file when you press ENTER.

Beg Eff Date—beginning effectivity date or earliest date this resource is to be used for production. PRISM does not roll up a resource if its effectivity date is not within the rollup limits. See RM *Resource Master Maintenance* (1-13) and RP *Production Model Maintenance* (Section 1-4) for details.

End Eff Date—ending effectivity date or latest date this resource is to be used for production. See Beginning Effectivity Date above.

NRV USAGE—Net realizable value applies to produced resources only. A Y tells PRISM to deduct the net realizable value from the total PM cost before distributing that PM cost to the other resources produced on the PM. Enter N if the produced resource does not have net realizable value.

Suppose you have a production model for beef stew. That PM produces the expected beef stew and a lower grade of leftover stew ingredients that you sell to farmers as animal feed. The farmers pay you $10 a bucket for the feed. Therefore, you define with a Y the leftover ingredients as a net realizable produced resource. If you had to dispose of the leftovers, had to pay to have them removed, you would still enter Y here even though their value is negative.

Net Real Val—net realizable value assigned to the net realizable produced resource.

Prime Cost PM Type—required if Prime Costing PM Name is entered. This is used for manufactured consumed resources only and is the PM type of the prime costing PM for the resource. You define PM types in Production Model Type Maintenance (Section 1-2).

PM Name—name of the Prime Costing PM for this manufactured consumed resource. It applies only to resources that you produce on one production model and consume on another and is only used when the cost rollup costing method is R for rolled up.

Suppose your beef stew production model consumes a resource called bean paste. You consume bean paste, but you also produce it using one of three PMs, bean paste 1, bean paste 2, or bean paste 3. You must choose one of the 3 bean paste PMs as the Prime Costing PM for the consumed resource bean paste. If you roll up your beef stew PM using cost level code B (lower level), PRISM considers the cost breakdown for bean paste outlined in the PM.

PO LT Qty Brk—If the quantity of a resource you are purchasing is less than the quantity you enter here, the program uses PO Lead Time 1, defined below. If it is greater than this break quantity, the program uses PO Lead Time 2. These fields are also used by the Planning module.

For example, if you only require a small amount of a resource, you might be able to obtain it from a location nearby, thus giving you a short lead time. Larger quantities might need to come from farther away, and the lead time would be longer. You can determine here, by entering a quantity, what lead time will be used.

PO LT 1—If the quantity of a resource on order is less than the PO lead time break quantity, the program uses this lead time. You specify in RM tailoring question #P3 whether this lead time represents calendar days or work days.

PO LT 2—If the quantity of resource on order is greater than the PO lead time break quantity, the program uses this lead time.

PO LT Adj—PO lead time adjustment. PO lead times 1 and 2 are expected to be over by this many days. Cost Rollup adds this adjustment to the PO lead time.

Mfg LT Qty Break—Manufacturing order lead time quantity *break*. If the quantity of a resource you are producing is less than the quantity in this field, PRISM uses Mfg Lead Time 1, defined below. If it is greater than this break quantity, the program uses Mfg Lead Time 2.

Mfg LT 1—If the quantity of a resource scheduled for manufacturing is less than the Mfg lead time break quantity, the program uses this lead time.

Mfg LT 2—If the quantity of resource to be manufactured is greater than the Mfg lead time break quantity, the program uses this lead time.

Mfg LT Adj—Manufacturing lead time adjustment. Mfg Lead Times 1 and 2 are expected to be over by this many days. Cost Rollup adds this adjustment to the Mfg lead time.

Fixed Overhead:

Type—fixed overhead type: R if you are defining an actual rate, T if you are assigning the resource an overhead table value.

If this is a new simulation file record and this field is blank in the Resource Master File, PRISM checks for entries in the Sub-Class, Class, and tailoring files (RM tailoring question #G24). It displays the retrieved value and loads it into the simulation file when you press ENTER.

Rate—required if Fixed Overhead Type equals R. Enter or change the actual fixed overhead rate for the resource. Enter up to five digits plus six decimals.

If this is a new simulation file record and this field is blank in the Resource Master file, PRISM checks for entries in the Sub-Class, Class, and tailoring files. It displays the retrieved value and loads it into the simulation file when you press ENTER.

CODE—P if the Rate or rate assigned to the Table Value is a percentage, or D if it is a dollar rate or value.

If this is a new simulation file record and this field is blank in the Resource Master file, PRISM checks for entries in the Sub-Class, Class, and tailoring files. It displays the retrieved value and loads it into the simulaton file when you press ENTER.

Table Value—required if Fixed Overhead Type equals T. Enter the overhead table value assigned to the resource.

If this is a new simulation file record and this field is blank in the Resource Master file, PRISM checks for entries in the Sub-Class, Class, and tailoring file. It displays the retrieved value and loads it into the simulation file when you press ENTER.

Variable Overhead:

See the Fixed Overhead field descriptions above for defaulting information and details.

Type—variable overhead type or overhead table/rate code: R if you are defining an actual rate, T if you are assigning the resource an overhead table value.

Rate—required if Variable Overhead Type equals R. The actual variable overhead rate for the resource. You can enter up to five digits and six decimals.

Code—required if Variable Overhead Type equals R. P if the Rate or rate associated with the entered Table Value is a percentage, or D if it is a dollar amount.

Table Value—required if Variable Overhead Type equals T. Enter the overhead table value assigned to the resource.

Command Function Keys

ENTER—Press ENTER to update the simulation data. PRISM redisplays the shortened version of the data screen so you may select another record for maintenance.

If Resource Master fields were displayed, when you press ENTER, these defaults and any new entries are loaded into the simulation file. The update is recorded as an ADD on the Session Status Screen. This defaulting only occurs for new simulation file records.

CK18 REFRESH SCREEN—CK18 redisplays the file values that were in place when you first displayed the screen.

CK19 RETURN WITHOUT UPDATE—CK19 returns you to the Selection Screen without updating cost simulation data.

CK20 DELETE—After you use CK20 once to delete a record, PRISM displays a message that asks you to usethe command key again to confirm and delete the record. The Selection Screen is then redisplayed.

Note: Suppose you enter a resource number, but no simulation record exists for this resource yet. PRISM then displays cost data from your RM Resource Master File. It does not add this data to your simulation file until you press ENTER. In fact, CK20 is an invalid command until you first update the record. So, if you use CK20 to delete, the delete is not recorded on the Session Status Screen. Keep this in mind when reviewing session totals.

Resource Sub-Class Simulation Data Screen—MDE08003

Figure 31:
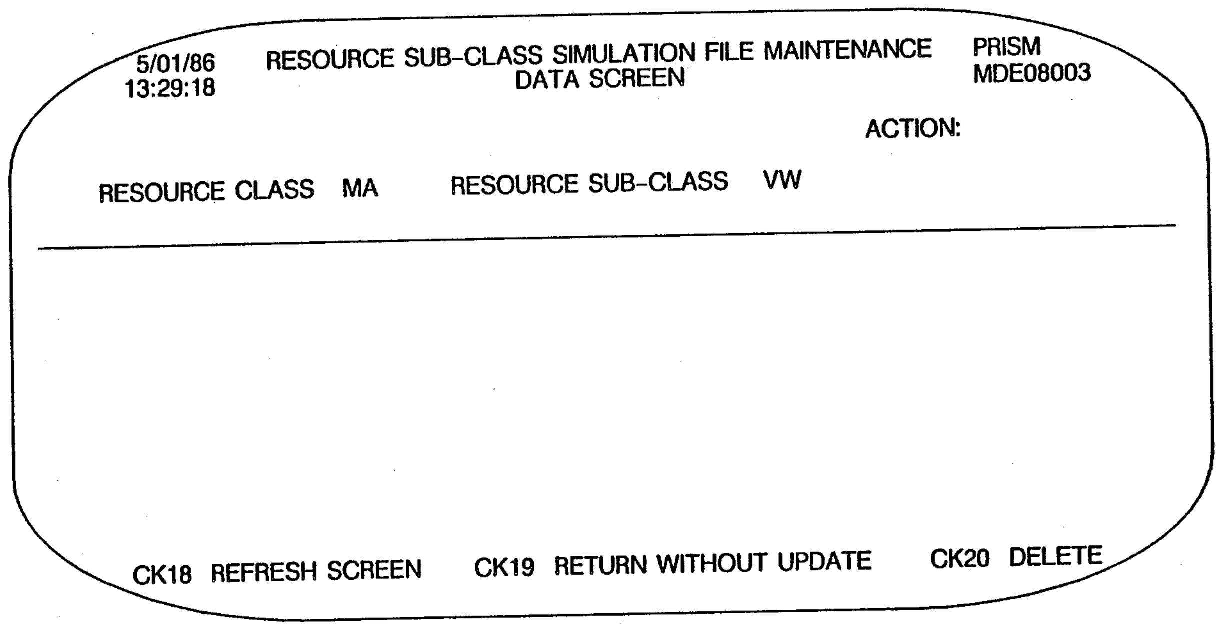

(See Figure 31)

When you select Option 2 from the Selection Screen and press ENTER, PRISM displays the Resource Sub-Class Simulation File Maintenance Data Screen. Here you enter the Resource Class/Sub-Class combination whose simulation data you want to maintain.

Fields for Entry

RESOURCE CLASS—Enter the code for the resource class with which the sub-class record you want to maintain is associated (see *Resource Class File Maintenance*, Section 1-12 of your RM reference manual for details). You may want to run a Resource Class File List (RM Section 4-15) to verify valid resource classes for this entity.

RESOURCE SUB-CLASS—Enter the sub-class whose simulation data you want to maintain. You may want to run a Resource Sub-Class File List (RM Section 3-19) to verify valid sub-classes.

Resource Sub-Class Simulation File Data Screen—MDE08003 (Expanded)

Figure 32:
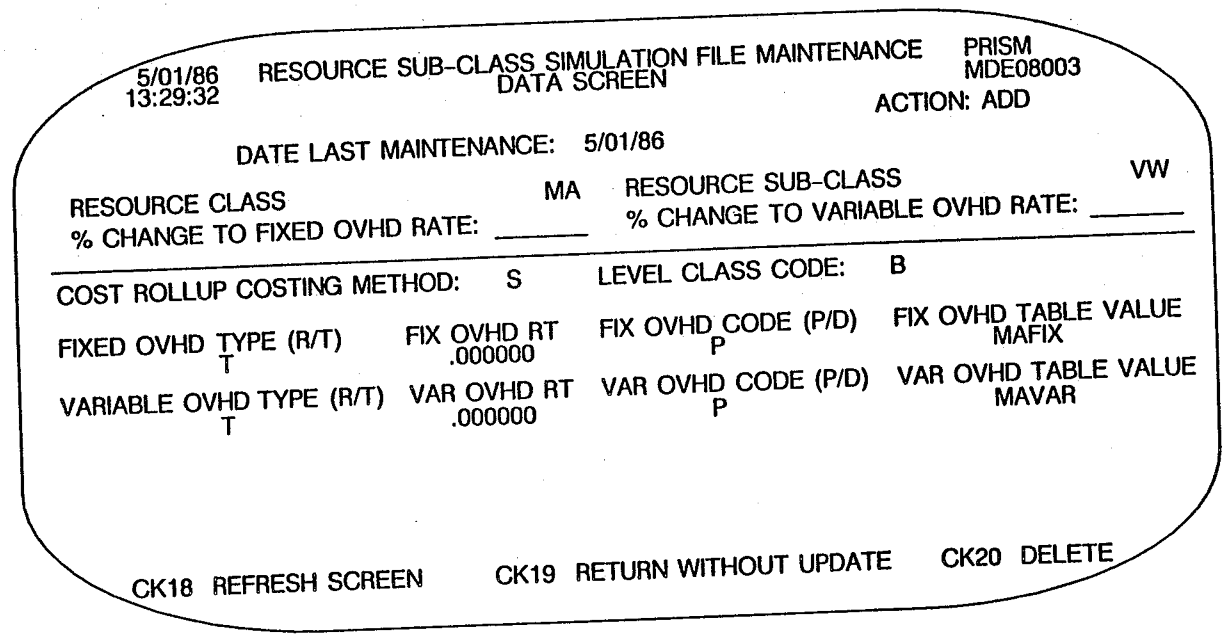

(See Figure 32)

When you press ENTER after defining a valid Resource Class/Sub-Class combination, PRISM displays the requested simulated cost data on the bottom of the data screen. The data comes from the Resource Sub-Class Simulation File if a simulation record already exists for the combination. If a simulation record does not exist, PRISM checks the RM Sub-Class and Class Files for the cost data. Some fields default from RM tailoring if fields are blank in both files. See each entry field below for default details.

Fields for Display

Date of Last Maintenance—date you last maintained this simulation file record, or today's date if you are adding new simulation data.

Action Code—indicates whether you are adding or changing simulation file data. If ADD, the values on the screen are defaults from your RM resource files. If CHANGE, you are looking at simulation file data.

Fields for Entry

See Fields for Entry under Resource Master Simulation Data Screen for detailed descriptions of the following fields.

% Change to Fixed Ovhd Rate—Use this field to specify a percentage change to the fixed overhead rate which appears on the bottom of this screen.

For example, suppose that the current fixed overhead rate for the resource class/sub-class is $500. If you enter a change of 10% here, PRISM adds 10% ($50) of the current rate ($500) to the current rate to get Table Value—required if Variable Overhead Type equals T. Overhead table value assigned to this resource class/sub-class.

Command Function Keys

ENTER—Press ENTER to update simulation data. PRISM redisplays the shortened version of the data screen, where you may select another resource class/sub-class simulation record for maintenance.

CK18 REFRESH SCREEN—CK18 redisplays the file values that were in place when you first displayed the screen.

CK19 RETURN WITHOUT UPDATE—Use CK19 to return to the Selection Screen without updating cost simulation data for the resource.

CK20 TO DELETE—CK20 is available for deleting the record displayed on the screen. After you use CK20 once, PRISM displays a message that asks you to use the command key again to confirm and delete the record. The Selection Screen is then redisplayed.

Remember that deletes do not show up on the Session Status Screen unless the simulation file record already exists. CK20 is an invalid command until the record is first updated.

Resource Class Simulation Data Screen—MDE08004

Figure 33:
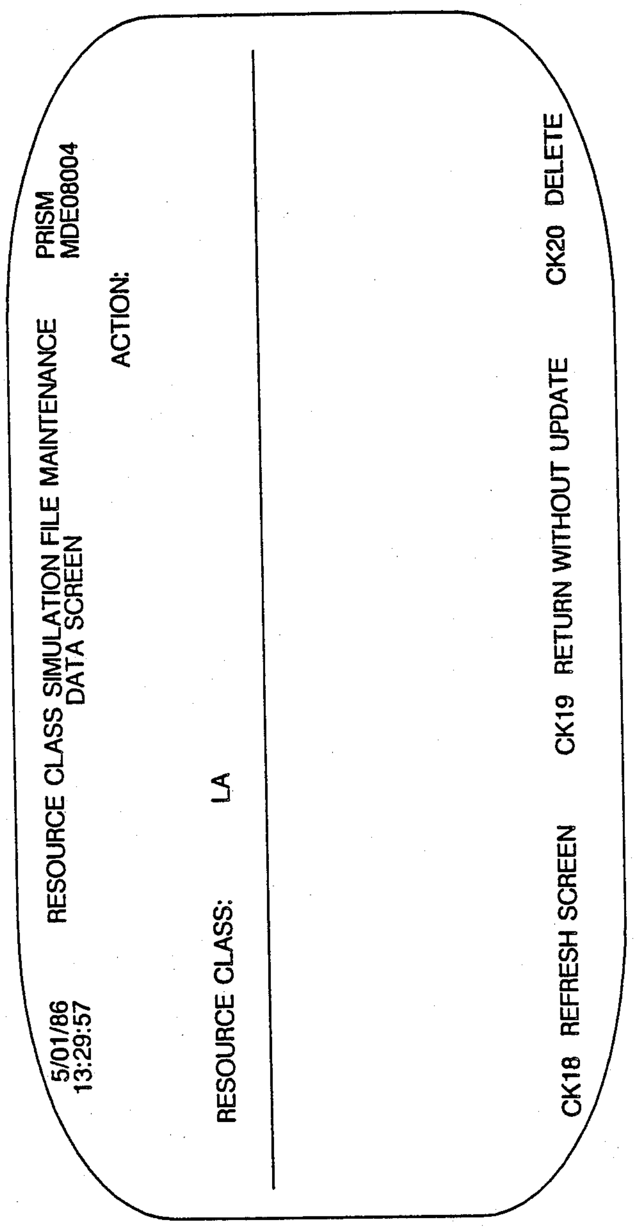

(See Figure 33)

When you select Option 3 from the Selection Screen and press ENTER, PRISM displays the Resource Class Simulation Data Screen. Here you enter the resource class whose simulation data you want to maintain.

a new fixed overhead rate of $550. You may enter a negative percentage change as well, to decrease the rate shown below. This new rate is used in any later simulated cost rollup calculations. You can also change the actual fixed overhead rate entry on the screen.

% Change to Variable Ovhd Rate—The Variable Overhead Rate assigned to this resource class/sub-class is available for entry at the bottom of this screen. Use this field to specify a % change to that rate. See % Change to Fix Ovhd Rate above for details on how PRISM calculates the % change.

Cost Rollup Costing Method—cost rollup costing method assigned to this resource class/sub-class: A for rolling average, F for fixed, H for historical, L for last period average, R for rolled up, S for standard cost. See the Resource Master Simulation Data Screen for details.

LEVEL CLASS CODE—cost rollup level class code assigned to this resource class/sub-class: A to include the first level only, B to include the first and second levels. See the Resource Master Simulation Data Screen for details.

Fixed Overhead:

Type—fixed overhead type code: R if you are defining an actual rate, T if you are assigning the resource class/sub-class an overhead table value.

Rate—required if Fixed Overhead Type equals R. You can enter an actual fixed overhead rate of up to five digits and six decimals.

CODE—P if the defined rate or rate associated with the specified Table Value is a percentage, D if the rate is expressed in dollars.

Table Value—required if the Fixed Overhead Type equals T. The overhead table value assigned to this resource class/sub-class.

Variable Overhead:

Type—variable overhead type code: R if you are defining an actual rate, T if you are assigning the resource class/sub-class an overhead table value.

Rate—required if Variable Overhead Type equals R. You can enter an actual variable overhead rate of up to five digits and six decimals.

CODE—P if the defined rate or rate associated with the specified Table Value is a percentage, D if the rate is expressed in dollars.

Fields for Entry

RESOURCE CLASS—Enter the code for the resource class simulation record you want to maintain. The Resource Class you enter must already exist in your Resource Class File. Run a Resource Class File List (RM Section 3-15) to verify resource class codes.

Resource Class Simulation Data Screen—MDE08004 (Expanded)

Figure 34:
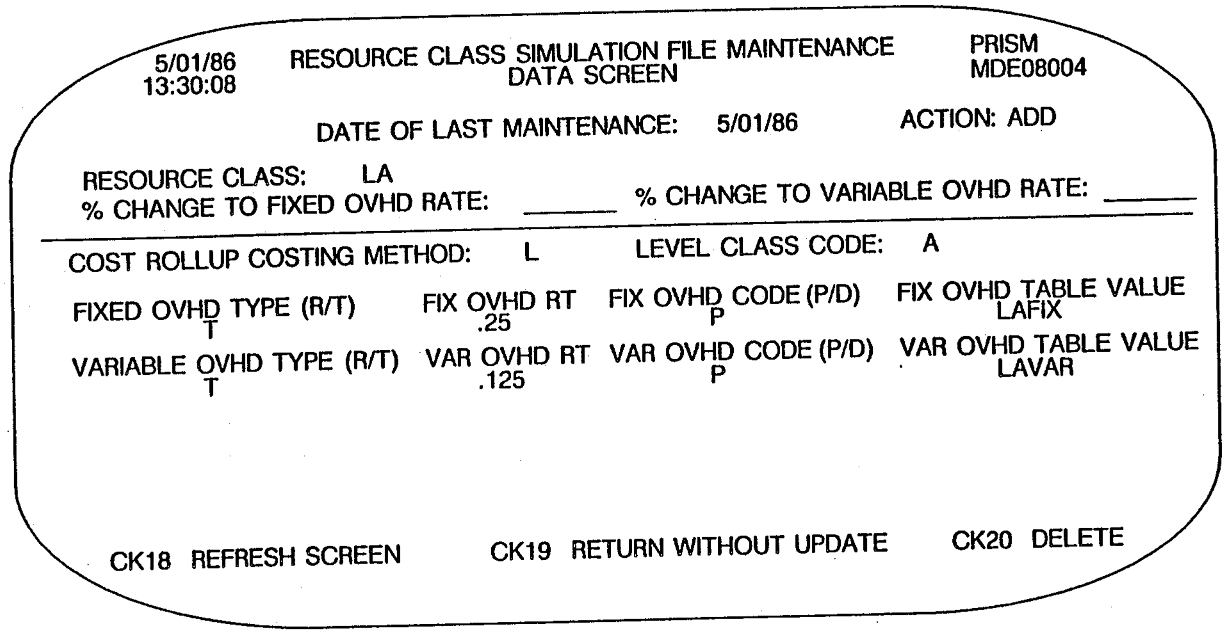

(See Figure 34)

When you press ENTER after defining a valid Resource Class, PRISM displays the requested data on the bottom of the screen. The data comes from the Resource Class File if a simulation record already exists. If a simulation record does not exist, cost information from the Resource Class File is displayed, or, if blank there, from RM tailoring. See each entry field below for default details.

Fields for Display

Date of Last Maintenance—date you last maintained this simulation file record, or today's date if you are adding new simulation data.

Action Code—indicates whether you are adding or changing simulation file data. If ADD, the values on the screen are defaults from your RM resource files. If CHANGE, you are looking at simulation file data.

Fields for Entry

See Fields for Entry under the Resource Master Simulation Data Screen earlier in this section for complete field descriptions.

% Change to Fixed Ovhd Rate—The Fixed Overhead Rate field for this resource class appears at the bottom of this screen. Use this field to specify a percentage change, positive or negative, to the rate.

For example, suppose that the current fixed overhead rate for the resource class/sub-class is $500. If you enter a change of 10% here, PRISM adds 10% ($50) of the current rate ($500) to the current rate to get a new fixed overhead rate of $550. You may enter a negative percentage change as well, to decrease the rate shown below. This new rate is used in any later simulated cost rollup calculations. You can also change the actual fixed overhead rate entry on the screen.

% Change to Variable Ovhd Rate—The Variable Overhead Rate assigned to this resource class is available for entry at the bottom of this screen. Use this field to specify a % change to that rate. See % Change to Fixed Ovhd Rate above for details on how PRISM calculates the % change.

Cost Rollup Costing Method—cost rollup costing method assigned to this resource class: A for rolling average, F for fixed, H for historical, L for last period average, R for rolled up, S for standard cost.

LEVEL CLASS CODE—cost rollup level class code assigned to this resource class: A to include the first level only, or B to include the first and second levels.

Fixed Overhead:

Type—fixed overhead type code: R if you are defining an actual rate, T if you are assigning the resource class an overhead table value.

Rate—required if Fixed Overhead Type equals R. This is the actual fixed overhead rate associated with this resource class, in dollars.

CODE—P if the defined rate or rate associated with the specified Table Value is a percentage, or D if the rate is expressed in dollars.

Table Value—required if the Fixed Overhead Type equals T. This is the overhead table value assigned to this resource class.

Variable Overhead:

Type—variable overhead type code: R if you are defining an actual rate, T if you are assigning the resource class an overhead table value.

Rate—required if Variable Overhead Type equals R. This is the actual variable overhead rate for the resource class.

CODE—P if the defined rate or rate associated with the specified Table Value is a percentage, D if the rate is expressed in dollars.

Table Value—required if Variable Overhead Type equals T. This is the overhead table value assigned to this resource class.

Command Function Keys

ENTER—Press ENTER to update simulation data. PRISM redisplays the shortened version of the data screen, where you may select another resource class cost simulation record for maintenance.

CK18 REFRESH SCREEN—CK18 redisplays the file values that were in place when you first displayed the screen.

CK19 RETURN WITHOUT UPDATE—Use CK19 to return to the Selection Screen without updating cost simulation data for the resource class.

CK20 TO DELETE—CK20 is available for deleting the record displayed on the screen. After you use CK20 once, PRISM displays a message that asks you to use the command key again to confirm and delete the record. The Selection Screen is then redisplayed.

Remember that deletes do not show up on the Session Status Screen unless the simulation file record already exists. CK20 is an invalid command until the record is first updated.

Resource Balance Simulation Data Screen—MDE08007

Figure 35:
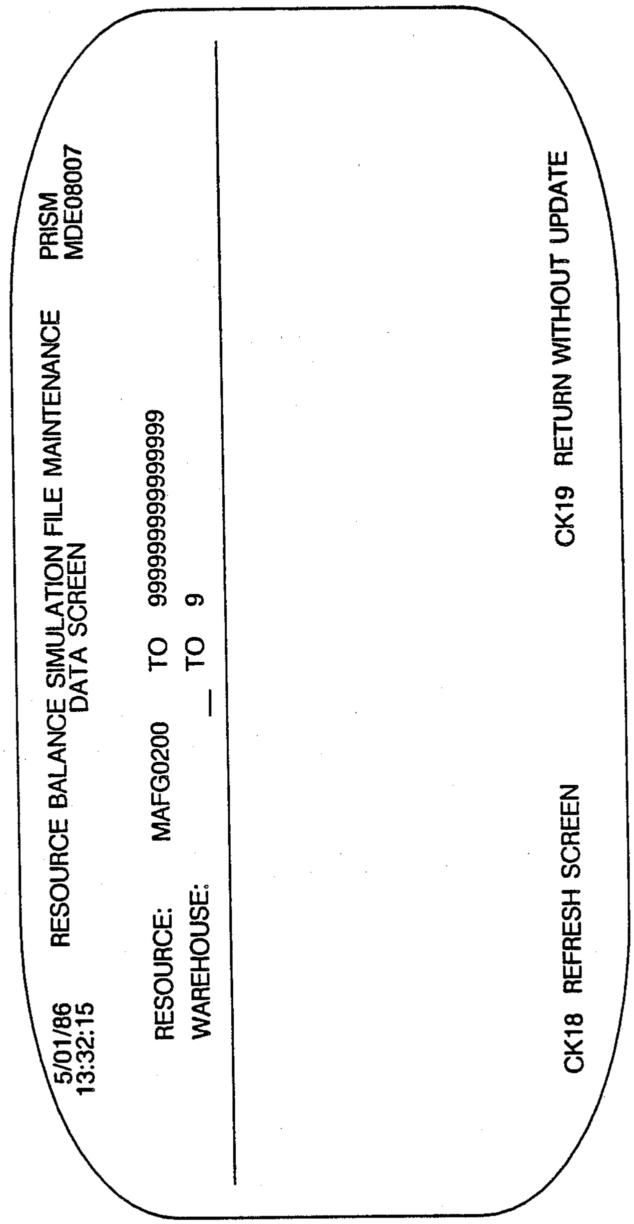

(See Figure 35)

When you select Option 4 from the Selection Screen and press ENTER, PRISM displays the Resource Balance Simulation Data Screen. Here you enter a range of Resource/Warehouse combinations whose simulation data you want to maintain.

Fields for Entry

* Resource—Enter the range of resources. Each resource must exist in your RM Resource Master File. Run a Resource Master File List (RM Section 4-16) to verify valid resources.

Warehouse—Enter the range of warehouses where the above resources are stored. The resource/warehouse combination you enter must exist in your Resource Balance file. You may want to run a Resource Balance File List (RM Section 4-14) for valid resource/warehouse combinations.

Note: If you leave both of the above fields blank, PRISM displays all resources in the Resource Balance file.

Resource Balance Simulation Data Screen—MDE08007 (Expanded)

(See Figure 36)

When you press ENTER after defining a range of resources and warehouse, PRISM displays the requested simulated cost data on the bottom of the screen. Since the screen only accomodates 10 lines of information at a time, use the Roll Up and Roll Down keys to page through the entire list.

The data comes from the Resource Balance Simulation File if a record already exists for the resource/warehouse range. If no information exists there, cost information from the Resource Balance File file is displayed and updated into the simulation file when you press ENTER.

*Fields for Display*

Resource—PRISM displays the resource number range you entered on the shortened version of the screen. In each detail line shown on the bottom of the screen, the individual resource number is displayed.

Warehouse—PRISM displays the warehouse number range you entered on the shortened version of the screen. In each detail line shown on the bottom of the screen, the individual resource/warehouse number combination is displayed.

*Fields for Entry*

In Resource Master Maintenance you define a cost rollup costing method for each resource. This specifies which cost is to be used during a rollup: A for rolling average, F for fixed, H for historical, L for last period's average cost, R for rolled up, or S for standard.

You define standard and fixed cost in Resource Master Maintenance. The other three costs are calculated by PRISM at each period close (see *Period Close*, Section 9-2, of your RM reference manual). These three cost fields appear as entry fields on this screen and brief descriptions of each follow. See Section 1-13 of your RM reference manual for more detailed descriptions. Any change you initiate with these fields affects all the values on the record, that is, every value beyond the ten displayed on the screen.

% Change to Hist Avg Cost—The historical average cost is usually calculated by taking the average of all period average costs and the most recent period average cost. Here, however, you can change the historical average cost. Suppose the historical average cost in place for resource X is $500. If you enter a change of 10%, PRISM adds 10% of the current cost ($500) to the current cost to get a new historical average cost of $550. This new cost is used in any later simulated cost rollup calcuations.

This calculation method gives considerably more weight to the most recent period than to any other individual period. You may not want to use this cost method if the last period average cost was unusually above or below average.

You can also change the historical average cost by simply moving to the bottom of the screen and keying in the new value.

% Change to Rolling Avg Cost—Rolling average cost is the historical average cost with an adjustment to even out the averaging. In RM tailoring question #T38 you define the percentage to be applied to the last period average cost so that it does not outweigh the historical average.

You can use this field to specify a change to the displayed cost value. Or you can change the rolling average cost by simply moving to the bottom of the screen and keying in the new value. See % Change to Hist Avg Cost above for details on how PRISM calculates the percentage change.

% Change to Last Comp Pd Cost—The last complete period average cost is the average cost of this resource over the period just closed. You can use this field to specify a change to the cost value. Or you can change the last complete period cost by simply moving to the bottom of the screen and keying in the new value. See % Change to Hist Avg Cost above for details on how PRISM calculates the percentage change.

Dl—Enter a D in this column to delete the simulated cost data for this resource/warehouse combination. PRISM will instead use cost data for the resource/warehouse from the RM Resource Balance File for the cost rollup.

When you key in delete codes and press ENTER, PRISM immediately deletes the lines and redisplays the Selection Screen. For convenience, then, you should perform all other file maintenance on the record before pressing ENTER to delete. Otherwise, you must reselect the record to finish maintenance.

Remember that deletes do not show up on the Session Status Screen unless the simulation file record already exists. If you delete new simulation data that has not yet been updated, PRISM simply removes the information from the screen.

Hist Avg Cost—historical average cost assigned to this resource/warehouse.

Rolling Avg Cost—rolling average cost assigned to this resource/warehouse.

Last Comp Pd Cost—last complete period average cost assigned to this resource/warehouse.

Command Function Keys

ENTER—Press ENTER to update or delete simulation data for the resource/warehouse combinations displayed. PRISM redisplays the shortened version of the data screen, where you may select another resource/ warehouse record or range of cost simulation records for maintenance.

CK18 REFRESH SCREEN—CK18 redisplays the file values that were in place when you first displayed the screen.

CK19 RETURN WITHOUT UPDATE—Use CK19 to return to the Selection Screen without updating resource /warehouse cost simulation data.

Overhead Rate Simulation Data Screen—MDE08008

Figure 37:
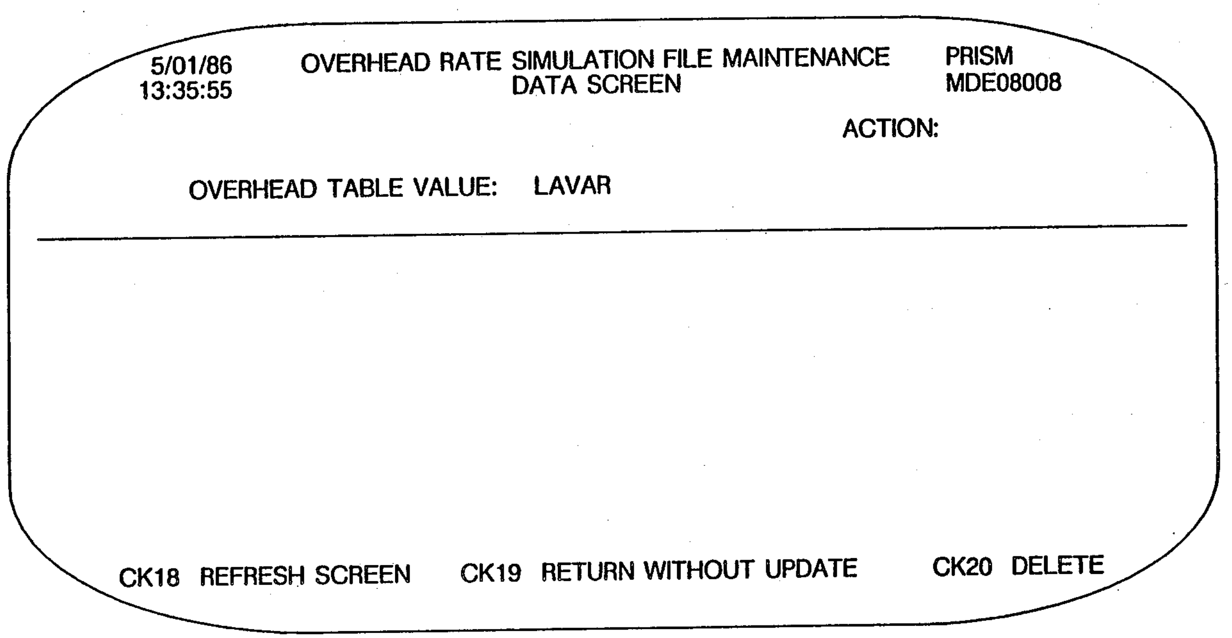

(See Figure 37)

When you select Option 5 from the Selection Screen and press ENTER, the Overhead Rate Simulation File Maintenance Data Screen appears. On this screen you enter the Overhead Table Value whose simulation cost data you want to maintain.

Fields for Entry

OVERHEAD TABLE VALUE—Enter the overhead table value to display its cost data. You defined overhead table values in Overhead Rate Maintenance (RM Section 1-7). The overhead table value you enter must already exist in your RM Overhead Rate File. You may want to run an Overhead Rate File List (RM Section 4-9) to verify valid overhead table values.

Overhead Rate Simulation Data Screen—MDE08008 (Expanded)

Figure 38:
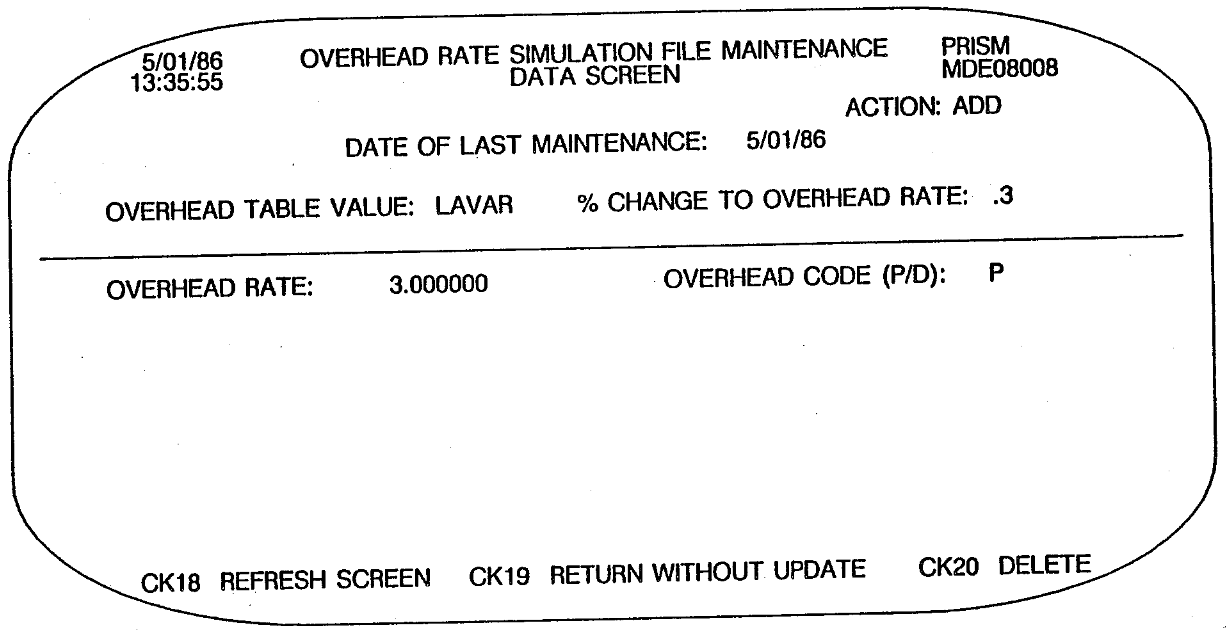

(See Figure 38)

When you define an overhead table value and press ENTER, PRISM displays the requested cost information on the bottom of the screen.

The data comes from the Overhead Rate Simulation File if a record exists for the table value. If a simulation record does not exist, cost information from the Overhead Rate File is displayed. If blank there, some fields also default from RM tailoring. See each entry field below for default details.

Fields for Display

Date of Last Maintenance—date you last maintained this simulation file record, or today's date if you are adding new simulation data.

Action Code—indicates whether you are adding or changing simulation file data. If ADD, the values on the screen are defaults from your RM resource files. If CHANGE, you are looking at simulation file data.

Overhead Table Value.

Fields for Entry

% Change to Overhead Rate—Use this field to specify a percentage change, positive or negative, to the overhead rate that appears further down on this screen.

OVERHEAD RATE—Enter or change the rate assigned to this overhead table value. If a dollar value, this rate is five digits-long, plus six decimals. Enter only four decimal positions for percentages.

OVERHEAD RATE CODE—P if the entered overhead rate is a percentage, or D if it is expressed in dollars.

Command Function Keys

ENTER—Press ENTER to update your overhead simulation data. PRISM redisplays the shortened version of the Data Screen, where you may select another record for maintenance.

CK18 REFRESH SCREEN—CK18 redisplays the file values that were in place when you first displayed the screen.

CK19 RETURN WITHOUT UPDATE—Use CK19 to return to the Selection Screen without updating simulated cost information for the overhead table value.

CK20 TO DELETE—CK20 is available for deleting the record. After you use CK20 once, PRISM displays a message that asks you to use the command key again to confirm and delete the record. The Selection Screen is then redisplayed.

Remember that deletes do not show up on the Session Status Screen unless the simulation file record already exists. If you delete new simulation data that has not yet been updated, PRISM simply removes the information from the screen.

Session Status Screen—MDE08009

(See Figure 39)

Taking CK01 from the Selection Screen calls up the Session Status Screen. Use this screen to review the total number of simulation file records added, changed, and deleted. CK01 from the Status Screen returns you to the menu where you initially called the option, and prints a register that details your maintenance activity.

SECTION VI-II

When To Use Overhead Rate File Maintenance

For each resource in your system you can assign an overhead table value, or specify an overhead rate. This rate adds a certain dollar amount or percentage to the cost of a resource to account for overhead costs. Option 7 allows you to maintain the Overhead Rate (OVRHDF) file, so you can group overhead costs.

This file is helpful if you have, for example, 1,000 resources with the same overhead rate. You define a single overhead table value, say T1, to refer to an overhead rate of 10 percent. You then assign an overhead table value of T1 to those resources, rather than specifying 10 percent for each one. Later, if you want to change all those resources to an overhead rate of 13 percent, all you have to do is use this option and change Table T1 to a rate of 13 percent, rather than changing the overhead rates for 1,000 resources.

How To Use Overhead Rate File Maintenance

When you select Option 7 from the File Maintenance Menu (MI10), the Overhead Rate File Maintenance Selection Screen is displayed. Use this screen to identify the Overhead Table Value you want to remove or for which you want to add or change the defined rate.

Selection Screen—MIE10001

(See Figure 40)

Fields for Entry

Overhead Table Value—Enter a code up to five characters long. This is the code you enter in Resource Master, Resource Class, and/or Resource Sub-Class File Maintenance, to stand for a particular overhead rate.

ACTION CODE—Enter A to add a new overhead table value, C to change an existing record, or D to delete an existing record.

Command Function Keys

ENTER—Press ENTER after entering the overhead table value and an action code, to proceed to the data screen.

CK01 DISPLAY SESSION STATUS—Press CK01 to display the session status screen, which shows the number of records in the Overhead Rate file you have added, changed, and deleted during this session. When you exit Overhead Rate Maintenance by pressing CK01 from that screen, a register is automatically printed. This register shows all records added, changed, and deleted during this maintenance session, with the current data for each.

CK20 DELETE—After entering action code D, you can choose one of two methods to remove the record:

(1) Press CK20. This removes this record from the file immediately.

(2) Press ENTER. This displays the data screen with the information for the record you are attempting to delete. At that point a message is displayed, instructing you to press CK20 to confirm that you want to delete the record. From this screen you can also press CK19 to return to the selection screen without removing the record.

Data Screen—MIE10002

Figure 41:
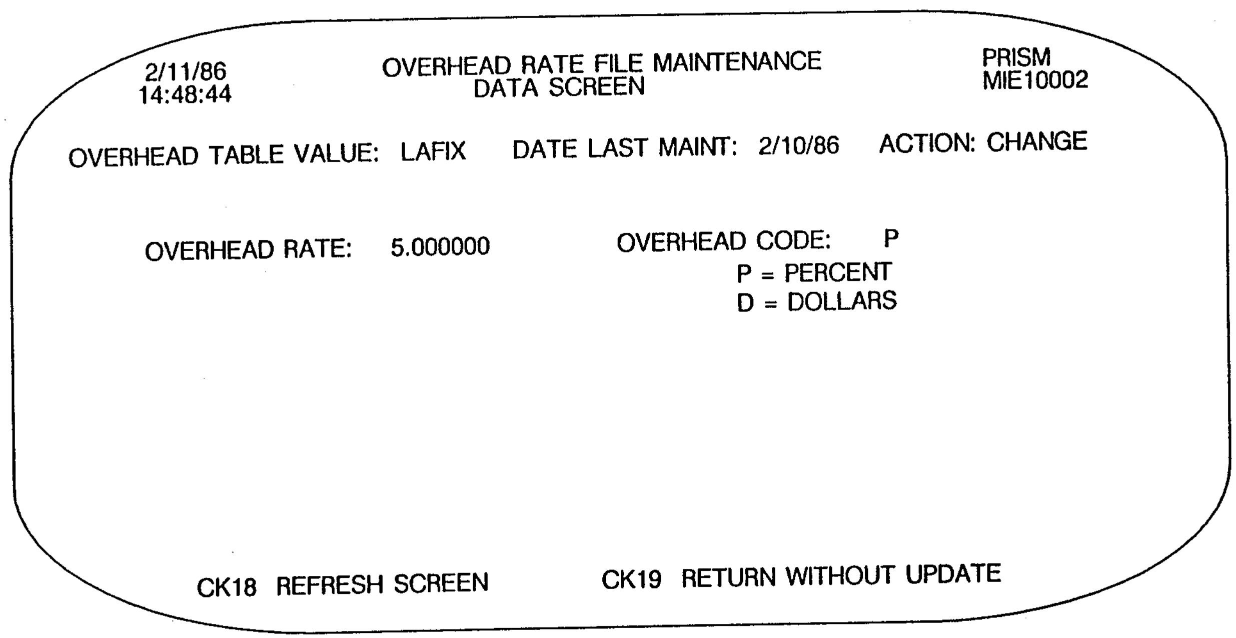

(See Figure 41)

The data screen is displayed when you press ENTER on the selection screen. Here, if the action code is A (add) or C (change), you can enter an overhead rate for each unit of a resource to which this overhead table value is assigned. The rate can be a percentage of the unit cost of the resource, or it can be a dollar amount.

Fields for Display

Overhead Table Value

Date Last Maint—date this overhead record was last updated. If you are adding a table, this is today's date.

Action—The word ADD, CHANGE, or DELETE is displayed here, depending on the action code. If the word DELETE is displayed, all fields on this screen are for display only—you cannot enter or change the overhead rate associated with this table value.

Fields for Entry

OVERHEAD RATE—amount or percentage overhead per unit of a resource.

OVERHEAD CODE—Enter P (percent) or D (dollars), to indicate whether this overhead rate is a percentage of the unit cost of the resource or a dollar amount. If this field is P, then the Overhead Rate field can have at most four decimal places. If you enter a percentage of 3.12345, for example, it is truncated to 3.1234.

Your entries on this screen determine your method of distributing overhead costs among the resources you use. Suppose you have an overhead table value called T1, which you assign a rate of 10. You assign overhead table T1 to resource A, whose unit cost is $40, and resource B, whose unit cost is $20.

If the overhead code for T1 is P (percent), the system adds $4 to the unit cost of resource A (for a total of $44) and $2 to that of resource B (for a total of $22). If the overhead code is D (dollars), the system adds $10 to the cost of each unit of resource A (for a total of $50) and $10 to each unit of resource B (for a total of $30).

Command Function Keys

ENTER—Press ENTER after entering or changing the overhead rate and type, to update the file with this new information. This returns you to the selection screen. If the action code is D (delete), pressing ENTER just redisplays the screen.

CK18 REFRESH SCREEN—Select CK18 to redisplay this screen with the values currently stored in the file. If you are adding a record, the overhead rate is blank and the overhead code entered the last time this screen was used is displayed. If you are changing a record, the old rate information is displayed. If the action code is D (delete), the same values are displayed.

CK19 RETURN WITHOUT UPDATE—If you decide not to add, change, or delete the information for this overhead table, press CK19. This returns you to the selection screen.

CK20 DELETE—If the action code is D, a message is displayed at the bottom of the screen, instructing you to press CK20 to delete the record. At this point, you have a choice:

(1) Press CK20 to remove this record from the file and return to the selection screen.

(2) Press CK19. This returns you to the selection screen without removing the record.

SECTION VI-III

When To Use Resource Master Maintenance

Option 13 allows you to maintain the Resource Master (RESMST) file. This file contains information about each resource used in your system.

You assign a resource class and sub-class to each resource in this file. If you define your classes and sub-classes so that the resources in those categories have a number of common characteristics, many fields in Resource Master Maintenance need not be entered. You can simply allow the appropriate information to "default from" the corresponding Resource Class or Resource Sub-Class file record. See *RM Concepts*, Section B, for a detailed discussion of the PRISM defaulting system.

How To Use Resource Master Maintenance

When you select Option 13 from the File Maintenance Menu (MI10), the Resource Master Maintenance Selection Screen is displayed. Use this screen to identify the resource you want to maintain.

Selection Screen—MIE18001

Figure 42:
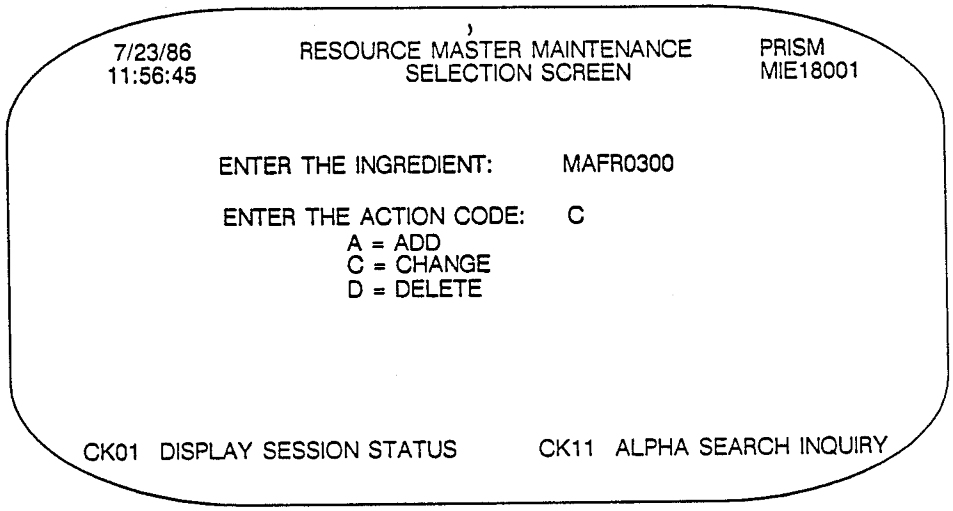

(See Figure 42)

Fields for Entry

- Resource—required entry with action code A. Enter the number of the resource you want to add, change, or delete.

If you are planning to install Resource Processor (RP), you may want to name your work centers for the resources produced there. In this case, your resource numbers can be no more than five characters long, because that is the length of the Work Center field. This method of naming work centers also comes into play when you create a dependent resource for an operation. See the Operation Maintenance Screen in Production Model Maintenance (Section 1-4 of the RP reference manual) or Schedule Maintenance (Section 7-3 of this manual).

ACTION CODE—Enter A to add a new resource, C to change an existing resource, or D to delete an existing resource.

If you are adding a resource and the answer to tailoring question #G15 or #G32A is Y (depending on whether it is a balance or non-balance resource—see Data Screen MIE18002), Resource Balance (RESBAL) file records are automatically generated for that resource. Each of these tailoring questions has an associated question that determines which warehouses are used.

For example, when adding a balance resource, if tailoring question #G15 is Y and the response to tailoring question #G16 includes warehouses A, B, and C, then Trade Secret Information of Marcam; All Rights Reserved.

Resource Balance records are created for this resource in those warehouses.

Command Function Keys

ENTER—Press ENTER after entering the resource number, to proceed to Data Screen MIE18002.

CK01 DISPLAY SESSION STATUS—Press CK01 to display the session status screen, which shows the number of records in the Resource Master file you have added, changed, and deleted during this session. When you exit Resource Master Maintenance by pressing CK01 from that screen, a register is automatically printed. This register shows all records added, changed, and deleted during this maintenance session, with the current data for each.

CK11 ALPHA SEARCH INQUIRY—Press CK11 to display the Alpha Search Inquiry Screen, if you do not know the number of the resource you want to maintain. This inquiry allows you to find the number you need using information you already have, such as a partial description. You can then select the correct resource number from a list and have the system return that number to this screen. For more information about the Alpha Search Inquiry, see Section 6-1.

CK20 DELETE—After entering action code D, you can choose one of two methods to remove the record:

(1) Press CK20. This removes this record from the file immediately.

(2) Press ENTER. This displays Data Screen MIE18002 with the information for the record you are attempting to delete. At that point a message is displayed, instructing you to press CK20 to confirm that you want to delete the record. From that screen you can also press ENTER to display further data screens, or press CK19 to return to the selection screen without removing the record.

Data Screen MIE18002

(See Figure 43)

This data screen is displayed when you press ENTER on the selection screen. Here, if the action code is A (add) or C (change), you can enter the attributes associated with this resource number. If the action code is D, all fields on this screen are for display only.

Fields for Display

- Resource

Date Last Maint—date this resource was last updated. If you are adding a new resource, this is today's date.

Action—The word ADD, CHANGE, or DELETE is displayed here, depending on the action code.

Date ABC Code Last Updated—date the ABC Report (see Section 2-1) was last used to update the ABC code for this resource.

# of Times Resource is Used—used only if this is a potent resource (Potent Resource = Y: see Data Screen MIE18004) with a Potency Factor greater than zero. This is the number of tasks on production models that produce or consume this potent resource. The system updates this field when you run the Potent Resource Usage Counter (see Section 5-2 of the RP reference manual).

Fields for Entry

CLASS—resource class to which this resource belongs.This field is available for entry only when the action code is A (add). To change a resource class, you must use Option 6 from the Batch Update Menu (MI90).

SUB-CLASS—resource sub-class to which this resource belongs. This field is available for entry only when the action code is A (add). To change a resource sub-class, you must use Option 6 from the Batch Update Menu (MI90).

Description—Enter up to 30 characters of description for this resource.

STANDARD UNIT OF MEASURE—unit of measure for this resource. This field is available for entry only when the action code is A (add).

Earliest Acceptable Revision Level—Enter the lowest revision level of this resource still acceptable for use.

Current Revision Level—current revision level of this resource.

Service Level (%)—used in future PRISM modules. Default from Resource Sub-Class (RESUBC) file loaded.

Balance Resource Code (B/C)—Enter B if this is a "balance" resource, one for which you keep track of balances in locations. Enter C if this is a "count up" resource, one whose usage you track but for which you do not keep location balances. Labor, for example, might be a "count up" resource. Default from Resource Sub-Class (RESUBC) file loaded.

ABC Code—user-maintained or updated by the system. This code indicates which resources are most important. You define a percentage for each code (A, B, and C), adding up to 100, and assign a code to each resource. If the percentage for code A is 15, for example, then ABC code A should be assigned to the 15 percent of your resources that are most important (based on the method defined in tailoring question #G20). You can also have the system calculate the ABC code for each resource when the ABC Report is printed, and load the appropriate code for each resource into this file.

Shortage Flag (Y/N)—indicates whether there is a shortage of this resource. If you launch a schedule and the system cannot reserve the entire allocated quantity of the resource (there is an insufficient quantity of the resource in on hand location classifications in the warehouse), this field is changed from N to Y.

Periodically, you run the Reset Resource Shortage Flag program (see Section 9-5) to change this field back to N for resources that no longer have shortages. You can also change this field to Y or N manually.

Miscellaneous Field 1—Miscellaneous fields 1-3 are available for you to enter any resource information you need that is not covered by the existing fields in the Resource Master file. It is recommended that you determine a consistent meaning for each field: Miscellaneous Field 1 should not mean "department number" for resource 200 and "sales rep name" for resource 202.

Miscellaneous Field 2—see MISCELLANEOUS FIELD 1.

Miscellaneous Field 3—see MISCELLANEOUS FIELD 1.

Amounts or percentages for variable and fixed overhead are added to the cost of a resource to account for the overhead cost accumulated when using that resource. The following eight fields allow you to determine how these overhead figures are calculated for this resource.

If you allow the answers for all four variable overhead fields to default from the Resource Sub-Class (RESUBC) file, those defaults are used but are not loaded into the Resource Master file. If you override one or more defaults, all four fields are loaded into the file. A similar rule is followed for the four fixed overhead fields. For more information about the PRISM defaulting system, see *RM Concepts*, Section B.

Variable Overhead Table/Rate (T/R)—Enter T if the variable overhead rate for this resource is to be taken from a table. In this case, you must enter a valid table value from the Overhead Rate (OVRHDF) file in the Variable Overhead Table Value field. Enter R if the overhead rate is specified here. In this case, you must enter a Variable Overhead Rate and Code.

Variable Overhead Table Value—Enter the table value to be used, if the Table/Rate field is T. Each valid table value defined in the Overhead Rate file is associated with a rate and an overhead code.

Variable Overhead Rate—Enter the variable overhead rate, if the Table/Rate field is R. The Variable Overhead Code determines whether this is a percentage (P) of the cost of the resource, or a dollar amount (D).

Variable Overhead Code (P/D)—Enter P if the Variable Overhead Rate is a percentage of the cost of the resource. Enter D if it is a dollar amount. If this field is P, the Variable Overhead Rate cannot be zero.

Fixed Overhead Table/Rate (T/R)—Enter T if the fixed overhead rate for this resource is to be taken from a table. In this case, you must enter a valid table value from the Overhead Rate (OVRHDF) file in the Fixed Overhead Table Value field. Enter R if the overhead rate is specified in this record. In this case, you must enter a Fixed Overhead Rate and Code.

Fixed Overhead Table Value—Enter the table value to be used, if the Table/Rate field is T. Each valid table value defined in the Overhead Rate file is associated with a rate and an overhead code.

Fixed Overhead Rate—Enter the fixed overhead rate, if the Table/Rate field is R. The Fixed Overhead Code determines whether this is a percentage (P) of the cost of the resource, or a dollar amount (D).

Fixed Overhead Code (P/D)—Enter P if the Fixed Overhead Rate is a percentage of the cost of the resource. Enter D if it is a dollar amount. If this field is P, the Fixed Overhead Rate cannot be zero.

Cumulative LT of Prime Costing PM—total lead time for the prime costing PM for this resource (see PRIME COSTING PM—TYPE/NAME, below). For more information, see *Cost Rollup*, Sections 2-2 and 2-3 of the RP reference manual.

Theoretical Cons Code (D/C/T)—default theoretical consumption code for this resource. Enter the letter corresponding to the method of consuming this resource. This field must be D if (1) tailoring question #G17 is N or (2) Batch Consumption Code for this resource is Y (see below). The first combination of entries causes a hard halt (severity code 0) message; the second displays a message that is either overrideable (severity code 1) or a hard halt. Default from Resource Sub-Class (RESUBC) file loaded. You have three options:

D = DIRECT. Use this code with resources you want to track most carefully, because it encourages precise tracking of the use of the resource. This means that a direct issue (DI) transaction must be entered to issue this resource to a particular task on a schedule release. A quantity issued in this way and then not used can be returned to the warehouse using an RS (return to stock) transaction.

C = CALCULATED COST. Use this code with balance resources you want "almost" theoretically consumed. The sequence of events for using such resources in production is as follows:

(1) Issue a quantity of the resource to the shop floor or production line using an IP (issue to production) transaction. This tells the system that this quantity has been taken out of inventory and to the shop floor, but does not indicate what task on what schedule release will actually use the resource.

This transaction causes the system to reduce the quantity of this resource in this warehouse (this information is in the Resource Balance (RESBAL) file), and to reduce the quantity of this resource at each location (information in the Location Detail (LOCDTL) file) from which it was picked.

(2) When you enter a PR (production receipt) transaction for a resource produced by the production model, you do not have to tell the system how much of this resource you used in this run of the PM. The system uses the quantity received from production to calculate how much of the consumed resource you must have used. It then automatically generates a CC (calculated cost) transaction for that quantity of the resource.

NOTE: The CC transaction alone does not reduce the system's estimate of the quantity of a resource in a warehouse or at a location (see step 1, above). This is accomplished by the IP transaction, so it is very important that this step not be omitted for a resource with a Theoretical Consumption Code of C.

T = THEORETICAL CONSUMPTION. Use this code for resources (balance or non-balance) you want theoretically consumed. These could be resources too numerous and inexpensive to count, such as lids for 32-ounce jars, or non-balance resources that cannot be physically taken from inventory to the shop floor, such as labor.

For example, you may want electricity theoretically consumed, if the amount of electricity available to you is unlimited. In that case, you have no balance of the resource on hand, but you do want to track what you use because it does add to the cost of production.

When a PR transaction is entered, the system calculates the quantity of this resource used based on the quantity of the end resource produced. Suppose the PM produces 100 pounds of tomato paste per batch and uses 1 KwH of electricity per 100 pounds of paste (electricity has a theoretical consumption code of T). When you enter a PR transaction for 300 pounds of tomato paste, the system automatically generates a TC (theoretical consumption) transaction for 3 KwH of electricity.

Batch Consumption (Y/N)—Y if the resource can be used in full batch quantities only, N if partial batches are allowed. If this field is Y, Theoretical Consumption Code (see above) must be D. Default from Resource Sub-Class (RESUBC) file loaded.

This concept is best illustrated by an example. Suppose your production model requires that a cook stand by the kettle as 20 gallons of sauce simmers for one hour. Your planning activities indicate that you need 30 gallons of sauce, so you plan to run 1-1/2 batches. However, you still need an hour of the cook's time to watch it simmer, even when you are running only half a batch.

A Y in this field prevents the system from calculating partial batch quantities for the resource; it rounds up the quantity instead. In this case, 1-1/2 batches is rounded up to two batches, and the system calculates that you need two hours of the cook's time rather than 1-1/2 hours. Place an N in this field if this resource can have partial batch quantities.

Prime Planning PM—Type—PM type for the production model to be used when planning production of this resource. This field and the Prime Planning PM Name field also identify the default PM to be used when superflushing this resource (see *RM Concepts*, Section B).

Prime Planning PM Name—production model to be used when planning production of this resource.

Prime Costing PM—Type—PM type for the production model used by the Cost Rollup program in Resource Processor (see Sections 2-2 and 2-3 of the RP reference manual) to calculate the cost of producing this resource.

Prime Costing PM—Name—production model used by the Cost Rollup program in Resource Processor (see Sections 2-2 and 2-3 of the RP reference manual) to calculate the cost of producing this resource.

Selling Price—selling price for this resource.

Recost (Y/N)—If this field is Y, the rolled-up cost of this resource will be recalculated the next time the Cost Rollup program is run in RP. The system automatically changes this field to Y if you change any cost information (see Data Screen MIE18005) except Net Realizable Value. The system then changes this field back to N when the Cost Rollup program recalculates the cost of this resource. You can also change this field to Y or N manually.

Command Function Keys

ENTER—Press ENTER to proceed to Data Screen MIE18003.

CK15 NOTEBOOK FILE MAINTENANCE—available only if the action code is A (add) or C (change). Select CK15 to display Notebook File Maintenance data screen MZE08002, to enter values for any extra fields defined for the Resource Master file. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19. This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

Data Screen MIE18003

(See Figure 44)

This data screen is displayed when you press ENTER on Data Screen MIE18002. Here, if the action code is A (add) or C (change), you can enter the attributes associated with Trade Secret Information of Marcam; All Rights Reserved.

this resource number. If the action code is D, all fields on this screen are for display only.

Fields for Display

° Resource

Date Last Maint—date this resource was last updated. If you are adding a new resource, this is today's date.

Action—The word ADD, CHANGE, or DELETE is displayed here, depending on the action code.

Simulated Rollup Task Name—name of the task that produces this resource, on the production model most recently used to perform a simulated rollup of this resource.

Actual Rollup Task Name—name of the task that produces this resource, on its Prime Costing PM.

Date Last Rollup—date the Cost Rollup program was last run for the Prime Costing PM (see Data Screen MIE18002) for this resource. 0/00/00 if it has never been run or if there is no Prime Costing PM (for example, if this is a purchased resource).

Fields for Entry

RECALCULATE LEAD TIME (Y/N)—reserved for future PRISM enhancements.

Cost Rollup Costing Method—used only if RP is installed. Enter the letter corresponding to the cost figure you want to use. Default from Resource Sub-Class (RESUBC) file not loaded.

A—rolling average cost with alpha factor (RESBAL)

F—fixed cost (RESMST)

H—historical average cost (RESBAL)

L—last period's average cost (RESBAL)

R—cost from last rollup (RESMST)

S—standard cost (RESMST)

This code indicates the type of cost to be used for a consumed resource when needed to roll up the cost of a produced resource. For example, suppose the cost rollup program is calculating the cost of producing tomato paste. One of the ingredients in the tomato paste is tomatoes. This code tells the system what price to use for tomatoes in calculating the cost of tomato paste. For more information on the available cost figures, see *RM Concepts*, Section B.

Cost Rollup Type Code (F/N/V)—used only if RP is installed. Default from Resource Sub-Class (RESUBC) file not loaded.

Think of the cost of production as having three components: the actual cost of the consumed resources, plus adjustments for fixed and variable overhead. The cost of a produced resource is stored in three "buckets:"

(1) "Direct" cost. This is the total of costs directly attributable to production of this resource, for example materials.

(2) Fixed overhead. "Overhead" refers to costs not directly attributable to production of a particular resource. "Fixed" overhead means the costs in this category that stay the same regardless of your level of production. For example, if you rent your building, you pay a fixed amount every month, no matter how much beef stew or tomato paste you produce. This cost is not the direct result of producing any single resource, so you try to distribute it logically among some or all of your products.

(3) Variable overhead. These are overhead costs that vary with production. Electricity could be considered variable, for example if you use more to produce 100 cases of beef stew than to produce 50 cases.

The cost of each resource consumed in order to produce something is also stored in three buckets. In the "direct cost" bucket is the cost of this resource determined by the Cost Rollup Costing Method (see above). Let's say you have an L in that field, and the last period's average cost of this resource is $1.20.

On screen MIE18002 you defined the fixed and variable overhead costs for this resource. Let's say the fixed overhead is 10 percent, and the variable overhead is $0.05, a flat dollar amount for each unit consumed.

Suppose you use 100 units of this resource in running one batch of the production model. When rolling up the PM, the direct cost of this resource would be $120, the fixed overhead would be $12, and the variable overhead would be $5.

If this resource is beans being used to make beef stew, you would expect the direct cost of the beans to add to the direct cost of the stew, the fixed overhead for the beans to add to the fixed overhead bucket for the stew, and so on.

But what if this resource is electricity? Maybe you receive a single electric bill every month for the entire plant, but you also included electricity as a consumed resource on this production model. You might want the entire cost of the electricity—$131—added to the variable overhead bucket for the beef stew, because your accounting system considers electricity to be strictly an overhead item.

This field, the Cost Rollup Type Code, allows you to determine how the three cost components for this resource are used to add to the three cost buckets for a produced resource. The default for this resource can be changed when you add it to a production model (see *Production Model Maintenance*, Section 1–4 of the RP reference manual). You have three choices:

N = NORMAL. This code causes each cost associated with the consumed resource (direct cost, fixed overhead, and variable overhead) to be added to the corresponding bucket for the produced resource. This matches the example of the beans, above.

V = VARIABLE. All costs of the consumed resource are added to the variable overhead bucket for the produced resource. This matches the example of electricity, above.

F = FIXED. All costs of the consumed resource are added to the fixed overhead bucket for the produced resource.

Cost Rollup Level Class Code (A/B)—used only if RP is installed. Default from Resource Sub-Class (RESUBC) file not loaded.

This code is used during Cost Rollup (see Sections 2–2 and 2–3 in the RP reference manual) when this resource is consumed by the production model being "rolled up," and when the Cost Rollup Costing Method is R (cost from last rollup). It tells the system whether to go down an extra level for the cost of this resource.

If the level class code for a consumed resource is A, the system adds the entire cost of the resource to the class/sub-class assigned to it. If its level class code is B, the system looks down another level, to the prime costing PM for that resource, for more detailed information about its cost.

Suppose you have a production model for beef stew (class/sub-class MA/FG), and one of the consumed resources is beans (class/sub-class MA/FR), and the Cost Rollup Costing Method for beans is R. When the beans are added to the stew they have already been washed and cut, and this process takes place on a separate production model.

When rolling up the cost of the beef stew, the system needs a cost figure for the beans. Let's say the cost from last rollup for washed beans is currently $0.666667/lb. Fifty pounds of beans are used in making the beef stew, so the cost of the beans is $33, all attributable to class/sub-class MA/FR.

If the level class code for beans is B, the system goes down another level, to find all class/sub-class combinations that went into the washed beans. The consumed resources on this PM are unwashed beans (class/sub-class MA/FR) and unskilled labor (class/sub-class LA/UN).

The Cost Rollup Costing Method for the unwashed beans is S, and the standard cost is $0.50/lb. The Cost Rollup Costing Method for the labor is F, and the fixed cost is $8/hr. It takes one hour and 50 pounds of unwashed beans to produce the 50 pounds of clean beans necessary for the beef stew. Therefore, the total cost of the washed beans is $25 (for the beans) + $8 (for the labor) = $33. The cost of the washed beans has two components: $25 from class/sub-class MA/FR, and $8 from class/sub-class LA/UN.

Comparing the two methods:

| | *Level Class Code = A* | | *Level Class Code = B* | |
|---|---|---|---|---|
| | Cost | Class/Sub-Class | Cost | Class/Sub-Class |
| | $33 | MA/FR | $25 | MA/FR |
| | | | 8 | LA/UN |
| Total | $33 | | $33 | |

The Cost Rollup Report shows cost totals by class and sub-class, so the different breakdowns can be important. Using level class code B can help you identify significant cost elements that would otherwise be hidden (for example, the labor cost in this example).

The total cost for the beans is the same for level class code A or B. Level class code B takes the Cost From Last Rollup and breaks that down into the costs contributed by different classes and sub-classes.

Note: If you install the Costing module, you may want to change all level class codes to A when you do so. The Costing module calculates costs using the actual PMs used to produce each resource, rather than using the Prime Costing PM for the entire quantity. After you install Costing, if any resource has a Level Class Code of B, the cost information calculated by Cost Rollup will not be comparable to the figures calculated by the Costing module.

Documentation Location Code—This five-character code allows you to print the pick list (see Sections 7-9 and 7-10) in order by the area of the plant where the resource will be used. If line 1 and line 2 are at opposite ends of a mile-long plant, you might want to enter different documentation location codes for resources depending on whether they are used on line 1 or line 2. Thus all the resources going to line 1 could be picked and brought to their destination at the same time.

SHELF LIFE (Y/N)—Enter Y if this resource has a limited shelf life, N if not. If you enter Y, Shelf Life Days is required. Default from Resource Sub-Class (RESUBC) file loaded.

Shelf Life Days—required if Shelf Life is Y. Enter the number of days this resource can remain in a location before it must be reinspected.

Lot Control (Y/N)—Enter Y if this resource must be lot-controlled, N if not. Default from Resource Sub-Class (RESUBC) file loaded.

FORWARD PLANNING (Y/N)—used only if the TPFP module is installed. Enter Y if this is a produced resource and may be included in a Time-Phased Forward Planning (TPFP) run. Enter N if it is not to be included.

Dflt Locn Classif Cd-Misc Receipt—Enter the default location classification code to be used when an MR (miscellaneous receipt) transaction is entered for this resource, placing it in a new location, and no location classification code is specified. Defaults to the value from tailoring question #T18. This field must be blank for a non-balance resource.

Dflt Locn Classif Cd-Prodn Rcpt—Enter the location classification code to be used when a PR (production receipt) transaction is entered for this resource, placing it in a new location, and no location classification code is specified. Defaults to the value from tailoring question #T19. This field must be blank for a non-balance resource.

Default Warehouse-Consumption—default warehouse for creating allocations for this resource. This is the default for the Warehouse field on Data Screen MDE04012 in Production Model Maintenance (see Section 1-4 of the RP reference manual).

Dflt Location-Consumption—preferred location in the above warehouse for creating reservations for this resource. This is the default for the Location field on Data Screen MDE04012 in Production Model Maintenance (see Section 1-4 of the RP reference manual). This field must be blank for a non-balance resource.

Default Warehouse-Production—default warehouse for PR (production receipt) transactions for this resource. Defaults to the value from tailoring question #T21.

Dflt Location-Production—default location for PR (production receipt) transactions for this resource. Defaults to the value from tailoring question #T20. This field must be blank for a non-balance resource.

Standard Inventory Classification Code—SIC code for this resource, for bar-coded resources.

Required From Locn Classif Cd—Enter the location classification code this resource must be coming from, if it is going from a location classification that is NOT considered on hand to one that IS considered on hand. For example, if all resources must be inspected before being considered on hand, enter the location classification code for quality assurance (QA in the standard database) in this field. This helps to ensure that the resource goes to QA before reaching an on hand location classification.

MPP Code (P/M/blank)—used only if Planning is installed. This code indicates whether this is a master production planned resource (P), a manual requirement resource (M), or neither (blank).

(1) Enter P if this is a master production planned resource. This means that you will be telling the system what quantity of this resource you plan to produce, and the system will not change that number. You would normally use this definition for the most important produced resources on your system, whose planned production quantities are determined by upper management.

(2) Enter M if this is a manual requirement resource. This means that you will be entering a manual requirement through planning, and the system will add to this the requirement determined by the planning run, to calculate the gross requirement for this resource.

Suppose, for example, that you make fountain pens. The finished pen might have an MPP code of P, and the ink cartridge for the pen might have an MPP code of M. You plan to make 10,000 pens, so the planning run determines a need for 10,000 ink cartridges. In addition, you sell ink cartridges separately: to cover this additional need, you enter a manual requirement of 1,000. The gross requirement calculated by the system is 11,000.

(3) Leave this field blank if neither P nor M applies. Such resources are treated like manual requirement (M) resources, with one important exception: you cannot enter a manual requirement. The system uses just the calculated need from PMs to determine the gross requirement. If pen caps are assigned this code (see the example above), the gross requirement would be 10,000.

Planner Number—number of planner responsible for this resource. Default from Resource Sub-Class (RESUBC) file loaded.

Buyer Number—number of buyer responsible for this resource. Default from Resource Sub-Class (RESUBC) file loaded.

Planning Sequence Number—used by the Planning module in determining the order in which production of various resources is planned. If two resources have the same Planning Level Code (see below), the one with the lower Planning Sequence Number is planned first.

Planning Level Code—used only if Planning is installed.This number determines the order in which the Planning run considers the need for resources. A resource with planning level code zero (0) would be considered first. You can assign planning level codes, or you can use Planning to have the system determine the appropriate codes.

FIXED PLANNING LEVEL CODE (Y/N)—used only if Planning is installed. You can use a program in Planning to have the system determine the Planning Level Code (see above) for each resource. Enter Y in this field to prevent that program from changing the Planning Level Code currently assigned to this resource.

RE-PLAN FLAG (Y/N)—reserved for future PRISM enhancements. This field is automatically changed to Y if you update a change to an attribute of this resource.

ORDER POLICY CODE (A, B, C, D, E, G, or H)—This code tells the system how to calculate when you need to order or make this resource, and what quantity to order/schedule. This represents what you may know as a Lot Sizing Code. Defaults to the value from tailoring question #G25.

Codes D and E are used by RM in the Reorder Report (see Section 2-17). Codes A, D, G, and H are used by the Planning module. Codes B and C are reserved for future PRISM modules. For information on the meaning of each code, see the appropriate section of the reference manual for the module that uses it. In the case of RM, this is Section 2-17.

Fixed Order Qty—used with order policy codes D (in Planning only) and H, defaults to the value from tailoring question #G26. Any purchase order or schedule for this resource must be for this quantity. When the order policy code is D, Planning determines a net requirement of 200, and the Fixed Order Amount is 70, three POs/schedules for 70 each are created. When the order policy code is H, the system waits until the net requirement is at least this quantity to create a purchase order or schedule for this resource.

Days of Supply—number of days of supply to order for this resource, defaults to the value from tailoring question #G27. This field is used in conjunction with order policy codes E and G. This field tells the system to order or schedule a quantity just large enough so that you can meet all your requirements for this resource for this number of days. For more information, see the appropriate section of the reference manual for the module using the order policy code.

Command Function Keys

ENTER—Press ENTER to proceed to Data Screen MIE18004.

CK03 PAGE BACKWARD—Press CK03 to go back to Data Screen MIE18002.

CK04 LOCATION PROMPTING—In tailoring question #G7, you can enter a set of prompts for your location field. Operators can use these prompts to make sure they enter the correct information. When you enter C or P in the one-character field next to the word PROMPTING and press CK04, the Location Prompting Screen is displayed.

If you enter C in the one-character field, the location information you enter on the Location Prompting Screen is returned to the field labelled Dflt Location-Consumption. If you enter P in that field, the location number is returned to the field labelled Dflt Location-Prodn Rcpt. You must enter C or P in order to use CK04.

CK15 NOTEBOOK FILE MAINTENANCE—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

Data Screen MIE18004

Figure 45:
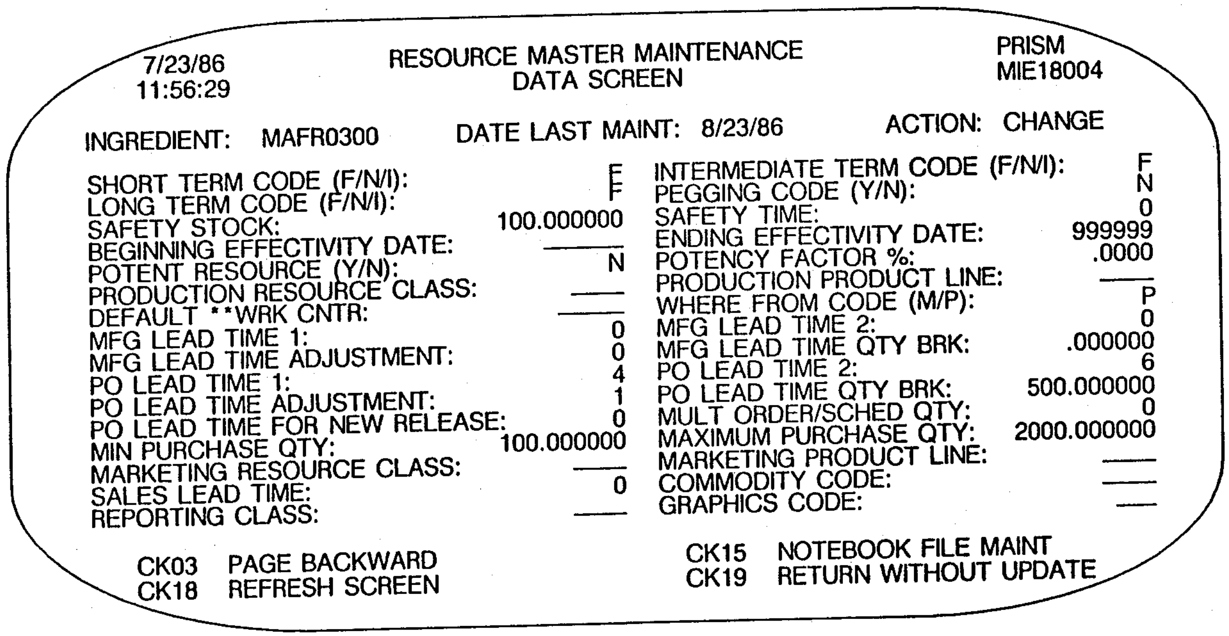

(See Figure 45)

This data screen is displayed when you press ENTER on Data Screen MIE18003. Here, if the action code is A (add) or C (change), you can enter the attributes associated with this resource number. If the action code is D, all fields on this screen are for display only.

Fields for Display

Resource

Date Last Maint—date this resource was last updated. If you are adding a new resource, this is today's date.

Action—The word ADD, CHANGE, or DELETE is displayed here, depending on the action code.

Fields for Entry

SHORT TERM CODE (F/N/I)—used only if Planning is installed. Enter F if this is a finite resource in the short term, I if it is infinite in the short term, N if it is not to be included on Planning reports. You can limit some reports in Planning to short, intermediate, or long term resources. A short term resource is one with an F or an I in this field.

INTERMEDIATE TERM CODE (F/N/I)—used only if Planning is installed. Enter F if this is a finite resource in the intermediate term, I if it is infinite in the intermediate term, N if it is not to be included on Planning reports. You can limit some reports in Planning to short, intermediate, or long term resources. An intermediate term resource is one with an F or an I in this field.

LONG TERM CODE (F/N/I)—used only if Planning is installed. Enter F if this is a finite resource in the long term, I if it is infinite in the long term, N if it is not to be included on Planning reports. You can limit some reports in Planning to short, intermediate, or long term resources. A long term resource is one with an F or an I in this field.

PEGGING CODE (Y/N)—reserved for future PRISM enhancements.

Safety Stock—This is an extra quantity, beyond what your schedule(s) indicate that you need, that you always want to have in stock "just in case." This figure is the default for the Safety Stock field in the Resource Balance (RESBAL) file, which is used to calculate the Recommended Order Quantity if the order policy code is D. For more information, see *Reorder Report*, Section 2-17.

Safety Time—reserved for future PRISM enhancements.

Beginning/Ending Effectivity Date—earliest and latest dates when this resource can be used. These fields are used only by the Planning module. They do not serve as default effectivity dates for resources on production models.

Potent Resource (Y/N)—Enter Y if this is a potent resource, such as a solution. In this case, Potency Factor % (see below) is required. Enter N if this is not a potent resource.

Potency Factor %—Enter the default potency factor for this resource. For example, if the resource is a 10 percent salt solution, you would enter 10 in this field. For more information how potency is handled in PRISM, see *RM Concepts*, Section B.

Production Resource Class—four-character optional field. You can use production resource class limits for certain RM reports.

Production Product Line—four-character optional field. You can use production product line limits for certain RM reports.

* Default Work Center—for an operation dependent upon this resource. If on a PM you create an operation dependent upon this resource, but you do not enter a work center where that operation takes place, this work center is used.

WHERE FROM CODE (M/P)—Enter M if this is a manufactured resource, P if it is purchased from outside vendors. You must make an entry in this field, even for resources that you both produce and purchase. This code determines which lead time figures for this resource (see below) are considered in calculating the lead time for a PM. If this code is P, the PO lead time figures are used. If this code is M, the Mfg lead time figures are used. In Planning, this code determines whether an order or a schedule is created to meet the requirement for this resource.

Mfg Lead Time 1—used to calculate lead times for PMs that consume this resource, if the Where From Code is M. Enter the lead time, in days, for manufacturing this resource in relatively small quantities. Planning does not use this field, because that module can calculate the lead time using operation times.

Mfg Lead Time 2—Enter the lead time, in days, for manufacturing a quantity of this resource greater than or equal to the Mfg Lead Time Qty Brk (see below). Planning does not use this field, because that module can calculate the lead time using operation times.

Mfg Lead Time Adjustment—number of days from the time a quantity of this resource is received from production (PR transaction) to the time it is received to an on hand location classification.

Mfg Lead Time Qty Brk—manufacturing lead time quantity break. Suppose this field is 500. This means that the lead time for manufacturing less than 500 of this resource is Mfg Lead Time 1. The lead time for manufacturing 500 or more is Mfg Lead Time 2.

PO Lead Time 1—used to calculate lead times for PMs that consume this resource, if the Where From Code is P. Enter the lead time, in days, for purchasing this resource in relatively small quantities.

PO Lead Time 2—Enter the lead time, in days, for purchasing a quantity of this resource greater than or equal to the PO Lead Time Qty Brk (see below).

PO Lead Time Adjustment—number of days from the time a quantity of this resource is received from the vendor to the time it is received to an on hand location classification.

PO Lead Time Qty Brk—purchasing lead time quantity break. Suppose this field is 500. This means that the lead time for purchasing less than 500 of this resource is PO Lead Time 1.The lead time for purchasing 500 or more is PO Lead Time 2.

PO Lead Time for New Release—used only if Planning is installed. The use of this field is best illustrated with an example. Suppose a planning run determines that you need 100 more units of a purchased resource. The system checks to see if there is an open purchase order for it, whose authorized quantity is more than the quantity ordered. It finds an open PO for 300, with an authorized quantity of 500. If the date the 100 units are needed is before the authorized expiration date for the PO, the system recommends that a new release for 100 be added to that PO. This field is the lead time for that new release.

Mult Order/Sched Qty—indicates that the quantity of any purchase or schedule for this resource must be a multiple of this number. If this field is 10, the system will not generate an order/schedule for 23 units of this resource: a net requirement of 23 results in a PO or schedule for 30.

Min Purchase Qty—indicates that any order or schedule for this resource must be for at least this quantity.

Maximum Purchase Qty—indicates that an order or schedule for this resource can be for no more than this quantity.

Marketing Resource Class—four-character optional field.

Marketing Product Line—four-character optional field.

Sales Lead Time—lead time, in days, for producing a quantity of this resource for sale.

Commodity Code—four-character optional field. You can use this field for any information you need. You can use commodity code limits on certain RM reports.

Reporting Class—You can use this field for any information, for example department number. Enter the reporting class to which this resource belongs. Certain RM reports can be limited by reporting class. Default from Resource Sub-Class (RESUBC) file loaded.

Graphics Code—reserved for future PRISM enhancements.

Command Function Keys

ENTER—Press ENTER to proceed to Data Screen MIE18005. If your user profile is not authorized to see cost information, the selection screen is displayed instead.

CK03 PAGE BACKWARD—Press CK03 to go back to Data Screen MIE18003.

CK15 NOTEBOOK FILE MAINT—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

Data Screen MIE18005

(See Figure 46)

This data screen is displayed when you press ENTER on Data Screen MIE18004. Here, if the action code is A (add) or C (change), you can enter cost attributes associated with this resource number. If the action code is D, all fields on this screen are for display only.

If your user profile is not authorized to see cost information, this screen cannot be displayed. Instead, the Selection Screen is redisplayed when you press ENTER on MIE18004.

For more information on costs, see *RM Concepts*, Section B.

Fields for Display

° Resource

Date Last Maint—date this resource was last updated. If you are adding a resource, this is today's date.

Action—The word ADD, CHANGE, or DELETE is displayed here, depending on the action code.

Fields for Entry

Standard Cost—your estimate of the average cost of this resource over the course of a year. For example, if you could be certain that the price of tomatoes would be $1 per pound from November to April and .50 from May to October, and that you would buy the same quantity during each six-month time period, you would enter a standard cost of .75 per pound.

Fixed Cost—a different estimate of the "standard cost," used if the Cost Rollup Costing Method for this resource is F. This allows you to use one estimate for cost rollup and one for non-rollup purposes.

Selected Unit Cost (blank/S/A/H/L)—Enter a letter to indicate the cost figure used for the resource in all cases EXCEPT when rolling up a PM that consumes it. Default from Resource Sub-Class (RESUBC) file loaded.

A—rolling average cost with alpha factor (RESBAL)

H—historical average cost (RESBAL)

L—last period's average cost (RESBAL)

S—standard cost (RESMST)

Note: If the Balance Resource Code (see Data Screen MIE18002) is C, this field must be S.

NET REALIZABLE VALUE USAGE (Y/N)—Enter Y if this is a "net realizable value" resource, that is if it is not a major produced resource but it has some fixed value or cost to you. N if this is not a "net realizable value" resource. For example, you might put a Y in this field for the carrot peelings produced when you peel carrots or the clam shells "produced" when you shuck clams.

Net Realizable Value—required if Net Realizable Value Usage is Y. Enter the price or cost of this NRV resource. Continuing the above example, the clam shells might have a negative Net Realizable Value, if you have to pay someone to take them away.

Switch Over Cost—reserved for future PRISM modules. This is the cost of switching a line from production of something else to production of this resource.

Cost From Last Rollup—usually updated by the system. This is the cost calculated the last time the Cost Rollup program in RP was run for this resource. This field is also available for entry, because you might want to enter a starting price when you install the system. This is the cost used when the Cost Rollup Costing Method (see Data Screen MIE18003) is R.

Command Function Keys

ENTER—Press ENTER if the action code is A or C, to update the file with new information. This returns you to the selection screen. If the action code is D (delete), pressing ENTER just redisplays the screen.

CK03 PAGE BACKWARD—Press CK03 to go back to Data Screen MIE18004.

CK15 NOTEBOOK FILE MAINT—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this sub-class are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press CK20. This removes this record from the file and returns you to the selection screen.

(2) Press CK19. This returns you to the selection screen without removing the record.

SECTION VI-IV

MIE180

Resource Master File Maintenance

A. The Resource Master File Maintenance program allows the user to enter and maintain information in the Resource Master (RESMST) file. This file contains one record for every non-balance resource (e.g., electricity) as well as a record for every balance resource on the system.

Screens

MIE18001—Selection Screen
MIE18002—Data Screen #1
MIE18003—Data Screen #2
MIE18004—Data Screen #3
MIE18005—Data Screen #4 (Cost fields)
MIE18006—Session Status Screen

Selection Screen—MIE18001

From the Selection Screen, the user can take CK11 to call the Alpha Search Inquiry program (MII180) for a list of resource numbers and their corresponding descriptions before keying in a particular resource number.

The user may add, change, or delete records. A delete is performed *only* if the resource number for the record to be deleted does not exist in Resource Balance (RESBAL), Production Model Resource (PMRESR), or Schedule Resource (RMRESR) file.

An RM Tailoring question determines if RESBAL records are generated automatically for a given warehouse when a record is added to the RESMST file. If a RESBAL record is to be generated, the RM Tailoring (TALFLI) file is checked to find the warehouse numbers to be used. More than one RESBAL record can be generated by this process, depending on the number of warehouses defined in TALFLI.

If the resource is a non-balance resource, a separate question in RM Tailoring is checked to determine whether RESBAL records are generated automatically for non-balance resources.

If the system is generating RESBAL records automatically, the following fields are loaded as indicated below:

Class and Sub-Class = RESMST fields.
Order Policy fields = RESMST fields.
Cycle Count Method = RM Tailoring default value.
All Quantity fields = zero.
All Cost fields = zero.
All Date fields (except Date Last Maintenance) = zero.
Date Last Maintenance = system date.
When any of the fields in RESMST are changed, the Re-Plan Flag is set to Y.
If the user maintains the Selected Unit Cost or any cost information except the Net Realizable Value, Cost Rollup Cost Method, Cost Rollup Type Code or Cost Rollup Level Class Code, the Recost Flag is set to Y.

Entry Fields:

Resource Number
Action Code (A = add, C = change, D = delete)

Required Fields:

Resource Number (Add only)
Action Code

Edits:

If Action is ADD, record must not exist.
If Action is CHANGE or DELETE, record must exist.
Action Code must be A, C, or D.
If Action is DELETE, resource number cannot exist in RESBAL file.
If Action is DELETE, resource number cannot exist in PMRESR file.
If Action is DELETE, resource number cannot exist in RMRESR file.

Command Keys (Display):

CK01 Display Session Status
CK11 Alpha Search Inquiry

Command Keys (Non-Display):

CK07 Send Message to Action List
CK17 Error Message Override
CK20 Delete Record
HELP HELP Text

Data Screen #1—MIE18002

Display-Only Fields:
- Resource Number
- Date of Last Maintenance
- Action
- Standard Unit of Measure (CHANGE/DELETE mode only)
- Class (CHANGE/DELETE mode only)
- Sub-Class (CHANGE/DELETE mode only)
- Date ABC Code Last Updated
- Number of Times Resource is Used Entry Fields:
- Description
- Standard Unit of Measure (ADD mode only)
- Class (ADD mode only)
- Sub-Class (ADD mode only)
- Earliest Acceptable Revision Level
- Current Revision Level
- Service Level (%)
- Balance Resource Code
- ABC Code
- Shortage Flag
- Miscellaneous Field 1
- Miscellaneous Field 2
- Miscellaneous Field 3
- Variable Overhead Code
- Variable Overhead Rate
- Variable Overhead Table Value
- Variable Overhead Table/Rate
- Fixed Overhead Code
- Fixed Overhead Rate
- Fixed Overhead Table Value
- Fixed Overhead Table/Rate
- Cumulative Lead Time of Prime Costing PM
- Theoretical Consumption Code
- Batch Consumption Code
- Prime Planning PM Type
- Prime Planning PM Name
- Prime Costing PM Type
- Prime Costing PM Name
- Selling Price
- Recost Byte Required Fields:
- Class (ADD mode only)
- Sub-Class (ADD mode only)
- Standard Unit of Measure (if the default value is blank)

Edits:
- If Action is ADD, Class must exist in RECLAS file and Sub-Class must exist in RESUBC file.
- Balance Resource Code must be B, C, or blank.
- ABC Code must be A, B, C, or blank.
- Shortage Code must be Y or N.
- Variable Overhead Table/Rate must be T, R, or blank.
- If Variable Overhead Table/Rate is T, the Variable Overhead Table Value must be entered.
- If Variable Overhead Table/Rate is T, the Variable Overhead Table Value must exist in Overhead Rate (OVHDRF) file.

If Variable Overhead Table/Rate is R, the Variable Overhead Rate and Variable Overhead Code fields mustbe entered. (However, if the user blanks out either of these fields, a default value is loaded in before editing begins. The Table edits are handled the same way.)

Variable Overhead Code must be P, D, or blank.

Fixed Overhead Code must be P, D, or blank.

If Fixed Overhead Table/Rate is T, the Variable Overhead Table Value must be entered.

If Fixed Overhead Table/Rate is T, the Variable

If Fixed Overhead Table/Rate is R, the Variable Overhead Table Value must exist in the Overhead Rate (OVHDRF) file.

Overhead Rate and Variable Overhead Code fields must be entered. (However, if the user blanks out either of these fields, a default value is loaded in before editing begins. The Table edits are handled the same way.)

Fixed Overhead Table/Rate must be T, R, or blank.

If RM Tailoring allows theoretical consumption, the Theoretical Consumption Code must be D, C, T, or blank.

If RM Tailoring does not allow theoretical consumption, Theoretical Consumption Code must be D. Batch Consumption Code must be Y, N, or blank.

Prime Planning Type and Name must exist in PMODEL if RP and RM are supposed to interface (check INTFAC). Prime Costing Type and Name must exist in PMODEL if RP and RM are supposed to interface (check INTFAC).

Recost Byte must be Y or N.

Theoretical Consumption Code must be D if Batch Consumption Code equals Y (UDS Error Message).

Defaults:

Date Last Maintenance—defaults to system date (ADD mode only).

Standard Unit of Measure—defaults to RESUBC field RSUMSR because this field cannot be blank.

Balance Resource Code—defaults to RESUBC field RSBORC because this field cannot be blank.

Batch Consumption Code—defaults to RESUBC field RSBCON because this field cannot be blank.

Theoretical Consumption Code—defaults to RESUBC field RSTHEO because this field cannot be blank.

Service Level (%)—defaults to RESUBC field RSSERV because this field cannot be blank.

If all of the following four Variable Overhead fields are equal to their respective default values, blanks, or zeroes are loaded into the RESMST file. If one or more of the fields does not equal its default value, the screen values are loaded in the RESMST file.

Variable Overhead Code—defaults to:
RESUBC field RSVOPD, then
RECLAS field RCVOPD, then
TALFLI field TAVOPD.

Variable Overhead Rate—defaults to:
RESUBC field RSVORT, then
RECLAS field RCVORT, then
TALFLI field TAVORT.

Variable Overhead Table Value—defaults to:
RESUBC field RSVOTV, then
RECLAS field RCVOTV, then
TALFLI field TAVOTV.

Variable Overhead
Table/Rate—defaults to:
RESUBC field RSVOTR, then
RECLAS field RCVOTR, then
TALFLI field TAVOTR.

If all of the following four Fixed Overhead fields are equal to their respective default values, blanks, or zeroes are loaded into the RESMST file. If one or more of the fields does not equal its default value, the screen values are loaded in the RESMST file (including those that equal their default values).

Fixed Overhead Code—defaults to:
RESUBC field RSFOPD, then
RECLAS field RCFOPD, then
TALFLI field TAFOPD.

Fixed Overhead Rate—defaults to:
RESUBC field RSFORT, then
RECLAS field RCFORT, then
TALFLI field TAFORT.

Fixed Overhead Table Value—defaults to:
RESUBC field RSFOTV, then
RECLAS field RCFOTV, then
TALFLI field TAFOTV.

Fixed Overhead Table/Rate—defaults to:
RESUBC field RSFOTR, then
RECLAS field RCFOTR, then
TALFLI field TAFOTR.

Command Keys (Display):

CK15 Notebook File Maintenance (ADD/CHANGE only)
CK18 Refresh Screen
CK19 Return Without Update Command Keys (Non-Display):

CK07 Send Message to Action List
CK17 Error Message Override (DELETE only)
HELP HELP Text

Data Screen #2—MIE18003

Display-Only Fields:

Resource Number
Date Last Maintenance
Action
Date Last Rollup
Actual Rollup Task Name
Simulated Rollup Task Name Entry Fields:

Recalculate Lead Time
Cost Rollup Type Code
Cost Rollup Costing Method
Cost Rollup Level Class Code
Documentation Location Code
Shelf Life Code Shelf Life Days
Lot Control
Forward Planning Byte
Default Location Classification Code—Miscellaneous Receipts
Default Location Classification Code—Production Receipts
Default Warehouse—Consumption
Default Location—Consumption
Default Warehouse—Production Receipts
Default Location—Production receipts
Standard Inventory Classification Code
Required From Location Classification Code
Master Production Plan Code
Planner Number
Buyer Number
Planning Sequence Number
Planning Level Code
Fixed Planning Level Code
Order Policy Code
Fixed Order Quantity
Days of Supply Required Fields:

Recalculate Lead Time
Shelf Life Code
Forward Planning Code
Fixed Planning Level Code
Order Policy Code
Re-Plan Flag Edits:

Recalculate Lead Time must be Y or N.
Cost Rollup Type Code must be N, F, V, or blank.
Cost Rollup Costing Method must be F, R, S, A, H, L, or blank.
Cost Rollup Level Code must be A, B, or blank.
Shelf Life Code must be Y or N.
If Shelf Life Code is Y, Shelf Life Days must be greater than zero; if Shelf Life Code is N, Shelf Life Days must be zero.
Lot Control must be Y, N, or blank.
Forward Planning Code must be Y or N.
Default Location Classification Code—Miscellaneous Receipts must exist in CLASCD file.
Default Location Classification Code—Production Receipts must exist in CLASCD file.
Required From Location Classification Code must exist in CLASCD file (UDS message).
Master Production Plan Code must be P, M, or blank.
Fixed Planning Level Code must be Y or N.
Order Policy Code must be A, B, C, D, E, G, or H.
Re-Plan Flag must be Y or N.
Location Prompting Code must be C or P when CK04 is selected.
For Non-Balance resources, the following fields cannot have values entered:
Default Location Classification Code—Miscellaneous Receipts Default Location Classification Code—Production Receipts Default Location—Production Receipts Default Location for Consumption.

Defaults:

Date Last Maintenance—defaults to system date (ADD only).

Cost Rollup Type Code—defaults to:
RESUBC field RSCSTP, then
RECLAS field RCCSTP, then
TALFLI field TACSTP.

Cost Rollup Costing Method—defaults to:
RESUBC field RSCSRU, then
RECLAS field RCCSRU, then
TALFLI field TACSRU.

Cost Rollup Level Class Code—defaults to:
RESUBC field RSCRLC, then
RECLAS field RCCRLC, then
TALFLI field TACRLC.

Shelf Life Code—defaults to RESUBC field RSSHLF because this field cannot be blank.

Shelf Life Days—defaults to RESUBC field RSSHLD because this field cannot be blank.

Default Location Classification Code (Miscellaneous Receipts)—defaults to TALFLI field TADCPO.

Default Location Classification Code (Production Receipts)—defaults to TALFLI field TADCPR.

Default Location (Production Receipts)—defaults to TALFLI field TADLPR.

Default Warehouse (Production Receipts)—defaults to TALFLI field TADWPR.

Planner Number—defaults to RESUBC field RSPLAN because this field cannot be blank.

Buyer Number—defaults to RESUBC field RSBUYR because this field cannot be blank.

Lot Control Code—defaults to RESUBC field RSLOTN because this field cannot be blank.

Order Policy Code—defaults to TALFLI field TAORPL because this field cannot be blank.

Fixed Order Quantity—defaults to TALFLI field TAORAM because this field cannot be blank.

Days of Supply—defaults to TALFLI field TAORDY because this field cannot be blank.

Planning Level Code defaults to 9s.

Command Keys (Display):

| | |
|---|---|
| CK03 | Page Backward |
| CK04 | Location Prompting |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Data Screen #3—MIE18003

Display-Only Fields:

- Resource Number
- Date Last Maintenance
- Action

Entry Fields:

- Short Term Code
- Intermediate Term Code
- Long Term Code
- Pegging Code
- Safety Stock
- Safety Time
- Beginning Effectivity Date
- Ending Effectivity Date
- Default Work Center
- Where From Code
- Production Resource Class
- Production Product Line
- Potent Resource
- Potency Factor (%)
- Manufacturing Lead Time 1
- Manufacturing Lead Time 2
- Manufacturing Lead Time Adjustment
- Manufacturing Lead Time Quantity Break
- Purchase Order Lead Time 1
- Purchase Order Lead Time 2
- Purchase Order Lead Time Adjustment
- Purchase Order Lead Time Quantity Break
- Purchase Order Lead Time for New Release
- Multiple Purchase Factor
- Minimum Purchase Quantity
- Maximum Purchase Quantity
- Marketing Resource Class
- Marketing Product Line
- Sales Lead Time
- Commodity Code
- Reporting Class
- Graphics Code Required Fields:

- Short Term Code
- Intermediate Term Code
- Long Term Code
- Pegging Code
- Where-From Code Edits:

- Short Term Code must be F, N, or I.
- Intermediate Term Code must be F, N, or I.
- Long Term Code must be F, N, or I.
- Pegging Code must be Y or N.
- Beginning Effectivity Date validity check.
- Ending Effectivity Date validity check.
- Beginning Effectivity Date cannot be greater than Ending Effectivity Date.
- Where From Code must be M or P.

When changing the Potent Resource Code from Y to N, the Number of Times the Resource is used must be zero.

Potent Resource Code cannot be changed if a record exists in LOCDTL file.

Potent Resource Code must be Y, N, or blank.

If Potent Resource Code is N, Potency Factor must equal zero.

If Potent Resource Code is Y, Potency Factor must be greater than zero.

Minimum Purchase Quantity cannot be greater than maximum purchase quantity.

Defaults:

Date Last Maintenance—defaults to system date (ADD only).

Potent Resource Code—defaults to RESUBC field RSPOTR because this field cannot be blank.

Potency Factor—defaults to RESUBC field RSPOTF because this field always contains a value even if that value is zero.

Reporting Class—defaults to RESUBC field RSPRCL because this field cannot be blank.

Command Keys (Display):

| | |
|---|---|
| CK03 | Previous Screen |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Data Screen #4—MIE18005

This last data screen displays cost fields. This screen can be displayed or maintained only if the user is authorized to see cost information.

Display-Only fields:

Resource Number
Date Last Maintenance
Action

Entry Fields:

Standard Cost
Fixed Cost
Selected Unit Cost
Net Realizable Value Usage
Net Realizable Value
Switch Over Cost
Cost from Last Rollup Required Fields:

Net Realizable Value Usage

Edits:

Selected Unit Cost must be S, A, H, L, or blank.

If Balance Resource Code is C (non-balance), the Selected Unit Cost must be S.

Net Realizable Value Usage must be Y or N.

Defaults:

Date Last Maintenance—defaults to System Date (ADD only).

Selected Unit Cost—defaults to RESUBC field RSSELC.

Command Keys (Display):

| | |
|---|---|
| CK03 | Previous Screen |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Session Status Screen—MIE18006

Display-Only Fields:

Number of Records Added
Number of Records Changed
Number of Records Deleted

Command Keys (Display):

| | |
|---|---|
| CK01 | End Job |

Command Keys (Non-Display):

| | |
|---|---|
| CK07 | Send Message to Action List |
| HELP | HELP Text |

B.

| File | Usage |
|---|---|
| CLASCD | IF |
| ERRMSG | IF |
| INTFAC | IF |
| LOCDTLRW | IF |
| MIE180FM | CF |
| NOTES | UF |
| OVHDRF | IF |
| PMODEL | IF |
| PMRESRRS | IF |
| RESBAL | UF |
| RECLAS | IF |
| RESMST | UF |
| RESUBC | IF |
| RMRESRRD | IF |
| TALFLI | IF |
| TALFLZ | IF |
| QSYSPRT | O |

C.

| File Name | Field Name | Description |
|---|---|---|
| TALFLI | TACCSL | Cycle Counting Method |
| | TACRLC | Cost Rollup Level Class Code |
| | TACSRU | Cost Rollup Costing Method |
| | TACSTP | Cost Rollup Type Code |
| | TADCPO | Default Inventory Class PO/Misc Receipt |
| | TADCPR | Default Inventory Class Prod Receipt |
| | TADLPR | Default Location (Prod Receipt) |
| | TADWPR | Default Whse (Prod Receipt) |
| | TADSPC | Cost Security |
| | TAFOPD | Fixed Overhead Code |
| | TAFORT | Fixed Overhead Rate |
| | TAFOTR | Fixed Overhead Table/Rate |
| | TAFOTV | Fixed Overhead Table Value |
| | TAORAM | Default Order Amount |
| | TAORDY | Default # of Days of Supply |
| | TAORPL | Order Policy Code |
| | TAPMNM | PM Name Variable Heading |
| | TARGBM | Generate RESBAL records? (Non-balance) |
| | TARGBN | Generate RESBAL records? (Balance) |
| TALFLI | TARESC | Resource # Variable Heading |
| | TASELC | Selected Unit Cost |
| | TATCAL | Allow Theoretical Consumption? |
| | TAVOPD | Variable Overhead Code |
| | TAVORT | Variable Overhead Rate/Table |
| | TAVOTR | Variable Overhead Type Code |
| | TAVOTV | Variable Overhead Table Value |

Warehouses for Balance Resources:

| | | |
|---|---|---|
| TAWH01 | RESBAL | Warehouse # 1 |
| TAWH02 | RESBAL | Warehouse # 2 |
| TAWH03 | RESBAL | Warehouse # 3 |
| TAWH04 | RESBAL | Warehouse # 4 |
| TAWH05 | RESBAL | Warehouse # 5 |
| TAWH06 | RESBAL | Warehouse # 6 |
| TAWH07 | RESBAL | Warehouse # 7 |
| TAWH08 | RESBAL | Warehouse # 8 |
| TAWH09 | RESBAL | Warehouse # 9 |
| TAWH10 | RESBAL | Warehouse #10 |
| TAWH11 | RESBAL | Warehouse #11 |
| TAWH12 | RESBAL | Warehouse #12 |
| TAWH13 | RESBAL | Warehouse #13 |
| TAWH14 | RESBAL | Warehouse #14 |
| TAWH15 | RESBAL | Warehouse #15 |

Warehouses for Non-Balance Resources:

| | | |
|---|---|---|
| TAWHAA | RESBAL | Warehouse # 1 |
| TAWHAB | RESBAL | Warehouse # 2 |
| TAWHAC | RESBAL | Warehouse # 3 |
| TAWHAD | RESBAL | Warehouse # 4 |
| TAWHAE | RESBAL | Warehouse # 5 |
| TAWHAF | RESBAL | Warehouse # 6 |
| TAWHAG | RESBAL | Warehouse # 7 |
| TAWHAH | RESBAL | Warehouse # 8 |
| TAWHAI | RESBAL | Warehouse # 9 |
| TAWHAJ | RESBAL | Warehouse #10 |
| TAWHAK | RESBAL | Warehouse #11 |

| | | |
|---|---|---|
| TAWHAL | RESBAL | Warehouse #12 |
| TAWHAM | RESBAL | Warehouse #13 |
| TAWHAN | RESBAL | Warehouse #14 |
| TAWHAO | RESBAL | Warehouse #15 |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Resource Master records that were updated are printed on the Maintenance Register, which includes the Action (ADD, CHANGE or DELETE) and all entry and display-only fields.

SECTION VI-V

MIE100

Overhead Rate File Maintenance

A. The Overhead Rate File Maintenance program allows the user to enter and maintain information in the Overhead Rate (OVHDRF) File. The Overhead Rate File defines Overhead Rates (in percentages or dollars) for a particular Overhead Table Value. Each Resource that has the same Overhead Table Value has the same Overhead Rate Value. The Overhead Table Value is the key to the Overhead Rate File and is used in a table lookup operation.

Screens

MIE10001—Selection Screen
MIE10002—Data Screen
MIE10003—Session Status Screen

Selection Screen—MIE10001

Entry Fields:

Overhead Table Value
Action Code (A = add, C = change, D = delete)

Required Fields:

Overhead Table Value
Action Code

Edits:

If Action is ADD, record must not already exist.
If Action is CHANGE or DELETE, record must exist.
Action Code must be A, C, or D.

Command Keys (Display):

| | |
|---|---|
| CK01 | Display Session Status |

Command Keys (Non-Display):

| | |
|---|---|
| CK07 | Send Message to Action List |
| CK17 | Error Message Override |
| CK20 | Delete Record |
| HELP | Help Text |

Data Screen—MIE10002

When the Overhead Rate is processed, if it is a percentage it is displayed on the Data Screen in percentage format and loaded into the file in decimal format.

Display-Only Fields:

Overhead Table Value
Date Last Maintenance
Action Code

Entry Fields:

Overhead Rate
Overhead Code

Required Fields:

Overhead Rate
Overhead Code

Edits:

Overhead Code must be P or D.
Overhead Rate cannot be zero if Overhead Code is P or D (UDS error message).

Defaults:

Overhead Code—defaults to value for previous record displayed on this screen (ADD mode only).
Date Last Maintenance—defaults to System Date (ADD mode only).

Command Keys (Display):

| | |
|---|---|
| CK19 | Return Without Update |

Command Keys (Non-Display):

| | |
|---|---|
| CK07 | Send Message to Action List |
| CK20 | Delete Record |
| HELP | Help Text |

Session Status Screen—MIE10003

The Session Status Screen displays the number of records added, changed, or deleted.

Display-Only Fields:

Number of Records Added
Number of Records Changed
Number of Records Deleted

Command Keys (Display):

| | |
|---|---|
| CK01 | End Job |
| ENTER | Return to Selection Screen |

Command Keys (Non-Display):

| | |
|---|---|
| CK07 | Send Message to Action List |
| HELP | HELP Text |

B.

| File | Usage |
|---|---|
| MIE100FM | CF |
| ERRMSG | IF |
| OVHDRF | UF |
| QSYSPRT | O |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Overhead Rate records that were updated are printed on the Maintenance Register, which includes the Action (ADD, CHANGE or DELETE) and all entry and display-only fields.

SECTION VI-VI

MDE080

Simulation Files Maintenance

A. A simulated cost rollup can show the user how a cost rollup would update the files given current data as well as "what if" data. This program allows the user to maintain the simulation files prior to executing a simulated cost rollup. Users can enter a new cost for a resource or percentage changes in cost for a resource class or sub-class. Changes to specific overhead rates and percentage changes to all overhead rates for a resource, class, or sub-class can also be made.

Each maintenance program is described in the sections that follow. File usage, tailoring file usage, GPLDA usage, sequences, options, and report formats are all discussed at the end of this program's description.

The permanent simulation files are:

RESMSTSM - Resource Master Simulation File
RESUBCSM - Resource Sub-Class Simulation File
RECLASSM - Resource Class Simulation File
RESBALSM - Resource Balance Simulation File
OVHDRFSM - Overhead Rate Simulation File

Screens

MDE08001—Selection Screen
MDE08002—Data Screen for Resource Master Simulation Maintenance
MDE08003—Data Screen for Resource Sub-Class Simulation Maintenance
MDE08004—Data Screen for Resource Class Simulation Maintenance
MDE08005—Command Keys for Resource Balance Maintenance Subfile
MDE08006—Subfile for Resource Balance Simulation Maintenance Subfile
MDE08007—Subfile Control Format for Resource Balance Simulation Subfile
MDE08008—Data Screen for Overhead Rate Simulation Maintenance
MDE08009—Session Status Screen

Selection Screen—MDE08001

This is the first screen to appear, and it allows the user to choose the file to maintain:

RESMSTSM—Resource Master Simulation File Maintenance
RESUBCSM—Resource Sub-Class Simulation File Maint.
RECLASSM—Resource Class Simulation File Maintenance
RESBALSM—Resource Balance Simulation File Maintenance
OVHDRFSM—Overhead Rate Simulation File Maintenance Once the selection is made, the program branches. Each file has, essentially, its own standard maintenance program.

Entry Fields:

Menu Selection Number

Required Fields:

Menu Selection Number

Edits:

The only valid menu selections are 1, 2, 3, 4, or 5.

Menu selection 4 can only be run if the user has cost authorization.

Command Keys (Display):

CK01 Display Session Status

Command Keys (Non-Display):

HELP Help Text
CK07 Send Message to Action List
CK17 Override Error Message

Resource Master Data Screen—MDE08002

The Data Screen displays one resource record at a time. At first, the Resource Number appears alone. Once a Resource Number is entered, it is used to chain to RESMSTSM. If the chain succeeds, the information from the simulation file is displayed with the action being CHANGE. If the chain fails, the same Resource Number is used to chain to the RESMST file. If this chain fails, an error message is displayed. If the chain succeeds, the information from that file is displayed with an action of ADD.

On the top portion of the screen, the user can enter the % change to standard cost, fixed cost, fixed overhead rate, and variable overhead rate. This change factor can be positive or negative, and is applied to the appropriate cost and overhead fields. For example:

% change to standard cost = 10%
Original standard cost = $35.00
First, the percentage is converted to a decimal:

10% / 100 = .10

Then, the change is applies to the original cost:

New cost = original cost + (change factor × original cost)

New Cost = 35.00 + (.10 × 35.00)
New Cost = 38.50

Display-Only Fields:

Action
Date Last Maintenance
Resource
Resource Class
Resource Sub-Class

Entry Fields:

% Change to Standard Cost
% Change to Fixed Cost
% Change to Fixed Overhead Rate
% Change to Variable Overhead Rate
Prime Costing PM Type
Prime Costing PM Name
Costing Method (Blank/F/R/S/H/A/L)
Level Class Code (A/B)
Beginning Effectivity Date
Ending Effectivity Date
NRV Usage (Y/N)
Net Realizable Value
Standard Cost
Fixed Cost
Fixed Overhead Type (R/T)
Fixed Overhead Rate
Fixed Overhead Code (P/D)
Fixed Overhead Table Value
Variable Overhead Type (R/T)
Variable Overhead Rate
Variable Overhead Code (P/D)
Variable Overhead Table Value
Manufacturing Lead Time 1
Manufacturing Lead Time Qty Break
Manufacturing Lead Time 2
Manufacturing Lead Time Adjustment
Purchase Order Lead Time 1
Purchase Order Lead Time Qty Break
Purchase Order Lead Time 2
Purchase Order Lead Time Adjustment Required Fields:

NRV Usage (Y/N)
Level Class Code (A/B)

Edits:

Beginning effectivity date cannot be greater than ending effectivity date. If entered, the dates must be valid.

Costing Rollup Costing Method must be A, F, H, L, R, or S.

The user can only take CK20 to delete the record if it already exists in RESMSTSM.

If a Fixed/Variable Table Value is entered, it must exist in the Overhead Rate file.

Fixed and Variable Overhead Type must be R or T.

Fixed and Variable Overhead Code must be P, D, or blank.

When Fixed Overhead Type = R, Fixed Overhead Rate and Fixed Overhead Code must be entered.

When Variable Overhead Type = R, Variable Overhead Rate and Variable Overhead Code must be entered.

Level Class Code must be A or B.

NRV usage must be Y or N.

The Prime Planning Type and Name must exist in PMODEL

For every percent change field, an edit is done to see if the percentage field is less than zero. If it is, the program edits so that the value of the field is not less than -100.

The Resource Number must exist in RESMST.

Defaults:

If any of the following fields are blank in RESMST, the defaulting scheme described below is used to retrieve the value. When the RESMSTSM record is updated, the default is loaded into the file.

Variable OH Type = RESUBC field RSVOPD, or RECLAS field RCVOPD, or TALFLI field TAVOPD.

Variable OH Rate = RESUBC field RSVORT, or RECLAS field RCVORT, or TALFLI field TAVORT.

Var OH Table/Val = RESUBC field RSVOTV, or RECLAS field RCVOTV, or TALFLI field TAVOTV.

Var OH Table/Rate = RESUBC field RSVOTR, or RECLAS field RCVOTR, or TALFLI field TAVOTR.

Fixed OH Type = RESUBC field RSFOPD, or RECLAS field RCFOPD, or TALFLI field TAFOPD.

Fixed OH Rate = RESUBC field RSFORT, or RECLAS field RCFORT, or TALFLI field TAFORT.

Fix OH Table/Val = RESUBC field RSFOTV, or RECLAS field RCFOTV, or TALFLI field TAFOTV.

Fix OH Table/Rate = RESUBC field RSFOTR, or RECLAS field RCFOTR, or TALFLI field TAFOTR.

Cost Rollup Method = RESUBC field RSCSRU, or RECLAS field RCCSRU, or TALFLI field TACSRU.

Cost Rollup Level = RESUBC field RSCRLC, or RECLAS field RCCRLC, or TALFLI field TACRLC.

Command Keys (Display):

CK18 Refresh the Screen
CK19 Return Without Update
CK20 Delete Record

Command Keys (Non-Display):

HELP Help Text
CK07 Send Message to Action List
CK17 Override Error Message

Resource Sub-Class Data Screen—MDE08003

This Data Screen displays one record at a time. Using the Resource Class and Sub-Class entered at the top of the screen, the program chains to the Resource Sub-Class Simulation File (RESUBCSM). If the chain succeeds, the information from that file is displayed with an action of CHANGE. If the chain fails, a chain is made to the Resource Sub-Class file (RESUBC). If this chain fails, an error message appears. If the chain succeeds, information from that file is displayed with an action of ADD.

On the top of the screen the user can enter a % Change to Fixed Overhead Rate and a % Change to Variable Overhead Rate. The change factor can be positive or negative. For example:

% Change to Fixed Overhead Rate = 10%
Original Fixed Overhead Rate = $35.00

First, convert from percentage to decimal format.
10% / 100 = .10

Then apply the change factor to overhead.

New Rate = original rate + (change factor × original rate)

New Rate = 35.00 + (.10 × 35.00)

New Rate = 38.50

Display-Only Fields:

Action
Date Last Maintenance

Entry Fields:

Resource Class
Resource Sub-Class
% Change to Fixed Overhead Rate
% Change to Variable Overhead Rate
Cost Rollup Costing Method
Level Class Code
Fixed Overhead Type (R/T)
Fixed Overhead Rate
Fixed Overhead Code (P/D)
Fixed Overhead Table Value
Variable Overhead Type (R/T)
Variable Overhead Rate
Variable Overhead Code (P/D)
Variable Overhead Table Value Required Fields:

Resource Class
Resource Sub-Class
Level Class Code
Overhead Rate and Overhead Code are required if the Overhead Type is R.
The Overhead Table Value is required if the Overhead Type is T.

Edits:

The Class/Sub-Class combination must exist in RESUBC.
The record must exist in RESUBCSM if the user takes CK20 to delete the record.
Cost Rollup Costing Method must be A, F, H, L, R, S, or blank.
Level Class Code must be A or B.
If Fixed Overhead Type = T, the Fixed Overhead Table Value must be entered. If Variable Overhead Type = T, the Variable Overhead Table Value must be entered.
If the Overhead Table Value is entered, it must exist in the Overhead Rate File (OVHDRF).
Variable and Fixed Overhead Codes must be P, D, or blank.
Variable and Fixed Overhead Type must be R or T.
If Variable Overhead Type = R, the Variable Overhead Rate and Code must be entered. If Fixed Overhead Type = R, the Fixed Overhead Rate and Code must be entered.

Defaults:

If any of the following fields are blank in RESUBC, when a record is added the defaulting scheme described below is used to retrieve the values. When the RESUBCSM record is updated, the default values are loaded into the file.

Variable OH Type defaults to RECLAS field RCVOPD, or TALFLI field TAVOPD.

Variable OH Rate defaults to RECLAS field RCVORT, or TALFLI field TAVORT.

Variable OH Table/Value defaults to RECLAS field RCVOTV, or TALFLI field TAVOTV.

Variable OH Table/Rate defaults to RECLAS field RCVOTR, or TALFLI field TAVOTR.

Fixed OH Type defaults to RECLAS field RCFOPD, or TALFLI field TAFOPD.

Fixed OH Rate defaults to RECLAS field RCFORT, or TALFLI field TAFORT.

Fixed OH Table/Rate defaults to RECLAS field RCFOTR, or TALFLI field TAFOTR

Cost Rollup Method defaults to RECLAS field RCCSRU, or TALFLI field TACSRU.

Cost Rollup Level defaults to RECLAS field RCCRLC, or TALFLI field TACRLC.

Command Keys (Display):

CK18 Refresh the Screen
CK19 Return Without Update
CK20 Delete Record

Command Keys (Non-Display):

HELP Help Text
CK07 Send Message to Action list
CK17 Override Error Message

Resource Class Data Screen—MDE08004

Using the Resource Class entered at the top of this screen, the program chains to the Resource Class Simulation File (RECLASSM). If the chain succeeds, the information from that file is displayed with an action of CHANGE. If the chain fails, a chain is made to the Resource Class File (RECLAS). If this chain fails, an error message appears. If the chain succeeds, the information from that file is displayed with an action of ADD.

On the top portion of the screen the user can enter a % Change to Fixed Overhead Rate and a % Change to Variable Overhead Rate. The change factor can be positive or negative. For example:

% change to fixed overhead rate = 10%
Original fixed overhead rate = $35.00

First, convert from percentage to decimal format.
10% / 100 = .10

Then, apply the change factor to overhead.
New rate = original rate + (change factor × original rate)

New Rate = 35.00 + (.10 × 35.00)
New Rate = 38.50

Display-Only Fields:

Action
Date Last Maintenance

Entry Fields:

Resource Class
% Change to Fixed Overhead Rate
% Change to Variable Overhead Rate
Cost Rollup Costing Method Level Class Code
Fixed Overhead Type (R/T)
Fixed Overhead Rate
Fixed Overhead Code (P/D)
Fixed Overhead Table Value
Variable Overhead Type (R/T)
Variable Overhead Rate
Variable Overhead Code (P/D)
Variable Overhead Table Value Required Fields:

Resource Class
Level Class Code
The Overhead Rate and Overhead Code are required if the Overhead Type = R.
The Overhead Table Value is required if the Overhead Type = T.

Edits:

The record must exist in RECLASSM if the user takes CK20 to delete the record.
Cost Rollup Costing Method must be A, F, H, L, R, S, or blank.
Level Class Code must be A or B.
If the Overhead Table Value is entered, it must exist in the Overhead Rate File (OVHDRF).
Overhead Type must be R or T.
Resource Class must exist in RECLASSM or RECLAS.
Variable and Fixed Overhead Codes must be P, D, or blank.
If Variable Overhead Type = R, the Variable OH Rate and Code must be entered. If the Fixed Overhead Type = R, the Fixed OH Rate and Code must be entered.
If the Variable Overhead Type = T, the Variable Overhead Table Value must be entered. If the Fixed Overhead Type = T, the Fixed Overhead Table Value must be entered.

Defaults:

If any of the following fields are blank in RECLAS, when a record is added the defaulting scheme described below is used to retrieve the values. When the RECLASSM record is updated, the values are loaded into the file.

Variable OH Type from TALFLI field TAVOPD.
Variable OH Rate from TALFLI field TAVORT.
Variable OH Table/Value from TALFLI field TAVOTV.
Variable OH Table/Rate from TALFLI field TAVOTR.
Fixed OH Type from TALFLI field TAFOPD.
Fixed OH Rate from TALFLI field TAFORT.
Fixed OH Table/Value from TALFLI field TAFOTV.
Fixed OH Table/Rate from TALFLI field TAFOTR.
Cost Rollup Method from TALFLI field TACSRU.
Cost Rollup Level from TALFLI field TACRLC.

Command Keys (Display):

CK18 Refresh Screen
CK19 Return Without Update
CK20 Delete Record

Command Keys (Non-Display):

HELP Help Text
CK07 Send Message to Action List
CK17 Override Error Message

Resource Balance Data Screen—MDE08007

This Data Screen is a subfile built from RESBAL and RESBALSM records within the Resource Number and Warehouse limits. The subfile is built one page at a time. Lower limits are set to the Resource Balance File (RESBAL) by the Resource Number and Warehouse lower limits entered by the user. The file is then read sequentially.

When a record is found that falls within the limits, a chain is made to the Resource Balance Simulation File (RESBALSM) to see if the record already exists. If the chain is successful, the information from RESBALSM is displayed. If the chain is not successful, the information from RESBAL is displayed. If no record is found there, an error message appears. Once the user presses ENTER, the screen is edited. If it passes the edits, it is added or updated to the RESBALSM file.

The user can enter new limits after the records have been updated. After the subfile is built, however, the limits are not available for entry. The Roll keys allow the user to page through the subfile.

On the top of the screen the user can enter a % Change to Historical Average Cost, Rolling Average Cost, and Last Complete Period Cost. The change can be positive or negative. For example:

% Change to Standard Cost = 10%
Original Standard Cost = $35.00

First, convert from percentage to decimal format.
10% / 100 = .10

Then, apply the change factor to cost.
New Cost = original cost + (change factor × original cost)
New Cost = 35.00 + (.10 × 35.00)
New Cost = 38.50

Display-Only Fields (after ENTER):

Resource
Warehouse

Entry Fields:

Resource Number Lower Limit
Resource Number Upper Limit
Warehouse Lower Limit
Warehouse Upper Limit
% Change to Historical Average cost
% Change to Rolling Cost
% Change to Last Complete Period Cost
Delete Code
Resource Number
Warehouse
Historical Average Cost
Rolling Average Cost
Last Complete Period Cost Edits:

The record must exist in RESBALSM if the user takes CK20 to delete .

The Resource Number/Warehouse limits must exist in either RESBAL or RESBALSM.

The Resource Number Lower Limit must be less than or equal to the Resource Number Upper Limit.

The Warehouse Lower Limit must be less than or equal to the Warehouse Upper Limit.

Command Keys (Display):

CK18 Refresh the Screen
CK19 Return Without Update

Command Keys (Non-Display):

HELP Help Text
CK07 Send Message to Action List
CK17 Override Error Message

Overhead Rate Data Screen—MDE08008

The Overhead Table Value entered at the top of this screen is used to chain to the the Overhead Rate Simulation File (OVHDRFSM). If the chain is successful, the information is displayed, and the action is CHANGE. If the chain is unsuccessful, a chain is made to the Overhead Rate File (OVRHDF). If that chain fails, an error message appears. If the chain is successful, information from the file is displayed, and the action is ADD.

On the top of the screen the user can enter a % Change to Overhead Rate. The calculation uses the value on the screen as the original Overhead Rate. The change may be positive or negative. For example:

% Change to Fixed Overhead Rate = 10%
Original Fixed Overhead Rate = $35.00

First, convert from percentage to decimal format.
10% / 100 = .10

Then, apply the change factor to overhead.
New Rate = original rate + (change factor × original rate)
New Rate = 35.00 + (.10 × 35.00)
New Rate = 38.50

Display-Only Fields:

Action
Date Last Maintenance

Entry Fields:

Overhead Table Value
% Change to Overhead Rate
Overhead Rate
Overhead Code (P/D)

Required Fields:

Overhead Table Value
Overhead Rate
Overhead Code (P/D)

Edits:

Record must exist in OVHDRFSM if the user takes CK20 to delete it.

Overhead Code must be P or D.

The Overhead Table Value must exist in either the OVHDRFSM or OVHDRF file.

Command Keys (Display):

| | |
|---|---|
| CK18 | Refresh the Screen |
| CK19 | Return Without Update |
| CK20 | Delete Record |

Command Keys (Non-Display):

| | |
|---|---|
| HELP | Help Text |
| CK07 | Send Message to Action List |
| CK17 | Override Error Message |

Session Status Screen—MDE08009

This screen displays the number of records added, changed, and deleted for each simulation file.

Display-Only Fields:

Number of Records Added/Changed/Deleted for each of the following files:

Resource Master Simulation File—RESMSTSM
Resource Sub-Class Simulation File—RESUBCSM
Resource Class Simulation File—RECLASSM
Resource Balance Simulation File—RESBALSM
Overhead Rate Simulation File—OVHDRFSM Command Keys (Display):

| | |
|---|---|
| CK01 | End Job |

Command Keys (Non-Display):

| | |
|---|---|
| HELP | Help Text |
| CK07 | Send Message to Action List |

B.

| File | Usage |
|---|---|
| ERRMSG | IF |
| MDE080FM | CF |
| OVHDRF | IF |
| OVHDRFSM | UF |
| PMODEL | IF |
| RECLAS | IF |
| RECLASSM | UF |
| RESBAL | IF |
| RESBALSM | UF |
| RESMST | IF |
| RESMSTSM | UF |
| RESUBC | IF |
| RESUBCSM | UF |
| TALFLD | IF |
| TALFLI | IF |
| TALFLZ | IF |
| PRTBLNCE | O |
| PRTCLASS | O |
| PRTMASTR | O |
| PRTOVRHD | O |
| PRTSUBCL | O |

C.

| File Name | Field Name | Description |
|---|---|---|
| TALFLD | TADSPC | Tells the program whether it must check for user cost authorization. |
| TALFLI | TACRLC | Default value for Level Class Code |
| | TACSRU | Default value for Cost Rollup Cost Method |
| | TAFOPD | Default value for Fixed Overhead Type |
| | TAFORT | Default Value for Fixed Overhead Rate |
| | TAFOTR | Default Value for Fixed OH Table/Rate |
| | TAFOTV | Default Value for Fixed OH Table Value |
| | TARESC | Variable Heading for Resource Number |
| | TAPMNM | Variable Heading for PM Name |
| | TAVOPD | Default Value for Variable OH Type |
| | TAVORT | Default Value for Variable OH Rate |
| | TAVOTR | Default Value for Variable OH Table/Rate |
| | TAVOTV | Default Value for Variable OH Table Value |
| TALFLZ | TANDEC | User-defined number of decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. A separate register prints for each option chosen from the Selection Screen. For example, if the user maintains the Resource Master Simulation File and the Resource Balance Simulation File in one session, two registers are printed, one for each file.

SECTION VII

SECTION VII-I

Distribution % Screen—MDE04015

This screen displays the cost distribution and production distribution percentages for all produced resources on a task. The screen appears if the user uses CK11 from the first Resource Maintenance Screen.

This subfile is built one page at a time. The values on this screen are for display only if this is a dependent PM. Also, if the resource is non-reportable, the Production Distribution % field is not available for entry. And if the resource is defined as having net realizable value, the Cost Distribution % field is not available for entry.

Display-Only Fields:

- PM Type (PM Maintenance only)
- PM Name (PM Maintenance only)
- Task Name
- Resource Number
- Description
- Quantity Relative To Task Batch Size in Std UM
- Resource Standard UM Entry Fields:

- Cost Distribution %
- Production Distribution %

Edits:

- A resource cannot have a cost distribution percentage that is greater than 100.
- The total of all cost distribution percentages for resources on the task must equal 100.
- A resource cannot have a production distribution percentage that is greater than 100.
- The total of all production distribution percentages for resources on the task must equal 100.

Command Keys (Display):

CK18 Refresh Screen
CK19 Return without Update

Command Keys (Non-Display):

HELP Display Additional Text
CK07 Send Message to Action List

SECTION VII-II

Distribution % Screen—MDE04015

(See Figure 47)

Selecting CK11 from either Resource Maintenance Screen displays the Distribution % Screen. PRISM requires that the production and cost distribution percentages for all produced resources on a task add up to 100.

The Production Distribution tells what percentage of resources went into making this produced resource. In our cardboard box example, large boxes use more cardboard than small boxes. So the Production Distribution % for large boxes might equal 60 percent, while the % for small boxes is 40 percent.

Similarly, the Cost Distribution tells what percentage of the total cost of a task is attributed to each produced resource. You use more resources to produce large boxes, so they deserve a higher Cost Distribution %.

Note: When defining a superflushable PM, you must display this screen and define the distribution percentages for its one produced resource.

Fields for Display

PM Type—appears only during PM Maintenance.

PM Name—appears only during PM Maintenance.

Task Name.

Resource—PRISM lists the number of each produced resource defined for the task.

Description.

Qty Rel To Task Batch—This is the quantity of resource produced from one task batch.

UM—unit of measure for the above quantity.

Fields for Entry

COST DIST %—PRISM displays the cost distribution percentage, if any, assigned to the resource on the Resource Maintenance Screen. You may enter or adjust this percentage field. The sum of cost distribution percentages for all resources displayed on the screen must equal 100.

PRODUCTION DIST %—PRISM displays the production distribution percentage, if any, assigned to the resource on the Resource Maintenance Screen. You may enter or adjust this percentage field. The sum of production distribution percentages for all resources displayed on the screen must equal 100.

Note: If certain program messages are overridable, you may use CK17 to update and exit this screen even if your percentages do not equal 100. You must, however, adjust the percentages before you are allowed to exit PM Maintenance.

Command Function Keys

ENTER—Press ENTER to update the new cost and production distribution percentages and return to the Resource Maintenance Screen.

CK18 REFRESH SCREEN—Use CK18 to redisplay the distribution percentages that were in place when the screen first appeared.

CK19 RETURN WITHOUT UPDATE—Use CK19 to redisplay the Resource Maintenance Screen without update.

SECTION VIII

SECTION VIII-I

Data Screen MIE18005

(See Figure 48)

This data screen is displayed when you press ENTER on Data Screen MIE18004. Here, if the action code is A (add) or C (change), you can enter cost attributes associated with this resource number. If the action code is D, all fields on this screen are for display only.

If your user profile is not authorized to see cost information, this screen cannot be displayed. Instead, the Selection Screen is redisplayed when you press ENTER on MIE18004.

For more information on costs, see *RM Concepts*, Section B.

Fields for Display

- Resource

Date Last Maint—date this resource was last updated. If you are adding a resource, this is today's date.

Action—The word ADD, CHANGE, or DELETE is displayed here, depending on the action code.

Fields for Entry

Standard Cost—your estimate of the average cost of this resource over the course of a year. For example, if you could be certain that the price of tomatoes would be $1 per pound from November to April and .50 from May to October, and that you would buy the same quantity during each six-month time period, you would enter a standard cost of .75 per pound.

Fixed Cost—a different estimate of the "standard cost," used if the Cost Rollup Costing Method for this resource is F. This allows you to use one estimate for cost rollup and one for non-rollup purposes.

Selected Unit Cost (blank/S/A/H/L)—Enter a letter to indicate the cost figure used for the resource in all cases EXCEPT when rolling up a PM that consumes it. Default from Resource Sub-Class (RESUBC) file loaded.

A—rolling average cost with alpha factor (RESBAL)

H—historical average cost (RESBAL)

L—last period's average cost (RESBAL)

S—standard cost (RESMST)

Note: If the Balance Resource Code (see Data Screen MIE18002) is C, this field must be S.

NET REALIZABLE VALUE USAGE (Y/N)—Enter Y if this is a "net realizable value" resource, that is if it is not a major produced resource but it has some fixed value or cost to you. N if this is not a "net realizable value" resource. For example, you might put a Y in this field for the carrot peelings produced when you peel carrots or the clam shells "produced" when you shuck clams.

Net Realizable Value—required if Net Realizable Value Usage is Y. Enter the price or cost of this NRV resource. Continuing the above example, the clam shells might have a negative Net Realizable Value, if you have to pay someone to take them away.

Switch Over Cost—reserved for future PRISM modules. This is the cost of switching a line from production of something else to production of this resource.

Cost From Last Rollup—usually updated by the system. This is the cost calculated the last time the Cost Rollup program in RP was run for this resource. This field is also available for entry, because you might want to enter a starting price when you install the system. This is the cost used when the Cost Rollup Costing Method (see Data Screen MIE18003) is R.

Command Function Keys

ENTER—Press ENTER if the action code is A or C, to update the file with new information. This returns you to the selection screen. If the action code is D (delete), pressing ENTER just redisplays the screen.

CK03 PAGE BACKWARD—Press CK03 to go back to Data Screen MIE18004.

CK15 NOTEBOOK FILE MAINT—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this sub-class are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press CK20. This removes this record from the file and returns you to the selection screen.

(2) Press CK19. This returns you to the selection screen without removing the record.

Session Status Screen—MIE18006

See SESSION STATUS SCREEN in the *Introduction to File Maintenance*, Section 1-A.

SECTION VIII-II

Resource Maintenance Screen (1)—MDE04012

(See Figure 49)

This is the first of two Resource Maintenance Screens on which you can enter data for each resource defined for the task.

Fields for Display

PM Type—only appears during PM Maintenance.

Action—This field is always VIEW for produced resources on dependent PMs and for consumed resources that are dependent on operations.

PM Name—only appears during PM Maintenance.

Date Last Maintenance—date you last updated information for this resource, or today's date if you are defining a new resource.

Task Name.

Class/Sub-Class—If you are adding a new resource to a task, these fields only appear if you specified the resource number on the PM or Standard Task Maintenance Selection Screen.

Standard Unit of Measure.

Qty/PM (Std UM)—PRISM calculates the quantity of the resource required to produce one PM batch, in the standard unit of measure.

Qty/Task (Std UM)—PRISM calculates the quantity of the resource required to produce one task batch, in the standard unit of measure.

Quantity Type—If you choose to express the required quantity of this resource as a ratio of another resource, PRISM displays an R for ratio in this field. Otherwise, the field remains blank.

Ratio Dependencies—If you define the required quantity of another resource as a ratio of this resource, PRISM displays the letter Y in this field, indicating that there are ratio dependencies on this resource.

Fields for Entry

Default information for the following fields comes from a variety of places. If you are adding a new resource, however, and did not enter the resource number on the PM Maintenance Selection Screen, the Resource Maintenance Screen appears with no defaults in place. If you would like to see the defaults to help you define your new resource, enter only the resource number and type on the first Resource Maintenance Screen and press ENTER. PRISM will display an error message that tells you the Qty/Task Batch is required. Along with the error message, it will also display all default values for the resource.

PRISM updates most Resource Maintenance Screen defaults to your Production Model Resource File when you press ENTER, providing you left the fields blank. Not all defaults, however, are updated to this file. This is noted in the field description where appropriate. Only enter a value in the field when you do not want to use the default.

WARNING: PRISM only updates default values during an ADD. If you change the default and then decide later that you want to revert to the default value, do not just blank out the field and press ENTER. You must key in the original default value yourself.

* RESOURCE—If you are defining a resource on a new task, enter the resource number here. Leave this field blank if you are adding a stream resource to the task. If you entered a Resource on the PM or Standard Task Maintenance Selection Screen, it is displayed here.

TYPE—C if the resource is consumed by the task, P if produced. This field is for display only if you are maintaining a resource on a dependent PM.

Qty/Task Batch—Required entry for all standard tasks and for all regular tasks unless:

(1) you are defining the quantity as a ratio of another resource on this task; or (2) this is a produced resource, and the system calculates produced resource quantities for you.

If neither of these conditions applies, enter the quantity of this resource required to produce one standard task batch. You have the choice of defining this quantity in a user unit of measure or in the standard unit of measure for the resource. If this is a potent resource, you must define this quantity in potent units.

User UM—the unit of measure for the quantity per task batch. If you leave this field blank, PRISM assumes you defined the quantity in the resource's standard unit of measure.

Note: If you plan to make an operation dependent on this resource, PRISM must be able to convert the user unit of measure to hours for run, cleanup, and setup times. Unit of measure for hours is defined in Foundation tailoring question #9.

DESCRIPTION—This field defaults from Resource Master Maintenance.

STREAM RESOURCE—Enter Y if this is a stream resource. Leave the default as N if this is not a stream resource. Remember that (1) your first task may not consume a stream resource, (2) final tasks may not produce them (3) any task, except the first and last, may have only one consumed and one produced stream, and (4) if this PM has one task only, it may neither produce nor consume a stream.

If this field is Y, you must leave the Resource Number field blank. If you do not enter a description, PRISM displays the description "STREAM".

REPORTABLE RESOURCE (Y/N)—for produced resources only. Enter Y if this is a reportable resource. Enter N if you do not want to report produced quantities. If N, this is a theoretical production resource. PRISM calculates how much you have produced based on how much you have consumed. If N, the Production Distribution % field must be blank for non-reportable, non-stream produced resources.

NRV USAGE (Y/N)—Enter Y if this resource has net realizable value, N if it does not. If Y, the Cost Distribution % must be blank since you are assigning this resource a cost.

Suppose your company produces chicken parts. One resource produced from the final task is chicken feathers. Since these feathers are not an overly valuable resource, you do not assign them a cost or production distribution percentage. But you know you can sell them for $20 a bag to a local pillow manufacturer. Chicken feathers, then, have a net realizable value of $20 per bag. You can also use NRV to account for the cost of waste products you must pay to have taken away. In this case, the net realizable value would be negative.

Effectivity Dates—for consumed resources only. Enter the range of dates during which workers on the floor can use this resource. This date range might be used, for example, if you have a seasonal product mix. The ending effectivity date you enter here cannot be greater than the one assigned to the resource during Resource Master Maintenance.

Whse—For consumed resources, enter the warehouse where an employee picking goods would find the resource. For produced resources, enter the receiving warehouse, where the finished item will be stocked.

This field defaults from the warehouse you entered on the Production Model Maintenance Screen. If that file is blank, it defaults from the PM Type File, the Resource Master File, and then RM tailoring question #T21.

Location—not allowed for non-balance or stream resources. If you want to specify a picking or receiving location for this resource, enter the number of that location here. If left blank, this field defaults from the Resource Master File, but is not updated to the Production Model Resource File.

Print on Documents (Y/N)—This field applies to any consumed resource on a parent PM with a quantity per task batch of zero. You may choose not to print the resource on selected reports by entering N. This applies to the following RP reports: Indented Model Retrieval (Section 2-6), Standard Task (Section 2-12), and Where-Used Resource (Section 2-14).

Grade—for consumed resources only. Grades allow you to assign quality levels to purchased and manufactured consumed resources. You assign a grade to each consumed resource when you receive it to stock. If you want to use only a certain grade or range of grades for this PM, enter the acceptable grade range here. If left blank, all grades are considered available.

PRISM contains no grade maintenance program, which means you must keep track of your grade scale manually and inform employees of the acceptable grade codes or numbers. Your Valid Grade Report (see Section 3-6 of your RM reference manual) does show all locations for a given resource, the grade of resource at each location, and the open schedules in need of the resource.

Production Distribution %—for reportable produced or stream resources only. Enter the percentage of consumed task resource(s) used to produce this resource.

For example, suppose you have a task to make cardboard boxes and that task produces two sizes of boxes, one large and one small. It takes more cardboard to produce a large box than it does to make a small box. So, the production distribution percentage for the large box might be 60 percent, while the distribution percentage for the small box is 40 percent.

The sum of the production distribution percentages for all produced resources on each task must equal 100. You may review the percentages assigned to other resources by using CK11 to call up the Distribution % Screen.

Cost Distribution %—for produced resources only. Enter the percentage of the total cost of this task you want to apply to this resource. This percentage is used during cost rollup to distribute the cost of a PM to its produced resources.

The sum of the cost distribution percentages for all produced resources on each task must equal 100. You may review the percentages assigned to other resources by using CK11 to call up the Distribution % Screen.

Clean Up—for consumed resources only. Enter the estimated quantity of this resource used to clean up the work center at the end of the task.

If you make an operation dependent on this resource, PRISM converts clean up and setup quantities into clean up and setup times. Thus, user unit of measure for the resource must be convertible to hours.

Note: If clean up or setup quantities are greater than zero, theoretical consumption of this resource must be D.

Setup Qty—for consumed resources only. Enter the estimated quantity of this resource used to setup the work center at the beginning of the task. For example, for some tasks, you may need to run a certain amount of resource through to make sure the machine is set correctly.

Documentation Location Code—for consumed resources only. Use this field to have resource locations with the same code printed together on the pick list. Enter the documentation location code for the resource or leave the field blank to use the default assigned in Resource Master Maintenance.

Location Classif-Prodn Rcpt—for produced resources only. When you receive this resource to a new location at the end of the task, this is the default location classification code for that location. You define location classification codes in Location Classification Maintenance (see Section 1-4 of your RM reference manual).

- Related Resource—for consumed resources only. If you want to express the Qty/Task Batch of this resource as a ratio or percentage of another resource on this task, enter the number of the related resource here.

When defining the related and ratio-dependent resources, you must follow these rules:

1. The related resource must already exist on this task.
2. The related and ratio-dependent resources must be of the same resource type, both consumed or both produced.
3. The standard unit of measure for the dependent resource must be convertible to the standard unit of measure for the related resource. You define unit of measure conversions in UM Conversion Maintenance (see Section 1-19 of your RM reference manual).
4. You may define a related resource on a dependent PM. You may also change the related resource ratio.
5. You may have multiple ratio-dependent resources. For example, suppose the quantity of A is determined as a ratio of B. You may also define C and D as a ratio of B. You may not, however, define E as a ratio of A, another ratio-dependent resource.
6. A resource that is defined as related or ratio-dependent cannot also be dependent on an operation or have an operation dependent on it.

Ratio—Enter the ratio of the resource to its related resource. For example, if related resource B has a quantity per task of 100, you may enter a ratio of .5 for dependent resource A, indicating a Qty/Task Batch of one-half of 100, or 50.

If you update a related resource number and ratio, when you redisplay this resource record, PRISM displays an R for ratio in the Quantity Type field. The quantity calculated from that ratio is displayed in the Qty/Task Batch field.

Retrieval Type—The Retrieval Type and Number fields in combination with CK12 allow you to select another resource for maintenance without first returning to the selection screen. Enter C for a consumed resource, P for a produced.

Number—Enter the number of the resource.

Trade Secret Information of Marcam; All Rights Reserved.

WARNING! Be sure to press ENTER to update the current resource record before retrieving another for maintenance. Remember that you must press ENTER on the first Resource Maintenance Screen AND on the second to update any data entered on the first screen.

Command Function Keys

CK01 DISPLAY SESSION STATUS SCREEN—Use CK01 to display the Session Status Screen where you can review the number of records maintained this session.

CK08 OPERATION MAINTENANCE—Use CK08 to transfer to the Operation Maintenance Screen to define operations for this task. When adding, use this command key only if you have already defined all resources for the task. Only use this key if you know the number of the operation you want to add or maintain, since no reference screen is available.

CK09 PROD RESOURCE QTY %—Use CK09 to display the Produced Resource Quantity % Screen. After you have defined all produced resources for a task, use this command key to have PRISM calculate the required quantity per task batch for the resources. The standard unit of measure for each resource must be convertible to the task batch size UM.

Note: CK09 is not valid if any of the produced resources on this task are ratio-dependent, or if this is a dependent PM where produced resources are available for display only.

CK11 DISTRIBUTION %—For each produced resource added to each task, you must define a cost and production distribution percentage. CK11 displays the Distribution % Screen where you can review and adjust the percentages you have assigned.

CK12 RETRIEVE RESOURCE—Use this command key in combination with the Retrieval Type and Number fields to retrieve another resource without returning to a selection screen.

CK15 DEPENDENT RESOURCE MAINT—CK15 breaks a dependency you created between a consumed resource and an operation. For instance, you may have set up a PM so the longer you run a machine the more electricity you use.

All dependent resource information is display-only (the word VIEW appears in the Action field in the upper right corner of the screen). But CK15 makes the fields available for entry by breaking the dependency. Once you select CK15, you must maintain the resource Qty/Task Batch independent of the operation.

CK18 REFRESH SCREEN—Use CK18 to redisplay the data that was on the screen when it first appeared.

CK19 RETURN WITHOUT UPDATE—Use CK19 to return to the Selection Screen where you initally called this screen.

CK20 TO DELETE—CK20 is valid at any time to delete a resource displayed on the Resource Maintenance Screen. You may not, however, delete resources with dependent operations.

SECTION IX

SECTION IX-I

Setting on Recost Flags. A change in any field or record for a PM sets on the recost flag for that PM. Setting the recost flag for a PM also sets the recost flags for all PMs that are dependent upon it. To retrieve all dependent PMs, lower limits are set to PMODELPA using PM Type/PM Name, and a series of READE operations is done. For every successful READE, the Recost byte of the PM is set to Y.

Creating a Dependent PM. When adding a record, the user can create a dependent PM by entering the parent PM Type and parent PM Name. The parent PM must be an existing independent PM. To verify these conditions, a chain is made to the PMODEL file using parent PM Type/parent PM Name. If the chain is successful, the program checks that the Dependency Code = I. If these conditions are met, the Dependency Code is set to D and the Dependencies on This PM is set to N on the dependent PM. On the parent PM, the Dependencies on This PM is set to Y, and the Number of Dependencies is incremented by one. If no parent PM is defined, the Dependency Code on the PM being maintained is set to I, and the Dependencies on This PM is set to N.

Historical information (yields on PMODEL and PMTASK, and quantities, costs, and date last costed in PMRESR) is taken from the parent PM. One exception is the Date Last Costed in PMODEL, which is set to zero when a dependent PM is created. In addition, if the user changes a consumed resource on the dependent PM, the following fields are initialized in the PMRESR file:

PRAVQY—Historical Average Quantity
PRLSQY—Last Quantity
PRPDQY—Last Complete Period Average Quantity
PRCSRU—Cost Rollup Costing Method
PRAVCS—Historical Average Cost
PRPDCS—Last Complete Period Average Cost
PRUNTC—Rolled Up Cost Per Std UM
PRTSKC—Total Rolled Up Cost for Task Size
PRPMCS—Total Rolled Up Cost for PM Size
PRPVCS—Previous Rolled Up Cost Per Std UM
PRDTLR—Date Last Rollup
PRSIMC—Simulated Rolled Up Cost If a parent PM Type/parent PM Name are entered, the following fields are not available for entry, since their values are taken from the parent PM:

Std Batch Size for PM
Std Batch Size UM
Theoretical Consumption

After a dependent PM is added, the program returns to the PM Selection Screen.

Changing the Dependency Code. If the user changes the Dependency Code to I, making a dependent PM an independent PM, the program duplicates all tasks, resources, operations, and comments from the parent PM into the dependent PM. In addition, the Number of Dependencies is decreased in the parent PM record. If the Number of Dependencies equals zero as a result of this subtraction, the Dependencies on This PM field is set to N.

Any historical information (yields in PMODEL and PMTASK, and quantities, costs, and date last costed in PMRESR) is initialized to zero when a dependent PM is changed to an independent PM.

To copy task records of the parent PM to the new independent PM, lower limits are set to the PMTASK file using parent PM Type/parent PM Name, and a series of READE operations is done. For every successful READE, a record is added to the PMTASK file with the dependent PM Type and dependent PM Name as the first two key values.

After all tasks have been added, the Number of Dependencies is reduced for resources on the parent PM that have dependent resources.To do this, lower limits are set to the PMRESR file using dependent PM Type/dependent PM Name, and a READE operation is done. If the READE is successful, the key field values are saved. The same resource is retrieved from the parent PM by chaining to PMRESR by parent PM Type/parent PM Name/Task Name/Resource Type = C/Resource Number. The Number of Dependencies is decreased by 1. If the Number of Dependencies equals zero as a result of this subtraction, Dependencies on This Resource is set to N.

The same process is done for the task that consumes this resource. A CHAIN is made to PMTASK using parent PM Type/parent PM Name/Task Name. The Number of Dependencies is adjusted, and Dependencies on This Task are reset accordingly. The next resource from the dependent PM is retrieved by doing a SETGT limits, and then a READE is done (key = dependent PM Type/dependent PM Name).

Next, resources that were the same on the parent and dependent PM are copied. Lower limits are set to the PMRESR file using parent PM Type/parent PM Name, and a READE operation is done. The key field values are saved before the process continues. If the READE is successful, the program determines if this record was overridden on the dependent PM by chaining to the PMRESR file using dependent PM Type/dependent PM Name/Task Name/Resource Type = C/ Resource Number. If the chain is unsuccessful, the program duplicates the record for this resource from the parent PM by chaining back with the saved key.

Otherwise, the same process continues with the next resource from the parent PM by setting greater than limits with the saved key and doing another READE. When all consumed resources have been read on the parent PM, all produced resource records are duplicated from the parent PM record with the exception of the PM Type and PM Name, which are taken from the dependent PM.

After all resources have been duplicated, the operations on the task are copied to the new independent PM record. Lower limits are set to the PMOPER file using parent PM Type/parent PM Name, and a series of READE operations is done. For every successful READE, a record is added to the PMOPER file. These records are copies of the parent PM operation records, with the exception of the PM Type and PM Name, which originate from the dependent PM.

Finally, the operation comment records are duplicated. Lower limits are set to the COMMNT file using parent PM Type/parent PM Name, and a series of READE operations is done. For every successful READE, a record is added to the COMMNT file. These records are copies of the parent PM operation comments, with the exception of the PM Type and PM Name, which originate from the dependent PM.

An independent PM cannot be converted to a dependent PM. That is, the Dependency Code cannot be changed from I to D.

Fields in PMODEL that have Y/N values default when a new record is added. When maintaining an existing record, the values in the file are displayed. If any fields remain blank when the user updates a record, an error message appears.

Standard Batch Size, UM, Plant Number, and Warehouse default from PMTYPE if no values appear in PMODEL. If the user blanks out a required field, however, the program retrieves the default value and loads it into the file.

When a record is added, the default for the sensitivity factor is retrieved from the PMTYPE file. The default is only updated if the user does not change the value on the screen.

Display-Only Fields (top of screen):

PM Type
PM Name
Date Last Maintenance
Action

Display-Only Fields (bottom of screen):

Dependencies on this PM
Recosting byte
System calculated cost level code
Date last costed
These yields can be maintained only if CK05 is used:
Historical Average Yield %
Last Yield %
Last Complete Period Average Yield %

Entry Fields:

Parent PM Type
Parent PM Name
Cumulative Lead Time
User Assigned Cost Level Code
EC Level
Theoretical Consumption
Standard Batch Size for PM
Standard Batch Size UM
System Recalculates Lead Time
Plant Number
Warehouse
Production Sequence #
Dependency Code
Sensitivity Factor %

Required Fields:

- Description
- Standard Batch Size for PM
- Standard Batch Size UM
- Recalculate Lead Time
- Dependency Code Defaults:

- Recosting byte = Y
- System Calculated Cost Level Code = 0
- Date Last Costed = 0/00/00
- Cost Rollup Code = N
- Simulated Cumulative Lead Time = 0
- Standard Batch Size for PM from PMTYPE
- Standard Batch Size UM from PMTYPE
- System Recalculates Lead Time = Y
- Plant Number from PMTYPE
- Warehouse from PMTYPE
- Production Sequence # = 99999
- Dependency Code = I
- Sensitivity Factor % from PMTYPE Edits:

- Dependency Code must be I or D.
- If Dependency Code = I, no parent PM Type or parent PM Name can be entered if the user is adding. If in CHANGE mode, the user can change the code from D to I, and the program blanks out parent PM Type/parent PM Name.
- If Dependency Code = D, parent PM Type must be specified.
- If parent PM Type is entered, it must exist in PMODEL.
- If Dependency Code = D, parent PM Name must be entered.
- If parent PM Name is entered, it must exist in PMODEL and be independent.
- If parent PM Name is entered, the Standard Batch Size, Standard Batch Size UM, and Theoretical Consumption Code must be identical to those on the parent PM.
- If PM size is changed, a warning message is displayed that tells the user they should adjust tasks and resources to agree with the new batch size.
- System Recalculates Lead Time must be Y or N.
- Theoretical Consumption Code must be T, C, D, or blank.

Command Keys (Display):

| | |
|---|---|
| CK01 | Display Session Status |
| CK05 | Historical Yield Maintenance |
| CK18 | Refresh Screen |
| CK19 | Return without Update |

Command Keys (Non-Display):

| | |
|---|---|
| HELP | Display Additional Text |
| CK07 | Send Message to Action List |
| CK17 | Override Error Message |
| CK20 | Delete a Record |

Same as Except Screen—MDE04009

This screen appears if CK10 is used on the Selection Screen (MDE04001). The Same as Except Screen allows the user to duplicate a PM but without having the copy be dependent on the original. All tasks, resources, operations, and operation comments are also copied. In addition, the user can maintain the new PM immediately after it is created.

All historical information (yields in PMODEL and PMTASK, and quantities and costs in PMRESR) is initialized to zero on the new production model.

To maintain the new production model, the program goes directly to the Production Model Maintenance Screen when the ENTER key is selected. Otherwise, a blank Same as Except Screen is displayed so the user can copy additional PMs.

The program copies the PMODEL record of the original PM by using the original PM Type/PM Name to chain to PMODEL. If the chain is successful, a record is added to the PMODEL file with the new PM Type/PM Name. If the PM being copied has dependencies, the new PM has no dependencies. If the PM being copied is a dependent PM, the new PM has the same parent PM Type and parent PM Name. The parent PM is updated to reflect an increase in its number of dependencies. On a dependent PM, only the exceptions to the parent PM are stored. That is, only the PMODEL record and consumed resource records are duplicated.

SECTION IX-II

Dependent PMs during PM Maintenance. A dependent PM is a copy of another PM (its parent PM) with the exception that one or more of the parent's consumed resources have been changed on the dependent PM.

A dependent PM does not consist of all the records that are normally associated with a PM. For example, if the parent PM SOUP has one task, two operations and three resources, the PM has one PMODEL record, two PMOPER records, and three PMRESR records. If a PM is created that is dependent on SOUP, it has one PMODEL record for the new PM and one PMRESR record for each consumed resource that differs from the consumed resource on the parent. These are the only records that exist for the dependent PM. All others records are referenced from the parent PM records.

When a dependent PM is maintained, the produced resource information is for display only. Only consumed resources that exist on the parent PM can be maintained. If the user tries to change a produced resource on a dependent PM, tan error message appears. The same occurs if the user tries to delete a resource from a dependent PM.

The user can maintain consumed resources on a dependent production model by either entering the Resource Number or selecting the resource on the Resource Selection Screen. In either case, the resource record is retrieved by using the dependent PM Type/dependent PM Name/Task Name/Resource Type = C/Resource Number to chain to PMRESR. If the chain is successful, the information is displayed for maintenance. If the chain fails, parent PM Type/parent PM Name is substituted in the key, and another chain is made to PMRESR. If that chain is successful, the resource information from the parent PM is displayed, along with the PM Type and PM Name of the dependent PM. If both chains fail, an error message appears.

If a consumed resource record is added to a dependent PM, the task that consumes the resource is updated to reflect this addition. A chain is made to PMTASK using parent PM Type/parent PM Name/Task Name. Dependencies on This Task is set to Y, and the Number of Dependencies is incremented by one. If a consumed resource record is deleted from a dependent PM, the Number of Dependencies is decreased by one. If the result of this subtraction sets the counter to zero, Dependencies on This Task is set to N. The same updating applies to the resource on the parent PM. The record is accessed by chaining to the PMRESR file by parent PM Type/parent PM Name/Task name/Resource Type = C/ Resource Number.

The only action available for resources on a dependent PM is CHANGE. If a record for the resource exists on the dependent PM (i.e., overrides to the resource on the parent PM have been made), the Remove Overrides field on the second Resource Maintenance Screen is available for entry. The field defaults to N, but if Y is entered the resource is deleted from the dependent PM. In other words, the resource information reverts to the information on the parent PM.

When consumed resources are maintained on a dependent PM, if the original resource on the parent PM is either related to an operation, or has an operation that is related to it, a warning message appears, since maintaining the resource would deactivate the relationship.

The Resource Type is never available for entry during maintenance on dependent PMs.

If a resource is expressed as a ratio of another resource, or if either of the related resources is changed on the dependent PM, both resource records exist on the dependent PM.

If a resource has dependencies it cannot be deleted. It can only be changed by an operator with security clearance for maintaining dependent tasks and resources. To determine if the user profile has clearance, the program calls the program MZM300 with parameters of: module code, $MOD (D); sequence, $SEQ (003); and result, $RES. If the result returned by MZM300, $RES, is Y, the user profile can perform the maintenance.

Dependent operations cannot be created on dependent PMs.

SECTION IX-III

Parent/Dependent PMs

One type of production model is a parent PM. Parent PMs are independent and stand on their own. You can also, however, create a dependent PM, which would be identical to its parent except for a few minor changes.

For example, one parent PM might include fresh tomatoes on it, since you use only fresh tomatoes when they are available. When tomatoes are out of season, however, you use canned tomatoes. So you could create a dependent PM that replaces fresh tomatoes with canned tomatoes but keeps everything else on the PM the same.

This saves time, since you do not have to construct another PM just to incorporate canned tomatoes. PRISM constructs it for you. The parent/dependent relationship, while useful, does impose certain restrictions that are described in detail in *PM Maintenance*, Section 1–4 of this manual.

Master/Associated PMs

You may also create master and associated PMs. For example, suppose that whenever you make beef stew, you must also make beef marinade. RP lets you define the beef stew PM as a master PM and the beef marinade PM as its associate. When you schedule and open the PM beef stew, PRISM automatically opens the PM beef marinade.

PM Type Codes

RP also lets you group PMs with common characteristics by a PM type code. A PM name always appears with its associated type code. For example, you may want to define the type code for all financial PMs as FI, while assigning all PMs related to beef stew a type code of BS.

SECTION IX-IV

Dependency Code—This field is only available for entry when adding a new PM.

Leave the default as I if you are defining an independent PM. Enter D if you plan to make this PM dependent on an already existing PM. For example, if you have a PM that uses fresh tomatoes, you might create a dependent PM that would be identical except for replacing fresh tomatoes with canned tomatoes. When you define a PM as dependent, PRISM associates all tasks, resources, and operations of the parent PM with the dependent. Note the word "associates". The parent data itself is not copied into the new PM record, only the basic structure of the PM.

If you enter D, you must also enter the Parent PM Type and Parent PM Name fields at the bottom of this screen. You may only maintain selected fields on a dependent PM. You may change the summary information for the PM with the exception of three fields: Standard Batch Size, Batch Size UM, and Theoretical Consumption. These three fields must be the same for parent and dependent PM to insure the integrity of the PM formula.

You may also maintain the consumed resources to be used by the dependent PM. You may not, however, add new consumed resources directly to the dependent PM. You must first add the resource to the parent with a quantity of zero and then maintain it, changing the quantity on the dependent PM. You also cannot change or delete any dependent PM tasks or operations.

The parent/dependent relationship places restrictions on the parent PM as well. For example, you may not delete the parent PM as long as it has dependencies. Once you change consumed resource data on a dependent PM, you may not delete the resource on the parent PM. The parent resource is said to have resource dependencies. You may, however, override the changes using the Override field and then delete the record.

When you purge a schedule, PRISM updates production distribution percentages and resource yields and quantities for the PM. When you purge a dependent PM, PRISM updates these values into both the dependent and parent PM records. It assumes that the user has set up the parent/dependent relationship for a very minor and frequently run variation of the parent PM. Do not make a dependent PM, then, if you are interested in tracking historical data separately for the two PMs.

If you are interested in using one PM simply as a building block for another PM, use the Same As Except Screen described later in this section.

Historical Average Yield %—A user authorized to maintain historical information can use CK05 and enter a value. Historical Average Yield % equals the average of the actual yield percentages.

Last Yield %—A user authorized to maintain historical information can use CK05 and enter a value. Last Yield % equals the last produced quantity divided by the expected quantity, the result of which is multiplied by the expected yield percentage.

Parent PM Type/* PM Name—The Parent PM Type and Name only appear when you are defining a new PM or maintaining a dependent PM. If you entered D in the Dependency Code field, enter the type code and name of the PM on which this production model is dependent.

SECTION X

SECTION X-I

MDE060

Production Model Type Maintenance

A. The Production Model Type Maintenance program allows the user to enter and maintain information in the Production Model Type File (PMTYPE).

Screens

MDE06001—Selection Screen
MDE06002—Data Screen
MDE06003—Session Status Screen

Selection Screen—MDE06001

Here the user enters the Production Model Type and the Action Code. The Production Model Type is required only when adding, while the Action Code is always required.

Entry Fields:

PM Type
Action Code

Required Fields:

PM Type (Add only)
Action Code

Edits:

Action Code must be A, C, or D.
If Action Code = A, the record must not already exist in the PMTYPE file.
If Action Code = C or D, the record must exist in the PMTYPE file.

Command Keys (Display):

CK01 Display Session Status

Command Keys (Non-Display):

HELP Help Text
CK07 Send Message to Action List
CK20 Delete

Data Screen—MDE06002

On the Data Screen the user enters, changes, or deletes the record. The Action Code text is displayed in the upper right corner. The Date Last Maintenance is always displayed for review, as is the Production Model Type. All other fields are available for entry. If deleting, a message indicates CK20 must be used to delete the record.

Display-Only Fields:

Action
Date Last Maintenance
PM Type

Entry Fields:

Description
Standard Batch Size
Batch Size UM
Plant Number
Warehouse
Schedule Release
Sensitivity Factor Required Fields:

Description
Schedule Release

Edits:

If standard batch size is entered, the Batch Size UM must be entered.
Batch Size UM, if entered, must be valid.
Schedule Release must be Y or N.

Defaults:

Schedule Release = Y
Sensitivity Factor from Tailoring

Command Keys (Display):

CK18 Refresh Screen
CK19 Return Without Update

Command Keys (Non-Display):

HELP Help Text
CK07 Send Message to Action List
CK20 Delete (Delete only)

Session Status Screen—MDE06003

The Session Status Screen displays the number of records added, changed, and deleted. CK01 is available to end the program, and ENTER returns the user to the Selection Screen.

Display-Only Fields:

Number of Records Added/Changed/Deleted

Command Keys (Display):

CK01 End Job

Command Keys (Non-Display):

HELP Help Text
CK07 Send Message to Action List

B.

| File | Usage |
|---|---|
| ERRMSG | IF |
| MDE060FM | CF |
| PMTYPE | UF |
| TALFLD | IF |
| TALFLZ | IF |
| QSYSPRT | O |

C.

| File Name | Field Name | Description |
|---|---|---|
| TALFLD | TASENS | Default Value for Sensitivity Factor |
| TALFLZ | TANDEC | User-defined number of decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All file updates are printed on the Production Model Type Maintenance Transaction Register with the information added, changed, or deleted from the Production Model Type File.

SECTION X-II

When To Use Production Model Type Maintenance

Use this option to define production model type codes. Type codes allow you to group production models together by some common characteristic. For example, if your company makes both soup and stew, you might assign one type code to all soup production models and another type code to all stew production models. When you enter a PM Name in PRISM, you are also required to enter its associated PM type.

PRISM stores all type code information in your Production Model Type Master File (PMTYPE). You may review current PM types and their characteristics by running your PM Type File List (Section 3-9).

How To Use Production Model Type Maintenance

Select Option 2 from the RP Maintenance Menu to display the Production Model Type Maintenance Selection Screen (MDE06001). On this screen you enter the PM Type you want to add or maintain and an Action Code.

Selection Screen—MDE06001

Figure 50:
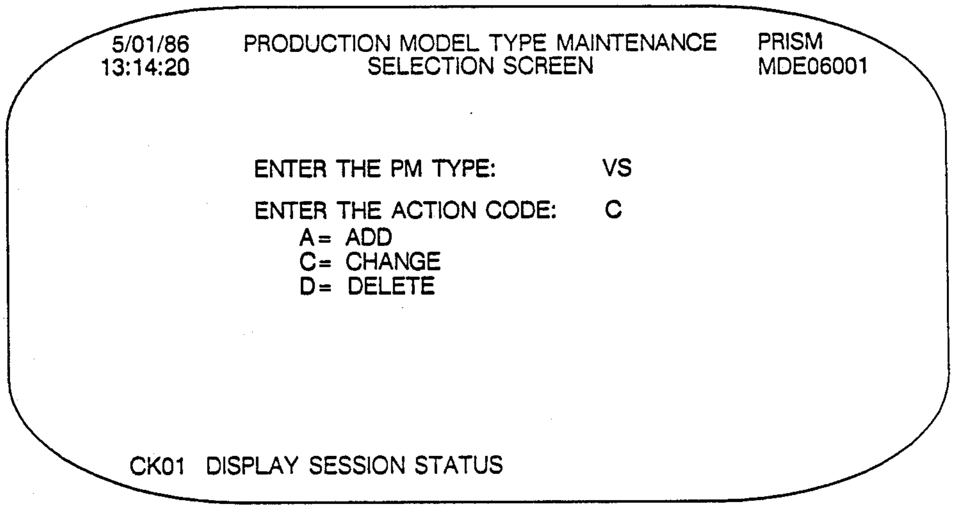

(See Figure 50)

Fields for Entry

PM TYPE—Enter the PM Type you want to add or maintain. PM Type may be any one- or two-digit alphanumeric entry. Since PM Type is a required entry in many places, you should choose type codes that are easy to remember.

ACTION CODE—Enter A to add, C to change, or D to delete the record.

Command Function Keys

ENTER—Press ENTER to display the Data Screen. If you entered Action Code D, PRISM displays a message that asks you to take CK20 to confirm the deletion.

CK01 DISPLAY SESSION STATUS—CK01 calls up the Session Status Screen. Use this screen to review the total number of records added, changed, and deleted so far during the session.

Data Screen—MDE06002

(See Figure 51)

When you key in the required fields and press ENTER from the Selection Screen, PRISM displays the Data Screen. Use this screen to define or review the characteristics of the PM Type.

Fields for Display

PM Type.

Date Last Maintenance—date you last updated the record, or today's date if you are defining a new PM Type.

Action—what you chose to do to this record.

Fields for Entry

DESCRIPTION—explanation of the PM type. This will help identify PM Type/Name combinations on PRISM screens, reports, and lists.

Standard Batch Size—Enter the default standard batch size or total amount (15 digits including six decimal positions) to be produced by production models of this type. This becomes the default standard batch size for all production models assigned this PM type code.

Batch *Size Unit* of Measure—required if a Standard Batch Size is entered. Enter the unit of measure abbreviation for the Standard Batch Size. For example, you might enter GA for gallons.

SCHEDULE RELEASE—Leave the default as Y if production models assigned this type code are operational PMs, PMs you actually plan to schedule and run. Enter N if this type code groups together financial or experimental PMs you plan to use for costing or planning only, not for actual production.

Note: It is strongly recommended that you group all financial PMs to be used during cost rollup under one type code. You may then define this type code as your default rollup PM type in RP tailoring question #1. See Section C, *Installation and Tailoring*, and *Cost Rollup Report - Actual*, Section 2-2, for details.

Plant Number—Enter the abbreviation of the plant or factory where production models of this type will occur. The value you enter here becomes the default Plant Number when you define a production model with this type code in Production Model Maintenance.

Warehouse—Enter the abbreviation of the warehouse where resources produced by production models of this type will be received. The value you enter here becomes the default warehouse when you define PMs with this type code in PM Maintenance.

Sensitivity Factor %—for new PM Types, this field uses your answer to RP tailoring question #2. You may enter a percentage ranging from 0.1-100.0.

PRISM uses the sensitivity factor to decide if a batch should be run even if a full batch is not needed to complete an order. For example, if you set the sensitivity factor at 40 percent, PRISM will schedule another batch if the quantity required is at least 40 percent of the standard batch size.

The value you enter here becomes the default sensitivity factor for PMs of this type. You may also define a sensitivity factor for each task. See Production Model Maintenance (Section 1-4) for details.

Command Function Keys

ENTER—Press ENTER to update the record and return to the Selection Screen. If you entered Action Code D, PRISM reminds you to take CK20 to delete the record.

CK18 REFRESH SCREEN—CK18 redisplays the PM Type information that was on the screen when it first appeared.

CK19 RETURN WITHOUT UPDATE—CK19 redisplays the Selection Screen without updating PM Type information.

Session Status Screen—MDE06003

Selecting CK01 from the Selection Screen calls up the Session Status Screen. Use this screen to review the total number of records added, changed, and deleted during the session. Take CK01 from the Status Screen to exit the option and generate a register that details your maintenance activity.

See Section 1-A of this manual for details on session status screens.

SECTION XI

SECTION XI-I

• *Negative Theoretical Consumption:*

A Completed negative production receipt transaction generates negative theoretical consumption. The purpose of negative theoretical consumption is to reverse theoretical consumption done with a positive production receipt.

1. Theoretical consumption ratio in this case is negative.
2. All CC trans are the reverse of positive consumption.
3. All TP transactions are the reverse of positive production.
4. All TC transactions are the reverse of positive consumption.
5. Negative superflush is not done.

• *Summary of Transaction Updates:*

The following tables summarize the updates that occur in addition to Updates1 and Updates2 detailed above. In some cases, additional information can be found under the individual transaction section, listed by screen numbers after the tables.

Summary of Transaction Updates

| Transaction Type | CHn | CHy | DI | IA | IM | IP | MI | MR | PR | RA | RC | RS | RT | SA | TC | TP | TR |
|---|---|---|---|---|---|---|---|---|---|---|---|---|---|---|---|---|---|
| File—LOCDTL | f t | f t | | | | | | | | c p | f t | | | | | | f t |
| Qty @ Locn Std—LDLOCQ | - + | | - | + | X | - | - | + | X | - + | - + | + | - | - | X | X | - + |
| Qty @ Locn LR—LDORUM | - + | | - | + | X | - | - | + | X | - + | - + | + | - | - | X | X | - + |
| Last Recv UM—LDRCUM | X | | | | | | | X | X | | | X | | | | | X |
| Potency Factor—LDPOTF | X | | | | | | | X | X | X | X | | | | | X | X |
| Grade—LDGRDE | T | | | | | | | T | T | T | T | T | | | | | T |
| Revision Lvl—LDREVL | T | | | | | | | T | T | T | T | T | | | | | T |
| Qty Resv Mfg—LDQYRM | | | - | | | | | | | | | | | | X | | |
| Qty Resv Sales—LDQYRS | | | | | | | | | | | | | | - | | | |
| Trans # LR—LDTRAN | X | | | | | | | X | X | | X | | | | | | X |
| Date Last Recv—LDDLRC | X | | | | | | | X | X | | X | X | | | | | X |
| Time Last Recv—LDTLRC | X | | | | | | | X | X | | X | X | | | | | X |
| FIFO Date—LDFIFO | T | | | | | | | T | T | | T | T | | | | | T |
| ETD—LDETD | T | | | | | | | T | T | | T | T | | | | | T |
| Shelf Life Dt—LDEXPD | T | | | | | | | T | T | | T | T | | | | | T |
| Classif Code—LDCLCD | | X | | | | | | | | | | | | | | | |
| On Order Inv—LDOOIN | | X | | | | | | | | | | | | | | | |
| Avail for Plan—LDAVPL | | X | | | | | | | | | | | | | | | |
| On Hand Inv—LDOHIN | | X | | | | | | | | | | | | | | | |
| $ Value Inv—LDDVIN | | X | | | | | | | | | | | | | | | |
| $ Value WIP—LDDWIP | | X | | | | | | | | | | | | | | | |
| Add a Record— | * | | | | | | | * | * | * | * | * | | | * | * | * |

f = From Location
t = To Location
c = Consumed from
p = Produced To

X = Update the record
+ = Increase
- = Decrease
* = If no record currently exists
T = Updated based on tailoring CHn = Change classification with Reclassify byte = no
CHy = Change classification with Reclassify byte = yes
LR = last received

Summary of Transaction Updates (continued)

| Transaction Type | CH | DI | IA | IM | IP | MI | MR | PR | RA | RC | RS | RT | SA | TC | TP | TR |
|---|---|---|---|---|---|---|---|---|---|---|---|---|---|---|---|---|
| **File—LOCMAS†** | n | | | | | | | | | | | | | | | |
| Warehouse—LCWHSE | X | | | | | | | X | X | X | X | X | | | X | X |
| Location—LCLOCN | X | | | | | | | X | X | X | X | X | | | X | X |
| Pick Ovrd Seq—LCPOSQ | X | | | | | | | X | X | | X | | | | X | X |
| Dt Last Maint—LCDTMT | X | | | | | | | X | X | X | X | X | | | X | X |
| **File—LOTMAS** | f t | | | | | | | | c p | f t | | | | | | f t |
| Last Rcpt Date—LMLRDT | X | | | | | | X | X | X | X | X | | | | | X |
| Lot Qty Issued—LMLQYI | | + | | | + | | | | + | | − | | + | | | |
| Lot Qty Shipped—LMLQYS | | | | | | | | | | | | | | + | | |
| Lot Qty MscDsp—LMLQYD | + | | − | − | | + | | | | + | | | | | | + |
| Tot Lot QtyRcv—LMLQYT | + | | | | | | + | + | + | + | | − | | | | + |
| Add a Record— | • | | | | | | • | • | • | • | • | | | | | • |
| **File—PODETL** | | | | | | | | | | | | | | | | |
| Date Last Rcpt—PDLRDT | X | | | | | | | | | | | | | | | |
| Qty Rcvd OnHnd—PDQROH | L | | | | | | | | | | | | | | | |
| Qty Rcvd OnOrd—PDQROO | L | | | | | | | | | | | | | | | |
| Qty Rcvd Total—PDQYRC | E | | | | | | | | | | | | | | | |
| **File—POSUMM** | | | | | | | | | | | | | | | | |
| PO Status—PSSTAT | X | | | | | | | | | | | | | | | |

f = From Location
t = To Location
c = Consumed from
p = Produced To
n = If Reclassify = no
L = Depends on Location Classification
E = Updated if transaction goes from a location which is not not available for planning to one that is available for planning.

X = Update the record
\+ = Increase
− = Decrease
• = If no record currently exists † If the system is not required to have a LOCMAS record (determined by RM tailoring), one will be added by the following transactions which may create new locations.

Summary of Transaction Updates (continued)

| Transaction Type | CH | DI | IA | IM | IP | MI | MR | PR | RA | | RC | | RS | RT | SA | SC | TC | TP | TRw | |
|---|---|---|---|---|---|---|---|---|---|---|---|---|---|---|---|---|---|---|---|---|
| File—RESBAL | | | | | | | | | c | p | f | t | | | | | | | f | t |
| Select Next CY—RBSNCC | T | T | T | T | T | T | | | T | | T | | | T | T | | T | | T | |
| # Tran Sinc CY—RPTLCC | X | X | X | X | X | X | X | X | X | X | X | X | X | X | X | X | X | X | X | X |
| Qty On Hand—RBQYOH | L | L | L | L | L | L | L | L | L | L | L | L | L | L | L | | L | L | L | L |
| Qty On Order—RBQYOO | R L | L | L | L | L | L | L | L | L | L | | | L | L | L | | L | L | L | L |
| Tot Qty Present—RBTQTY | L | - | + | + | - | - | + | + | - | + | - | + | + | - | - | | - | + | - | + |
| Dt Last Activity—RBDTLA | X | X | X | X | X | X | X | X | X | X | X | X | X | X | X | X | X | X | X | X |
| Dt Last Eff OHQ—RBDLOQ | L | L | L | L | L | L | L | L | L | L | L | L | L | L | L | | L | L | L | L |
| Prod Qty Total—RBAPTL | | | | | | | | + | | + | | | | - | | | | + | | |
| Mfg Reserv Qty—RBMMRQ | | - | | | | | | | | | | | | | | | - | | | |
| Qty Sold To Dt—RBQYSD | | | | | | | | | | | | | | | | | | | | |
| Sales Aloc Qty—RBSAQY | | | | | | | | | | | | | | | + | | | | | |
| Sales Rsrv Qty—RBSMRQ | | | | | | | | | | | | | | | - | | | | | |
| Date Last Sale—RBDTLS | | | | | | | | | | | | | | | X1 | | | | | |
| Total Consumpt—RBSCTL | | + | | | + | + | | | + | | | | | | | | + | | | |
| Hist Avg Cost—RBAVCS | L | | | | | | | | | | | | | | | | | | | L |
| Rolling Avg Cost w/ alpha factor—RBRLCS | L | | | | | | | | | | | | | | | | | | | L |
| File—RESMST | | | | | | | | | | | | | | | | | | | | |
| Re-Plan Flag—RMREPL | E | | | | | | | | | | | | | | | X | | | | |
| File—RESRES | | | | | | | | | | | | | | | | | | | | |
| Qty Issued—RVQYIS | | + | | | | | | | | | | | | | | | + | | | |

f = From Location
t = To Location
c = Consumed from
p = Produced To
n = If Reclassify = no
T = Updated based on tailoring
R = Depends if a PO is entered
L = Depends on Location Classification
E = Updated if transaction goes from a location which is not not available for planning to one that is available for planning.

X = Update the record
X1 = byte is updated to Y
+ = Increase
- = Decrease
w = if the From warehouse is different than the To warehouse
Dt Last Activity is updated to today's date unless otherwise noted.

Summary of Transaction Updates (continued)

| Transaction Type | DI | CC | ON | PR | RA | RS | RT | TC | TP | SC |
|---|---|---|---|---|---|---|---|---|---|---|
| **File—RMODEL** | | | | | | | | | | |
| # Earn PM Batch—RDNEPB | | | + | + | | | | | | + |
| Task Comp Code—RDTSCC | | | | X | | | | | | X |
| Release Status—RDSTAT | X | | X | X | | | | | | X |
| Act Start Date—RDATSD | X | | X | X | | | | | | X |
| **File—RMRESR** | | | p | | c p | | | | | |
| Qty Prod To Dt—RRQYPD | | | + | + | + | | – | | + | |
| Qty Issued—RRQYIS | + | + | | | + | – | | + | | |
| Qty Red Fr Res—RRQYRR | + | | | | | | | + | | |
| Substitute Cd—RRSRSB | X | | | | Y Y | | | | | |
| Resc Subst For—RRRNSF | X | | | | | | | | | |
| Add a Record— | • | | | • | • • | | | | | |
| **File—RMTASK** | | | | | | | | | | |
| Task Status—RTSTAT | X | | X | X | | | | X | X | X |
| Actual Start Dt—RTTASD | X | | X | X | | | | X | X | X |
| Actual Comp Dt—RTTACD | | | X | X | | | | | | X |
| **File—TRCOMM** | This file can be updated by any transaction. | | | | | | | | | |

c = Consumed from
p = Produced To

X = Update the record
Y = Byte set to Y if record added
+ = Increase
– = Decrease
• = If no record currently exists Summary of Transaction Updates (continued)

| Transaction Type | CA | CH | DI | IA | IM | IP | MI | MR | ON | PC | PR | RA | RC | RS | RT | SA | SC | TR |
|---|---|---|---|---|---|---|---|---|---|---|---|---|---|---|---|---|---|---|
| **File—TRCTRL** | | | | | | | | | | | | | | | | | | |
| # Sales Trans—TLSATN | | | | | | | | | | | | | | | | X | | |
| $ Val Sale Trans—TLSATD | | | | | | | | | | | | | | | | X | | |
| # Scrap Trans—TLSCTN | | | | | | | | | | | | | | | | | X | |
| # Chg Class Trn—TLCCTN | | X | | | | | | | | | | | | | | | | |
| # Adjust Trans—TLADTN | X | | | X | X | | | X | | | | X | X | X | | | | X |
| # Issue Trans—TLISTN | | | X | | | X | X | | | X | | | | | | | | |
| # PR Trans—TLPRTN | | | | | | | | | X | | X | | | | X | | | |
| # of Trans—TLTRCN | X | X | X | X | X | X | X | X | X | X | X | X | X | X | X | X | X | X |
| $ Val All Tran—TLTTDV | | X | | | | | | X | | | X | X | | | | | X | |
| # Suspend Tran—TLSPTN | 1 | 1 | 1 | 1 | 1 | 1 | 1 | 1 | 1 | 1 | 1 | 1 | 1 | 1 | 1 | 1 | 1 | 1 |
| # Updated Tran—TLUPTN | 1 | 1 | 1 | 1 | 1 | 1 | 1 | 1 | 1 | 1 | 1 | 1 | 1 | 1 | 1 | 1 | 1 | 1 |
| # Error Trans—TLERTN | 1 | 1 | 1 | 1 | 1 | 1 | 1 | 1 | 1 | 1 | 1 | 1 | 1 | 1 | 1 | 1 | 1 | 1 |
| # Part Upd Trn—TLPUTN | | | | | | | | | 1 | | 1 | | | | | | 1 | |
| **File—TREBAT** | | | | | | | | | | | | | | | | | | |
| All Entry Fields—Screen | f | f | f | f | f | f | f | t | t | t | t | f | f | t | f | f | t | f |
| Source Byte—TBSRCB | X | X | X | X | X | X | X | X | X | X | X | X | X | X | X | X | X | X |
| Trans Qty User—TBQNTY | | X | X | X | X | X | X | X | X | X | X | X | X | X | X | X | X | X |
| UM (User)—TBUMSR | | X | X | X | X | X | X | X | X | X | X | X | X | X | X | X | X | X |
| Trans Qty Std—TBSQTY | | X | X | X | X | X | X | X | X | X | X | X | X | X | X | X | X | X |
| Unit Cost—TBUNCS | | X | X | X | X | X | X | X | | | X | X | X | X | X | X | X | X |
| Selected Unit Cst—TBSELC | | X | X | X | X | X | X | X | | | X | X | X | X | X | X | X | X |
| Extended Cost—TBEXCS | | X | X | X | X | X | X | X | | | X | X | X | X | X | X | X | X |
| Trans Amount—TBTRAM | X | XT | | | | | | XT | | | XT | p | | | | | | |
| Sales Amount—TBUNPR | | | | | | | | | | | | | | | | X | | |
| User Ent Tr Amt—TBUTAM | | X | | | | | | X | | | | | | | | | | |
| Plant #—TBPLNT | | | X | | | | | | X | X | X | X | | X | X | | X | |
| Misc Upd Cd 1—TBMUB1 | | T | | | | | | | | | T | | | | | | | |
| Sv/Restore Code—TBSAVE | X | X | X | X | X | X | X | X | X | X | X | X | X | X | X | X | X | X |

f = From Location X = Update the record
t = To Location T = Updated based on tailoring
p = Produced To 1 = Only one field can be updated
Transaction Quantity (user) and UM are loaded from the screen Summary of Transaction Updates (continued)

| Transaction Type | CA | CC | CH | DI | IA | IM | IP | MI | MR | ON | PC | PR | RA | RC | RS | RT | SA | SC | TC | TP | TR |
|---|---|---|---|---|---|---|---|---|---|---|---|---|---|---|---|---|---|---|---|---|---|
| **File—TRHIST** | | | | | | | | | | | | | | | | | | | | | |
| All Entry Fields—Screen | f | f | f | f | f | f | f | f | t | t | t | t | f | f | t | f | f | t | f | t | f |
| Effect inv $—THEFIN | | | L | L | L | L | L | L | L | | | L | L | | L | L | L | | L | L | |
| Effect Non-MRP—THEFPQ | | | L | L | L | L | L | L | L | | | L | L | | L | L | L | | L | L | |
| Trans Qty User—THQNTY | | X | X | X | X | X | X | X | X | X | X | X | X | X | X | X | X | X | X | X | X |
| UM (user)—THUMSR | | X | X | X | X | X | X | X | X | X | X | X | X | X | X | X | X | X | X | X | X |
| Trans Qty Std—THSQTY | | X | X | X | X | X | X | X | X | X | X | X | X | X | X | X | X | X | X | X | X |
| Efct Not On Ord—THTENQ | | | | L | L | L | L | L | | | | L | L | | L | L | L | | L | L | |
| Rcvd frm On Ord—THTRON | | | L | | | | | | L | | | | L | | | | | | | | |
| Rcvd to On Ord—THTROH | | | | L | | | | | L | | | L | L | | L | L | L | | L | L | |
| Resc Class—THRSCL | X | X | X | X | X | X | X | X | X | | | X | X | X | X | X | X | X | X | X | X |
| Resc Sub-class—THRSSC | X | X | X | X | X | X | X | X | X | | | X | X | X | X | X | X | X | X | X | X |
| Resource Type—THRSTP | | X | | X | | | | | | | | X | X | | X | X | | X | X | X | |
| Substitute Byt—THSRSB | | | | X | | | | | | | | | X | | | | | | | | |
| Resc Subst for—THSUBR | | | | X | | | | | | | | | | | | | | | | | |
| User Ent Tr Amt—THUTAM | X | | X | | | | | | X | | | | X | | | | X | | | | |
| Unit Cost—THUNCS | | X | X | X | X | X | X | X | X | | | X | X | X | X | X | X | X | X | X | X |
| Slctd Unit Cost—THSELC | | X | X | X | X | X | X | X | X | | | X | X | X | X | X | X | X | X | X | X |
| Extended Cost—THEXCS | | X | X | X | X | X | X | X | X | | | X | X | X | X | X | X | X | X | X | X |
| Trans Amount—THTRAM | X | | T | | | | | | T | | | XT | X | | | | | | | T | |
| Plant—THPLNT | | X | | X | | | | | | X | X | X | X | | X | X | | X | X | X | |
| Res Bal Adj Qty—THRBAQ | | | | | X | X | | | | | | | | | | | | | | | |

Transaction Quantity (user) and UM are loaded from the screen.
The "Effect on Not On Order" (THTENQ) and "Received from On Order" (THTRON) fields are mutually exclusive.

X = Update the record
T = Updated based on tailoring
f = From Location
t = To Location
L = Depends on Location Classification Notes:

1. CC, TC, and TP transactions are generated by ON, SC, and PR.
2. DI transactions are generated by PC but, unlike CC, TC, and TP, they can also be generated by the user.
3. CC transactions only update RMRESR and TRHIST.
4. PODETL and POSUMM are only updated by CH. This happens because CH is the only transaction with a PO number.

SECTION XI-II

Production Receipt—MIE44205

A PR transaction allows the operator to receive the produced resources from a schedule to a location in the warehouse. The warehouse defaults from the resource on the production model. If it is not defined there, it defaults from the Resource Master File (RESMST).

When entering a production receipt, the user must specify the attributes of the location where the resource is going. The Location Classification Code defaults from the Location Detail file if a LOCDTL record exists. If there is no existing LOCDTL record, the Classification Code defaults from the RMRESR record. If the RMRESR record is blank, the default is from RESMST.

The PR transaction generates the TC (theoretical consumption), TP (theoretical production), and CC (calculated cost) transactions. IMPORTANT: When doing a negative production receipt, a negative TC, TP, and CC are performed if applicable.

When a production receipt is performed, the operator has the option of setting all task statuses to Complete. If the operator selects to complete all tasks, only those tasks that are prior to the task being received against and the task that is being completed are set to Complete. If the task that is being completed is the last task on the schedule, the All Tasks are Complete byte in RMODEL is set to Y.

When a task is completed, reservations that are outstanding may be deleted. Reservations may be deleted (backed out) by a separate menu option.

Updates

Reminder: This section only contains updates for those files and fields that require a detailed explanation. For the remainder of the updates, please see the *Summary of Transaction Updates* table.

- *LOCDTL (Existing Record):*

Quantity at location in standard unit of measure:

A. If the Quantity is positive and a. the transaction UM and the standard UM are the same and, 1. the resource is non-potent, the transaction quantity is added to the quantity at location in standard UM.
2. the resource is a potent resource, the transaction quantity extended by the entered potency factor is added to the quantity at locn in standard UM.

b. the transaction UM and standard UM are different and 1. the resource is a non-potent resource, the transaction quantity converted to the std UM is added to the quantity at location in standard UM.
2. the resource is a potent resource, the transaction quantity converted to the standard UM and then extended by the entered potency factor is added to the quantity at location in standard UM.

B. If the Quantity is negative, and a. the transaction UM and the standard UM are the same, and 1. the resource is non-potent, the transaction quantity is added to the quantity at location in standard UM.

2. the resource is a potent resource, the transaction quantity extended by the entered potency factor is added to the quantity at location in standard UM b. the transaction UM and standard UM are different, and 1. the resource is a non-potent resource, the transaction quantity multiplied by -1, converted to the standard UM and then multiplied by -1 again is added to the quantity at location in standard UM.
2. the resource is a potent resource, the transaction quantity multiplied by -1, extended by the entered potency factor. Then, it is converted to the standard UM and then multiplied by -1 again is added to the quantity at location in standard UM.

Quantity at location in the last received UM, and

A. resource is non-potent, and a. the transaction UM and the standard UM are the same, the transaction quantity is added to the quantity at location in standard UM then this becomes the quantity at location in the last received UM.
b. the transaction UM and the standard UM are different, the transaction quantity is converted to the standard UM, then added to the quantity at location in standard UM. The result is converted to the the transaction UM, and this quantity is the quantity at location in the last received UM.

B. resource is potent, and a. the transaction UM and the standard UM are the same and potency factors are the same, the potency factor at the location is divided into the quantity at location in Standard UM; then added to the transaction quantity. This quantity is updated as the quantity at location in the last received UM.
b. the Transaction UM and the standard UM are the same and Potency Factors are different,the transaction quantity is converted into potent units by multiplying the transaction quantity by the potency entered. This quantity is added to the quantity at location in standard UM. The new Potency Factor is calculated (see beginning of transaction entry) and divided into the quantity just calculated. This now becomes the quantity at location in last received UM.
c. the transaction UM and the standard UM are different and potency factors are the same, the potency factor at the location is divided into the quantity at location in Standard UM and added to the transaction quantity converted to the standard UM. This quantity is converted to the transaction UM and updated into the Quantity at Location in the last received UM.
d. the transaction UM and the standard UM are different and potency factors are different, the transaction quantity is converted into potent units by multiplying the transaction quantity by the potency entered. This quantity is converted to the Standard UM. This quantity is added to the quantity at location in standard UM.

The new potency factor is calculated (see beginning of transaction entry) and divided into the quantity just calculated.Then it is converted to the transaction UM. This now becomes the quantity at location in last received UM.

Note: The descriptions for the updating of the quantity at location in the last received UM may not exactly correspond to the lines of code which calculate the field. However, the result is the same. For the exact steps taken, please refer to the source code.

Quantity at location in the standard UM, and

A. resource is non-potent, and a. the transaction UM and the standard UM are the same, the transaction quantity is added to the quantity at location in standard UM.

b. the transaction UM and the standard UM are the different, the transaction quantity is converted to the standard UM and added to the quantity at location in standard UM.

B. resource is potent, and a. the last received UM and the standard UM are the same, the transaction quantity is multiplied by the potency factor and then added to the quantity at location in standard UM.

b. the last received UM and the standard UM are different, the transaction quantity is converted to the standard UM then multiplied by the potency factor. This quantity is added to the quantity at location in standard UM.

Last Received UM = Transaction UM

Date Last Received = Transaction Date (user)

Time last Received = Transaction Time (user)

Trans # of Last Receipt = Trans #

Estimated Time of Departure is calculated:

a. A CHAIN is done to the CLASCD file to find the number of days expected in that classification;

b. That number of days is added to the transaction date.

Shelf life expiration equals transaction date plus number of shelf life days. If the transaction does not have a shelf life, this date is set to 99/99/99.

FIFO Date

Transaction Date

Potency Factor

If the entered potency is different from the location potency, the new potency factor is calculated by the following formula:

New Potency Factor $$= \frac{PQ(P) + PQ(L)}{\frac{PQ(L)}{PF(L)} + AQ(P)}$$

PQ(P) = Produced Quantity In Potent Units

PQ(L) = Quantity At Location In Potent Units

PF(L) = Potency Factor At Location

AQ(P) = Actual Quantity Produced In Standard UM

- *LOCDTL (New record):*

Location number is from entry screen.

Warehouse is from entry screen.

Resource is from entry screen.

Grade is from entry screen.

Lot number is from entry.
Quantity At Location (std) equals the transaction quantity converted to std UM.
Standard UM is taken from the RESMST.
Resource Class is extracted from RESMST.
Resource Sub-Class is extracted from RESMST.
Quantity In Last received UM equals Transaction Quantity.
Last Received UM equals Transaction UM.
Potency Factor is from entry screen (if blank default from RESMST).
Revision Level is from entry screen.
Classification code is from entry screen.
All Classification bytes—CHAIN to CLASCD.
Quantity Reserved—manufacturing is set to zero.
Quantity Reserved—sales is set to zero.
Last Date received is user-entered transaction date.
Last Time Received is user-entered transaction time.
FIFO date equals transaction date.
Estimated Time of Departure is calculated:

a. A CHAIN is done to the CLASCD file to find the # of days expected in that classification.
b. It is determined if the # of days is defined in calendar days or work days (defined in CLASCD file).
c. That number of days is added to the transaction date.

Picking Override Sequence Number: See rules for updating.
Shelf Life Expiration Date is calculated using shelf life days.
If the transaction does not have a shelf life, this date is set to 99/99/99.

- *LOCMAS (New record):*

Warehouse = entered warehouse #
Location = entered location #
Date Last Maintenance = User-entered transaction date
Picking Override Sequence Number defaults from tailoring.

- *LOTMAS (Existing record):*

Total Lot Quantity Received is increased.
Date Last Received equals transaction date.
If no LOTMAS record exists and this is a receipt, a new record is added.
Lot # = entered Lot #
Resource # = entered Resource #
Schedule = entered
OLSN = entered
Rel # = entered
PM Type is either entered or extracted from RMODEL.
PM Name is either entered or extracted from RMODEL.
First Receipt Date = Transaction Date (user)
Last Receipt Date = Transaction Date (user)
Code = M for manufactured.
Initial Receipt Quantity = Trans Quantity (in standard UM)

Lot Quantity Issued = zero
Lot Quantity Shipped = zero
Lot Quantity Misc Disposed Of = zero
Total Lot Quantity Received = Trans Quantity (in std UM)

- *RESBAL:*

Number of trans since the last cycle count
  Quantity On Hand is increased if the location is classified as On Hand = YES.
  Quantity On Order is increased if the location is classified as On Order = YES.
  Total Quantity Present is increased.
  Date Last Activity = transaction date (user).
  Date Last Effect on On Hand Quantity = Transaction Date (user). Note: Date is ONLY updated if the location was classified as On Hand = YES.
  Production Quantity—TOTAL is increased by Trans Quantity in std UM.

- *RMODEL:*

Number of earned PM batches is increased using the Theoretical Consumption Ratio. (See Theoretical Consumption section.)
  P = Std Adj Quantity divided by Quantity Rel to PM Batch multiplied by Production Distribution Percentage.
  P is added to the Earned PM Batches field in RMODEL.
  All Tasks Are Complete byte is set to Y if the operator selected to complete the task and the task was the last task on the production model.
  Actual PM completion date is NOT updated. This date is updated when the menu Schedule Completion option is taken.

- *RMTASK:*

If completion code is Y, the following updates are done for ALL TASKS on this Schedule/OLSN/Rel # that are prior to the current task.
  Status equals C for complete.
  Actual task completion date = transaction date (user-entered).
  The task completion date is not updated unless the completion date is currently still at zero.

- *RMRESR (Existing record):*

Quantity Produced to Date is increased.

- *RMRESR (New record):*

PM Type = extracted from RMODEL using the entered Schedule/OLSN/Rel.
  PM Name = same as above
  Task Name = the entered task name
  Resource Type = P produced
  Resource # = entered Resource #
  Resource description is extracted from RESMST.
  Quantity Relative To Batch Size equals zero.
  Quantity relative to task batch size equals zero.
  Resource (standard UM) is extracted from RESMST.
  Quantity in non-standard UM = Transaction Quantity
  UM (user-defined) = Transaction UM
  Quantity type code = Q for quantity (versus ratio)
  Resource (ratio) = zero Resource number ratio = Blanks
Production distribution % = zero
Cost distribution % = zero
Resource Class is extracted from RESMST.
Resource Sub-Class is extracted from RESMST.
Documentation Location Code Override is blank.
Reportable resource = Y
Superflushable resource = N
Theoretical Usage code = D (direct issue only).
Consumed/Produced To Warehouse = blank.
Consumed/Produced To Location = blank.
Locn Classification Code = blanks.
Use net realizable value defaults to RESMST.
Grade Level Upper Limit = blanks
Grade Level Lower Limit = blanks
Batch consumption = RESMST
Setup Quantity = zero.
Clean Up Quantity = zero
Dependent Operation Name = blanks
Dependent Operation byte = blanks
Dependent Resource byte = blanks
Stream resource = blanks
Prime PM Type override = blank
Prime PM Name override = blank
Print on document (only used if the quantity is zero) = Y.
Date entered = transaction date (user)
Substitute resource byte = N

- *TRHIST:*

Transaction quantity in standard UM
Resource Class
Resource Sub-Class
Received from On Order byte THTRON:
If location attribute On Order = N and production is positive, field is "+". If production is negative, field is "-".
Not on Order byte THTENQ is left blank.
Location On Hand byte THTROH:
If location on hand attribute is Y and if production is positive, TRTROH is "+". If production is negative, field is "-".

Effect on Inventory $ byte THEFIN:
Positive Prod: If the To location is inventory $ = Y, byte is set to "+".
Negative Prod: If the To Location is inventory $ = Y, byte is set to "-".

Effect on Non-plan quantity byte THEFPQ:
Positive Prod: If the To Location is Available for Planning = 0, THEFPQ is set to "+".
Negative Prod: If the To Location is Available for planning = 0, this byte is set to "-".

- *TRCTRL:*

The following fields are updated even if this is NOT online updating. This is in addition to the list at the beginning of the transaction summary section.

Number Totals for Production Receipt Transactions
Total Number of Transactions entered Entry Fields:

Schedule
OLSN
Schedule Release Number
PM Type
PM Name
Resource
Quantity
Task
Warehouse
Location
Classification
Lot Number
Picking Override Sequence
Grade
Revision Level
Potency Factor
Transaction Amount
Complete Task Byte
Update Online Byte
Update System Transaction Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Lot Number (If the resource is defined as having lot tracking active, the classification requires lot tracking and a LOCDTL record exists.)
Quantity
Complete Task Byte
Update Online Byte
Update System Transaction Byte
Suspend Byte
Verify Byte
Duplicate Byte Defaults:

If the system is tailored for single warehouse support, the warehouse defaults to tailoring.

If the warehouse is blank, it defaults to RMRESR for the produced to warehouse.

If the warehouse in RMRESR is blank, it defaults to RESMST.

If the location is blank, the default from RMRESR for the Produced to Location is used.
If the location in RMRESR is blank, it defaults to RESMST.
If the OLSN is blank, it defaults to 1 if PM Type and PM Name are not entered.
Release Number defaults to 1.
To Classification defaults to the LOCDTL record if one exists.
If there is no LOCDTL record, then the To Classification defaults to RMRESR.
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:
Schedule
Resource
Lot Number (If the resource is defined as having lot tracking active, the classification requires lot tracking and a LOCDTL record exists.)
Quantity
Complete Task Byte
Update Online Byte
Update System Transaction Byte
Suspend Byte
Verify Byte
Duplicate Byte Defaults:
If the system is tailored for single warehouse support, the warehouse defaults to tailoring.
If the warehouse is blank, it defaults to RMRESR for the produced to warehouse.
If the warehouse in RMRESR is blank, it defaults to RESMST.
If the location is blank, the default from RMRESR for the Produced to Location is used.
If the location in RMRESR is blank, it defaults to RESMST.
If the OLSN is blank, it defaults to 1 if PM Type and PM Name are not entered.
Release Number defaults to 1.
To Classification defaults to the LOCDTL record if one exists.
If there is no LOCDTL record, then the To Classification defaults to RMRESR.

If RMRESR is blank, the To Classification defaults to RESMST.

If only one task is consuming this resource, the task defaults to RMRESR.

The PM Type and PM Name default to RMODEL

If there is an existing LOCDTL record, the grade defaults to the grade at that location. This is true for both consumed and produced resources.

If the revision level is blank, it defaults to the current revision level.

If the potency factor is blank, but the resource is potent and a record exists in LOCDT, the default is LOCDTL.

If there is no existing LOCDTL record and the resource is a potent resource (check RESMST), the potency factor defaults from RESMST.

The Picking Override Sequence defaults to tailoring if it is inactive.

If the UM is not entered, the default is user UM.

The Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's Initials default to the Session Status Screen.

Edits:

Transaction Type is checked to make sure the user is authorized.

Schedule/OLSN/Release Number must exist in RMODEL.

Schedule/OLSN/Release Number must not be Complete or Closed.

If the PM Type is entered, PM Name is required.

If the PM Name is entered, PM Type is required.

If the PM Type and PM Name is entered, there must be a schedule in RMODEL (with the correct status).

The resource must exist in RESMST.

Resource/Warehouse must exist in RESBAL.

The resource must exist in RMRESR for the Schedule/OLSN/Release/Resource.

The quantity cannot be zero unless the user selects to complete the Schedule/Release.

If a task is entered it must exist in RMRESR for this Schedule/OLSN/Release/Resource.

Task cannot have a status of Complete or Closed.

Task must produce the resource entered.

Task must be defined in RMTASK for this Schedule/OLSN/Release Number.

If tailoring requires, the location must have a LOCMAS record.

If a grade is entered, the program checks for an existing LOCDTL record with a different grade.

The entered resource must have a revision level equal to or greater than the earliest acceptable revision level in RESMST.

The lot number is required if the resource has lot tracking active and if the From Classification Code specifies that lot tracking is active.

If the lot number is entered, the lot number in LOCDTL must be the same.

If there is an existing LOCDTL, a warning is sent if the record is receiving a new potency.

If a potent resource is entered, it is being received to a new location, and the default potency in RESMST is zero, the potency factor must be entered.

Classification Code must be active.

Classification Code must exist in CLASCD.

Update Online byte must be Y or N.

If the unit of measure is entered, it must be convertible to the standard unit of measure Transaction Detail Code must be valid.

Period cannot be closed.

Date must be valid.

The time must be valid.

Suspend byte must be Y or N.

Verify byte must be Y or N.

Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

On Going Production Transaction—MIE44206

An ON transaction indicates that a stream resource has been produced, thus showing that part of a task has been completed. Unlike the PR Transaction, it does not result in a change to the inventory. An On Going Production Transaction allows the stream resource to move from one task to the next.

When an on going production transaction is entered, Theoretical Consumption transactions (TC, CC, and TP transactions) are generated. See the description of theoretical consumption.

The resource is not an entry field and the stream resource is always blank. This record has the Schedule/OLSN/Rel/Task #/Blank Resource # and a Resource Type of P for produced.

When a schedule or task is completed, allocations and reservations are deleted. This transaction allows the operator to set the status to complete, but no reservations or allocations are deleted online. A separate menu option must be taken to back out those allocations and reservations for the completed Schedule/OLSN/Rel/Tasks.

The operator can select to set the task status to complete. If this option is taken, the quantity field can be left blank. If the operator selects to Complete The Task, that task as well as all prior tasks are set to a status of Complete.

Updates

Reminder: This section only contains updates for those files and fields that require a detailed explanation. For the remainder of the updates, please see the *Summary of Transaction Updates* table.

• *RMRESR:*

The stream resource of a task has two RMRESR records. One record for the task that is producing the stream resource. The second RMRESR record is for the task that is consuming the resource from the next task. The consumed stream resource record is updated when production is reported for this task (or the next reportable task).

The PRODUCED stream resource record: Quantity Produced to Date is increased by the transaction quantity (standard UM).

• *RMTASK:*

If the Task Completion Code = Y: Actual Completion Date = Transaction Date (user- entered)

Task Status = C for complete.

• *TRHIST:*

All entry fields, Transaction Quantity in standard UM, Resource Class, and Resource Sub-Class are updated.

THTRON, THTENQ, THTROH, THEFIN, THEFPQ are blank.

• *TRCTRL*

The following fields are updated even if this is NOT online updating. This is in addition to the list at the beginning of the transaction summary section.

Number totals for production receipt transactions
Total number of transactions entered Display-Only Fields:

Resource

Entry Fields:

Schedule
OLSN
Schedule Release Number
PM Type
PM Name
Quantity
Task
Complete Task Byte
Update Online Byte
Update System Transaction Byte
Unit of Measure
Detail Code
Year
Period
Date
Time
Shift Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Quantity (see edits)
Task
Complete Task Byte
Update Online Byte
Update System Transaction Byte
Suspend Byte
Verify Byte
Duplicate Byte Defaults:

If the OLSN is blank, it defaults to 1 if PM Type and PM Name were not entered.
The Release Number defaults to 1.
The PM Type and PM Name default to RMODEL
If the UM is not entered, the default is the user UM.
The Account Group Number defaults to TRDTCD then to tailoring.
The year defaults to the current year in tailoring.
The period defaults to the current period in tailoring.
The date defaults to the system date.
The time defaults to the system time.
Complete Tasks byte defaults to N.
Update Online byte defaults to tailoring.
Update System Transactions byte defaults to tailoring.
The Shift Number defaults to the Session Status Screen.
The Operator's Initials default to the Session Status Screen.

Edits:

Transaction Type is checked to make sure the user is authorized.
Schedule/OLSN/Release Number must exist in RMODEL.
Schedule/OLSN/Release Number must not be Completed or Closed.
If the PM Type is entered, PM Name is required.
If the PM Name is entered, PM Type is required.
If the PM Type and PM Name are entered, then there must be a schedule in RMODEL (with the correct status).
The Quantity cannot be zero unless the Complete Tasks byte equals Y.
If a Task is entered, it must exist in RMRESR for this Schedule/OLSN/Release/Resource.
Task cannot have a status of Complete or Closed.
Task must be reportable.
Update Online byte must be Y or N If the unit of measure is entered, it must be convertible to the standard unit of measure
Transaction Detail Code must be valid.
Period cannot be closed.
Date must be valid.
Time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK05 | Comments |
| CK08 | Detail Codes |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Return To Production—MIE44207

An RT Transaction is performed when a resource has been produced from a schedule but needs to be returned to the schedule for reprocessing. It decreases the production record for the schedule for reprocessing. It does not undo resource consumption since it is assumed that the reprocessing causes additional consumption of a resource.

This transaction does not perform any TC, TP, or CC transactions.

Updates

Reminder: This section only contains updates for those files and fields that require a detailed explanation. For the remainder of the updates, please see the *Summary of Transaction Updates* table.

Before performing any updates, the transaction quantity must be converted to standard UM. All file quantities are in standard UM unless otherwise specified.

• *LOCDTL:*

Quantity At Location in the last received UM, and

A. resource is non-potent, and
  a. the transaction UM and the standard UM are the same, the transaction quantity is subtracted from the quantity at location in standard UM. This becomes the quantity at location in the last received UM.
  b. the transaction UM and the standard UM are different, the transaction quantity is converted to the standard UM, then subtracted from the quantity at location in std UM. The result is converted to the transaction UM. This quantity is the quantity at location in the last received UM.

B. resource is potent, and
  a. the last received UM and the standard UM are the same, the Potency Factor at the Location is divided into the quantity at location in Standard UM. Then transaction quantity is subtracted. This quantity is updated as the Quantity at the Location in the last received UM.

b. the last received UM and the standard UM are the different, the Potency Factor at the Location is divided into the quantity at location in standard UM. Then the transaction quantity converted to the standard UM is subtracted. This quantity is updated as the quantity at location in the last received UM.

Quantity At Location in the standard UM, and

A. resource is non-potent, and a. the transaction UM and the standard UM are the same, the transaction quantity is subtracted from the quantity at location in standard UM.

b. the transaction UM and the standard UM are the different, the transaction quantity is converted to the standard UM; the result is subtracted from the quantity at location in standard UM.

B. resource is potent, and a. the last received UM and the standard UM are the same, the transaction qty is multiplied by the potency factor then subtracted from the quantity at location in standard UM.

b. the last received UM and the standard UM are the different, the transaction quantity is converted to the standard UM then multiplied by the potency factor. The result is subtracted from the quantity at location in standard UM.

- *LOCMAS:*
  - Warehouse = entered warehouse
  - Location = entered location
- *LOTMAS:*
  - Lot Quantity Received = reduced using transaction quantity in Std UM.
- *RESBAL:*
  - Number of transaction since the last cycle count is updated.
  - Total quantity present is reduced using transaction quantity in Std UM.
  - Quantity On Hand: If the Location is classified as On Hand = Yes, reduced by Transaction Quantity (std UM).
  - Quantity On Order: If the Location is classified as On Order = Yes, reduced by Transaction Quantity (std UM) (actual quantity produced—total ).
  - Date Last Activity = Transaction Date (user-entered)
  - Date Last Effect On On Hand Quantity: If Location was classified as On Hand = Yes, this field is updated with the system date.
- *RMRESR:*
  - Quantity Produced To Date is reduced.
- *TRHIST:*
  - Updated:
  - Transaction Quantity in standard UM
  - Transaction Quantity in user UM
  - Resource Class
  - Resource Sub-Class THTRON: If location attribute is On Hand = Y, this byte is set to "-".

THEFIN: Effect on inventory $—if the location is inventory $ = Y, the byte is set to "-".

THEFPQ, LDAVPL:

0 = unavailable
1 = available after ETD
2 = available

Effect on non-Plan quantity = (+, -, or blank): If Avail for Planning = 0, this byte is set to "-".

THTRON = Received from On Order byte is left blank.

THTENQ (Effect on Not On Order byte): If the Received From On Order byte is blank AND if the from Classification Code is not On Order AND if the transaction decreases the Total Quantity Present this byte is set to "-".

- *TRCTRL:*

The following field is updated even if this is NOT online updating. This is in addition to the list at the beginning of the transaction summary section.

Number totals for production receipt transactions

Entry Fields:

Schedule
OLSN
Schedule Release Number
PM Type
PM Name
Resource
Quantity
Task
Warehouse
Location
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

- Schedule
- Resource
- Task (see edits)
- Quantity
- Update Online Byte
- Suspend Byte
- Verify Byte
- Duplicate Byte Defaults:

- If the system is tailored for single warehouse support, the warehouse defaults to tailoring.
- If the OLSN is blank, it defaults to 1 if PM Type and PM Name were not entered.
- The Release Number defaults to 1.
- If only one task is producing this resource, the task defaults to RMRESR.
- The PM Type and PM Name default to RMODEL.
- If the UM is not entered, it defaults to the last received UM in LOCDTL.
- The Account Group Number defaults to TRDTCD then to tailoring.
- Year defaults to the current year in tailoring.
- Period defaults to the current period in tailoring.
- Date defaults to the system date.
- Time defaults to the system time.
- Update Online byte defaults to tailoring.
- Shift Number defaults to the Session Status Screen.
- Operator's Initials default to the Session Status Screen.

Edits:

- Transaction Type is checked to make sure the user is authorized.
- Schedule/OLSN/Release Number must exist in RMODEL.
- Schedule/OLSN/Release Number must not be Complete or Closed.
- If the PM Type is entered, PM Name is required.
- If the PM Name is entered, PM Type is required.
- If the PM Type and PM Name are entered then there must be a schedule in RMODEL (with the correct status).
- The resource must exist in RESMST.
- The Resource/Warehouse must exist in RESBAL.
- The resource must be a balance resource.
- The resource must exist in RMRESR for the Schedule/OLSN/Release/Resource.
- The quantity cannot be zero.
- The quantity cannot be negative.
- The quantity cannot be greater than what is available at the location. This means that the transaction quantity must be less than or equal to: Quantity At Locn (std) minus Reserved Quantity To Sales.
- If a task is entered it must exist in RMRESR for this Schedule/OLSN/Release/Resource.
- The task cannot have a status of Complete or Closed.
- The task is required if more than one task is producing the entered resource.
- The task must be defined in RMTASK for this Schedule/OLSN/Release Number.

The Resource/Warehouse/Location must exist in LOCDTL.

The Update Online byte must be Y or N.

If the unit of measure is entered, it must be convertible to the standard unit of measure Transaction Detail Code must be valid.

Period cannot be closed.

The Date must be valid.

The Time must be valid.

Suspend byte must be Y or N.

Verify byte must be Y or N.

Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

4.235

Return To Stock—MIE44208

An RS transaction is the opposite of a Direct Issue (DI) Transaction. It indicates that a consumed resource issued to a schedule was not used and is being returned to inventory. The tailoring questions used by an RS transaction are T27, T31, and T35.

Updates

Reminder: This section only contains updates for those files and fields that require a detailed explanation. For the remainder of the updates, please see the *Summary of Transaction Updates* table.

• *LOCDTL (Existing record):*

Quantity at location in the last received UM, and

A. resource is non-potent, and a. the transaction UM and the standard UM are the same, the transaction quantity is subtracted from the quantity at location in standard UM. This becomes the quantity at location in the last received UM.

b. the transaction UM and the standard UM are different, the transaction quantity is converted to the standard UM. The result is subtracted from the quantity at location in standard UM then converted to the transaction UM. This result is the quantity at location in the last received UM.

B. resource is potent, and a. the transaction UM and the standard UM are the same and potency factors are the same, the program divides the Potency Factor at the Location into the quantity at location in Standard UM. Then it subtracts the transaction quantity from this quantity. This quantity is updated as the quantity at location in the last received UM.

b. the transaction UM and the standard UM are the same and potency factors are different, the program converts the transaction quantity into potent units by multiplying the transaction quantity by the potency entered. This quantity is added to the quantity at location in standard UM.

The new potency factor is calculated (see *beginning* of transaction entry). The new potency factor is divided into the quantity just calculated. This now becomes the quantity at location in last received UM.

c. the transaction UM and the standard UM are different and potency factors are the same, the program divides the Potency Factor at the Location into the quantity at location in standard UM; Then, the transaction quantity converted to the standard UM is subtracted. This result is converted to the transaction UM. This quantity is updated as the quantity at location in the Last Received UM.

d. the transaction UM and the standard UM are different and potency factors are different, the transaction quantity is converted into potent units by multiplying the transaction quantity by the potency entered. This quantity is converted to the Standard UM. The result is added to the quantity at location in standard UM.

The new potency factor is calculated (see beginning of transaction entry) and divided into the quantity just calculated and converted to the transaction UM. This now becomes the quantity at location in last received UM.

Note: The descriptions for the updating of the quantity at location in the Last Received UM may not exactly correspond to the lines of code which calculate the field. However, the result is the same. For the exact steps taken, please refer to the source code.

Quantity At Location in the standard UM:

A. resource is non-potent, and a. the transaction UM and the standard UM are the same, the transaction quantity is subtracted from the quantity at location in standard UM.

b. the transaction UM and the standard UM are the different, the transaction quantity is converted to the standard UM. That quantity is subtracted from the quantity at location in standard UM.

B. resource is potent, and a. the last received UM and the standard UM are the same, the transaction quantity is multiplied by the entered potency factor. That quantity is subtracted from the quantity at location in standard UM.

b. the last received UM and the standard UM are the different, the transaction quantity is converted to the standard UM then multiplied by the entered potency factor. This quantity is subtracted from the quantity at location in standard UM.

*Additional Updates:*

New potency at the location is saved and updated to the LOCDTL record.

Total Quantity in standard UM is updated.

Last Received UM is updated.

Potency Factor—see beginning of transaction entry.

Last Date Received

Last Time Received

ETD—Estimated Time of Departure = Transaction Date plus ETD days.
Shelf Life Expiration Date = Transaction Date plus Shelf Life Days
FIFO Date
Transaction Date

- *LOCDTL (New record):*

Location # = To Location # from entry screen
Warehouse = To Warehouse from entry screen
Resource = Resource # from entry screen
Grade is from entry screen.
Lot # is from entry screen.
Quantity At Location (Std) = Transaction Quantity converted to Std UM.
Standard UM is taken from the RESMST record.
Resource Class is from RESMST.
Resource Sub-Class is from RESMST.
Quantity in last received UM is Transaction Quantity.
Last Received UM equals transaction UM.
Potency Factor is from entry screen.
Revision Level is from entry screen.
Classification code is from entry screen.
All classification bytes: The classification bytes are found by CHAINING to the CLASCD file using the entered classification code.
Quantity reserved—manufacturing is set to zero.
Quantity reserved—sales is set to zero.
Last Date Received = User-entered Transaction Date
Last Time Received = User-entered Transaction Time
ETD = calculated using # of days defined in CLASCD the number of days can be expressed in either calendar days or work days. (CLASCD)
Picking Override Sequence # = defaults to LOCMAS then to tailoring.
Shelf Life Expiration Date = transaction date plus number of shelf life days .
FIFO Date = transaction date (user-entered)

- *LOCMAS:*

If the LOCMAS record does not exist for the To location, and if the system is tailored Not To Require LOCMAS records, a record is added to the LOCMAS file. If the system is tailored for requiring a LOCMAS record, a hard halt message is sent.

Warehouse = entered warehouse
Location = entered location

- *LOTMAS (Existing record):*

Last Receipt date is updated.
Lot Quantity Issued is decreased.

*LOTMAS (New record):*

Lot # = Lot # from entry screen
Resource # = Resource # from the entry screen
Schedule/PO = Blanks
OLSN = Zeros
Release= Zeros
PM Type = Blanks
PM Name = Blanks Reference # = Blanks (This does not equal the entry field called reference number. This is the reference number tied to a schedule.)

First Receipt Date = User-entered Transaction Date

First Receipt Time = User-entered Transaction Time

Initial Receipt Quantity = Transaction Quantity in Std UM

Code (Purchased Or Manufactured) = Blanks

Vendor # = Blanks

Vendor Name = Blanks

Lot Quantity Issued—decreased using the Transaction Quantity. The Issued Quantity is a negative quantity.

Lot Quantity Shipped = Zero

Lot Quantity Misc Disposed Of = Zero

Total Lot Quantity Received = Zero

- *RESBAL*

Number of transactions since the last cycle count

Total quantity present increased using trans quantity in standard UM.

Quantity On Hand—If the To Locn is classified as On Hand = Yes. Quantity On Hand is increased using Trans Quantity in standard UM.

Quantity On Order— If the To Locn is classified as On Order = Yes, Quantity On Order is increased.

Date Last Activity = Transaction Date (user)

Date Last Effect On On Hand Quantity—If To Locn is classified as On Hand = Yes, this field is set to the system date.

- *RMRESR:*

Quantity Issued is reduced.

- *TRHIST:*

All entered fields plus the following:

THTROH: If location attribute On Hand = Y, THTROH is updated with a "+".

THEFIN:

Transaction Quantity in Standard UM

Effect on Inventory $ = (+, −, or blank): If the To location is Inventory $ = YES, byte is set to "+".

THEFPQ, LDAVPL:

0 = unavailable

1 = available after ETD

2 = available

If location is unavailable for planning and quantity increases, this field is updated with a "+".

If location is unavailable for planning and quantity decreases, this field is updated with a "−".

The THEFPQ field updates by transaction type:

Effect on non-Plan quantity = blanks

If the To Location is Avail for planning = 2, this byte is set to "+".

THTENQ, THTRON:

Received From On Order byte is left blank.

Effect on Not On Order byte: If the Received From On Order byte is blank AND if the from classification code is Not On Order AND if the transaction increases the total quantity present this byte is set to "+".

• *TRCTRL:*

The following field is updated even if this is NOT online updating. This is in addition to the list at the beginning of the transaction summary section.

Number totals for ISSUE transactions

Display-Only Fields:

Resource Type

Entry Fields:

Schedule
OLSN
Schedule Release Number
PM Type
PM Name
Resource
Quantity
Task
Warehouse
Location
Classification
Lot Number
Picking Override Sequence
Grade
Revision Level
Potency Factor
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Location
Warehouse
Task (see edits)
Lot Number (If the resource is defined as having lot tracking active, the classification requires lot tracking and a LOCDTL record exists.)
Quantity
Update Online Byte
Suspend Byte
Verify Byte
Duplicate Byte Defaults:

If the system is tailored for single warehouse support, the warehouse defaults to tailoring.

If the OLSN is blank, it defaults to 1 if PM Type and PM Name were not entered.

The release number defaults to 1.

The To Classification defaults to the LOCDTL record if one exists.

If only one task is producing this resource, the task defaults to RMRESR.

The PM Type and PM Name default to RMODEL.

If there is an existing LOCDTL record the grade defaults to the grade at that location.

If the potency factor is blank, the resource is potent and a record exists in LOCDTL, the default is LOCDTL.

If there is an existing LOCDTL record, the revision level defaults to the revision level at that location.

If there is an existing LOCDTL record, the lot number defaults to the lot number at that location.

If the UM is not entered, it defaults to the last received UM in LOCDTL.

Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's Initials default to the Session Status Screen.

If the Picking Override Sequence Number is Active, defaulting is:

If the To location is a new location:

1. screen entry, if not equal to zero;
2. Location Master, if not equal to zero;
3. the From Location value, if one exists;
4. Tailoring.

If the To location already exists:

1. screen entry, if not equal to zero;
2. unchanged at the existing location.

If the Picking Override Sequence Number is inactive, the default is tailoring.

Edits:

Transaction Type is checked to make sure the user is authorized.

Schedule/OLSN/Release Number must exist in RMODEL.

Schedule/OLSN/Release Number must not be Complete or Closed.

If the PM Type is entered, PM Name is required.

If the PM Name is entered, PM Type is required.

If the PM Type and PM Name are entered, there must be a schedule in RMODEL (with the correct status).

The resource must exist in RESMST.

The resource must be a balance resource.

The Resource/Warehouse must exist in RESBAL.

The resource must exist in RMRESR for the Schedule/OLSN/Release/Resource.

The quantity cannot be zero.
The quantity cannot be negative.
If a task is entered, it must exist in RMRESR for this Schedule/OLSN/Release/Resource.
The task must be defined in RMTASK for this Schedule/OLSN/Release Number.
If Tailoring requires, the location must have a LOCMAS record.
If a grade is entered, an edit is done to see if a LOCDTL record exists with a different grade.
An edit is done to see if the revision level is the same as the one LOCDTL (provided a LOCDTL record exists).
The lot number is required if the resource has lot tracking active and if the from classification code specifies that lot tracking is active.
If lot number is entered and the lot number in LOCDTL must be the same.
An edit is done to see if the entered potency is different from the potency at the location.
Classification Code must be entered if there is not a LOCDTL record.
Classification Code must be active.
Classification Code must exist in CLASCD.
Update Online byte must be Y or N.
If the unit of measure is entered, it must be convertible to the standard unit of measure
Transaction Detail Code must be valid.
Period cannot be closed.
The date must be valid.
The time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

• *Processing Steps for Theoretical Consumption:*

A. The number of batches run is calculated.
B. The theoretical ratio is calculated.
C. The first/next theoretically consumed or calculated cost resource for this Schedule/OLSN/Release is found.

When reading the RMRESR records for the task, the stream resource record (the resource of the RMRESR record equals blanks) is also processed. When the stream resource record is read, the reportable/non-reportable byte is checked. If the stream resource is non-reportable, two transactions are generated for that resource. The transactions that are generated are:

a. one (1) theoretical consumption (TC);
b. one (1) theoretical production (TP).

Each system-generated transaction has a new transaction number. Each time a transaction is generated the transaction number is incremented by one.

Each system-generated transaction has a tailoring default value for:

a. Transaction Detail Code;
b. Accounting Group Number.

Each system-generated transaction uses the Schedule/OLSN/Release that was entered on the original transaction. The original transaction was either a PR transaction, an ON transaction, or an SC transaction. The exception to this rule are transactions generated from superflush which have a different OLSN. (See the *Superflushing* section below.)

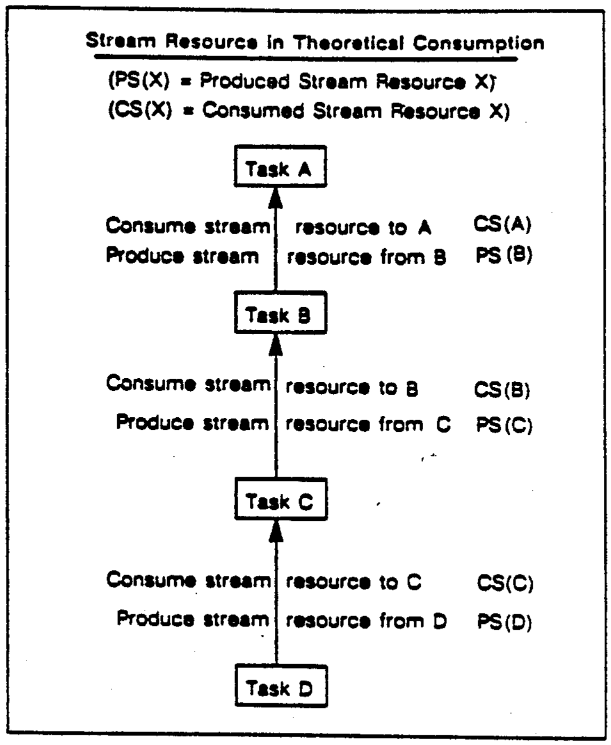

Example:

1. If a transaction is reported out of Task A and PS(B) is reportable, then:
   All TCs and CCs out of Task A are generated.
   TP for any non-reportable prod resource on Task A is generated.
   TC for CS(A) is generated.
2. If a transaction is reported out of Task A, PS(B) is non-reportable and PS(C) is reportable, then:
   All TCs and CCs out of Task A are generated.
   TP for any non-reportable produced resource on Task A is generated.
   TC for CS(A) is generated.
   TP for PS(B) is generated.
   All TCs and CCs out of Task B are generated.
   TP for any non-reportable produced on Task B is generated.
   TC for CS(B) is generated.
3. If an ON transaction is reported out of Task B, PS(B) is reportable and PS(C) out of Task C is reportable, then:
   All TCs and CCs out of Task B are generated.
   TP for any non-reportable produced resource on Task B is generated.
   TC for CS(B) is generated.
4. If a PR transaction is reported out of Task B, PS(B) is reportable and PS(C) out of Task C is reportable, then:
   All TCs and CCs out of Task B are generated.
   TP for any non-reportable produced resource on Task B is generated.
   TP for PS(B) is generated.
   TC for CS(B) is generated.
5. If a PR transaction is reported out of Task B, PS(B) is non-reportable and PS(C) out of Task C is reportable, then:
   All TCs and CCs out of Task B are generated.
   TP for any non-reportable produced resource on Task B is generated.
   TC for CS(B) is generated.

D. The quantity theoretically consumed for this resource is calculated. If the resource is a non-balance resource, locations are not checked and superflushing is not performed. These type of resources do not exist in locations. If the resource is a non-balance resource, then only RESBAL, RMRESR, and TRHIST are updated.

E. The location for consumption is found.

F. UPDATE1—Consumed resource updates are done:
   a. A TC or CC transaction is written to TRHIST.
   b. RESBAL, LOCDTL, RMRESR, and possibly RESRES, and LOTMAS are updated.
   c. If the Task Status is launched, the status is updated to Running (RMTASK).

- *Superflush:*
  1. The theoretical consumption ratio for the current task is saved. The theorectical consumption ratio for this PM is calculated.

2. S1—The first/next theoretically consumed or calculated cost resource for this Schedule/OLSN/Release is found.
3. S2—The Quantity Theoretically Consumed for this resource is calculated.
4. The location for consumption is found.
5. UPDATE1—Consumed resource updates are done:
   a. A TC or CC transaction is written to TRHIST.
   b. RESBAL, LOCDTL, RMRESR, and possibly RESRES, and LOTMAS are updated.
   c. If the Task Status is launched, the status is updated to Running (RMTASK).
6. If the transaction is a production receipt or scrap transaction of a produced resource, the following steps are executed in order to theoretically produce the non-reportable resource of this PM, if one exists.

*Producing A Non-Reportable Produced Resource:*

1. The task is evaluated to determine if it is a nonreportable produced resource on this Schedule/OLSN/Rel/Task.
2. The quantity theoretically produced for this resource is calculated.
3. The location to default production is found.
4. UPDATE2—Updates for the theoretically produced resource are done:
   a. A TP transaction is written to TRHIST.
   b. RESBAL, LOCDTL, RMRESR, and LOTMAS are updated.
   c. If the task status is launched, the status is updated to Running (RMTASK).

The following pages provide a detailed example of superflushing.

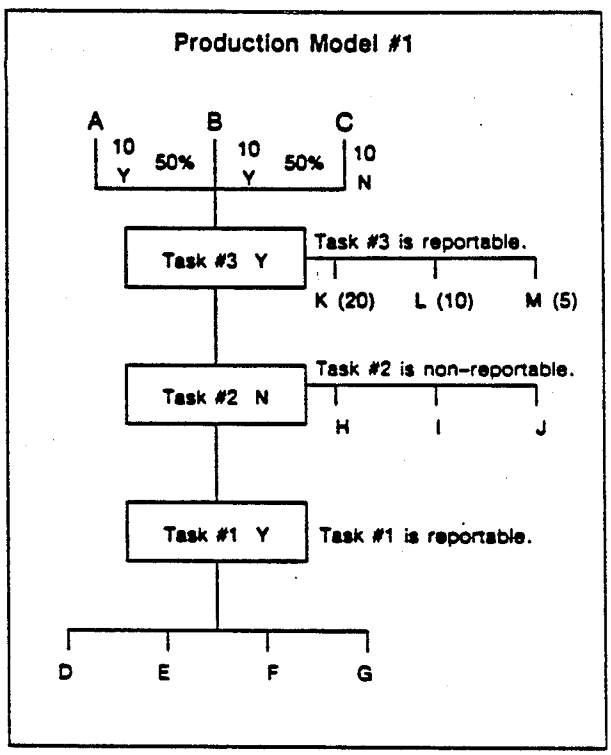

In the above production model:

A = a reportable produced resource

A = 50% of the reportable produced resource distribution

A = expected produced quantity of 10 per PM batch

See the next page for Production Model #2. It is used if K needs to be superflushed.

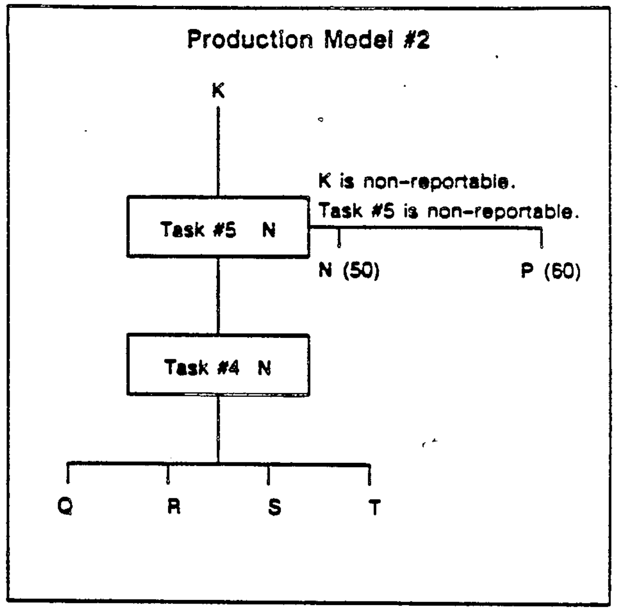

In the above production model (PM #2),

K = is a produced resource from the last task

K = is a non-reportable resource

K = is the only produced resource

Transaction:

Type = PR
Resource = A
Qty = 10

*Processing:*

A. The Number Of Batches used is calculated:

a. Qty Produced = Production Receipt Qty (converted to standard UM).

b. Qty Per Standard Batch Size comes from the RMRESR file for this produced resource (the resource received on this PR transaction).

Number of batches = Qty Produced divided by Qty per Standard Batch size (both quantities must be in stc UM):

= 10 / 10
= 1

The above step is only done ONCE.

B. The theoretical consumption ratio is calculated.

1. This ratio is calculated for each task. This ratio is used for ALL theoretically consumed/produced resources on that task. It is very important to note that the theoretically produced resources from a task use the same ratio as the theoretically consumed resource for that task.

a. The theoretical consumption ratio of the LAST task on a schedule is calculated as follows:

The number of batches used is multiplied by the % of total reportable resources. The percentage is defined in RMRESR for the resource being received.

The percentage of total reportable resources is stored in the file in decimal format. This is the format used in the following calculation. It is not converted to percentage format.

Example:

# of batches = 1
% of total reportable resources = 50% (i.e., .5)
(1) x (.5) = (.5)
The theoretical consumption ratio = .50.

b. The theoretical consumption ratio of any task on a schedule EXCEPT the last task is calculated as follows:

The theoretical consumption ratio that was calculated for the previous task is multiplied by the production distribution percentage of the stream resource of this task.

The % of total reportable resources is stored in the file in decimal format. It is not converted to percentage format.

The above step is done ONCE for each task. The following steps are done for EACH theoretically consumed resource on this PM.

2. The next theoretically consumed resource for this Schedule/OLSN/Rel/Task is found.

The RMTASKSQ file is read, starting with the task that initiated theoretical consumption. All resources on the task are then checked. The stream resource is checked to determine if it is reportable. If the stream resource is reportable, theoretical consumption stops.

If the stream resource is non-reportable, theoretical consumption continues. If theoretical consumption continues, the theoretical consumption ratio is calculated for this task. (See above for calculations.)

C. Lower limits are set to RMRESR using the Schedule/OLSN/Rel/Task. RMRESR file is read. The resource must be:

a. consumed resource for this Schedule/OLSN/Release/Task, or
b. a theoretically consumed resource, or
c. a calculated cost resource.

If no more RMRESR records exist for this Schedule/OLSN/Release/Task, the subroutine ends for the current task.

D. The Quantity Theoretically Consumed for this resource is calculated.

The Quantity Consumed per PM Batch is multiplied by the theoretical consumption ratio to determine the Quantity Consumed for this resource.

The Quantity Consumed per Batch is found in the RMRESR file for each theoretically consumed resource. The field in the file is called Quantity Relative to PM Batch Size.

If the resource is a calculated cost resource, the RMRESR file is updated. The next RMRESR record is read from C. Quantity Issued is updated in RMRESR by adding the Quantity to Consume For This Resource to Quantity Issued. The Allocated Quantity in RESBAL or RMRESR is not updated. Those quantities are never updated by a transaction.

The following steps apply ONLY to theoretically consumed resources, NOT calculated cost resources.

E. The locations for consumption are found.
   1. The locations defined by the reservation records for this Resource/Schedule/OLSN/Release/Task are checked.

LOOP1—TAG

A reservation record for this Schedule/OLSN/Release/Task/Resource is read. Note: The Task Number and Resource Number are not from the production receipt transaction. They are the Resource Number and Task Number found in Step C.

If the CHAIN was successful, the Reduced From Reserved Quantity is compared to the Quantity Reserved. If the Quantity Reserved is greater, the Reduced From Reserved Quantity is subtracted from the Quantity Reserved. The difference equals the Quantity Being Consumed at this location.

To perform this calculation, a CHAIN is done to the Location Detail record for this reservation. Regardless of what the quantity is available at this location is, if there is a location detail record, the following fields are reduced by the Quantity Being Consumed from this location:

Quantity At Location (std UM)
Quantity At Location (last UM)
Quantity Reserved To Manufacturing The Quantity At Location is allowed to become negative, but the Reserved Quantity is not. If the Reserved Quantity is negative, the field is set to zero. To update the Quantity At Location (last received UM), the Total Quantity At Location after transaction in standard UM is converted to the last received UM (defined in the LOCDTL record). This Quantity is then updated to the Quantity At Location (last received UM).

If a reservation record is found and the Reduced From Reserved Quantity is less than the Quantity Reserved, but no LOCDTL record exists for that location, a LOCDTL record is added. This record has a negative Quantity At Location and the Reserved Quantity is equal to zero.

The default classification code for this LOCDTL record comes from Tailoring. Before a LOCDTL record is added, the default Classification Code is used to CHAIN to the CLASCD file. If the Classification Code exists in CLASCD, the classification attributes are used to load the new LOCDTL record. If not, the resource CANNOT be theoretically consumed.

*LOCDTL (new record updates):*

Location # = To Location # from reservation record
Warehouse = To Warehouse from reservation record
Resource = From Reservation record
Grade = blank
Lot # = blank
Quantity at Location (standard) = Quantity Being Consumed From This Location (always negative when writing a new record).
Standard UM = RESMST
Resource Class = extract from RESMST
Resource Sub-Class = extract from RESMST
Quantity in Last Received UM = zero
Last Received UM = blank
Potency Factor = defaults to RESMST
Potent Units = calculated
Revision Level = defaults to Current Revision Level (RESMST)
Classification Code = defaults to Tailoring (must be valid).
All classification bytes = extracted from the CLASCD file using the default class code.
Quantity Reserved—Manufacturing = zero.
Quantity Reserved—Sales = zero
Last Date Received = system date
Last Rime Received = system time
ETD = zero
Net Activity field = zero
Shelf Life Expiration date = zero
FIFO Date = zero
Total Quantity to be Consumed for this resource is reduced by the Quantity Consumed from that Location.

UPDATE1 is executed. (See UPDATES for consumed resource below.) Then the following steps are performed.

1. If the Total Quantity to be Consumed for this resource is greater than zero, LOOP1 (see above) is performed. The LOOP stops as soon as the Total Quantity to be Consumed for this resource has been consumed OR if no more reservation records for this Schedule/OLSN/Rel/Task/Resource exist.

After all the reservations for this Schedule/OLSN/Release/Task/Resource have been read, if the Total Quantity to be Consumed for this Resource is consumed, the program goes to Step C to read the next RMRESR record. If the Total Quantity could not be consumed, the program continues with Step #2. Step #2 is only done if there are no reservations for the Schedule/OLSN/Release/Resource, or if there are reservations for the Schedule/OLSN/Release/Resource but not enough.

2. The location defined in RMRESR as the primary location (and warehouse) is checked.

A CHAIN is done to LOCDTL for that location. The Quantity Available To Consume is determined (Quantity At Location minus Quantity Reserved Sales minus Quantity Reserved Mfg). If the Quantity Available to Consume is Greater than zero, this location is used. If the Total Quantity to be Consumed for this resource is greater than the Available to Consume, the Available Quantity from this Location is consumed. If the Quantity Available to Consume is greater than the Total Quantity to be Consumed for this Resource, only what is needed for this resource is consumed.

If it is able to consume from this location, the Location Detail File is updated.

The following fields are reduced by the Quantity Being Consumed From This Location:

Quantity At Location (std UM)
Quantity At Location (last UM)
Quantity Reserved at Manufacturing If the Total Quantity to be Consumed for this Resource is consumed, UPDATE1 is executed (see Updates below for consumed resources). The program goes to Step C to read the next RMRESR record. If the total quantity could not be consumed, after executing UPDATE1, the program continues with Step #3 (below).

If a lot number was defined at the location, the LOTMAS file is updated. (See UPDATE1 for details.)

3. The location defined in RESMST is checked to determine if it is the primary location for consumption. Processing is the same as in Step #2 above.

If the Total Quantity to be Consumed for this resource is consumed, the program goes to Step C to read the next RMRESR record. If the Total Quantity can not be consumed, the program continues with Step #4.

4. RMRESR is checked to determine if the resource can be superflushed.

If the resource cannot be superflushed, one of the locations below has to be forced negative.

*Hierarchy Of Locations When A Resource Is Forced Negative:* a. The location specified for the Resource/Sched/OLSN/Rel # (RMRESR) is used. This location is found in Step #2 above.
b. If there is no Location Detail record for that location, the location from RESMST is used (from Step #3 above).
c. If a Location Detail record is not found for that location either, the location that is specified in the last reservation record is used. If there are no reservation records, the resource cannot be theoretically consumed. An error message is displayed. (The program continues trying to theoretically consume any other resources defined as TC resources for this PM.)

The error listing prints resources that can not be theoretically consumed and the quantity which can not be consumed. The listing also shows the total quantity that needs to be consumed for this resource.

*Duplicate Subroutines:*

The following subroutines have functional duplicates among the theoretical consumption subroutines. This is done to enable the system to perform superflush.

1. TCTASK has the duplicate TCTASL.
2. TCRESR has the duplicate TCRESL.
3. TCCONT has the duplicate TCCONL.
4. TCONTC has the duplicate TCONTL.

The above duplication is necessary to avoid the following complication while superflushing a resource.

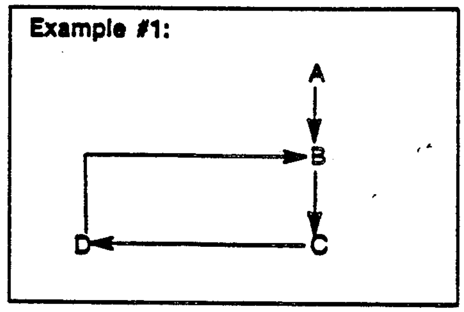

A executes B.
B executes C.
C executes D.
D executes B.
B does not execute C.
B ends.
B returns to D.
D returns to C.
C returns to B.
B performs more work.
B ends.

In RPG, B does not return to A but to D. RPG does not stack calls to a subroutine. It only remembers the last call.

One way to get around this situation is to use duplicates of subroutines. They are called from one subroutine while executing another subroutine.

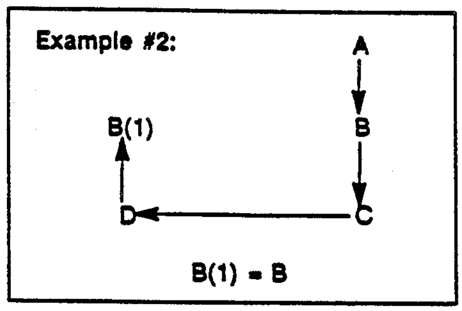

B(1) and B are duplicate subroutines.

Now,
A executes B.
B executes C.
C executes D.
D executes B(1).
B(1) does not execute C.
B(1) ends.
B(1) returns to D.
D returns to C.
C returns to B.
B performs more work.
B ends.
And now B returns to A.

*Sequence of actual execution in one case of superflush:*

TCACTV to TCTASK;
TCTASK to TCRESR;
TCRESR to TCCONT;
TCCONT to TCONTC;
TCONTC to TCSUPR;
TCSUPR to TCTASL;
TCTASL to TCRESL;
TCRESL to TCCONL;
TCCONL to TCONTL;
TCONTL to TCSUPR is not allowed.
TCONTL returns to TCCONL;
TCCONL returns to TCRESL;
TCRESL returns to TCTASL;
TCTASL returns to TCSUPR;
TCSUPR returns to TCONTC;
TCONTC returns to TCCONT;
TCCONT returns to TCRESR;
TCRESR returns to TCTASK;
TCTASK returns to TCACTV.

Theoretical Consumption ends.

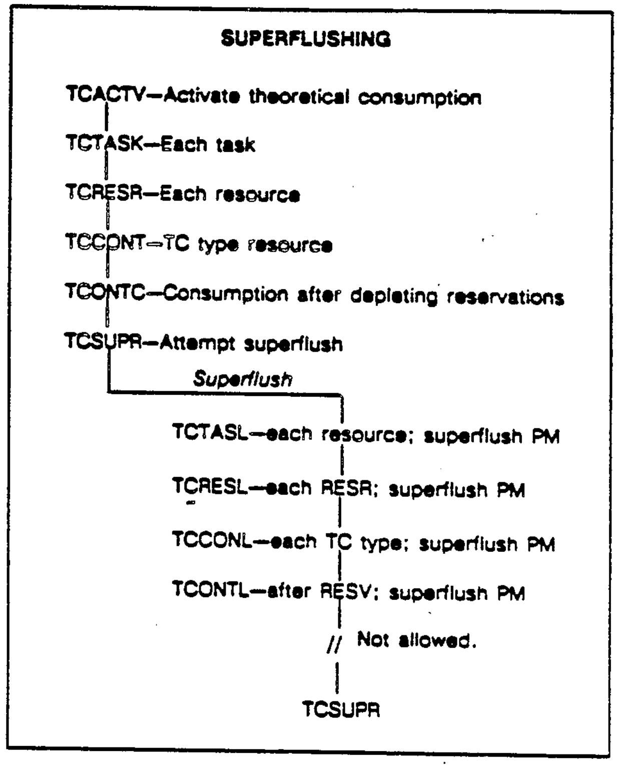

To find the PM Type and PM Name used for superflush, RMRESR is checked. If the PM Type and PM Name is not defined in RMRESR, the resource cannot be superflushed.

If the resource cannot be superflushed, some location for that resource must be forced negative. See above. *Hierarchy Of Locations When A Resource Is Forced Negative.*

*Prerequisites For Superflushing:*

The resource is a produced resource from the last task.

The resource is the only produced resource for this PM.

The resource and task are non-reportable.

An edit is performed to check that the produced resource on this production model equals the resource that is trying to be superflushed. If so, superflush can continue. All consumed resources for that PM are read, and all resources from that PM are theoretically consumed.

When superflushing, the process is exactly the same as above except the program cannot superflush any of the resources on this PM. You can only superflush down one level.

*Determine The Schedule/Release:*

Before continuing with superflush, the program edits that there is really a Schedule/Release/PM Type and PM Name for the production model being used for superflush. This is done because the TC, TP, and CC transactions that are generated during the superflush have a schedule and release attached.

Using the schedule and release from the PR, ON, or SC transaction and the PM Type/PM Name being used for superflush, a CHAIN is done to RMODELPP (permanent logical file by PM Type/PM Name/Schedule/Release). If the CHAIN is successful, the OLSN is extracted and superflush continues. If the CHAIN is not successful, superflush STOPS. Superflush cannot continue unless a valid Schedule/Release for this PM Type and PM Name is found.

If superflush can continue, the theoretical consumption ratio for this production model is calculated.

*Recalculate The Theoretical Consumption Ratio:*

When executing superflush, the program first calculates the new theoretical consumption for this production model. It also saves the first TC calculation so when processing returns to the theoretical consumption of the original production model, the ratio is still available. However, after saving the ratio from above, a new TC ratio must be calculated for this production model.

To do this, the Quantity Being Consumed through superflush is divided by the Quantity Relative To PM Batch Size (from RMRESR). That result is the multiplied percentage of total reportable produced resources.

These calculations are the same calculations as described in the *Theoretical Consumption* section. The percentage of total reportable produced resources in this calculation almost always equals 100. This is because, to perform superflush, there can only be one produced resource, and, therefore, that resource always equals 100% of the total produced resources.

S1. The first/next theoretically consumed resource for this Schedule/OLSN/Rel/Task is found. The RMTASKSQ file is read starting with the task that produces the superflushable resource. All resources on the task are then examined.

The task is checked to determine if stream resource is reportable. If the stream resource is reportable, then theoretical consumption stops. If theoretical consumption is going to continue, the theoretical consumption ratio for this task is calculated (see *Theoretical Consumption* section for calculation details).

The RMRESR file is read and the following edits are performed:

a. The resource is theoretically consumed, or b. the resource is a calculated cost resource.

If no more RMRESR records exist for this PM Type/PM Name, superflush stops. The program goes to Step C to continue with theoretical consumption.

S2. The Quantity To Be Theoretically Consumed for this resource is calculated (Quantity To Consume For This Resource).

The Quantity Consumed Per Batch is multiplied by the theoretical consumption ratio for the Quantity To Theoretically Consume for this resource.

The Quantity Consumed Per Batch is found in the RMRESR file for each theoretically consumed resource. The field in the file is called Quantity Relative To PM Batch Size.

If the resource is a calculated cost resource, RMRESR is updated. The program then goes to S1 to read next RMRESR record. quantity issued in RMRESR is updated by adding Quantity Issued to Quantity To Consume for this resource.

The following steps do NOT apply to calculated cost resources, only to theoretically consumed resources.

E. Locations for consumption are found.

1. The locations defined by the reservation records for this Resource/Sched/OLSN/Rel/Task are checked.

LOOP2—TAG

A reservation record for this Sched/OLSN/Rel/Task/Resource is read. The Task Number and Resource Number are not from the production receipt transactions. They are the Resource Number and Task Number found in Step S1.

If the CHAIN was successful, the Quantity Reserved is compared with Reduced From Reserved Quantity. If Quantity Reserved is greater, Reduced From Reserved Quantity is subtracted from Quantity Reserved. The difference equals the Quantity To Consume at this location. To do this, a CHAIN is done to the Location Detail record for this reservation.

Regardless of what quantity is available at this location, if there is a Location Detail record, the following fields are reduced by the Quantity Being Consumed from this location:

Quantity At Location (std UM)
Quantity At Location (last UM)
Quantity At Location Reserved To Manufacturing Quantity at Location is allowed to become negative, but the Reserved Quantity is not. If the reserved quantity is negative, the field is set to zero. The quantity in last received UM is updated in the standard manner as described above.

If a reservation record is found and the Reduced From Reserved Quantity is less than the Quantity Reserved, but no LOCDTL record exists for that location, a LOCDTL record is added. This record has a negative Quantity At Location, and the Reserved Quantity is equal to zero.

The default Classification Code for this LOCDTL record comes from Tailoring. Before a LOCDTL record is added, the default Classification Code is used to CHAIN to the CLASCD file. If the Classification Code exists in the Classification Code file, the classification attributes loaded into the new LOCDTL record. If not, the resource CANNOT be theoretically consumed.

*LOCDTL (New record updates):*

Location # = To Location # from reservation record
Warehouse = To Warehouse from reservation record
Resource = From reservation record
Grade = Blank
Lot # = Blank
Quantity At Location (standard) = Quantity being Consumed From This Location (always negative when writing a new record).
Standard UM = RESMST
Resource Class = extracted from RESMST.
Resource Sub-Class = extract from RESMST
Quantity in Last Received UM = zero
Last Received UM = blank
Potency Factor = default to RESMST
Potent Units = calculated
Revision level = defaults to Current Revision Level (RESMST)
Classification Code = defaults to Tailoring
All Classification Bytes = extracted from the CLASCD file using the default Classification Code.
Quantity Reserved—manufacturing = zero.
Quantity Reserved—sales = zero.
Last Date Received = system date
Last Time Received = system time
ETD = zero
Net Activity Field = zero
Shelf Life Expiration Date = zero
FIFO date = zero 1. The total quantity to be consumed for this resource is reduced by the Quantity Consumed from that location.

If the Total Quantity to be Consumed for this resource is greater than zero, the program goes to LOOP2. The LOOP2 stops as soon as the Total Quantity to be consumed for this resource has been consumed OR if there are no more reservation records for this Schedule/OLSN/Release/Task/Resource Number.

If the Total Quantity to be Consumed for this Resource was consumed, UPDATE1 is executed (see Updates for consumed resources). The program then goes to S1 to read the next RMRESR record. If the total quantity could not be consumed, after doing UPDATE1, the program continues with Step #2.

2. The location defined in RMRESR as the primary location (and warehouse) is checked.

The program CHAINs to LOCDTL for that location. The Quantity Available To Consume is determined (Quantity At Location minus Quantity Reserved Sale minus Quantity Reserved Mfg). If the Quantity Available To Consume is greater than zero, this location is used. If the Total Quantity To Be Consumed for this resource is greater than the Quantity Available To Consume, the Available Quantity from this location is consumed. If the Quantity Available To Consume is greater than the Total Quantity To Be Consumed for this resource, only what is needed for this resource is consumed.

If it was possible to consume from this location, the Location Detail file is updated. The following fields are reduced by the quantity being consumed from this location:

Quantity At Location (std UM)
Quantity At Location (last UM)
Quantity Reserved To Manufacturing If the Total Quantity to be consumed for this resource is consumed, UPDATE1 is executed (see Updates for consumed resources). Then the program goes to S1 to read the next RMRESR record. If the total quantity could not be consumed, the program continues with Step 3.

If the locations defined a lot number, the LOTMAS file is updated (see UPDATE1 for more details).

3. The location defined in RESMST as the primary location for consumption is checked. The process is the same as Step 2 above.

If the Total Quantity to be Consumed for this resource was consumed, the program goes to Step S1 to read the next RMRESR record. If the total quantity could not be consumed, the program continues with Step #4.

If the resource cannot be superflushed, one of the following locations is forced negative:

a. The location specified for the Resource/Sched/OLSN/Rel # (PMRESR) is first used (found in #2 above).
b. If there is no Location Detail record for that location, the location found from RESMST is used (the location that was found in #3 above).
c. If a Location Detail record was not found for that location either, the location that was specified in the last reservation record is used. If there were no reservation records, the resource cannot be theoretically consumed. (The program continues to try and theoretically consume any other resources defined as TC resources for this PM.) An error message is generated.

F. UPDATE1—Updates for Consumed Resources

When doing theoretical consumption, if the resource is defined as calculated cost, the only file that gets updated is RMRESR.

If the resource is a "count up" resource (i.e., electricity), the resource does not exist in a location. Therefore, if a count up resource is consumed, the LOCDTL and LOTMAS files are not updated.

The Task Status of the Task on the RMRESR record is checked. If the Task Status is launched, the Task Status is updated to Running.

Updates

• *RESBAL:*

Number of Transactions since the last cycle count
Mfg Reserved Quantity= reduce using Trans Quantity in standard UM
The Reserved Quantity is only reduced by what was actually consumed from reservations (i.e., if no reservations existed, this field is not reduced).

Manufacturing Allocated Quantity is never updated by a transaction.

Quantity Consumed to Date increased using Quantity Consumed from this location.

Total Quantity Present—reduced using Quantity Consumed From This Location.

Quantity On Order: If the from location was classified as On Order = Y, Quantity on Order is reduced using Trans Quantity in standard UM.

On Hand Quantity: If the From Location was classified as On Hand = Y, On Hand Quantity is reduced using Trans Quantity in standard UM.

Date of Last Effect on On Hand Quantity: If the From Location was classified as On Hand = Y, then today's date is the date of last effect.

Date of Last Activity is today's date.

- *LOCDTL:* this file does not get updated unless the resource is a balance type resource.

Quantity At Location (in standard UM) is reduced using Quantity Consumed From This Location.

Quantity At Location (in last received UM) is updated after the Trans Last Received UM.Then that quantity is updated to Quantity At Location for last received UM.

Quantity Reserved at location is compared with the Trans Quantity. If the Quantity Reserved is less than the Transaction Quantity, Quantity Reserved is subtracted. If the Quantity Reserved is greater than or equal to the transaction quantity, the Transaction Quantity is subtracted. The Quantity Reserved field is never negative.

Transaction Quantity means the quantity being consumed at this location.

- *LOTMAS:*

This file does not get updated unless the resource is a balance type resource.

If the From location had a Lot Number, the LOTMAS file is updated.

Quantity Issued is increased using Quantity Consumed from this Location in standard UM.

- *RMRESR:*

Quantity Allocated is NOT updated.

Quantity Reserved is NOT updated.

Quantity Issued is increased using Quantity Consumed from this Location.

Quantity Reduced from Reserved is increased using Quantity Consumed from this Location. This quantity is ONLY updated by the quantity that was consumed FROM a reservation.

- *RMTASK:*

Task Status is updated to Running if the present status is launched.

- *RESRES:*

This file is only updated during step #1 above.

Quantity Issued is increased by the Quantity To Consume From This Location.

Reduced from Reserved Quantity is increased using the quantity that was consumed for this resource from reservations.

- *TREBAT and TRHIST:*

There are three transaction types that can be generated:

a. TC—theoretical consumption
b. CC—calculated cost
c. TP—theoretical production TC transactions are written for theoretically consumed resources for each location used. See table on following page.

| Theoretical Consumption Transaction | | | | | | | | | |
|---|---|---|---|---|---|---|---|---|---|
| Locn Attr: | On order | | On Hand | | $ Value | | Avail plan | | |
| | *Yes* | *No* | *Yes* | *No* | *Yes* | *No* | *0* | *1* | *2* |
| | *Balance type—positive consumption* | | | | | | | | |
| Fields: THTENQ | " " | "-" | N/A | N/A | N/A | N/A | N/A | | |
| THTRON | " " | " " | N/A | N/A | N/A | N/A | N/A | | |
| THTROH | N/A | N/A | "-" | " " | N/A | N/A | N/A | | |
| THEFIN | N/A | N/A | N/A | N/A | "-" | " " | N/A | | |
| THEFPQ | N/A | N/A | N/A | N/A | N/A | N/A | "-" | " " | " " |
| | *Balance type—negative consumption* | | | | | | | | |
| Fields: THTENQ | " " | "+" | N/A | N/A | N/A | N/A | N/A | | |
| THTRON | " " | " " | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |

"+" = plus sign " " = blank
"-" = minus sign N/A = not applicable

See the following page for additional updates.

| Theoretical Consumption Transaction | | | | |
|---|---|---|---|---|
| Locn Attr: | On order Yes \| No | On Hand Yes \| No | $ value Yes \| No | Avail plan 0 \| 1 \| 2 |
| | *Non-balance type—positive consumption* | | | |
| Fields: THTENQ | " " | N/A | N/A | N/A |
| THTRON | " " | N/A | N/A | N/A |
| THTROH | N/A | " " | N/A | N/A |
| THEFIN | N/A | N/A | " " | N/A |
| THEFPQ | N/A | N/A | N/A | " " |
| | *Non-balance type—negative consumption* | | | |
| Fields: THTENQ | " " | N/A | N/A | N/A |
| THTRON | " " | N/A | N/A | N/A |
| THTROH | N/A | " " | N/A | N/A |
| THEFIN | N/A | N/A | " " | N/A |
| THEFPQ | N/A | N/A | N/A | " " |
| "+" = plus sign " " = blank "–" = minus sign N/A = not applicable | | | | |

*Additional Updates:*

Transaction Number (unique for each trans)
Period #
Transaction Date
Transaction Time
User Entered Date
User Entered Time
Operator Initials
Transaction Detail Code
Reference #
Schedule
OLSN
Release #
Task
PM Type and Name All of the above fields are loaded using the information from the actual entered transaction (i.e., the production receipt transaction or the scrap transaction) except transaction number.

Resource Number
Quantity
UM
From Warehouse
From Location
Grade
Lot #

Revision Level
Potency Factor
Transaction Quantity In Standard UM
Effect on Inventory $ = (+, -, or blank). If the location Inventory $ = YES, byte is set to "-".
Effect on Non-MRP Quantity = blanks. If the location was Avail for Planning = 2, byte is set to "-".
Resource Class
Resource Sub-Class One CC Transaction is written for each calculated cost resource.

| Calculated Cost Transaction | | | | |
|---|---|---|---|---|
| Locn Attr: | On Order | On Hand | $ Value | Avail Plan |
| Fields: THTENQ | Blanks | N/A | N/A | N/A |
| THTRON | Blanks | N/A | N/A | N/A |
| THTROH | N/A | Blanks | N/A | N/A |
| THEFIN | N/A | N/A | Blanks | N/A |
| THEFPQ | N/A | N/A | N/A | Blanks |

*Additional Updates*

Transaction Number
Period #
Transaction Date
Transaction Time
User Entered Date
User Entered Time
Operator Initials
Transaction Detail Code
Reference #
Schedule
OLSN
Release #
Task
PM Type And Name All of the above fields are loaded using the information from the actual entered transaction (i.e., the production receipt transaction or the scrap transaction) except Transaction Number.

Resource Number
Quantity
UM
Transaction Quantity In Standard UM
Resource Class
Resource Sub-Class

• *TRCTRL:*

This file is NOT updated by the system-generated transactions. For example, if a PR transaction is done and that transaction generates 20 TC transactions, the batch session screen would display Number of Transactions = 1.

- *Producing A Non-reportable Resource:*

The program continues with Step G below.

G. First, it is determined if there is a non-reportable produced resource for the task that is being evaluated by this cycle.

H. If a non-reportable produced resource is found, processing continues by calculating the quantity to theoretically produce.

- *Theoretical Production of a Non-Potent Resource:*

The same updates as for a production receipt are used. The quantity produced is added to the location quantity in standard UM. Total Quantity at Location in standard UM is converted to Quantity in last received UM.

- *Theoretical Production of a Potent Resource:*

Quanitities in standard and last received units of measure are used to recalculate the new Potency Factor.

*Case 1.* Standard and last received UM are the same.

*Case 2.* Standard and last received UM are different.

Example:

Q(1) = Quantity Prod in potent units in standard UM.

P(1) = Default potency from Resource Master.

V(1) = Q(1)/P(1) = Actual Quantity Produced in std UM.

Q(2) = Quantity At Location in potent units in standard UM.

P(2) = Potency at location.

V(2) = Q(2)/P(2) = Actual Quantity At Location in std UM.

Q(3) = Quantity At Location in last received UM.

*Case 1:*

If standard and last received UM are same:

Q(1) + Q(2) = Quantity At Location in potent units in standard UM.

V(1) + Q(3) = Quantity At Location in last received UM.

(Q(1) + Q(2)) divided by (V(1) +Q(3)) = New potency factor at location.

*Case 2:*

If standard and last received UM are different:

Q(1) + Q(2) = Quantity At Location in potent units in standard UM.

F(Q(1) + Q(2)) = Quantity At Location in potent units in last UM after UM conversion.

V(1) + V(2) = Actual Quantity At Location in standard UM.

The new Potency Factor at location is calculated before calculating the Quantity in last received UM.

(Q(1) + Q(2)) divided by (V(1) + V(2)) = New potency factor at location.

Calculate Quantity in last received UM.

F(Q(1) + Q(2)) divided by (Q(1) + Q(2))divided by (V(1) + V(2)) = Quantity At Location in last received UM.

· The Quantity To Theoretically Produce is calculated in the same manner as the Quantity To Theoretically Consume (for consumed resources). This means the Quantity Relative to PM Batch Size is multiplied by the theoretical consumption ratio. (The theoretical consumption ratio was calculated in Step B.)

It is very important to note that the theoretically produced resources from a task use the same ratio as the theoretically consumed resource for that task. To reiterate, one ratio is used for a task for both produced and consumed resources.

After that quantity is calculated, the program continues to Step I (below).

I. The program tries to find a Produced to Location for a default.

First, the program checks RMRESR for the Produced To Warehouse and Produced To Location. If those fields are not blank, a CHAIN is done to LOCDTL for this Warehouse/Location/Resource. If a LOCDTL record exists, the program checks the Lot Number field in the LOCDTL record. If the Lot Number is blank, this location can be used. If the Lot Number is not blank, this location cannot be used.

If there is no existing LOCDTL record, a LOCDTL record is added. Then, the program continues with Step J—UPDATE2.

If the location from RMRESR was not valid, or if RMRESR had blanks for Produced To Warehouse or Produced To Location, the program checks RESMST. The default from Produced To Warehouse and from Produced To Location from RESMST are used to CHAIN to LOCDTL. If a LOCDTL record exists, the Lot Number is checked. If the Lot Number is blank, the location is valid. If the Lot Number is not blank, the location is invalid. If the location is invalid, processing ends. An error message is printed on the Error Listing report.

The program continues with Step J—UPDATE2.

J. UPDATE2—Updates for Theoretically Produced Resources:
   a. A TP transaction is written to TRHIST.
   b. RESBAL, LOCDTL, and RMRESR are updated (see below).

• *RESBAL:* of Transactions since the last cycle count
   Actual Production—year-to-date
   Actual Production—total increased using the calculated Produced Quantity.
   Total Quantity Present is increased using the calculated Produced Quantity.
   Quantity On Order—If the To Location was classified as On Order = Y, Quantity On Order is increased using calculated Produced Quantity.
   On Hand Quantity—If the To Location was classified as On Hand = Y, On Hand Quantity is increased using calculated Produced Quantity.
   Date of Last Effect on On Hand Quantity— If the To location was classified as On Hand = Y, the system date is the Date of Last Effect.
   Date Last Activity—updated using user-entered transaction date.

- *LOCDTL (Existing record):*
  - Quantity at Location (in standard UM) is increased using calculated Produced Quantity.
  - Quantity at Location (in last received UM)
  - Potent Units—see above for potency units considerations.
- *LOCDTL (New record):*
  - Location # = from either RMRESR or RESMST depending on which location was valid
  - Warehouse = from either RMRESR or RESMST depending on which location was valid
  - Resource = the theoretically produced resource #
  - Grade = blank
  - Lot # = blank
  - Quantity At Location (standard) equals the calculated Produced Quantity.
  - Standard UM = RESMST
  - Resource Class = extract from RESMST
  - Resource Sub-Class = extract from RESMST
  - Quantity In Last Received UM = zero
  - Last Received UM = blank
  - Potency Factor = defaults to RESMST
  - Potent Units = Produced Quantity (Std UM) x Potency Factor
  - Revision Level = defaults to Current Revision Level (RESMST).
  - Classification Code = default to Tailoring
  - All Classification Bytes = using the default classification byte, these fields are loaded from CLASCD.
  - Quantity Reserved—manufacturing = zero
  - Quantity Reserved—sales = zero.
  - Last Date Received = transaction date (user-entered)
  - Last Time Received = transaction time (user-entered)
  - ETD = zero
  - Net Activity field = zero
  - Shelf Life Expiration Date = calculated by adding Shelf Life Days (defined in RESMST for this resource) to the transaction date (user-entered). This is done after converting to Julian format.
  - FIFO Date = transaction date (user-entered)
- *RMTASK:*
  - Task Status is set to Running if presently at launched.
- *RMRESR:*
  - Quantity Produced To Date is increased using calculated Produced Quantity.

• *TREBAT and TRHIST:*

See the table below.

| Theoretical Production Transaction | | | | | | | | | |
|---|---|---|---|---|---|---|---|---|---|
| Locn Attr: | On Order | | On Hand | | $ Value | | Avail Plan | | |
| | *Yes* | *No* | *Yes* | *No* | *Yes* | *No* | *0* | *1* | *2* |
| | *Positive Production Receipt—Non-stream* | | | | | | | | |
| Fields: THTENQ | " " | "+" | N/A | N/A | N/A | N/A | N/A | | |
| THTRON | " " | " " | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |
| | *Negative Production Receipt—Non-stream* | | | | | | | | |
| Fields: THTENQ | " " | "-" | N/A | N/A | N/A | N/A | N/A | | |
| THTRON | " " | " " | N/A | N/A | N/A | N/A | N/A | | |
| THTROH | N/A | N/A | "-" | " " | N/A | N/A | N/A | | |
| THEFIN | N/A | N/A | N/A | N/A | "-" | " " | N/A | | |
| THEFPQ | N/A | N/A | N/A | N/A | N/A | N/A | "-" | " " | " " |
| | *Positive & Negative Production Receipt—Stream* | | | | | | | | |
| Fields: THTENQ | " " | | N/A | | N/A | | N/A | | |
| THTRON | " " | | N/A | | N/A | | N/A | | |
| THTROH | N/A | | " " | | N/A | | N/A | | |
| THEFIN | N/A | | N/A | | " " | | N/A | | |
| THEFPQ | N/A | | N/A | | N/A | | " " | | |

*Additional Updates:*

TP transactions are written for a theoretically produced resource.

Transaction Number = increase by 1.
Period #
Transaction Date
Transaction Time
User Entered Date
User Entered Time
Operator Initials
Transaction Detail Code
Reference #
Schedule
OLSN
Release #
Task
PM Type and Name All of the above fields are loaded using the information from the actual entered transaction, (i.e., the production receipt transaction or the scrap transaction) except transaction number.

Resource Number
Quantity—calculated produced quantity
UM
To Warehouse
To Location
Grade—blank
Lot #—blank
Revision Level—default to current revision level (RESMST).
Potency Factor—blank
Transaction Quantity in standard UM
Calculated Produced Quantity in standard UM
Effect on inventory $ = (+, -, or blank)
If the location was Inventory $ = YES, byte is set to "+".
Effect on Non-MRP Quantity = blanks
If the Location was MRP available = Yes, byte is set equal to "+".
Resource Class
Resource Sub-Class

• *TRCTRL:*

This file is NOT updated by the system-generated transactions. For example, if a PR transaction is done and that transaction generates 20 transactions, the batch session screen displays number of transactions = 1.

• *Negative Theoretical Consumption:*

A Completed negative production receipt transaction generates negative theoretical consumption. The purpose of negative theoretical consumption is to reverse theoretical consumption done with a positive production receipt.

1. Theoretical consumption ratio in this case is negative.
2. All CC trans are the reverse of positive consumption.
3. All TP transactions are the reverse of positive production.
4. All TC transactions are the reverse of positive consumption.
5. Negative superflush is not done.

• *Summary of Transaction Updates:*

The following tables summarize the updates that occur in addition to Updates1 and Updates2 detailed above. In some cases, additional information can be found under the individual transaction section, listed by screen numbers after the tables.

Summary of Transaction Updates

| Transaction Type | CHn | CHy | DI | IA | IM | IP | MI | MR | PR | RA | RC | RS | RT | SA | TC | TP | TR |
|---|---|---|---|---|---|---|---|---|---|---|---|---|---|---|---|---|---|
| File—LOCDTL | f t | f t | | | | | | | | c p | f t | | | | | | f t |
| Qty @ Locn Std—LDLOCQ | − + | | − | + | X | − | − | + | X | − + | − + | + | − | − | X | X | − + |
| Qty @ Locn LR—LDORUM | − + | | − | + | X | − | − | + | X | − + | − + | + | − | − | X | X | − + |
| Last Recv UM—LDRCUM | X | | | | | | | X | X | | | X | | | | | X |
| Potency Factor—LDPOTF | X | | | | | | | X | X | X | X | | | | | X | X |
| Grade—LDGRDE | T | | | | | | | T | T | T | T | T | | | | | T |
| Revision Lvl—LDREVL | T | | | | | | | T | T | T | T | T | | | | | T |
| Qty Resv Mfg—LDQYRM | | | − | | | | | | | | | | | | X | | |
| Qty Resv Sales—LDQYRS | | | | | | | | | | | | | | − | | | |
| Trans # LR—LDTRAN | X | | | | | | | X | X | | X | | | | | | X |
| Date Last Recv—LDDLRC | X | | | | | | | X | X | | X | X | | | | | X |
| Time Last Recv—LDTLRC | X | | | | | | | X | X | | X | X | | | | | X |
| FIFO Date—LDFIFO | T | | | | | | | T | T | | T | T | | | | | T |
| ETD—LDETD | T | | | | | | | T | T | | T | T | | | | | T |
| Shelf Life Dt—LDEXPD | T | | | | | | | T | T | | T | T | | | | | T |
| Classif Code—LDCLCD | | X | | | | | | | | | | | | | | | |
| On Order Inv—LDOOIN | | X | | | | | | | | | | | | | | | |
| Avail for Plan—LDAVPL | | X | | | | | | | | | | | | | | | |
| On Hand Inv—LDOHIN | | X | | | | | | | | | | | | | | | |
| $ Value Inv—LDDVIN | | X | | | | | | | | | | | | | | | |
| $ Value WIP—LDDWIP | | X | | | | | | | | | | | | | | | |
| Add a Record— | * | | | | | | | * | * | * | * | * | | | * | * | * |

f = From Location
t = To Location
c = Consumed from
p = Produced To

X = Update the record
+ = Increase
− = Decrease
* = If no record currently exists
T = Updated based on tailoring CHn = Change classification with Reclassify byte = no
CHy = Change classification with Reclassify byte = yes
LR = last received Summary of Transaction Updates (continued)

| Transaction Type | CH | DI | IA | IM | IP | MI | MR | PR | RA | RC | RS | RT | SA | TC | TP | TR |
|---|---|---|---|---|---|---|---|---|---|---|---|---|---|---|---|---|
| **File—LOCMAS†** | n | | | | | | | | | | | | | | | |
| Warehouse—LCWHSE | X | | | | | | | X | X | X | X | X | | | X | X |
| Location—LCLOCN | X | | | | | | | X | X | X | X | X | | | X | X |
| Pick Ovrd Seq—LCPOSQ | X | | | | | | | X | X | | X | | | | X | X |
| Dt Last Maint—LCDTMT | X | | | | | | | X | X | X | X | X | | | X | X |
| **File—LOTMAS** | f t | | | | | | | | c p | f t | | | | | | f t |
| Last Rcpt Date—LMLRDT | X | | | | | | X | X | X | X | X | | | | | X |
| Lot Qty Issued—LMLQYI | | + | | | + | | | | + | | − | | + | | | |
| Lot Qty Shipped—LMLQYS | | | | | | | | | | | | | | + | | |
| Lot Qty MscDsp—LMLQYD | + | | − | − | | + | | | | + | | | | | | + |
| Tot Lot QtyRcv—LMLQYT | + | | | | | | + | + | + | + | | − | | | | + |
| Add a Record— | • | | | | | | • | • | • | • | • | | | | | • |
| **File—PODETL** | | | | | | | | | | | | | | | | |
| Date Last Rcpt—PDLRDT | X | | | | | | | | | | | | | | | |
| Qty Rcvd OnHnd—PDQROH | L | | | | | | | | | | | | | | | |
| Qty Rcvd OnOrd—PDQROO | L | | | | | | | | | | | | | | | |
| Qty Rcvd Total—PDQYRC | E | | | | | | | | | | | | | | | |
| **File—POSUMM** | | | | | | | | | | | | | | | | |
| PO Status—PSSTAT | X | | | | | | | | | | | | | | | |

f = From Location
t = To Location
c = Consumed from
p = Produced To
n = If Reclassify = no
L = Depends on Location Classification
E = Updated if transaction goes from a location which is not not available for planning to one that is available for planning.
† If the system is not required to have a LOCMAS record (determined by RM tailoring), one will be added by the following transactions which may create new locations.

X = Update the record
+ = Increase
− = Decrease
* = If no record currently exists Summary of Transaction Updates (continued)

| Transaction Type | CH | DI | IA | IM | IP | MI | MR | PR | RA | RC | RS | RT | SA | SC | TC | TP | TRw |
|---|---|---|---|---|---|---|---|---|---|---|---|---|---|---|---|---|---|
| **File—RESBAL** | | | | | | | | | c p | f t | | | | | | | f t |
| Select Next CY—RBSNCC | T | T | T | T | T | T | | | T | T | | T | T | | T | | T |
| # Tran Sinc CY—RPTLCC | X | X | X | X | X | X | X | X | X X | X X | X | X | X | X | X | X | X X |
| Qty On Hand—RBQYOH | L | L | L | L | L | L | L | L | L L | L L | L | L | L | | L | L | L L |
| Qty On Order—RBQYOO | R L | L | L | L | L | L | L | L | L L | | L | L | L | | L | L | L L |
| Tot Qty Present—RBTQTY | L | - | + | + | - | - | + | + | - + | - + | + | - | - | | - | + | - + |
| Dt Last Activity—RBDTLA | X | X | X | X | X | X | X | X | X X | X X | X | X | X | X | X | X | X X |
| Dt Last Eff OHQ—RBDLOQ | L | L | L | L | L | L | L | L | L L | L L | L | L | L | | L | L | L L |
| Prod Qty Total—RBAPTL | | | | | | | | + | + | | | - | | | | + | |
| Mfg Reserv Qty—RBMMRQ | | - | | | | | | | | | | | | | - | | |
| Qty Sold To Dt—RBQYSD | | | | | | | | | | | | | | | | | |
| Sales Aloc Qty—RBSAQY | | | | | | | | | | | | | + | | | | |
| Sales Rsrv Qty—RBSMRQ | | | | | | | | | | | | | - | | | | |
| Date Last Sale—RBDTLS | | | | | | | | | | | | | X1 | | | | |
| Total Consumpt—RBSCTL | | + | | | + | + | | | + | | | | | | + | | |
| Hist Avg Cost—RBAVCS | L | | | | | | | | | | | | | | | | L |
| Rolling Avg Cost w/ alpha factor—RBRLCS | L | | | | | | | | | | | | | | | | L |
| **File—RESMST** | | | | | | | | | | | | | | | | | |
| Re-Plan Flag—RMREPL | E | | | | | | | | | | | | | X | | | |
| **File—RESRES** | | | | | | | | | | | | | | | | | |
| Qty Issued—RVQYIS | | + | | | | | | | | | | | | | + | | |

f = From Location
t = To Location
c = Consumed from
p = Produced To
n = If Reclassify = no
T = Updated based on tailoring
R = Depends if a PO is entered
L = Depends on Location Classification
E = Updated if transaction goes from a location which is not not available for planning to one that is available for planning.

X = Update the record
X1 = byte is updated to Y
+ = Increase
- = Decrease
w = If the From warehouse is different than the To warehouse
Dt Last Activity is updated to today's date unless otherwise noted.

Summary of Transaction Updates (continued)

| Transaction Type | DI | CC | ON | PR | RA | RS | RT | TC | TP | SC |
|---|---|---|---|---|---|---|---|---|---|---|
| **File—RMODEL** | | | | | | | | | | |
| # Earn PM Batch—RDNEPB | | | + | + | | | | | | + |
| Task Comp Code—RDTSCC | | | | X | | | | | | X |
| Release Status—RDSTAT | X | | X | X | | | | | | X |
| Act Start Date—RDATSD | X | | X | X | | | | | | X |
| **File—RMRESR** | | | p | | c p | | | | | |
| Qty Prod To Dt—RRQYPD | | | + | + | + | | − | | + | |
| Qty Issued—RRQYIS | + | + | | | + | − | | + | | |
| Qty Red Fr Res—RRQYRR | + | | | | | | | + | | |
| Substitute Cd—RRSRSB | X | | | | Y Y | | | | | |
| Resc Subst For—RRRNSF | X | | | | | | | | | |
| Add a Record— | * | | | * | * * | | | | | |
| **File—RMTASK** | | | | | | | | | | |
| Task Status—RTSTAT | X | | X | X | | | | X | X | X |
| Actual Start Dt—RTTASD | X | | X | X | | | | X | X | X |
| Actual Comp Dt—RTTACD | | | X | X | | | | | | X |
| **File—TRCOMM** | This file can be updated by any transaction. | | | | | | | | | |

c = Consumed from
p = Produced To

X = Update the record
Y = Byte set to Y if record added
+ = Increase
− = Decrease
* = If no record currently exists Summary of Transaction Updates (continued)

| Transaction Type | CA | CH | DI | IA | IM | IP | MI | MR | ON | PC | PR | RA | RC | RS | RT | SA | SC | TR |
|---|---|---|---|---|---|---|---|---|---|---|---|---|---|---|---|---|---|---|
| **File—TRCTRL** | | | | | | | | | | | | | | | | | | |
| # Sales Trans—TLSATN | | | | | | | | | | | | | | | | X | | |
| $ Val Sale Trans—TLSATD | | | | | | | | | | | | | | | | X | | |
| # Scrap Trans—TLSCTN | | | | | | | | | | | | | | | | | X | |
| # Chg Class Trn—TLCCTN | | X | | | | | | | | | | | | | | | | |
| # Adjust Trans—TLADTN | X | | | X | X | | | X | | | | X | X | X | | | | X |
| # Issue Trans—TLISTN | | | X | | | X | X | | | X | | | | | | | | |
| # PR Trans—TLPRTN | | | | | | | | | X | | X | | | | X | | | |
| # of Trans—TLTRCN | X | X | X | X | X | X | X | X | X | X | X | X | X | X | X | X | X | X |
| $ Val All Tran—TLTTDV | | X | | | | | | X | | | X | X | | | | | X | |
| # Suspend Tran—TLSPTN | 1 | 1 | 1 | 1 | 1 | 1 | 1 | 1 | 1 | 1 | 1 | 1 | 1 | 1 | 1 | 1 | 1 | 1 |
| # Updated Tran—TLUPTN | 1 | 1 | 1 | 1 | 1 | 1 | 1 | 1 | 1 | 1 | 1 | 1 | 1 | 1 | 1 | 1 | 1 | 1 |
| # Error Trans—TLERTN | 1 | 1 | 1 | 1 | 1 | 1 | 1 | 1 | 1 | 1 | 1 | 1 | 1 | 1 | 1 | 1 | 1 | 1 |
| # Part Upd Trn—TLPUTN | | | | | | | | | 1 | | 1 | | | | | | 1 | |
| **File—TREBAT** | | | | | | | | | | | | | | | | | | |
| All Entry Fields—Screen | f | f | f | f | f | f | f | t | t | t | t | f | f | t | f | f | t | f |
| Source Byte—TBSRCB | X | X | X | X | X | X | X | X | X | X | X | X | X | X | X | X | X | X |
| Trans Qty User—TBQNTY | | X | X | X | X | X | X | X | X | X | X | X | X | X | X | X | X | X |
| UM (User)—TBUMSR | | X | X | X | X | X | X | X | X | X | X | X | X | X | X | X | X | X |
| Trans Qty Std—TBSQTY | | X | X | X | X | X | X | X | X | X | X | X | X | X | X | X | X | X |
| Unit Cost—TBUNCS | | X | X | X | X | X | X | X | | | X | X | X | X | X | X | X | X |
| Selected Unit Cst—TBSELC | | X | X | X | X | X | X | X | | | X | X | X | X | X | X | X | X |
| Extended Cost—TBEXCS | | X | X | X | X | X | X | X | | | X | X | X | X | X | X | X | X |
| Trans Amount—TBTRAM | X | XT | | | | | | XT | | | XT | p | | | | | | |
| Sales Amount—TBUNPR | | | | | | | | | | | | | | | | X | | |
| User Ent Tr Amt—TBUTAM | | X | | | | | | X | | | | | | | | | | |
| Plant #—TBPLNT | | | X | | | | | | X | X | X | X | | X | X | | X | |
| Misc Upd Cd 1—TBMUB1 | | T | | | | | | | | | T | | | | | | | |
| Sv/Restore Code—TBSAVE | X | X | X | X | X | X | X | X | X | X | X | X | X | X | X | X | X | X |

f = From Location X = Update the record
t = To Location T = Updated based on tailoring
p = Produced To 1 = Only one field can be updated
Transaction Quantity (user) and UM are loaded from the screen

Summary of Transaction Updates (continued)

| Transaction Type | CA | CC | CH | DI | IA | IM | IP | MI | MR | ON | PC | PR | RA | RC | RS | RT | SA | SC | TC | TP | TR |
|---|---|---|---|---|---|---|---|---|---|---|---|---|---|---|---|---|---|---|---|---|---|
| **File—TRHIST** | | | | | | | | | | | | | | | | | | | | | |
| All Entry Fields—Screen | f | f | f | f | f | f | f | f | t | t | t | t | f | f | t | f | f | t | f | t | f |
| Effect Inv $—THEFIN | | | L | L | L | L | L | L | L | | | L | L | | L | L | L | | L | L | |
| Effect Non-MRP—THEFPQ | | | L | L | L | L | L | L | L | | | L | L | | L | L | L | | L | L | |
| Trans Qty User—THQNTY | | X | X | X | X | X | X | X | X | X | X | X | X | X | X | X | X | X | X | X | X |
| UM (user)—THUMSR | | X | X | X | X | X | X | X | X | X | X | X | X | X | X | X | X | X | X | X | X |
| Trans Qty Std—THSQTY | | X | X | X | X | X | X | X | X | X | X | X | X | X | X | X | X | X | X | X | X |
| Efct Not On Ord—THTENQ | | | | L | L | L | L | L | | | | L | L | | L | L | L | | L | L | |
| Rcvd frm On Ord—THTRON | | | L | | | | | | L | | | | L | | | | | | | | |
| Rcvd to On Ord—THTROH | | | | L | | | | | L | | | L | L | | L | L | L | | L | L | |
| Resc Class—THRSCL | X | X | X | X | X | X | X | X | X | | | X | X | X | X | X | X | X | X | X | X |
| Resc Sub-class—THRSSC | X | X | X | X | X | X | X | X | X | | | X | X | X | X | X | X | X | X | X | X |
| Resource Type—THRSTP | | X | | X | | | | | | | | X | X | | X | X | | X | X | X | |
| Substitute Byt—THSRSB | | | | X | | | | | | | | | X | | | | | | | | |
| Resc Subst for—THSUBR | | | | X | | | | | | | | | | | | | | | | | |
| User Ent Tr Amt—THUTAM | X | | X | | | | | | X | | | | X | | | | X | | | | |
| Unit Cost—THUNCS | | X | X | X | X | X | X | X | X | | | X | X | X | X | X | X | X | X | X | X |
| Slctd Unit Cost—THSELC | | X | X | X | X | X | X | X | X | | | X | X | X | X | X | X | X | X | X | X |
| Extended Cost—THEXCS | | X | X | X | X | X | X | X | X | | | X | X | X | X | X | X | X | X | X | X |
| Trans Amount—THTRAM | X | | T | | | | | | T | | | XT | X | | | | | | | T | |
| Plant—THPLNT | | X | | X | | | | | | X | X | X | X | | X | X | | X | X | X | |
| Res Bal Adj Qty—THRBAQ | | | | | X | X | | | | | | | | | | | | | | | |

Transaction Quantity (user) and UM are loaded from the screen.
The "Effect on Not On Order" (THTENQ) and "Received from On Order" (THTRON) fields are mutually exclusive.

X = Update the record
T = Updated based on tailoring
f = From Location
t = To Location
L = Depends on Location Classification Notes:

1. CC, TC, and TP transactions are generated by ON, SC, and PR.
2. DI transactions are generated by PC but, unlike CC, TC, and TP, they can also be generated by the user.
3. CC transactions only update RMRESR and TRHIST.
4. PODETL and POSUMM are only updated by CH. This happens because CH is the only transaction with a PO number.

SECTION XI-IV

Production Receipt Transaction Screen—MIE44205

Figure 52:
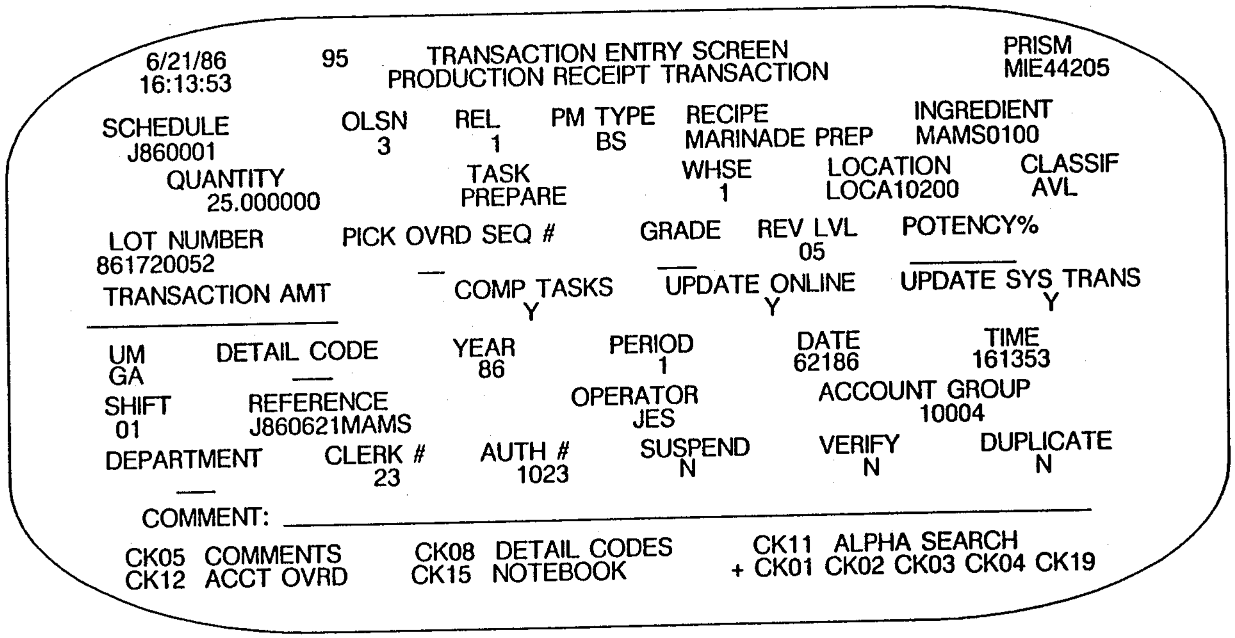

(See Figure 52)

The Production Receipt Transaction Screen is displayed when you:

(1) enter PR in the entry field on the Transaction Selection Screen and press ENTER;

(2) select a PR transaction for review from the Transaction Review Screen.

Enter a PR transaction to report non-stream resources produced from an ongoing schedule release. When the transaction is updated, any necessary TC (theoretical consumption), CC (calculated cost), or TP (theoretical production) transactions are generated by the system (see *RM Concepts*, Section B, for details on what transactions are generated).

Fields for Entry

* SCHEDULE—schedule number against which PR is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—produced resource being reported. It does not have to be a balance resource, but the Resource Balance (RESBAL) file must have a record for this resource/warehouse. In addition, this resource must be defined as a reportable resource on this production model.

Quantity—quantity produced. This quantity can be positive or negative. You would enter a negative PR to reduce the reported quantity before the release is complete. After the schedule release is completed, only RA (resource adjustment) transactions can be entered against it. At that point you would use an RA transaction to adjust the produced quantity. This quantity can be zero only if the Comp Tasks field is Y. This allows you to enter a transaction just to complete the task, in case you forget to do so when reporting the last of the produced resources.

Task—task that produced this resource.

Whse/Location—warehouse/location where the produced resource is now stored. If you leave these fields blank, they default to the Default Warehouse-Production and Default Location-Production defined for the resource on this release of the PM. If no value is found there, it defaults to the warehouse and location defined in the Resource Master (RESMST) file.

Note: If you answer Y to tailoring question #G2, the Whse field is not available for entry. It is displayed with the system warehouse defined in tailoring question #G1.

Classif—location classification code for the location to which this resource is received. If blank, the default is the classification defined for this resource on this release of the PM. If no value is found there, the system uses the default from the Resource Master (RESMST) file.

Lot Number—required if both resource and location classification are lot-controlled (see *Location Classification Code Maintenance*, Section 1-4). If you are having the system generate lot numbers (see tailoring question #T2), you can leave this field blank.

Pick Ovrd Seq #—pick list override sequence number for this resource at this location. You can use this field to enter the pick list override sequence number for a new location or change its value at an existing location.

* Grade—of the produced resource.

Rev Lvl—revision level of the produced resource at this location.

Potency %—potency of the produced resource at this location. For information on how PRISM handles potent resources, see *RM Concepts*, Section B.

Transaction Amt—transaction amount, the dollar value of this transaction. If you answer Y to the PR portion of tailoring question #T41, this field defaults to Quantity times Selected Unit Cost for the resource. If you answer N to that portion of #T41, then a message may be displayed if you do not enter a transaction amount for this transaction.

COMP TASKS—Enter Y to designate this task and all preceding tasks on this release as complete.

UPDATE ONLINE—available for entry only if the answer to tailoring question #T10 is Y. This field indicates whether this transaction is to be updated online or in batch. The default is from tailoring question #T6.

UPDATE SYS TRANS—available for entry only if the answer to tailoring question #T10 is Y. This field determines whether the system-generated transactions caused by this PR transaction are updated online or in batch. If the PR transaction is updated in batch, the system-generated transactions cannot be updated online. The default for this field is from tailoring question #T6.

UM—unit of measure for the Quantity received from production. This UM must be convertible into the standard UM for the resource.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Ongoing Production Transaction Screen—MIE44206

Figure 53:
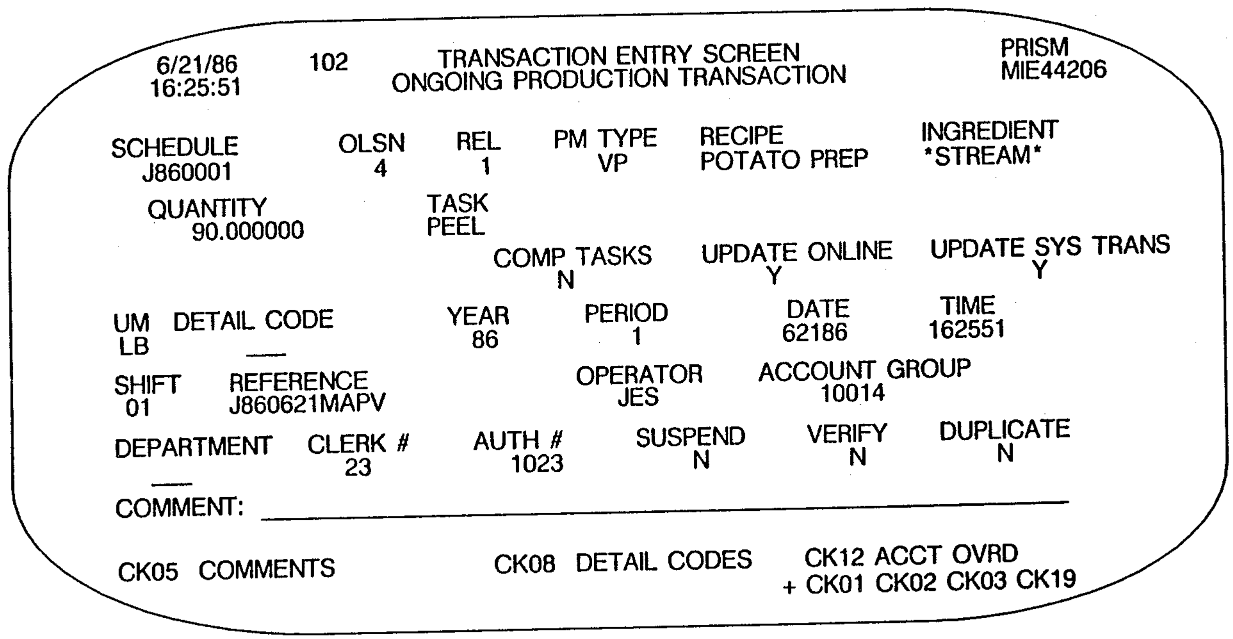

(See Figure 53)

The Ongoing Production Transaction Screen is displayed when you:

(1) enter ON in the entry field on the Transaction Selection Screen and press ENTER;

(2) select an ON transaction for review from the Transaction Review Screen.

Enter an ON transaction to report stream resources produced from an ongoing schedule release. The only differences between an ON and a PR transaction stem from the fact that a PR is for a non-stream and an ON is for a stream resource.

For example, PR allows you to enter the warehouse and location to which the produced resource is received. Because stream resources are by definition not received to locations, but are sent on to the next task, you do not enter warehouse, location, or any location-associated information with an ON. Similarly, the on order quantity of a resource is not changed by an ON transaction, so you do not enter a transaction amount with it.

A consumed stream resource always has a theoretical consumption code of T (theoretical consumption), because you are consuming exactly what you produced in the previous task. The quantity entered with an ON transaction determines the quantity of the consumed stream resource that is theoretically consumed by the next task.

Field for Display

- RESOURCE—An ON transaction is always for a stream resource, so this field is not available for entry. The word "STREAM" is displayed.

Fields for Entry

- SCHEDULE—schedule number against which ON is being entered.

OLSN

Rel—release number.

PM Type/* PM Name—If you enter both OLSN and PM type/PM name combination, they must correspond to each other. If you enter one or the other, the system retrieves the corresponding OLSN or production model.

Quantity—quantity of the stream resource produced. This quantity can be positive or negative. You would enter a negative ON to reduce the reported quantity before the task is complete. After the task is completed, only RA (resource adjustment) transactions can be entered to adjust the produced quantity. This quantity can be zero only if the Comp Tasks field is Y. This allows you to enter a transaction just to complete the task, in case you forget to do so when reporting the last of the produced resources for this task.

TASK—task for which stream resource is being reported.

COMP TASKS—Enter Y to designate this task and all preceding tasks on this release as complete.

UPDATE ONLINE—available for entry only if the answer to tailoring question #T10 is Y. This field indicates whether this transaction is to be updated online or in batch. The default is from tailoring question #T9.

UPDATE SYS TRANS—available for entry only if the answer to tailoring question #T10 is Y. This field determines whether the system-generated transactions caused by this ON transaction are updated online or in batch. If the ON transaction is updated in batch, the system-generated transactions cannot be updated online. The default for this field is from tailoring question #T9.

UM—unit of measure for the Quantity. This UM must be convertible into the UM defined for this stream resource on this release of the PM.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Return to Production Transaction Screen—MIE44207

Figure 54:
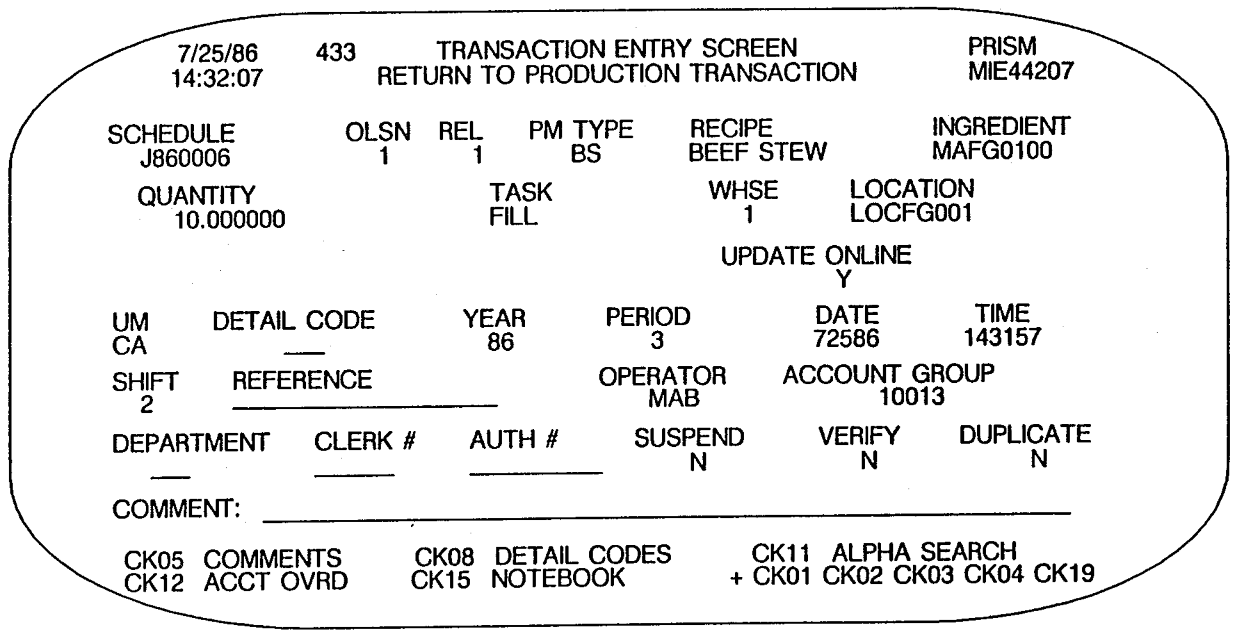

(See Figure 54)

The Return to Production Transaction Screen is displayed when you:

(1) enter RT in the entry field on the Transaction Selection Screen and press ENTER;

(2) select an RT transaction for review from the Transaction Review Screen.

Enter an RT transaction when you need to return an already-produced resource to the production floor, for example for rework. When you update an RT transaction, the system reduces the quantity of this resource produced to date from this task by the quantity returned to production.

However, the quantities of resources consumed are NOT reduced, because they were already used to produce what was received to stock. This is an important distinction between the RT and PR (production receipt) transactions. When you enter a negative PR transaction, you are saying that that quantity was never produced. The RT transaction, on the other hand, says that the quantity was produced but has to be reworked.

Fields for Entry

* SCHEDULE—schedule number against which RT is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—resource being returned to this task for more work. You cannot enter this transaction for a non-balance resource, because such a resource would not have been received to a location.

QUANTITY—quantity of this resource returned to the production floor. If some of the quantity being returned has already been reserved for other schedules or for sales, you may have to back out a portion of the reservations before finishing the RT.

This quantity must be greater than zero. When the reworking is finished, do not enter a negative RT: enter a new PR transaction. Note that the PR will cause additional consumption of theoretically consumed or calculated cost resources. If the quantities consumed by rework are actually less than those consumed by regular production, you must enter RA (resource adjustment) transactions to correct this.

Task—task to which this resource is being returned. This MUST be the task that originally produced the resource. If this resource is only produced by one task on the PM for this release, you can leave this field blank. The system retrieves the correct task name.

Whse/Location—Enter the warehouse and location from which you are returning this resource to the task.

Note: If you answer Y to tailoring question #G2, the Whse field is not available for entry. It is displayed with the system warehouse defined in tailoring question #G1.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file, for the lot number associated with this resource at this location. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Return to Stock Transaction Screen—MIE44208

Figure 55:
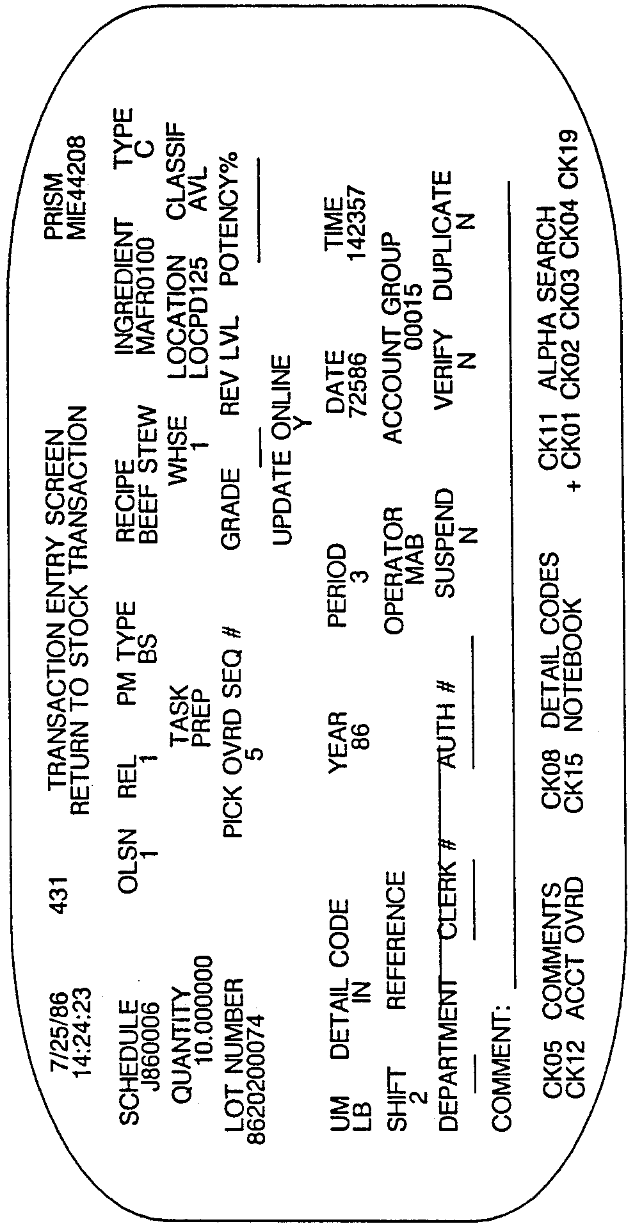

(See Figure 55)

The Return to Stock Transaction Screen is displayed when you:

(1) enter RS in the entry field on the Transaction Selection Screen and press ENTER;

(2) select an RS transaction for review from the Transaction Review Screen.

The RS transaction is the opposite of a DI (direct issue). Use this transaction when you issue a quantity of a consumed resource to a task, and not all of it is actually used. The unused quantity that is returned to stock is the quantity for this transaction.

Fields for Entry

° SCHEDULE—schedule number against which RS is being entered.

OLSN

Rel—release number.

PM Type/* PM Name—If you enter both OLSN and PM type/PM name combination, they must correspond to each other. If you enter one or the other, the system retrieves the corresponding OLSN or production model.

° RESOURCE—must be a balance resource, because otherwise you would not return it to a specific warehouse/location.

QUANTITY—quantity being returned to the warehouse. This quantity must be positive. For a potent resource, enter the physical quantity, not the potent units. The system will calculate the potent units using the entered Potency.

Task—required if this resource is consumed by more than one task on this production model. If that is not the case, the system can retrieve the correct task name.

WHSE/LOCATION—Enter the warehouse and location to which the resource is being returned. It does not have to be returned to the same warehouse/location from which it was consumed.

Note: If you answer Y to tailoring question #G2, the Whse field is not available for entry. It is displayed with the system warehouse defined in tailoring question #G1.

Classif—location classification code for the location to which this resource is returned.

Lot Number—required if both resource and location classification are lot-controlled (see *Location Classification Code Maintenance*, Section 1-4).

Pick Ovrd Seq #—pick list override sequence number for this resource at this location. You can use this field to enter the pick list override sequence number for a new location or change its value at an existing location, if a record for this warehouse/location/resource already exists.

* Grade—of the resource being returned.

Rev Lvl—revision level of this resource being returned.

Potency %—potency of this resource being returned. For information on how PRISM handles potent resources, see *RM Concepts*, Section B.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

For the remaining fields for entry on this screen, see "Common Fields," earlier in this section.

Field for Display

Type—for display only, because only consumed resources can be used with this transaction. This field is always C.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed.

CK19—When entering new transactions, press CK19 to return to the Transaction Selection Screen without saving or updating the current transaction. When reviewing transactions, press CK19 to return to the Transaction Review Screen without saving any changes you have made.

SECTION XI-V

Theoretical Consumption Codes

Each *consumed* resource on a task is assigned a theoretical consumption code, which indicates the method used to track consumption.

(1) If the code is D, it is a direct-issue resource. A DI (direct issue) transaction is entered to issue this resource to a schedule. You would normally issue it from a location where it has already been reserved for that schedule.

(2) If the code is C, it is a calculated cost resource. Suppose you make wagons, and you use 2,000 screws to make a batch of 100. You never take the trouble to assign a particular 2,000 screws to a particular schedule: you just know you use 20 screws per wagon. When you bring screws from the warehouse to the production floor, you bring them in barrels of 5,000.

To reproduce this situation in PRISM, you would enter an IP (issue to production) transaction each time a barrel of screws is brought from the warehouse. This reduces inventory by the appropriate quantity. Then, each time you report produced wagons (with a PR (production receipt) transaction), the system "consumes" the appropriate number of screws for you. If you enter a PR for 50 wagons, for example, the system generates a CC (calculated cost) transaction for 1,000 screws, because you use 20 screws for each wagon.

It is not a good idea to use the calculated cost method for resources with lot numbers. Suppose you work with food products, and you use an IP transaction to issue two entire lots of tomatoes to the production line. When you enter PR transactions for your tomato soup, tomato paste, vegetable soup, and so on, the system generates CC transactions for the appropriate quantities of tomatoes. However, it has no way of knowing which lot of tomatoes went into each product: they were not issued to particular schedules, just to the floor. Obviously, this would be an undesirable situation if you ever needed to trace the sources of your ingredients.

(3) If the code is T, it is a theoretical consumption resource. You can use this code for a balance or non-balance resource. You might use it for a non-balance resource like electricity, for example, if you know you use 1 KwH for every 100 wagons you manufacture. If you enter a PR for 50 wagons, the system generates a TC (theoretical consumption) transaction for .5 KwH of electricity. You could also use this code for a very inexpensive balance resource.

There are three major differences between the calculated cost and theoretical consumption methods:

(1) Calculated cost is for balance resources only. This is because you must enter an IP (issue to production) transaction, which implies that you are issuing something from a location in a warehouse. A non-balance resource is not stored in a location, so it cannot be issued to production.

(2) Reservations are not created for calculated cost resources. A reservation ties a particular quantity of a resource, at a particular location, to a specific schedule. This is not the way calculated cost resources are handled: they are issued to the production floor, for use in any schedule, through an IP transaction.

On the other hand, reservations are created for theoretical consumption resources. When you enter the PR transaction, the resource is "consumed" from the locations where it is reserved.

(3) Calculated cost requires two steps, while theoretical consumption requires only one. For a calculated cost resource, you must enter an IP transaction and a production receipt transaction. For a theoretical consumption resource, you need only enter the production receipt transaction.

Theoretical Production

Theoretical production occurs when a task has a non-reportable produced resource. Each task on a production model can have at most one non-reportable produced resource, so that the system can use the quantities of the other produced resource(s) to calculate the quantity produced of the non-reportable resource.

Suppose you have a task that involves taking chickens apart. Part of the task is to pluck the feathers, but the feathers are not valuable enough for you to bother reporting the exact quantity produced. In general, you know that you "produce" two ounces of chicken feathers for each chicken plucked.

For this task, you might define the chicken feathers as a non-reportable produced resource. Such a resource is "theoretically produced." This means that when you enter the ON or PR transactions for the other produced resources on the appropriate task (usually the same task that produces the chicken feathers), the system uses those transactions to calculate the quantity of chicken feathers produced. The system then generates a TP (theoretical production) transaction for that quantity.

Suppose one batch of this task consumes one chicken. For each chicken consumed, this task produces two ounces of feathers, two legs, two breasts, and two wings. The production distribution percentages defined for each produced resource are:

Feathers—must be zero because the resource is non-reportable.

Legs—30 percent

Breasts—40 percent

Wings—30 percent

You have entered a PR for 6 legs. Using the PR quantity, the batch size, and the production distribution percentages, the system calculates a quantity for the feathers and generates a TP transaction for that quantity. This is done as follows:

Qty of Feathers = # batches for PR x prod dist % for resource on PR x batch size of feathers The PR for 6 legs represents 3 batches (2 legs per batch of 1 chicken), the production distribution percentage for legs is 30, and one batch produces 2 ounces of feathers. So:

| |
|---|
| Qty of Feathers = 3 x .30 x 2 = 1.8 ounces |

The PR for 6 chicken legs results in a system-generated TP transaction for 1.8 ounces of feathers. For each subsequent PR transaction (for legs, breasts, or wings), another TP transaction is generated for the appropriate quantity of feathers.

Quiz yourself. Suppose you now enter a PR transaction for 4 chicken breasts:

(1) What will be the quantity for the corresponding TP transaction? (Your result should be 1.6 ounces.)

(2) After the new TP is updated, what will be the total quantity of chicken feathers produced to date? (Your result should be 1.8 + 1.6 = 3.4 ounces.)

SECTION XI-VI

Theoretical Production

Theoretical production occurs when a task has a non-reportable produced resource. Each task on a production model can have at most one non-reportable produced resource, so that the system can use the quantities of the other produced resource(s) to calculate the quantity produced of the non-reportable resource.

Suppose you have a task that involves taking chickens apart. Part of the task is to pluck the feathers, but the feathers are not valuable enough for you to bother reporting the exact quantity produced. In general, you know that you "produce" two ounces of chicken feathers for each chicken plucked.

For this task, you might define the chicken feathers as a non-reportable produced resource. Such a resource is "theoretically produced." This means that when you enter the ON or PR transactions for the other produced resources on the appropriate task (usually the same task that produces the chicken feathers), the system uses those transactions to calculate the quantity of chicken feathers produced. The system then generates a TP (theoretical production) transaction for that quantity.

Suppose one batch of this task consumes one chicken. For each chicken consumed, this task produces two ounces of feathers, two legs, two breasts, and two wings. The production distribution percentages defined for each produced resource are:

Feathers—must be zero because the resource is non-reportable.

Legs—30 percent

Breasts—40 percent

Wings—30 percent

You have entered a PR for 6 legs. Using the PR quantity, the batch size, and the production distribution percentages, the system calculates a quantity for the feathers and generates a TP transaction for that quantity. This is done as follows:

Qty of Feathers = # batches for PR x prod dist % for resource on PR x batch size of feathers The PR for 6 legs represents 3 batches (2 legs per batch of 1 chicken), the production distribution percentage for legs is 30, and one batch produces 2 ounces of feathers. So:

| |
|---|
| Qty of Feathers = 3 x .30 x 2 = 1.8 ounces |

The PR for 6 chicken legs results in a system-generated TP transaction for 1.8 ounces of feathers. For each subsequent PR transaction (for legs, breasts, or wings), another TP transaction is generated for the appropriate quantity of feathers.

Quiz yourself. Suppose you now enter a PR transaction for 4 chicken breasts:

(1) What will be the quantity for the corresponding TP transaction? (Your result should be 1.6 ounces.)

(2) After the new TP is updated, what will be the total quantity of chicken feathers produced to date? (Your result should be 1.8 + 1.6 = 3.4 ounces.)

SECTION XII

SECTION XII-I

Distribution % Screen—MDE04015

(See Figure 56)

Selecting CK11 from either Resource Maintenance Screen displays the Distribution % Screen. PRISM requires that the production and cost distribution percentages for all produced resources on a task add up to 100.

The Production Distribution tells what percentage of resources went into making this produced resource. In our cardboard box example, large boxes use more cardboard than small boxes. So the Production Distribution % for large boxes might equal 60 percent, while the % for small boxes is 40 percent.

Similarly, the Cost Distribution tells what percentage of the total cost of a task is attributed to each produced resource. You use more resources to produce large boxes, so they deserve a higher Cost Distribution %.

Note: When defining a superflushable PM, you must display this screen and define the distribution percentages for its one produced resource.

Fields for Display

PM Type—appears only during PM Maintenance.

* PM Name—appears only during PM Maintenance.

Task Name.

* Resource—PRISM lists the number of each produced resource defined for the task.

Description.

Qty Rel To Task Batch—This is the quantity of resource produced from one task batch.

UM—unit of measure for the above quantity.

Fields for Entry

COST DIST %—PRISM displays the cost distribution percentage, if any, assigned to the resource on the Resource Maintenance Screen. You may enter or adjust this percentage field. The sum of cost distribution percentages for all resources displayed on the screen must equal 100.

PRODUCTION DIST %—PRISM displays the production distribution percentage, if any, assigned to the resource on the Resource Maintenance Screen. You may enter or adjust this percentage field. The sum of production distribution percentages for all resources displayed on the screen must equal 100.

Note: If certain program messages are overridable, you may use CK17 to update and exit this screen even if your percentages do not equal 100. You must, however, adjust the percentages before you are allowed to exit PM Maintenance.

Command Function Keys

ENTER—Press ENTER to update the new cost and production distribution percentages and return to the Resource Maintenance Screen.

CK18 REFRESH SCREEN—Use CK18 to redisplay the distribution percentages that were in place when the screen first appeared.

CK19 RETURN WITHOUT UPDATE—Use CK19 to redisplay the Resource Maintenance Screen without update.

SECTION XII-II

Distribution % Screen—MDE04015

This screen displays the cost distribution and production distribution percentages for all produced resources on a task. The screen appears if the user uses CK11 from the first Resource Maintenance Screen.

This subfile is built one page at a time. The values on this screen are for display only if this is a dependent PM. Also, if the resource is non-reportable, the Production Distribution % field is not available for entry. And if the resource is defined as having net realizable value, the Cost Distribution % field is not available for entry.

Display-Only Fields:

PM Type (PM Maintenance only)
PM Name (PM Maintenance only)
Task Name
Resource Number
Description
Quantity Relative To Task Batch Size in Std UM
Resource Standard UM Entry Fields:

Cost Distribution %
Production Distribution %

Edits:

A resource cannot have a cost distribution percentage that is greater than 100.

The total of all cost distribution percentages for resources on the task must equal 100.

A resource cannot have a production distribution percentage that is greater than 100.

The total of all production distribution percentages for resources on the task must equal 100.

Command Keys (Display):

CK18 Refresh Screen
CK19 Return without Update

Command Keys (Non-Display):

HELP Display Additional Text
CK07 Send Message to Action List

SECTION XII-III

Miscellaneous Receipt Transaction Screen—MIE44213

Figure 57:
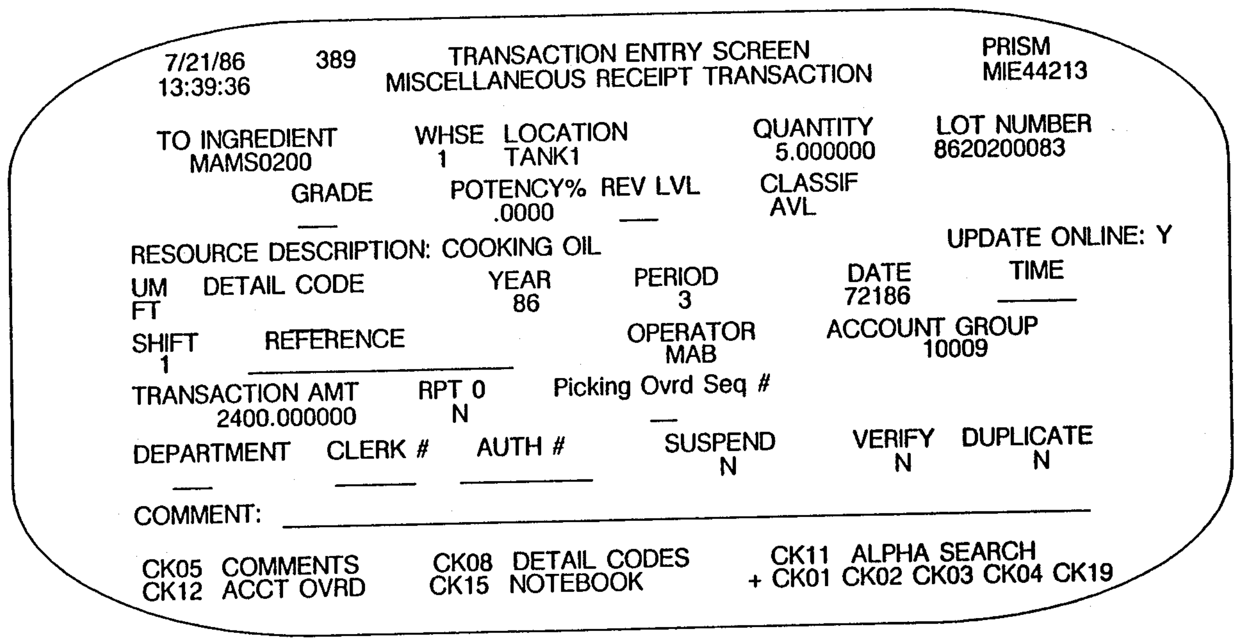

(See Figure 57)

The Miscellaneous Receipt Transaction Screen is displayed when you:

(1) enter MR in the entry field on the Transaction Selection Screen and press ENTER;

(2) select an MR transaction for review from the Transaction Review Screen.

An MR transaction is the opposite of an MI (miscellaneous issue) transaction. Enter MR transactions to record inventory received other than from a purchase order or schedule. For example, when first installing PRISM, you use MR transactions to record the resources you currently have in each location. Because you may enter MRs for a number of different reasons, you should probably use transaction detail codes to distinguish between them.

Fields for Entry

* TO RESOURCE—resource being received. This can be a non-balance resource, but there must be a Resource Balance (RESBAL) record for it.

WHSE/LOCATION—Enter the warehouse/location where this resource is now stored.

Note: If you answer Y to tailoring question #G2, the Whse field is not available for entry. It is displayed with the system warehouse defined in tailoring question #G1.

QUANTITY—quantity miscellaneously received. This must be a positive number. To reverse an MR transaction, enter an MI transaction with a positive quantity. Enter the quantity of a potent resource in physical rather than potent units.

Lot Number—of this resource at this whse/location, required if both the resource and the location classification are lot-controlled. If you are having the system generate lot numbers and you want to see the number generated, enter Y in the Verify field and press ENTER.

* Grade—of this resource at this whse/location.

Potency %—potency of this resource at this location. For information on how PRISM handles potent resources, see *RM Concepts*, Section B.

Rev Lvl—revision level of this resource at this whse/location. This must be greater than or equal to the earliest acceptable revision level defined for this resource in the Resource Master (RESMST) file.

Classif—location classification code for this resource at this location. This field is required if you are receiving to a new location.

UPDATE ONLINE—available for entry only if the answer to tailoring question #T10 is Y. This field indicates whether this transaction is to be updated online or in batch. The default response is from tailoring question #T11.

UM—unit of measure for the Quantity. This UM must be convertible into the standard UM for the resource.

Transaction Amt—dollar value of this transaction. This field defaults to quantity times selected unit cost for the resource, if you answer Y to the MR portion of tailoring question #T41. The transaction amount can be zero only if you enter Y in the Rpt 0 (report zero transaction) field.

RPT 0—If the Transaction Amt field is zero, the Y or N in this field tells the system whether the zero means that (Y) you have entered a transaction amount of zero or (N) you have not entered a transaction amount. If the transaction amount is zero (if this field is Y), the default from #T41 is not used.

Picking Ovrd Seq #—picking override sequence number for this resource at this location.

For the remaining fields for entry on this screen, see "Common Fields," earlier in this section.

Fields for Display

The following information is for display only. To have it displayed when entering a new transaction, use the Verify field.

Resource Description—from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information.

When you press CK04, the Location Prompting Screen is displayed. For a detailed description of the Location Prompting Inquiry, see *Location Master File Maintenance*, Section 1–6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6–1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1–5, *Notebook File Maintenance*, and 1–6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

SECTION XII-IV

Miscellaneous Receipt—MIE44213

An MR Transaction is the opposite of an MI transaction. It is a way for the user to record the addition of inventory for some reason other than production or receipt from a purchase order.

Updates

Reminder: This section only contains updates for those files and fields that require a detailed explanation. For the remainder of the updates, please see the *Summary of Transaction Updates* table.

• *LOCDTL (Existing record):*

Quantity at Location in last received UM:

To update this field, the program:

a. converts the transaction qty into std UM.
b. adjusts the qty at the location in std UM.
c. converts the qty at location in standard UM to last received UM and uses this amount to update the Quantity at Location in last received UM.

Shelf life expiration date is updated based on a tailoring question.

Should the shelf life expiration date be:

A. the date at the to location;

B. trans date + # of shelf life days?

FIFO date is updated based on the tailoring question below:

Should the FIFO date be:

A. the FIFO date of the to location;

B. the transaction date?

Last Received UM = Transaction UM

Date Last Received = Transaction Date

Time Last Received = Transaction Time

Trans # of last receipt = Transaction Number

Potency Factor is calculated. Note: Refer to the example in the description of a TR transaction for the potency factor calculation.

- *LOCDTL (New record):*

Location # = To Location # from entry screen.

Warehouse = To Warehouse from entry screen.

Resource = Resource # from entry screen.

Grade is from entry screen.

Lot # is from entry screen.

Quantity at location (Std) = Transaction Quantity converted to Std UM.

Standard UM is taken from the RESMST.

Resource Class is extracted from RESMST.

Resource Sub-Class is extracted from RESMST.

Quantity in Last Received UM = Transaction Quantity

Last Received UM = Transaction UM

Potency Factor is taken from entry screen.

Revision Level is from entry.

Classification Code is from entry.

All Classification bytes is from to CLASCD.

Quantity Reserved—manufacturing is set to zero.

Quantity Reserved—sales is set to zero.

Last Date Received equals user-entered transaction date.

Last Time Received equals user-entered transaction time.

Transaction Number of last receipt equals transaction number.

FIFO date equals the transaction date.

ETD—The program calculates this by:

a. CHAINing to the CLASCD file to find the # of days expected in that classification;

b. determining whether the # of days is expressed in calendar days or work days (CLASCD).

c. calculating new ETD.

Picking Override Sequence # defaults to LOCMAS then to tailoring.

Shelf Life Expiration date is calculated using shelf life days.

- *LOCMAS (New record):*

Warehouse = entered Warehouse
  Location = entered Location
  Date Last Maint = User-entered Transaction Date

- *LOTMAS (Existing record):*

Last Receipt date
  Total Lot Quantity received increased using Transaction Quantity in Std UM.

- *LOTMAS (New record):*

Lot Number = To Lot Number from entry screen
  Resource = entered Resource
  Schedule = Blanks
  OLSN = zeros
  Release Number = zero
  PM Type = Blanks
  PM Name = Blanks
  Ref # = Blanks (This is not the field from the entry screen, but the reference # from the schedule.)
  First Receipt Date = Transaction Date
  Last Receipt Date = Transaction Date
  Total Lot Quantity Received = Transaction Qty (In Std UM)
  Initial Receipt Quantity = Transaction Quantity (in Std UM)
  Code = Blank
  Vendor # and Name = Blanks
  Lot Quantity Issued = zero
  Lot Quantity Shipped = zero
  Lot Quantity Misc Disposed Of = zero
  Total Lot Quantity Received = Transaction Qty (in Std UM)

- *RESBAL:*

Number of transaction since the last cycle count
  Total quantity present is increased using Trans Quantity in standard UM.

In addition to the above update for the Total Quantity Present, if the Location is On Order = N and a transaction amount is entered, the Historical Average Cost field and the Rolling Average Cost with Alpha Factor field are also updated.

Calculation of New Historical Average Cost $$\frac{(A \times B) + C}{(B + D)}$$

A = Previous average cost (RESBAL)
B = Total quantity present (before trans)
C = Transaction amount
D = Transaction quantity in standard UM

| Calculation of Rolling Average Cost with Alpha Factor |
|---|
| ( A x alpha factor ) + { B x ( 1 - alpha factor)} |
| A = unit cost of transaction<br>B = rolling average cost with alpha factor (before trans)<br>Unit cost of trans = transaction amount |

Quantity On Hand (only if the To Location is classified as On Hand = Yes) is increased using Trans Quantity in standard UM.

Quantity On Order increased only if the To Location is classified as On Order = Yes.

Date Last Activity = Transaction Date

Date Last Effect on On Hand Quantity: If To Location is classified as On Hand = Yes, today's date is the Date of Last Effect.

- *TRHIST:*

All fields from TREBAT are updated.

Transaction quantity in Standard UM is updated.

Transaction Amount was entered Y/N: If the operator entered anything into this field, even zero, this byte is set to Y. (This is needed for the accrual report.)

Effect on Inventory $ = (+, -, or blank): If the To Location is Inventory $ = YES, byte is set to "+".

Effect on Non-planning Quantity: If the To Location is Available for planning = 0, this byte is set to "+".

Resource Class

Resource Sub-Class

- *TRCTRL:*

The following fields are updated even if this is NOT online updating. This is in addition to the list at the beginning of the transaction summary section.

Number totals for ADJUSTMENT transactions

Transaction amount was entered Y/N? This field reflects the Report 0 Amount that is displayed on the screen. If the operator entered a trans amount, then this field is set to N (i.e., the user is not reporting a zero quantity). If the operator entered zero as a trans amount, this field is set to Y (i.e., the user is reporting a zero amount).

Received from On Order byte is left blank.

Effect on Not On Order byte is left blank

All other transactions leave this byte blank.

Display-Only Fields:

Resource Description

Entry Fields:

To Resource

To Warehouse

To Location

Quantity
To Lot Number
Grade
Potency %
Revision Level
Classification Code
Update Online Byte
Unit of Measure
Detail Code
Year
Period
Date
Time
Shift
Reference Number
Operator
Accounting Group
Transaction Amount
Report 0 Amount
Picking Override Sequence Number
Miscellaneous Field 1
Miscellaneous Field 2
Miscellaneous Field 3
Suspend Byte
Verify Byte
Duplicate Byte
Comment Required Fields:

To Resource
To Warehouse
To Location
Quantity
Classification Code
Update Online Byte
Transaction Amount
Report 0 Amount
Suspend Byte
Verify Byte
Duplicate Byte Defaults:

If the system is tailored for single warehouse support, the warehouse defaults to tailoring.
Potency Factor defaults to LOCDTL.
The grade defaults to LOCDTL then to RESMST.
The Lot Number defaults to tailoring (T2).
The Unit of Measure defaults to the Last Received Unit of Measure in LOCDTL. If blank or no LOCDTL record exists, the standard UM (RESMST) is used as the default.
The Revision Level defaults to RESMST.
The Classification Code defaults to LOCDTL, then to RESMST and finally to tailoring (T18).
Account Group Number defaults to TRDTCD, then to tailoring.
Year defaults to the current year in tailoring.
Period defaults to the current period in tailoring.
Date defaults to the system date.
Time defaults to the system time.

Update Online byte defaults to tailoring.

Shift Number defaults to the Session Status Screen.

Operator's Initials default to the Session Status Screen.

If the Picking Override Sequence Number is Active, then defaulting is as follows:

If the To Location is a new location:
1. screen entry if not equal to zero;
2. Location Master if not equal to zero;
3. the From location value if one exists;
4. tailoring.

If the To Location already exists:
1. screen entry if not equal to zero;
2. unchanged at the existing location.

If the Picking Override Sequence Number is inactive, the default is tailoring.

Edits:

Transaction Type is checked to make sure the user is authorized.

The Resource Number is required.

The Resource must exist in RESMST.

The Resource/Warehouse must exist in RESBAL.

Warehouse is protected if single warehouse support exists.

The Location is required.

The Quantity cannot be zero.

The Quantity cannot be negative.

The Lot Number is required if Lot Tracking = Y and if Lot Tracking is active.

The Lot Number must be the same as the one in LOCDTL.

An edit is done to see if the Grade entered is the same as the Grade in LOCDTL.

An edit is done to see if the entered Revision Level is greater or equal to the earliest acceptable Revision Level in RESMST.

An edit is done to see if the entered Revision Level is the same as the one in LOCDTL.

The Classification code is required if a record exists in LOCDTL for the Resource/Warehouse/Location.

An edit is done to see if the entered classification code is the same as the one in LOCDTL.

The Classification Code must be ACTIVE.

The Classification Code is required if there is no LOCDTL record.

The Update Online byte must be Y or N.

If the unit of measure is entered, it must be convertible to the standard unit of measure The Transaction Detail Code must be valid.

The Period cannot be closed.

An edit is done to see if the entered period is greater than the number of periods in a year.

The date must be valid.

The time must be valid.

An edit is done to see if the Transaction Amount is blank.

The Report 0 Amount must be Y or N.

The Report 0 Amount cannot be Y if the Transaction Amount has been entered.

The Suspend byte must be Y or N.
The Verify byte must be Y or N.
The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

SECTION XIII

SECTION XIII-I

When To Use Resource Master Maintenance

Option 13 allows you to maintain the Resource Master (RESMST) file. This file contains information about each resource used in your system.

You assign a resource class and sub-class to each resource in this file. If you define your classes and sub-classes so that the resources in those categories have a number of common characteristics, many fields in Resource Master Maintenance need not be entered. You can simply allow the appropriate information to "default from" the corresponding Resource Class or Resource Sub-Class file record. See *RM Concepts*, Section B, for a detailed discussion of the PRISM defaulting system.

How To Use Resource Master Maintenance

When you select Option 13 from the File Maintenance Menu (MI10), the Resource Master Maintenance Selection Screen is displayed. Use this screen to identify the resource you want to maintain.

Selection Screen—MIE18001

Figure 58:
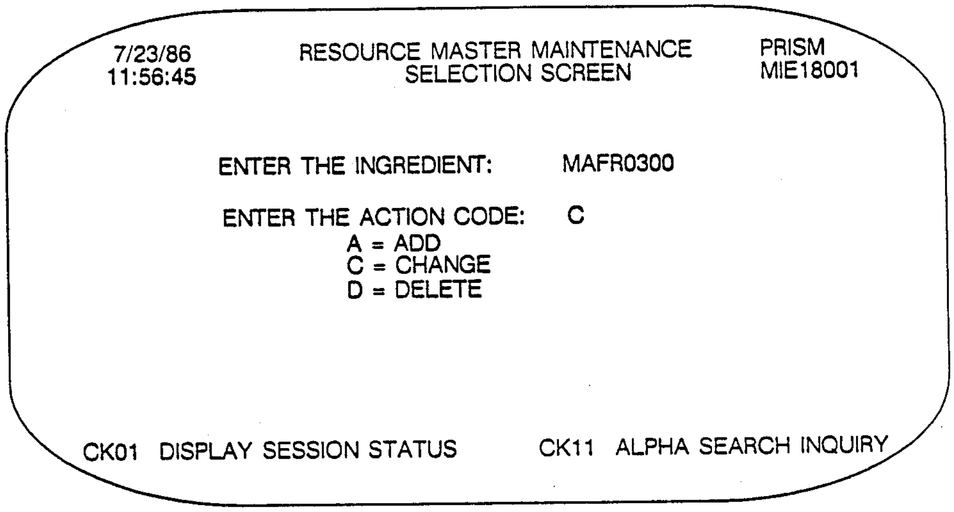

(See Figure 58)

Fields for Entry

- Resource—required entry with action code A. Enter the number of the resource you want to add, change, or delete.

If you are planning to install Resource Processor (RP), you may want to name your work centers for the resources produced there. In this case, your resource numbers can be no more than five characters long, because that is the length of the Work Center field. This method of naming work centers also comes into play when you create a dependent resource for an operation. See the Operation Maintenance Screen in Production Model Maintenance (Section 1–4 of the RP reference manual) or Schedule Maintenance (Section 7-3 of this manual).

ACTION CODE—Enter A to add a new resource, C to change an existing resource, or D to delete an existing resource.

If you are adding a resource and the answer to tailoring question #G15 or #G32A is Y (depending on whether it is a balance or non-balance resource—see Data Screen MIE18002), Resource Balance (RESBAL) file records are automatically generated for that resource. Each of these tailoring questions has an associated question that determines which warehouses are used.

For example, when adding a balance resource, if tailoring question #G15 is Y and the response to tailoring question #G16 includes warehouses A, B, and C, then Resource Balance records are created for this resource in those warehouses.

Command Function Keys

ENTER—Press ENTER after entering the resource number, to proceed to Data Screen MIE18002.

CK01 DISPLAY SESSION STATUS—Press CK01 to display the session status screen, which shows the number of records in the Resource Master file you have added, changed, and deleted during this session. When you exit Resource Master Maintenance by pressing CK01 from that screen, a register is automatically printed. This register shows all records added, changed, and deleted during this maintenance session, with the current data for each.

CK11 ALPHA SEARCH INQUIRY—Press CK11 to display the Alpha Search Inquiry Screen, if you do not know the number of the resource you want to maintain. This inquiry allows you to find the number you need using information you already have, such as a partial description. You can then select the correct resource number from a list and have the system return that number to this screen. For more information about the Alpha Search Inquiry, see Section 6–1.

CK20 DELETE—After entering action code D, you can choose one of two methods to remove the record:

(1) Press CK20. This removes this record from the file immediately.

(2) Press ENTER. This displays Data Screen MIE18002 with the information for the record you are attempting to delete. At that point a message is displayed, instructing you to press CK20 to confirm that you want to delete the record. From that screen you can also press ENTER to display further data screens, or press CK19 to return to the selection screen without removing the record.

Data Screen MIE18002

(See Figure 59)

This data screen is displayed when you press ENTER on the selection screen. Here, if the action code is A (add) or C (change), you can enter the attributes associated with this resource number. If the action code is D, all fields on this screen are for display only.

Fields for Display

- Resource

Date Last Maint—date this resource was last updated. If you are adding a new resource, this is today's date.

Action—The word ADD, CHANGE, or DELETE is displayed here, depending on the action code.

Date ABC Code Last Updated—date the ABC Report (see Section 2-1) was last used to update the ABC code for this resource.

# of Times Resource is Used—used only if this is a potent resource (Potent Resource = Y: see Data Screen MIE18004) with a Potency Factor greater than zero. This is the number of tasks on production models that produce or consume this potent resource. The system updates this field when you run the Potent Resource Usage Counter (see Section 5-2 of the RP reference manual).

Fields for Entry

CLASS—resource class to which this resource belongs.This field is available for entry only when the action code is A (add). To change a resource class, you must use Option 6 from the Batch Update Menu (MI90).

SUB-CLASS—resource sub-class to which this resource belongs. This field is available for entry only when the action code is A (add). To change a resource sub-class, you must use Option 6 from the Batch Update Menu (MI90).

Description—Enter up to 30 characters of description for this resource.

STANDARD UNIT OF MEASURE—unit of measure for this resource. This field is available for entry only when the action code is A (add).

Earliest Acceptable Revision Level—Enter the lowest revision level of this resource still acceptable for use.

Current Revision Level—current revision level of this resource.

Service Level (%)—used in future PRISM modules. Default from Resource Sub-Class (RESUBC) file loaded.

Balance Resource Code (B/C)—Enter B if this is a "balance" resource, one for which you keep track of balances in locations. Enter C if this is a "count up" resource, one whose usage you track but for which you do not keep location balances. Labor, for example, might be a "count up" resource. Default from Resource Sub-Class (RESUBC) file loaded.

ABC Code—user-maintained or updated by the system. This code indicates which resources are most important. You define a percentage for each code (A, B, and C), adding up to 100, and assign a code to each resource. If the percentage for code A is 15, for example, then ABC code A should be assigned to the 15 percent of your resources that are most important (based on the method defined in tailoring question #G20). You can also have the system calculate the ABC code for each resource when the ABC Report is printed, and load the appropriate code for each resource into this file.

Shortage Flag (Y/N)—indicates whether there is a shortage of this resource. If you launch a schedule and the system cannot reserve the entire allocated quantity of the resource (there is an insufficient quantity of the resource in on hand location classifications in the warehouse), this field is changed from N to Y.

Periodically, you run the Reset Resource Shortage Flag program (see Section 9-5) to change this field back to N for resources that no longer have shortages. You can also change this field to Y or N manually.

Miscellaneous Field 1—Miscellaneous fields 1-3 are available for you to enter any resource information you need that is not covered by the existing fields in the Resource Master file. It is recommended that you determine a consistent meaning for each field: Miscellaneous Field 1 should not mean "department number" for resource 200 and "sales rep name" for resource 202.

Miscellaneous Field 2—see MISCELLANEOUS FIELD 1.

Miscellaneous Field 3—see MISCELLANEOUS FIELD 1.

Amounts or percentages for variable and fixed overhead are added to the cost of a resource to account for the overhead cost accumulated when using that resource. The following eight fields allow you to determine how these overhead figures are calculated for this resource.

If you allow the answers for all four variable overhead fields to default from the Resource Sub-Class (RESUBC) file, those defaults are used but are not loaded into the Resource Master file. If you override one or more defaults, all four fields are loaded into the file. A similar rule is followed for the four fixed overhead fields. For more information about the PRISM defaulting system, see *RM Concepts*, Section B.

Variable Overhead Table/Rate (T/R)—Enter T if the variable overhead rate for this resource is to be taken from a table. In this case, you must enter a valid table value from the Overhead Rate (OVRHDF) file in the Variable Overhead Table Value field. Enter R if the overhead rate is specified here. In this case, you must enter a Variable Overhead Rate and Code.

Variable Overhead Table Value—Enter the table value to be used, if the Table/Rate field is T. Each valid table value defined in the Overhead Rate file is associated with a rate and an overhead code.

Variable Overhead Rate—Enter the variable overhead rate, if the Table/Rate field is R. The Variable Overhead Code determines whether this is a percentage (P) of the cost of the resource, or a dollar amount (D).

Variable Overhead Code (P/D)—Enter P if the Variable Overhead Rate is a percentage of the cost of the resource. Enter D if it is a dollar amount. If this field is P, the Variable Overhead Rate cannot be zero.

Fixed Overhead Table/Rate (T/R)—Enter T if the fixed overhead rate for this resource is to be taken from a table. In this case, you must enter a valid table value from the Overhead Rate (OVRHDF) file in the Fixed Overhead Table Value field. Enter R if the overhead rate is specified in this record. In this case, you must enter a Fixed Overhead Rate and Code.

Fixed Overhead Table Value—Enter the table value to be used, if the Table/Rate field is T. Each valid table value defined in the Overhead Rate file is associated with a rate and an overhead code.

Fixed Overhead Rate—Enter the fixed overhead rate, if the Table/Rate field is R. The Fixed Overhead Code determines whether this is a percentage (P) of the cost of the resource, or a dollar amount (D).

Fixed Overhead Code (P/D)—Enter P if the Fixed Overhead Rate is a percentage of the cost of the resource. Enter D if it is a dollar amount. If this field is P, the Fixed Overhead Rate cannot be zero.

Cumulative LT of Prime Costing PM—total lead time for the prime costing PM for this resource (see PRIME COSTING PM—TYPE/NAME, below). For more information, see *Cost Rollup*, Sections 2-2 and 2-3 of the RP reference manual.

Theoretical Cons Code (D/C/T)—default theoretical consumption code for this resource. Enter the letter corresponding to the method of consuming this resource. This field must be D if (1) tailoring question #G17 is N or (2) Batch Consumption Code for this resource is Y (see below). The first combination of entries causes a hard halt (severity code 0) message; the second displays a message that is either overrideable (severity code 1) or a hard halt. Default from Resource Sub-Class (RESUBC) file loaded. You have three options:

D = DIRECT. Use this code with resources you want to track most carefully, because it encourages precise tracking of the use of the resource. This means that a direct issue (DI) transaction must be entered to issue this resource to a particular task on a schedule release. A quantity issued in this way and then not used can be returned to the warehouse using an RS (return to stock) transaction.

C = CALCULATED COST. Use this code with balance resources you want "almost" theoretically consumed. The sequence of events for using such resources in production is as follows:

(1) Press ENTER. This displays the next data screen.
(2) Press CK20. This removes this record from the file and returns you to the selection screen.
(3) Press CK19. This returns you to the selection screen without removing the record.

Data Screen MIE18003

(See Figure 60)

This data screen is displayed when you press ENTER on Data Screen MIE18002. Here, if the action code is A (add) or C (change), you can enter the attributes associated with this resource number. If the action code is D, all fields on this screen are for display only.

Fields for Display

* Resource

Date Last Maint—date this resource was last updated. If you are adding a new resource, this is today's date.

Action—The word ADD, CHANGE, or DELETE is displayed here, depending on the action code.

Simulated Rollup Task Name—name of the task that produces this resource, on the production model most recently used to perform a simulated rollup of this resource.

Actual Rollup Task Name—name of the task that produces this resource, on its Prime Costing PM.

Date Last Rollup—date the Cost Rollup program was last run for the Prime Costing PM (see Data Screen MIE18002) for this resource. 0/00/00 if it has never been run or if there is no Prime Costing PM (for example, if this is a purchased resource).

Fields for Entry

RECALCULATE LEAD TIME (Y/N)—reserved for future PRISM enhancements.

Cost Rollup Costing Method—used only if RP is installed. Enter the letter corresponding to the cost figure you want to use. Default from Resource Sub-Class (RESUBC) file not loaded.

A—rolling average cost with alpha factor (RESBAL)

F—fixed cost (RESMST)

H—historical average cost (RESBAL)

L—last period's average cost (RESBAL)

R—cost from last rollup (RESMST)

S—standard cost (RESMST)

This code indicates the type of cost to be used for a consumed resource when needed to roll up the cost of a produced resource. For example, suppose the cost rollup program is calculating the cost of producing tomato paste. One of the ingredients in the tomato paste is tomatoes. This code tells the system what price to use for tomatoes in calculating the cost of tomato paste. For more information on the available cost figures, see *RM Concepts*, Section B.

Cost Rollup Type Code (F/N/V)—used only if RP is installed. Default from Resource Sub-Class (RESUBC) file not loaded.

Think of the cost of production as having three components: the actual cost of the consumed resources, plus adjustments for fixed and variable overhead. The cost of a produced resource is stored in three "buckets:"

(1) "Direct" cost. This is the total of costs directly attributable to production of this resource, for example materials.

(2) Fixed overhead. "Overhead" refers to costs not directly attributable to production of a particular resource. "Fixed" overhead means the costs in this category that stay the same regardless of your level of production. For example, if you rent your building, you pay a fixed amount every month, no matter how much beef stew or tomato paste you produce. This cost is not the direct result of producing any single resource, so you try to distribute it logically among some or all of your products.

(3) Variable overhead. These are overhead costs that vary with production. Electricity could be considered variable, for example if you use more to produce 100 cases of beef stew than to produce 50 cases.

The cost of each resource consumed in order to produce something is also stored in three buckets. In the "direct cost" bucket is the cost of this resource determined by the Cost Rollup Costing Method (see above). Let's say you have an L in that field, and the last period's average cost of this resource is $1.20.

On screen MIE18002 you defined the fixed and variable overhead costs for this resource. Let's say the fixed overhead is 10 percent, and the variable overhead is $0.05, a flat dollar amount for each unit consumed.

Suppose you use 100 units of this resource in running one batch of the production model. When rolling up the PM, the direct cost of this resource would be $120, the fixed overhead would be $12, and the variable overhead would be $5.

If this resource is beans being used to make beef stew, you would expect the direct cost of the beans to add to the direct cost of the stew, the fixed overhead for the beans to add to the fixed overhead bucket for the stew, and so on.

But what if this resource is electricity? Maybe you receive a single electric bill every month for the entire plant, but you also included electricity as a consumed resource on this production model. You might want the entire cost of the electricity—$131—added to the variable overhead bucket for the beef stew, because your accounting system considers electricity to be strictly an overhead item.

(1) Issue a quantity of the resource to the shop floor or production line using an IP (issue to production) transaction. This tells the system that this quantity has been taken out of inventory and to the shop floor, but does not indicate what task on what schedule release will actually use the resource.

This transaction causes the system to reduce the quantity of this resource in this warehouse (this information is in the Resource Balance (RESBAL) file), and to reduce the quantity of this resource at each location (information in the Location Detail (LOCDTL) file) from which it was picked.

(2) When you enter a PR (production receipt) transaction for a resource produced by the production model, you do not have to tell the system how much of this resource you used in this run of the PM. The system uses the quantity received from production to calculate how much of the consumed resource you must have used. It then automatically generates a CC (calculated cost) transaction for that quantity of the resource.

NOTE: The CC transaction alone does not reduce the system's estimate of the quantity of a resource in a warehouse or at a location (see step 1, above). This is accomplished by the IP transaction, so it is very important that this step not be omitted for a resource with a Theoretical Consumption Code of C.

T = THEORETICAL CONSUMPTION. Use this code for resources (balance or non-balance) you want theoretically consumed. These could be resources too numerous and inexpensive to count, such as lids for 32-ounce jars, or non-balance resources that cannot be physically taken from inventory to the shop floor, such as labor.

For example, you may want electricity theoretically consumed, if the amount of electricity available to you is unlimited. In that case, you have no balance of the resource on hand, but you do want to track what you use because it does add to the cost of production.

When a PR transaction is entered, the system calculates the quantity of this resource used based on the quantity of the end resource produced. Suppose the PM produces 100 pounds of tomato paste per batch and uses 1 KwH of electricity per 100 pounds of paste (electricity has a theoretical consumption code of T). When you enter a PR transaction for 300 pounds of tomato paste, the system automatically generates a TC (theoretical consumption) transaction for 3 KwH of electricity.

Batch Consumption (Y/N)—Y if the resource can be used in full batch quantities only, N if partial batches are allowed. If this field is Y, Theoretical Consumption Code (see above) must be D. Default from Resource Sub-Class (RESUBC) file loaded.

This concept is best illustrated by an example. Suppose your production model requires that a cook stand by the kettle as 20 gallons of sauce simmers for one hour. Your planning activities indicate that you need 30 gallons of sauce, so you plan to run 1-1/2 batches.

However, you still need an hour of the cook's time to watch it simmer, even when you are running only half a batch.

A Y in this field prevents the system from calculating partial batch quantities for the resource; it rounds up the quantity instead. In this case, 1-1/2 batches is rounded up to two batches, and the system calculates that you need two hours of the cook's time rather than 1-1/2 hours. Place an N in this field if this resource can have partial batch quantities.

Prime Planning PM—Type—PM type for the production model to be used when planning production of this resource. This field and the Prime Planning PM Name field also identify the default PM to be used when superflushing this resource (see *RM Concepts*, Section B).

Prime Planning PM Name—production model to be used when planning production of this resource.

Prime Costing PM—Type—PM type for the production model used by the Cost Rollup program in Resource Processor (see Sections 2-2 and 2-3 of the RP reference manual) to calculate the cost of producing this resource.

Prime Costing PM—Name—production model used by the Cost Rollup program in Resource Processor (see Sections 2-2 and 2-3 of the RP reference manual) to calculate the cost of producing this resource.

Selling Price—selling price for this resource.

Recost (Y/N)—If this field is Y, the rolled-up cost of this resource will be recalculated the next time the Cost Rollup program is run in RP. The system automatically changes this field to Y if you change any cost information (see Data Screen MIE18005) except Net Realizable Value. The system then changes this field back to N when the Cost Rollup program recalculates the cost of this resource. You can also change this field to Y or N manually.

Command Function Keys

ENTER—Press ENTER to proceed to Data Screen MIE18003.

CK15 NOTEBOOK FILE MAINTENANCE—available only if the action code is A (add) or C (change). Select CK15 to display Notebook File Maintenance data screen MZE08002, to enter values for any extra fields defined for the Resource Master file. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19. This returns you to the selection screen.

CK20 DELETE—If the action code is D, a message is displayed at the bottom of the screen, instructing you to press CK20 to delete the record. At this point, you have a choice:

This field, the Cost Rollup Type Code, allows you to determine how the three cost components for this resource are used to add to the three cost buckets for a produced resource. The default for this resource can be changed when you add it to a production model (see *Production Model Maintenance*, Section 1-4 of the RP reference manual). You have three choices:

N = NORMAL. This code causes each cost associated with the consumed resource (direct cost, fixed overhead, and variable overhead) to be added to the corresponding bucket for the produced resource. This matches the example of the beans, above.

V = VARIABLE. All costs of the consumed resource are added to the variable overhead bucket for the produced resource. This matches the example of electricity, above.

F = FIXED. All costs of the consumed resource are added to the fixed overhead bucket for the produced resource.

Cost Rollup Level Class Code (A/B)—used only if RP is installed. Default from Resource Sub-Class (RESUBC) file not loaded.

This code is used during Cost Rollup (see Sections 2-2 and 2-3 in the RP reference manual) when this resource is consumed by the production model being "rolled up," and when the Cost Rollup Costing Method is R (cost from last rollup). It tells the system whether to go down an extra level for the cost of this resource.

If the level class code for a consumed resource is A, the system adds the entire cost of the resource to the class/sub-class assigned to it. If its level class code is B, the system looks down another level, to the prime costing PM for that resource, for more detailed information about its cost.

Suppose you have a production model for beef stew (class/sub-class MA/FG), and one of the consumed resources is beans (class/sub-class MA/FR), and the Cost Rollup Costing Method for beans is R. When the beans are added to the stew they have already been washed and cut, and this process takes place on a separate production model.

When rolling up the cost of the beef stew, the system needs a cost figure for the beans. Let's say the cost from last rollup for washed beans is currently $0.666667/lb. Fifty pounds of beans are used in making the beef stew, so the cost of the beans is $33, all attributable to class/sub-class MA/FR.

If the level class code for beans is B, the system goes down another level, to find all class/sub-class combinations that went into the washed beans. The consumed resources on this PM are unwashed beans (class/sub-class MA/FR) and unskilled labor (class/sub-class LA/UN).

The Cost Rollup Costing Method for the unwashed beans is S, and the standard cost is $0.50/lb. The Cost Rollup Costing Method for the labor is F, and the fixed cost is $8/hr. It takes one hour and 50 pounds of unwashed beans to produce the 50 pounds of clean beans necessary for the beef stew. Therefore, the total cost of the washed beans is $25 (for the beans) + $8 (for the labor) = $33. The cost of the washed beans has two components: $25 from class/sub-class MA/FR, and $8 from class/sub-class LA/UN.

Comparing the two methods:

| | Level Class Code = A | | Level Class Code = B | |
|---|---|---|---|---|
| | Cost | Class/Sub-Class | Cost | Class/Sub-Class |
| | $33 | MA/FR | $25 | MA/FR |
| | | | 8 | LA/UN |
| Total | $33 | | $33 | |

The Cost Rollup Report shows cost totals by class and sub-class, so the different breakdowns can be important. Using level class code B can help you identify significant cost elements that would otherwise be hidden (for example, the labor cost in this example).

The total cost for the beans is the same for level class code A or B. Level class code B takes the Cost From Last Rollup and breaks that down into the costs contributed by different classes and sub-classes.

Note: If you install the Costing module, you may want to change all level class codes to A when you do so. The Costing module calculates costs using the actual PMs used to produce each resource, rather than using the Prime Costing PM for the entire quantity. After you install Costing, if any resource has a Level Class Code of B, the cost information calculated by Cost Rollup will not be comparable to the figures calculated by the Costing module.

Documentation Location Code—This five-character code allows you to print the pick list (see Sections 7-9 and 7-10) in order by the area of the plant where the resource will be used. If line 1 and line 2 are at opposite ends of a mile-long plant, you might want to enter different documentation location codes for resources depending on whether they are used on line 1 or line 2. Thus all the resources going to line 1 could be picked and brought to their destination at the same time.

SHELF LIFE (Y/N)—Enter Y if this resource has a limited shelf life, N if not. If you enter Y, Shelf Life Days is required. Default from Resource Sub-Class (RESUBC) file loaded.

Shelf Life Days—required if Shelf Life is Y. Enter the number of days this resource can remain in a location before it must be reinspected.

Lot Control (Y/N)—Enter Y if this resource must be lot-controlled, N if not. Default from Resource Sub-Class (RESUBC) file loaded.

FORWARD PLANNING (Y/N)—used only if the TPFP module is installed. Enter Y if this is a produced resource and may be included in a Time-Phased Forward Planning (TPFP) run. Enter N if it is not to be included.

Dflt Locn Classif Cd-Misc Receipt—Enter the default location classification code to be used when an MR (miscellaneous receipt) transaction is entered for this resource, placing it in a new location, and no location classification code is specified. Defaults to the value from tailoring question #T18. This field must be blank for a non-balance resource.

Dflt Locn Classif Cd-Prodn Rcpt—Enter the location classification code to be used when a PR (production receipt) transaction is entered for this resource, placing it in a new location, and no location classification code is specified. Defaults to the value from tailoring question #T19. This field must be blank for a non-balance resource.

Default Warehouse-Consumption—default warehouse for creating allocations for this resource. This is the default for the Warehouse field on Data Screen MDE04012 in Production Model Maintenance (see Section 1-4 of the RP reference manual).

Dflt Location-Consumption—preferred location in the above warehouse for creating reservations for this resource. This is the default for the Location field on Data Screen MDE04012 in Production Model Maintenance (see Section 1-4 of the RP reference manual). This field must be blank for a non-balance resource.

Default Warehouse-Production—default warehouse for PR (production receipt) transactions for this resource. Defaults to the value from tailoring question #T21.

Dflt Location-Production—default location for PR (production receipt) transactions for this resource. Defaults to the value from tailoring question #T20. This field must be blank for a non-balance resource.

Standard Inventory Classification Code—SIC code for this resource, for bar-coded resources.

Required From Locn Classif Cd—Enter the location classification code this resource must be coming from, if it is going from a location classification that is NOT considered on hand to one that IS considered on hand. For example, if all resources must be inspected before being considered on hand, enter the location classification code for quality assurance (QA in the standard database) in this field. This helps to ensure that the resource goes to QA before reaching an on hand location classification.

MPP Code (P/M/blank)—used only if Planning is installed. This code indicates whether this is a master production planned resource (P), a manual requirement resource (M), or neither (blank).

(1) Enter P if this is a master production planned resource. This means that you will be telling the system what quantity of this resource you plan to produce, and the system will not change that number. You would normally use this definition for the most important produced resources on your system, whose planned production quantities are determined by upper management.

(2) Enter M if this is a manual requirement resource. This means that you will be entering a manual requirement through planning, and the system will add to this the requirement determined by the planning run, to calculate the gross requirement for this resource.

Suppose, for example, that you make fountain pens. The finished pen might have an MPP code of P, and the ink cartridge for the pen might have an MPP code of M. You plan to make 10,000 pens, so the planning run determines a need for 10,000 ink cartridges. In addition, you sell ink cartridges separately: to cover this additional need, you enter a manual requirement of 1,000. The gross requirement calculated by the system is 11,000.

(3) Leave this field blank if neither P nor M applies. Such resources are treated like manual requirement (M) resources, with one important exception: you cannot enter a manual requirement. The system uses just the calculated need from PMs to determine the gross requirement. If pen caps are assigned this code (see the example above), the gross requirement would be 10,000.

Planner Number—number of planner responsible for this resource. Default from Resource Sub-Class (RESUBC) file loaded.

Buyer Number—number of buyer responsible for this resource. Default from Resource Sub-Class (RESUBC) file loaded.

Planning Sequence Number—used by the Planning module in determining the order in which production of various resources is planned. If two resources have the same Planning Level Code (see below), the one with the lower Planning Sequence Number is planned first.

Planning Level Code—used only if Planning is installed.This number determines the order in which the Planning run considers the need for resources. A resource with planning level code zero (0) would be considered first. You can assign planning level codes, or you can use Planning to have the system determine the appropriate codes.

FIXED PLANNING LEVEL CODE (Y/N)—used only if Planning is installed. You can use a program in Planning to have the system determine the Planning Level Code (see above) for each resource. Enter Y in this field to prevent that program from changing the Planning Level Code currently assigned to this resource.

RE-PLAN FLAG (Y/N)—reserved for future PRISM enhancements. This field is automatically changed to Y if you update a change to an attribute of this resource.

ORDER POLICY CODE (A, B, C, D, E, G, or H)—This code tells the system how to calculate when you need to order or make this resource, and what quantity to order/schedule. This represents what you may know as a Lot Sizing Code. Defaults to the value from tailoring question #G25.

Codes D and E are used by RM in the Reorder Report (see Section 2-17). Codes A, D, G, and H are used by the Planning module. Codes B and C are reserved for future PRISM modules. For information on the meaning of each code, see the appropriate section of the reference manual for the module that uses it. In the case of RM, this is Section 2-17.

Fixed Order Qty—used with order policy codes D (in Planning only) and H, defaults to the value from tailoring question #G26. Any purchase order or schedule for this resource must be for this quantity. When the order policy code is D, Planning determines a net requirement of 200, and the Fixed Order Amount is 70, three POs/schedules for 70 each are created. When the order policy code is H, the system waits until the net requirement is at least this quantity to create a purchase order or schedule for this resource.

Days of Supply—number of days of supply to order for this resource, defaults to the value from tailoring question #G27. This field is used in conjunction with order policy codes E and G. This field tells the system to order or schedule a quantity just large enough so that you can meet all your requirements for this resource for this number of days. For more information, see the appropriate section of the reference manual for the module using the order policy code.

Command Function Keys

ENTER—Press ENTER to proceed to Data Screen MIE18004.

CK03 PAGE BACKWARD—Press CK03 to go back to Data Screen MIE18002.

CK04 LOCATION PROMPTING—In tailoring question #G7, you can enter a set of prompts for your location field. Operators can use these prompts to make sure they enter the correct information. When you enter C or P in the one-character field next to the word PROMPTING and press CK04, the Location Prompting Screen is displayed.

If you enter C in the one-character field, the location information you enter on the Location Prompting Screen is returned to the field labelled Dflt Location-Consumption. If you enter P in that field, the location number is returned to the field labelled Dflt Location-Prodn Rcpt. You must enter C or P in order to use CK04.

CK15 NOTEBOOK FILE MAINTENANCE—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

**Data Screen *MIE18004***

Figure 61:
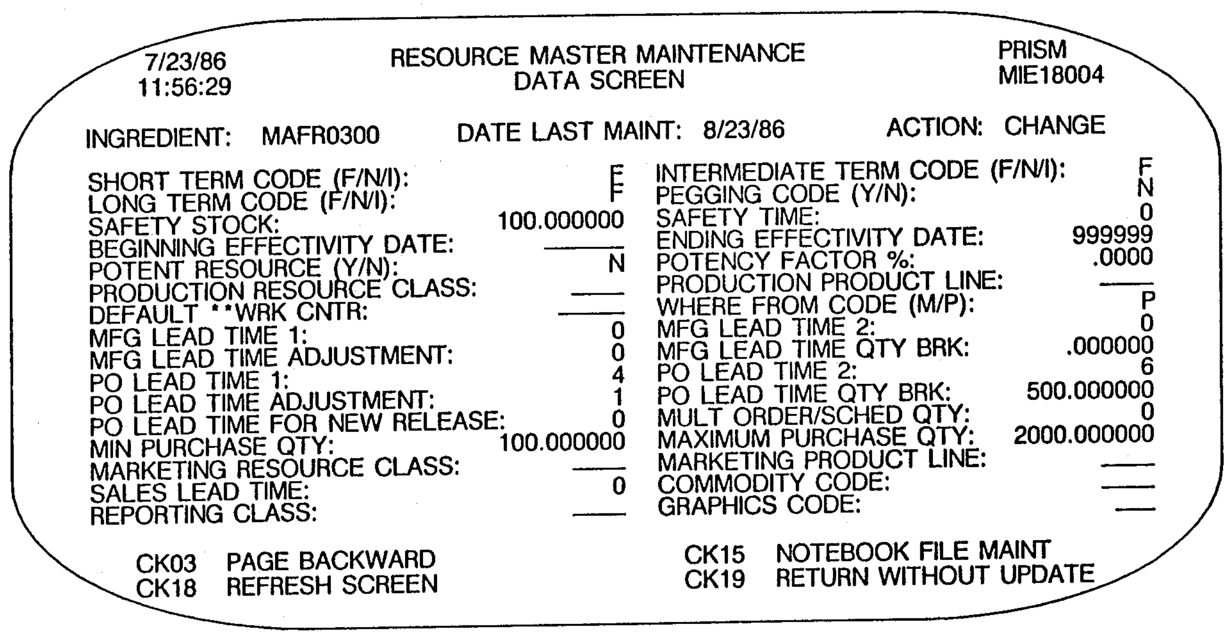

(See Figure 61)

This data screen is displayed when you press ENTER on Data Screen MIE18003. Here, if the action code is A (add) or C (change), you can enter the attributes associated with this resource number. If the action code is D, all fields on this screen are for display only.

Fields for Display

Resource

Date Last Maint—date this resource was last updated. If you are adding a new resource, this is today's date.

Action—The word ADD, CHANGE, or DELETE is displayed here, depending on the action code.

Fields for Entry

SHORT TERM CODE (F/N/I)—used only if Planning is installed. Enter F if this is a finite resource in the short term, I if it is infinite in the short term, N if it is not to be included on Planning reports. You can limit some reports in Planning to short, intermediate, or long term resources. A short term resource is one with an F or an I in this field.

INTERMEDIATE TERM CODE (F/N/I)—used only if Planning is installed. Enter F if this is a finite resource in the intermediate term, I if it is infinite in the intermediate term, N if it is not to be included on Planning reports. You can limit some reports in Planning to short, intermediate, or long term resources. An intermediate term resource is one with an F or an I in this field.

LONG TERM CODE (F/N/I)—used only if Planning is installed. Enter F if this is a finite resource in the long term, I if it is infinite in the long term, N if it is not to be included on Planning reports. You can limit some reports in Planning to short, intermediate, or long term resources. A long term resource is one with an F or an I in this field.

PEGGING CODE (Y/N)—reserved for future PRISM enhancements.

Safety Stock—This is an extra quantity, beyond what your schedule(s) indicate that you need, that you always want to have in stock "just in case." This figure is the default for the Safety Stock field in the Resource Balance (RESBAL) file, which is used to calculate the Recommended Order Quantity if the order policy code is D. For more information, see *Reorder Report*, Section 2-17.

Safety Time—reserved for future PRISM enhancements.

Beginning/Ending Effectivity Date—earliest and latest dates when this resource can be used. These fields are used only by the Planning module. They do not serve as default effectivity dates for resources on production models.

Potent Resource (Y/N)—Enter Y if this is a potent resource, such as a solution. In this case, Potency Factor % (see below) is required. Enter N if this is not a potent resource.

Potency Factor %—Enter the default potency factor for this resource. For example, if the resource is a 10 percent salt solution, you would enter 10 in this field. For more information how potency is handled in PRISM, see *RM Concepts*, Section B.

Production Resource Class—four-character optional field. You can use production resource class limits for certain RM reports.

Production Product Line—four-character optional field. You can use production product line limits for certain RM reports.

Default Work Center—for an operation dependent upon this resource. If on a PM you create an operation dependent upon this resource, but you do not enter a work center where that operation takes place, this work center is used.

WHERE FROM CODE (M/P)—Enter M if this is a manufactured resource, P if it is purchased from outside vendors. You must make an entry in this field, even for resources that you both produce and purchase. This code determines which lead time figures for this resource (see below) are considered in calculating the lead time for a PM. If this code is P, the PO lead time figures are used. If this code is M, the Mfg lead time figures are used. In Planning, this code determines whether an order or a schedule is created to meet the requirement for this resource.

Mfg Lead Time 1—used to calculate lead times for PMs that consume this resource, if the Where From Code is M. Enter the lead time, in days, for manufacturing this resource in relatively small quantities. Planning does not use this field, because that module can calculate the lead time using operation times.

Mfg Lead Time 2—Enter the lead time, in days, for manufacturing a quantity of this resource greater than or equal to the Mfg Lead Time Qty Brk (see below). Planning does not use this field, because that module can calculate the lead time using operation times.

Mfg Lead Time Adjustment—number of days from the time a quantity of this resource is received from production (PR transaction) to the time it is received to an on hand location classification.

Mfg Lead Time Qty Brk—manufacturing lead time quantity break. Suppose this field is 500. This means that the lead time for manufacturing less than 500 of this resource is Mfg Lead Time 1. The lead time for manufacturing 500 or more is Mfg Lead Time 2.

PO Lead Time 1—used to calculate lead times for PMs that consume this resource, if the Where From Code is P. Enter the lead time, in days, for purchasing this resource in relatively small quantities.

PO Lead Time 2—Enter the lead time, in days, for purchasing a quantity of this resource greater than or equal to the PO Lead Time Qty Brk (see below).

PO Lead Time Adjustment—number of days from the time a quantity of this resource is received from the vendor to the time it is received to an on hand location classification.

PO Lead Time Qty Brk—purchasing lead time quantity break. Suppose this field is 500. This means that the lead time for purchasing less than 500 of this resource is PO Lead Time 1.The lead time for purchasing 500 or more is PO Lead Time 2.

PO Lead Time for New Release—used only if Planning is installed. The use of this field is best illustrated with an example. Suppose a planning run determines that you need 100 more units of a purchased resource. The system checks to see if there is an open purchase order for it, whose authorized quantity is more than the quantity ordered. It finds an open PO for 300, with an authorized quantity of 500. If the date the 100 units are needed is before the authorized expiration date for the PO, the system recommends that a new release for 100 be added to that PO. This field is the lead time for that new release.

Mult Order/Sched Qty—indicates that the quantity of any purchase or schedule for this resource must be a multiple of this number. If this field is 10, the system will not generate an order/schedule for 23 units of this resource: a net requirement of 23 results in a PO or schedule for 30.

Min Purchase Qty—indicates that any order or schedule for this resource must be for at least this quantity.

Maximum Purchase Qty—indicates that an order or schedule for this resource can be for no more than this quantity.

Marketing Resource Class—four-character optional field.

Marketing Product Line—four-character optional field.

Sales Lead Time—lead time, in days, for producing a quantity of this resource for sale.

Commodity Code—four-character optional field. You can use this field for any information you need. You can use commodity code limits on certain RM reports.

Reporting Class—You can use this field for any information, for example department number. Enter the reporting class to which this resource belongs. Certain RM reports can be limited by reporting class. Default from Resource Sub-Class (RESUBC) file loaded.

Graphics Code—reserved for future PRISM enhancements.

Command Function Keys

ENTER—Press ENTER to proceed to Data Screen MIE18005. If your user profile is not authorized to see cost information, the selection screen is displayed instead.

CK03 PAGE BACKWARD—Press CK03 to go back to Data Screen MIE18003.

CK15 NOTEBOOK FILE MAINT—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

Data Screen MIE18005

(See Figure 62)

This data screen is displayed when you press ENTER on Data Screen MIE18004. Here, if the action code is A (add) or C (change), you can enter cost attributes associated with this resource number. If the action code is D, all fields on this screen are for display only.

If your user profile is not authorized to see cost information, this screen cannot be displayed. Instead, the Selection Screen is redisplayed when you press ENTER on MIE18004.

For more information on costs, see *RM Concepts*, Section B.

Fields for Display

- Resource

Date Last Maint—date this resource was last updated. If you are adding a resource, this is today's date.

Action—The word ADD, CHANGE, or DELETE is displayed here, depending on the action code.

Fields for Entry

Standard Cost—your estimate of the average cost of this resource over the course of a year. For example, if you could be certain that the price of tomatoes would be $1 per pound from November to April and .50 from May to October, and that you would buy the same quantity during each six-month time period, you would enter a standard cost of .75 per pound.

Fixed Cost—a different estimate of the "standard cost," used if the Cost Rollup Costing Method for this resource is F. This allows you to use one estimate for cost rollup and one for non-rollup purposes.

Selected Unit Cost (blank/S/A/H/L)—Enter a letter to indicate the cost figure used for the resource in all cases EXCEPT when rolling up a PM that consumes it. Default from Resource Sub-Class (RESUBC) file loaded.

A—rolling average cost with alpha factor (RESBAL)

H—historical average cost (RESBAL)

L—last period's average cost (RESBAL)

S—standard cost (RESMST)

Note: If the Balance Resource Code (see Data Screen MIE18002) is C, this field must be S.

NET REALIZABLE VALUE USAGE (Y/N)—Enter Y if this is a "net realizable value" resource, that is if it is not a major produced resource but it has some fixed value or cost to you. N if this is not a "net realizable value" resource. For example, you might put a Y in this field for the carrot peelings produced when you peel carrots or the clam shells "produced" when you shuck clams.

Net Realizable Value—required if Net Realizable Value Usage is Y. Enter the price or cost of this NRV resource. Continuing the above example, the clam shells might have a negative Net Realizable Value, if you have to pay someone to take them away.

Switch Over Cost—reserved for future PRISM modules. This is the cost of switching a line from production of something else to production of this resource.

Cost From Last Rollup—usually updated by the system. This is the cost calculated the last time the Cost Rollup program in RP was run for this resource. This field is also available for entry, because you might want to enter a starting price when you install the system. This is the cost used when the Cost Rollup Costing Method (see Data Screen MIE18003) is R.

Command Function Keys

ENTER—Press ENTER if the action code is A or C, to update the file with new information. This returns you to the selection screen. If the action code is D (delete), pressing ENTER just redisplays the screen.

CK03 PAGE BACKWARD—Press CK03 to go back to Data Screen MIE18004.

CK15 NOTEBOOK FILE MAINT—available only when action code is A (add) or C (change). Select CK15 to switch to Notebook File Maintenance, to enter values for any extra fields defined for the Resource Master file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this sub-class are displayed. If the action code is D (delete), the same values are displayed.

CK19 RETURN WITHOUT UPDATE—If you decide not to add, change, or delete the information for this resource, press CK19.This returns you to the selection screen.

CK20 DELETE—If the action code is D, a message is displayed at the bottom of the screen, instructing you to press CK20 to delete the record. At this point, you have a choice:

(1) Press CK20. This removes this record from the file and returns you to the selection screen.

(2) Press CK19. This returns you to the selection screen without removing the record.

SECTION XIII-II

MIE180

Resource Master File Maintenance

A. The Resource Master File Maintenance program allows the user to enter and maintain information in the Resource Master (RESMST) file. This file contains one record for every non-balance resource (e.g., electricity) as well as a record for every balance resource on the system.

Screens

MIE18001—Selection Screen
MIE18002—Data Screen #1
MIE18003—Data Screen #2
MIE18004—Data Screen #3
MIE18005—Data Screen #4 (Cost fields)
MIE18006—Session Status Screen

Selection Screen—MIE18001

From the Selection Screen, the user can take CK11 to call the Alpha Search Inquiry program (MII180) for a list of resource numbers and their corresponding descriptions before keying in a particular resource number.

The user may add, change, or delete records. A delete is performed only if the resource number for the record to be deleted does not exist in Resource Balance (RESBAL), Production Model Resource (PMRESR), or Schedule Resource (RMRESR) file.

An RM Tailoring question determines if RESBAL records are generated automatically for a given warehouse when a record is added to the RESMST file. If a RESBAL record is to be generated, the RM Tailoring (TALFLI) file is checked to find the warehouse numbers to be used. More than one RESBAL record can be generated by this process, depending on the number of warehouses defined in TALFLI.

If the resource is a non-balance resource, a separate question in RM Tailoring is checked to determine whether RESBAL records are generated automatically for non-balance resources.

If the system is generating RESBAL records automatically, the following fields are loaded as indicated below:

Class and Sub-Class = RESMST fields.
Order Policy fields = RESMST fields.
Cycle Count Method = RM Tailoring default value.
All Quantity fields = zero.
All Cost fields = zero.
All Date fields (except Date Last Maintenance) = zero.
Date Last Maintenance = system date.
When any of the fields in RESMST are changed, the Re-Plan Flag is set to Y.
If the user maintains the Selected Unit Cost or any cost information except the Net Realizable Value, Cost Rollup Cost Method, Cost Rollup Type Code or Cost Rollup Level Class Code, the Recost Flag is set to Y.

Entry Fields:

Resource Number
Action Code (A = add, C = change, D = delete)

Required Fields:

- Resource Number (Add only)
- Action Code

Edits:

- If Action is ADD, record must not exist.
- If Action is CHANGE or DELETE, record must exist.
- Action Code must be A, C, or D.
- If Action is DELETE, resource number cannot exist in RESBAL file.
- If Action is DELETE, resource number cannot exist in PMRESR file.
- If Action is DELETE, resource number cannot exist in RMRESR file.

Command Keys (Display):

| | |
|---|---|
| CK01 | Display Session Status |
| CK11 | Alpha Search Inquiry |

Command Keys (Non-Display):

| | |
|---|---|
| CK07 | Send Message to Action List |
| CK17 | Error Message Override |
| CK20 | Delete Record |
| HELP | HELP Text |

Data Screen #1—MIE18002

Display-Only Fields:

- Resource Number
- Date of Last Maintenance
- Action
- Standard Unit of Measure (CHANGE/DELETE mode only)
- Class (CHANGE/DELETE mode only)
- Sub-Class (CHANGE/DELETE mode only)
- Date ABC Code Last Updated
- Number of Times Resource is Used Entry Fields:

- Description
- Standard Unit of Measure (ADD mode only)
- Class (ADD mode only)
- Sub-Class (ADD mode only)
- Earliest Acceptable Revision Level
- Current Revision Level
- Service Level (%)
- Balance Resource Code
- ABC Code
- Shortage Flag
- Miscellaneous Field 1
- Miscellaneous Field 2
- Miscellaneous Field 3
- Variable Overhead Code
- Variable Overhead Rate
- Variable Overhead Table Value
- Variable Overhead Table/Rate
- Fixed Overhead Code
- Fixed Overhead Rate Fixed Overhead Table Value
Fixed Overhead Table/Rate
Cumulative Lead Time of Prime Costing PM
Theoretical Consumption Code
Batch Consumption Code
Prime Planning PM Type
Prime Planning PM Name
Prime Costing PM Type
Prime Costing PM Name
Selling Price
Recost Byte Required Fields:

Class (ADD mode only)
Sub-Class (ADD mode only)
Standard Unit of Measure (if the default value is blank)

Edits:

If Action is ADD, Class must exist in RECLAS file and Sub-Class must exist in RESUBC file.

Balance Resource Code must be B, C, or blank.

ABC Code must be A, B, C, or blank.

Shortage Code must be Y or N.

Variable Overhead Table/Rate must be T, R, or blank.

If Variable Overhead Table/Rate is T, the Variable Overhead Table Value must be entered.

If Variable Overhead Table/Rate is T, the Variable Overhead Table Value must exist in Overhead Rate (OVHDRF) file.

If Variable Overhead Table/Rate is R, the Variable Overhead Rate and Variable Overhead Code fields mustbe entered. (However, if the user blanks out either of these fields, a default value is loaded in before editing begins. The Table edits are handled the same way.)

Variable Overhead Code must be P, D, or blank.

Fixed Overhead Code must be P, D, or blank.

If Fixed Overhead Table/Rate is T, the Variable Overhead Table Value must be entered.

If Fixed Overhead Table/Rate is T, the Variable

IL Fixed Overhead Table/Rate is R, the Variable Overhead Table Value must exist in the Overhead Rate (OVHDRF) file.

Overhead Rate and Variable Overhead Code fields must be entered. (However, if the user blanks out either of these fields, a default value is loaded in before editing begins. The Table edits are handled the same way.)

Fixed Overhead Table/Rate must be T, R, or blank.

If RM Tailoring allows theoretical consumption, the Theoretical Consumption Code must be D, C, T, or blank.

If RM Tailoring does not allow theoretical consumption, Theoretical Consumption Code must be D. Batch Consumption Code must be Y, N, or blank.

Prime Planning Type and Name must exist in PMODEL if RP and RM are supposed to interface (check INTFAC). Prime Costing Type and Name must exist in PMODEL if RP and RM are supposed to interface (check INTFAC).

Recost Byte must be Y or N.

Theoretical Consumption Code must be D if Batch Consumption Code equals Y (UDS Error Message).

Defaults:

Date Last Maintenance—defaults to system date (ADD mode only).

Standard Unit of Measure—defaults to RESUBC field RSUMSR because this field cannot be blank.

Balance Resource Code—defaults to RESUBC field RSBORC because this field cannot be blank.

Batch Consumption Code—defaults to RESUBC field RSBCON because this field cannot be blank.

Theoretical Consumption Code—defaults to RESUBC field RSTHEO because this field cannot be blank.

Service Level (%)—defaults to RESUBC field RSSERV because this field cannot be blank.

If all of the following four Variable Overhead fields are equal to their respective default values, blanks, or zeroes are loaded into the RESMST file. If one or more of the fields does not equal its default value, the screen values are loaded in the RESMST file.

Variable Overhead Code—defaults to:
RESUBC field RSVOPD, then
RECLAS field RCVOPD, then
TALFLI field TAVOPD.

Variable Overhead Rate—defaults to:
RESUBC field RSVORT, then
RECLAS field RCVORT, then
TALFLI field TAVORT.

Variable Overhead Table Value—defaults to:
RESUBC field RSVOTV, then
RECLAS field RCVOTV, then
TALFLI field TAVOTV.

Variable Overhead
Table/Rate—defaults to:
RESUBC field RSVOTR, then
RECLAS field RCVOTR, then
TALFLI field TAVOTR.

If all of the following four Fixed Overhead fields are equal to their respective default values, blanks, or zeroes are loaded into the RESMST file. If one or more of the fields does not equal its default value, the screen values are loaded in the RESMST file (including those that equal their default values).

Fixed Overhead Code—defaults to:
RESUBC field RSFOPD, then
RECLAS field RCFOPD, then
TALFLI field TAFOPD.

Fixed Overhead Rate—defaults to:
RESUBC field RSFORT, then
RECLAS field RCFORT, then
TALFLI field TAFORT.

Fixed Overhead Table Value—defaults to:
RESUBC field RSFOTV, then
RECLAS field RCFOTV, then
TALFLI field TAFOTV.

Fixed Overhead Table/Rate—defaults to:
RESUBC field RSFOTR, then
RECLAS field RCFOTR, then
TALFLI field TAFOTR.

Command Keys (Display):

| | |
|---|---|
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override (DELETE only) |
| HELP | HELP Text |

Data Screen #2—MIE18003

Display-Only Fields:

Resource Number
Date Last Maintenance
Action
Date Last Rollup
Actual Rollup Task Name
Simulated Rollup Task Name

*Entry Fields:*

Recalculate Lead Time
Cost Rollup Type Code
Cost Rollup Costing Method
Cost Rollup Level Class Code
Documentation Location Code
Shelf Life Code
Shelf Life Days
Lot Control
Forward Planning Byte
Default Location Classification Code—Miscellaneous Receipts
Default Location Classification Code—Production Receipts
Default Warehouse—Consumption
Default Location—Consumption
Default Warehouse—Production Receipts
Default Location—Production receipts
Standard Inventory Classification Code
Required From Location Classification Code
Master Production Plan Code
Planner Number
Buyer Number
Planning Sequence Number
Planning Level Code
Fixed Planning Level Code
Order Policy Code
Fixed Order Quantity
Days of Supply Required Fields:

Recalculate Lead Time
Shelf Life Code
Forward Planning Code
Fixed Planning Level Code
Order Policy Code
Re-Plan Flag Edits:

Recalculate Lead Time must be Y or N.
Cost Rollup Type Code must be N, F, V, or blank.

Cost Rollup Costing Method must be F, R, S, A, H, L, or blank.

Cost Rollup Level Code must be A, B, or blank.

Shelf Life Code must be Y or N.

If Shelf Life Code is Y, Shelf Life Days must be greater than zero; if Shelf Life Code is N, Shelf Life Days must be zero.

Lot Control must be Y, N, or blank.

Forward Planning Code must be Y or N.

Default Location Classification Code—Miscellaneous Receipts must exist in CLASCD file.

Default Location Classification Code—Production Receipts must exist in CLASCD file.

Required From Location Classification Code must exist in CLASCD file (UDS message).

Master Production Plan Code must be P, M, or blank.

Fixed Planning Level Code must be Y or N.

Order Policy Code must be A, B, C, D, E, G, or H.

Re-Plan Flag must be Y or N.

Location Prompting Code must be C or P when CK04 is selected.

For Non-Balance resources, the following fields cannot have values entered:

Default Location Classification Code—Miscellaneous Receipts

Default Location Classification Code—Production Receipts

Default Location—Production Receipts

Default Location for Consumption.

Defaults:

Date Last Maintenance—defaults to system date (ADD only).

Cost Rollup Type Code—defaults to:
RESUBC field RSCSTP, then
RECLAS field RCCSTP, then
TALFLI field TACSTP.

Cost Rollup Costing Method—defaults to:
RESUBC field RSCSRU, then
RECLAS field RCCSRU, then
TALFLI field TACSRU.

Cost Rollup Level Class Code—defaults to:
RESUBC field RSCRLC, then
RECLAS field RCCRLC, then
TALFLI field TACRLC.

Shelf Life Code—defaults to RESUBC field RSSHLF because this field cannot be blank.

Shelf Life Days—defaults to RESUBC field RSSHLD because this field cannot be blank.

Default Location Classification Code (Miscellaneous Receipts)—defaults to TALFLI field TADCPO.

Default Location Classification Code (Production Receipts)—defaults to TALFLI field TADCPR.

Default Location (Production Receipts)—defaults to TALFLI field TADLPR.

Default Warehouse (Production Receipts)—defaults to TALFLI field TADWPR.

Planner Number—defaults to RESUBC field RSPLAN because this field cannot be blank.

Buyer Number—defaults to RESUBC field RSBUYR because this field cannot be blank.
Lot Control Code—defaults to RESUBC field RSLOTN because this field cannot be blank.
Order Policy Code—defaults to TALFLI field TAORPL because this field cannot be blank.
Fixed Order Quantity—defaults to TALFLI field TAORAM because this field cannot be blank.
Days of Supply—defaults to TALFLI field TAORDY because this field cannot be blank.
Planning Level Code defaults to 9s.

Command Keys (Display):

| | |
|---|---|
| CK03 | Page Backward |
| CK04 | Location Prompting |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Data Screen #3—MIE18003

Display-Only Fields:

Resource Number
Date Last Maintenance
Action

Entry Fields:

Short Term Code
Intermediate Term Code
Long Term Code
Pegging Code
Safety Stock
Safety Time
Beginning Effectivity Date
Ending Effectivity Date
Default Work Center
Where From Code
Production Resource Class
Production Product Line
Potent Resource
Potency Factor (%)
Manufacturing Lead Time 1
Manufacturing Lead Time 2
Manufacturing Lead Time Adjustment
Manufacturing Lead Time Quantity Break
Purchase Order Lead Time 1
Purchase Order Lead Time 2
Purchase Order Lead Time Adjustment
Purchase Order Lead Time Quantity Break
Purchase Order Lead Time for New Release
Multiple Purchase Factor
Minimum Purchase Quantity
Maximum Purchase Quantity
Marketing Resource Class
Marketing Product Line Sales Lead Time
Commodity Code
Reporting Class
Graphics Code Required Fields:

Short Term Code
Intermediate Term Code
Long Term Code
Pegging Code
Where-From Code Edits:

Short Term Code must be F, N, or I.
Intermediate Term Code must be F, N, or I.
Long Term Code must be F, N, or I.
Pegging Code must be Y or N.
Beginning Effectivity Date validity check.
Ending Effectivity Date validity check.
Beginning Effectivity Date cannot be greater than Ending Effectivity Date.
Where From Code must be M or P.
When changing the Potent Resource Code from Y to N, the Number of Times the Resource is used must be zero.
Potent Resource Code cannot be changed if a record exists in LOCDTL file.
Potent Resource Code must be Y, N, or blank.
If Potent Resource Code is N, Potency Factor must equal zero.
If Potent Resource Code is Y, Potency Factor must be greater than zero.
Minimum Purchase Quantity cannot be greater than maximum purchase quantity.

Defaults:

Date Last Maintenance—defaults to system date (ADD only).
Potent Resource Code—defaults to RESUBC field RSPOTR because this field cannot be blank.
Potency Factor—defaults to RESUBC field RSPOTF because this field always contains a value even if that value is zero.
Reporting Class—defaults to RESUBC field RSPRCL because this field cannot be blank.

Command Keys (Display):

| | |
|---|---|
| CK03 | Previous Screen |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Data Screen #4—MIE18005

This last data screen displays cost fields. This screen can be displayed or maintained only if the user is authorized to see cost information.

Display-Only fields:

Resource Number
Date Last Maintenance
Action

Entry Fields:

Standard Cost
Fixed Cost
Selected Unit Cost
Net Realizable Value Usage
Net Realizable Value
Switch Over Cost
Cost from Last Rollup Required Fields:

Net Realizable Value Usage

Edits:

Selected Unit Cost must be S, A, H, L, or blank.
If Balance Resource Code is C (non-balance), the Selected Unit Cost must be S.
Net Realizable Value Usage must be Y or N.

Defaults:

Date Last Maintenance—defaults to System Date (ADD only).
Selected Unit Cost—defaults to RESUBC field RSSELC.

Command Keys (Display):

CK03 Previous Screen
CK15 Notebook File Maintenance (ADD/CHANGE only)
CK18 Refresh Screen
CK19 Return Without Update Command Keys (Non-Display):

CK07 Send Message to Action List
CK17 Error Message Override
HELP HELP Text

Session Status Screen—MIE18006

Display-Only Fields:

Number of Records Added
Number of Records Changed
Number of Records Deleted

Command Keys (Display):

CK01 End Job

Command Keys (Non-Display):

CK07 Send Message to Action List
HELP HELP Text

B.

| File | Usage |
|---|---|
| CLASCD | IF |
| ERRMSG | IF |
| INTFAC | IF |
| LOCDTLRW | IF |
| MIE180FM | CF |
| NOTES | UF |
| OVHDRF | IF |
| PMODEL | IF |
| PMRESRRS | IF |
| RESBAL | UF |
| RECLAS | IF |
| RESMST | UF |
| RESUBC | IF |
| RMRESRRD | IF |
| TALFLI | IF |
| TALFLZ | IF |
| QSYSPRT | O |

C.

| File Name | Field Name | Description |
|---|---|---|
| TALFLI | TACCSL | Cycle Counting Method |
| | TACRLC | Cost Rollup Level Class Code |
| | TACSRU | Cost Rollup Costing Method |
| | TACSTP | Cost Rollup Type Code |
| | TADCPO | Default Inventory Class PO/Misc Receipt |
| | TADCPR | Default Inventory Class Prod Receipt |
| | TADLPR | Default Location (Prod Receipt) |
| | TADWPR | Default Whse (Prod Receipt) |
| | TADSPC | Cost Security |
| | TAFOPD | Fixed Overhead Code |
| | TAFORT | Fixed Overhead Rate |
| | TAFOTR | Fixed Overhead Table/Rate |
| | TAFOTV | Fixed Overhead Table Value |
| | TAORAM | Default Order Amount |
| | TAORDY | Default # of Days of Supply |
| | TAORPL | Order Policy Code |
| | TAPMNM | PM Name Variable Heading |
| | TARGBM | Generate RESBAL records? (Non-balance) |
| | TARGBN | Generate RESBAL records? (Balance) |
| TALFLI | TARESC | Resource # Variable Heading |
| | TASELC | Selected Unit Cost |
| | TATCAL | Allow Theoretical Consumption? |
| | TAVOPD | Variable Overhead Code |
| | TAVORT | Variable Overhead Rate/Table |
| | TAVOTR | Variable Overhead Type Code |
| | TAVOTV | Variable Overhead Table Value |

Warehouses for Balance Resources:

| | | |
|---|---|---|
| TAWH01 | RESBAL | Warehouse # 1 |
| TAWH02 | RESBAL | Warehouse # 2 |
| TAWH03 | RESBAL | Warehouse # 3 |
| TAWH04 | RESBAL | Warehouse # 4 |
| TAWH05 | RESBAL | Warehouse # 5 |
| TAWH06 | RESBAL | Warehouse # 6 |
| TAWH07 | RESBAL | Warehouse # 7 |
| TAWH08 | RESBAL | Warehouse # 8 |
| TAWH09 | RESBAL | Warehouse # 9 |
| TAWH10 | RESBAL | Warehouse #10 |

| | | |
|---|---|---|
| TAWH11 | RESBAL | Warehouse #11 |
| TAWH12 | RESBAL | Warehouse #12 |
| TAWH13 | RESBAL | Warehouse #13 |
| TAWH14 | RESBAL | Warehouse #14 |
| TAWH15 | RESBAL | Warehouse #15 |

Warehouses for Non-Balance Resources:

| | | |
|---|---|---|
| TAWHAA | RESBAL | Warehouse # 1 |
| TAWHAB | RESBAL | Warehouse # 2 |
| TAWHAC | RESBAL | Warehouse # 3 |
| TAWHAD | RESBAL | Warehouse # 4 |
| TAWHAE | RESBAL | Warehouse # 5 |
| TAWHAF | RESBAL | Warehouse # 6 |
| TAWHAG | RESBAL | Warehouse # 7 |
| TAWHAH | RESBAL | Warehouse # 8 |
| TAWHAI | RESBAL | Warehouse # 9 |
| TAWHAJ | RESBAL | Warehouse #10 |
| TAWHAK | RESBAL | Warehouse #11 |
| TAWHAL | RESBAL | Warehouse #12 |
| TAWHAM | RESBAL | Warehouse #13 |
| TAWHAN | RESBAL | Warehouse #14 |
| TAWHAO | RESBAL | Warehouse #15 |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Resource Master records that were updated are printed on the Maintenance Register, which includes the Action (ADD, CHANGE or DELETE) and all entry and display-only fields.

SECTION XIV

SECTION XIV-I

Resources/Classes/ Sub-Classes

Resource classes and sub-classes provide a method of categorizing the resources on your system. You must assign a resource class and sub-class to each resource you define. For example, you might want to have a class for "packaging materials" and have sub-classes within that class such as "paper" and "aluminum." You can divide a class called "labor" into "skilled" and "unskilled." As a food processor, you might define a class for "ingredients" and divide it into sub-classes "spices," "fresh vegetables," "dairy products," and so on.

Try to group together resources that share important characteristics. Creating meaningful categories of resources is useful for several purposes:

(1) Using default field values. A field in the Resource Class (RECLAS) file provides the default value for the same field in the Resource Sub-Class (RESUBC) file. Similarly, the value of a field in the Resource Sub-Class file is the default for the same field in the Resource Master (RESMST) file. This can save you keying time when setting up your database.

(2) Categorizing information. Many reports in RM can be limited by class and sub-class and/or printed in class/sub-class sequence. The limits make it possible to see data for a specific category of resource quickly and easily. The sequences allow you, for example, to keep all information on utilities together. In addition, the Cost Rollup Report in Resource Processor can be used to give production costs by class and sub-class.

SECTION XIV-II

When To Use Resource Class File Maintenance

Option 12 allows you to maintain the Resource Class (RECLAS) file. Resource classes can be used to group together resources with common characteristics. For example, the standard database includes resource classes LA (labor) and MA (materials). The resources in the class LA have characteristics in common: they are all non-balance resources, they are not lot controlled, and so on. Resources in class MA, on the other hand, are balance resources and are lot controlled.

Within a resource class, resources that are more closely related can be grouped into sub-classes. Each sub-class is identified by a resource class/sub-class combination. Resource class LA includes two sub-classes, SK (skilled) and UN (unskilled). At the resource level, these human resources are identified specifically: resource number LASK0200 refers to a particular type of skilled labor, a cook. Maintain your resource sub-classes through Resource Sub-Class File Maintenance (see Section 1-15).

You must assign a resource class and sub-class to each resource defined in the Resource Master (RESMST) file. If you define your resource classes and sub-classes so that the resources in those categories have a number of common characteristics, many fields in Resource Master Maintenance need not be entered. You can simply allow the appropriate information to "default from" the corresponding Resource Class or Resource Sub-Class file record. See *RM Concepts*, Section B, for a detailed discussion of the PRISM defaulting system.

How To Use Resource Class File Maintenance

When you select Option 12 from the File Maintenance Menu (MI10), the Resource Class File Maintenance Selection Screen is displayed. Use this screen to identify the resource class you want to maintain.

**Selection Screen—*MIE14001***

Figure 63:
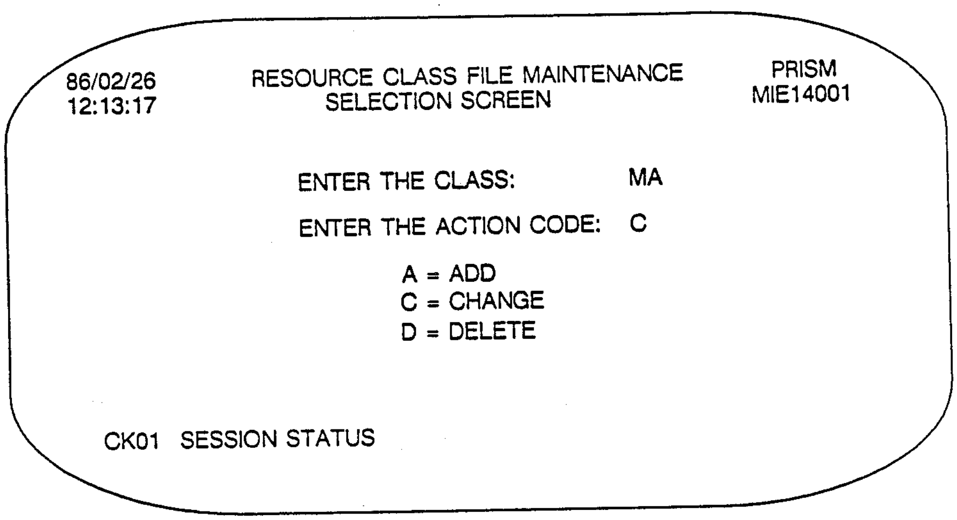

(See Figure 63)

Fields for Entry

Class—Enter the two-character code for a resource class.

ACTION CODE—Enter A to add a new resource class, C to change an existing record, or D to delete an existing record.

Command Function Keys

ENTER—Press ENTER after entering the resource class and an action code, to proceed to the data screen.

CK01 SESSION STATUS—Press CK01 to display the session status screen, which shows the number of records in the Resource Class file you have added, changed, and deleted during this session. When you exit Resource Class Maintenance by pressing CK01 from that screen, a register is automatically printed. This register shows all records added, changed, and deleted during this maintenance session, with the current data for each.

CK20 DELETE—After entering action code D, you can choose one of two methods to remove the record:

(1) Press CK20. This removes this record from the file immediately.

(2) Press ENTER. This displays the data screen with the information for the record you are attempting to delete. At that point a message is displayed, instructing you to press CK20 to confirm that you want to delete the record. From that screen you can also press CK19 to return to the selection screen without removing the record.

Data Screen—MIE14002

(See Figure 64)

The data screen is displayed when you press ENTER on the selection screen. Here, if the action code is A (add) or C (change), you can enter the attributes associated with this resource class code. If the action code is D, all fields on this screen are for display only.

Fields for Display

Class

Date Last Maint—date this resource class record was last updated. If you are adding a new class, this is today's date.

Action—The word ADD, CHANGE, or DELETE is displayed here, depending on the action code.

Fields for Entry

For more information about any of the fields on this screen except Description, see *Resource Master Maintenance*, Section 1-13.

Description—Enter up to 30 characters of description for this resource class.

Unit of Measure—unit of measure used for most resources in this class. Default from Foundation tailoring question #12 loaded.

DEFAULT THEORETICAL CONSUMPTION CODE (D/C/T)—Enter the letter corresponding to the method of consuming resources in this class. Default (D) loaded. You have three options:

D = DIRECT. This means that a direct issue (DI) transaction must be entered to issue this resource to a particular schedule release. Use this code with resources you want to track most carefully, because it encourages precise tracking of the use of the resource.

C = CALCULATED. Use this code with balance resources you want theoretically consumed. When you report produced resources from the production model, the appropriate quantity of a resource with this code is "theoretically consumed" from the quantity previously issued to the floor using an IP transaction.

T = THEORETICAL CONSUMPTION. Use this code for non-balance resources you want theoretically consumed. For example, you may want electricity theoretically consumed, if the amount of electricity available to you is unlimited. In that case, you have no balance of the resource on hand, but you do want to track what you use because it adds to the cost of production.

SELECTED UNIT COST—Enter a letter to indicate the cost figure to be used for the resource: S = standard cost, A = rolling average cost, H = historical cost, L = last period's average cost. Default from tailoring question #G9 loaded.

Amounts or percentages for variable and fixed overhead are added to the cost of a resource, to account for the overhead cost accumulated when using that resource. The following eight fields allow you to determine how these overhead figures are calculated for resources in this class.

If you allow the answers for all four variable overhead fields to default from tailoring questions #G21–G24, those defaults are used but are not loaded into the file. If you override one or more defaults, all four fields are loaded into the file. A similar rule is followed for the four fixed overhead fields. For more information about the PRISM defaulting system, see *RM Concepts*, Section B.

Variable Overhead Table/Rate—Enter T if the default variable overhead rate for resources in this class is to be taken from a table. In this case, you must enter a valid table value from the Overhead Rate (OVRHDF) file in the Variable Overhead Table Value field. Enter R if the default overhead rate is specified in this record. In this case, you must enter a Variable Overhead Rate and Code.

Variable Overhead Table Value—Enter the table value to be used, if the Table/Rate field is T. Each valid table value defined in the Overhead Rate file is associated with a rate and an overhead code.

Variable Overhead Rate—Enter the variable overhead rate, if the Table/Rate field is R. The Variable Overhead Code determines whether this is a percentage (P) of the cost of the resource, or a dollar amount (D).

Variable Overhead Code—Enter P if the Variable Overhead Rate is a percentage of the cost of the resource. Enter D if it is a dollar amount.

Fixed Overhead Table/Rate—Enter T if the default fixed overhead rate for resources in this class is to be taken from a table. In this case, you must enter a valid table value from the Overhead Rate (OVRHDF) file in the Fixed Overhead Table Value field. Enter R if the default overhead rate is specified in this record. In this case, you must enter a Fixed Overhead Rate and Code.

Fixed Overhead Table Value—Enter the table value to be used, if the Table/Rate field is T. Each valid table value defined in the Overhead Rate file is associated with a rate and an overhead code.

Fixed Overhead Rate—Enter the fixed overhead rate, if the Table/Rate field is R. The Fixed Overhead Code determines whether this is a percentage (P) of the cost of the resource, or a dollar amount (D).

Fixed Overhead Code—Enter P if the Fixed Overhead Rate is a percentage of the cost of the resource. Enter D if it is a dollar amount.

Cost Roll Type Cd (F/N/V)—cost rollup type code, used only if RP is installed. Default from tailoring question #G12 not loaded.

Think of the cost of production as having three components: the actual cost of the consumed resources, fixed overhead, and variable overhead. When rolling up the cost of a produced resource, there are three possible ways to use the costs of a consumed resource. Enter the letter corresponding to the method you want to use for most resources in this class.

N = NORMAL. This code causes the appropriate amounts to be added to all three components of the cost of the produced resource.

F = FIXED. The cost of the consumed resource plus any fixed and variable overhead amounts are all included in the category of fixed overhead for the produced resource.

V = VARIABLE. The cost of the consumed resource plus any fixed and variable overhead amounts are all included in the category of variable overhead.

Cost Roll Cost Meth—cost rollup costing method, used only if RP is installed. Enter the letter corresponding to the cost figure you want to use. F = fixed cost, R = rolled cost, S = standard cost, A = rolling average cost, H = historical cost, L = last period's average cost.

This code indicates the type of cost to be used for a consumed resource in this class when needed to roll up the cost of a produced resource. Default from tailoring question #G10 not loaded.

Level Class Cd (A/B)—used only if RP is installed and the Cost Rollup Costing Method is R. Default from tailoring question #G11 not loaded.

The cost of a produced resource can be broken down by resource class and sub-class. This code tells the system how closely to look at the cost of a consumed resource in this class when rolling up the cost of a produced resource. If the level class code for a consumed resource is A, the system uses the cost from last rollup for that resource. If its level class code is B, the system looks down another level, to the prime costing PM for that resource, to find the components of its cost.

Note: If you install the Costing module, you may want to change all level class codes to A when you do so. The Costing module calculates costs using the actual PMs used to produce each resource, rather than using the Prime Costing PM for the entire quantity. After you install Costing, if any resource has a Level Class Code of B, the cost information calculated by Cost Rollup will not be comparable to the figures calculated by the Costing module.

BALANCE RES CD (B/C)—balance resource code. Enter B if this class is generally "balance" resources, for which you keep track of on-hand balances in your warehouses. Enter C if this class is generally "count up" resources, whose usage you track but for which you have no on-hand balance. Labor is a good example of a "count up" resource. Default (B) loaded.

BATCH CONS CD (Y/N)—batch consumption code. Y if the resource can be used in full batch quantities only, N if partial batches are allowed. Default from tailoring question #G14 loaded.

LOT CONTROL (Y/N)—Enter Y if resources in this class are generally lot-controlled, N if not. Default (N) loaded.

Action Horizon Days—used only if PRISM Planning module is installed. This is the number of days from the current planning date to the latest date for which you are acting upon the planning recommendations. See the Planning reference manual for more information about the various reference dates and their meanings. Default from Planning module tailoring questionnaire loaded.

Review Horizon Days—used only if PRISM Planning module is installed. This figure defines your long-term planning period: it is the number of days from the action date (latest date for which you are acting upon planning recommendations) to the review date (latest date for which you are creating planning recommendations). See the Planning reference manual for more information about the various reference dates and their meanings. Default from Planning module tailoring questionnaire loaded.

Buyer #—number of the buyer responsible for resources in this class.

SHELF LIFE CODE (Y/N)—Enter Y if resources in this class generally have limited shelf life, N if not. If you enter Y, the Shelf Life Days field is required. Default (N) loaded.

Shelf Life Days—required if Shelf Life Code is Y. Enter the number of days resources in this class can remain in a location before they must be re-inspected.

Planner #—number of the planner responsible for resources in this class. Certain reports in the Planning module can be limited by planner number.

POTENT RESOURCE (Y/N)—Enter Y if resources in this class generally have a potency factor, N if not. If you enter Y, Potency Factor is required. Default (N) loaded.

Potency Factor (%)—required if Potent Resource is Y. Enter the most common potency factor for resources in this class. For example, for a 40 percent solution this field would be 40.

Reporting Cl—reporting class. You can use this field for any information, for example department number. Enter the reporting class to which most resources in this class belong. Certain RM reports can be limited by reporting class.

Service Level (%)—used in future PRISM modules. Default from tailoring question #G30 loaded.

SYSTEM GENERATED PLANNED PURCHASE ORDERS (Y/N)—Y to allow system-generated purchase orders for resources in this class, N not to allow. Default (N) loaded.

Command Function Keys

ENTER—Press ENTER if the action code is A or C, to update the file with new information. This returns you to the selection screen. If the action code is D (delete), pressing ENTER just redisplays the screen.

CK18 REFRESH SCREEN—Select CK18 to redisplay this screen with the values currently stored in the file. If you are adding a record, the default information is displayed where applicable. If you are changing a record, the old attributes of this class are displayed. If the action code is D (delete), the same values are displayed.

CK19 RETURN WITHOUT UPDATE—If you decide not to add, change, or delete the information for this class, press CK19. This returns you to the selection screen.

CK20 DELETE—If the action code is D, a message is displayed at the bottom of the screen, instructing you to press CK20 to delete the record. At this point, you have a choice:

(1) Press CK20. This removes this record from the file and returns you to the selection screen.

(2) Press CK19. This returns you to the selection screen without removing the record.

SECTION XIV-III

When To Use Resource Sub-Class Maintenance

Option 15 allows you to maintain the Resource Sub-Class (RESUBC) file. This file is part of the PRISM defaulting system for resource information. Resource sub-classes, identified by resource class/sub-class combination, can be used to group together resources with common characteristics.

For example, the standard database includes resource sub-classes LA/SK (skilled labor) and LA/UN (unskilled labor). The resources in these categories are in the same resource class, but there are significant differences (cost, for example) requiring two sub-classes. At the resource level, these human resources are identified specifically: resource number LASK0200 refers to a particular type of skilled labor, a cook.

You assign a resource class and sub-class to each resource defined in the Resource Master (RESMST) file. If you define your resource classes and sub-classes so that the resources in those categories have a number of common characteristics, many fields in Resource Master Maintenance need not be entered. You can simply allow the appropriate information to "default from" the corresponding Resource Class or Resource Sub-Class file record. See *RM Concepts*, Section B, for a detailed discussion of the PRISM defaulting system.

How To Use Resource Sub-Class Maintenance

When you select Option 15 from the File Maintenance Menu (MI10), the Resource Sub-Class File Maintenance Selection Screen is displayed. Use this screen to identify the resource sub-class you want to maintain.

Selection Screen—MIE16001

Figure 65A:
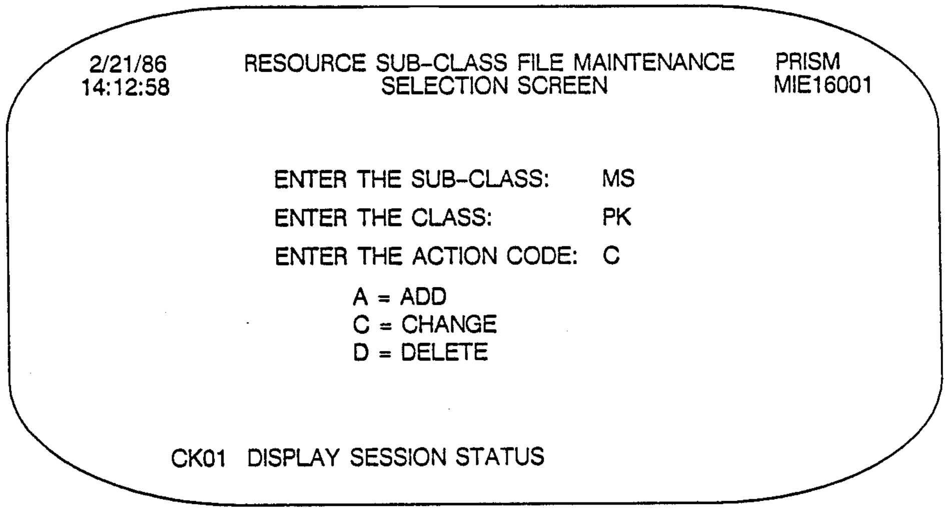

(See Figure 65A)

Fields for Entry

Sub-Class—required entry with action code A. Enter the two-character code for a resource sub-class.

Class—required entry with action code A. Enter the two-character code for a resource class.

ACTION CODE—Enter A to add a new resource sub-class, C to change an existing record, or D to delete an existing record.

Command Function Keys

ENTER—Press ENTER after entering the resource class and sub-class, to proceed to the data screen.

CK01 DISPLAY SESSION STATUS—Press CK01 to display the session status screen, which shows the number of records in the Resource Sub-Class file you have added, changed, and deleted during this session. When you press CK01 from that screen, a register is automatically printed. This register shows all records maintained during this session, with the current data for each.

CK20 DELETE—After entering action code D, you can choose one of two methods to remove the record:

(1) Press CK20. This removes this record from the file immediately.

(2) Press ENTER. This displays the data screen with the information for the record you are attempting to delete. At that point a message is displayed, instructing you to press CK20 to confirm that you want to delete the record. From that screen you can also press CK19 to return to the selection screen without removing the record.

Data Screen—MIE16002

(See Figure 65B)

The data screen is displayed when you press ENTER on the selection screen. Here, if the action code is A (add) or C (change), you can enter the attributes associated with this resource class/sub-class combination. If the action code is D, all fields on this screen are for display only.

Fields for Display

Class

Sub-Class

Last Maint—date this resource sub-class record was last updated. If you are adding a sub-class, this is today's *date.*

Action—The word ADD, CHANGE, or DELETE is displayed here, depending on the action code.

Class Description—description of the resource class for this sub-class, from the Resource Class (RECLAS) file.

Fields for Entry

For more information about any of the fields on this screen except Description, see *Resource Master Maintenance*, Section 1-13.

Sub-Class Description—Enter up to 30 characters of description for this resource sub-class.

Unit of Measure—unit of measure used for most resources in this sub-class. Default from Resource Class (RECLAS) file loaded.

Default Theoretical Consumption Code (D/C/T)—Enter the letter corresponding to the method of consuming resources in this sub-class. Default from Resource Class (RECLAS) file loaded. You have three options:

D = DIRECT. This means that a direct issue (DI) transaction must be entered to issue this resource to a particular schedule release. Use this code with resources you want to track most carefully, because it encourages precise tracking of the use of the resource. This code can be used for balance or non-balance resources.

C = CALCULATED. Use this code with non-balance resources you want theoretically consumed. When you report produced resources from the production model, the appropriate quantity of a resource with this code is "theoretically consumed" from the quantity previously issued to the floor using an IP transaction. This allows you to track some balance resources less closely than direct (D) or theoretically consumed (T) resources.

T = THEORETICAL CONSUMPTION. Use this code for balance resources you want theoretically consumed. In this case, you do not track a balance of the resource, but you do track what you use because it adds to the cost of production.

Selected Unit Cost—Enter a letter to indicate the cost figure to be used for the resource: S = standard cost, A = rolling average cost, H = historical cost, L = last period's average cost. Default from Resource Class (RECLAS) file loaded.

Amounts or percentages for variable and fixed overhead are added to the cost of a resource, to account for the overhead cost accumulated when using that resource. The following eight fields allow you to determine how these overhead figures are calculated for resources in this sub-class.

If you allow the answers for all four variable overhead fields to default from the Resource Class (RECLAS) file or tailoring questions #G21-G24, those defaults are used but are not loaded into the file. If you override one or more defaults, all four fields are loaded into the file. A similar rule is followed for the four fixed overhead fields. For more information about the PRISM defaulting system, see *RM Concepts*, Section B.

Variable Overhead Table/Rate—Enter T if the default variable overhead rate for resources in this sub-class is to be taken from a table. In this case, you must enter a valid table value from the Overhead Rate (OVRHDF) file in the Variable Overhead Table Value field. Enter R if the default overhead rate is specified in this record. In this case, you must enter a Variable Overhead Rate and Code.

Variable Overhead Table Value—Enter the table value to be used, if the Table/Rate field is T. Each valid table value defined in the Overhead Rate file is associated with a rate and an overhead code.

Variable Overhead Rate—Enter the variable overhead rate, if the Table/Rate field is R. The Variable Overhead Code determines whether this is a percentage (P) of the cost of the resource, or a dollar amount (D).

Variable Overhead Code—Enter P if the Variable Overhead Rate is a percentage of the cost of the resource. Enter D if it is a dollar amount.

Fixed Overhead Table/Rate—Enter T if the default fixed overhead rate for resources in this sub-class is to be taken from a table. In this case, you must enter a valid table value from the Overhead Rate (OVRHDF) file in the Fixed Overhead Table Value field. Enter R if the default overhead rate is specified in this record. In this case, you must enter a Fixed Overhead Rate and Code.

Fixed Overhead Table Value—Enter the table value to be used, if the Table/Rate field is T. Each valid table value defined in the Overhead Rate file is associated with a rate and an overhead code.

Fixed Overhead Rate—Enter the fixed overhead rate, if the Table/Rate field is R. The Fixed Overhead Code determines whether this is a percentage (P) of the cost of the resource, or a dollar amount (D).

Fixed Overhead Code—Enter P if the Fixed Overhead Rate is a percentage of the cost of the resource. Enter D if it is a dollar amount.

Cost Roll Type Cd (F/N/V)—cost rollup type code, used only if RP is installed. Default from Resource Class (RECLAS) file or tailoring question #G12 not loaded.

Think of the cost of production as having three components: the actual cost of the consumed resources, fixed overhead, and variable overhead. Enter the letter corresponding to the method of costing you want to use for most resources in this sub-class.

N = NORMAL. This code causes normal amounts to be added to all three components of the cost of the produced resource.

F = FIXED. The cost of the consumed resource plus any fixed and variable overhead amounts are all included in the category of fixed overhead for the produced resource.

V = VARIABLE. The cost of the consumed resource plus any fixed and variable overhead amounts are all included in the category of variable overhead.

Cost Roll Cost Meth—cost rollup costing method, used only if RP is installed. Enter the letter corresponding to the cost figure you want to use. F = fixed cost, R = rolled cost, S = standard cost, A = rolling average cost, H = historical cost, L = last period's average cost.

This code indicates the type of cost to be used for a consumed resource in this sub-class when needed to roll up the cost of a produced resource. Default from Resource Class (RECLAS) file or tailoring question #G10 not loaded.

Level Class Cd (A/B)—used only if RP is installed and if the Cost Rollup Costing Method is R. Default from Resource Class (RECLAS) file or tailoring question #G11 not loaded.

The cost of a produced resource can be broken down by resource class and sub-class. This code tells the system how closely to look at the cost of a consumed resource in this sub-class when rolling up the cost of a produced resource. If the level class code for a consumed resource is A, the system uses the cost from last rollup for that resource. If its level class code is B, the system looks down another level, to the prime costing PM for that resource, to find the components of its cost.

Note: If you install the Costing module, you may want to change all level class codes to A when you do so. The Costing module calculates costs using the actual PMs used to produce each resource, rather than using the Prime Costing PM for the entire quantity. After you install Costing, if any resource has a Level Class Code of B, the cost information calculated by Cost Rollup will not be comparable to the figures calculated by the Costing module.

Balance Res Cd (B/C)—balance resource code. Enter B if this sub-class is generally "balance" resources, for which you keep track of location balances. Enter C if this is a "count up" resource, one whose usage you track but for which you do not keep location balances. Labor is a good example of a "count up" resource. Default from Resource Class (RECLAS) file loaded.

Batch Cons Cd (Y/N)—batch consumption code. Y if the resource can be used in full batch quantities only. N if partial batches are allowed. Default from Resource Class (RECLAS) file loaded.

Lot Control (Y/N)—Enter Y if resources in this sub-class are generally lot-controlled. N if not. Default from Resource Class (RECLAS) file loaded.

Action Horizon Days—used only if PRISM Planning module is installed. This is the number of days from the current planning date to the latest date for which you are acting upon the planning recommendations. See the Planning reference manual for more information about the various reference dates and their meanings. Default from Resource Class (RECLAS) file loaded.

Review Horizon Days—used only if PRISM Planning module is installed. This figure defines your long-term planning period: it is the number of days from the action date (latest date for which you are acting upon planning recommendations) to the review date (latest date for which you are creating planning recommendations). See the Planning reference manual for more information about the various reference dates and their meanings. Default from Resource Class (RECLAS) file loaded.

Buyer #—number of the buyer responsible for resources in this sub-class.

Shelf Life Code (Y/N)—Enter Y if resources in this sub-class generally have limited shelf life, N if not. If you enter Y, the Shelf Life Days field is required. Default from Resource Class (RECLAS) file loaded.

Shelf Life Days—required if Shelf Life Code is Y. Enter the number of days resources in this sub-class can remain in a location before they must be re-inspected.

Planner #—number of the planner responsible for resources in this sub-class. Certain reports in the Planning module can be limited by planner number.

Potent Resource (Y/N)—Enter Y if resources in this sub-class generally have a potency factor, N if not. If you enter Y, Potency Factor is required. Default from Resource Class (RECLAS) file loaded.

Potency Factor (%)—required if Potent Resource is Y. Enter the most common potency factor for resources in this sub-class. For example, for a 40 percent solution this field would be 40.

Reporting Cl—reporting class. You can use this field for any information, for example department number. Enter the reporting class to which most resources in this sub-class belong. Certain RM reports can be limited by reporting class.

Service Level (%)—used in future PRISM modules. Default from Resource Class (RECLAS) file loaded.

System Generated Planned Purchase Orders (Y/N)—Y to allow system-generated purchase orders for resources in this sub-class, N not to allow. Default from Resource Class (RECLAS) file loaded.

Command Function Keys

ENTER—Press ENTER if the action code is A or C, to update the file with new information. This returns you to the selection screen. If the action code is D (delete), pressing ENTER just redisplays the screen.

CK18 REFRESH SCREEN—Select CK18 to redisplay this screen with the values currently stored in the file. If you are adding a record, the default information is displayed where applicable. If you are changing a record, the old attributes of this sub-class are displayed. If the action code is D (delete), the same values are displayed.

CK19 RETURN WITHOUT UPDATE—If you decide not to add, change, or delete the information for this sub-class, press CK19. This returns you to the selection screen.

CK20 DELETE—If the action code is D, a message is displayed at the bottom of the screen, instructing you to press CK20 to delete the record. At this point, you have a choice:

(1) Press CK20. This removes this record from the file and returns you to the selection screen.

(2) Press CK19. This returns you to the selection screen without removing the record.

SECTION XIV-IV

MIE140

RESOURCE CLASS FILE MAINTENANCE

A. The Resource Class File Maintenance program allows the user to enter and maintain information in the Resource Class (RECLAS) file. This file groups similar types of resource sub-classes and defines default values for that group of sub-classes.

Screens

MIE14001—Selection Screen
MIE14002—Data Screen
MIE14003—Session Status Screen

Selection Screen—MIE14001

A delete is performed only if the Resource Class for the record to be deleted is not used by any RESMST or RESUBC records that currently exist on the system.

Entry Fields:

Resource Class
Action Code (A = add, C = change, D = delete)

Required Fields:

Resource Class
Action Code

Edits:

If Action is ADD, record must not exist.
If Action is CHANGE or DELETE, record must exist.
CK20 not valid if Action Code is A or C.
Action Code must be A, C, or D.
If Action is DELETE, resource class cannot exist in Resource Master (RESMST) file or in Resource Sub-Class (RESUBC) file.

Command Keys (Display):

CK01 Display Session Status

Command Keys (Non-Display):

CK07 Send Message to Action List
CK17 Error Message Override
CK20 Delete Record
HELP HELP Text

Data Screen—MIE14002

Display-Only Fields:

Resource Class
Date Last Maintenance
Action Code

Entry Fields:

Resource Class Description
Unit of Measure
Default Theoretical Consumption Code
Selected Unit Cost
Variable Overhead Table/Rate
Variable Overhead Table Value
Variable Overhead Rate
Variable Overhead Code
Fixed Overhead Table/Rate
Fixed Overhead Table Value
Fixed Overhead Rate
Fixed Overhead Code
Cost Rollup Type Code
Cost Rollup Costing Method
Cost Rollup Class Level Code
Balance Resource Code
Batch Consumption Code
Lot Control
Action Horizon Days
Review Horizon Days
Buyer Number
Shelf Life Code
Shelf Life Days
Planner Number
Potent Resource
Potency Factor (%)
Reporting Class
Service Level (%)
System Generated Planned Purchase Order Required Fields:

Balance Resource Code
Default Theoretical Consumption Code
Potent Resource
Shelf Life Code
Batch Consumption Code
Lot Control
System Generated Planned Purchase Order Edits:

Note: If the user blanks out a field that defaults to Tailoring (Foundation, RM, or Planning), that field is reloaded with the default value before any editing is performed, and the default value is edited.

Balance resource code must be B or C.

Default theoretical consumption code be T, C, or D.

If the RM Tailoring field TATCAL (Theoretical Consumption Allowed?) is N, default theoretical consumption code must be D. Cost Roll Up Type Code must be F, N, V, or blank.

Cost Roll Up Costing Method must be F, R, S, A, H, L, or blank.

Selected Unit Cost must be S, A, H, or L.

Cost Rollup Class Level Code must be A, B, or blank.
Fixed Overhead Table/Rate must be R, T, or blank.
Fixed Overhead Code must be P, D, or blank.
Variable Overhead Table/Rate must be R, T, or blank.
Variable Overhead Code must be P, D, or blank.
If Fixed Table/Rate is R, the Fixed Overhead Rate and Fixed Overhead Code fields must be entered.
If Variable Table/Rate is R, the Variable Overhead Rate and Variable Overhead Code fields must be entered.
If Fixed Table/Rate is T, the Fixed Table Value must be entered.
If Variable Table/Rate is T, the Variable Table Value must be entered.
If Fixed Table/Rate is T, the Fixed Table Value must exist in the Overhead Rate (OVHDRF) file.
If Variable Table/Rate is T, the Variable Table Value must exist in the Overhead Rate (OVHDRF) file.
Shelf Life Code must be Y or N.
If Shelf Life Code is Y, Shelf Life Days must be greater than zero.
If Shelf Life Code is N, Shelf Life Days must be zero.
Potent Resource must be Y or N.
If Potent Resource is Y, Potency Factor must be greater than zero.
If Potent Resource is N, Potency Factor must be zero.
Batch Consumption Code must be Y or N.
Lot control must be Y or N.
System-generated Planned Purchase Order must be Y or N.

Defaults:

Note: If the user blanks out a field that defaults to Tailoring (Foundation, RM or Planning), that field is reloaded with the default value before any editing is performed, and the default value is edited.
Unit of Measure—defaults to TALFLZ field TAUSYS and is loaded into RECLAS file.
Service Level (%)—defaults to TALFLI field TASERV and is loaded into RECLAS file.
Selected Unit Cost—defaults to TALFLI field TASELC and is loaded into RECLAS file.
Default Theoretical Consumption Code—defaults to D and is loaded into RECLAS file.
Balance Resource Code—defaults to B and is loaded into RECLAS file.
Variable Overhead Rate—defaults to TALFLI field TAVORT.
Variable Overhead Code—defaults to TALFLI field TAVOPD.
Variable Overhead Table Value—defaults to TALFLI field TAVOTV.
Variable Overhead Table/Rate—defaults to TALFLI field TAVOTR.

If all of the above four Variable Overhead fields are equal to their respective default values, blanks or zeroes are loaded into the RECLAS file. If one or more of the fields does not equal its default value, the screen values are loaded into the RECLAS file.

Fixed Overhead Rate—defaults to TALFLI field TAFORT.

Fixed Overhead Code—defaults to TALFLI field TAFOPD.

Fixed Overhead Table Value—defaults to TALFLI field TAFOTV.

Fixed Overhead Table/Rate—defaults to TALFLI field TAFOTR.

If all of the above four Fixed Overhead fields are equal to their respective default values, blanks or zeroes are loaded into the RECLAS file. If one or more of the fields does not equal its default value, the screen values are loaded into the RECLAS file.

Cost Roll Up Type Code—defaults to TALFLI field TACSTP. If blank, tailoring value NOT loaded into RECLAS file.

Cost Roll Up Costing Method—defaults to TALFLI field TACSRU. If blank, tailoring value NOT loaded into RECLAS file.

Cost Roll Up Class Code—defaults to TALFLI field TACRLC.

If blank, tailoring value NOT loaded into RECLAS file.

Shelf Life Code—defaults to N and is loaded into RECLAS file.

Potent Resource—defaults to N and is loaded into RECLAS file.

Lot Control Code—defaults to N and is loaded into RECLAS file.

Batch Consumption Code—defaults to TALFLI field TABCON and is loaded into RECLAS file.

Action Horizon Days—defaults to TALFLR field TACDRD and is loaded into RECLAS file.

Review Horizon Days—defaults to TALFLR field TARDRD and is loaded into RECLAS file.

System-generated Planned Purchase Order—defaults to N and is loaded into RECLAS file.

Date Last Maintenance—defaults to system date (ADD mode only).

Command Keys (Display):

CK18 Refresh Screen
CK19 Return Without Update

Command Keys (Non-Display):

CK07 Send Message to Action List
CK17 Error Message Override
CK20 Delete Record
HELP HELP Text Session Status Screen—MIE14003

The Session Status Screen displays the number of records added, changed, and deleted. If CK01 is taken, the program ends. If the ENTER key is pressed, the Selection Screen is redisplayed.

Display-Only Fields:

Number of Records Added
Number of Records Changed
Number of Records Deleted

Command Keys (Display):

CK01 End Job

Command Keys (Non-Display):

| | |
|---|---|
| CK07 | Send Message to Action List |
| HELP | HELP Text |

B.

| File | Usage |
|---|---|
| MIE140FM | CF |
| ERRMSG | IF |
| OVHDFRF | IF |
| RECLAS | UF |
| RESMSTCS | IF |
| RESUBC | IF |
| TALFLI | IF |
| TALFLR | IF |
| TALFLZ | IF |
| QSYSPRT | O |

C.

| File Name | Field Name | Description |
|---|---|---|
| TALFLI | TABCON | Batch Consumption |
| | TAFOPD | Fixed Overhead Code |
| | TAFORT | Fixed Overhead Rate |
| | TAFOTV | Fixed Overhead Table Value |
| | TAFOTR | Fixed Overhead Table/Rate |
| | TACRLC | Cost Rollup Level Class Code |
| | TACSTP | Cost Rollup Type Code |
| | TACSRU | Cost Rollup Method |
| | TASELC | Selected Unit Cost |
| | TASERV | Service Level (%) |
| | TAVORT | Variable Overhead Rate |
| | TAVOTV | Variable Overhead Table Value |
| | TAVOTR | Variable Overhead Type |
| | TAVOPD | Variable Overhead Code |
| TALFLR | TACDRD | Action Horizon Days |
| | TARDRD | Review Horizon Days |
| TALFLZ | TAUSYS | Unit of Measure |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Resource Class records that were updated are printed on the Maintenance Register, which includes the Action (ADD, CHANGE, or DELETE) and all entry and display-only fields.

MIE160

Resource Sub-Class File Maintenance

A. The Resource Sub-Class File Maintenance program allows the user to enter and maintain information in the Resource Sub-Class (RESUBC) file. This file groups similar types of resources together and defines default values for a group of resources.

Screens

MIE16001—Selection Screen
MIE16002—Data Screen
MIE16003—Session Status Screen

Selection Screen—MIE16001

The user may add, change, or delete records. A delete is performed only if the resource class/sub-class combination for the record to be deleted does not exist in the Resource Master (RESMST) file.

Entry Fields:

Resource Class
Resource Sub-Class
Action Code ( A = add, C = change, D = delete)

Required Fields:

Resource Class (ADD mode only)
Resource Sub-Class (ADD mode only)
Action Code

Edits:

If Action is ADD, record must not exist.
If Action is CHANGE or DELETE, record must exist.
CK20 not valid if Action Code is A or C.
Action Code must be A, C or D.
If Action is DELETE, Resource Class/Sub-Class cannot exist in Resource Master (RESMST) file.

Command Keys (Display):

CK01 Display Session Status

Command Keys (Non-Display):

CK07 Send Message to Action List
CK17 Error Message Override
CK20 Delete Record
HELP HELP Text

Data Screen—MIE16002

Display-Only Fields:

Resource Class
Resource Sub-Class
Date Last Maintenance
Action Code
Resource Class Description Entry Fields:

Resource Sub-Class Description
Unit of Measure
Service Level (%)
Default Theoretical Consumption Code
Selected Unit Cost
Variable Overhead Table/Rate
Variable Overhead Table Value
Variable Overhead Rate
Variable Overhead Code
Fixed Overhead Table/Rate
Fixed Overhead Table Value
Fixed Overhead Rate
Fixed Overhead Code
Cost Rollup Type Code
Cost Rollup Costing Method
Cost Rollup Level Class Code
Balance Resource Code
Batch Consumption Code
Lot Control Action Horizon Days
Review Horizon Days
Buyer Number
Shelf Life Code
Shelf Life—Days
Planner Number
Potent Resource
Potency Factor (%)
Reporting Class Service Level (%)
System-generated Planned Purchase Orders Edits:

Note: If the user blanks out a field that defaults to Tailoring (Foundation, RM, or Planning), that field is reloaded with the default value before any editing is performed, and the default value is edited.

Default Theoretical Consumption Code must be T, C, D, or blank.
Selected Unit Cost must be S, A, H, L, or blank.
Cost Rollup Type Code must be F, N, V, or blank.
Balance Resource code must be B, C, or blank.
Cost Rollup Costing Method must be F, R, S, A, H, L, or blank.
Variable Overhead Code, if entered, must be P or D.
Variable Overhead Table/Rate, if entered, must be T or R.
If Variable Overhead Table/Rate is T, the Variable Overhead Table Value must be entered and must exist in the Overhead Rate (OVHDRF) file.
If Variable Overhead Table/Rate is R, the Variable Overhead Rate and Variable Overhead Code fields must be entered.
Fixed Overhead Code, if entered, must be P or D.
Fixed Overhead Table/Rate, if entered, must be T or R.
If Fixed Overhead Table/Rate is T, the Fixed Overhead Table Value must be entered and must exist in the Overhead Rate (OVHDRF) file.
If Fixed Overhead Table/Rate is R, the Fixed Overhead Rate and Fixed Overhead Code fields must be entered.
Cost Rollup Level Class Code must be A, B, or blank.
Shelf Life Code, if entered, must be Y or N.
If Shelf Life Code is N, the Shelf Life Days field must be greater than zero. If Shelf
Life Code is Y, Shelf Life Days must be zero.
Potent Resource must be Y, N, or blanks.
If Potent Resource is Y, Potency Factor must be greater than zero. If Potent Resource is N or blank, Potency Factor must be zero.
System-generated Planned Purchase Orders must be Y, N, or blank.

Defaults:

Date Last Maintenance—defaults to system date (ADD mode only).

Required Fields:

The Data Screen has no required fields. If any of the following fields is blanked out, it defaults first to the Resource Class (RECLAS) file and then to the RM Tailoring (TALFLI) file. The defaulting sequence is shown below:

| Field Name | From File |
|---|---|
| Service Level (%) | RECLAS |
| Balance Resource Code | RECLAS |
| Theoretical Cons Code | RECLAS |
| Standard Unit of Measure | RECLAS |
| Selected Unit Cost | RECLAS |
| Reporting Class | RECLAS |
| Shelf Life Code | RECLAS |
| Shelf Life Days | RECLAS |
| Potent Resource Code | RECLAS |
| Potency Factor | RECLAS |
| Planner Number | RECLAS |
| Buyer Number | RECLAS |
| Batch Consumption Code | RECLAS |
| Action Horizon Days | RECLAS |
| Review Horizon Days | RECLAS |
| Lot Control | RECLAS |
| Planned Purchase Orders | RECLAS |

The following fields are loaded into RESUBC as blanks if they equal the default value in either RECLAS or the RM Tailoring (TALFLI) file.

Cost Roll Up Type Code
Cost Roll Up Costing Method
Cost Roll Up Level Class Code The following fields are loaded into RESUBC as blanks if all four equal their default values. If one or more fields does not equal its default values, all four screen fields are loaded into RESUBC.

Variable Overhead Rate
Variable Overhead Code
Variable Overhead Table Value
Variable Overhead Table/Rate The following fields are loaded into RESUBC as blanks if all four equal their default values. If one or more fields does not equal its default value, all four screen field values are loaded into RESUBC.

Fixed Overhead Rate
Fixed Overhead Code
Fixed Overhead Table Value
Fixed Overhead Table/Rate Command Keys (Display):

CK18 Refresh Screen
CK19 Return Without Update

Command Keys (Non-Display):

CK07 Send Message to Action List
CK17 Error Message Override
CK20 Delete Record
HELP HELP Text

Session Status Screen—MIE16003

The Session Status Screen displays the number of records added, changed, and deleted. CK01 ends the current job.

Display-Only Fields:

Number of Records Added
Number of Records Changed
Number of Records Deleted

Command Keys (Display):

CK01 End Job

Command Keys (Non-Display):

CK07 Send Message to Action List
HELP HELP Text

B.

| File | Usage |
|---|---|
| ERRMSG | IF |
| MIE160FM | CF |
| OVHDRF | IF |
| RECLAS | IF |
| RESMSTCS | IF |
| RESUBC | UF |
| TALFLI | IF |
| QSYSPRT | O |

MIE180

Resource Master File Maintenance

A. The Resource Master File Maintenance program allows the user to enter and maintain information in the Resource Master (RESMST) file. This file contains one record for every non-balance resource (e.g., electricity) as well as a record for every balance resource on the system.

Screens

MIE18001—Selection Screen
MIE18002—Data Screen #1
MIE18003—Data Screen #2
MIE18004—Data Screen #3
MIE18005—Data Screen #4 (Cost fields)
MIE18006—Session Status Screen

Selection Screen—MIE18001

From the Selection Screen, the user can take CK11 to call the Alpha Search Inquiry program (MII180) for a list of resource numbers and their corresponding descriptions before keying in a particular resource number.

SECTION XV-I

Location Classifications

SECTION XV

You may be accustomed to software systems that "classify" locations for you—dock, inspection, stock, and so forth. Even the most carefully designed "canned" classifications, however, are rarely as numerous as the actual situations in your plant. Their characteristics are predefined, allowing for no "ifs, ands, or buts."

Both of these problems are eliminated in PRISM. Using this system, you can define an unlimited number of location classifications, and you decide the meaning of each one.

To each warehouse/location/resource combination in your system you can assign a location classification code. This code, defined through *Location Classification Maintenance* (see Section 1–4), determines a number of the characteristics of the resource at that location. Some, but not all, of these characteristics are described below. For a complete list of the traits associated with location classifications, see Section 1–4.

All resources in locations on your system are defined to be "on hand" inventory, "on order" inventory, or neither (never both). This classifies the various quantities of each resource that you have in your warehouse(s), so that the system can perform certain calculations, create reservations, and so on.

"On hand" means that the resources in the location classification are immediately available for production. Only resources in "on hand" location classifications can be reserved for schedules.

"On order" means that the resources cannot be used for production immediately, but they definitely exist. You are fairly certain that at some future time they will become available. You might define inspection as an "on order" classification, for example. Resources being inspected are not available for use, but they will be after they have passed your quality tests.

A location classification can also be defined as neither on hand nor on order. This is another possibility you may consider for inspection locations. Resources being inspected are definitely not available for use, so they are not on hand. Since you have definitely received them, you may not consider them on order. On the other hand, if they fail inspection you may decide to send them back to the production line or back to a vendor. For this reason you may decide that they *are* on order. One of the benefits of PRISM is that you make this decision rather than your software.

Another characteristic determined by location classification is Planning Availability, that is whether resources in the classification should be considered in a Planning module planning run. This one-digit field in Location Classification Maintenance can be 2 (always available for planning), 1 (available for planning at ETD date), or 0 (never available for planning).

A two (2) means that resources in the location classification should always be considered available for planning, from the moment they enter that classification. For example, most users will have a location classification for resources that are simply in stock, ready for use. Such a classification would probably have a two in the Planning Availability field.

A one (1) means that resources in the classification should only be considered after a certain period of time (see Section 1-4 for details). Suppose you have an "in transit" location classification. Your policy is to "receive" resources to this classification when you know that you will physically receive them within 10 days. A planning run should not consider these resources immediately available. But when it starts planning production 10 or more days ahead, you might want these resources to be counted as available, because by then you should have them.

A zero (0) means that the resources should never be considered in planning. An inspection classification, for example, could have Planning Availability zero.

The resources at a location acquire some of their characteristics from the location classification. Thus, these characteristics change when the resource changes classification. When a resource moves from an "on order" location to an "on hand" classification, your dollar value of resources on order decreases, and your dollar value of on hand inventory increases.

Change Classification Transactions. Suppose you are finished inspecting a resource, and it is now available for further use. Normally, to give a software system this information, you would enter a transaction moving the resource from a location whose classification is "inspection" to one whose classification is "available." You can do this in PRISM.

But what if the "resource" is an airplane? In that case, you are probably not actually moving it to a new location. You want just to change the location classification of the resource at its current location. In PRISM, you can do this too. Such "change classification" transactions are user-defined (see *Transactions*, below).

Lot Control

The complete and accurate lot control information provided by PRISM requires that you perform a few simple procedures to set up your control process. For each resource on your system that needs to be lot-controlled, enter Y in the Lot Control field on Data Screen MIE18003 in Resource Master Maintenance. Then, define the location classifications that require lot numbers through Location Classification Maintenance. An "in transit" location classification, for example, would not require lot information, since at that point you have not yet received the materials.

When receiving a resource to a location, you are REQUIRED to enter a lot number *if and only if both Lot Control fields are Y.* The resource must be a lot control resource, AND the location to which you are receiving it must have a location classification that requires lot control. This way, you are not forced to enter lot control information unless it is necessary.

SECTION XV-II

When To Use Location Classification Code Maintenance

Use Option 4 to maintain the Location Classification Code (CLASCD) file. When you place a resource in a location, you specify a location classification. The location classification determines attributes of locations with that classification, and therefore also of resources in those locations. For more information on location classifications, see *RM Concepts*, Section B.

How To Use Location Classification Maintenance

When you select Option 4 from the File Maintenance Menu (MI10), the Location Classification Maintenance Selection Screen is displayed. Use this screen to identify the location classification code you want to add or change.

Selection Screen--MIE04001

(See Figure 66)

Fields for Entry

LOCATION CLASSIFICATION CODE—Enter the four-character location classification code whose attributes you want to maintain.

ACTION CODE—Enter A to add a new location classification to your system, C to change an existing record. You cannot delete an existing classification code, because its attributes may be needed to update the Transaction History (TRHIST) file. Use the Activity Status field on the data screen to "turn off" a classification, to prevent operators from using it.

Command Function Keys

ENTER—Press ENTER after entering the location classification and an action code, to proceed to the data screen.

CK01 DISPLAY SESSION STATUS—Press CK01 to display the session status screen, which shows the number of records in the Location Classification Code file you have added or changed during this session. You can exit Location Classification Code Maintenance from that screen.

Data Screen—*MIE04002*

(See Figure 67)

The data screen is displayed when you press ENTER on the selection screen. Here you can enter the attributes associated with this location classification code.

Fields for Display

Locn Classification Code

Date Last Maint—date this location classification record was last updated. If a new record is being added, this is today's date.

Action—The word ADD or CHANGE is displayed here, depending on the action code.

Fields for Entry

Be careful to enter the correct information on this screen, because you cannot delete location classification codes and certain fields (noted below) are not available for entry when the action code is C (change).

DESCRIPTION—Enter up to 30 characters of description for this location classification code.

ACTIVITY STATUS (A/N)—Enter A if this location classification is "active," that is, available for use, N if it is "non-active." If this field is A, this location classification code is treated normally. An operator can use it to record the type of location into which s/he is moving a resource. If this field is N, this location classification cannot be used. If an operator attempts to use it in Transaction Entry, for example, an error message is displayed.

This field allows you to "turn off" a location classification temporarily. You would also use this code to "delete" the classification. Location classification codes cannot be deleted in the normal way, because the attributes are needed by the system to update the Transaction History (TRHIST) file. Instead of deleting a classification, change this code to N so that it is no longer used. This accomplishes the goal of preventing operators from using it, without depriving the system of needed information.

LOT CONTROL—Enter Y if an operator must enter a lot number in order to move a resource into a location with this classification. Enter N if a lot number is not required.

EXPECTED NO. OF DAYS—number of days after it is moved to a location with this classification that a resource is expected to move to a different classification.

CALENDAR OR WORK DAYS—Enter C if the Expected Number of Days is measured in calendar days, W if in work (business) days. Which dates on your calendar are work days is determined through Calendar File Maintenance (see Section 1-1 of the Foundation reference manual).

ON ORDER INVENTORY—Enter Y if resources in these locations are considered to be on order. Enter N if resources in these locations are not on order. Resources in a classification can be on hand, on order, or neither. This field is not available for entry when the action code is C.

ON HAND INVENTORY—Enter Y if resources in these locations are considered to be on hand. Enter N if resources in these locations are not on hand. Resources in a classification can be on hand, on order, or neither. This field is not available for entry when the action code is C.

$ VALUE INVENTORY—Enter Y if the value of resources in these locations is considered an inventory amount, N if not. A resource cannot be both on order and an inventory amount: if the On Order Inventory field is Y, this field must be N. This field is not available for entry when the action code is C.

$ VALUE WIP—$ value work-in-process. Enter Y if the value of resources in these locations is considered a work-in-process amount, N if not. A resource cannot be both on order and a work-in-process amount: if the On Order Inventory field is Y, this field must be N. In addition, this field and the $ Value Inventory field cannot both be Y. This field is not available for entry when the action code is C.

PLANNING AVAILABILITY (0, 1, 2)—indicates when a resource in this location classification is available for planning purposes. If the On Order Inventory field is Y, this field must be 0. This field is not available for entry when the action code is C.

Enter 2 if such a resource is immediately available, if it can be used in planning runs from the time it enters this classification. Enter 1 if it becomes available at the estimated time of departure (ETD). The ETD is the date the resource enters the classification, plus the Expected Number of Days. Enter 0 if a resource in this classification is never available for planning.

IMPORTANT NOTE: If you expect to install the Planning module, it is recommended that you NOT define any location classifications with On Order = N and Planning Availability = 0. This would adversely affect the results from your Planning run for resources in such a classification. The resources in that location classification would disappear from Planning's view entirely, because they would be neither on order nor usable.

Command Function Keys

ENTER—Press ENTER after entering or changing the attributes associated with this location classification code, to update the file with this new information. This returns you to the selection screen.

CK18 REFRESH SCREEN—Select CK18 to redisplay this screen with the values currently stored in the file. If you are adding a record, the default information for all fields is displayed. If you are changing a record, the old attributes are displayed.

CK19 RETURN WITHOUT UPDATE—If you decide not to add or change the information for this classification, press CK19. This returns you to the selection screen.

SECTION XV-III

MIE040

Location Classification Code Maintenance

A. This program allows the user to enter and maintain information in the Location Classification Code (CLASCD) File. The Location Classification Code defines a set of attributes for locations that are identified using the Location Classification Code.

Screens

MIE04001—Selection Screen
MIE04002—Data Screen
MIE04003—Session Status Screen

Selection Screen—MIE04001

The user may add or change a record, but deletion of an existing record is not permitted.

Entry Fields:

Location Classification Code
Action Code (A = add, C = change)

Required Fields:

Location Classification Code
Action Code

Edits:

If Action is ADD, record cannot exist.
If Action is CHANGE, record must exist.
Action Code must be A or C.

Command Keys (Display):

CK01 Display Session Status

Command Keys (Non-Display):

CK07 Send Message to Action List
CK17 Error Message Override
HELP HELP Text

Data Screen—MIE04002

When the Action is ADD, all Data Screen fields are available for entry. When the Action is Change, only the Activity Status Code, Description, Number of Days, Calendar or Workdays Code, and Lot Control fields are available for entry.

When the Action is ADD and the Data Screen is displayed, all fields default except the Location Classification Code Description. The remaining fields default as follows:

1. All Yes/No fields default to N.
2. Activity Status (Active/Non-Active) defaults to A.
3. Expected Number of Days defaults to zero.
4. Calendar or Workdays defaults to W.
5. Planning Availability defaults to zero.

If the user blanks out any of these default values, except Expected Number of Days, s/he is required to enter a value.

Display-Only Fields (when Action is CHANGE):

Location Classification Code
Date Last Maintenance
Action
On Order Inventory
On Hand Inventory
$ Value Inventory
$ Value WIP
Planning Availability Entry Fields:

Fields marked with an asterisk (*) are not available for entry when Action is CHANGE.

Location Classification Code Description
Activity Status

Lot Control
Expected Number of Days
Calendar or Workdays
* On Order Inventory
° On Hand Inventory
° $ Value Inventory
° $ Value WIP
° Planning Availability Required Fields:

All fields except Expected Number of Days

Edits:

Activity Status must be A or N.
Calendar or Workdays must be C or W.
On Order Inventory must be Y or N.
On Hand Inventory must be Y or N.
$ Value Inventory must be Y or N.
$ Value WIP must be Y or N.
Planning Availability must be 0, 1, or 2.
If Action is ADD and On Order Inventory is Y, Planning Availability must be zero. If On Order Inventory is N, Planning Availability must be 1 or 2.
If Action is ADD and On Order Inventory is Y, the On Hand Inventory must be N, and vice-versa.
If Action is ADD and On Order Inventory is Y:
(1) $ Value Inventory must be N and
(2) $ Value WIP must be N.
If Action is ADD and On Hand Inventory is Y, $ Value Inventory must be N.
If $ Value WIP is Y, $ Value Inventory must be N.
Expected Number of Days cannot be negative.

Defaults:

Date Last Maintenance—defaults to System Date (ADD only)
See Section A for additional defaults.

Command Keys (Display):

CK18 Refresh Screen
CK19 Return Without Update

Command Keys (Non-Display):

CK07 Send Message to Action List
CK17 Error Message Override
HELP HELP Text

Session Status Screen—MIE04003

The Session Status Screen displays the number of records added and changed. If CK01 is taken, the program ends. If ENTER is pressed, the Selection Screen is redisplayed.

Display-Only Fields:

Number of Records Added
Number of Records Changed

Command Keys (Display):

CK01 End Job
ENTER Return to Selection Screen

Command Keys (Non-Display):

CK07 Send Message to Action List
HELP HELP Text

B.

| File | Usage |
|---|---|
| ERRMSG | IF |
| CLASCD | UF |
| MIE040FM | CF |
| QSYSPRT | O |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All records that were updated are printed on the Maintenance Register, which includes the Action (ADD or CHANGE) and all entry and display-only fields.

MIE060

Downgrade Template Maintenance

A. The Downgrade Template Maintenance program allows the user to enter and maintain information in the Downgrade Template (DGRADE) file. This file defines valid grade changes for a resource.

Screens

MIE06001—Selection Screen
MIE06002—Session Status Screen

Selection Screen—MIE06001

The user may add or delete a record, but a change to an existing record is not permitted. The Date of Last Maintenance field is maintained by the program but not displayed on the screen.

Entry Fields:

Resource Number
Original Grade
New Grade
Action Code (A = add, D = delete)

Required Fields:

Resource Number
Original Grade
New Grade
Action Code

Edits:

If Action is ADD, the record must not already exist.
If Action is DELETE, the record must exist.
Action Code must be A or D.
If Action is ADD, the Original Grade and New Grade cannot be the same.
Either Original Grade or New Grade must have a value other than blanks.
The Resource Number must exist in RESMST before a record can be added (UDS message).

Command Keys (Display):

CK01 Display Session Status

Command Keys (Non-Display):

| | |
|---|---|
| CK07 | Send Message to Action List |
| CK17 | Error Message Override |
| CK20 | Delete Record |
| HELP | HELP Text |

Session Status Screen—MIE06002

The Session Status Screen displays the number of records added and deleted. If CK01 is taken, the program ends. If ENTER is pressed, the Selection Screen is redisplayed.

Display-Only Fields:

Number of Records Added
Number of Records Deleted

Command Keys (Display):

| | |
|---|---|
| CK01 | End Job |
| ENTER | Return to Selection Screen |

Command Keys (Non-Display):

| | |
|---|---|
| CK07 | Send Message to Action List |
| HELP | HELP Text |

B.

| File | Usage |
|---|---|
| DGRADE | UF |
| ERRMSG | IF |
| MIE060FM | CF |
| RESMST | IF |
| TALFLI | IF |
| QSYSPRT | O |

C.

| File Name | Field Name | Description |
|---|---|---|
| TALFLI | TARESC | Resource # Variable Heading |
| | TAGRAD | Grade Variable Heading |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All records that were updated are printed on the Maintenance Register, which includes Action (ADD or DELETE), and all entry and display-only fields.

SECTION XVI

SECTION XVI-I

Transactions

What is a transaction? It is the way you tell the computer what is happening in your plant. Transactions inform the computer when you move a resource from one location to another, from your warehouse to the production floor, from the vendor to your warehouse. There are also transactions for correcting quantities at locations, for changing the grade of a resource, even for telling the system that some quantity of resource was stolen. In general, you tell the system "Here is the way things were, and here is the way they are now."

Consequently, you see a lot of references in this and other PRISM manuals to "From" and "To" attributes (such as locations, lot numbers, and grades). Think of these as the "before" and "after" pictures, which the system uses to change its records of where everything is. Suppose you tell it that you moved 100 of resource A from location A22 to location B33. The computer needs to REDUCE the quantity of resource A currently recorded at location A22 by 100, and INCREASE what is currently recorded at location B33 by the same quantity. It receives this information from transactions.

Marcam Transactions

Marcam defines 21 basic transactions:

| *Transaction Type* | *Meaning* |
|---|---|
| CA | Cost Adjustment |
| CC | Calculated Cost |
| CY | Cycle Count Adjustment |
| DI | Direct Issue |
| IA | Inventory Adjustment |
| IM | Indirect Measurement |
| IP | Issue To Production |
| MI | Miscellaneous Issue |
| MR | Miscellaneous Receipt |
| ON | Ongoing Production |
| PC | Pick Complete |
| PR | Production Receipt |
| RA | Resource Adjustment |
| RC | Resource Number Change |
| RS | Return to Stock |
| RT | Return to Production |
| SA | Sales |
| SC | Scrap |
| TC | Theoretical Consumption |
| TP | Theoretical Production |
| TR | Transfer Resource |

These are generally transactions that cannot vary between users because of the way they relate to the structure of PRISM. For example, this category includes schedule-related transactions, the transactions you use to tell the computer what is happening on your production lines.

Most Marcam-defined transactions can be entered by operators using the Transaction Entry program (see Section 8-2). The best way to become familiar with these transactions, and to analyze how they fit into the daily operations at your plant, is to read the descriptions provided at the beginning of each transaction screen in Section 8-2.

There are *four* Marcam-defined transactions that can only be generated by the computer, in response to certain actions on your part. These transactions are described below.

Theoretical Consumption (TC) & Calculated Cost (CC)—These transactions can be generated when an operator enters a PR (production receipt) or ON (ongoing production) transaction. PR and ON transactions record the production of a resource from a production model on a particular schedule.

Each consumed resource on a production model is assigned a Theoretical Consumption Code. If that code is D, you tell the system specifically when you issue some of the resource to a schedule. If that code is T or C, the system calculates how much you used based on the quantity of produced resources you report. If 20 screws are used for every wagon produced (this information is on the production model), and you report production of 10 wagons, the system knows enough to generate a transaction for 200 screws.

Whether you have the system do this for any individual resource depends on how closely you want to track consumption of it. For more information on theoretical consumption codes, see *Theoretical Consumption Codes* and Data Screen MIE18002 in *Resource Master Maintenance*, Section 1-13.

Theoretical Production (TP)—This transaction occurs when your production model has a non-reportable produced resource. The system calculates the quantity of the resource produced, based on reported production of other resources on the same task or a later task. For more information, see *Theoretical Production*.

Cycle Count (CY)—The cycle counting function in PRISM allows you to count inventory on a rotating basis, without ever having to shut down the whole plant just for that purpose. Briefly, that process works as follows:

(1) The system generates a list of resources and locations that need to be counted. See *Cycle Count List*, Section 2-4.

(2) You tell the system, through Cycle Count Entry (see Section 8-1), what quantity of each resource was actually found at each location. There may be a difference between the expected quantity of a resource at a location, and the actual quantity reported for that location.

(3) If you confirm that the reported quantity is the real quantity at that location, by running the Cycle Count Variance Report (see Section 2-5) and using the option to update the files, then the system generates a cycle count transaction to account for the difference.

The whole purpose of the CY transaction is for the system to have a record indicating the reason why the quantity at that location was increased or decreased.

User-Defined Transactions

User-defined transactions are necessary because location classifications are user-defined (see *Location Classifications*, above). You can define an unlimited number of your own transactions, using the User-Defined Transaction Maintenance program (see Section 1-20). These transactions allow you to move resources from one location classification to another, and to change the location classification of a resource without moving it.

Defining the transactions yourself provides you with the flexibility to do things YOUR way. It enables you to use the same accounting system you always have, rather than changing all your daily operations to fit the software. YOU determine what counts as an inventory amount and what counts as work-in-process. YOU determine what paths a resource can follow—if you don't define a transaction moving resources from the vendor directly to stock, it can't be done.

How can you determine what types of transactions you need? You should probably draw a diagram of some sort. One good way to start is to make a list of your location classifications, and figure out the paths that resources might follow.

For example, let's say your system allows a resource to go from a vendor to inspection, and from inspection to regular stock, but never from the vendor directly to stock. You want to be sure that resources are always inspected before being included as part of your inventory. In that case, you need a vendor-to-inspection transaction and an inspection-to-stock transaction, but you do not need a vendor-to-stock transaction.

Remember to think of ALL the ways that a resource could reach each location classification. You probably need more than just the paths from classification to classification. For example, a resource could get to inspection from another classification OR from a vendor.

SECTION XVI-II

When To Use Transaction Entry

Use this option to inform the system of all movements of resources in your plant: from vendor to your dock, from dock to inspection, from warehouse to production line, from task 1 to task 2, from production line to inspection, and so on. Transactions are your way of telling the system about activity in your plant or warehouse. It is extremely important that a transaction be entered with every movement of resources, and that each transaction be entered accurately, for the system to provide you with accurate information in return.

The general flow of this function is as follows:

(1) Enter transactions, which are stored in batches. The purpose of using batches is twofold:

(a) You can enter transactions without immediately "updating" them, that is without using the information contained in the transaction to change information in files such as the Resource Balance file, Location Detail file, Schedule Resource file, and so on. Since this activity can take a lot of processing time on your computer, you may want to save the transactions in batches and then update a number of them at once, rather than updating each one as it is entered. This is less taxing for your computer.

Using batches allows you to print a list of the transactions, to verify that the information is correct. In addition, PRISM allows you to "suspend" transactions. Such transactions are saved in the batch, unedited, even though some important information may have been left out. The system does not update a suspended transaction in a batch selected for updating, but you can return to it later and complete it when you find the information you need.

(b) A number of programs in RM allow you to select a batch or a range of batches, so that you do not have to run the program for all transactions at once. For example, you can print receipt tickets (see Section 8-6) one batch at a time, rather than having the system check all batches for transactions that require receipt tickets. This leads to another reason for using batches: it can be a useful way of dividing transaction work into your own categories. You can start a new batch each day, or enter PO receipts in a separate batch from schedule receipts, and so forth.

(2) Print transaction batches. You can print any transaction batch using the Transaction Batch Report (see Section 8-3) or the Transaction Register (see Section 8-5). This allows you to check the information in your transactions before using them to update your files.

(3) Make corrections. Transaction Entry allows you to review any transaction, and you can easily make changes to any that have not yet been updated. At this time you would also enter the information missing from your suspended transactions.

(4) Use Transaction Batch Update (see Section 8-4) to update any transactions that were not updated interactively.

Batch Selection Screen—MIE44001

(See Figure 68)

The Batch Selection Screen is displayed when you select Option 2 from the Transaction Processing Menu (MI80), and in other situations that require you to select a batch of transactions. Use this screen to indicate the transaction batch you want to work with.

Fields for Display

The following information is displayed for each existing batch. Selection number 1 is always "Start New Batch." Since this new batch does not yet exist, the information listed below is not displayed for that selection number.

Sel #—selection number. After you have been using PRISM for a while, your batch numbers will go higher and be more difficult to key in correctly, because they will use up the three available digits. A selection number is assigned to each batch, to make it easier for you to indicate the batch you want.

Batch #—number of the batch, generated by the system. You can use tailoring question #T40 to determine where these numbers begin.

Batch Stat—status of this batch. The status assigned to a batch tells you something about (1) what has and has not been done to this batch, and (2) what can and cannot be done with it. The possible statuses and their meanings are as follows:

IN USE—Another workstation is currently using this batch. This may mean, for example, that someone else is adding transactions to it. A batch that is IN USE cannot be selected for any purpose.

There is one exception to this rule. If the "Last Wk Station" (see below) is your workstation number, you can select this batch for entry. This would occur if your Transaction Entry session ended abnormally, for example if the system crashed. Any batches being used at the time of the crash would still have the status IN USE when the system came back up. By allowing the last workstation that used the batch to retrieve it, the crashed batch can be redeemed from "IN USE" status.

SUSPENDED—When you finish entering transactions in a batch and you are ready to exit Transaction Entry, you can either close or suspend the batch. You would suspend it to indicate that it is not ready to be updated. A SUSPENDED batch cannot be selected for updating (see *Transaction Batch Update*, Section 8-4), but it can be selected for entry.

CLOSED—A CLOSED batch is one that is ready to be updated. The Transaction Batch Update can only be run on CLOSED batches. However, a CLOSED batch can also be selected to have new transactions added to it.

FINISHED—When the Transaction Batch Update is successfully completed, the status of the batch changes from CLOSED to FINISHED. A FINISHED batch can be printed or deleted, but you cannot add transactions to it.

DELETED—You can completely delete any batch except one with updated or partially updated transactions. When you do so, its status changes to DELETED, but only while the deletion is in process. You never see the word DELETED in this field unless you happen to display this screen while the deletion is in progress. Any transactions in the batch that had not been updated are not updated by this process, and any transactions that had already been updated are not undone. The information is simply removed from the system.

If you delete a batch that has partially updated and/or updated transactions, all but these are deleted, and a message is displayed to that effect. The batch status becomes CLOSED so that you can finish updating the partially updated transactions.

If you delete a batch that has updated transactions but no partially updated transactions, all but the updated transactions are deleted and a message is displayed to that effect. The batch status becomes FINISHED so that you can run the Transaction History Purge (see Section 9-8) to get rid of the updated transactions.

Updated Trans—number of updated transactions in this batch.

Suspend Trans—number of suspended transactions in this batch.

Error Trans—number of error transactions in this batch. An error transaction is one that passed the edits while it was being entered, but did not pass when the time came to update it. A simple example: you enter a transaction with a location classification code of AVL. Next, you change the Activity Status for AVL from A (active) to N (non-active). When the system attempts to update the transaction, it no longer meets the requirement that the location classification be active.

This occurs only if the error would have resulted in a severity code 0 (zero) message on the screen (if the message severity code limits are 0 to 0). If the error is not a hard hold, it is ignored. The transaction is updated as if you had pressed CK17 to override the message.

Partial Trans—number of partially updated transactions in this batch. Whether this can happen on your system depends on your answers to tailoring questions #T6-9. These questions deal with the four transaction types (PR, SC, PC, and ON) that can cause the system to generate other transactions (DI, TC, CC, and TP).

In each question, you are asked whether the user-entered transaction should be updated online or in batch, and then whether the corresponding system-generated transactions should be updated online or in batch. If you have the user-entered transactions updated online and the system-generated transactions ROLL DOWN—Use the ROLL DOWN key combination (shift key and "down" arrow) to page backward through the list of batches. Your list begins with the first record, so ROLL DOWN is not valid until you have used ROLL UP at least once.

CK01 END JOB—Press CK01 to return to the menu from which you selected this option.

CK18 REFRESH SCREEN—Press CK18 to display the information currently in the files. For example, if someone begins using batch 126 AFTER you display this screen, the status listed for it does not automatically change to IN USE. If you press CK18, the correct information will be shown.

CK20 DELETE BATCH—Press CK20 to delete the batch you have selected. A message is displayed asking you to confirm the deletion by pressing CK20 again. When you do so, the batch is deleted, with the restrictions outlined above (see BATCH STAT).

Transaction Selection Screen—MIE44218

Figure 69:
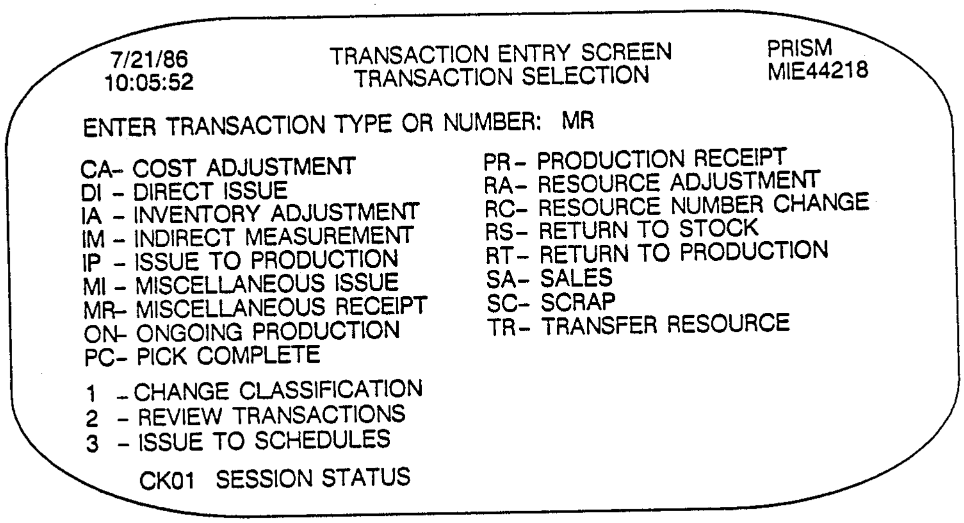

(See Figure 69)

When you select a batch from the Batch Selection Screen and press ENTER, the Transaction Selection Screen is displayed. Use this screen to indicate the type of transaction you want to enter or to indicate that you want to review transactions in this batch.

Field for Entry

TRANSACTION TYPE OR NUMBER—Enter the two-letter code for a MARCAM-defined transaction or a number 1-3 corresponding to what you want to do.

This screen shows a list of all the two-letter codes for MARCAM-defined transactions, and numeric entries for three other possible activities. Below, each of the entries is listed with the number of the screen displayed when you press ENTER after selecting that option. Most of this section shows those screens in numeric order, to make it easier for you to look up the information you need.

The exceptions to this rule are the Batch Status Screen (MIE44222), Transaction Detail Display Screen (MIE44227), and Comment Entry Screen (MIE44224). The Transaction Detail Display Screen and the Comment Entry Screen can be called from almost any transaction screen, and the Batch Status Screen is the last displayed before you exit Transaction Entry. These three screens are covered at the end of the section, after all the transaction screens.

CA (cost adjustment)—MIE44217
DI (direct issue)—MIE44203
IA (inventory adjustment)—MIE44214
IM (indirect measurement)—MIE44215
IP (issue to production)—MIE44216
MI (miscellaneous issue)—MIE44212
MR (miscellaneous receipt)—MIE44213
ON (ongoing production)—MIE44206
PC (pick complete)—MIE44204
PR (production receipt)—MIE44205
RA (resource adjustment)—MIE44201
RC (resource number change)—MIE44211
RS (return to stock)—MIE44208
RT (return to production)—MIE44207
SA (sales)—MIE44209
SC (scrap)—MIE44202
TR (transfer resource)—MIE44210

1 (change classification)—MIE44229
2 (review transactions)—MIE44220
3 (issue to schedules)—MIE44232

Command Function Keys

ENTER—Press ENTER after indicating a selection in the entry field, to display the corresponding screen.

CK01 SESSION STATUS—Press CK01 to display the Batch Status Screen. This screen shows the number of transactions you have entered during this session, as well as their total dollar value. From the Batch Status updated in batch, you will sometimes have batches that contain *partially* updated transactions. This is because the user-entered transactions will be updated immediately, but the system-generated transactions will not be updated until the batch is CLOSED and you run the Transaction Batch Update. In the meantime, the user-entered transactions are considered partially updated.

Total Trans—total number of transactions in this batch. This is NOT the total of the previous four fields. It is possible that a transaction could be entered but not yet updated, without being suspended or an error transaction.

Last Wk Station—workstation number that most recently added or changed transactions in this batch.

Fields for Entry

Selection Number—Enter the selection number (see Sel #, above) corresponding to the batch number you want to use. Either selection number or batch number is required.

Batch Number—Enter the number of the batch you want to use. Either selection number or batch number is required. If you enter both, they must correspond to each other on the above list.

Operator's Initials—All transaction types have a field for the initials of the operator entering the transaction. You can use this field rather than entering your initials with every transaction. The Operator field will default to this value for the length of this Transaction Entry session.

Shift—All transaction types have a field for the Shift during which the transaction occurred. You can use this field rather than entering the shift number with every transaction. The Shift field will default to this value for the length of this Transaction Entry session.

Command Function Keys

ENTER—Press ENTER after selecting a batch, to continue with the program. If you are using Transaction Entry, the Transaction Selection Screen is displayed. If you are printing Receipt Tickets (see Section 8-6), for example, the receipt tickets are printed after you select a batch.

ROLL UP—Use the ROLL UP key combination (shift key and "up" arrow) to page forward through the list of batches. If there is information beyond what is currently displayed, you see a "+" sign in the lower right-hand corner of the screen. When you no longer see the "+" sign, there is no further data to display and ROLL UP is no longer valid.

Screen you can return to the Batch Selection Screen, return to this screen, or exit Transaction Entry.

Transaction Entry—General Rules

1. When entering a transaction for a potent resource, enter the quantity in physical rather than potent units. The system calculates the potent units using the transaction quantity and the entered potency factor.
2. Most schedule-related transactions can only be entered against a task whose status is OPEN, LAUNCHED, or RUNNING. The only transaction that can be entered against a task with status COMPLETE is the RA (resource adjustment). No transactions may be entered against a CLOSED schedule release.
3. When you are entering a new transaction, the transaction number is displayed at the top of the screen, between the date/time and the screen headings. When you are displaying an existing transaction, the status of the transaction is also displayed, between the screen headings and the screen number. The status information is abbreviated as follows:

U (updated)—UPD

N (entered but not updated)—ENT

E (error)—ERR

S (suspended)—SUS

P (partially updated)—PAR

Lot-Controlled Resources

It is recommended that you avoid the following transaction types when working with lot-controlled resources. It is impossible for the system to trace a resource/lot any further after one of these transactions is entered for it. For example, if you enter an MI (miscellaneous issue) transaction for resource A/lot 1, that transaction does not indicate how the resource was used. It could be on a schedule, scrapped, stolen—the system has no way of knowing.

CC—Calculated Cost

IP—Issue To Production

MI—Miscellaneous Issue

MR—Miscellaneous Receipt

Note on Location Defaults

When you receive or transfer a resource, you specify a "To Warehouse" and a "To Location." These two fields identify the location TO which you are receiving the specified quantity of the resource (in an RC transaction, this refers to the "To" resource).

If there is already a record in the Location Detail (LOCDTL) file for the To warehouse/To location/resource combination, the defaults for certain fields on the screen work differently than if a Location Detail record did not already exist. The entire quantity of a resource at a location must have the same grade, revision level, shelf life date, and so on. If a Location Detail record already exists for the To warehouse/To location/resource, and you enter information for it that does not match the value assigned to the existing record, the conflict must be resolved.

If a Location Detail record already exists, you are said to be receiving the resource to an "existing location." If no Location Detail record exists for the To warehouse/To location/resource, the system creates one when the transaction is updated. In this case, you are said to be receiving the resource to a "new location."

The following transaction types can involve receiving a resource to a new or existing location:

IM—indirect measurement

MR—miscellaneous receipt

PR—production receipt

RA—resource adjustment

RC—resource number change

RS—return to stock

TR—transfer resource change classification (user-defined transactions)

For these transactions, the default information associated with the To Location (To Warehouse/To Location/Resource combination) will be different depending on whether it is a new or existing location. Some of these fields are available for entry on the transaction screen, and some are not.

A Location Detail record may exist without there being any quantity of the resource physically in the location. Thus, it is possible to obtain what may seem to be incorrect defaults, since the attributes that are defaulting are not actually attached to any physical quantity of a resource. To avoid this problem, consider adding the Purge Empty Locations program (see Section 9-4) to your nightly procedures. An additional way to avoid confusion is to encourage operators to use the Verify key (see below), to be sure the correct information is being updated with your transactions.

Existing Location

*Grade* defaults first to the grade of the resource at the From Whse/From Location, if any. If this or any entered grade conflicts with the grade at the existing location, a message may be displayed. If the operator overrides the message or if the message has severity code 2 (non-display), tailoring question #T25 determines which grade is used.

*Lot Number* (defaults only if lot number is required for both resource and To Location Classification). This field uses the lot number entered on the screen, if any. The first default is the lot number of the resource at the From Whse/From Location, if one exists. If the To lot number on the screen does not match the lot number of the resource at the existing location, a hard hold (severity 0) message is displayed.

*Picking Override Sequence Number*—defaults to the number entered on the screen, if there is one and its value is not zero. Otherwise, this field defaults to the picking override sequence number for the To Whse/To Location.

If the resource is defined to be a potent resource, the *Potency* field defaults to the potency at the From Whse/From Location, if there is one. If not, it defaults to the potency at the To Whse/Location. If no potency is found there, this field defaults to the Potency defined for the resource in the Resource Master (RESMST) file.

*Revision Level* defaults first to the revision level of the resource at the From Whse/From Location, if any. If this or any entered revision level conflicts with the revision level at the existing location, a message may be displayed. If the operator overrides the message or if the message has severity code 2 (non-display), tailoring question #T26 determines which revision level is used.

If there is no From information, the revision level defaults to the current revision level of the resource, defined through Resource Master Maintenance.

New Location

*Lot Number* (defaults only if lot number is required for both resource and To Location Classification). This field defaults to the lot number of the resource at the From Whse/From Location, if there is one. If not, and you do not enter a lot number, the next step depends on your answer to tailoring question #T2. If your answer to that question is Y (system generates lot numbers), the system generates a lot number. If your answer to that question is N, a hard hold message is displayed, forcing you to enter a lot number.

*Picking Override Sequence Number*—uses the number entered on the screen, if there is one and its value is not zero. The first default for this field is the picking override sequence number from the Location Master (LOCMAS) file for the To Whse/To Location. If none is found there, the value associated with the From Whse/From Location is used. If none is found there or if there is no From Whse/From Location, the value from tailoring question #R8 is used.

If the resource is defined to be a potent resource, the *Potency* field defaults to the potency at the From Whse/From Location, if there is one. If no potency is found there, this field defaults to the Potency defined for the resource in the Resource Master (RESMST) file.

*Revision Level* defaults first to the revision level of the resource at the From Whse/From Location, if any. If there is no From information, it defaults to the current revision level for the resource, defined on Data Screen MIE18002 in Resource Master Maintenance.

Common Fields

The following fields are available for entry on most transaction screens. To conserve space and because they work exactly the same way for every transaction, they are listed here once, rather than being repeated for each transaction screen.

Detail Code—transaction detail code, defined to provide more information about this transaction. For a list of the available detail codes for this transaction type and their meanings, press CK08.

Year/Period—year and period to which this transaction is assigned. This combination must represent a period that is not yet closed. These fields default to the answers to tailoring questions #Y1-2.

Date—date this transaction occurred: defaults to today's date.

Time—time on the above date that this transaction occurred. Defaults to the time when the transaction is updated online or saved for batch update.

Shift—shift number when this transaction occurred. Defaults to the number entered on the Batch Selection Screen.

Reference—reference number for this transaction. This field can be used for information not covered by the available fields on this screen. This is NOT the same as the reference number for a schedule release..

Operator—initials of the operator entering this transaction. Defaults to what was entered on the Batch Selection Screen.

Account Group—accounting group number for this transaction. Defaults first to the accounting group number defined for this transaction type/transaction detail code combination (see *Transaction Detail Code Maintenance*, Section 1-17), then to tailoring question #T42.

Heading 1/2/3—The headings for these fields are determined by your answers to tailoring questions #T15-17, so that you can enter your own transaction information not covered by the available entry fields. On the sample screens in this section, these fields are "Department," "Clerk #," and "Auth #."

SUSPEND—Enter Y in this field to suspend this transaction. A suspended transaction is saved, unedited. If you discover that you are missing some important information, this field allows you to stop in the middle of entering a transaction, without having to start all over when you return to complete it later. Suspended transactions cannot be updated until the Suspend field is changed to N (indicating that the transaction is no longer suspended).

VERIFY—Enter Y in this field and press ENTER, to display the defaults for all fields on this screen that do not yet have entries.

If you use this field while one or more fields have errors, you may see the messages more than once. The screen edits are performed once while the Verify field is Y; when the screen passes all the edits, it is displayed once more with the Verify field changed back to N. If you then change one of the fields, creating another error, or if you used CK17 to override a message while the Verify field was Y, that message comes up again when the system attempts to save or update the transaction.

DUPLICATE—available only during entry of transactions. Enter Y in this field to copy the information from this transaction to the next entry screen. When one transaction is entered, you see the next screen redisplayed with the same entries, rather than a blank screen. This can save you some keying time if you are entering a number of similar transactions.

Comment—Use this field to enter a transaction comment whose length is 50 characters or less. To enter a longer comment, press CK05 to display the Comment Entry Screen. If you enter the first 50 characters and discover that your text is longer than you thought, you can still press CK05. The text you entered on this screen is displayed on the first line of the Comment Entry Screen.

Resource Adjustment Transaction Screen—MIE44201

Figure 70:
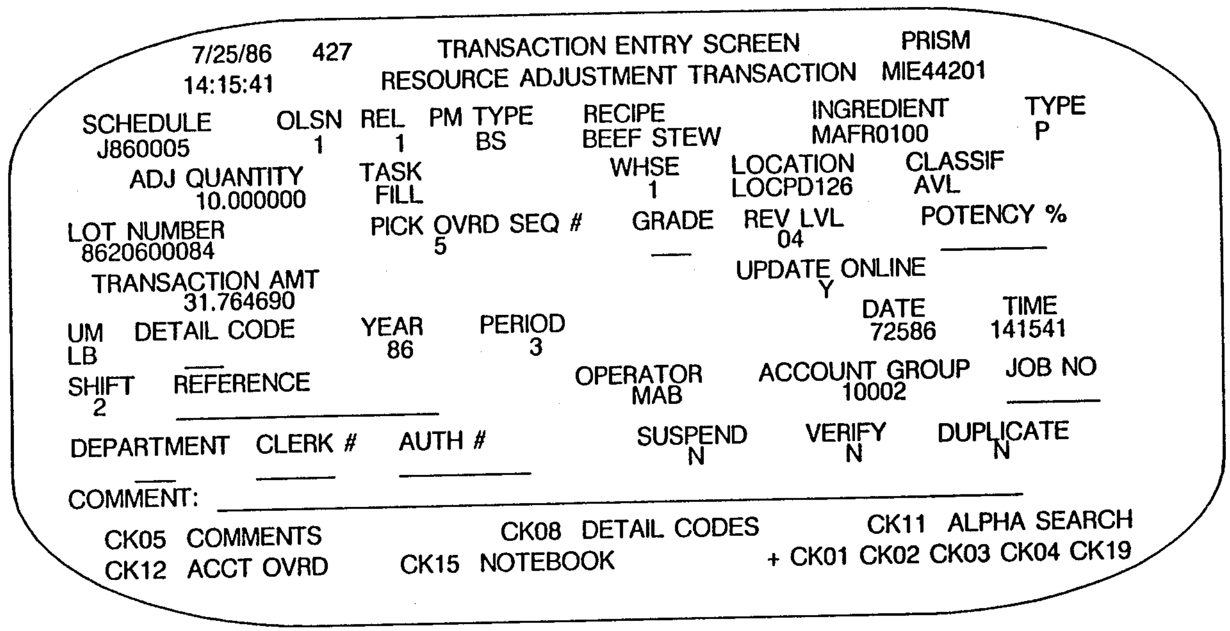

(See Figure 70)

The Resource Adjustment Transaction Screen is displayed when you:

(1) enter RA in the entry field on the Transaction Selection Screen and press ENTER;

(2) select an RA transaction for review from the Transaction Review Screen.

The RA is a schedule-related transaction. Enter an RA transaction against an ongoing schedule in order to adjust the quantity of a resource consumed or produced. An RA for a consumed resource behaves like an issue transaction (direct issue), and an RA for a produced resource behaves like a PR (production receipt) transaction.

This is the only type of transaction allowed against a schedule whose status is COMPLETE, and that is when you would normally use it. For example, to change the quantity of an updated PR transaction for a schedule that is not yet complete, you could enter another PR with a positive or negative quantity.

Fields for Entry

* SCHEDULE—schedule number against which RA is being entered.

OLSN—OLSN number on this schedule.

Rel—release number of this schedule/OLSN.

PM Type/* PM Name—If you enter both OLSN and PM type/PM name combination, they must correspond to each other. If you enter one or the other, the system retrieves the corresponding OLSN or production model.

* RESOURCE—resource number whose quantity is being adjusted.

Type—resource type: C (consumed) or P (produced). This field is required if the resource is both consumed and produced by this task. If that is not the case, the system can retrieve the correct code.

If you are reporting an unexpected produced resource, the system will add a record for this resource to the release. This additional produced resource will have cost and production distribution percentages of zero. Such a transaction does NOT cause the system to generate additional transactions (TC, CC, TP) for other resources.

ADJ QUANTITY—adjustment quantity. This is the quantity by which you want to adjust the quantity produced or consumed. It can be positive or negative, but not zero. For a potent resource, enter the physical quantity, not the potent units. The system will calculate the potent units using the entered Potency.

Task—required if this resource is produced or consumed by more than one task on this production model. If that is not the case, the system can retrieve the correct task name.

Whse/Location—Both warehouse and location are required if this is a produced resource or if it is a consumed resource with a theoretical consumption code of D (direct issue) or T (theoretical consumption). Because the system generates reservations for such resources, you must indicate the warehouse and location for the adjustment.

Note: If you answer Y to tailoring question #G2, the Whse field is not available for entry. It is displayed with the system warehouse defined in tailoring question #G1.

Classif—location classification code for the location to/from which this resource is produced/consumed. There is no need to enter this field for a consumed resource, since the system can retrieve the correct location classification for the specified Location.

Lot Number—required if both resource and location classification are lot-controlled (see *Location Classification Code Maintenance*, Section 1-4). You can leave this field blank for a consumed resource, because the system can retrieve the correct lot number for the location.

Pick Ovrd Seq #—pick list override sequence number for this location. If this is a produced resource, you can use this field to change the pick list override sequence for this warehouse/location/resource. For a consumed resource, allow this field to default.

* Grade—of this resource at this location. Enter this information for produced resources only.

Rev Lvl—revision level of this resource at this location. Enter this information for produced resources only.

Potency %—potency of this resource at this location, for produced resources only. For information on how PRISM handles potent resources, see *RM Concepts*, Section B.

Transaction Amt—transaction amount, for entry with produced resources only. If you answer Y to the RA portion of tailoring question #T41, this field defaults to Adj Quantity times Selected Unit Cost for the resource. If you answer N to that portion of #T41, then a message may be displayed if you do not enter a transaction amount for this transaction.

UPDATE ONLINE—available for entry only if the answer to tailoring question #T10 is Y. This field indicates whether this transaction is to be updated online or in batch. The default is from tailoring question #T11.

UM—unit of measure for the adjustment quantity. This UM must be convertible into the standard UM for the resource.

Job No—job number for this RA transaction. This is an informational field.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Scrap Transaction Screen—MIE44202

Figure 71:
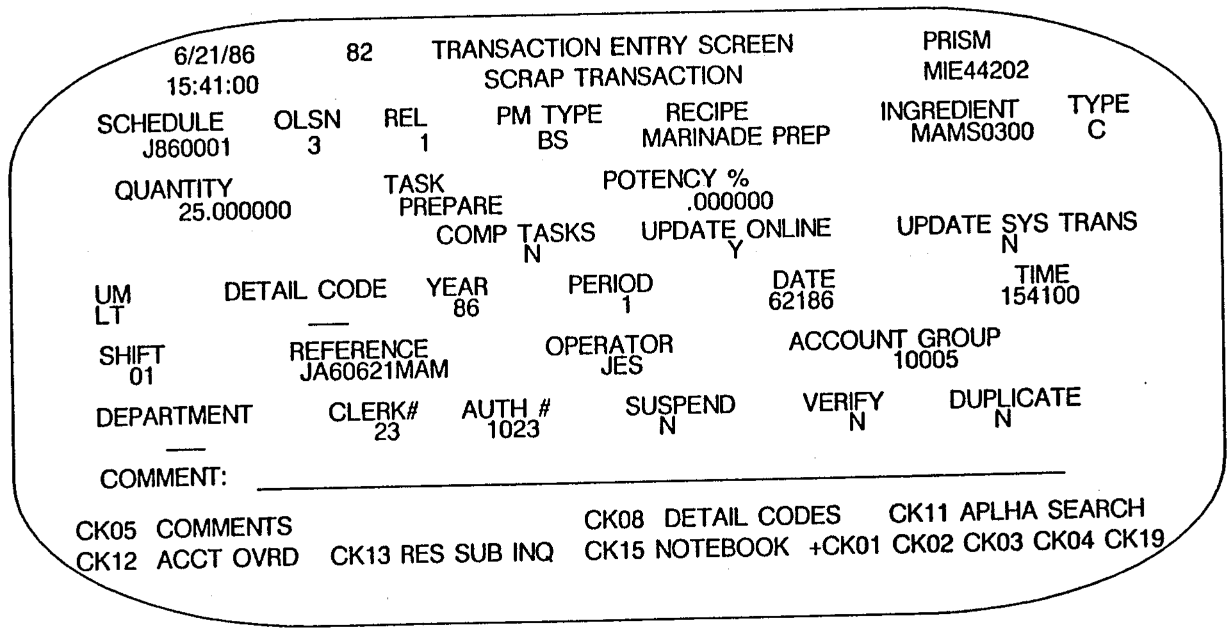

(See Figure 71)

The Scrap Transaction Screen is displayed when you:

(1) enter SC in the entry field on the Transaction Selection Screen and press ENTER;

(2) select an SC transaction for review from the Transaction Review Screen.

Enter an SC transaction for an ongoing schedule, when a quantity of the resource consumed or produced by a task must be discarded for some reason. For example, you might enter an SC for a resource that was produced but found to be unusable, for example if the beef stew was overcooked.

You would enter an SC for a consumed resource AFTER it was issued to the task. If the resource is found to be unusable BEFORE being issued, while it is still at the location, you would not enter an SC. Two suggestions:

(1) Suppose there are 100 of the resource at the location, and 50 are reserved for various schedules and sales. If 30 are found to be unusable, this does not need to affect your reservations, because 50 are unreserved. You can define a location classification for "scrap," and enter a TR (transfer resource) transaction moving the 30 unusable units from their present location to a "scrap" location. In this situation you could also enter an MI (miscellaneous issue) transaction with a transaction detail code indicating that it is scrap.

(2) If, on the other hand, 60 of the 100 units had to be scrapped, this does affect your reservations. One way to deal with the situation is to use Reservation Maintenance (see Section 7-7) to reduce the quantity reserved of this resource to 40. Next, enter an MI or user-defined scrap transaction for the 60 units. Then, run Reservation Batch Update (see Section 7-8) for the schedule release whose reservation was reduced by 10, using the option to Create Reservations for Additional Quantity. The system then finds 10 usable units of this resource at a different location.

Note: Whenever an SC transaction is entered, the Replan field for the resource is automatically set to Y. See *Resource Master Maintenance*, Section 1-13.

Fields for Entry

- SCHEDULE—schedule number against which SC is being entered.

OLSN

Rel—release number.

PM Type/* PM Name—If you enter both OLSN and PM type/PM name combination, they must correspond to each other. If you enter one or the other, the system retrieves the corresponding OLSN or production model.

° Resource—A blank Resource field signifies a stream resource.

Type—resource type: C (consumed) or P (produced). This field is required if the resource is both consumed and produced by this task. If that is not the case, the system can retrieve the correct code. When an SC transaction is entered for a produced resource, the system generates any necessary TC, CC, or TP transactions, exactly as if you had entered a PR (production receipt) or ON (ongoing production) transaction for the same quantity.

QUANTITY—quantity scrapped. This must be a positive number. For a potent resource, enter the physical quantity, not the potent units. The system will calculate the potent units using the entered Potency.

Task—required if this resource is produced or consumed by more than one task on this production model. If that is not the case, the system can retrieve the correct task name.

Potency %—potency of this resource at this location, for produced resources only. For information on how PRISM handles potent resources, see *RM Concepts*, Section B.

COMP TASKS—Enter Y to designate this task and all preceding tasks on this release as complete. This field can be Y only if a produced resource is being scrapped.

UPDATE ONLINE—available for entry only if the answer to tailoring question #T10 is Y. This field indicates whether this transaction is to be updated online or in batch. The default response is from tailoring question #T7.

UPDATE SYS TRANS—available for entry only if the answer to tailoring question #T10 is Y. This field determines whether any system-generated transactions caused by this transaction are updated online or in batch. If the SC transaction is updated in batch, the system-generated transactions cannot be updated online. The default for this field is from tailoring question #T7.

UM—unit of measure for the Quantity. This UM must be convertible into the standard UM for the resource.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Direct Issue Transaction Screen—MIE44203

Figure 72:
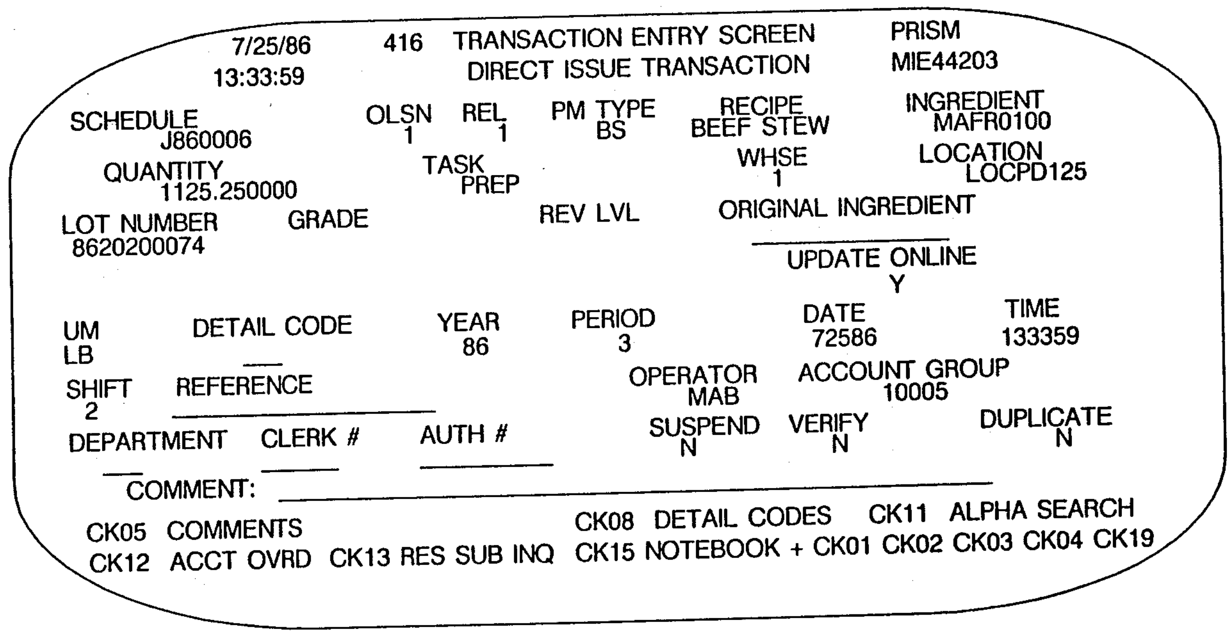

(See Figure 72)

The Direct Issue Transaction Screen is displayed when you:

(1) enter DI in the entry field on the Transaction Selection Screen and press ENTER;

(2) select a DI transaction for review from the Transaction Review Screen.

Enter DI transactions for ongoing schedules, to indicate that you removed a certain quantity of a resource from a location and used it in performing a task. You would use this type of transaction to tell the system that you have consumed the appropriate quantity of a resource whose theoretical consumption code is D (direct issue).

Normally, reservations for such resources are created when you launch the schedule release. After picking each consumed resource, you would create DI transactions indicating that the quantity reserved was actually used. This does not have to be done through this transaction screen: DI transactions are also generated by the system when you enter a PC (pick complete) transaction, or when you use the Issue To Schedules option (#3) from the Transaction Selection Screen.

Note: DI transactions cannot be entered for resources with theoretical consumption codes of C (calculated cost) or T (theoretical consumption).

Fields for Entry

* SCHEDULE—schedule number against which DI is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—resource being issued to this task. You can issue a non-balance resource: just leave the Whse and Location fields blank.

To consume an ADDITIONAL resource, one that is not defined for the task but is also not a substitute, enter that additional resource number in this field. Leave the Original Resource field blank.

To substitute one resource for another, enter the substitute in this field. Enter the resource actually defined for the task in the Original Resource field.

Note: You can enter a DI to issue a substitute for a theoretically consumed resource. However, when the PR or ON transaction is entered, the system still theoretically consumes the entire quantity for the TC resource: that quantity is NOT reduced by the quantity of the substitution.

For example, suppose you normally consume 100 of resource A, which is theoretically consumed. This time you plan to use 80 of resource A and 20 of resource B. The normal quantity of resource A, 100, is still theoretically consumed. You need to enter both a DI for 20 of resource B, and an RA (resource adjustment) for -20 of resource A, to give the system an accurate picture of what happened.

QUANTITY—quantity issued to this task. This quantity must be greater than zero (to reverse a DI transaction, enter an RS (return to stock) transaction). For a potent resource, enter the physical quantity, not the potent units. The system will calculate the potent units using the entered Potency.

Task—required if this resource is produced or consumed by more than one task on this production model. If that is not the case, the system can retrieve the correct task name. Direct issue transactions cannot be entered against a task that is complete or closed.

Whse/Location—Enter the warehouse and location from which you are consuming this resource. Defaults are the Default Warehouse-Consumption and Default Location-Consumption in the Resource Master file (see Section 1-13). A message is displayed if this resource is not reserved at this location.

Note: If you answer Y to tailoring question #G2, the Whse field is not available for entry. It is displayed with the system warehouse defined in tailoring question #G1.

• Original Resource—If you are making a substitution, use this field to enter the resource number defined for this task. Enter the number of the resource being used as a substitute in the Resource field.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource number in the Resource field.

For the remaining fields for entry on this screen, see "Common Fields," earlier in this section.

Fields for Display

The following information is for display only. To have it displayed when entering a new transaction, use the Verify field.

Lot Number—of this resource at this location.

• Grade—of this resource at this location.

Rev Lvl—revision level of this resource at this location.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK13 RES SUB INQ—Press CK13 to transfer to the Resource Substitution Inquiry. This inquiry provides a list of the substitutions available for a specified resource, including the range of dates when that substitution is valid.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Pick Complete Transaction Screen—MIE44204

Figure 73:
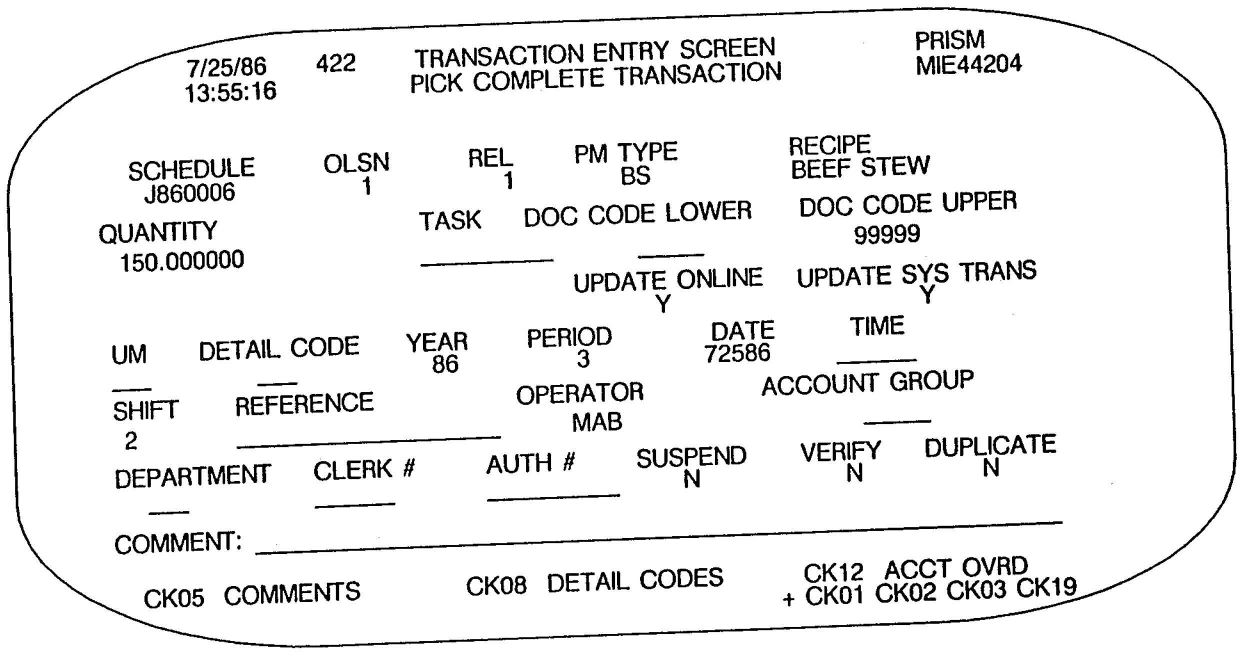

(See Figure 73)

The Pick Complete Transaction Screen is displayed when you:

(1) enter PC in the entry field on the Transaction Selection Screen and press ENTER;

(2) select a PC transaction for review from the Transaction Review Screen.

The PC transaction provides a shortcut method of entering DI (direct issue) transactions for a schedule release. You specify the release or task on a release that you want to "pick completely," and the system generates the appropriate DI transactions for consumed resources with theoretical consumption codes of D (direct issue).

For example, suppose your task is for making chili. This task uses 30 pounds of beans, 20 gallons of tomatoes, one pre-measured bag of chili powder, and 2 hours of cooking time, to produce 30 gallons of chili. The theoretical consumption codes are D for beans, D for tomatoes, D for chili powder, and T for the cooking unit. If you enter a PC transaction for this task, with a quantity of 30 gallons, the system will generate DI transactions for the beans, tomatoes, and chili powder, but not for the cooking unit.

The PC transaction method only works if there are reservations for the DI resources. When the system attempts to generate the necessary DIs for tomatoes, for example, it looks for locations where tomatoes have been reserved for this task of this release. A DI transaction is generated for the quantity at each location that is reserved but not yet issued (quantity reserved minus quantity reduced from reserved), until the total quantity needed has been issued or until there are no more reservation records.

To see the DI transactions generated by your PC transaction, run a Transaction Batch Report, using either CK13 from the Batch Status Screen or Option 3 from the Transaction Processing Menu (MI80). When you print the report from the Batch Status Screen, the report is printed just for the batch you are currently using.

Using tailoring question #T23, you can assign a transaction detail code to be used for system-generated DI transactions (which are caused only by the PC transaction and issuing to schedules or shortages). This provides an easy way to differentiate between user-entered and system-generated DI transactions.

Fields for Entry

- SCHEDULE—schedule number for which PC is being entered.

OLSN

Rel—release number.

PM Type/* PM Name—If you enter both OLSN and PM type/PM name combination, they must correspond to each other. If you enter one or the other, the system retrieves the corresponding OLSN or production model.

Quantity—refers the the schedule release run quantity. Suppose this release will ultimately produce 300 gallons, but only two batches (60 gallons) per day. You may not want to issue the consumed resources for all 300 gallons at once. In this situation, you could enter a quantity of 60 gallons, to generate DI transactions just for the quantity of each resource consumed in a single day. If you leave this field blank, the system uses the full quantity for this release.

Task—If you enter Task, the system generates DI transactions just for the direct issue resources consumed by this task. If you leave this field blank, it generates DI transactions for all appropriate resources on the entire release.

Doc Code Lower/Upper—You can also limit the DI transactions generated by documentation location code. Each resource on the release is assigned a documentation location code, referring to the area of the plant where the resource will be used. If you use these limits, DI transactions are generated just for resources whose documentation location codes fall in this range.

UPDATE ONLINE—available for entry only if the answer to tailoring question #T10 is Y. This field indicates whether this transaction is to be updated online or in batch. The default response is from tailoring question #T8.

UPDATE SYS TRANS—available for entry only if the answer to tailoring question #T10 is Y. This field determines whether the DI transactions caused by this PC transaction are updated online or in batch. If the PC transaction is updated in batch, the system-generated transactions cannot be updated online. The default for this field is from tailoring question #T8.

UM—unit of measure for the Quantity. This field must match the standard batch size UM for the PM.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Production Receipt Transaction Screen—MIE44205

Figure 74:
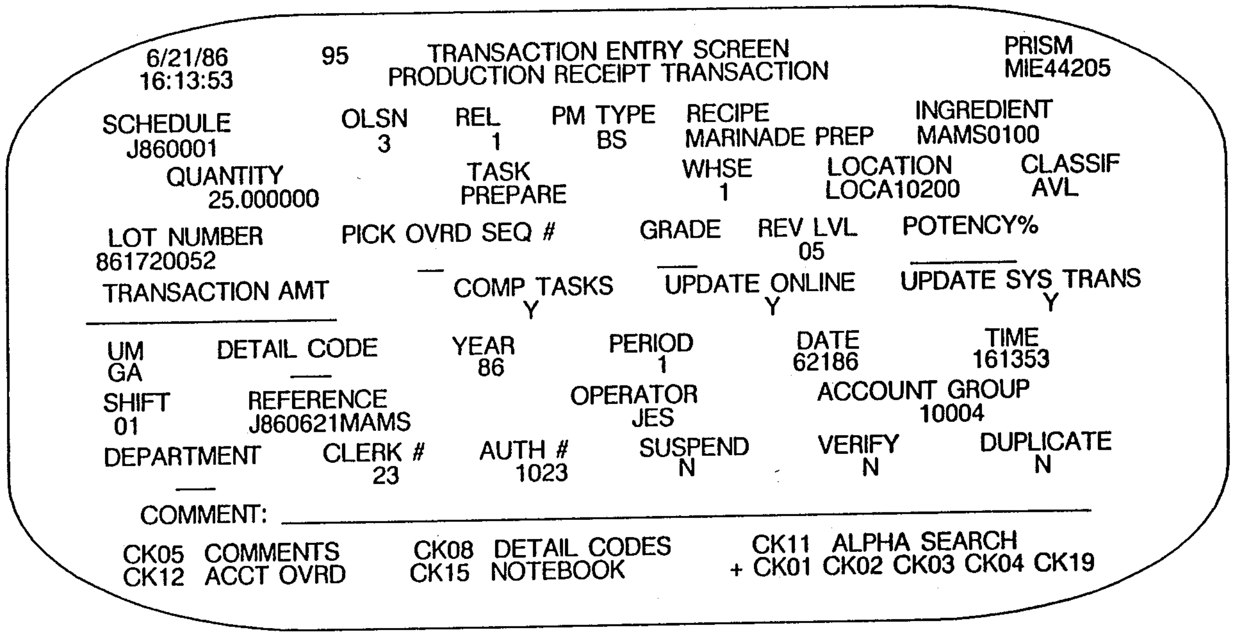

(See Figure 74)

The Production Receipt Transaction Screen is displayed when you:

(1) enter PR in the entry field on the Transaction Selection Screen and press ENTER;

(2) select a PR transaction for review from the Transaction Review Screen.

Enter a PR transaction to report non-stream resources produced from an ongoing schedule release. When the transaction is updated, any necessary TC (theoretical consumption), CC (calculated cost), or TP (theoretical production) transactions are generated by the system (see *RM Concepts*, Section B, for details on what transactions are generated).

Fields for Entry

* SCHEDULE—schedule number against which PR is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—produced resource being reported. It does not have to be a balance resource, but the Resource Balance (RESBAL) file must have a record for this resource/warehouse. In addition, this resource must be defined as a reportable resource on this production model.

Quantity—quantity produced. This quantity can be positive or negative. You would enter a negative PR to reduce the reported quantity before the release is complete. After the schedule release is completed, only RA (resource adjustment) transactions can be entered against it. At that point you would use an RA transaction to adjust the produced quantity. This quantity can be zero only if the Comp Tasks field is Y. This allows you to enter a transaction just to complete the task, in case you forget to do so when reporting the last of the produced resources.

Task—task that produced this resource.

Whse/Location—warehouse/location where the produced resource is now stored. If you leave these fields blank, they default to the Default Warehouse-Production and Default Location-Production defined for the resource on this release of the PM. If no value is found there, it defaults to the warehouse and location defined in the Resource Master (RESMST) file.

Note: If you answer Y to tailoring question #G2, the Whse field is not available for entry. It is displayed with the system warehouse defined in tailoring question #G1.

Classif—location classification code for the location to which this resource is received. If blank, the default is the classification defined for this resource on this release of the PM. If no value is found there, the system uses the default from the Resource Master (RESMST) file.

Lot Number—required if both resource and location classification are lot-controlled (see *Location Classification Code Maintenance*, Section 1–4). If you are having the system generate lot numbers (see tailoring question #T2), you can leave this field blank.

Pick Ovrd Seq #—pick list override sequence number for this resource at this location. You can use this field to enter the pick list override sequence number for a new location or change its value at an existing location.

* Grade—of the produced resource.

Rev Lvl—revision level of the produced resource at this location.

Potency %—potency of the produced resource at this location. For information on how PRISM handles potent resources, see *RM Concepts*, Section B.

Transaction Amt—transaction amount, the dollar value of this transaction. If you answer Y to the PR portion of tailoring question #T41, this field defaults to Quantity times Selected Unit Cost for the resource. If you answer N to that portion of #T41, then a message may be displayed if you do not enter a transaction amount for this transaction.

COMP TASKS—Enter Y to designate this task and all preceding tasks on this release as complete.

UPDATE ONLINE—available for entry only if the answer to tailoring question #T10 is Y. This field indicates whether this transaction is to be updated online or in batch. The default is from tailoring question #T6.

UPDATE SYS TRANS—available for entry only if the answer to tailoring question #T10 is Y. This field determines whether the system-generated transactions caused by this PR transaction are updated online or in batch. If the PR transaction is updated in batch, the system-generated transactions cannot be updated online. The default for this field is from tailoring question #T6.

UM—unit of measure for the Quantity received from production. This UM must be convertible into the standard UM for the resource.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Ongoing Production Transaction Screen—MIE44206

Figure 75:
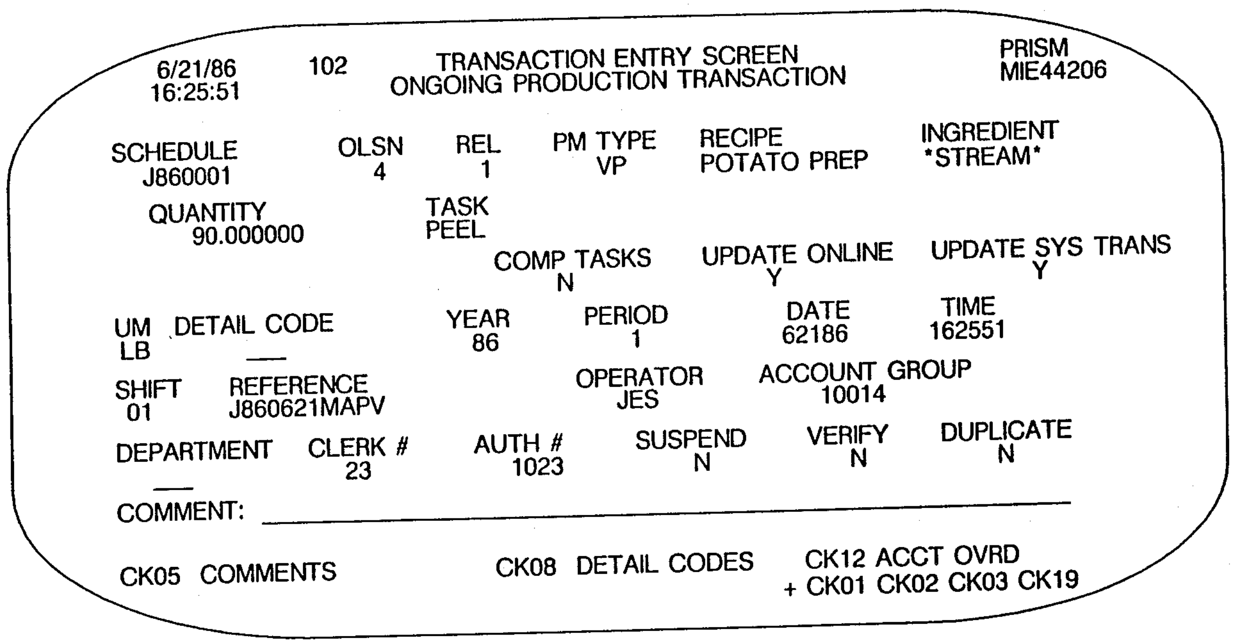

(See Figure 75)

The Ongoing Production Transaction Screen is displayed when you:

(1) enter ON in the entry field on the Transaction Selection Screen and press ENTER;

(2) select an ON transaction for review from the Transaction Review Screen.

Enter an ON transaction to report stream resources produced from an ongoing schedule release. The only differences between an ON and a PR transaction stem from the fact that a PR is for a non-stream and an ON is for a stream resource.

For example, PR allows you to enter the warehouse and location to which the produced resource is received. Because stream resources are by definition not received to locations, but are sent on to the next task, you do not enter warehouse, location, or any location-associated information with an ON. Similarly, the on order quantity of a resource is not changed by an ON transaction, so you do not enter a transaction amount with it.

A consumed stream resource always has a theoretical consumption code of T (theoretical consumption), because you are consuming exactly what you produced in the previous task. The quantity entered with an ON transaction determines the quantity of the consumed stream resource that is theoretically consumed by the next task.

Field for Display

- RESOURCE—An ON transaction is always for a stream resource, so this field is not available for entry. The word "STREAM" is displayed.

Fields for Entry

- SCHEDULE—schedule number against which ON is being entered.

OLSN

Rel—release number.

PM Type/* PM Name—If you enter both OLSN and PM type/PM name combination, they must correspond to each other. If you enter one or the other, the system retrieves the corresponding OLSN or production model.

Quantity—quantity of the stream resource produced. This quantity can be positive or negative. You would enter a negative ON to reduce the reported quantity before the task is complete. After the task is completed, only RA (resource adjustment) transactions can be entered to adjust the produced quantity. This quantity can be zero only if the Comp Tasks field is Y. This allows you to enter a transaction just to complete the task, in case you forget to do so when reporting the last of the produced resources for this task.

TASK—task for which stream resource is being reported.

COMP TASKS—Enter Y to designate this task and all preceding tasks on this release as complete.

UPDATE ONLINE—available for entry only if the answer to tailoring question #T10 is Y. This field indicates whether this transaction is to be updated online or in batch. The default is from tailoring question #T9.

UPDATE SYS TRANS—available for entry only if the answer to tailoring question #T10 is Y. This field determines whether the system-generated transactions caused by this ON transaction are updated online or in batch. If the ON transaction is updated in batch, the system-generated transactions cannot be updated online. The default for this field is from tailoring question #T9.

UM—unit of measure for the Quantity. This UM must be convertible into the UM defined for this stream resource on this release of the PM.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Return to Production Transaction Screen—MIE44207

Figure 76:
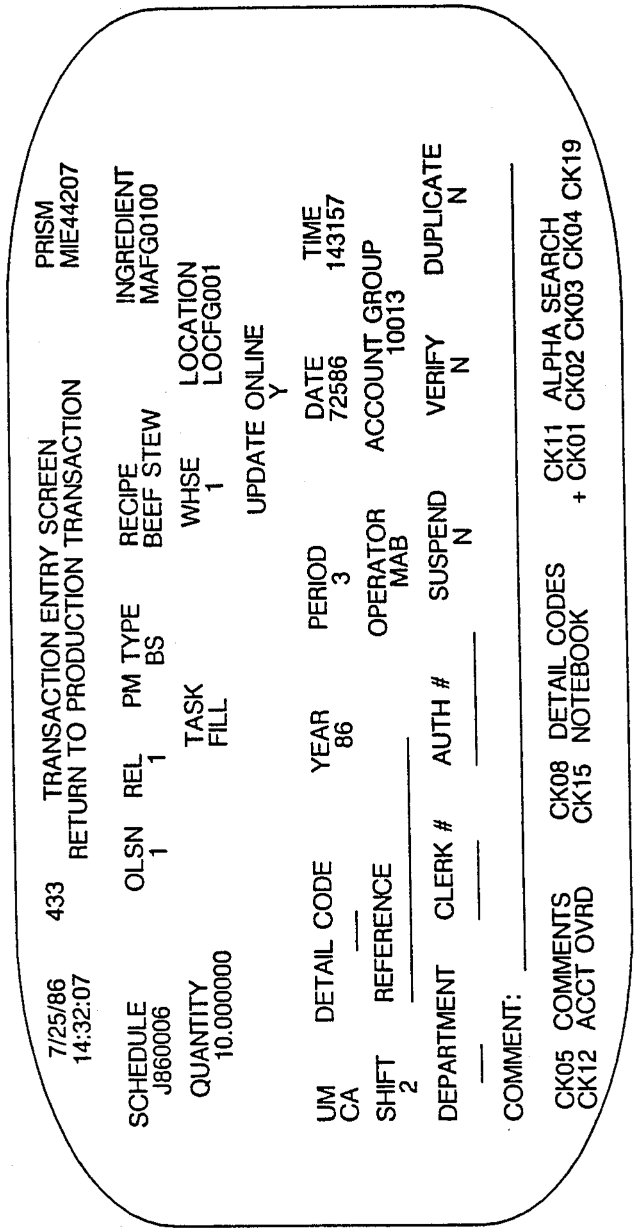

(See Figure 76)

The Return to Production Transaction Screen is displayed when you:

(1) enter RT in the entry field on the Transaction Selection Screen and press ENTER;

(2) select an RT transaction for review from the Transaction Review Screen.

Enter an RT transaction when you need to return an already-produced resource to the production floor, for example for rework. When you update an RT transaction, the system reduces the quantity of this resource produced to date from this task by the quantity returned to production.

However, the quantities of resources consumed are NOT reduced, because they were already used to produce what was received to stock. This is an important distinction between the RT and PR (production receipt) transactions. When you enter a negative PR transaction, you are saying that that quantity was never produced. The RT transaction, on the other hand, says that the quantity was produced but has to be reworked.

Fields for Entry

* SCHEDULE—schedule number against which RT is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—resource being returned to this task for more work. You cannot enter this transaction for a non-balance resource, because such a resource would not have been received to a location.

QUANTITY—quantity of this resource returned to the production floor. If some of the quantity being returned has already been reserved for other schedules or for sales, you may have to back out a portion of the reservations before finishing the RT.

This quantity must be greater than zero. When the reworking is finished, do not enter a negative RT: enter a new PR transaction. Note that the PR will cause additional consumption of theoretically consumed or calculated cost resources. If the quantities consumed by rework are actually less than those consumed by regular production, you must enter RA (resource adjustment) transactions to correct this.

Task—task to which this resource is being returned. This MUST be the task that originally produced the resource. If this resource is only produced by one task on the PM for this release, you can leave this field blank. The system retrieves the correct task name.

Whse/Location—Enter the warehouse and location from which you are returning this resource to the task.

Note: If you answer Y to tailoring question #G2, the Whse field is not available for entry. It is displayed with the system warehouse defined in tailoring question #G1.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

For the remaining fields for entry on this screen, see "Common Fields," earlier in this section.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see LOCATION PROMPTING SCREEN in *Location Master File Maintenance*, Section 1–6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6–1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file, for the lot number associated with this resource at this location. Notebook File Maintenance data screen MZE08002 is displayed.

To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Return to Stock Transaction Screen—MIE44208

Figure 77:
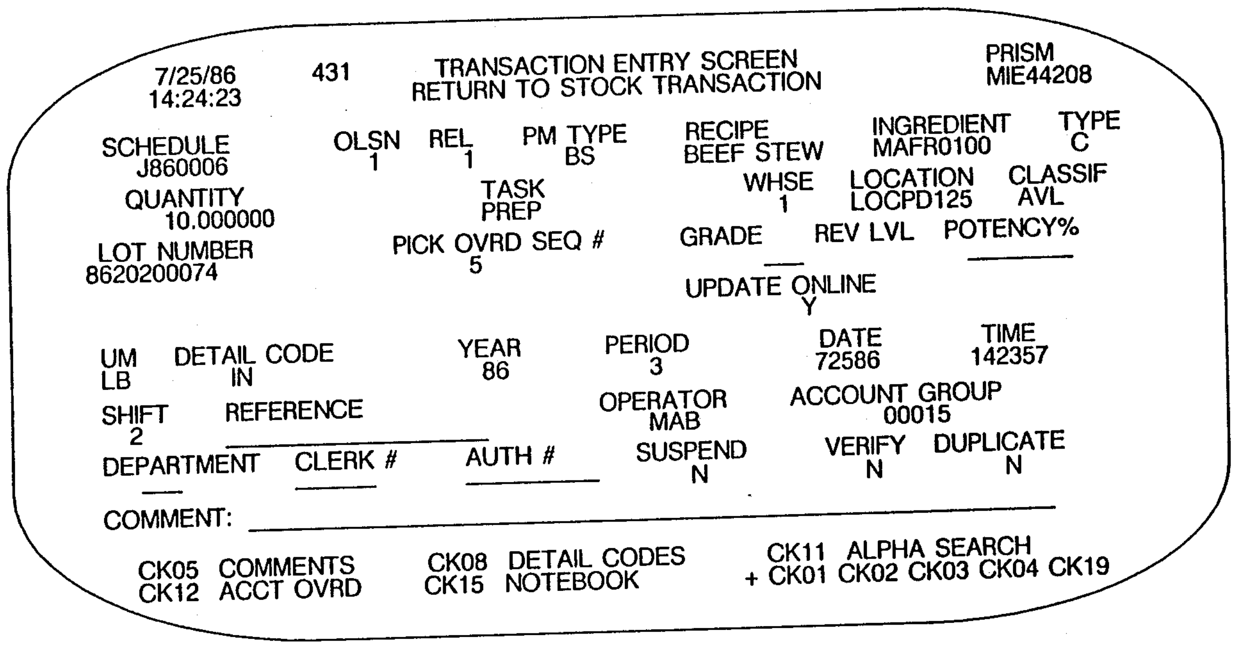

(See Figure 77)

The Return to Stock Transaction Screen is displayed when you:

(1) enter RS in the entry field on the Transaction Selection Screen and press ENTER;

(2) select an RS transaction for review from the Transaction Review Screen.

The RS transaction is the opposite of a DI (direct issue). Use this transaction when you issue a quantity of a consumed resource to a task, and not all of it is actually used. The unused quantity that is returned to stock is the quantity for this transaction.

Fields for Entry

* SCHEDULE—schedule number against which RS is being entered.

OLSN

Rel—release number.

PM Type/* PM Name—If you enter both OLSN and PM type/PM name combination, they must correspond to each other. If you enter one or the other, the system retrieves the corresponding OLSN or production model.

* RESOURCE—must be a balance resource, because otherwise you would not return it to a specific warehouse/location.

QUANTITY—quantity being returned to the warehouse. This quantity must be positive. For a potent resource, enter the physical quantity, not the potent units. The system will calculate the potent units using the entered Potency.

Task—required if this resource is consumed by more than one task on this production model. If that is not the case, the system can retrieve the correct task name.

WHSE/LOCATION—Enter the warehouse and location to which the resource is being returned. It does not have to be returned to the same warehouse/location from which it was consumed.

Note: If you answer Y to tailoring question #G2, the Whse field is not available for entry. It is displayed with the system warehouse defined in tailoring question #G1.

Classif—location classification code for the location to which this resource is returned.

Lot Number—required if both resource and location classification are lot-controlled (see *Location Classification Code Maintenance*, Section 1-4).

Pick Ovrd Seq #—pick list override sequence number for this resource at this location. You can use this field to enter the pick list override sequence number for a new location or change its value at an existing location, if a record for this warehouse/location/resource already exists.

Grade—of the resource being returned.

Rev Lvl—revision level of this resource being returned.

Potency %—potency of this resource being returned. For information on how PRISM handles potent resources, see *RM Concepts*, Section B.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

For the remaining fields for entry on this screen, see "Common Fields," earlier in this section.

Field for Display

Type—for display only, because only consumed resources can be used with this transaction. This field is always C.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed.

CK19—When entering new transactions, press CK19 to return to the Transaction Selection Screen without saving or updating the current transaction. When reviewing transactions, press CK19 to return to the Transaction Review Screen without saving any changes you have made.

Sales Transaction Screen—MIE44209

Figure 78:
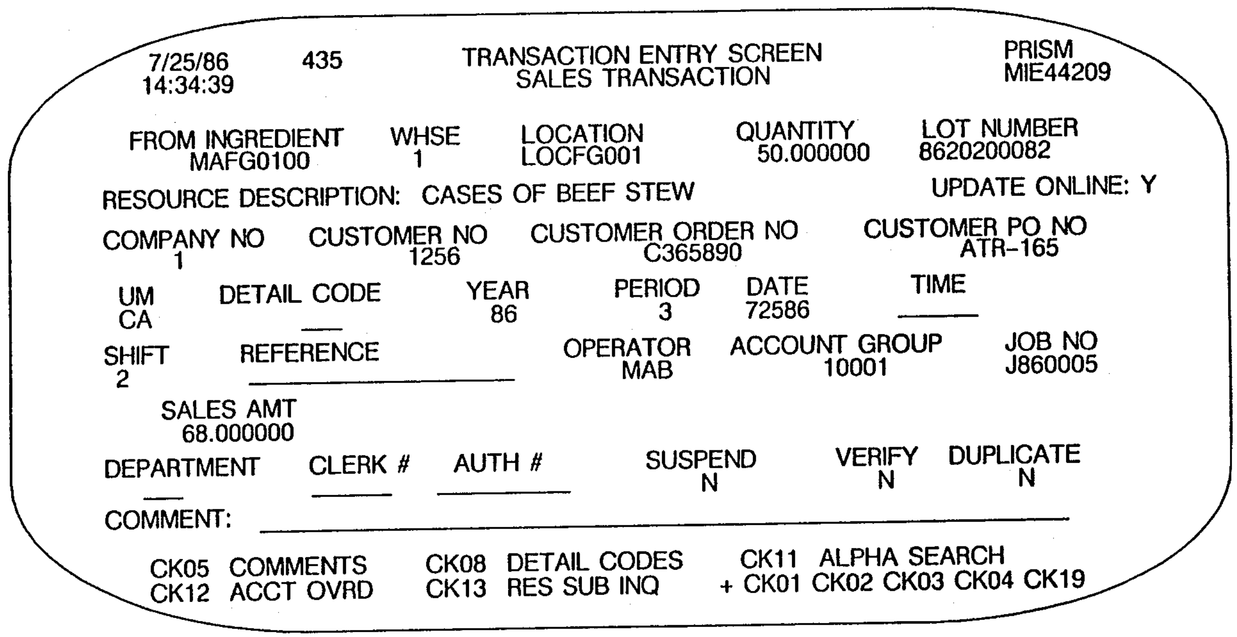

(See Figure 78)

The Sales Transaction Screen is displayed when you:

(1) enter SA in the entry field on the Transaction Selection Screen and press ENTER:

(2) select an SA transaction for review from the Transaction Review Screen.

Enter an SA transaction to report quantities of resources you sell.

Fields for Entry

* FROM RESOURCE—resource being shipped to a customer. This must be a balance resource.

WHSE/LOCATION—warehouse/location where the sold resource is currently stored. Resources can only be sold from on-hand locations. This means that the Location you enter must have a location classification with the On Hand field = Y (see *Location Classification Code Maintenance*, Section 1-4).

Note: If you answer Y to tailoring question #G2, the Whse field is not available for entry. It is displayed with the system warehouse defined in tailoring question #G1.

QUANTITY—quantity sold. This quantity can be positive or negative. For example, if you keyed in an incorrect quantity for an SA transaction, you could then correct it by entering an SA for a negative quantity.

The quantity entered here is subtracted from the Quantity Allocated to Sales in the Resource Balance (RESBAL) file and from the Quantity Reserved for Sales in the Resource Balance and Location Detail (LOCDTL) files. (If the transaction quantity is negative, this has the CK19—When entering new transactions, press CK19 to return to the Transaction Selection Screen without saving or updating the current transaction. When reviewing transactions, press CK19 to return to the Transaction Review Screen without saving any changes you have made.

Transfer Resource Transaction Screen—MIE44210

Figure 79:
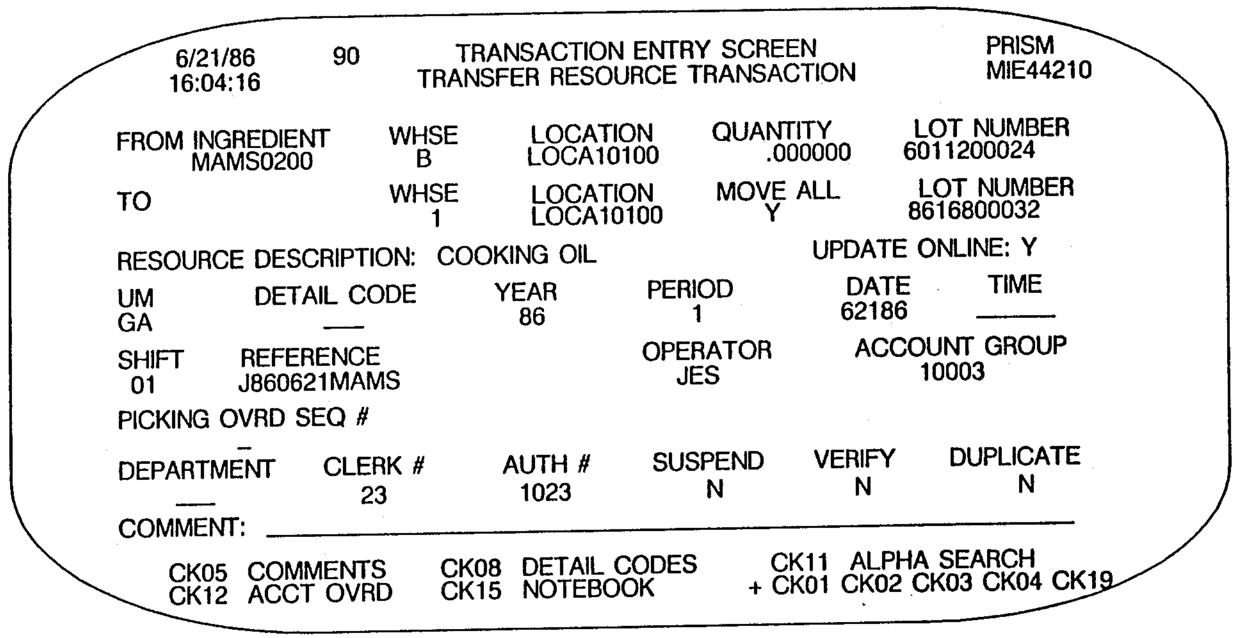

(See Figure 79)

The Transfer Resource Transaction Screen is displayed when you:

(1) enter TR in the entry field on the Transaction Selection Screen and press ENTER;

(2) select a TR transaction for review from the Transaction Review Screen.

Enter a TR transaction to inform the system that you have moved a resource from one location to another, when the two locations have the same location classification.

To move a resource from a location with one location classification to a location with a different location classification, you would use a user-defined transaction. You can also define a user-defined transaction that allows you to change the location classification for a warehouse/location/resource combination, without moving it between locations.

Fields for Entry

FROM RESOURCE—resource being moved. This must be a balance resource.

FROM WHSE/LOCATION—warehouse/location from which the resource is being moved.

effect of increasing those quantities.) If this sales transaction would send one of those fields below zero, the field is set to zero instead.

Sales Amount—total amount for this sale.

UPDATE ONLINE—available for entry only if the answer to tailoring question #T10 is Y. This field indicates whether this transaction is to be updated online or in batch. The default is from tailoring question #T11.

Company No—number of the company, or division of your firm, making the sale.

Customer No—number for customer purchasing this resource.

Customer Order No—order number for this transaction.

Customer PO No—number of the customer's purchase order authorizing this sale.

UM—unit of measure for the Quantity sold. This UM must be convertible into the standard UM for the resource.

Job No—job number for this SA transaction. This is an informational field.

For the remaining fields for entry on this screen, see "Common Fields," earlier in this section.

Fields for Display

The following two fields are for display only. This information is displayed if you (1) enter Y in the Verify field or (2) press ENTER to save/update the transaction, but a screen error causes a message to be displayed.

Lot Number—If both the resource and the location classification for the Location are lot-controlled, this resource is assigned a lot number at this location.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK13 RES SUB INQ—Press CK13 to transfer to the Resource Substitution Inquiry. This inquiry provides a list of the substitutions available for a specified resource, including the range of dates when that substitution is valid.

Note: If you answer Y to tailoring question #G2, neither Whse field is available for entry. They are displayed with the system warehouse defined in tailoring question #G1.

Quantity—quantity of this resource being moved. You can leave this field blank (zero) and enter Y in the Move All field, if you are moving the entire quantity of this resource from the From Whse/Location to the To Whse/Location. The system can retrieve the correct quantity.

TO WHSE/LOCATION—warehouse/location to which this quantity of the resource is being transferred. This location must have the same location classification as the From Whse/Location.

Normally, when a Location Detail (LOCDTL) record exists for the To Whse/To Location/Resource for a transaction, and the From Revision Level or Grade is different than the To Revision Level or Grade, tailoring questions #T25-26 determine which value is used to determine the new value for the To Whse/To Location/To Resource. However, for TR transactions, the system always uses the From Revision Level, regardless of your answers to #T25-26.

MOVE ALL—If you enter a quantity in the Quantity field, this field must be N. This indicates that you are moving the specified quantity of the resource from the From Whse/Location to the To Whse/Location. Or, you can leave the Quantity field blank and enter Y in this field. This indicates that you are moving the entire quantity of the resource, whatever that quantity is, from the From Whse/Location to the To Whse/Location. The system then retrieves the appropriate quantity (though it is not displayed on this screen).

To Lot Number—lot number of the resource at its new location. This field only needs to be entered if both the resource and the location classification are lot-controlled. If so, this resource already has a lot number at the From Whse/Location. If a Location Detail record exists for the To Whse/To Location/Resource, then there is also a lot number for this resource at that location. If the two lot numbers are different, you cannot transfer this resource to that Whse/Location.

If there is no Location Detail record for the To Whse/To Location/Resource, you can enter a lot number (the same as or different from the From Lot Number) in this field. If you leave it blank in this situation, the To Lot Number defaults to the From Lot Number. If you enter a different lot number, this quantity of the From Lot Number of this resource is considered "miscellaneously disposed of."

UPDATE ONLINE—available for entry only if the answer to tailoring question #T10 is Y. This field indicates whether this transaction is to be updated online or in batch. The default is from tailoring question #T11.

UM—unit of measure for the Quantity. This UM must be convertible into the standard UM for the resource.

Pick Ovrd Seq #—pick list override sequence number for this resource at the To Location. You can use this field to enter the pick list override sequence number for a new location or change its value at an existing location, if a record for the To Whse/To Location/Resource already exists.

For the remaining fields for entry on this screen, see "Common Fields," earlier in this section.

Fields for Display

The following two fields are for display only. This information is displayed if you (1) enter Y in the Verify field or (2) press ENTER to save/update the transaction, but a screen error causes a message to be displayed.

From Lot Number—lot number of this resource at the From Whse/From Location, if both the resource and the location classification are lot-controlled.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed, with two fields allowing you to indicate whether the location information you enter is to be returned to the From Location or the To Location field. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file, for the the To Lot Number. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Resource Number Change Transaction Screen—MIE44211

Figure 80:
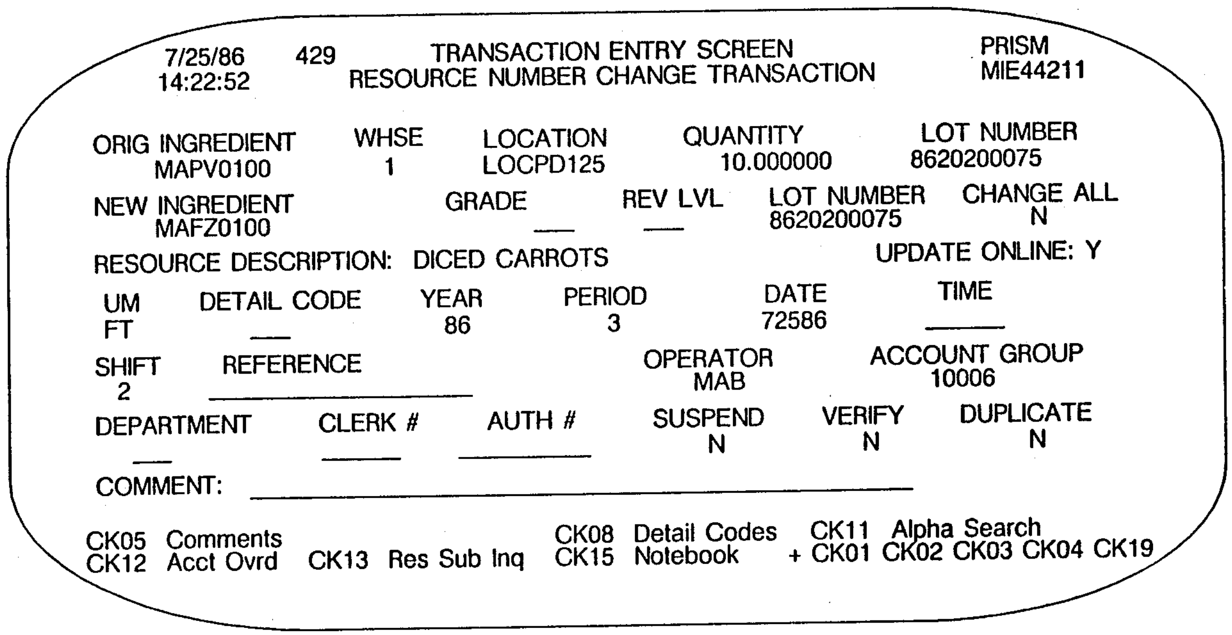

(See Figure 80)

The Resource Number Change Transaction Screen is displayed when you:

(1) enter RC in the entry field on the Transaction Selection Screen and press ENTER;

(2) select an RC transaction for review from the Transaction Review Screen.

Enter an RC transaction to change the resource number and/or grade of a resource at a location, without moving it from that location. If you are a manufacturer of cheese, for example, you may need to change resource numbers when soft curds turn into mild cheddar. Similarly, you may need to change grades if the quality of a resource improves or deteriorates with time. The only valid changes are those defined through Resource Substitution Maintenance (see Section 1-16).

You can use a single transaction to change just resource number, just grade, or both resource number and grade. Keep two things in mind when entering this type of transaction:

(1) If you are changing GRADE ONLY, the entire quantity of the resource at this location must have its grade changed. This is because you cannot have two grades of the same resource at one location. So in this situation, you are better off using the Change All field rather than entering Quantity. This avoids the possibility of having an error message displayed because an incorrect quantity was entered.

(2) When you are changing the resource number, there are two possibilities: that a Location Detail (LOCDTL) file record already exists for the Whse/Location/New Resource combination, or that it does not.

If it does, then the new resource number already has a grade, revision level, and possibly lot number assigned to it at this location. If you leave any of these fields blank on this screen, it defaults to the value for the Original Resource. Whether you enter a value or it defaults, if the grade or revision level on this screen differs from the grade or revision level that already exists, a message is displayed to that effect. Depending on the severity code for the message, your answer to tailoring question #T25 may determine which of the conflicting values is used. If the lot numbers conflict, this transaction cannot be updated.

If a Location Detail record does not exist for the Whse/Location/New Resource, one will be created when this RC transaction is updated. The grade, revision level, and lot number assigned to the new resource at this location depend upon your entries on this screen. If you make an entry in any of those fields, your entry is the value assigned. If you leave the field blank, the value from the Original Resource is assigned.

Note that even if you are tailored to have system-generated lot numbers (see tailoring question #T2), the system will not generate a new lot number for your new resource number. If you leave the New Lot Number field blank, the lot number from the Original Resource is used.

Fields for Entry

* ORIG RESOURCE—original resource number. This is the resource number currently found at the location, which is being changed to a different resource number and/or grade.

WHSE/LOCATION—Enter the warehouse and location where both the original and the new resource are stored.

Note: If you answer Y to tailoring question #G2, the Whse field is not available for entry. It is displayed with the system warehouse defined in tailoring question #G1.

Quantity—quantity of this resource having its resource number and/or grade changed. Remember that the entire quantity of a resource at a location must have the same grade. Therefore, if you are changing the grade without changing the resource number, you MUST enter the total quantity for this location or use the Change All field.

* New Resource—Enter the new resource number, if you are using this transaction to change the resource number.

* Grade—new grade for the original resource or the new resource (if any) at this location.

Rev Lvl—If you are changing the resource number, you may want to define a different revision level for the new resource.Revision level 02 of resource A may change to revision level 04 of resource B.

Lot Number—Use this field only if you are changing the resource number and you want the lot number to be different.

CHANGE ALL—Enter Y to change the resource number and/or grade of the entire quantity of the original resource at this location. In this case, the Quantity field must be zero. Enter N in this field if you are entering a Quantity. The Quantity may or may not be the full quantity for this location.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource number in the Orig Resource field. In addition, the standard UM for the original resource must be convertible into the standard UM for the new resource number.

For the remaining fields for entry on this screen, see "Common Fields," earlier in this section.

Fields for Display

The following information is for display only. To have it displayed when entering a new transaction, use the Verify field.

Orig Lot Number—lot number of the original resource number at this location.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the original resource for this transaction, press CK11 to display the Alpha Search Inquiry Screen. This inquiry allows you to find the resource number you need using information you already have, such as a partial description. You can then select the correct resource number from a list and have the system return that number to the Orig Resource field. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK13 RES SUB INQ—Press CK13 to transfer to the Resource Substitution Inquiry. This inquiry provides a list of the valid resource number changes, including the range of dates when each change is valid.

CK15 NOTEBOOK—Select CK15 to switch to Notebook File Maintenance, to enter values for any extra fields defined for the Lot Master (LOTMAS) file, for the New Lot Number. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Miscellaneous Issue Transaction Screen—MIE44212

(See Figure 81)

The Miscellaneous Issue Transaction Screen is displayed when you:

(1) enter MI in the entry field on the Transaction Selection Screen and press ENTER;

(2) select an MI transaction for review from the Transaction Review Screen.

Enter an MI transaction to record inventory loss from a location. This loss could have occurred because of theft, for example, or it might have been used for analysis by your Quality Assurance department. In either case, goods are missing from a location for reasons not covered by other transactions. You should probably use transaction detail codes to distinguish between the different reasons for entering MI transactions.

Transactions of this type do not have schedule numbers, while SC (scrap) transactions do. Thus, if something becomes unusable after being issued to a schedule, you would use an SC transaction. If it becomes unusable while still at the location, you could enter an MI transaction with a transaction detail code explaining that it is scrap.

Fields for Entry

FROM RESOURCE—missing or "miscellaneously used" resource. This can be a non-balance resource, but there must be a Resource Balance (RESBAL) record for it.

WHSE/LOCATION—Enter the warehouse/location from which this resource was scrapped, stolen, etc.

Note: If you answer Y to tailoring question #G2, the Whse field is not available for entry. It is displayed with the system warehouse defined in tailoring question #G1.

QUANTITY—quantity miscellaneously issued. This must be a positive number. To reverse an MI transaction, enter an MR transaction with a positive quantity. Enter the quantity of a potent resource in physical rather than potent units. The system calculates the potent units using the transaction quantity and entered potency factor. If you enter a lot number, an MI transaction causes an increase in the quantity "miscellaneously disposed of" for that lot number of the resource.

UPDATE ONLINE—available for entry only if the answer to tailoring question #T10 is Y. This field indicates whether this transaction is to be updated online or in batch. The default response is from tailoring question #T11.

UM—unit of measure for the Quantity. This UM must be convertible into the standard UM for the resource.

For the remaining fields for entry on this screen, see "Common Fields," earlier in this section.

Fields for Display

The following information is for display only. To have it displayed when entering a new transaction, use the Verify field.

Lot Number—of this resource at this whse/location.

Grade—of this resource at this whse/location.

Potency %—potency of this resource at this location. For information on how PRISM handles potent resources, see *RM Concepts*, Section B.

Resource Description—from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Miscellaneous Receipt Transaction Screen—MIE44213

Figure 82:
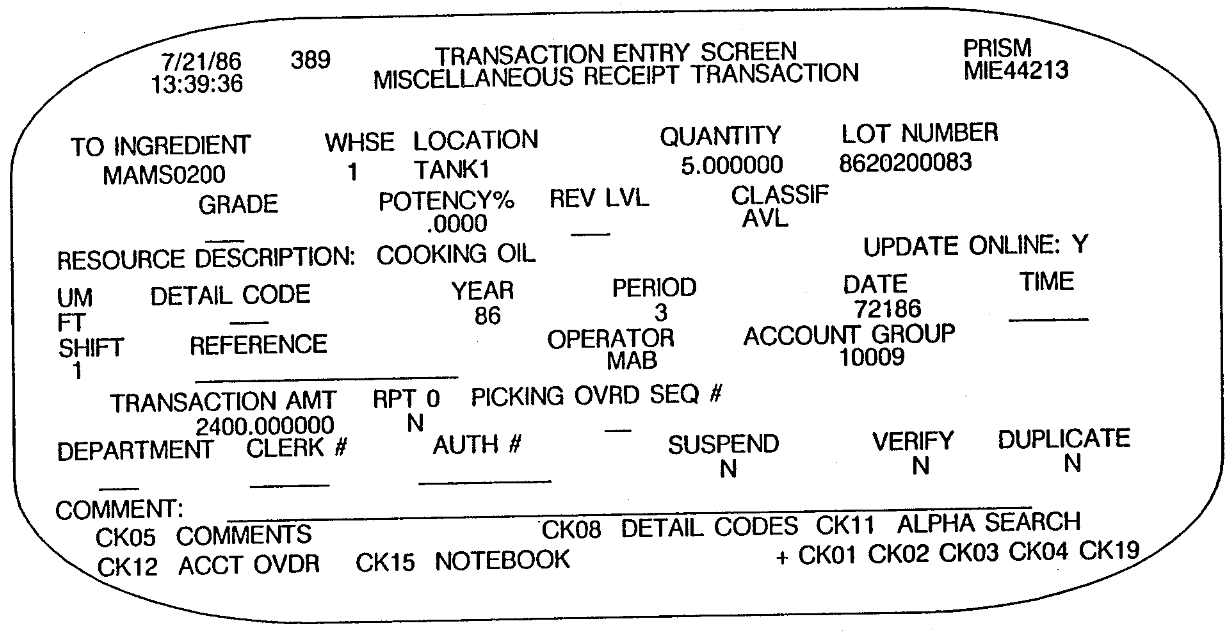

(See Figure 82)

The Miscellaneous Receipt Transaction Screen is displayed when you:

(1) enter MR in the entry field on the Transaction Selection Screen and press ENTER;

(2) select an MR transaction for review from the Transaction Review Screen.

An MR transaction is the opposite of an MI (miscellaneous issue) transaction. Enter MR transactions to record inventory received other than from a purchase order or schedule. For example, when first installing PRISM, you use MR transactions to record the resources you currently have in each location. Because you may enter MRs for a number of different reasons, you should probably use transaction detail codes to distinguish between them.

Fields for Entry

- TO RESOURCE—resource being received. This can be a non-balance resource, but there must be a Resource Balance (RESBAL) record for it.

WHSE/LOCATION—Enter the warehouse/location where this resource is now stored.

Note: If you answer Y to tailoring question #G2, the Whse field is not available for entry. It is displayed with the system warehouse defined in tailoring question #G1.

QUANTITY—quantity miscellaneously received. This must be a positive number. To reverse an MR transaction, enter an MI transaction with a positive quantity. Enter the quantity of a potent resource in physical rather than potent units.

Lot Number—of this resource at this whse/location, required if both the resource and the location classification are lot-controlled. If you are having the system generate lot numbers and you want to see the number generated, enter Y in the Verify field and press ENTER.

- Grade—of this resource at this whse/location.

Potency %—potency of this resource at this location. For information on how PRISM handles potent resources, see *RM Concepts*, Section B.

Rev Lvl—revision level of this resource at this whse/location. This must be greater than or equal to the earliest acceptable revision level defined for this resource in the Resource Master (RESMST) file.

Classif—location classification code for this resource at this location. This field is required if you are receiving to a new location.

UPDATE ONLINE—available for entry only if the answer to tailoring question #T10 is Y. This field indicates whether this transaction is to be updated online or in batch. The default response is from tailoring question #T11.

UM—unit of measure for the Quantity. This UM must be convertible into the standard UM for the resource.

Transaction Amt—dollar value of this transaction. This field defaults to quantity times selected unit cost for the resource, if you answer Y to the MR portion of tailoring question #T41. The transaction amount can be zero only if you enter Y in the Rpt 0 (report zero transaction) field.

RPT 0—If the Transaction Amt field is zero, the Y or N in this field tells the system whether the zero means that (Y) you have entered a transaction amount of zero or (N) you have not entered a transaction amount. If the transaction amount is zero (if this field is Y), the default from #T41 is not used.

Picking Ovrd Seq #—picking override sequence number for this resource at this location.

For the remaining fields for entry on this screen, see "Common Fields," earlier in this section.

Fields for Display

The following information is for display only. To have it displayed when entering a new transaction, use the Verify field.

Resource Description—from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Inventory Adjustment Transaction Screen—MIE44214

(See Figure 83)

The Inventory Adjustment Transaction Screen is displayed when you:

(1) enter IA in the entry field on the Transaction Selection Screen and press ENTER;

(2) select an IA transaction for review from the Transaction Review Screen.

Use an IA transaction to adjust the quantity of a resource in a warehouse or location, at times other than cycle counting. You would enter an IA transaction if the actual quantity present is different than the quantity according to the system, because of a data entry error. You can enter a location, to change both location quantity and warehouse (Resource Balance (RESBAL) file) quantity, or leave the Location field blank, to change just the warehouse quantity.

Suppose you use an RC (resource number change) transaction to change 100 pounds (physical quantity) of potent resource A (potency 20 percent) to non-potent resource B (potency 0 percent). The system assumes that the 20 potent units (100 pounds x 20 percent) of resource A have changed to 100 potent units (100 pounds x zero percent) of resource B. If you really intended to change the 100 pounds at 20 percent to 20 pounds at zero percent, you would need to enter an IA transaction for -80 pounds.

Fields for Entry

RESOURCE—resource whose quantity is being adjusted.This can be a non-balance resource, but there must be a Resource Balance (RESBAL) record for it.

WHSE/Location—Enter the warehouse/location for which you want to adjust the quantity. If you leave the Location field blank, just the Resource Balance file record for this resource/whse is adjusted.

Note: If you answer Y to tailoring question #G2, the Whse field is not available for entry. It is displayed with the system warehouse defined in tailoring question #G1.

QUANTITY—adjustment quantity. Enter the quantity by which you want to adjust the location or warehouse quantity, NOT the new correct quantity. If you want to change the quantity from 100 to 20, for example, enter -80 rather than 20. Enter the quantity of a potent resource in physical rather than potent units.

UPDATE ONLINE—available for entry only if the answer to tailoring question #T10 is Y. This field indicates whether this transaction is to be updated online or in batch. The default response is from tailoring question #T11.

UM—unit of measure for the Quantity. This UM must be convertible into the standard UM for the resource.

For the remaining fields for entry on this screen, see "Common Fields," earlier in this section.

Fields for Display

The following information is for display only. To have it displayed when entering a new transaction, use the Verify field.

Lot Number—of this resource at this location, if Location is entered and both resource and location classification are lot-controlled. If the adjustment quantity is negative, that quantity is added to the quantity "miscellaneously disposed of" for this resource/lot combination in the Lot Master (LOTMAS) file. If the adjustment quantity is positive, that quantity is subtracted from the quantity "miscellaneously disposed of."

Resource Description—from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Indirect Measurement Transaction Screen—MIE44215

(See Figure 84)

The Indirect Measurement Transaction Screen is displayed when you:

(1) enter IM in the entry field on the Transaction Selection Screen and press ENTER;

(2) select an IM transaction for review from the Transaction Review Screen.

If you use non-linear unit of measure conversions (see *Unit of Measure Conversion Maintenance*, Section 1-19), you have two possible methods of "cycle counting" the resources with non-linear conversions:

(1) Using the normal Cycle Count List (see Section 2-4). Treat the non-linear resource (for example, your 20-foot vat of oil in the yard behind warehouse B) like any other resource, and measure it when it comes up on the Cycle Count List. You can enter the reported quantity in a UM different than the resource's standard UM, and the non-linear conversion will be performed. This method would include the vat of oil in the accuracy statistics calculated by the Cycle Count Variance Report (see Section 2-5), which you may or may not want to do.

(2) Using the IM transaction. You may find that Cycle Counting is not adequate for your non-linear resources, especially if you count them more often than other resources. Suppose that because of the inexact nature of the measurement, you measure your backyard vat of oil once a week. No other resource is counted more often than once a month.

In this situation, you might not want to generate a Cycle Count List once a week. Instead, you could enter an IM transaction for the vat of oil once a week, and generate the Cycle Count List once a month. The resource/warehouse combination for the vat of oil would still come up on the Cycle Count List (there is no Cycle Count Method for "never"). You could either ignore it or use the listing to get that week's measurement.

Fields for Entry

* RESOURCE—resource being measured.

WHSE/LOCATION—Enter the warehouse/location where the resource was measured.

Note: If you answer Y to tailoring question #G2, the Whse field is not available for entry. It is displayed with the system warehouse defined in tailoring question #G1.

QUANTITY—quantity of this resource measured at this whse/location. This is the new correct quantity, and it cannot be negative. Enter the quantity of a potent resource in physical rather than potent units.

UPDATE ONLINE—available for entry only if the answer to tailoring question #T10 is Y. This field indicates whether this transaction is to be updated online or in batch. The default response is from tailoring question #T11.

UM—unit of measure for the Quantity. This UM must be convertible into the standard UM for the resource.

For the remaining fields for entry on this screen, see "Common Fields," earlier in this section.

Fields for Display

The following information is for display only. To have it displayed when entering a new transaction, use the Verify field.

Resource Description—from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Issue To Production Transaction Screen—MIE44216

(See Figure 85)

The Issue To Production Transaction Screen is displayed when you:

(1) enter IP in the entry field on the Transaction Selection Screen and press ENTER;

(2) select an IP transaction for review from the Transaction Review Screen.

Enter an IP transaction to indicate that you removed a certain quantity of a resource from a location and sent it to the production floor. You would use this type of transaction for a consumed resource whose theoretical consumption code is C (calculated cost).

When a task consumes a calculated cost resource, you need to enter two transactions. The IP reduces the inventory balance of the resource (in the Resource Balance (RESBAL) file), but does not associate the issued quantity with a particular schedule release. When you enter a PR or ON transaction for the corresponding produced resource(s), the system generates CC (calculated cost) transactions for the appropriate quantity of the CC resource. These CC transactions indicate the quantity used by an individual schedule release.

Fields for Entry

- FROM RESOURCE—resource being issued to the production floor. This does not have to be a balance resource, but there must be a Resource Balance (RESBAL) record for this resource/warehouse.

WHSE/LOCATION—Enter the warehouse and location from which you are issuing this resource.

Note: If you answer Y to tailoring question #G2, the Whse field is not available for entry. It is displayed with the system warehouse defined in tailoring question #G1.

QUANTITY—quantity being issued. This quantity can be positive or negative, but not zero. For a potent resource, enter the physical quantity, not the potent units.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

Work Center—work center to which this quantity of the resource is being issued. If you have RP installed and RM is interfaced to RP, this work center must be defined in the Work Center (WCMAST) file (see Section 1-7 of the RP reference manual).

For the remaining fields for entry on this screen, see "Common Fields," earlier in this section.

Fields for Display

The following information is for display only. To have it displayed when entering a new transaction, use the Verify field.

Lot Number—of this resource at this location.

Grade—of this resource at this location.

Potency %—potency percentage of this resource at this location.

Rev Lvl—revision level of this resource at this location.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Cost Adjustment Transaction Screen—MIE44217

(See Figure 86)

The Cost Adjustment Transaction Screen is displayed when you:

(1) enter CA in the entry field on the Transaction Selection Screen and press ENTER;

(2) select a CA transaction for review from the Transaction Review Screen.

The simplest reason for entering a CA transaction is to correct a mistake if you update a transaction with an incorrect transaction amount.

You may also need to enter a CA when you close the period associated with a transaction, before entering a transaction amount. The following paragraphs explain why this is a problem and how it can be resolved.

The actual Period Close program calculates the average cost of each resource in each warehouse over the period being closed. This average cost is calculated using the dollar value of the resource you have in the warehouse at the beginning of the period, added to the dollar value of receipts for that resource/warehouse for the period, and divided by the total quantity of the resource in the warehouse at the end of the period.

It is very possible that the system will not have a transaction amount available for every receipt of a resource/warehouse (this goes into the dollar value of receipts). For example, you enter a transaction when you receive the resource from a vendor, but you may not enter a transaction amount until much later, possibly not until you receive the corresponding invoice. If the Accrual Report and then the Period Close are run after the material is received but before the transaction amount is recorded, an estimated transaction amount, called the accrual amount, is used to perform the calculations during the Period Close.

The accrual amount is always the transaction quantity times the selected unit cost for the resource/warehouse, and this may or may not be correct. Suppose you enter a transaction receiving 100 pounds of tomatoes from a vendor to warehouse 1. The selected unit cost for the resource is A (rolling average cost with alpha factor), and the value of A for tomatoes in warehouse 1 is $0.20/pound. At the end of the period, the invoice for these tomatoes has not yet come in. You run the Accrual Report (see Section 2-2), and the system calculates an accrued amount of $20.

Later, you receive the invoice for the tomatoes, and the price on the invoice is $0.30/pound. Therefore, the transaction amount should have been $30 rather than $20. This means there was a $10 error in the cost calculations at the end of the last period. Because of this difference, the end of period average cost for the resource/warehouse for the closed period is incorrect.

You cannot correct this discrepancy for the closed period. You can, however, enter a CA transaction to correct it when the next period is closed.

Fields for Entry

You must enter EITHER resource, warehouse, and adjusting amount, OR transaction number and actual amount. You cannot use both sets of fields.

* Resource—resource for which cost adjustment is being entered.

Whse—warehouse for which adjustment is being entered.

Note: If you answer Y to tailoring question #G2, the Whse field is not available for entry. It is displayed with the system warehouse defined in tailoring question #G1.

Adjusting Amount—amount you want to add to the total dollar amount of receipts for this resource/warehouse for the period identified on this screen. If the original transaction amount or the accrued amount was $100 and the correct amount is $120, you would enter $20 in this field. The Adjusting Amount can be positive or negative, but not zero.

Transaction #—Enter the number of the updated transaction whose transaction amount you are correcting with this CA transaction.

Actual Amount—Enter the correct amount for the original transaction. If the original transaction amount or the accrued amount was $100 and the correct amount is $120, you would enter $120 in this field. This amount can be positive or negative, but not zero.

UPDATE ONLINE—available for entry only if the answer to tailoring question #T10 is Y. This field indicates whether this transaction is to be updated online or in batch. The default is from tailoring question #T11.

For the remaining fields for entry on this screen, see "Common Fields," earlier in this section.

Fields for Display

The following information is for display only. To have it displayed when entering a new transaction, use the Verify field.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK19—When entering new transactions, press CK19 to return to the Transaction Selection Screen without saving or updating the current transaction. When reviewing transactions, press CK19 to return to the Transaction Review Screen without saving any changes you have made.

Transaction Review Screen—MIE44220

(See Figure 87)

The Transaction Review Screen is displayed when you select Option 2, Review Transactions, from the Transaction Selection Screen. This screen provides a list of the transactions in this batch. From that list you can select one or more non-updated transactions for maintenance or deletion. For updated or partially updated transactions, only the transaction comments can be maintained.

When this screen is first displayed, all transactions in the batch are listed (note the X in the selection field next to "All Transactions"). You can use the selection fields at the top of the screen to limit the list to entered but non-updated transactions (status N), suspended transactions (status S), or error transactions (status E). For more information on transaction status codes, see the description of the Batch Selection Screen, above.

Fields for Display

Batch Number—batch number for which transactions are being displayed. This is the batch you selected on the Batch Selection Screen.

The following information is displayed for each transaction on the list.

No—transaction number.

Type—two-character transaction type.

Sts—transaction status code: U = updated, N = entered but not updated, P = partially updated, E = error, S = suspended.

Code—transaction detail code, if any, associated with this transaction.

Date—transaction date. If this transaction was user-entered, this is the date entered by the operator, not the system date when the transaction was entered.

Resource—resource involved in the transaction. If the transaction has a From (or Orig) Resource and a To (or New) Resource, the To Resource is displayed here.

Wh—warehouse from/to which this resource was issued/received in this transaction.

Quantity—transaction quantity.

Fields for Entry

The four fields at the top of the screen allow you to limit the transactions displayed according to status. When this screen is first displayed, an X is displayed next to the All Transactions field, and all transactions in the batch are displayed.

If there are a lot of transactions in this batch, or if you only want to make corrections to a certain type of transaction, you can use one of these fields to shorten the list. Simply place an X in the field to the left of the type of transaction you want to see. Then press CK06 to have the system "restart" the list using just the transactions that fit that description.

Entered But Not Updated Transactions (+ CK06)—displays transactions with status N only.

Suspended Transactions (+ CK06)—displays transactions with status S only.

Error Transactions (+ CK06)—displays transactions with status E only.

All Transactions (+ CK06)—displays all transactions in the batch.

Start Review At This Trans #—This field also allows you to shorten the list of transactions. Within the set of transactions that meet the description marked at the top of the screen, the only transactions displayed are those with transaction numbers greater than or equal to your entry in this field.

For example, if you type an X to the left of "Error Transactions" and enter 1200 in this field, the list is limited to error transactions in this batch with transaction numbers of 1200 or greater.

X/D—Use this field if you want to change or delete a transaction. To delete one or more transactions, enter D to the left of the transaction(s) you want to delete, and press CK20. To maintain a transaction, enter X to the left of it and press ENTER.

When you select a transaction for maintenance, the normal screen for that transaction type (DI, IP, etc.) is displayed, with the current values for that transaction in each field. Any fields that are normally available for entry are available to be changed, unless the transaction's status is U (updated) or P (partially updated). In that case, the only information that can be entered or changed is a comment.

If you select more than one transaction for maintenance, the transactions are processed in order down the list. Suppose you enter X next to transactions 1200 and 1203. When you press ENTER, the transaction screen for transaction 1200 is displayed.

If you press ENTER on that transaction screen, you do not return to the Transaction Review Screen. Instead, the next transaction you selected for maintenance, transaction 1203, is displayed. Each selected transaction is displayed in turn until you press ENTER from the last one or press CK19 from any of them. If you press CK19 from the transaction you are reviewing, you return to the Transaction Review Screen. All remaining transactions are still marked with X.

Command Function Keys

ENTER—Press ENTER after marking one or more transactions with X, to display those transactions for maintenance. If you press ENTER while no transactions are marked with X or D, the Transaction Review Screen just blinks and is redisplayed.

ROLL UP—Use the ROLL UP key combination (shift key and "up" arrow) to page forward through the list of transactions. If there is information beyond what is currently displayed, you see a "+" sign in the lower right-hand corner of the screen. When you no longer see the "+" sign, there is no further data to display and ROLL UP is no longer valid.

ROLL DOWN—Use the ROLL DOWN key combination (shift key and "down" arrow) to page backward through the list of transactions. Your list begins with the first record, so ROLL DOWN is not valid until you have used ROLL UP at least once.

CK01 SESSION STATUS—Press CK01 to display the Batch Status Screen, from which you can return to the Batch Selection Screen, the Transaction Selection Screen, or exit Transaction Entry.

CK06 RESTART—Press CK06 to have the system "restart" the list of transactions. For example, this screen is first displayed with a list of all transactions in the batch. To change the list to just the suspended transactions, you would enter X next to "Suspended Transactions" and press CK06. When you press CK06, no more than one selection can be marked with X.

CK19 RETURN TO TRANS SEL—Press CK19 to return to the Transaction Selection Screen.

CK20 DELETE—To delete one or more transactions on this list, type X to the left of the transaction(s) you want to delete, and press CK20. Updated and partially updated transactions cannot be deleted.

Comment Entry Screen—MIE44224

(See Figure 88)

The Comment Entry Screen is displayed when you select CK05 from any transaction screen. This screen allows you to enter text to be associated with the transaction currently being maintained.

Fields for Display

Transaction Number—number of the transaction with which this comment will be associated.

Line #—You can enter up to 999 50-character lines of comments with each transaction. To conserve file space, each of these lines is associated with a line number, so that the system only has to save the lines of text you actually use. Therefore, you cannot leave blank lines between lines that have text.

Fields for Entry

Del—Enter D in this field to the left of any line of text you want to remove from the comment. When you press ENTER to update this comment, the lines marked with D are deleted. However, when you press ENTER the net result must be that at least one line of text will remain. To delete the entire comment, press CK20.

Comment—Enter as many lines of comments as you like. When you press ENTER from this screen, the first line of comments is displayed in the Comment field at the bottom of the transaction screen.

Command Function Keys

ENTER—Press ENTER to update this comment. You cannot press ENTER unless the net result is that the transaction will have at least one line of text. If not, press CK19 or CK20.

ROLL UP—Use the ROLL UP key combination (SHIFT key and "up" arrow) to page forward, if the current page is full. Until each of the 13 lines on this page has text, you cannot roll to the next page.

ROLL DOWN—Use the ROLL DOWN key combination (SHIFT key and "down" arrow) to page backward through the lines of comments.Your display begins with the first page, so ROLL DOWN is not valid until you have used ROLL UP at least once.

CK18 REFRESH SCREEN—Press CK18 to redisplay the Comment Entry Screen with the comments that existed when you first called it from the transaction screen.

CK19 RETURN WITHOUT UPDATE—Press CK19 to return to the transaction screen without adding any new comments or updating any changes made to existing text.

CK20 DELETE—Press CK20 to delete the entire comment.

Transaction Detail Code Display Screen—MIE44227

(See Figure 89)

This screen is displayed when you press CK08 from any transaction screen. It displays a list of the transaction detail codes defined for the transaction type being entered or reviewed. Transaction detail codes are defined using Transaction Detail Code Maintenance (see Section 1-17).

Fields for Display

Transaction Type—transaction type being entered on the screen from which you pressed CK08.

The following information is displayed for each transaction detail code defined for the above transaction type.

Transaction Detail Code

Transaction Detail Description—meaning of this transaction detail code.

Default Accounting Group #—default accounting group number for this transaction type/transaction detail code combination. This is the first default for the Account Group field on the transaction screen.

Command Function Keys

ENTER RETURN—Press ENTER to return to the transaction screen from which you pressed CK08.

ROLL UP—Use the ROLL UP key combination (SHIFT key and "up" arrow) to page forward through the list of transaction detail codes, if the current page is full. A plus ("+") sign is displayed in the lower right-hand corner of the screen, if there is more information to be displayed.

ROLL DOWN—Use the ROLL DOWN key combination (SHIFT key and "down" arrow) to page backward through the list of transaction detail codes. Your display begins with the first page, so ROLL DOWN is not valid until you have used ROLL UP at least once.

Change Classification Transaction Screen—MIE44229

Figure 90:
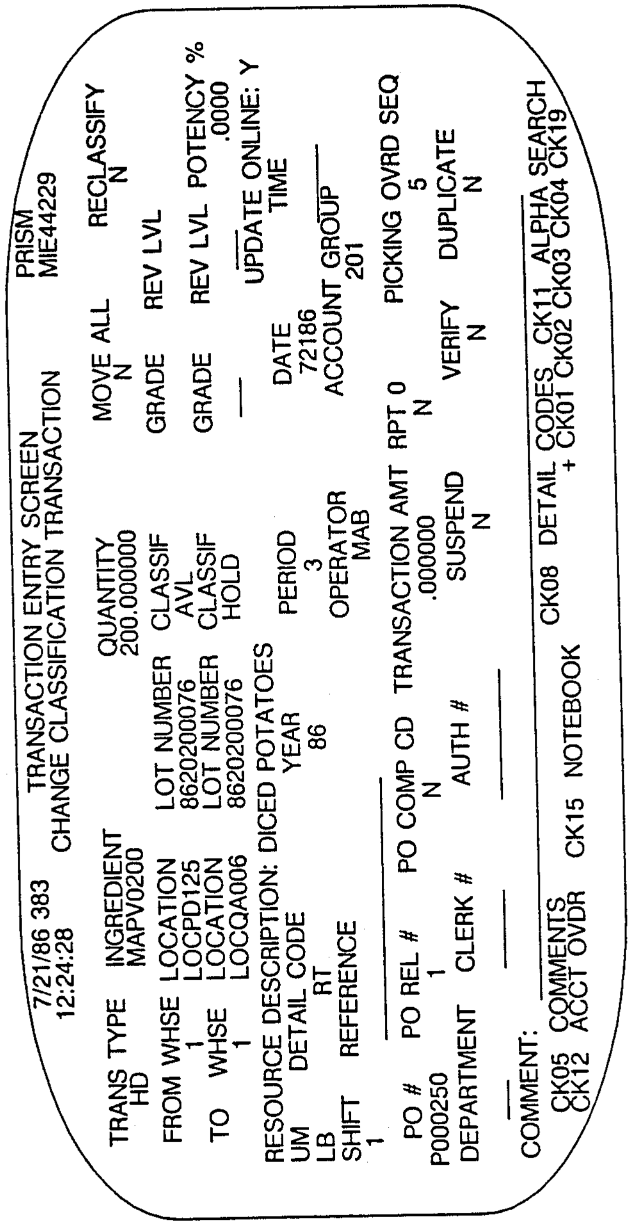

(See Figure 90)

The Change Classification Transaction Screen is displayed when you:

(1) enter 1 in the entry field on the Transaction Selection Screen and press ENTER;

(2) select a user-defined transaction for review from the Transaction Review Screen.

Through User-Defined Transaction Maintenance (see Section 1-20), you define any transactions you need that are not covered by the transactions defined by Marcam. For example, you probably need transactions to express what happens when you receive goods from a vendor, when you return goods to a vendor, and when you move goods from inspection (quality control) to regular stock. These would all be user-defined transactions.

One of the major reasons you need user-defined transactions is for moving resources from one location classification to another. The TR (transfer resource) transaction only allows you to transfer a resource from location to location within a classification. This is not adequate if your canned beef stew has been quarantined for 10 days, and is now suitable for sale. At that point you would be moving the resource from a "quarantine" classification to a "stock" classification, so the TR transaction could not be used.

Fields on this screen often have restrictions that depend on the *user*-entered definition of the transaction. Of course, the rules surrounding many transactions will be obvious to you just from knowing the purpose of the transaction. For example, a transaction for receiving goods from a vendor might not be allowed to have a From Location—because it's coming from a vendor, not from a location in your warehouse.

Still, when using user-defined transactions, especially at first, it is a good idea to have handy a chart showing the characteristics of each transaction. One simple way to get such a chart is to run the User-Defined Transaction File List (see Section 5-15). Using that list, you can tell at a glance what information you need to enter for each transaction type.

Fields for Entry

TRANSACTION TYPE—Enter the one- or two-character code for the transaction you are entering.

RESOURCE—resource being moved, received, or returned. If the Reclassify field is Y, this must be a balance resource.

Quantity—quantity of the resource being moved. If the Reclassify and Move All fields are both N, this field must be positive. To reverse an incorrect user-defined transaction, just enter another transaction with the From and To locations reversed. If the Reclassify or Move All field is Y, this field must be blank (zero). If this is a potent resource, enter the quantity in *physical* units.

MOVE ALL—You can indicate the quantity being moved in two ways:

(1) Enter a quantity and leave this field N.

(2) Enter Y in this field and leave the Quantity field blank (zero). This indicates that whatever quantity of this resource is found at the From Location, you are moving that quantity to the To Location.

Note: This field cannot be Y if you are entering a transaction amount.

RECLASSIFY—Use this field when you want to change the location classification for an entire lot of the resource. When this field is Y, you can only make entries in four other fields:

(1) Transaction Type (2) Resource (3) From Lot Number (4) To Classif

These entries indicate that for every location where this lot of this resource is found, you are changing the location classification to the code you have entered.

How would you use this? Suppose you produce lot 1000 of beef stew on July 5th. The entire lot, which takes up about 50 individual locations, is quarantined (the location classification for each of these 50 locations is QUAR for quarantine) for 10 days. On the 15th, you don't want to enter 50 transactions moving the beef stew from quarantine locations into non-quarantine locations. Instead, you use the Reclassify field to change all of those locations to the location classification STCK for stock.

When this transaction is updated, the system generates one transaction of this type for each location where this resource/lot was found (this is both the From and the To Location). There is one restriction, if this transaction type is defined to have restricted From Location Classifications: for each From Location, the location classification code must be one of the From Location Classifications defined for the transaction.

From Whse/Location—Enter the warehouse and location, if any, from which you are moving this resource. Each user-defined transaction either (1) MUST have a From Warehouse and Location or (2) must NOT have them.

If this transaction is defined to have restricted From Location Classifications, then the From Location must have a location classification that matches one of those defined for the transaction.

From Lot Number—You only need to enter this information when you are using the Reclassify field. In that case, you must specify the resource/lot for which you want to change location classifications. Otherwise:

(1) If no From Location is entered, you cannot enter a From Lot Number.

(2) If you are entering a From Location and a lot number is necessary (both resource and location classification are lot-controlled), one has already been assigned. In that case, just let this field default to the lot number already assigned to this resource at this location.

To Whse/Location—Enter the warehouse and location, if any, to which you are moving this resource. Each user-defined transaction either (1) MUST have a To Warehouse and Location or (2) must NOT have them.

To Lot Number—lot number of this resource at the To Whse/Location. If a Location Detail record already exists for the To Whse/To Location/Resource, the To Lot Number on the screen (if you do not enter one, it defaults to the From Lot Number) must match the lot number already assigned to that record.

To Classif—defaults to the To Classif defined for this transaction type. This field can have different meanings, depending on whether you are using the Reclassify field.

(1) If Reclassify = Y, this is the new location classification code for all locations that contain the specified resource/lot.

(2) If Reclassify = N, this is the location classification code for the To Location, the location to which you are moving this resource. If a Location Detail record already exists for the To Whse/To Location/Resource, the code in this field (if you do not enter one, it defaults to the From Classif) must match the code already assigned to it.

If this transaction changes the resource from being available for planning (Planning Availability defined for the location classification is 1 or 2) to not being available for planning (Planning Availability is 0), or vice-versa, the Re-Plan Flag for the resource is set to Y. This field is on Data Screen MIE18003 in Resource Master Maintenance.

* To Grade—grade of this resource at the To Location.

Rev Lvl—revision level of this resource at the To Location. The default value for a new location's revision level is the current revision level defined for the resource on Data Screen MIE18002 in Resource Master Maintenance.

Potency %—potency of this resource at the To Location, if this is a potent resource.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource.

PO #—purchase order number associated with this transaction. You would enter a PO number with each receipt from a vendor, for example. This field is required if one or more of the following are true, and not allowed if none of them are true:

(1) The From Location is blank.

(2) The To Location is blank.

(3) The transaction changes the resource from being "on order" to being "not on order," or vice-versa.

(4) The transaction is defined to require a PO number (through User-Defined Transaction Maintenance).

Conditions 1 and 2 cover the situations when you are receiving goods from or returning goods to a vendor. Condition 3 deals mainly with the peculiarities of your own system of location classifications.

Suppose you inspect materials immediately when they come in from a vendor. While in these inspection locations at your receiving dock, they are still considered "on order," because you reserve the right to reject them.

After they pass inspection, you need a transaction which acknowledges that they now belong to you, that they are no longer on order. You have to associate that transaction with a PO number, so that the system can record what quantity of the resource ordered on the PO is no longer on order (this quantity is often referred to as Received From On Order).

PO Rel #—If you enter a PO number with this transaction, you must also enter a release number. This field defaults to 1. When receiving goods ordered on two different releases of the same PO, it is best to enter two different transactions.

PO Comp Cd—If you are receiving the last of the goods ordered on a certain release of a purchase order, you can designate that release as "complete" by entering Y in this field. If you originally ordered 100, received 50, and cancelled the balance of the order, you can still call the release "complete" when the 50 are received.

Transaction Amt—ALLOWED only if one of the following is true:

(1) The transaction is moving the resource to a location that is not on order from a blank From Location. (In other words, you are receiving the resource from a vendor.)

(2) The transaction is moving the resource from a location that is on order to a location that is not on order, or vice-versa. This would happen if, for example, you receive resources from an inspection location (on order) to a stock location (on hand).

This field is REQUIRED if one of the above is true AND the transaction is defined to have transaction amount required. When you update a transaction that has a transaction amount, the historical average cost and the rolling average cost for the resource/warehouse are automatically recalculated. For more information on cost figures, see *RM Concepts*, Section B.

If you answer Y to the CH portion of tailoring question #T41, the system generates a default if you do not enter transaction amount. (In this case, the "required" field need not be entered by the operator, because the system "enters" it.) If this transaction has a PO number, the transaction amount defaults to quantity x unit price from the PO. If this transaction does not have a PO number, or if no unit price was entered with the PO, the transaction amount defaults to quantity x selected unit cost for the resource.

RPT 0—This Y/N field indicates whether you are reporting a transaction amount of zero. If the Transaction Amt field is zero, this field enables the system to distinguish between a transaction amount of zero and a transaction amount that has not been entered.

Picking Ovrd Seq #—picking override sequence number for this resource at the To Location.

For the remaining fields for entry on this screen, see "Common Fields," earlier in this section.

Fields for Display

The following information is for display only. To have it displayed when entering a new transaction, use the Verify field.

From Classif—location classification for this resource at the From Whse/Location.

If this transaction moves the resource from a location that is not on hand (or a blank location, since that would also not be on hand) to an on hand location, the only acceptable From Classif is the Required From Locn Classif Cd defined for the resource on Data Screen MIE18003 in Resource Master Maintenance (see Section 1-13). This restriction exists so that you can ensure that all resources required to be inspected are actually inspected (you make the Required From Locn Classif Cd your location classification code for inspection).

From Grade—grade of this resource at the From Whse/Location.

From Rev Lvl—revision level of this resource at the From Whse/Location.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed, with two fields allowing you to indicate whether the location information you enter is to be returned to the From Location or the To Location field. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the resource for this transaction, press CK11 to display the Alpha Search Inquiry Screen. This inquiry allows you to find the resource number you need using information you already have, such as a partial description. You can then select the correct resource number from a list and have the system return that number to this screen. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK15 NOTEBOOK—Select CK15 to switch to Notebook File Maintenance, to enter values for any extra fields defined for the Lot Master (LOTMAS) file, for the the To Lot Number. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

Issue To Schedules Screen—MIE44232

(See Figure 91)

The Issue To Schedules Screen is displayed when you select Option 3, Issue To Schedules, from the Transaction Selection Screen. This screen provides a list of the consumed resources reserved for a specified schedule but for which DI (direct issue) transactions are needed.

For each resource, the quantity reserved for but not yet issued to the schedule is displayed. You enter the quantity of each resource to be issued, and the system generates a DI (direct issue) transaction for that quantity.

The system-generated DI transactions require information that is not displayed or available for entry on this screen. These fields, such as transaction detail code and accounting group number, use the default values defined for them in the tailoring questionnaire. If you are not updating the DI transactions online (see UPDATE ONLINE, below), you can use the Transaction Review Screen to make changes to those fields after the system generates the DI transactions.

Fields for Entry

Use the following fields to indicate the schedule release for which you want to generate issue transactions. Then, press ENTER to display a list of the corresponding resources.

You can change the list of resources displayed on the screen simply by entering new schedule information and pressing ENTER again. If you do this while there is a Qty To Issue next to a resource, no DI transaction is created. The system just redisplays the screen with the new list of resources.

- * SCHEDULE—Enter the number of the schedule for which you want to display direct-issue resources.
- OLSN—If neither OLSN nor PM type/PM name combination is entered, this field defaults to 1, and the corresponding production model is retrieved.
- Release—defaults to 1.
- PM Type
- * PM Name—production model being run on this schedule release.
- Task—If you specify a task, then only the resources for that task are displayed. If you do not specify a task, the direct-issue resources for all tasks on the production model are included in the list.
- UPDATE ONLINE—available for entry only if the answer to tailoring question #T10 is Y. This field indicates whether the DI transactions generated from this screen are to be updated online or in batch. The default is from tailoring question #T11.

Fields for Display

The following information is displayed for each direct-issue resource on this schedule release or task. The only resources listed are those for which a portion of the reserved quantity has not yet been issued to the task.

- ° Resource
- Wh—warehouse for consumption of this resource.
- Location—location where this resource is reserved for this task.
- Task—task for which the resource is reserved.
- Qty Remaining—quantity of this resource reserved for this task but not yet issued to it. Qty Remaining = Qty Reserved - Qty Issued.
- Usr UM—unit of measure for the above quantity.

Field for Entry

Qty To Issue—For each resource listed, you can enter the quantity to be issued to that task, in the Usr UM. This quantity cannot be greater than the Qty Remaining, since this is all that is needed. You can also use CK13 to have the system calculate the quantities for you.

Command Function Keys

ENTER—Press ENTER after you first enter the schedule information at the top of the screen, to display the list of corresponding resources. After you enter quantities to issue for one or more resources, press ENTER to have the system generate the appropriate DI (direct issue) transactions. For a DI transaction to be generated, the Qty To Issue must be greater than zero.

CK01 SESSION STATUS—Press CK01 to display the Batch Status Screen, from which you can return to the Batch Selection Screen, the Transaction Selection Screen, or exit Transaction Entry.

CK13 GENERATE ISSUE QTYS—Press CK13 to have the system generate issue quantities for you. After you press CK13, this screen is redisplayed, and the Qty To Issue next to each resource matches the Qty Remaining for that resource. These quantities are not converted into DI transactions, however, until you press ENTER with those quantities in place.

CK19 RETURN TO TRANS SEL—Press CK19 to return to the Transaction Selection Screen without generating DI transactions for the resources currently displayed on the screen.

Issue To Shortages Screen—MIE44242

(See Figure 92)

When you are receiving a resource from a vendor (via user-defined transaction), and there is a shortage of that resource, a message is displayed. This message informs you of the shortage and instructs you to press CK10 to "issue to shortages." If you press CK10 while that message is displayed, the Issue To Shortages Screen is displayed.

This screen allows you to have the system generate DI transactions issuing the shortage resource to schedules that need it, immediately. A task on a schedule is defined to have a shortage of a resource if the quantity reserved for the task is less than the quantity allocated to it.

Note: When you press CK10 to display this screen, the transaction you were entering is updated online, regardless of whether the Update Online field says Y or N. This is because the resource must be received to a location before it can be issued to a schedule.

The system-generated DI transactions require information that is not displayed or available for entry on this screen.These fields, such as transaction detail code and accounting group number, use the default values defined for them in the tailoring questionnaire. This situation is different than the Issue To Schedules Screen, because the DI transactions must be updated online. This means that you cannot change the values in the defaulted fields.

Fields for Display

* Resource—shortage resource you were receiving on the Change Classification Transaction Screen.

UM—unit of measure entered with the receiving transaction.

Quantity—quantity of the shortage resource received.

For each task on a launched schedule that has a shortage of this resource, the following information is displayed.

- Schedule

Tp—PM type for this production model.

- PM Name—production model being run.

Rel—release number of this schedule.

Sts—status of the schedule release: LAU (launched) or RUN (running).

Task—task that has a shortage of this resource.

Shortage Qty—quantity allocated to (needed by) this task but not yet reserved.

Fields for Entry

Set Off Shortage—Enter Y to have the system change the Shortage Flag (on Data Screen MIE18002 in Resource Master Maintenance) back to N, indicating that there is no longer a shortage. You can do this whether or not you are using this screen to issue a quantity.

UPDATE ONLINE—available for entry only if the answer to tailoring question #T10 is Y. This field indicates whether the DI transactions generated from this screen are to be updated online or in batch. The default is from tailoring question #T11.

Qty To Issue—On each line, enter the quantity of the resource to be issued to that task. The total of these quantities cannot exceed the Quantity at the top of the screen, which is the quantity of the shortage resource being received. You do not have to issue the entire quantity being received.

Command Function Keys

ENTER—After entering quantities to issue to one or more tasks, press ENTER to have the system generate the appropriate DI (direct issue) transactions. For a DI transaction to be generated, the Qty To Issue must be greater than zero.

CK01 RETURN—Press CK01 to return to the screen from which you pressed CK10, without issuing the shortage resource to any tasks.

Batch Status Screen—MIE44222

(See Figure 93)

The Batch Status Screen can be displayed from almost any screen in Transaction Entry, simply by pressing CK01. This screen displays information about the transactions added to and changed in this batch during this Transaction Entry session, as well as all transactions in the batch. From this screen you can return to the Transaction Selection Screen or the Batch Selection Screen, or exit Transaction Entry.

Fields for Entry

Enter "R" To Return To Batch Selection—Enter R in this field and press ENTER, to return to the Batch Selection Screen.

Batch Status (S=Suspend, C=Close, +CK01)—When you press CK01 to exit Transaction Entry, this code determines whether the batch is suspended or closed. If you do not want the Transaction Batch Update program (see Section 8-4) run on this batch, enter S for suspended. Only closed batches can be used for the Transaction Batch Update. For more information on batch statuses, see Batch Selection Screen, above.

Fields for Display

Batch Number—number of the batch selected on the Batch Selection Screen.

Two sets of totals are displayed for this batch. The left-hand column are the totals for transactions added to this batch during this session. The right-hand totals are for all transactions in this batch. A "session" begins when you select a batch from the Batch Selection Screen, and ends when you press CK01 from this screen.

# of Sales Trans—number of SA transactions.

# of Scrap Trans—number of SC transactions.

# of Issue Trans—number of DI (direct issue), MI (miscellaneous issue), IP (issue to production), CC (calculated cost), theoretical consumption (TC), PC (pick complete), RT (return to production) transactions, and RS (return to stock) transactions.

# of Adjustment Trans—number of RA (resource adjustment), TR (transfer resource), RC (resource number change), IA (inventory adjustment), IM (indirect measurement), CA (cost adjustment), and MR (miscellaneous receipt) transactions.

# of Production Receipt Trans—number of PR (production receipt), TP (theoretical production), and ON (ongoing production) transactions.

# of Change Classification Trans—number of user-defined transactions.

# of Suspended Trans—number of suspended transactions (status S).

# of Updated Trans—number of updated transactions (status U).

# of Error Trans—number of error transactions (status E).

Total # of Transactions—total number of transactions added to this batch during this session and the total number in the batch.

Sales $—total amount of all SA (sales) transactions.

Total $ for All Trans—total transaction amount for all non-sales transactions added during this session and the total for the batch.

Command Function Keys

ENTER RETURN TO PREVIOUS SCREEN—Press ENTER to return to the screen from which you pressed CK01.

CK01 END JOB—Press CK01 to suspend or close the batch, depending on the code in the Batch Status field, and exit Transaction Entry.

CK13 PRINT BATCH—Press CK13 to print the Transaction Batch Report for this batch. This is the same as taking Option 3 from the Transaction Processing Menu (see Section 8-3), except that you cannot enter limits for the report. It is automatically printed for the batch already selected (the batch number shown on this screen).

CK19 RETURN TO SELECTION SCREEN—Press CK19 to return to the Transaction Selection Screen.

CK20 DELETE BATCH—Press CK20 to delete this batch. A message is displayed asking you to confirm the deletion by pressing CK20 again. When you do so, the batch is deleted, with the restrictions outlined in the description of the Batch Selection Screen.

SECTION XVI-III

When To Use Transaction Batch Update

When a transaction is "updated," the information from that transaction is used to adjust the data in various files, according to the activity represented by the transaction.

For example, when you enter a TR (transfer resource) transaction, moving a certain quantity of a resource from one location to another, the Location Detail (LOCDTL) file must be updated to reflect the change. The Quantity at Location for the From Whse/From Location/Resource must be REDUCED by that quantity (the resource is moving OUT of that location). Similarly, the Quantity at Location for the To Whse/To Location/Resource must be INCREASED by that quantity (the resource is moving INTO that location).

Use this option after closing a batch, to update any transactions in the batch that were not updated online and that are not suspended or error transactions. Each transaction has one of the following statuses, depending on whether it has been "edited" (checked for incorrect or inconsistent entries) and whether it has been updated:

U—UPDATED. A transaction with this status has been used to update the necessary files. When this occurs, a copy of the transaction is sent to the Transaction History (TRHIST) file.

P—PARTIALLY UPDATED. This occurs when a transaction that results in system-generated transactions, such as the PR (production receipt) transaction, is updated online, and the corresponding system-generated transactions are set to be updated in batch (see tailoring questions #T6-9). If the entered transaction has been updated but the system-generated transactions have not, the entered transaction is considered to be only partially updated. The Transaction Batch Update program updates the system-generated transactions.

S—SUSPENDED. When you "suspend" a transaction through Transaction Entry (see Section 8-2), you save the transaction without updating it and without having the system edit it. This allows you to stop entry in the middle of a transaction, and come back to it later without having to start all over again. Suspended transactions can never be updated.

E—ERROR. A transaction becomes an "error" transaction during an attempt at batch updating. In this case, a transaction that passed the screen edits during entry does not pass the same edits during batch update. Generally, this happens for one of two reasons:

(1) The data in your system changes between when the transaction is entered and when the update is attempted. For example, the location classification is valid when you enter the transaction. After you save it, that classification is changed from Activity Status A (active) to N (non-active). When you run the update, the location classification is invalid so the transaction becomes an error transaction.

(2) An error may be caused by the order in which transactions are updated. Each transaction is edited based on the data in your system at the time of the edit. Suppose transaction #40 receives a resource to a new location, and gives it a lot number of A123456. This transaction is saved for batch update, and it passes the screen edits. The next transaction in the same batch, #41, receives the same resource to the same location, and gives it a lot number of A111111. This also passes the edits, because no Location Detail record yet exists for the new warehouse/location/resource.

When you run the Transaction Batch Update for this batch, transaction #40 is updated first. At that time, a new Location Detail record is created for the warehouse/location/resource, with a lot number of A123456. Next, the system attempts to update transaction #41, receiving the same resource to the same location, with a lot number of A111111. This transaction does not pass the edits, because now (after the update of transaction #40) that location already exists, with a different lot number. Transaction #41 becomes an error transaction.

N—ENTERED BUT NOT UPDATED. This is a transaction that has been entered and has passed the edits, but has not yet been updated. This category includes any system-generated transactions caused by the partially updated transactions. Transactions with this status are updated by the Transaction Batch Update.

How To Use Transaction Batch Update

When you select Option 4 from the Transaction Processing Menu (MI80), the Batch Selection Screen is displayed. On this screen, enter the Selection Number and/or Batch Number for a batch whose status is CLOSED. Only CLOSED batches can be used for the Transaction Batch Update. To cancel the update, press CK01. To update ALL closed batches, press CK13.

When you press CK13 or select a batch and press ENTER, the Job Continuation Controller Screen (MZM02001) is displayed. On this screen, enter the letter corresponding to the method you want to use for running the update—batch (B), interactive (I), or job scheduler (S). To submit/start the job, press CK10. To cancel it, press CK01.

Transaction Entry Batch Update Register—MIE442

(See Figure 94A)

When the Transaction Batch Update is completed, this register is printed. It shows basic information about each transaction, along with each transaction's status after the update program was completed.

1. Trans #—transaction number.
2. Batch—batch number updated.
3. Trans Type—transaction type: PR, RA, CC, etc.
4. Date—date entered by the operator for this transaction.
5. Resource—If the transaction involves a From and a To Resource, the To Resource is printed. For stream resources, which have blank resource numbers, the word °STREAM is printed.
6. Whse—If this transaction involves a From and a To warehouse, the To Warehouse is printed.
7. UM—unit of measure entered with this transaction.
8. Quantity—transaction quantity.
9. Status—status of this transaction after the update was run. This is one of the following:

UPDATED—This transaction was entered, but not updated (status N) before the update was run. Its status changed from N to U (updated).

ALREADY UPDATED—This transaction had already been updated before the update was run.

SUSPENDED—Suspended transactions cannot be updated. This transaction was suspended (status S) before the update, and it still has the same status.

ERROR—This transaction had a status of N (entered but not updated) before the update. The update caused this to become an error transaction (status E).

SYSTEM UPDATED—This system-generated transaction (TC, CC, or TP) was updated by this run of the Transaction Batch Update. This occurs if you have partially updated transactions in the batch before you run the update.

At the end of the register:

10. Total # of Transactions—in the batch.

SECTION XVI-IV

MIE440

Batch Selection Program

A. This program allows the user to select a batch to be used by one of the three programs described below. This program loads the batch number of the selected batch into the GPLDA. The programs MIE442 and MIE444 then process the batch number stored in the GPLDA.

Screens

MIE44001—Batch Selection Screen

Selection Screen—MIE44001

The Batch Selection Screen is a separate program which is called from:

A. Transaction Entry
B. Transaction Update (the menu option)
C. Batch List Report The Batch Selection Screen is the only screen displayed. It shows the status of each of the data entry batches and permits the user to select a batch. This screen also shows the batch number, total number of transactions, total number of suspended transactions, total number of updated transactions, total number of partial transactions, total number of error transactions, the last workstation to use the batch, and the batch status.

The shift number and operator initials are also entry fields. They are only available if the program is called from the Transaction Entry program. These fields are used as session defaults for each transaction entry screen.

A batch has one of the following statuses:

IN USE:

The batch has this status when a workstation is using this batch. A batch with this status cannot be selected for entry unless the workstation number is the same as the original workstation number. A batch with this status cannot be selected for update.

SUSPENDED:

A batch with this status can be selected for entry. The workstation number DOES NOT have to match that of the original user. A suspended batch CANNOT be selected for batch update.

CLOSED:

A batch with a closed status CAN be selected for entry and batch update.

FINISHED:

A batch with a finished status CANNOT be selected for entry or batch update.

DELETED:

The batch has this status when an operator selects CK20 from the batch selection screen. A batch with this status CANNOT be selected for entry or update.

The following chart displays the valid statuses:

| Calling Program | Parm | Valid Statuses |
|---|---|---|
| Transaction Entry | E | Closed, Suspended, In Use (for entry), Closed, Suspended, Finished (for deletions) |
| Batch Update | U | Closed |
| Batch List Report | U | Closed |
| Batch List Report | — | Closed, Suspended Finished |

Only batches with a status of Suspended, Finished, or Closed can be selected for deletion. When a batch is deleted, all transactions are deleted except updated and partially updated transactions. CK20 must be pressed twice to delete a batch. The first time it is selected, a message is displayed asking for confirmation. The second time CK20 is taken, the record(s) are deleted.

If a batch is selected for deletion and it contains partially updated records, those records (and any updated records) are not deleted and the batch status is left at C (Closed). If a batch is selected for deletion and it contains updated records, and no partially updated records, those records are not deleted and the batch status is set to F. (Finished).

Display-Only Fields:

Selection Number
Batch Number
Batch Status
Number Of Updated Transactions
Number Of Suspended Transactions
Number Of Error Transactions
Number Of Partial Transactions
Number Of Total Transactions
Last Workstation Entry Fields:

Selection Number
Batch Number
Operator's Initial (when called from Transaction Entry)
Shift (when called from Transaction Entry)

Required Fields:

Selection Number and/or
Batch Number

Edits:

Selection Number or Batch Number is required.
If entered, the Selection Number must be valid.
If entered, the Batch Number must be valid.
If both Selection Number and Batch Number are entered, they must correspond.
If the calling program is Batch Update, the only valid status is closed.
If the calling program is Transaction Entry and the user is not selecting CK20 to delete, the only valid statuses are closed and suspended. If the workstation in the GPLDA equals the last workstation in the TRCTRL then an In Use status is valid.

If CK20 is selected and the calling program is the Batch List Report, the only valid statuses are Closed, Suspended, and Finished If the calling program is Batch List Report, the only invalid statuses is In Use, Update Active, and Deleted.

CK20 is only valid when the calling program is Transaction Entry.

If starting a new batch the Batch Number field must be blank.

If the calling program is Transaction Entry then selection number 1 (start a new batch) cannot be deleted.

Command Keys (Display):

| | |
|---|---|
| CK01 | End Job |
| CK18 | Refresh the Screen |
| CK20 | Delete a Batch (when called from Trans Entry) |

Command Keys (Non-Display):

| | |
|---|---|
| CK07 | Send Message To Action List |
| CK17 | Error Message Override |
| HELP | Help Text |

B.

| File | Usage |
|---|---|
| ERRMSG | IF |
| MIE440FM | CF |
| TALFLI | UF |
| TRCTRL | UF |
| TREBAT | UF |

C.

| File Name | Field Name | Description |
|---|---|---|
| TALFLI | TANBAT | Next Available Batch Number |

D.

| Field Name | Position From | To | Description |
|---|---|---|---|
| GPBATN | 353 | 355 | Batch Number |
| GPINIT | 356 | 356 | Operator's Initials |
| GPSHFN | 359 | 360 | Shift |
| GPCNCL | 1701 | 1701 | Cancel Code |
| GPWSID | 1801 | 1810 | Workstation ID |
| $USRPF | 1811 | 1820 | User Profile |
| $USER | 1891 | 1891 | Date Format Code |

MIE442X

Transaction Entry CL Program

A. The Transaction Entry CL program performs the following functions:

a. calls the batch selection program;
b. performs file overrides;
c. sets on U1, sets off U2;
d. calls MIE442;
e. deletes file overrides;
f. returns to calling program.

The CL program performs an OVRDBF of the display file shared between MIE442 and MIE444. The OVRDBF is used to change the file attribute to SHARE(YES). By doing this, the files do not have to be opened and closed each time MIE442 or MIE444 is called. Therefore, the OVRDBF command reduces the response time required to initiate the called program from within the calling program.

*Important:*

The use of the shared file in the called program RESETs any subfile pointers. So, if the called program performs a CHAIN, when control returns back to the calling program, a READ retrieves the record after the last record read in the called program. It does not retrieve the record after the last record read in the calling program. All file overrides are deleted at the end of the CL program.

---

The CL program calls MIE442. Note: Program MIE444 is called from within MIE442 and NOT by the CL program. After the Transaction Type Selection screen is displayed, the operator selects a transaction type to be entered. MIE442 compares the transaction type selected with the list of transaction types handled by this program.

If the transaction type does not match those transaction types handled in MIE442, MIE444 is called. When program MIE444 is called a parameter is passed. This parameter equals the Transaction Type that was selected for entry.

MIE442 & MIE444

Transaction Entry

A. The general program flow for Transaction Entry is:
   1) Select Transaction Entry from the Transaction Menu (MI80).
   2) Select the batch from the Batch Selection Screen.
   3) Select the transaction to be processed from the Transaction Type Selection Menu.
   4) Enter the transaction.
   5) The Batch Status Screen is displayed when CK01 is pressed from the Transaction Type Menu or any of the individual transaction screens.

Transaction Entry consists of 3 programs: MIE440, MIE442, and MIE444. MIE440 is the Batch Selection Screen for Transaction Entry. MIE442 and MIE444 allow the entry and processing of the transactions. There is only one display file (MIE442FM) which is shared by both MIE442 and MIE444. The passage of information between the two programs is done with the use of parameters and the GPLDA.

Each of the above transaction programs (with the exception of MIE440) contains the edit subroutines and update subroutines for the transaction types processed by that particular program. These same programs (MIE442 and MIE444) are also called when the Transaction Update menu option is selected.

The Transaction Entry CL program (MIE442X) sets on U1 and sets off U2. (The Transaction Update CL program sets off U1 and sets on U2.) These U-switches are used in MIE442 and MIE444 to determine what file is to be used as the input file. When U1 is ON, the input file is the Transaction Entry Screen (MIE442FM). When U2 is ON, the input file is the Transaction Entry Batch File (TREBAT).

By using the same programs for transaction entry as well as transaction update, the problem of inconsistencies in editing and updating are eliminated. Also, if any changes have to be made, they are isolated to one program (either MIE442 or MIE444).

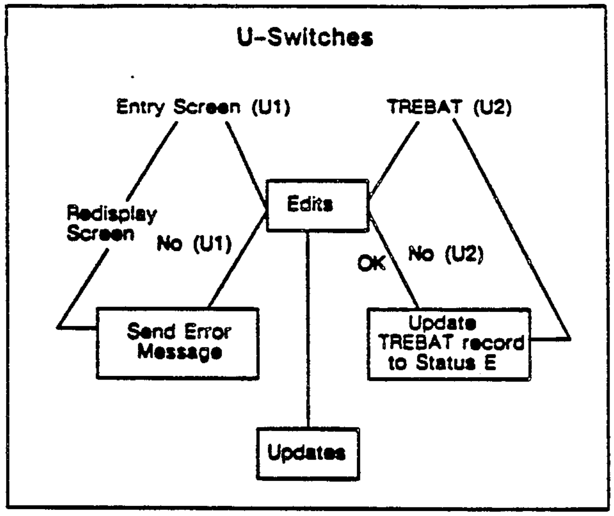

The CL program does not call MIE444. This program is only called from MIE442.

When this program is called, it is passed seven parameters, which are listed below:

1. Transaction Type
2. Transaction Number
3. Batch Number
4. Relative Record Number Of Review Subfile
5. Issue to Shortage Resource Number
6. Issue to Shortage Quantity
7. Issue to Shortage byte The first parameter is analyzed and the corresponding entry screen is displayed. The second and third parameters are only used when an existing transaction has been selected for maintenance (either by paging or from the Transaction Review Screen). If both parameters are not equal to zero, the program CHAINs to the Transaction Entry Batch file (TREBAT) to extract the existing information for the batch number/transaction number being maintained. After the CHAIN is complete, the appropriate entry screen is displayed with the existing information.

The fourth parameter is used when a transaction, which is processed by MIE444, is selected from the Transaction Review Screen. It passes the relative record number of the selected subfile record. The fifth, sixth, and seventh parameters are passed when a shortage condition exists. The fifth is the resource number for the shortage. The sixth is the quantity and the seventh parameter is a byte which is equal to Y when there is a shortage condition.

When the operator presses CK01 from an individual entry screen, the Session Status Screen is displayed from this program and then returns to MIE442.

• *Shared Files:*

Programs MIE442 and MIE444 share one display file and pass screens between programs. This increases operator response time.

Both programs use exactly the same display file (MIE442FM). All screens are displayed in one display file. This file is then shared by the two programs. The first program can leave the screen displayed, and the second program can read it. Then the second program can display a screen, and the first program can read it.

To make the display file a shared file, the CL program must:

OVRDSPF MIE442FM MIE442FM SHARE (*YES)

MIE442 is the controlling program and is called first. When a request is made to process a transaction in MIE444, MIE442 performs a WRITE operation to the entry screen for that transaction. It then calls MIE444. MIE444 does a READ operation to that screen and does the processing. When the user makes a request that is handled by MIE442, MIE444 executes a WRITE operation to that screen and uses the RETRN operation to return control to MIE442 without setting on LR.

Then, MIE442 can perform a READ operation to read the screen and do the processing. When the user tries to end the whole program then the CL program performs a RCLRSC (reclaim resource). This must be done so that all files and data areas are closed and unlocked.

• *Verify And Duplicate Options:*

The verify byte is used to redisplay the entry screen after the system defaults have been loaded. For example, if the operator was entering a miscellaneous receipt transaction, the transaction amount defaults to (Quantity x Selected Unit Cost). So, if the verify byte was set to Y, the screen is redisplayed with all the entered information and with the system default for the transaction amount.

The duplicate byte is used if the operator is entering many transactions with similar information. This byte prevents the entry screen from being cleared between transactions.

The verify and duplicate bytes are options on all entry screens. The default for each is N. Once the operator changes the verify byte or duplicate byte to Y, the byte remains Y until the operator changes it back to N.

When the verify byte is set to Y, the value changes as follows. When the transaction is being entered, the byte is Y. After the operator presses ENTER, the transaction defaults are displayed and the byte is set to N. After the operator presses ENTER again, the transaction is updated, and the verify byte is set back to Y for the start of the next transaction.

• *Online Versus Batch Update:*

The transactions can be processed either online or in batch. However, both processes use the same coding. The only major difference between the two is the time when the coding is executed.

The system can be tailored for online or batch update. If online updating is selected, all files are updated at the time the transaction is entered (with the exception of suspended transactions). If the system is tailored for batch update, the only files updated at the time of transaction entry are:

TREBAT—Transaction Entry Detail File
TRCTRL—Transaction Entry Control File
TRECOM—Transaction Comment File If the system is tailored for batch entry, the operator selects a different menu option to update a batch. When this update option is selected, the user selects which batch to update or to update all batches.

When the update option is selected, the entry program is called with indicator U2 set on. This signals the entry/update program to read the input from the TREBAT file instead of the screen. When the transaction entry option is selected, the program is called with indicator U1 set on. And again, this signals the entry/update program to read the input from the screen instead of the TREBAT file. By using the same program for entry and update, any inconsistencies with updating are avoided.

Once a transaction has been successfully updated, the transaction status code in TREBAT is set to U, and a record is written to TRHIST.

- *Suspended Transactions:*

The operator can select to suspend a transactions. If this is done, the only files updated at the time of transaction entry are:

TRCTRL—Transaction Entry Control File
TREBAT—Transaction Entry Detail File
TRECOM—Transaction Comment File When a transaction is entered as suspended, NO EDITS are done. The reason for entering a suspended transaction is either to delay file updates or because more information is needed on that transaction before it can be entered. In this way, the user can enter an incomplete transaction.

After the needed information is found, or when the operator decides the transaction is updated, the operator can release the transaction. After the suspended transaction is released and the system is tailored for online update, the files are immediately updated. If the transaction is released and the system is tailored for batch update, the suspended transaction is changed from a code S to a code N (entered). When the batch is selected for update, the transaction is processed.

- *Transaction Status Codes:*

The following is a list of Transaction Status Codes:

N = Transaction has been entered but not updated.
S = Suspended
U = Updated
P = Partially Updated (Updated but not theoretically consumed)
E = Error When a transaction has been successfully updated, the status is set to U. The transaction status cannot be U unless all system-generated transactions (if any) for this resource have also been updated.

The partially updated status code is only valid for transaction types that cause the system to generate transactions. This status occurs when one of these transaction types are entered, and it is defined to be updated in online, but theoretical consumption is defined to be updated in batch. The transaction types are:

PR—Production Receipt
PC—Pick Complete
ON—On-Going Production
SC—Scrap transaction (for a produced resource only).

A tailoring question for each of these transaction types asks:

a. Should the ENTERED transaction be updated online or in batch?
b. Should the GENERATED transaction be updated online or in batch?

(Note: The answer to "a" cannot be batch if "b" is online.)

The Error status occurs only when a batch update is run. For example, suppose a receipt transaction is entered for:

Resource = A
Warehouse = 1
Location = STOCK1
Grade = A

Then, another transaction was entered for:

Resource = A
Warehouse = 1
Location = STOCK1
Grade = B

The transaction passes the edits during transaction entry. However, during the update, the first transaction is updated, but the second transaction is not because there is already a record with a different grade in LOCDTL. (Different grades of the same resource are not allowed at the same location.) Therefore, a record is written to TREBAT as an error transaction, but none of the other files are changed.

*Important:*

The error occurs during the edit part of batch update. This means that none of the updates are done for the transaction. Also, during batch update, all overridable messages are overridden. Since the error from the example above (mixing the grades) is an overridable message, the transaction does not end in error.

The user can select a different option to review all error transactions. When this option is selected, the transaction can be maintained, and the status is reset to N (unless the transaction was updated online, in which case the status is set to U). When the next update is run, that transaction is processed again. If all edits are passed the transaction is updated.

• *General Rules For Unit Of Measure Defaulting:*

1. If the transaction is moving a resource OUT of a location, the UM defaults to the last received UM from the Location Detail record (LOCDTL) of the FROM location.
2. If the transaction is receiving a resource INTO location, that has an existing Location Detail record (LOCDTL), the UM defaults to the last received UM at the TO location.
3. If the transaction is receiving a resource INTO a location that does not have an existing LOCDTL record, the UM defaults to the standard UM for the resource (defined in RESMST).

• *Potency Factors:*

When a transaction is entered for a potent resource, the operator enters the physical quantity not the potent unit quantity. The Transaction Entry program converts the physical quantity of the transaction to the standard UM, then applies the potency to the physical quantity in standard UM. All file quantities are stored in standard UM and updated using the potent unit quantity with the exception of the quantity in last received UM in LOCDTL. The Quantity in last received UM in LOCDTL is updated using the physical quantity in the receiving UM.

For example:

Resource A has a standard UM of pounds (lbs).

UM CONVERSION 10 gallon—.5 lbs
50 gallons—2 lbs
100 gallons—5 lbs
200 gallons—15 lbs
300 gallons—30 lbs To convert Resource Qty UM to Location Potency:

Receipt Transaction #1 = 100 gal of Res A to Loc1 with potency factor of 10 %.

Potent Units = Transaction Quantity x Transaction Potency Factor

Quantity in the Standard UM for 100 gls is 5 lbs. (See UM conversion table above.)

Now the potency is applied:

The potent unit quantity is equal to 0.5 (5 X .1).

During conversion of user unit of measure to standard unit of measure, the Physical Quantity is used, not the Potent Unit Quantity. The UMCONV records are always entered based on the Potent Unit Quantity, if potency applies.

Now, the files are updated:

*LOCDTL:*

Quantity in Standard UM = .5
Standard UM = pounds
Quantity in Last Received UM = 100
Last Received UM = gallons
Potency factor = .10

*RESBAL:*

Quantity present = .5

In the above example, only the Location Detail and the Resource Balance files are updated. This is only for the purpose of the example. During an actual transaction, many more files are updated. (For example, if a Lot Number was entered on the transaction, the LOTMAS file would also have to be updated. If a PO was entered on the transaction, the PODETL file would also have to be updated. All files quantities are in standard UM and use the same quantity to update as the RESBAL record used to update Quantity in Standard UM).

Suppose another receipt to that location is made:

Receipt Transaction #2 = 200 gal. of Res A to Loc1 with potency factor of 15%.

Then, the program must:

a. Convert the Quantity to the standard UM. The quantity in the standard UM for this transaction would equal 15 lbs. See UM conversion chart above using 200 gallons.
b. Calculate the Potent Unit Quantity for this transaction. See potent unit formula above. For the next transaction, the Potent Unit Quantity would be 2.25 lbs.(15 x .15).

c. Calculate Quantity at the Location in standard UM by adding the Quantity calculated in step "b" above to the existing Quantity at the Location. This equals .5 lbs + 2.25 lbs = 2.75 lbs.

d. Calculate the Quantity at Location in last received UM by adding the Transaction Quantity to the existing Quantity at Location in last received UM. The receiving UM of this transaction might not be the same as the last received UM. If they are not the same, the existing Quantity at the Location in last received UM, must be converted to the new last received UM (the trans UM), then added to the transaction quantity. In this example, the Quantity in last received UM is 300 (100 gallons + 200 gallons).

e. If a receipt is performed to an existing location (meaning there is an existing LOCDTL record), the Potency Factor at the location must be recalculated.

Formula for Calculating the New Potency Factor

$$\frac{(\text{Prev Qty in user UM}) \times (\text{Prev Potency}) + (\text{Trans Qty in user UM}) \times (\text{Trans Potency})}{(\text{Prev Qty in user UM}) + (\text{Trans Qty in user UM})}$$

The new Potency Factor in this example is:

$$\frac{\{(100) \times .10) + (200 \times .5)\}}{100 + 200} = \frac{10 + 30}{300} = .13333$$

File Updates:

*LOCDTL:*

Quantity In Standard UM = 2.75 (.5 + 2.25)
Standard UM = pounds
Quantity in Last Received UM = 300 (100 + 200)
Last Received UM = gallons
Potency Factor = .13333 (See new potency calculation above.)

*RESBAL:*

Quantity present = 2.75 (.5 + 2.25)

- *Assigning A Transaction Number:*

1. The next available transaction number is stored in the tailoring file. Each time a transaction is written to the TREBAT file the following occurs:
   a. CHAIN to tailoring to find the next available transaction number.
   b. CHAIN to the TREBAT file and the TRHIST file using the next available transaction number, to verify that the transaction number has not already been used. If either of the CHAINs are successful, the transaction number is invalid. If the transaction number is invalid, one (1) is added to the next available transaction number and that transaction number is edited against TREBAT and TRHIST. This process of adding 1 and editing continues until a valid transaction number is found.

c. Using that transaction number, the TREBAT file is written.
d. One (1) is added to the transaction number used. In the Tailoring file, the next available transaction number is updated.

◦ *Shelf Life Date:*

Three tailoring questions determine how to calculate the Shelf Life Date. These questions are:

1. When processing a transaction, if both the From Location and the to Location are specified and the To Location is an existing location, should the Shelf Life Expiration Date be:

A. the earliest date (between the two locations);
   B. the latest date (between the two locations);
   C. the date of the From Location;
   D. not changed at all;
   E. Transaction Date plus Shelf Life Days?

2. If doing a transaction and the From Location is not specified and the To Location is specified, should the Shelf Life be:

A. the Transaction Date plus Number of Shelf Life Days;
   B. the To Location Date?

However, if the To Location is a new location, always use the Transaction Date plus the Number of Shelf Life Days.

3. If processing a transaction and the From Location and the TO Location are specified, and the To Location is a new location, should the Shelf Life be:

A. the Transaction Date plus Number of Shelf Life Days;
   B. the FROM Location date?

• *Generating Lot Numbers:*

A tailoring question determines whether the system generates lot numbers. If the response to that question is YES, a second tailoring question determines how to generate the lot numbers. The possible methods of generating lot numbers are:

1. Julian/sequential number
2. Year/sequential number
3. Year/month/sequential number
4. Julian If the system is tailored to generate lot numbers, the only time the system generates a lot number for a transaction is if the following conditions are true:

a. The resource is defined as having lot tracking active.
b. The To Location has a classification code that specifies lot tracking is active.
c. The transaction is a:
   Change Classification
   Miscellaneous Receipt
   Transfer Resource
   Production Receipt
   Resource Adjustment—produced resource only
   Theoretical Production
d. No LOCDTL record exists for the To Location.

The Sequential Number field (Next Sequential Number to Use When Generating Lot Numbers) that is used to generate the lot numbers is stored in the Tailoring file. When generating a lot number, if the sequential number method is being used, a CHAIN is done to Tailoring for the sequential number. After the transaction is entered into the TREBAT file, Next Sequential Number field is increased in the Tailoring file.

• *Receipt Tickets:*

Receipt tickets are printed as a result of two types of transactions: a Production Receipt transaction or a Change Classification transaction that has a purchase order number.

Two tailoring questions affect receipt tickets. They are:

1. Should receipt tickets print for a production receipt transaction?
2. Should receipt tickets be printed for each Change Classification transaction that has a PO Number?

• *Display Location Prompt:*

This screen displays the meaning of each part of the location number, as defined in tailoring. It can be accessed by selecting CK04 from any entry screen where Location Number is available for entry. This program checks tailoring then displays the location number breakdown.

For example:

| *Location #* | *Breakdown* |
|---|---|
| Position 1 | Warehouse |
| Position 2 | Warehouse |
| Position 3 | Location |
| Position 4 | Location |
| Position 5 | Location |
| Position 6 | Location |
| Position 7 | Shelf |
| Position 8 | Bin |
| Position 9 | Blanks |
| Position 10 | Blanks |

• *Override Accounting Group Number:*

This program is called by selecting CK12 from any transaction entry screen, but ONLY if the Costing module is installed. A byte in the LDA that determines if the Costing module is installed.

Pressing CK04 calls a Costing module program. If the program does not exist, an error message is displayed. If the program exists, the Costing program is called. It allows the operator to enter each accounting number overridden along with the debits and credits that correspond to that account number.

• *Selected For Next Cycle Count Byte:*

If a transaction is entered that reduces the Total Quantity Present at a Location to less than zero, a tailoring question determines if the resource should be selected for the next cycle count. If the system is tailored to select resources with negative balances for a cycle count and the transaction reduced the quantity to less than zero, the Selected for Next Cycle Count field in RESBAL is set to Y.

The tailoring question is:

Should resources that have a negative balance automatically be selected for a cycle count (Y/N) ?

- *Transaction Categories:*

All transactions are divided into six categories: Sales, Scrap, Issues, Adjustments, Production Receipts, and Change Classifications.

SALES includes the SA transaction.

SCRAP includes the SC transaction.

ISSUE includes the following transactions:

Direct Issue (DI)
Miscellaneous Issue (MI)
Issue to Production (IP)
Calculated Cost (CC)
Theoretical Consumption (TC)
Pick Complete (PC)
Return to Stock (RS) (the opposite of a direct issue)

ADJUSTMENTS include the following transactions:

Resource Adjustment (RA)
Transfer Resource (TR)
Resource Number Change (RC)
Inventory Adjustment (IA)
Indirect Measurement (IM)
Cost Adjustment (CA)
Miscellaneous Receipt (MR)

PRODUCTION RECEIPT includes the following transactions:

Production Receipt (PR)
Theoretical Production (TP)
Return to Production (RT)
On Going Production Receipt (ON)

CHANGE CLASSIFICATION includes all user-defined transaction types.

The transactions processed by both MIE442 and MIE444 are:

SA—Sales
RA—Resource Adjustment
TR—Transfer Resource
PR—Production Receipt
DI—Direct Issue
RC—Resource Number Change
SC—Scrap Transaction
MI—Miscellaneous Issue
MR—Miscellaneous Receipt
IA—Inventory Adjustments
PC—Pick Complete
IM—Indirect Measurement
RT—Return to Production
ON—On Going Production
RS—Return to Stock
IP—Issue to Production (used for calculated cost resources)
CA—Cost Adjustment System-generated transactions:

TC—Theoretical Consumption
TP—Theoretical Production
CC—Calculated Cost

The cycle count transactions are generated by the cycle count entry program (MIE360).

CY—Cycle Count Adjustment

MIE442 processes the following transactions:

CA—Cost Adjustment
IA—Inventory Adjustment
IM—Indirect Measurement
IP—Issue to Production
MI—Miscellaneous Issue
MR—Miscellaneous Receipt
RC—Resource Number Change
SA—Sales
TR—Transfer Resource
Change Classification Review Transactions MIE444 processes the following transactions:

DI—Direct Issue
ON—On Going Production
PC—Pick Complete
PR—Production Receipt
RA—Resource Adjustment
RS—Return to Stock
RT—Return to Production
SC—Scrap
Issue to Schedules
Issue to Shortages
CC—Cycle Count
TC—Theoretical Consumption
TP—Theoretical Production

Screens

MIE44201—Resource Adjustment
MIE44202—Scrap
MIE44203—Direct Issue
MIE44204—Pick Complete
MIE44205—Production Receipt
MIE44206—On Going Production
MIE44207—Return to Production
MIE44208—Return to Stock
MIE44209—Sales
MIE44210—Transfer Resource
MIE44211—Resource Number Change
MIE44212—Miscellaneous Issue
MIE44213—Miscellaneous Receipt
MIE44214—Inventory Adjustment
MIE44215—Indirect Measurement
MIE44216—Issue to Production
MIE44217—Cost Adjustment
MIE44218—Transaction Type Selection Screen
MIE44219—Subfile for Review Transactions
MIE44220—Review Transactions
MIE44221—Command Keys for Review Transactions
MIE44222—Batch Status Screen
MIE44223—Subfile for Transaction Comment Entry and Review
MIE44224—Transaction Comment Entry and Review
MIE44225—Command Keys for Transaction Comment Entry and Review MIE44226—Subfile for Transaction Detail Code
MIE44227—Transaction Detail Code
MIE44228—Command Keys for Transaction Detail Code
MIE44229—Change Classification
MIE44231—Subfile for Issue to Schedules
MIE44232—Issue to Schedules
MIE44233—Command Keys for Issue to Schedules
MIE44241—Subfile for Issue to Shortages
MIE44242—Issue to Shortages
MIE44243—Command Keys for Issue to Shortages ∘ *Individual Transaction Edits And Updates:*

The following are common methods of processing the transactions.

For any transaction that allows the entry of the date and time, the defaults are the current system date and time. The current date is displayed as a default, but the current time is not displayed. If the user does not enter a time, the system generates the current time.

The user profile is checked to determine if the user is authorized for the transaction type. To do this, a CHAIN is done to the TRNSEC file with this user profile/transaction type. If the CHAIN is successful, the user is authorized to this transaction. If the CHAIN is not successful, a record in the TRNSEC file is checked for a blank user profile and the selected transaction type. If such a record exists in the TRNSEC file, all users are authorized for this transaction type.

If a Transaction Detail code is entered, a CHAIN is done to the TRDTCD file, using Transaction Detail Code and transaction type. If it does not exist, a CHAIN is done to TRDTCD with a blank Transaction Type. Any Transaction Detail Code with a blank Transaction Type is valid for all transaction types. If the CHAIN fails, a message is displayed.

The Last Period Close field is stored in Tailoring. This program checks the entered year and period. If the entered Year/Period is less than the Tailoring Year/Period, then the entered period number has already been closed and, therefore, it is invalid.

If the operator did not specify an accounting group number, a CHAIN to the TRDTCD file is made. If the file contains an accounting group number, that number is used as the default. If TRDTCD is blank, Tailoring is checked for a default.

On various transaction screens, there are miscellaneous fields. The user-entered miscellaneous field update only the TRHIST file. (The miscellaneous fields in RESMST are different fields.) For ease of entry, required fields are placed on the top of the screen. Fields which do not have defaults, but are important, or frequently used, are placed on the second line.

The user can select to SUSPEND transactions. If this option is selected, no edits are performed. The only files that are updated are TRCTRL, TREBAT, and TRCOMM. In addition, no theoretical consumption transactions are generated. Those transactions are generated at the time the suspended transaction is updated.

If the transaction is for a potent resource, special considerations must be taken into account. For more information, see the *Potency* section above.

When a transaction generating the system transactions TC and CC is performed, the theoretical consumption subroutine is executed. The updates described with that transaction's description are only the updates for the received resource. All the updates for the theoretically consumed or produced resources are described under the description of *Theoretical Consumption* below.

A tailoring question determines if the these transactions are updated online or in batch. Another tailoring question determines if the system-generated transactions are updated in batch or online. The tailoring responses to these questions serve as a default. Run time overrides are available. System-generated transactions cannot be updated online if the other transaction is updated in batch.

• *Selecting A Schedule:*

For any transaction where the user can enter a schedule, if the user enters only the Schedule Number, the OLSN and Release Number default to one. If user enters Schedule, Release Number, PM Type and PM Name, the system finds the corresponding OLSN for that PM Type/PM Name on that Schedule/Release Number. If Schedule/OLSN/Release/PM Type/PM Name are all entered, the PM Name and PM Type must match the PM Name and PM Type defined in RMODEL for the Schedule/OLSN/Release.

The following files are updated even if this is NOT online updating for each of the transactions in MIE442 and MIE444 with the exception of CC, TC, and TP.

*TRCTRL*:

Number of Suspended Transactions
Number of Updated Transactions
Number of Error Transactions
Total Number of Transactions Entered

*TREBAT:*

All Entry Fields
Source Byte:
M = through a Marcam program
U = through a user program The unit cost and the extended cost are not updated for a CA, IM, or SA transaction. Also, when updating for a RC transaction, the resource used for the CHAIN to RESMST is the FROM resource.

Unit Cost—Selected Unit Cost for this resource
Extended Cost—(Qty x Selected Unit Cost)

*TRCOMM*:

All Transaction Comments

• *Theoretical Consumption:*

Theoretical consumption can occur during a production receipt, scrap transaction for a produced resource, or an on going production transaction.

Three types of transactions can be generated:

TC = Theoretical Consumption Transaction
TP = Theoretical Production Transaction
CC = Calculated Cost Transaction Theoretical consumption stops at the first task that has a NON-REPORTABLE STREAM RESOURCE except the last task (meaning the task that has initiated theoretical consumption). There can only be one non-reportable produced resource on a Schedule/OLSN/Rel/Task not including the stream resource. The non-reportable resource is theoretically produced.

Theoretical consumption transactions for the stream resource of a task are generated when that task is reported. If the stream resource was defined as non-reportable, theoretical production transactions for the stream resource are also generated.

If theoretical consumption is done through a task that has a current status of launched, the Task Status is set to Running. A task is usually assigned a status of Running when a direct issue transaction is performed on the task. Since a theoretical consumption transaction is essentially the same as a direct issue, the task status must also be updated when theoretical consumption transactions are generated for that task and if the task status is presently launched.

• *Processing Steps for Theoretical Consumption:*

A. The number of batches run is calculated.
B. The theoretical ratio is calculated.
C. The first/next theoretically consumed or calculated cost resource for this Schedule/OLSN/Release is found.

When reading the RMRESR records for the task, the stream resource record (the resource of the RMRESR record equals blanks) is also processed. When the stream resource record is read, the reportable/non-reportable byte is checked. If the stream resource is non-reportable, two transactions are generated for that resource. The transactions that are generated are:

a. one (1) theoretical consumption (TC);
b. one (1) theoretical production (TP).

Each system-generated transaction has a new transaction number. Each time a transaction is generated the transaction number is incremented by one.

Each system-generated transaction has a tailoring default value for:

a. Transaction Detail Code;
b. Accounting Group Number.

Each system-generated transaction uses the Schedule/OLSN/Release that was entered on the original transaction. The original transaction was either a PR transaction, an ON transaction, or an SC transaction. The exception to this rule are transactions generated from superflush which have a different OLSN. (See the *Superflushing* section below.)

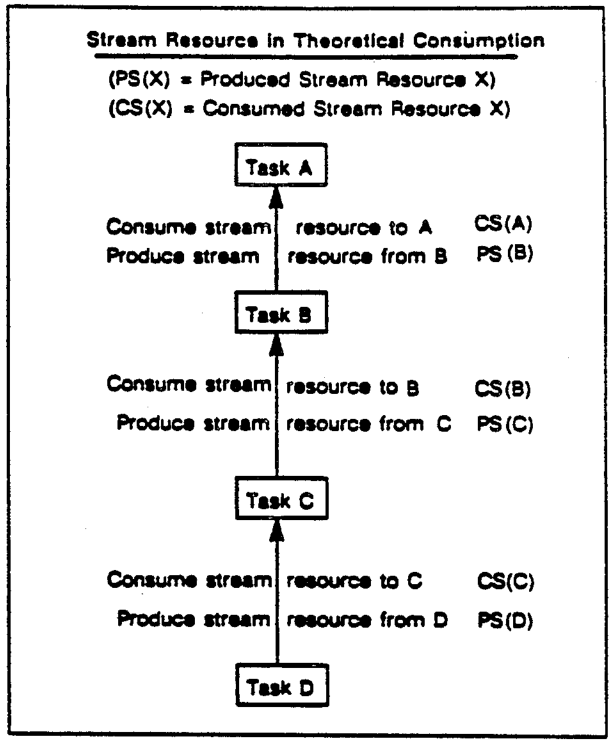

Example:

1. If a transaction is reported out of Task A and PS(B) is reportable, then:

All TCs and CCs out of Task A are generated.

TP for any non-reportable prod resource on Task A is generated.

TC for CS(A) is generated.

2. If a transaction is reported out of Task A, PS(B) is non-reportable and PS(C) is reportable, then:

All TCs and CCs out of Task A are generated.

TP for any non-reportable produced resource on Task A is generated.

TC for CS(A) is generated.

TP for PS(B) is generated.

All TCs and CCs out of Task B are generated.

TP for any non-reportable produced on Task B is generated.

TC for CS(B) is generated.

3. If an ON transaction is reported out of Task B, PS(B) is reportable and PS(C) out of Task C is reportable, then:

All TCs and CCs out of Task B are generated.

TP for any non-reportable produced resource on Task B is generated.

TC for CS(B) is generated.

4. If a PR transaction is reported out of Task B, PS(B) is reportable and PS(C) out of Task C is reportable, then:

All TCs and CCs out of Task B are generated.

TP for any non-reportable produced resource on Task B is generated.

TP for PS(B) is generated.

TC for CS(B) is generated.

5. If a PR transaction is reported out of Task B, PS(B) is non-reportable and PS(C) out of Task C is reportable, then:

All TCs and CCs out of Task B are generated.

TP for any non-reportable produced resource on Task B is generated.

TC for CS(B) is generated.

D. The quantity theoretically consumed for this resource is calculated. If the resource is a non-balance resource, locations are not checked and superflushing is not performed. These type of resources do not exist in locations. If the resource is a non-balance resource, then only RESBAL, RMRESR, and TRHIST are updated.

E. The location for consumption is found.

F. UPDATE1—Consumed resource updates are done:
   a. A TC or CC transaction is written to TRHIST.
   b. RESBAL, LOCDTL, RMRESR, and possibly RESRES, and LOTMAS are updated.
   c. If the Task Status is launched, the status is updated to Running (RMTASK).

- *Superflush:*
  1. The theoretical consumption ratio for the current task is saved. The theorectical consumption ratio for this PM is calculated.
  2. S1—The first/next theoretically consumed or calculated cost resource for this Schedule/OLSN/Release is found.
  3. S2—The Quantity Theoretically Consumed for this resource is calculated.
  4. The location for consumption is found.
  5. UPDATE1—Consumed resource updates are done:
     a. A TC or CC transaction is written to TRHIST.
     b. RESBAL, LOCDTL, RMRESR, and possibly RESRES, and LOTMAS are updated.
     c. If the Task Status is launched, the status is updated to Running (RMTASK).
  6. If the transaction is a production receipt or scrap transaction of a produced resource, the following steps are executed in order to theoretically produce the non-reportable resource of this PM, if one exists.

*Producing A Non-Reportable Produced Resource:*

1. The task is evaluated to determine if it is a nonreportable produced resource on this Schedule/OLSN/Rel/Task.
2. The quantity theoretically produced for this resource is calculated.
3. The location to default production is found.
4. UPDATE2—Updates for the theoretically produced resource are done:
   a. A TP transaction is written to TRHIST.
   b. RESBAL, LOCDTL, RMRESR, and LOTMAS are updated.
   c. If the task status is launched, the status is updated to Running (RMTASK).

The following pages provide a detailed example of superflushing.

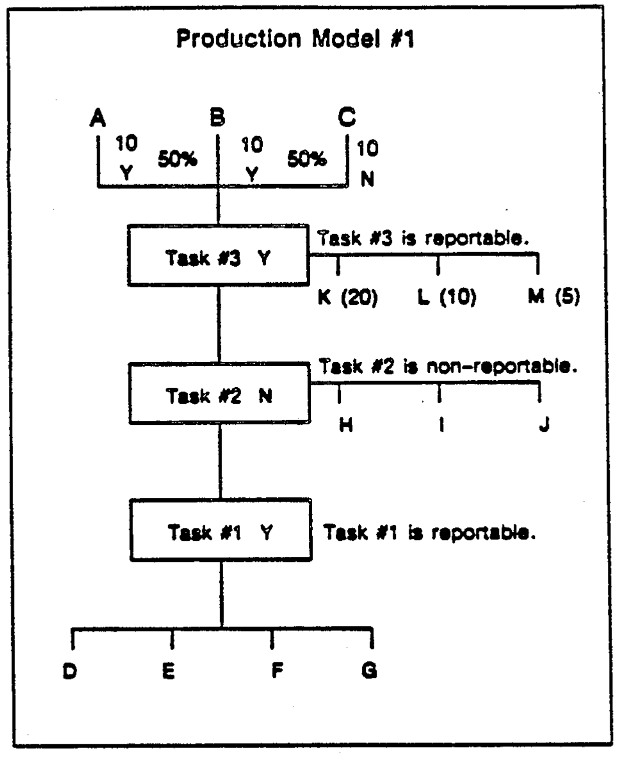
In the above production model:
A = a reportable produced resource
A = 50% of the reportable produced resource distribution
A = expected produced quantity of 10 per PM batch
See the next page for Production Model #2. It is used if K needs to be superflushed.
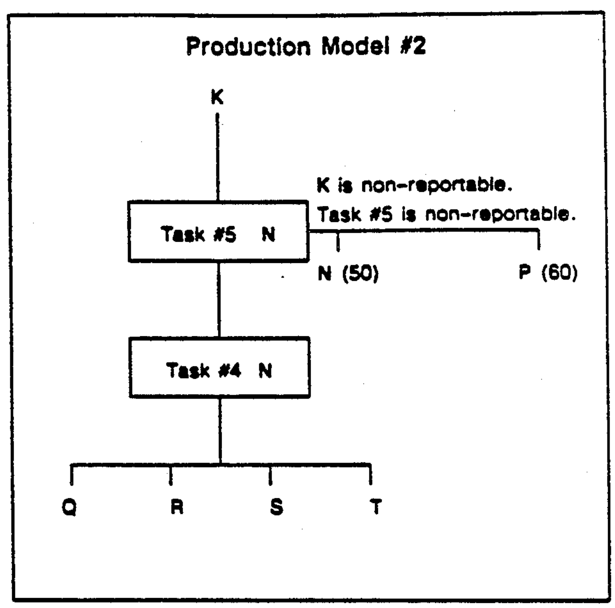
In the above production model (PM #2),
K = is a produced resource from the last task K = is a non-reportable resource
K = is the only produced resource Transaction:

Type = PR
Resource = A
Qty = 10

*Processing:*

A. The Number Of Batches used is calculated:

a. Qty Produced = Production Receipt Qty (converted to standard UM).

b. Qty Per Standard Batch Size comes from the RMRESR file for this produced resource (the resource received on this PR transaction).

Number of batches = Qty Produced divided by Qty per Standard Batch size (both quantities must be in stc UM):

= 10 / 10
= 1

The above step is only done ONCE.

B. The theoretical consumption ratio is calculated.

1. This ratio is calculated for each task. This ratio is used for ALL theoretically consumed/produced resources on that task. It is very important to note that the theoretically produced resources from a task use the same ratio as the theoretically consumed resource for that task.

a. The theoretical consumption ratio of the LAST task on a schedule is calculated as follows:

The number of batches used is multiplied by the % of total reportable resources. The percentage is defined in RMRESR for the resource being received.

The percentage of total reportable resources is stored in the file in decimal format. This is the format used in the following calculation. It is not converted to percentage format.

Example:

# of batches = 1
% of total reportable resources = 50% (i.e.. .5)
(1) x (.5) = (.5)
The theoretical consumption ratio = .50.

b. The theoretical consumption ratio of any task on a schedule EXCEPT the last task is calculated as follows:

The theoretical consumption ratio that was calculated for the previous task is multiplied by the production distribution percentage of the stream resource of this task.

The % of total reportable resources is stored in the file in decimal format. It is not converted to percentage format.

The above step is done ONCE for each task. The following steps are done for EACH theoretically consumed resource on this PM.

2. The next theoretically consumed resource for this Schedule/OLSN/Rel/Task is found.

The RMTASKSQ file is read, starting with the task that initiated theoretical consumption. All resources on the task are then checked. The stream resource is checked to determine if it is reportable. If the stream resource is reportable, theoretical consumption stops.

If the stream resource is non-reportable, theoretical consumption continues. If theoretical consumption continues, the theoretical consumption ratio is calculated for this task. (See above for calculations.)

C. Lower limits are set to RMRESR using the Schedule/OLSN/Rel/Task. RMRESR file is read. The resource must be:

a. consumed resource for this Schedule/OLSN/Release/Task, or
b. a theoretically consumed resource, or
c. a calculated cost resource.

If no more RMRESR records exist for this Schedule/OLSN/Release/Task, the subroutine ends for the current task.

D. The Quantity Theoretically Consumed for this resource is calculated.

The Quantity Consumed per PM Batch is multiplied by the theoretical consumption ratio to determine the Quantity Consumed for this resource.

The Quantity Consumed per Batch is found in the RMRESR file for each theoretically consumed resource. The field in the file is called Quantity Relative to PM Batch Size.

If the resource is a calculated cost resource, the RMRESR file is updated. The next RMRESR record is read from C. Quantity Issued is updated in RMRESR by adding the Quantity to Consume For This Resource to Quantity Issued. The Allocated Quantity in RESBAL or RMRESR is not updated. Those quantities are never updated by a transaction.

The following steps apply ONLY to theoretically consumed resources, NOT calculated cost resources.

E. The locations for consumption are found.

1. The locations defined by the reservation records for this Resource/Schedule/OLSN/Release/Task are checked.

LOOP1—TAG

A reservation record for this Schedule/OLSN/Release/Task/Resource is read. Note: The Task Number and Resource Number are not from the production receipt transaction. They are the Resource Number and Task Number found in Step C.

If the CHAIN was successful, the Reduced From Reserved Quantity is compared to the Quantity Reserved. If the Quantity Reserved is greater, the Reduced From Reserved Quantity is subtracted from the Quantity Reserved. The difference equals the Quantity Being Consumed at this location.

To perform this calculation, a CHAIN is done to the Location Detail record for this reservation. Regardless of what the quantity is available at this location is, if there is a location detail record, the following fields are reduced by the Quantity Being Consumed from this location:

Quantity At Location (std UM)
Quantity At Location (last UM)
Quantity Reserved To Manufacturing The Quantity At Location is allowed to become negative, but the Reserved Quantity is not. If the Reserved Quantity is negative, the field is set to zero. To update the Quantity At Location (last received UM), the Total Quantity At Location after transaction in standard UM is converted to the last received UM (defined in the LOCDTL record). This Quantity is then updated to the Quantity At Location (last received UM).

If a reservation record is found and the Reduced From Reserved Quantity is less than the Quantity Reserved, but no LOCDTL record exists for that location, a LOCDTL record is added. This record has a negative Quantity At Location and the Reserved Quantity is equal to zero.

The default classification code for this LOCDTL record comes from Tailoring. Before a LOCDTL record is added, the default Classification Code is used to CHAIN to the CLASCD file. If the Classification Code exists in CLASCD, the classification attributes are used to load the new LOCDTL record. If not, the resource CANNOT be theoretically consumed.

*LOCDTL (new record updates):*

Location # = To Location # from reservation record
Warehouse = To Warehouse from reservation record
Resource = From Reservation record
Grade = blank
Lot # = blank
Quantity at Location (standard) = Quantity Being Consumed From This Location (always negative when writing a new record).
Standard UM = RESMST
Resource Class = extract from RESMST
Resource Sub-Class = extract from RESMST
Quantity in Last Received UM = zero
Last Received UM = blank
Potency Factor = defaults to RESMST
Potent Units = calculated
Revision Level = defaults to Current Revision Level (RESMST)
Classification Code = defaults to Tailoring (must be valid).
All classification bytes = extracted from the CLASCD file using the default class code.
Quantity Reserved—Manufacturing = zero.
Quantity Reserved—Sales = zero
Last Date Received = system date
Last Rime Received = system time
ETD = zero
Net Activity field = zero
Shelf Life Expiration date = zero
FIFO Date = zero
Total Quantity to be Consumed for this resource is reduced by the Quantity Consumed from that Location.

UPDATE1 is executed. (See UPDATES for consumed resource below.) Then the following steps are performed.

1. If the Total Quantity to be Consumed for this resource is greater than zero, LOOP1 (see above) is performed. The LOOP stops as soon as the Total Quantity to be Consumed for this resource has been consumed OR if no more reservation records for this Schedule/OLSN/Rel/Task/Resource exist.

After all the reservations for this Schedule/OLSN/Release/Task/Resource have been read, if the Total Quantity to be Consumed for this Resource is consumed, the program goes to Step C to read the next RMRESR record. If the Total Quantity could not be consumed, the program continues with Step #2. Step #2 is only done if there are no reservations for the Schedule/OLSN/Release/Resource, or if there are reservations for the Schedule/OLSN/Release/Resource but not enough.

2. The location defined in RMRESR as the primary location (and warehouse) is checked.

A CHAIN is done to LOCDTL for that location. The Quantity Available To Consume is determined (Quantity At Location minus Quantity Reserved Sales minus Quantity Reserved Mfg). If the Quantity Available to Consume is Greater than zero, this location is used. If the Total Quantity to be Consumed for this resource is greater than the Available to Consume, the Available Quantity from this Location is consumed. If the Quantity Available to Consume is greater than the Total Quantity to be Consumed for this Resource, only what is needed for this resource is consumed.

If it is able to consume from this location, the Location Detail File is updated.

The following fields are reduced by the Quantity Being Consumed From This Location:

Quantity At Location (std UM)
Quantity At Location (last UM)
Quantity Reserved at Manufacturing If the Total Quantity to be Consumed for this Resource is consumed, UPDATE1 is executed (see Updates below for consumed resources). The program goes to Step C to read the next RMRESR record. If the total quantity could not be consumed, after executing UPDATE1, the program continues with Step #3 (below).

If a lot number was defined at the location, the LOTMAS file is updated. (See UPDATE1 for details.)

3. The location defined in RESMST is checked to determine if it is the primary location for consumption. Processing is the same as in Step #2 above.

If the Total Quantity to be Consumed for this resource is consumed, the program goes to Step C to read the next RMRESR record. If the Total Quantity can not be consumed, the program continues with Step #4.

4. RMRESR is checked to determine if the resource can be superflushed.

If the resource cannot be superflushed, one of the locations below has to be forced negative.

*Hierarchy Of Locations When A Resource Is Forced Negative:* a. The location specified for the Resource/Sched/OLSN/Rel # (RMRESR) is used. This location is found in Step #2 above.
b. If there is no Location Detail record for that location, the location from RESMST is used (from Step #3 above).

c. If a Location Detail record is not found for that location either, the location that is specified in the last reservation record is used. If there are no reservation records, the resource cannot be theoretically consumed. An error message is displayed. (The program continues trying to theoretically consume any other resources defined as TC resources for this PM.)

The error listing prints resources that can not be theoretically consumed and the quantity which can not be consumed. The listing also shows the total quantity that needs to be consumed for this resource.

*Duplicate Subroutines:*

The following subroutines have functional duplicates among the theoretical consumption subroutines. This is done to enable the system to perform superflush.

1. TCTASK has the duplicate TCTASL.
2. TCRESR has the duplicate TCRESL.
3. TCCONT has the duplicate TCCONL.
4. TCONTC has the duplicate TCONTL.

The above duplication is necessary to avoid the following complication while superflushing a resource.

Example #1:

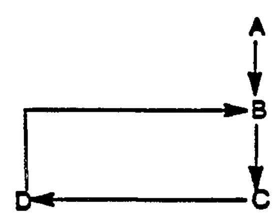

A executes B.
B executes C.
C executes D.
D executes B.
B does not execute C.
B ends.
B returns to D.
D returns to C.
C returns to B.
B performs more work.
B ends.

In RPG, B does not return to A but to D. RPG does not stack calls to a subroutine. It only remembers the last call.

One way to get around this situation is to use duplicates of subroutines. They are called from one subroutine while executing another subroutine.

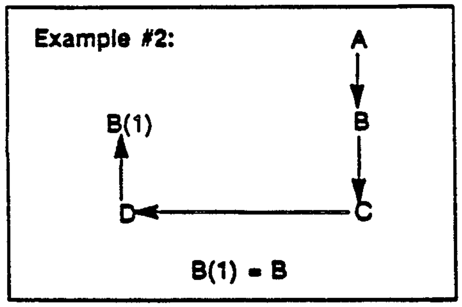

B(1) and B are duplicate subroutines.

Now,
A executes B.
B executes C.
C executes D.
D executes B(1).
B(1) does not execute C.
B(1) ends.
B(1) returns to D.
D returns to C.
C returns to B.
B performs more work.
B ends.
And now B returns to A.

*Sequence of actual execution in one case of superflush:*

TCACTV to TCTASK;
TCTASK to TCRESR;
TCRESR to TCCONT;
TCCONT to TCONTC;
TCONTC to TCSUPR;
TCSUPR to TCTASL;
TCTASL to TCRESL;
TCRESL to TCCONL;
TCCONL to TCONTL;
TCONTL to TCSUPR is not allowed.
TCONTL returns to TCCONL;
TCCONL returns to TCRESL;
TCRESL returns to TCTASL;
TCTASL returns to TCSUPR;
(Continued on following page.)
TCSUPR returns to TCONTC;
TCONTC returns to TCCONT;
TCCONT returns to TCRESR;
TCRESR returns to TCTASK;
TCTASK returns to TCACTV.

Theoretical Consumption ends.

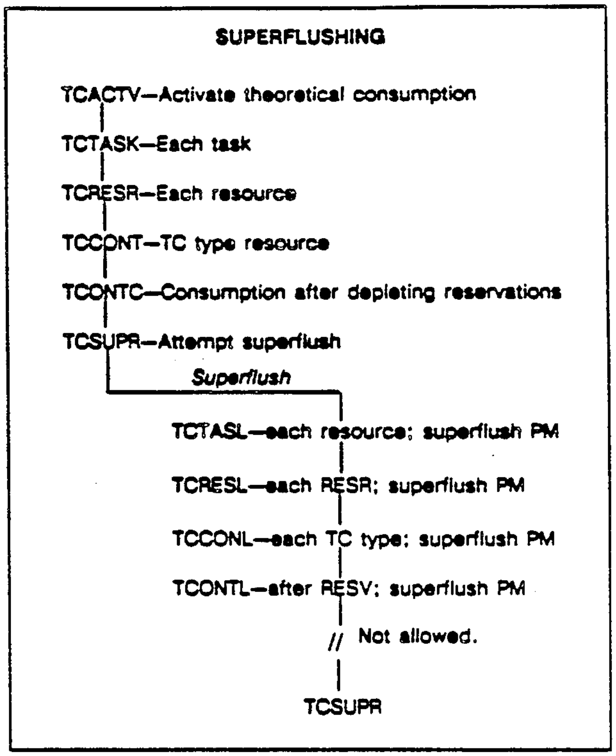

To find the PM Type and PM Name used for superflush, RMRESR is checked. If the PM Type and PM Name is not defined in RMRESR, the resource cannot be superflushed.

If the resource cannot be superflushed, some location for that resource must be forced negative. See above. *Hierarchy Of Locations When A Resource Is Forced Negative.*

*Prerequisites For Superflushing:*

The resource is a produced resource from the last task.
The resource is the only produced resource for this PM.
The resource and task are non-reportable.

An edit is performed to check that the produced resource on this production model equals the resource that is trying to be superflushed. If so, superflush can continue. All consumed resources for that PM are read, and all resources from that PM are theoretically consumed.

When superflushing, the process is exactly the same as above except the program cannot superflush any of the resources on this PM. You can only superflush down one level.

*Determine The Schedule/Release:*

Before continuing with superflush, the program edits that there is really a Schedule/Release/PM Type and PM Name for the production model being used for superflush. This is done because the TC, TP, and CC transactions that are generated during the superflush have a schedule and release attached.

Using the schedule and release from the PR, ON, or SC transaction and the PM Type/PM Name being used for superflush, a CHAIN is done to RMODELPP (permanent logical file by PM Type/PM Name/Schedule/Release). If the CHAIN is successful, the OLSN is extracted and superflush continues. If the CHAIN is not successful, superflush STOPS. Superflush cannot continue unless a valid Schedule/Release for this PM Type and PM Name is found.

If superflush can continue, the theoretical consumption ratio for this production model is calculated.

*Recalculate The Theoretical Consumption Ratio:*

When executing superflush, the program first calculates the new theoretical consumption for this production model. It also saves the first TC calculation so when processing returns to the theoretical consumption of the original production model, the ratio is still available. However, after saving the ratio from above, a new TC ratio must be calculated for this production model.

To do this, the Quantity Being Consumed through superflush is divided by the Quantity Relative To PM Batch Size (from RMRESR). That result is the multiplied percentage of total reportable produced resources.

These calculations are the same calculations as described in the *Theoretical Consumption* section. The percentage of total reportable produced resources in this calculation almost always equals 100. This is because, to perform superflush, there can only be one produced resource, and, therefore, that resource always equals 100% of the total produced resources.

S1. The first/next theoretically consumed resource for this Schedule/OLSN/Rel/Task is found. The RMTASKSQ file is read starting with the task that produces the superflushable resource. All resources on the task are then examined.

The task is checked to determine if stream resource is reportable. If the stream resource is reportable, then theoretical consumption stops. If theoretical consumption is going to continue, the theoretical consumption ratio for this task is calculated (see *Theoretical Consumption* section for calculation details).

The RMRESR file is read and the following edits are performed:

a. The resource is theoretically consumed, or b. the resource is a calculated cost resource.

If no more RMRESR records exist for this PM Type/PM Name, superflush stops. The program goes to Step C to continue with theoretical consumption.

S2. The Quantity To Be Theoretically Consumed for this resource is calculated (Quantity To Consume For This Resource).

The Quantity Consumed Per Batch is multiplied by the theoretical consumption ratio for the Quantity To Theoretically Consume for this resource.

The Quantity Consumed Per Batch is found in the RMRESR file for each theoretically consumed resource. The field in the file is called Quantity Relative To PM Batch Size.

If the resource is a calculated cost resource, RMRESR is updated. The program then goes to S1 to read next RMRESR record. quantity issued in RMRESR is updated by adding Quantity Issued to Quantity To Consume for this resource.

The following steps do NOT apply to calculated cost resources, only to theoretically consumed resources.

E. Locations for consumption are found.

1. The locations defined by the reservation records for this Resource/Sched/OLSN/Rel/Task are checked.

LOOP2—TAG

A reservation record for this Sched/OLSN/Rel/Task/Resource is read. The Task Number and Resource Number are not from the production receipt transactions. They are the Resource Number and Task Number found in Step S1.

If the CHAIN was successful, the Quantity Reserved is compared with Reduced From Reserved Quantity. If Quantity Reserved is greater, Reduced From Reserved Quantity is subtracted from Quantity Reserved. The difference equals the Quantity To Consume at this location. To do this, a CHAIN is done to the Location Detail record for this reservation.

Regardless of what quantity is available at this location, if there is a Location Detail record, the following fields are reduced by the Quantity Being Consumed from this location:

Quantity At Location (std UM)
Quantity At Location (last UM)
Quantity At Location Reserved To Manufacturing Quantity at Location is allowed to become negative, but the Reserved Quantity is not. If the reserved quantity is negative, the field is set to zero. The quantity in last received UM is updated in the standard manner as described above.

If a reservation record is found and the Reduced From Reserved Quantity is less than the Quantity Reserved, but no LOCDTL record exists for that location, a LOCDTL record is added. This record has a negative Quantity At Location, and the Reserved Quantity is equal to zero.

The default Classification Code for this LOCDTL record comes from Tailoring. Before a LOCDTL record is added, the default Classification Code is used to CHAIN to the CLASCD file. If the Classification Code exists in the Classification Code file, the classification attributes loaded into the new LOCDTL record. If not, the resource CANNOT be theoretically consumed.

*LOCDTL (New record updates):*

Location # = To Location # from reservation record
Warehouse = To Warehouse from reservation record
Resource = From reservation record
Grade = Blank
Lot # = Blank
Quantity At Location (standard) = Quantity being Consumed From This Location (always negative when writing a new record).
Standard UM = RESMST
Resource Class = extracted from RESMST.
Resource Sub-Class = extract from RESMST
Quantity in Last Received UM = zero
Last Received UM = blank
Potency Factor = default to RESMST
Potent Units = calculated
Revision level = defaults to Current Revision Level (RESMST)
Classification Code = defaults to Tailoring
All Classification Bytes = extracted from the CLASCD file using the default Classification Code.

Quantity Reserved—manufacturing = zero.
Quantity Reserved—sales = zero.
Last Date Received = system date
Last Time Received = system time
ETD = zero
Net Activity Field = zero
Shelf Life Expiration Date = zero
FIFO date = zero 1. The total quantity to be consumed for this resource is reduced by the Quantity Consumed from that location.

If the Total Quantity to be Consumed for this resource is greater than zero, the program goes to LOOP2. The LOOP2 stops as soon as the Total Quantity to be consumed for this resource has been consumed OR if there are no more reservation records for this Schedule/OLSN/Release/Task/Resource Number.

If the Total Quantity to be Consumed for this Resource was consumed, UPDATE1 is executed (see Updates for consumed resources). The program then goes to S1 to read the next RMRESR record. If the total quantity could not be consumed, after doing UPDATE1, the program continues with Step #2.

2. The location defined in RMRESR as the primary location (and warehouse) is checked.

The program CHAINs to LOCDTL for that location. The Quantity Available To Consume is determined (Quantity At Location minus Quantity Reserved Sale minus Quantity Reserved Mfg). If the Quantity Available To Consume is greater than zero, this location is used. If the Total Quantity To Be Consumed for this resource is greater than the Quantity Available To Consume, the Available Quantity from this location is consumed. If the Quantity Available To Consume is greater than the Total Quantity To Be Consumed for this resource, only what is needed for this resource is consumed.

If it was possible to consume from this location, the Location Detail file is updated. The following fields are reduced by the quantity being consumed from this location:

Quantity At Location (std UM)
Quantity At Location (last UM)
Quantity Reserved To Manufacturing If the Total Quantity to be consumed for this resource is consumed, UPDATE1 is executed (see Updates for consumed resources). Then the program goes to S1 to read the next RMRESR record. If the total quantity could not be consumed, the program continues with Step 3.

If the locations defined a lot number, the LOTMAS file is updated (see UPDATE1 for more details).

3. The location defined in RESMST as the primary location for consumption is checked. The process is the same as Step 2 above.

If the Total Quantity to be Consumed for this resource was consumed, the program goes to Step S1 to read the next RMRESR record. If the total quantity could not be consumed, the program continues with Step #4.

If the resource cannot be superflushed, one of the following locations is forced negative:

a. The location specified for the Resource/Sched/OLSN/Rel # (PMRESR) is first used (found in #2 above).
b. If there is no Location Detail record for that location, the location found from RESMST is used (the location that was found in #3 above).
c. If a Location Detail record was not found for that location either, the location that was specified in the last reservation record is used. If there were no reservation records, the resource cannot be theoretically consumed. (The program continues to try and theoretically consume any other resources defined as TC resources for this PM.) An error message is generated.

F. UPDATE1—Updates for Consumed Resources

When doing theoretical consumption, if the resource is defined as calculated cost, the only file that gets updated is RMRESR.

If the resource is a "count up" resource (i.e., electricity), the resource does not exist in a location. Therefore, if a count up resource is consumed, the LOCDTL and LOTMAS files are not updated.

The Task Status of the Task on the RMRESR record is checked. If the Task Status is launched, the Task Status is updated to Running.

Updates

• *RESBAL:*

Number of Transactions since the last cycle count

Mfg Reserved Quantity= reduce using Trans Quantity in standard UM

The Reserved Quantity is only reduced by what was actually consumed from reservations (i.e., if no reservations existed, this field is not reduced).

Manufacturing Allocated Quantity is never updated by a transaction.

Quantity Consumed to Date increased using Quantity Consumed from this location.

Total Quantity Present—reduced using Quantity Consumed From This Location.

Quantity On Order: If the from location was classified as On Order = Y, Quantity on Order is reduced using Trans Quantity in standard UM.

On Hand Quantity: If the From Location was classified as On Hand = Y, On Hand Quantity is reduced using Trans Quantity in standard UM.

Date of Last Effect on On Hand Quantity: If the From Location was classified as On Hand = Y, then today's date is the date of last effect.

Date of Last Activity is today's date.

• *LOCDTL:* this file does not get updated unless the resource is a balance type resource.

Quantity At Location (in standard UM) is reduced using Quantity Consumed From This Location.

Quantity At Location (in last received UM) is updated after the Trans Last Received UM.Then that quantity is updated to Quantity At Location for last received UM.

Quantity Reserved at location is compared with the Trans Quantity. If the Quantity Reserved is less than the Transaction Quantity, Quantity Reserved is subtracted. If the Quantity Reserved is greater than or equal to the transaction quantity, the Transaction Quantity is subtracted. The Quantity Reserved field is never negative.

Transaction Quantity means the quantity being consumed at this location.

- *LOTMAS:*

This file does not get updated unless the resource is a balance type resource.

If the From location had a Lot Number, the LOTMAS file is updated.

Quantity Issued is increased using Quantity Consumed from this Location in standard UM.

- *RMRESR:*

Quantity Allocated is NOT updated.

Quantity Reserved is NOT updated.

Quantity Issued is increased using Quantity Consumed from this Location.

Quantity Reduced from Reserved is increased using Quantity Consumed from this Location. This quantity is ONLY updated by the quantity that was consumed FROM a reservation.

- *RMTASK:*

Task Status is updated to Running if the present status is launched.

- *RESRES:*

This file is only updated during step #1 above.

Quantity Issued is increased by the Quantity To Consume From This Location.

Reduced from Reserved Quantity is increased using the quantity that was consumed for this resource from reservations.

- *TREBAT and TRHIST:*

There are three transaction types that can be generated:

a. TC—theoretical consumption b. CC—calculated cost c. TP—theoretical production TC transactions are written for theoretically consumed resources for each location used. See table on following page.

| Theoretical Consumption Transaction | | | | | | | | | |
|---|---|---|---|---|---|---|---|---|---|
| Locn Attr: | On order | | On Hand | | $ Value | | Avail plan | | |
| | *Yes* | *No* | *Yes* | *No* | *Yes* | *No* | *0* | *1* | *2* |
| | *Balance type—positive consumption* | | | | | | | | |
| Fields: THTENQ | " " | "-" | N/A | N/A | N/A | N/A | N/A | | |
| THTRON | " " | " " | N/A | N/A | N/A | N/A | N/A | | |
| THTROH | N/A | N/A | "-" | " " | N/A | N/A | N/A | | |
| THEFIN | N/A | N/A | N/A | N/A | "-" | " " | N/A | | |
| THEFPQ | N/A | N/A | N/A | N/A | N/A | N/A | "-" | " " | " " |
| Fields: | *Balance type—negative consumption* | | | | | | | | |
| THTENQ | " " | "+" | N/A | N/A | N/A | N/A | N/A | | |
| THTRON | " " | " " | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |

"+" = plus sign " " = blank
"-" = minus sign N/A = not applicable

See the following page for additional updates.

| Theoretical Consumption Transaction | | | | | | | | | |
|---|---|---|---|---|---|---|---|---|---|
| Locn Attr: | On order | | On Hand | | $ value | | Avail plan | | |
| | Yes | No | Yes | No | Yes | No | 0 | 1 | 2 |
| | Non-balance type—positive consumption | | | | | | | | |
| Fields: THTENQ | " " | | N/A | | N/A | | N/A | | |
| THTRON | " " | | N/A | | N/A | | N/A | | |
| THTROH | N/A | | " " | | N/A | | N/A | | |
| THEFIN | N/A | | N/A | | " " | | N/A | | |
| THEFPQ | N/A | | N/A | | N/A | | " " | | |
| | Non-balance type—negative consumption | | | | | | | | |
| Fields: THTENQ | " " | | N/A | | N/A | | N/A | | |
| THTRON | " " | | N/A | | N/A | | N/A | | |
| THTROH | N/A | | " " | | N/A | | N/A | | |
| THEFIN | N/A | | N/A | | " " | | N/A | | |
| THEFPQ | N/A | | N/A | | N/A | | " " | | |

"+" = plus sign " " = blank
"-" = minus sign N/A = not applicable

*Additional Updates:*

Transaction Number (unique for each trans)
Period #
Transaction Date
Transaction Time
User Entered Date
User Entered Time
Operator Initials
Transaction Detail Code
Reference #
Schedule
OLSN
Release #
Task
PM Type and Name All of the above fields are loaded using the information from the actual entered transaction (i.e., the production receipt transaction or the scrap transaction) except transaction number.

Resource Number
Quantity
UM
From Warehouse
From Location
Grade
Lot #

Revision Level
Potency Factor
Transaction Quantity In Standard UM
Effect on Inventory $ = (+, -, or blank). If the location Inventory $ = YES, byte is set to "-".
Effect on Non-MRP Quantity = blanks. If the location was Avail for Planning = 2, byte is set to "-".
Resource Class
Resource Sub-Class One CC Transaction is written for each calculated cost resource.

| Calculated Cost Transaction | | | | |
|---|---|---|---|---|
| Locn Attr: | On Order | On Hand | $ Value | Avail Plan |
| Fields: THTENQ | Blanks | N/A | N/A | N/A |
| THTRON | Blanks | N/A | N/A | N/A |
| THTROH | N/A | Blanks | N/A | N/A |
| THEFIN | N/A | N/A | Blanks | N/A |
| THEFPQ | N/A | N/A | N/A | Blanks |

*Additional Updates*

Transaction Number
Period #
Transaction Date
Transaction Time
User Entered Date
User Entered Time
Operator Initials
Transaction Detail Code
Reference #
Schedule
OLSN
Release #
Task
PM Type And Name All of the above fields are loaded using the information from the actual entered transaction (i.e., the production receipt transaction or the scrap transaction) except Transaction Number.

Resource Number
Quantity
UM
Transaction Quantity In Standard UM
Resource Class
Resource Sub-Class

• *TRCTRL:*

This file is NOT updated by the system-generated transactions. For example, if a PR transaction is done and that transaction generates 20 TC transactions, the batch session screen would display Number of Transactions = 1.

• *Producing A Non-reportable Resource:*

The program continues with Step G below.

G. First, it is determined if there is a non-reportable produced resource for the task that is being evaluated by this cycle.

H. If a non-reportable produced resource is found, processing continues by calculating the quantity to theoretically produce.

• *Theoretical Production of a Non-Potent Resource:*

The same updates as for a production receipt are used. The quantity produced is added to the location quantity in standard UM. Total Quantity at Location in standard UM is converted to Quantity in last received UM.

• *Theoretical Production of a Potent Resource:*

Quanitities in standard and last received units of measure are used to recalculate the new Potency Factor.

*Case 1.* Standard and last received UM are the same.

*Case 2.* Standard and last received UM are different.

Example:

Q(1) = Quantity Prod in potent units in standard UM.

P(1) = Default potency from Resource Master.

V(1) = Q(1)/P(1) = Actual Quantity Produced in std UM.

Q(2) = Quantity At Location in potent units in standard UM.

P(2) = Potency at location.

V(2) = Q(2)/P(2) = Actual Quantity At Location in std UM.

Q(3) = Quantity At Location in last received UM.

*Case 1:*

If standard and last received UM are same:

Q(1) + Q(2) = Quantity At Location in potent units in standard UM.

V(1) + Q(3) = Quantity At Location in last received UM.

(Q(1) + Q(2)) divided by (V(1) +Q(3)) = New potency factor at location.

*Case 2:*

If standard and last received UM are different:

Q(1) + Q(2) = Quantity At Location in potent units in standard UM.

F(Q(1) + Q(2)) = Quantity At Location in potent units in last UM after UM conversion.

V(1) + V(2) = Actual Quantity At Location in standard UM.

The new Potency Factor at location is calculated before calculating the Quantity in last received UM.

(Q(1) + Q(2)) divided by (V(1) + V(2)) = New potency factor at location.

Calculate Quantity in last received UM.

F(Q(1) + Q(2)) divided by (Q(1) + Q(2))divided by (V(1) + V(2)) = Quantity At Location in last received UM.

The Quantity To Theoretically Produce is calculated in the same manner as the Quantity To Theoretically Consume (for consumed resources). This means the Quantity Relative to PM Batch Size is multiplied by the theoretical consumption ratio. (The theoretical consumption ratio was calculated in Step B.)

It is very important to note that the theoretically produced resources from a task use the same ratio as the theoretically consumed resource for that task. To reiterate, one ratio is used for a task for both produced and consumed resources.

After that quantity is calculated, the program continues to Step I (below).

I. The program tries to find a Produced to Location for a default.

First, the program checks RMRESR for the Produced To Warehouse and Produced To Location. If those fields are not blank, a CHAIN is done to LOCDTL for this Warehouse/Location/Resource. If a LOCDTL record exists, the program checks the Lot Number field in the LOCDTL record. If the Lot Number is blank, this location can be used. If the Lot Number is not blank, this location cannot be used.

If there is no existing LOCDTL record, a LOCDTL record is added. Then, the program continues with Step J—UPDATE2.

If the location from RMRESR was not valid, or if RMRESR had blanks for Produced To Warehouse or Produced To Location, the program checks RESMST. The default from Produced To Warehouse and from Produced To Location from RESMST are used to CHAIN to LOCDTL. If a LOCDTL record exists, the Lot Number is checked. If the Lot Number is blank, the location is valid. If the Lot Number is not blank, the location is invalid. If the location is invalid, processing ends. An error message is printed on the Error Listing report.

The program continues with Step J—UPDATE2.

J. UPDATE2—Updates for Theoretically Produced Resources:
   a. A TP transaction is written to TRHIST.
   b. RESBAL, LOCDTL, and RMRESR are updated (see below).

- *RESBAL:* of Transactions since the last cycle count

Actual Production—year-to-date

Actual Production—total increased using the calculated Produced Quantity.

Total Quantity Present is increased using the calculated Produced Quantity.

Quantity On Order—If the To Location was classified as On Order = Y, Quantity On Order is increased using calculated Produced Quantity.

On Hand Quantity—If the To Location was classified as On Hand = Y, On Hand Quantity is increased using calculated Produced Quantity.

Date of Last Effect on On Hand Quantity— If the To location was classified as On Hand = Y, the system date is the Date of Last Effect.

Date Last Activity—updated using user-entered transaction date.

- *LOCDTL (Existing record):*
  - Quantity at Location (in standard UM) is increased using calculated Produced Quantity.
  - Quantity at Location (in last received UM)
  - Potent Units—see above for potency units considerations.
- *LOCDTL (New record):*
  - Location # = from either RMRESR or RESMST depending on which location was valid
  - Warehouse = from either RMRESR or RESMST depending on which location was valid
  - Resource = the theoretically produced resource #
  - Grade = blank
  - Lot # = blank
  - Quantity At Location (standard) equals the calculated Produced Quantity.
  - Standard UM = RESMST
  - Resource Class = extract from RESMST
  - Resource Sub-Class = extract from RESMST
  - Quantity In Last Received UM = zero
  - Last Received UM = blank
  - Potency Factor = defaults to RESMST
  - Potent Units = Produced Quantity (Std UM) x Potency Factor
  - Revision Level = defaults to Current Revision Level (RESMST).
  - Classification Code = default to Tailoring
  - All Classification Bytes = using the default classification byte, these fields are loaded from CLASCD.
  - Quantity Reserved—manufacturing = zero
  - Quantity Reserved—sales = zero.
  - Last Date Received = transaction date (user-entered)
  - Last Time Received = transaction time (user-entered)
  - ETD = zero
  - Net Activity field = zero
  - Shelf Life Expiration Date = calculated by adding Shelf Life Days (defined in RESMST for this resource) to the transaction date (user-entered). This is done after converting to Julian format.
  - FIFO Date = transaction date (user-entered)
- *RMTASK:*
  - Task Status is set to Running if presently at launched.
- *RMRESR:*
  - Quantity Produced To Date is increased using calculated Produced Quantity.

• *TREBAT and TRHIST:*

See the table below.

| Theoretical Production Transaction | | | | | | | | | |
|---|---|---|---|---|---|---|---|---|---|
| Locn Attr: | On Order | | On Hand | | $ Value | | Avail Plan | | |
| | *Yes* | *No* | *Yes* | *No* | *Yes* | *No* | *0* | *1* | *2* |
| | *Positive Production Receipt—Non-stream* | | | | | | | | |
| Fields: THTENQ | " " | "+" | N/A | N/A | N/A | N/A | N/A | | |
| THTRON | " " | " " | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |
| | *Negative Production Receipt—Non-stream* | | | | | | | | |
| Fields: THTENQ | " " | "–" | N/A | N/A | N/A | N/A | N/A | | |
| THTRON | " " | " " | N/A | N/A | N/A | N/A | N/A | | |
| THTROH | N/A | N/A | "–" | " " | N/A | N/A | N/A | | |
| THEFIN | N/A | N/A | N/A | N/A | "–" | " " | N/A | | |
| THEFPQ | N/A | N/A | N/A | N/A | N/A | N/A | "–" | " " | " " |
| | *Positive & Negative Production Receipt—Stream* | | | | | | | | |
| Fields: THTENQ | " " | | N/A | | N/A | | N/A | | |
| THTRON | " ". | | N/A | | N/A | | N/A | | |
| THTROH | N/A | | " " | | N/A | | N/A | | |
| THEFIN | N/A | | N/A | | " " | | N/A | | |
| THEFPQ | N/A | | N/A | | N/A | | " " | | |

*Additional Updates:*

TP transactions are written for a theoretically produced resource.

Transaction Number = increase by 1.
Period #
Transaction Date
Transaction Time
User Entered Date
User Entered Time
Operator Initials
Transaction Detail Code
Reference #
Schedule
OLSN
Release #
Task
PM Type and Name All of the above fields are loaded using the information from the actual entered transaction, (i.e., the production receipt transaction or the scrap transaction) except transaction number.

Resource Number
Quantity—calculated produced quantity
UM
To Warehouse
To Location
Grade—blank
Lot #—blank
Revision Level—default to current revision level (RESMST).
Potency Factor—blank
Transaction Quantity in standard UM
Calculated Produced Quantity in standard UM
Effect on inventory $ = (+, −, or blank)
If the location was Inventory $ = YES, byte is set to "+".
Effect on Non-MRP Quantity = blanks
If the Location was MRP available = Yes, byte is set equal to "+".
Resource Class
Resource Sub-Class

• *TRCTRL:*

This file is NOT updated by the system-generated transactions. For example, if a PR transaction is done and that transaction generates 20 transactions, the batch session screen displays number of transactions = 1.

• *Negative Theoretical Consumption:*

A Completed negative production receipt transaction generates negative theoretical consumption. The purpose of negative theoretical consumption is to reverse theoretical consumption done with a positive production receipt.

1. Theoretical consumption ratio in this case is negative.
2. All CC trans are the reverse of positive consumption.
3. All TP transactions are the reverse of positive production.
4. All TC transactions are the reverse of positive consumption.
5. Negative superflush is not done.

• *Summary of Transaction Updates:*

The following tables summarize the updates that occur in addition to Updates1 and Updates2 detailed above. In some cases, additional information can be found under the individual transaction section, listed by screen numbers after the tables.

Summary of Transaction Updates

| Transaction Type | CHn | CHy | DI | IA | IM | IP | MI | MR | PR | RA | RC | RS | RT | SA | TC | TP | TR |
|---|---|---|---|---|---|---|---|---|---|---|---|---|---|---|---|---|---|
| File—LOCDTL | f t | f t | | | | | | | | c p | f t | | | | | | f t |
| Qty @ Locn Std—LDLOCQ | - + | | - | + | X | - | - | + | X | - + | - + | + | - | - | X | X | - + |
| Qty @ Locn LR—LDORUM | - + | | - | + | X | - | - | + | X | - + | - + | + | - | - | X | X | - + |
| Last Recv UM—LDRCUM | X | | | | | | | X | X | | | X | | | | | X |
| Potency Factor—LDPOTF | X | | | | | | | X | X | X | X | | | | | X | X |
| Grade—LDGRDE | T | | | | | | | T | T | T | T | T | | | | | T |
| Revision Lvl—LDREVL | T | | | | | | | T | T | T | T | T | | | | | T |
| Qty Resv Mfg—LDQYRM | | | - | | | | | | | | | | | | X | | |
| Qty Resv Sales—LDQYRS | | | | | | | | | | | | | | - | | | |
| Trans # LR—LDTRAN | X | | | | | | | X | X | | X | | | | | | X |
| Date Last Recv—LDDLRC | X | | | | | | | X | X | | X | X | | | | | X |
| Time Last Recv—LDTLRC | X | | | | | | | X | X | | X | X | | | | | X |
| FIFO Date—LDFIFO | T | | | | | | | T | T | | T | T | | | | | T |
| ETD—LDETD | T | | | | | | | T | T | | T | T | | | | | T |
| Shelf Life Dt—LDEXPD | T | | | | | | | T | T | | T | T | | | | | T |
| Classif Code—LDCLCD | | X | | | | | | | | | | | | | | | |
| On Order Inv—LDOOIN | | X | | | | | | | | | | | | | | | |
| Avail for Plan—LDAVPL | | X | | | | | | | | | | | | | | | |
| On Hand Inv—LDOHIN | | X | | | | | | | | | | | | | | | |
| $ Value Inv—LDDVIN | | X | | | | | | | | | | | | | | | |
| $ Value WIP—LDDWIP | | X | | | | | | | | | | | | | | | |
| Add a Record— | * | | | | | | | * | * | * | * | * | | | * | * | * |

f = From Location
t = To Location
c = Consumed from
p = Produced To

X = Update the record
+ = Increase
- = Decrease
* = If no record currently exists
T = Updated based on tailoring CHn = Change classification with Reclassify byte = no
CHy = Change classification with Reclassify byte = yes
LR = last received

Summary of Transaction Updates (continued)

| Transaction Type | CH | DI | IA | IM | IP | MI | MR | PR | RA | RC | RS | RT | SA | TC | TP | TR |
|---|---|---|---|---|---|---|---|---|---|---|---|---|---|---|---|---|
| File—LOCMAS† | n | | | | | | | | | | | | | | | |
| Warehouse—LCWHSE | X | | | | | | | X | X | X | X | X | | | X | X |
| Location—LCLOCN | X | | | | | | | X | X | X | X | X | | | X | X |
| Pick Ovrd Seq—LCPOSQ | X | | | | | | | X | X | | X | | | | X | X |
| Dt Last Maint—LCDTMT | X | | | | | | | X | X | X | X | X | | | X | X |
| File—LOTMAS | f t | | | | | | | | c p | f t | | | | | | f t |
| Last Rcpt Date—LMLRDT | X | | | | | | X | X | X | X | X | | | | | X |
| Lot Qty Issued—LMLQYI | | + | | | + | | | | + | | − | | + | | | |
| Lot Qty Shipped—LMLQYS | | | | | | | | | | | | | | + | | |
| Lot Qty MscDsp—LMLQYD | + | | − | − | | + | | | | + | | | | | | + |
| Tot Lot QtyRcv—LMLQYT | + | | | | | | + | + | + | + | | − | | | | + |
| Add a Record— | * | | | | | | * | * | * | * | * | | | | | * |
| File—PODETL | | | | | | | | | | | | | | | | |
| Date Last Rcpt—PDLRDT | X | | | | | | | | | | | | | | | |
| Qty Rcvd OnHnd—PDQROH | L | | | | | | | | | | | | | | | |
| Qty Rcvd OnOrd—PDQROO | L | | | | | | | | | | | | | | | |
| Qty Rcvd Total—PDQYRC | E | | | | | | | | | | | | | | | |
| File—POSUMM | | | | | | | | | | | | | | | | |
| PO Status—PSSTAT | X | | | | | | | | | | | | | | | |

f = From Location
t = To Location
c = Consumed from
p = Produced To
n = If Reclassify = no
L = Depends on Location Classification
E = Updated if transaction goes from a location which is not not available for planning to one that is available for planning.
† If the system is not required to have a LOCMAS record (determined by RM tailoring), one will be added by the following transactions which may create new locations.

X = Update the record
+ = Increase
− = Decrease
* = If no record currently exists

Summary of Transaction Updates (continued)

| Transaction Type | CH | DI | IA | IM | IP | MI | MR | PR | RA c | RA p | RC f | RC t | RS | RT | SA | SC | TC | TP | TRw f | TRw t |
|---|---|---|---|---|---|---|---|---|---|---|---|---|---|---|---|---|---|---|---|---|
| **File—RESBAL** | | | | | | | | | | | | | | | | | | | | |
| Select Next CY—RBSNCC | T | T | T | T | T | T | | | T | | T | | | T | T | | T | | T | |
| # Tran Sinc CY—RPTLCC | X | X | X | X | X | X | X | X | X | X | X | X | X | X | X | X | X | X | X | X |
| Qty On Hand—RBQYOH | L | L | L | L | L | L | L | L | L | L | L | L | L | L | L | | L | L | L | L |
| Qty On Order—RBQYOO | R L | L | L | L | L | L | L | L | L | L | | | L | L | L | | L | L | L | L |
| Tot Qty Present—RBTQTY | L | - | + | + | - | - | + | + | - | + | - | + | + | - | - | | - | + | - | + |
| Dt Last Activity—RBDTLA | X | X | X | X | X | X | X | X | X | X | X | X | X | X | X | X | X | X | X | X |
| Dt Last Eff OHQ—RBDLOQ | L | L | L | L | L | L | L | L | L | L | L | L | L | L | L | | L | L | L | L |
| Prod Qty Total—RBAPTL | | | | | | | | + | | + | | | | - | | | | + | | |
| Mfg Reserv Qty—RBMMRQ | | - | | | | | | | | | | | | | | | - | | | |
| Qty Sold To Dt—RBQYSD | | | | | | | | | | | | | | | | | | | | |
| Sales Aloc Qty—RBSAQY | | | | | | | | | | | | | | | + | | | | | |
| Sales Rsrv Qty—RBSMRQ | | | | | | | | | | | | | | | - | | | | | |
| Date Last Sale—RBDTLS | | | | | | | | | | | | | | | X1 | | | | | |
| Total Consumpt—RBSCTL | | + | | | + | + | | | + | | | | | | | | + | | | |
| Hist Avg Cost—RBAVCS | L | | | | | | | | | | | | | | | | | | | L |
| Rolling Avg Cost w/ alpha factor—RBRLCS | L | | | | | | | | | | | | | | | | | | | L |
| **File—RESMST** | | | | | | | | | | | | | | | | | | | | |
| Re-Plan Flag—RMREPL | E | | | | | | | | | | | | | | | X | | | | |
| **File—RESRES** | | | | | | | | | | | | | | | | | | | | |
| Qty Issued—RVQYIS | | + | | | | | | | | | | | | | | | + | | | |

f = From Location
t = To Location
c = Consumed from
p = Produced To
n = If Reclassify = no
T = Updated based on tailoring
R = Depends if a PO is entered
L = Depends on Location Classification
E = Updated if transaction goes from a location which is not not available for planning to one that is available for planning.

X = Update the record
X1 = byte is updated to Y
+ = Increase
− = Decrease
w = if the From warehouse is different than the To warehouse
Dt Last Activity is updated to today's date unless otherwise noted.

Summary of Transaction Updates (continued)

| Transaction Type | DI | CC | ON | PR | RA | RS | RT | TC | TP | SC |
|---|---|---|---|---|---|---|---|---|---|---|
| **File—RMODEL** | | | | | | | | | | |
| # Earn PM Batch—RDNEPB | | | + | + | | | | | | + |
| Task Comp Code—RDTSCC | | | | X | | | | | | X |
| Release Status—RDSTAT | X | | X | X | | | | | | X |
| Act Start Date—RDATSD | X | | X | X | | | | | | X |
| **File—RMRESR** | | | p | | c p | | | | | |
| Qty Prod To Dt—RRQYPD | | | + | + | + | | – | | + | |
| Qty Issued—RRQYIS | + | + | | | + | – | | + | | |
| Qty Rcd Fr Res—RRQYRR | + | | | | | | | + | | |
| Substitute Cd—RRSRSB | X | | | | Y Y | | | | | |
| Resc Subst For—RRRNSF | X | | | | | | | | | |
| Add a Record— | • | • | | • | • • | | | | | |
| **File—RMTASK** | | | | | | | | | | |
| Task Status—RTSTAT | X | | X | X | | | | X | X | X |
| Actual Start Dt—RTTASD | X | | X | X | | | | X | X | X |
| Actual Comp Dt—RTTACD | | | X | X | | | | | | X |
| **File—TRCOMM** | This file can be updated by any transaction. | | | | | | | | | |

c = Consumed from
p = Produced To

X = Update the record
Y = Byte set to Y if record added
+ = Increase
– = Decrease
* = If no record currently exists Summary of Transaction Updates (continued)

| Transaction Type | CA | CH | DI | IA | IM | IP | MI | MR | ON | PC | PR | RA | RC | RS | RT | SA | SC | TR |
|---|---|---|---|---|---|---|---|---|---|---|---|---|---|---|---|---|---|---|
| **File—TRCTRL** | | | | | | | | | | | | | | | | | | |
| # Sales Trans—TLSATN | | | | | | | | | | | | | | | | X | | |
| $ Val Sale Trans—TLSATD | | | | | | | | | | | | | | | | X | | |
| # Scrap Trans—TLSCTN | | | | | | | | | | | | | | | | | X | |
| # Chg Class Trn—TLCCTN | | X | | | | | | | | | | | | | | | | |
| # Adjust Trans—TLADTN | X | | | X | X | | | X | | | | X | X | X | | | | X |
| # Issue Trans—TLISTN | | | X | | | X | X | | | X | | | | | | | | |
| # PR Trans—TLPRTN | | | | | | | | | X | | X | | | | X | | | |
| # of Trans—TLTRCN | X | X | X | X | X | X | X | X | X | X | X | X | X | X | X | X | X | X |
| $ Val All Tran—TLTTDV | | X | | | | | | X | | | X | X | | | | | X | |
| # Suspend Tran—TLSPTN | 1 | 1 | 1 | 1 | 1 | 1 | 1 | 1 | 1 | 1 | 1 | 1 | 1 | 1 | 1 | 1 | 1 | 1 |
| # Updated Tran—TLUPTN | 1 | 1 | 1 | 1 | 1 | 1 | 1 | 1 | 1 | 1 | 1 | 1 | 1 | 1 | 1 | 1 | 1 | 1 |
| # Error Trans—TLERTN | 1 | 1 | 1 | 1 | 1 | 1 | 1 | 1 | 1 | 1 | 1 | 1 | 1 | 1 | 1 | 1 | 1 | 1 |
| # Part Upd Trn—TLPUTN | | | | | | | | | 1 | | 1 | | | | | | 1 | |
| **File—TREBAT** | | | | | | | | | | | | | | | | | | |
| All Entry Fields—Screen | f | f | f | f | f | f | f | t | t | t | t | f | f | t | f | f | t | f |
| Source Byte—TBSRCB | X | X | X | X | X | X | X | X | X | X | X | X | X | X | X | X | X | X |
| Trans Qty User—TBQNTY | | X | X | X | X | X | X | X | X | X | X | X | X | X | X | X | X | X |
| UM (User)—TBUMSR | | X | X | X | X | X | X | X | X | X | X | X | X | X | X | X | X | X |
| Trans Qty Std—TBSQTY | | X | X | X | X | X | X | X | X | X | X | X | X | X | X | X | X | X |
| Unit Cost—TBUNCS | | X | X | X | X | X | X | X | | | X | X | X | X | X | X | X | X |
| Selected Unit Cst—TBSELC | | X | X | X | X | X | X | X | | | X | X | X | X | X | X | X | X |
| Extended Cost—TBEXCS | | X | X | X | X | X | X | X | | | X | X | X | X | X | X | X | X |
| Trans Amount—TBTRAM | X | XT | | | | | | XT | | | XT | p | | | | | | |
| Sales Amount—TBUNPR | | | | | | | | | | | | | | | | X | | |
| User Ent Tr Amt—TBUTAM | | X | | | | | | X | | | | | | | | | | |
| Plant #—TBPLNT | | | X | | | | | | X | X | X | X | | X | X | | X | |
| Misc Upd Cd 1—TBMUB1 | | T | | | | | | | | | T | | | | | | | |
| Sv/Restore Code—TBSAVE | X | X | X | X | X | X | X | X | X | X | X | X | X | X | X | X | X | X |

f = From Location
t = To Location
p = Produced To
X = Update the record
T = Updated based on tailoring
1 = Only one field can be updated
Transaction Quantity (user) and UM are loaded from the screen

Summary of Transaction Updates (continued)

| Transaction Type | CA | CC | CH | DI | IA | IM | IP | MI | MR | ON | PC | PR | RA | RC | RS | RT | SA | SC | TC | TP | TR |
|---|---|---|---|---|---|---|---|---|---|---|---|---|---|---|---|---|---|---|---|---|---|
| **File—TRHIST** | | | | | | | | | | | | | | | | | | | | | |
| All Entry Fields—Screen | f | f | f | f | f | f | f | f | t | t | t | t | f | f | t | f | f | t | f | t | f |
| Effect Inv $—THEFIN | | | L | L | L | L | L | L | L | | | L | L | | L | L | L | | L | L | |
| Effect Non-MRP—THEFPQ | | | L | L | L | L | L | L | L | | | L | L | | L | L | L | | L | L | |
| Trans Qty User—THQNTY | | X | X | X | X | X | X | X | X | X | X | X | X | X | X | X | X | X | X | X | X |
| UM (user)—THUMSR | | X | X | X | X | X | X | X | X | X | X | X | X | X | X | X | X | X | X | X | X |
| Trans Qty Std—THSQTY | | X | X | X | X | X | X | X | X | X | X | X | X | X | X | X | X | X | X | X | X |
| Efct Not On Ord—THTENQ | | | | L | L | L | L | L | | | | L | L | | L | L | L | | L | L | |
| Rcvd frm On Ord—THTRON | | | L | | | | | | L | | | | L | | | | | | | | |
| Rcvd to On Ord—THTROH | | | | L | | | | | L | | | L | L | | L | L | L | | L | L | |
| Resc Class—THRSCL | X | X | X | X | X | X | X | X | X | | | X | X | X | X | X | X | X | X | X | X |
| Resc Sub-class—THRSSC | X | X | X | X | X | X | X | X | X | | | X | X | X | X | X | X | X | X | X | X |
| Resource Type—THRSTP | | X | | X | | | | | | | | X | X | | X | X | | X | X | X | |
| Substitute Byt—THSRSB | | | | X | | | | | | | | | X | | | | | | | | |
| Resc Subst for—THSUBR | | | | X | | | | | | | | | | | | | | | | | |
| User Ent Tr Amt—THUTAM | X | | X | | | | | | X | | | | X | | | | X | | | | |
| Unit Cost—THUNCS | | X | X | X | X | X | X | X | X | | | X | X | X | X | X | X | X | X | X | X |
| Slctd Unit Cost—THSELC | | X | X | X | X | X | X | X | X | | | X | X | X | X | X | X | X | X | X | X |
| Extended Cost—THEXCS | | X | X | X | X | X | X | X | X | | | X | X | X | X | X | X | X | X | X | X |
| Trans Amount—THTRAM | X | | T | | | | | | T | | | XT | X | | | | | | | T | |
| Plant—THPLNT | | X | | X | | | | | | X | X | X | X | | X | X | | X | X | X | |
| Res Bal Adj Qty—THRBAQ | | | | | X | X | | | | | | | | | | | | | | | |

Transaction Quantity (user) and UM are loaded from the screen.
The "Effect on Not On Order" (THTENQ) and "Received from On Order" (THTRON) fields are mutually exclusive.

X = Update the record
T = Updated based on tailoring
f = From Location
t = To Location
L = Depends on Location Classification Notes:

1. CC, TC, and TP transactions are generated by ON, SC, and PR.
2. DI transactions are generated by PC but, unlike CC, TC, and TP, they can also be generated by the user.
3. CC transactions only update RMRESR and TRHIST.
4. PODETL and POSUMM are only updated by CH. This happens because CH is the only transaction with a PO number.
5. During TC, if a reservation exists but a location does not, then a LOCDTL record is added.
6. In TREBAT, the user-entered transaction amount field is updated based on the screen field Rpt 0. In TRHIST, this field is updated based on whether a transaction amount was entered.
7. For RA transactions, if the resource is a consumed, calculated cost resource, the only fields updated are TRCTRL, TREBAT, TRHIST, and RMRESR.

Resource Adjustment—MIE44201

An RA transaction is a schedule related transaction which indicates a change to resource consumption or production results for an on going schedule. It is the only type of schedule transaction that can be performed after the schedule is set to a Complete status. This transaction can also be done to a schedule with a launched or Running status.

If the resource is a calculated cost resource, then only the schedule is updated with the adjustment. For the other resources, the schedule and the balance is updated.

Updates

Reminder: This section only contains updates for those files and fields that require a detailed explanation. For the remainder of the updates, please see the *Summary of Transaction Updates* table.

- *LOCDTL:*

Quantity at Location in standard unit of measure:

A. If the quantity is positive and a. the transaction UM and the standard UM are same and, 1. the resource is non-potent, the Quantity At Location in standard UM is the transaction quantity.

2. the resource is potent, the Quantity At Location in standard UM is the transaction quantity extended by the entered potency factor.

b. the transaction UM and standard UM are different and 1. the resource is a non-potent resource, the Quantity At Location in standard UM is the transaction quantity converted to the std UM.

2. the resource is potent, the Quantity At Location in standard UM is the transaction quantity converted to the std UM and then extended by the entered potency factor.

B. If the quantity is negative, and a. the transaction UM and the standard UM are the same, and 1. the resource is non-potent, the Quantity At Location in standard UM is the transaction quantity.

2. the resource is potent, the Quantity At Location in standard UM is the transaction quantity extended by the entered potency factor.

b. the transaction UM and standard UM are different, and 1. the resource is non-potent, the Quantity At Location in standard UM is the transaction quantity multiplied by -1, converted to the standard UM and then multiplied by -1 again.

2. the resource is potent, the Quantity At Location in standard UM is the transaction quantity multiplied by -1, extended by the entered potency factor, converted to the std UM and then multiplied by -1 again.

Quantity At Location in the last received UM:

A. If the resource is non-potent, and a. the last received UM and the standard UM are the same, and 1. the resource is produced, the transaction quantity is added to the Quantity At Location in the last received UM quantity.

2. the resource is consumed, the transaction quantity is subtracted from the Quantity At Location in the last received UM quantity.

b. the last received UM and the standard UM are different, and 1. the resource is produced, the transaction qty is converted to the standard UM, the result is added to the Qty At Location in std UM. Then that result is converted to the last received UM and this qty is the Quantity At Location in the last received UM.

2. the resource is consumed, the transaction qty is converted to the std UM. The result is subtracted from the Qty At Location in standard UM. Then that quantity is converted to the last last received UM. This result is the quantity at the location in the last received UM.

B. If resource is potent, and a. the transaction UM and the standard UM are the same and potency factors are the same, and 1. the resource is produced, the program divides the potency factor at the location into the Quantity At Location in standard UM, then adds the transaction quantity to this quantity. This quantity is updated as the quantity at the location in the last received UM.

2. the resource is consumed, the program divides the potency factor at the location into the Quantity At Location in standard UM, then subtracts the transaction quantity from this quantity. This quantity is updated as the Quantity At Location in the last received UM.

b. the transaction UM and the standard UM are the same and potency factors are different, and 1. the resource is produced, the program converts the transaction quantity into potent units by multiplying the transaction quantity by the potency entered. This quantity is added to the Quantity At Location in standard UM.

The new potency factor is calculated (see beginning of Transaction Entry). The new potency factor is divided into the quantity just calculated. This now becomes the Quantity At Location in last received UM.

2. the resource is consumed, the program converts the transaction qty into potent units by multiplying the transaction qty by the potency entered. This quantity is subtracted from the quantity at the location in standard UM.

The program calculates the new potency factor (see beginning of transaction entry) and divides the new potency factor into the quantity just calculated. This now becomes the Quantity At Location in last received UM.

c. the transaction UM and the standard UM are different and potency factors are the same, and 1. the resource is produced, the program divides the potency factor at the location into the Quantity At Location in standard UM. Then, the transaction quantity is converted to the standard UM. This quantity is converted to the transaction UM and updated into the Quantity At Location in the last received UM.

2. the resource is consumed, the program divides the potency factor at the location into the Quantity At Location in standard UM. Then the transaction quantity converted from the standard UM is subtracted from the result. This quantity is converted to the transaction UM and updated into the Quantity At Location in the last received UM.

d. the transaction UM and the standard UM are different and potency factors are different, and 1. the resource is produced, the transaction qty is converted into potent units by multiplying the transaction qty by the potency entered. This qty is converted to the standard UM. This qty is added to the Quantity At Location in standard UM. The new potency factor is calculated (see beginning of Transaction Entry). Then, the new potency factor is divided into the qty just calculated and converted to the transaction UM. This now becomes the Quantity At Location in last received UM.

2. the resource is consumed, the transaction qty is converted into potent units by multiplying the transaction qty by the potency entered. Then, this qty is converted to the standard UM. The result is subtracted from the Quantity At Location in standard UM.

The new potency factor is calculated (see beginning of Transaction Entry). Then the new potency factor is divided into the qty just calculated and converted to the transaction UM. This now becomes the Quantity At Location in last received UM.

The descriptions for the updating of the Quantity At Location in the last received UM may not exactly correspond to the lines of code which calculate the field. However, the result is the same. For the exact steps taken, please refer to the source code.

*Potency at Location:*

New Potency Factor $$= \frac{PQ(P) + PQ(L)}{\frac{PQ(L)}{PF(L)} + AQ(P)}$$

PQ(P) = Produced Quantity In Potent Units
PQ(L) = Quantity At Location In Potent Units
PF(L) = Potency Factor At Location
AQ(P) = Actual Quantity Produced In Standard UM If the entered potency is different from the potency at the location, the potency at the location is adjusted.

- *LOTMAS:*
  - If a LOTMAS record does not exist and this is a receipt, a new record is created from the user-entered information.
  - If the resource is being consumed, a LOTMAS record must exist.
- *RESBAL:*
  - Date Last Effect on On Hand Quantity = transaction date (user). This date is only updated if the location is classified as On Hand = Yes.

If the resource is being CONSUMED:

- Quantity On Hand is reduced if the location is classified as On Hand = Yes.
- Quantity On Order is reduced if the location is classified as On Order = Yes.
- Date Last Effect on On Hand Quantity = Transaction Date (user)
- This date is only updated if the location was classified as On Hand = Yes.

If the resource is being PRODUCED:

- Quantity On Hand is increased if the location is classified as On Hand = Yes.
- Quantity On Order is increased if the location is classified as On Order = Yes.

- *TRHIST:*
  - Transaction Quantity in user UM and Transaction Quantity in standard UM are updated.
  - See tables on following pages for additional field updates.

| Resource Adjustment Transaction | | | | | | | | | |
|---|---|---|---|---|---|---|---|---|---|
| Locn Attr: | On Order | | On Hand | | $ Value | | Avail Plan | | |
| | Yes | No | Yes | No | Yes | No | 0 | 1 | 2 |
| | *Positive adjustment—consumed resources* | | | | | | | | |
| Fields: THTENQ | " " | "-" | N/A | N/A | N/A | N/A | N/A | | |
| THTRON | " " | " " | N/A | N/A | N/A | N/A | N/A | | |
| THTROH | N/A | N/A | "-" | " " | N/A | N/A | N/A | | |
| THEFIN | N/A | N/A | N/A | N/A | "-" | " " | N/A | | |
| THEFPQ | N/A | N/A | N/A | N/A | N/A | N/A | "-" | " " | " " |
| | *Positive adjustment—produced resources* | | | | | | | | |
| Fields: THTENQ | " " | " " | N/A | N/A | N/A | N/A | N/A | | |
| THTRON | " " | "+" | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |
| | *Negative adjustment—consumed resources* | | | | | | | | |
| Fields: THTENQ | " " | "+" | N/A | N/A | N/A | N/A | N/A | | |
| THTRON | " " | " " | N/A | N/A | N/A | N/A | N/A | | |
| THTROH | N/A | N/A | "+" | " " | N/A | N/A | N/A | | |
| THEFIN | N/A | N/A | N/A | N/A | "+" | " " | N/A | | |
| THEFPQ | N/A | N/A | N/A | N/A | N/A | N/A | "+" | " " | " " |

Table is continued on next page.

| Resource Adjustment Transaction (continued) | | | | | | | | | |
|---|---|---|---|---|---|---|---|---|---|
| Locn Attr | On Order | | On Hand | | $ Value | | Avail Plan | | |
| | Yes | No | Yes | No | Yes | No | 0 | 1 | 2 |
| | *Negative adjustment—produced resource* | | | | | | | | |
| Fields: THTENQ | " " | " " | N/A | N/A | N/A | N/A | N/A | | |
| THTRON | " " | "–" | N/A | N/A | N/A | N/A | N/A | | |
| THTROH | N/A | N/A | "–" | " " | N/A | N/A | N/A | | |
| THEFIN | N/A | N/A | N/A | N/A | "–" | " " | N/A | | |
| THEFPQ | N/A | N/A | N/A | N/A | N/A | N/A | "–" | " " | " " |

*Additional Updates:*
- Resource Class
- Resource Sub-Class
- Substitute byte Y/N—If an RMRESR record was added, this byte is set to Y.

TRCTRL is updated even if this is NOT online updating.

Display-Only Fields:

The following fields are display-only when the resource is a consumed resource.
- Grade
- Revision Level
- Potency Factor Entry Fields:
- Schedule
- OLSN
- Schedule Release Number
- PM Type
- PM Name
- Resource
- Resource Type
- Adjustment Quantity
- Task
- Warehouse
- Location
- Classification
- Lot Number
- Picking Override Sequence
- Grade (only for produced resources)
- Revision Level (only for produced resources)
- Potency Factor (only for produced resources)
- Transaction Amount
- Update Online Byte
- Unit of Measure
- Detail Code
- Year
- Period
- Date
- Time
- Shift Reference Number
Operator
Accounting Group
Job Number
Miscellaneous Field 1
Miscellaneous Field 2
Miscellaneous Field 3
Suspend Byte
Verify Byte
Duplicate Byte
Comment Required Fields:

Schedule
Resource
Lot Number (only if the resource is defined as having lot tracking active, the classification requires lot tracking and a LOCDTL record exists).
Resource Type (only if the resource is both consumed and produced for the schedule).
Adjustment Quantity
Task (only if a resource with the same type exists on more than one task for the schedule).
Warehouse (if it is not a calculated cost resource).
Location (if it is not a calculated cost resource).
Update Online Byte
Suspend Byte
Verify Byte
Duplicate Byte Defaults:

If the system is tailored for single warehouse support, the warehouse defaults to tailoring.
If the warehouse is blank for a consumed resource, Consumed from Warehouse defaults from RMRESR.
If the warehouse is blank for a produced resource, the the Produced to Warehouse defaults from RMRESR.
If the location is blank for a consumed resource, the default for the consumed from location comes from RMRESR.
If the location is blank for a produced resource, the produced to location defaults from RMRESR.
If the OLSN is blank, it defaults to 1 if PM Type and PM name are not entered.
The release number defaults to 1.
The To Classification defaults to the LOCDTL record
The Lot Number defaults to LOCDTL.
The Resource Type defaults to P for a produced resource.
The Resource Type defaults to C for a consumed resource.
If only one task is consuming this resource, the Task defaults to RMRESR.
The PM Type and PM Name defaults to RMODEL
If there is an existing LOCDTL record, the grade defaults to the grade at that location. This is true for both consumed and produced resources.
If a produced resource is entered, the Revision Level defaults to the current revision level.
If Lot Number defaults to LOCDTL (both consumed and produced resources)

If the resource is being consumed or produced and there is an existing LOCDTL record, the potency factor defaults to the potency from the existing LOCDTL record.

If there is no existing LOCDTL record and the resource is a potent resource (check RESMST), the potency factor defaults from RESMST.

If the UM is not entered, User UM is the default.

The Account Group Number defaults to TRDTCD then to tailoring.

The Year defaults to the current year in tailoring

The Period defaults to the current period in tailoring

The Date defaults to the system date.

The Time defaults to the system time.

The Update Online byte defaults to tailoring.

The Shift Number defaults to the status screen.

The Operator's Initials default to the Session Status Screen.

Edits:

If the resource is a calculated cost resource, the location information can not be entered.

Transaction Type is checked for user authorization.

Schedule/OLSN/Release Number must exist in RMODEL

Schedule/OLSN/Release Number must be Launched, Running, or Complete.

If the PM Type is entered, PM Name is required.

If the PM Name is entered, PM Type is required.

If the PM Type and PM Name is entered, there must be a schedule in RMODEL (with the proper status).

The resource must exist in RESMST.

The resource must exist in RMRESR for the schedule/OLSN/Release/Resource.

There must be a LOCDTL record for this Resource/Warehouse/Location.

The quantity cannot be zero.

The quantity cannot be greater than what is available at the location. This means that the transaction quantity must be less than or equal to (quantity at locn (Std)—reserved quantity to sales).

The Task is required if a consumed resource is entered and more than one task (on this schedule) is consuming this resource.

If a Task is entered, it must exist in RMRESR for this Schedule/OLSN/Release/Resource.

The Task CAN have a status of complete or closed.

The Task must be defined in RMTASK for this Schedule/OLSN/Release Number.

If a grade is entered, an edit checks for a LOCDTL record with a different grade.

The entered resource must have a revision level equal to or greater than the earliest acceptable revision level in RESMST.

The Lot Number is required if the resource has lot tracking active and if the from Classification Code specifies that lot tracking is active.

The Lot Number entered and the Lot Number in LOCDTL must be the same.

If there is no existing LOCDTL record, and the resource is a potent resource (check RESMST), the potency factor must be entered.

If the resource entered is a produced resource, the classification code must be active.

The Resource Type must be P or C

The Update Online byte must be Y or N.

If the unit of measure is entered, it must be convertible to standard unit of measure The Transaction Detail Code must be valid.

The Period cannot be CLOSED.

The Date must be valid.

The Time must be valid.

The Suspend byte must be Y or N.

The Verify byte must be Y or N.

The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK13 | Resource Substitution Inquiry |
| CK19 | Return to Transaction Selection Screen |

Command Keys (Non-Display):

| | |
|---|---|
| CK07 | Send Message To Action List |
| CK17 | Error Message Override |
| HELP | Help Text |

Scrap Transaction—MIE44202

An SC transaction is always performed for an on going schedule. When an SC transaction is performed for a consumed resource, it represents a consumed resource that was not used for production purposes but somehow was wasted. This transaction is also performed for a produced resource. This indicates that the process has completed but the product was somehow unusable.

The Scrap transaction generates TC (theoretical consumption), TP (theoretical production), and CC (calculated consumption) transactions when it is being performed for a produced resource only.

When doing a Scrap transaction for a produced resource, the operator has the option of setting all task statuses to Complete. Only tasks that are prior to the task of the transaction are set to complete. If the task is the last task on the production model, the All Tasks are Complete byte in RMODEL is set to Y.

If the Scrap transaction is for a produced resource, the Number of Earned Batches in RMODEL is updated. A Scrap transaction for a produced or consumed resource sets on the REPLAN Flag in RESMST.

When a schedule or task is completed, reservations are deleted. This transaction allows the operator to set the status to complete, but no reservations are deleted online. A separate menu option (Complete Schedules) must be taken to back out those reservations for the completed Schedule/OLSN/Release/Tasks.

A Scrap transaction can be done for a stream resource.

Updates

Reminder: This section only contains updates for those files and fields that require a detailed explanation. For the remainder of the updates, please see the *Summary of Transaction Updates* table.

The following updates apply only to the actual SC transaction. See the descriptions for TC and CC transactions for their updates.

- *RMODEL:*

P = Adj Quantity in Std UM divided by Quantity Rel to PM Batch multiplied by the production distribution percentage.

P is added to the Earned PM Batches field in RMODEL.

Task Complete Code is set to Y if the operator selected to complete the task, and the task was the last task on the production model.

Actual PM Completion Date is NOT updated. This date is updated when the menu Schedule Completion option is taken.

- *RMTASK:*

The following updates are done for ALL TASKS prior to the task on this Schedule/OLSN/Release #.

If Completion Code is Y, status is C for complete.

Actual completion date is transaction date (user entered).

The task completion date is NOT updated unless the completion date is currently still at zero.

- *TRHIST:*

Produced/Consumed Resource For A Scrap Trans = (P or C).

THTRON, THTENQ, THTROH, THEFIN, THEFPQ are blank for this transaction.

TRCTRL is updated even if this is NOT online updating.

Entry Fields:

Schedule
OLSN
Schedule Release Number
PM Type
PM Name
Resource
Resource Type
Quantity
Task
Potency Factor (only for produced resources)
Complete Tasks Byte
Update Online Byte
Update System Transaction Byte
Unit of Measure
Detail Code
Year
Period
Date
Time
Shift
Reference Number Operator
Accounting Group
Miscellaneous Field 1
Miscellaneous Field 2
Miscellaneous Field 3
Suspend Byte
Verify Byte
Duplicate Byte
Comment Required Fields:

Schedule
Resource (if not a stream resource)
Resource Type (if the resource is both consumed and produced for the schedule)
Task (only if a resource with the same type exists on more than one task for the schedule)
Quantity
Complete Tasks Byte
Update System Transaction Byte
Update Online Byte
Suspend Byte
Verify Byte
Duplicate Byte Defaults:

If the system is tailored for single warehouse support, the warehouse defaults to tailoring.
If the OLSN is blank, it defaults to 1 if PM Type and PM Name are not entered.
The Release Number defaults to 1.
The Resource Type defaults to P for a produced resource.
The Resource Type defaults to C for a consumed resource.
If only one task is consuming this resource, the task defaults to RMRESR.
The PM type and PM name defaults to RMODEL.
If the UM is not entered, the default is user UM in RMRESR.
The Account Group Number defaults to TRDTCD then to tailoring.
Year defaults to the current year in Tailoring.
Period defaults to the current period in Tailoring.
Date defaults to the system date.
Time defaults to the system time.
Update Online byte defaults to Tailoring.
Update System Transactions byte defaults to Tailoring.
The Shift Number defaults to the Status Screen.
The Operator's Initials default to the Session Status Screen.

Edits:

Transaction Type is checked to make sure the user is authorized.
Schedule/OLSN/Release Number must exist in RMODEL.
Schedule/OLSN/Release Number cannot be Completed or Closed.
If the PM type is entered, PM name is required.

If the PM name is entered, PM type is required

If the PM Type and PM Name is entered, there must must be a schedule in RMODEL (with the correct status).

The resource must exist in RESMST.

The resource must exist in RMRESR for the Schedule/OLSN/Release/Task/Resource Type.

The Quantity cannot be zero.

The Quantity cannot be negative.

The task is required if a consumed resource is entered and more than one task (on this schedule) is consuming this resource.

The task is required if scrapping a stream resource.

Potency Factor must be blank for a non-potent resource.

The task CANNOT have a status of Complete or Closed.

The task must be defined in RMTASK for this Schedule/OLSN/Release Number.

The resource type must be P or C.

The Update Online byte must be Y or N.

If the unit of measure is entered, it must be convertible to standard unit of measure.

The Transaction Detail Code must be valid.

The Period cannot be closed.

The Date must be valid.

The Time must be valid.

The Suspend byte must be Y or N.

The Verify byte must be Y or N.

The Duplicate byte must be Y or N.

The Complete Tasks byte must be Y or N.

The Update Online byte must be Y or N.

The Update System Transaction byte must be Y or N.

Command Keys (Display):

| | |
|---|---|
| CK01 | Session Status |
| CK02 | Page Forward |
| CK03 | Page Backward |
| CK05 | Comments |
| CK08 | Detail Codes |
| CK11 | Alpha Search |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

DIRECT ISSUE—MIE44203

A DI transaction is used to indicate that a resource is consumed or used by an on going transaction. A direct issue cannot be done for a resource, if the PM defines that resource as a theoretically consumed or calculated cost resource.

The operator can issue a substitute resource or an additional resource. If a substitute is being performed, the user enters the original resource. If an addition is being performed, the original resource is left blank. If the original resource is entered, the RESSUB file is checked to determine if this is a valid substitution.If the original resource is blank, there is no edit against the substitution file.

To determine if the resource is a valid substitution, the RESSUB is checked. When this file is checked, not only does a record have to exist in this file for the resource/original resource, but the transaction date must be in the range of the effectivity dates.

A direct issue of a resource that is not defined on this PM, (i.e., issuing a substitute resource or an additional resource) is permitted, but the program sends a UDS warning message.

The operator receives a warning if a substitution is entered for a theoretically consumed resource. The system sends an overridable message if an issue is done for a resource whose shelf life has expired.

If a substitution or addition is made, the substitute byte in TRHIST is set to Y.

Updates

Reminder: This section only contains updates for those files and fields that require a detailed explanation. For the remainder of the updates, please see the *Summary of Transaction Updates* table.

Before doing any updates, the transaction quantity must be converted to standard UM. All file quantities are in standard UM unless otherwise specified. The full transaction quantity is used for updates unless noted otherwise.

- *LOCDTL:*

Quantity At Location (in last received UM): Full Location Quantity is converted to last received UM. That quantity is updated to Quantity At Location last UM.

Quantity Reserved: The Quantity Reserved at the location is compared to the trans quantity. If the Quantity Reserved is less than the Transaction Quantity, Quantity Reserved is subtracted from Transaction Quantity. If the Quantity Reserved is greater than or equal to the Transaction Quantity, Transaction Quantity is subtracted from Quantity Reserved. The Quantity Reserved field is never negative.
- *RMTASK:*

Task Status is updated to Running.

Actual Start Date is ONLY updated if the start date is zero.

When updating, transaction date (user-entered) is used.
- *RESBAL:*

Number of transactions since the last cycle count

Quantity Reserved: This is updated using ONLY the quantity that was reduced from the Quantity Reserved field in LOCDTL. This is not always the full transaction quantity.

Quantity On Order: If the From Location was classified as On Order = Y.

Quantity On Order is reduced using transaction quantity in standard UM.

On Hand Quantity: If the From Location was classified as On Hand = Y, On Hand Quantity is decreased using trans quantity in standard UM.

Date of Last Effect on On Hand Quantity: If the From Location was classified as On Hand = Y, then today's date is the Date of Last Effect.

- *RMODEL:*

Release Status is updated to Running status if the status is not already Running.

Actual Start Date is updated with the user-entered transaction date, ONLY if the actual start date equals zero.

- *RMTASK:*

Task Status is updated to Running status if the status is not already Running.

Actual Start Date is updated with the user-entered transaction date, ONLY if the actual start date equals ZERO.

- *RMRESR:*

Reduced from Reserved Quantity is increased using the quantity that was used to update the Quantity Reserved field in LOCDTL. This field is not always updated using the Full Transaction Quantity (see *LOCDTL* updates above).

If this is a substitute resource issue, an RMRESR record is added using all the same information as the original resource but using the substitute resource instead of the original resource.

PM Type is extracted from RMODEL using the entered Schedule/OLSN/Release #.

PM Name is extracted from RMODEL using the entered Schedule/OLSN/Release #.

Task Name is the entered task name.

Resource Type is C (consumed).

Resource = Entered Resource (not original resource).

Resource Description is extracted from RESMST.

Quantity Relative to Batch Size is zero.

Quantity Relative to Task Batch Size is zero.

Resource Standard UM is extracted from RESMST.

Quantity in non-standard UM is Transaction Quantity.

UM (user-defined) is the Transaction UM.

Quantity Type Code = Q for quantity (versus ratio).

Resource (ratio) is zero.

Resource Number—ratio = blanks.

Note: The two fields directly below do NOT apply to consumed resources.

Production Distribution % = zero.

Cost Distribution % = zero.

Resource Class is extracted from RESMST.

Resource Sub-Class is extracted from RESMST.

Beginning Effectivity Date defaults to 000000.

Ending Effectivity Date defaults to 999999.

Documentation Location Code override is blank.

Reportable Resource equals N.

Superflushable Resource equals N.

Theoretical Usage Code equals D (direct issue only).

Consumed/Produced from Warehouse is blank.

Consumed/Produced from Location is blank.

Inventory Classification equals blanks.

Schedule Priority Number equals zero.

Hist Average Quantity in standard batch size equals zero.

Last Quantity in Standard UM relative to batch size equals zero.

Average Quantity for Last Complete Period equals zero.
Average Quantity Year to Date equals zero.
Cost of Resource is extracted from RESMST.
Use Net Realizable Value defaults to RESMST.
Recosting required equals N.
All Rolled Up Costs equals zero.
Historical Average Cost equals zero.
Last Period Average YTD average cost equals zero.
Standard Cost is extracted from RESMST.
Fixed Cost is extracted from RESMST.
Grade Level Upper equals blanks.
Grade Level Lower equals blanks.
Batch Consumption defaults from RESMST.
Setup Quantity equals zero.
Clean Up Quantity equals zero.
Dependent Operation Name equals blanks.
Dependent Operation byte equals blanks.
Dependent Resource byte equals blanks.
Dependency on this Resource equals blanks.
Number of Dependencies equals zero.
Stream Resource equals blanks.
Prime PM Type override equals blanks.
Prime PM Name override equals blanks.
Print on document (only used if the quantity is zero) is Y.
Date Entered = Transaction Date (user).
Substitute Resource byte equals Y.
The Substitute Resource byte is set to Y regardless of whether the resource is a substitute or just an addition.
If the Original Resource # was entered, Resource # Substituted For is updated.

- *TRHIST:*

| Direct Issue Transaction | | | | | | | | | |
|---|---|---|---|---|---|---|---|---|---|
| Locn Attr: | On order | | On Hand | | $ value | | Avail plan | | |
| | *Yes* | *No* | *Yes* | *No* | *Yes* | *No* | *0* | *1* | *2* |
| Fields: | *Balance resource* | | | | | | | | |
| THTENQ | " " | "-" | N/A | N/A | N/A | N/A | N/A | | |
| THTRON | " " | " " | N/A | N/A | N/A | N/A | N/A | | |
| THTROH | N/A | N/A | "-" | " " | N/A | N/A | N/A | | |
| THEFIN | N/A | N/A | N/A | N/A | "-" | " " | N/A | | |
| THEFPQ | N/A | N/A | N/A | N/A | N/A | N/A | "-" | " " | " " |
| Fields: | *Non-balance resource* | | | | | | | | |
| THTENQ | " " | | N/A | | N/A | | N/A | | |
| THTRON | " " | | N/A | | N/A | | N/A | | |
| THTROH | N/A | | " " | | N/A | | N/A | | |
| THEFIN | N/A | | N/A | | " " | | N/A | | |
| THEFPQ | N/A | | N/A | | N/A | | " " | | |

*Additional Updates:*

Transaction Quantity in standard UM
Transaction Quantity in user UM
Resource Class
Resource Sub-Class
TRCTRL is updated even if this is not online updating.

Display-Only Fields:

Lot Number
Grade
Revision Level

Entry Fields:

Schedule
OLSN
Schedule Release Number
PM Type
PM Name
Resource
Quantity
Task
Warehouse
Location
Original Resource
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Update Online Byte
Suspend Byte
Verify Byte
Duplicate Byte

Defaults:

If the system is tailored for single warehouse support, the warehouse defaults to tailoring.

If the warehouse is blank for a consumed resource, the default for the Consumed From Warehouse is from RMRESR.

If the location is blank for a consumed resource, the the Consumed From Location defaults from RMRESR.

If the OLSN is blank, it defaults to 1 if PM Type and PM name were not entered.

The Release Number defaults to 1.

The Lot Number defaults to LOCDTL

If only one task is consuming this resource, the Task defaults to RMRESR.

The PM type and PM name default to RMODEL

If there is an existing LOCDTL record, the grade defaults to the grade at that location.

The Potency Factor defaults to the potency from the existing LOCDTL record.

If the UM is not entered, it defaults to the last received UM.

The Account Group Number defaults to TRDTCD then to tailoring.

The Year defaults to the current year in Tailoring.

The Period defaults to the current period in Tailoring.

The Date defaults to the system date.

The Time defaults to the system time.

The Update Online byte defaults to Tailoring.

The Shift Number defaults to the Status Screen.

The Operator's Initials default to the Session Status Screen.

Edits:

The Resource/Warehouse/Location must exist in LOCDTL.

If the resource is a calculated cost resource, the location information can not be entered.

Transaction Type is checked to make sure the user is authorized.

Schedule/OLSN/Release Number must exist in RMODEL.

Schedule/OLSN/Release Number must be Completed or Closed.

If the PM Type is entered, PM Name is required.

If the PM Name is entered, PM Type is required.

If it the PM Type and PM Name is entered, there must must be a schedule in RMODEL (with the correct status).

The resource must exist in RESMST.

The resource must exist in RMRESR for the schedule/OLSN/Release/Resource.

The resource must not be defined as a TC or CC resource on the PM defined in PMRESR.

The resource must be consumed for the entered PM.

The original resource must exist in RESMST.

The original resource must not be defined as a TC or CC resource on the PM defined in PMRESR.

The original resource must be defined in RESSUB as a valid substitution for the entered resource.

There must be a LOCDTL record for this Resource/Warehouse/ Location.

The Quantity cannot be zero.

The Quantity cannot be greater than what is available at the location. This means that the Transaction Quantity must be less than or equal to Quantity At Locn (Std) minus Reserved Quantity To Sales.

If a Task is entered, it must exist in RMRESR for this Schedule/OLSN/Release/Resource.

The Task CANNOT have a status of Complete or Closed.

The Task must be defined in RMTASK for this Schedule/OLSN/Release Number.

The Update Online byte must be Y or N

If the unit of measure is entered, it must be convertible to the standard unit of measure The program checks for reservations for the Schedule/OLSN/Release Number/Task/Resource/Warehouse/Location.

The Transaction Detail Code must be valid.

The Period cannot be closed.

The Date must be valid.

The Time must be valid.

The Suspend byte must be Y or N.

The Verify byte must be Y or N.

The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK13 | Resource Substitution Inquiry |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

Pick Complete—MIE44204

A PC transaction is performed for a task or schedule. It is performed to indicate that all consumed resources for that task have been consumed as expected. When such a transaction is performed, the system generates a direct issue transaction for every consumed resource on that task which is not theoretically consumed or cost-calculated. The user can also enter limits by Documentation Location code (found in RMRESR). This defines the limits for resource selection.

To process this transaction, lower limits are set to the RMRESR file using whatever data is entered. For example, if the user entered Schedule/OLSN/Rel #, all three fields are used to set lower limits. If s/he only entered the Schedule, then only Schedule is used. A RMRESR record is read. If the record matches the entered data, the program checks to determine if this is a direct issue consumed resource for this PM. If it is and if the Documentation Location Code is within the limits, the pick complete subroutine is executed. When executing the pick complete subroutine, the system direct issues (DI) are generated and the files are updated.

There are two tailoring questions for the pick complete transaction. One determines if the pick complete transaction is updated online, and the other determines if the system-generated transactions are updated in batch or online. These tailoring questions serve as a default. The user has the option of performing a run time override Another tailoring question determines what the Transaction Detail Code is for system-generated issue transactions. This is done because both operator and system can generate DI transactions, and the transaction detail code can be used to differentiate between the two.

The operator can enter a quantity for the pick complete.This quantity refers to the Schedule Run Quantity. This quantity is used as follows: suppose the Schedule Run Quantity equals 1000 cases, but the batch size is 100 cases and the batch takes one day to run. The operator could perform a pick complete at the beginning of the week for only 500 cases and then next week a pick complete for another 500 cases. Or, s/he could perform a pick complete each morning for 100 cases. By doing this, all the resources needed for the ENTIRE schedule are not considered issued until they are actually necessary.

The program continues to read all reservation records for this Schedule/OLSN/Release or Schedule/OLSN/Rel/Task (depending on what is entered on the transaction). Processing ends after all the valid RESRES records are read and processed. The transaction register or batch list report is used to show the system-generated issues.

If no reservations exist for the resource, no issue transaction is generated. If reservations do exist for the resource only the Remaining Reserved Quantity is issued. For example, suppose the program calculated the Quantity to Issue for this resource as equal to 100. However, only one reservation record exists for that resource and the reservation is for 100, but 70 have already been issued from that reservation. This program generates an issue transaction for a quantity of 30, not 100.

Each system-generated transaction has a new transaction number. The transaction number is updated one by one, each time a transaction is generated. The system-generated issue transactions have a tailoring default for Transaction Detail Code. By defining a default Transaction Detail Code for system-generated issues, the operator is able to identify which direct issue transactions were generated by the system rather than the user.

If the operator wishes to see the system-generated direct issue transactions, the Batch List Report can be run. The batch list report can be selected from the Batch Status Screen or from the Report Menu.

Steps For A Pick Complete

A. The issue ratio is calculated.

B The next direct issue consumed resource for this Schedule/OLSN/Rel #/Task is found.

C. The Quantity To Issue for this resource is calculated.

D. The reservations for this Schedule/OLSN/Rel #/Task are found.

E. UPDATES—Updates for consumed resource:

a. A DI transaction is written to TRHIST.

b. RESBAL, LOCDTL, RMRESR, and possibly RESRES and LOTMAS are updated.

*Example:*

A. The issue ratio is calculated.

Example: Suppose the schedule is for 1000 cases of soup. The operator entered a quantity of 600 cases:

600/1000 = 0.6 = Issue Ratio

The entered quantity is the quantity the operator entered on the PC transaction. If the operator leaves the quantity blank during transaction entry, the quantity defaults to the Schedule Run Quantity.

The entered quantity from the PC transaction must be in the same UM as the Schedule Run Quantity. The schedule Run Quantity UM is found in RMODEL.

B. The next direct issue consumed resource for this Schedule/OLSN/Rel/Task is found.

If this is the first cycle, lower limits are set to RMRESR using the Schedule/OLSN/Release/Task that is entered on the Pick Complete transaction. If all tasks are to be picked, the first task on the Schedule/OLSN/Rel is read. While reading the RMRESR file, the program edits that the resource is:

a. a consumed resource for this Schedule/OLSN/Release/ Task;

b. a direct issue resource.

If no more RMRESR records exist for this Schedule/ OLSN/Rel/Task, the procedure continues with the next task if all tasks are being picked. If only one task is being picked, the procedure ends.

C. The Quantity to Issue for this resource is calculated.

Quantity Allocated x Issue Ratio = Quantity to Issue

The Quantity Allocated is found in RMRESR. The ratio was calculated above in part A. If the Quantity to Issue for this resource is less than or equal to zero, the next RMRESR record is read (Step B).

D. The reservations for this Sched/OLSN/Rel/Task/ Resource are found.

LOOP1—TAG

A *reservation* record is read for this Schedule/OLSN/ Release/Task/Resource. The task is not from the Pick Complete transactions. It is the task found in Step B.

If the CHAIN succeeds, the Quantity Reserved is compared to Reduced from Reserved Quantity. If Quantity Reserved is greater, Reduced from Reserved Quantity is subtracted from Quantity Reserved. The difference is the Quantity Being Issued at this location.

Next, the program CHAINs to the Location Detail record for this reservation. Regardless of the Quantity Available at this location, if there is a Location Detail record, the following fields are reduced by the Quantity Being Issued from this location:

Quantity at Location (standard UM)

Quantity at Location (last UM)

Quantity Reserved to Manufacturing

The Quantity at Location is allowed to become negative, but the Reserved Quantity is not. If the Reserved Quantity is negative, the field is set to zero. To update the Quantity at Location (last received UM), the Total Quantity at the location is converted to the last received UM (defined in the LOCDTL record).

If a reservation record is found and the Reduced From Reserved Quantity is less than the Quantity Reserved, but no LOCDTL record exists for that location, a LOCDTL record is added. This record has a negative Quantity At Location, and the Reserved Quantity is equal to zero.

Updates

Reminder: This section only contains updates for those files and fields that require a detailed explanation. For the remainder of the updates, please see the *Summary of Transaction Updates* table.

- *LOCDTL (New record):*
  - Location = To Location from reservation record
  - Warehouse = To Warehouse from reservation record
  - Resource = From Reservation Record
  - Grade = Blank
  - Lot = Blank
  - Quantity At Location (standard) equals the Quantity Being Issued from this location (only negative).
  - Standard UM is extracted from RESMST.
  - Resource Class is extracted from RESMST.
  - Resource Sub-Class is extracted from RESMST.
  - Quantity in Last Received UM is zero.
  - Last Received UM is blank.
  - Potency Factor defaults to RESMST.
  - Potent Units—calculated.
  - Revision Level defaults to current revision level (RESMST).
  - Classification Code defaults to tailoring.
  - All Classification Bytes loaded based on default class code.
  - Quantity Reserved—manufacturing is zero.
  - Quantity Reserved—sales is zero.
  - Last Date Received = system date.
  - Last Time Received = system time.
  - ETD = zero.
  - Net Activity field = zero.
  - Shelf Life expiration date = zero.
  - FIFO date = zero.
  - The Total Quantity To Be Issued for this resource is reduced by the Quantity Issued from that location.
  - If the Total Quantity To Be Issued for this resource is greater than zero, the program goes to the LOOP.
  - The LOOP stops as soon as the Total Quantity To Be Issued for this resource has been issued, or if no more reservation records for this Schedule/OLSN/Rel #/Task/Resource exist.
  - If the Total Quantity To Be Issued for this resource is issued, RESBAL, LOCDTL, LOTMAS, RMRESR, and RESRES are updated and part C is repeated (i.e., the next RMRESR record is read).
- *LOCDTL (Existing Record):*
  - Quantity at Location (in standard UM) is reduced using Quantity Issued from this Location.
  - Quantity at Location (in last received UM) is reduced.
  - Quantity Reserved—The Quantity Reserved at the location is compared with the Transaction Quantity. If the Quantity Reserved is less than the Transaction Quantity, Quantity Reserved is subtracted from the Transaction Quantity. If Quantity Reserved is greater than Transaction Quantity, Transaction Quantity is subtracted from Quantity Reserved. The Quantity Reserved field is never negative.
  - (Note: Transaction Quantity means the quantity being issued for this resource.)

- *RESBAL:*
  - Number of transactions since the last cycle count is updated.
  - Quantity Allocated is NOT updated.
  - Manufacturing Reserved Quantity is only reduced by what was actually consumed from reservations (i.e., if no reservations existed, this field is not reduced).
  - Quantity Consumed to Date is increased using Quantity Issued From This Location
  - Total Quantity Present is reduced using Quantity Issued From This Location.
  - Quantity On Order: If the From Location was classified as On Order = Y, Quantity On Order is reduced using Transaction Quantity in standard UM.
  - On Hand Quantity: If the From Location was classified as On Hand = Y, On Hand Quantity is reduced using Transaction Quantity in standard UM.
  - Date of Last Effect on On Hand Quantity: If the From Location was classified as On Hand = Y, then today's date is the Date of Last Effect.
  - Date Last Activity is today's date.
- *LOTMAS:*
  - If the From Location had a lot number, the LOTMAS file is updated.
  - Quantity Issued increased using Quantity Issued from this Location in Standard UM.
- *RMRESR:*
  - Quantity Allocated is NOT updated.
  - Quantity Reserved is NOT updated.
  - Quantity Issued is increased using Quantity Issued from this Location.
  - Quantity Reduced From Reserved is increased using the quantity used to reduce the quantity reserved field in LOCDTL. This Quantity may not be equal to the Quantity Issued From This Location. See LOCDTL updates.
- *RESRES:*
  - Quantity Reserved is NOT updated.
  - Quantity Issued increased by the Quantity Issued From This Location.

The updates following only update the actual PC transaction. All updates for the system issues that are generated are defined further below.

- *TRHIST:*
  - See Transaction Summary table.
- *TRCTRL:*

This file is updated even if this is NOT online updating. This is in addition to the list at the beginning of the transaction summary section.

The following fields are only updated by one. This means that any system-generated issues are not included in the batch status totals.

Number totals for Issue Transactions
Number of Suspended Transactions
Number of Updated Transactions
Number of Error Transactions
Total Number of Transactions entered Entry Fields:

Schedule
OLSN
Schedule Release Number
PM Type
PM Name
Quantity
Task
Documentation Code Lower Limit
Documentation Code Upper Limit
Update Online Byte
Update System Transaction Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Update Online Byte
Update System Transaction Byte
Suspend Byte
Verify Byte
Duplicate Byte Defaults:

If the OLSN is blank, it defaults to 1 if PM Type and PM Name are not entered.
The Release Number defaults to 1.
The Quantity defaults to the Schedule Run Quantity.
The PM Type and PM Name defaults to RMODEL.
If the UM is not entered, it defaults to the PM Batch Size UM from RMODEL.
Documentation Lower Limit defaults to blanks.
Documentation Upper Limit defaults to 99999.
Account Group Number defaults to TRDTCD then to tailoring.
Year defaults to the current year in tailoring.
Period defaults to the current period in tailoring.
Date defaults to the system date.
Time defaults to the system time.
Update Online byte defaults to tailoring.
Update System Transaction Byte defaults to tailoring.
Shift Number defaults to the Session Status Screen.
Operator's Initials default to the Session Status Screen.

Edits:

The Schedule/OLSN/Release must exist in RMODEL.
The Schedule Status cannot be complete or closed.
Transaction Type is checked to make sure the user is authorized.
The entered Task must exist in RMTASK.
If the PM Type is entered, PM Name is required.
If the PM Name is entered, PM Type is required.
If the PM Type and PM Name are entered, then there must be a schedule in RMODEL (with the correct status).
The entered UM must be the same as the PM Batch Size UM.
The Update Online byte must be Y or N.
Transaction Detail Code must be valid.
Period cannot be closed.
Date must be valid.
Time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK05 | Comments |
| CK08 | Detail Codes |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Production Receipt—MIE44205

A PR transaction allows the operator to receive the produced resources from a schedule to a location in the warehouse. The warehouse defaults from the resource on the production model. If it is not defined there, it defaults from the Resource Master File (RESMST).

When entering a production receipt, the user must specify the attributes of the location where the resource is going. The Location Classification Code defaults from the Location Detail file if a LOCDTL record exists. If there is no existing LOCDTL record, the Classification Code defaults from the RMRESR record. If the RMRESR record is blank, the default is from RESMST.

The PR transaction generates the TC (theoretical consumption), TP (theoretical production), and CC (calculated cost) transactions. IMPORTANT: When doing a negative production receipt, a negative TC, TP, and CC are performed if applicable.

When a production receipt is performed, the operator has the option of setting all task statuses to Complete. If the operator selects to complete all tasks, only those tasks that are prior to the task being received against and the task that is being completed are set to Complete. If the task that is being completed is the last task on the schedule, the All Tasks are Complete byte in RMODEL is set to Y.

When a task is completed, reservations that are outstanding may be deleted. Reservations may be deleted (backed out) by a separate menu option.

Updates

Reminder: This section only contains updates for those files and fields that require a detailed explanation. For the remainder of the updates, please see the *Summary of Transaction Updates* table.

• *LOCDTL (Existing Record):*

Quantity at location in standard unit of measure:

A. If the Quantity is positive and a. the transaction UM and the standard UM are the same and, 1. the resource is non-potent, the transaction quantity is added to the quantity at location in standard UM.
2. the resource is a potent resource, the transaction quantity extended by the entered potency factor is added to the quantity at locn in standard UM.

b. the transaction UM and standard UM are different and 1. the resource is a non-potent resource, the transaction quantity converted to the std UM is added to the quantity at location in standard UM.
2. the resource is a potent resource, the transaction quantity converted to the standard UM and then extended by the entered potency factor is added to the quantity at location in standard UM.

B. If the Quantity is negative, and a. the transaction UM and the standard UM are the same, and 1. the resource is non-potent, the transaction quantity is added to the quantity at location in standard UM.
2. the resource is a potent resource, the transaction quantity extended by the entered potency factor is added to the quantity at location in standard UM b. the transaction UM and standard UM are different, and 1. the resource is a non-potent resource, the transaction quantity multiplied by -1, converted to the standard UM and then multiplied by -1 again is added to the quantity at location in standard UM.
2. the resource is a potent resource, the transaction quantity multiplied by -1, extended by the entered potency factor. Then, it is converted to the standard UM and then multiplied by -1 again is added to the quantity at location in standard UM.

Quantity at location in the last received UM, and

A. resource is non-potent, and a. the transaction UM and the standard UM are the same, the transaction quantity is added to the quantity at location in standard UM then this becomes the quantity at location in the last received UM.

b. the transaction UM and the standard UM are different, the transaction quantity is converted to the standard UM, then added to the quantity at location in standard UM. The result is converted to the the transaction UM, and this quantity is the quantity at location in the last received UM.

B. resource is potent, and a. the transaction UM and the standard UM are the same and potency factors are the same, the potency factor at the location is divided into the quantity at location in Standard UM, then added to the transaction quantity. This quantity is updated as the quantity at location in the last received UM.

b. the Transaction UM and the standard UM are the same and Potency Factors are different,the transaction quantity is converted into potent units by multiplying the transaction quantity by the potency entered. This quantity is added to the quantity at location in standard UM. The new Potency Factor is calculated (see beginning of transaction entry) and divided into the quantity just calculated. This now becomes the quantity at location in last received UM.

c. the transaction UM and the standard UM are different and potency factors are the same, the potency factor at the location is divided into the quantity at location in Standard UM and added to the transaction quantity converted to the standard UM. This quantity is converted to the transaction UM and updated into the Quantity at Location in the last received UM.

d. the transaction UM and the standard UM are different and potency factors are different, the transaction quantity is converted into potent units by multiplying the transaction quantity by the potency entered. This quantity is converted to the Standard UM. This quantity is added to the quantity at location in standard UM.

The new potency factor is calculated (see beginning of transaction entry) and divided into the quantity just calculated.Then it is converted to the transaction UM. This now becomes the quantity at location in last received UM.

Note: The descriptions for the updating of the quantity at location in the last received UM may not exactly correspond to the lines of code which calculate the field. However, the result is the same. For the exact steps taken, please refer to the source code.

Quantity at location in the standard UM, and

A. resource is non-potent, and a. the transaction UM and the standard UM are the same, the transaction quantity is added to the quantity at location in standard UM.

b. the transaction UM and the standard UM are the different, the transaction quantity is converted to the standard UM and added to the quantity at location in standard UM.

B. resource is potent, and a. the last received UM and the standard UM are the same, the transaction quantity is multiplied by the potency factor and then added to the quantity at location in standard UM.

b. the last received UM and the standard UM are different, the transaction quantity is converted to the standard UM then multiplied by the potency factor. This quantity is added to the quantity at location in standard UM.

Last Received UM = Transaction UM
Date Last Received = Transaction Date (user)
Time last Received = Transaction Time (user)
Trans # of Last Receipt = Trans #

Estimated Time of Departure is calculated:
a. A CHAIN is done to the CLASCD file to find the number of days expected in that classification;
b. That number of days is added to the transaction date.

Shelf life expiration equals transaction date plus number of shelf life days. If the transaction does not have a shelf life, this date is set to 99/99/99.

FIFO Date

Transaction Date

Potency Factor

If the entered potency is different from the location potency, the new potency factor is calculated by the following formula:

New Potency Factor $$= \frac{PQ(P) + PQ(L)}{\frac{PQ(L)}{PF(L)} + AQ(P)}$$

PQ(P) = Produced Quantity In Potent Units
PQ(L) = Quantity At Location In Potent Units
PF(L) = Potency Factor At Location
AQ(P) = Actual Quantity Produced In Standard UM

- *LOCDTL (New record):*

Location number is from entry screen.
Warehouse is from entry screen.
Resource is from entry screen.
Grade is from entry screen.
Lot number is from entry.
Quantity At Location (std) equals the transaction quantity converted to std UM.
Standard UM is taken from the RESMST.
Resource Class is extracted from RESMST.
Resource Sub-Class is extracted from RESMST.
Quantity in Last received UM equals Transaction Quantity.
Last Received UM equals Transaction UM.
Potency Factor is from entry screen (if blank default from RESMST).
Revision Level is from entry screen.
Classification code is from entry screen.
All Classification bytes—CHAIN to CLASCD.
Quantity Reserved—manufacturing is set to zero.
Quantity Reserved—sales is set to zero.
Last Date received is user-entered transaction date.
Last Time Received is user-entered transaction time.
FIFO date equals transaction date.

Estimated Time of Departure is calculated:

a. A CHAIN is done to the CLASCD file to find the # of days expected in that classification.
b. It is determined if the # of days is defined in calendar days or work days (defined in CLASCD file).
c. That number of days is added to the transaction date.

Picking Override Sequence Number: See rules for updating.

Shelf Life Expiration Date is calculated using shelf life days.

If the transaction does not have a shelf life, this date is set to 99/99/99.

- *LOCMAS (New record):*

Warehouse = entered warehouse #

Location = entered location #

Date Last Maintenance = User-entered transaction date

Picking Override Sequence Number defaults from tailoring.

- *LOTMAS (Existing record):*

Total Lot Quantity Received is increased.

Date Last Received equals transaction date.

If no LOTMAS record exists and this is a receipt, a new record is added.

Lot # = entered Lot #

Resource # = entered Resource #

Schedule = entered

OLSN = entered

Rel # = entered

PM Type is either entered or extracted from RMODEL.

PM Name is either entered or extracted from RMODEL.

First Receipt Date = Transaction Date (user)

Last Receipt Date = Transaction Date (user)

Code = M for manufactured.

Initial Receipt Quantity = Trans Quantity (in standard UM)

Lot Quantity Issued = zero

Lot Quantity Shipped = zero

Lot Quantity Misc Disposed Of = zero

Total Lot Quantity Received = Trans Quantity (in std UM)

- *RESBAL:*

Number of trans since the last cycle count

Quantity On Hand is increased if the location is classified as On Hand = YES.

Quantity On Order is increased if the location is classified as On Order = YES.

Total Quantity Present is increased.

Date Last Activity = transaction date (user).

Date Last Effect on On Hand Quantity = Transaction Date (user). Note: Date is ONLY updated if the location was classified as On Hand = YES.

Production Quantity—TOTAL is increased by Trans Quantity in std UM.

- *RMODEL:*

Number of earned PM batches is increased using the Theoretical Consumption Ratio. (See Theoretical Consumption section.)

P = Std Adj Quantity divided by Quantity Rel to PM Batch multiplied by Production Distribution Percentage.

P is added to the Earned PM Batches field in RMODEL.

All Tasks Are Complete byte is set to Y if the operator selected to complete the task and the task was the last task on the production model.

Actual PM completion date is NOT updated. This date is updated when the menu Schedule Completion option is taken.

- *RMTASK:*

If completion code is Y, the following updates are done for ALL TASKS on this Schedule/OLSN/Rel # that are prior to the current task.

Status equals C for complete.

Actual task completion date = transaction date (user-entered).

The task completion date is not updated unless the completion date is currently still at zero.

- *RMRESR (Existing record):*

Quantity Produced to Date is increased.

- *RMRESR (New record):*

PM Type = extracted from RMODEL using the entered Schedule/OLSN/Rel.
  PM Name = same as above
  Task Name = the entered task name
  Resource Type = P produced
  Resource # = entered Resource #
  Resource description is extracted from RESMST.
  Quantity Relative To Batch Size equals zero.
  Quantity relative to task batch size equals zero.
  Resource (standard UM) is extracted from RESMST.
  Quantity in non-standard UM = Transaction Quantity
  UM (user-defined) = Transaction UM
  Quantity type code = Q for quantity (versus ratio)
  Resource (ratio) = zero
  Resource number ratio = Blanks
  Production distribution % = zero
  Cost distribution % = zero
  Resource Class is extracted from RESMST.
  Resource Sub-Class is extracted from RESMST.
  Documentation Location Code Override is blank.
  Reportable resource = Y
  Superflushable resource = N
  Theoretical Usage code = D (direct issue only).
  Consumed/Produced To Warehouse = blank.
  Consumed/Produced To Location = blank.
  Locn Classification Code = blanks.
  Use net realizable value defaults to RESMST.
  Grade Level Upper Limit = blanks
  Grade Level Lower Limit = blanks
  Batch consumption = RESMST
  Setup Quantity = zero.
  Clean Up Quantity = zero
  Dependent Operation Name = blanks Dependent Operation byte = blanks
Dependent Resource byte = blanks
Stream resource = blanks
Prime PM Type override = blank
Prime PM Name override = blank
Print on document (only used if the quantity is zero) = Y.
Date entered = transaction date (user)
Substitute resource byte = N

- *TRHIST:*

Transaction quantity in standard UM
Resource Class
Resource Sub-Class
Received from On Order byte THTRON:
If location attribute On Order = N and production is positive, field is "+". If production is negative, field is "-".
Not on Order byte THTENQ is left blank.
Location On Hand byte THTROH:
If location on hand attribute is Y and if production is positive, TRTROH is "+". If production is negative, field is "-".

Effect on Inventory $ byte THEFIN:
Positive Prod: If the To location is Inventory $ = Y, byte is set to "+".
Negative Prod: If the To Location is Inventory $ = Y, byte is set to "-".

Effect on Non-plan quantity byte THEFPQ:
Positive Prod: If the To Location is Available for Planning = 0, THEFPQ is set to "+".
Negative Prod: If the To Location is Available for planning = 0, this byte is set to "-".

- *TRCTRL:*

The following fields are updated even if this is NOT online updating. This is in addition to the list at the beginning of the transaction summary section.

Number Totals for Production Receipt Transactions
Total Number of Transactions entered Entry Fields:

Schedule
OLSN
Schedule Release Number
PM Type
PM Name
Resource
Quantity
Task
Warehouse
Location
Classification
Lot Number
Picking Override Sequence
Grade
Revision Level
Potency Factor
Transaction Amount
Complete Task Byte Update Online Byte
Update System Transaction Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Lot Number (If the resource is defined as having lot tracking active, the classification requires lot tracking and a LOCDTL record exists.)
Quantity
Complete Task Byte
Update Online Byte
Update System Transaction Byte
Suspend Byte
Verify Byte
Duplicate Byte Defaults:

If the system is tailored for single warehouse support, the warehouse defaults to tailoring.
If the warehouse is blank, it defaults to RMRESR for the produced to warehouse.
If the warehouse in RMRESR is blank, it defaults to RESMST.
If the location is blank, the default from RMRESR for the Produced to Location is used.
If the location in RMRESR is blank, it defaults to RESMST.
If the OLSN is blank, it defaults to 1 if PM Type and PM Name are not entered.
Release Number defaults to 1.
To Classification defaults to the LOCDTL record if one exists.
If there is no LOCDTL record, then the To Classification defaults to RMRESR.
If RMRESR is blank, the To Classification defaults to RESMST.
If only one task is consuming this resource, the task defaults to RMRESR.
The PM Type and PM Name default to RMODEL
If there is an existing LOCDTL record, the grade defaults to the grade at that location. This is true for both consumed and produced resources.
If the revision level is blank, it defaults to the current revision level.

If the potency factor is blank, but the resource is potent and a record exists in LOCDT, the default is LOCDTL.

If there is no existing LOCDTL record and the resource is a potent resource (check RESMST), the potency factor defaults from RESMST.

The Picking Override Sequence defaults to tailoring if it is inactive.

If the UM is not entered, the default is user UM.

The Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's initials default to the Session Status Screen.

Edits:

Transaction Type is checked to make sure the user is authorized.

Schedule/OLSN/Release Number must exist in RMODEL.

Schedule/OLSN/Release Number must not be Complete or Closed.

If the PM Type is entered, PM Name is required.

If the PM Name is entered, PM Type is required.

If the PM Type and PM Name is entered, there must be a schedule in RMODEL (with the correct status).

The resource must exist in RESMST.

Resource/Warehouse must exist in RESBAL.

The resource must exist in RMRESR for the Schedule/OLSN/Release/Resource.

The quantity cannot be zero unless the user selects to complete the Schedule/Release.

If a task is entered it must exist in RMRESR for this Schedule/OLSN/Release/Resource.

Task cannot have a status of Complete or Closed.

Task must produce the resource entered.

Task must be defined in RMTASK for this Schedule/OLSN/Release Number.

If tailoring requires, the location must have a LOCMAS record.

If a grade is entered, the program checks for an existing LOCDTL record with a different grade.

The entered resource must have a revision level equal to or greater than the earliest acceptable revision level in RESMST.

The lot number is required if the resource has lot tracking active and if the From Classification Code specifies that lot tracking is active.

If the lot number is entered, the lot number in LOCDTL must be the same.

If there is an existing LOCDTL, a warning is sent if the record is receiving a new potency.

If a potent resource is entered, it is being received to a new location, and the default potency in RESMST is zero, the potency factor must be entered.

Classification Code must be active.

Classification Code must exist in CLASCD.

Update Online byte must be Y or N.

If the unit of measure is entered, it must be convertible to the standard unit of measure Transaction Detail Code must be valid.

Period cannot be closed.

Date must be valid.

The time must be valid.

Suspend byte must be Y or N.

Verify byte must be Y or N.

Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

On Going Production Transaction—MIE44206

An ON transaction indicates that a stream resource has been produced, thus showing that part of a task has been completed. Unlike the PR Transaction, it does not result in a change to the inventory. An On Going Production Transaction allows the stream resource to move from one task to the next.

When an on going production transaction is entered, Theoretical Consumption transactions (TC, CC, and TP transactions) are generated. See the description of theoretical consumption.

The resource is not an entry field and the stream resource is always blank. This record has the Schedule/OLSN/Rel/Task #/Blank Resource # and a Resource Type of P for produced.

When a schedule or task is completed, allocations and reservations are deleted. This transaction allows the operator to set the status to complete, but no reservations or allocations are deleted online. A separate menu option must be taken to back out those allocations and reservations for the completed Schedule/OLSN/Rel/Tasks.

The operator can select to set the task status to complete. If this option is taken, the quantity field can be left blank. If the operator selects to Complete The Task, that task as well as all prior tasks are set to a status of Complete.

Updates

Reminder: This section only contains updates for those files and fields that require a detailed explanation. For the remainder of the updates, please see the *Summary of Transaction Updates* table.

- *RMRESR:*

The stream resource of a task has two RMRESR records. One record for the task that is producing the stream resource. The second RMRESR record is for the task that is consuming the resource from the next task. The consumed stream resource record is updated when production is reported for this task (or the next reportable task).

The PRODUCED stream resource record: Quantity Produced to Date is increased by the transaction quantity (standard UM).

- *RMTASK:*

If the Task Completion Code = Y: Actual Completion Date = Transaction Date (user- entered)

Task Status = C for complete.

- *TRHIST:*

All entry fields, Transaction Quantity in standard UM, Resource Class, and Resource Sub-Class are updated.

THTRON, THTENQ, THTROH, THEFIN, THEFPQ are blank.

- *TRCTRL*

The following fields are updated even if this is NOT online updating. This is in addition to the list at the beginning of the transaction summary section.

Number totals for production receipt transactions
Total number of transactions entered Display-Only Fields:

Resource

Entry Fields:

Schedule
OLSN
Schedule Release Number
PM Type
PM Name
Quantity
Task
Complete Task Byte
Update Online Byte
Update System Transaction Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

- Schedule
- Quantity (see edits)
- Task
- Complete Task Byte
- Update Online Byte
- Update System Transaction Byte
- Suspend Byte
- Verify Byte
- Duplicate Byte Defaults:

- If the OLSN is blank, it defaults to 1 if PM Type and PM Name were not entered.
- The Release Number defaults to 1.
- The PM Type and PM Name default to RMODEL
- If the UM is not entered, the default is the user UM.
- The Account Group Number defaults to TRDTCD then to tailoring.
- The year defaults to the current year in tailoring.
- The period defaults to the current period in tailoring.
- The date defaults to the system date.
- The time defaults to the system time.
- Complete Tasks byte defaults to N.
- Update Online byte defaults to tailoring.
- Update System Transactions byte defaults to tailoring.
- The Shift Number defaults to the Session Status Screen.
- The Operator's Initials default to the Session Status Screen.

Edits:

- Transaction Type is checked to make sure the user is authorized.
- Schedule/OLSN/Release Number must exist in RMODEL.
- Schedule/OLSN/Release Number must not be Completed or Closed.
- If the PM Type is entered, PM Name is required.
- If the PM Name is entered, PM Type is required.
- If the PM Type and PM Name are entered, then there must be a schedule in RMODEL (with the correct status).
- The Quantity cannot be zero unless the Complete Tasks byte equals Y.
- If a Task is entered, it must exist in RMRESR for this Schedule/OLSN/Release/Resource.
- Task cannot have a status of Complete or Closed.
- Task must be reportable.
- Update Online byte must be Y or N
- If the unit of measure is entered, it must be convertible to the standard unit of measure
- Transaction Detail Code must be valid.
- Period cannot be closed.
- Date must be valid.
- Time must be valid.
- Suspend byte must be Y or N.
- Verify byte must be Y or N.
- Duplicate byte must be Y or N.

Command Keys (Display):

| | |
|---|---|
| CK01 | Session Status |
| CK02 | Page Forward |
| CK03 | Page Backward |
| CK05 | Comments |
| CK08 | Detail Codes |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Return To Production—MIE44207

An RT Transaction is performed when a resource has been produced from a schedule but needs to be returned to the schedule for reprocessing. It decreases the production *record for* the schedule for reprocessing. It does not undo resource consumption since it is assumed that the reprocessing causes additional consumption of a resource.

This transaction does not perform any TC, TP, or CC transactions.

Updates

Reminder: This section only contains updates for those files and fields that require a detailed explanation. For the remainder of the updates, please see the *Summary of Transaction Updates* table.

Before performing any updates, the transaction quantity must be converted to standard UM. All file quantities are in standard UM unless otherwise specified.

- *LOCDTL:*

Quantity At Location in the last received UM, and

A. resource is non-potent, and a. the transaction UM and the standard UM are the same, the transaction quantity is subtracted from the quantity at location in standard UM. This becomes the quantity at location in the last received UM.

b. the transaction UM and the standard UM are different, the transaction quantity is converted to the standard UM, then subtracted from the quantity at location in std UM. The result is converted to the transaction UM. This quantity is the quantity at location in the last received UM.

B. resource is potent, and a. the last received UM and the standard UM are the same, the Potency Factor at the Location is divided into the quantity at location in Standard UM. Then transaction quantity is subtracted. This quantity is updated as the Quantity at the Location in the last received UM.

b. the last received UM and the standard UM are the different, the Potency Factor at the Location is divided into the quantity at location in standard UM. Then the transaction quantity converted to the standard UM is subtracted. This quantity is updated as the quantity at location in the last received UM.

Quantity At Location in the standard UM, and

A. resource is non-potent, and
  a. the transaction UM and the standard UM are the same, the transaction quantity is subtracted from the quantity at location in standard UM.
  b. the transaction UM and the standard UM are the different, the transaction quantity is converted to the standard UM; the result is subtracted from the quantity at location in standard UM.

B. resource is potent, and
  a. the last received UM and the standard UM are the same, the transaction qty is multiplied by the potency factor then subtracted from the quantity at location in standard UM.
  b. the last received UM and the standard UM are the different, the transaction quantity is converted to the standard UM then multiplied by the potency factor. The result is subtracted from the quantity at location in standard UM.

- *LOCMAS:*

Warehouse = entered warehouse
  Location = entered location

- *LOTMAS:*

Lot Quantity Received = reduced using transaction quantity in Std UM.

- *RESBAL:*

Number of transaction since the last cycle count is updated.
  Total quantity present is reduced using transaction quantity in Std UM.
  Quantity On Hand: If the Location is classified as On Hand = Yes, reduced by Transaction Quantity (std UM).
  Quantity On Order: If the Location is classified as On Order = Yes, reduced by Transaction Quantity (std UM) (actual quantity produced—total ).
  Date Last Activity = Transaction Date (user-entered)
  Date Last Effect On On Hand Quantity: If Location was classified as On Hand = Yes, this field is updated with the system date.

- *RMRESR:*

Quantity Produced To Date is reduced.

- *TRHIST:*

Updated:
  Transaction Quantity in standard UM
  Transaction Quantity in user UM
  Resource Class
  Resource Sub-Class
  THTRON: If location attribute is On Hand = Y, this byte is set to "-".
  THEFIN: Effect on inventory $—if the location is inventory $ = Y, the byte is set to "-".
  THEFPQ, LDAVPL:
    0 = unavailable
    1 = available after ETD
    2 = available Effect on non-Plan quantity = (+, -, or blank): If Avail for Planning = 0, this byte is set to "-".

THTRON = Received from On Order byte is left blank.

THTENQ (Effect on Not On Order byte): If the Received From On Order byte is blank AND if the from Classification Code is not On Order AND if the transaction decreases the Total Quantity Present this byte is set to "-".

• *TRCTRL:*

The following field is updated even if this is NOT online updating. This is in addition to the list at the beginning of the transaction summary section.

Number totals for production receipt transactions

Entry Fields:

Schedule
OLSN
Schedule Release Number
PM Type
PM Name
Resource
Quantity
Task
Warehouse
Location
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Task (see edits)
Quantity
Update Online Byte
Suspend Byte
Verify Byte
Duplicate Byte Defaults:

If the system is tailored for single warehouse support, the warehouse defaults to tailoring.

If the OLSN is blank, it defaults to 1 if PM Type and PM Name were not entered.

The Release Number defaults to 1.

If only one task is producing this resource, the task defaults to RMRESR.

The PM Type and PM Name default to RMODEL.

If the UM is not entered, it defaults to the last received UM in LOCDTL.

The Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's Initials default to the Session Status Screen.

Edits:

Transaction Type is checked to make sure the user is authorized.

Schedule/OLSN/Release Number must exist in RMODEL.

Schedule/OLSN/Release Number must not be Complete or Closed.

If the PM Type is entered, PM Name is required.

If the PM Name is entered, PM Type is required.

If the PM Type and PM Name are entered then there must be a schedule in RMODEL (with the correct status).

The resource must exist in RESMST.

The Resource/Warehouse must exist in RESBAL.

The resource must be a balance resource.

The resource must exist in RMRESR for the Schedule/OLSN/Release/Resource.

The quantity cannot be zero.

The quantity cannot be negative.

The quantity cannot be greater than what is available at the location. This means that the transaction quantity must be less than or equal to: Quantity At Locn (std) minus Reserved Quantity To Sales.

If a task is entered it must exist in RMRESR for this Schedule/OLSN/Release/Resource.

The task cannot have a status of Complete or Closed.

The task is required if more than one task is producing the entered resource.

The task must be defined in RMTASK for this Schedule/OLSN/Release Number.

The Resource/Warehouse/Location must exist in LOCDTL.

The Update Online byte must be Y or N.

If the unit of measure is entered, it must be convertible to the standard unit of measure Transaction Detail Code must be valid.

Period cannot be closed.

The Date must be valid.

The Time must be valid.

Suspend byte must be Y or N.

Verify byte must be Y or N.

Duplicate byte must be Y or N.

Command Keys (Display):

CK01 Session Status

CK02 Page Forward

| | |
|---|---|
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

Return To Stock—MIE44208

An RS transaction is the opposite of a Direct Issue (DI) Transaction. It indicates that a consumed resource issued to a schedule was not used and is being returned to inventory. The tailoring questions used by an RS transaction are T27, T31, and T35.

Updates

Reminder: This section only contains updates for those files and fields that require a detailed explanation. For the remainder of the updates, please see the *Summary of Transaction Updates* table.

• *LOCDTL (Existing record):*

Quantity at location in the last received UM, and

A. resource is non-potent, and a. the transaction UM and the standard UM are the same, the transaction quantity is subtracted from the quantity at location in standard UM. This becomes the quantity at location in the last received UM.

b. the transaction UM and the standard UM are different, the transaction quantity is converted to the standard UM. The result is subtracted from the quantity at location in standard UM then converted to the transaction UM. This result is the quantity at location in the last received UM.

B. resource is potent, and a. the transaction UM and the standard UM are the same and potency factors are the same, the program divides the Potency Factor at the Location into the quantity at location in Standard UM. Then it subtracts the transaction quantity from this quantity. This quantity is updated as the quantity at location in the last received UM.

b. the transaction UM and the standard UM are the same and potency factors are different, the program converts the transaction quantity into potent units by multiplying the transaction quantity by the potency entered. This quantity is added to the quantity at location in standard UM.

The new potency factor is calculated (see beginning of transaction entry). The new potency factor is divided into the quantity just calculated. This now becomes the quantity at location in last received UM.

c. the transaction UM and the standard UM are different and potency factors are the same, the program divides the Potency Factor at the Location into the quantity at location in standard UM; Then, the transaction quantity converted to the standard UM is subtracted. This result is converted to the transaction UM. This quantity is updated as the quantity at location in the Last Received UM.

d. the transaction UM and the standard UM are different and potency factors are different, the transaction quantity is converted into potent units by multiplying the transaction quantity by the potency entered. This quantity is converted to the Standard UM. The result is added to the quantity at location in standard UM.

The new potency factor is calculated (see beginning of transaction entry) and divided into the quantity just calculated and converted to the transaction UM. This now becomes the quantity at location in last received UM.

Note: The descriptions for the updating of the quantity at location in the Last Received UM may not exactly correspond to the lines of code which calculate the field. However, the result is the same. For the exact steps taken, please refer to the source code.

Quantity At Location in the standard UM:

A. resource is non-potent, and a. the transaction UM and the standard UM are the same, the transaction quantity is subtracted from the quantity at location in standard UM.

b. the transaction UM and the standard UM are the different, the transaction quantity is converted to the standard UM. That quantity is subtracted from the quantity at location in standard UM.

B. resource is potent, and a. the last received UM and the standard UM are the same, the transaction quantity is multiplied by the entered potency factor. That quantity is subtracted from the quantity at location in standard UM.

b. the last received UM and the standard UM are the different, the transaction quantity is converted to the standard UM then multiplied by the entered potency factor. This quantity is subtracted from the quantity at location in standard UM.

*Additional Updates:*

New potency at the location is saved and updated to the LOCDTL record.

Total Quantity in standard UM is updated.

Last Received UM is updated.

Potency Factor—see beginning of transaction entry.

Last Date Received

Last Time Received

ETD—Estimated Time of Departure = Transaction Date plus ETD days.

Shelf Life Expiration Date = Transaction Date plus Shelf Life Days

FIFO Date

Transaction Date

• *LOCDTL (New record):*

Location # = To Location # from entry screen

Warehouse = To Warehouse from entry screen

Resource = Resource # from entry screen

Grade is from entry screen.

Lot # is from entry screen.

Quantity At Location (Std) = Transaction Quantity converted to Std UM.

Standard UM is taken from the RESMST record.
Resource Class is from RESMST.
Resource Sub-Class is from RESMST.
Quantity in last received UM is Transaction Quantity.
Last Received UM equals transaction UM.
Potency Factor is from entry screen.
Revision Level is from entry screen.
Classification code is from entry screen.
All classification bytes: The classification bytes are found by CHAINING to the CLASCD file using the entered classification code.
Quantity reserved—manufacturing is set to zero.
Quantity reserved—sales is set to zero.
Last Date Received = User-entered Transaction Date
Last Time Received = User-entered Transaction Time
ETD = calculated using # of days defined in CLASCD the number of days can be expressed in either calendar days or work days. (CLASCD)
Picking Override Sequence # = defaults to LOCMAS then to tailoring.
Shelf Life Expiration Date = transaction date plus number of shelf life days .
FIFO Date = transaction date (user-entered)

• *LOCMAS:*

If the LOCMAS record does not exist for the To location, and if the system is tailored Not To Require LOCMAS records, a record is added to the LOCMAS file. If the system is tailored for requiring a LOCMAS record, a hard halt message is sent.

Warehouse = entered warehouse
Location = entered location

• *LOTMAS (Existing record):*

Last Receipt date is updated.
Lot Quantity Issued is decreased.

*LOTMAS (New record):*

Lot # = Lot # from entry screen
Resource # = Resource # from the entry screen
Schedule/PO = Blanks
OLSN = Zeros
Release= Zeros
PM Type = Blanks
PM Name = Blanks
Reference # = Blanks (This does not equal the entry field called reference number. This is the reference number tied to a schedule.)
First Receipt Date = User-entered Transaction Date
First Receipt Time = User-entered Transaction Time
Initial Receipt Quantity = Transaction Quantity in Std UM
Code (Purchased Or Manufactured) = Blanks
Vendor # = Blanks
Vendor Name = Blanks
Lot Quantity Issued—decreased using the Transaction Quantity. The Issued Quantity is a negative quantity.
Lot Quantity Shipped = Zero
Lot Quantity Misc Disposed Of = Zero
Total Lot Quantity Received = Zero

- *RESBAL*

Number of transactions since the last cycle count

Total quantity present increased using trans quantity in standard UM.

Quantity On Hand—If the To Locn is classified as On Hand = Yes, Quantity On Hand is increased using Trans Quantity in standard UM.

Quantity On Order— If the To Locn is classified as On Order = Yes, Quantity On Order is increased.

Date Last Activity = Transaction Date (user)

Date Last Effect On On Hand Quantity—If To Locn is classified as On Hand = Yes, this field is set to the system date.

- *RMRESR:*

Quantity Issued is reduced.

- *TRHIST:*

All entered fields plus the following:

THTROH: If location attribute On Hand = Y, THTROH is updated with a "+".

THEFIN:

Transaction Quantity in Standard UM

Effect on Inventory $ = (+, -, or blank): If the To location is Inventory $ = YES, byte is set to "+".

THEFPQ, LDAVPL:

0 = unavailable

1 = available after ETD

2 = available

If location is unavailable for planning and quantity increases, this field is updated with a "+".

If location is unavailable for planning and quantity decreases, this field is updated with a "-".

The THEFPQ field updates by transaction type:

Effect on non-Plan quantity = blanks

If the To Location is Avail for planning = 2, this byte is set to "+".

THTENQ, THTRON:

Received From On Order byte is left blank.

Effect on Not On Order byte: If the Received From On Order byte is blank AND if the from classification code is Not On Order AND if the transaction increases the total quantity present this byte is set to "+".

- *TRCTRL:*

The following field is updated even if this is NOT online updating. This is in addition to the list at the beginning of the transaction summary section.

Number totals for ISSUE transactions

Display-Only Fields:

Resource Type

Entry Fields:

Schedule
OLSN
Schedule Release Number
PM Type
PM Name
Resource

Quantity
Task
Warehouse
Location
Classification
Lot Number
Picking Override Sequence
Grade
Revision Level
Potency Factor
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Schedule
Resource
Location
Warehouse
Task (see edits)
Lot Number (If the resource is defined as having lot tracking active, the classification requires lot tracking and a LOCDTL record exists.)
Quantity
Update Online Byte
Suspend Byte
Verify Byte
Duplicate Byte Defaults:

If the system is tailored for single warehouse support, the warehouse defaults to tailoring.

If the OLSN is blank, it defaults to 1 if PM Type and PM Name were not entered.

The release number defaults to 1.

The To Classification defaults to the LOCDTL record if one exists.

If only one task is producing this resource, the task defaults to RMRESR.

The PM Type and PM Name default to RMODEL.

If there is an existing LOCDTL record the grade defaults to the grade at that location.

If the potency factor is blank, the resource is potent and a record exists in LOCDTL, the default is LOCDTL.

If there is an existing LOCDTL record, the revision level defaults to the revision level at that location.

If there is an existing LOCDTL record, the lot number defaults to the lot number at that location.

If the UM is not entered, it defaults to the last received UM in LOCDTL.

Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's Initials default to the Session Status Screen.

If the Picking Override Sequence Number is Active, defaulting is:

If the To location is a new location:

1. screen entry, if not equal to zero;
2. Location Master, if not equal to zero;
3. the From Location value, if one exists;
4. Tailoring.

If the To location already exists:

1. screen entry, if not equal to zero;
2. unchanged at the existing location.

If the Picking Override Sequence Number is inactive, the default is tailoring.

Edits:

Transaction Type is checked to make sure the user is authorized.

Schedule/OLSN/Release Number must exist in RMODEL.

Schedule/OLSN/Release Number must not be Complete or Closed.

If the PM Type is entered, PM Name is required.

If the PM Name is entered, PM Type is required.

If the PM Type and PM Name are entered, there must be a schedule in RMODEL (with the correct status).

The resource must exist in RESMST.

The resource must be a balance resource.

The Resource/Warehouse must exist in RESBAL.

The resource must exist in RMRESR for the Schedule/OLSN/Release/Resource.

The quantity cannot be zero.

The quantity cannot be negative.

If a task is entered, it must exist in RMRESR for this Schedule/OLSN/Release/Resource.

The task must be defined in RMTASK for this Schedule/OLSN/Release Number.

If Tailoring requires, the location must have a LOCMAS record.

If a grade is entered, an edit is done to see if a LOCDTL record exists with a different grade.

An edit is done to see if the revision level is the same as the one LOCDTL (provided a LOCDTL record exists).

The lot number is required if the resource has lot tracking active and if the from classification code specifies that lot tracking is active.

If lot number is entered and the lot number in LOCDTL must be the same.

An edit is done to see if the entered potency is different from the potency at the location.

Classification Code must be entered if there is not a LOCDTL record.

Classification Code must be active.

Classification Code must exist in CLASCD.

Update Online byte must be Y or N.

If the unit of measure is entered, it must be convertible to the standard unit of measure Transaction Detail Code must be valid.

Period cannot be closed.

The date must be valid.

The time must be valid.

Suspend byte must be Y or N.

Verify byte must be Y or N.

Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

Sales Transaction—MIE44209

An SA Transaction is entered to record the sale of a resource and reduce the inventory correspondingly.

Updates

Reminder: This section only contains updates for those files and fields that require a detailed explanation. For the remainder of the updates, please see the *Summary of Transaction Updates* table.

• *LOCDTL:*

The Quantity Reserved—sales is reduced by the Transaction Quantity if the Quantity Reserved—sales is greater than or equal to the Transaction Quantity. If the Quantity Reserved—sales is less than the Transaction Quantity, the reserved Quantity is set to zero and the value of Quantity Reserved—sales is saved before it is set to zero. (This saved value is used to update the RESBAL file.)

This field never reduces to a negative number.

• *RESBAL:*

Quantity On Order is reduced by the Transaction Quantity (in std UM) only if the From Location is classified as On Order = Yes.

Period cannot be closed.
The date must be valid.
The time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

Sales Transaction—MIE44209

An SA Transaction is entered to record the sale of a resource and reduce the inventory correspondingly.

Updates

Reminder: This section only contains updates for those files and fields that require a detailed explanation. For the remainder of the updates, please see the *Summary of Transaction Updates* table.

- *LOCDTL:*

The Quantity Reserved—sales is reduced by the Transaction Quantity if the Quantity Reserved—sales is greater than or equal to the Transaction Quantity. If the Quantity Reserved—sales is less than the Transaction Quantity, the reserved Quantity is set to zero and the value of Quantity Reserved—sales is saved before it is set to zero. (This saved value is used to update the RESBAL file.)

This field never reduces to a negative number.

- *RESBAL:*

Quantity On Order is reduced by the Transaction Quantity (in std UM) only if the From Location is classified as On Order = Yes.

Quantity On Hand is reduced by the Transaction Quantity (in std UM) only if the From Location is classified as On Hand = Yes.

Quantity Sold To Date is increased using the Transaction Quantity (Std UM).

Sales Allocated Quantity is always reduced by the full amount.

Sales Reserved Quantity is reduced by the quantity used to reduce LOCDTL.

For example, if the operator shipped something from a location that was not used by the pick list, the Reserved Quantity—sales at that location might be zero. In this case, it is not desirable to reduce the resource balance quantity. Or, if the location had a quantity of 10 reserved for sales but the transaction sales quantity was 30, the Reserved Quantity-sales would be reduced by only 10. (The allocated quantity would be reduced by 30.)

Total Quantity Present is decreased using the Transaction Amount in standard UM.
Date of Last Activity = transaction date (user entered)
Date Of Last Sale = Trans Date (user entered)
Date of Last effect on On Hand Quantity
If the From Location is On Hand = Yes, then today's date is the Date of Last Effect.

- *TRHIST*

All entry fields PLUS:
Resource Class
Resource Sub-Class
Transaction Quantity in standard UM
Transaction amount was entered Y/N: This byte is always set to Y for a sales transaction so an accrual amount is never generated for a sales transaction.
Effect on inventory $ = (+, -, or blank):
If the From Location is inventory $ = Yes and the entered quantity is greater than zero, then this byte is set to "-".
If the From Location is inventory $ = Yes and the entered quantity is less than zero, then byte is set to "+".
Effect on non-Planning quantity:
If the From Location is Avail for Planning = 0 and the entered quantity is greater than zero, this byte is set to "-".
If the From Location is Avail for planning = 0 and the entered quantity is less than zero, this byte equals "+".

Received From On Order byte is left blank.

Effect on Not On Order byte:
If the Received From On Order byte is blank, the From Classification Code is not On Order, and the transaction increases the total quantity present this byte is set to "+". If the transaction decreases the quantity present, this byte is set to "-".

All other transactions leave this byte blank.

- *TRCTRL:*

The following fields are updated even if this is NOT online updating. This is in addition to the list at the beginning of the transaction summary section.

$ totals for SALES transactions
totals for SALES transactions
$ totals of all transactions Display-Only Fields:

Lot Number
Resource Description

Entry Fields:

From Resource
Warehouse
Location
Quantity
Update Online Byte
Company Number

Customer Number
Customer Order Number
Customer Purchase Order Number
Unit of Measure
Detail Code
Year
Period
Date
Time
Shift
Reference Number
Operator.
Accounting Group
Job Number
Sales Amount
Miscellaneous Field 1
Miscellaneous Field 2
Miscellaneous Field 3
Suspend Byte
Verify Byte
Duplicate Byte
Comment Required Fields:

From Resource
Warehouse
Location
Quantity
Update Online Byte
Suspend Byte
Verify Byte
Duplicate Byte Defaults:

If the system is tailored for single warehouse support, the warehouse defaults to tailoring.
The unit of measure defaults to the From Location in LOCDTL then to RESMST.
The Account Group Number defaults to TRDTCD then to tailoring.
The year defaults to the current year in tailoring.
The period defaults to the current period in tailoring.
The date defaults to the system date.
The time defaults to the system time.
The Update Online byte defaults to tailoring.
The Shift Number defaults to the Session Status Screen.
The Operator's Initials default to the Session Status Screen.

Edits:

Transaction Type is checked to make sure the user is authorized.
The resource must exist in RESMST.
The resource must exist in RESBAL.
The resource must be a balance resource.
The From Location must exist in LOCDTL for this Resource/Warehouse/Locn.
A warning message is displayed if the location is not classified as On Hand = Y.
The quantity cannot be zero.

The quantity cannot be greater than what is available at the From Location. This means that the trans quantity must be less than or equal to (quantity at locn (std) - manufacturing reserved quantity).

The Update Online byte must be Y or N.

An edit is done to see if the company number is blank.

An edit is done to see if the customer number is blank.

An edit is done to see if the customer order number is blank.

An edit is done to see if the PO number is blank.

If the unit of measure is entered, it must be convertible standard unit of measure.

The Transaction Detail Code must be valid.

The period cannot be closed.

The date must be valid.

The time must be valid.

An edit is done to see if the sales amount is blank.

The Suspend byte must be Y or N.

The Verify byte must be Y or N.

The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK13 | Resource Substitution Inquiry |
| CK19 | Return to Transaction Selection Screen |

Command Keys (Non-Display):

| | |
|---|---|
| CK07 | Send Message To Action List |
| CK17 | Error Message Override |
| HELP | Help Text |

Transfer Resource—MIE44210

This transaction is used to transfer resources from one Warehouse/Location combination to another without changing the location classification.

If a resource is being transferred to an existing location, a warning message is sent if the grade and/or the revision level at the new location is different from the previous location. The message is a UDS message. If the operator wishes to ignore the message, tailoring questions determines which grade and/or revision level is attached to that location.

The Move All Code can be used instead of entering the quantity field. This byte moves all the inventory from one location to another location without having to enter a quantity.

Assume the Update Online byte is equal to N at the time the transaction is entered. Then, between the time the transaction is entered and the time it is updated, inventory is either added to or removed from the warehouse. When the transaction is updated, the quantity of inventory at the present time is used rather than the quantity of the inventory at the time the transaction was entered.

If the user wants to change the lot number s/he must move the resource to a new location that does not have a LOCDTL record and assign a new lot number.

Updates

Reminder: This section only contains updates for those files and fields that require a detailed explanation. For the remainder of the updates, please see the *Summary of Transaction Updates* table.

- *LOCDTL (Existing record):*

To Location

Grade is updated based on the following tailoring question:

When receiving to an existing location, should the grade be:

A. the grade from the From Location, or
B. the grade from the To Location?

Revision level is updated based on the following tailoring question:

When receiving to an existing location, should the revision level be:

A. the revision level from the From Location;
B. the revision level from the To Location?

Potency Factor is calculated. The user can transfer a resource from one location to another even if there is a different potency factor at the new location. If this is done, the potency factor must be recalculated at the To Location. See example below.

A. The new Quantity at Location (standard UM) is calculated.
B. The new potent units at the location is calculated. The potent unit quantity from the From Location is added to the potent unit quantity from the To Location.
C. The new Potency Factor at the To location is calculated (# of potent units divided by new qty).

Last Date Received

Last Time Received

ETD—Estimated Time of Departure is updated based on the tailoring question:

Should the ETD date be:

A. the earliest date;
B. the latest date;
C. the ETD date of the From Location;
D. not changed at all?

Shelf life expiration date is updated based on this tailoring question:

Should the shelf life expiration date be:

A. the earliest date;
B. the latest date;
C. the date of the From Location;
D. not changed at all?

FIFO date is updated based on this tailoring question:

Should the FIFO date be:

A. the earliest date;
B. the latest date;
C. the date of the FROM location;
D. not changed at all?

- *LOCDTL (New record):*

Location = To Location from entry screen

Warehouse = To Warehouse from entry screen

Resource = Resource # from entry screen
Grade defaults from the old location.
Lot # defaults from the old location.
Quantity At Location (Std) = Transaction Quantity converted to Std UM.
Standard UM = taken from the TREBAT record for this transaction.
Resource Class is extracted from RESMST.
Resource Sub-Class is extracted from RESMST.
Quantity in last received UM = transaction quantity.
Last Received UM = Transaction UM.
Potency Factor defaults from the old location.
Revision Level defaults from the old location.
Classification Code defaults from the old location.
All Classification bytes default from the old location.
Quantity Reserved—manufacturing is set to zero.
Quantity Reserved—sales is set to zero.
Last Date Received equals user-entered transaction date.
Last Time Received equals user-entered transaction time.
Last Transaction Number equals transaction number.
ETD defaults from old location.
Picking Override Sequence # defaults to the screen entry, then to LOCMAS, and then to tailoring.
Shelf Life Expiration Date is either the shelf life date of the from location or the transaction date based on the tailoring question below.
When transferring a resource to a new location, the shelf life date should be:
A. the date of the from location;
B. the transaction date plus number of days in classification.
FIFO date equals either the FIFO date of the From Location or the transaction date based on the tailoring question below.
When transferring a resource to a new location, the FIFO date should be:
A. the date of the from location;
B. the transaction date.
If the transaction date is specified, the shelf life date must be calculated (transaction date plus number of shelf life days for this resource).

• *LOCMST:*
If the LOCMST record does not exist for the FROM location, a record is added to the LOCMST file.
If the LOCMST record does not exist for the TO location, a record is added to the LOCMST file.

• *LOTMAS:*
From Lot Number: If the To Lot Number does not equal the From Lot Number, the Miscellaneous Quantity Disposed Of is updated by adding the Quantity.
To Lot Number: If the To Lot # does not equal the From Lot #, the following fields are updated:
Existing records are updated.
Last Receipt Date
Total Lot Quantity Received (standard UM)

A new record is added to LOTMAS file if none exists. The following updates are done:

Lot # = To Lot # from entry screen
Resource # = Resource # from the entry screen
Schedule/PO = Blanks
OLSN = zeros
Release = zeros
PM Type = Blanks
PM Name = Blanks
Reference Number = Blanks (It does not equal the entry *field* called *reference* number. This is the reference number that is tied to a schedule.)
First Receipt Date = User-entered Transaction Date
First Receipt Time = User-entered Transaction Time
Initial Receipt Quantity = Transaction Quantity in Std UM
Code (Purchased or Manufactured) = Blank
Vendor # = Blanks
Vendor name = Blanks
Lot Quantity Issued equals zero.
Lot Quantity Shipped equals zero.
Lot Quantity Misc Disposed of equals zero.
Total Lot Quantity Received = Transaction Qty (Std UM)

- *TRHIST:*

All fields plus:
Transaction Quantity in standard UM
Received From On Order byte is left blank.
Effect On Not On Order byte is left blank.

- *TRCTRL:*

The following fields are updated even if this is NOT online updating. This is in addition to the list at the beginning of the transaction summary section.

Number totals for ADJUSTMENT transactions
Number of ADJUSTMENT Transactions

Display-Only Fields:

To Lot Number
Resource Description

Entry Fields:

Resource
From Warehouse
From Location
Quantity
To Warehouse
To Location
Move All Byte
To Lot Number
Update Online Byte
Unit of Measure
Detail Code
Year
Period
Date
Time
Shift
Reference Number
Operator
Accounting Group
Picking Override Sequence Number Miscellaneous Field 1
Miscellaneous Field 2
Miscellaneous Field 3
Suspend Byte
Verify Byte
Duplicate Byte
Comment Required Fields:

Resource
From Warehouse
From Location
Quantity
To Warehouse
To Location
Move All Byte
Update Online Byte
Suspend Byte
Verify Byte
Duplicate Byte Defaults:

If the system is tailored for single warehouse support, both warehouses default to tailoring.

The Unit of Measure defaults to the from location in LOCDTL, then to the TO location, then to RESMST.

The Account Group Number defaults to TRDTCD then to tailoring.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

If the To Lot Number is blank and no LOCDTL record exists, the To Lot Number defaults to the From Lot Number.

If the Picking Override Sequence Number is active, then defaulting is as follows:

If the To Location is a *new* location:

1. screen entry if not equal to zero;
2. Location Master if not equal to zero;
3. the From Location value if one exists;
4. Tailoring.

If the To Location already *exists:*

1. screen entry if not equal to zero;
2. unchanged at the existing location.

If the Picking override sequence number is inactive, then the default is Tailoring.

Edits:

Transaction Type is checked to make sure the user is authorized.

The resource must exist in RESMST.

The resource must exist in RESBAL for Resource/From Whse.

The resource must exist in RESBAL for Resource/To Warehouse.

The resource must be a balance resource.

Both warehouses are protected if single warehouse support exists.

CK 15 is only available when lot number is entered.

The From Location must exist in LOCDTL for this Resource/Warehouse/Location.

A warning message is displayed if the Location is not classified as On Hand = Y.

The Quantity cannot be zero unless Move All = Y.

The Quantity cannot be negative. (If the operator wants to Reverse the transaction, instead of entering a negative transaction quantity, the user could enter a transaction with the locations in the opposite fields.)

The quantity cannot be greater than what is available at the From Location. This means that the transaction quantity must be less than or equal to (Quantity at Location (standard) minus Mfg Reserved Quantity minus Sales Reserved Quantity). Note: Before this edit is done, the transaction quantity is converted to the standard UM.

An edit is done to see if the Transaction Quantity is greater than the Quantity Available at the location.

The Update Online byte must be Y or N.

The Move All byte must be Y or N.

The Move All byte cannot be Y if a Transaction Quantity has been entered.

If a LOCDTL record already exists for the To Location, the To Lot Number entered on the screen must match the To Lot Number from the LOCDTL record.

If lot tracking is specified in the To Classification and RESMST defines the resource as lot tracking active, a lot number is required.

If the unit of measure is entered, it must be convertible to standard unit of measure.

The Transaction Detail Code must be valid.

The period cannot be closed

The date must be valid.

The time must be valid.

The Suspend byte must be Y or N.

The Verify byte must be Y or N.

The Duplicate byte must be Y or N .

To Location is a required entry.

If the system requires a Location Master record, a LOCMAS record must exist.

The Lot Numbers must be equal if a LOCDTL record exists for this Resource/To Warehouse/To Location.

The grade of the From Location must equal the grade from the To Location.

An edit is done to see if the revision level of the FROM location is different from the revision level of the TO location.

The classification of the From and To Locations must be the same.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |

CK12 Account Override
CK15 Notebook File Maintenance
CK19 Return to Transaction Selection Screen Command Keys (Non-Display):

CK07 Send Message To Action List
CK17 Error Message Override
HELP Help Text

Resource Number Change Transaction—MIE44211

The Resource Number Change transaction is used to change the resource number of the material at a specific location. This is done when a change in quality of the resource requires it to be renamed or downgraded.

The operator can use the resource number change transaction to simply change the grade of a resource. If this is done, the new resource number is the same as the original resource number, and the new grade is entered.

When a Resource Downgrade is done, the DGRADE file is used to determine if the downgrade is valid. A CHAIN is done to the DGRADE file using Resource/Original Grade/New Grade. If a record exists in the file, the grade change is valid. If a record does not exist in the file, the grade change is invalid.

There is a byte on the screen which allows the user to change all of the quantity for an existing LOCDTL record. This is the Change All byte. If a Y is entered, the entire quantity for the original resource is changed.

Note: Refer to the beginning of the transaction entry program description for information on potency.

Updates

Reminder: This section only contains updates for those files and fields that require a detailed explanation. For the remainder of the updates, please see the *Summary of Transaction Updates* table.

Before doing any of the updates, the transaction quantity must be converted to standard unit of measure. All file quantities are in standard unit of measure unless otherwise specified.

• *LOCDTL (Existing record):*

Estimated Time of Departure is updated based on the tailoring question below:

Should the ETD date be:

A. trans date plus number of days in that classification;

B. the ETD date of the to location?

Picking Override Sequence Number defaults to the screen entry, then to LOCMAS, and then to tailoring.

Shelf life expiration date is updated based on a tailoring question:

Should the shelf life expiration date be:

A. the date at the to location;

B. trans date + # of shelf life days?

FIFO date is updated based on the tailoring question below:

Should the FIFO date be:

A. the FIFO date of the to location;

B. the transaction date?

Last Date Received equals the transaction date.

Last time received equals the transaction time.
Received Transaction Number equals the transaction number.

- *LOCDTL (New record):*

Location is from entry screen.
Warehouse is from entry screen.
Resource = new Resource from entry screen.
Grade defaults from the old location if the new grade is blank.
Lot Number defaults from the old location if new Lot Number is blank.
Quantity at Location (std) = standard unit of measure.
Resource Class is extracted from RESMST.
Resource Sub-Class is extracted from RESMST.
Quantity in last received UM = total quantity at location in standard UM.
Last Received UM = Standard UM for TO resource.
Potency Factor defaults from the old location if the new potency factor is blank.
All Classification Bytes default from the old location.
Quantity reserved—manufacturing is set to zero.
Quantity Reserved-sales is set to zero.
ETD defaults from old location.
Expected Shelf Life Expiration Date—see above.
FIFO date—see above.
Received Transaction Number
Date Received = transaction date
Time received = transaction time

- *LOTMAS:*

The Old Lot Number/Original resource # record is updated.
Lot Quantity Miscellaneously disposed of—increased if it is for the original resource.
New Lot #/New Resource # record is updated.

If a record already *exists:*

Last Receipt Date equals transaction date.
Total Lot Quantity received increased = transaction quantity (std UM).

If a new record must be *added:*

Lot # = new Lot #
Resource # = new Resource #
First Receipt Date = Transaction Date
Last Receipt Date = Transaction Date
Initial Receipt Quantity = Transaction Quantity (Std UM)
Code = Blank
Lot Quantity Issued = zero
Lot Quantity Shipped = zero
Lot Quantity Misc Disposed Of = zero
Total Lot Quantity Received = Transaction Quantity (Std UM)

- *RESBAL:*

Original resource number is updated.
Quantity On Hand is reduced if location is specified as On Hand = Y.
Date Last Activity = Trans Date
Date Last Effect on On Hand Quantity = Transaction Date.

Date Last Effect on On Hand Quantity is only updated if the location is specified as On Hand = Y.

New Resource # record is updated.

Quantity On Hand is increased if Location is specified as On Hand = Y.

- *TRHIST:*

All entry fields plus:
  Transaction Quantity in standard UM
  Resource Class
  Resource Sub-Class

- *TRCTRL:*

The following field is updated even if this is NOT on line updating. This is in addition to the list at the beginning of the transaction summary section.

Number totals for ADJUSTMENT transactions

Display-Only Fields:

Lot Number (for the original resource)
Original Resource Description

Entry Fields:

Original Resource
Warehouse
Location
Quantity
Original Lot Number
New Resource
Grade
Revision Level
New Lot Number
Change All Byte
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Original Resource
Warehouse
Location
Quantity—if Change All byte is N
New Resource
New Lot Number—if the new resource is defined as Lot Tracking = Yes, and the classification requires lot numbers.

Change All Byte—if quantity = 0
Update Online Byte
Suspend Byte
Verify Byte
Duplicate Byte Defaults:

If the system is tailored for single warehouse support, the warehouse defaults to tailoring.

Lot Number—If blank the Lot Number defaults from the old location.

New Grade defaults to the grade from the previous LOCDTL record.

New Revision Level defaults to the current revision level for the new resource.

New Lot Number defaults to the lot number from the previous LOCDTL record.

The Unit of Measure defaults to the Last Received Unit of Measure in LOCDTL.

The Account Group Number defaults to TRDTCD then to tailoring.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

Edits:

Transaction Type is check to make sure the user is authorized.

The original resource must exist in RESMST.

The new Resource/Warehouse must exist in RESBAL.

The Original Resource/New Resource must exist in RESSUB.

The warehouse is protected if single warehouse support exists.

CK 15 is only available when the Lot Number is entered.

The From Location must exist in LOCDTL for this Resource/Warehouse/Location.

A warning message is displayed if the grade in LOCDTL is different from the entered grade.

The Quantity cannot be zero unless Change All = Y or unless the grade is being changed.

The Quantity cannot be negative.

The Quantity cannot be greater than what is available at the From Location. This means that the Transaction Quantity must be less than or equal to Quantity At Location (Std) minus Mfg Reserved Quantity minus Sales Reserved Quantity. Note: Before this edit is done, the Transaction Quantity is converted to the standard UM.

An edit is done to see if the Transaction Quantity is not greater than the Quantity Available at the Location.

The message defaults to hard halt but could be changed to a warning or non-display.

An edit is done to see if the grade change is valid by checking the DGRADE file.

The entered Revision Level must be greater than the Earliest Acceptable Revision in RESMST for this New Resource.

An edit is done to see if the Revision Level of the From Location is different from the Revision Level of the To Location.

If the new Resource is defined as having Lot Tracking active (RESMST) and if the To Classification Code (which must be the same as the From Classification Code), has lot tracking active (CLASCD), then the new Lot Number is required.

A Lot Number which is entered cannot be different from the one in LOCDTL for the new resource.

Update Online byte must be Y or N.

Change All byte must be Y or N.

Change All byte cannot be Y if a Transaction Quantity has been entered.

If the unit of measure is entered, it must be convertible standard unit of measure.

Transaction Detail Code must be valid.

The period cannot be closed.

The date must be valid.

The time must be valid.

Suspend byte must be Y or N.

Verify byte must be Y or N.

Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK13 | Resource Substitution Inquiry |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

Miscellaneous Issue—MIE44212

The MI transaction is used to record the loss of inventory at a location. Such a loss can occur as a result of spoilage, theft, damage, etc.

Updates

Reminder: This section only contains updates for those files and fields that require a detailed explanation. For the remainder of the updates, please see the *Summary of Transaction Updates* table.

• *RESBAL:*

Number of transactions since the last cycle count

Total Quantity Present is decreased using Transaction Quantity in standard UM.

Quantity consumed to date is increased using Transaction Quantity in standard UM Quantity On Order: If the From Location is classified as On Order = Y, then the Transaction Quantity in Std UM is subtracted from the Quantity on Order.

On Hand Quantity: If the From Location is classified as On Hand = Y, then the Transaction Qty in Std UM is subtracted from the Quantity on Hand.

Date of Last Effect on On Hand Quantity: If the From Location is classified as On Hand = Y, then today's date is the Date of Last Effect.

Date Last Activity is today's date.

- *TRHIST:*

Transaction Quantity in Standard UM

Effect on Inventory $ = (+, -, or blank): If the From Location is Inventory $ = Yes, byte is set to "-".

Effect On Non-Planning Quantity: If the From Location is Avail for Planning = 0, this byte is set to "-".

Received from On Order byte is left blank.

Effect on Not On Order byte: If the From Location is On Order Inventory = N and if the transaction decreases the total quantity present, this byte is set to "-".

Effect on On Hand byte: If the From Location is On Hand Inventory = Y and if the transaction decreases the total quantity present, this byte is set to "-".

Resource Class

Resource Sub-Class

- *TRCTRL:*

The following field is updated even if this is NOT online updating. This is in addition to the list at the beginning of the transaction summary section.

Number totals for ISSUE transactions

- *TREBAT:*

Effect on Not On Order byte: If the From Location is On Order Inventory = N and if the transaction decreases the total quantity present, this byte is set to "-".

Effect on On Hand Byte: If the From Location is On Hand Inventory = Y and if the transaction decreases the total quantity present, this byte is set to "-".

Display-Only Fields:

Lot Number
Grade
Potency %
Resource Description

Entry Fields:

Resource
Warehouse
Location
Quantity
Update Online Byte
Unit of Measure
Detail Code
Year
Period
Date
Time
Shift
Reference Number
Operator Accounting Group
Miscellaneous Field 1
Miscellaneous Field 2
Miscellaneous Field 3
Suspend Byte
Verify Byte
Duplicate Byte
Comment Required Fields:

Resource
Warehouse
Location
Quantity
Update Online Byte
Suspend Byte
Verify Byte
Duplicate Byte Defaults:

If the system is tailored for single warehouse support, the warehouse defaults to tailoring.

The Unit of Measure defaults to the Last Received Unit of Measure in LOCDTL. If blank or no LOCDTL record exists, the standard UM (RESMST) is used as the default.

The Account Group Number defaults to TRDTCD, then to tailoring.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

Edits:

Transaction Type is checked to make sure the user is authorized.

The resource must exist in RESMST.

Resource/Warehouse must exist in RESBAL if the resource is a balance resource.

Warehouse is protected if single warehouse support exists.

The location must exist in LOCDTL for this Resource/Warehouse/Location.

Quantity cannot be zero.

Quantity cannot be negative.

Quantity cannot be greater than what is available at the From location. This means that the Trans Quantity must be less than or equal to Quantity At Location (Std) minus Mfg Reserved Quantity minus Sales Reserved Quantity. Note: Before this edit is done, the Transaction Quantity must be converted to the standard UM.

An edit is done to see if the transaction quantity is greater than the quantity available at the location.

Update Online byte must be Y or N.

If the unit of measure is entered, it must be convertible to the standard unit of measure
The Transaction Detail Code must be valid.
The Period cannot be closed.
The date must be valid.
The time must be valid.
The Suspend byte must be Y or N.
The Verify byte must be Y or N.
The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Miscellaneous Receipt—MIE44213

An MR Transaction is the opposite of an MI transaction. It is a way for the user to record the addition of inventory for some reason other than production or receipt from a purchase order.

Updates

Reminder: This section only contains updates for those files and fields that require a detailed explanation. For the remainder of the updates, please see the *Summary of Transaction Updates* table.

• *LOCDTL (Existing record):*

Quantity at Location in last received UM:
To update this field, the program:
a. converts the transaction qty into std UM.
b. adjusts the qty at the location in std UM.
c. converts the qty at location in standard UM to last received UM and uses this amount to update the Quantity at Location in last received UM.

Shelf life expiration date is updated based on a tailoring question.
Should the shelf life expiration date be:
A. the date at the to location;
B. trans date + # of shelf life days?

FIFO date is updated based on the tailoring question below:
Should the FIFO date be:
A. the FIFO date of the to location;
B. the transaction date?

Last Received UM = Transaction UM
Date Last Received = Transaction Date

Time Last Received = Transaction Time
Trans # of last receipt = Transaction Number
Potency Factor is calculated. Note: Refer to the example in the description of a TR transaction for the potency factor calculation.

- *LOCDTL (New record):*

Location # = To Location # from entry screen.
Warehouse = To Warehouse from entry screen.
Resource = Resource # from entry screen.
Grade is from entry screen.
Lot # is from entry screen.
Quantity at location (Std) = Transaction Quantity converted to Std UM.
Standard UM is taken from the RESMST.
Resource Class is extracted from RESMST.
Resource Sub-Class is extracted from RESMST.
Quantity in Last Received UM = Transaction Quantity
Last Received UM = Transaction UM
Potency Factor is taken from entry screen.
Revision Level is from entry.
Classification Code is from entry.
All Classification bytes is from to CLASCD.
Quantity Reserved—manufacturing is set to zero.
Quantity Reserved—sales is set to zero.
Last Date Received equals user-entered transaction date.
Last Time Received equals user-entered transaction time.
Transaction Number of last receipt equals transaction number.
FIFO date equals the transaction date.
ETD—The program calculates this by:

a. CHAINing to the CLASCD file to find the # of days expected in that classification;
b. determining whether the # of days is expressed in calendar days or work days (CLASCD).
c. calculating new ETD.

Picking Override Sequence # defaults to LOCMAS then to tailoring.
Shelf Life Expiration date is calculated using shelf life days.

- *LOCMAS (New record):*

Warehouse = entered Warehouse
Location = entered Location
Date Last Maint = User-entered Transaction Date

- *LOTMAS (Existing record):*

Last Receipt date
Total Lot Quantity received increased using Transaction Quantity in Std UM.

- *LOTMAS (New record):*

Lot Number = To Lot Number from entry screen
Resource = entered Resource
Schedule = Blanks
OLSN = zeros Release Number = zero
PM Type = Blanks
PM Name = Blanks
Ref # = Blanks (This is not the field from the entry screen, but the reference # from the schedule.)
First Receipt Date = Transaction Date
Last Receipt Date = Transaction Date
Total Lot Quantity Received = Transaction Qty (In Std UM)
Initial Receipt Quantity = Transaction Quantity (in Std UM)
Code = Blank
Vendor # and Name = Blanks
Lot Quantity Issued = zero
Lot Quantity Shipped = zero
Lot Quantity Misc Disposed Of = zero
Total Lot Quantity Received = Transaction Qty (in Std UM)

- *RESBAL:*

Number of transaction since the last cycle count
Total quantity present is increased using Trans Quantity in standard UM.

In addition to the above update for the Total Quantity Present, if the Location is On Order = N and a transaction amount is entered, the Historical Average Cost field and the Rolling Average Cost with Alpha Factor field are also updated.

Calculation of New Historical Average Cost $$\frac{(A \times B) + C}{(B + D)}$$

A = Previous average cost (RESBAL)
B = Total quantity present (before trans)
C = Transaction amount
D = Transaction quantity in standard UM Calculation of Rolling Average Cost with Alpha Factor $$(A \times \text{alpha factor}) + \{B \times (1 - \text{alpha factor})\}$$

A = unit cost of transaction
B = rolling average cost with alpha factor (before trans)
Unit cost of trans = transaction amount Quantity On Hand (only if the To Location is classified as On Hand = Yes) is increased using Trans Quantity in standard UM.

Quantity On Order increased only if the To Location is classified as On Order = Yes.

Date Last Activity = Transaction Date

Date Last Effect on On Hand Quantity: If To Location is classified as On Hand = Yes, today's date is the Date of Last Effect.

- *TRHIST:*

All fields from TREBAT are updated.

Transaction quantity in Standard UM is updated.

Transaction Amount was entered Y/N: If the operator entered anything into this field, even zero, this byte is set to Y. (This is needed for the accrual report.)

Effect on Inventory $ = (+, −, or blank): If the To Location is Inventory $ = YES, byte is set to "+".

Effect on Non-planning Quantity: If the To Location is Available for planning = 0, this byte is set to "+".

Resource Class

Resource Sub-Class

- *TRCTRL:*

The following fields are updated even if this is NOT online updating. This is in addition to the list at the beginning of the transaction summary section.

Number totals for ADJUSTMENT transactions

Transaction amount was entered Y/N? This field reflects the Report 0 Amount that is displayed on the screen. If the operator entered a trans amount, then this field is set to N (i.e., the user is not reporting a zero quantity). If the operator entered zero as a trans amount, this field is set to Y (i.e., the user is reporting a zero amount).

Received from On Order byte is left blank.

Effect on Not On Order byte is left blank

All other transactions leave this byte blank.

Display-Only Fields:

Resource Description

Entry Fields:

To Resource
To Warehouse
To Location
Quantity
To Lot Number
Grade
Potency %
Revision Level
Classification Code
Update Online Byte
Unit of Measure
Detail Code
Year
Period
Date
Time
Shift
Reference Number
Operator Accounting Group
Transaction Amount
Report 0 Amount
Picking Override Sequence Number
Miscellaneous Field 1
Miscellaneous Field 2
Miscellaneous Field 3
Suspend Byte
Verify Byte
Duplicate Byte
Comment Required Fields:

To Resource
To Warehouse
To Location
Quantity
Classification Code
Update Online Byte
Transaction Amount
Report 0 Amount
Suspend Byte
Verify Byte
Duplicate Byte Defaults:

If the system is tailored for single warehouse support, the warehouse defaults to tailoring.
Potency Factor defaults to LOCDTL.
The grade defaults to LOCDTL then to RESMST.
The Lot Number defaults to tailoring (T2).
The Unit of Measure defaults to the Last Received Unit of Measure in LOCDTL. If blank or no LOCDTL record exists, the standard UM (RESMST) is used as the default.
The Revision Level defaults to RESMST.
The Classification Code defaults to LOCDTL, then to RESMST and finally to tailoring (T18).
Account Group Number defaults to TRDTCD, then to tailoring.
Year defaults to the current year in tailoring.
Period defaults to the current period in tailoring.
Date defaults to the system date.
Time defaults to the system time.
Update Online byte defaults to tailoring.
Shift Number defaults to the Session Status Screen.
Operator's Initials default to the Session Status Screen.
If the Picking Override Sequence Number is Active, then defaulting is as follows:

If the To Location is a new location:
1. screen entry if not equal to zero;
2. Location Master if not equal to zero;
3. the From location value if one exists;
4. tailoring.

If the To Location already exists:
1. screen entry if not equal to zero;
2. unchanged at the existing location.

If the Picking Override Sequence Number is inactive, the default is tailoring.

Edits:

Transaction Type is checked to make sure the user is authorized.

The Resource Number is required.

The Resource must exist in RESMST.

The Resource/Warehouse must exist in RESBAL.

Warehouse is protected if single warehouse support exists.

The Location is required.

The Quantity cannot be zero.

The Quantity cannot be negative.

The Lot Number is required if Lot Tracking = Y and if Lot Tracking is active.

The Lot Number must be the same as the one in LOCDTL.

An edit is done to see if the Grade entered is the same as the Grade in LOCDTL.

An edit is done to see if the entered Revision Level is greater or equal to the earliest acceptable Revision Level in RESMST.

An edit is done to see if the entered Revision Level is the same as the one in LOCDTL.

The Classification code is required if a record exists in LOCDTL for the Resource/Warehouse/Location.

An edit is done to see if the entered classification code is the same as the one in LOCDTL.

The Classification Code must be ACTIVE.

The Classification Code is required if there is no LOCDTL record.

The Update Online byte must be Y or N.

If the unit of measure is entered, it must be convertible to the standard unit of measure The Transaction Detail Code must be valid.

The Period cannot be closed.

An edit is done to see if the entered period is greater than the number of periods in a year.

The date must be valid.

The time must be valid.

An edit is done to see if the Transaction Amount is blank.

The Report 0 Amount must be Y or N.

The Report 0 Amount cannot be Y if the Transaction Amount has been entered.

The Suspend byte must be Y or N.

The Verify byte must be Y or N.

The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

CK07 Send Message To Action List
CK17 Error Message Override
HELP Help Text

Inventory Adjustments—MIE44214

An IA transaction is used to change a location balance. It records additions and reductions to inventory due to discrepancies between the actual inventory and the system's inventory.

The quantity entered is the Adjusting Quantity. It is added to the existing Quantity At Location. The operator has the option to update just the Resource Balance File (RESBAL) by leaving the location blank.

Updates

Reminder: This section only contains updates for those files and fields that require a detailed explanation. For the remainder of the updates, please see the *Summary of Transaction Updates* table.

• *LOCDTL:*

This file is only updated if the operator entered a location.

Quantity at Location (Std)—Trans Quantity is added to the Existing Quantity.

Transaction Quantity is converted to std UM.

Quantity at Location in last received UM is increased.

• *LOTMAS:*

This file is only updated if the operator entered a location.

Lot Quantity Misc Disposed Of—The Adjusting Quantity is subtracted from this field. The Adjusting Quantity can be negative or positive. This field can be forced negative.

• *RESBAL:*

Number of Transactions since the last cycle count

Total Quantity Present increased using Adjusting Qty (Std UM).

Quantity On Hand increased using Adjusting Quantity in standard UM only if the location is classified as On Hand = Yes.

Quantity On Order increased using adjusting in standard UM if the Location is classified as On Order = Yes.

Date Last Activity = Transaction Date (user)

Date Last Effect on On Hand Quantity—if Location is classified as On Hand = YES, this field is updated to system date.

• *TRHIST:*

Transaction Quantity in standard UM

Effect on Inventory $ = (+, −, or blank: If the From Location is Inventory $ = Yes, byte is set to "+".

Effect on Non-Planning Quantity:

If the Avail for Planning = 0 and if the entered quantity is greater than zero, this byte is set to "+".

If the Avail for Planning = 0 and if the entered quantity is less than zero this byte is set to "−".

Received from On Order byte is left blank.

Effect on Not on Order byte:

If the From Classification code is not On Order and if the transaction increases the total quantity present, this byte is set to "+".

If the From Classification code is not On Order and the transaction decreases the quantity present, this byte is set to "-".

Resource Class

Resource Sub-Class

Unit Cost: the selected unit cost for this resource is loaded.

Extended cost: the Extended Cost (Quantity X Selected Unit Cost) is loaded.

- *RESBAL:*

Adjustment Quantity

If the location is left blank, only RESBAL is adjusted. In this case, Trans Quantity in Standard UM, Trans quantity in User UM, and RESBAL Adjustment Quantity (all in TRHIST) are loaded. However, if the resource is a Potent Resource and no location is entered, the Trans Quantity entered is the value loaded into the three fields above.

If the location is entered, then LOCDTL, LOTMAS, RESBAL, TRHIST, TREBAT, and TRCOMM are updated. Again, Trans Quantity in Standard UM, Trans Quantity in User U, and RESBAL Adjustment Quantity (all in TRHIST) are loaded.

If the resource is defined as potent in that location, then Trans Quantity in Standard Potent Units is loaded into the Trans Quantity in Standard UM field. The Trans Quantity in Standard UM minus the quantity at location is loaded into the RESBAL Adjustment Quantity field. The Trans Quantity is loaded into the Trans Quantity in User UM field.

- *TRCTRL:*

The following fields are updated even if this is not online updating. This is in addition to the list at the beginning of the transaction summary section.

totals for ADJUSTMENT transactions $ totals of all transactions

Display-Only Fields:

Lot Number

Resource Description

Entry Fields:

Resource

Warehouse

Location

Quantity

Update Online Byte

Unit of Measure

Detail Code

Year

Period

Date

Time

Shift

Reference Number

Operator
Accounting Group
Miscellaneous Field 1
Miscellaneous Field 2
Miscellaneous Field 3
Suspend Byte
Verify Byte
Duplicate Byte
Comment Required Fields:

Resource
Warehouse
Quantity
Update Online Byte
Suspend Byte
Verify Byte
Duplicate Byte Defaults:

If the system is tailored for single warehouse support, the warehouse defaults to tailoring.

The unit of measure defaults to the Last Received Unit of Measure in LOCDTL; if blank or no LOCDTL record exists, the standard UM (RESMST) is used as the default.

Account Group Number defaults to TRDTCD then to tailoring.

Year defaults to the current year in tailoring.

Period defaults to the current period in tailoring.

Date defaults to the system date.

Time defaults to the system time.

Update Online byte defaults to tailoring.

Shift Number defaults to the Session Status Screen.

Operator's Initials default to the Session Status Screen.

Edits:

Transaction Type is checked to make sure the user is authorized.

The resource must exist in RESMST.

The Resource/Warehouse must exist in RESBAL.

The resource must be a balance resource.

Warehouse is protected if single warehouse support exists.

The location must exist in LOCDTL for this Resource/Warehouse/Location.

The quantity cannot be zero.

Update Online byte must be Y or N.

If the unit of measure is entered, it must be convertible to the standard unit of measure Transaction Detail Code must be valid.

The period cannot be closed.

The date must be valid.

The time must be valid.

Suspend byte must be Y or N.

Verify byte must be Y or N.

Duplicate byte must be Y or N.

Command Keys (Display):

CK01 Session Status
CK02 Page Forward

| | |
|---|---|
| CK03 | Page Backward |
| CK04 | Location Prompting Inquiry |
| CK05 | Comments |
| CK08 | Detail Codes |
| CK11 | Alpha Search |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Indirect Measurement—MIE44215

An IM transaction can be entered if the user regularly takes measurements of resources stored in tanks or bins and wants to update the system with the results. It tells the system that the user-entered quantity represents the current inventory at that location. If this quantity is different from the value that is currently on the system, the system value is adjusted.

Updates

Reminder: This section only contains updates for those files and fields that require a detailed explanation. For the remainder of the updates, please see the *Summary of Transaction Updates* table.

- *LOCDTL:*

Quantity at Location (standard) is added to the Adjusting Quantity (in Standard UM).

Quantity at Location in last received UM = Transaction Quantity

Last Received UM = Transaction UM

- *LOTMAS:*

Lot Quantity Misc Disposed Of—The Adjusting Quantity is subtracted from this field. The Adjusting Quantity can be negative or positive. This field can be forced negative.

Adjusting Quantity = Expected Quantity minus Reported Quantity

The Quantity Expected is the quantity that equals Qty at Location in Std UM at this location before the indirect measurement transaction. The new quantity reported is the Transaction Quantity in Std UM.

- *RESBAL:*

Number of transactions since the last cycle count

Total Quantity Present is increased using Adjusting Quantity (Std UM).

Quantity On Hand (only if the location is classified as On Hand = Yes) is increased using adjusting quantity (std UM).

Quantity On Order (only if the location is classified as On Order = Yes) is increased using Adjusting Quantity (std UM).

Date last activity = Transaction Date (user)

Date Last Effect on On Hand Quantity—If Location is classified as On Hand = YES, updated to system date.

◦ *TRHIST:*

Transaction quantity in standard UM

Effect on inventory $ = (+, -, or blank):

If the location is inventory $ = YES and the adjusting quantity is greater than zero, this byte is set to "+".

If the location is inventory $ = YES and the adjusting quantity is less than zero, this byte is set to "-".

Effect on Non-Planning quantity = (+, -, or blank):

If the location is Avail for Planning = 0and the adjusting quantity is greater than zero, this byte is set to "+".

If the location is Avail for planning = 0 and the Adjusting Quantity is less than zero, this byte is set to "-".

Effect on Not On Order byte:

If the From Classification Code is Not On Order and if the transaction increases the Total Quantity Present, this byte is set to "+".

If the From Classification code is Not On Order and the transaction decreases the quantity present, this byte is set to "-".

• *RESBAL:*

Adjustment Quantity:The Adjusting Quantity is calculated and loaded into this field.

Resource Class

Resource Sub-Class

• *TRCTRL:*

The following field is updated even if this is NOT online updating. This is in addition to the list at the beginning of the transaction summary section.

Number of totals for ADJUSTMENT transactions

• *TREBAT:*

Received from On Order byte is left blank.

Effect on Not On Order byte:

If the Received From On Order byte is blank, the From Classification Code is Not On Order and if the transaction increases the Total Quantity Present, this byte is set to "+".

If the Received From On Order byte is blank, the from classification code is not on order and the transaction decreases the Total Quantity Present, this byte is set to "-".

All other transactions are blank.

Display-Only Fields:

Resource Description

Entry Fields:

Resource
Warehouse
Location
Quantity
Update Online Byte
Unit of Measure
Detail Code
Year
Period
Date
Time
Shift Reference Number
Operator
Accounting Group
Miscellaneous Field 1
Miscellaneous Field 2
Miscellaneous Field 3
Suspend Byte
Verify Byte
Duplicate Byte
Comment Required Fields:

Resource
Warehouse
Location
Update Online Byte
Suspend Byte
Verify Byte
Duplicate Byte Defaults:

If the system is tailored for single warehouse support, the warehouse defaults to tailoring.
The Unit of Measure defaults to the Last Received Unit of Measure in LOCDTL. If blank or no LOCDTL record exists, the standard UM (RESMST) is used as the default.
The Account Group Number defaults to TRDTCD then to tailoring.
The year defaults to the current year in tailoring.
The period defaults to the current period in tailoring.
The date defaults to the system date.
The time defaults to the system time.
The Update Online byte defaults to tailoring.
The Shift Number defaults to the Session Status Screen.
The Operator's Initials default to the Session Status Screen.

Edits:

*Transaction* Type is checked to make sure the user is authorized.
The resource must exist in RESMST.
The Resource/Warehouse must exist in RESBAL.
The warehouse is protected if single warehouse support exists.
The location must exist in LOCDTL for this resource/warehouse/location.
The quantity cannot be negative.
The Update Online byte must be Y or N.
If the unit of measure is entered, it must be convertible standard unit of measure
Transaction Detail Code must be valid.
Period cannot be closed.
The date must be valid.
The time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK19 | Return to Transaction Selection Screen |

CommandKeys (Non-Display):

| | |
|---|---|
| CK07 | Send Message To Action List |
| CK17 | Error Message Override |
| HELP | Help Text |

Issue To Production—MIE44216

An IP transaction is used to indicate that a resource has been taken out of inventory and sent to the shop floor to be used in production. This is done without indicating the exact schedule that is using the resource. The IP Transaction is the same as a Direct Issue (DI) except the user cannot enter a schedule.

Reservations do not exist for an issue to production, so there is no need to update the RESRES file. However, allocation do exist for the issue to production. The IP Transaction does NOT update the allocated quantity fields. This is done when the Calculated Cost Transaction is generated.

Updates

Reminder: This section only contains updates for those files and fields that require a detailed explanation. For the remainder of the updates, please see the *Summary of Transaction Updates* table.

Before processing any updates, the transaction quantity is converted to standard UM. All file quantities are in standard UM unless otherwise specified.

- *LOCDTL:*

Quantity at Location (in Std UM) is decreased using Trans Quantity (in Std UM).

Quantity at Location in Last received UM: The transaction quantity is converted to last received UM then the result is subtracted from the Qty at location last UM.

Quantity Reserved (manufacturing) is NOT reduced.

- *RESBAL:*

Number of transactions since the last cycle count

Quantity Reserved (Manufacturing) is NOT reduced.

Allocated Quantity (Manufacturing) is NOT reduced.

The Allocated Quantity is not reduced by the issue to production transaction because the calculated cost transaction reduces it.

Quantity consumed to date is increased using Trans Quantity in std UM.

Total Quantity Present is reduced using Trans Quantity in standard UM.

Quantity On Order: If the From Location is classified as On Order = Y, Qty On Order is reduced using trans quantity in standard UM.

On Hand Quantity: If the From Location is classified as On Hand = Y, On Hand Qty is reduced using trans quantity in standard UM Date of Last Effect on On Hand Quantity: If the From Location is classified as On Hand = Y, then today's date is the Date of Last Effect.

Date Last Activity is today's date.

- *TRHIST:*

Transaction Quantity in Standard UM is updated.

Effect on Inventory $: If the From Location is Inventory $ = YES, byte is set to "-".

Effect on Non-Plan Quantity: If the From Location is Avail for Planning = 2, this byte is set to "-".

Effect on Not On Order byte: If the From Location is On Order inventory = N and if the transaction decreases the total quantity present, this byte is set to "-".

Effect on Not On Order byte: If the From Location is On Order Inventory = N and if the transaction increases the Total Quantity Present, this byte to is set to "+".

Effect on On Hand byte: If the From Location is On Hand Inventory = Y and if the transaction decreases the Total Quantity Present, this byte is set to "-".

Effect on On Hand byte: If the From Location is On Hand Inventory = Y and if the Transaction increases the Total Quantity Present, this byte is set to "+".

Resource Class

Resource Sub-Class

The following files are updated even if this is NOT online updating. This is in addition to the list at the beginning of the transaction summary section.

- *TRCTRL:* totals for ISSUE transactions

- *TREBAT:*

Received From On Order byte is left blank.

Effect on Not On Order byte: If the From Location is On Order Inventory = N and if the transaction decreases the total quantity present, this byte is set to "-".

Effect on Not On Order byte: If the From Location is on Order Inventory = N and if the transaction increases the total quantity present, this byte is set to "+".

Effect on On Hand byte: If the From Location is On Hand Inventory = Y and if the transaction decreases the total quantity present, this byte is set to "-".

Effect on On Hand byte: If the From Location is On Hand Inventory = Y and if the transaction increases the Total Quantity Present, this byte is set to "+".

Display-Only Fields:

Lot Number
  Grade
  Potency Factor
  Revision Level
  Resource Description

Entry Fields:

Resource
  Warehouse
  Location
  Quantity
  Update Online Byte
  Unit of Measure Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Resource
Warehouse
Location
Quantity
Update Online Byte
Suspend Byte
Verify Byte
Duplicate Byte Defaults:

If the system is tailored for single warehouse support, the warehouse defaults to tailoring.

The unit of measure defaults to the last received unit of measure in LOCDTL.

The Account Group Number defaults to TRDTCD then to tailoring.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

Edits:

Transaction Type is checked to make sure the user is authorized.

The resource must exist in RESMST.

The Resource/Warehouse must exist in RESBAL.

The warehouse is protected if single warehouse support exists.

The location must exist in LOCDTL for this Resource/Warehouse/Location.

The quantity cannot be zero.

The quantity cannot be greater than what is available at the From Location. This means that the trans quantity must be less than or equal to (Quantity at location (Std) - sales reserved quantity).

The Update Online byte must be Y or N.

If the unit of measure is entered, it must be convertible to the standard unit of measure.

The Transaction Detail Code must be valid.

The Period cannot be closed.
The date must be valid.
The time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK19 | Return to Transaction Selection Screen |

Command Keys (Non-Display):

| | |
|---|---|
| CK07 | Send Message To Action List |
| CK17 | Error Message Override |
| HELP | Help Text |

Cost Adjustment—MIE44217

A CA transaction is used in the following manner. The user runs the Accrual Report in the previous period to enter the estimated transaction amount for the transactions. For any transaction where the estimated amount is not equal to the actual amount and the period is closed, the user can enter a Cost Adjustment Transaction.

The Cost Adjustment Transaction is used during the next actual period close to calculate the new Average Cost for the Resource. Any error that was made during the previous period is now corrected.

A user can perform a CA transaction in two ways. The user can key in the actual amount of a transaction. This is done if the operator wants to change the transaction amount for a particular transaction entered during a period that is closed. To do this, the user must know the original transaction number. The original transaction is NOT updated. It must, however, exist in TRHIST and be a Change Classification Transaction.

If the above method is used and the transaction does not exist in TRHIST, or if the transaction is not a change classification transaction, a HARD HALT message is displayed.

In the second method, the operator makes an adjustment to a resource's transaction amount for the period without knowing the exact transaction number. In this case, the operator simply keys in the resource, warehouse, and adjustment amount.

It is important to notice that it is the ACTUAL AMOUNT is entered in the first method, but the ADJUSTING AMOUNT is entered in the second method. The adjusting amount is loaded into the Transaction Amount field in the transaction entry file.

Updates

Reminder: This section only contains updates for those files and fields that require a detailed explanation. For the remainder of the updates, please see the *Summary of Transaction Updates* table.

- *TRHIST:*
  - All fields from the entry screen.
  - Transaction Quantity in standard UM
  - Resource Class
  - Resource Sub-Class The following files are updated even if this is NOT online updating. This is in addition to the list at the beginning of the transaction summary section.

- *TRCTRL:*
  - # totals for ADJUSTMENT transactions
  - Actual $ entered—Trans Amount (TRHIST) = Adjustment Quantity.

Display-Only Fields:

Resource Description

Entry Fields:

Resource
Warehouse
Adjusting Amount
Transaction Number
Actual Amount
Update Online Byte
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Resource
Warehouse
Adjusting Amount
*Or:*
Transaction Number
Actual Amount
*Always:*
Update Online Byte
Suspend Byte
Verify Byte
Duplicate Byte Defaults:

If the system is tailored for single warehouse support, the warehouse defaults to tailoring.

The Account Group Number defaults to TRDTCD then to tailoring.

Year defaults to the current year in tailoring.
Period defaults to the current period in tailoring.
Date defaults to the system date.
Time defaults to the system time.
Update Online byte defaults to tailoring.
Shift Number defaults to the Session Status Screen.
Operator's Initials default to the Session Status Screen.

Edits:

Transaction Type is check to make sure the user is authorized.
The resource must exist in RESMST.
The Resource/Warehouse must exist in RESBAL.
The warehouse is protected if single warehouse support exists.
The adjusting amount cannot be zero.
If the transaction number is entered it must exist in TRHIST and be a change classification.
Update Online byte must be Y or N.
Transaction Detail Code must be valid.
Period cannot be closed.
Date must be valid.
Time must be valid.
Suspend byte must be Y or N.
Verify byte must be Y or N.
Duplicate byte must be Y or N.

Command Keys (Display):

CK01 Session Status
CK02 Page Forward
CK03 Page Backward
CK05 Comments
CK08 Detail Codes
CK11 Alpha Search
CK12 Account Override
CK19 Return to Transaction Selection Screen Command Keys (Non-Display):

CK07 Send Message To Action List
CK17 Error Message Override
HELP Help Text

Transaction Type Selection Screen—MIE44218

The Transaction Type Selection Screen is the next screen displayed after a batch has been selected from the Batch Selection Screen. This screen is also displayed after CK01 is taken from any Transaction Type Entry Screen.

The Transaction Type Selection Screen displays a menu, listing each of the transaction types and the corresponding transaction type selection number. (The user transaction types are entered by selecting the Change Classification transaction type.)

The Transaction Type Selection Screen is used to select a transaction type for entry or to display the batch status. If CK01 is selected, the batch status screen is displayed. From the Batch Status Screen, options are available to exit and close the batch, exit and suspend the batch, or return to the Batch Selection Screen. If the operator presses enter from the Batch Status Screen, the Transaction Type Selection Screen is redisplayed.

Entry Fields:

Transaction Type/Number

Required Fields:

Transaction Type/Number

Edits:

The Transaction Type must be valid.
The User must be authorized for the Transaction Type.

Command Keys (Display):

CK01 Session Status

Command Keys (Non-Display):

CK07 Send Message To Action List
HELP Help Text

Subfile For Review Transactions—MIE442219

Display-Only Fields:

Batch Number
Transaction Number
Transaction Type
Status
Code
Transaction Date
Resource Number
Warehouse
Quantity Entry Fields:

Maintain/Delete (X/D) byte

Required Fields:

Maintain/Delete (X/D) byte

Edits:

X and D are the only valid entries for the Maintain/Delete option.

Review Transactions—Control Format—MIE444220

Review Transactions is an additional menu option on the Transaction Selection Screen. When this option is selected, the Transaction Review Screen is displayed (MIE44220) along with the subfile of all the transactions. The operator can limit the transactions reviewed to Entered But Not Updated, Suspended, or Error transactions by placing an X in the field and selecting CK06.

If the operator selected Entered But Not Updated Transactions, the subfile is built from TREBAT. Only records with this batch number and the status code of N are added to the subfile. If the operator selected to review just suspended transactions, the record status would have to be S. If the operator selected only error transactions, the record status would be E.

After the subfile is displayed, the operator can select a transaction for maintenance or deletion. If a D is selected, the transaction is deleted. A transaction that has been updated or partially updated cannot be deleted. A record can be selected for maintenance by placing an X next to the desired subfile record. A partially updated or updated transaction cannot be maintained.

When a record is selected for maintenance, the transaction type of that transaction is analyzed. If the transaction type is one which is processed by MIE442, then MIE442 is called and passed two parameters. The first parameter is the transaction type and the second is the transaction number. If the transaction type is one processed by MIE444, then MIE444 is called and passes FIVE parameters. The first parameter is the Transaction Type, the second parameter is the Transaction Number. The third, fourth, and fifth parameters are blank as they apply only in the Issue to Shortage Screen.

After the transaction has been selected for maintenance, the appropriate transaction entry screen is displayed with the existing transaction information. The operator can enter new information or maintain the existing information. After the operator presses ENTER, the normal edits are done. If the edits are met, the normal transaction updates are done and the transaction status (TREBAT) is set to N or U. The transaction is set to N if the transaction was not updated on line. If the transaction was updated online, the status is set to U.

After a transaction is maintained, the transaction subfile is redisplayed.

Entry Fields:

Entered But Not Updated Transaction byte
Suspended Transaction byte
Error Transaction byte
All Transactions byte
Start Review at this Transaction Number byte

Command Keys For Review Transactions—MIE44221

Edits:

CK20 must be selected a second time to confirm deletion

Command Keys (Display):

| | |
|---|---|
| CK01 | Session Status |
| CK06 | Rebuild |
| CK19 | Return to Transaction Selection Screen |
| CK20 | Delete |

Command Keys (Non-Display):

| | |
|---|---|
| CK07 | Send Message To Action List |
| HELP | Help Text |

Batch Status Screen—MIE44222

The Batch Status Screen is displayed from almost any screen in Transaction Entry when the user presses CK01. This screen displays session totals and batch totals. From this screen the user can return to the Transaction Selection Screen or the Batch Selection Screen or exit Transaction Entry.

While in this screen, the operator can do one of the following:

a. Press ENTER—Processing returns to Transaction Selection menu.
b. Select CK01—This exits the Transaction Entry program and returns to the menu that is called Transaction Entry. The batch status is set to either Closed or Suspended depending on the selection of the Close/Suspend byte.
c. Select the byte to return to the Batch Selection Screen. If this byte is selected, the batch is either Closed or Suspended, depending on the value of the Close/Suspend byte.

The operator can select to print the batch. If this option is selected (CK13), a CL program is called that in turn calls the Transaction Batch Report Program (MIR062X). The CL program does NOT call the Report Prompter program. Instead, the batch number currently being used for entry is passed to the Transaction Batch Report program through the GPLDA batch number limits. The CL program called from this program is not the same as the CL program called from the Report Menu Option—Transaction Batch Report.

The Transaction Batch Report can be run interactively or in batch. The Batch Status Screen allows the user to select which option to use. That option is passed through the GPLDA to the Transaction Batch Report CL program.

The dollar transaction amount total on the Batch Status Screen is updated by only those transactions that have the Transaction Amount as an entry field.

Display-Only Fields:

Batch Number

The following fields are displayed for both session and batch totals:

Number of Sales Transactions
Number of Scrap Transactions
Number of Issue Transactions
Number of Adjustment Transactions
Number of Production Receipt Transactions
Number of Change Classification Transactions
Number of Suspended Transactions
Number of Updated Transactions
Number of Error Transactions
Total Number of All Transactions
Sales Dollars
Total Dollars for All Transactions Entry Fields:

Close/Suspend byte
Return to Batch Selection Screen byte

Defaults:

Close/Suspend option defaults to Tailoring (Question T1).

Edits:

CK20 must be selected a second time to confirm deletion.

Batch Update Code must be S or C.

Command Keys (Display):

CK01 End Job
CK13 Print Batch
CK19 Return to Selection Screen
CK20 Delete Batch

Command Keys (Non-Display):

CK07 Send Message To Action List
HELP Help Text

Subfile For Transaction Comment Entry And Review—MIE44223

Display-Only Fields:

Line Number

Entry Fields:

Delete Code
Comment Line

Required Fields:

Delete Code

Edits:

Delete Code must be D or blank.
Embedded blank comments are not allowed.

Transaction Comment Entry And Review—Control Format—MIE44224

This screen can be accessed by selecting CK05 from any transaction entry screen. This program allows the operator to enter new transaction comments or review existing transaction comments.

When the operator selects CK05 from the transaction entry screen, the next screen that appears displays all the existing comments for the transaction, followed by blank lines and the Transaction Number (on the top of screen). The Transaction Number defaults to the last Transaction Number entered, but can be overridden. The operator then enters any new comments for that transaction into the blank subfile records below.

When the operator presses ENTER, any changes made to the existing comments and any new comments are updated into the file (TRCOMM).

Display-Only Fields:

Transaction Number

Command Keys For Transaction Comment Entry And Review—MIE44225

Command Keys (Display):

CK18 Refresh Screen
CK19 Return without Update

Command Keys (Non-Display):

CK07 Send Message To Action List
CK17 Error Message Override
HELP Help Text

Subfile For Transaction Detail Code Display—MIE44226

Display-Only Fields:

Transaction Detail Code
Transaction Detail Description
Default Accounting Group Number

Display Transaction Detail Codes—Control Format—MIE44227

This screen can be accessed by selecting CK08 from any transaction entry screen. This screen displays all the transaction detail codes for the transaction type being entered.

This program builds a subfile by setting lower limits to the Transaction Detail Code file (TRDTCD) and reading all transaction detail code records for this transaction type. Each transaction detail code is a separate record in the subfile. The subfile contains the following fields: Transaction Detail Code, Transaction Detail Description, and the default Accounting Group Number. The Transaction Type is displayed on the top of the screen.

Also, this screen displays not only transaction detail codes with this transaction type, but also transaction detail codes with a blank transaction type. Transaction detail codes with a blank transaction detail type are valid for all transactions.

Display-Only Fields:

Transaction Type

Command Keys (Non-Display):

CK07 Send Message To Action List
HELP Help Text

Command Keys For Transaction Detail Code Display—MIE44228

Display-Only Fields:

Transaction Type

Command Keys (Non-Display):

CK07 Send Message To Action List
HELP Help Text

Change Classification—MIE44229

This transaction is used to change the attributes of material in a location. Also, it can be used to move the material to a new location with the new attributes. The user defines his/her own transactions that predefine the location attributes. There is a master file (USRTRN) for these user-defined transactions.

The user is able to perform a reclassification by resource/lot number. This means that the operator enters the new classification, resource, and lot number. The program updates every location record for that Resource/Lot Number combination with the changed attributes. (This requires using a logical view of the Location Detail file by Resource/Lot Number.)

However, when the reclassify option is selected, ONLY locations that have a valid classification code for this transaction type are reclassified. This means that the classification code of each location record is compared to the list of valid From Classification Code for the transaction type. When the reclassify option is taken, this program generates one TREBAT record for each location that was reclassified.

The user-defined transactions can be defined so that material can be moved from a valid location to a blank location. One example is sending material back to the vendor. In this case, the To Classification is blank.

A Receipt from vendor transaction is processed by the change classification transaction. Some change classification transactions can be coded so that the From Location must be blank.

If the To Classification is On Hand = Yes, and the From Classification Code is On Hand = No, the From Classification code equals the Required From Classification Code defined in RESMST. This edit is used for resources that must go through quality control. The To Classification Code defaults from the USRTRN file for this transaction type.

The quantity cannot be negative. If the operator wishes to backout an entered transaction, the From and To Locations can be reversed. If the operator enters a Purchase Order Number, the status is set to Complete by placing a C in the Completion Code field.

Any Change Classification Transaction that moves a resource from a location classification that is available for planning to a locations classification that is unavailable for planning, sets the RE-PLAN flag in RESMST on. (The opposite is also true.)

If the reclassify byte equals Y, the only other fields available for entry are the resource and lot number.

1. The Purchase Order file is updated if the transaction goes from an On Order status to a Not On Order status.
2. The Location file is updated to reflect the new balance and classification.
3. Update the resource balance file to reflect any change in classification i.e., no longer on order, no longer on hand, etc.).
4. The Lot Master file is updated. If it is a new lot number, then a record is added. If it is an old lot number, the record may have to be updated.

To update the TRHIST record, the program calculates the effect on Inventory $ and the effect on Avail for Planning Quantity. The program calculates this because there are going to be multiple From Classifications. This means that each Location Detail record might have a different effect on these quantities.

So, as each location detail record is read, the From Classification Code is checked. If the From and To classification codes are such that there is an effect on Inventory $ or avail for planning quantity, the program adds or subtracts to either The Accumulated Effect on Inventory $ or The Accumulated Effect on Avail for Planning Quantity. These two accumulated fields are then used to update the TRHIST record.

Updates

Reminder: This section only contains updates for those files and fields that require a detailed explanation. For the remainder of the updates, please see the *Summary of Transaction Updates* table.

• *LOCDTL:*

If the Reclassify byte equals Y, all LOCDTL records with the entered Resource/Lot Number have their classification codes changed. For each of these locations, one TRHIST record is generated. No generated records are added to the TREBAT file.

If the Reclassify byte equals N:
*From location:*

Quantity At Location (in standard UM) is reduced.
Quantity At Location (in received in UM) is reduced.

*To Location:*

Updates to an EXISTING record:
Quantity At Location (in standard UM) increased.
Quantity At Location (in last received UM) increased.
Last Received UM
Potency Factor: see calculations.

The user can transfer a resource from one location to another even if there is a different potency factor at the new location. If this is done, the potency factor is recalculated at that To Location. To calculate the potency factor at the new location see the example below.

The program:

A. calculates the new quantity at location (standard UM);

B. calculates the new potent units at the location (adds the potent unit quantity from the From Location to the potent unit quantity from the to Location);

C. calculates the new potency factor at the To Location (new potent units divided by new qty at location).

ETD—Estimated Time of Departure is updated based on the tailoring questionnaire.

Should the ETD date be:

A. the earliest date;
B. the latest date;
C. the ETD date of the From Location;
D. not changed at all?

Shelf life expiration date is updated based on tailoring.

T28. If performing a transaction, both locations (To and From) are specified and the To location is an existing location, should the shelf life expiration date be:

A. the earliest date (between the two locations);
B. the latest date (between the two locations);
C. the date of the From Location;
D. not changed at all;
E. Transaction Date plus Shelf Life Days?

T27. If performing a transaction, the From Location is not specified and the To Location is an existing location, should the shelf life expiration date be:

A. Transaction Date plus Shelf Life Days;
B. the date of the From Location?

T29. If performing a transaction, both locations (To and From) are specified and the To location is a new location, should the shelf life expiration date be:

A. Transaction Date plus Shelf Life Days;
B. the date of the From Location?

If Shelf Life is inactive for this resource, the shelf life date is set to 99/99/99.

If shelf life is active, it is updated based on tailoring.

If there is a From Location and there is a To Location which has an existing LOCDTL record, tailoring question #1 is used for updating.

If there is NOT a From Location and there is a To Location, tailoring question #2 is checked. (But, if there is no LOCDTL record for the To Location then the transaction date plus the # of shelf life days is used.)

If there is a From Location and there is a To Location that does not have an existing LOCDTL record, tailoring question #3 is checked.

*Updates to a NEW record:*

Location = To Location from entry screen

Warehouse = To Warehouse from entry screen

Resource = resource from entry screen

Grade = the grade from entry (defaults to from grade)

Lot # = the lot # from entry (defaults to from Lot #)

Quantity at Location (Std) = transaction quantity converted to Std UM.

Standard UM = taken from the RESMST record for this transaction.

Resource class = extract from RESMST

Resource sub-class = extract from RESMST

Quantity in last received UM = Transaction Quantity

Last received UM = transaction UM

Potency Factor = from the entry screen or calculated

Revision Level = from the entry screen

Classification code = the to classification code

All classification bytes = extract from CLASCD using the to classification code

Quantity Reserved—manufacturing is set to zero.

Quantity Reserved—sales is set to zero.

ETD = calculated based on the number of days defined in CLASCD. The number of days defined in the CLASCD file can be expressed in calendar days or work days. There is a byte in the CLASCD file that determines which to use.

Picking Override Sequence Number—see edits for Picking Override Sequence #.

Shelf Life Expiration Date is either the shelf life date of the From Location or the transaction date. It is based on tailoring plus the number of shelf life days for the resource. The tailoring question below is used:

When transferring a resource to a new location, the shelf life date should be:

A. the date of the from location;

B. the transaction date.

If the transaction date is specified, the shelf life date must be calculated: transaction date plus # of shelf life days for this resource.

• *LOCMAS:*

If the LOCMAS record does not exist for the To Location, a record is added to the LOCMAS file.

• *LOTMAS:*

The following updates are not needed unless the reclassify byte equals N. This is because if the operator chose to reclassify then the From and To lot are equal.

From Lot Number: If the To Lot Number does not equal the From Lot Number, the Miscellaneous Quantity Disposed Of is updated by adding the quantity.

To Lot Number: If the To Lot # does not equal the From Lot #, then existing record, last receipt date, and total lot quantity received (standard UM) are updated.

If a record does not exist, a record is added to LOTMAS file. The following updates are done:

Lot # = To Lot # from entry screen

Resource # = Resource # from the entry screen

Schedule/PO = PO Number (if entered)

OLSN = zeros

Release = PO Release Number (if entered)

PM Type = Blanks

PM Name = Blanks

Reference number = Blanks (This does not equal the entry field called Reference Number; this is the Reference Number tied to a schedule release.)

First Receipt Date = User-entered Transaction Date

Initial Receipt Quantity = Transaction Quantity in Std UM

Code (Purchased or Manufactured) = P if PO is entered.

Vendor # extracted from POSUMM if PO is entered.

Vendor name extracted from POSUMM if PO is entered.

Lot Quantity Issued = zero

Lot Quantity Shipped = zero

Lot Quantity Misc Disposed Of = zero

Total Lot Quantity Received = Transaction Qty (Std UM)

*RESMST:*

Replan flag Y/N: The replanning flag is set on if the transaction goes from a classification that was available for planning to a classification that was unavailable for planning.

- *RESBAL:*

The following updates apply regardless of the value of the Reclassify byte. All of the quantities below are in standard UM.

Whether or not the system is tailored to edit the PO #, if the PO # exists in POSUMM, then the RESBAL file (Quantity On Order) is updated.

If the From Location is not entered, the Transaction Quantity is added to the Total Quantity Present.

If the To Location is not entered, the Transaction Quantity is subtracted from the Total Quantity Present.

If the From classification is On Order = No, and the To Classification is On Order = Yes, the transaction quantity is increased by the Total Quantity On Order.

In addition to the above update of the Total Quantity On Order, if the transaction changed the On Order classification and had a transaction amount entered, the Historical Average Cost field and the Rolling Average Cost w/Alpha Factor field must be updated. See *Miscellaneous Receipt* section for the calculations.

If a PO Number is entered and it exists in POSUMM, the From Location is On Order = No and the To Classification is blank or On Order = Yes, the Transaction Quantity is added to the On Order Quantity.

If a PO Number is entered and it exists in POSUMM, the From location is blank or On Order = Yes and the To Location is On Order = No, the Transaction Quantity is subtracted from the On Order Quantity.

On Order Quantity: If the From Classification is On Order = Yes, and the To Classification is On Order = No, the program subtracts the lesser of:

A. The Transaction Quantity

B. Quantity Ordered - Quantity Received from On Order

The quantities used in (B) are the quantities from PODETL prior to this transaction. Note: The On Order Quantity cannot be negative.

If the From Classification is On Order = No, and the To Classification is On Order = Yes, the Transaction Quantity is added to the On Order Quantity.

On Hand Quantity: If the From Classification is On Hand = Yes, and the To Classification is On Hand = No, the Transaction Quantity is subtracted from the On Hand Quantity.

If the From Classification is On Hand = No and the To Classification is On Hand = yes, the Transaction Quantity is added to the On Hand Quantity.

If the On Hand Quantity is effected, the Date Last Effect on the On Hand Quantity is updated.

Date Last Activity = Transaction Date (user)

- *PODETL:*

This file is only updated if a PO # was entered.

Whether or not the system is tailored to edit the PO #, if the PO# exists in POSUMM, the POSUMM file and RESBAL file are updated.

Date Last Receipt is updated.

Quantity Received to On Hand is increased if the To Classification is On Hand = Yes and the From Classification is On Hand = No.

Quantity Received from On Order is increased if the To Classification is On Order = Yes and the From Classification is On Order = No.

- *POSUMM:*

Whether or not the system is tailored to edit the PO #, if the PO # exists in POSUMM, the POSUMM file is updated.

If the PO status is not Received Against, the PO status byte is updated to a Received Against status.

If the Completion Code equals C, the PO status is set to Complete.

- *TRHIST:*

All entered fields are updated plus:

Transaction Quantity in standard UM

Transaction Amount was entered Y/N

If the operator entered anything into this field, (including zero), this byte is set to Y. (This is needed for the Accrual Report.)

Effect on inventory $ = (+, −, or blank):

If the From Location is blank or Inventory $ = N and the To Location is Inventory $ = Y, the byte is set to "+".

If the To Location is blank or Inventory $ = N and the From Location is Inventory $ = Y, this byte is set to "−".

If the To Location is blank and the From Location is Inventory $ = N, the byte is set to blanks.

If the From Location is blank and the To Location is Inventory $ = N, the byte is set to blanks.

Effect on Non Planning Quantity = (+, −, or blanks):

If the From Location is blank or Available for Planning = 1 or 2, and if the To Location is Available for Planning = 0, the byte is set to "+".

If the From Location is blank or Available for Planning = 0, and if the To Location is blank or Available for Planning = 1 or 2, then set the byte to "−".

If the From Location is blank and the To Location is Available for Planning = 1 or 2, the byte is set equal to blanks.

If the To Location is blank and the From Location is Available for Planning = 1 or 2, the byte is set equal to blanks.

Received from On Order byte:

If the From Location is blank or On Order = Y and the To Location is On Order = N, the byte is set to "+".

If the To Location is blank or On Order = Y and the From Location is On Order = N, the byte to is set to "-".

Received to On Hand byte:

If the From Location is blank or On Hand = N and if the To Location is On Hand = Y, the byte is set to "+".

If the To Location is blank or On Hand = N and if the From Location On Hand = Y, the byte is set to "-".

Resource Class
Resource Sub-Class

The following fields are updated even if this is NOT online updating. This is in addition to the list at the beginning of the transaction summary section.

- *TRCTRL:*
  - # totals for CHANGE CLASSIFICATION transactions
  - $ totals of all transactions Display-Only Fields:
- From Classification
- From Grade
- From Revision Level
- Resource Description Entry Fields:
- Transaction Type
- Resource
- Quantity
- Move All Byte
- Reclassify Byte
- From Warehouse
- From Location
- From Lot Number
- To Warehouse
- To Location
- To Lot Number
- To Classification
- To Grade
- To Revision Level
- To Potency Percentage
- Update Online Byte
- Unit of Measure
- Detail Code
- Year
- Period
- Date
- Time
- Shift
- Reference Number
- Operator
- Accounting Group
- Purchase Order Number
- Purchase Order Release Number
- Purchase Order Completion Code
- Transaction Amount
- Report 0 Amount Byte Picking Override Sequence Number
Miscellaneous Field 1
Miscellaneous Field 2
Miscellaneous Field 3
Suspend Byte
Verify Byte
Duplicate Byte
Comment Required Fields:

If Reclassify = Y,
Transaction Type
Resource
From Lot Number
To Classification

If Reclassify = N,
Transaction Type
Resource
Quantity
From Warehouse
From Location (see edits)
To Warehouse
To Location (see edits)
Purchase Order Number (see edits)
Purchase Order Completion Code
To Classification
To Lot Number (see edits)

Always Required:
Update Online Byte
Report 0 Amount Byte
Move All Byte
Suspend Byte
Verify Byte
Duplicate Byte Defaults:

If the system is tailored for single warehouse support, both warehouses default to tailoring.

The From Lot Number defaults to LOCDTL of the From Location.

The From Classification defaults to LOCDTL of the From Location.

The To Classification defaults from USRTRN for the entered transaction type.

The To Grade defaults to LOCDTL for the From Location. If the From Location does not exist in LOCDTL then To Grade defaults to LOCDTL for the To Location.

The To Revision Level defaults from RESMST for the current revision level.

The To Lot Number defaults to LOCDTL of the To Location.

The To Location defaults to the From Location.

The Potency Factor defaults to LOCDTL for the From Location, then to LOCDTL for the To Location, then to RESMST.

The Unit of Measure defaults to LOCDTL for the Last Received UM, then to LOCDTL for the To Location, then to RESMST.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

The Account Group Number defaults to TRDTCD then to USRTRN.

If the PO Number is entered the PO release number defaults to 1.

If the system is tailored to have the Transaction Amount default, it defaults to quantity times PO price. If the PO price does not exist, then it defaults to quantity times selected unit cost.

If the Picking Override Sequence Number is Active, then defaulting is:

If the TO location is a new location, 1. screen entry if not equal to zero;
2. Location Master if not equal to zero;
3. the From Location value if one exists;
4. Tailoring.

If the TO location already exists:

1. screen entry if not equal to zero;
2. unchanged at the existing location.

If the Picking override sequence number is inactive, then defaulting is tailoring.

Edits:

Transaction Type is checked to make sure the user is authorized.

Transaction Type must exist in USRTRN.

The resource must exist in RESMST.

The resource must be a balance resource if Reclassify = Y.

The resource/To Warehouse must exist in RESBAL if it is a balance resource.

The resource/From Warehouse must exist in RESBAL if it is a balance resource.

The Warehouse is protected if single warehouse support exists.

The Quantity cannot be zero unless the Move All Byte = Y.

The Quantity cannot be negative.

The Quantity cannot be be greater than what is available at the From Location (if entered). The quantity is converted to the standard UM before this edit.

The Move All byte must be Y or N.

The Move All byte cannot be Y if the transaction amount is entered.

The Reclassify byte must be Y or N.

The From Location must exist in LOCDTL for the resource/warehouse/from location.

The From Location is required if specified in USRTRN for the entered transaction type.

The From Classification must exist in USRTRN for the Transaction Type if the From Location is Restricted = Y.

The Lot Number must be valid if From location is Restricted = Y.

The Location Number is required if specified in USRTRN

The program edits for a LOCMAS record for the entered To Location if specified in tailoring.

If the To Location Number has an record in LOCDTL, the To Lot Number entered must match the To Lot Number in the LOCDTL record.

If RESMST and CLASCD are Lot Tracking Required, then the To Lot Number is required.

If the transaction number is entered, it must exist in TRHIST and be a change classification.

The To Classification Code must exist in CLASCD and be Active.

The To Classification Code must exist USRTRN as valid for the entered Transaction Type.

The From Classification Code must equal the Required From Classification Code in RESMST. If it is not blank, the To Classification Code is defined as On Hand = Yes, and the From Classification Code is defined as On Hand = No.

If the To Location has a LOCDTL record, the program edits to see if the To Grade equals the Grade in the LOCDTL record The To Revision Level must be greater than or equal to the Current Revision Level in RESMST.

If the To Location has a LOCDTL record, the program edits to see if the To Revision Level matches the one in LOCDTL.

The Potency Factor is not allowed if the resource is not a potent resource.

If the To Location has a LOCDTL record the program edits to see if the Potency Factor is the same.

The Update Online byte must be Y or N.

The Unit of Measure must be convertible to the standard unit of measure.

The Transaction Detail Code must be valid.

The Period cannot be closed.

The Date must be valid.

The Time must be valid.

The Purchase Order Number is required if any of the following are true:

1. The USRTRN file specifies PO Number Required = Yes.
2. The From Location is blank.
3. The To Location is blank.
4. The From Classification is On Order = Yes.
5. The To Classification is On Order = Yes.

The Purchase Order Number is not allowed if none of the above conditions exist.

The PO Number must exist in POSUMM if specified in tailoring and the PO cannot be completed.

The PO Release Number must be 0 if a PO Number was not entered.

The PO Completion Code must be Y or N.

The PO Completion Code must be Y if a PO number is entered.

The Transaction Amount can only be entered if the From Classification is On Order and the To Classification is Not On Order and vice versa.

If the From Classification is blank and the To Classification is Not On Order, the Transaction Amount can be entered.
The Report Amount byte must be Y or N.
The Report Amount cannot be Y if a transaction amount has been entered.
The Suspend byte must be Y or N.
The Verify byte must be Y or N.
The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK06 | Resume Entry (only when paging is in use) |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK10 | Issue to Shortage Screen |
| CK17 | Error Message Override |
| HELP | Help Text |

Subfile For Issue To Schedule—MIE44231

(MIE44230—Does Not Exist in MIE442FM)

Display-Only Fields:

Resource Number
Warehouse
Location
Task
Quantity Remaining
User Unit of Measure

Entry Fields:

Quantity to Issue

Required Fields:

Quantity to Issue

Edits:

The Quantity entered must be less than or equal to the Quantity Available at Location.
The subfile must contain data.
Roll Up is not active if the last record is shown.
Issued Quantity cannot be greater than Remaining Quantity to Issue.

Issue To Schedules—Control Format—MIE44232

There is an additional menu option on the Transaction Selection Screen called Issue To Schedules. When this option is selected, the next screen displayed is an entry screen which allows the user to select a schedule. Once a schedule has been selected, a subfile of reservations is displayed. The subfile is built using direct resources only.

From this subfile screen, the operator can enter the quantity issued on each of the subfile records, or can select a command key to have the system generate all the issue quantities.

The subfile is built from the RESRES file. Lower limits are set to the RESRES file using the Schedule/OLSN/Release Number/Task from the Selection Screen. (If PM Type and PM Name are entered instead of OLSN, the program finds the corresponding OLSN then sets lower limits.) After the set lower limits, the READE operation is used to display all the reservations for that Schedule/OLSN/Release Number/Task.

Before each record is written to the subfile, the program calculates the Quantity Remaining. Quantity Remaining = Quantity Reserved minus Quantity Issued. If the Quantity Remaining is less than zero, the record is not displayed.

If the operator selects CK13, the system generates the Issued Quantities for all the records in the subfile. The system calculates the Issued Quantity to be equal to the Remaining Quantity.

When operator presses ENTER, a direct issue is generated for each resource/warehouse/location. All system defaults are used for each Direct Issue generated. All the edits that are done for a regular operator-entered DI transaction are also performed for an Issue to Schedule transaction. If the Direct Issue generated by using all the defaults has errors, an error transaction is entered. In this case, updates for the transaction are omitted.

Updates

Reminder: This section only contains updates for those files and fields that require a detailed explanation. For the remainder of the updates, please see the *Summary of Transaction Updates* table.

All updates that are performed for each Direct Issue Transaction are performed for each system-generated direct issue.

After all updates have been performed, the top of the subfile is redisplayed and the operator can perform more issues. CK01 is available to exit the function.

This function can be selected from either MIE442 or MIE444. If selected from MIE442, the top of the Issue To Schedules subfile is displayed by MIE442 and MIE444 is called. All processing for this function is done in MIE444.

Entry Fields:

Schedule
OLSN
Release #
PM Type
PM Name
Task
Update Online byte

Required Fields:

Schedule
Update Online byte

Defaults:

If the Release Number and OLSN are not entered, they default to 1.

If the PM Type and PM Name are not entered, they default to the equivalent for the OLSN.

Edits:

Schedule is required.
PM Name cannot be blank if PM Type is specified.
PM Type cannot be blank if PM Name is specified.
PM must exist on the schedule.
Schedule cannot be Completed or Closed.
Schedule/OLSN/Release number must exist.
Schedule cannot be purged.
Update Online code must be Y or N.
Task must exist on the schedule.

Command Keys For Issue To Shortages—MIE44233

Command Keys (Display):

CK01 Session Status
CK13 Generate Issue Quantities
CK19 Return to Transaction Selection Screen Command Keys (Non-Display):

CK07 Send Message To Action List
CK17 Error Message Override
HELP Help Text

Subfile For Issue To Shortages—MIE44241

MIE44234 - MIE44240—Do Not Exist in MIE442FM

Display-Only Fields:

Task
Schedule
Release #
PM Type
PM Name
Status
Shortage Quantity

Entry Fields:

Quantity to Issue

Required Fields:

Quantity to Issue

Edits:

The subfile must contain data.
Roll Up is not active if the last record is shown.
Issued Quantity cannot be greater than Remaining Quantity to Issue.

Issue To Shortages—Control Format—MIE44242

This screen can only be accessed by selecting CK10 from the Change Classification Transaction Entry Screen when a message is displayed stating so.

When doing transaction receipts (Change Classification Transactions) the operator can select a command key to display an Issue To Shortage Screen. This is done after a message is displayed notifying the user of the shortage. The Issue to shortage screen can only be displayed if the Shortage Flag is on in RESMST and the CK10 message is displayed.

The Issue To Shortage Screen is a subfile of all schedules which have a consumed resource and have a reserved quantity (or issued quantity, whichever is greater) less than the allocated quantity. The schedules must have a status of Launched or Running.

At the top of the Issue To Shortage Screen, the quantity being received is displayed in standard UM (if potent, it displays in potent units) .

After the subfile is displayed, the operator can enter a Quantity To Issue next to any of the schedules listed in the subfile. The Quantity entered next to the schedule is issued to that schedule. The operator can issue quantities to as many schedules as s/he likes. The program sends a warning message if the issue quantities add up to more than the quantity being received.

The issue to shortage screen is built by setting lower limits to RMRESRRD (logical view by Warehouse/Resource/Date required). As each record is read, the program edits that the resource is a Consumed resource on this schedule. If it is, the program compares the allocated quantity to the greater of the reserved quantity or the issued quantity. If the allocated quantity is greater, a record is written to the subfile.

When operator presses ENTER, a direct issue is generated for each Resource/Warehouse/Location. All system defaults are used for each Direct Issue generated. All the edits that are done for a regular operator-entered DI transaction are also performed for an Issue to Shortage transaction. If the Direct Issue generated by using all the defaults has errors, an error transaction is entered. In this case, updates for the transaction are omitted.

The Issue to Shortage screen is called from the Change Classification Screen which is in MIE442, but the logic for the Issue to shortages is done in MIE444. So when MIE442 calls MIE444, it passes 5 parameters:

Parameter 1 = Trans #—not applicable for Issue to shortage screen

Parameter 2 = Transaction Type—again not applicable for Issue to Shortage Screen.

Parameter 3 = Resource # being received

Parameter 4 = Quantity Being Received (in standard UM)

Parameter 5 = Byte indicating go directly to the shortage screen

Updates

All updates that are performed for each direct issue transaction are performed for each system-generated direct issue.

After all updates have been performed, the top of the subfile is redisplayed and the operator can perform more issues. CK01 is available to exit the function.

This function can be selected from either MIE442 or MIE444. If selected from MIE442, the top of the issue to schedules subfile is displayed by MIE442 and MIE444 is called. All processing for this function is done in MIE444.

Display-Only Fields:
- Resource Number
- Quantity
- Update Online byte (see edits)
- Unit of Measure Entry Fields:
- Set Off Shortage
- Update Online byte (see edits)

Required Fields:
- Set Off Shortage
- Update Online byte (see edits)

Defaults:
- The Update Online byte defaults to tailoring

Edits:
- The Set Off Shortage byte is required.
- The Quantity entered must be less than or equal to the Quantity Available At Location.
- If TAUPOV = Y, the Update Online code is required.
- If TAUPOV = N, the Update Online code is protected.
- Update Online code must be Y or N.

Command Keys For Issue To Shortages—MIE44243

Command Keys (Display):

| | |
|---|---|
| CK01 | Return |

Command Keys (Non-Display):

| | |
|---|---|
| CK07 | Send Message To Action List |
| CK17 | Error Message Override |
| HELP | Help Text |

B.

| File | Usage |
|---|---|
| *MIE442* | |
| MIE442FM | CF |
| CLASCD | IF |
| CLWORK | IF |
| DGRADE | IF |
| ERRMSG | IF |
| LOCDTL | UF |
| LOCDTLLR | IF |
| LOCMAS | UF |
| LOTMAS | UF |
| PODETL | UF |
| POSUMM | UF |
| RESBAL | UF |
| RESMST | UF |
| RESSUB | IF |
| TALFLI | UF |
| TALFLZ | IF |
| TRCOMM | UF |
| INTFAC | IF |
| TRCTRL | UF |
| TRDTCD | IF |
| TREBAT | UF |
| TREBATTR | IF |
| TRHIST | UF |
| TRHIST49 | IF |
| TRNSEC | IF |
| UMCONV | IF |

| | |
|---|---|
| USRTRN | IF |
| WCMAST | IF |
| QSYSPRT | O |
| *MIE444* | |
| MIE442FM | CF |
| CLASCD | IF |
| CLWORK | IF |
| ERRMSG | IF |
| LOCDTL | UF |
| LOCMAS | UF |
| LOTMAS | UF |
| RESBAL | UF |
| RESMST | UF |
| RESRES | UF |
| RESSUB | IF |
| RMODEL | UF |
| RMODELPP | IF |
| RMRESR | UF |
| RMRESRRD | IF |
| RMTASK | UF |
| RMTASKSQ | UF |
| SCHHIS | IF |
| TALFLD | IF |
| TALFLI | UF |
| TALFLZ | IF |
| TRCOMM | UF |
| INTFAC | IF |
| TRCTRL | UF |
| TRDTCD | IF |
| TREBAT | UF |
| TREBATTR | IF |
| TRHIST | UF |
| TRNSEC | IF |
| UMCONV | IF |
| QSYSPRT | O |

C.

| File Name | Field Name | Description |
|---|---|---|
| *MIE442* | | |
| TALFLI | TAAGCA | Accounting Group for CA Transaction |
| | TAAGCH | Accounting Group for Change Classification Transaction |
| | TAAGIA | Accounting Group for IA Transaction |
| | TAAGIM | Accounting Group for IM Transaction |
| | TAAGIP | Accounting Group for IP Transaction |
| | TAAGMI | Accounting Group for MI Transaction |
| | TAAGMR | Accounting Group for MR Transaction |
| | TAAGRC | Accounting Group for RC Transaction |
| | TAAGSA | Accounting Group for SA Transaction |
| | TAAGTR | Accounting Group for TR Transaction |
| | TABLED | ETD—transaction from a blank location |
| | TABLFD | FIFO—transaction from blank location |

| | | |
|---|---|---|
| | TACCTC | Default Class Code for Theoretical Consumption |
| | TACCTP | Default Class Code for Theoretical Production |
| | TACUPE | Current Period |
| | TACUYR | Current Year |
| | TADCED | ETD—when different Location Classification Codes exist |
| | TADFXB | Default When Exiting Batch |
| | TADLED | ETD for Transferring Resource |
| | TADLFD | FIFO Date—Transaction Resource Old Location |
| | TAEDPO | Edit PO During Transaction Entry? |
| | TAGLOT | System-Generated Lot Numbers |
| | TAGRAD | Grade Variable Heading |
| | TALMRR | LOCMAS record required? |
| | TALPCC | Last Actual Period Close |
| | TALYRC | Last Actual Year Close |
| | TANFSL | SHLD—From Location not Specified |
| | TANLED | ETD for Received Resource to New Location |
| | TANLFD | FIFO Date—Transaction Resource New Location |
| | TANTRN | Next Available Transaction |
| | TANTSL | SHLD—To Locn Spec & New |
| | TAPDYR | Number of Periods in a Year |
| | TAPMNM | PM Variable Heading |
| | TAPOSA | Picking Override Sequence # Active Code |
| | TAPOSQ | Pick List Override Sequence |
| | TARESC | Resource Variable Heading |
| | TARGDE | Grade When Received Resource with Different Grade |
| | TARNBS | Select Negative Balance Resource for CC |
| | TARREV | Revision Level When Received Grade with Different Revision Level |
| | TARTCC | Print Receipt Tickets for CC |
| | TATACH | Transaction Amount Default for CH |
| | TATAMR | Transaction Amt Default for MR |
| | TATLSL | Shelf Life Date—At To Location? |
| | TASCHD | Schedule Variable Heading |
| | TASWHS | Single Warehouse Support |
| | TAUPAL | All Other Trans Update Code |
| | TAUPDI | Update Code for System-generated PC Trans |
| | TAUPPC | PC Transaction Update Code |
| | TAUPPR | PR Transaction Update Code |
| | TAUPPS | Update Code for System Generated PR Transaction |
| | TAUPON | ON Transaction Update Code |
| | TAUPOS | Update Code for System-generated ON Transaction |
| | TAUPOV | Override Update Option Code |
| | TAUPSC | SC Transaction Update Code |
| | TAUPSS | Update Code for System Generated SC Transaction |
| | TAWHSE | Warehouse |
| | TAWKCT | Work Center Variable Heading |
| TALFLZ | TANDEC | User-Defined # of Decimals |

C.

| File Name | Field Name | Description |
|---|---|---|
| *MIE444* | | |
| TALFLI | TAAGCC | Accounting Group for CC Transaction |
| | TAAGCY | Accounting Group for CY Transaction |
| | TAAGDI | Accounting Group for DI Transaction |
| | TAAGON | Accounting Group for ON Transaction |
| | TAAGPC | Accounting Group for PC Transaction |
| | TAAGPR | Accounting Group for PR Transaction |
| | TAAGRA | Accounting Group for RA Transaction |
| | TAAGRS | Accounting Group for RS Transaction |
| | TAAGRT | Accounting Group for RT Transaction |
| | TAAGSC | Accounting Group for SC Transaction |
| | TAAGTC | Accounting Group for TC Transaction |
| | TAAGTP | Accounting Group for TP Transaction |
| | TABLED | ETD—Transaction From A Blank Location |
| | TABLFD | FIFO—Transaction From Blank Location |
| | TACCTC | Default Class Code for Theoretical Consumption |
| | TACCTP | Default Class Code for Theoretical Production |
| | TACUPE | Current Period |
| | TACUYR | Current Year |
| | TADCPR | Default Inventory Class Code for PR |
| | TADFXB | Default When Exiting Batch |
| | TADLPR | Default Location for Production Receipt |
| | TADWPR | Default Warehouse for Production Receipt |
| | TAGLOT | System-Generated Lot Numbers |
| | TAGRAD | Grade Variable Heading |
| | TALMRR | LOCMAS record required? |
| | TALPCC | Last Actual Period Close |
| | TALYRC | Last Actual Year Close |
| | TANFSL | SHLD—From Location not Spec |
| | TANTRN | Next Available Transaction |
| | TAPDYR | Number of Periods in a Year |
| | TAPMNM | PM Variable Heading |
| | TAPOSA | Picking Override Sequence # Active Code |
| | TAPOSQ | Pick List Override Sequence |
| | TARESC | Resource Variable Heading |
| | TARGDE | Grade When Received Resource with Different Grade |
| | TARNBS | Select Negative Balance Resource for CC |
| | TARREV | Revision Level When Received Grade with Different Revision Level |

| | | |
|---|---|---|
| | TARTPR | Print Receipt Tickets for PR |
| | TASCHD | Schedule Variable Heading |
| | TASWHS | Single Warehouse Support |
| | TASCTP | Scrap Transaction Default Resource Type |
| | TATAPR | Transaction Amount Default for PR, ON, TP |
| | TATDCC | Transaction Detail Code for Calculated Cost |
| | TATDIS | Transaction Detail Code for System Issues |
| | TATDTC | Transaction Detail Code for Theoretical Consumption |
| | TATDTP | Transaction Detail Code for Theoretical Production |
| | TAUPAL | All Other Transaction Update Code |
| | TAUPDI | Update Code for System-generated PC Transaction |
| | TAUPPC | PC Transaction Update Code |
| | TAUPPR | PR Transaction Update Code |
| | TAUPPS | Update Code for System-generated PR Transaction |
| | TAUPON | ON Transaction Update Code |
| | TAUPOS | Update Code for System - generated ON Transaction |
| | TAUPOV | Override Update Option Code |
| | TAUPSC | SC Transaction Update Code |
| | TAUPSS | Update Code for System-Generated SC Transaction |
| | TAWHSE | Warehouse |
| TALFLZ | TANDEC | User-Defined # of Decimals |

D.

| Field Name | Position From | To | Description |
|---|---|---|---|
| *MIE442 and MIE444* | | | |
| GPSV1 | 353 | 473 | Information for MIE444 |
| GPBATN | 353 | 355 | Batch Number |
| GPINIT | 356 | 358 | Operator's Initials |
| GPSHFN | 359 | 360 | Shift Number |
| XTSAS | 401 | 404 | SA Session Totals |
| XTSCS | 405 | 408 | SC Session Totals |
| XTMIS | 409 | 412 | MI Session Totals |
| XTRAS | 413 | 416 | RA Session Totals |
| XTPRS | 417 | 420 | PR Session Totals |
| XTCLS | 421 | 424 | Change Classification Totals |
| XTSUSS | 425 | 428 | Suspended Transaction Totals |
| XTUPDS | 429 | 432 | Updated Transaction Totals |
| XTERRS | 433 | 436 | Error Transaction Totals |
| XTTOTS | 437 | 441 | Total Transaction Totals |
| XTSA$S | 442 | 456 | Sales Dollar Totals |
| XTT$S | 457 | 471 | Total Dollar Totals |
| DSEL | 472 | 472 | Delete Byte (Y or N) |
| PAGEF | 473 | 473 | Paging Byte |
| SVTRTP | 475 | 476 | Transaction Type |
| STRANN | 477 | 483 | Transaction Number |
| CCLOCN | 484 | 493 | CC Location Number |
| CCWHSE | 494 | 494 | CC Warehouse |
| GPR01H | 495 | 498 | Saved Paging Field |
| GPCNCL | 1701 | 1701 | Cancel Code |
| GPWSID | 1801 | 1810 | Workstation ID |
| $USRPF | 1811 | 1820 | User Profile |

| | | | |
|---|---|---|---|
| $GPENT | 1821 | 1830 | Entity |
| $USER | 1891 | 1891 | Date Format Code |
| RP | 1895 | 1895 | RP Installed? |
| COST | 1898 | 1898 | Cost Security |
| $UDATE | 1953 | 1958 | Date in User Format |

F. MIE442—when Transaction Batch Update is run a register prints displaying everything in the batch and whether the transactions were previously updated. MIE444 prints an Error Register only if an error occurred during theoretical consumption.

MIE460

Contract File Maintenance

A. The Contract File Maintenance program allows the user to enter and maintain information in the Contract File (CONTRA). This file is used to associate schedules with a contract number. The key to the file is Contract/Schedule #/PM Type/PM Name/Release Number.

SECTION XVI-V

• *Negative Theoretical Consumption:*

A Completed negative production receipt transaction generates negative theoretical consumption. The purpose of negative theoretical consumption is to reverse theoretical consumption done with a positive production receipt.

1. Theoretical consumption ratio in this case is negative.
2. All CC trans are the reverse of positive consumption.
3. All TP transactions are the reverse of positive production.
4. All TC transactions are the reverse of positive consumption.
5. Negative superflush is not done.

• *Summary of Transaction Updates:*

The following tables summarize the updates that occur in addition to Updates1 and Updates2 detailed above. In some cases, additional information can be found under the individual transaction section, listed by screen numbers after the tables.

Summary of Transaction Updates

| Transaction Type | CHn | CHy | DI | IA | IM | IP | MI | MR | PR | RA | RC | RS | RT | SA | TC | TP | TR |
|---|---|---|---|---|---|---|---|---|---|---|---|---|---|---|---|---|---|
| File—LOCDTL | f t | f t | | | | | | | | c p | f t | | | | | | f t |
| Qty @ Locn Std—LDLOCQ | - + | | - | + | X | - | - | + | X | - + | - + | + | - | - | X | X | - + |
| Qty @ Locn LR—LDORUM | - + | | - | + | X | - | - | + | X | - + | - + | + | - | - | X | X | - + |
| Last Recv UM—LDRCUM | X | | | | | | | X | X | | | X | | | | | X |
| Potency Factor—LDPOTF | X | | | | | | | X | X | X | X | | | | | X | X |

Summary of Transaction Updates (continued)

| Transaction Type | CHn | CHy | DI | IA | IM | IP | MI | MR | PR | RA | RC | RS | RT | SA | TC | TP | TR |
|---|---|---|---|---|---|---|---|---|---|---|---|---|---|---|---|---|---|
| Grade—LDGRDE | T | | | | | | | T | T | T | T | T | | | | | T |
| Revision Lvl—LDREVL | T | | | | | | | T | T | T | T | T | | | | | T |
| Qty Resv Mfg—LDQYRM | | | − | | | | | | | | | | | | X | | |
| Qty Resv Sales—LDQYRS | | | | | | | | | | | | | | − | | | |
| Trans # LR—LDTRAN | X | | | | | | | X | X | | X | | | | | | X |
| Date Last Recv—LDDLRC | X | | | | | | | X | X | | X | X | | | | | X |
| Time Last Recv—LDTLRC | X | | | | | | | X | X | | X | X | | | | | X |
| FIFO Date—LDFIFO | T | | | | | | | T | T | | T | T | | | | | T |
| ETD—LDETD | T | | | | | | | T | T | | T | T | | | | | T |
| Shelf Life Dt—LDEXPD | T | | | | | | | T | T | | T | T | | | | | T |
| Classif Code—LDCLCD | | X | | | | | | | | | | | | | | | |
| On Order Inv—LDOOIN | | X | | | | | | | | | | | | | | | |
| Avail for Plan—LDAVPL | | X | | | | | | | | | | | | | | | |
| On Hand Inv—LDOHIN | | X | | | | | | | | | | | | | | | |
| $ Value Inv—LDDVIN | | X | | | | | | | | | | | | | | | |
| $ Value WIP—LDDWIP | | X | | | | | | | | | | | | | | | |
| Add a Record— | * | | | | | | | * | * | * | * | * | | | * | * | * |

f = From Location
t = To Location
c = Consumed from
p = Produced To

X = Update the record
+ = Increase
− = Decrease
* = If no record currently exists
T = Updated based on tailoring CHn = Change classification with Reclassify byte = no
CHy = Change classification with Reclassify byte = yes
LR = last received

Summary of Transaction Updates (continued)

| Transaction Type | CH | DI | IA | IM | IP | MI | MR | PR | RA | RC | RS | RT | SA | TC | TP | TR |
|---|---|---|---|---|---|---|---|---|---|---|---|---|---|---|---|---|
| **File—LOCMAS**† | n | | | | | | | | | | | | | | | |
| Warehouse—LCWHSE | X | | | | | | | X | X | X | X | X | | | X | X |
| Location—LCLOCN | X | | | | | | | X | X | X | X | X | | | X | X |
| Pick Ovrd Seq—LCPOSQ | X | | | | | | | X | X | | X | | | | X | X |
| Dt Last Maint—LCDTMT | X | | | | | | | X | X | X | X | X | | | X | X |
| **File—LOTMAS** | f t | | | | | | | | c p | f t | | | | | | f t |
| Last Rcpt Date—LMLRDT | X | | | | | | X | X | X | X | X | | | | | X |
| Lot Qty Issued—LMLQYI | | + | | | + | | | | + | | − | | + | | | |
| Lot Qty Shipped—LMLQYS | | | | | | | | | | | | | | + | | |
| Lot Qty MscDsp—LMLQYD | + | | − | − | | + | | | | + | | | | | | + |
| Tot Lot QtyRcv—LMLQYT | + | | | | | | + | + | + | + | | − | | | | + |
| Add a Record— | * | | | | | | * | * | * | * | * | | | | | * |

Summary of Transaction Updates (continued)

| Transaction Type | CH | DI | IA | IM | IP | MI | MR | PR | RA | RC | RS | RT | SA | TC | TP | TR |
|---|---|---|---|---|---|---|---|---|---|---|---|---|---|---|---|---|
| **File—PODETL** | | | | | | | | | | | | | | | | |
| Date Last Rcpt—PDLRDT | X | | | | | | | | | | | | | | | |
| Qty Rcvd OnHnd—PDQROH | L | | | | | | | | | | | | | | | |
| Qty Rcvd OnOrd—PDQROO | L | | | | | | | | | | | | | | | |
| Qty Rcvd Total—PDQYRC | E | | | | | | | | | | | | | | | |
| **File—POSUMM** | | | | | | | | | | | | | | | | |
| PO Status—PSSTAT | X | | | | | | | | | | | | | | | |

f = From Location
t = To Location
c = Consumed from
p = Produced To
n = If Reclassify = no
L = Depends on Location Classification
E = Updated if transaction goes from a location which is not not available for planning to one that is available for planning.
† If the system is not required to have a LOCMAS record (determined by RM tailoring), one will be added by the following transactions which may create new locations.

X = Update the record
+ = Increase
− = Decrease
* = If no record currently exists

Summary of Transaction Updates (continued)

| Transaction Type | CH | DI | IA | IM | IP | MI | MR | PR | RA | | RC | | RS | RT | SA | SC | TC | TP | TRw | |
|---|---|---|---|---|---|---|---|---|---|---|---|---|---|---|---|---|---|---|---|---|
| **File—RESBAL** | | | | | | | | | c | p | f | t | | | | | | | f | t |
| Select Next CY—RBSNCC | T | T | T | T | T | T | | | T | | T | | | T | T | | T | | T | |
| # Tran Sinc CY—RPTLCC | X | X | X | X | X | X | X | X | X | X | X | X | X | X | X | X | X | X | X | X |
| Qty On Hand—RBQYOH | L | L | L | L | L | L | L | L | L | L | L | L | L | L | L | | L | L | L | L |
| Qty On Order—RBQYOO | R L | L | L | L | L | L | L | L | L | L | | | L | L | L | | L | L | L | L |
| Tot Qty Present—RBTQTY | L | − | + | + | − | − | + | + | − | + | − | + | + | − | − | | − | + | − | + |
| Dt Last Activity—RBDTLA | X | X | X | X | X | X | X | X | X | X | X | X | X | X | X | X | X | X | X | X |
| Dt Last Eff OHQ—RBDLOQ | L | L | L | L | L | L | L | L | L | L | L | L | L | L | L | | L | L | L | L |
| Prod Qty Total—RBAPTL | | | | | | | | + | | + | | | | − | | | | + | | |
| Mfg Reserv Qty—RBMMRQ | | − | | | | | | | | | | | | | | | − | | | |
| Qty Sold To Dt—RBQYSD | | | | | | | | | | | | | | | | | | | | |
| Sales Aloc Qty—RBSAQY | | | | | | | | | | | | | | | + | | | | | |
| Sales Rsrv Qty—RBSMRQ | | | | | | | | | | | | | | | − | | | | | |
| Date Last Sale—RBDTLS | | | | | | | | | | | | | | | X1 | | | | | |
| Total Consumpt—RBSCTL | | + | | | + | + | | | + | | | | | | | | + | | | |
| Hist Avg Cost—RBAVCS | L | | | | | | | | | | | | | | | | | | | L |
| Rolling Avg Cost w/ alpha factor—RBRLCS | L | | | | | | | | | | | | | | | | | | | L |
| **File—RESMST** | | | | | | | | | | | | | | | | | | | | |
| Re-Plan Flag—RMREPL | E | | | | | | | | | | | | | | | X | | | | |

Summary of Transaction Updates (continued)

| Transaction Type | CH | DI | IA | IM | IP | MI | MR | PR | RA | RC | RS | RT | SA | SC | TC | TP | TRw |
|---|---|---|---|---|---|---|---|---|---|---|---|---|---|---|---|---|---|
| **File—RESRES** | | | | | | | | | | | | | | | | | |
| Qty Issued—RVQYIS | | + | | | | | | | | | | | | | + | | |

f = From Location
t = To Location
c = Consumed from
p = Produced To
n = If Reclassify = no
T = *Updated based* on tailoring
R = Depends if a PO is entered
L = Depends on Location Classification
E = Updated if transaction goes from a location which is not not available for planning to one that is available for planning.

X = Update the record
X1 = byte is updated to Y
+ = Increase
− = Decrease
w = if the From warehouse is different than the To warehouse
Dt Last Activity is updated to today's date unless otherwise noted.

Summary of Transaction Updates (continued)

| Transaction Type | CA | CH | DI | IA | IM | IP | MI | MR | ON | PC | PR | RA | RC | RS | RT | SA | SC | TR |
|---|---|---|---|---|---|---|---|---|---|---|---|---|---|---|---|---|---|---|
| **File—TRCTRL** | | | | | | | | | | | | | | | | | | |
| # Sales Trans—TLSATN | | | | | | | | | | | | | | | | X | | |
| $ Val Sale Trans—TLSATD | | | | | | | | | | | | | | | | X | | |
| # Scrap Trans—TLSCTN | | | | | | | | | | | | | | | | | X | |
| # Chg Class Trn—TLCCTN | | X | | | | | | | | | | | | | | | | |
| # Adjust Trans—TLADTN | X | | | X | X | | | X | | | | X | X | X | | | | X |
| # Issue Trans—TLISTN | | | X | | | X | X | | | X | | | | | | | | |
| # PR Trans—TLPRTN | | | | | | | | | X | | X | | | | X | | | |
| # of Trans—TLTRCN | X | X | X | X | X | X | X | X | X | X | X | X | X | X | X | X | X | X |
| $ Val All Tran—TLTTDV | | X | | | | | | X | | | X | X | | | | | X | |
| # Suspend Tran—TLSPTN | 1 | 1 | 1 | 1 | 1 | 1 | 1 | 1 | 1 | 1 | 1 | 1 | 1 | 1 | 1 | 1 | 1 | 1 |
| # Updated Tran—TLUPTN | 1 | 1 | 1 | 1 | 1 | 1 | 1 | 1 | 1 | 1 | 1 | 1 | 1 | 1 | 1 | 1 | 1 | 1 |
| # Error Trans—TLERTN | 1 | 1 | 1 | 1 | 1 | 1 | 1 | 1 | 1 | 1 | 1 | 1 | 1 | 1 | 1 | 1 | 1 | 1 |
| # Part Upd Trn—TLPUTN | | | | | | | | | 1 | | 1 | | | | | | 1 | |
| **File—TREBAT** | | | | | | | | | | | | | | | | | | |
| All Entry Fields—Screen | f | f | f | f | f | f | f | t | t | t | t | f | f | t | f | f | t | f |
| Source Byte—TBSRCB | X | X | X | X | X | X | X | X | X | X | X | X | X | X | X | X | X | X |
| Trans Qty User—TBQNTY | | X | X | X | X | X | X | X | X | X | X | X | X | X | X | X | X | X |
| UM (User)—TBUMSR | | X | X | X | X | X | X | X | X | X | X | X | X | X | X | X | X | X |
| Trans Qty Std—TBSQTY | | X | X | X | X | X | X | X | X | X | X | X | X | X | X | X | X | X |
| Unit Cost—TBUNCS | | X | X | X | X | X | X | X | | | X | X | X | X | X | X | X | X |
| Selected Unit Cst—TBSELC | | X | X | X | X | X | X | X | | | X | X | X | X | X | X | X | X |
| Extended Cost—TBEXCS | | X | X | X | X | X | X | X | | | X | X | X | X | X | X | X | X |
| Trans Amount—TBTRAM | X | XT | | | | | | XT | | | XT | p | | | | | | |
| Sales Amount—TBUNPR | | | | | | | | | | | | | | | | X | | |
| User Ent Tr Amt—TBUTAM | | X | | | | | | X | | | | | | | | | | |
| Plant #—TBPLNT | | | X | | | | | | X | X | X | X | | X | X | | X | |
| Misc Upd Cd 1—TBMUB1 | | T | | | | | | | | | T | | | | | | | |
| Sv/Restore Code—TBSAVE | X | X | X | X | X | X | X | X | X | X | X | X | X | X | X | X | X | X |

f = From Location
t = To Location
p = Produced To
X = Update the record
T = Updated based on tailoring
1 = Only one field can be updated
Transaction Quantity (user) and UM are loaded from the screen

Summary of Transaction Updates (continued)

| Transaction Type | DI | CC | ON | PR | RA | RS | RT | TC | TP | SC |
|---|---|---|---|---|---|---|---|---|---|---|
| **File—RMODEL** | | | | | | | | | | |
| # Earn PM Batch—RDNEPB | | | + | + | | | | | | + |
| Task Comp Code—RDTSCC | | | | X | | | | | | X |
| Release Status—RDSTAT | X | | X | X | | | | | | X |
| Act Start Date—RDATSD | X | | X | X | | | | | | X |
| **File—RMRESR** | | | p | | c p | | | | | |
| Qty Prod To Dt—RRQYPD | | | + | + | + | | − | | + | |
| Qty Issued—RRQYIS | + | + | | | + | − | | + | | |
| Qty Red Fr Res—RRQYRR | + | | | | | | | + | | |
| Substitute Cd—RRSRSB | X | | | | Y Y | | | | | |
| Resc Subst For—RRRNSF | X | | | | | | | | | |
| Add a Record— | * | | | * | * * | | | | | |
| **File—RMTASK** | | | | | | | | | | |
| Task Status—RTSTAT | X | | X | X | | | | X | X | X |
| Actual Start Dt—RTTASD | X | | X | X | | | | X | X | X |
| Actual Comp Dt—RTTACD | | | X | X | | | | | | X |
| **File—TRCOMM** | This file can be updated by any transaction. | | | | | | | | | |

c = Consumed from
p = Produced To

X = Update the record
Y = Byte set to Y if record added
+ = Increase
− = Decrease
* = If no record currently exists

Summary of Transaction Updates (continued)

| Transaction Type | CA | CC | CH | DI | IA | IM | IP | MI | MR | ON | PC | PR | RA | RC | RS | RT | SA | SC | TC | TP | TR |
|---|---|---|---|---|---|---|---|---|---|---|---|---|---|---|---|---|---|---|---|---|---|
| **File—TRHIST** | | | | | | | | | | | | | | | | | | | | | |
| All Entry Fields—Screen | f | f | f | f | f | f | f | f | t | t | t | t | f | f | t | f | f | t | f | t | f |
| Effect Inv $—THEFIN | | | L | L | L | L | L | L | L | | | L | L | | L | L | L | | L | L | |
| Effect Non-MRP—THEFPQ | | | L | L | L | L | L | L | L | | | L | L | | L | L | L | | L | L | |
| Trans Qty User—THQNTY | | X | X | X | X | X | X | X | X | X | X | X | X | X | X | X | X | X | X | X | X |
| UM (user)—THUMSR | | X | X | X | X | X | X | X | X | X | X | X | X | X | X | X | X | X | X | X | X |
| Trans Qty Std—THSQTY | | X | X | X | X | X | X | X | X | X | X | X | X | X | X | X | X | X | X | X | X |
| Efct Not On Ord—THTENQ | | | | L | L | L | L | L | | | | L | L | | L | L | L | | L | L | |
| Rcvd frm On Ord—THTRON | | | L | | | | | | L | | | | L | | | | | | | | |
| Rcvd to On Ord—THTROH | | | | L | | | | | L | | | L | L | | L | L | L | | L | L | |
| Resc Class—THRSCL | X | X | X | X | X | X | X | X | X | | | X | X | X | X | X | X | X | X | X | X |
| Resc Sub-class—THRSSC | X | X | X | X | X | X | X | X | X | | | X | X | X | X | X | X | X | X | X | X |
| Resource Type—THRSTP | | X | | X | | | | | | | | X | X | | X | X | | X | X | X | |
| Substitute Byt—THSRSB | | | | X | | | | | | | | | X | | | | | | | | |
| Resc Subst for—THSUBR | | | | X | | | | | | | | | | | | | | | | | |

Summary of Transaction Updates (continued)

| Transaction Type | CA | CC | CH | DI | IA | IM | IP | MI | MR | ON | PC | PR | RA | RC | RS | RT | SA | SC | TC | TP | TR |
|---|---|---|---|---|---|---|---|---|---|---|---|---|---|---|---|---|---|---|---|---|---|
| File—TRHIST | | | | | | | | | | | | | | | | | | | | | |
| User Ent Tr Amt—THUTAM | X | | X | | | | | | X | | | | X | | | | X | | | | |
| Unit Cost—THUNCS | | X | X | X | X | X | X | X | X | | | X | X | X | X | X | X | X | X | X | X |
| Slctd Unit Cost—THSELC | | X | X | X | X | X | X | X | X | | | X | X | X | X | X | X | X | X | X | X |
| Extended Cost—THEXCS | | X | X | X | X | X | X | X | X | | | X | X | X | X | X | X | X | X | X | X |
| Trans Amount—THTRAM | X | | T | | | | | | T | | | XT | X | | | | | | | T | |
| Plant—THPLNT | | X | | X | | | | | | X | X | X | X | | X | X | | X | X | X | |
| Res Bal Adj Qty—THRBAQ | | | | | X | X | | | | | | | | | | | | | | | |

Transaction Quantity (user) and UM are loaded from the screen.
The "Effect on Not On Order" (THTENQ) and "Received from On Order" (THTRON) fields are mutually exclusive.

X = Update the record
T = Updated based on tailoring
f = From Location
t = To Location
L = Depends on Location Classification Notes:

1. CC, TC, and TP transactions are generated by ON, SC, and PR.
2. DI transactions are generated by PC but, unlike CC, TC, and TP, they can also be generated by the user.
3. CC transactions only update RMRESR and TRHIST.
4. PODETL and POSUMM are only updated by CH. This happens because CH is the only transaction with a PO number.

SECTION XVI-VI

Resource Number Change Transaction—MIE44211

The Resource Number Change transaction is used to change the resource number of the material at a specific location. This is done when a change in quality of the resource requires it to be renamed or downgraded.

The operator can use the resource number change transaction to simply change the grade of a resource. If this is done, the new resource number is the same as the original resource number, and the new grade is entered.

When a Resource Downgrade is done, the DGRADE file is used to determine if the downgrade is valid. A CHAIN is done to the DGRADE file using Resource/Original Grade/New Grade. If a record exists in the file, the grade change is valid. If a record does not exist in the file, the grade change is invalid.

There is a byte on the screen which allows the user to change all of the quantity for an existing LOCDTL record. This is the Change All byte. If a Y is entered, the entire quantity for the original resource is changed.

Note: Refer to the beginning of the transaction entry program description for information on potency.

Updates

Reminder: This section only contains updates for those files and fields that require a detailed explanation. For the remainder of the updates, please see the *Summary of Transaction Updates* table.

Before doing any of the updates, the transaction quantity must be converted to standard unit of measure. All file quantities are in standard unit of measure unless otherwise specified.

• *LOCDTL (Existing record):*

Estimated Time of Departure is updated based on the tailoring question below:

Should the ETD date be:

A. trans date plus number of days in that classification;

B. the ETD date of the to location?

Picking Override Sequence Number defaults to the screen entry, then to LOCMAS, and then to tailoring.

Shelf life expiration date is updated based on a tailoring question:

Should the shelf life expiration date be:

A. the date at the to location;

B. trans date + # of shelf life days?

FIFO date is updated based on the tailoring question below:

Should the FIFO date be:

A. the FIFO date of the to location;

B. the transaction date?

Last Date Received equals the transaction date.

Last time received equals the transaction time.

Received Transaction Number equals the transaction number.

• *LOCDTL (New record):*

Location is from entry screen.

Warehouse is from entry screen.

Resource = new Resource from entry screen.

Grade defaults from the old location if the new grade is blank.

Lot Number defaults from the old location if new Lot Number is blank.

Quantity at Location (std) = standard unit of measure.

Resource Class is extracted from RESMST.

Resource Sub-Class is extracted from RESMST.

Quantity in last received UM = total quantity at location in standard UM.

Last Received UM = Standard UM for TO resource.

Potency Factor defaults from the old location if the new potency factor is blank.

All Classification Bytes default from the old location.

Quantity reserved—manufacturing is set to zero.

Quantity Reserved-sales is set to zero.

ETD defaults from old location.

Expected Shelf Life Expiration Date—see above.

FIFO date—see above.

Received Transaction Number

Date Received = transaction date

Time received = transaction time

• *LOTMAS:*

The Old Lot Number/Original resource # record is updated.

Lot Quantity Miscellaneously disposed of—increased if it is for the original resource.

New Lot #/New Resource # record is updated.

If a record already *exists:*

Last Receipt Date equals transaction date.

Total Lot Quantity received increased = transaction quantity (std UM).

If a new record must be *added:*

Lot # = new Lot #
Resource # = new Resource #
First Receipt Date = Transaction Date
Last Receipt Date = Transaction Date
Initial Receipt Quantity = Transaction Quantity (Std UM)
Code = Blank
Lot Quantity Issued = zero
Lot Quantity Shipped = zero
Lot Quantity Misc Disposed Of = zero
Total Lot Quantity Received = Transaction Quantity (Std UM)

- *RESBAL:*

Original resource number is updated.

Quantity On Hand is reduced if location is specified as On Hand = Y.

Date Last Activity = Trans Date

Date Last Effect on On Hand Quantity = Transaction Date.

Date Last Effect on On Hand Quantity is only updated if the location is specified as On Hand = Y.

New Resource # record is updated.

Quantity On Hand is increased if Location is specified as On Hand = Y.

- *TRHIST:*

All entry fields plus:
Transaction Quantity in standard UM
Resource Class
Resource Sub-Class

- *TRCTRL:*

The following field is updated even if this is NOT on line updating. This is in addition to the list at the beginning of the transaction summary section.

Number totals for ADJUSTMENT transactions

Display-Only Fields:

Lot Number (for the original resource)
Original Resource Description

Entry Fields:.

Original Resource
Warehouse
Location
Quantity

Original Lot Number
New Resource
Grade
Revision Level
New Lot Number
Change All Byte
Update Online Byte
Unit of Measure
Detail Code
Year
Period
Date
Time
Shift
Reference Number
Operator
Accounting Group
Miscellaneous Field 1
Miscellaneous Field 2
Miscellaneous Field 3
Suspend Byte
Verify Byte
Duplicate Byte
Comment Required Fields:

Original Resource
Warehouse
Location
Quantity—if Change All byte is N
New Resource
New Lot Number—if the new resource is defined as Lot Tracking = Yes, and the classification requires lot numbers.
Change All Byte—if quantity = 0
Update Online Byte
Suspend Byte
Verify Byte
Duplicate Byte Defaults:

If the system is tailored for single warehouse support, the warehouse defaults to tailoring.

Lot Number—if blank the Lot Number defaults from the old location.

New Grade defaults to the grade from the previous LOCDTL record.

New Revision Level defaults to the current revision level for the new resource.

New Lot Number defaults to the lot number from the previous LOCDTL record.

The Unit of Measure defaults to the Last Received Unit of Measure in LOCDTL.

The Account Group Number defaults to TRDTCD then to tailoring.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

Edits:

Transaction Type is check to make sure the user is authorized.

The original resource must exist in RESMST.

The new Resource/Warehouse must exist in RESBAL.

The Original Resource/New Resource must exist in RESSUB.

The warehouse is protected if single warehouse support exists.

CK 15 is only available when the Lot Number is entered.

The From Location must exist in LOCDTL for this Resource/Warehouse/Location.

A warning message is displayed if the grade in LOCDTL is different from the entered grade.

The Quantity cannot be zero unless Change All = Y or unless the grade is being changed.

The Quantity cannot be negative.

The Quantity cannot be greater than what is available at the From Location. This means that the Transaction Quantity must be less than or equal to Quantity At Location (Std) minus Mfg Reserved Quantity minus Sales Reserved Quantity. Note: Before this edit is done, the Transaction Quantity is converted to the standard UM.

An edit is done to see if the Transaction Quantity is not greater than the Quantity Available at the Location.

The message defaults to hard halt but could be changed to a warning or non-display.

An edit is done to see if the grade change is valid by checking the DGRADE file.

The entered Revision Level must be greater than the Earliest Acceptable Revision in RESMST for this New Resource.

An edit is done to see if the Revision Level of the From Location is different from the Revision Level of the To Location.

If the new Resource is defined as having Lot Tracking active (RESMST) and if the To Classification Code (which must be the same as the From Classification Code), has lot tracking active (CLASCD), then the new Lot Number is required.

A Lot Number which is entered cannot be different from the one in LOCDTL for the new resource.

Update Online byte must be Y or N.

Change All byte must be Y or N.

Change All byte cannot be Y if a Transaction Quantity has been entered.

If the unit of measure is entered, it must be convertible standard unit of measure.
Transaction Detail Code must be valid.
The period cannot be closed.
The date must be valid.
The time must be valid.
Suspend byte must be Y or N.
Verify byte must be Y or N.
Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK08 | Detail Codes |
| CK11 | Alpha Search |
| CK12 | Account Override |
| CK13 | Resource Substitution Inquiry |
| CK15 | Notebook File Maintenance |
| CK19 | Return to Transaction Selection Screen |

Command Keys (Non-Display):

| | |
|---|---|
| CK07 | Send Message To Action List |
| CK17 | Error Message Override |
| HELP | Help Text |

SECTION XVI-VII

Resource Number Change Transaction Screen—MIE44211

Figure 94B:
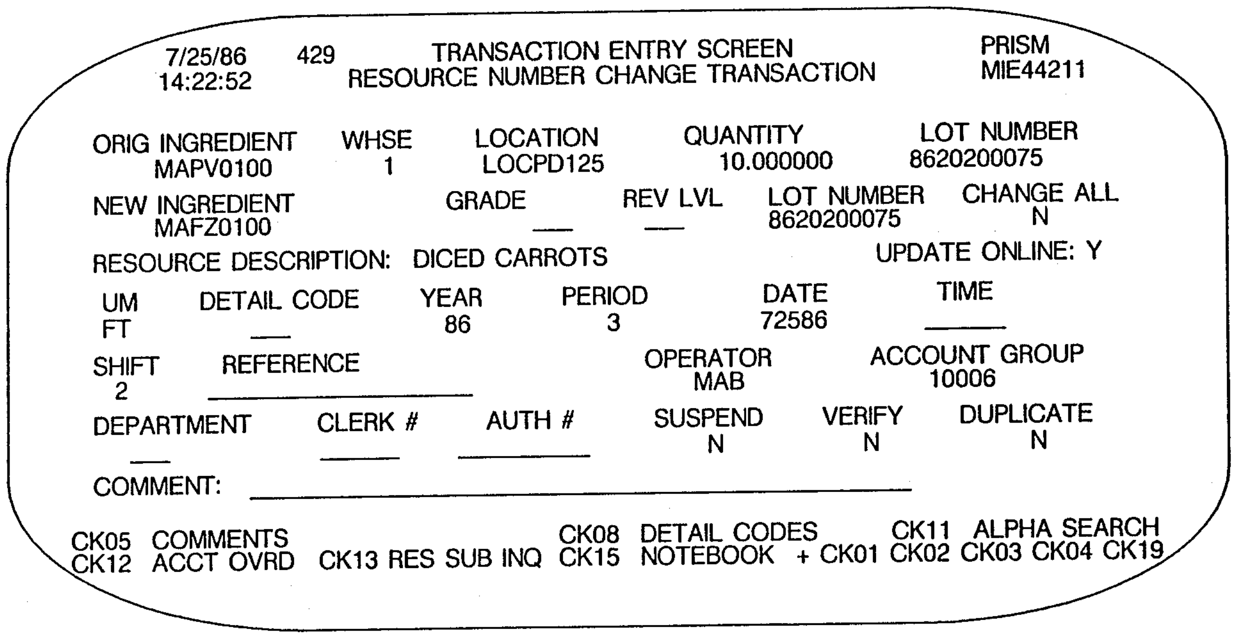

(See Figure 94B)

The Resource Number Change Transaction Screen is displayed when you:

(1) enter RC in the entry field on the Transaction Selection Screen and press ENTER;

(2) select an RC transaction for review from the Transaction Review Screen.

Enter an RC transaction to change the resource number and/or grade of a resource at a location, without moving it from that location. If you are a manufacturer of cheese, for example, you may need to change resource numbers when soft curds turn into mild cheddar. Similarly, you may need to change grades if the quality of a resource improves or deteriorates with time. The only valid changes are those defined through Resource Substitution Maintenance (see Section 1-16).

You can use a single transaction to change just resource number, just grade, or both resource number and grade. Keep two things in mind when entering this type of transaction:

(1) If you are changing GRADE ONLY, the entire quantity of the resource at this location must have its grade changed. This is because you cannot have two grades of the same resource at one location. So in this situation, you are better off using the Change All field rather than entering Quantity. This avoids the possibility of having an error message displayed because an incorrect quantity was entered.

(2) When you are changing the resource number, there are two possibilities: that a Location Detail (LOCDTL) file record already exists for the Whse/Location/New Resource combination, or that it does not.

If it does, then the new resource number already has a grade, revision level, and possibly lot number assigned to it at this location. If you leave any of these fields blank on this screen, it defaults to the value for the Original Resource. Whether you enter a value or it defaults, if the grade or revision level on this screen differs from the grade or revision level that already exists, a message is displayed to that effect. Depending on the severity code for the message, your answer to tailoring question #T25 may determine which of the conflicting values is used. If the lot numbers conflict, this transaction cannot be updated.

If a Location Detail record does not exist for the Whse/Location/New Resource, one will be created when this RC transaction is updated. The grade, revision level, and lot number assigned to the new resource at this location depend upon your entries on this screen. If you make an entry in any of those fields, your entry is the value assigned. If you leave the field blank, the value from the Original Resource is assigned.

Note that even if you are tailored to have system-generated lot numbers (see tailoring question #T2), the system will not generate a new lot number for your new resource number. If you leave the New Lot Number field blank, the lot number from the Original Resource is used.

Fields for Entry

- ORIG RESOURCE—original resource number. This is the resource number currently found at the location, which is being changed to a different resource number and/or grade.

WHSE/LOCATION—Enter the warehouse and location where both the original and the new resource are stored.

Note: If you answer Y to tailoring question #G2, the Whse field is not available for entry. It is displayed with the system warehouse defined in tailoring question #G1.

Quantity—quantity of this resource having its resource number and/or grade changed. Remember that the entire quantity of a resource at a location must have the same grade. Therefore, if you are changing the grade without changing the resource number, you MUST enter the total quantity for this location or use the Change All field.

- New Resource—Enter the new resource number, if you are using this transaction to change the resource number.
- Grade—new grade for the original resource or the new resource (if any) at this location.

Rev Lvl—If you are changing the resource number, you may want to define a different revision level for the new resource.Revision level 02 of resource A may change to revision level 04 of resource B.

Lot Number—Use this field only if you are changing the resource number and you want the lot number to be different.

CHANGE ALL—Enter Y to change the resource number and/or grade of the entire quantity of the original resource at this location. In this case, the Quantity field must be zero. Enter N in this field if you are entering a Quantity. The Quantity may or may not be the full quantity for this location.

UPDATE ONLINE—available for entry only if the answer to tailoring question #T10 is Y. This field indicates whether this transaction is to be updated online or in batch. The default is from tailoring question #T11.

UM—unit of measure for the quantity. This UM must be convertible into the standard UM for the resource number in the Orig Resource field. In addition, the standard UM for the original resource must be convertible into the standard UM for the new resource number.

For the remaining fields for entry on this screen, see "Common Fields," earlier in this section.

Fields for Display

The following information is for display only. To have it displayed when entering a new transaction, use the Verify field.

Orig Lot Number—lot number of the original resource number at this location.

Resource Description—description of this resource from the Resource Master (RESMST) file.

Command Function Keys

ENTER—If the Verify field is Y, pressing ENTER causes the screen defaults to be displayed and the screen to be edited. (Editing is the system's process of checking for errors.) If the Verify field is N and there are no errors, the transaction is either updated (if the Update Online field is Y) or saved for batch update (if the Update Online field is N). If the Suspend field is Y, the screen is not edited and the transaction is suspended and saved for later completion/update.

When entering new transactions, pressing ENTER displays a new blank transaction screen or a duplicate of the transaction just completed, depending on whether the Duplicate field is Y or N. When reviewing transactions, pressing ENTER displays the next selected transaction, if any, or returns you to the Transaction Review Screen. If the transaction being reviewed has not yet been updated, ENTER also re-saves the transaction with the changed information.

CK01—Press CK01 to display the Batch Status Screen, from which you can return to the Batch Selection Screen, the Transaction Selection Screen, or exit Transaction Entry.

CK02—not valid if you selected this transaction for review from the Transaction Review Screen. Press CK02 to page forward through the transactions in this batch.

CK03—not valid if you selected this transaction for review from the Transaction Review Screen. Press CK03 to page backward through the transactions in this batch.

CK04—available only if tailoring question #G7 was answered for this entity. In tailoring question #G7, a set of prompts is defined for your Location field. You can use these prompts to make sure you enter the correct information. When you press CK04, the Location Prompting Screen is displayed. For a detailed description of the Location Prompting Inquiry, see *Location Master File Maintenance*, Section 1-6.

CK05 COMMENTS—Press CK05 to display the Comment Entry Screen, to enter text associated with this transaction.

CK08 DETAIL CODES—Press CK08 to display the Transaction Detail Code Display Screen, which lists the valid transaction detail codes for this transaction type.

CK11 ALPHA SEARCH—If you do not know the number of the original resource for this transaction, press CK11 to display the Alpha Search Inquiry Screen. This inquiry allows you to find the resource number you need using information you already have, such as a partial description. You can then select the correct resource number from a list and have the system return that number to the Orig Resource field. For more information about the Alpha Search Inquiry, see Section 6-1.

CK12 ACCT OVRD—If you have the Costing module installed and the two modules are interfaced, you must press CK12 if you want to override the normal accounting group number for this transaction. CK12 transfers you to the appropriate Costing program.

CK13 RES SUB INQ—Press CK13 to transfer to the Resource Substitution Inquiry. This inquiry provides a list of the valid resource number changes, including the range of dates when each change is valid.

CK15 NOTEBOOK—Select CK15 to switch to Notebook File Maintenance, to enter values for any extra fields defined for the Lot Master (LOTMAS) file, for the New Lot Number. Notebook File Maintenance data screen MZE08002 is displayed. To learn how to use the Notebook (NOTES) file, see Sections 1-5, *Notebook File Maintenance*, and 1-6, *Notebook File Prompt Maintenance*, of the Foundation reference manual.

CK19—When entering new transactions, press CK19 to return to the Transaction Selection Screen without saving or updating the current transaction. When reviewing transactions, press CK19 to return to the Transaction Review Screen without saving any changes you have made.

SECTION XVII

SECTION XVII-I

Change Classification—MIE44229

This transaction is used to change the attributes of material in a location. Also, it can be used to move the material to a new location with the new attributes. The user defines his/her own transactions that predefine the location attributes. There is a master file (USRTRN) for these user-defined transactions.

The user is able to perform a reclassification by resource/lot number. This means that the operator enters the new classification, resource, and lot number. The program updates every location record for that Resource/Lot Number combination with the changed attributes. (This requires using a logical view of the Location Detail file by Resource/Lot Number.)

However, when the reclassify option is selected, ONLY locations that have a valid classification code for this transaction type are reclassified. This means that the classification code of each location record is compared to the list of valid From Classification Code for the transaction type. When the reclassify option is taken, this program generates one TREBAT record for each location that was reclassified.

The user-defined transactions can be defined so that material can be moved from a valid location to a blank location. One example is sending material back to the vendor. In this case, the To Classification is blank.

A Receipt from vendor transaction is processed by the change classification transaction. Some change classification transactions can be coded so that the From Location must be blank.

If the To Classification is On Hand = Yes, and the From Classification Code is On Hand = No, the From Classification code equals the Required From Classification Code defined in RESMST. This edit is used for resources that must go through quality control. The To Classification Code defaults from the USRTRN file for this transaction type.

The quantity cannot be negative. If the operator wishes to backout an entered transaction, the From and To Locations can be reversed. If the operator enters a Purchase Order Number, the status is set to Complete by placing a C in the Completion Code field.

Any Change Classification Transaction that moves a resource from a location classification that is available for planning to a locations classification that is unavailable for planning, sets the RE-PLAN flag in RESMST on. (The opposite is also true.)

If the reclassify byte equals Y, the only other fields available for entry are the resource and lot number.

1. The Purchase Order file is updated if the transaction goes from an On Order status to a Not On Order status.

2. The Location file is updated to reflect the new balance and classification.
3. Update the resource balance file to reflect any change in classification i.e., no longer on order, no longer on hand, etc.).
4. The Lot Master file is updated. If it is a new lot number, then a record is added. If it is an old lot number, the record may have to be updated.

To update the TRHIST record, the program calculates the effect on Inventory $ and the effect on Avail for Planning Quantity. The program calculates this because there are going to be multiple From Classifications. This means that each Location Detail record might have a different effect on these quantities.

So, as each location detail record is read, the From Classification Code is checked. If the From and To classification codes are such that there is an effect on Inventory $ or avail for planning quantity, the program adds or subtracts to either The Accumulated Effect on Inventory $ or The Accumulated Effect on Avail for Planning Quantity. These two accumulated fields are then used to update the TRHIST record.

Updates

Reminder: This section only contains updates for those files and fields that require a detailed explanation. For the remainder of the updates, please see the *Summary of Transaction Updates* table.

- *LOCDTL:*

If the Reclassify byte equals Y, all LOCDTL records with the entered Resource/Lot Number have their classification codes changed. For each of these locations, one TRHIST record is generated. No generated records are added to the TREBAT file.

If the Reclassify byte equals N:

*From location:*

Quantity At Location (in standard UM) is reduced.
Quantity At Location (in received in UM) is reduced.

*To Location:*

Updates to an EXISTING record:
Quantity At Location (in standard UM) increased.
Quantity At Location (in last received UM) increased.
Last Received UM
Potency Factor: see calculations.

The user can transfer a resource from one location to another even if there is a different potency factor at the new location. If this is done, the potency factor is recalculated at that To Location. To calculate the potency factor at the new location see the example below.

The program:

A. calculates the new quantity at location (standard UM);

B. calculates the new potent units at the location (adds the potent unit quantity from the From Location to the potent unit quantity from the to Location);

C. calculates the new potency factor at the To Location (new potent units divided by new qty at location).

ETD—Estimated Time of Departure is updated based on the tailoring questionnaire.

Should the ETD date be:

A. the earliest date;
B. the latest date;
C. the ETD date of the From Location;
D. not changed at all?

Shelf life expiration date is updated based on tailoring.

T28. If performing a transaction, both locations (To and From) are specified and the To location is an existing location, should the shelf life expiration date be:

A. the earliest date (between the two locations);
B. the latest date (between the two locations);
C. the date of the From Location;
D. not changed at all;
E. Transaction Date plus Shelf Life Days?

T27. If performing a transaction, the From Location is not specified and the To Location is an existing location, should the shelf life expiration date be:

A. Transaction Date plus Shelf Life Days;
B. the date of the From Location?

T29. If performing a transaction, both locations (To and From) are specified and the To location is a new location, should the shelf life expiration date be:

A. Transaction Date plus Shelf Life Days;
B. the date of the From Location?

If Shelf Life is inactive for this resource, the shelf life date is set to 99/99/99.

If shelf life is active, it is updated based on tailoring.

If there is a From Location and there is a To Location which has an existing LOCDTL record, tailoring question #1 is used for updating.

If there is NOT a From Location and there is a To Location, tailoring question #2 is checked. (But, if there is no LOCDTL record for the To Location then the transaction date plus the # of shelf life days is used.)

If there is a From Location and there is a To Location that does not have an existing LOCDTL record, tailoring question #3 is checked.

*Updates to a NEW record:*

Location = To Location from entry screen

Warehouse = To Warehouse from entry screen

Resource = resource from entry screen

Grade = the grade from entry (defaults to from grade)

Lot # = the lot # from entry (defaults to from Lot #)

Quantity at Location (Std) = transaction quantity converted to Std UM.

Standard UM = taken from the RESMST record for this transaction.

Resource class = extract from RESMST
Resource sub-class = extract from RESMST
Quantity in last received UM = Transaction Quantity
Last received UM = transaction UM
Potency Factor = from the entry screen or calculated
Revision Level = from the entry screen
Classification code = the to classification code
All classification bytes = extract from CLASCD using the to classification code
Quantity Reserved—manufacturing is set to zero.
Quantity Reserved—sales is set to zero.
ETD = calculated based on the number of days defined in CLASCD. The number of days defined in the CLASCD file can be expressed in calendar days or work days. There is a byte in the CLASCD file that determines which to use.
Picking Override Sequence Number—see edits for Picking Override Sequence #.
Shelf Life Expiration Date is either the shelf life date of the From Location or the transaction date. It is based on tailoring plus the number of shelf life days for the resource. The tailoring question below is used:
When transferring a resource to a new location, the shelf life date should be:

A. the date of the from location;

B. the transaction date.

If the transaction date is specified, the shelf life date must be calculated: transaction date plus # of shelf life days for this resource.

- *LOCMAS:*

If the LOCMAS record does not exist for the To Location, a record is added to the LOCMAS file.

- *LOTMAS:*

The following updates are not needed unless the reclassify byte equals N. This is because if the operator chose to reclassify then the From and To lot are equal.

From Lot Number: If the To Lot Number does not equal the From Lot Number, the Miscellaneous Quantity Disposed Of is updated by adding the quantity.

To Lot Number: If the To Lot # does not equal the From Lot #, then existing record, last receipt date, and total lot quantity received (standard UM) are updated.

If a record does not exist, a record is added to LOTMAS file. The following updates are done:

Lot # = To Lot # from entry screen
Resource # = Resource # from the entry screen
Schedule/PO = PO Number (if entered)
OLSN = zeros Release = PO Release Number (if entered)
PM Type = Blanks
PM Name = Blanks
Reference number = Blanks (This does not equal the entry field called Reference Number; this is the Reference Number tied to a schedule release.)
First Receipt Date = User-entered Transaction Date
Initial Receipt Quantity = Transaction Quantity in Std UM
Code (Purchased or Manufactured) = P if PO is entered.
Vendor # extracted from POSUMM if PO is entered.
Vendor name extracted from POSUMM if PO is entered.
Lot Quantity Issued = zero
Lot Quantity Shipped = zero
Lot Quantity Misc Disposed Of = zero
Total Lot Quantity Received = Transaction Qty (Std UM)

- *RESMST:*

Replan flag Y/N: The replanning flag is set on if the transaction goes from a classification that was available for planning to a classification that was unavailable for planning.

- *RESBAL:*

The following updates apply regardless of the value of the Reclassify byte. All of the quantities below are in standard UM.

Whether or not the system is tailored to edit the PO #, if the PO # exists in POSUMM, then the RESBAL file (Quantity On Order) is updated.

If the From Location is not entered, the Transaction Quantity is added to the Total Quantity Present.

If the To Location is not entered, the Transaction Quantity is subtracted from the Total Quantity Present.

If the From classification is On Order = No, and the To Classification is On Order = Yes, the transaction quantity is increased by the Total Quantity On Order.

In addition to the above update of the Total Quantity On Order, if the transaction changed the On Order classification and had a transaction amount entered, the Historical Average Cost field and the Rolling Average Cost w/Alpha Factor field must be updated. See *Miscellaneous Receipt* section for the calculations.

If a PO Number is entered and it exists in POSUMM, the From Location is On Order = No and the To Classification is blank or On Order = Yes, the Transaction Quantity is added to the On Order Quantity.

If a PO Number is entered and it exists in POSUMM, the From location is blank or On Order = Yes and the To Location is On Order = No, the Transaction Quantity is subtracted from the On Order Quantity.

On Order Quantity: If the From Classification is On Order = Yes, and the To Classification is On Order = No, the program subtracts the lesser of:

A. The Transaction Quantity

B. Quantity Ordered – Quantity Received from On Order

The quantities used in (B) are the quantities from PODETL prior to this transaction. Note: The On Order Quantity cannot be negative.

If the From Classification is On Order = No, and the To Classification is On Order = Yes, the Transaction Quantity is added to the On Order Quantity.

On Hand Quantity: If the From Classification is On Hand = Yes, and the To Classification is On Hand = No, the Transaction Quantity is subtracted from the On Hand Quantity.

If the From Classification is On Hand = No and the To Classification is On Hand = yes, the Transaction Quantity is added to the On Hand Quantity.

If the On Hand Quantity is effected, the Date Last Effect on the On Hand Quantity is updated.

Date Last Activity = Transaction Date (user)

- *PODETL:*

This file is only updated if a PO # was entered.

Whether or not the system is tailored to edit the PO #, if the PO# exists in POSUMM, the POSUMM file and RESBAL file are updated.

Date Last Receipt is updated.

Quantity Received to On Hand is increased if the To Classification is On Hand = Yes and the From Classification is On Hand = No.

Quantity Received from On Order is increased if the To Classification is On Order = Yes and the From Classification is On Order = No.

- *POSUMM:*

Whether or not the system is tailored to edit the PO #, if the PO # exists in POSUMM, the POSUMM file is updated.

If the PO status is not Received Against, the PO status byte is updated to a Received Against status.

If the Completion Code equals C, the PO status is set to Complete.

- *TRHIST:*

All entered fields are updated plus:

Transaction Quantity in standard UM

Transaction Amount was entered Y/N

If the operator entered anything into this field, (including zero), this byte is set to Y. (This is needed for the Accrual Report.)

Effect on inventory $ = (+, –, or blank):

If the From Location is blank or Inventory $ = N and the To Location is Inventory $ = Y, the byte is set to "+".

If the To Location is blank or Inventory $ = N and the From Location is Inventory $ = Y, this byte is set to "–".

If the To Location is blank and the From Location is Inventory $ = N, the byte is set to blanks.

If the From Location is blank and the To Location is Inventory $ = N, the byte is set to blanks.

Effect on Non Planning Quantity = (+, –, or blanks):

If the From Location is blank or Available for Planning = 1 or 2, and if the To Location is Available for Planning = 0, the byte is set to "+".

If the From Location is blank or Available for Planning = 0, and if the To Location is blank or Available for Planning = 1 or 2, then set the byte to "–".

If the From Location is blank and the To Location is Available for Planning = 1 or 2, the byte is set equal to blanks.

If the To Location is blank and the From Location is Available for Planning = 1 or 2, the byte is set equal to blanks.

Received from On Order byte:

If the From Location is blank or On Order = Y and the To Location is On Order = N, the byte is set to "+".

If the To Location is blank or On Order = Y and the From Location is On Order = N, the byte to is set to "–".

Received to On Hand byte:

If the From Location is blank or On Hand = N and if the To Location is On Hand = Y, the byte is set to "+".

If the To Location is blank or On Hand = N and if the From Location On Hand = Y, the byte is set to "–".

Resource Class
Resource Sub-Class

The following fields are updated even if this is NOT online updating. This is in addition to the list at the beginning of the transaction summary section.

- *TRCTRL:*
  - # totals for CHANGE CLASSIFICATION transactions
  - $ totals of all transactions Display-Only Fields:

From Classification
From Grade
From Revision Level
Resource Description

Entry Fields:

Transaction Type
Resource
Quantity
Move All Byte
Reclassify Byte
From Warehouse
From Location From Lot Number
To Warehouse
To Location
To Lot Number
To Classification
To Grade
To Revision Level
To Potency Percentage
Update Online Byte
Unit of Measure
Detail Code
Year
Period
Date
Time
Shift
Reference Number
Operator
Accounting Group
Purchase Order Number
Purchase Order Release Number
Purchase Order Completion Code
Transaction Amount
Report 0 Amount Byte
Picking Override Sequence Number
Miscellaneous Field 1
Miscellaneous Field 2
Miscellaneous Field 3
Suspend Byte
Verify Byte
Duplicate Byte
Comment Required Fields:

If Reclassify = Y.
Transaction Type
Resource
From Lot Number
To Classification

If Reclassify = N.
Transaction Type
Resource
Quantity
From Warehouse
From Location (see edits)
To Warehouse
To Location (see edits)
Purchase Order Number (see edits)
Purchase Order Completion Code
To Classification
To Lot Number (see edits)

Always Required:
Update Online Byte
Report 0 Amount Byte
Move All Byte
Suspend Byte
Verify Byte
Duplicate Byte Defaults:

If the system is tailored for single warehouse support, both warehouses default to tailoring.

The From Lot Number defaults to LOCDTL of the From Location.

The From Classification defaults to LOCDTL of the From Location.

The To Classification defaults from USRTRN for the entered transaction type.

The To Grade defaults to LOCDTL for the From Location. If the From Location does not exist in LOCDTL then To Grade defaults to LOCDTL for the To Location.

The To Revision Level defaults from RESMST for the current revision level.

The To Lot Number defaults to LOCDTL of the To Location.

The To Location defaults to the From Location.

The Potency Factor defaults to LOCDTL for the From Location, then to LOCDTL for the To Location, then to RESMST.

The Unit of Measure defaults to LOCDTL for the Last Received UM, then to LOCDTL for the To Location, then to RESMST.

The year defaults to the current year in tailoring.

The period defaults to the current period in tailoring.

The date defaults to the system date.

The time defaults to the system time.

The Update Online byte defaults to tailoring.

The Shift Number defaults to the Session Status Screen.

The Operator's Initials default to the Session Status Screen.

The Account Group Number defaults to TRDTCD then to USRTRN.

If the PO Number is entered the PO release number defaults to 1.

If the system is tailored to have the Transaction Amount default, it defaults to quantity times PO price. If the PO price does not exist, then it defaults to quantity times selected unit cost.

If the Picking Override Sequence Number is Active, then defaulting is:

If the TO location is a new location, 1. screen entry if not equal to zero;
2. Location Master if not equal to zero;
3. the From Location value if one exists;
4. Tailoring.

If the TO location already exists:

1. screen entry if not equal to zero;
2. unchanged at the existing location.

If the Picking override sequence number is inactive, then defaulting is tailoring.

Edits:

Transaction Type is checked to make sure the user is authorized.

Transaction Type must exist in USRTRN.

The resource must exist in RESMST.

The resource must be a balance resource if Reclassify = Y.

The resource/To Warehouse must exist in RESBAL if it is a balance resource.

The resource/From Warehouse must exist in RESBAL if it is a balance resource.

The Warehouse is protected if single warehouse support exists.

The Quantity cannot be zero unless the Move All Byte = Y.

The Quantity cannot be negative.

The Quantity cannot be be greater than what is available at the From Location (if entered). The quantity is converted to the standard UM before this edit.

The Move All byte must be Y or N.

The Move All byte cannot be Y if the transaction amount is entered.

The Reclassify byte must be Y or N.

The From Location must exist in LOCDTL for the resource/warehouse/from location.

The From Location is required if specified in USRTRN for the entered transaction type.

The From Classification must exist in USRTRN for the Transaction Type if the From Location is Restricted = Y.

The Lot Number must be valid if From location is Restricted = Y.

The Location Number is required if specified in USRTRN

The program edits for a LOCMAS record for the entered To Location if specified in tailoring.

If the To Location Number has an record in LOCDTL, the To Lot Number entered must match the To Lot Number in the LOCDTL record.

If RESMST and CLASCD are Lot Tracking Required, then the To Lot Number is required.

If the transaction number is entered, it must exist in TRHIST and be a change classification.

The To Classification Code must exist in CLASCD and be Active.

The To Classification Code must exist USRTRN as valid for the entered Transaction Type.

The From Classification Code must equal the Required From Classification Code in RESMST. If it is not blank, the To Classification Code is defined as On Hand = Yes, and the From Classification Code is defined as On Hand = No.

If the To Location has a LOCDTL record, the program edits to see if the To Grade equals the Grade in the LOCDTL record The To Revision Level must be greater than or equal to the Current Revision Level in RESMST.

If the To Location has a LOCDTL record, the program edits to see if the To Revision Level matches the one in LOCDTL The Potency Factor is not allowed if the resource is not a potent resource.

If the To Location has a LOCDTL record the program edits to see if the Potency Factor is the same.

The Update Online byte must be Y or N.

The Unit of Measure must be convertible to the standard unit of measure.

The Transaction Detail Code must be valid.

The Period cannot be closed.

The Date must be valid.

The Time must be valid.

The Purchase Order Number is required if any of the following are true:

1. The USRTRN file specifies PO Number Required = Yes.
2. The From Location is blank.
3. The To Location is blank.
4. The From Classification is On Order = Yes.
5. The To Classification is On Order = Yes.

The Purchase Order Number is not allowed if none of the above conditions exist.

The PO Number must exist in POSUMM if specified in tailoring and the PO cannot be completed.

The PO Release Number must be 0 if a PO Number was not entered.

The PO Completion Code must be Y or N.

The PO Completion Code must be Y if a PO number is entered.

The Transaction Amount can only be entered if the From Classification is On Order and the To Classification is Not On Order and vice versa.

If the From Classification is blank and the To Classification is Not On Order, the Transaction Amount can be entered.

The Report Amount byte must be Y or N.

The Report Amount cannot be Y if a transaction amount has been entered.

The Suspend byte must be Y or N.

The Verify byte must be Y or N.

The Duplicate byte must be Y or N.

Command Keys (Display):

| | |
|---|---|
| CK01 | Session Status |
| CK02 | Page Forward |
| CK03 | Page Backward |
| CK04 | Location Prompting Inquiry |
| CK05 | Comments |
| CK06 | Resume Entry (only when paging is in use) |
| CK08 | Detail Codes |
| CK11 | Alpha Search |
| CK12 | Account Override |
| CK15 | Notebook File Maintenance |
| CK19 | Return to Transaction Selection Screen |

Command Keys (Non-Display):

| | |
|---|---|
| CK07 | Send Message To Action List |
| CK10 | Issue to Shortage Screen |
| CK17 | Error Message Override |
| HELP | Help Text |

Subfile For Issue To Schedule—MIE44231
(MIE44230—Does Not Exist In MIE442FM)

Display-Only Fields:

- Resource Number
- Warehouse
- Location
- Task
- Quantity Remaining
- User Unit of Measure

Entry Fields:

- Quantity to issue

Required Fields:

- Quantity to issue

Edits:

- The Quantity entered must be less than or equal to the Quantity Available at Location.
- The subfile must contain data.
- Roll Up is not active if the last record is shown.
- Issued Quantity cannot be greater than Remaining Quantity to Issue.

SECTION XVII-II

Section 1-20: User-Defined Transaction Maintenance

When To Use User-Defined Transaction Maintenance

Option 20 allows you to maintain the User-Defined Transaction (USRTRN) file. This file allows you to define special transactions your system of production requires. ones that are not covered by the Marcam-defined transaction types provided with PRISM.

For example. suppose your system of planning distinguishes between materials that have just been ordered from a vendor. and those you know to be on the way. You might define a special location classification called "In Transit." The "locations" in this classification would be physically empty of course. because the goods have not yet arrived. Yet you could make a planning distinction. "In transit" goods could be available for planning (see *Location Classification Code Maintenance*, Section 1-4). Goods just ordered would not be available for planning. because you don't yet know exactly when they will arrive.

This new classification. then. requires a new transaction. because you have to "receive" resources to the "In Transit" classification when you are notified that your order has been shipped. No such transaction is provided with PRISM. so you would need to add it to the User-Defined Transaction file.

How To Use User-Defined Transaction Maintenance

When you select Option 20 from the File Maintenance Menu (MI10). the User-Defined Transaction Maintenance Selection Screen is displayed. Use this screen to enter the transaction type code for the special transaction you want to maintain.

Selection Screen—MIE32001

(See Figure 95A)

Fields for Entry

TRANSACTION TYPE—Enter the two-character code for the transaction you want to maintain. The code for this transaction must not match any of the Marcam-defined transactions. This is the code you enter during Transaction Entry (see Section 8-2) when you perform this transaction.

ACTION CODE—Enter A to add a new transaction type or C to change the attributes of an existing transaction. Once added, a transaction type cannot be deleted. To prevent operators from using it, change its Activity Status to N (see below).

Command Function Keys

ENTER—Press ENTER after entering the transaction type and an action code, to proceed to the data screen.

CK01 DISPLAY SESSION STATUS—Press CK01 to display the session status screen, which shows the number of records in the User-Defined Transaction file you have added and changed during this session. When you exit User-Defined Transaction Maintenance by pressing CK01 from that screen, a register is automatically printed. This register shows all records added, changed, and deleted during this maintenance session, with the current attributes of each.

Data Screen—MIE32002

Figure 95B:
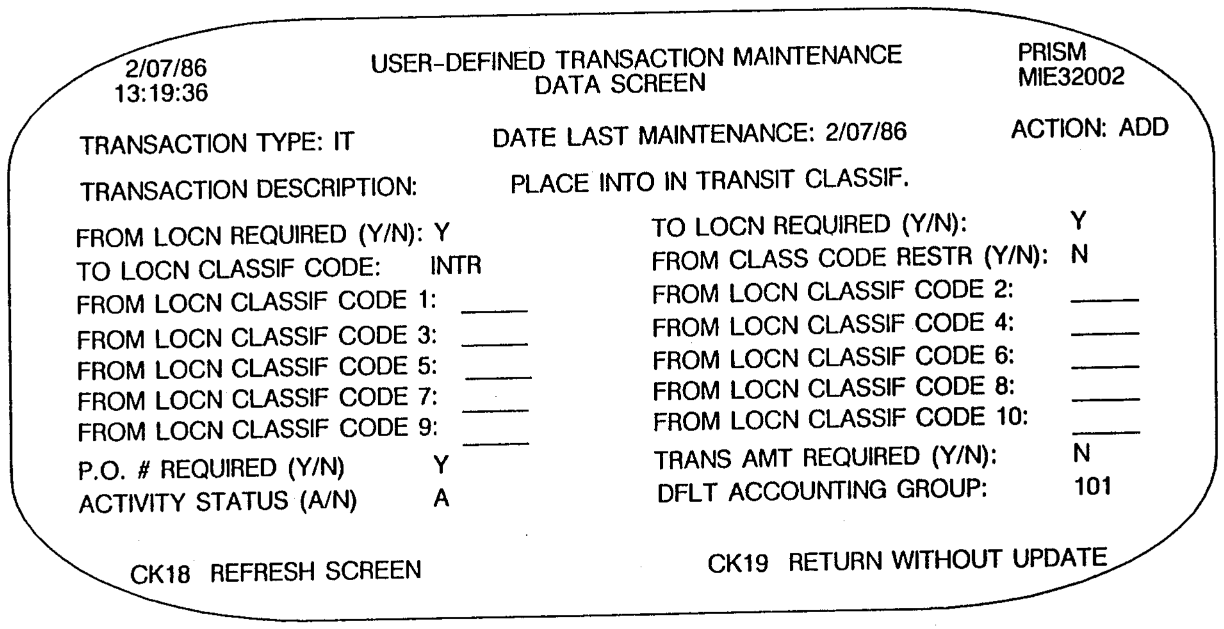

(See Figure 95B)

The data screen is displayed when you press ENTER on the selection screen. Here you can enter or change the attributes of this transaction, such as the description and whether a From and/or To Location must be specified when using it. The above illustration continues the example of the transaction needed to receive to an "In Transit" location classification. Refer to this illustration as you read the field descriptions.

Fields for Display

Transaction Type

Date Last Maintenance—date this transaction type was last updated. If you are adding a new transaction, this is today's date.

Action—The word ADD or CHANGE is displayed here, depending on the action code.

Fields for Entry

TRANSACTION DESCRIPTION—Enter up to 30 characters of description for this transaction type.

From Locn Required (Y/N)—Enter Y if an operator performing this transaction must specify the From Location. An N in this field means that From Location is optional.

To Locn Required (Y/N)—available for entry only when action code is A (add). Enter Y if an operator performing this transaction MUST specify the To Location, N if the operation must NOT specify a To Location. Either the To Location or the From Location must be required.

To each transaction type you assign the valid From and To Location classification codes. When the operator enters the To Location, for example, that location must have the same location classification code as the To Classification Code defined for this transaction. You can define multiple From Classification Codes as valid for any transaction, or you can specify that the From Location can be in any classification.

To Locn Classif Code—available for entry only when action code is A (add), and required if the To Location is required (see above). All transactions of this type must have a To Location that belongs to this location classification. The location classification code you enter here must have an activity status of A (see *Location Classification Code Maintenance*, Section 1-4).

FROM LOCN CLASSIF CODE RESTR (Y/N)—Enter Y if the From Classification Codes for this transaction are restricted, N if not. If you answer Y, the only valid From Locations for transactions of this type are those in From Locn Classif Codes 1-10, entered below. In this case, you must enter at least one From Locn Classif Code.

From Locn Classif Code 1-10—Enter up to 10 valid From Location Classifications for this transaction type. This transaction type can use resources coming from locations in these location classifications only. If you enter more than one From Locn Classif Code, use fields 1-10 in order: for example, do not make entries in fields 1 and 3, leaving From Locn Classif Code 2 blank.

PO # REQUIRED (Y/N)—Enter Y if the operator must enter a purchase order number when performing this transaction, N if not.

TRANS AMT REQUIRED (Y/N)—A transaction amount can only be entered with a user-defined transaction that changes the on-order quantity of a resource. In other words, one of the following must be true:

(1) the transaction is moving a resource from an on order location to a location that is not on order, or vice-versa;

(2) the transaction is moving a resource from an unspecified location to a location that is not on order (this is probably a PO receipt).

If one of the above IS true, then this field determines whether the field is required. If you answer N, operators can enter any user-defined transaction without a transaction amount. If you answer Y, and an operator leaves the Transaction Amt field blank for a transaction for which (1) or (2) is true, a message is displayed.

Note: If you answer Y to the CH (user-defined transaction) portion of tailoring question #T41, then the transaction amount for a user-defined transaction defaults to quantity times selected unit cost. In this case, a blank Transaction Amt would not cause a message to be displayed, because the system would calculate the transaction amount.

ACTIVITY STATUS (A/N)—Enter A if this transaction type is "active," that is, available for use, N if it is "non-active." If this field is A, this transaction type is treated normally. Operators can use it to record the transfer of resources from one location or one location classification to another. If this field is N, this transaction type cannot be used. If an operator attempts to use it in Transaction Entry, for example, an error message is displayed.

This field allows you to "turn off" a transaction type temporarily. You would also use this code to "delete" the transaction type. User-defined transactions cannot be deleted in the normal way, because the attributes may be needed by the system to update transactions already entered. Instead of deleting a transaction type, change this code to N so that it is no longer used. This accomplishes the goal of preventing operators from using it, without depriving the system of needed information.

DFLT ACCOUNTING GROUP—default accounting group number for this transaction type.

Command Function Keys

ENTER—Press ENTER after entering the attributes of your transaction type, to update the file with this new information. This returns you to the selection screen.

CK18 REFRESH SCREEN—Select CK18 to redisplay this screen with the values currently stored in the file. If you are adding a record, the default information is displayed in the Y/N and A/N fields. If you are changing a record, the existing attributes of this transaction are displayed.

CK19 RETURN WITHOUT UPDATE—If you decide not to add or change this transaction type, press CK19. This returns you to the selection screen.

SECTION XVII-III

MIE320

User-Defined Transaction Maintenance

A. The User-Defined Transaction Maintenance program allows the user to enter and maintain information in the User-Defined Transaction File (USRTRN). This file contains one record for each user-defined transaction type.

Screens

MIE32001—Selection Screen
MIE32002—Data Screen
MIE32003—Session Status Screen

Selection Screen—MIE32001

The user may add or change a record, but deletion of an existing record is not permitted. User-Defined transactions are deleted through the Transaction Purge program (MIU280).

All From Classification Code fields that are not blank are edited against the CLASCD file. This verifies that the From Classification Codes entered by the user are currently active on the system. If the user enters more than one From Classification Code, embedded blanks are not permitted.

Entry Fields:

Transaction Type
Action Code (A = add, C = change)

Required Fields:

Transaction Type
Action Code

Edits:

If Action is ADD, record must not exist.
If Action is ADD, transaction cannot already be a Marcam-defined transaction.
If Action is CHANGE, record must exist.
Action Code must be A or C.

Command Keys (Display):

CK01 Display Session Status

Command Keys (Non-Display):

CK07 Send Message to Action List
CK17 Error Message Override
HELP Help Text

Data Screen—MIE32002

Display-Only Fields:

Transaction Type
Date Last Maintenance
Action
To Classification Code (CHANGE only)

Entry Fields:

Transaction Description
From Location Required
To Location Required
To Location Classification Code (ADD only)
From Location Classification Code Restricted
From Classification Code 1
From Classification Code 2
From Classification Code 3
From Classification Code 4
From Classification Code 5
From Classification Code 6
From Classification Code 7
From Classification Code 8
From Classification Code 9
From Classification Code 10
Purchase Order Number Required
Transaction Amount Required
Activity Status
Default Accounting Group Required Fields:

Transaction Description (UDS Error Message)
From Location Classification Code (at least one is required if From Location Classification Code Restricted is Y).
To Location Classification Code (only if To Location Required is Y).

From Location Classification Code Restricted
From Location Required
To Location Required
Purchase Order Number
Transaction Amount
Activity Status
Default Accounting Group (UDS Error Message)

Edits:

From Location Required must be Y or N.
To Location Required must be Y or N.
To Location Classification Code must exist in CLASCD file.
If From Location Classification Code Restricted is Y, at least one From Location Classification Code must be entered.
If user enters more than one From Location Classification Code, there cannot be any embedded blanks.
Either From Location Required or To Location Required must be Y.
If To Location Classification Code is entered, To Location Required must be Y.
From Location Classification Code Restricted must be Y or N.
Purchase Order Number Required must be Y or N.
Transaction Amount Required must be Y or N.
Activity Status must be A or N.
Either To Location Required or From Location Required must be Y.

Defaults:

Date Last Maintenance—defaults to system date (ADD only).
Note: For the following fields, the default values display only when this program is initially called by the user. If the user subsequently blanks out one of these fields, s/he is required to enter a value.

To Location Required—defaults to Y.
From Location Required—defaults to Y.
Transaction Amount Required—defaults to Y.
Purchase Order # Required—defaults to N.
From Classification Code Restricted—defaults to Y.
Activity Status—defaults to A (Active).

Command Keys (Display):

CK18 Refresh Screen
CK19 Return Without Update

Command Keys (Non-Display):

CK07 Send Message to Action List
CK17 Error Message Override
HELP Help Text

Session Status Screen—MIE32003

The Session Status Screen displays the number of records added and changed. If CK01 is taken, the job is ended. If the ENTER Key is taken, the Selection Screen is redisplayed.

Display-Only Fields:

Number of Records Added

Number of Records Changed

Command Keys (Display):

CK01 End Job
ENTER Return to Selection Screen

Command Keys (Non-Display):

CK07 Send Message to Action List
HELP Help Text

B.

| File | Usage |
|---|---|
| CLASCD | IF |
| ERRMSG | IF |
| MIE320FM | CF |
| USRTRN | UF |
| QSYSPRT | O |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All User-Defined Transaction records that were updated are printed on the Maintenance Register, which includes the Action (ADD or CHANGE) and all entry and display-only fields.

MIE340

Location Detail Maintenance

A. The Location Detail Maintenance program allows the user to enter and maintain information in the Location Detail File (LOCDTL). This file contains one record for each Resource #/Warehouse/Location.

Screens

MIE34001—Selection Screen
MIE34002—Data Screen
MIE34003—Session Status Screen

Selection Screen—MIE34001

The user may change or delete a record, but no records may be added to the file. The ADD capability is omitted here because LOCDTL records must be created by the Transaction Entry program. To add a LOCDTL record, a Miscellaneous Issue (MI) is generated. Record deletion is permitted only if the quantity at location is equal to zero (due to Lot Tracking Report requirements) and the reserved quantities (manufacturing and sales) are equal to zero.

During a DELETE operation to be performed from either the Selection Screen or the Data Screen, if a Notebook File record exists that corresponds to the LOCDTL record to be deleted, the Notebook File record must be deleted as well.

From the Selection Screen, CK04 calls the Location Prompting Inquiry program (MII220). This program helps the user determine what a location number is before keying it in.

Entry Fields:

Warehouse
Location
Resource Number
Action Code (C = change, D = delete)

Required Fields:

Action Code

SECTION XVIII

SECTION XVIII-I

Balance/Non-Balance Resources

Each resource on your system must be identified as a "balance" or "non-balance" ("count-up") resource. This attribute is assigned on Data Screen MIE18002 in Resource Master Maintenance (see Section 1-13).

As a general rule, balance resources are those traditionally considered inventory items, things physically kept in a warehouse. On the other hand, you may have resources for which you do not measure a quantity in a warehouse, but that you want to track because they do add to the cost of production. These are non-balance resources.

For example, labor is a resource but you do not keep an inventory of it in the same sense that you might keep an inventory of carrots. Electricity might be a balance resource if the local utility company restricts your use of it to a certain number of kilowatts per month. Or, it might be non-balance if you can use an unlimited quantity.

Certain rules apply to the use of non-balance resources:

(1) Non-balance resources cannot be received to locations. This results from their definition as resources not kept in inventory.

(2) A non-balance resource must have a Selected Unit Cost of S (standard cost) and a Cost Rollup Costing Method of S or F (fixed cost from Resource Balance file). This restriction is necessary because other figures, such as rolling average or historical average cost, are continuously recalculated as transactions are entered to receive the resource to a location. Since non-balance resources cannot be stored in locations, these other costs cannot be used.

(3) Both balance and non-balance resources can have records in the Resource Balance file. Of course, most information in that file is not as meaningful for non-balance resources. However, having the Resource Balance record can be useful, for example to keep track of the total quantity consumed.

(4) Non-balance resources are <u>never</u> reserved for schedules, because they are not stored in locations. It is assumed that there is enough of the resource available for any task. The only way to track diminishing availability of a non-balance resource would be to watch the Total Consumption field in the Resource Balance file.

Costs

There are six cost figures available for use in Resource Management. Each of these is stored in the Resource Master (RESMST) or Resource Balance (RESBAL) file. In RM and RP, the codes for these costs are used for two fields: the Selected Unit Cost for each resource (used in both RM and RP) and the Cost Rollup Costing Method for each resource consumed by a production model (used only if RP is installed).

A—rolling average cost with alpha factor (RESBAL)

F—fixed cost (RESMST)

H—historical average cost (RESBAL)

L—last period's average cost (RESBAL)

R—cost from last rollup (RESMST)

S—standard cost (RESMST)

Costs F and S are user-defined in the Resource Master file. Costs A and H are continuously recalculated as you enter transactions for the resource/warehouse combination. Cost L is calculated when you run the Period Close program. Cost R exists only for produced resources, and is recalculated each time you run the Actual Cost Rollup program for that resource or its prime costing PM.

The Cost Rollup Costing Method, which can be any of the six codes, determines the cost figure used for a resource when rolling up a production model that consumes it. The Selected Unit Cost (A, H, L, or S) determines the cost used for a resource in all situations except cost rollup. For example, the amount of a transaction can default to quantity x selected unit cost. The Resource Valuation Report uses the selected unit cost to show the value of each resource you have on hand in your warehouses. For more information on these fields, see *Resource Master Maintenance*, Section 1-13.

How can you decide which cost figure to use for these fields for each resource? The best choice depends on the characteristics of your company. This section explains the meanings of and calculations for each cost figure, so that you can differentiate between them and make an informed decision.

SECTION XVIII-II

Data Screen MIE18002

Figure 96:
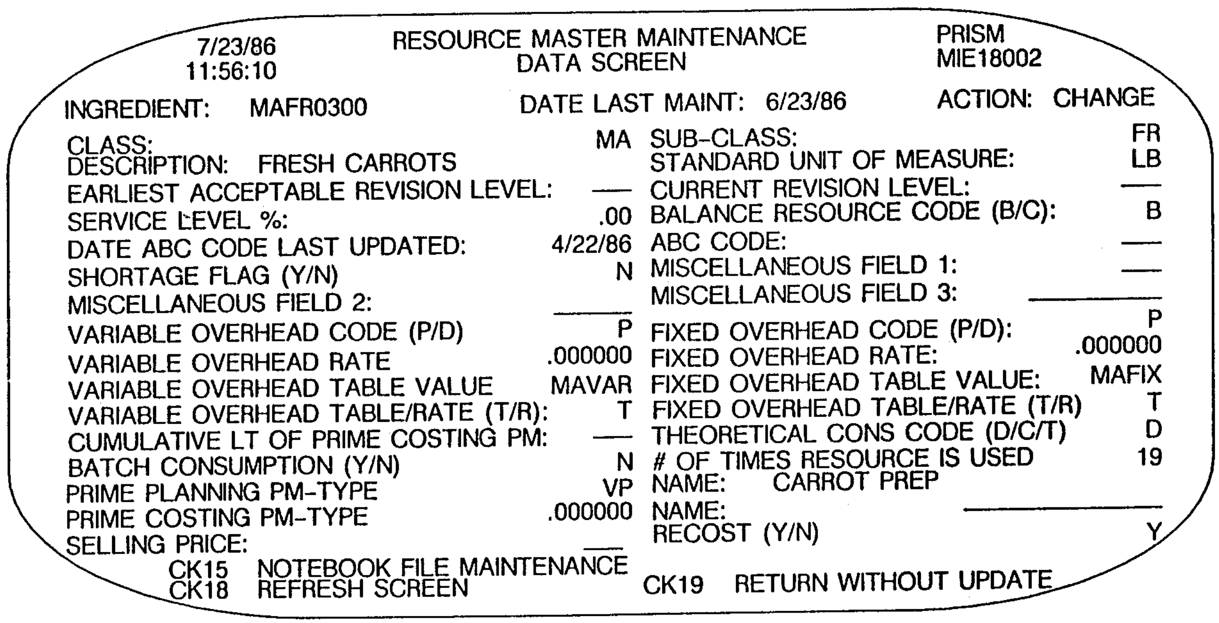
Figure 100:
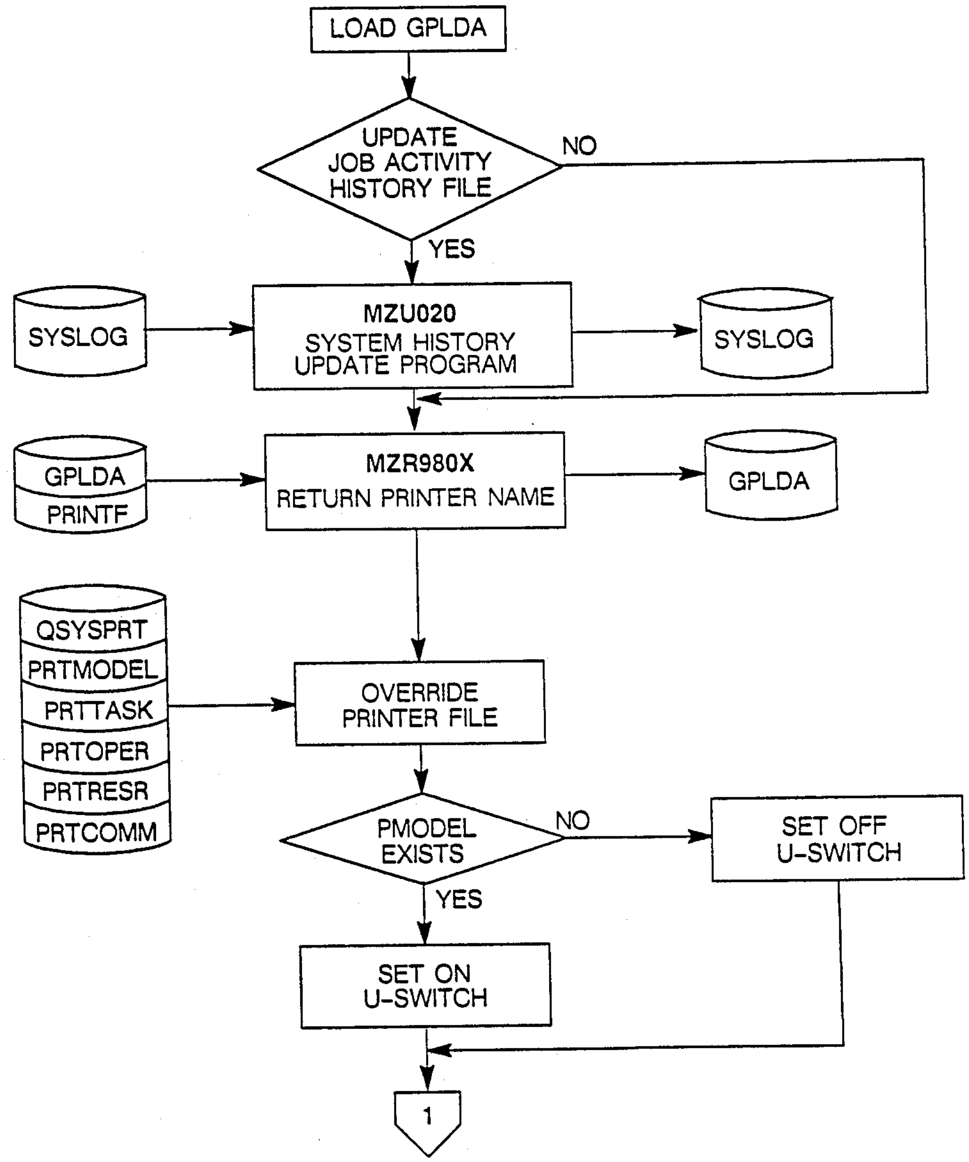
FIGS. 100-165 depict the operational processing sequence of a preferred resource planning system constructed in accord with the invention.
Figure 101:
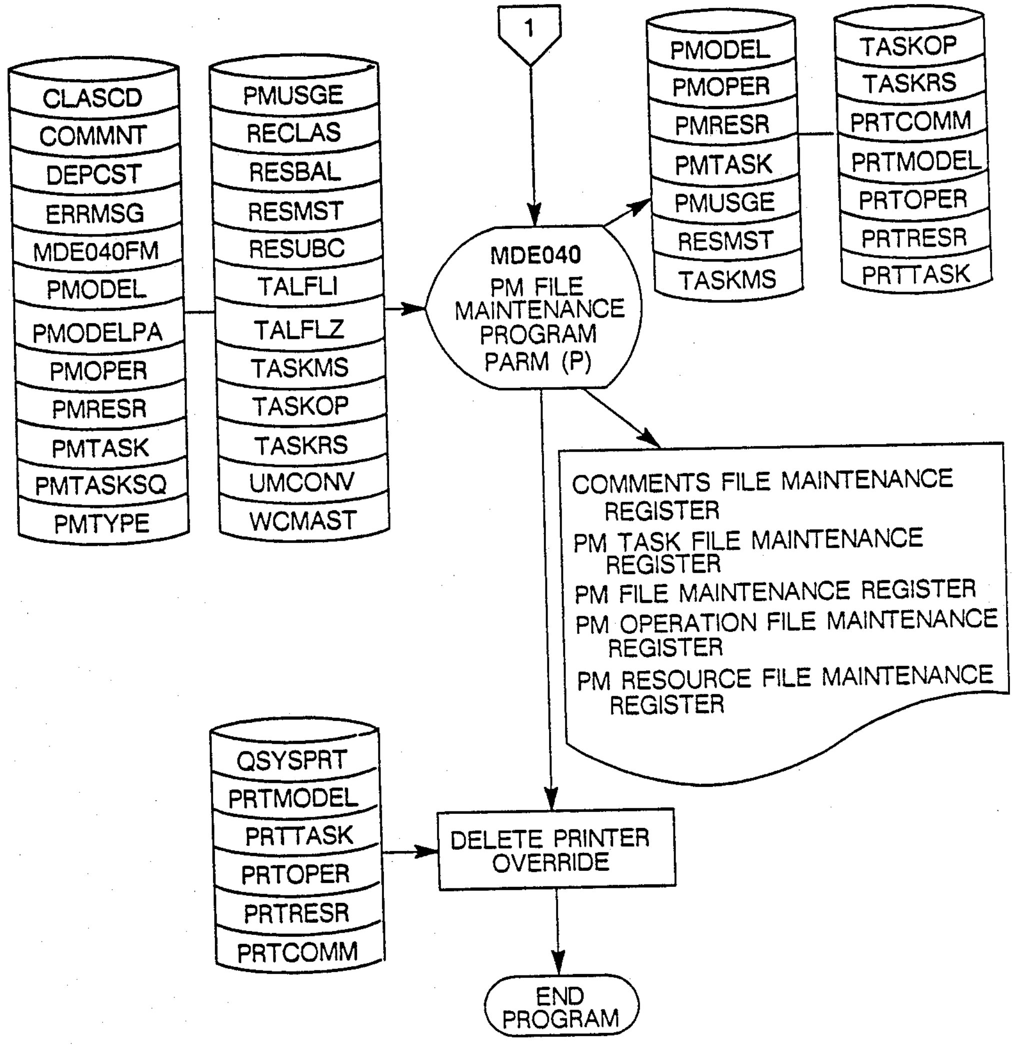
Figure 102A:
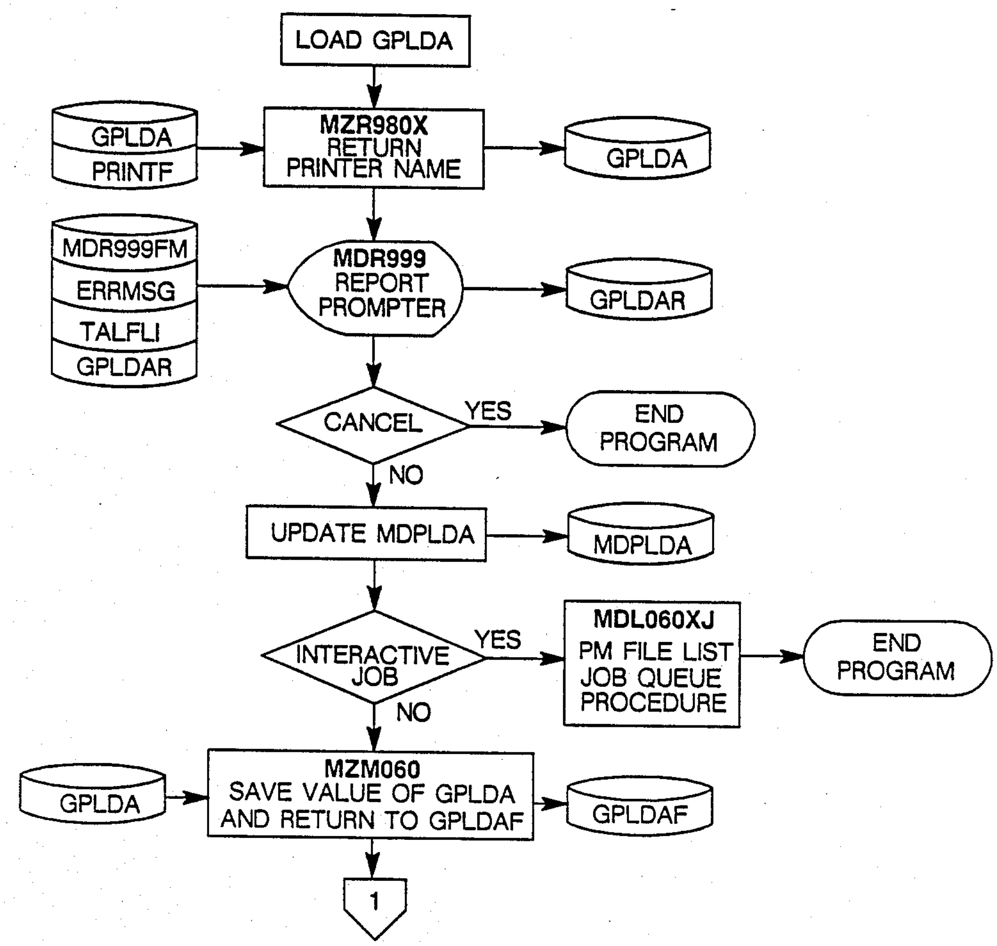
Figure 102B:
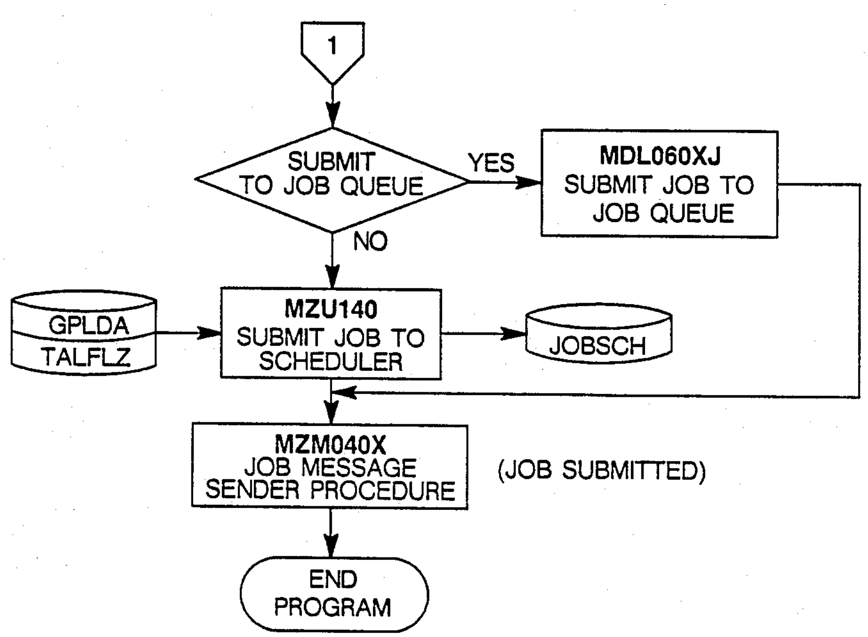
Figure 103:
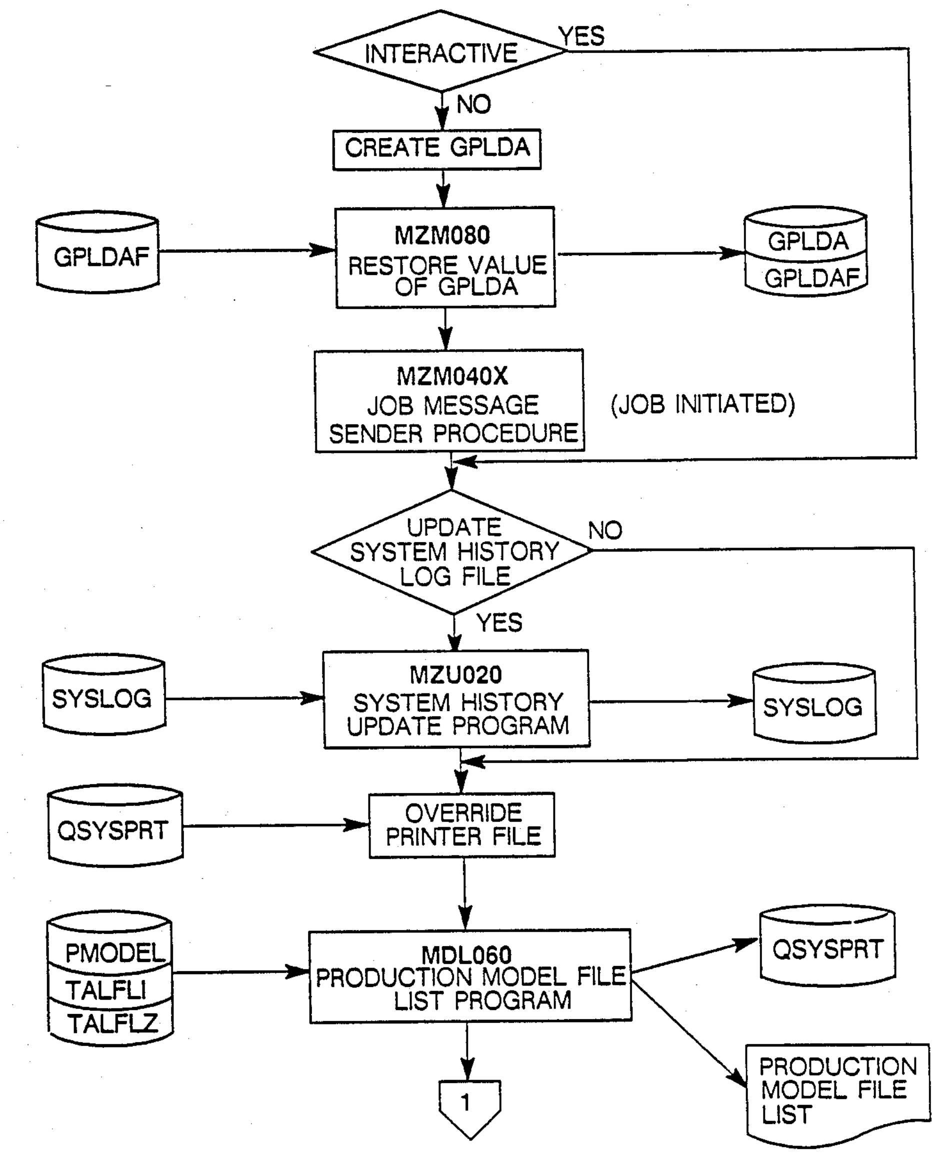
Figure 104:
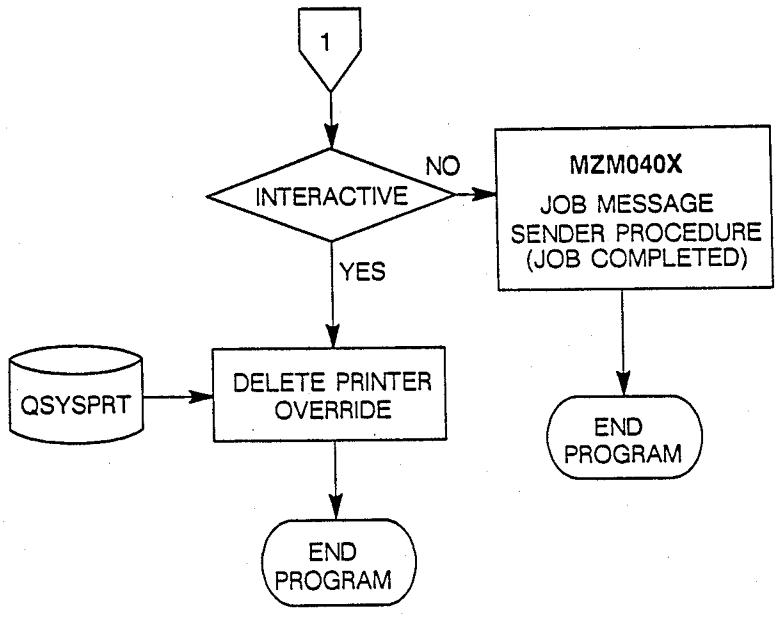
Figure 105A:
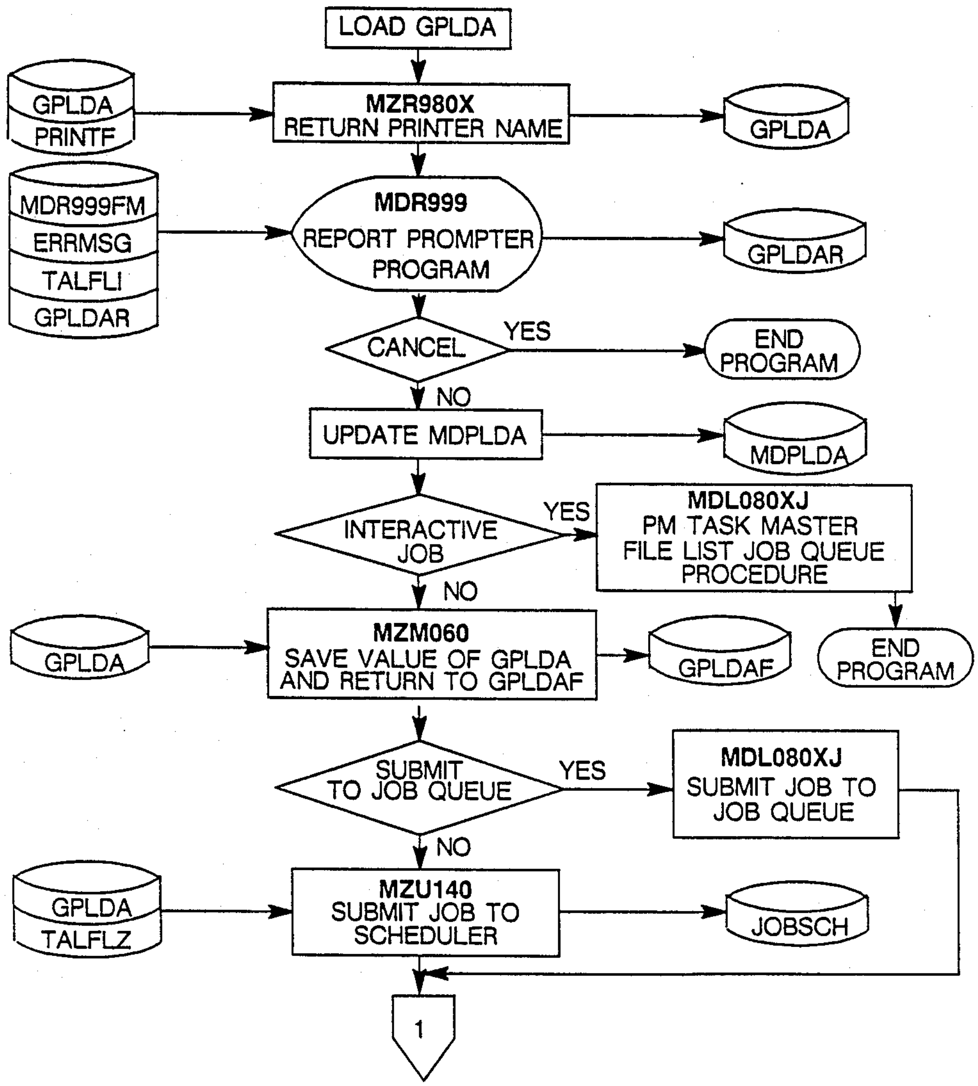
Figure 105B:
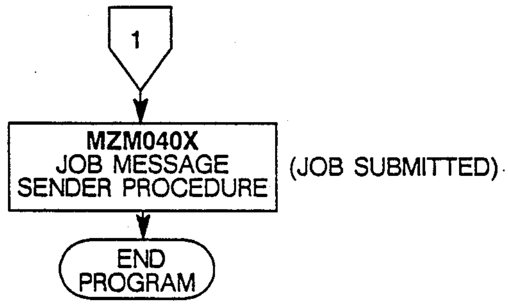
Figure 106:
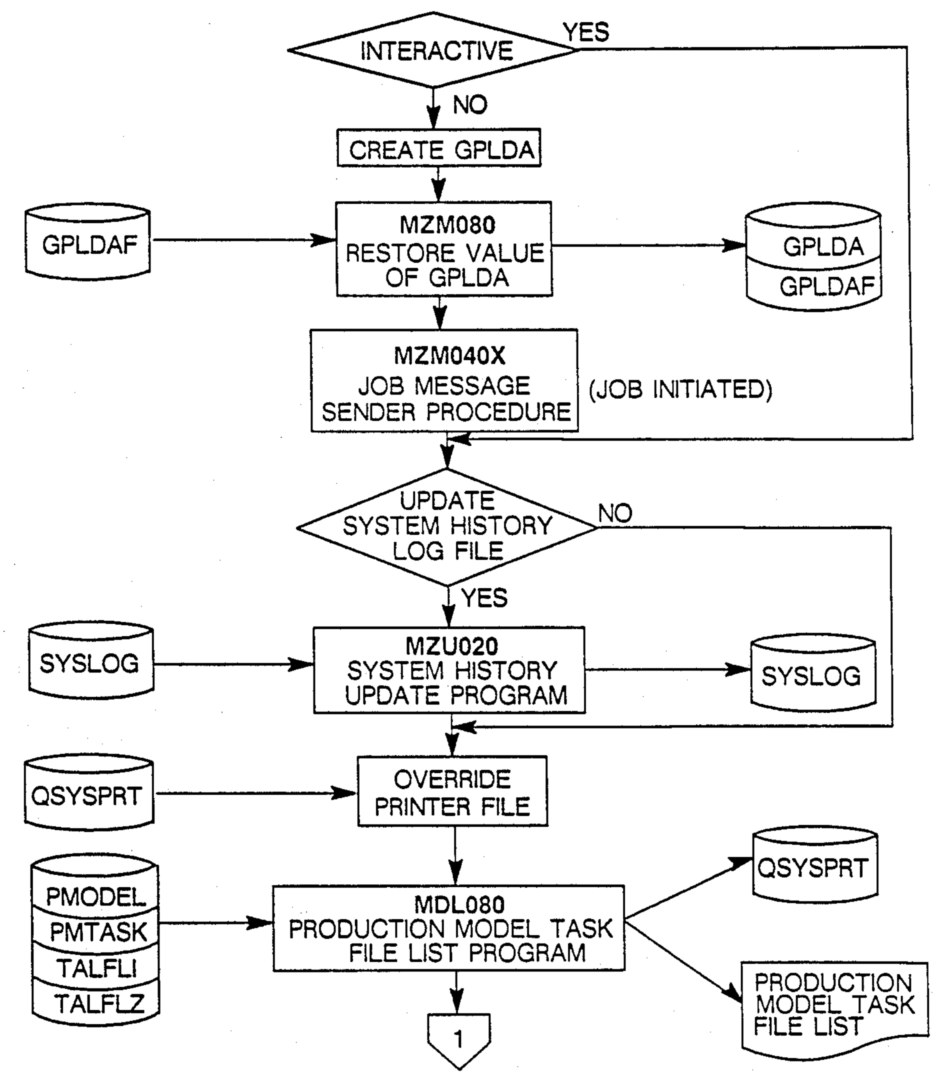
Figure 107:
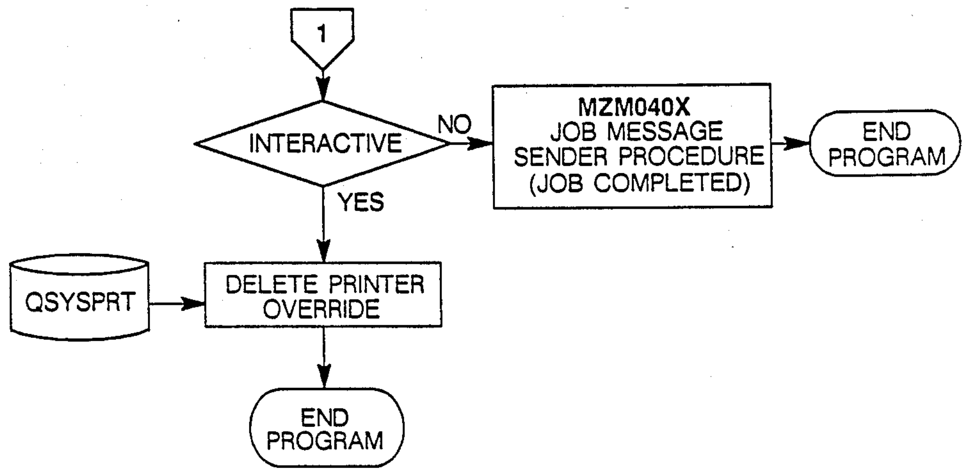
Figure 108:
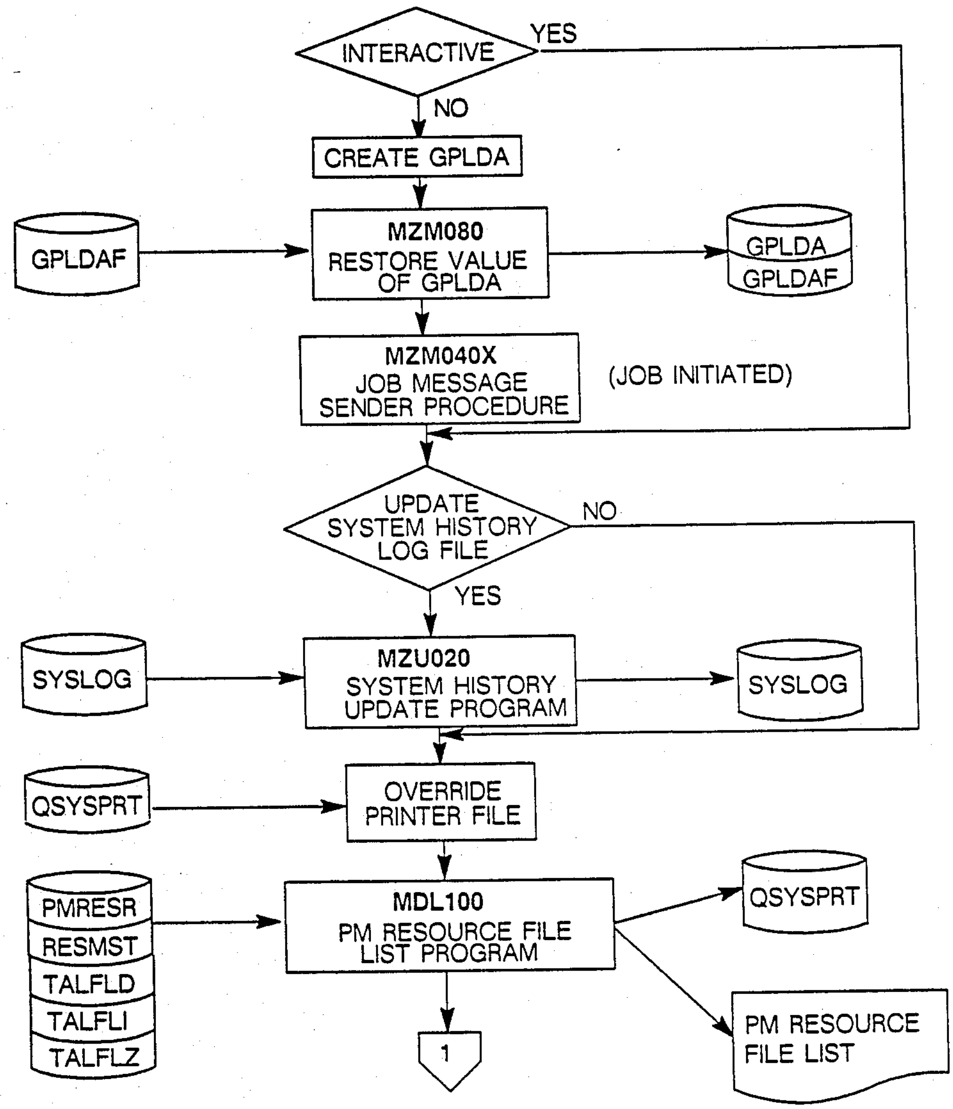
Figure 109A:
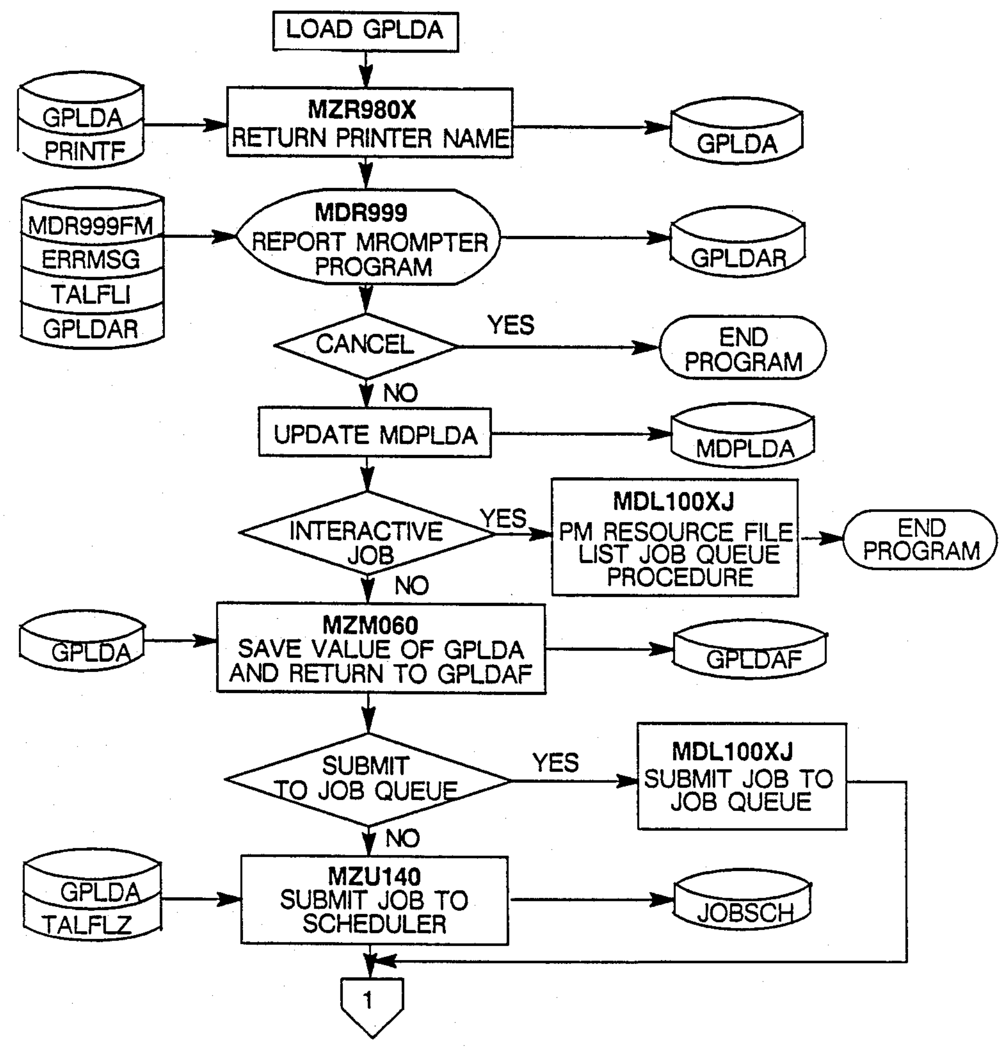
Figure 109B:
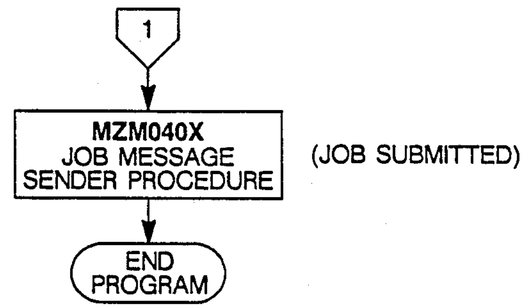
Figure 110:
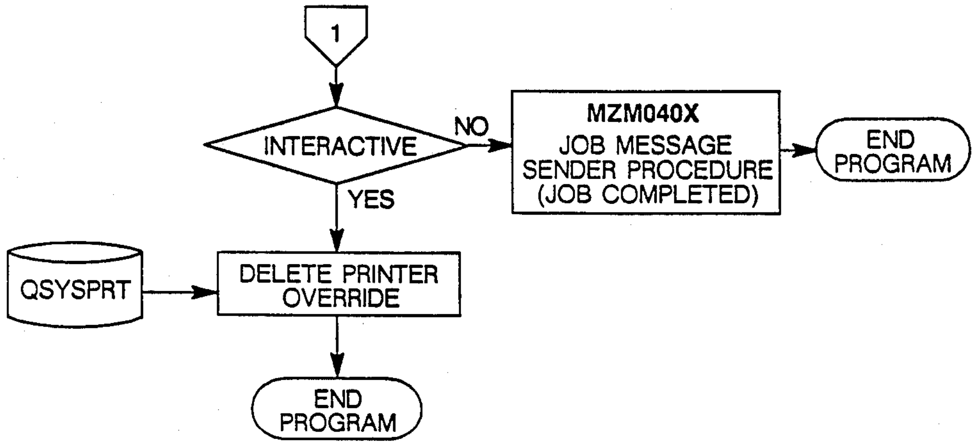
Figure 111A:
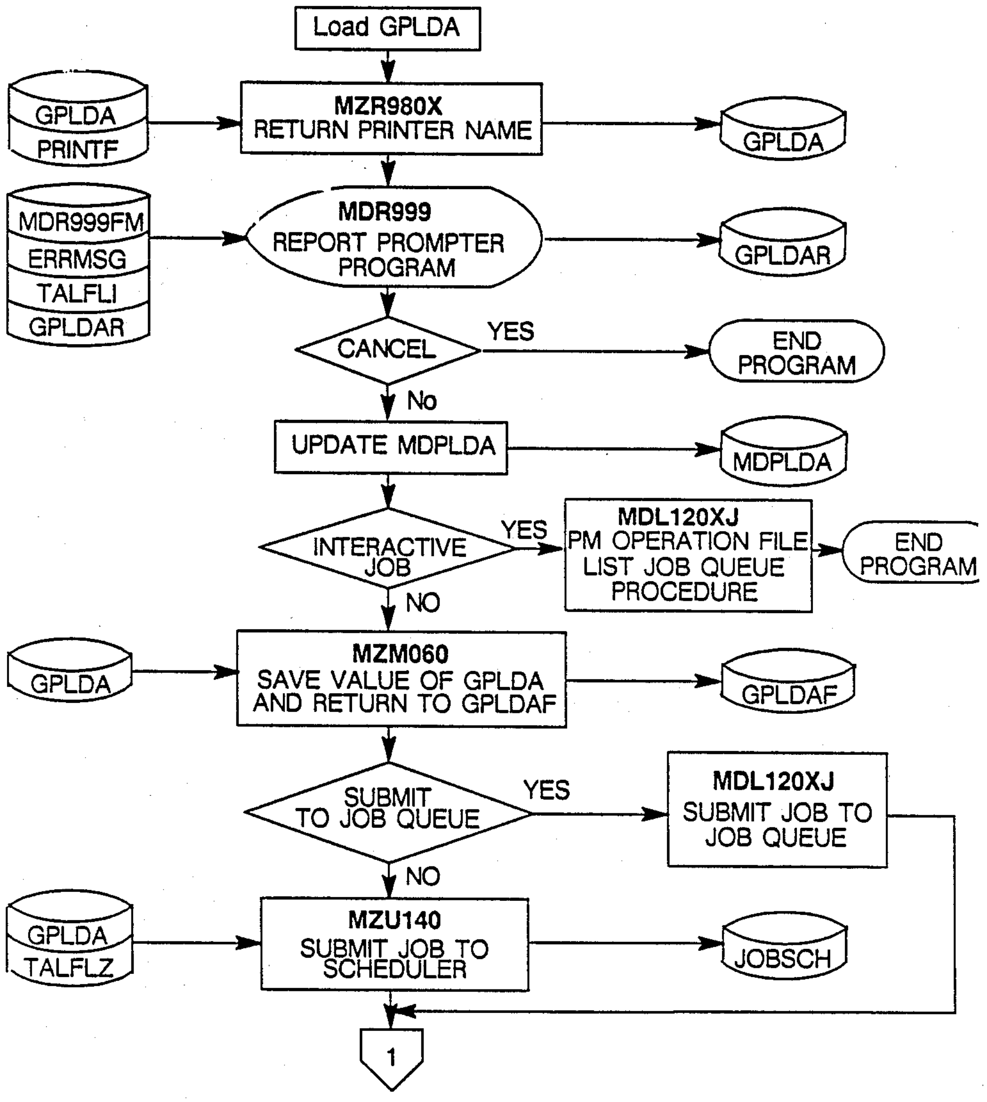
Figure 111B:
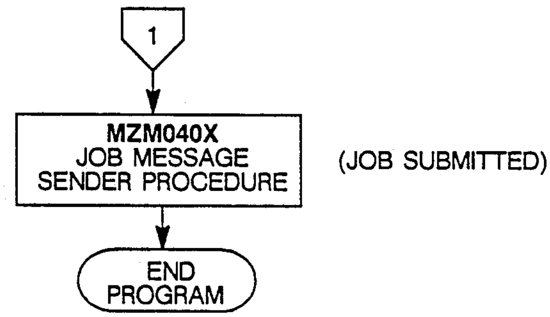
Figure 112:
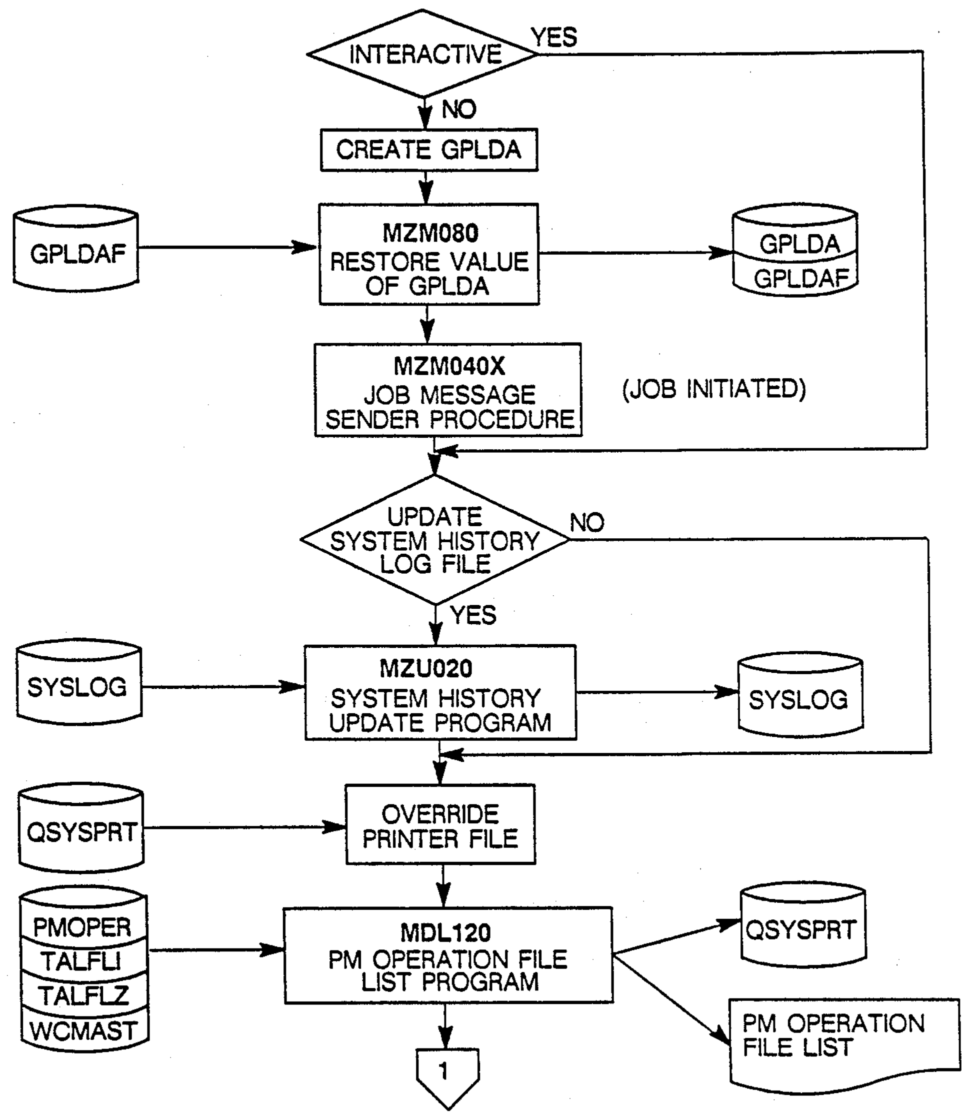
Figure 113:
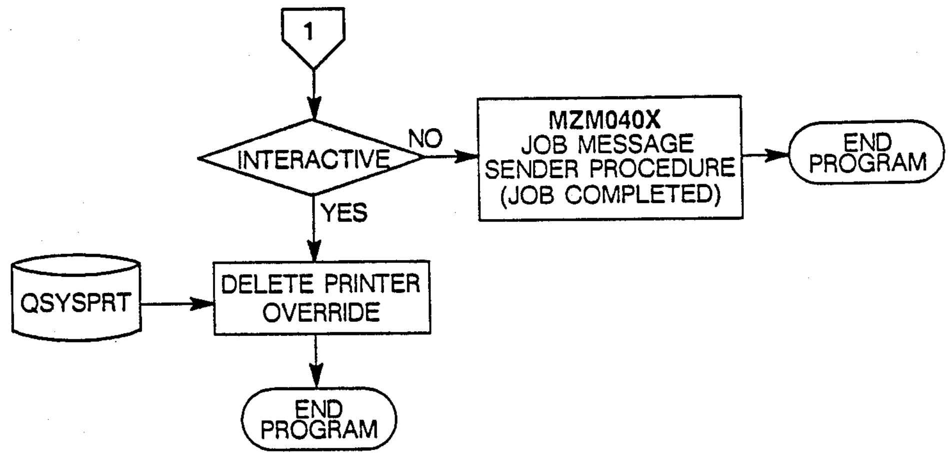
Figure 114:
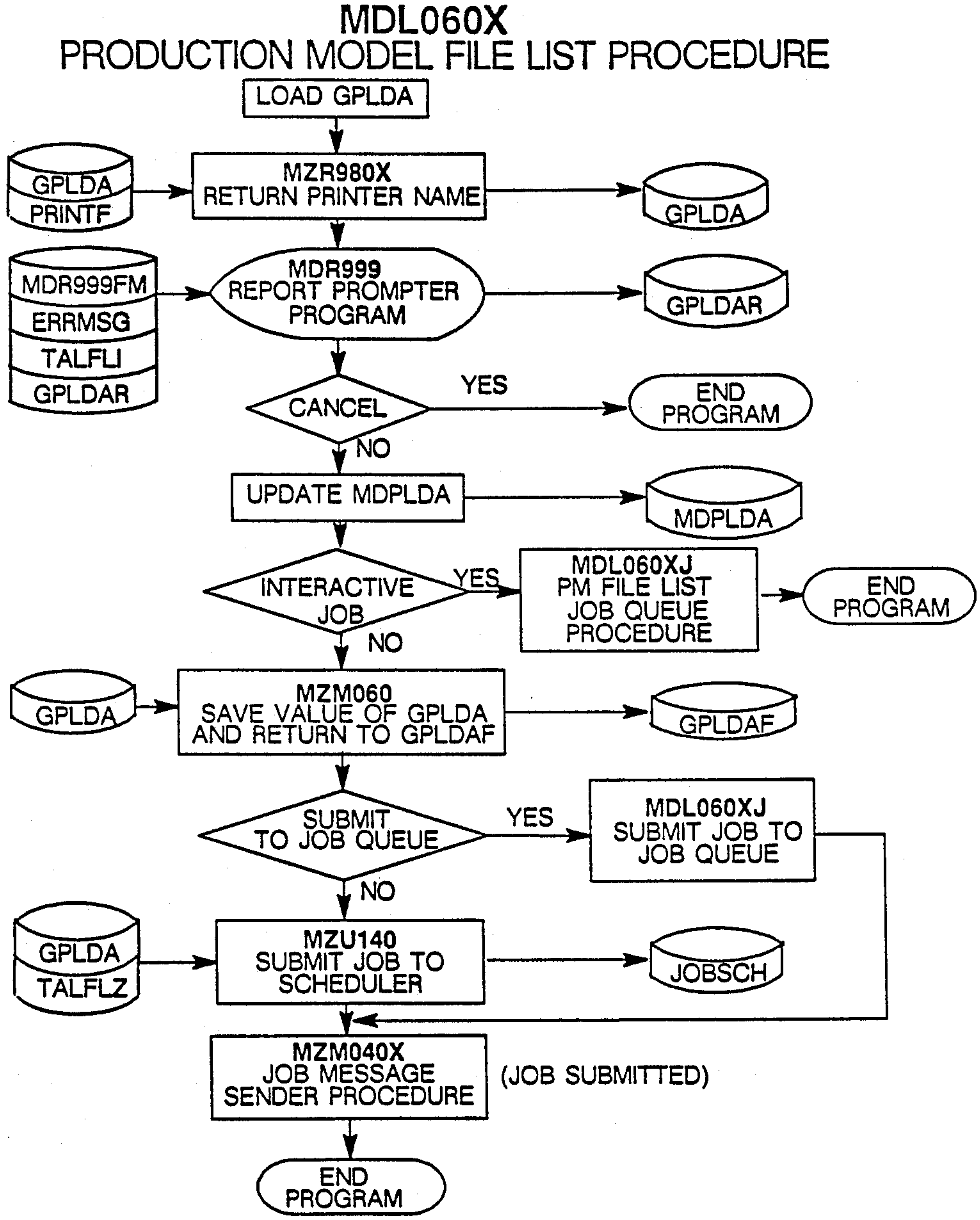
Figure 115:
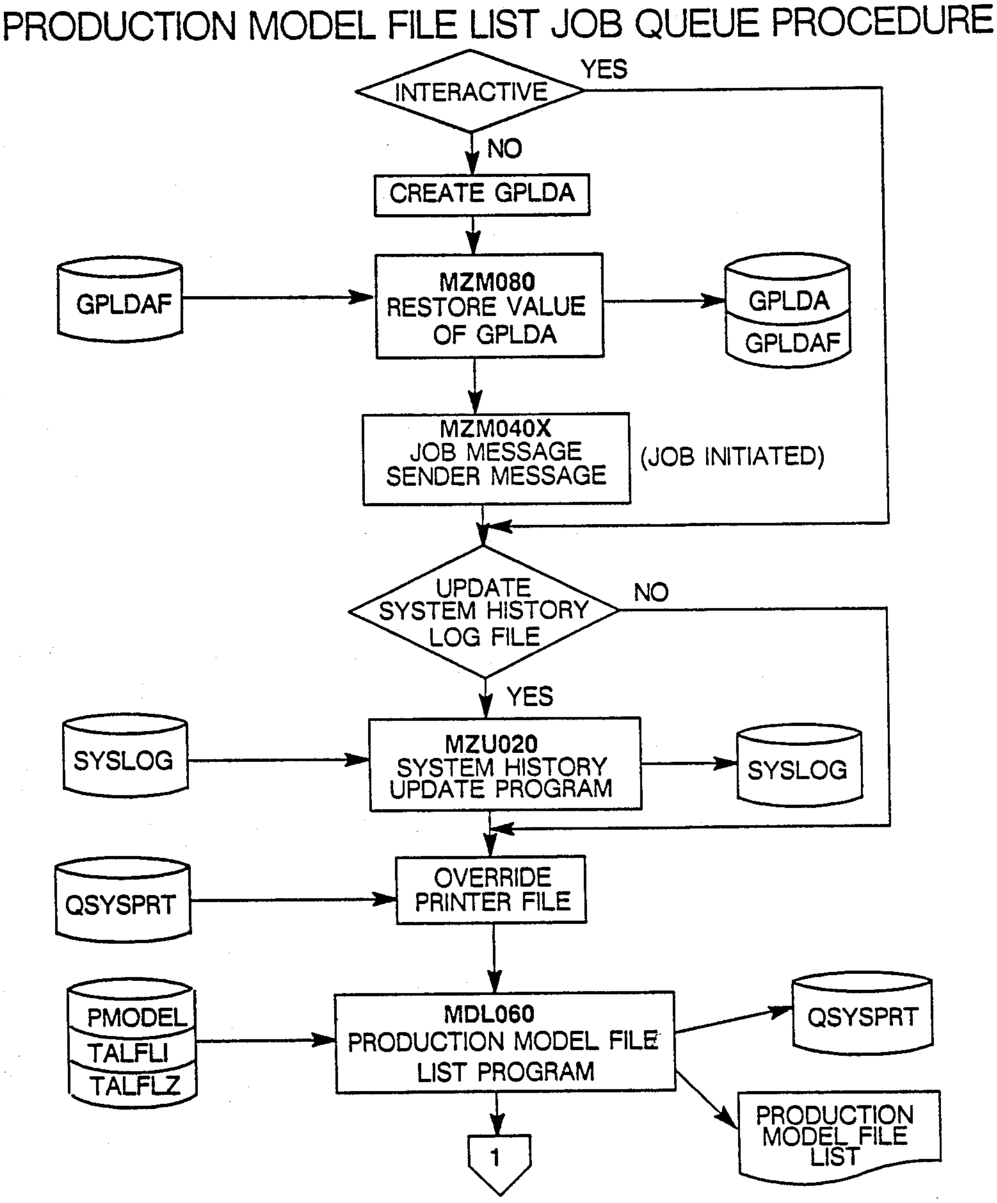
Figure 116:
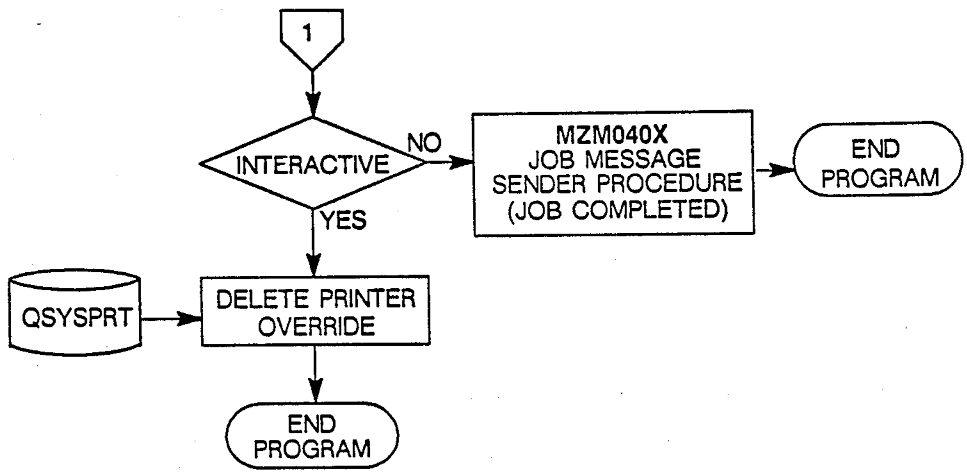
Figure 117A:
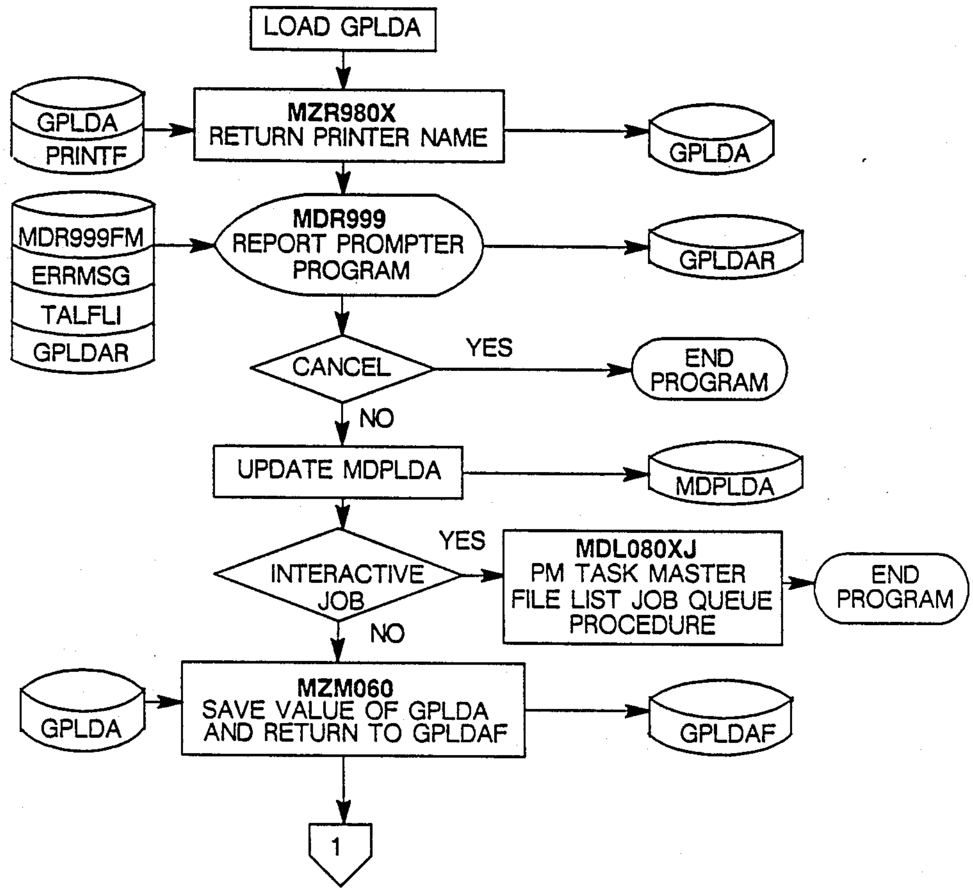
Figure 117B:
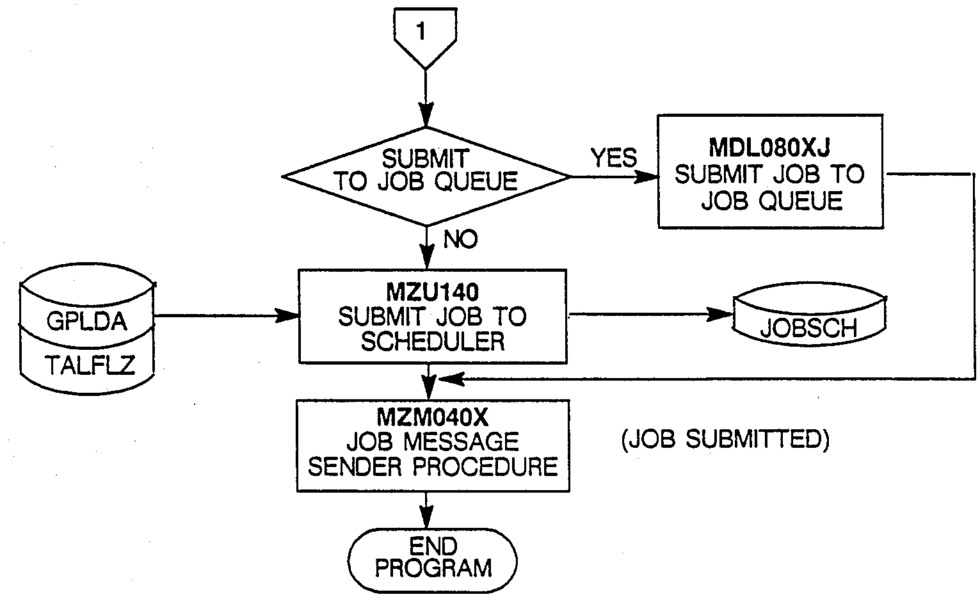
Figure 118:
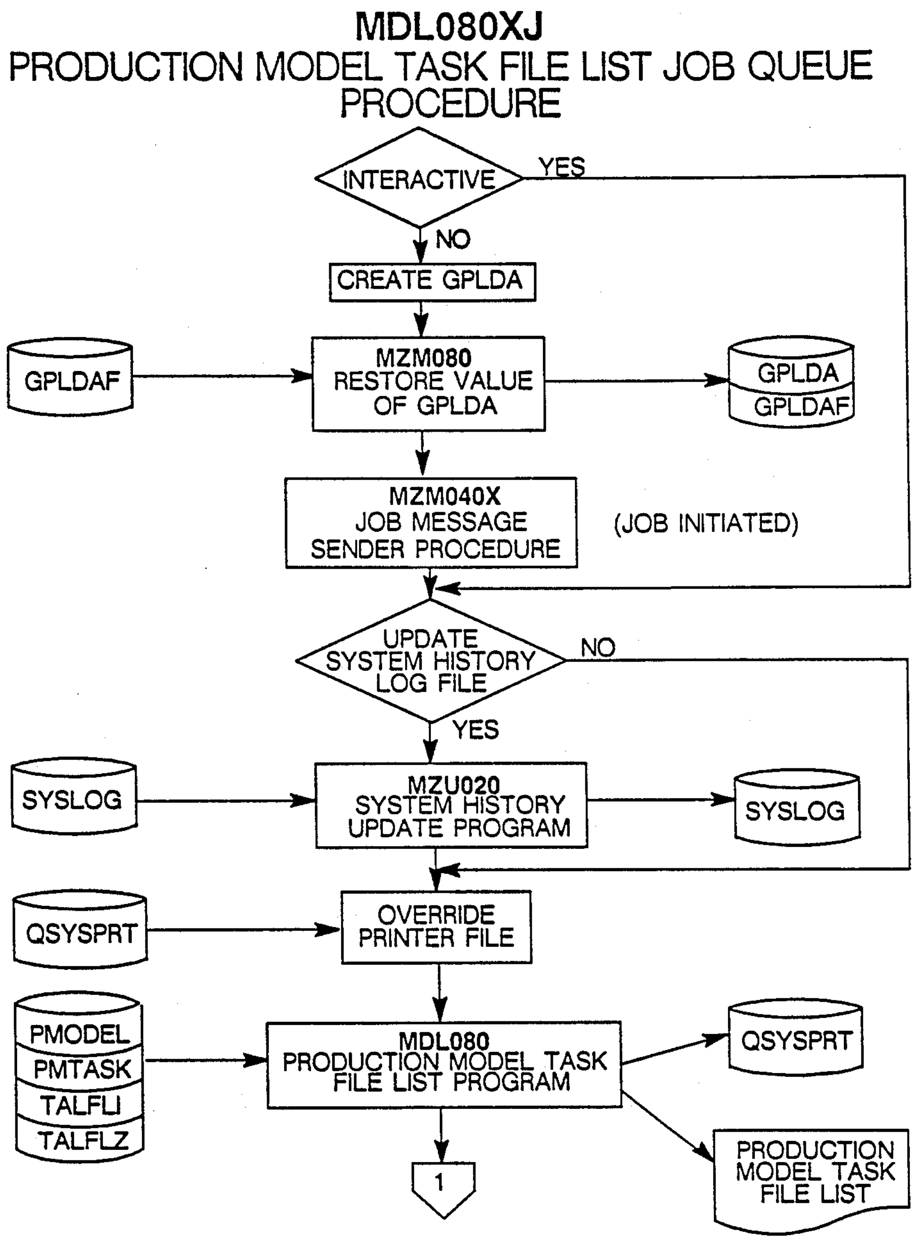
Figure 119:
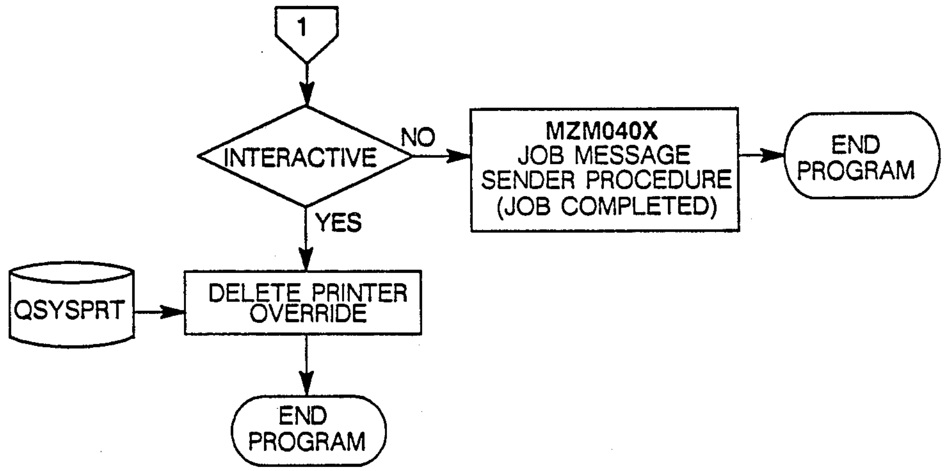
Figure 120A:
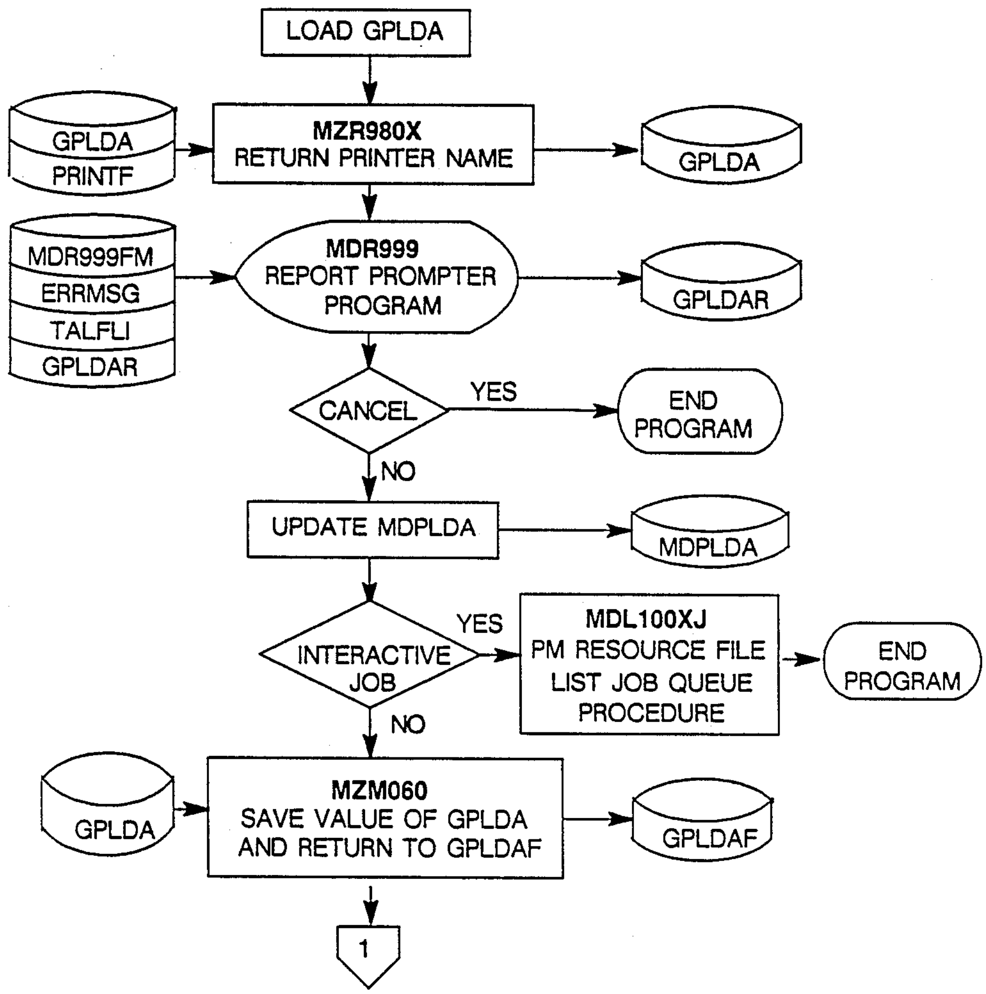
Figure 120B:
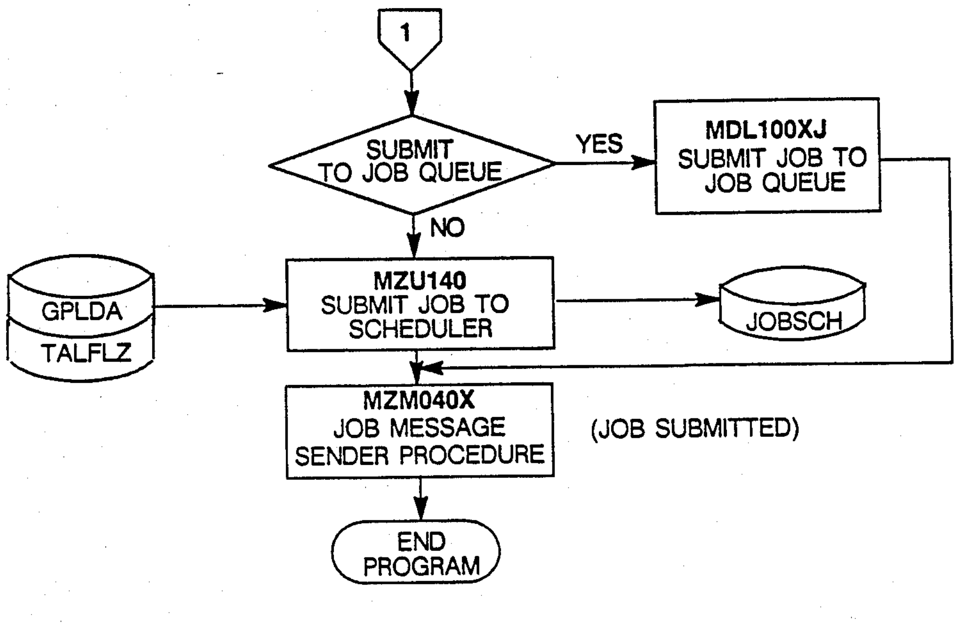
Figure 121:
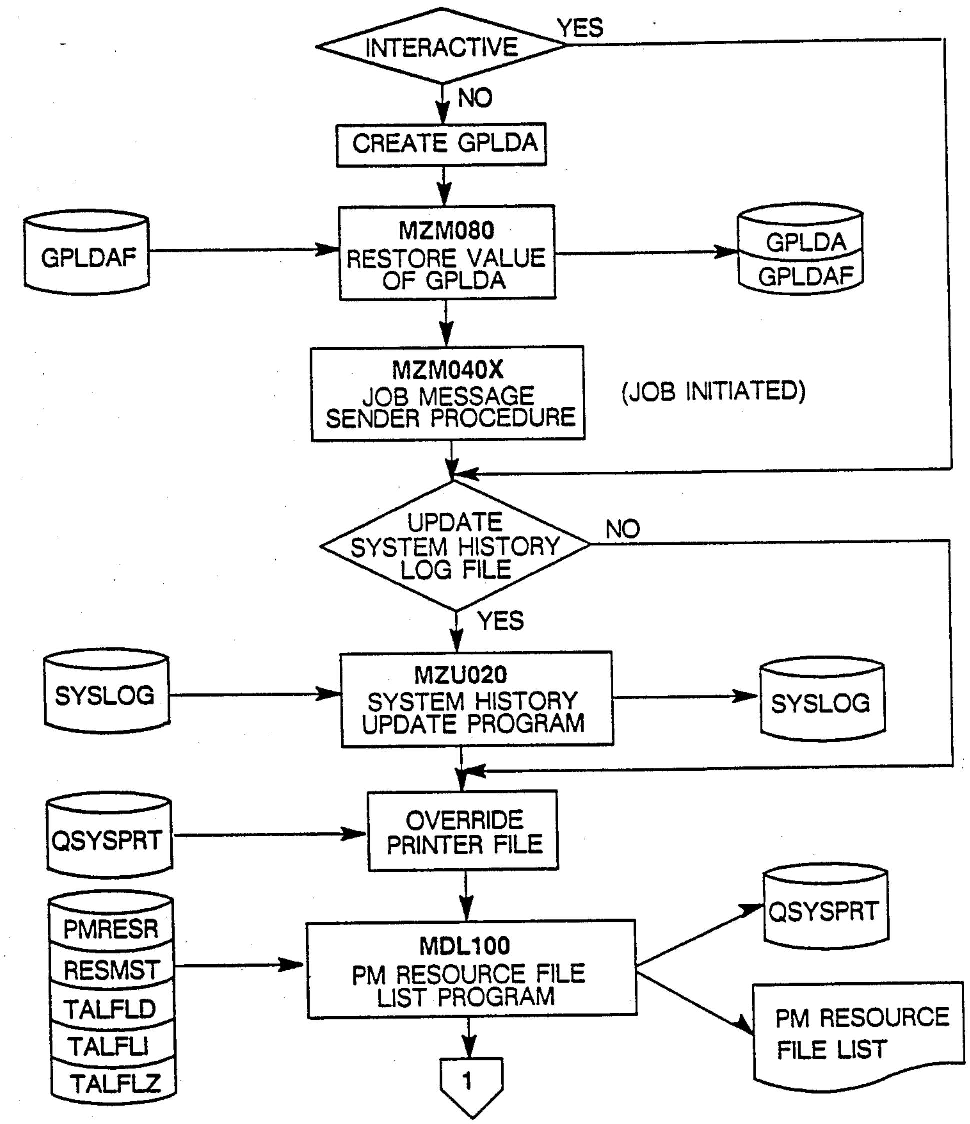
Figure 122:
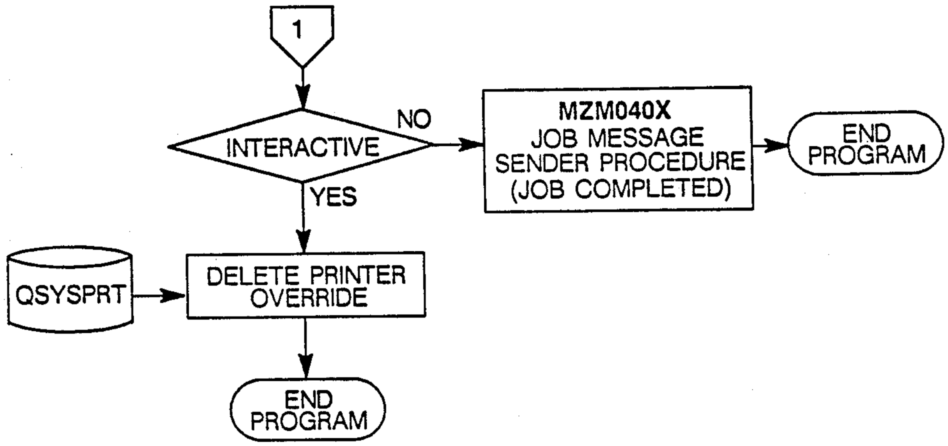
Figure 123A:
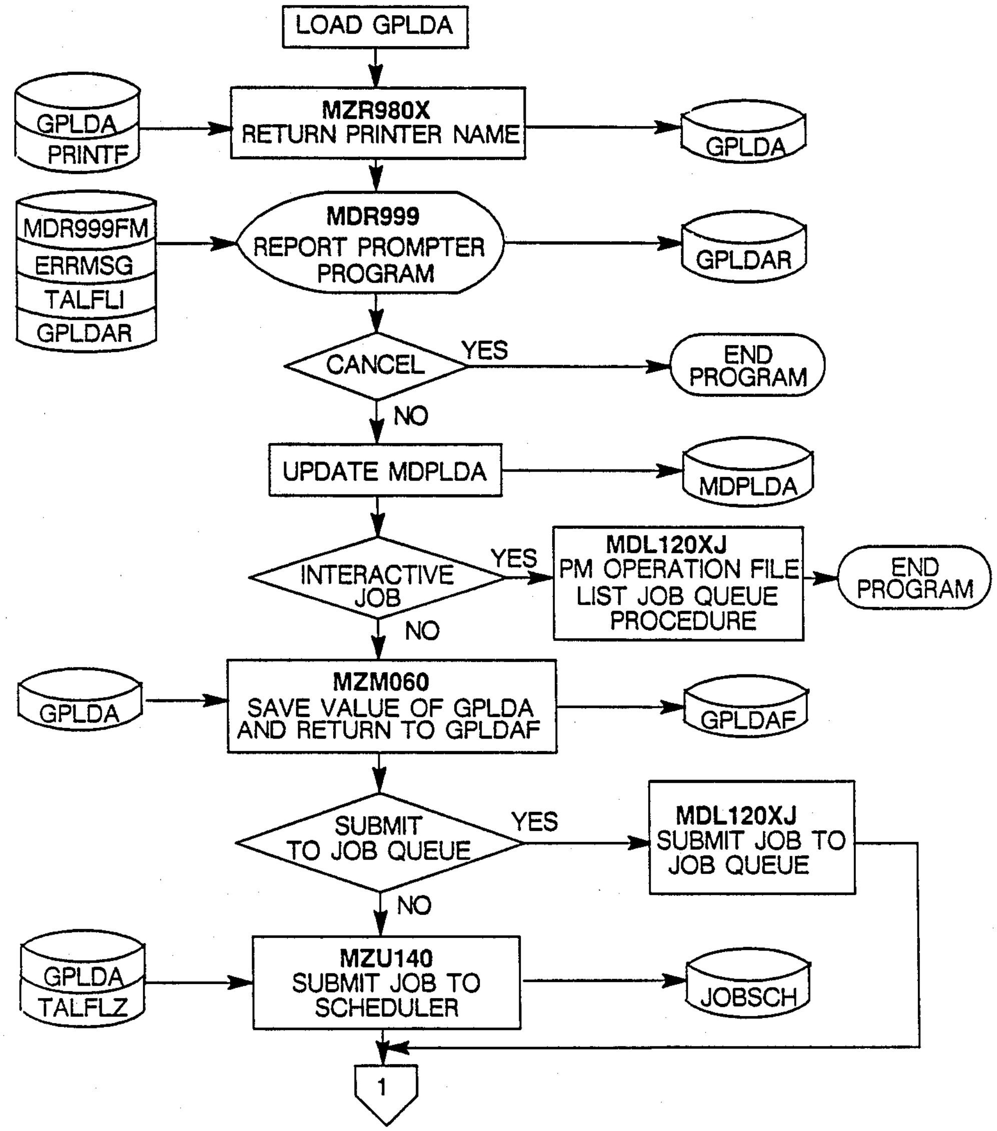
Figure 123B:
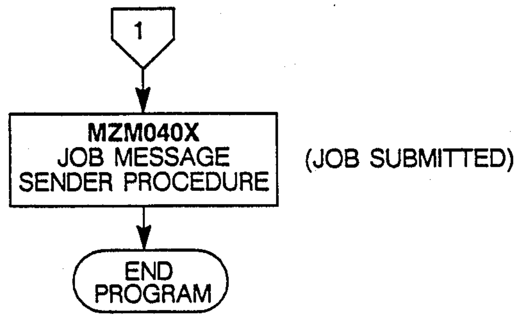
Figure 124:
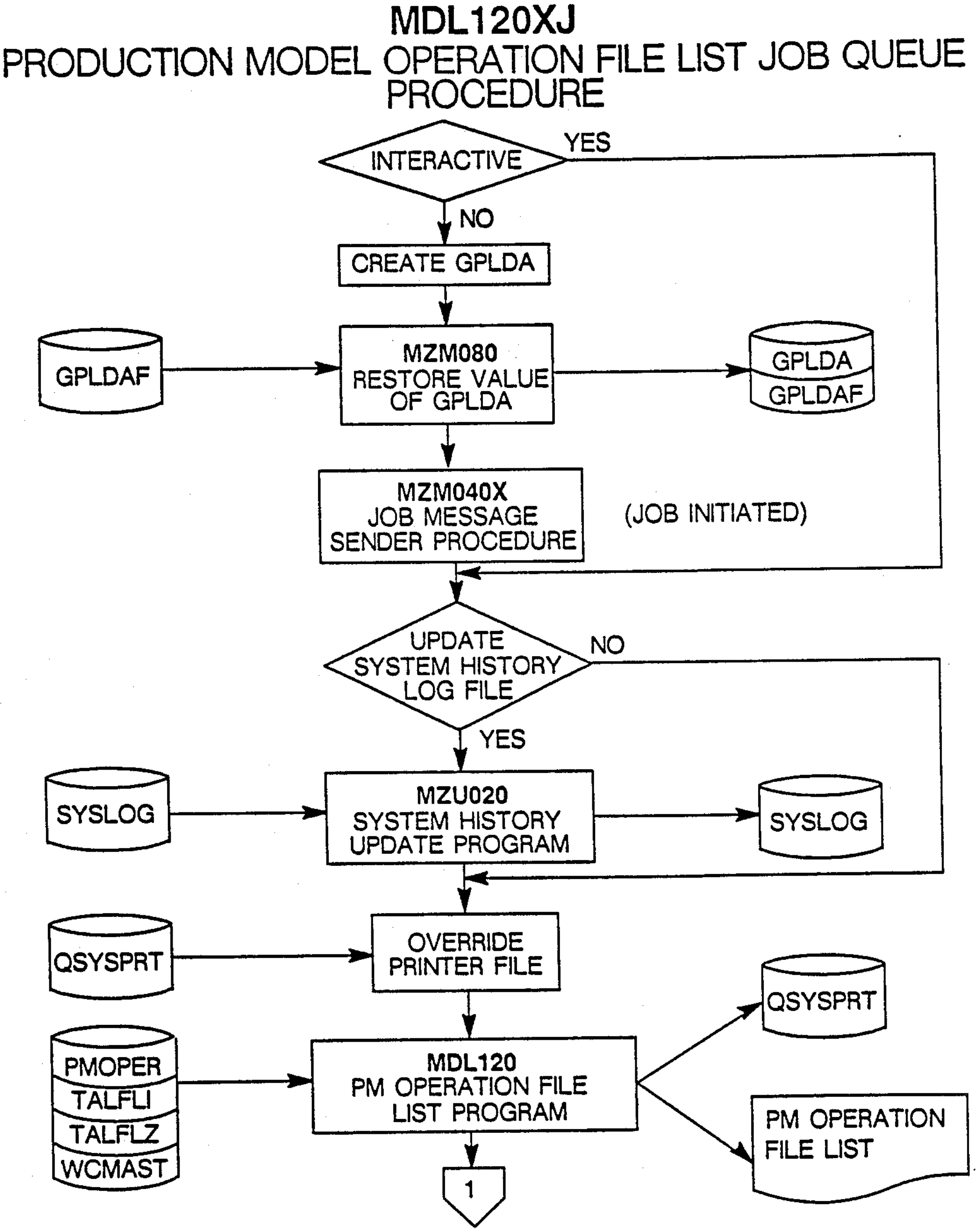
Figure 125:
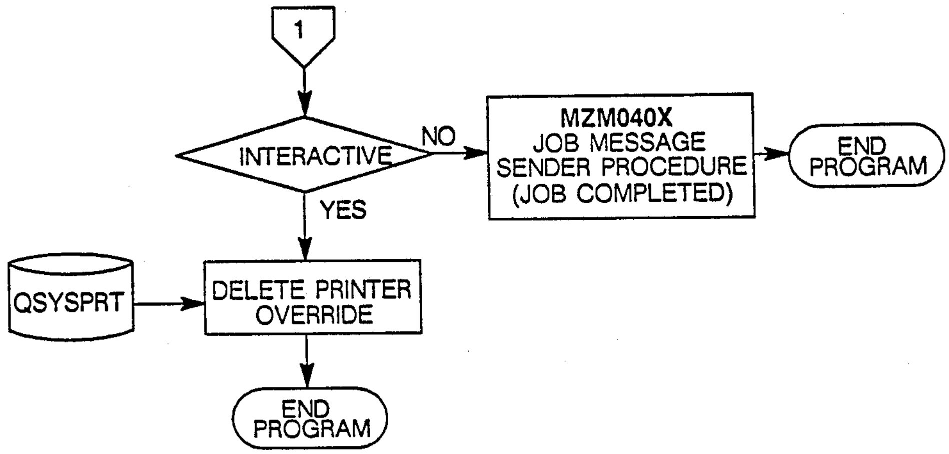
Figure 126A:
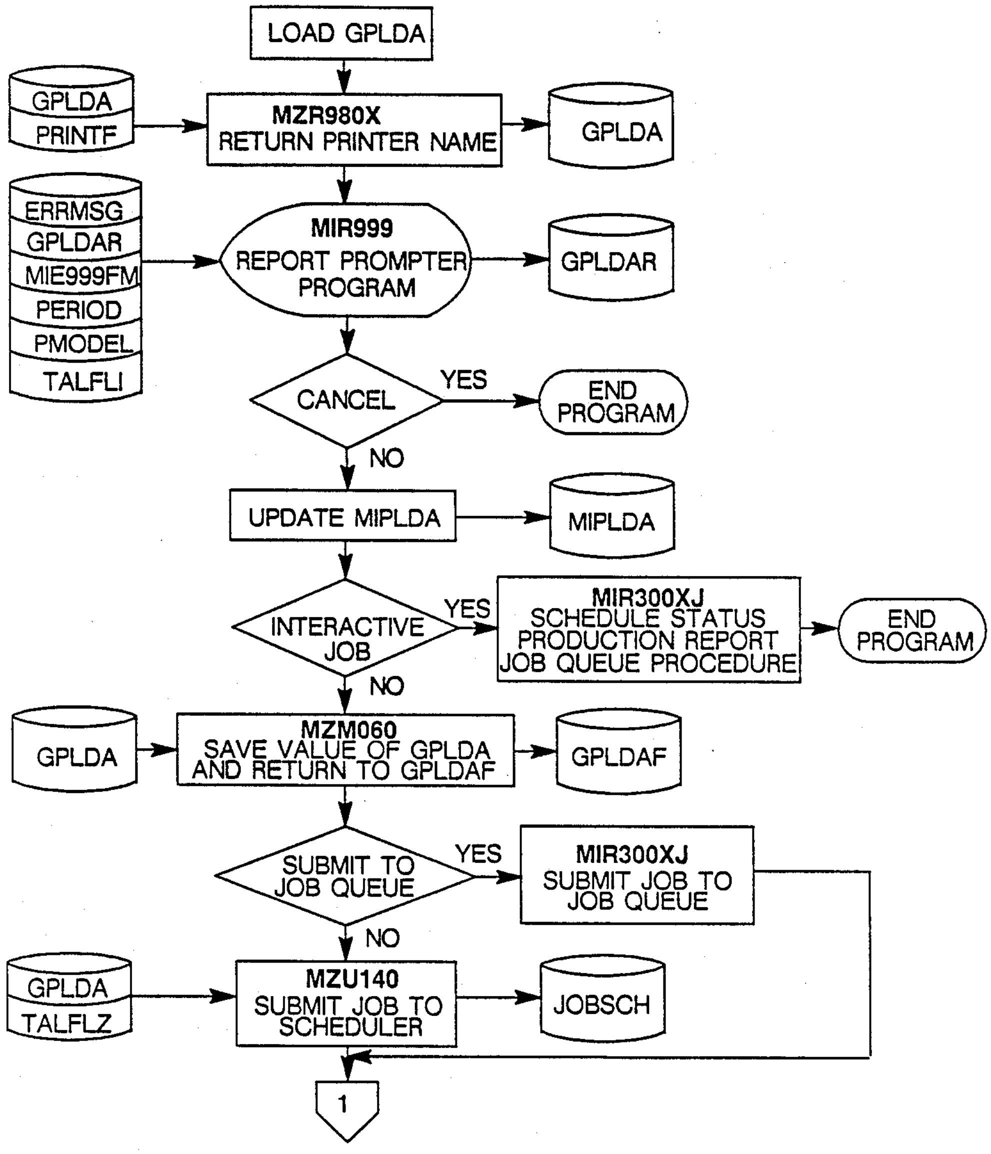
Figure 126B:
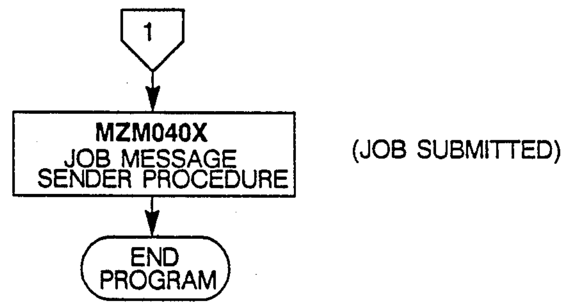
Figure 127:
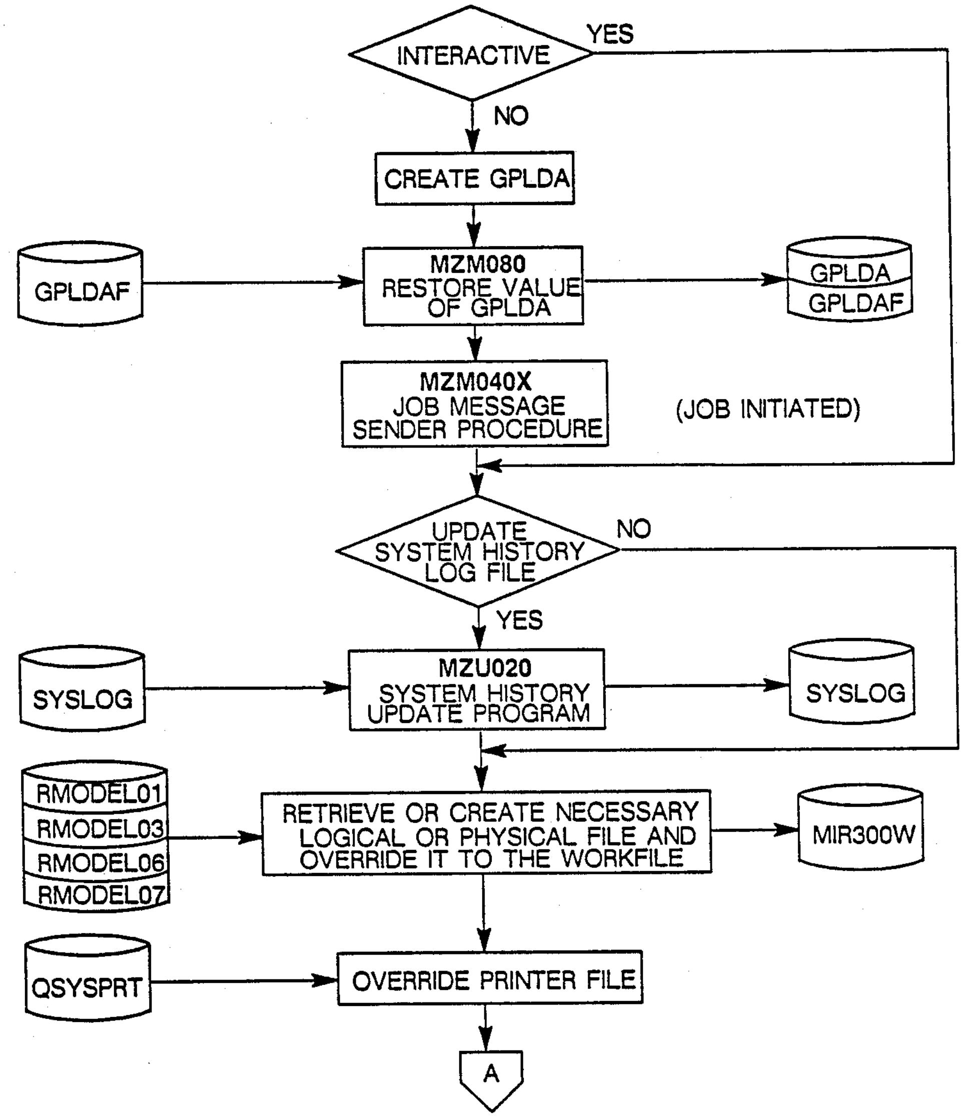
Figure 128:
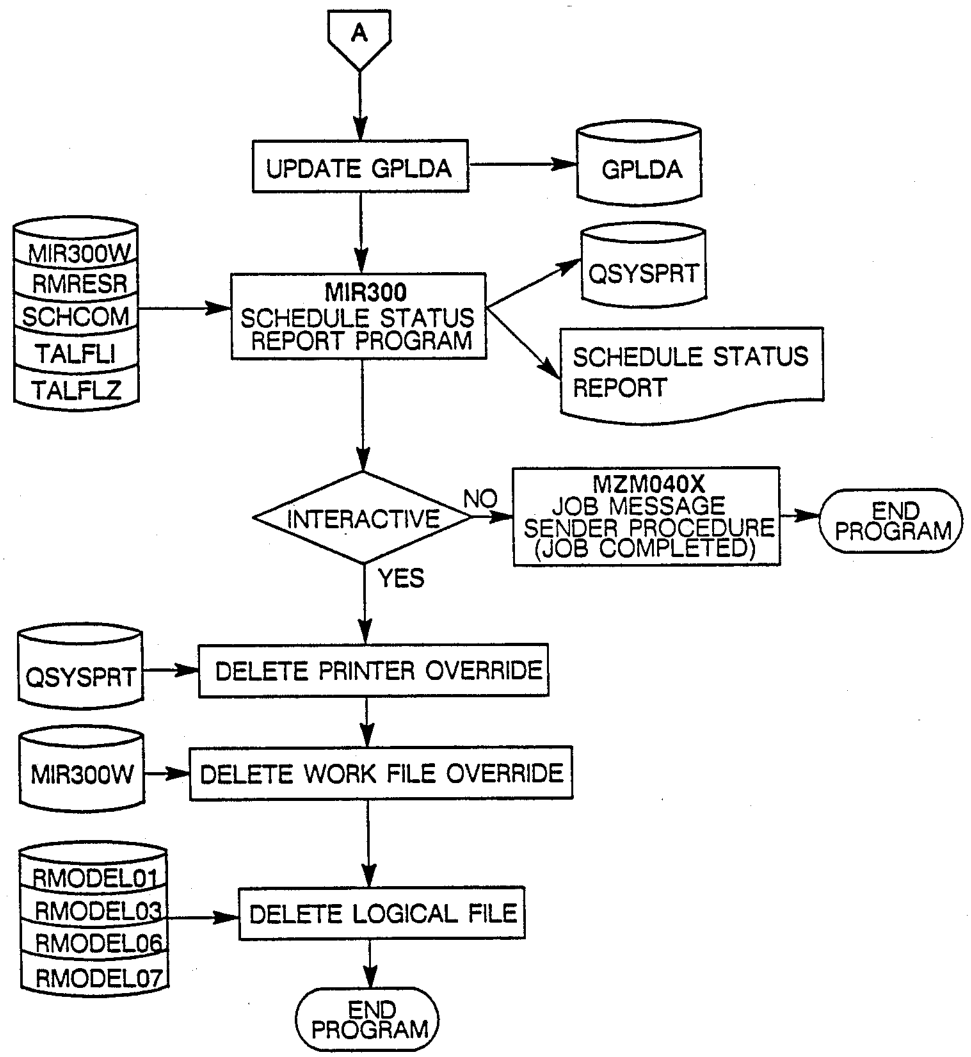
Figure 129A:
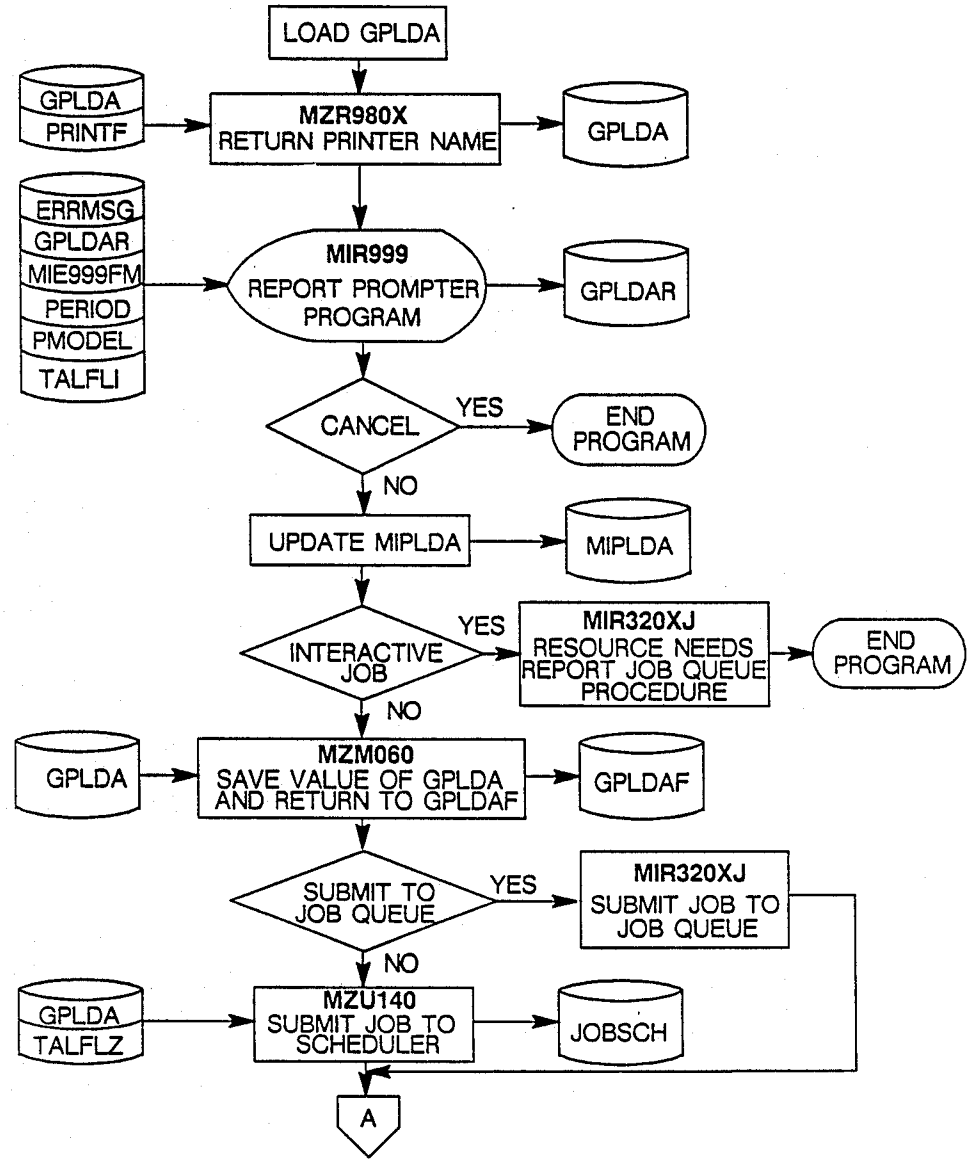
Figure 129B:
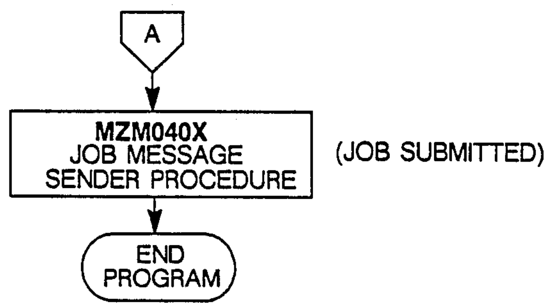
Figure 130:
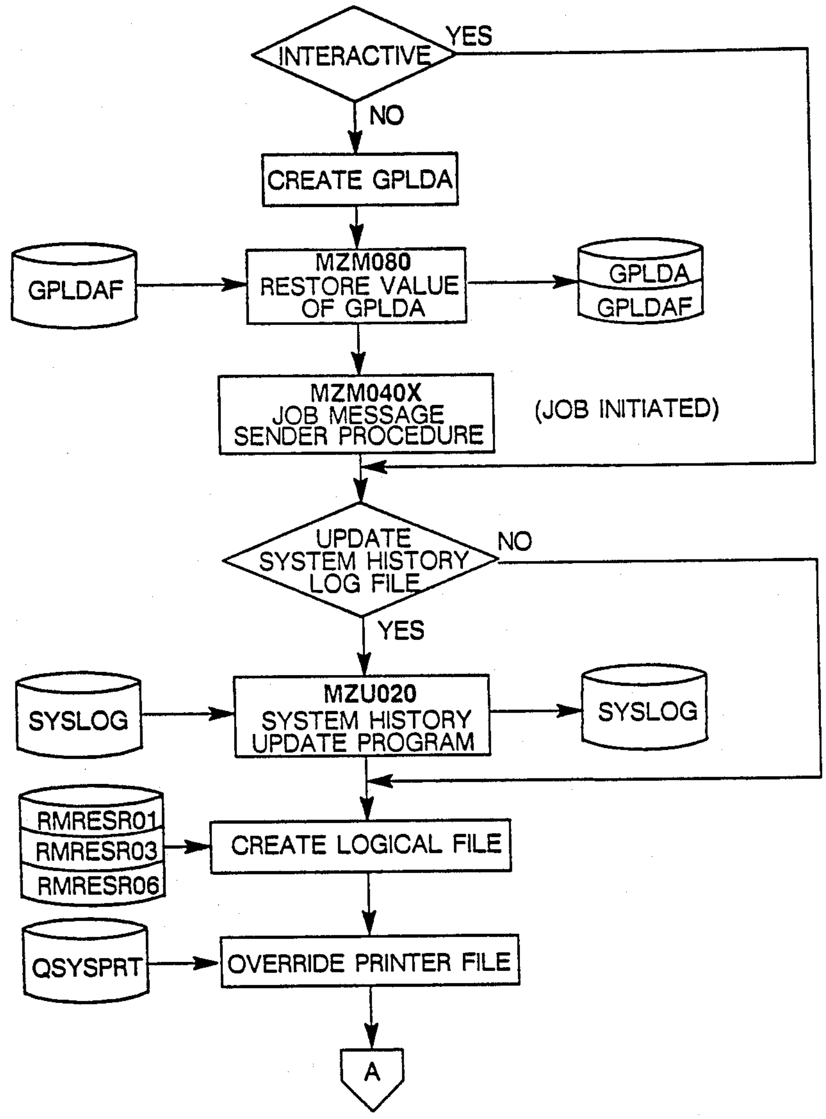
Figure 131:
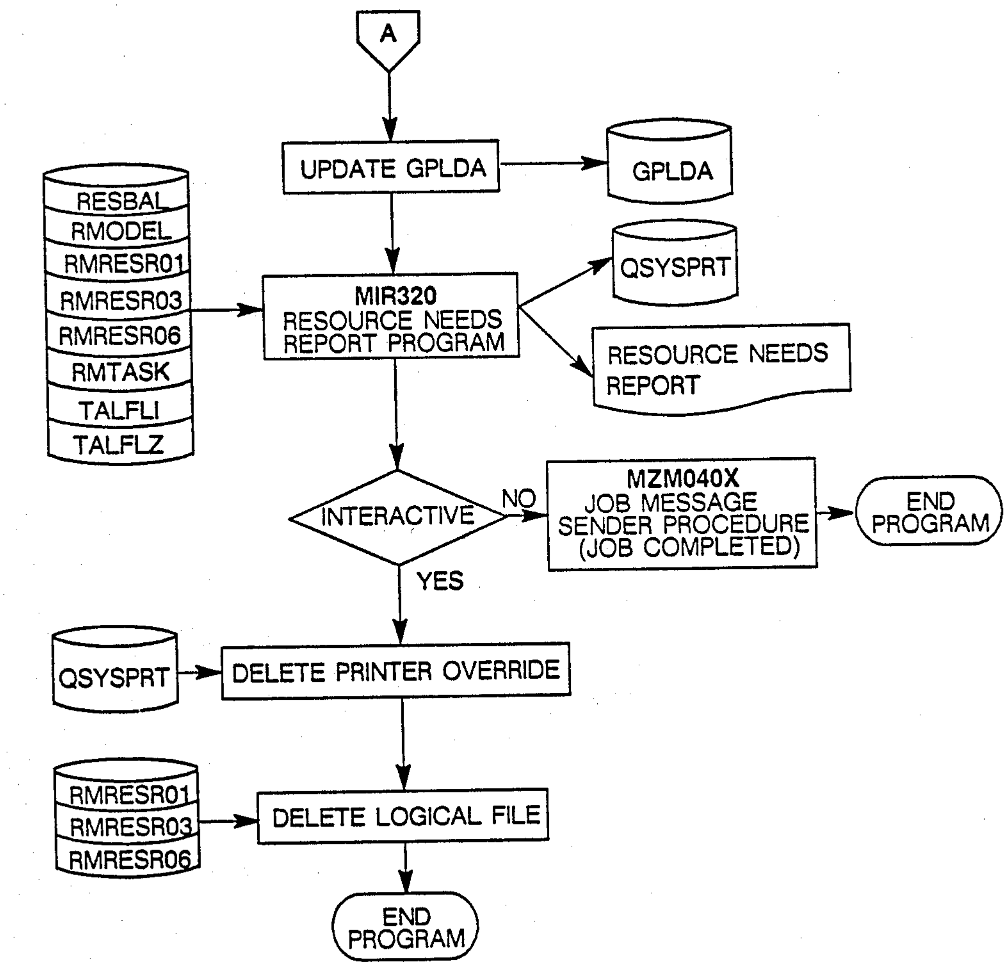
Figure 132A:
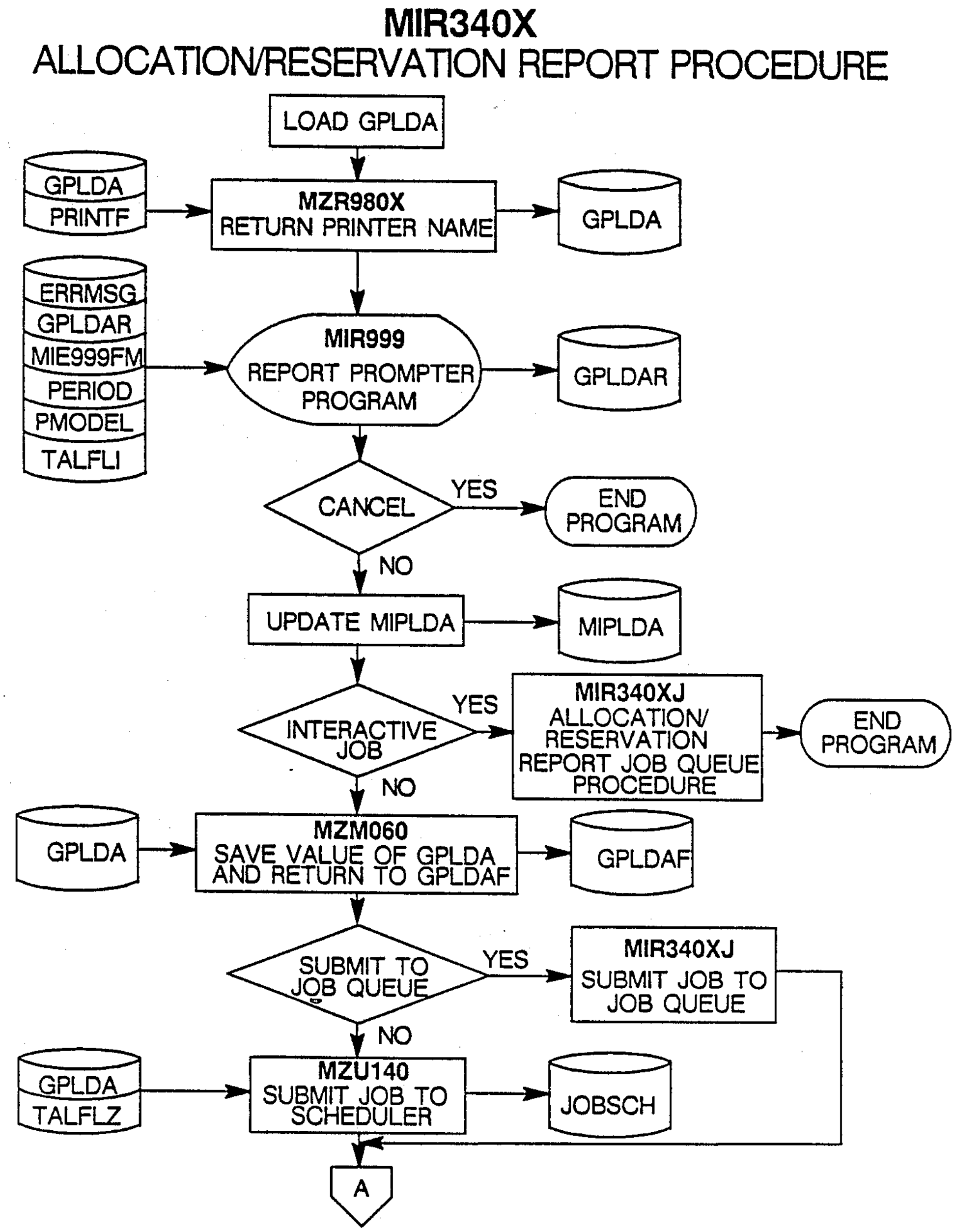
Figure 132B:
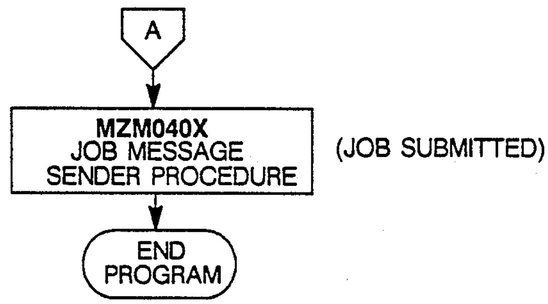
Figure 133:
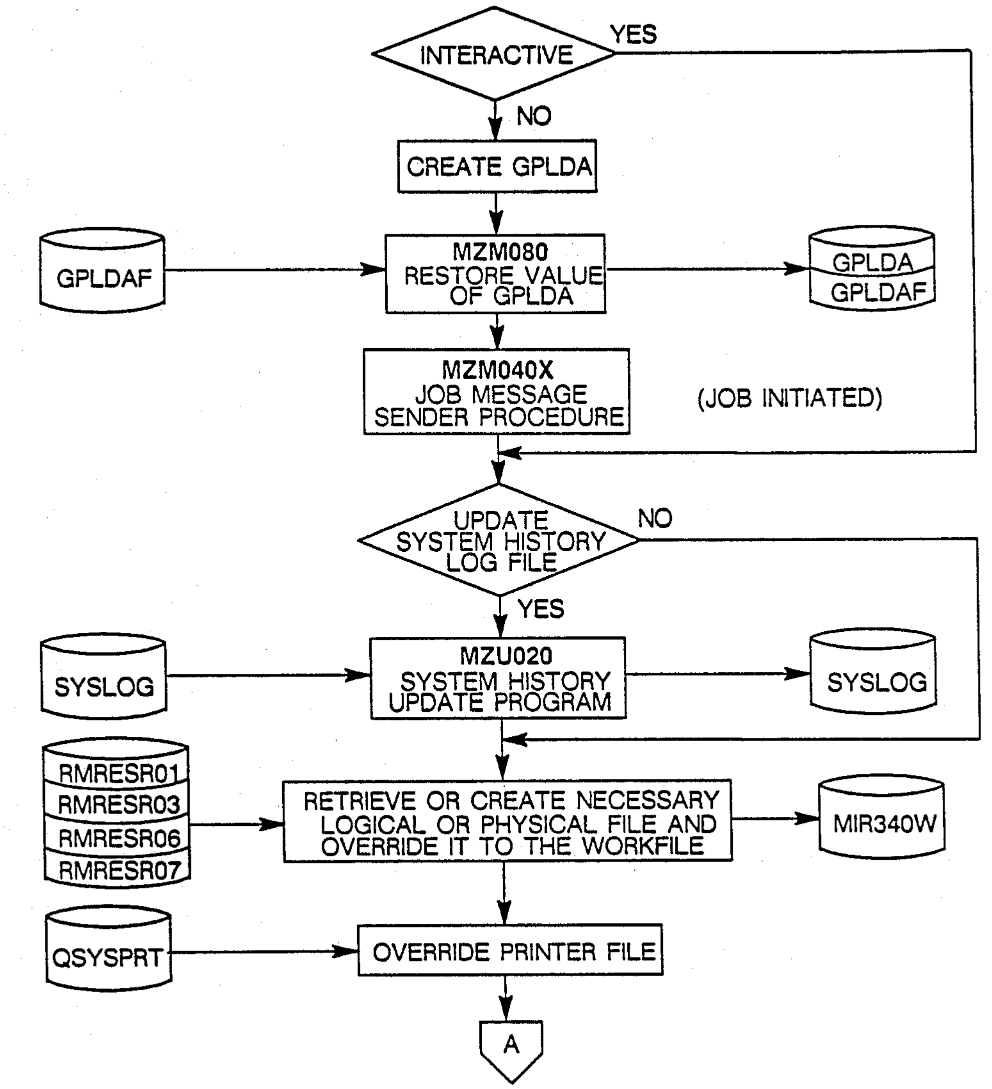
Figure 134:
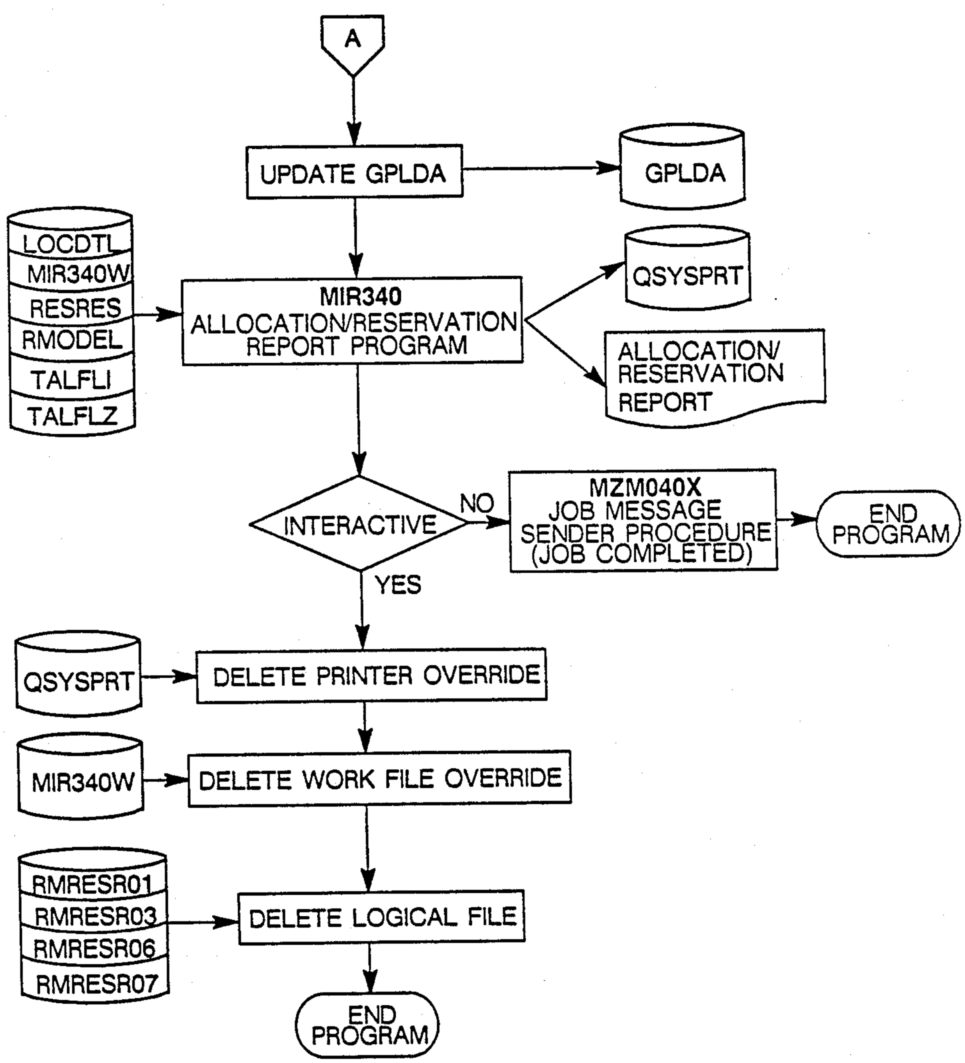
Figure 135A:
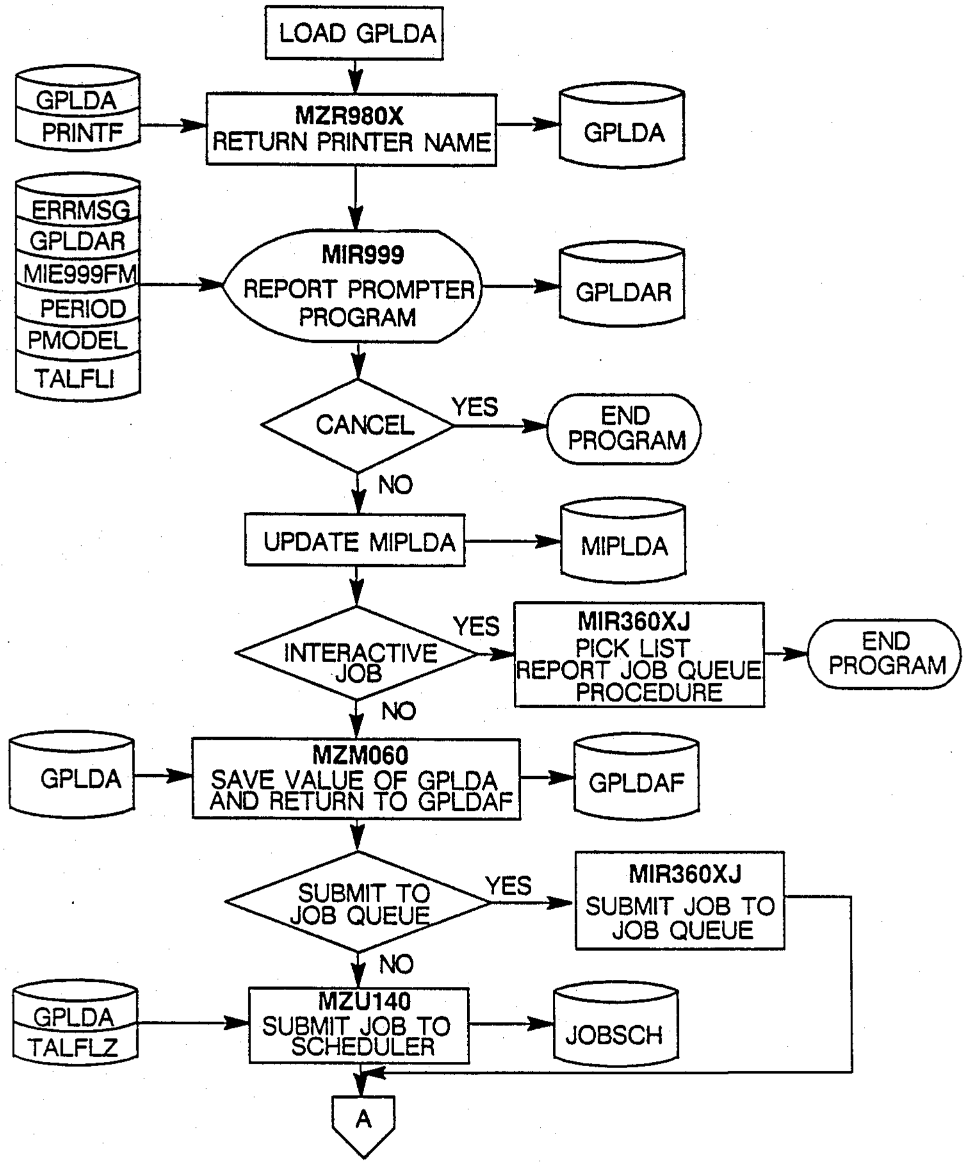
Figure 135B:
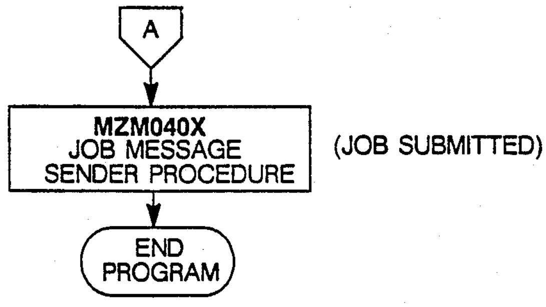
Figure 136:
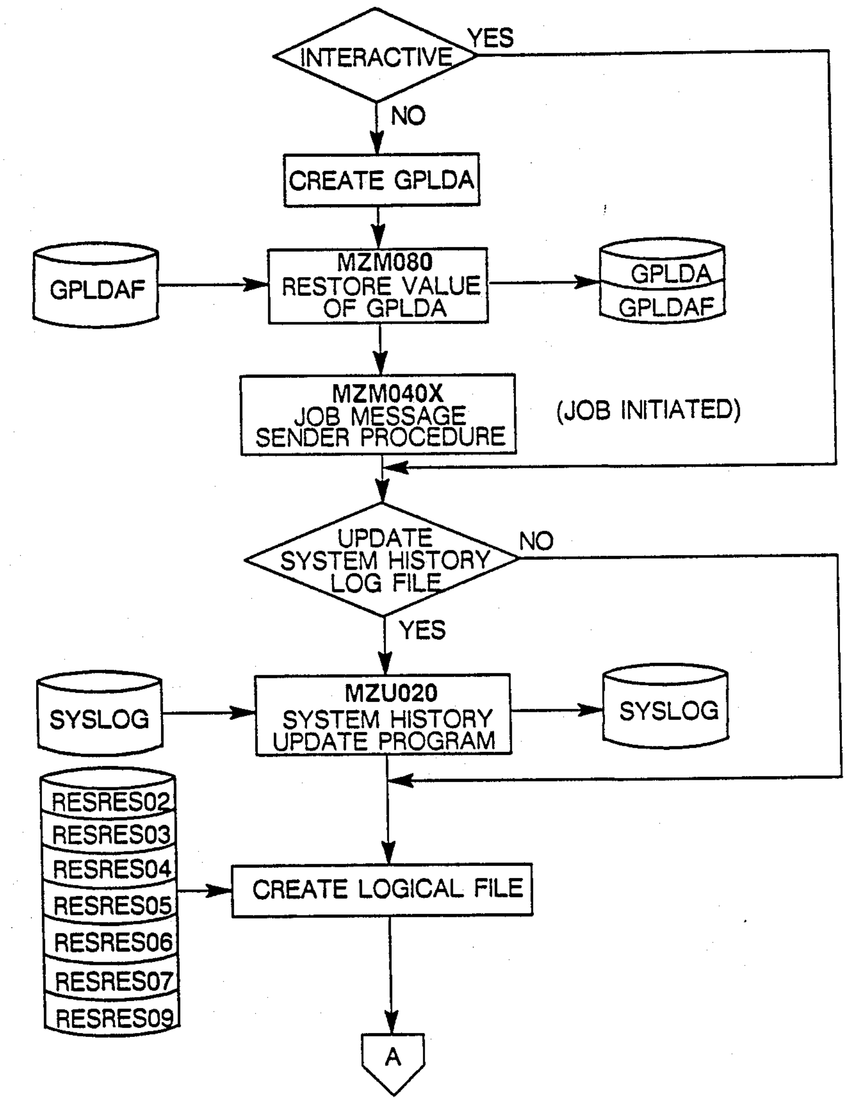
Figure 137:
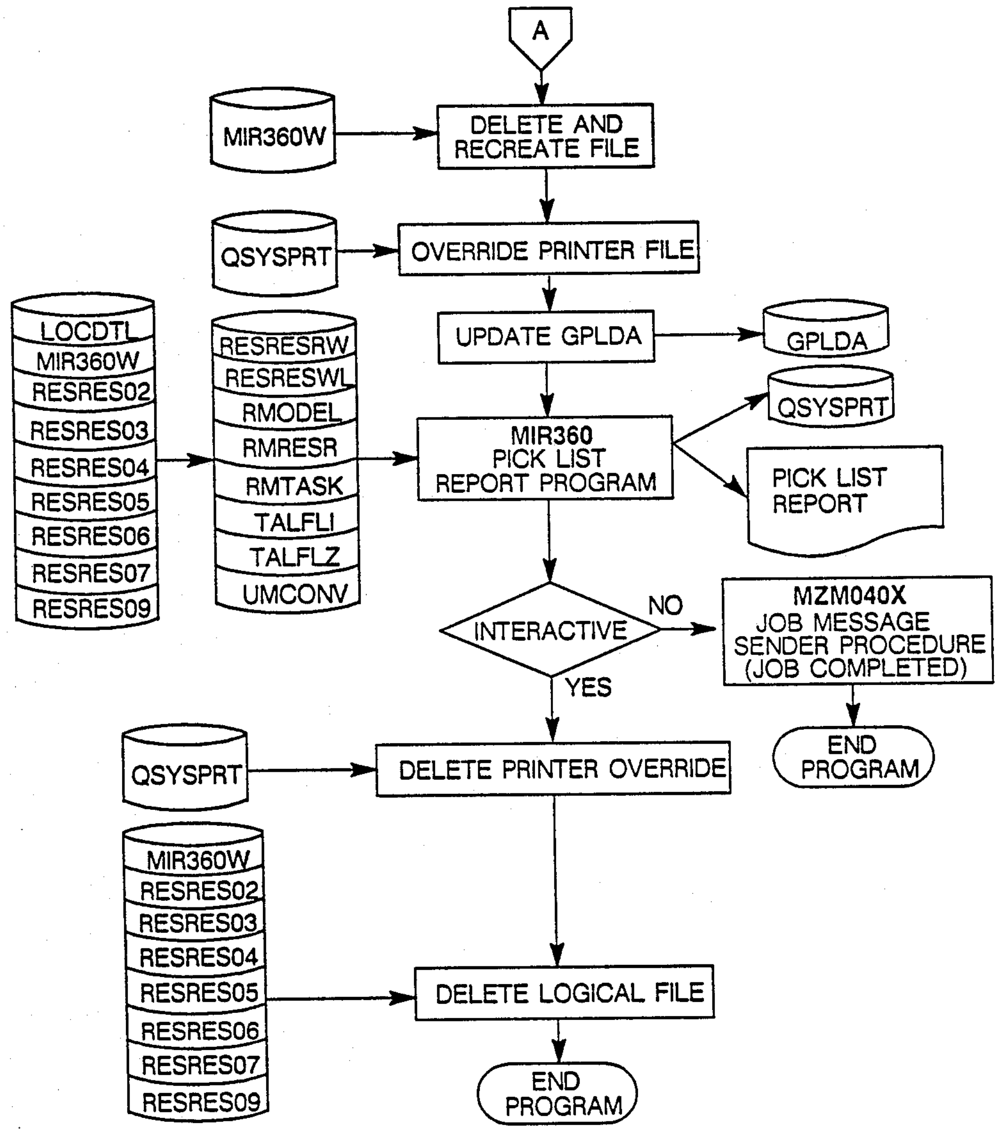
Figure 138A:
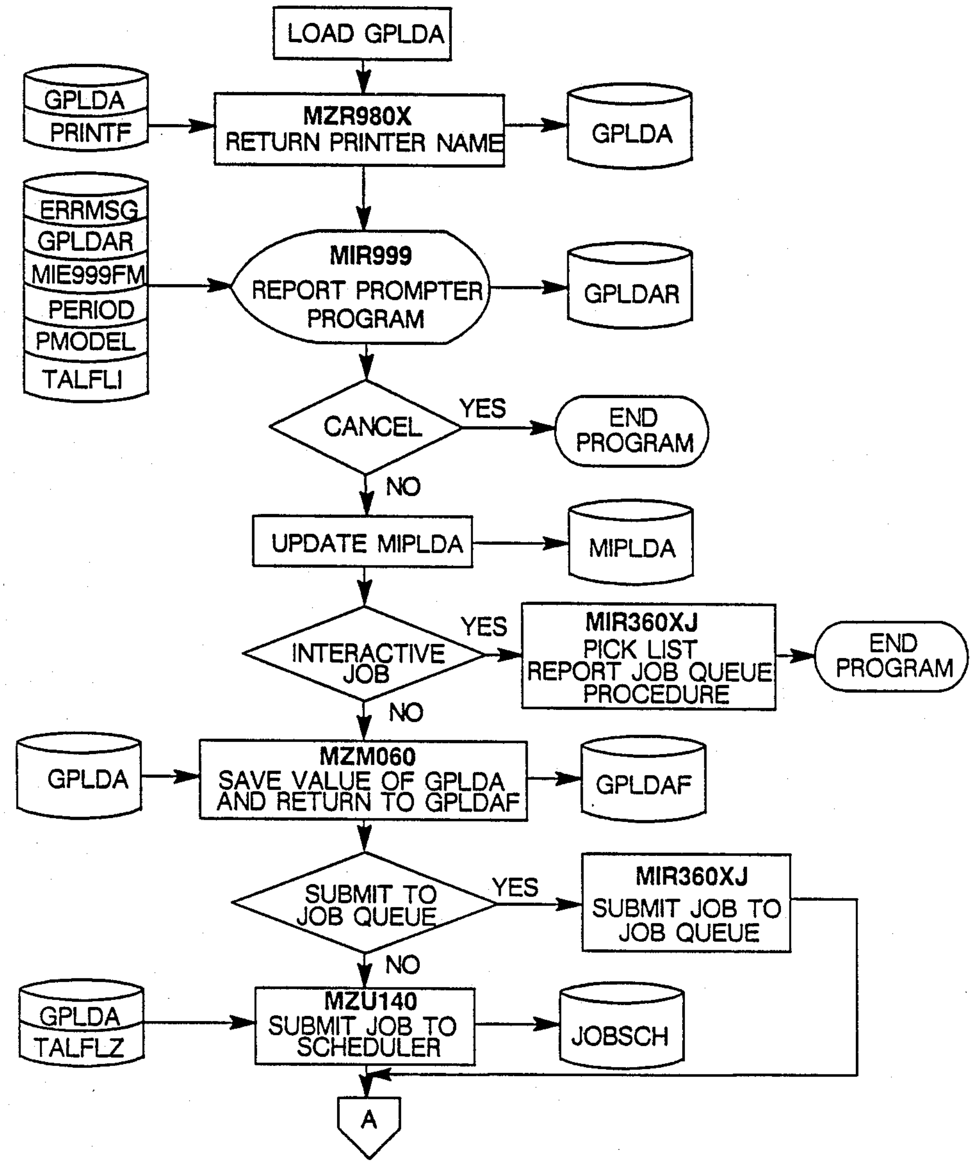
Figure 138B:
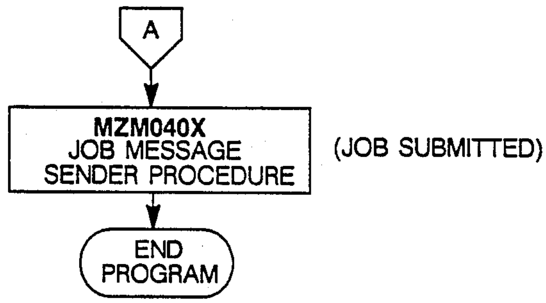
Figure 139:
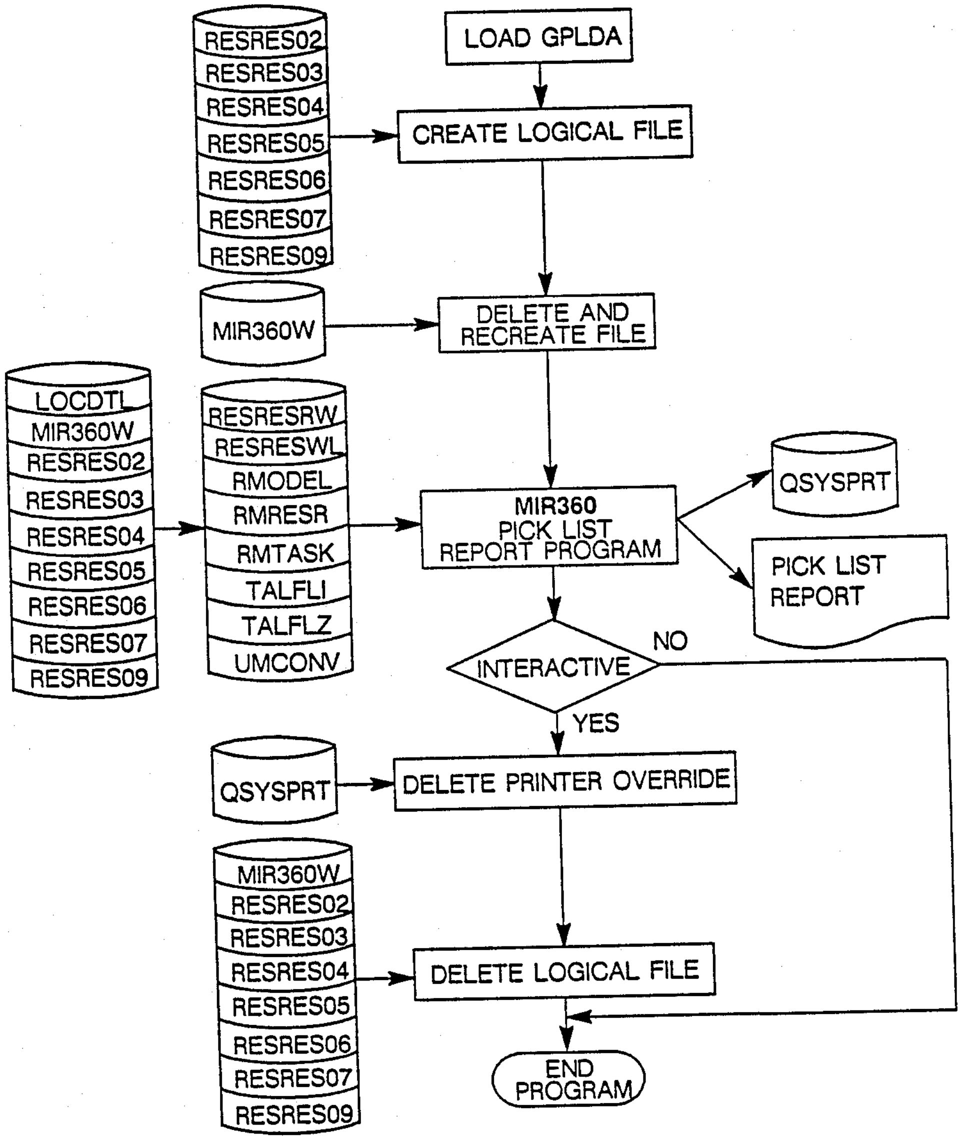
Figure 140A:
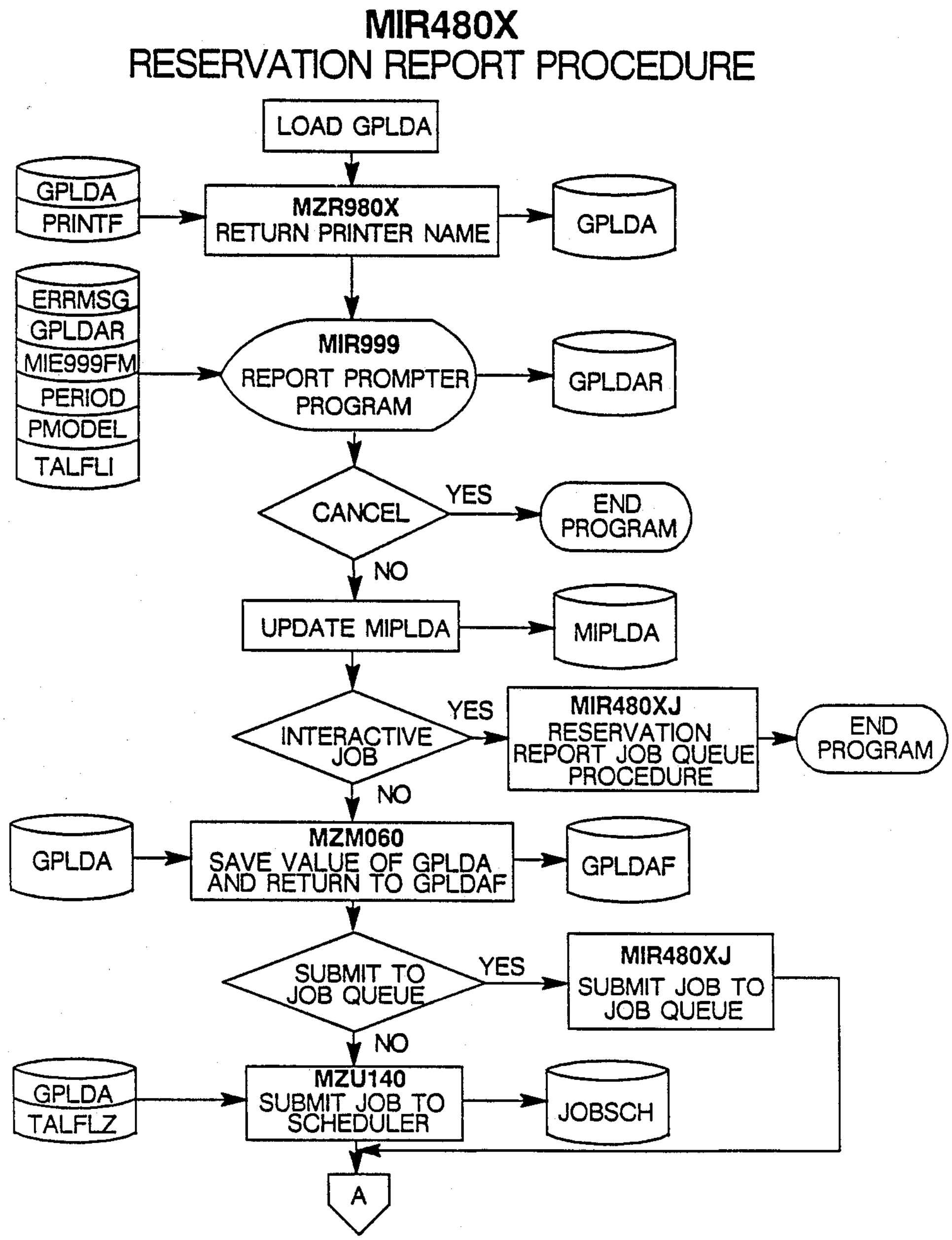
Figure 140B:
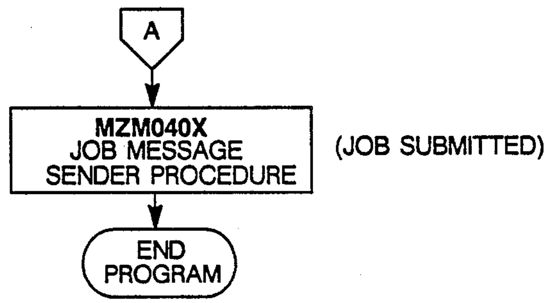
Figure 141:
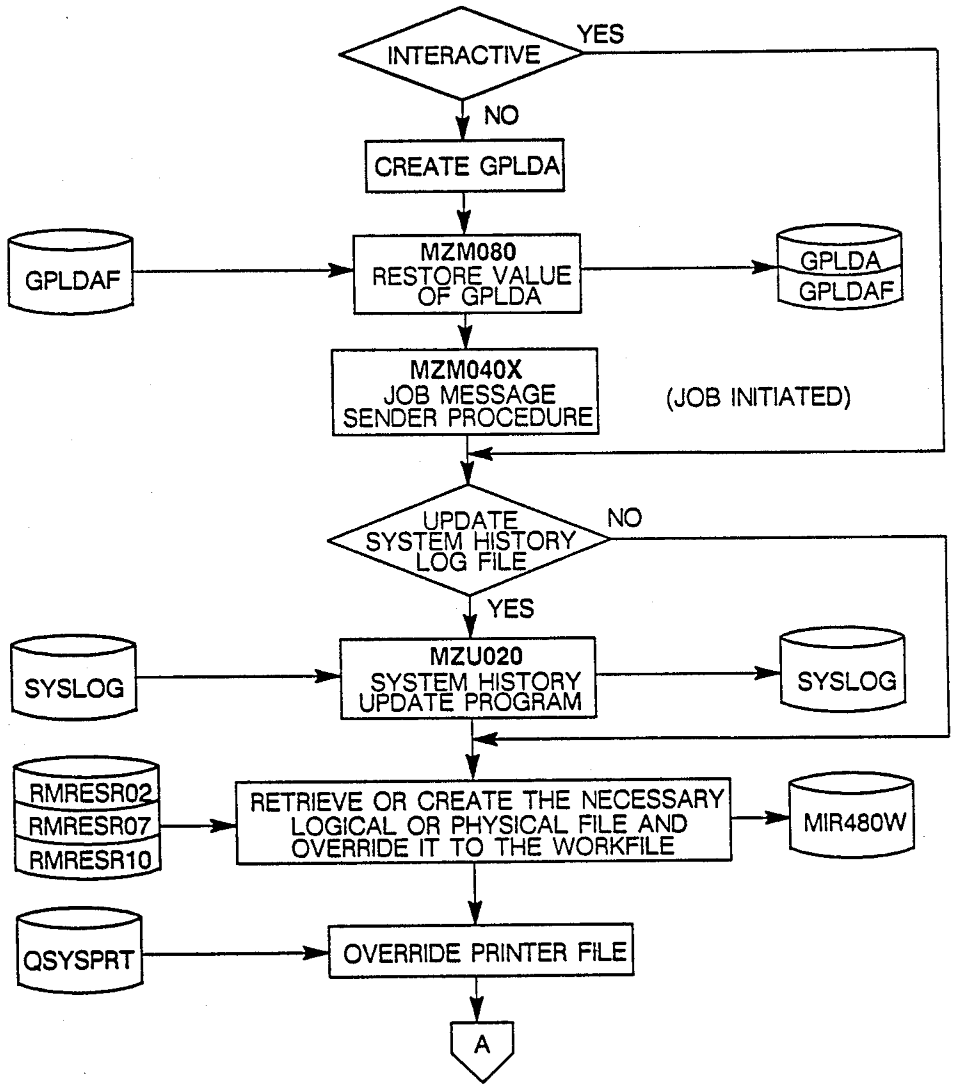
Figure 142:
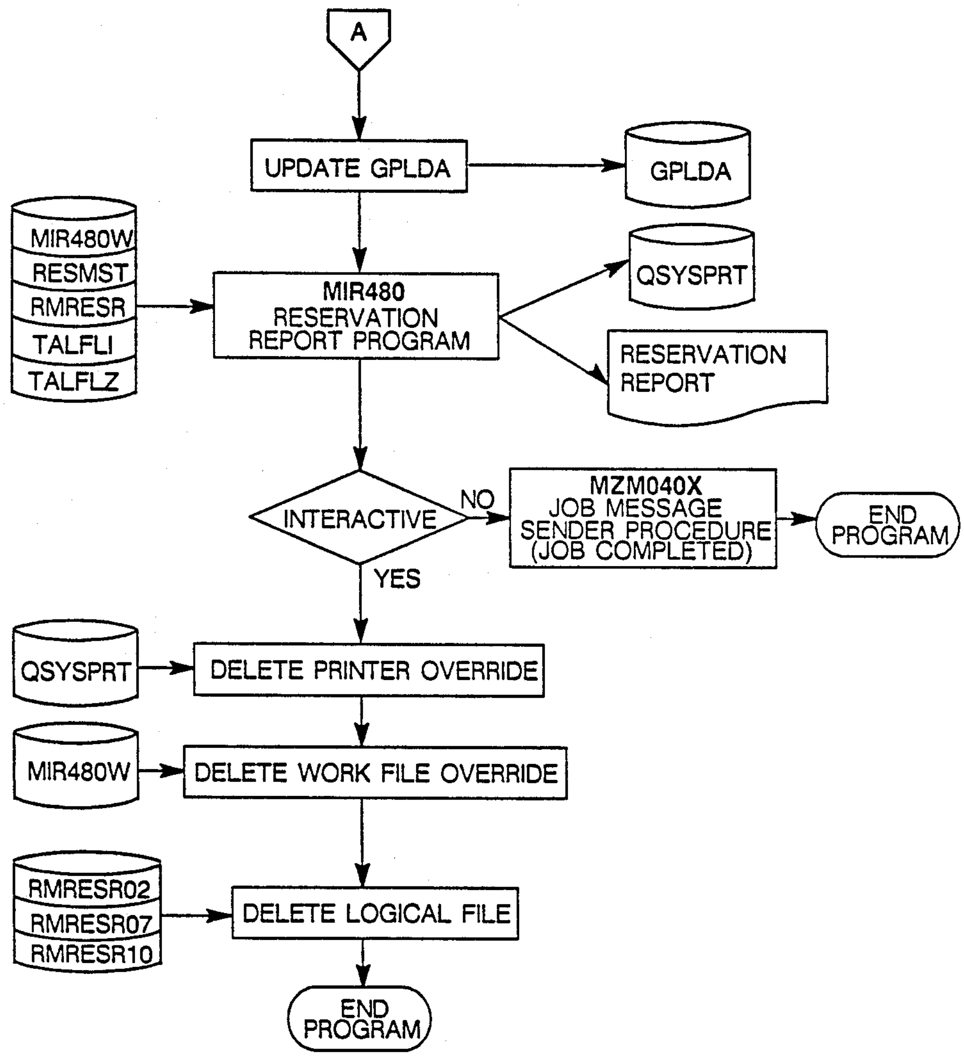
Figure 143:
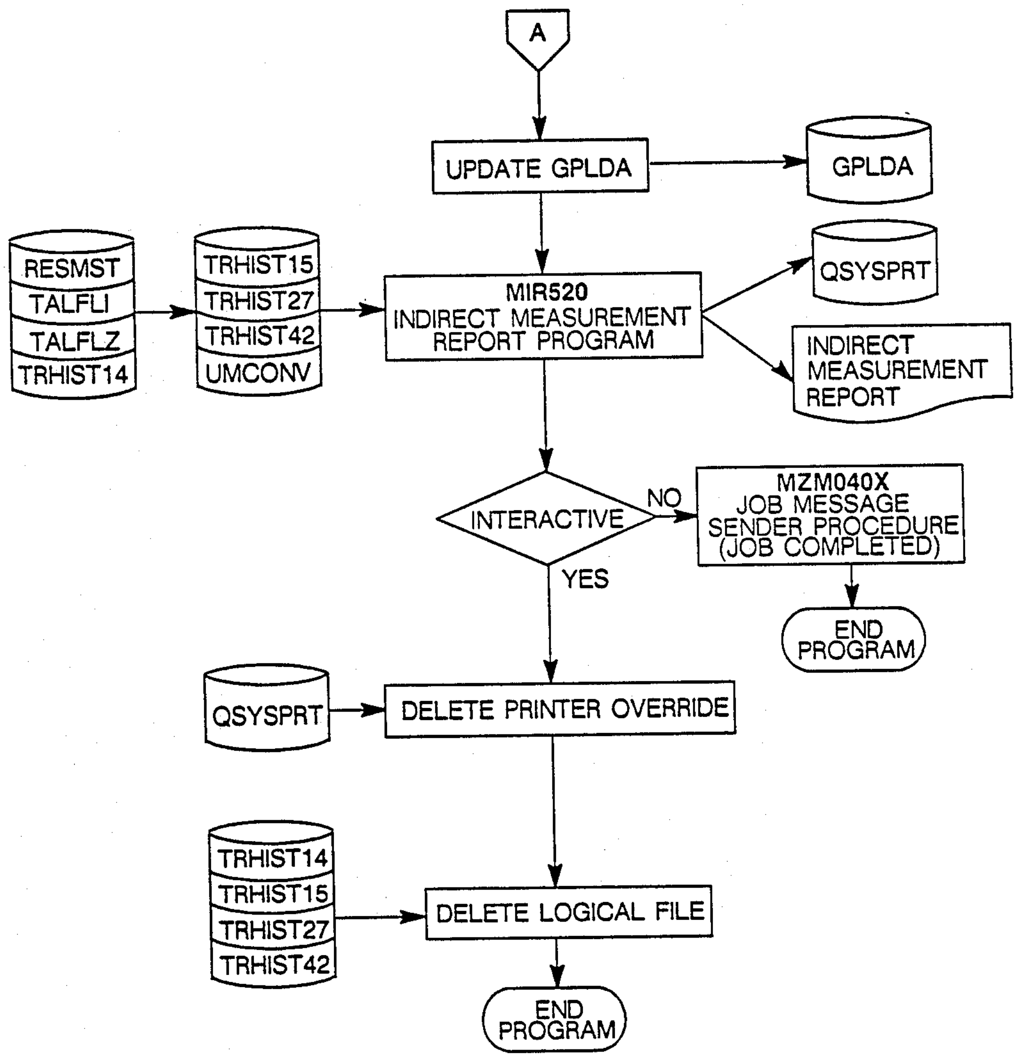
Figure 144A:
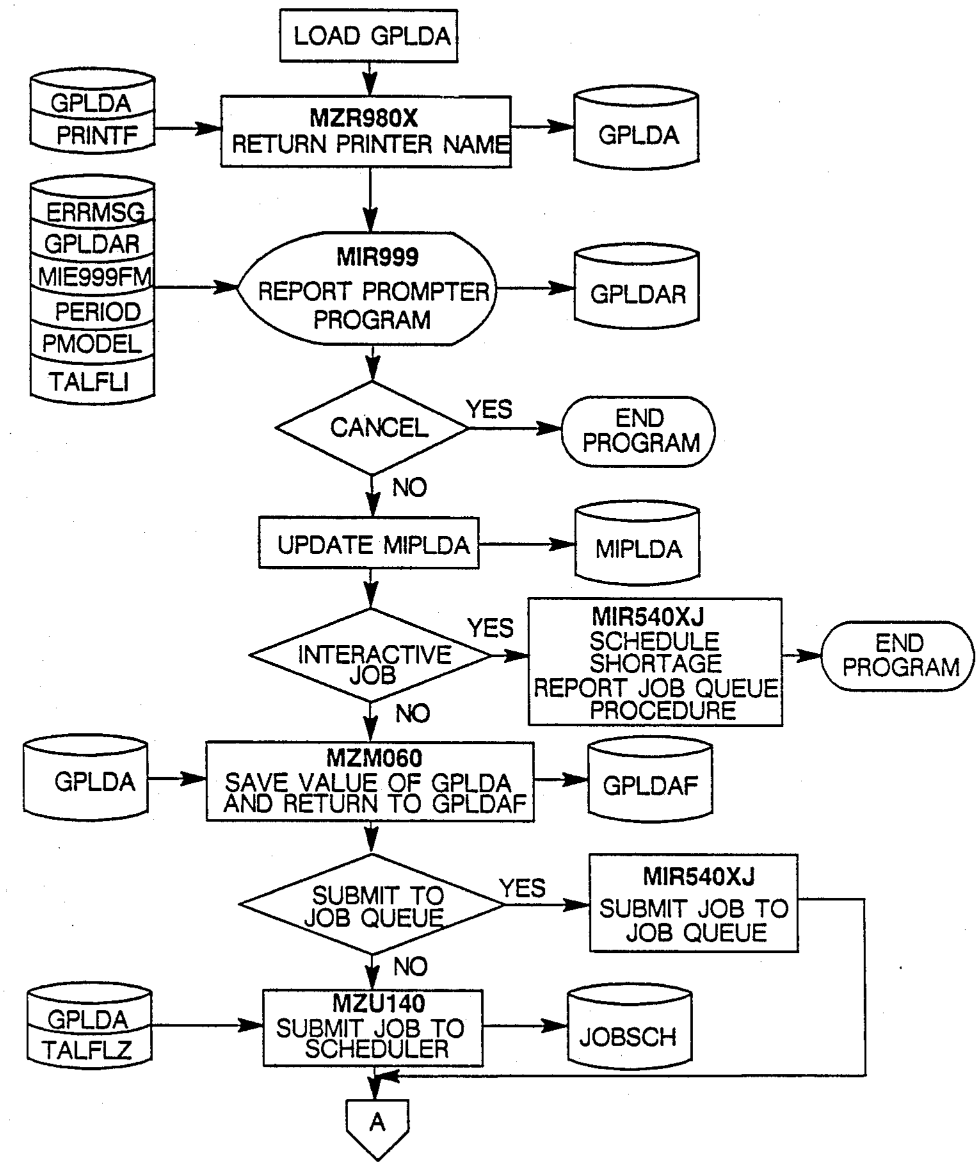
Figure 144B:
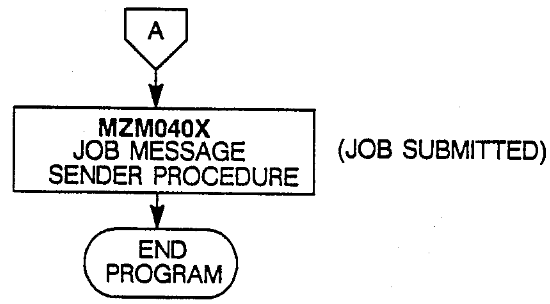
Figure 145:
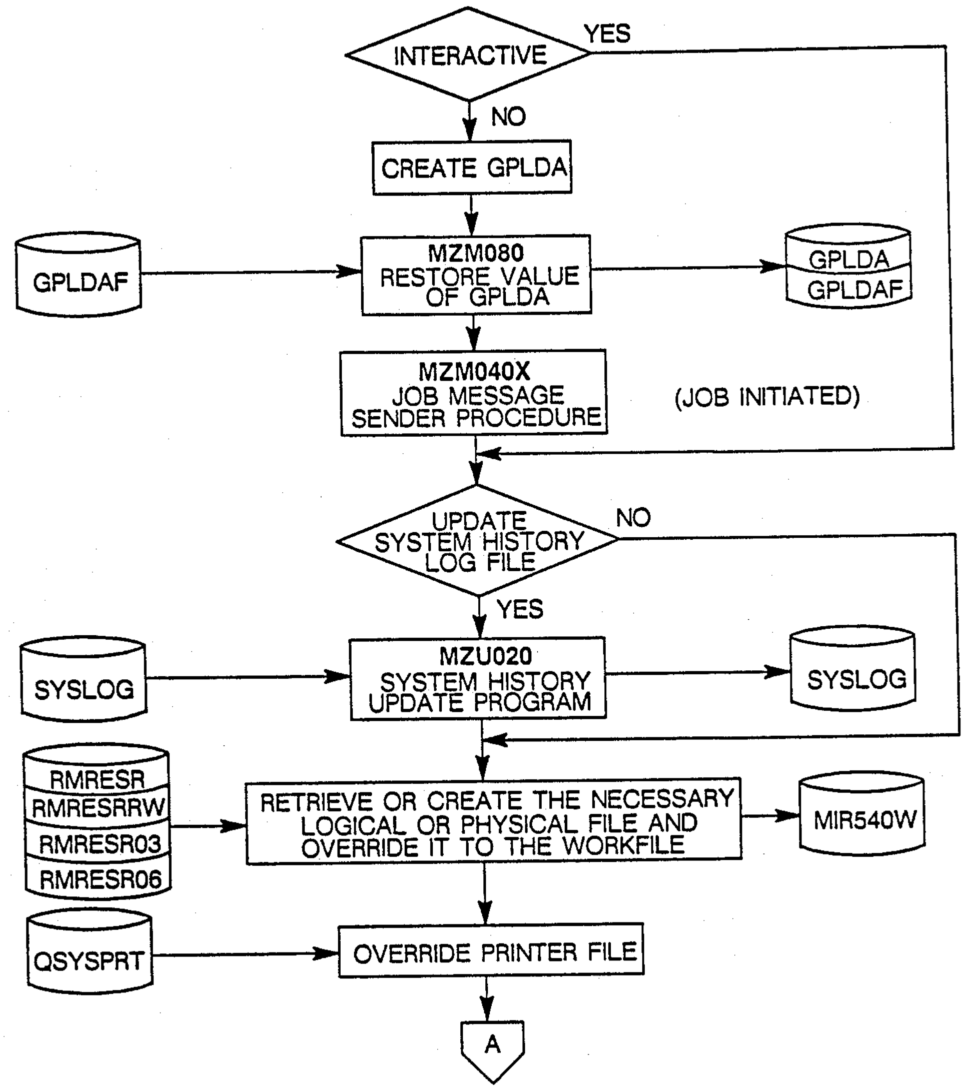
Figure 146:
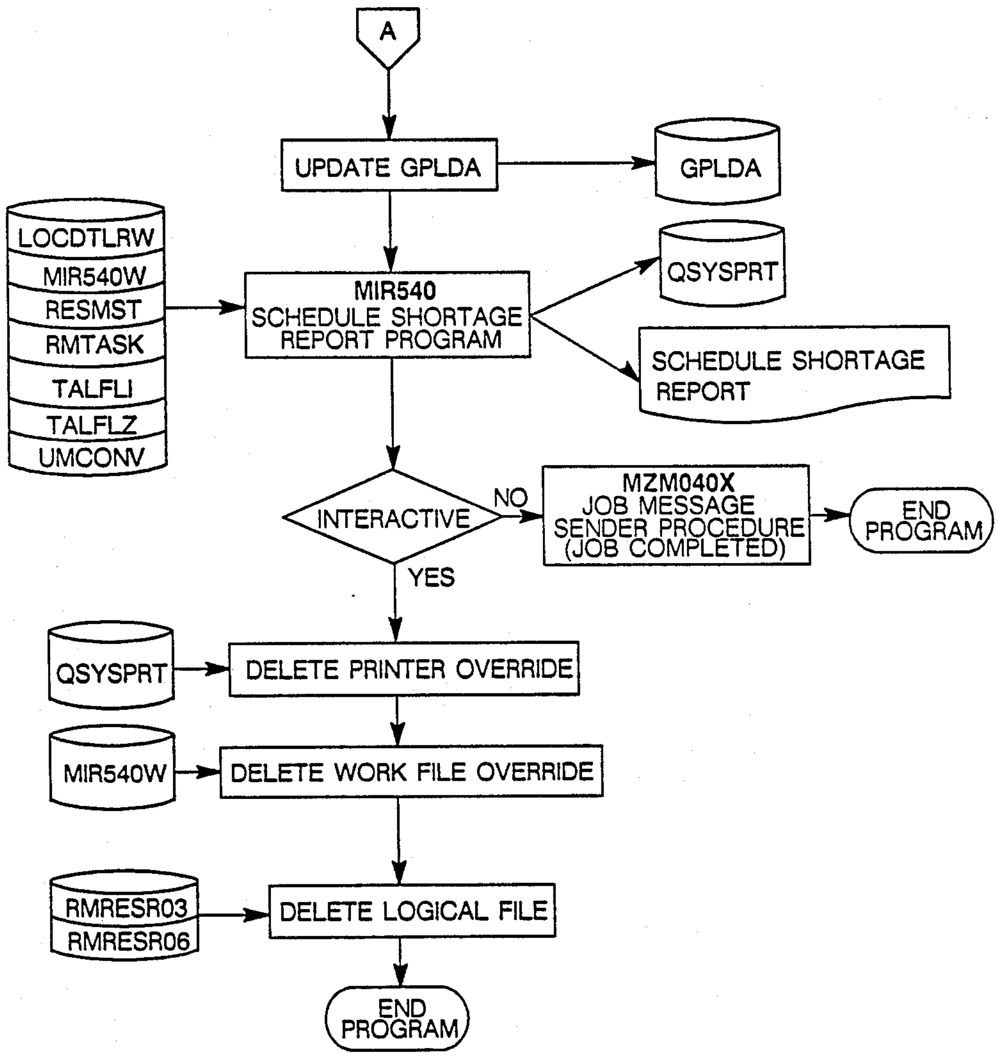
Figure 147A:
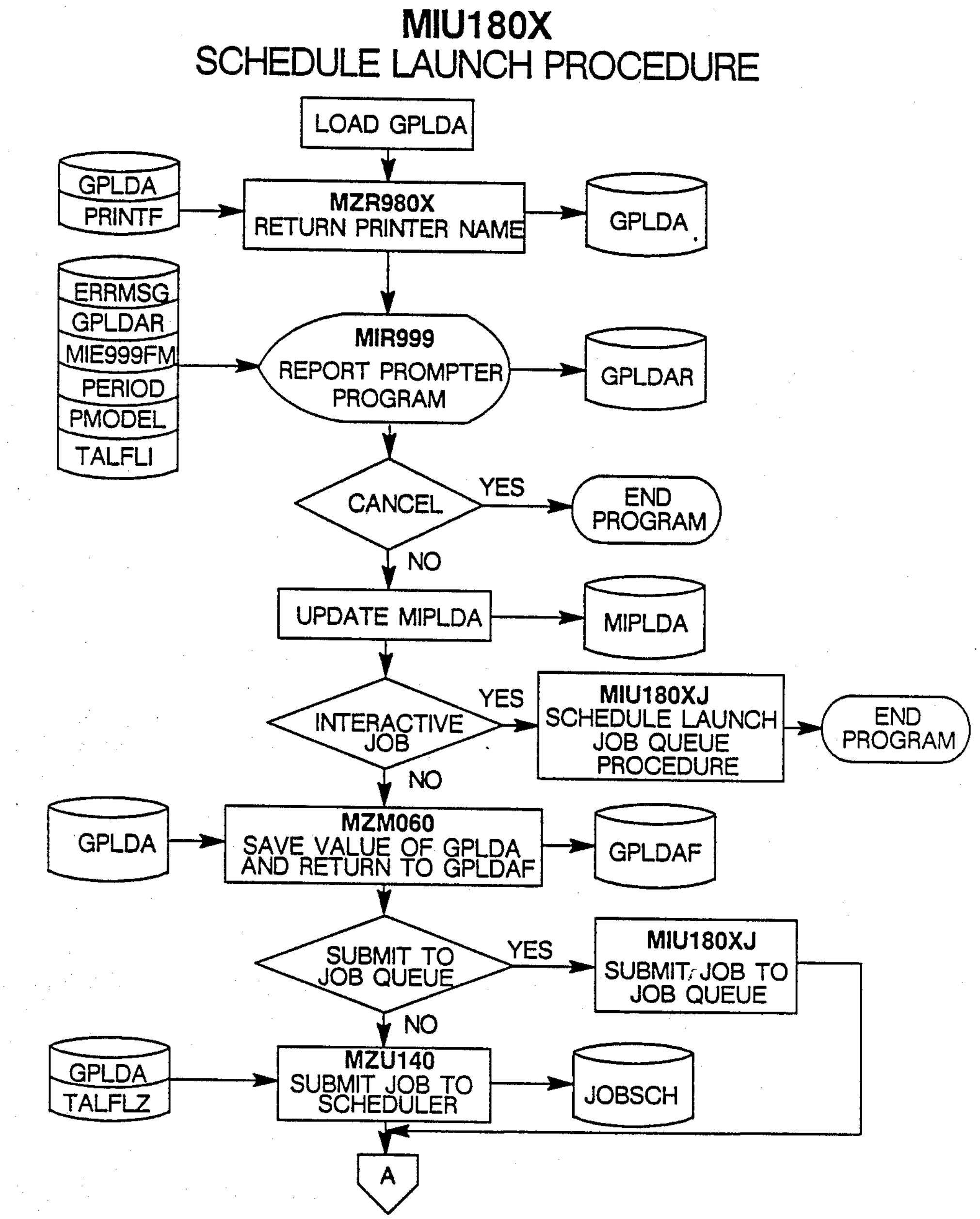
Figure 147B:
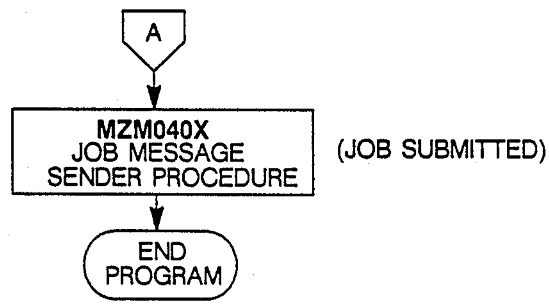
Figure 148:
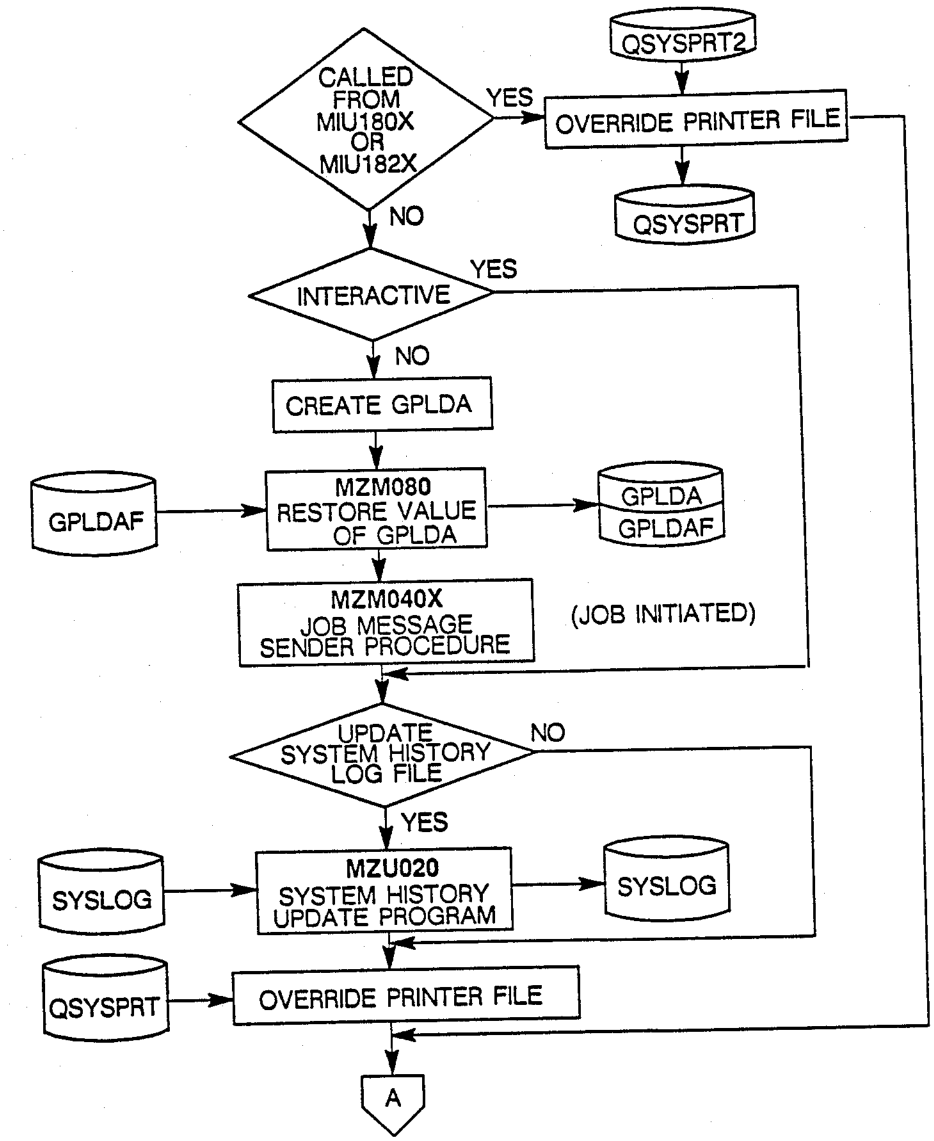
Figure 149:
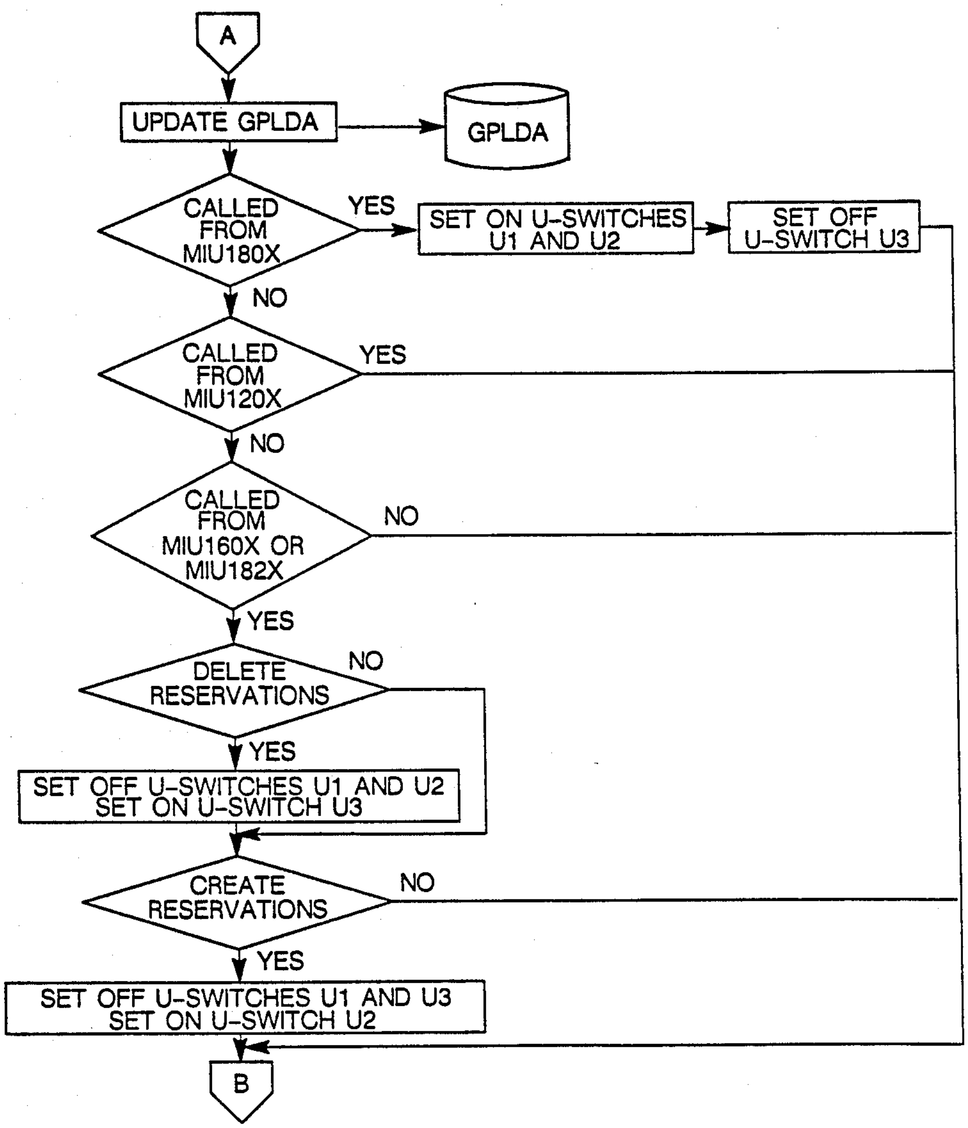
Figure 150:
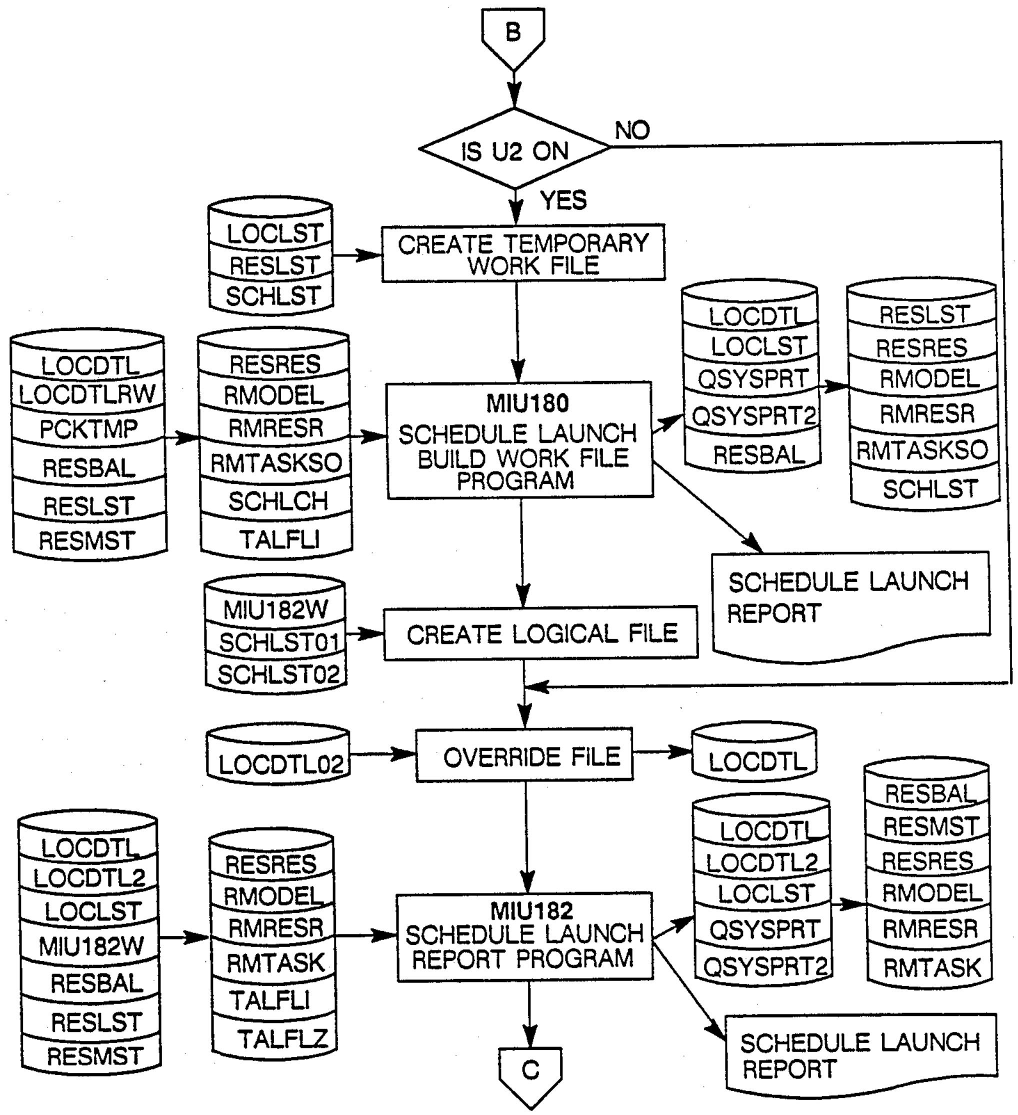
Figure 151:
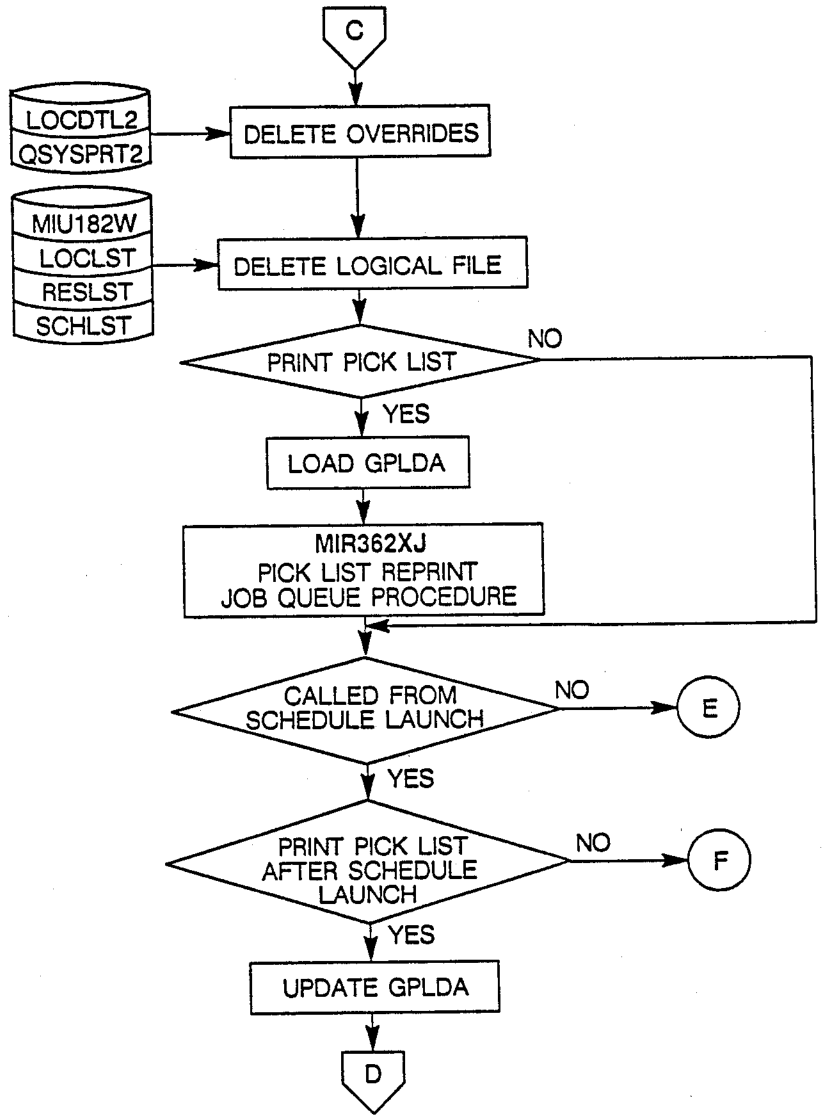
Figure 152:
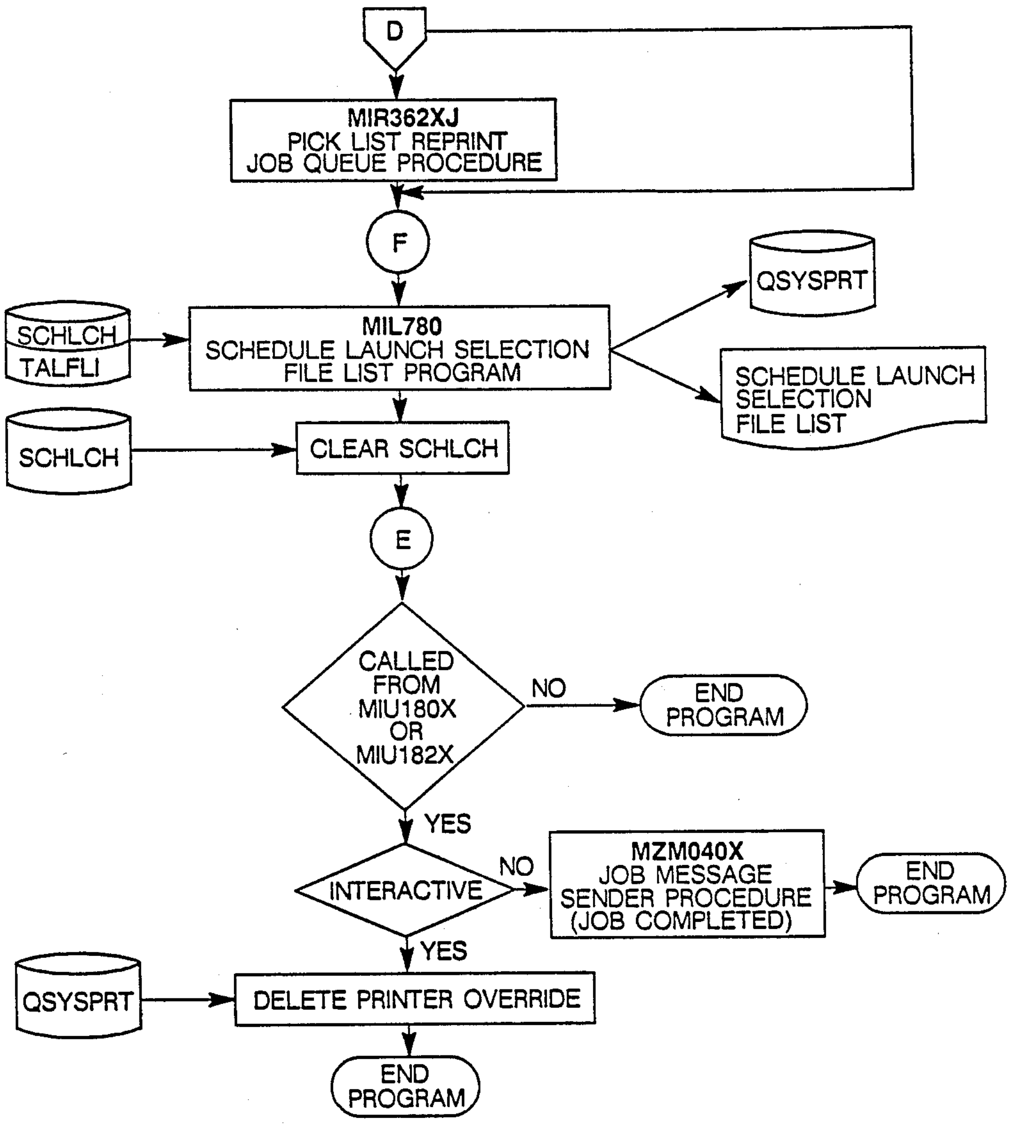
Figure 153A:
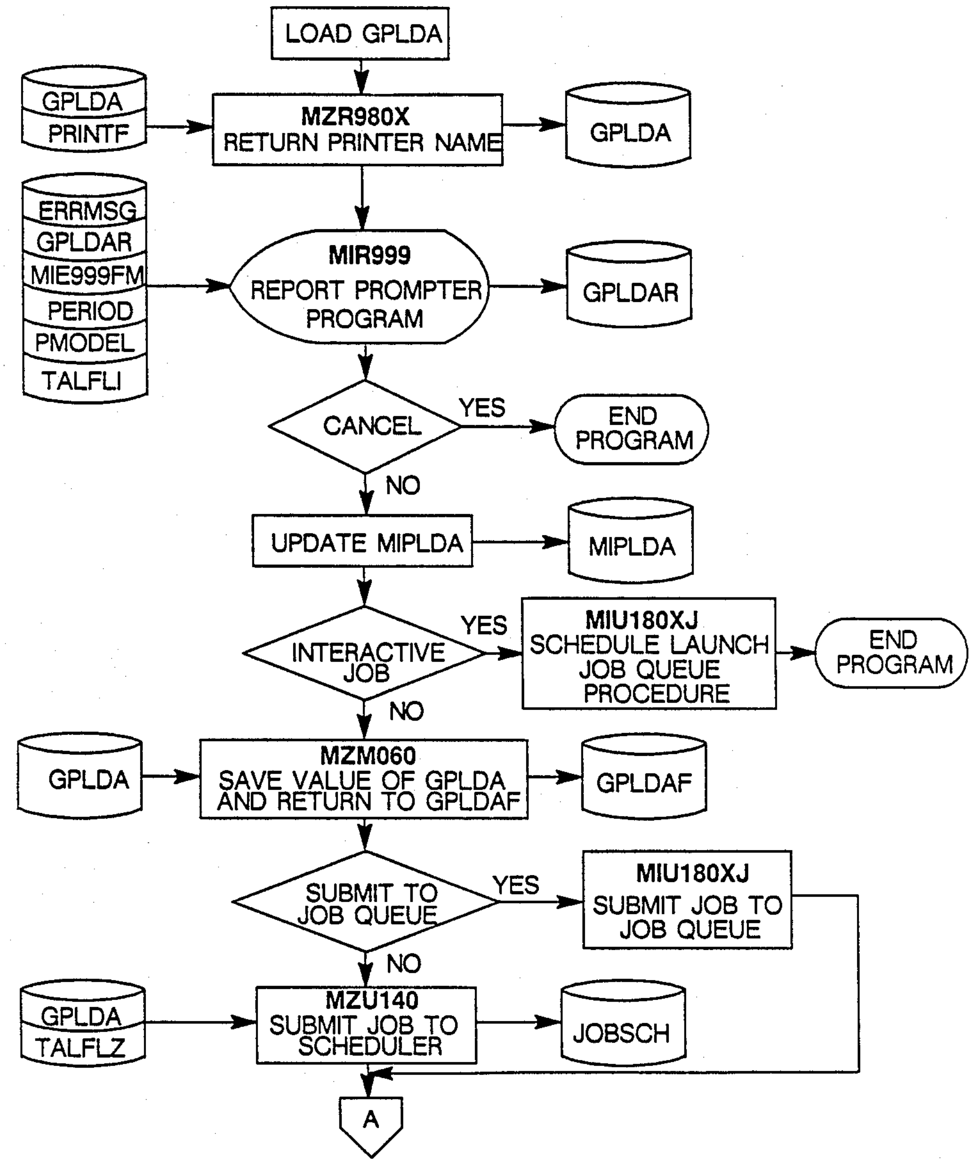
Figure 153B:
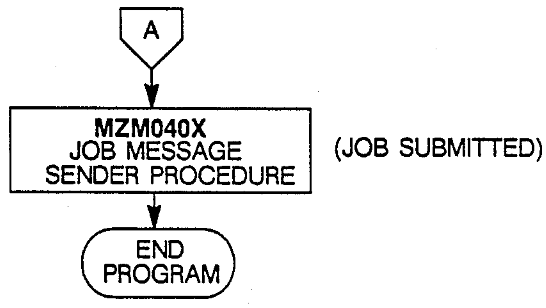
Figure 154:
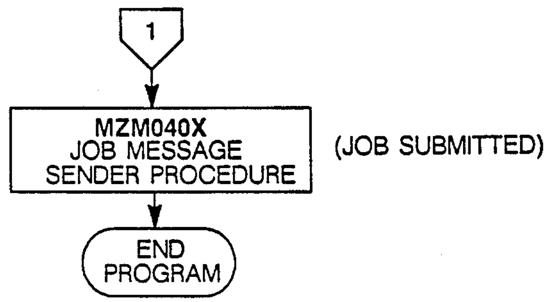
Figure 155:
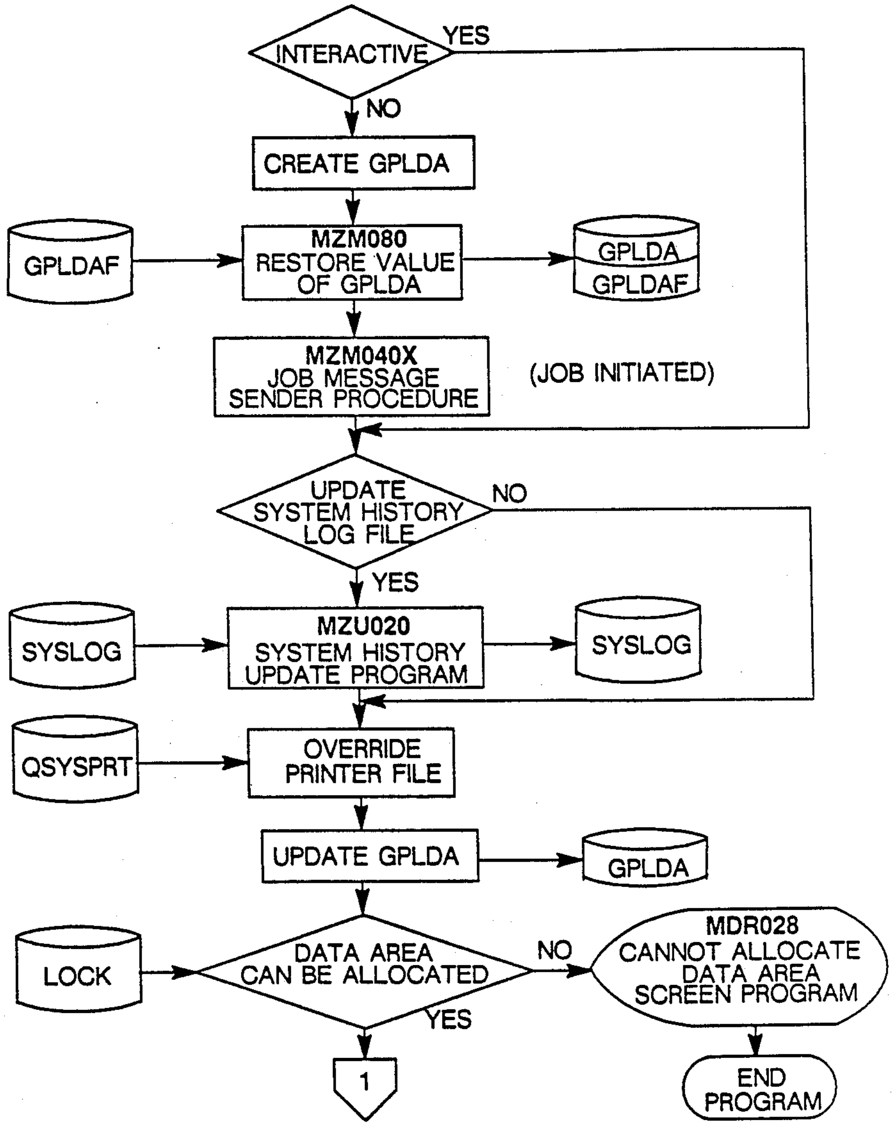
Figure 156:
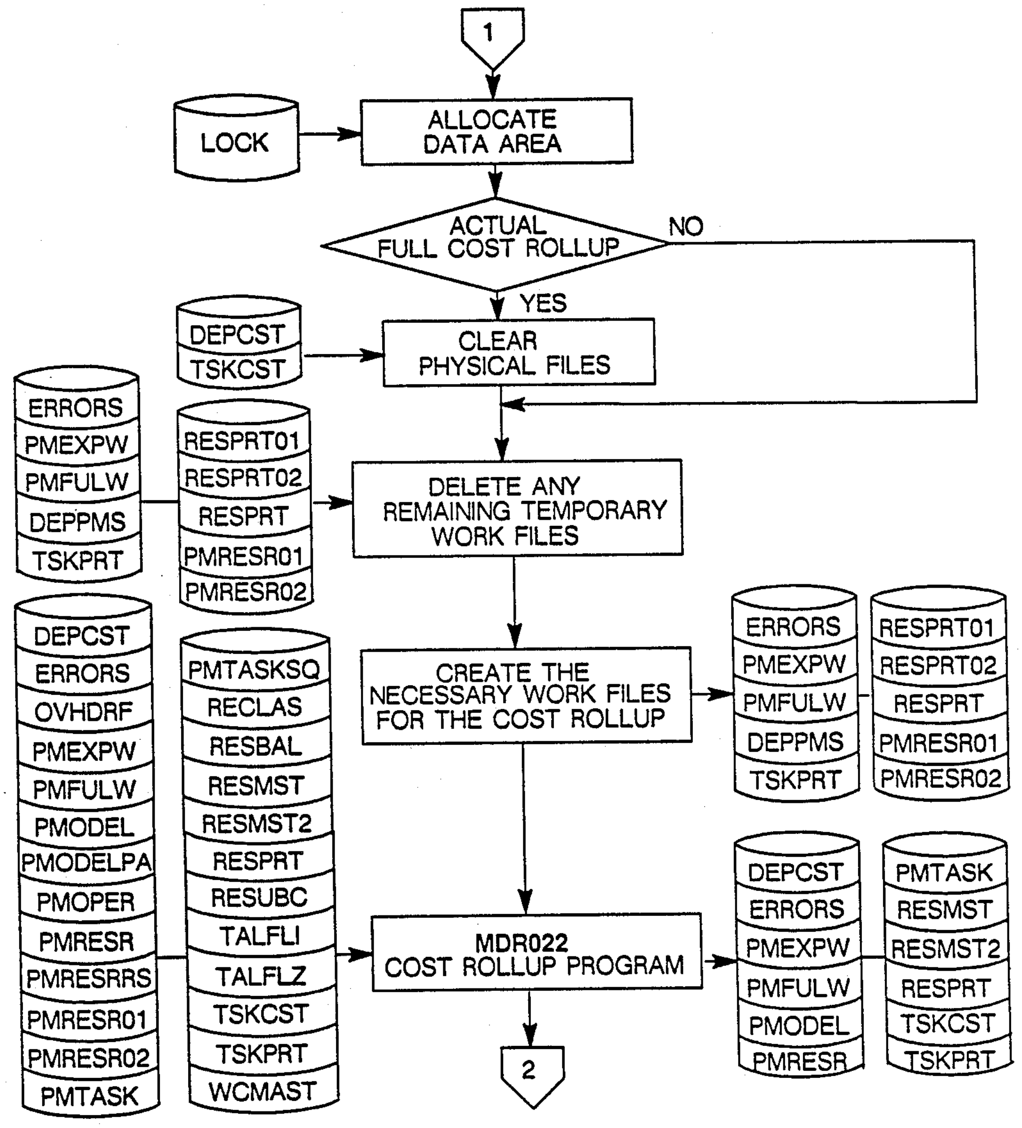
Figure 157:
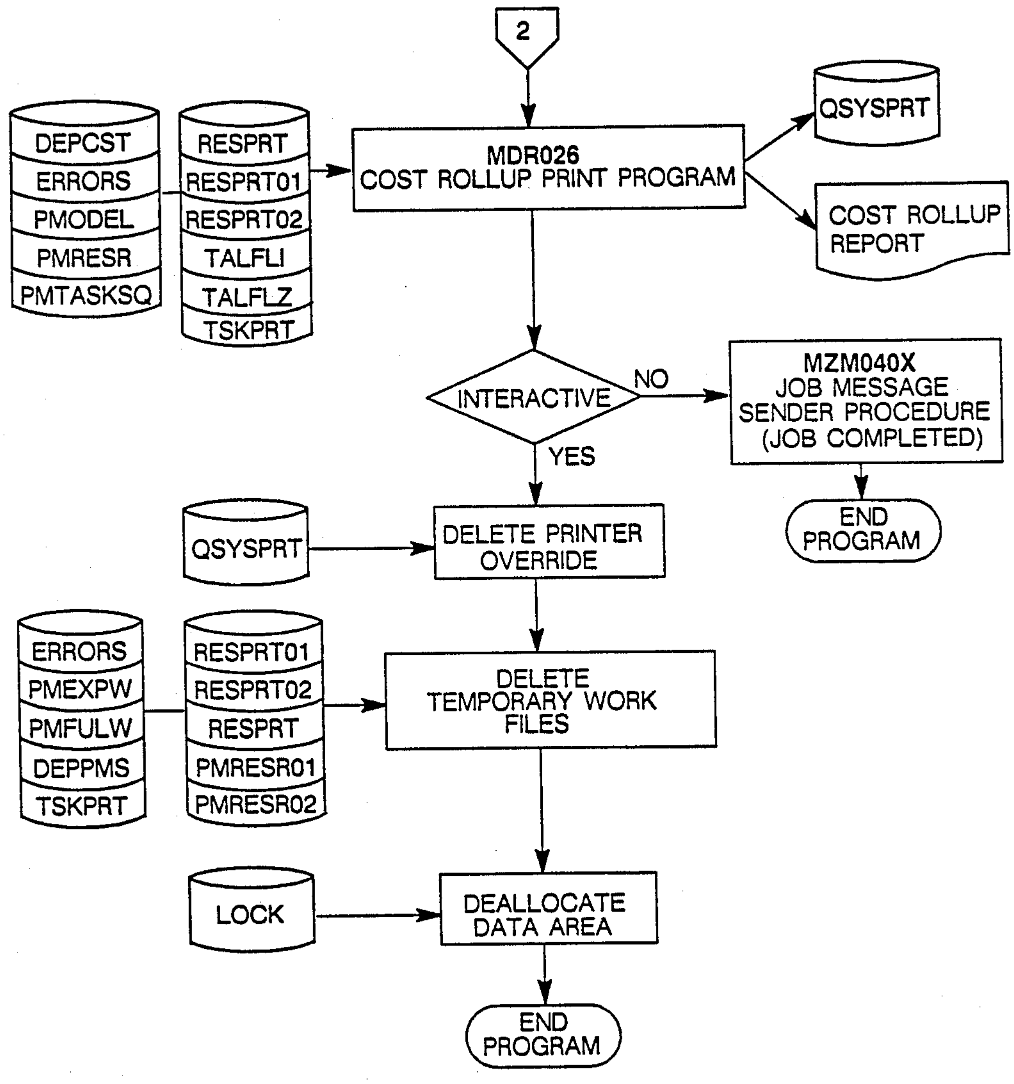
Figure 158:
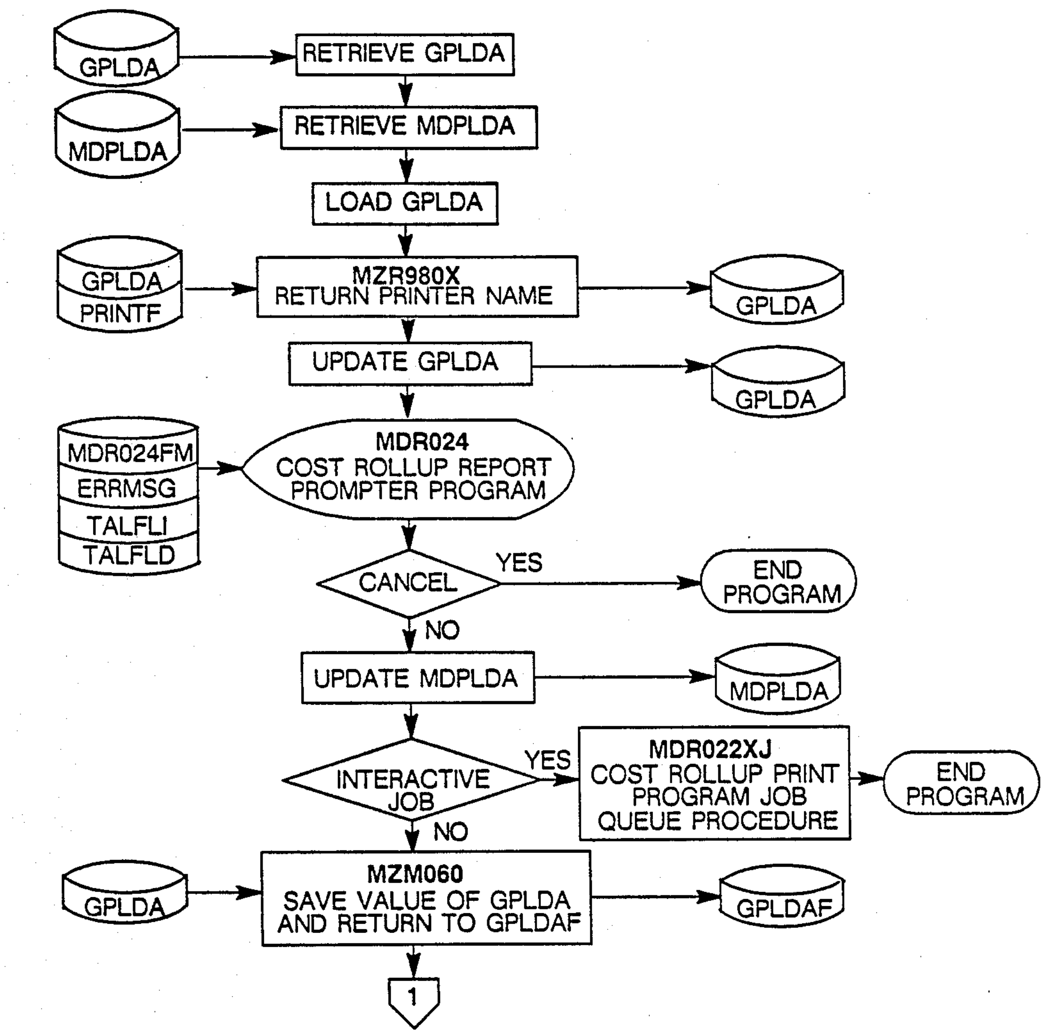
Figure 159:
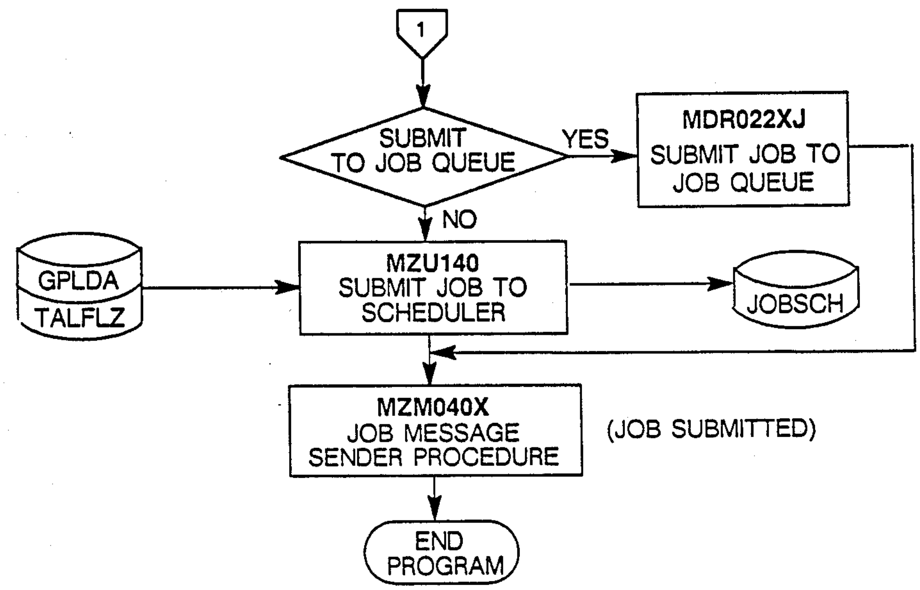
Figure 160:
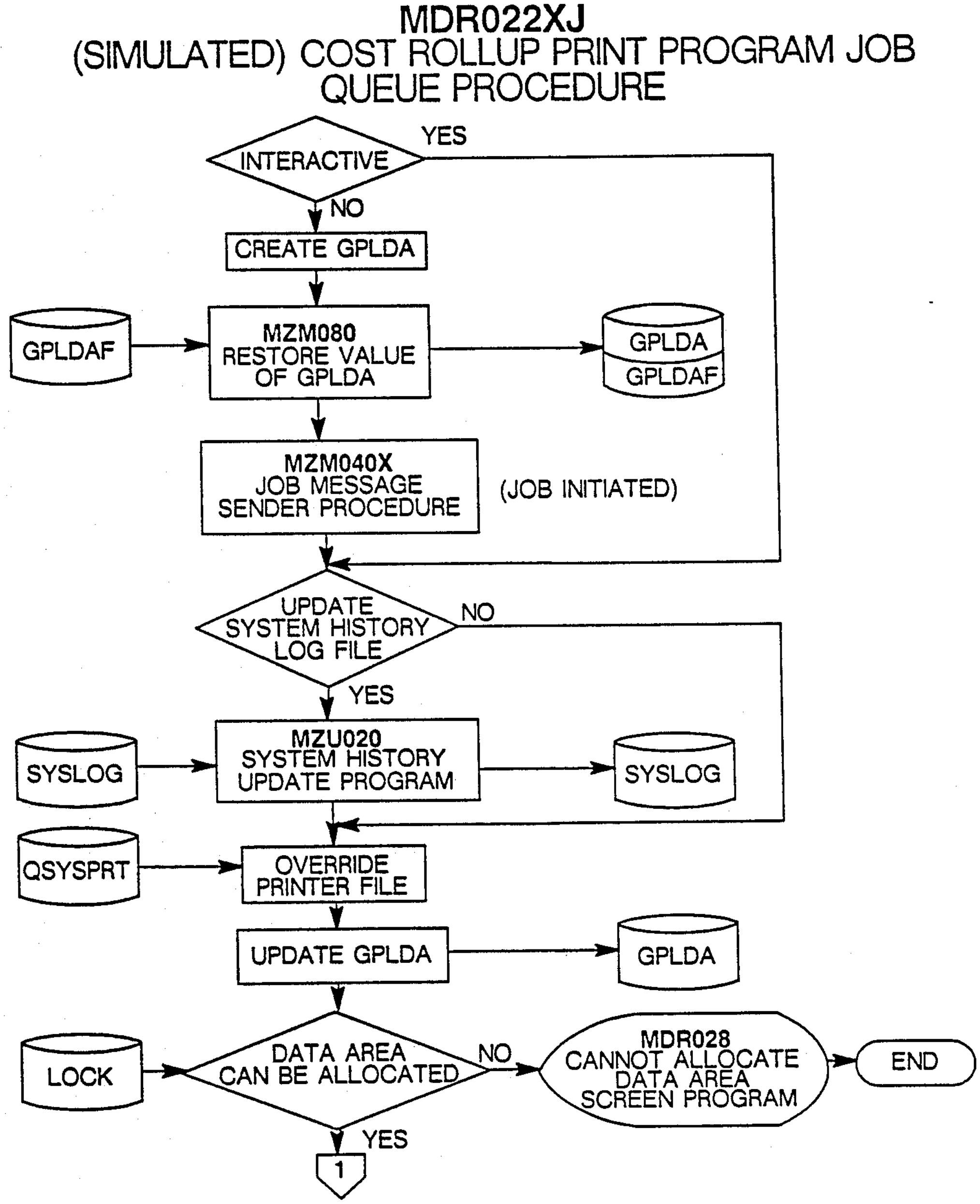
Figure 161:
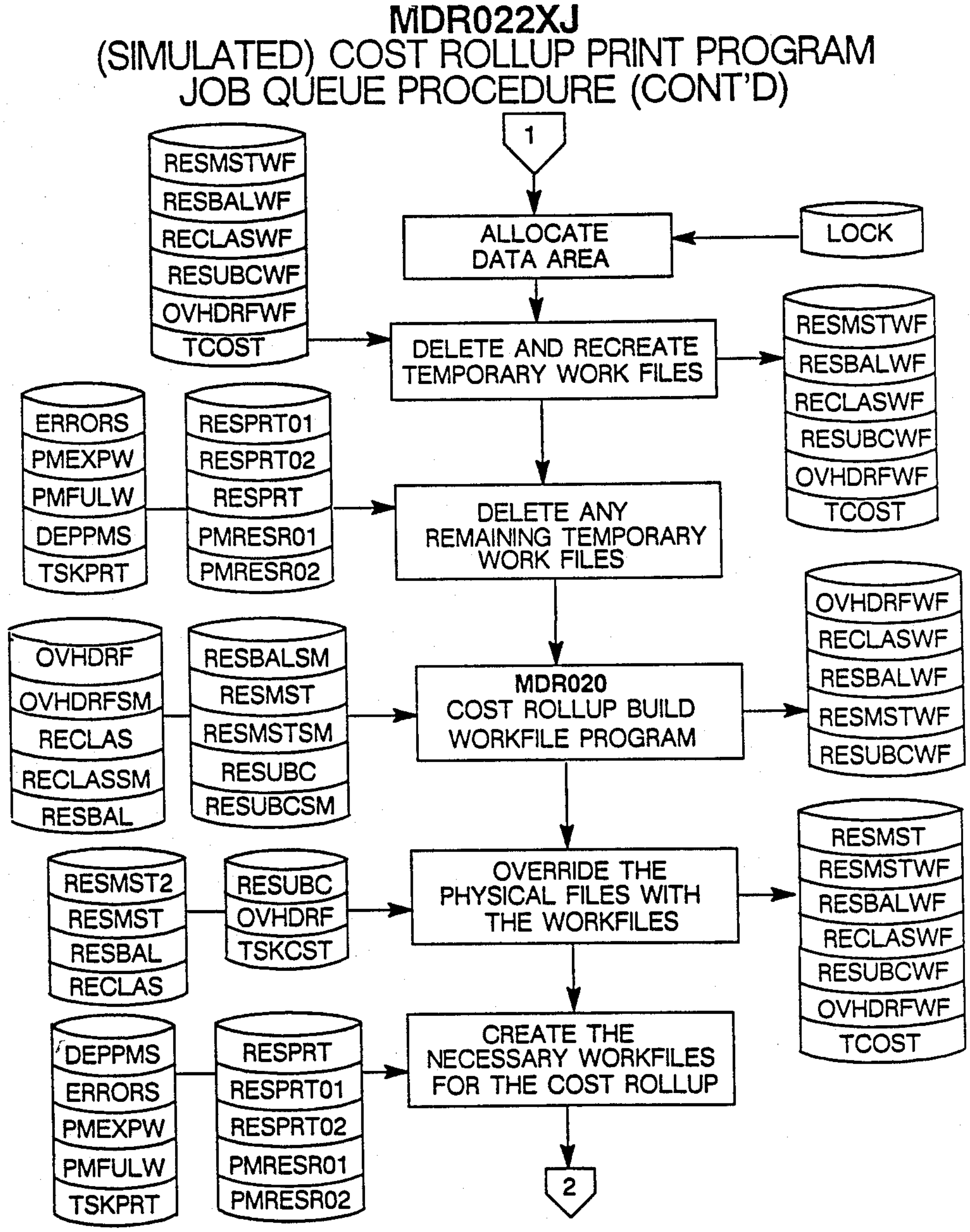
Figure 162:
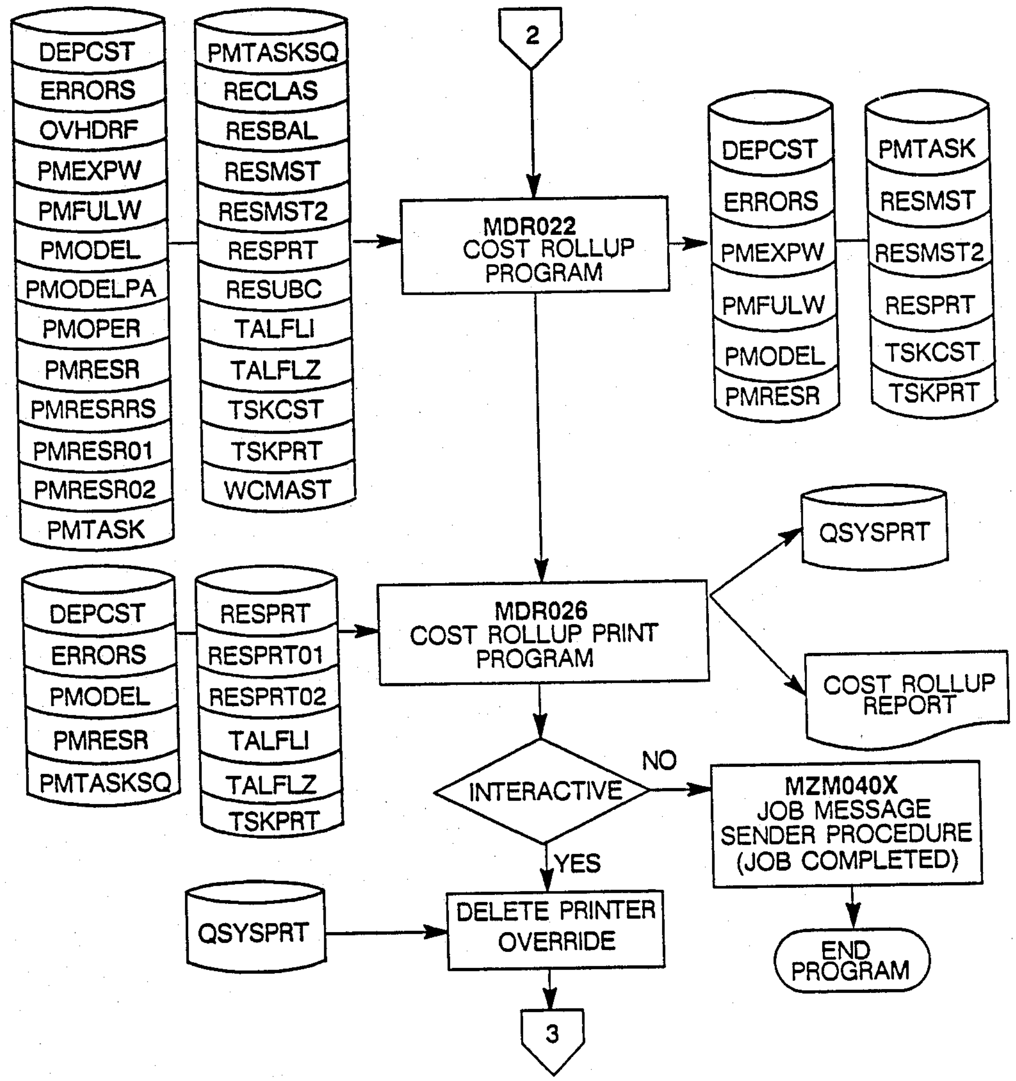
Figure 163:
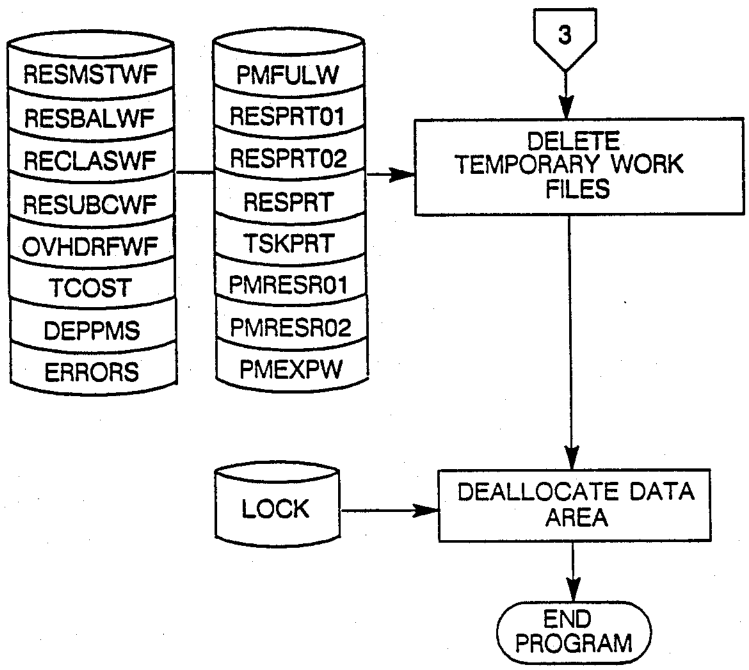
Figure 164:
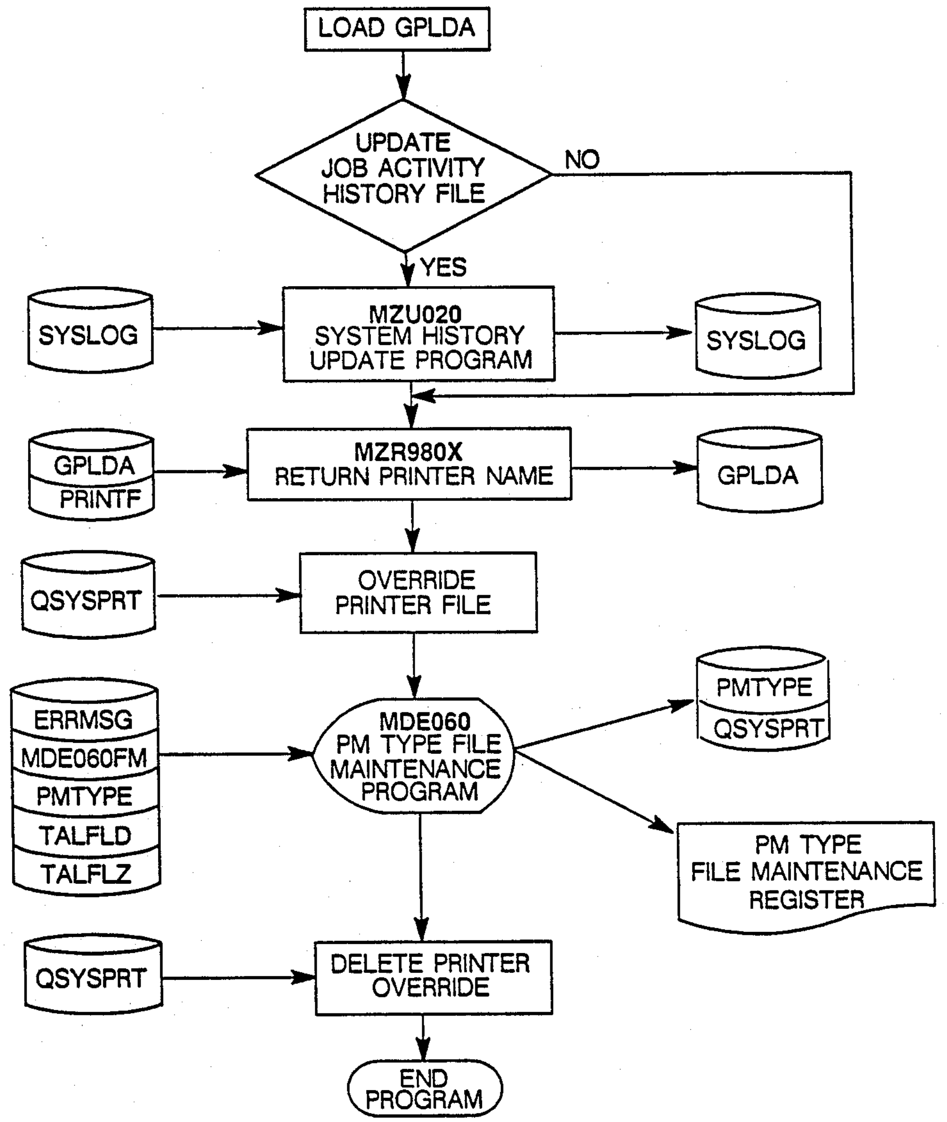
Figure 165:
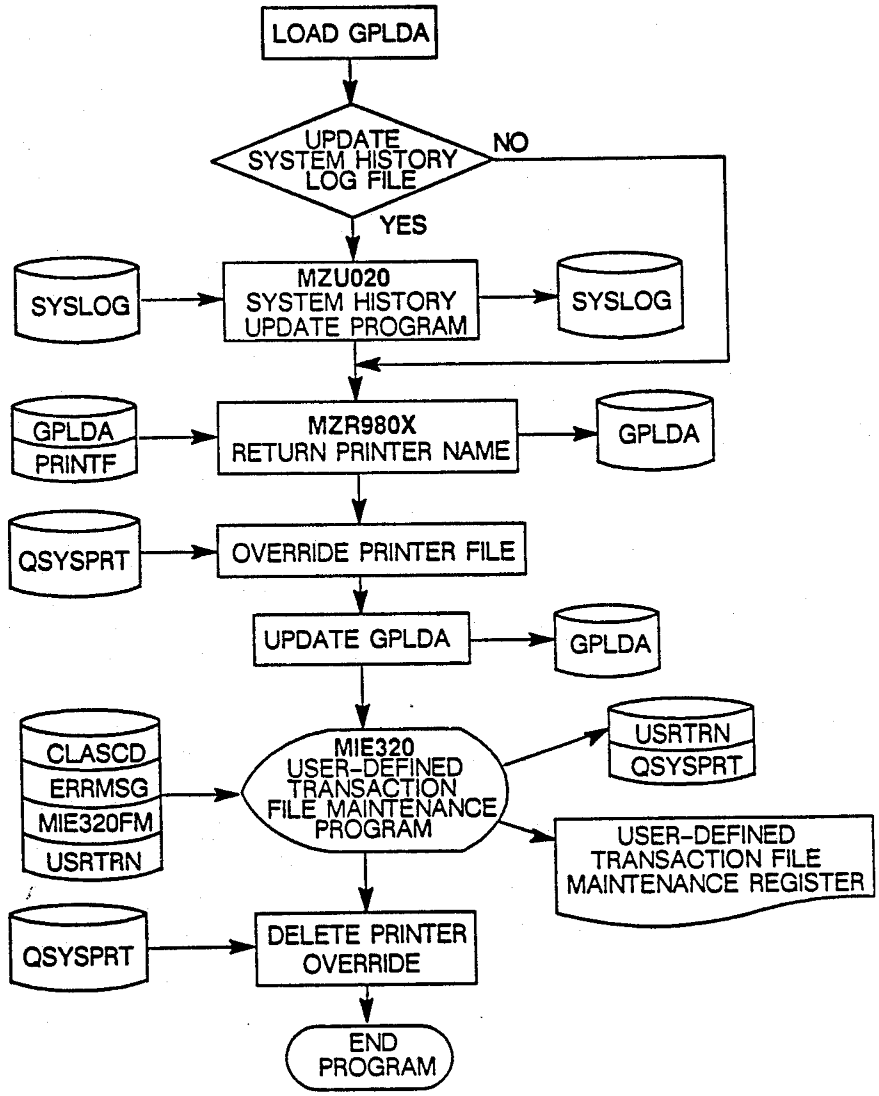

(See Figure 96)

This data screen is displayed when you press ENTER on the selection screen. Here, if the action code is A (add) or C (change), you can enter the attributes associated with this resource number. If the action code is D, all fields on this screen are for display only.

Fields for Display

Resource

Date Last Maint—date this resource was last updated. If you are adding a new resource, this is today's date.

Action—The word ADD, CHANGE, or DELETE is displayed here, depending on the action code.

Date ABC Code Last Updated—date the ABC Report (see Section 2-1) was last used to update the ABC code for this resource.

# of Times Resource is Used—used only if this is a potent resource (Potent Resource = Y: see Data Screen MIE18004) with a Potency Factor greater than zero. This is the number of tasks on production models that produce or consume this potent resource. The system updates this field when you run the Potent Resource Usage Counter (see Section 5-2 of the RP reference manual).

Fields for Entry

CLASS—resource class to which this resource belongs.This field is available for entry only when the action code is A (add). To change a resource class, you must use Option 6 from the Batch Update Menu (MI90).

SUB-CLASS—resource sub-class to which this resource belongs. This field is available for entry only when the Trade Secret Information of Marcam; All Rights Reserved.

action code is A (add). To change a resource sub-class, you must use Option 6 from the Batch Update Menu (MI90).

Description—Enter up to 30 characters of description for this resource.

STANDARD UNIT OF MEASURE—unit of measure for this resource. This field is available for entry only when the action code is A (add).

Earliest Acceptable Revision Level—Enter the lowest revision level of this resource still acceptable for use.

Current Revision Level—current revision level of this resource.

Service Level (%)—used in future PRISM modules. Default from Resource Sub-Class (RESUBC) file loaded.

Balance Resource Code (B/C)—Enter B if this is a "balance" resource, one for which you keep track of balances in locations. Enter C if this is a "count up" resource, one whose usage you track but for which you do not keep location balances. Labor, for example, might be a "count up" resource. Default from Resource Sub-Class (RESUBC) file loaded.

ABC Code—user-maintained or updated by the system. This code indicates which resources are most important. You define a percentage for each code (A, B, and C), adding up to 100, and assign a code to each resource. If the percentage for code A is 15, for example, then ABC code A should be assigned to the 15 percent of your resources that are most important (based on the method defined in tailoring question #G20). You can also have the system calculate the ABC code for each resource when the ABC Report is printed, and load the appropriate code for each resource into this file.

Shortage Flag (Y/N)—indicates whether there is a shortage of this resource. If you launch a schedule and the system cannot reserve the entire allocated quantity of the resource (there is an insufficient quantity of the resource in on hand location classifications in the warehouse), this field is changed from N to Y.

Periodically, you run the Reset Resource Shortage Flag program (see Section 9-5) to change this field back to N for resources that no longer have shortages. You can also change this field to Y or N manually.

Miscellaneous Field 1—Miscellaneous fields 1-3 are available for you to enter any resource information you need that is not covered by the existing fields in the Resource Master file. It is recommended that you determine a consistent meaning for each field: Miscellaneous Field 1 should not mean "department number" for resource 200 and "sales rep name" for resource 202.

Miscellaneous Field 2—see MISCELLANEOUS FIELD 1.

Miscellaneous Field 3—see MISCELLANEOUS FIELD 1.

Amounts or percentages for variable and fixed overhead are added to the cost of a resource to account for the overhead cost accumulated when using that resource. The following eight fields allow you to determine how these overhead figures are calculated for this resource.

If you allow the answers for all four variable overhead fields to default from the Resource Sub-Class (RESUBC)

file, those defaults are used but are not loaded into the Resource Master file. If you override one or more defaults, all four fields are loaded into the file. A similar rule is followed for the four fixed overhead fields. For more information about the PRISM defaulting system, see *RM Concepts*, Section B.

Variable Overhead Table/Rate (T/R)—Enter T if the variable overhead rate for this resource is to be taken from a table. In this case, you must enter a valid table value from the Overhead Rate (OVRHDF) file in the Variable Overhead Table Value field. Enter R if the overhead rate is specified here. In this case, you must enter a Variable Overhead Rate and Code.

Variable Overhead Table Value—Enter the table value to be used, if the Table/Rate field is T. Each valid table value defined in the Overhead Rate file is associated with a rate and an overhead code.

Variable Overhead Rate—Enter the variable overhead rate, if the Table/Rate field is R. The Variable Overhead Code determines whether this is a percentage (P) of the cost of the resource, or a dollar amount (D).

Variable Overhead Code (P/D)—Enter P if the Variable Overhead Rate is a percentage of the cost of the resource. Enter D if it is a dollar amount. If this field is P, the Variable Overhead Rate cannot be zero.

Fixed Overhead Table/Rate (T/R)—Enter T if the fixed overhead rate for this resource is to be taken from a table. In this case, you must enter a valid table value from the Overhead Rate (OVRHDF) file in the Fixed Overhead Table Value field. Enter R if the overhead rate is specified in this record. In this case, you must enter a Fixed Overhead Rate and Code.

Fixed Overhead Table Value—Enter the table value to be used, if the Table/Rate field is T. Each valid table value defined in the Overhead Rate file is associated with a rate and an overhead code.

Fixed Overhead Rate—Enter the fixed overhead rate, if the Table/Rate field is R. The Fixed Overhead Code determines whether this is a percentage (P) of the cost of the resource, or a dollar amount (D).

Fixed Overhead Code (P/D)—Enter P if the Fixed Overhead Rate is a percentage of the cost of the resource. Enter D if it is a dollar amount. If this field is P, the Fixed Overhead Rate cannot be zero.

Cumulative LT of Prime Costing PM—total lead time for the prime costing PM for this resource (see PRIME COSTING PM—TYPE/NAME, below). For more information, see *Cost Rollup*, Sections 2-2 and 2-3 of the RP reference manual.

Theoretical Cons Code (D/C/T)—default theoretical consumption code for this resource. Enter the letter corresponding to the method of consuming this resource. This field must be D if (1) tailoring question #G17 is N or (2) Batch Consumption Code for this resource is Y (see below). The first combination of entries causes a hard halt (severity code 0) message: the second displays a message that is either overrideable (severity code 1) or a hard halt. Default from Resource Sub-Class (RESUBC) file loaded. You have three options:

D = DIRECT. Use this code with resources you want to track most carefully, because it encourages precise tracking of the use of the resource. This means that a direct issue (DI) transaction must be entered to issue this resource to a particular task on a schedule release. A quantity issued in this way and then not used can be returned to the warehouse using an RS (return to stock) transaction.

C = CALCULATED COST. Use this code with balance resources you want "almost" theoretically consumed. The sequence of events for using such resources in production is as follows:

(1) Issue a quantity of the resource to the shop floor or production line using an IP (issue to production) transaction. This tells the system that this quantity has been taken out of inventory and to the shop floor, but does not indicate what task on what schedule release will actually use the resource.

This transaction causes the system to reduce the quantity of this resource in this warehouse (this information is in the Resource Balance (RESBAL) file), and to reduce the quantity of this resource at each location (information in the Location Detail (LOCDTL) file) from which it was picked.

(2) When you enter a PR (production receipt) transaction for a resource produced by the production model, you do not have to tell the system how much of this resource you used in this run of the PM. The system uses the quantity received from production to calculate how much of the consumed resource you must have used. It then automatically generates a CC (calculated cost) transaction for that quantity of the resource.

NOTE: The CC transaction alone does not reduce the system's estimate of the quantity of a resource in a warehouse or at a location (see step 1, above). This is accomplished by the IP transaction, so it is very important that this step not be omitted for a resource with a Theoretical Consumption Code of C.

T = THEORETICAL CONSUMPTION. Use this code for resources (balance or non-balance) you want theoretically consumed. These could be resources too numerous and inexpensive to count, such as lids for 32-ounce jars, or non-balance resources that cannot be physically taken from inventory to the shop floor, such as labor.

For example, you may want electricity theoretically consumed, if the amount of electricity available to you is unlimited. In that case, you have no balance of the resource on hand, but you do want to track what you use because it does add to the cost of production.

When a PR transaction is entered, the system calculates the quantity of this resource used based on the quantity of the end resource produced. Suppose the PM produces 100 pounds of tomato paste per batch and uses 1 KwH of electricity per 100 pounds of paste (electricity has a theoretical consumption code of T). When you enter a PR transaction for 300 pounds of tomato paste, the system automatically generates a TC (theoretical consumption) transaction for 3 KwH of electricity.

Batch Consumption (Y/N)—Y if the resource can be used in full batch quantities only, N if partial batches are allowed. If this field is Y, Theoretical Consumption Code (see above) must be D. Default from Resource Sub-Class (RESUBC) file loaded.

This concept is best illustrated by an example. Suppose your production model requires that a cook stand by the kettle as 20 gallons of sauce simmers for one hour. Your planning activities indicate that you need 30 gallons of sauce, so you plan to run 1-1/2 batches. However, you still need an hour of the cook's time to watch it simmer, even when you are running only half a batch.

A Y in this field prevents the system from calculating partial batch quantities for the resource; it rounds up the quantity instead. In this case, 1-1/2 batches is rounded up to two batches, and the system calculates that you need two hours of the cook's time rather than 1-1/2 hours. Place an N in this field if this resource can have partial batch quantities.

Prime Planning PM—Type—PM type for the production model to be used when planning production of this resource. This field and the Prime Planning PM Name field also identify the default PM to be used when superflushing this resource (see *RM Concepts*, Section B).

Prime Planning PM Name—production model to be used when planning production of this resource.

Prime Costing PM—Type—PM type for the production model used by the Cost Rollup program in Resource Processor (see Sections 2-2 and 2-3 of the RP reference manual) to calculate the cost of producing this resource.

Prime Costing PM—Name—production model used by the Cost Rollup program in Resource Processor (see Sections 2-2 and 2-3 of the RP reference manual) to calculate the cost of producing this resource.

Selling Price—selling price for this resource.

Recost (Y/N)—If this field is Y, the rolled-up cost of this resource will be recalculated the next time the Cost Rollup program is run in RP. The system automatically changes this field to Y if you change any cost information (see Data Screen MIE18005) except Net Realizable Value. The system then changes this field back to N when the Cost Rollup program recalculates the cost of this resource. You can also change this field to Y or N manually.

Command Function Keys

ENTER—Press ENTER to proceed to Data Screen MIE18003.

CK15 NOTEBOOK FILE MAINTENANCE—available only if the action code is A (add) or C (change). Select CK15 to display Notebook File Maintenance data screen MZE08002, to enter values for any extra fields defined for the Resource Master file. To learn how to use the Notebook (NOTES) file, see Sections 1-5, *Notebook File Maintenance*, and 1-6, *Notebook File Prompt Maintenance*, of the Foundation reference manual.

CK18 REFRESH SCREEN—Select CK18 to redisplay this screen with the values currently stored in the file. If you are adding a record, the default information is displayed where applicable. If you are changing a record, the old attributes of this resource are displayed. If the action code is D (delete), the same values are displayed.

CK19 RETURN WITHOUT UPDATE—If you decide not to add, change, or delete the information for this resource, press CK19. This returns you to the selection screen.

CK20 DELETE—If the action code is D, a message is displayed at the bottom of the screen, instructing you to press CK20 to delete the record. At this point, you have a choice:

(1) Press ENTER. This displays the next data screen.

(2) Press CK20. This removes this record from the file and returns you to the selection screen.

(3) Press CK19. This returns you to the selection screen without removing the record.

SECTION XVIII-III

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All resource sub-class records that were updated are printed on the Maintenance Register, which includes the Action (ADD, CHANGE or DELETE) and all entry and display-only fields.

MIE180

Resource Master File Maintenance

A. The Resource Master File Maintenance program allows the user to enter and maintain information in the Resource Master (RESMST) file. This file contains one record for every non-balance resource (e.g., electricity) as well as a record for every balance resource on the system.

Screens

MIE18001—Selection Screen
MIE18002—Data Screen #1
MIE18003—Data Screen #2
MIE18004—Data Screen #3
MIE18005—Data Screen #4 (Cost fields)
MIE18006—Session Status Screen

Selection Screen—MIE18001

From the Selection Screen, the user can take CK11 to call the Alpha Search Inquiry program (MII180) for a list of resource numbers and their corresponding descriptions before keying in a particular resource number.

The user may add, change, or delete records. A delete is performed only if the resource number for the record to be deleted does not exist in Resource Balance (RESBAL), Production Model Resource (PMRESR), or Schedule Resource (RMRESR) file.

An RM Tailoring question determines if RESBAL records are generated automatically for a given warehouse when a record is added to the RESMST file. If a RESBAL record is to be generated, the RM Tailoring (TALFLI) file is checked to find the warehouse numbers to be used. More than one RESBAL record can be generated by this process, depending on the number of warehouses defined in TALFLI.

If the resource is a non-balance resource, a separate question in RM Tailoring is checked to determine whether RESBAL records are generated automatically for non-balance resources.

If the system is generating RESBAL records automatically, the following fields are loaded as indicated below:

Class and Sub-Class = RESMST fields.

Order Policy fields = RESMST fields.

Cycle Count Method = RM Tailoring default value.

All Quantity fields = zero.

All Cost fields = zero.

All Date fields (except Date Last Maintenance) = zero.

Date Last Maintenance = system date.

When any of the fields in RESMST are changed, the Re-Plan Flag is set to Y.

If the user maintains the Selected Unit Cost or any cost information except the Net Realizable Value, Cost Rollup Cost Method, Cost Rollup Type Code or Cost Rollup Level Class Code, the Recost Flag is set to Y.

Entry Fields:

Resource Number

Action Code (A = add, C = change, D = delete)

Required Fields:

Resource Number (Add only)

Action Code

Edits:

If Action is ADD, record must not exist.

If Action is CHANGE or DELETE, record must exist.

Action Code must be A, C, or D.

If Action is DELETE, resource number cannot exist in RESBAL file.

If Action is DELETE, resource number cannot exist in PMRESR file.

If Action is DELETE, resource number cannot exist in RMRESR file.

Command Keys (Display):

CK01 Display Session Status

CK11 Alpha Search Inquiry

Command Keys (Non-Display):

CK07 Send Message to Action List

CK17 Error Message Override

CK20 Delete Record

HELP HELP Text

Data Screen #1—MIE18002

Display-Only Fields:

Resource Number

Date of Last Maintenance

Action

Standard Unit of Measure (CHANGE/DELETE mode only)
Class (CHANGE/DELETE mode only)
Sub-Class (CHANGE/DELETE mode only)
Date ABC Code Last Updated
Number of Times Resource is Used Entry Fields:
Description
Standard Unit of Measure (ADD mode only)
Class (ADD mode only)
Sub-Class (ADD mode only)
Earliest Acceptable Revision Level
Current Revision Level
Service Level (%)
Balance Resource Code
ABC Code
Shortage Flag
Miscellaneous Field 1
Miscellaneous Field 2
Miscellaneous Field 3
Variable Overhead Code
Variable Overhead Rate
Variable Overhead Table Value
Variable Overhead Table/Rate
Fixed Overhead Code
Fixed Overhead Rate
Fixed Overhead Table Value
Fixed Overhead Table/Rate
Cumulative Lead Time of Prime Costing PM
Theoretical Consumption Code
Batch Consumption Code
Prime Planning PM Type
Prime Planning PM Name
Prime Costing PM Type
Prime Costing PM Name
Selling Price
Recost Byte Required Fields:
Class (ADD mode only)
Sub-Class (ADD mode only)
Standard Unit of Measure (if the default value is blank)

Edits:
If Action is ADD, Class must exist in RECLAS file and Sub-Class must exist in RESUBC file.
Balance Resource Code must be B, C, or blank.
ABC Code must be A, B, C, or blank.
Shortage Code must be Y or N.
Variable Overhead Table/Rate must be T, R, or blank.
If Variable Overhead Table/Rate is T, the Variable Overhead Table Value must be entered.
If Variable Overhead Table/Rate is T, the Variable Overhead Table Value must exist in Overhead Rate (OVHDRF) file.
If Variable Overhead Table/Rate is R, the Variable Overhead Rate and Variable Overhead Code fields mustbe entered. (However, if the user blanks out either of these fields, a default value is loaded in before editing begins. The Table edits are handled the same way.)

Variable Overhead Code must be P, D, or blank.

Fixed Overhead Code must be P, D, or blank.

If Fixed Overhead Table/Rate is T, the Variable Overhead Table Value must be entered.

If Fixed Overhead Table/Rate is T, the Variable

If Fixed Overhead Table/Rate is R, the Variable Overhead Table Value must exist in the Overhead Rate (OVHDRF) file.

Overhead Rate and Variable Overhead Code fields must be entered. (However, if the user blanks out either of these fields, a default value is loaded in before editing begins. The Table edits are handled the same way.)

Fixed Overhead Table/Rate must be T, R, or blank.

If RM Tailoring allows theoretical consumption, the Theoretical Consumption Code must be D, C, T, or blank.

If RM Tailoring does not allow theoretical consumption, Theoretical Consumption Code must be D. Batch Consumption Code must be Y, N, or blank.

Prime Planning Type and Name must exist in PMODEL if RP and RM are supposed to interface (check INTFAC). Prime Costing Type and Name must exist in PMODEL if RP and RM are supposed to interface (check INTFAC).

Recost Byte must be Y or N.

Theoretical Consumption Code must be D if Batch Consumption Code equals Y (UDS Error Message).

Defaults:

Date Last Maintenance—defaults to system date (ADD mode only).

Standard Unit of Measure—defaults to RESUBC field RSUMSR because this field cannot be blank.

Balance Resource Code—defaults to RESUBC field RSBORC because this field cannot be blank.

Batch Consumption Code—defaults to RESUBC field RSBCON because this field cannot be blank.

Theoretical Consumption Code—defaults to RESUBC field RSTHEO because this field cannot be blank.

Service Level (%)—defaults to RESUBC field RSSERV because this field cannot be blank.

If all of the following four Variable Overhead fields are equal to their respective default values, blanks, or zeroes are loaded into the RESMST file. If one or more of the fields does not equal its default value, the screen values are loaded in the RESMST file.

Variable Overhead Code—defaults to:
RESUBC field RSVOPD, then
RECLAS field RCVOPD, then
TALFLI field TAVOPD.

Variable Overhead Rate—defaults to:
RESUBC field RSVORT, then
RECLAS field RCVORT, then
TALFLI field TAVORT.

Variable Overhead Table Value—defaults to:
RESUBC field RSVOTV, then
RECLAS field RCVOTV, then
TALFLI field TAVOTV.

Variable Overhead
Table/Rate—defaults to:
RESUBC field RSVOTR, then
RECLAS field RCVOTR, then
TALFLI field TAVOTR.

If all of the following four Fixed Overhead fields are equal to their respective default values, blanks, or zeroes are loaded into the RESMST file. If one or more of the fields does not equal its default value, the screen values are loaded in the RESMST file (including those that equal their default values).

Fixed Overhead Code—defaults to:
RESUBC field RSFOPD, then
RECLAS field RCFOPD, then
TALFLI field TAFOPD.

Fixed Overhead Rate—defaults to:
RESUBC field RSFORT, then
RECLAS field RCFORT, then
TALFLI field TAFORT.

Fixed Overhead Table Value—defaults to:
RESUBC field RSFOTV, then
RECLAS field RCFOTV, then
TALFLI field TAFOTV.

Fixed Overhead Table/Rate—defaults to:
RESUBC field RSFOTR, then
RECLAS field RCFOTR, then
TALFLI field TAFOTR.

Command Keys (Display):

CK15 Notebook File Maintenance (ADD/CHANGE only)
CK18 Refresh Screen
CK19 Return Without Update Command Keys (Non-Display):

CK07 Send Message to Action List
CK17 Error Message Override (DELETE only)
HELP HELP Text

Data Screen #2—MIE18003

Display-Only Fields:

Resource Number
Date Last Maintenance
Action
Date Last Rollup
Actual Rollup Task Name
Simulated Rollup Task Name Entry Fields:

Recalculate Lead Time
Cost Rollup Type Code
Cost Rollup Costing Method
Cost Rollup Level Class Code
Documentation Location Code
Shelf Life Code
Shelf Life Days
Lot Control
Forward Planning Byte Default Location Classification Code—Miscellaneous Receipts
Default Location Classification Code—Production Receipts
Default Warehouse—Consumption
Default Location—Consumption
Default Warehouse—Production Receipts
Default Location—Production receipts
Standard Inventory Classification Code
Required From Location Classification Code
Master Production Plan Code
Planner Number
Buyer Number
Planning Sequence Number
Planning Level Code
Fixed Planning Level Code
Order Policy Code
Fixed Order Quantity
Days of Supply Required Fields:

Recalculate Lead Time
Shelf Life Code
Forward Planning Code
Fixed Planning Level Code
Order Policy Code
Re-Plan Flag Edits:

Recalculate Lead Time must be Y or N.
Cost Rollup Type Code must be N, F, V, or blank.
Cost Rollup Costing Method must be F, R, S, A, H, L, or blank.
Cost Rollup Level Code must be A, B, or blank.
Shelf Life Code must be Y or N.
If Shelf Life Code is Y, Shelf Life Days must be greater than zero; if Shelf Life Code is N, Shelf Life Days must be zero.
Lot Control must be Y, N, or blank.
Forward Planning Code must be Y or N.
Default Location Classification Code—Miscellaneous Receipts must exist in CLASCD file.
Default Location Classification Code—Production Receipts must exist in CLASCD file.
Required From Location Classification Code must exist in CLASCD file (UDS message).
Master Production Plan Code must be P, M, or blank.
Fixed Planning Level Code must be Y or N.
Order Policy Code must be A, B, C, D, E, G, or H.
Re-Plan Flag must be Y or N.
Location Prompting Code must be C or P when CK04 is selected.
For Non-Balance resources, the following fields cannot have values entered:
Default Location Classification Code—Miscellaneous Receipts
Default Location Classification Code—Production Receipts Default Location—Production Receipts
Default Location for Consumption.

Defaults:

Date Last Maintenance—defaults to system date (ADD only).

Cost Rollup Type Code—defaults to:
RESUBC field RSCSTP, then
RECLAS field RCCSTP, then
TALFLI field TACSTP.

Cost Rollup Costing Method—defaults to:
RESUBC field RSCSRU, then
RECLAS field RCCSRU, then
TALFLI field TACSRU.

Cost Rollup Level Class Code—defaults to:
RESUBC field RSCRLC, then
RECLAS field RCCRLC, then
TALFLI field TACRLC.

Shelf Life Code—defaults to RESUBC field RSSHLF because this field cannot be blank.

Shelf Life Days—defaults to RESUBC field RSSHLD because this field cannot be blank.

Default Location Classification Code (Miscellaneous Receipts)—defaults to TALFLI field TADCPO.

Default Location Classification Code (Production Receipts)—defaults to TALFLI field TADCPR.

Default Location (Production Receipts)—defaults to TALFLI field TADLPR.

Default Warehouse (Production Receipts)—defaults to TALFLI field TADWPR.

Planner Number—defaults to RESUBC field RSPLAN because this field cannot be blank.

Buyer Number—defaults to RESUBC field RSBUYR because this field cannot be blank.

Lot Control Code—defaults to RESUBC field RSLOTN because this field cannot be blank.

Order Policy Code—defaults to TALFLI field TAORPL because this field cannot be blank.

Fixed Order Quantity—defaults to TALFLI field TAORAM because this field cannot be blank.

Days of Supply—defaults to TALFLI field TAORDY because this field cannot be blank.

Planning Level Code defaults to 9s.

Command Keys (Display):

CK03 Page Backward
CK04 Location Prompting
CK15 Notebook File Maintenance (ADD/CHANGE only)
CK18 Refresh Screen
CK19 Return Without Update Command Keys (Non-Display):

CK07 Send Message to Action List
CK17 Error Message Override
HELP HELP Text

Data Screen #3—MIE18003

Display-Only Fields:

Resource Number

- Date Last Maintenance
- Action

Entry Fields:

- Short Term Code
- Intermediate Term Code
- Long Term Code
- Pegging Code
- Safety Stock
- Safety Time
- Beginning Effectivity Date
- Ending Effectivity Date
- Default Work Center
- Where From Code
- Production Resource Class
- Production Product Line
- Potent Resource
- Potency Factor (%)
- Manufacturing Lead Time 1
- Manufacturing Lead Time 2
- Manufacturing Lead Time Adjustment
- Manufacturing Lead Time Quantity Break
- Purchase Order Lead Time 1
- Purchase Order Lead Time 2
- Purchase Order Lead Time Adjustment
- Purchase Order Lead Time Quantity Break
- Purchase Order Lead Time for New Release
- Multiple Purchase Factor
- Minimum Purchase Quantity
- Maximum Purchase Quantity
- Marketing Resource Class
- Marketing Product Line
- Sales Lead Time
- Commodity Code
- Reporting Class
- Graphics Code Required Fields:

- Short Term Code
- Intermediate Term Code
- Long Term Code
- Pegging Code
- Where-From Code Edits:

- Short Term Code must be F, N, or I.
- Intermediate Term Code must be F, N, or I.
- Long Term Code must be F, N, or I.
- Pegging Code must be Y or N.
- Beginning Effectivity Date validity check.
- Ending Effectivity Date validity check.
- Beginning Effectivity Date cannot be greater than Ending Effectivity Date.
- Where From Code must be M or P.
- When changing the Potent Resource Code from Y to N, the Number of Times the Resource is used must be zero.
- Potent Resource Code cannot be changed if a record exists in LOCDTL file.

Potent Resource Code must be Y, N, or blank.
If Potent Resource Code is N, Potency Factor must equal zero.
If Potent Resource Code is Y, Potency Factor must be greater than zero.
Minimum Purchase Quantity cannot be greater than maximum purchase quantity.

Defaults:

Date Last Maintenance—defaults to system date (ADD only).
Potent Resource Code—defaults to RESUBC field RSPOTR because this field cannot be blank.
Potency Factor—defaults to RESUBC field RSPOTF because this field always contains a value even if that value is zero.
Reporting Class—defaults to RESUBC field RSPRCL because this field cannot be blank.

Command Keys (Display):

CK03 Previous Screen
CK15 Notebook File Maintenance (ADD/CHANGE only)
CK18 Refresh Screen
CK19 Return Without Update Command Keys (Non-Display):

CK07 Send Message to Action List
CK17 Error Message Override
HELP HELP Text

Data Screen #4—MIE18005

This last data screen displays cost fields. This screen can be displayed or maintained only if the user is authorized to see cost information.

Display-Only fields:

Resource Number
Date Last Maintenance
Action

Entry Fields:

Standard Cost
Fixed Cost
Selected Unit Cost
Net Realizable Value Usage
Net Realizable Value
Switch Over Cost
Cost from Last Rollup Required Fields:

Net Realizable Value Usage

Edits:

Selected Unit Cost must be S, A, H, L, or blank.
If Balance Resource Code is C (non-balance), the Selected Unit Cost must be S.
Net Realizable Value Usage must be Y or N.

Defaults:

Date Last Maintenance—defaults to System Date (ADD only).
Selected Unit Cost—defaults to RESUBC field RSSELC.

Command Keys (Display):

| | |
|---|---|
| CK03 | Previous Screen |
| CK15 | Notebook File Maintenance (ADD/CHANGE only) |
| CK18 | Refresh Screen |
| CK19 | Return Without Update |

Command Keys (Non-Display):

| | |
|---|---|
| CK07 | Send Message to Action List |
| CK17 | Error Message Override |
| HELP | HELP Text |

Session Status Screen—MIE18006

Display-Only Fields:

Number of Records Added
Number of Records Changed
Number of Records Deleted

Command Keys (Display):

| | |
|---|---|
| CK01 | End Job |

Command Keys (Non-Display):

| | |
|---|---|
| CK07 | Send Message to Action List |
| HELP | HELP Text |

B.

| File | Usage |
|---|---|
| CLASCD | IF |
| ERRMSG | IF |
| INTFAC | IF |
| LOCDTLRW | IF |
| MIE180FM | CF |
| NOTES | UF |
| OVHDRF | IF |
| PMODEL | IF |
| PMRESRRS | IF |
| RESBAL | UF |
| RECLAS | IF |
| RESMST | UF |
| RESUBC | IF |
| RMRESRRD | IF |
| TALFLI | IF |
| TALFLZ | IF |
| QSYSPRT | O |

C.

| File Name | Field Name | Description |
|---|---|---|
| TALFLI | TACCSL | Cycle Counting Method |
| | TACRLC | Cost Rollup Level Class Code |
| | TACSRU | Cost Rollup Costing Method |
| | TACSTP | Cost Rollup Type Code |
| | TADCPO | Default Inventory Class PO/Misc Receipt |
| | TADCPR | Default Inventory Class Prod Receipt |
| | TADLPR | Default Location (Prod Receipt) |
| | TADWPR | Default Whse (Prod Receipt) |
| | TADSPC | Cost Security |
| | TAFOPD | Fixed Overhead Code |
| | TAFORT | Fixed Overhead Rate |
| | TAFOTR | Fixed Overhead Table/Rate |
| | TAFOTV | Fixed Overhead Table Value |

| | | |
|---|---|---|
| | TAORAM | Default Order Amount |
| | TAORDY | Default # of Days of Supply |
| | TAORPL | Order Policy Code |
| | TAPMNM | PM Name Variable Heading |
| | TARGBM | Generate RESBAL records? (Non-balance) |
| | TARGBN | Generate RESBAL records? (Balance) |
| TALFLI | TARESC | Resource # Variable Heading |
| | TASELC | Selected Unit Cost |
| | TATCAL | Allow Theoretical Consumption? |
| | TAVOPD | Variable Overhead Code |
| | TAVORT | Variable Overhead Rate/Table |
| | TAVOTR | Variable Overhead Type Code |
| | TAVOTV | Variable Overhead Table Value |

Warehouses for Balance Resources:

| | | |
|---|---|---|
| TAWH01 | RESBAL | Warehouse # 1 |
| TAWH02 | RESBAL | Warehouse # 2 |
| TAWH03 | RESBAL | Warehouse # 3 |
| TAWH04 | RESBAL | Warehouse # 4 |
| TAWH05 | RESBAL | Warehouse # 5 |
| TAWH06 | RESBAL | Warehouse # 6 |
| TAWH07 | RESBAL | Warehouse # 7 |
| TAWH08 | RESBAL | Warehouse # 8 |
| TAWH09 | RESBAL | Warehouse # 9 |
| TAWH10 | RESBAL | Warehouse #10 |
| TAWH11 | RESBAL | Warehouse #11 |
| TAWH12 | RESBAL | Warehouse #12 |
| TAWH13 | RESBAL | Warehouse #13 |
| TAWH14 | RESBAL | Warehouse #14 |
| TAWH15 | RESBAL | Warehouse #15 |

Warehouses for Non-Balance Resources:

| | | |
|---|---|---|
| TAWHAA | RESBAL | Warehouse # 1 |
| TAWHAB | RESBAL | Warehouse # 2 |
| TAWHAC | RESBAL | Warehouse # 3 |
| TAWHAD | RESBAL | Warehouse # 4 |
| TAWHAE | RESBAL | Warehouse # 5 |
| TAWHAF | RESBAL | Warehouse # 6 |
| TAWHAG | RESBAL | Warehouse # 7 |
| TAWHAH | RESBAL | Warehouse # 8 |
| TAWHAI | RESBAL | Warehouse # 9 |
| TAWHAJ | RESBAL | Warehouse #10 |
| TAWHAK | RESBAL | Warehouse #11 |
| TAWHAL | RESBAL | Warehouse #12 |
| TAWHAM | RESBAL | Warehouse #13 |
| TAWHAN | RESBAL | Warehouse #14 |
| TAWHAO | RESBAL | Warehouse #15 |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Resource Master records that were updated are printed on the Maintenance Register, which includes the

SECTION XIX

SECTION XIX-I

Remember to think of ALL the ways that a resource could reach each location classification. You probably need more than just the paths from classification to classification. For example, a resource could get to inspection from another classification OR from a vendor.

Unit of Measure Conversion

PRISM provides for two types of unit of measure conversion, linear and non-linear. Both types of conversion records are entered through Unit of Measure Conversion Maintenance (see Section 1-19). When you enter a record for converting in one direction (for example, from OZ to LB), the system automatically creates a record for the opposite conversion (from LB to OZ).

"Linear" conversion means that a quantity in the first unit of measure (abbreviated "UM") can always be converted to the second UM using the same ratio. For example, one pound is 16 ounces, two pounds are 32 ounces, and so on. For this type of conversion, you only need to define one "conversion factor."

A "non-linear" conversion is used when there is no consistent relationship between the two units. For example, suppose you order oil in large quantities and store it in a large, irregularly-shaped vat 20 feet high (see figure 1). You determine how much oil you have by measuring the height of the oil in the vat.

To handle this type of situation as accurately as possible, you provide the system with a number of from- and to-quantity pairs that you know are correct, so that it can estimate the conversion for other quantities. For example, you might enter three pairs for your vat of oil: 10 ft = 40 gl, 15 ft = 70 gl, and 20 ft = 110 gl. If the quantity in feet or gallons does not exactly match a figure in one of these pairs, the system uses the two nearest sets to approximate the conversion. If you record 18 feet of oil, for example, 18 is 3/5 of the way between 15 and 20, so the number of gallons is 3/5 of the way from 70 to 85, or 79 gallons.

The number of conversion pairs you need to enter depends on (a) how accurate you want the conversion to be and (b) the shape of your vessel. Suppose it looks like this:

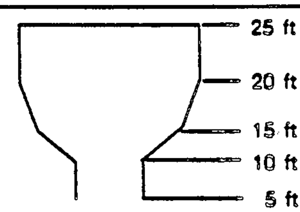

figure 1

In this case, you could enter just five conversion pairs, because between the pairs entered for 5 feet/10 feet, 10 feet/15 feet, 15 feet/20 feet, and 20 feet/25 feet (see illustration), the shape of the vessel is fairly regular. Adding an extra conversion pair between 5 feet and 10 feet, for example, would not add to the accuracy of the system's conversion.

You can enter conversion information for a specific resource or for all resources. For example, there are 16 ounces in a pound regardless of which resource you are measuring. However, you may have 24 cans in a case of soup, but 20 cans in a case of beans. In addition, you can have a conversion for a specific resource/warehouse/location combination (non-linear conversions MUST be resource/warehouse/location specific).

When converting a quantity, the system first looks for a conversion record for the specific resource/warehouse/location combination (if warehouse and location are available). If none is found, it checks for a resource-specific conversion. Lastly, it checks for a general conversion.

SECTION XIX-II

When To Use Unit of Measure Conversion Maintenance

Use this option to enter information for converting quantities from one unit of measure to another. Each resource in your system is assigned a standard unit of measure. By using this option you make it possible to enter quantities of the resource, for example on purchase orders or production models, in other units of measure.

PRISM provides for both linear and non-linear conversion between units of measure. A "linear" conversion is one that requires only one conversion factor for all quantities. For example, if a case of soup contains 24 cans, the conversion factor is the same whether you are converting a quantity of one case to cans (24) or a quantity of 100 cases to cans (2,400).

A "non-linear" conversion would be used, for example, if you needed to convert units of measure for quantities of olive oil stored in an irregularly shaped tank. Suppose you have 40 gallons when the liquid is 10 feet high in the tank. When the liquid is 15 feet high, you have 70 gallons. When the liquid is 20 feet high, you have 85 gallons. In this situation, a single conversion factor would not convert quantities accurately.

You can enter conversion information for a specific resource or for all resources. For example, there are 16 ounces in a pound regardless of which resource you are measuring. However, you may have 24 cans in a case of soup, but 20 cans in a case of beans.

How To Use Unit of Measure Conversion Maintenance

When you select Option 19 from the File Maintenance Menu (MI10), the Unit of Measure Conversion Maintenance Selection Screen is displayed. Use this screen to identify the "to" and "from" units of measure for which you want to add, change, or delete conversion information. If the conversion is for a particular resource, you also enter the resource number (and, if desired, warehouse and location) on this screen.

Selection Screen—MIE30001

(See Figure 97)

Fields for Entry

You can enter three combinations of information on this screen:

(1) From Unit of Measure, To Unit of Measure—for conversion information applicable to all resources in all locations.

(2) From Unit of Measure, To Unit of Measure, Resource Number—for conversion information applicable to this resource only, in all locations where it is found.

(3) From Unit of Measure, To Unit of Measure, Resource Number, Warehouse, Location—for conversion information applicable to this resource in this warehouse and location only.

Conversions are performed using the most specific information available. Suppose there are three records in this file for converting quantities from cases (CS) to cans (CN): one for resource A in warehouse B in location 100, one for resource A, and one with no resource specified. When converting a quantity of resource A, warehouse B, location 200, from cases to cans, the information specifically for resource A is used. The information for resource A, warehouse B, location 100 cannot be used because the location is not the same.

FROM UNIT OF MEASURE—Enter the two-character code for a unit of measure. Quantities in this unit of measure are being converted into quantities in the "to" unit of measure.

TO UNIT OF MEASURE—Enter the unit of measure into which quantities in the "from" unit of measure are being converted.

* Resource—required for a non-linear conversion. If this conversion is for a specific resource, enter that resource number.

Warehouse—required for a non-linear conversion. If resource is entered, you can enter warehouse and location to make the conversion information specific to this resource in this particular location.

Location—required for a non-linear conversion. See WAREHOUSE.

ACTION CODE—Enter A to add a new conversion record, C to change an existing record, or D to delete one.

When you add a record to the Unit of Measure Conversion file, the system adds a corresponding record for conversions in the other direction. This is also true for other action codes. When you change or delete a record, the "opposite" record is similarly changed or deleted.

Note that when you display the Session Status Screen, the number of records added, changed, and deleted reflects only the records you maintain. It does not include the records automatically maintained by the system.

Command Function Keys

ENTER—Press ENTER after entering all necessary information, to continue to the appropriate data screen. If the action code is A or C, this is data screen MIE30004. If the action code is D, data screen MIE30007 is displayed.

CK01 DISPLAY SESSION STATUS—Press CK01 to display the session status screen, which shows the number of records in the Unit of Measure Conversion (UMCONV) file you have added, changed, and deleted during this session. When you exit Unit of Measure Conversion Maintenance by pressing CK01 from that screen, a register is automatically printed. This register shows all records added, changed, and deleted during this maintenance session, with the current data for each.

CK20 DELETE—After entering action code D, you can choose one of two methods to remove the record:

(1) Press CK20. This removes this record from the file immediately.

(2) Press ENTER. This displays the data screen with the information for the record you are attempting to delete. At that point a message is displayed, instructing you to press CK20 to confirm that you want to delete the record. From that screen you can also press CK19 to return to the selection screen without removing the record.

Data Screen MIE30004

(See Figure 98)

Data screen MIE30004 is displayed when you enter action code A or C on the selection screen and press ENTER. Use this screen to enter or change the conversion information.

Fields for Display

From UM

To UM

Resource

Location

Warehouse

Action—If the action code is A, the word ADD is displayed here. If the action code is C, the word CHANGE is displayed.

Date Last Maint—date this conversion record was last updated. If you are adding a new record, this is today's date.

Fields for Entry

There are two particularly convenient aspects to entering conversion information in PRISM:

(1) When you enter a conversion record, the system automatically creates a second record as well, for conversions in the opposite direction. For example, if you enter information for converting from ounces to pounds, the system adds that record and also a record for converting from pounds to ounces. This is true for both linear and non-linear conversions.

(2) The Calculation Type code allows you to enter information for linear conversions in the most convenient way. Many conversion programs assume that quantities in the To UM are calculated by multiplying the quantity in the From UM by the conversion factor. When converting ounces to pounds, for example, you would have to enter a conversion factor of 0.0625. With PRISM, you can enter a conversion factor of 16 with Calculation Type D (divide).

If this is a linear conversion (only one conversion factor needed), make entries in the fields above the word "OR." If this is a non-linear conversion, make entries in the fields below the word "OR." For non-linear conversions, you must have entered resource, warehouse, and location on the selection screen.

Linear Conversions

Unit of Measure Conversion Factor—Enter the linear conversion factor to convert quantities from the From UM to the To UM. This is the amount by which a quantity in the From UM must be multiplied or divided to determine the quantity in the To UM.

Calculation Type—Enter M (multiply) or D (divide) to indicate how the conversion factor is used to convert quantities. See UNIT OF MEASURE CONVERSION FACTOR, above.

Non-Linear Conversions

From Quantity/To Quantity—Enter at least two From Quantity/To Quantity combinations. After filling the first five lines, press ROLL UP to display five more lines to enter more combinations. You may enter any number of combinations, to allow the system to make the conversions as accurately as you need them.

Returning to the olive oil example from the beginning of this section, suppose you enter three sets of from/to quantities, as follows:

| *From Quantity* | *To Quantity* |
|---|---|
| 10 | 40 |
| 15 | 70 |
| 20 | 85 |

If the quantity to be converted does not exactly match the from quantity for one of the combinations, the system does a linear conversion using the two nearest from/to quantity combinations. Suppose you measure 18 feet of oil in your tank. The from quantity, 18 feet, is three-fifths of the way from 15 to 20. Therefore, the system calculates three-fifths of the difference between 70 and 85, and estimates that you have 79 gallons of olive oil in the tank.

If the quantity to be converted is above or below the highest or lowest from quantity on the list, the system still uses the nearest two from/to quantity combinations. Suppose there are eight feet of olive oil in the tank. Using the first two from/to quantity combinations, the system calculates that the quantity in gallons is 28.

To use the non-linear conversion capability efficiently, enter more from/to quantity combinations for parts of the vessel that are irregularly shaped. If between the place where you measure 10 feet and the place where you measure 20 feet there are no irregularities (for example, if the vessel is perfectly cylindrical), there is no need to enter multiple from/to quantities between the from quantities of 10 and 20 feet.

D=Del—delete code. Enter D in this field next to any from/to quantity combination you want to remove from this record.

Generally, you will use this with action code C, to remove individual lines from the record. There is no need to use it when adding a new record. If the action code is A, none of these lines has yet been updated to the file, so you can change them simply by typing over the old information.

Command Function Keys

ENTER—Press ENTER after entering or changing conversion information, to update the file with this new information. This returns you to the selection screen.

CK18 REFRESH SCREEN—Select CK18 to redisplay this screen with the values currently stored in the file. If you are adding a record, this has the effect of blanking out all fields for entry, since this record currently does not exist in the file. If you are changing a record, the old conversion information is displayed.

CK19 RETURN WITHOUT UPDATE—If you decide not to add this record or not to change the existing conversion information, press CK19. This returns you to the selection screen.

Data Screen MIE30007

(See Figure 99)

Data screen MIE30007 is displayed when you enter action code D on the selection screen and press ENTER. This screen displays the conversion record so that you can make sure it is the one you want to remove.

Fields for Display

From UM

To UM

Resource

Location

Warehouse

Action—The word DELETE is displayed here.

Date Last Maint—date this conversion record was last updated.

Unit of Measure Conversion Factor—displayed if this is a linear conversion record. This is the linear conversion factor used to convert quantities from the From UM to the To UM. This is the amount by which a quantity in the From UM must be multiplied or divided to determine the quantity in the To UM.

Calculation Type—displayed if this is a linear conversion record. This code (M or D) indicates how the conversion factor is used to convert quantities. See UNIT OF MEASURE CONVERSION FACTOR.

From Quantity/To Quantity—displayed if this is a non-linear conversion record. At least two From Quantity/To Quantity combinations are entered, allowing the system to make the conversions as accurately as you need them.

If the quantity to be converted does not exactly match the from quantity for one of the combinations, the system does a linear conversion using the two nearest from/to quantity combinations.

Command Function Keys

ENTER—If the five lines on this screen have from/to combinations, press ENTER or ROLL UP to display the next five lines.

CK18 REFRESH SCREEN—Press CK18 to redisplay this screen with the first five lines of from/to quantity combinations.

CK19 RETURN WITHOUT UPDATE—If you decide not to remove this conversion record, press CK19. This returns you to the selection screen.

SECTION XIX-III

MIE300

Unit Of Measure Conversion Maintenance

A. The Unit of Measure Conversion Maintenance program allows the user to enter and maintain information in the Unit of Measure Conversion File (UMCONV). This file contains linear conversions and non-linear conversions which can be defined as standard or can be defined for a specific resource or Resource #/Location/Warehouse.

Screens

MIE30001—Selection Screen
MIE30004—Data Screen 1
MIE30007—Data Screen 2—Delete Mode Only
MIE30008—Session Status Screen

Selection Screen—MIE30001

The user may add, change, or delete records. When the user initially defines a unit of measure conversion, two records are added to the UMCONV file. For example, if the user wants to enter a standard conversion that changes feet to inches, s/he keys in on the Selection Screen From UM = FT and To UM = IN and leaves the resource number, warehouse, and location blank. On the first Data Screen, the Conversion Factor is keyed in as 12.0 and the calculation code as M (Multiply). When the ENTER Key is pressed, the program adds a record to the UMCONV file.

A second record is added to the file with the From UM/To UM and calculation code switched around, i.e., From UM = IN, To UM = FT, and calculation code = D (Divide). If the conversion is non-linear, the From Quantity and To Quantity breaks are switched around. This second record is added so that the entire conversion process requires, at most, three chains to the UMCONV file regardless of the direction the conversion is performed. When a record is changed or deleted, both records are updated.

For a non-linear conversion, the user has the option of deleting all records for a particular From UM/To UM, or of deleting individual records. To delete all records, the ENTER key can be taken from the Selection Screen to display the second data screen.

Entry Fields:

From Unit of Measure

To Unit of Measure

Possible combinations are:

1. From UM To UM
2. From UM To UM/Resource Number
3. From UM To UM/Resource #/ Warehouse/Location Action Code (A = add, C = change, D = delete)

Required Fields:

From Unit of Measure

To Unit of Measure

Resource Number (only if warehouse is entered)

Action Code

Edits:

If Action is ADD, record must not exist.

If Action is CHANGE or DELETE, record must exist.

CK20 not valid if Action Code is A or C.

Action Code must be A, C, or D.

If Action is ADD, resource number must exist in RESMST file.

Warehouse and location must be entered together or left blank.

Command Keys (Display):

CK01 Display Session Status

Command Keys (Non-Display):

CK07 Send Message to Action List

CK17 Error Message Override

CK20 Delete Record

HELP Help Text

Data Screen 1—MIE30004

If a non-linear conversion is being added, a subfile c five blank records is displayed on the first data screen. Th from quantity and to quantity fields entered togethe comprise a subfile record, and each subfile recor constitutes a quantity break.

If the user is entering more than five subfile records, th roll up key can be taken to display five additional blan records. Each new record is created in the data file with sequence number that is incremented by one. If the use enters eight quantity breaks, the first five appear in th UMCONV record with sequence #1 assigned to it, and th remaining three are written to a second UMCONV reco (sequence #2).

If a non-linear conversion is being changed, the fir data screen displays any existing quantity break informati and then fills the remainder of the page with blank lines allow for entry of new unit of measure conversions. display existing information, this program reads all UMCO file records for the selected From UM/To UM.

Display-Only Fields:

From Unit of Measure

To Unit of Measure

Resource #

Warehouse

Location

Date of Last Maintenance

Action

Entry Fields:

- Unit of Measure Conversion Factor
- Calculation Type
- Unit of Measure Conversion Breakdown: From Quantity To Quantity
- Delete Code Required Fields:

- Unit of Measure Conversion Factor or Unit of Measure Conversion Breakdown (From Qty/To Qty).

Edits:

- If Unit Of Measure Conversion Factor is not zero, no quantity break information is allowed.
- If Unit Of Measure Conversion Factor is not zero, calculation code must be M or D.
- If Unit Of Measure Conversion Factor is zero, Calculation Code must be blank.
- For Unit of Measure Conversion Breakdown, a minimum of two Quantity Breaks (i.e., two subfile records) must be entered.
- Duplicate quantity breaks are not permitted.
- The Unit Of Measure Conversion Factor and Unit Of Measure Conversion Breakdown cannot be entered simultaneously.
- From Unit Of Measure and To Unit Of Measure cannot be equal.
- Calculation Code must be M or D.
- If location is blank, conversion must be linear.
- Roll Up key is invalid if subfile page is not full.

Defaults:

- Date Last Maintenance—defaults to system date (ADD only).

Command Keys (Display):

| | |
|---|---|
| CK18 | Refresh Screen |
| CK19 | Return Without Update |

Command Keys (Non-Display):

| | |
|---|---|
| CK07 | Send Message to Action List |
| CK17 | Error Message Override |
| CK20 | Delete Record |
| HELP | Help Text |

Data Screen 2—MIE30007 (Delete Mode Only)

The second data screen is identical to the first except all fields are protected and the delete code is omitted. To confirm the deletion, CK20 must be taken. To delete individual records, a delete code of D must be entered next to the subfile record on the first data screen.

Display-Only Fields:

- From Unit of Measure
- To Unit of Measure
- Resource #
- Warehouse
- Location
- Date of Last Maintenance
- Action
- Unit of Measure Conversion Factor
- Calculation Type From Quantity
To Quantity Defaults:

Date Last Maintenance—defaults to system date (ADD only).

Command Keys (Display):

CK19 Return Without Update

Command Keys (Non-Display):

CK07 Send Message to Action List
CK17 Error Message Override
CK20 Delete Record
HELP Help Text

Session Status Screen—MIE30008

The Session Status Screen displays the number of Unit of Measure Conversions added, changed, and deleted. If CK01 is taken, the job is ended. If the ENTER key is taken, the Selection Screen is redisplayed.

Display-Only Fields:

Number of Records Added
Number of Records Changed
Number of Records Deleted

Command Keys (Display):

CK01 End Job
ENTER Return to Selection Screen

Command Keys (Non-Display):

CK07 Send Message to Action List
HELP Help Text

B.

| File | Usage |
|---|---|
| ERRMSG | IF |
| MIE300FM | CF |
| MIE300W | IF |
| RESMST | IF |
| TALFLI | IF |
| TALFLZ | IF |
| UMCONV | UF |
| QSYSPRT | O |

C.

| File Name | Field Name | Description |
|---|---|---|
| TALFLI | TARESC | Resource Variable Heading |
| TALFLZ | TANDEC | User-Defined # of Decimals |

D.

| Field Name | Position From | To | Description |
|---|---|---|---|
| $USRPF | 1811 | 1820 | User Profile |
| GPENTN | 1821 | 1830 | Entity Name |
| $USER | 1891 | 1891 | User Date Format |
| $UDATE | 1953 | 1958 | Current Date (User Format) |

F. All Unit of Measure Conversion records that were updated are printed on the Maintenance Register, which includes the Action (ADD, CHANGE, or DELETE) and all entry and display-only fields.

MIE320

User-Defined Transaction Maintenance

A. The User-Defined Transaction Maintenance program allows the user to enter and maintain information in the User-Defined Transaction File (USRTRN). This file contains one record for each user-defined transaction type.

Screens

MIE32001—Selection Screen
MIE32002—Data Screen
MIE32003—Session Status Screen

Selection Screen—MIE32001

The user may add or change a record, but deletion of an existing record is not permitted. User-Defined transactions are deleted through the Transaction Purge program (MIU280).

SECTION XIX-IV

Resource Adjustment—MIE44201

An RA transaction is a schedule related transaction which indicates a change to resource consumption or production results for an on going schedule. It is the only type of schedule transaction that can be performed after the schedule is set to a Complete status. This transaction can also be done to a schedule with a launched or Running status.

If the resource is a calculated cost resource, then only the schedule is updated with the adjustment. For the other resources, the schedule and the balance is updated.

Updates

Reminder: This section only contains updates for those files and fields that require a detailed explanation. For the remainder of the updates, please see the *Summary of Transaction Updates* table.

• *LOCDTL:*

Quantity at Location in standard unit of measure:

A. If the quantity is positive and a. the transaction UM and the standard UM are same and, 1. the resource is non-potent, the Quantity At Location in standard UM is the transaction quantity.

2. the resource is potent, the Quantity At Location in standard UM is the transaction quantity extended by the entered potency factor.

b. the transaction UM and standard UM are different and 1. the resource is a non-potent resource, the Quantity At Location in standard UM is the transaction quantity converted to the std UM.

2. the resource is potent, the Quantity At Location in standard UM is the transaction quantity converted to the std UM and then extended by the entered potency factor.

B. If the quantity is negative, and a. the transaction UM and the standard UM are the same, and 1. the resource is non-potent, the Quantity At Location in standard UM is the transaction quantity.

2. the resource is potent, the Quantity At Location in standard UM is the transaction quantity extended by the entered potency factor.

b. the transaction UM and standard UM are different, and 1. the resource is non-potent, the Quantity At Location in standard UM is the transaction quantity multiplied by -1, converted to the standard UM and then multiplied by -1 again.

2. the resource is potent, the Quantity At Location in standard UM is the transaction quantity multiplied by -1, extended by the entered potency factor, converted to the std UM and then multiplied by -1 again.

Quantity At Location in the last received UM:

A. If the resource is non-potent, and a. the last received UM and the standard UM are the same, and 1. the resource is produced, the transaction quantity is added to the Quantity At Location in the last received UM quantity.

2. the resource is consumed, the transaction quantity is subtracted from the Quantity At Location in the last received UM quantity.

b. the last received UM and the standard UM are different, and 1. the resource is produced, the transaction qty is converted to the standard UM, the result is added to the Qty At Location in std UM. Then that result is converted to the last received UM and this qty is the Quantity At Location in the last received UM.

2. the resource is consumed, the transaction qty is converted to the std UM. The result is subtracted from the Qty At Location in standard UM. Then that quantity is converted to the last last received UM. This result is the quantity at the location in the last received UM.

B. If resource is potent, and a. the transaction UM and the standard UM are the same and potency factors are the same, and 1. the resource is produced, the program divides the potency factor at the location into the Quantity At Location in standard UM, then adds the transaction quantity to this quantity. This quantity is updated as the quantity at the location in the last received UM.

2. the resource is consumed, the program divides the potency factor at the location into the Quantity At Location in standard UM, then subtracts the transaction quantity from this quantity. This quantity is updated as the Quantity At Location in the last received UM.

b. the transaction UM and the standard UM are the same and potency factors are different, and 1. the resource is produced, the program converts the transaction quantity into potent units by multiplying the transaction quantity by the potency entered. This quantity is added to the Quantity At Location in standard UM.

The new potency factor is calculated (see beginning of Transaction Entry). The new potency factor is divided into the quantity just calculated. This now becomes the Quantity At Location in last received UM.

2. the resource is consumed, the program converts the transaction qty into potent units by multiplying the transaction qty by the potency entered. This quantity is subtracted from the quantity at the location in standard UM.

The program calculates the new potency factor (see beginning of transaction entry) and divides the new potency factor into the quantity just calculated. This now becomes the Quantity At Location in last received UM.

c. the transaction UM and the standard UM are different and potency factors are the same, and 1. the resource is produced, the program divides the potency factor at the location into the Quantity At Location in standard UM. Then, the transaction quantity is converted to the standard UM. This quantity is converted to the transaction UM and updated into the Quantity At Location in the last received UM.

2. the resource is consumed, the program divides the potency factor at the location into the Quantity At Location in standard UM. Then the transaction quantity converted from the standard UM is subtracted from the result. This quantity is converted to the transaction UM and updated into the Quantity At Location in the last received UM.

d. the transaction UM and the standard UM are different and potency factors are different, and 1. the resource is produced, the transaction qty is converted into potent units by multiplying the transaction qty by the potency entered. This qty is converted to the standard UM. This qty is added to the Quantity At Location in standard UM. The new potency factor is calculated (see beginning of Transaction Entry). Then, the new potency factor is divided into the qty just calculated and converted to the transaction UM. This now becomes the Quantity At Location in last received UM.

2. the resource is consumed, the transaction qty is converted into potent units by multiplying the transaction qty by the potency entered. Then, this qty is converted to the standard UM. The result is subtracted from the Quantity At Location in standard UM.

The new potency factor is calculated (see beginning of Transaction Entry). Then the new potency factor is divided into the qty just calculated and converted to the transaction UM. This now becomes the Quantity At Location in last received UM.

The descriptions for the updating of the Quantity At Location in the last received UM may not exactly correspond to the lines of code which calculate the field. However, the result is the same. For the exact steps taken, please refer to the source code.

*Potency at Location:*

$$\text{New Potency Factor} = \frac{PQ(P) + PQ(L)}{\frac{PQ(L)}{PF(L)} + AQ(P)}$$

PQ(P) = Produced Quantity In Potent Units

PQ(L) = Quantity At Location In Potent Units

PF(L) = Potency Factor At Location

AQ(P) = Actual Quantity Produced In Standard UM

If the entered potency is different from the potency at the location, the potency at the location is adjusted.

- *LOTMAS:*
  - If a LOTMAS record does not exist and this is a receipt, a new record is created from the user-entered information.
  - If the resource is being consumed, a LOTMAS record must exist.
- *RESBAL:*
  - Date Last Effect on On Hand Quantity = transaction date (user). This date is only updated if the location is classified as On Hand = Yes.

If the resource is being CONSUMED:

- Quantity On Hand is reduced if the location is classified as On Hand = Yes.
- Quantity On Order is reduced if the location is classified as On Order = Yes.
- Date Last Effect on On Hand Quantity = Transaction Date (user)
- This date is only updated if the location was classified as On Hand = Yes.

If the resource is being PRODUCED:

- Quantity On Hand is increased if the location is classified as On Hand = Yes.
- Quantity On Order is increased if the location is classified as On Order = Yes.

- *TRHIST:*
  - Transaction Quantity in user UM and Transaction Quantity in standard UM are updated.
  - See tables on following pages for additional field updates.

In view of the foregoing, we claim:

1. A digital data processing apparatus for manufacturing process control, comprising:

A. first input means for inputting digital signals representative of one or more resource elements consumed in said manufacturing process, B. second input means for inputting digital signals representative of one or more resource elements produced by said manufacturing process, C. third input means for inputting digital signals representative of manufacturing relations associated with said manufacturing process between at least one consumed resource and a set of one or more produced resources, said manufacturing relations including at least one of an operational relation, a planning relation, and a financial relation, D. production modeling means, coupled with said first, second and third input means, for generating and storing a production model comprising digital signals representative of said manufacturing relations, said production modeling means including means for generating digital signals representing one-to-one, one-to-many, many-to-one, and many-to-many manufacturing relations between consumed and produced resource elements, and E. output means, coupled with said production modeling means and with said first and second input means, for generating output signals representative of at least selected portions of said manufacturing process, including manufacturing relations associated therewith.

2. A digital data processing apparatus according to claim 1, wherein said output means comprises means for generating digital signals representative of at least one of production, yield, consumption, composition, value, and variances therein of selected ones of said resource elements.

3. A digital data processing apparatus according to claim 1, wherein

A. said third input means includes task-defining means for inputting digital signals representative of one or more tasks performed during said manufacturing process, and B. said production modeling means includes task-storing means responsive to said task-representative signal for generating and storing digital signals representative one or more of (i) one or more resource elements consumed by a task, (ii) one or more resource elements produced by a task, (iii) one or more production operations performed during the course of a task, and (iv) manufacturing relations between the associated task and one or more other tasks.

4. A digital data processing apparatus according to claim 1, wherein said production modeling means comprises means for generating a digital signal indicating that a resource element produced by one task serves as a resource element consumed by the same or another task.

5. A digital data processing apparatus according to claim 1, wherein said output means includes cost computation means for generating a digital signal representative of a cost associated with at least one of a consumed resource, a produced resource, and a task.

6. A digital data processing apparatus according to claim 5, wherein said cost computation means includes cost roll-up means for generating a digital signal representative of a cost roll-up associated with one or more of said tasks.

7. A digital data processing apparatus according to claim 5, wherein

A. said first input means comprises means for inputting digital signals representative of costs associated with one or more resource elements consumed in said manufacturing process, and B. said cost computation means comprises means for generating a digital signal representative of a cost distribution associated with each of plural produced resources associated with one said task.

8. A digital data processing apparatus according to claim 5, wherein said cost computation means comprises means for generating a digital signal representative of a net realizable value of one or more resource elements produced by a selected task.

9. A digital data processing apparatus according to claim 1, comprising means coupled with said production modeling means for generating a digital signal defining a first said production model as a master production model and for defining other said production models as being dependent on said master production model, said dependent production model having in common with said master production model tasks and produced resource elements.

10. A digital data processing apparatus according to claim 1, wherein said production modeling means includes means for generating a digital signal representative of a production model type and for associating that production model type-representative signal with one or more production models having similar operational, financial, or planning characteristics.

11. A digital data processing apparatus according to claim 1, wherein

A. said second input means includes means for inputting digital signals representative of amounts of one or more resource elements produced by said manufacturing process, and B. said output means includes theoretical consumption means for generating a digital signal representative of an amount of one or more resource elements consumed by said process manufacture in the production of said one or more produced resource elements.

12. A digital data processing apparatus according to claim 11, wherein said theoretical consumption means includes means for generating a digital signal representative of a production distribution associated with each of plural resources produced by one or more said tasks.

13. A digital data processing apparatus according to claim 11, wherein

A. said first input means comprises inventory means for inputting and storing a digital signal representative of a quantity of a physical occurrence of a consumed resource element available for use in said manufacturing process, B. said theoretical consumption means includes means for modifying said stored quantity-representative signal to reflect a quantity of said resource element consumed during said manufacturing process, C. said output means comprises calculated cost means for generating a digital signal representative of an amount of said resource element consumed by said manufacturing process in the production of said resource elements without modifying said stored quantity-representative signal.

14. A digital data processing apparatus according to claim 1, wherein

A. said second input means includes means for inputting digital signals representative of amounts of one or more resource elements produced by a task associated with said manufacturing process, and B. said output means includes theoretical production means selectively operable for generating a digital signal representative of an amount of one or more resource elements produced by the same task.

15. A digital data processing apparatus according to claim 14, wherein said theoretical production means includes means for generating a digital signal representative of a production distribution associated with each of plural resources produced by one or more said tasks.

16. A digital data processing apparatus according to claim 14 wherein

A. said third input means comprises means for inputting a digital signal indicating whether quantities of resources produced by a task are reportable, and B. said digital data processing apparatus further comprises reportable task means connected with said third input means for selectively enabling said theoretical production means and for, alternatively, accepting input digital signals representative of a quantity of one or more resources produced by the task.

17. A digital data processing apparatus according to claim 1, wherein

A. said third input means comprises (i) means for inputting a digital signal representative of temporal or volumetric output of a production run corresponding to a production model, (ii) means for inputting a digital signal representative of a temporal or volumetric output of a task batch corresponding to a task associated with said production model, (iii) means for inputting a digital signal representative of a mathematical relationship between said production run output and said task batch output, and B. said output means includes task batch means for generating a digital signal representative of a number of said task batches required to complete said production run.

18. A digital data processing apparatus according to claim 1, wherein

A. said third input means includes means for inputting digital signals representative of a type of quantitative relation between a resource element consumed by a task and one or more resources produced by that same task, B. said output means includes batch/linear consumption means responsive to said quantitative relation type-representative signal for selectively generating a digital signal representative of either i. a linear quantitative relation between said consumed resource and said one or more produced resources, or ii. a step-function relation between said consumed resource and said one or more produced resources.

19. A digital data processing apparatus according to claim 1, wherein

A. said third input means comprises (i) means for inputting a digital signal representative of a quantity of a resource element consumed in a task, (ii) means for inputting a digital signal representative of a temporal duration of an operation associated with that same task, and B. said output means comprises resource operation dependency means for generating a digital signal establishing a relation between a quantity of the said consumed resource element and the temporal duration of said operation for selected ones of said consumed resources and said operations.

20. A digital data processing apparatus according to claim 1, further comprising resource means connected with said first and second input means for generating and storing a digital signal representative of a production characteristic associated with at least one said resource element, said production characteristic including one or more of a financial, operational, planning, and tracking attribute of said at least one resource element.

21. A digital data processing apparatus according to claim 20, wherein said resource means comprises class/sub-class means for generating a digital signal defining one or more said resources to have similar production characteristics.

22. A digital data processing apparatus according to claim 20, wherein said resource means comprises location classification means for generating a digital signal representing a location classification associated with a physical occurrence of a resource element, said location classification including one or more said production characteristics.

23. A digital data processing apparatus according to claim 22, further comprising transaction means connected to said resource means for modifying a digital signal representative of one or more production characteristics associated with a physical occurrence of a resource element.

24. A digital data processing apparatus according to claim 23, wherein said transaction means comprises resource change means for modifying a digital signal which represents a physical occurrence of one resource element to represent a physical occurrence of another resource element and for modifying, concurrently, one or more production characteristic-representative signals associated with the modified physical occurrence-representative signal.

25. A digital data processing apparatus according to claim 22, wherein said location classification means comprises user-defined classification means for inputting digital signals representative of user-defined location classifications.

26. A digital data processing apparatus according to claim 25, wherein said location classification means comprises user-defined classification change means for modifying a digital signal representation of a location classification associated with a physical occurrence resource element.

27. A digital data processing apparatus according to claim 20, comprising

A. tracking characteristic means coupled with said resource means for generating a balance/non-balance signal representative of a tracking characteristic of a resource element, and B. balance/non-balance means, coupled with said tracking characteristic means and with said output means, and responsive to said balance/non-balance signal for selectively tracking physical occurrences of a resource element.

28. A digital data processing apparatus according to claim 20, wherein said resource means comprises A. means for inputting a digital signal representative of a standard unit of measure associated with a resource element, B. means for inputting a digital signal representative of a transaction unit of measure associated with a physical occurrence of that same resource element, C. means for inputting a digital signal representative of conversion factor for converting a quantity of a physical occurrence of the resource element between the standard unit of measure associated with the resource element and the transaction unit of measure associated with the physical occurrence of the resource element, and D. means for inputting a digital signal representative of quantity expressable in the transaction unit of measure associated with a physical occurrence of the resource element and for converting that quantity into a digital signal representative of an equivalent quantity expressable in the standard unit of measure associated with the resource element and for generating a signal representative thereof.

29. A digital data processing apparatus according to claim 20, wherein said resource means comprises A. means for inputting digital signals representative of a standard unit of measure associated with a resource element, B. means for inputting a digital signal representative of a transaction unit of measure associated with a storage location for storing a physical occurrence of a resource element, C. means for inputting a digital signal representative of conversion factor for converting a quantity between the transaction unit of measure associated with the storage location and the standard unit of measure associated with a resource element stored in that storage location, D. means connected with said factor means for inputting a digital signal representative of quantity expressable in the transaction unit of measure and associated with the storage of a physical occurrence of a resource element and for converting that quantity into a digital signal representative of an equivalent quantity expressable in the standard unit of measure and for generating a signal representative thereof.

30. A digital data processing apparatus according to claim 20, wherein said resource means comprises A. means for inputting a digital signal representative of a theoretical quantity at a predetermined potency level, of a consumed resource element required for production of a produced resource element, B. means for inputting a digital signal representative of a potency-percentage quantity of a physical occurrence of said consumed resource element, C. means for generating a digital signal representative of a physical quantity of said physical occurrence of said consumed resource element required for production, said physical quantity-required signal being expressed in terms of said potency-percentage and being based upon the predetermined potency level.

31. A digital data processing apparatus according to claim 20, wherein said resource means comprises A. means for inputting digital signals representative of grade requirements for a resource element consumed in the manufacturing process and for generating a grade-requirement signal representative thereof, B. means for inputting a digital signal representative of a grade-based characteristic of a physical occurrence of the resource element and for generating a grade-reporting signal representative thereof, C. means responsive to said grade-requirement signal and to said grade-reporting signal for generating a digital signal indicating whether the physical occurrence of the resource element is a candidate for use in the manufacturing process.

32. A method of operating a digital data processing apparatus for manufacturing process control, said method comprising the steps of:

A. inputting digital signals representative of one or more resource elements consumed in said manufacturing process, B. inputting digital signals representative of one or more resource elements produced by said manufacturing process, C. inputting digital signals representative of manufacturing relations associated with said manufacturing process between at least one consumed resource and a set of one E. output means, coupled with said production modeling means and with said first and second input means, for generating output signals representative of at least selected portions of said manufacturing process, including manufacturing relations associated therewith.

33. A method for operating a digital data processing apparatus according to claim 32, comprising the further step of generating a digital signal representative of at least one of production, yield, consumption, composition, value, and variances therein of selected ones of said resource elements.

34. A method for operating a digital data processing apparatus according to claim 32, comprising the further steps of A. inputting a digital signal representative of one or more tasks performed during said manufacturing process, and B. responding to said task-representative signal for generating and storing a digital signal representative of at least (i) one or more resource elements consumed by the associated task, (ii) one or more resource elements produced by the associated task, (iii) one or more production operations performed during the course of the associated task, and (iv) manufacturing relations between the associated task and one or more other tasks.

35. A method for operating a digital data apparatus according to claim 32, comprising the further step of generating a digital signal defining a resource element produced by one task to be a resource element consumed by the same or another task.

36. A method for operating a digital data apparatus according to claim 32, comprising the further step of generating a digital signal representative of a cost associated with at least one of a consumed resource, a produced resource, and a task.

37. A method for operating a digital data apparatus according to claim 36, comprising the further step of generating a digital signal representative of a cost roll-up associated with one or more tasks of said manufacturing process.

38. A method for operating a digital data apparatus according to claim 37, comprising the further step of inputting a digital signal representative of a cost associated with one or more resource elements consumed in said manufacturing process.

39. A method for operating a digital data apparatus according to claim 38, comprising the further step of generating a digital signal representative of a cost distribution associated with each of plural resources associated with one said task.

40. A method for operating a digital data apparatus according to claim 39, comprising the further step of generating a digital signal representative of a net realizable value of one or more resource elements produced by a task.

41. A method for operating a digital data apparatus according to claim 32, comprising the further step of generating a digital signal defining at least one said production model as being a master production model and for defining other said production models as being dependent on said master production model, each said dependent production model having one or more consumed resource elements in common with a corresponding consumed resource element associated with said master production model.

42. A method for operating a digital data apparatus according to claim 32, comprising the further step of generating a digital signal representative of a production model type and for associating that production model type signal with one or more production models having similar operational, financial, or planning characteristics.

43. A method for operating a digital data apparatus according to claim 32, comprising the further steps of A. inputting a digital signal representative of an amount of one or more resource elements produced by said manufacturing process, and B. generating a digital signal representative of an amount of one or more resource elements consumed by said manufacturing process in the production of said resource elements.

44. A method for operating a digital data apparatus according to claim 43, comprising the further step of generating a digital signal representative of a production distributing associated with each of plural resources produced by one or more said tasks.

45. A method for operating a digital data apparatus according to claim 32, comprising the further steps of A. inputting a digital signal representative of an amount of a first resource element produced by said manufacturing process, and B. generating a digital signal representative of an amount of one or more other resource elements produced by said manufacturing process in conjunction with the production of said first resource element.

46. A method for operating a digital data apparatus according to claim 45, comprising the further step of generating a digital signal representative of a production distribution associated with each of plural resources produced by one or more said tasks.

47. A method for operating a digital data apparatus according to claim 32, comprising the further steps of A. inputting a digital signal representative of temporal or volumetric output of a production run corresponding with the production model, B. inputting a digital signal representative of a temporal or volumetric output of a task batch represented by a task associated with said production model, C. inputting a digital signal representative of a mathematical relationship between the production run output and the task batch output, and D. generating a digital signal representative of a number of said task batches required to complete said production run.

48. A method for operating a digital data apparatus according to claim 32, comprising the further steps of A. inputting a digital signal representative of a type of quantitative relation between a resource element consumed by a task and one or more resources produced by that same task, B. responding to said quantitative relation type-representative signal for selectively generating a digital signal representative of one of i. a linear quantitative relation between said consumed resource and said one or more produced resources, and ii. a step-function relation between said consumed resource and said one or more produced resources.

49. A method for operating a digital data apparatus according to claim 32, comprising the further steps of A. inputting a reportable-task signal indicating whether quantities of a resource produced by a task are reportable, and B. responding to said reportable task signal for selectively accepting input digital signals representative of quantities of resources produced by the task.

50. A method for operating a digital data apparatus according to claim 32, comprising the further steps of A. inputting and storing a digital signal representative of a quantity of a physical occurrence of a consumed resource element available for use in said manufacturing process, B. modifying said stored quantity-representative signal to reflect a quantity of said resource element consumed by said manufacturing process, and C. generating a digital signal representative of amounts of said resource element consumed by said manufacturing process in the production of said resource elements without modifying said stored quantity-representative signal.

51. A method for operating a digital data apparatus according to claim 32, comprising the further steps of A. inputting a digital signal representative of a quantity of a consumed resource used in a task associated with said production model, B. inputting a digital signal representative of a temporal duration of an operation associated with that task, and C. generating a digital signal establishing a relation between a quantity of a resource consumed in the task and the temporal duration of an operation associated with the task.

52. A method for operating a digital data apparatus according to claim 32, comprising the further step of generating and storing a digital signal representative of a production characteristic associated with at least one said resource, said production characteristic including one or more of a financial, operational, planning, and tracking attribute associated with the resource.

53. A method for operating a digital data apparatus according to claim 52, comprising the further step of generating a digital signal defining one or more said resources to have similar production characteristics.

54. A method for operating a digital data apparatus according to claim 53, comprising the further steps of A. generating a balance/non-balance signal representative of a tracking characteristic of a resource element, and B. responding to said balance/non-balance signal for selectively tracking physical occurrences of a resource element.

55. A method for operating a digital data apparatus according to claim 52, comprising the further step of generating a digital signal representing a location classification associated with a physical occurrence of a resource element, said location classification including one or more production characteristics.

56. A method for operating a digital data apparatus according to claim 55, comprising the further step of modifying a digital signal representative of one or more production characteristics associated with a physical occurrence of a resource element.

57. A method for operating a digital data apparatus according to claim 56, comprising the further step of modifying a digital signal which represents a physical occurrence of one resource element so as to represent a physical occurrence of another resource element and for, concurrently, modifying a production characteristic-representative signal associated with the physical occurrence-representative signal.

58. A method for operating a digital data apparatus according to claim 55, comprising the further step of inputting a digital signal representative of a user-defined location classification.

59. A method for operating a digital data apparatus according to claim 58, comprising the further step of modifying a user-defined location classification associated with a physical occurrence of said resource element.

60. A method for operating a digital data apparatus according to claim 52, comprising the further steps of A. inputting a digital signal representative of a standard unit of measure associated with a resource element, B. inputting a digital signal representative of a transaction unit of measure associated with a physical occurrence of said resource element, C. inputting a digital signal representative of conversion factor for converting a quantity representative of a physical occurrence of the resource element between the standard unit of measure associated with the resource element and the transaction unit of measure associated with the physical occurrence of the resource element, D. inputting a digital signal representative of quantity expressable in the transaction unit of measure and associated with a physical occurrence of a resource element, and E. converting that quantity-representative signal into a digital signal representative of an equivalent quantity expressable in the standard unit of measure and for generating a signal representative thereof.

61. A method for operating a digital data apparatus according to claim 52, comprising the further steps of A. inputting a digital signal representative of a standard unit of measure associated with a resource element, B. inputting a digital signal representative of a transaction unit of measure associated with a storage location for storing a physical occurrence of a resource element, C. inputting a digital signal representative of conversion factor for converting a quantity between the transaction unit of measure associated with the storage location and the standard unit of measure associated with a resource element stored in that storage location, D. inputting a digital signal representative of quantity expressable in the transaction unit of measure and associated with the storage of a physical occurrence of a resource element, and E. converting that quantity into an equivalent quantity expressable in the standard unit of measure and for generating a signal representative thereof.

62. A method for operating a digital data apparatus according to claim 52, comprising the further steps of A. inputting a digital signal representative of a theoretical quantity, at a predetermined level, of a consumed resource element required for production of a produced resource element, B. inputting a digital signal representative of a potency-percentage quantity of a physical occurrence of said consumed resource element, C. generating a digital signal representative of a physical quantity of said physical occurrence of said consumed resource element required for production, said physical quantity required signal being expressed in terms of said potency-percentage and being based upon the predetermined potency level.

63. A method for operating a digital data apparatus according to claim 52, comprising the further steps of A. inputting a digital signal representative of a grade requirement for a resource element consumed in the manufacturing process and for generating a grade-requirement signal representative thereof, B. inputting a digital signal representative of a grade-based characteristic of a physical occurrence of the resource element and for generating a grade-reporting signal representative thereof, C. responding to said grade-requirement signal and to said grade-reporting signal for generating a digital signal indicating whether the physical occurrence of the resource element is a candidate for use in the manufacturing process.

* * * * *

UNITED STATES PATENT AND TRADEMARK OFFICE
CERTIFICATE OF CORRECTION

PATENT NO. : 4,864,507

DATED : September 5, 1989

INVENTOR(S) : Ebling et al

It is certified that error appears in the above-identified patent and that said Letters Patent is hereby corrected as shown below:

Column 1, line 60, after "permitting" insert -- accurate --.

Column 3, line 14, replace "consumed an" with -- consumed and --.

Column 7, line 32, replace "from" with -- for --.

Column 1652, line 28, after "set of one" insert -- or more produced resources, said manufacturing relations including at least one of an operational relation, a planning relation, and a financial relation, D. generating and storing a production model comprising digital signals representative of one-to-one, one-to-many, many-to-one, and many-to-many manufacturing relations, and --.

UNITED STATES PATENT AND TRADEMARK OFFICE

CERTIFICATE OF CORRECTION

PATENT NO. : 4,864,507

DATED : September 5, 1989

INVENTOR(S) : Ebling et al

It is certified that error appears in the above-identified patent and that said Letters Patent is hereby corrected as shown below:

Column 1652, lines 29-34, replace "E. output means, coupled with said production modeling means and with said first and second input means, for generating output signals representative of at least selected portions of said manufacturing process, including manufacturing relations associated therewith" with -- E. generating output signals representative of at least selected portions of said manufacturing process, including manufacturing relations between resource elements included therein --.

Column 1653, line 50, replace "distributing" with -- distribution --.

Signed and Sealed this

Fourteenth Day of May, 1991

*Attest:*

HARRY F. MANBECK, JR.

*Attesting Officer* *Commissioner of Patents and Trademarks*